US012736962B1

(12) United States Patent
Ebrahimi Afrouzi et al.

(10) Patent No.: US 12,736,962 B1
(45) Date of Patent: Sep. 15, 2026

(54) SLAM ROBOT AND A PAIRED APPLICATION THEREOF

(71) Applicants: Ali Ebrahimi Afrouzi, Henderson, NV (US); Lukas Robinson, York (CA)

(72) Inventors: Ali Ebrahimi Afrouzi, Henderson, NV (US); Lukas Robinson, York (CA)

(73) Assignee: AI Incorporated, Toronto (CA)

( * ) Notice: Subject to any disclaimer, the term of this patent is extended or adjusted under 35 U.S.C. 154(b) by 672 days.

(21) Appl. No.: 17/990,743

(22) Filed: Nov. 21, 2022

Related U.S. Application Data

(60) Provisional application No. 63/412,486, filed on Oct. 2, 2022, provisional application No. 63/404,660, filed (Continued)

(51) Int. Cl.

| | |
|---|---|
| ***G05D 1/00*** | (2024.01) |
| ***A47L 9/00*** | (2006.01) |

(Continued)

(52) U.S. Cl.

CPC .......... *G05D 1/0044* (2013.01); *A47L 9/0063* (2013.01); *A47L 9/009* (2013.01); *A47L 9/149* (2013.01); *A47L 9/2826* (2013.01); *A47L 9/2842* (2013.01); *A47L 9/2852* (2013.01); *A47L 9/2873* (2013.01); *A47L 9/2894* (2013.01); *A47L 11/28* (2013.01); *A47L 11/4005* (2013.01); *A47L 11/4011* (2013.01); *A47L 11/4016* (2013.01); *A47L 11/4055* (2013.01); *A47L 11/4061* (2013.01);

(Continued)

(58) Field of Classification Search

CPC ...... G05D 1/00; G05D 1/0044; G05D 1/0016; G05D 1/0214; G05D 1/0221; G05D 1/0225; G05D 1/038; G06V 20/58; G06V 10/82; A47L 9/0063; A47L 9/009; A47L 9/149; A47L 9/2826; A47L 9/2842; A47L 9/2852; A47L 9/2873; A47L 9/2894; A47L 11/28; A47L 11/4005; A47L 11/4011; A47L 11/4016; A47L 11/4055; A47L 11/4061; A47L 11/4083; A47L 11/4091; A47L 2201/024; A47L 2201/026; A47L 2201/028; A47L 2201/04; A47L 2201/06

See application file for complete search history.

(56) References Cited

U.S. PATENT DOCUMENTS 10,482,619 B2 * 11/2019 Ebrahimi Afrouzi .. G06V 20/64
10,539,960 B2 * 1/2020 Bauer ................ G01C 21/3848

(Continued)

*Primary Examiner* — Andrew Joseph Rudy

(57) ABSTRACT

A method of composing a plurality of semi-enclosed floor surface constituents for digitally representing a fully enclosed floor surface on a screen of a smart computing device paired with a robot. The method includes composing digital representations of boundary lines of the floor surface by organizing a swarm of points to form the boundary lines, composing digital representations of the plurality of semi-enclosed floor surface constituents by organizing the digital representations of the boundary lines as they are composed to form the digital representations of the plurality of semi-enclosed floor surface constituents, and composing the digital representation of the fully enclosed floor surface using the digital representations of the plurality of semi-enclosed floor surface constituents as they are composed.

57 Claims, 414 Drawing Sheets

Related U.S. Application Data on Sep. 8, 2022, provisional application No. 63/403,821, filed on Sep. 5, 2022, provisional application No. 63/396,538, filed on Aug. 9, 2022, provisional application No. 63/331,182, filed on Apr. 14, 2022, provisional application No. 63/321,686, filed on Mar. 19, 2022, provisional application No. 63/315,158, filed on Mar. 1, 2022, provisional application No. 63/304,887, filed on Jan. 31, 2022, provisional application No. 63/293,917, filed on Dec. 27, 2021, provisional application No. 63/289,473, filed on Dec. 14, 2021, provisional application No. 63/281,661, filed on Nov. 20, 2021.

(51) Int. Cl.

| | |
|---|---|
| ***A47L 9/14*** | (2006.01) |
| ***A47L 9/28*** | (2006.01) |
| ***A47L 11/28*** | (2006.01) |
| ***A47L 11/40*** | (2006.01) |
| ***G06V 10/82*** | (2022.01) |
| ***G06V 20/58*** | (2022.01) |

(52) U.S. Cl.

CPC ....... *A47L 11/4083* (2013.01); *A47L 11/4091* (2013.01); *G05D 1/0016* (2013.01); *G05D 1/0214* (2013.01); *G05D 1/0221* (2013.01); *G05D 1/0225* (2013.01); *G05D 1/0238* (2013.01); *G06V 10/82* (2022.01); *G06V 20/58* (2022.01); *A47L 2201/022* (2013.01); *A47L 2201/024* (2013.01); *A47L 2201/026* (2013.01); *A47L 2201/028* (2013.01); *A47L 2201/04* (2013.01); *A47L 2201/06* (2013.01)

(56) References Cited

U.S. PATENT DOCUMENTS

| | | | | |
|---|---|---|---|---|
| 11,378,693 | B2 * | 7/2022 | Coddington ............ | G01S 17/42 |
| 12,094,145 | B2 * | 9/2024 | Ebrahimi Afrouzi ... | G06T 7/136 |
| 2002/0131770 | A1 * | 9/2002 | Meier .................. | H04N 1/6097 386/302 |
| 2020/0047337 | A1 * | 2/2020 | Williams ............... | B25J 9/1676 |

* cited by examiner

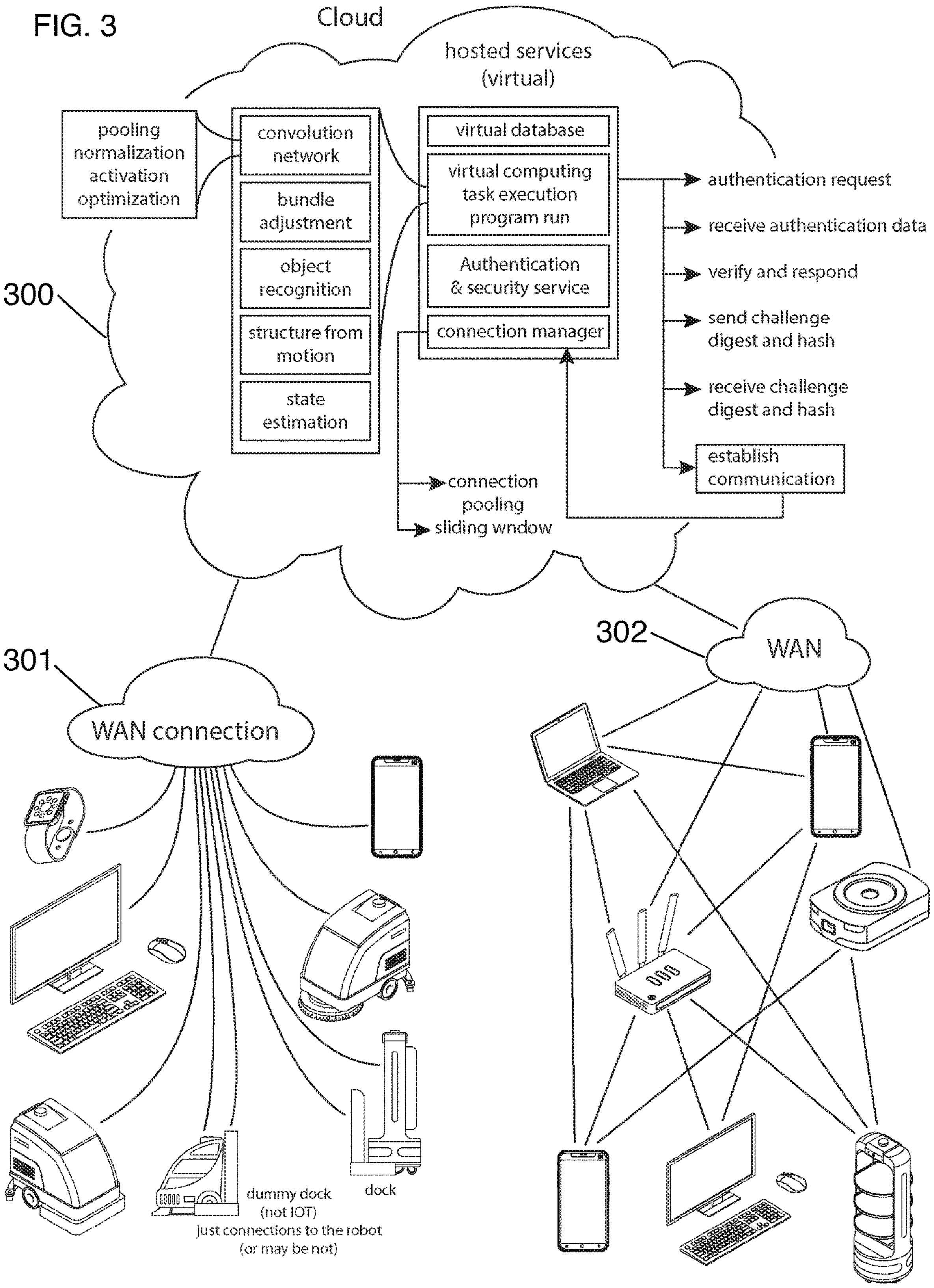

FIG. 3
Cloud
hosted services
(virtual)
pooling
normalization
activation
optimization
convolution
network
bundle
adjustment
object
recognition
structure from
motion
state
estimation
virtual database
virtual computing
task execution
program run
Authentication
& security service
connection manager
authentication request
receive authentication data
verify and respond
send challenge
digest and hash
receive challenge
digest and hash
establish
communication
connection
pooling
sliding wndow
300
301
302
WAN connection
WAN
dummy dock
(not IOT)
just connections to the robot
(or may be not)
dock I²C
SPI
UART
processor
threads
SLAM
mapping
& localization
Control
go left / right
Application
cleaning
applying detergent
Video
encoding
Audio
encoding
UART
data rate manager
data shaper
data policer
cellular
LTE
wifi 1 | 2.4 GHz
wifi 2 | 5 GHz
established based on
priority
or / and
connection pooling
symmetric
asymmetric Code compatibility with different operating systems

FIG. 9

Expedited Map Completion and Display

| Time and coverage required to generate a complete map in a complex environment | Real Time SLAM Navigational Stack | Traditional SLAM |
|---|---|---|
| Time to map entire area (less is better) | 11.2 minutes | > 60 minutes |
| Area travelled in order to build complete map (less is better) | 12% | >100% |

On average: area was mapped in 11.5 minutes with 12% coverage in this extremely complex/large space (Standard IEC room mapped in only 2.2 minutes )

Intended trajectory
17003
Picture 2
Picture 1
Picture 3
17004
17001
17003
17000
17002
17003

17003
Picture 2 with adjusted orientation
Picture 1
Picture 3
17001
17004
17003
17000
17002
17003

Object identification based on depth data highlighted area in 1st run > highlighted area in 2nd run > highlighted area in 3rd run more runs = more alignment with contour 6601
vector map portion loaded to primary memory
6602
robot
6600
6603
6604

6704
grid map
vector map
not superimposed
6702
6703
feature map + grid map
6705
100 ms
predictions
for a
participant
6701
vector map
superimposed
with participant
6700
robot's own
predictions
in next 100 ms

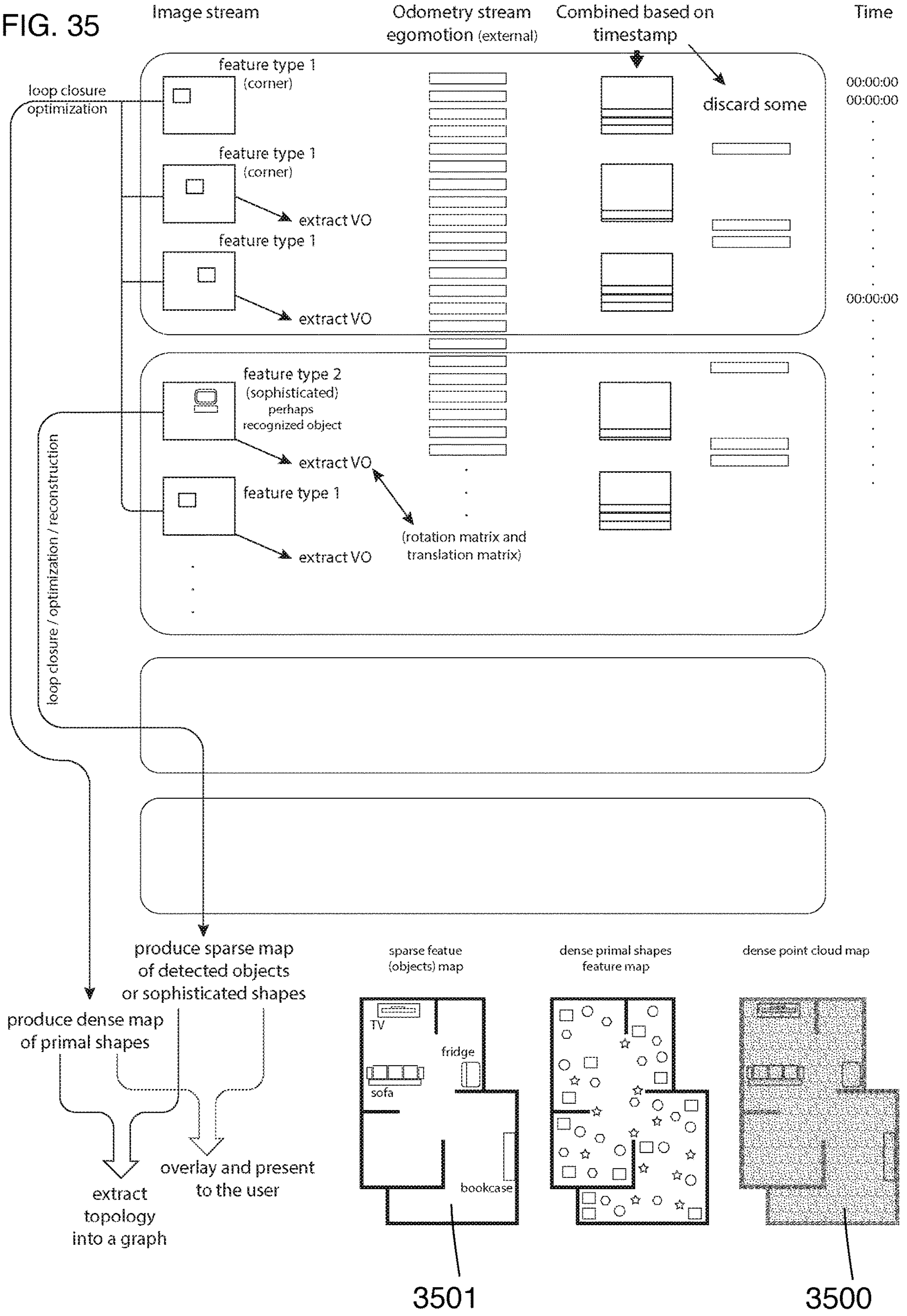

FIG. 35
Image stream
Odometry stream
egomotion (external)
Combined based on
timestamp
Time
feature type 1
(corner)
loop closure
optimization
discard some
00:00:00
00:00:00
feature type 1
(corner)
extract VO
feature type 1
extract VO
00:00:00
feature type 2
(sophisticated)
perhaps
recognized object
extract VO
feature type 1
extract VO
(rotation matrix and
translation matrix)
loop closure / optimization / reconstruction
produce sparse map
of detected objects
or sophisticated shapes
produce dense map
of primal shapes
extract
topology
into a graph
overlay and present
to the user
sparse featue
(objects) map
TV
fridge
sofa
bookcase
dense primal shapes
feature map
dense point cloud map
3501
3500

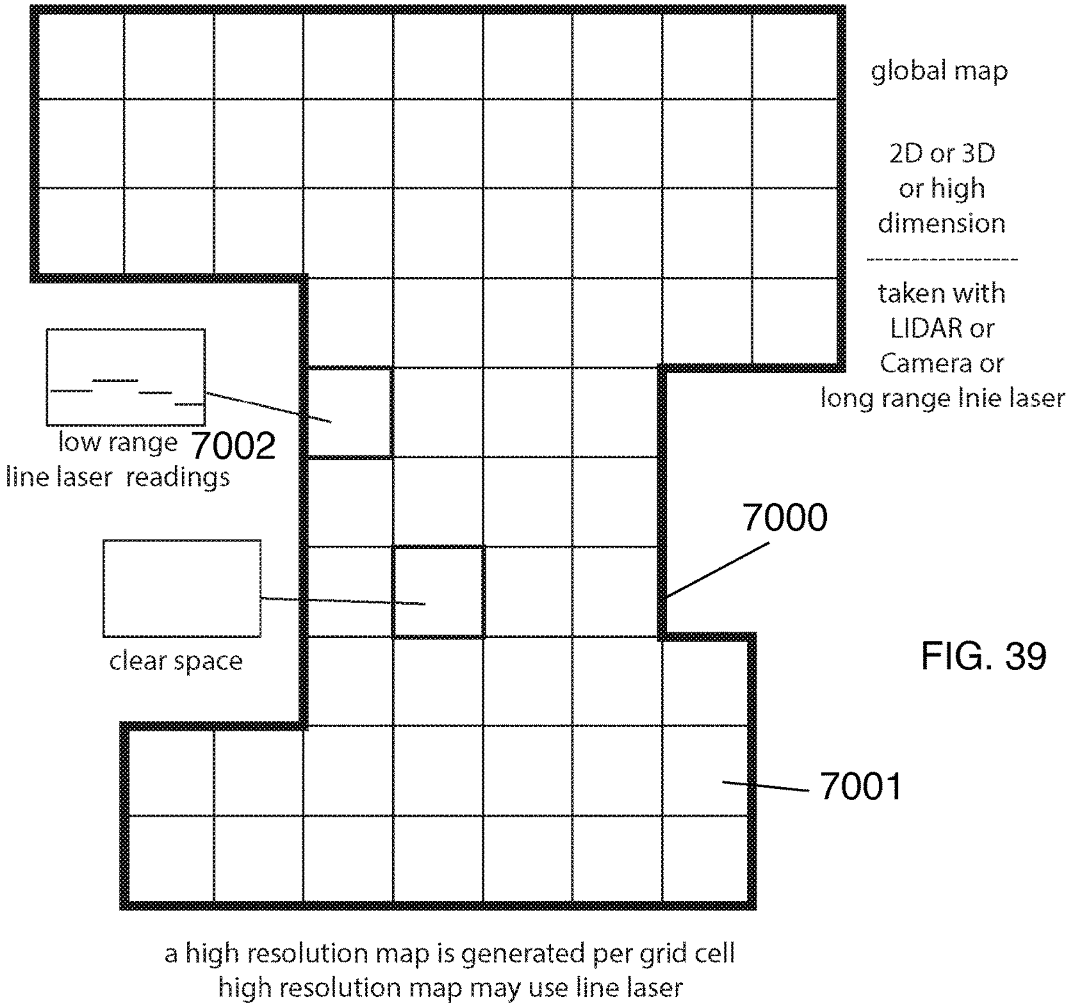
FIG. 39
FIG. 40
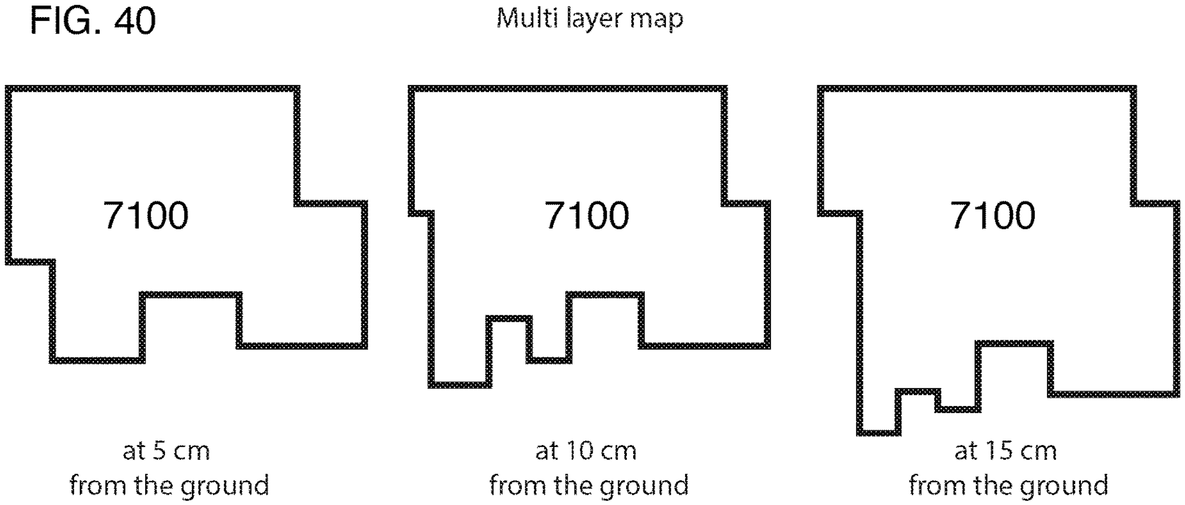

FIG. 41
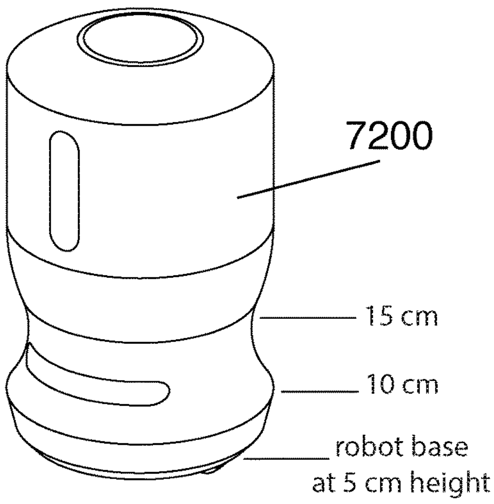
FIG. 42A
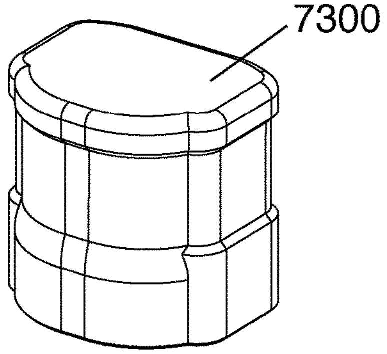
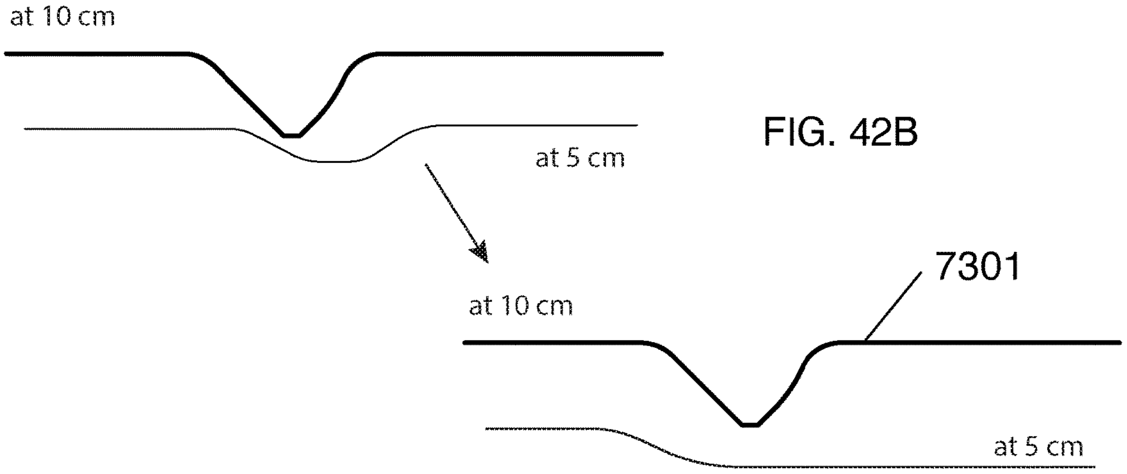
FIG. 42B

VS

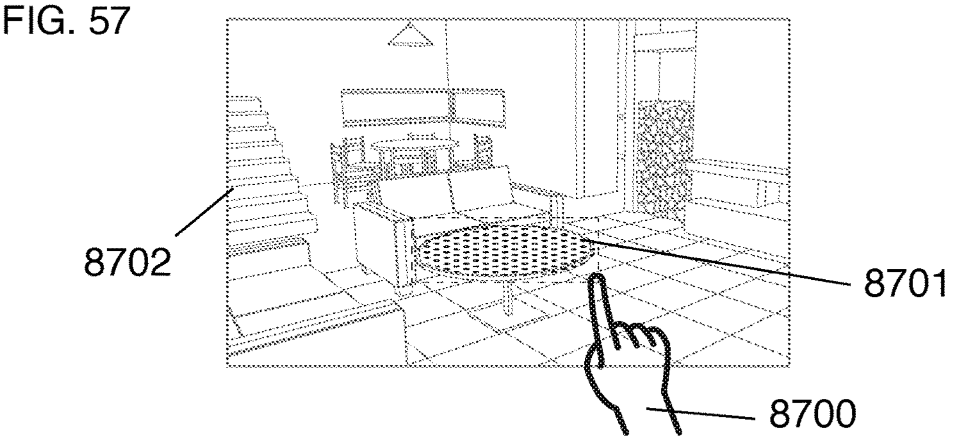

FIG. 57

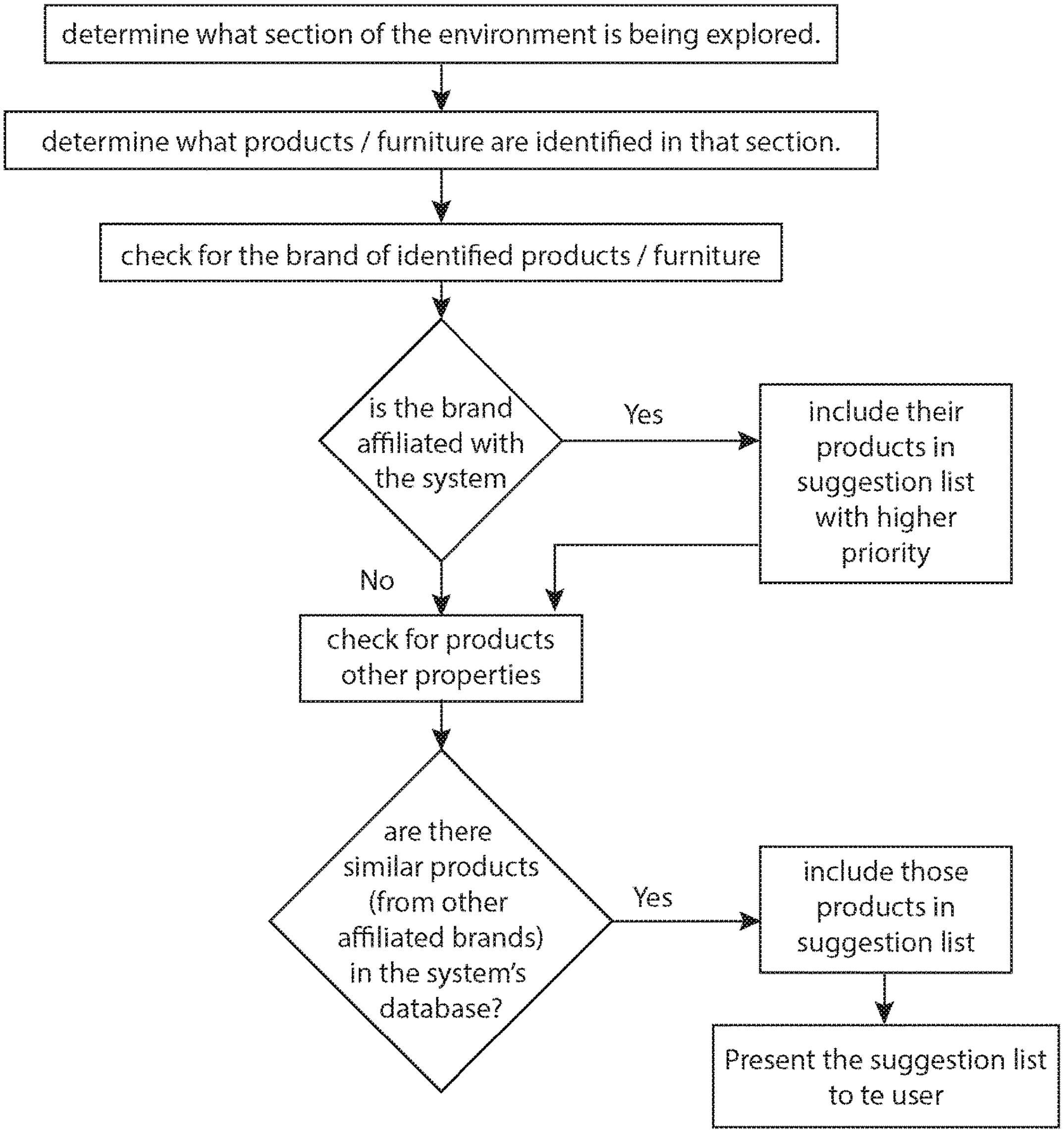

FIG. 58 determine what section of the environment is being explored.

determine what products / furniture are identified in that section.

check for the brand of identified products / furniture is the brand affiliated with the system Yes include their products in suggestion list with higher priority No check for products other properties are there similar products (from other affiliated brands) in the system's database?

Yes include those products in suggestion list

Present the suggestion list to te user

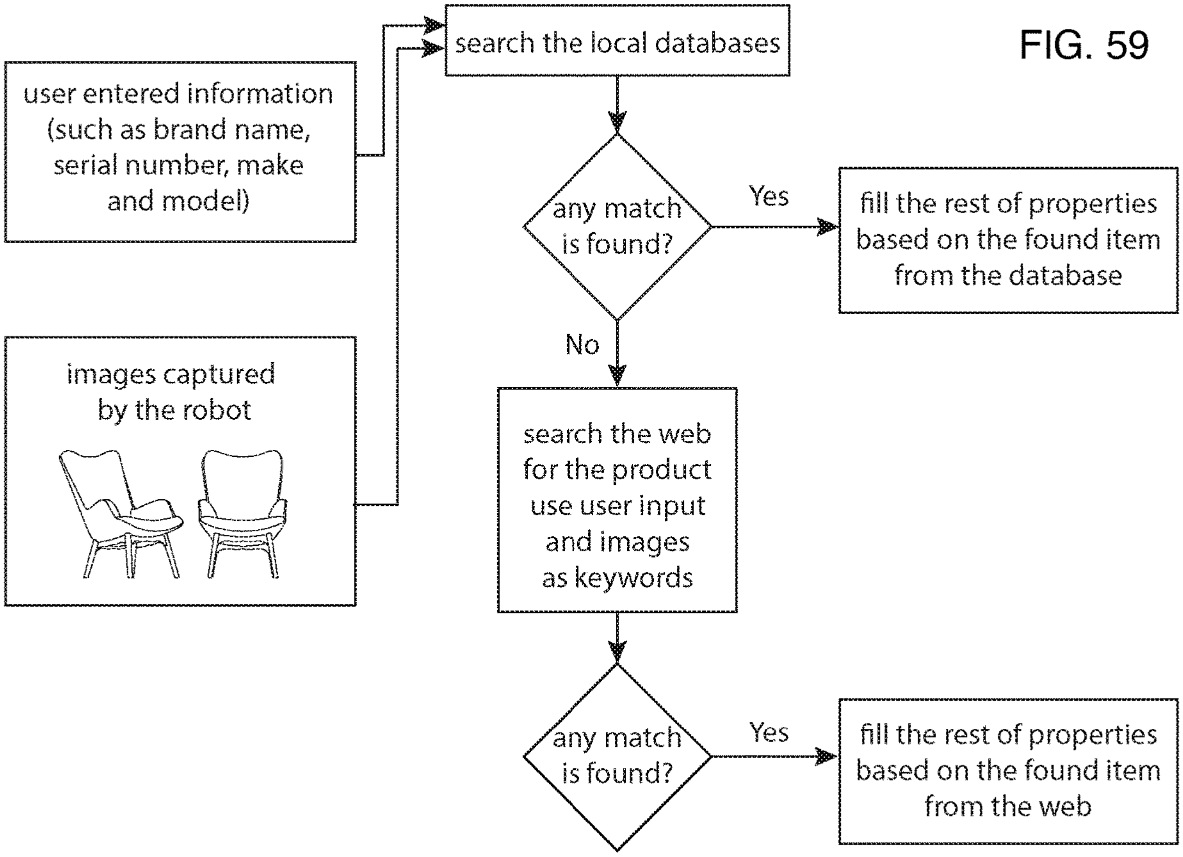
FIG. 59
FIG. 60
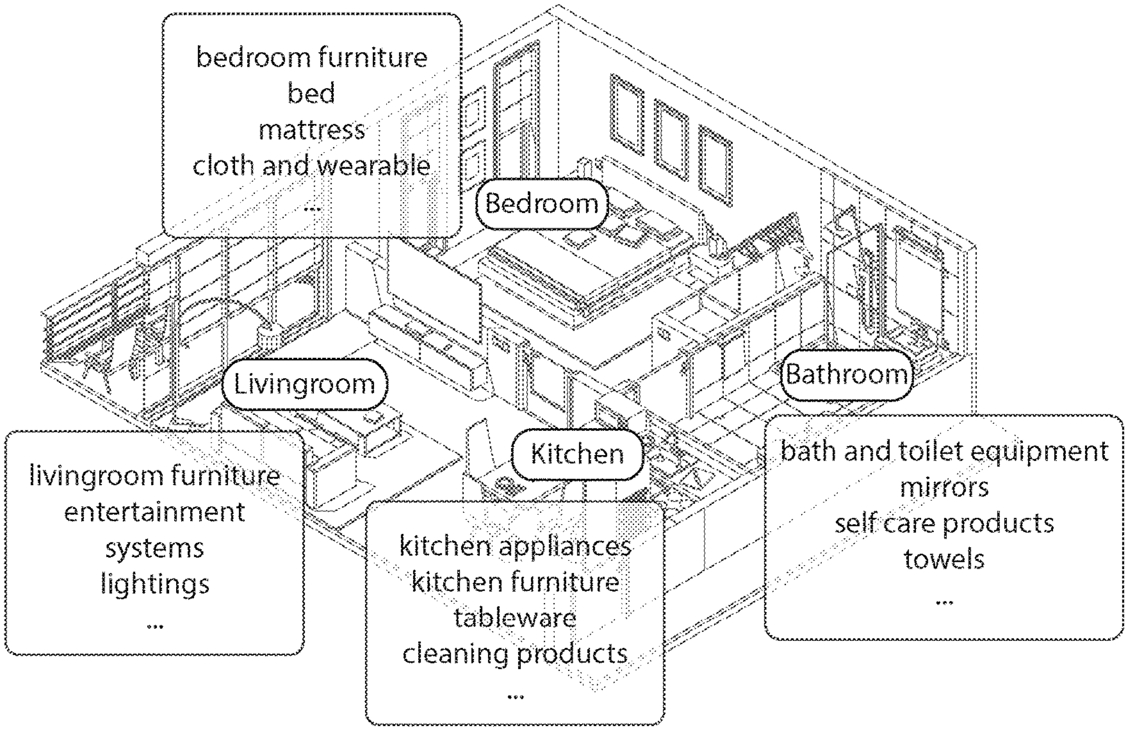

A.
B.
C.
D.
9200
9201
9202
9203
9204
Look what we found for you!!
office chair [chair name]
[brand name]
product description
would you like to try this chair for a month?
(No strings attached!)
Yes!
No
Maybe later
would you like to purchase this chair for $146.35*
or $29.27 / month for 5 month
More options E.
office chair [chair name]
[brand name]
product description
colors
9204
Promo code:
Add to cart
Financing options
Related items
Product reviews
F.
9204
Best Seller
office chair
[chair name]
[brand name]

A.
9300
B.
Look what we found for you!!
9301

FIG. 67A
FIG. 67B
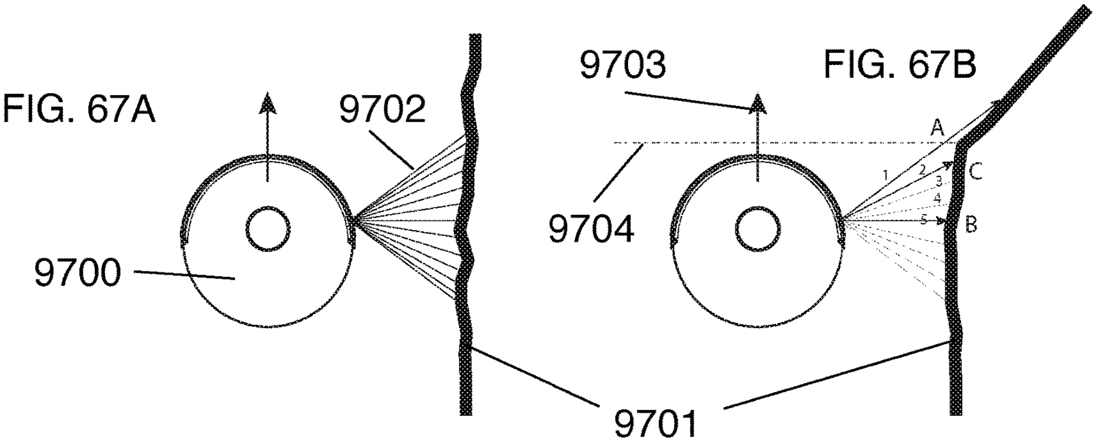
FIG. 68
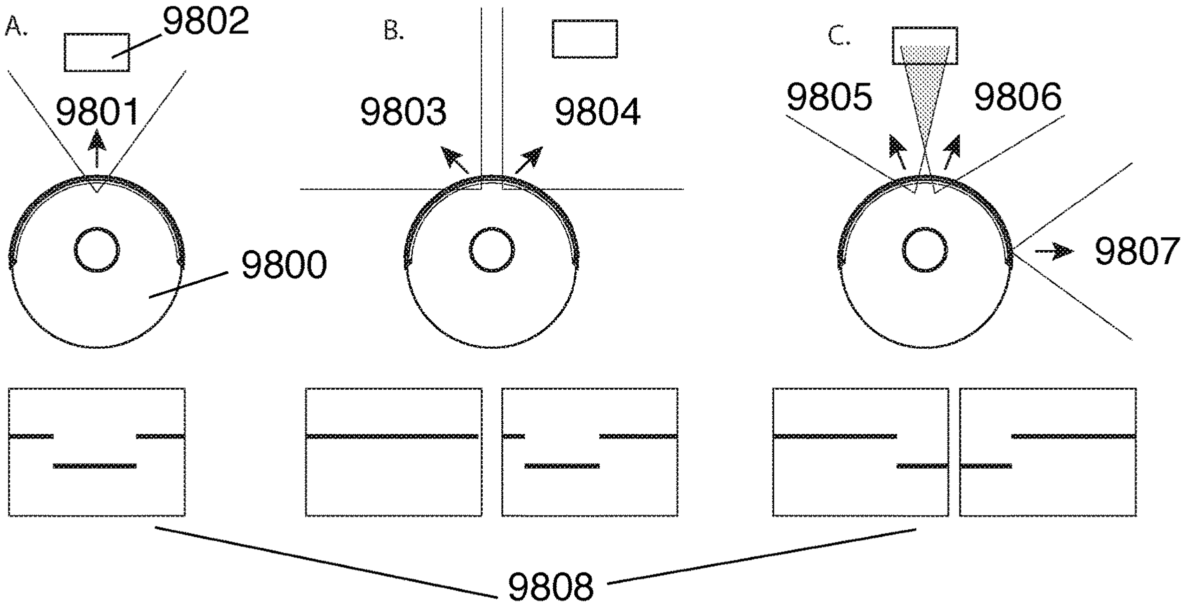
9702
9700
9703
9704
A
C
B
1
2
3
4
5
9701
A.
9802
9801
9800
B.
9803
9804
C.
9805
9806
9807
9808

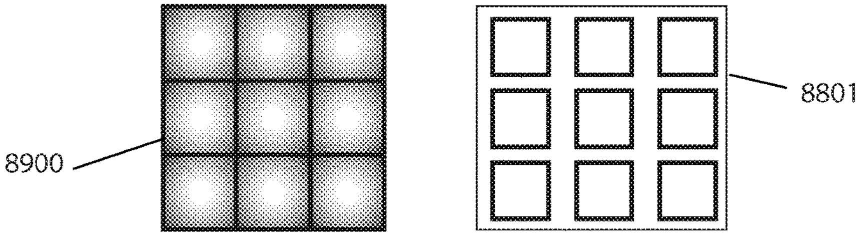

FIG. 75
8900
8801

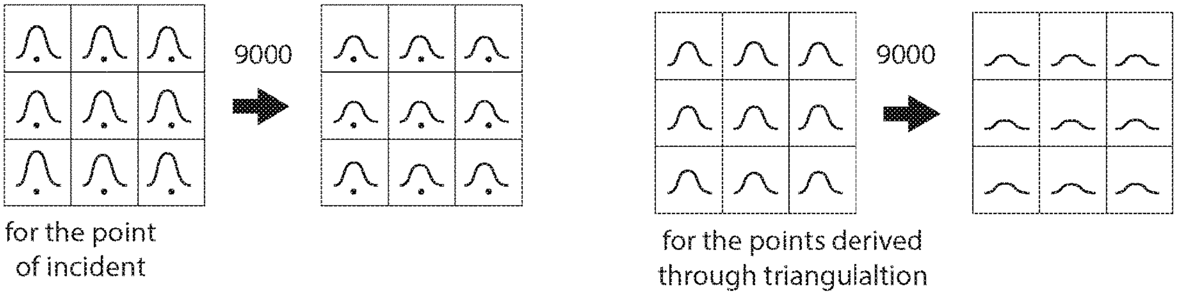

FIG. 76
9000
for the point of incident
9000
for the points derived through triangulaltion

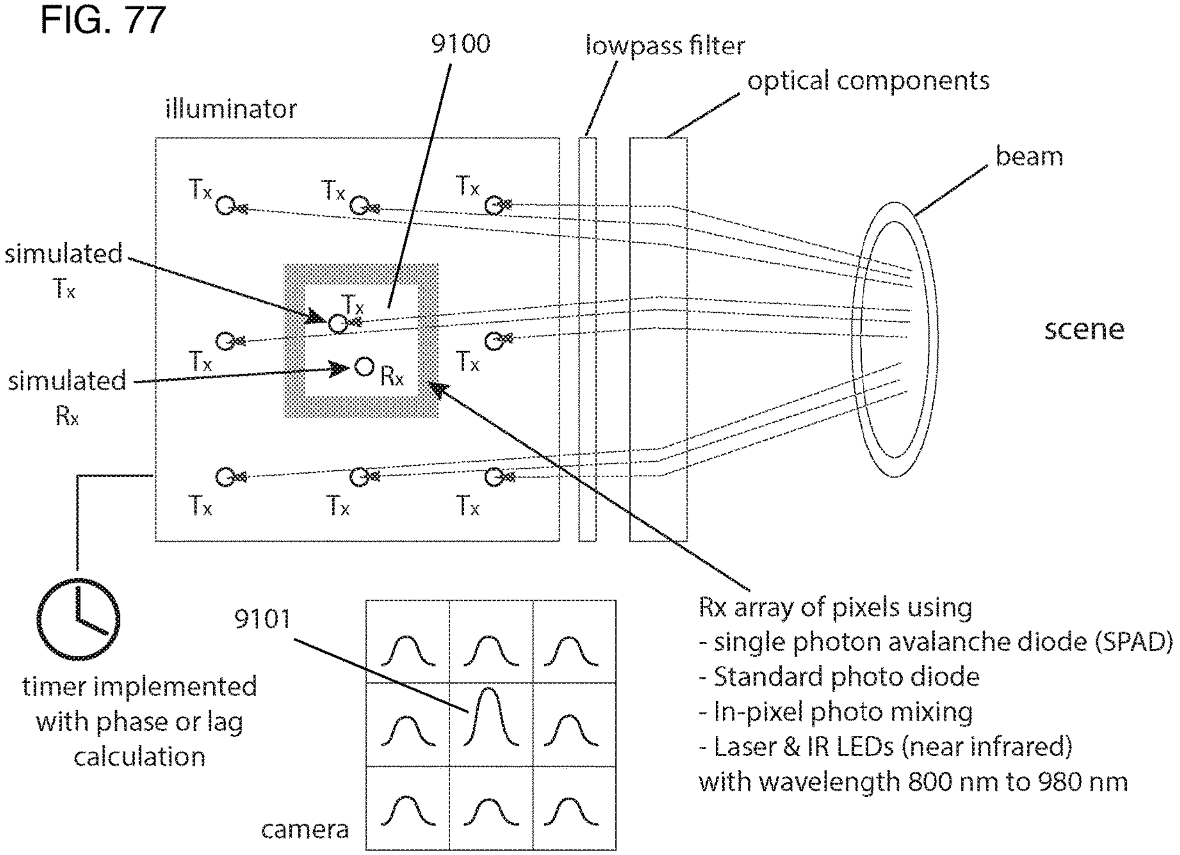

FIG. 77
9100
lowpass filter
optical components
illuminator
beam
Tx
simulated Tx
Rx
scene
simulated Rx
timer implemented with phase or lag calculation
9101
camera
Rx array of pixels using
- single photon avalanche diode (SPAD)
- Standard photo diode
- In-pixel photo mixing
- Laser & IR LEDs (near infrared)
with wavelength 800 nm to 980 nm 9401
9400
9403
9402
9402

9405
9401
9404

9501
side brush 2
side brush 1
9502
9502
side brush 1
cleans the wall
side brush 2
cleans the wall
9500

13402
toy box
13404
13400
13401
13403
living room box
where the TV
remote goes

Is this a things
box ?
13600
13502
Yes
No
Is this a things
box ?
13503
13504
13500
13501 network
virtualized server array
13701
13702
13703
NIC card
wireless card
13700
computer:
13706
real time
controller
on target ML
supervised ML
unsupervised ML
real time classification
based on full or partial
observability
ML libraries & algorithms
database storage
13705
class 3
class 2
class 1
class 4
4 3 2 1
Neural net
labeled
data
13704
classifier 13802
13805
13803
13804
13801
13800 object database
object book keeping
object loop closure
14700
14701
sensor input data
Robot operation
Current status
Analysis
Selection
Plan
Navigate
Notify
Validate 14801
14800
14801
14803
14804

15300
15301
cleaning robot
bigger footprint
moves slower
neds more power to move
15302
scout robot
smaller
can move faster
15305
dirty or sticky
spot
15303
person
15304
person with shopping cart frame 1
frame 2
flavor of Kalman filter
15500
B
B
G
G
R
2D
15500
R
2D
distance
combine geometrically
3D blue featue
3D blue featue
3D green featue
3D green featue
3D red featue
3D red featue
...
movement of blue feature
movement of green feature
movement of red feature

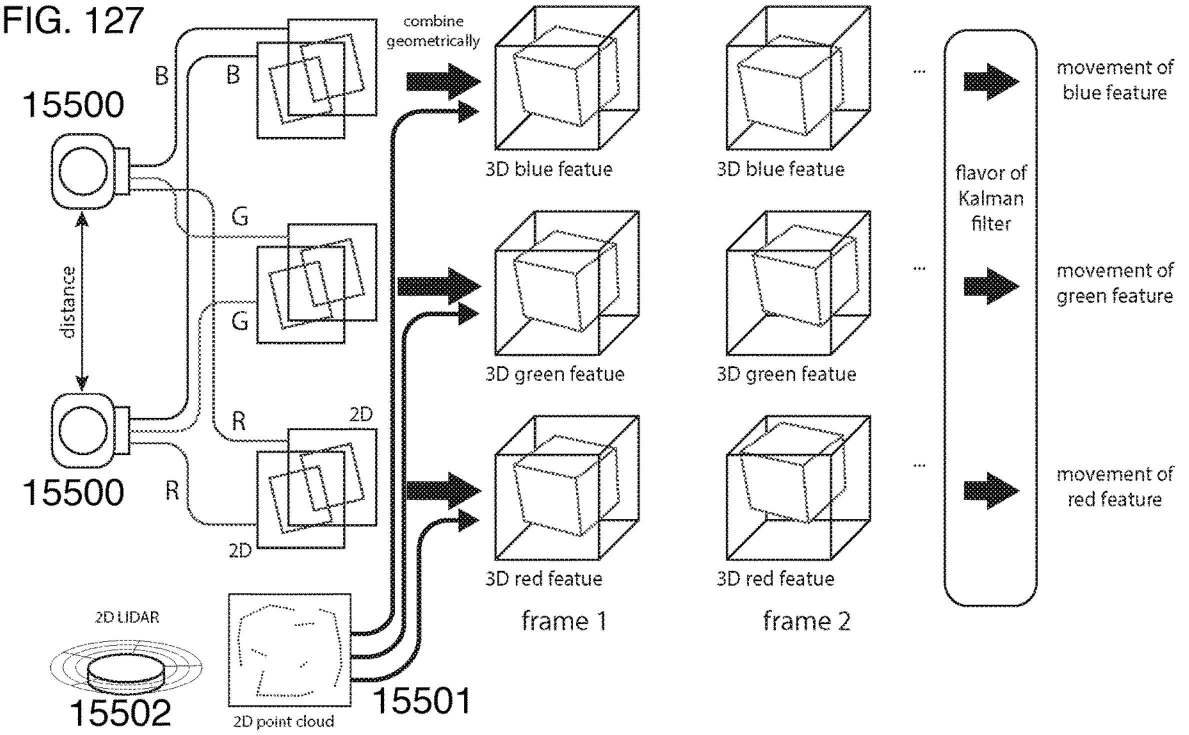

FIG. 127
15500
B
B
combine geometrically
3D blue featue
3D blue featue
movement of blue feature
flavor of Kalman filter
distance
G
G
3D green featue
3D green featue
movement of green feature
15500
R
R
2D
2D
3D red featue
3D red featue
movement of red feature
frame 1
frame 2
2D LIDAR
15502
2D point cloud
15501

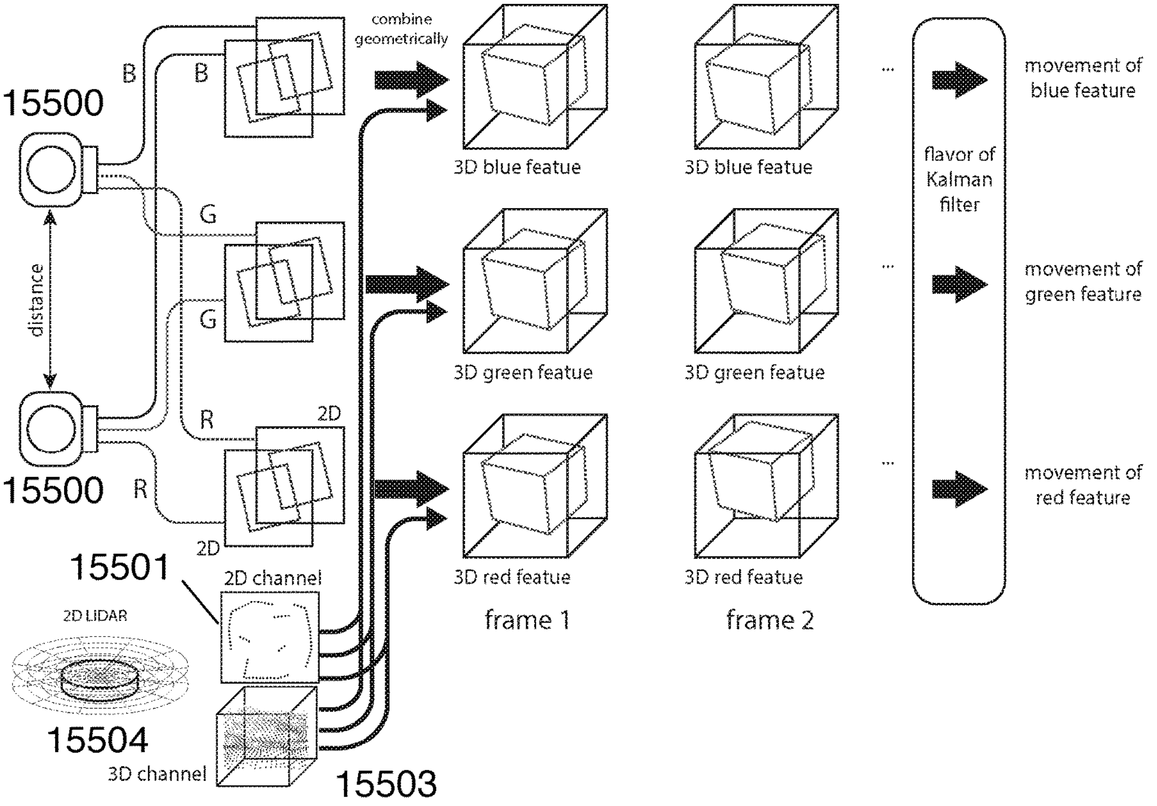

FIG. 128
15500
B
B
combine geometrically
3D blue featue
3D blue featue
movement of blue feature
flavor of Kalman filter
distance
G
G
3D green featue
3D green featue
movement of green feature
15500
R
R
2D
2D
3D red featue
3D red featue
movement of red feature
frame 1
frame 2
15501
2D channel
2D LIDAR
15504
3D channel
15503

FIG. 145
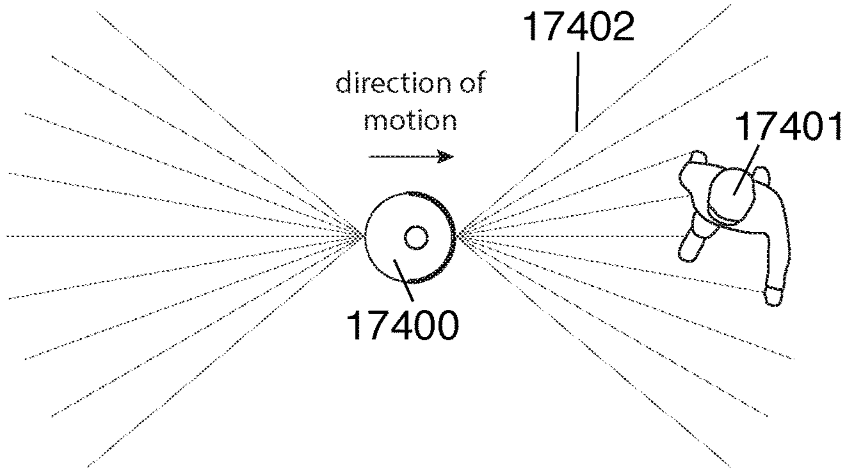
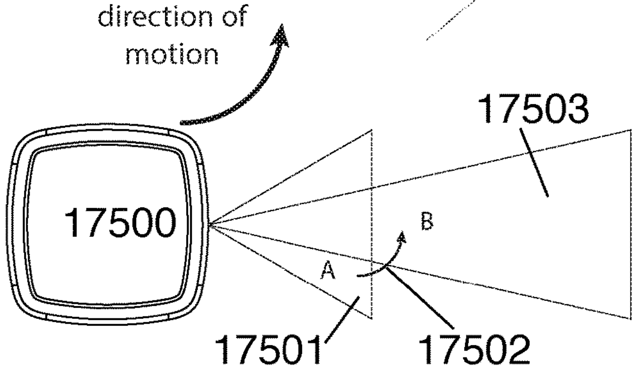
FIG. 146

FIG. 147
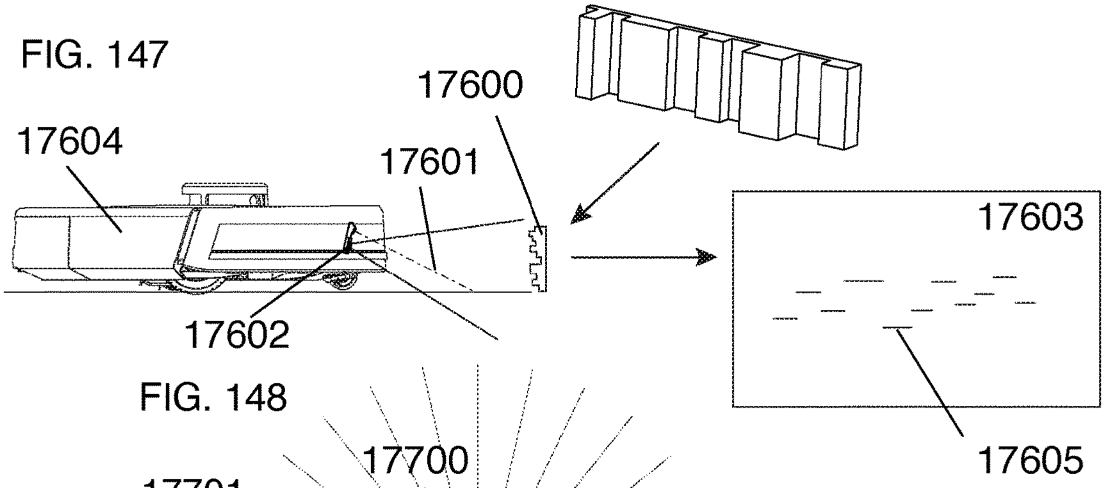
FIG. 148
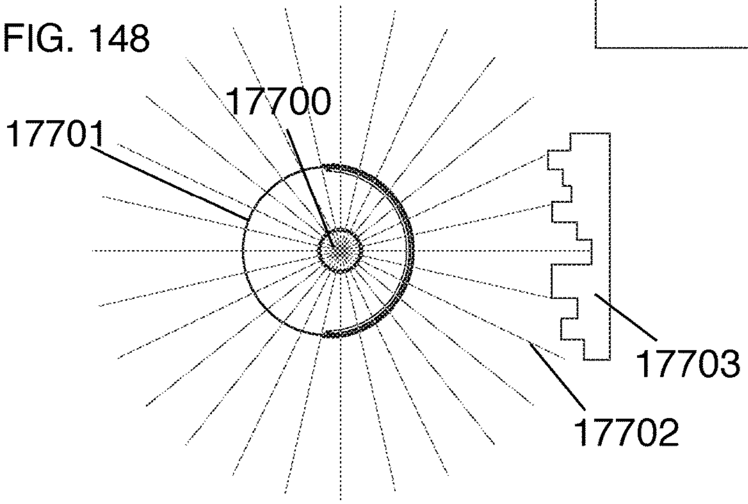
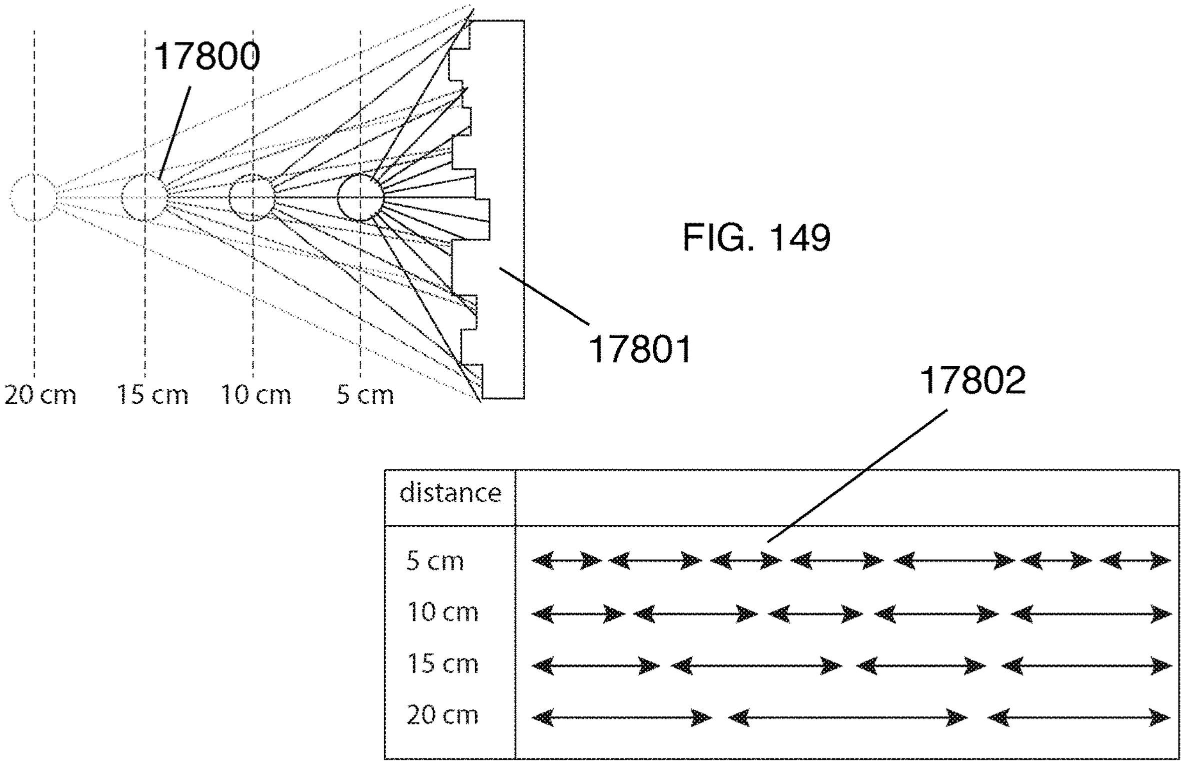
FIG. 149
17600
17604
17601
17603
17602
17605
17700
17701
17703
17702
17800
17801
20 cm
15 cm
10 cm
5 cm
17802
distance
5 cm
10 cm
15 cm
20 cm A.
18601
18602
18600
B.
turns 180 degrees
backward dock
for auto empty
using IR sensors
C.

unlevel surface
18701
18700
18704
18703
slight slope
18702

18800
No distortion
QRcode view
from the front
18802
18801
some distortion

FIG. 164B
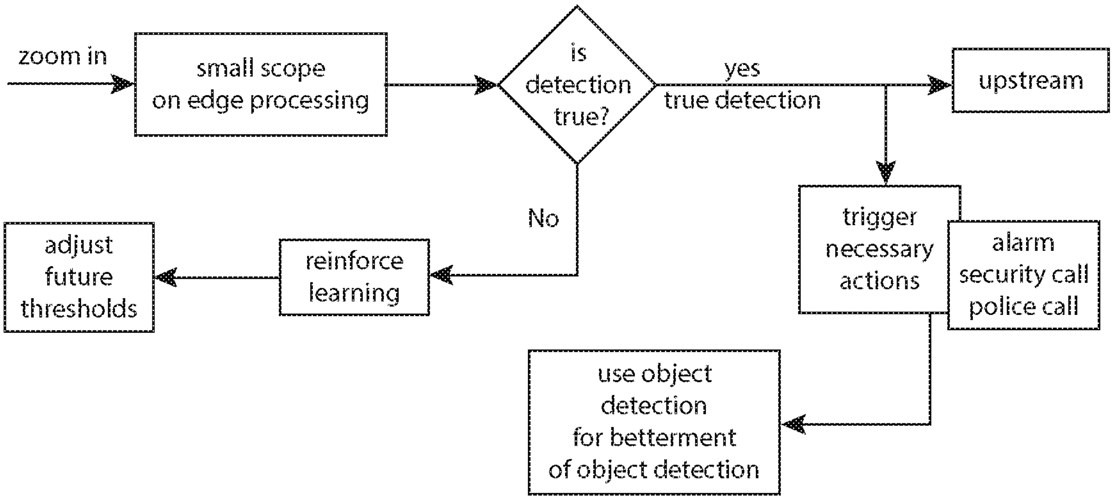
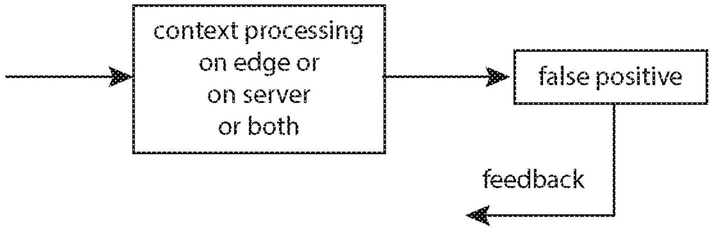

FIG. 166A
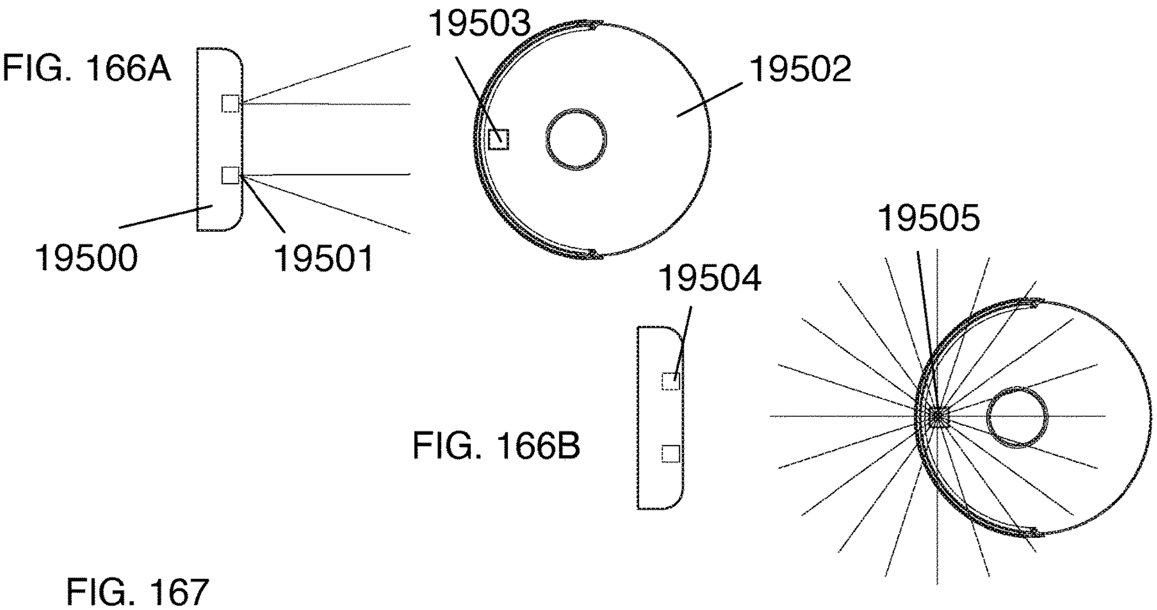
FIG. 166B
FIG. 167
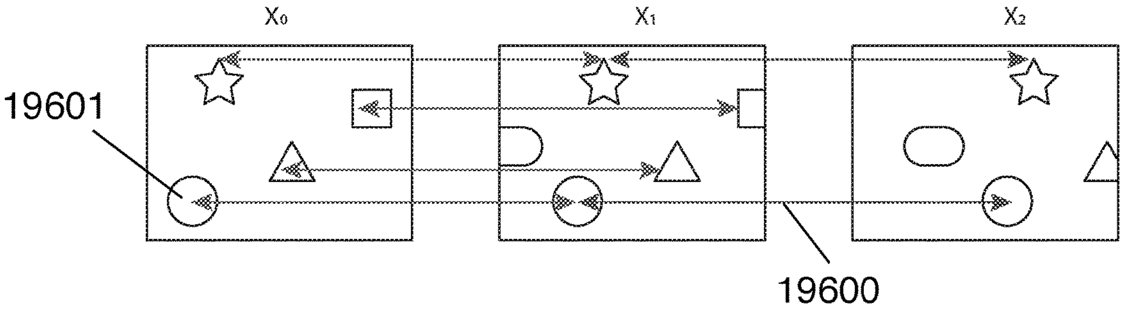
FIG. 168
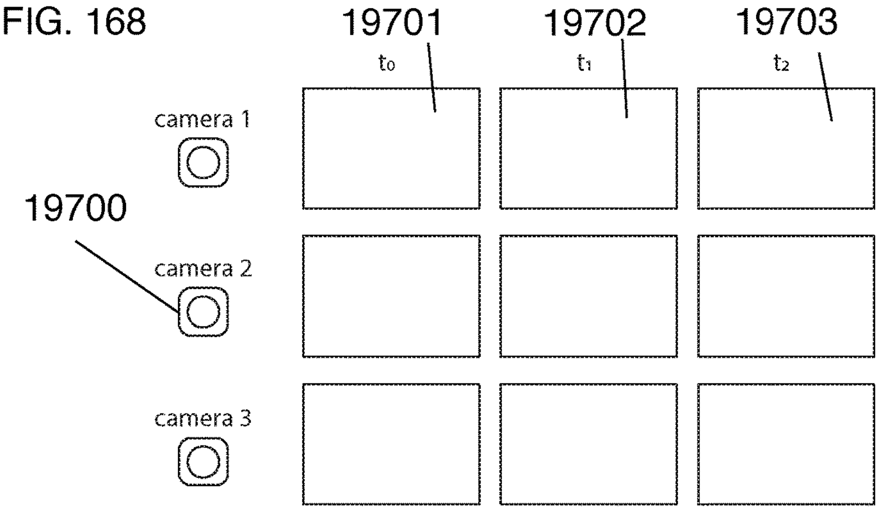
19503
19502
19500
19501
19505
19504
X0
X1
X2
19601
19600
19701
19702
19703
t0
t1
t2
camera 1
19700
camera 2
camera 3

19701
19702
19703
t0
t1
t2
camera 1
camera 2
camera 3
19700
merge
merge
merge
19705
19706
19707
compare
compare 19700
t0
t1
t2
t3
t4
t5
camera 1
camera 2
camera 3
19701
19702
19703
step 1
step 2

Localization arbitrator
Calculate confidence level of localization
above threshold
Examine alternative localization candidates
Success?
Initiate relocalization
Success?
arbitrait next action
ETC.
Bread crumb back to last known good localization
Coastal navigation back
Generate multiple hypothesis simulations & examine them

RUN 1

RUN 2

AP1
AP2
AP3
AP4
AP5
AP6
d1
d2
d3
d4
d5
Strong
Weak
Strength of each AP
AP3
AP2
AP1
AP4
15103
15102
15101
15100
Floor map
RUN 1
RUN 2

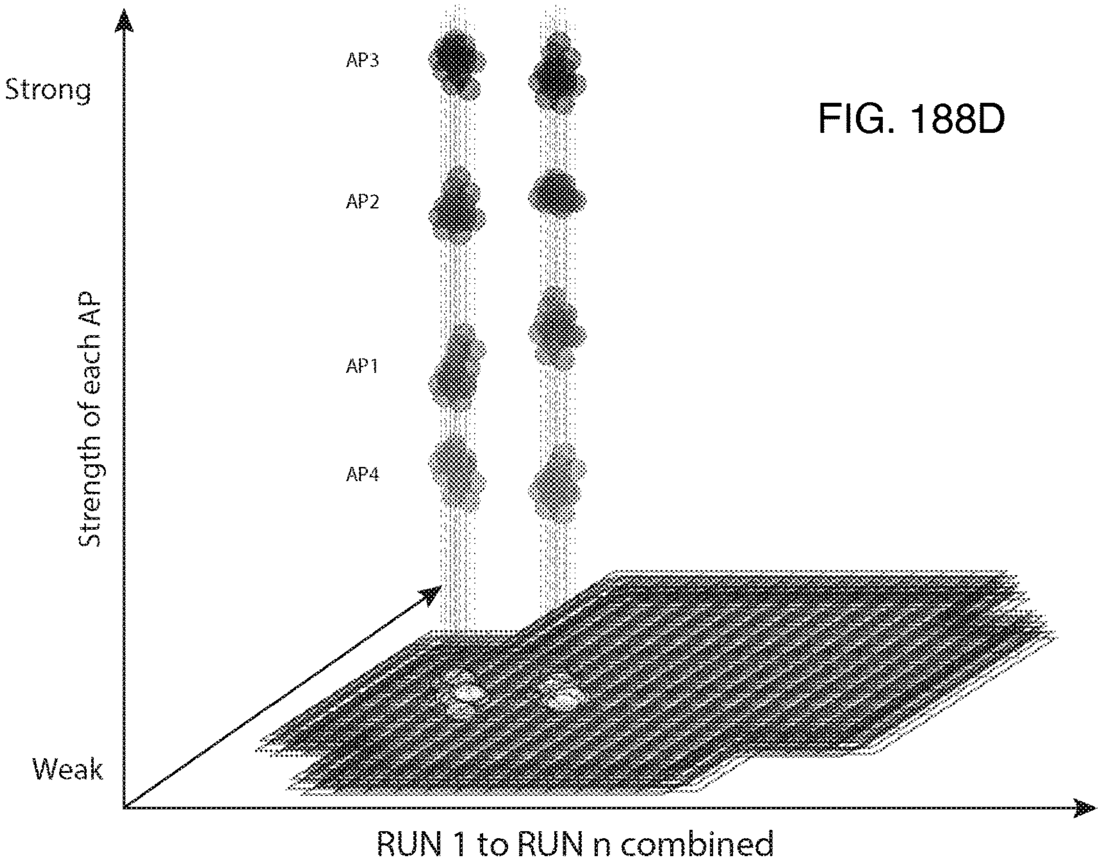
FIG. 188D
FIG. 189
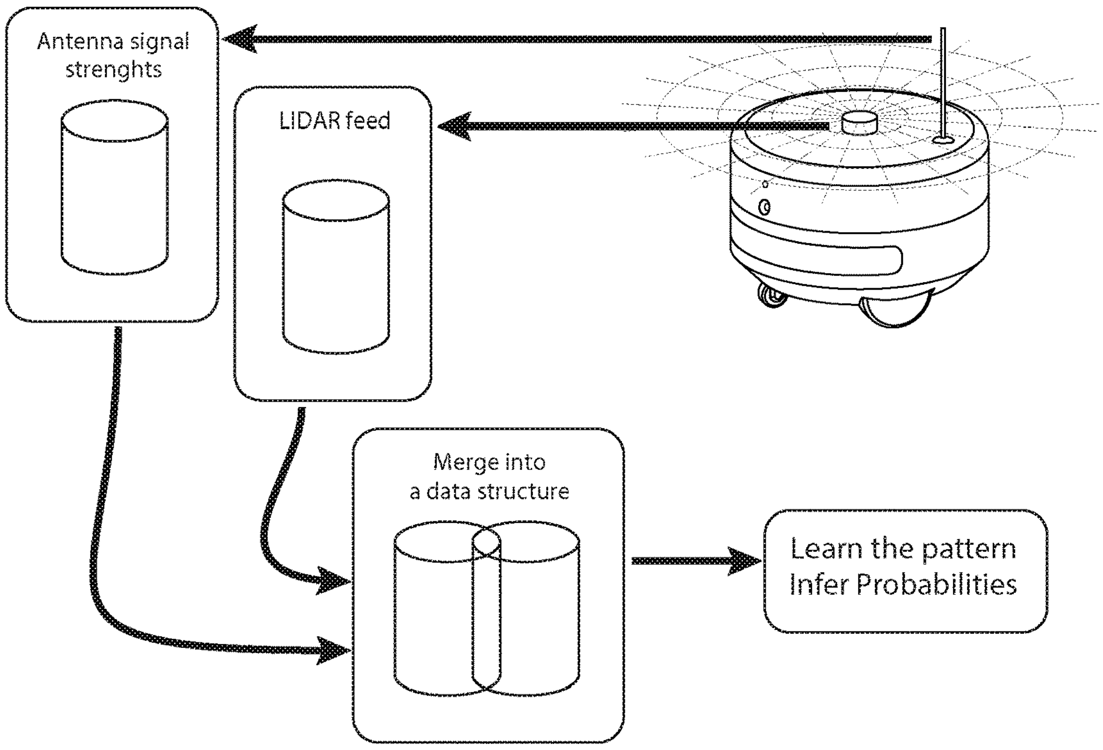

FIG. 197 teleport resilience rate - IEC

| | SS L2 QSLAM | SS L2 LD | SS LSB | LD 2nd gen (FD LR851) | Roborock S7+ | Neato D10 |
|---|---|---|---|---|---|---|
| 1m | 4/4 | 1/4 | 4/4 | 4/4 | 4/4 | 1/4 |
| 2m | 4/4 | | 2/4 | 1/4 | 2/4 | |
| 3m | 3/4 | | | | | |

teleport resilience rate - IEC

| | Dreambot L10 | Shark LIDAR | Midea M7 | Ecovacs Deebot | Eufy robovac | Samsung Jetbot |
|---|---|---|---|---|---|---|
| 1m | 4/4 | 4/4 | 0/4 | 0/4 | 0/4 | 0/4 |
| 2m | 1/4 | 3/4 | | | | |
| 3m | | | | | | |

FIG. 198
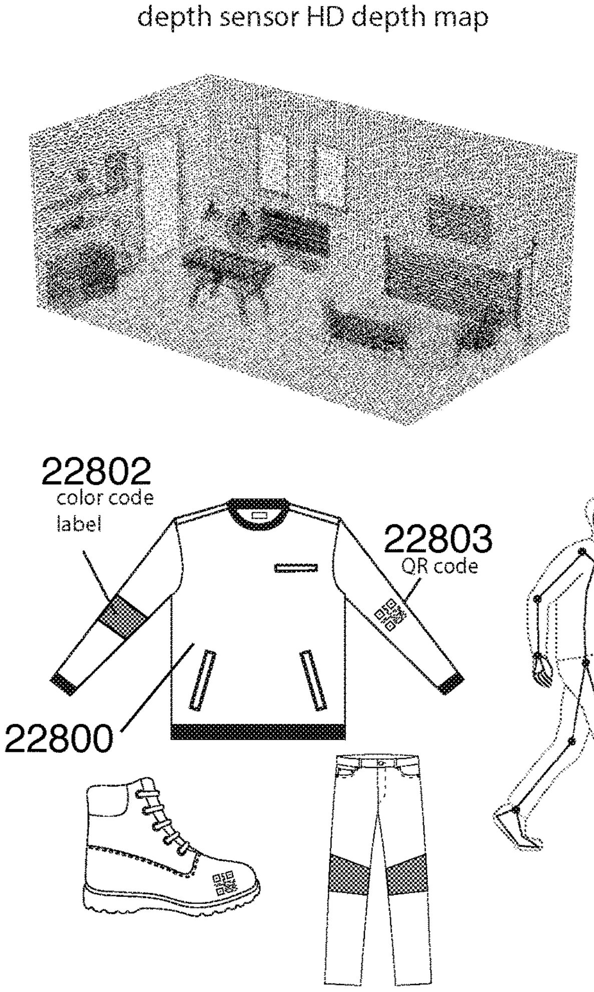
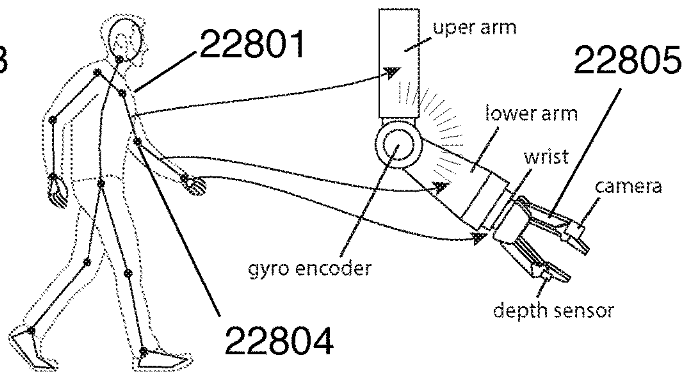
FIG. 199
FIG. 200
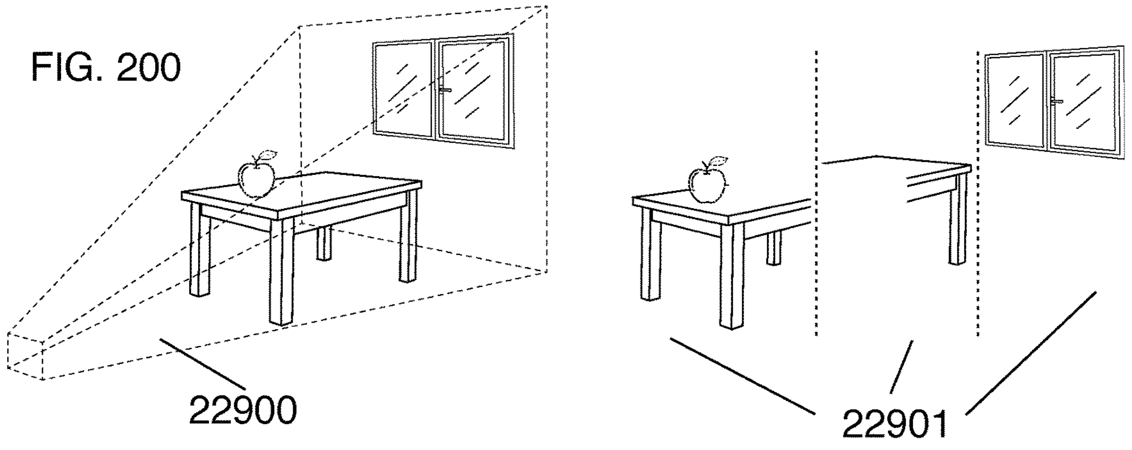

FIG. 205
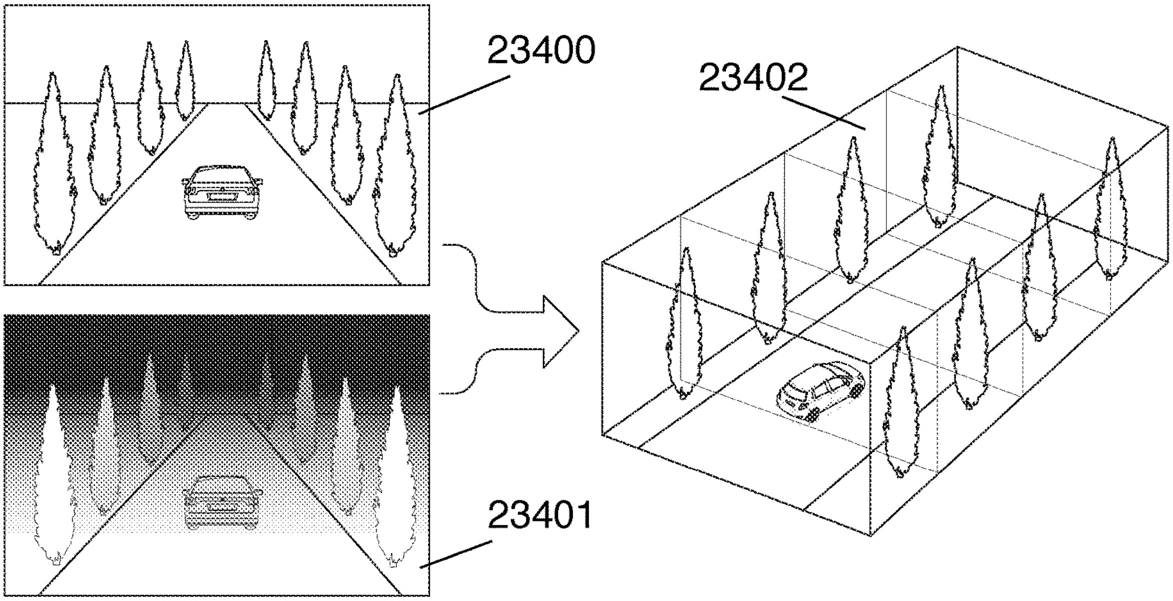
FIG. 206
23500
23501
| depth | pixels | pixels | ... |
|---|---|---|---|
| 1 | $(x_1,y_1)$ | $(x_2,y_2)$ | ... |
| 2 | $(i_1,j_1)$ | $(i_2,j_2)$ | ... |
| ... | ... | ... | ... |
FIG. 207
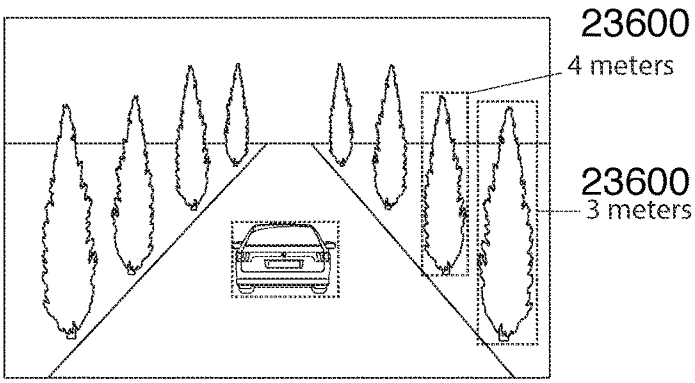

24400 y

θ x

24401

| image 1 | file ABC.jpg |
| --- | --- |
| image 2 | file KLM.jpg |
| ... | |

| 0,0 | 24402 |
| --- | --- |
| 0,1 | |
| 0,2 | |
| ... | |
| 1,0 | |
| 1,1 | |
| .... | |
| x,y | |

try to find
a match here database with location index

Camera input live.
Feature extraction
small subset of database with relevant images
database
proposal system
feature match?
Yes
localize
10 images
localization info
No
find the surrounding points next possible location on the list 24600
24601
match not found
K-nearest neighbors new points to examine
24602

$$\begin{bmatrix} x' \\ y' \\ w' \end{bmatrix} = \begin{bmatrix} a & b & c \\ d & e & f \\ 0 & 0 & 1 \end{bmatrix} \begin{bmatrix} x \\ y \\ w \end{bmatrix}$$

24802
detects the same user
(face recognition)
camera 1
robot 1
24801
camera 2
t0
24800
t1
t2
robot 2
robot 2
turns around
at t4 still
sees
the person
t3
robot 2 still
sees the person
at t3
t4
predict
user future
trajectory
based on
mapped
trajectory
24804
camera 3
t5
24803

24903
at time step 1
24904
after some time steps
24901
24902
24901
24905
24900
robot detects a power socket with some shapes next to it it cannot identify them but it checks to see if it can observe it again
robot detects a power socket but the shapes around it are not similar to step 1 it categorize it as a new landmark large tile size
25003
25001
primal landmarks
25002
y
θ
x
25000
small tile size 1. Clean here!
2. Or do an extra clean coverage here!
3. Or prioritize here!
4. Or do an incremental cleaning here
5. Or integrate these areas for a second time cleaning in your routine coverage
6. This information can be used to create / influence a cleaning behavior in any desired way Open / Half open / Closed?

Recognize as room boundary?

IoT enabled door?

Can be locked / unlocked remotely?

Ask for control in the app?

Use to localize against it?

FIG. 243
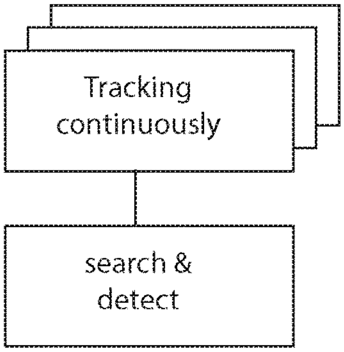
Strat tracking when a signal is given
I.e. a trolley is filled with cargo
25600
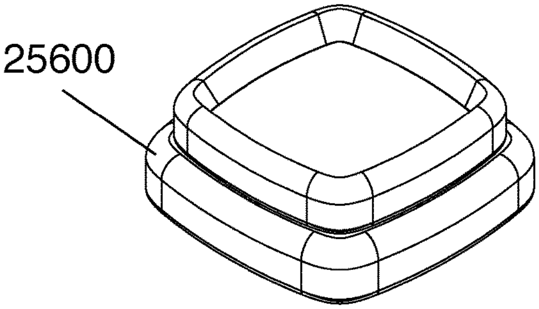
Then tracking starts
Track:
A single gesture snapshot (i.e. thumbs up)
A continuous motion
Detection methods:
1. use a marker
    a. active (electronic, sending signal)
    b. passive (different color)
2. use skin color FIG. 251
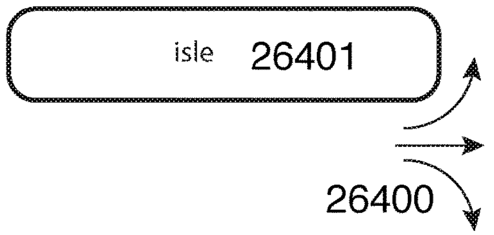
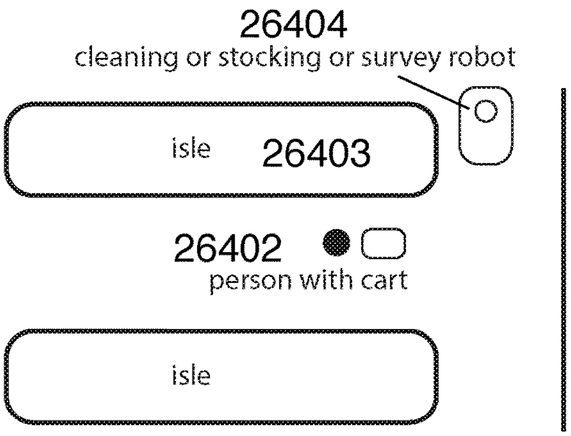
FIG. 252
FIG. 253
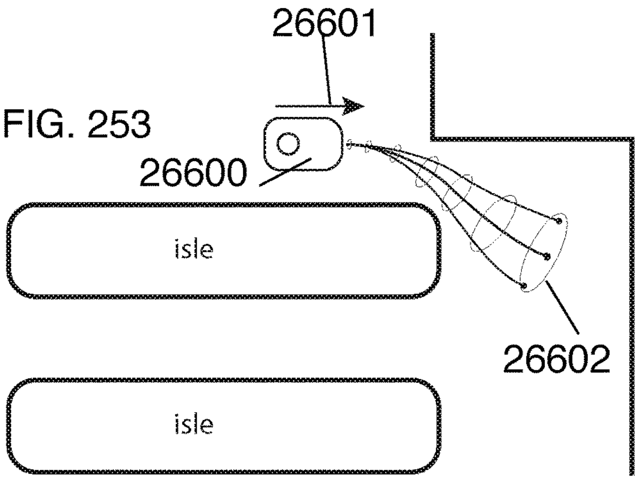
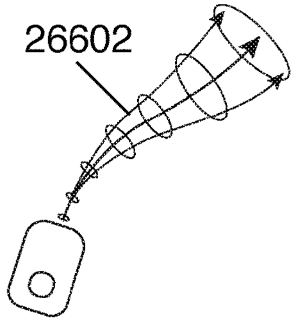
FIG. 254
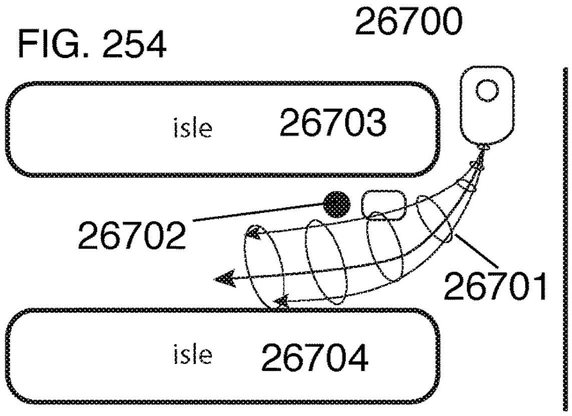
FIG. 255
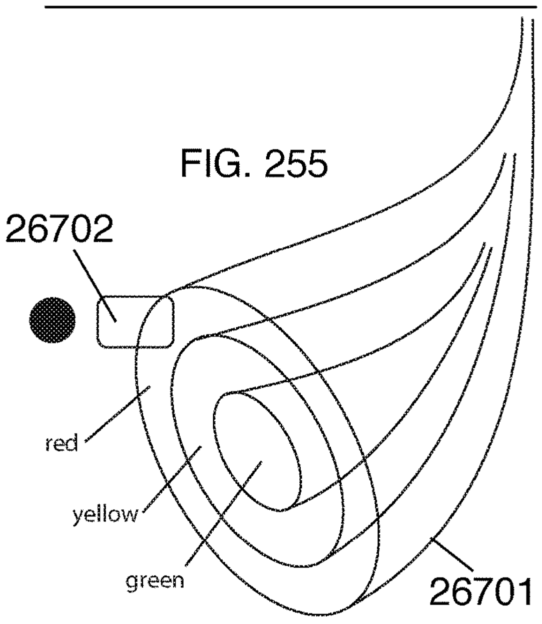
isle 26401
26400
26404
cleaning or stocking or survey robot
isle 26403
26402
person with cart
isle
26601
26600
isle
isle
26602
26602
26700
isle 26703
26702
26701
isle 26704
26702
red
yellow
green
26701 affinity levels
known
unknown
A.
28500
28501
Person X
(owner of the robot)
Person Y (total stranger)
B.
28502
interaction
Person X
(owner of the robot)
Person Y
(somewhat stranger)
C.
limited degree
of access is
provided
28503
Person Y
(somewhat stranger)

28604
28600
28601
28603
28602
location correlations
28605
suggest to download
the app for the robot
automatically pair with robot
inherit setting
suggest schedules FIG. 282A
FIG. 282B
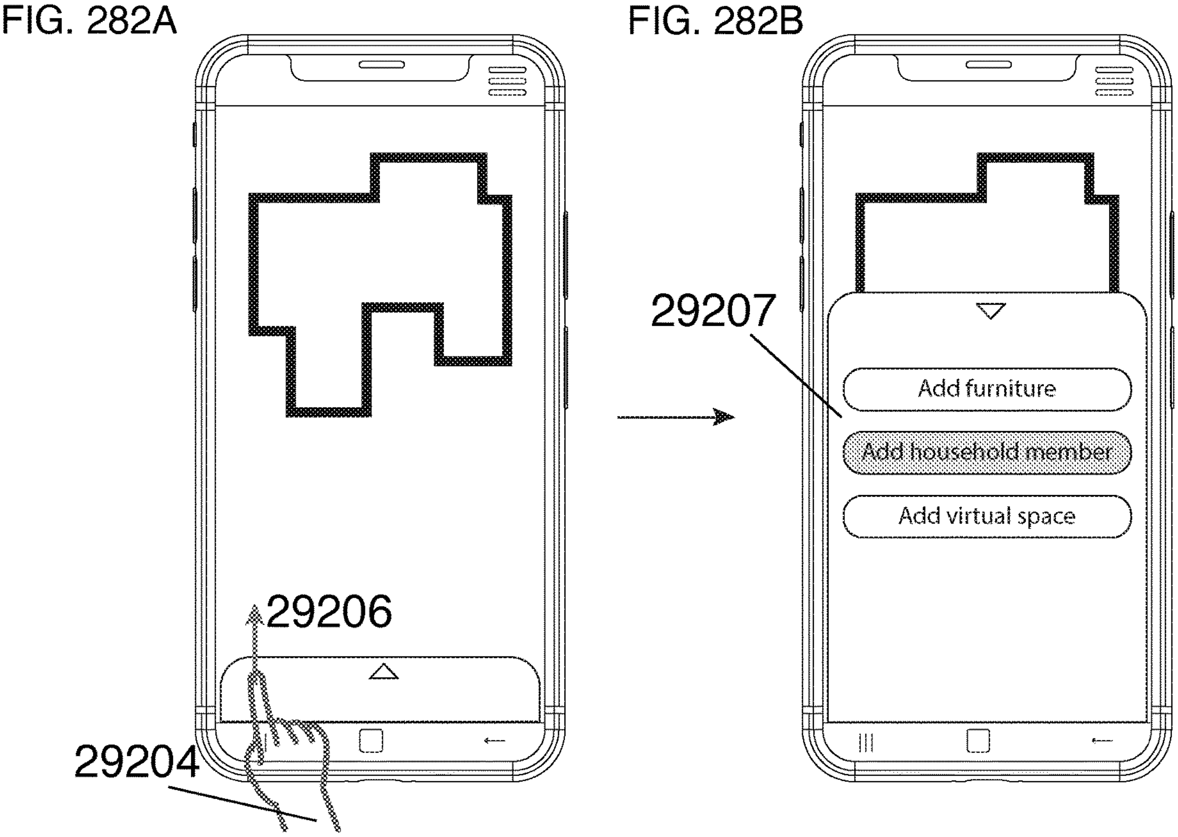
FIG. 282C
FIG. 282D
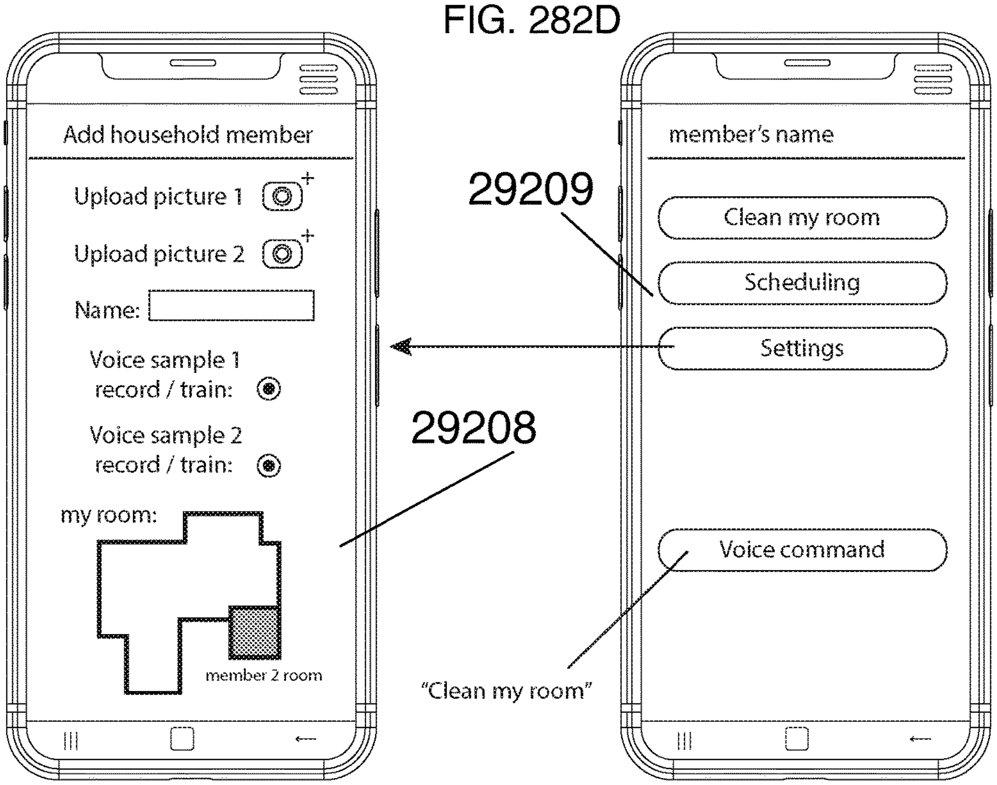
29207
Add furniture
Add household member
Add virtual space
29206
29204
Add household member
Upload picture 1
Upload picture 2
Name:
Voice sample 1 record / train:
Voice sample 2 record / train:
my room:
member 2 room
member's name
29209
Clean my room
Scheduling
Settings
29208
Voice command
"Clean my room"

Add furniture
Add household member
Add virtual space 29210
29211
Add virtual furniture
Buy virtual furniture Surprise!!
You just received a
virtual couch!
Do you want to put it
in the storage
or use it
right now?
29212
Use it right now
Put it in the storage storage
29213
Use in the space
Trade Trade
wallet: 2550 coins
Buy more coins
storage
700 coins
50 coins
100 coins
1100 coins
29214
store
Sell Trade
wallet: 2550 coins
Buy more coins
store
600 coins
250 coins
1500 coins
400 coins
29215
storage
Buy FIG. 287A
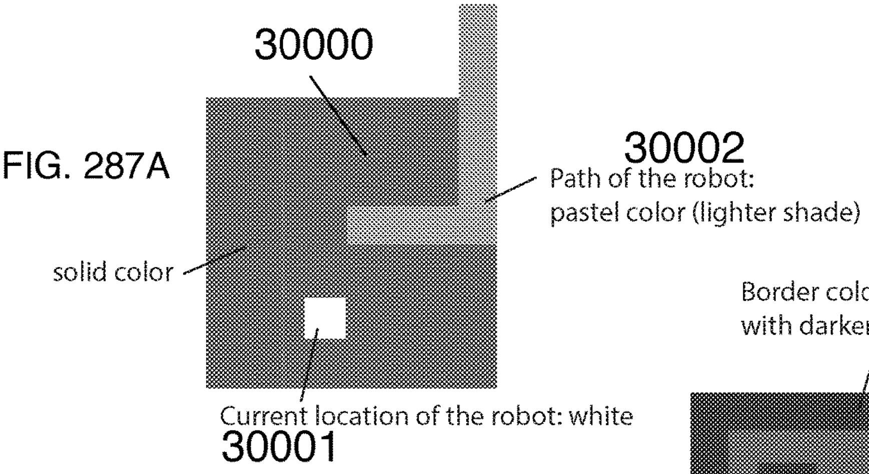
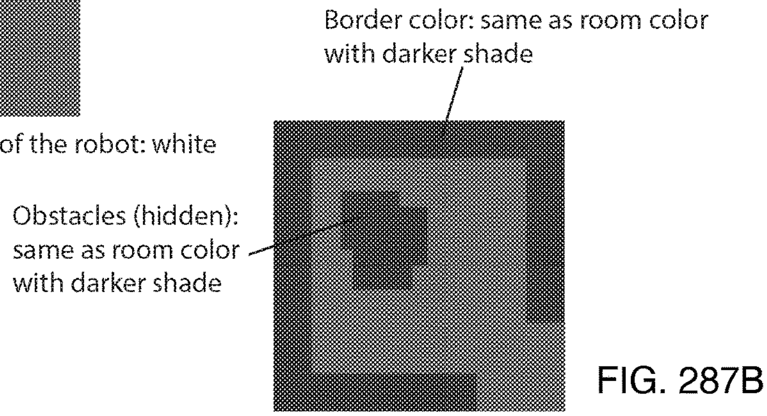
FIG. 287B
FIG. 288
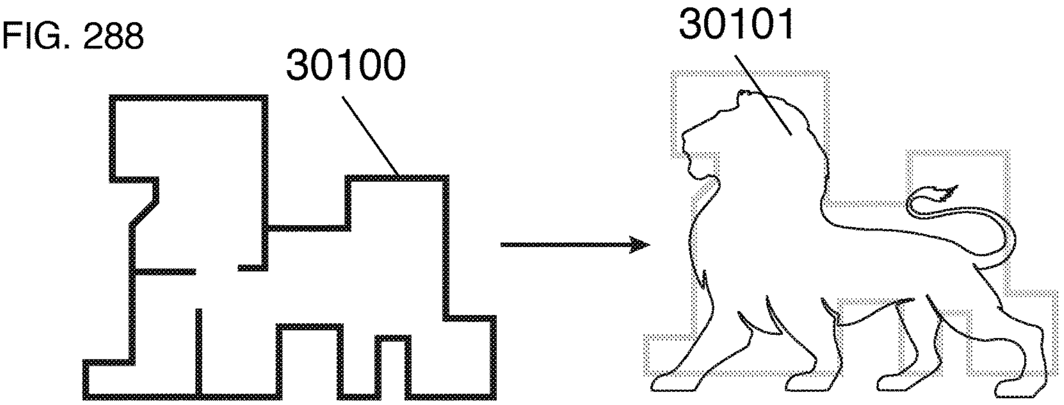

FIG. 291

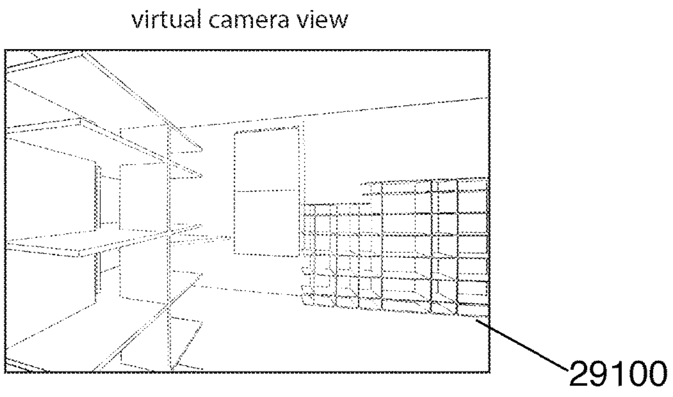

When the virtual camera is place in the center of sphere what the viewer
can see is as if they are standing in place of the robot when it took the picture.
they can turn the viewing direction but as soon as the virtual camera translates
the illusion of being in 3D space will be broken.
To compensate for this issue, th erobot may take image in different time or space intervals

FIG. 292

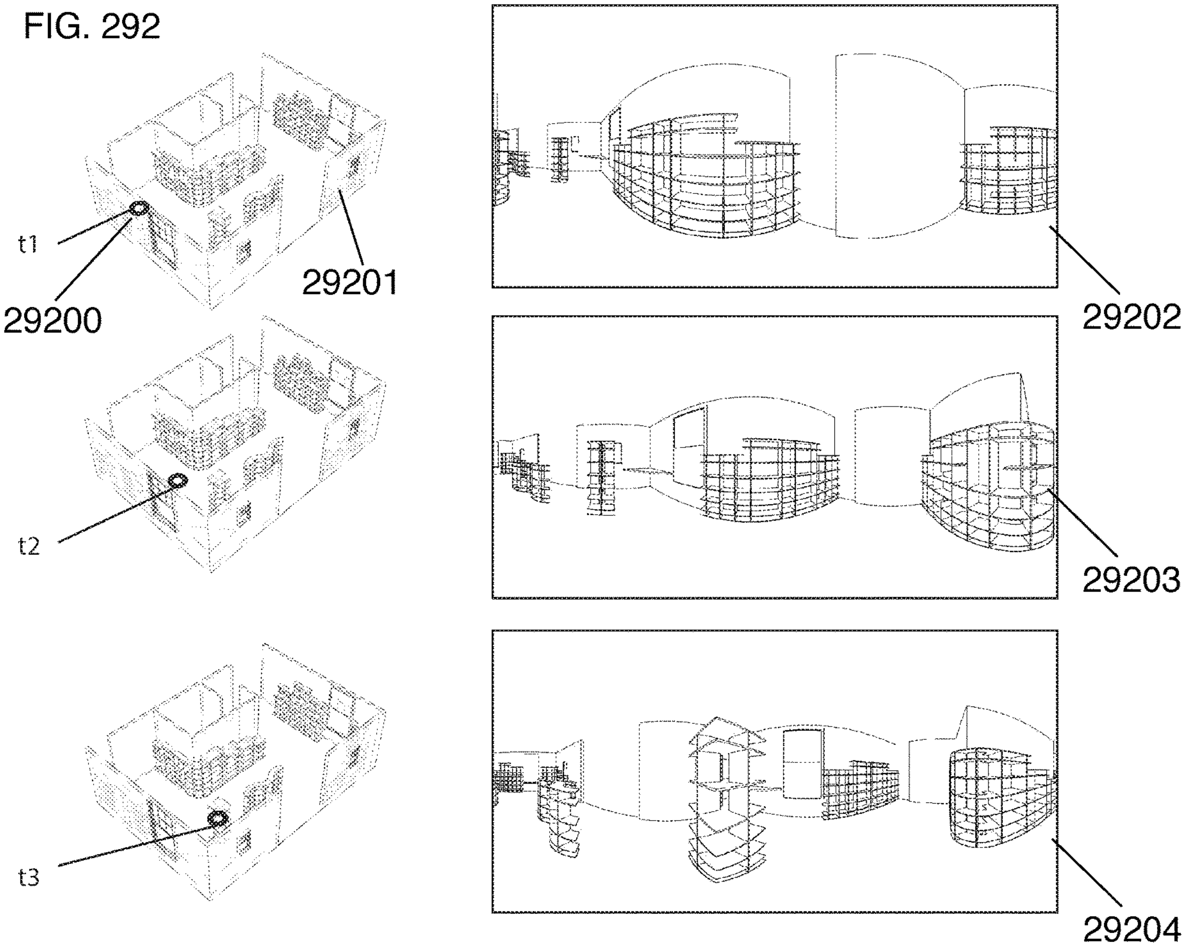

location of spheres (which are the same as location of the robot when it took each image)
are highlighted in the viewport of the virtual camera as hotspots.
the user can select each hotspot to relocate the virtual camera into that spot.

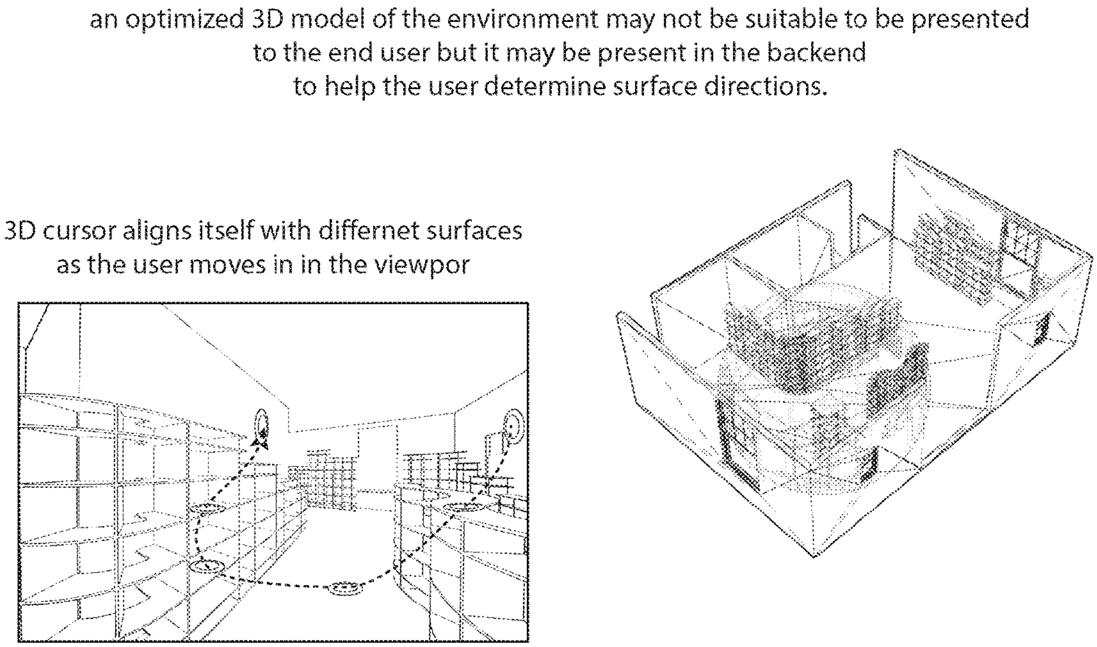

FIG. 295 an optimized 3D model of the environment may not be suitable to be presented
to the end user but it may be present in the backend
to help the user determine surface directions.

3D cursor aligns itself with differnet surfaces
as the user moves in in the viewpor

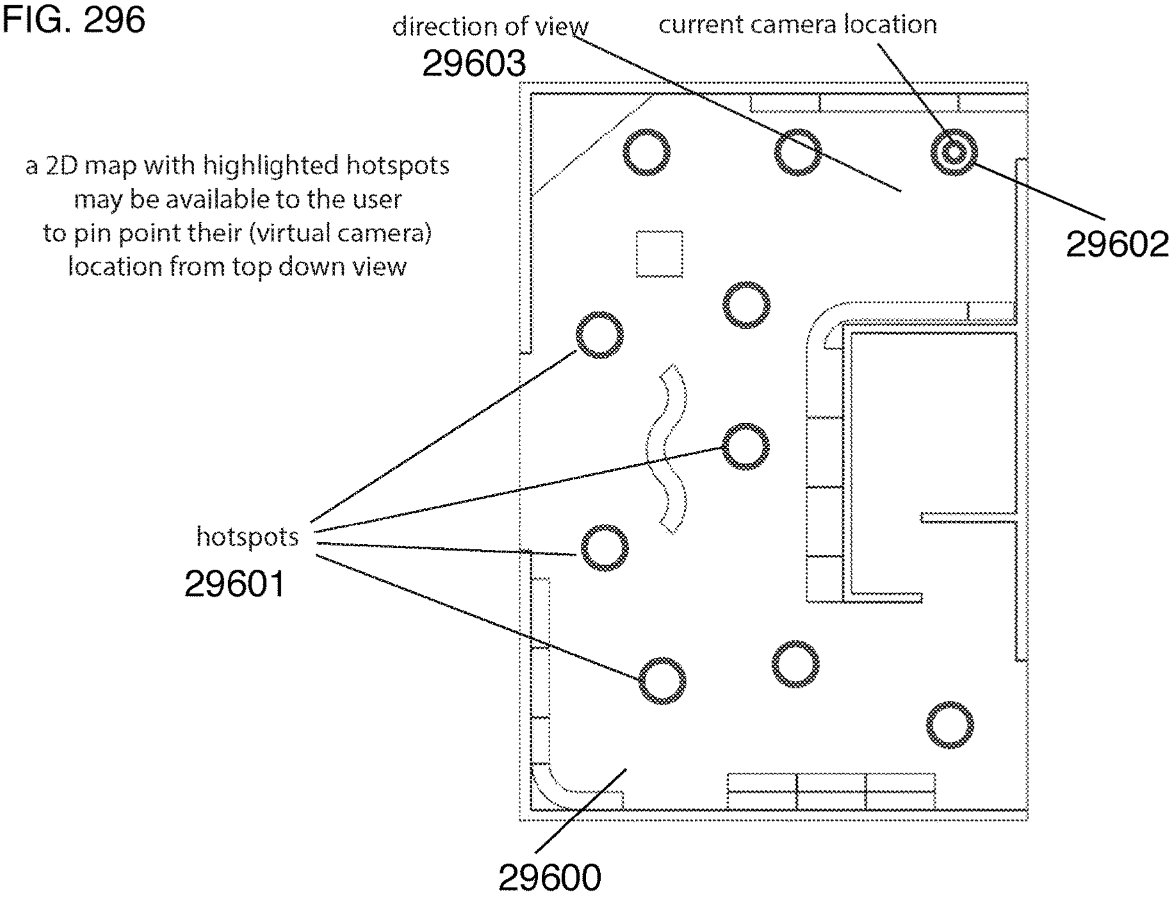

FIG. 296 direction of view
29603 current camera location a 2D map with highlighted hotspots
may be available to the user
to pin point their (virtual camera)
location from top down view

29602 hotspots
29601

29600 spherical panoramic capture

29700 spherical projection

29701

29702 while the image is distorted in both projection methods
from the outside, it will look correct when
the virtual camera with correct field of view
is placed at the center of the volume cubic projection cubical capture
(each square is directed towards one side of the cube)

29703

FRESH FRUIT
30100
30101
30102
Live stream
Live view:
in view items:
Red Grapes - 3 lbs
$4.49
Lemons -3 lbs
$3.98
Banana - 3 lbs
$2.29
Pears - 2 lbs
$3.64
30103
30104
Buying orders
Store app on
Online cutomer's
mobile device
30105

4302
4301
4300
too many rooms?
would you like to try again?
too few rooms?
would you like to try again?
I will adjust borders manually
Try again with more rooms
Try again with fewer rooms
I will adjust borders manually
4300

4301
A.
B
C.

6801
6804
6802
6803
6800
Map Generating Run
Cleaning Run 6900
6901
6902
6903
1st floor
2nd floor
3rd floor
Basement
1st floor
2nd floor
3rd floor
Basement
1st floor
2nd floor
3rd floor
Basement 35000
35001
t-shirt
white
short sleeve
brand xyz
35002
Sales from brand xyz
coupons for brand xyz
deals from brand xyz
35003
Items related to detected object
shop
shop
shop
shop
shop
shop
shop FIG. 356
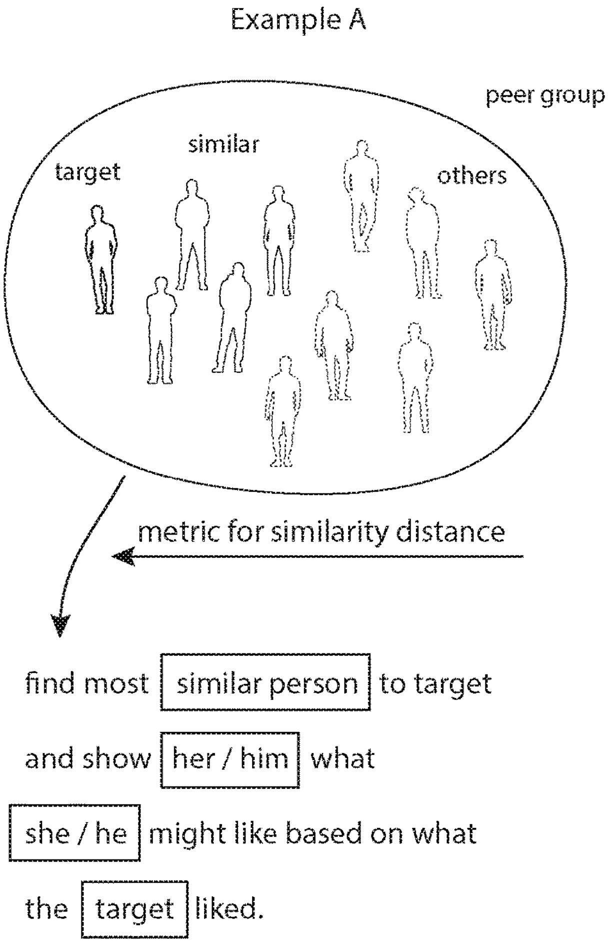
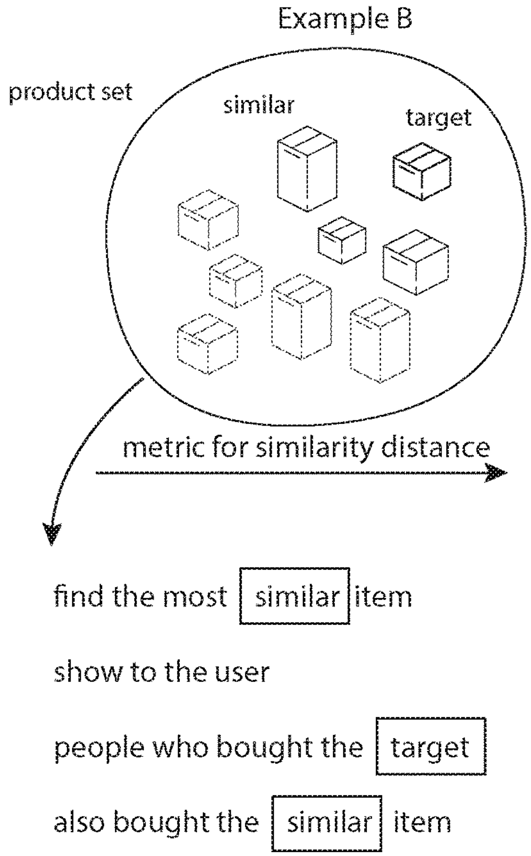
Predicted ratings are calculated based on weighted average.

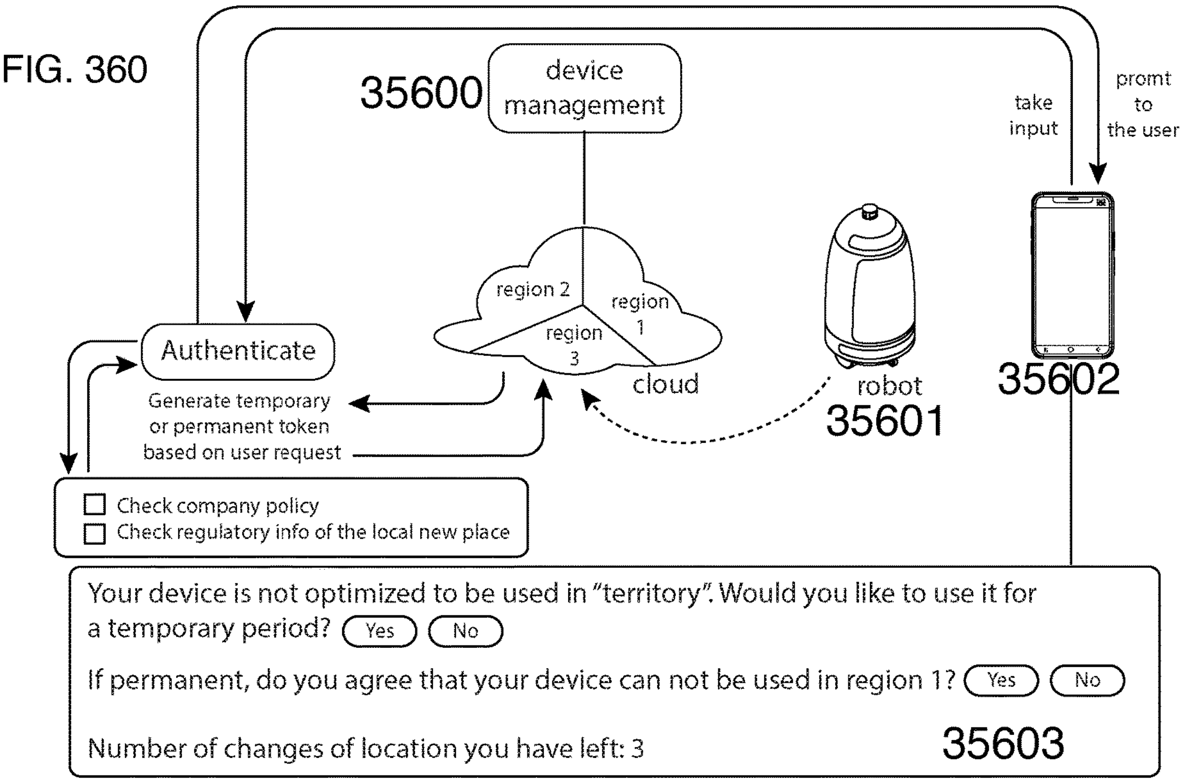

FIG. 360
35600
device management
promt to the user
take input
region 2
region 1
region 3
cloud
robot
35601
35602
Authenticate
Generate temporary or permanent token based on user request
Check company policy
Check regulatory info of the local new place
Your device is not optimized to be used in "territory". Would you like to use it for a temporary period? Yes No
If permanent, do you agree that your device can not be used in region 1? Yes No
Number of changes of location you have left: 3
35603

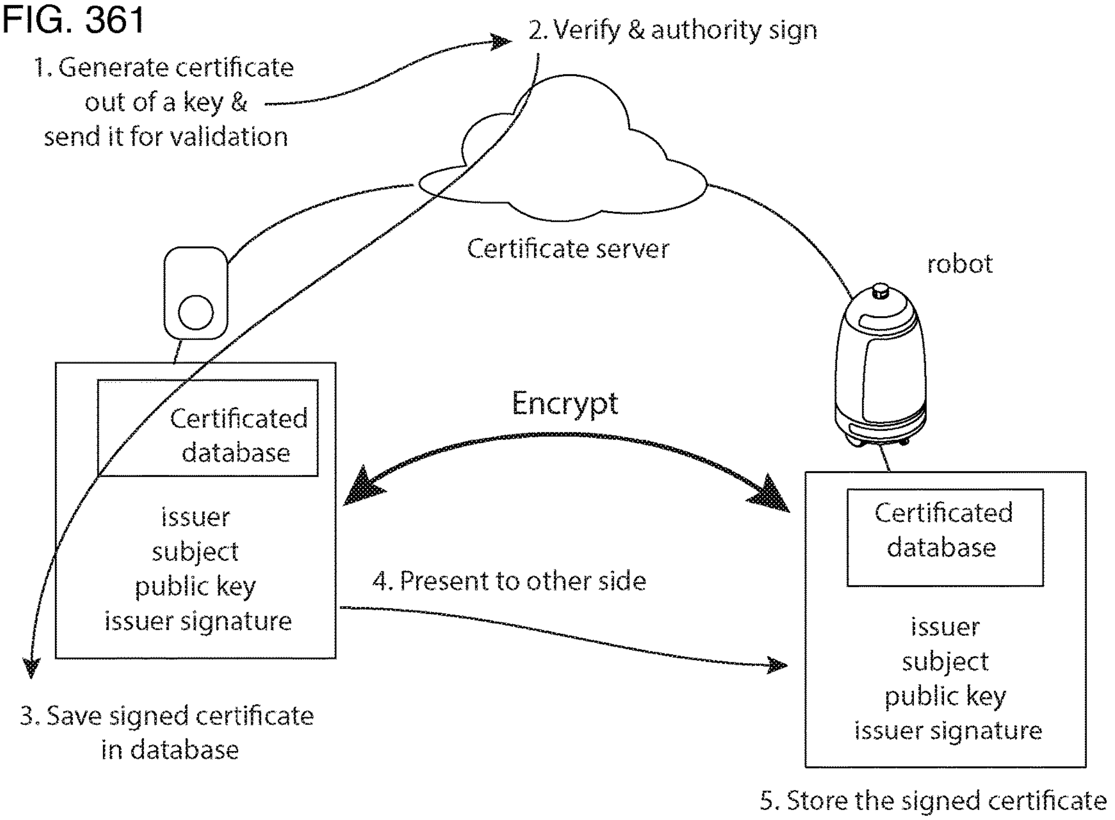

FIG. 361
1. Generate certificate out of a key & send it for validation
2. Verify & authority sign
Certificate server
robot
Certificated database
issuer
subject
public key
issuer signature
Encrypt
4. Present to other side
Certificated database
issuer
subject
public key
issuer signature
3. Save signed certificate in database
5. Store the signed certificate

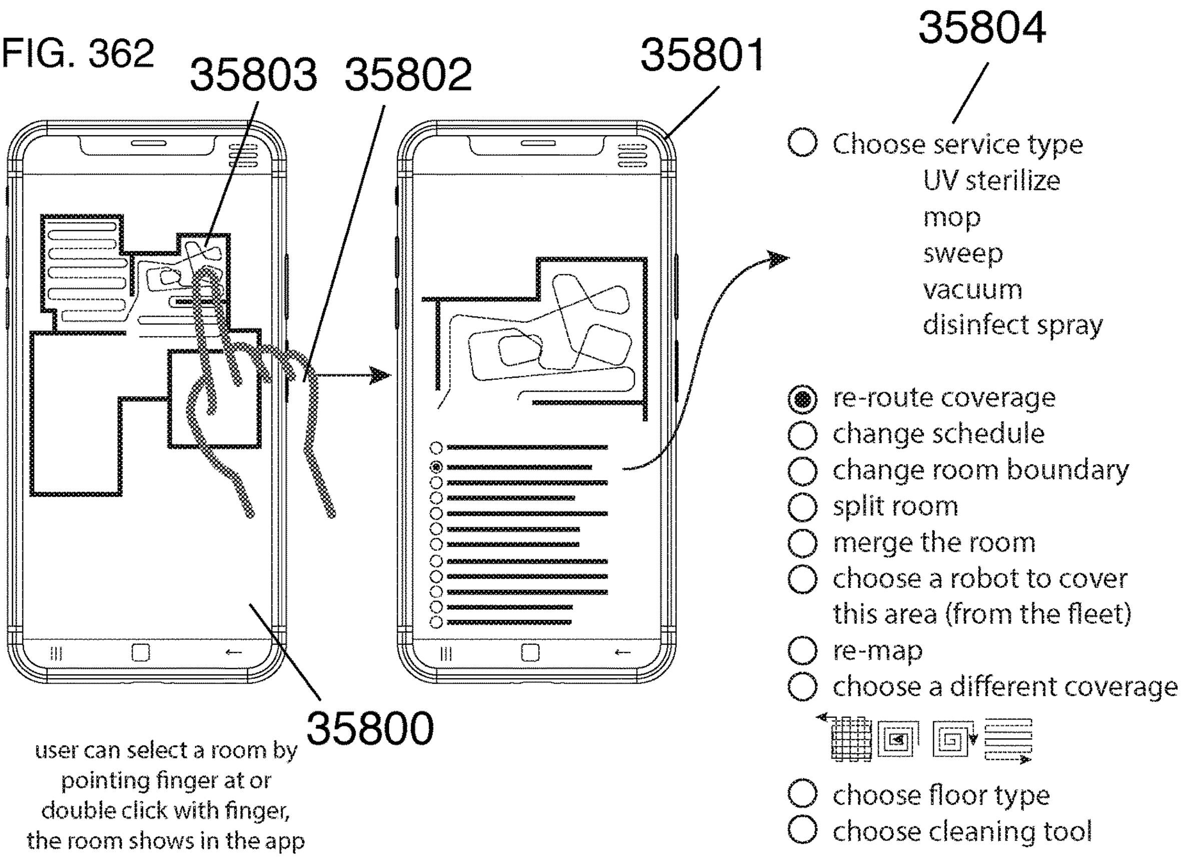

FIG. 362
35803
35802
35801
35804
Choose service type
UV sterilize
mop
sweep
vacuum
disinfect spray
re-route coverage
change schedule
change room boundary
split room
merge the room
choose a robot to cover this area (from the fleet)
re-map
choose a different coverage
choose floor type
choose cleaning tool
35800
user can select a room by pointing finger at or double click with finger, the room shows in the app FIG. 372
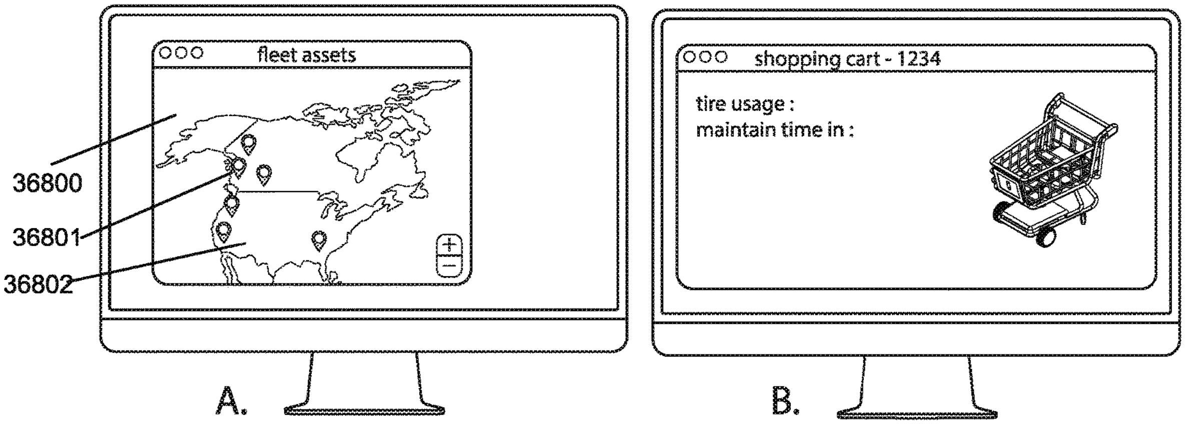
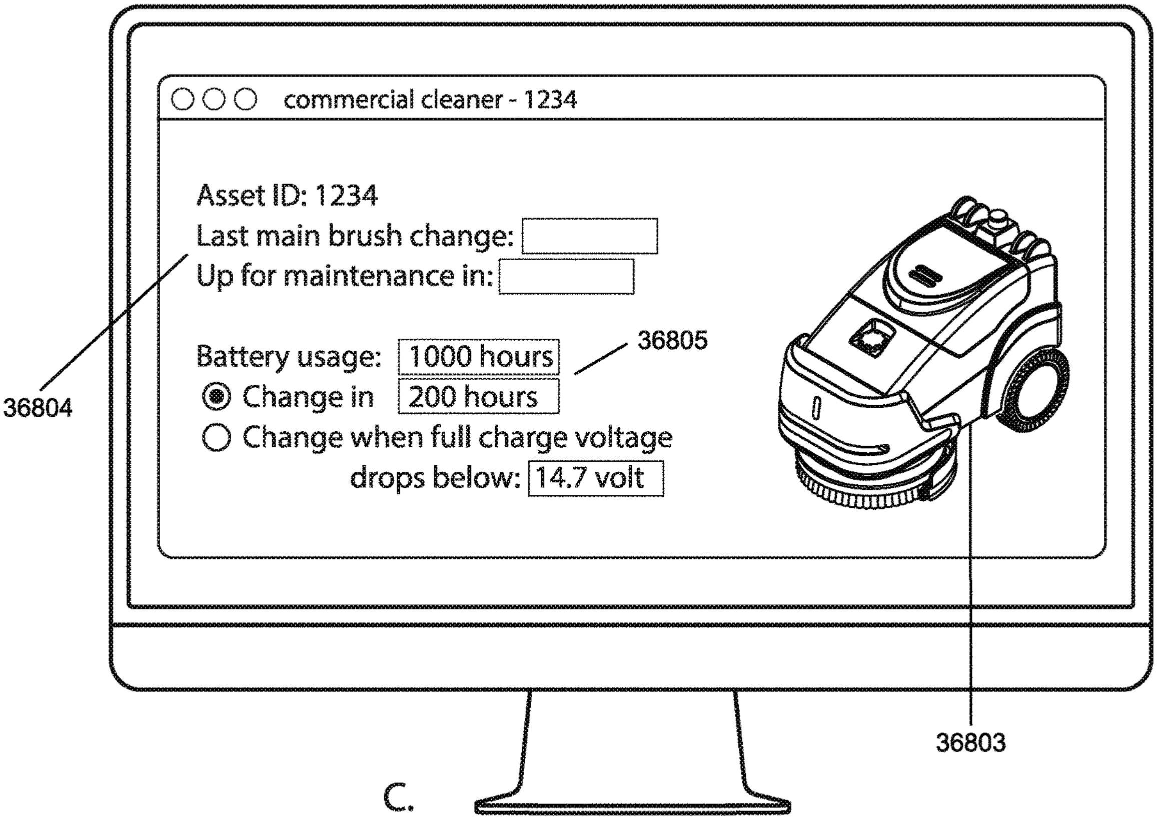

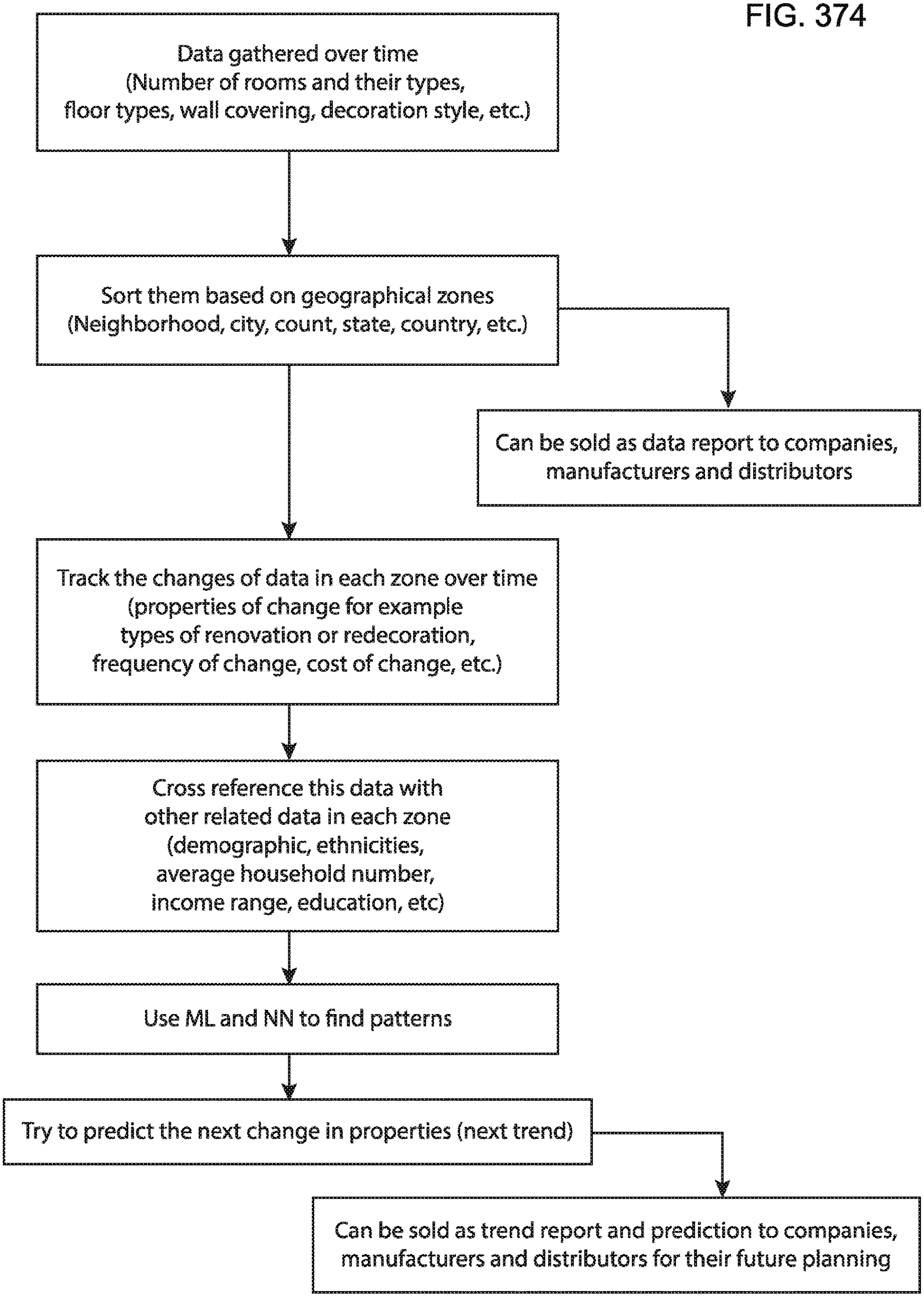

FIG. 374
Data gathered over time
(Number of rooms and their types,
floor types, wall covering, decoration style, etc.)
Sort them based on geographical zones
(Neighborhood, city, count, state, country, etc.)
Can be sold as data report to companies,
manufacturers and distributors
Track the changes of data in each zone over time
(properties of change for example
types of renovation or redecoration,
frequency of change, cost of change, etc.)
Cross reference this data with
other related data in each zone
(demographic, ethnicities,
average household number,
income range, education, etc)
Use ML and NN to find patterns
Try to predict the next change in properties (next trend)
Can be sold as trend report and prediction to companies,
manufacturers and distributors for their future planning 37208
37209
leftt camera view
front camera view
right camera view
37210 keyboard keypad
customized keypad
STOP
GO
OK
track pad
mouse
joystick
gamepad
remote steering wheel
vr controllers
voice command
go
turn right
wait
turn left
give right of way
OK!
Stop!
Hand gestures
OK!
Stop!
Go!
touch screen voice command
37700
mic
NLP
module
text
command
37701
37702
37703 gesture command
video
camera
gesture
recognition
text
command
37800
37801
37802
37803
voice command
37900
mic
NLP
processing 37901
gesture command
camera
image
processing
text
command
37902
37906
37903
37904
37905

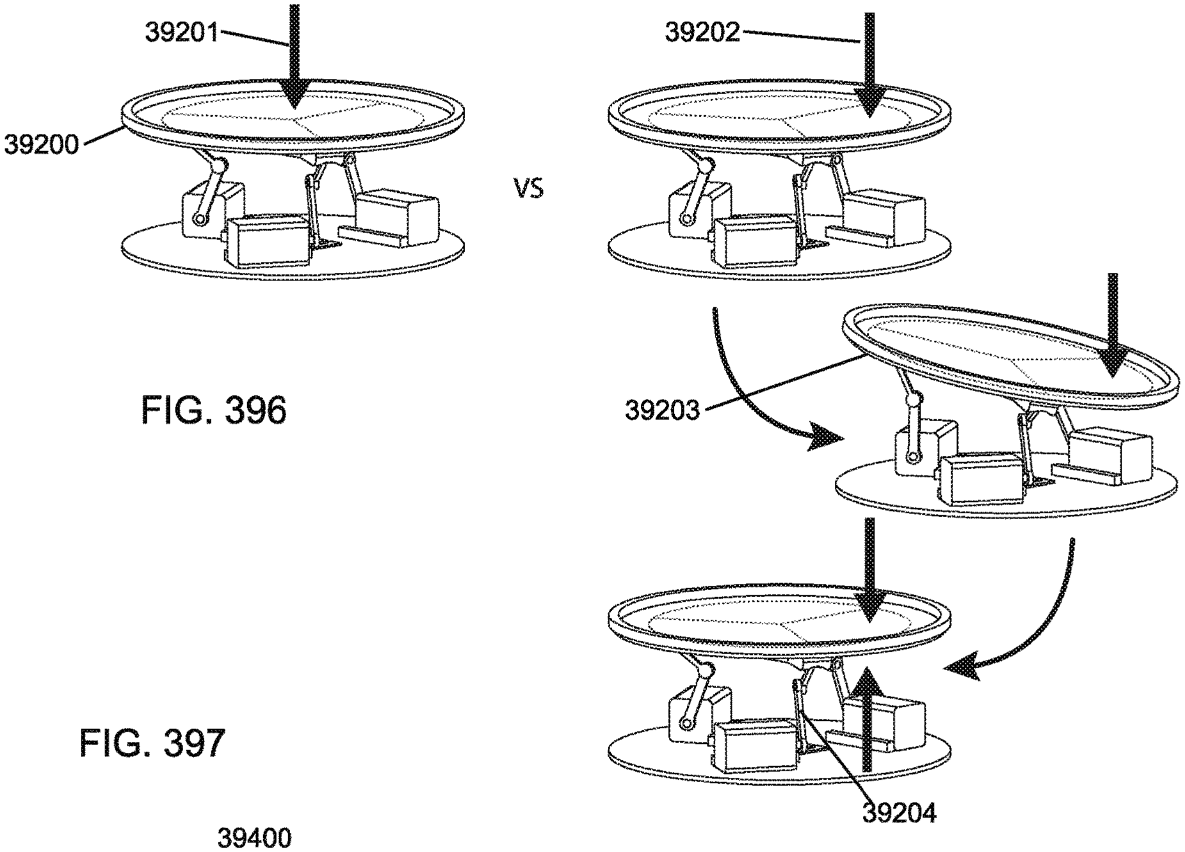
FIG. 396
FIG. 397
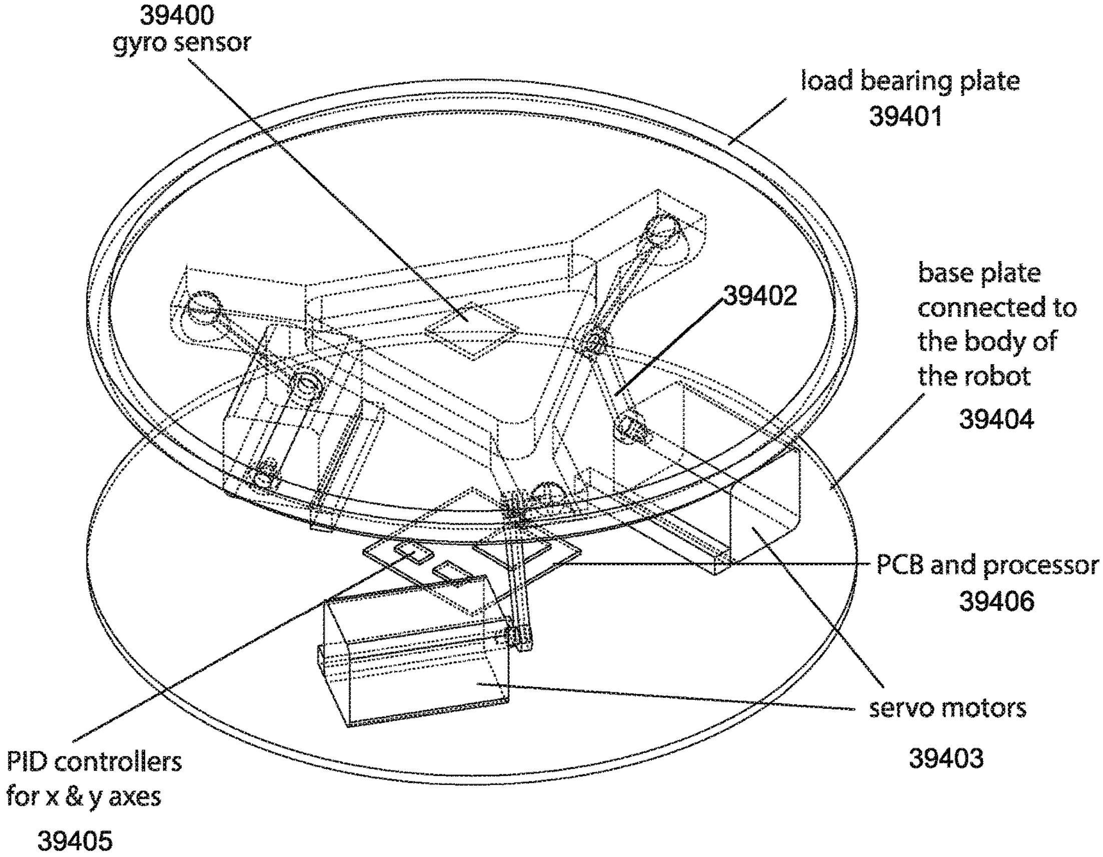

39600
load bearing plate x axis y axis 39604
gyro sensor 39603
base plate connected to the body of the robot

39602 servo motors
39601

39606
PCB and processor

39605
PID controllers for x & y axes camera A
39700
camera B
camera A
camera B
39701
39703
camera A
camera B
camera A
camera B
39702
39800
camera
39801
39802 camera
39804
39803

40101
40103
40100
40102
rent for a full day
rent for half a day
calculate hours after the job is done
specify the area to be digded
40105
40104
specify pouring area
40106
40107
rent for a full day
rent for half a day
calculate hours after the job is done examples of versatility for having a display as the robot's face fish eye omni directional vision

LIDAR

Gyro encoder

Gyro encoder camera camera

Gyro encoder

Gyro encoder

Gyro encoder

Gyro encoder (at every joint)

brushless motor actuator at each joint

LIDAR

LIDAR

FIG. 415
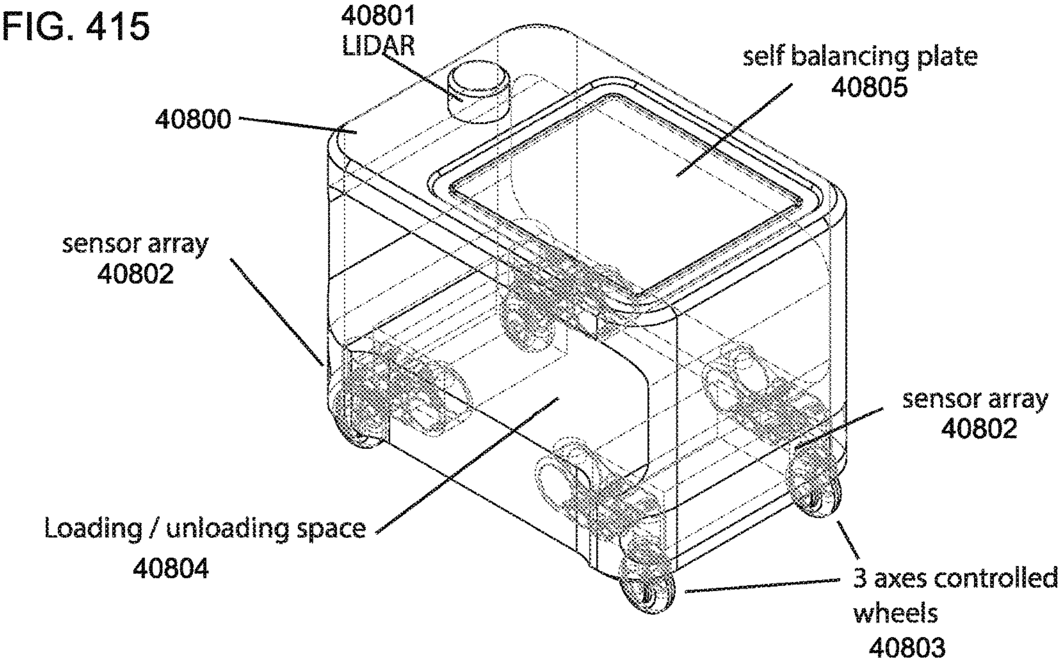
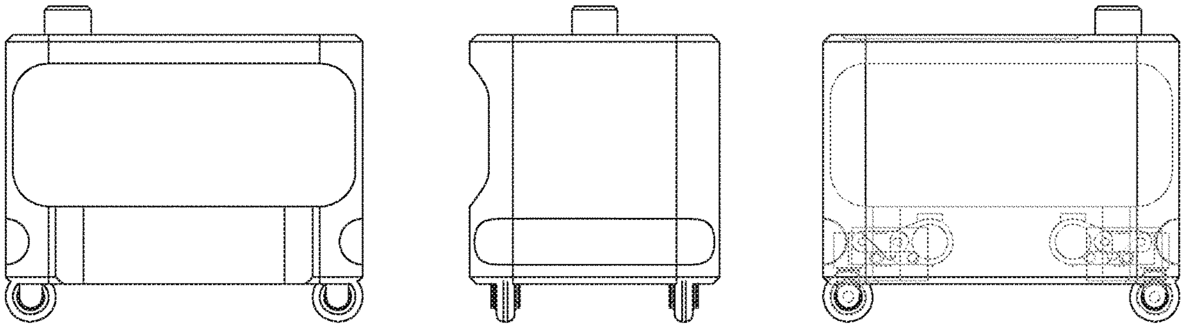

microphone
camera
robot
video stream
audio stream
encoding
remote location
remote data center
moving vehicle
user's cellphone
separate room in the same facility
...
operator
audio to text bot
speech recognition bot
voice authenticator bot 41801
41802
41800 item list:
xyz
abc
mnl
...
Please scan your items here
42200
42201
42202 item list:
xyz
abc
mnl
...
Total price: ........
42300
42301
42302
42303
42304
42305

FIG. 441
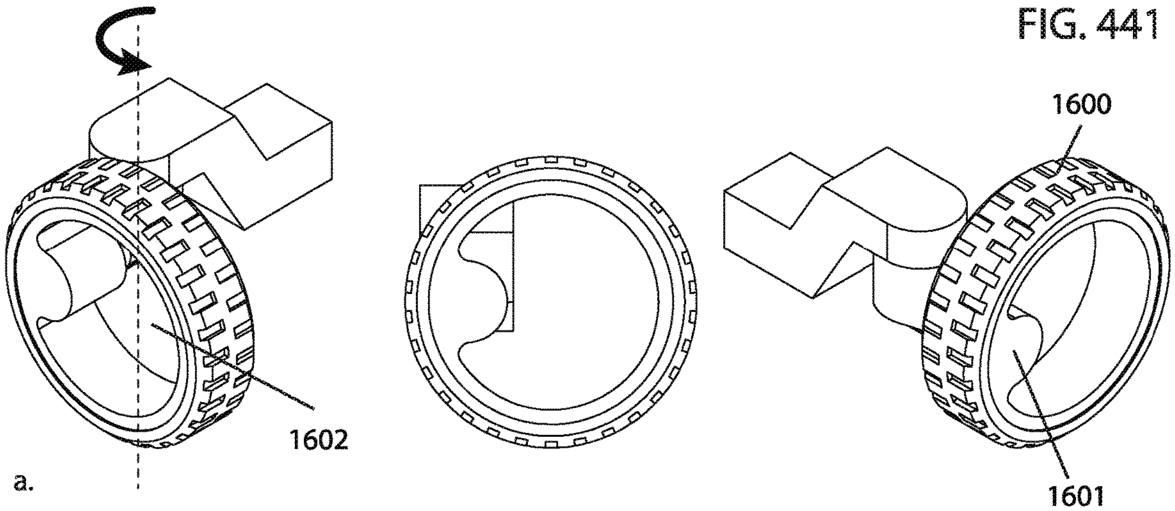
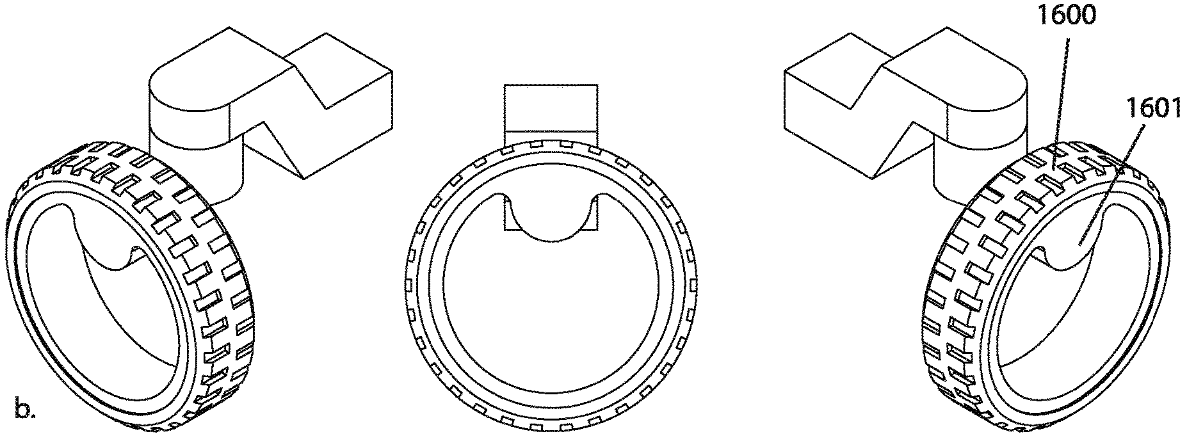
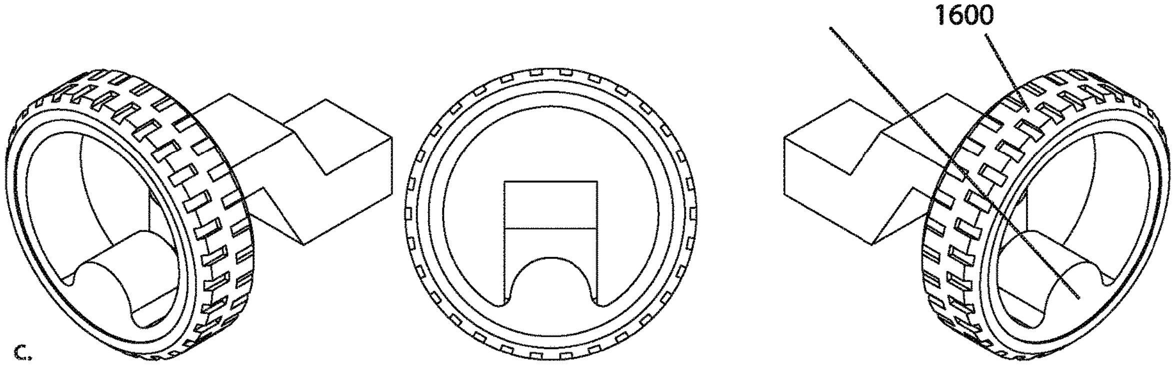

FIG. 442B
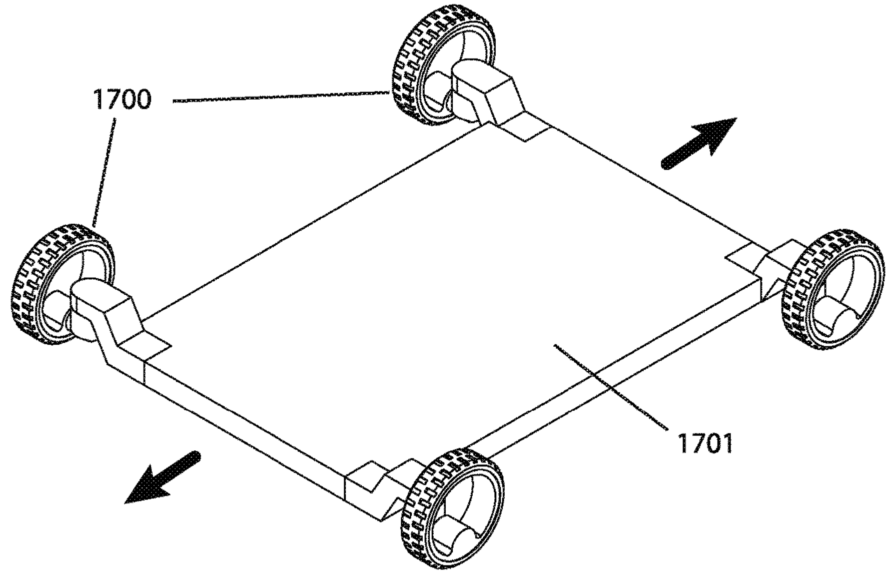
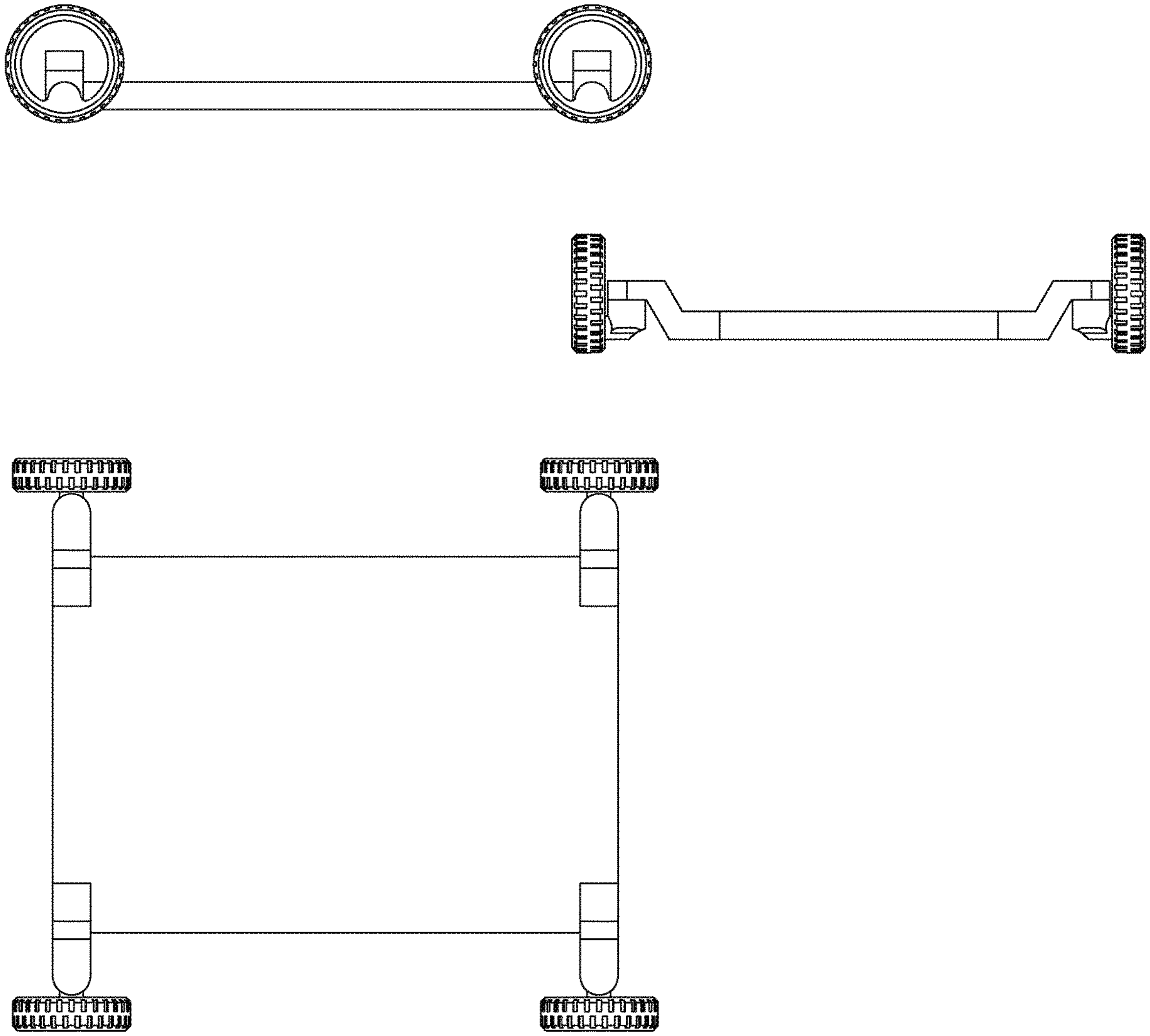

FIG. 442D
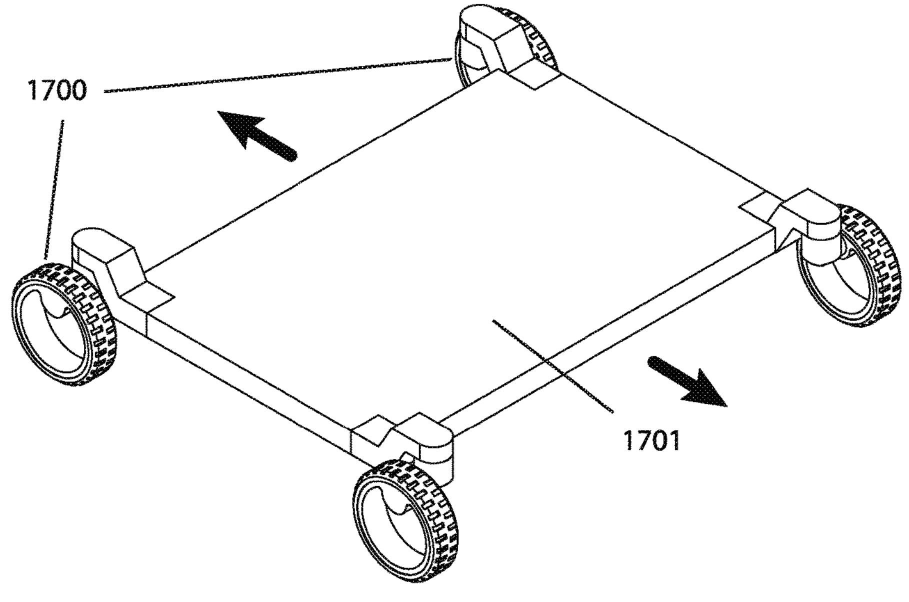
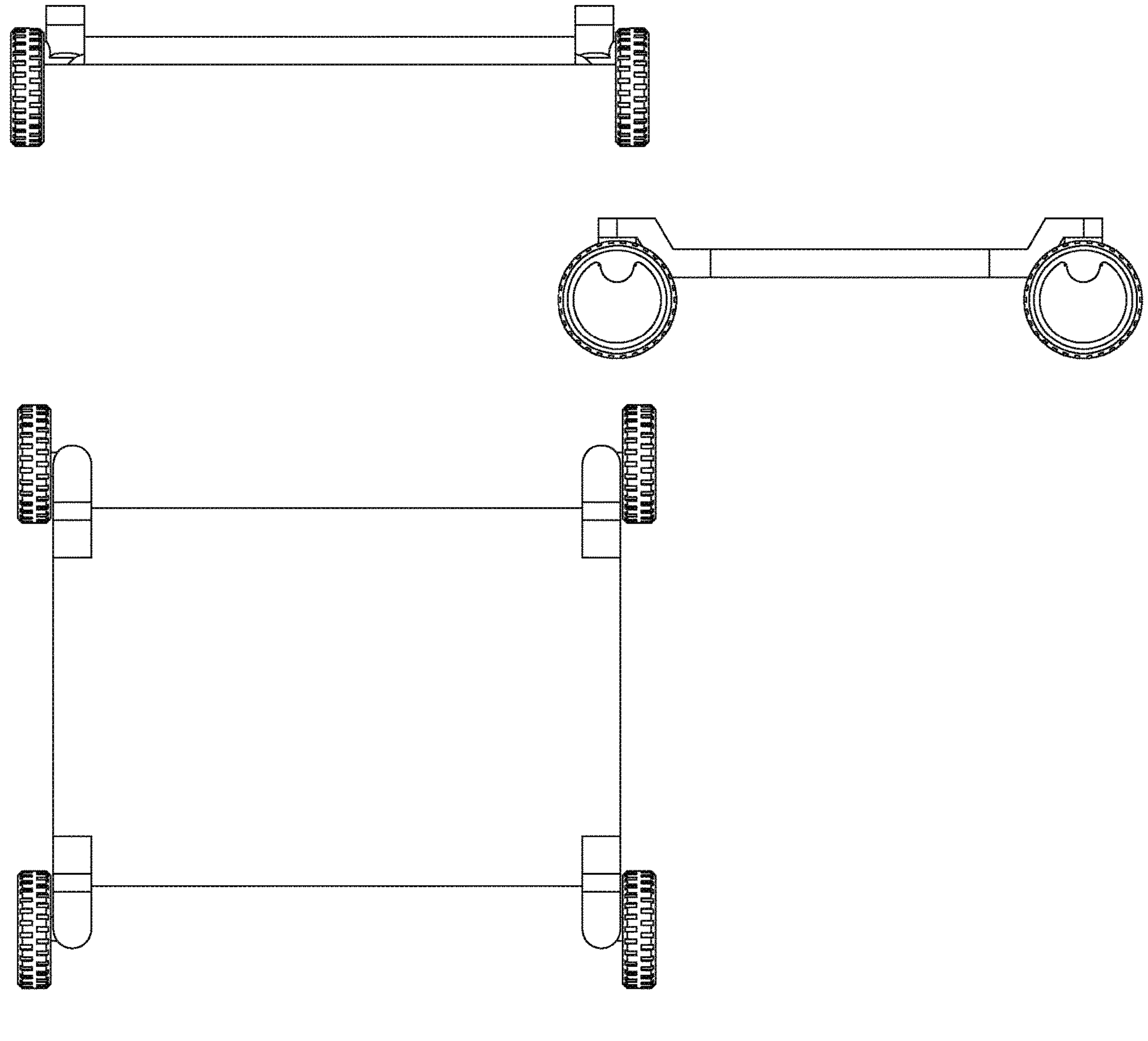

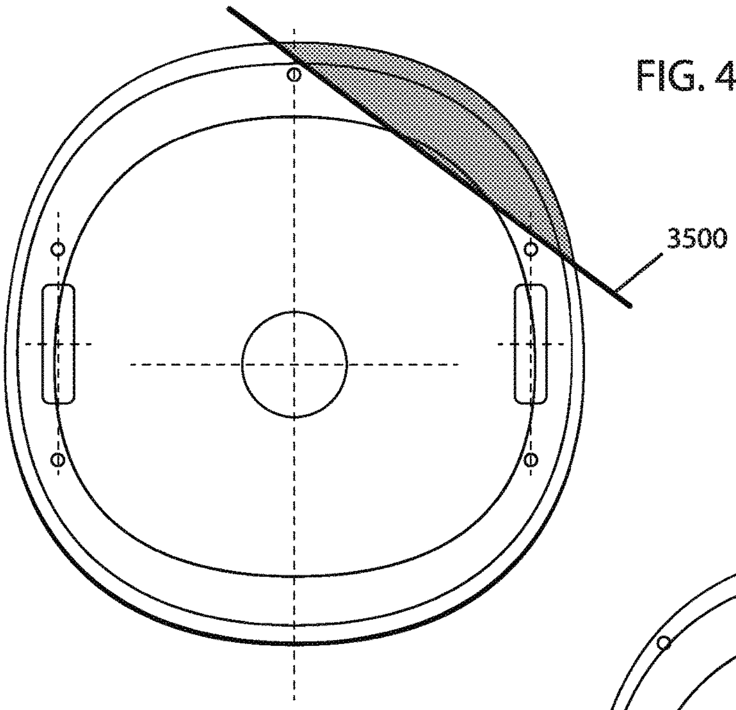
FIG. 460A
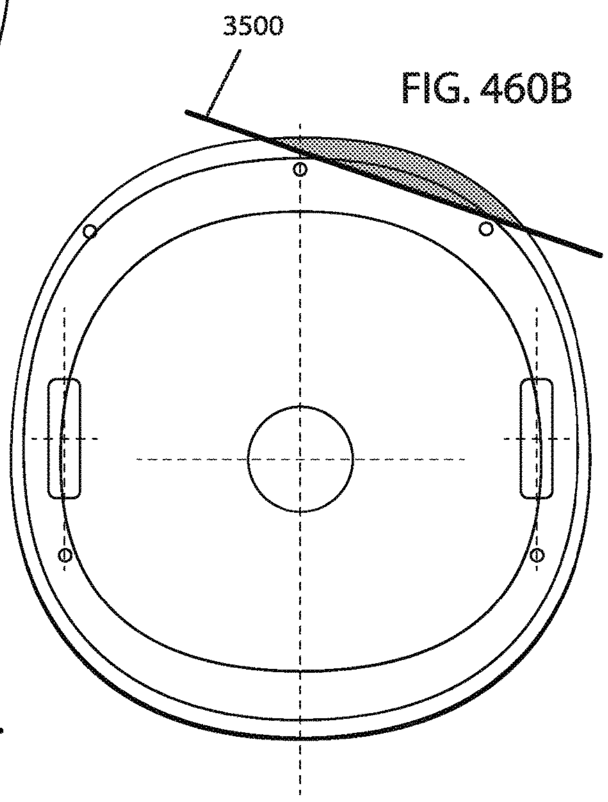
FIG. 460B
FIG. 460C
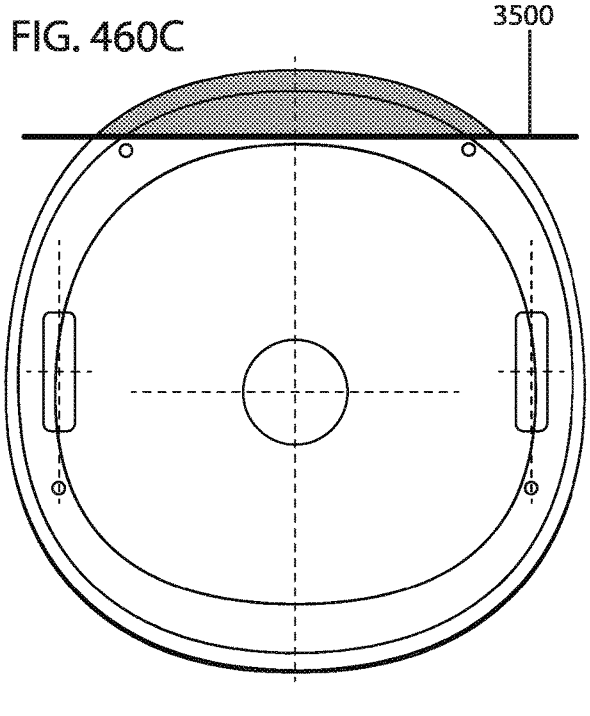

FIG. 475A
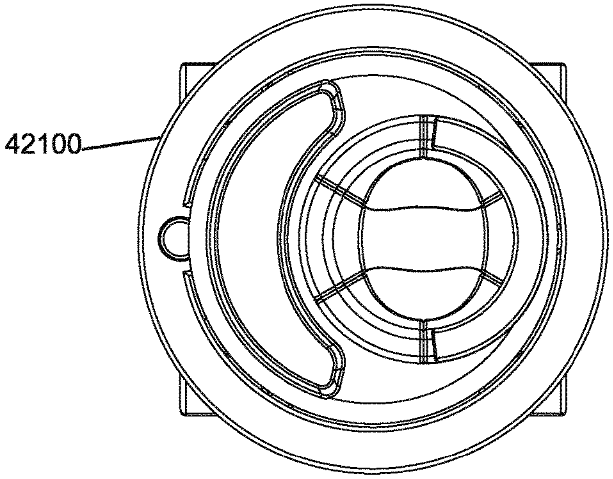
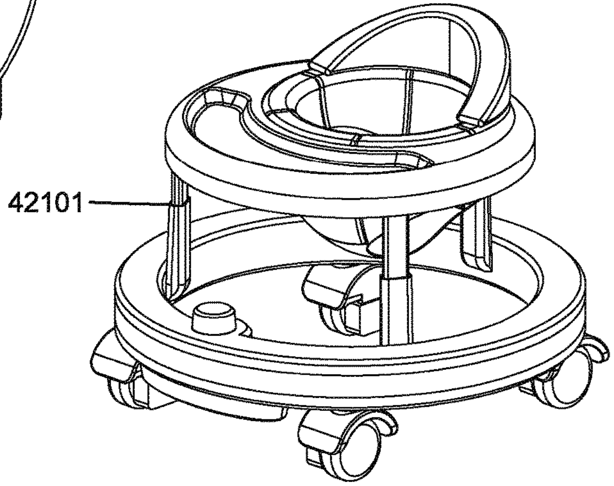
FIG. 475B
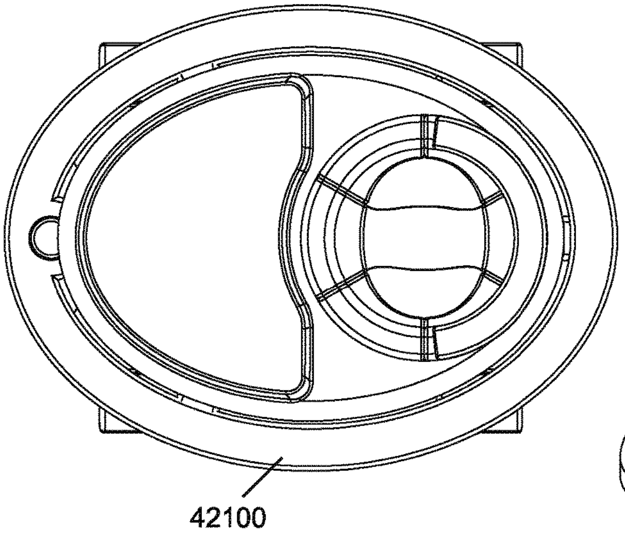
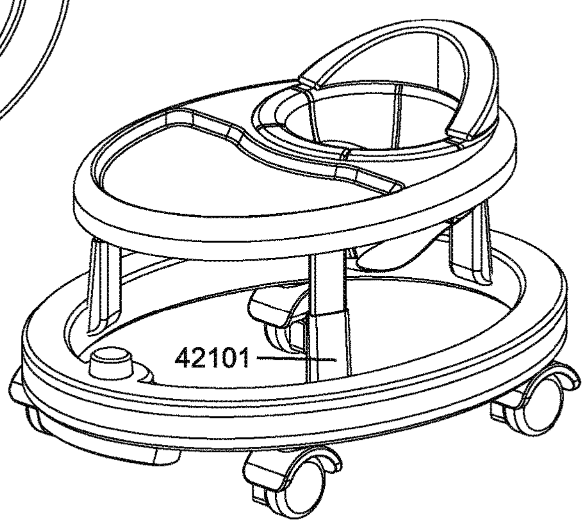

child's room
bedroom 1
kitchen
42403
42404
42402
42400
42401
child's room
bedroom 1
kitchen
42502
42501
42504
Follow me
Come here
42500
42501
42503
42502

All sub-systems combined together

A.
B.
C.
D.
43900
43901
43905
A
A
SECTION A-A mechanical switch - bumper side
44402
44404
44403
mechanical switch - body side
44400
44401
A.
B.

FIG. 509
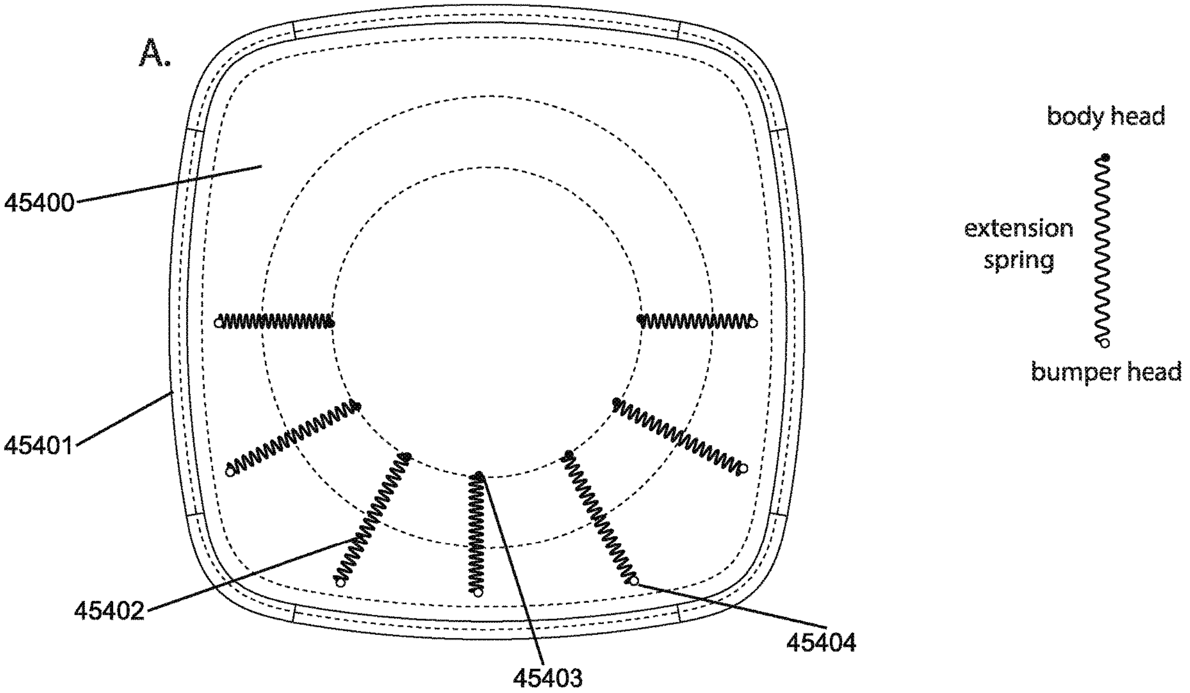
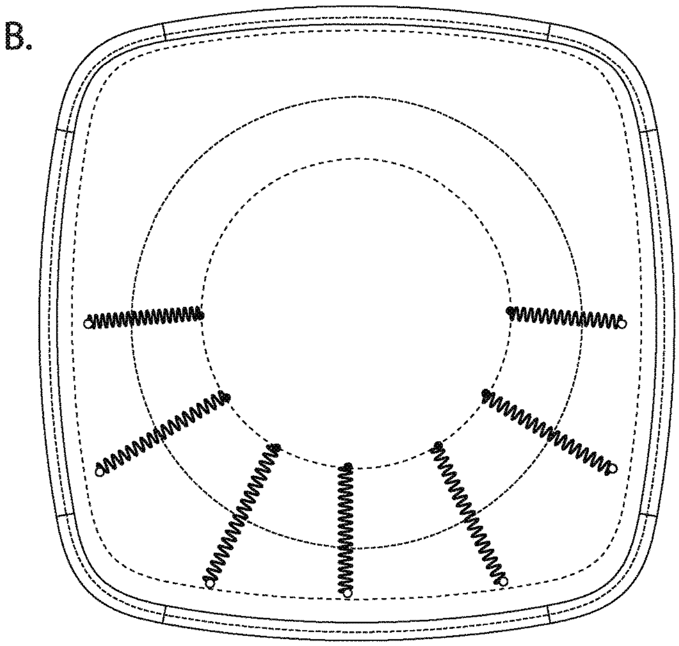

FIG. 510
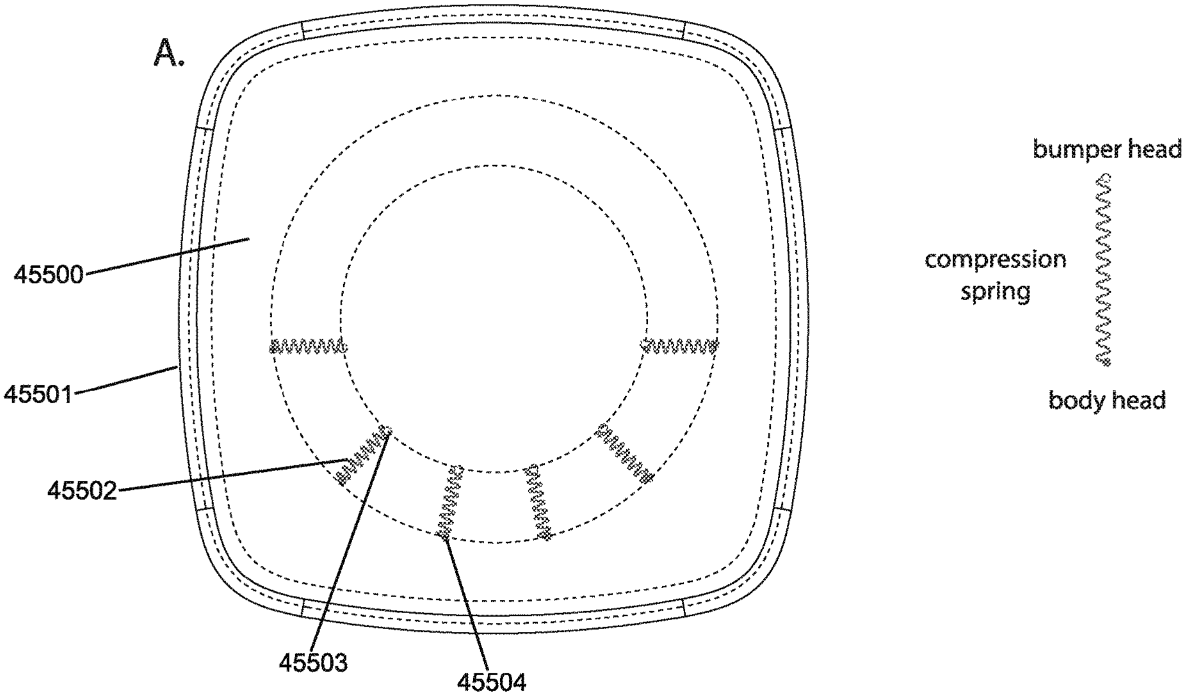
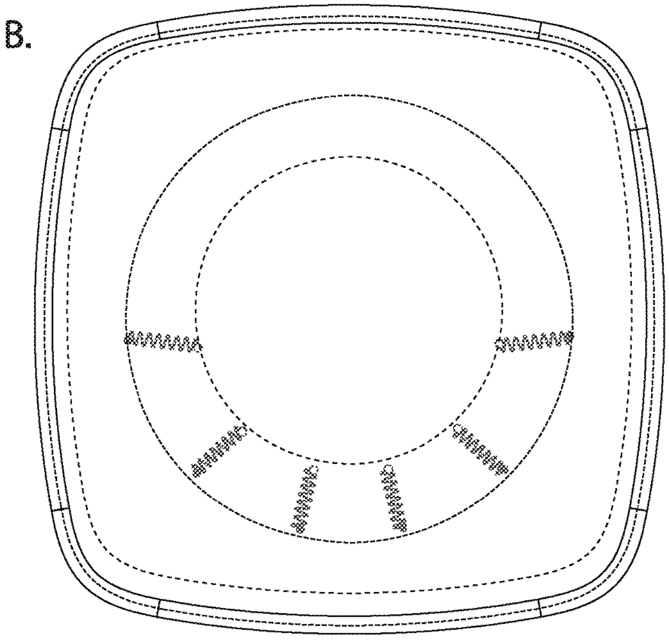

FIG. 511
A.
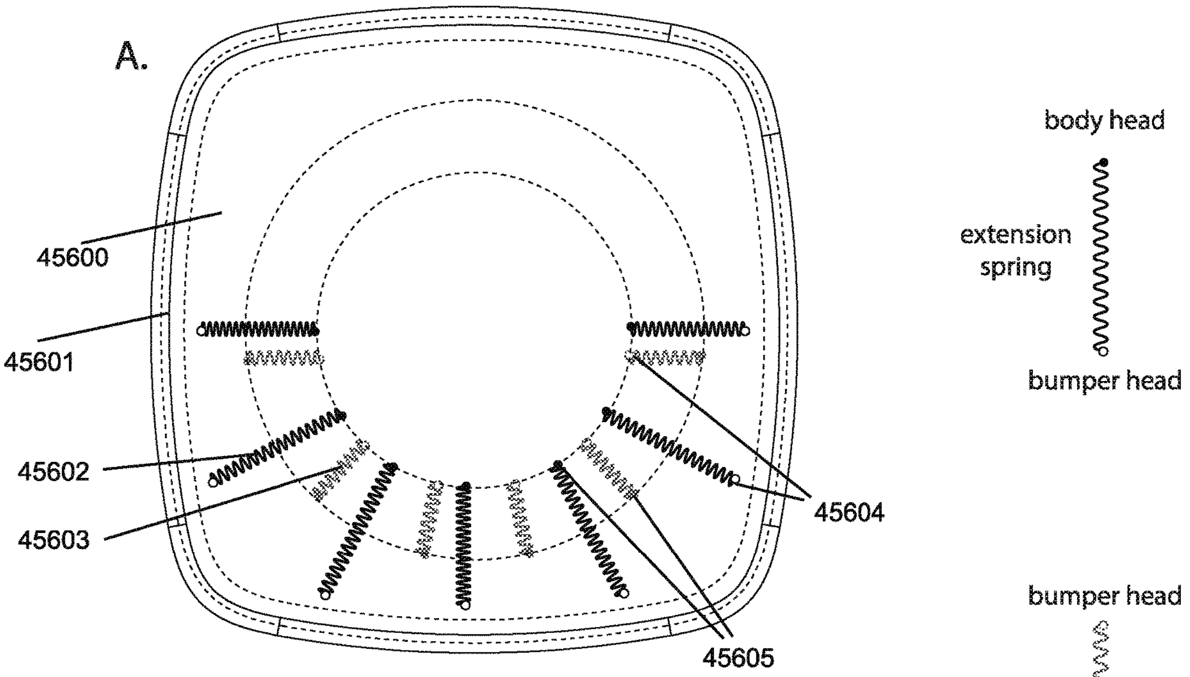
B.
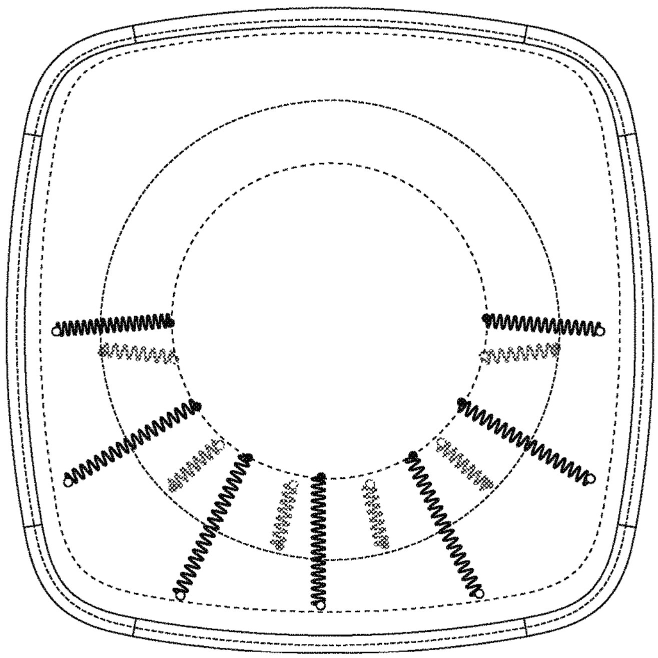

All sub-systems combined together

Summary of robot state machine showing all possible state transitions

Trash cans
Accessories shelves
Auto empty container
Guiding component IR emitter
Guiding component 3D indentation piece
Guining component rollers on each side of docking area
Guiding component QRcode, Barcode, or a specific pattern
Charging prongs

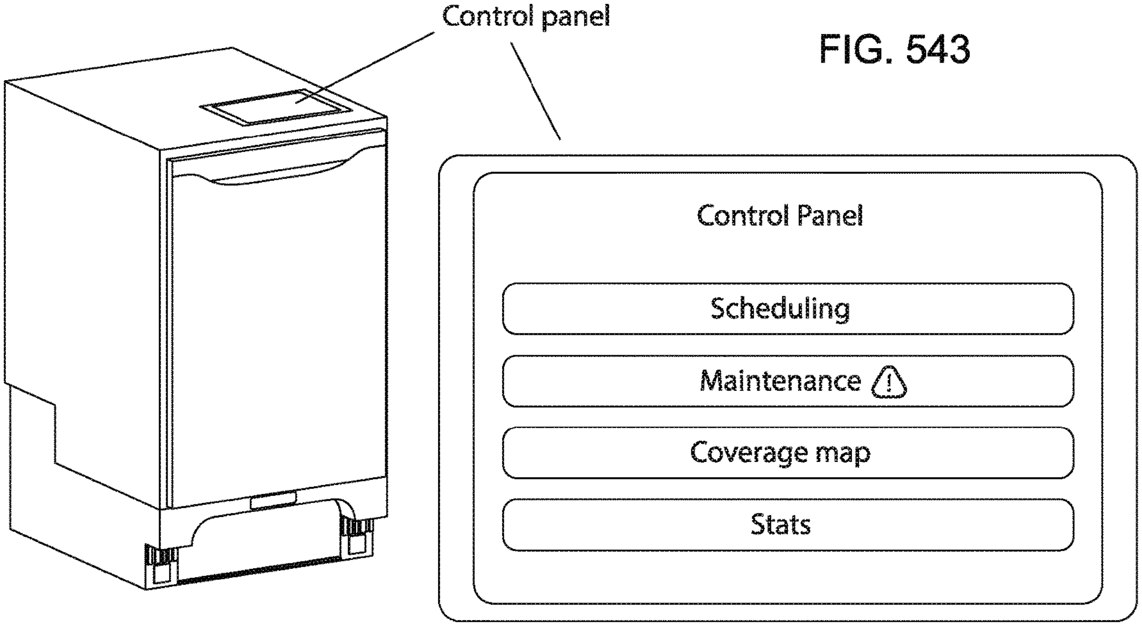
FIG. 543
Scheduling
| | Vacuum | Mop |
|---|---|---|
| Mon | 9:00 AM | 10:00 AM |
| Tue | 9:00 AM | 10:00 AM |
| Wed | 9:30 AM | 10:30 AM |
| Thu | -- | 10:00 AM |
| Fri | 9:00 AM | 10:00 AM |
| Sat | 11:00 AM | 02:00 PM |
| Sun | -- | 02:00 PM |
FIG. 544A
FIG. 544B
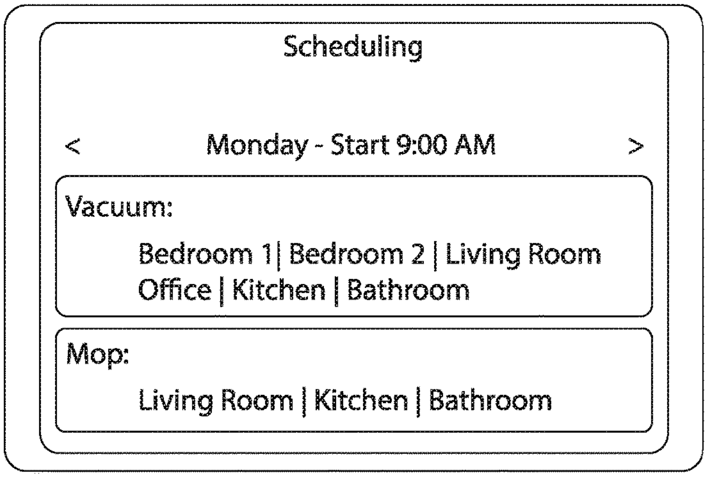

"Hey [AI assistant]... start [robot's name]"
"Hey [AI assistant]... stop [robot's name]"
"Hey [AI assistant]... send [robot's name] to be charged"
"Hey [AI assistant]... send [robot's name] to clean the [predefined room]"
...

SLAM ROBOT AND A PAIRED APPLICATION THEREOF

CROSS REFERENCE TO RELATED APPLICATIONS

This application claims the benefit of U.S. Provisional Patent Application Nos. 63/281,661, filed Nov. 20, 2021, 63/286,473, filed Dec. 6, 2021, 63/293,917, filed Dec. 27, 2021, 63/304,887, filed Jan. 31, 2022, 63/315,158, filed Mar. 1, 2022, 63/321,686, filed Mar. 19, 2022, 63/331,182, filed Apr. 19, 2022, 63/396,538, filed Aug. 9, 2022, 63/403,821, filed Sep. 5, 2022, 63/404,660, filed Sep. 8, 2022, and 63/412,486, filed Oct. 2, 2022, each of which is hereby incorporated herein by reference.

In this patent, certain U.S. patents, U.S. patent applications, or other materials (e.g., articles) have been incorporated by reference. Specifically, U.S. patent application Ser. Nos. 17/670,277, 17/344,892, and 17/494,251 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure generally relates to robots.

SUMMARY

Some aspects include a method of composing a plurality of semi-enclosed floor surface constituents for digitally representing a fully enclosed floor surface on a screen of a smart computing device paired with a robot, including: composing, with a processor of the robot, in real-time, upon first startup of the robot, and as the robot moves on a floor surface, digital representations of boundary lines of the floor surface by organizing a swarm of points to form the boundary lines, wherein: the swarm of points are formed based on at least light bouncing off of a wall or an obstacle captured by a sensor disposed on the robot; and a location of a boundary line corresponds to a location where the floor surface ends and a wall begins; composing, with the processor of the robot, in real-time, and as the robot moves on the floor surface, digital representations of the plurality of semi-enclosed floor surface constituents by organizing the digital representations of the boundary lines as they are composed to form the digital representations of the plurality of semi-enclosed floor surface constituents, wherein: an inner surface of each digital representation of a semi-enclosed floor surface constituent is semi-enclosed by digital representations of respective boundary lines; the application displays, on the screen of the smart computing device, the digital representations of the plurality of semi-enclosed floor surface constituents as they are composed in real-time; and each digital representation of a semi-enclosed floor surface constituent is displayed in a different color; and composing, with the processor of the robot, in real-time, and as the robot moves on the floor surface, the digital representation of the fully enclosed floor surface using the digital representations of the plurality of semi-enclosed floor surface constituents as they are composed, wherein: the digital representation of the fully enclosed floor surface is composed by iteratively connecting an inner surface of a new digital representation of a semi-enclosed floor surface constituent as it is composed to an inner surface of a previously composed digital representation of a semi-enclosed floor surface constituent, until the digital representation of the fully enclosed floor surface is complete; the application displays, on the screen of the smart computing device, an inner surface of each digital representation of a semi-enclosed floor surface constituent in a different color of a color pallet as each digital representation of a semi-enclosed floor surface constituent is composed in real-time; and the application displays, on the screen of the smart computing device, the digital representation of the fully enclosed floor surface as it is composed and in completed form.

Some aspects provide a robot implementing the above-described method.

Some aspects provide a memory storing instructions that when executed by a processor of a robot effectuate the above-described method.

Some aspects include a method of composing a plurality of semi-enclosed floor surface constituents for digitally representing a fully enclosed floor surface on a screen of a smart computing device paired with a robot, including: composing, with a processor of the robot, in real-time, upon a first startup of the robot, a first digital representation of a semi-enclosed boundary, an interior of which is colored in a first color, for digitally representing a first semi-enclosed floor surface constituent, wherein: each digital representation of a semi-enclosed boundary is composed of digital representations of boundary lines; each digital representation of a boundary line is composed of a swarm of points; the swarm of points are formed based on at least light bouncing off of a wall or an obstacle captured by a sensor disposed on the robot; a location of a digital representation of a boundary line on the screen corresponds to a location where a floor surface ends and a wall begins; composing, with the processor of the robot, in real-time, and as the robot performs work and moves on the floor surface, a second digital representation of a semi-enclosed boundary, an interior of which is colored in a second color, for digitally representing a second semi-enclosed floor surface constituent, wherein: as new swarms of points are obtained, new digital representations of semi-enclosed boundaries, an interior of each colored in a unique color, are iteratively composed for digitally representing new semi-enclosed floor surface constituents; and composing, with the processor of the robot, in real-time, and as the robot performs work and moves on the floor surface, the digital representation of the fully enclosed floor surface using the digital representations of the plurality of semi-enclosed floor surface constituents as they are composed, wherein: the digital representation of the fully enclosed floor surface is composed after the robot navigates the plurality of semi-enclosed floor surface constituents; the digital representation of the fully enclosed floor surface is stored and available to the processor of the robot for future work sessions; and the digital representation of the fully enclosed floor surface is viewed on the screen of the smart computing device and accessed by a user using an application executed on the smart computing device for at least spatially granular control of the robot.

Some aspects include a method for transmitting data for displaying a fully enclosed floor surface on a screen of a smart computing device paired with a robot, including: transmitting, by a processor of the robot, to an application, in real-time, and upon startup of the robot at a beginning of a first work session, sensor data associated with a first semi-enclosed floor surface constituent comprising a first digit code, wherein: the application displays, on the screen of the smart computing device, the first digit code in a first color; the first color displayed represents a surface area of the first semi-enclosed floor surface constituent; the robot determines the first surface area and where a floor surface ends and a wall begins using a swarm of points; and the swarm of points are formed based on at least light bouncing off of a wall or an obstacle captured by a sensor disposed on the robot; transmitting, by the processor of the robot, to the application, in real-time, and as the robot performs work, sensor data associated with a second semi-enclosed floor surface constituent comprising a second digit code, wherein: the application displays, on the screen of the smart computing device, the second digit code in a second color, unique to the first color; and the second color displayed represents a surface area of the second semi-enclosed floor surface constituent; iteratively transmitting, by the processor of the robot, in real-time, and as the robot performs work, sensor data associated with each of a plurality of semi-enclosed floor surface constituents, each comprising a unique digit code, to the application, wherein: the application displays, on the screen of the smart computing device, each unique digit code in a unique color; and each color displayed represents a surface area of a respective semi-enclosed floor surface constituent of the plurality of semi-enclosed floor surface constituents; transmitting, by the processor of the robot, to the application, in real-time, and as the robot performs work, sensor data associated with a last semi-enclosed floor surface constituent comprising a last digit code, wherein: the application displays, on the screen of the smart computing device, the last digit code in a last unique color; and the last unique color displayed represents a surface area of the last semi-enclosed floor surface constituent; and composing, with the processor of the robot, in real-time, and as the robot performs work, a digital representation of the fully enclosed floor surface using the semi-enclosed floor-surface constituents, wherein: the application displays, on the screen of the smart computing device, the digital representation of the fully enclosed floor surface as it is composed and in completed form.

BRIEF DESCRIPTION OF DRAWINGS

FIG. 3 illustrates examples of processing activities executed on the cloud and a process for establishing connection with electronics connected to the cloud.

FIG. 9 illustrates a time to map an entire area.

FIG. 35 illustrates examples of image and odometry data streams of a robot.

FIG. 39 illustrates an example of a map.

FIG. 40 illustrates a multi-layer map.

FIG. 41 illustrates an example of a robot configured to map.

FIGS. 42A and 42B illustrate a robot configured to clear a path.

FIG. 57 illustrates a user specifying surfaces in a 3D model of an environment using an application of a communication device.

FIG. 58 illustrates a process of generating a list of suggested items.

FIG. 59 illustrates a process of determining remaining properties of an object.

FIG. 60 illustrates prioritization of items on a suggested list.

FIGS. 67A and 67B illustrate an example of a robot measuring distance to walls.

FIG. 68 illustrates an example of a robot with one or more distance sensors.

FIGS. 74 and 75 illustrate examples of TOF sensors for accurately measuring distance.

FIG. 76 illustrates changes in accuracy for distances derived through triangulation.

FIG. 77 illustrates a relation between confidence score and a location of transmitters and receivers.

FIGS. 126-128 illustrate combining sensor data channels.

FIG. 145 illustrates a sensor of a robot observing a person as both the robot and the person move.

FIG. 146 illustrates a sensor of a robot observing a stationary object as the robot moves.

FIGS. 147-149 illustrate using detection of unique indentation patterns of objects as an indicator for information or instruction.

FIG. 156 illustrates a process of achieving a smooth final approach path of a robot during docking.

FIG. 157 illustrates a robot docking at a docking station using QR codes.

FIG. 158 illustrates a robot on uneven surface during docking.

FIG. 159 illustrates an example of a distorted image of a QR code.

FIG. 160 illustrates a process for interpreting a distorted image.

FIGS. 161A and 161B illustrate an example of a robot including a Time-o-Flight (TOF) sensor.

FIGS. 162A-162C illustrate an example of a robot including a LIDAR.

FIG. 163 illustrates combing segmentation methods.

FIGS. 164A-164C illustrate examples of an image analysis process.

FIG. 165 illustrates a stationary camera observing doorways of a server room.

FIGS. 166A and 166B illustrate a robot and a charging station including IR transmitters and receivers.

FIG. 167 illustrates an example of tracking observations from one frame to the next.

Figure 169:
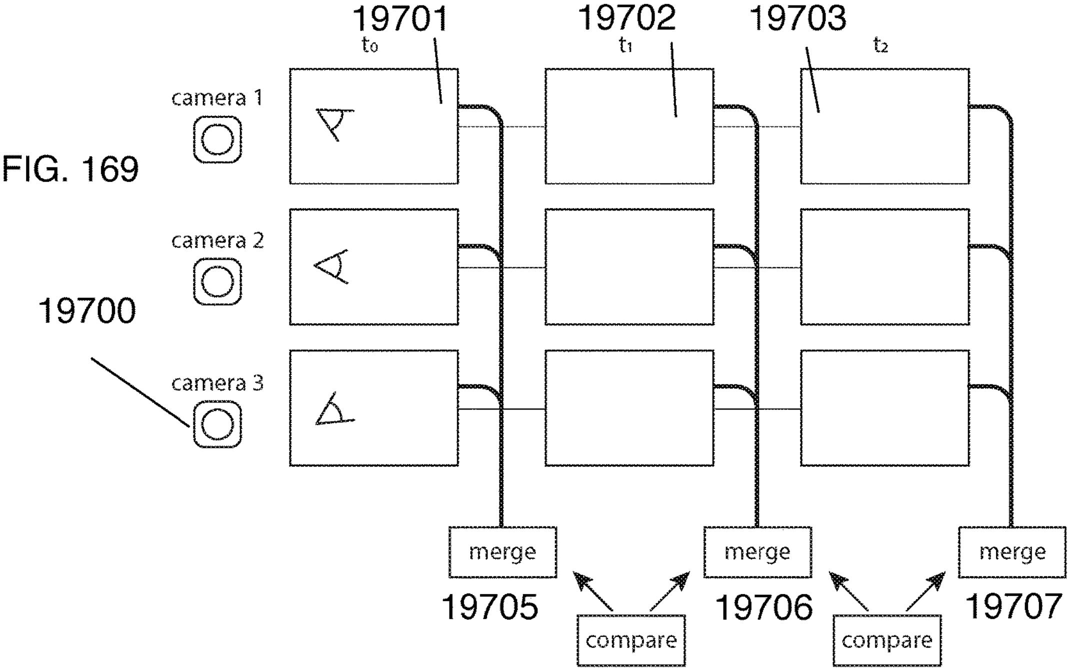
Figure 170:
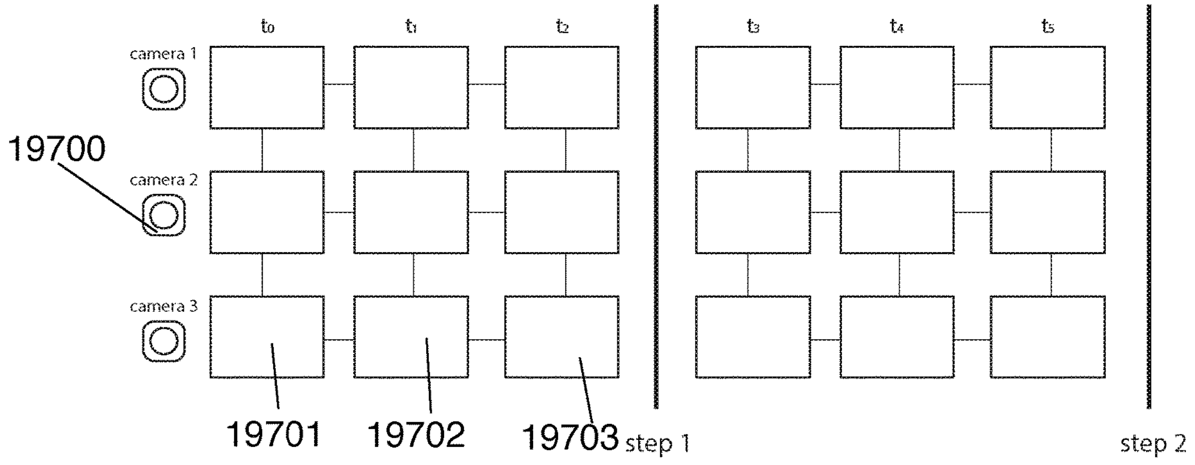

FIGS. 168-170 illustrate three cameras capturing frames of readings and merging images.

Figure 171:
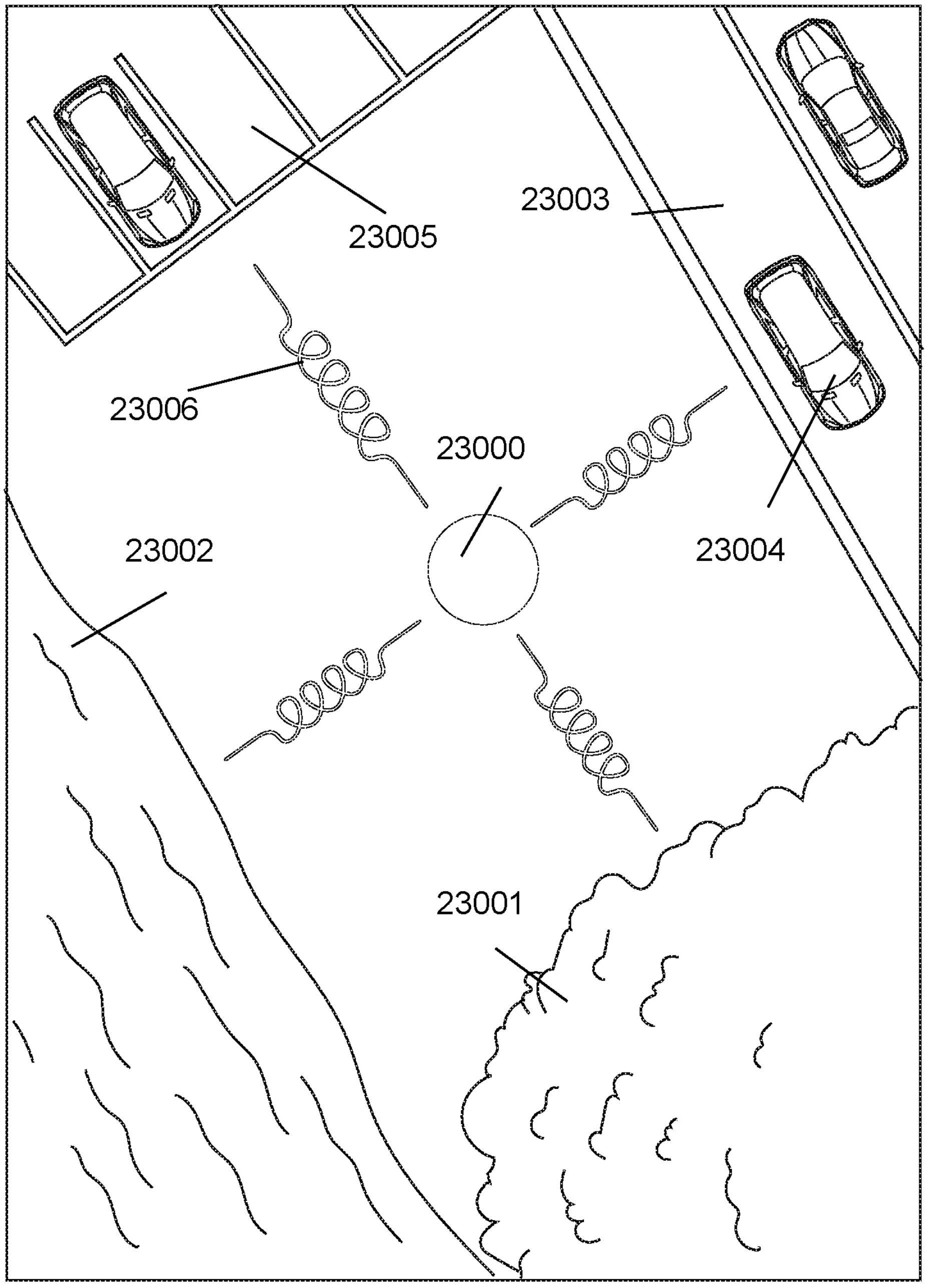

FIG. 171 illustrates a robot, a grassy area, an ocean, a street with cars, and a parking area.

Figure 172:
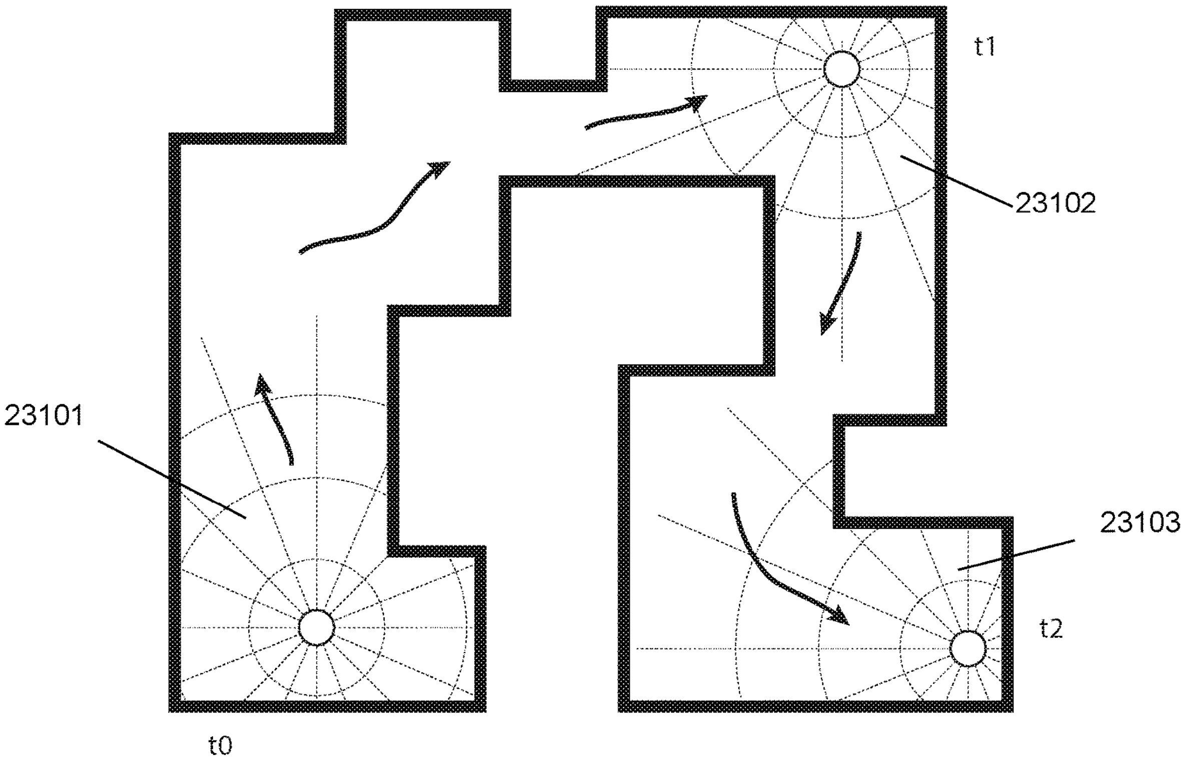
Figure 173:
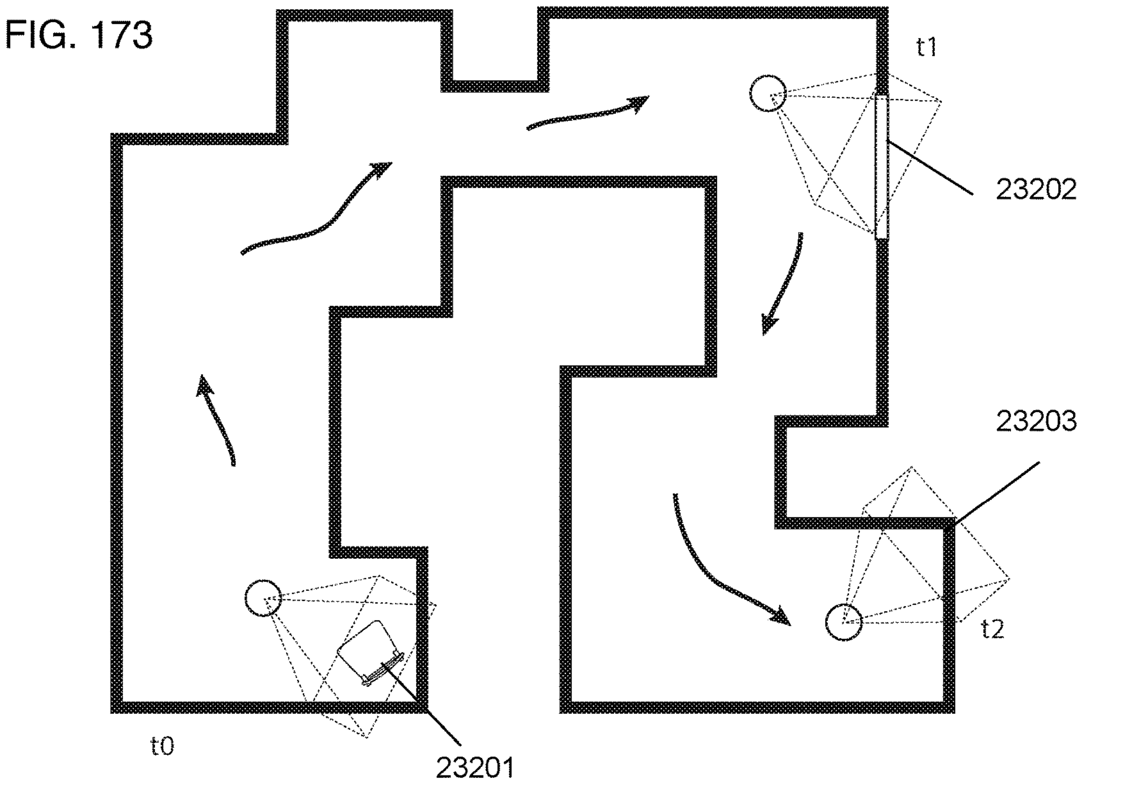

FIGS. 172 and 173 illustrate observations of a camera of a robot at different times and locations.

Figure 174:
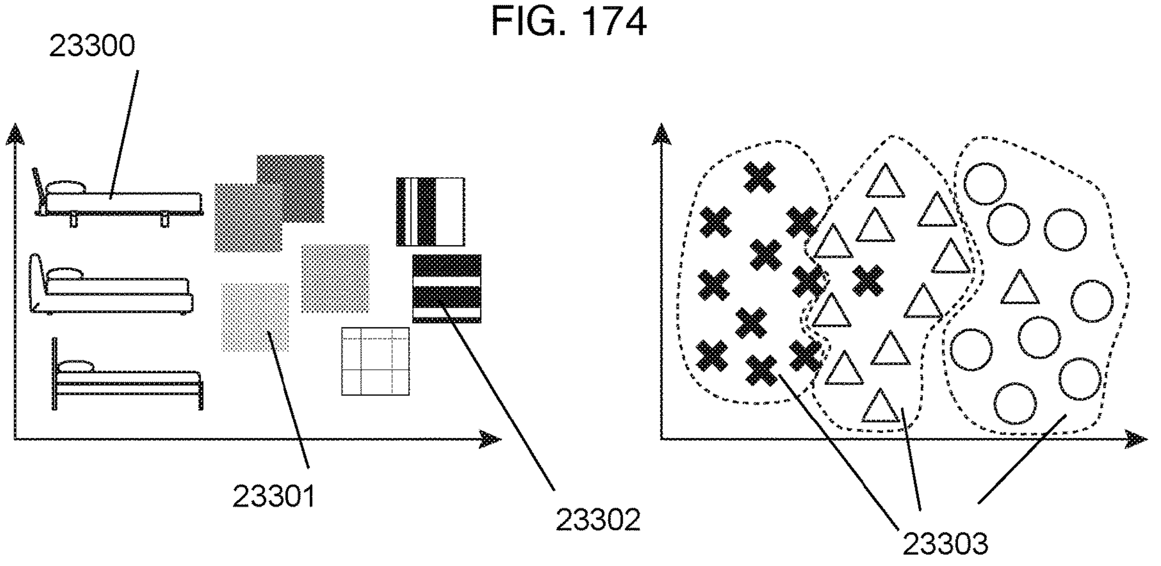

FIG. 174 illustrates an example of different commonalities observed for an area.

Figure 175:
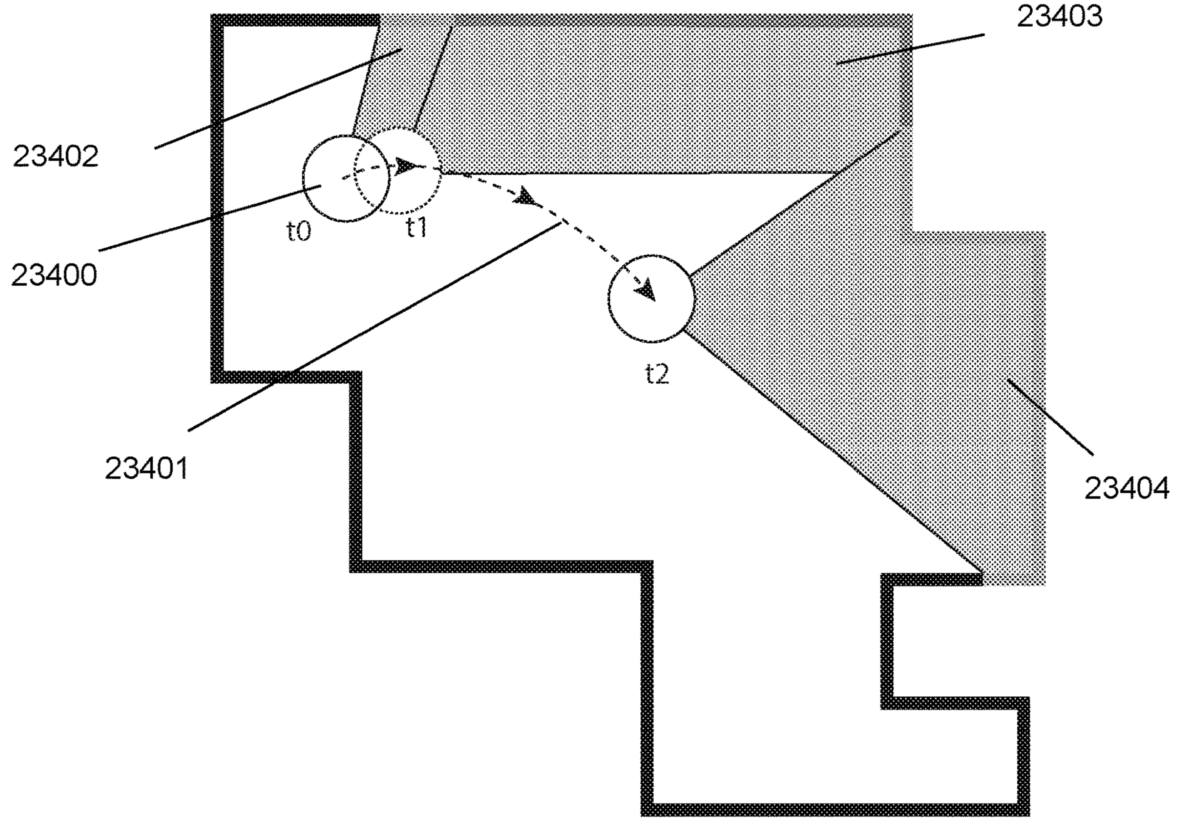

FIG. 175 illustrates the robot and its trajectory.

Figure 176:
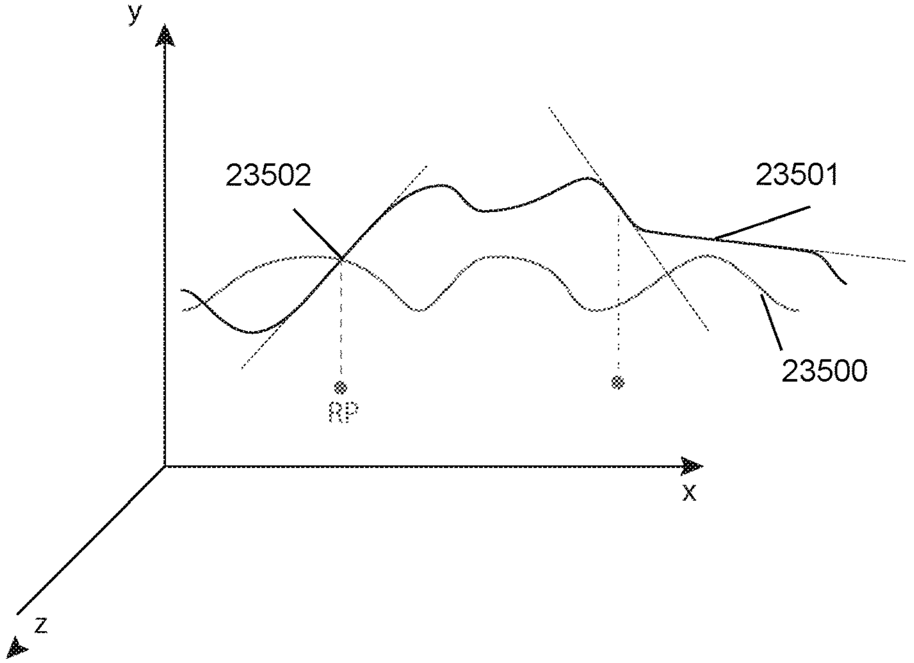

FIG. 176 illustrates confidence in a map and localization

FIGS. 177A-178C illustrate a robot capturing depth measurements.

Figure 179:
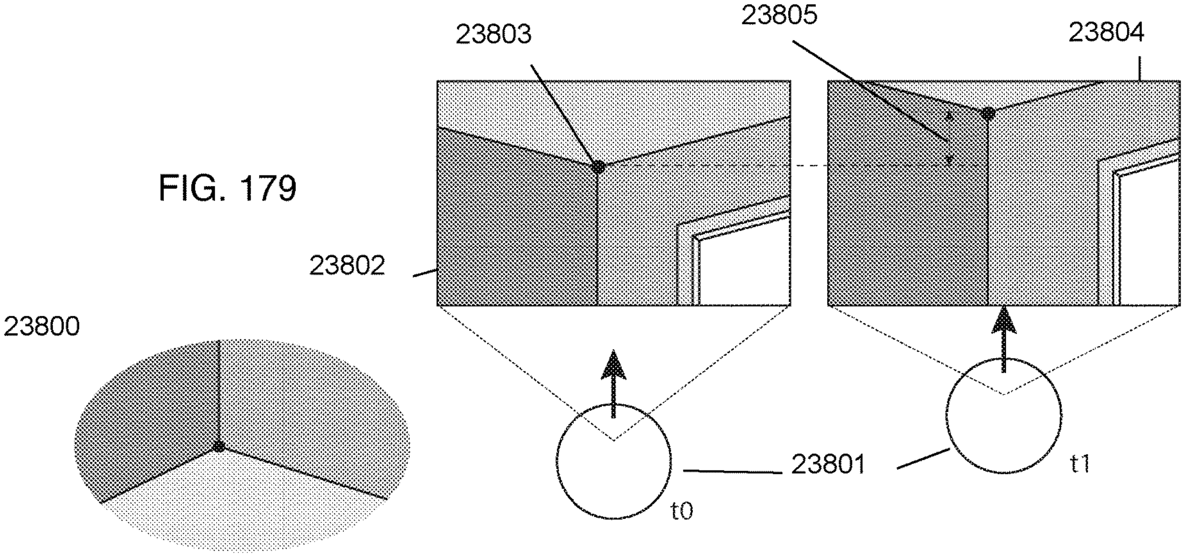

FIG. 179 illustrates an example of a corner detected by a processor of a robot.

Figure 180:
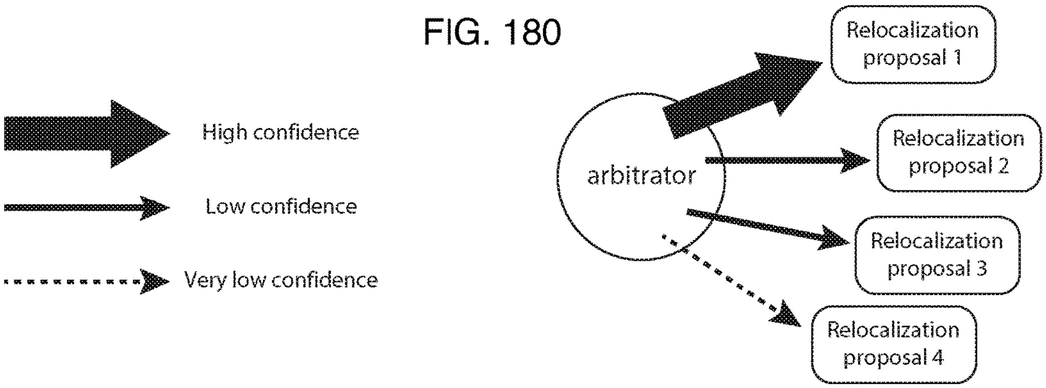

FIG. 180 illustrates an arbitrator proposing four different localization scenarios.

Figure 181A:
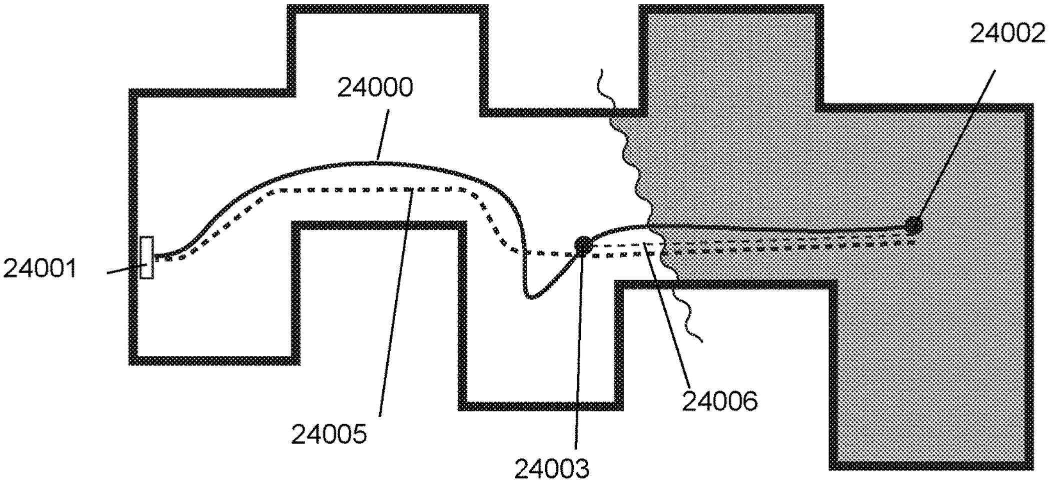

FIG. 181A illustrates a last known rendezvous point for the robot.

Figure 181B:
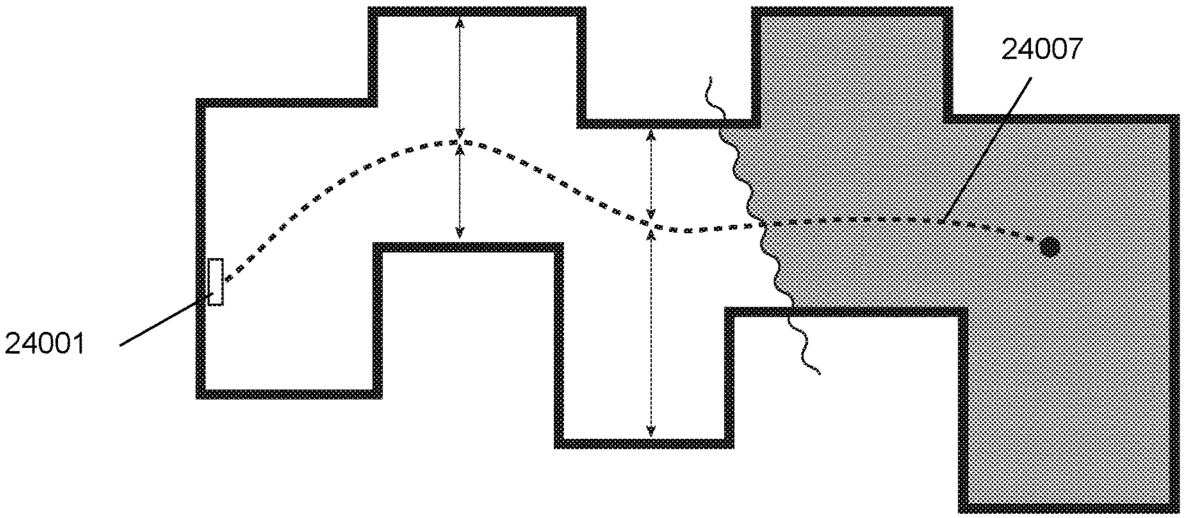

FIG. 181B illustrates a safe bread crumb path a robot follows back to a charging station.

Figure 181C:
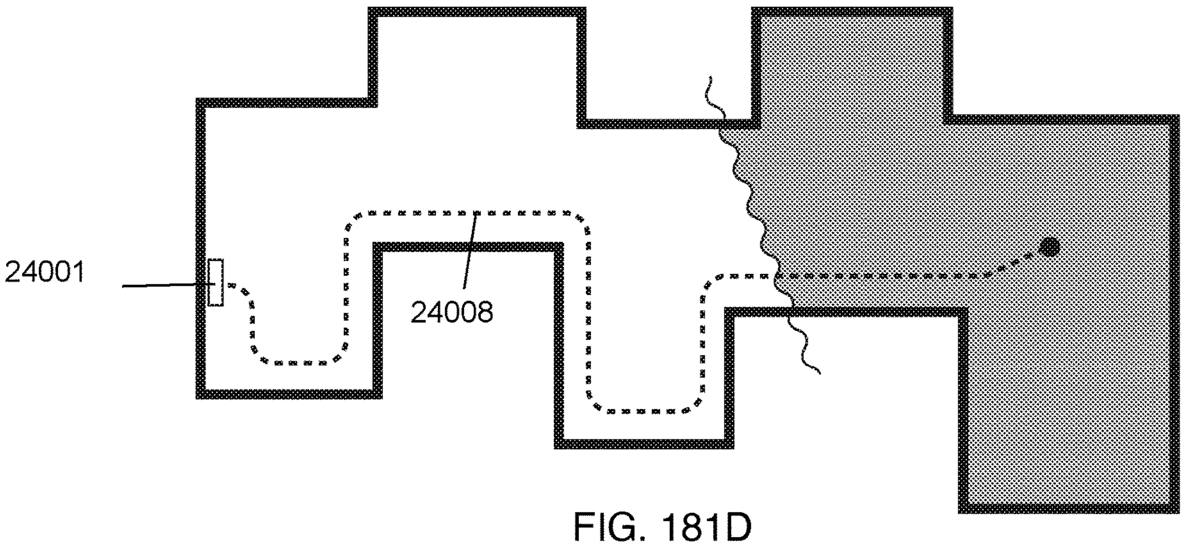

FIG. 181C illustrates a coastal path a robot follows to return to a charging station.

Figure 181D:
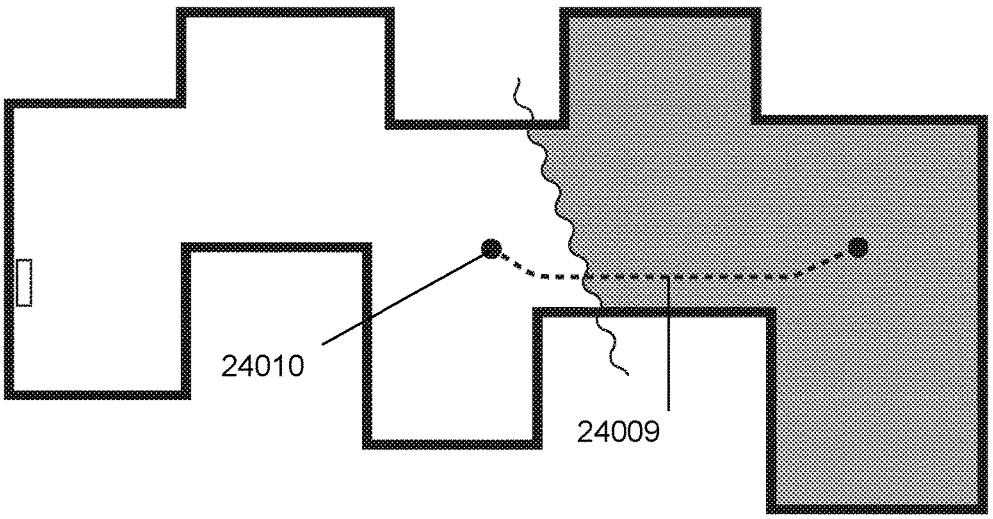

FIG. 181D illustrates a coastal path a robot follows to a last known point.

Figure 182:
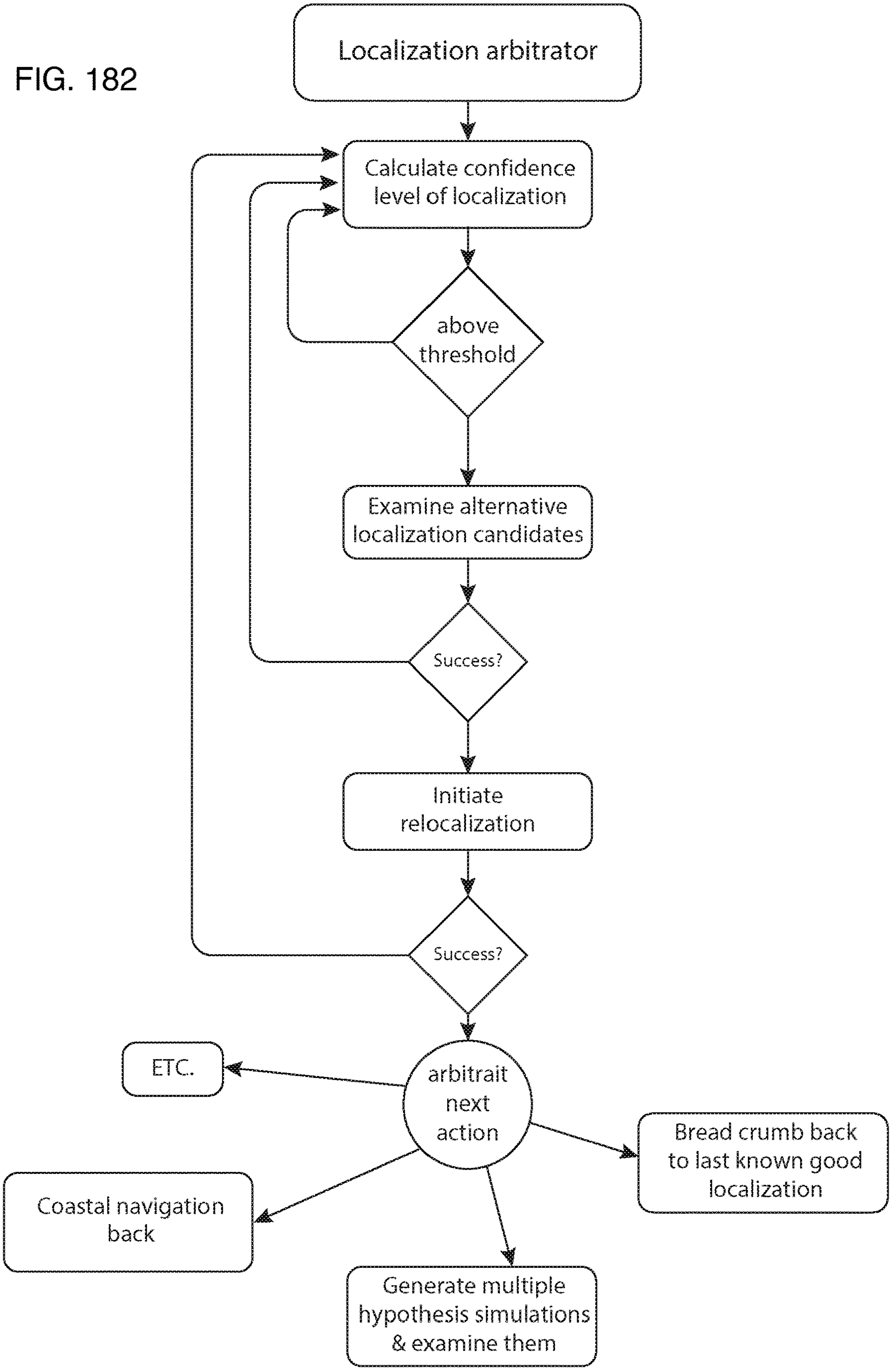

FIG. 182 illustrates an example of methods implemented in a localization arbitrator algorithm.

FIGS. 183A-183F illustrate an example of structured light projection in an environment.

Figure 184:
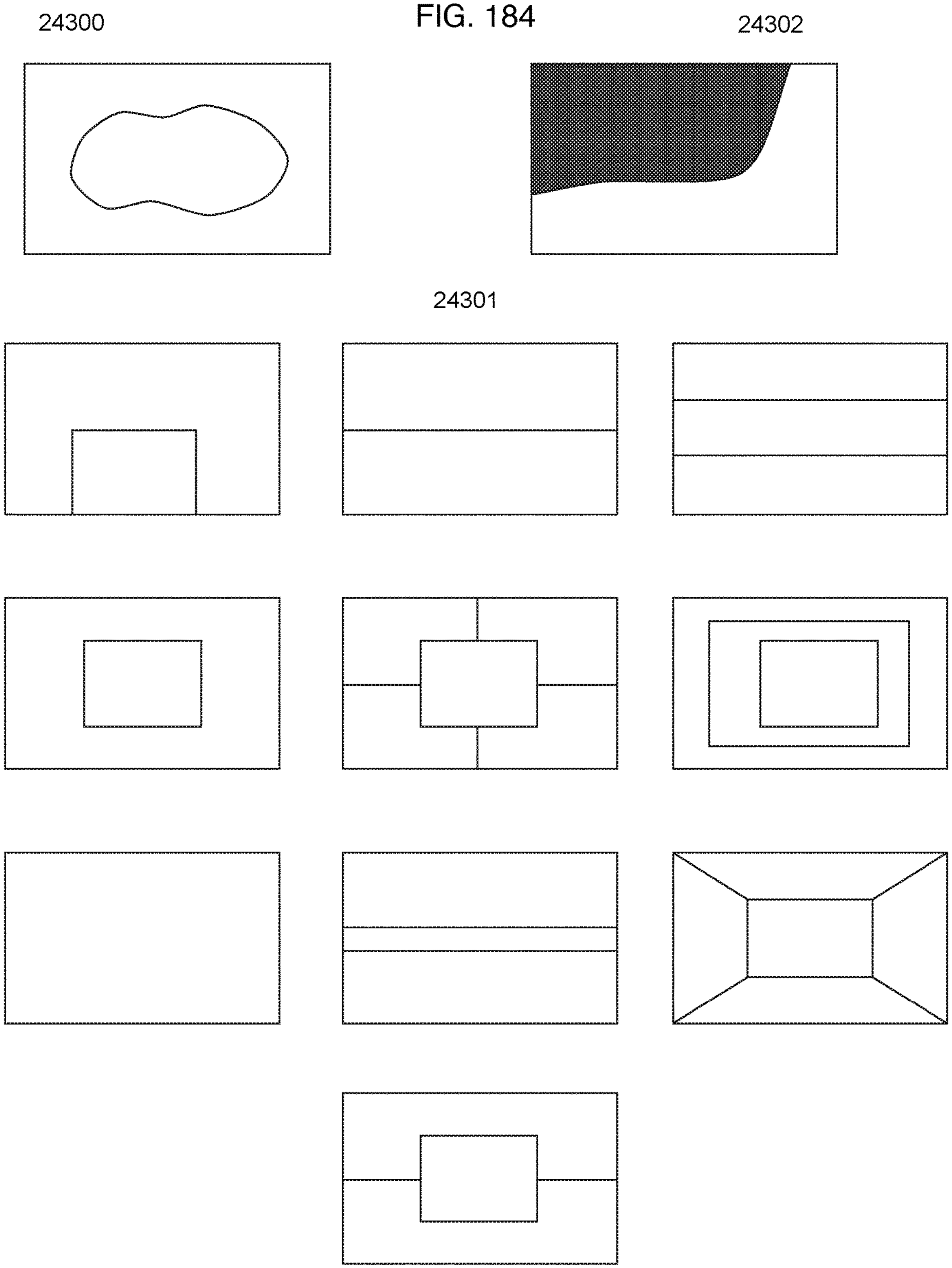

FIG. 184 illustrates various types of image segmentations.

Figure 185:
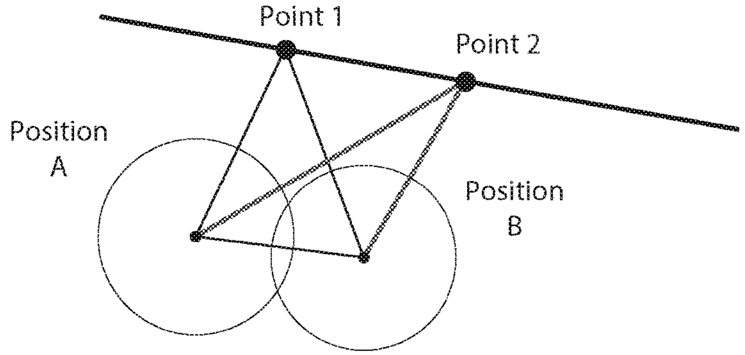

FIG. 185 illustrates an example of deep bundling.

Figure 186:
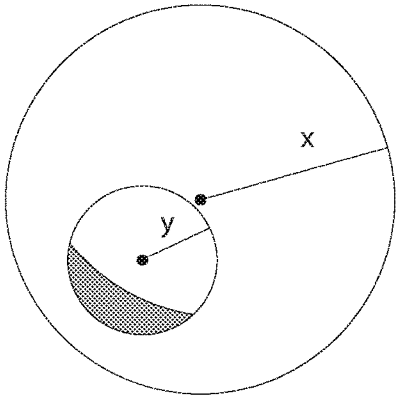

FIG. 186 illustrates a process of localization.

Figure 187:
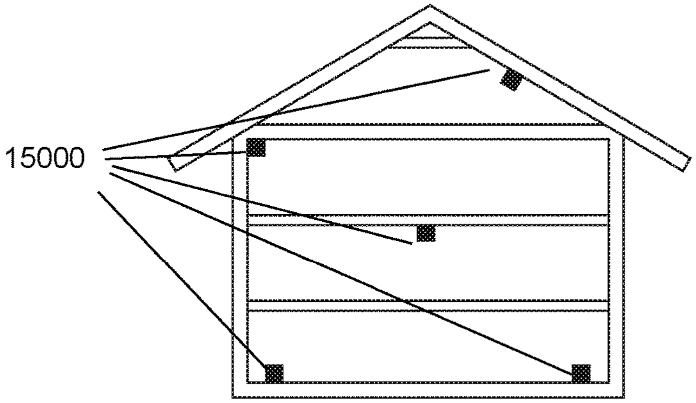

FIG. 187 illustrates wireless/Wi-Fi repeaters/routers at various levels within a home.

FIGS. 188A-188D illustrate an example of an airport with six access points and signal strength of each access point in two different runs.

FIG. 189 illustrates a process of bundling between signal strength and LIDAR feed.

Figure 190:
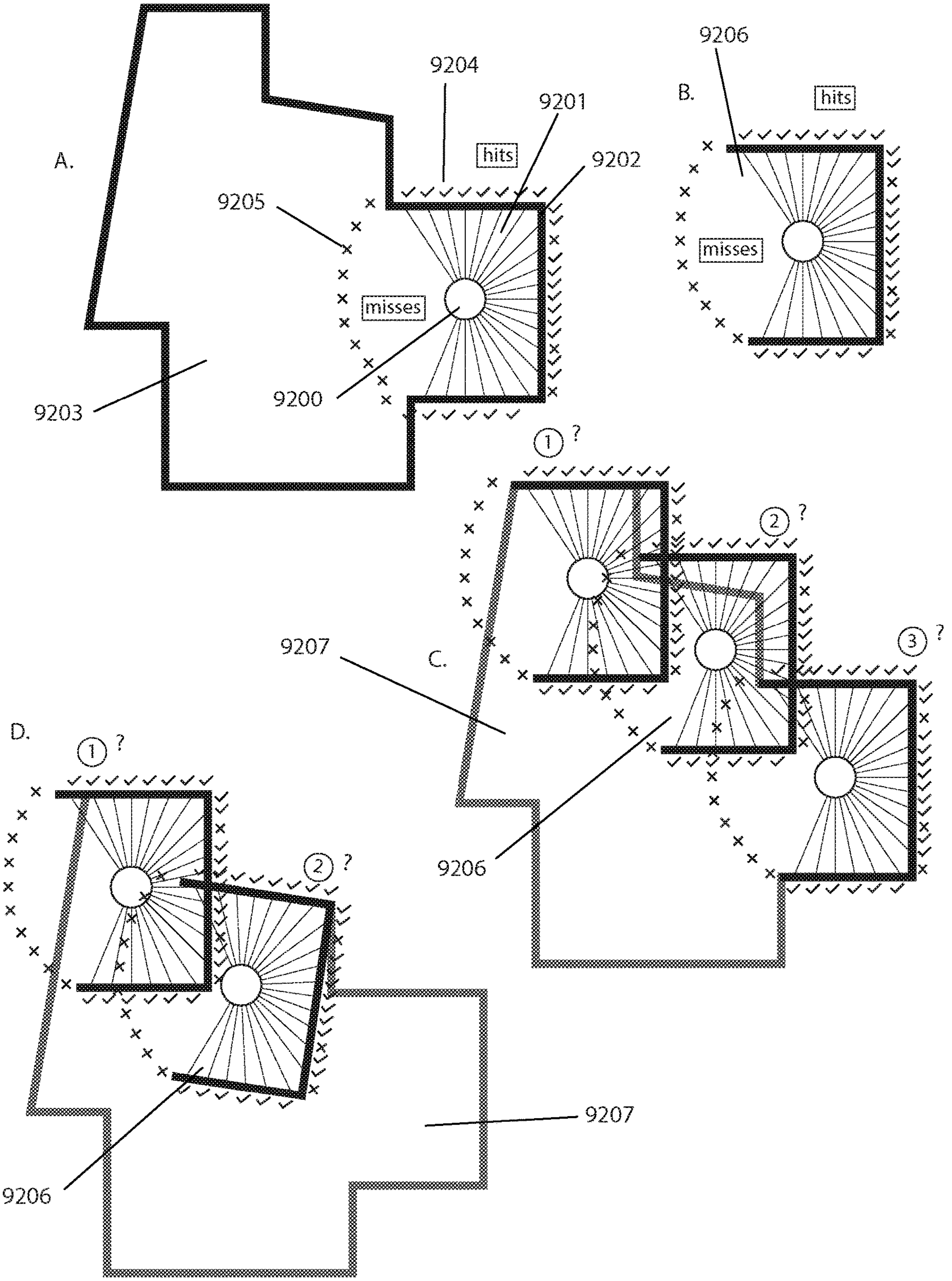
Figure 191A:
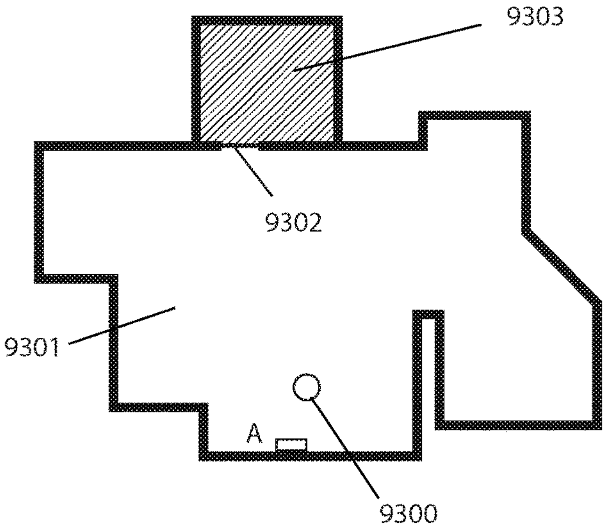
Figure 191B:
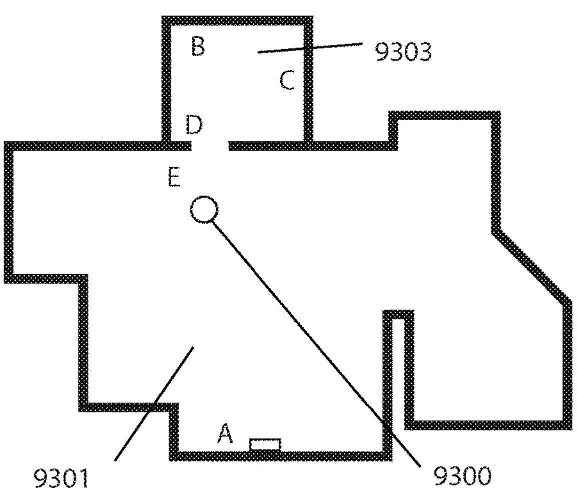

FIGS. 190-191B illustrate examples of relocalizing a robot.

Figure 192:
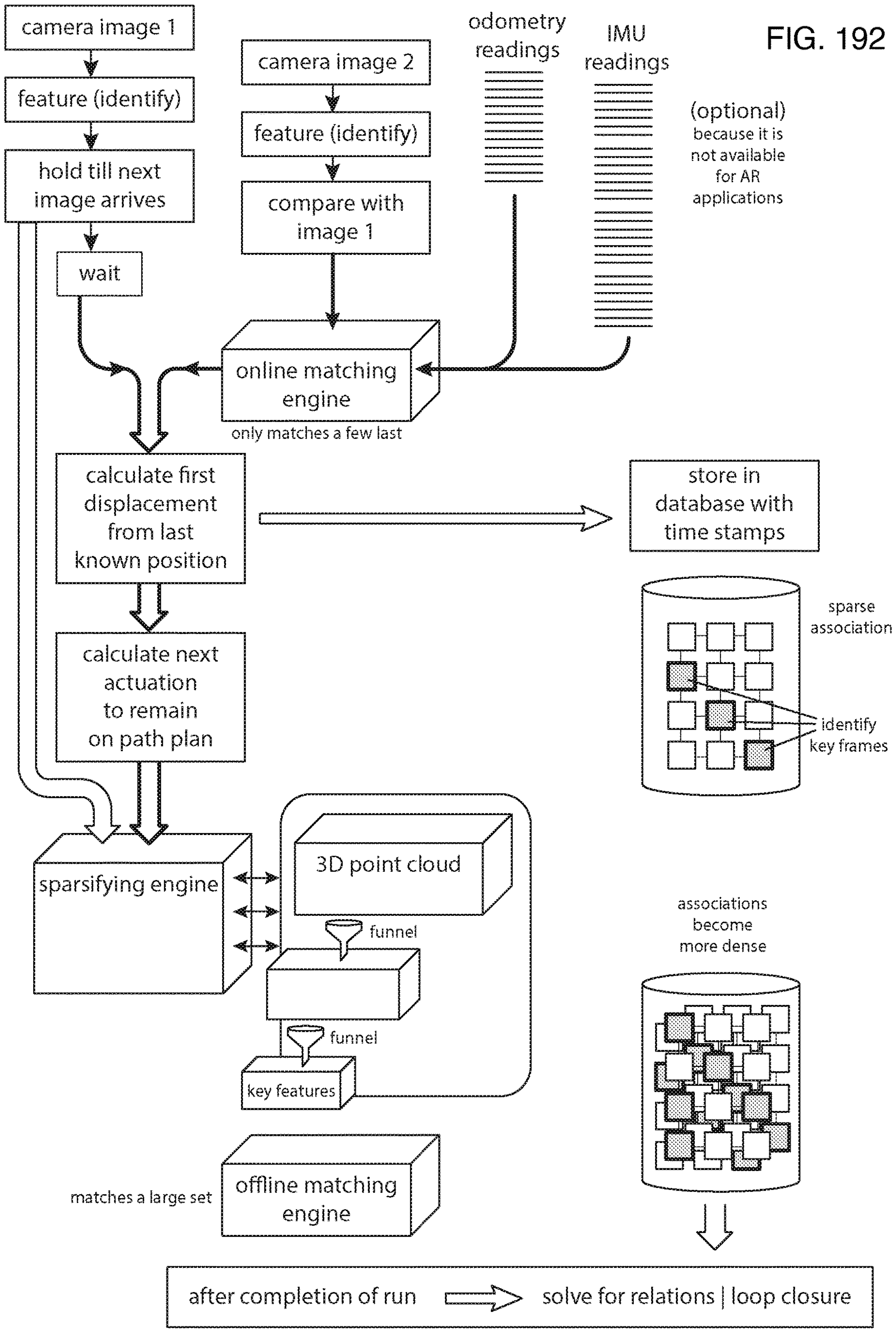

FIG. 192 illustrates a process of localization of a robot using various sensor data types.

Figure 193:
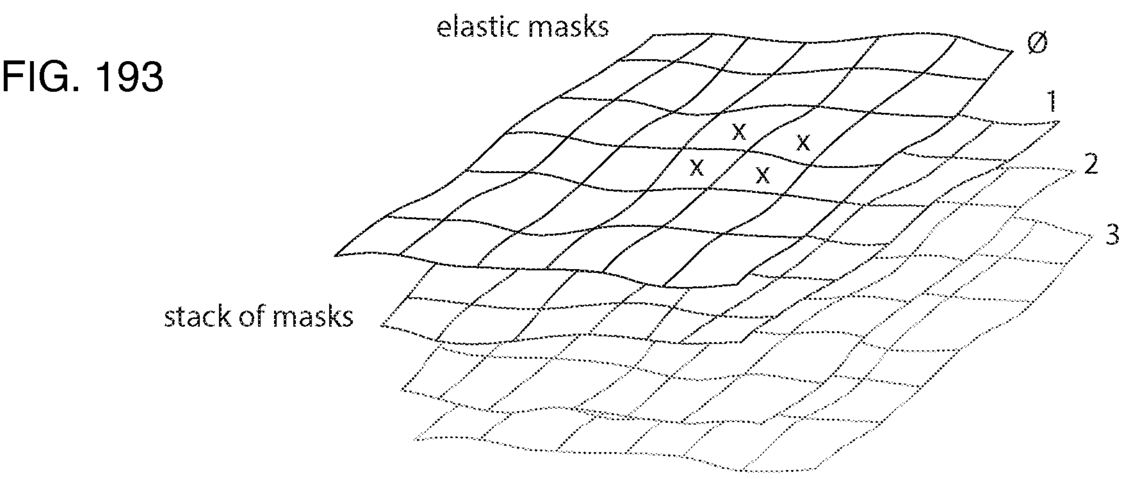

FIG. 193 illustrates a stack of masks.

Figure 194A:
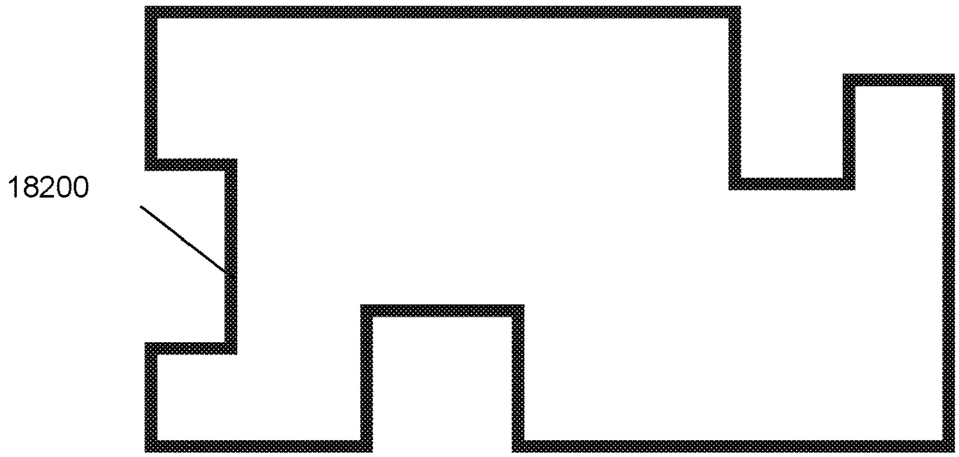
Figure 194B:
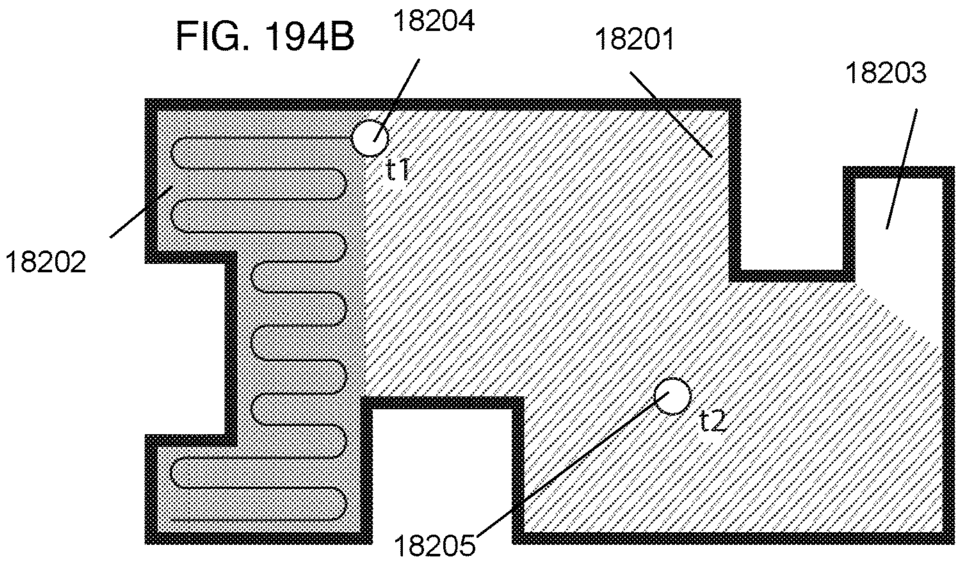
Figure 194C:
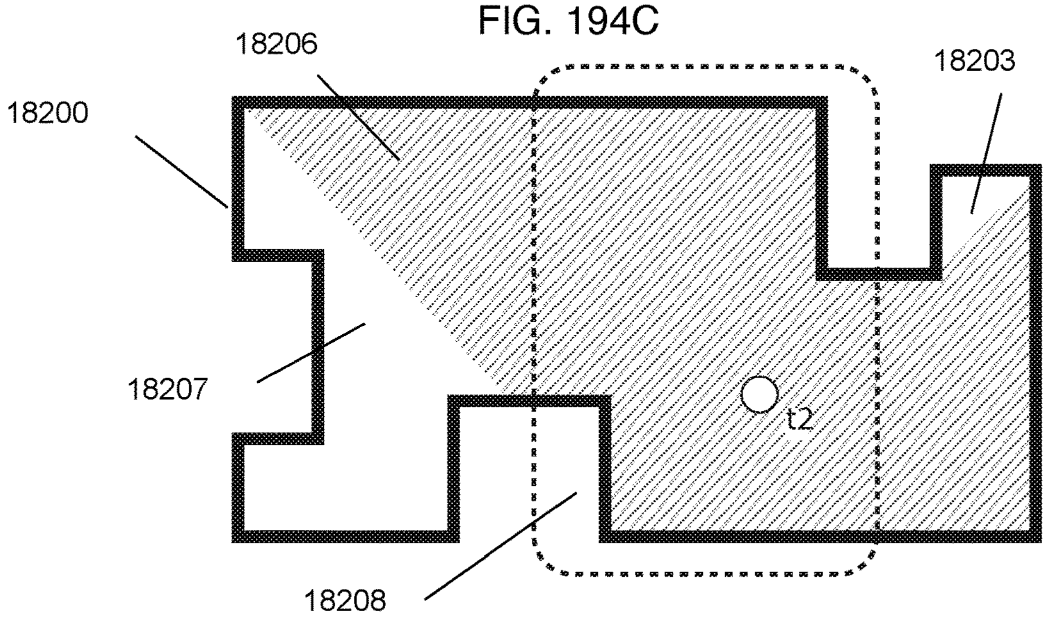

FIGS. 194A-194C illustrate a workspace, including mapped, covered, and undiscovered areas.

Figure 195:
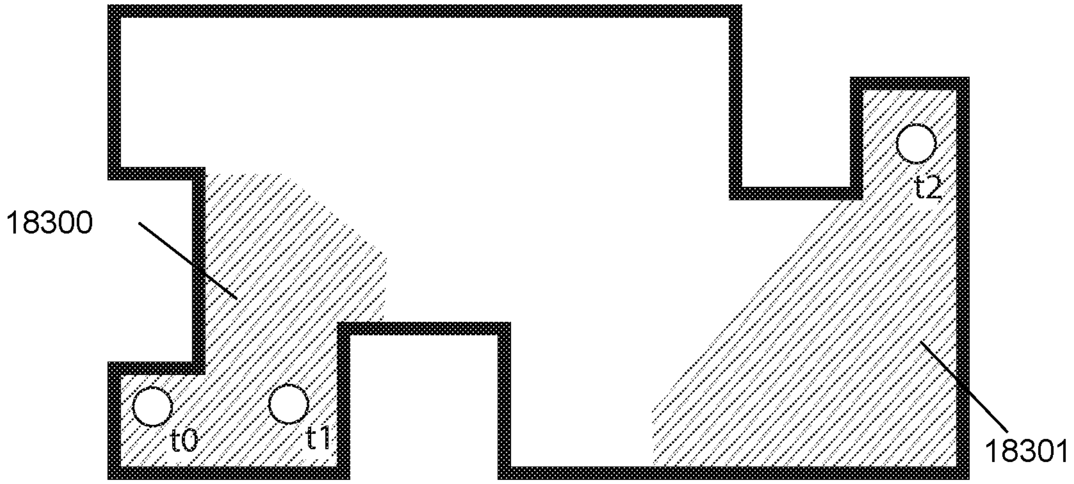

FIG. 195 illustrates a position of a robot at two different time points.

Figure 196:
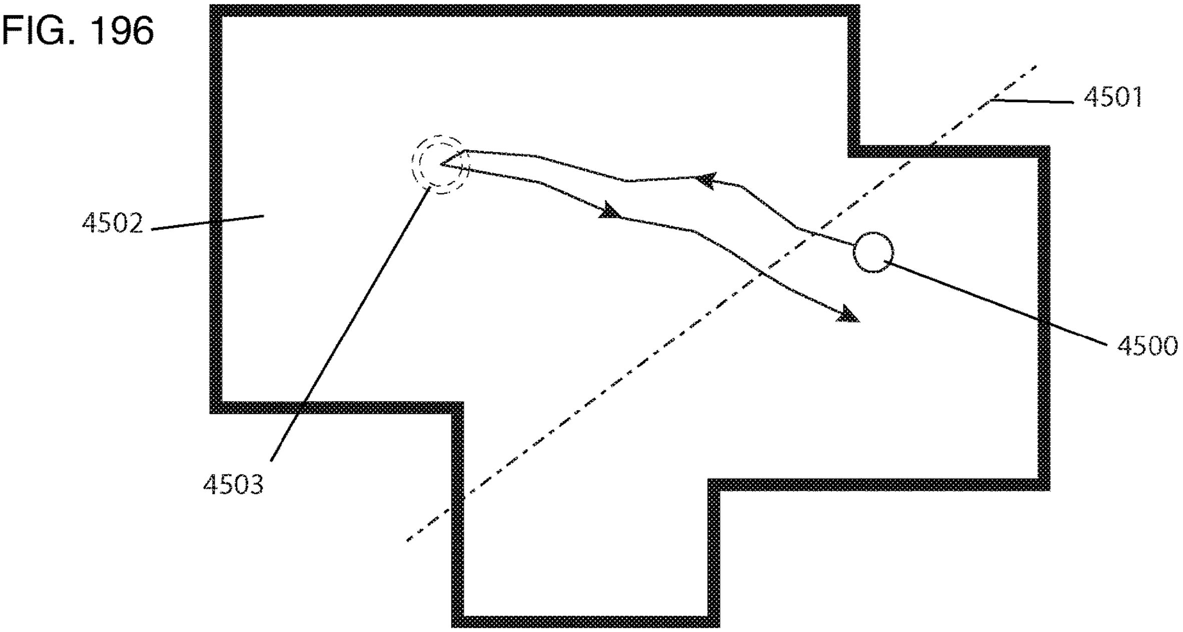

FIG. 196 illustrates an example of relocalization of a robot.

FIG. 197 illustrates a table of various robot brands and a number of successful relocalization attempts.

FIG. 198 illustrates an example of HD depth maps.

FIG. 199 illustrates localization of a robot using object features and QR codes.

FIG. 200 illustrates associating pixels with depth data.

Figure 201:
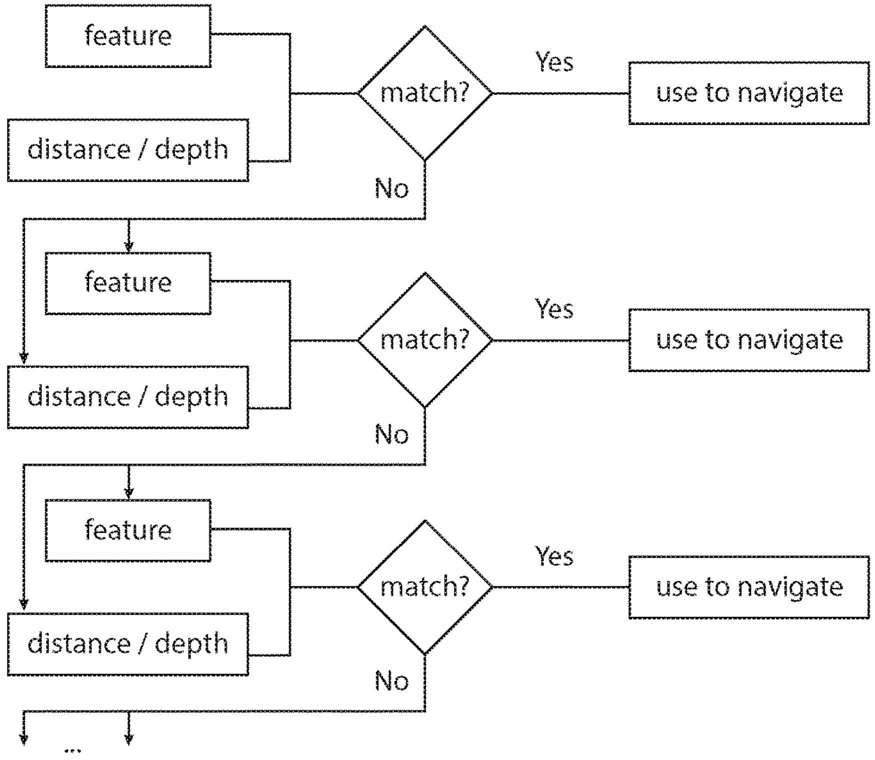
Figure 202:
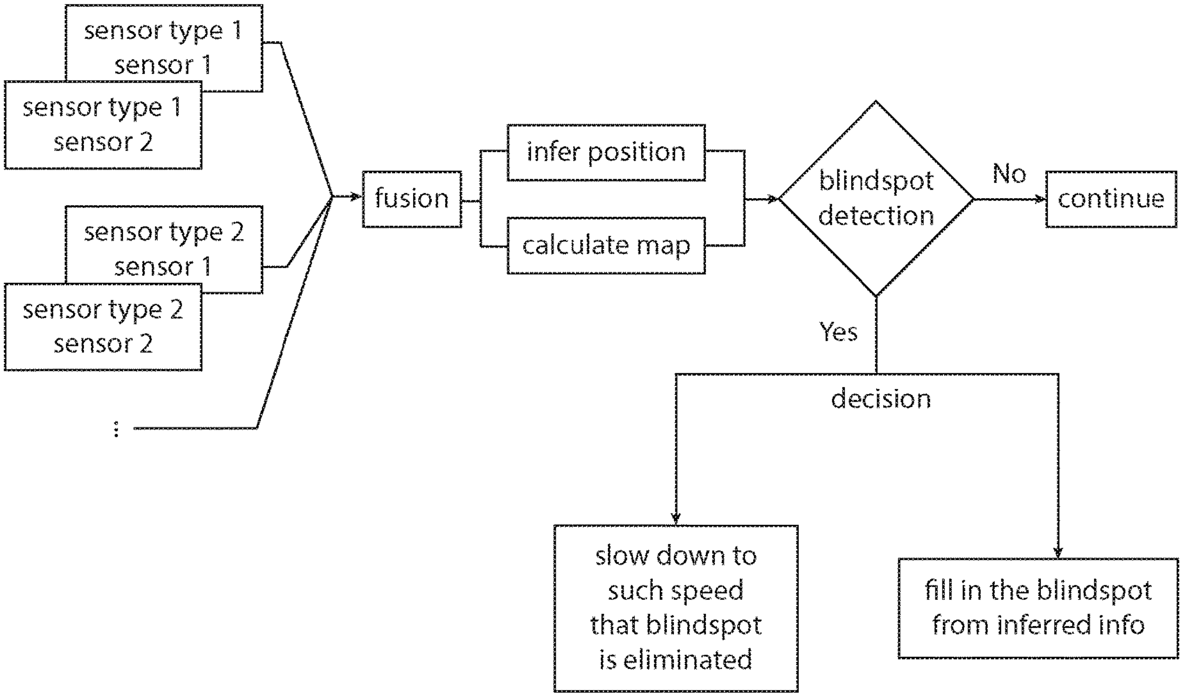

FIGS. 201 and 202 illustrate an example of a process for navigating a robot.

Figure 203:
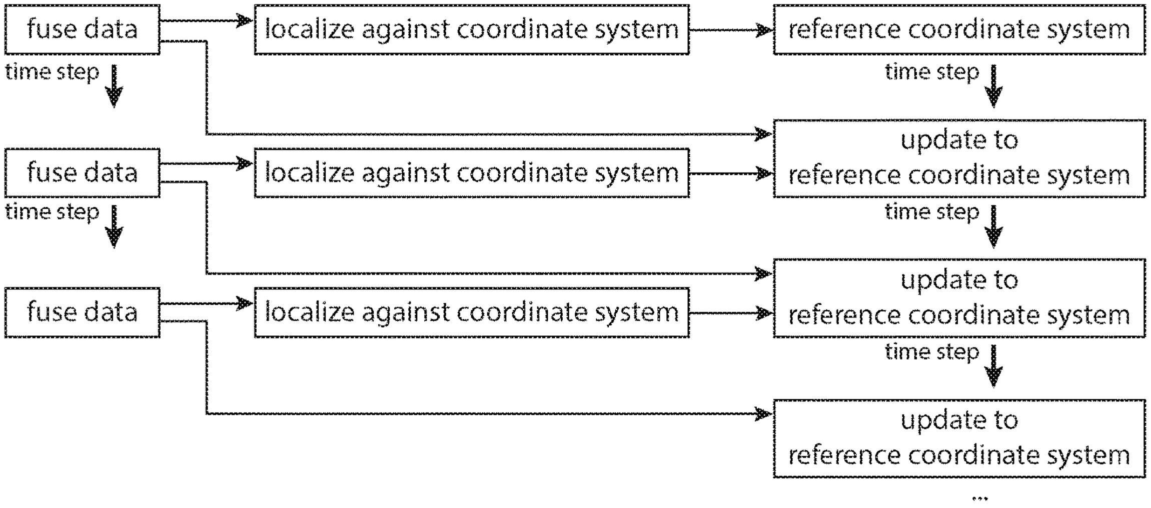
Figure 204:
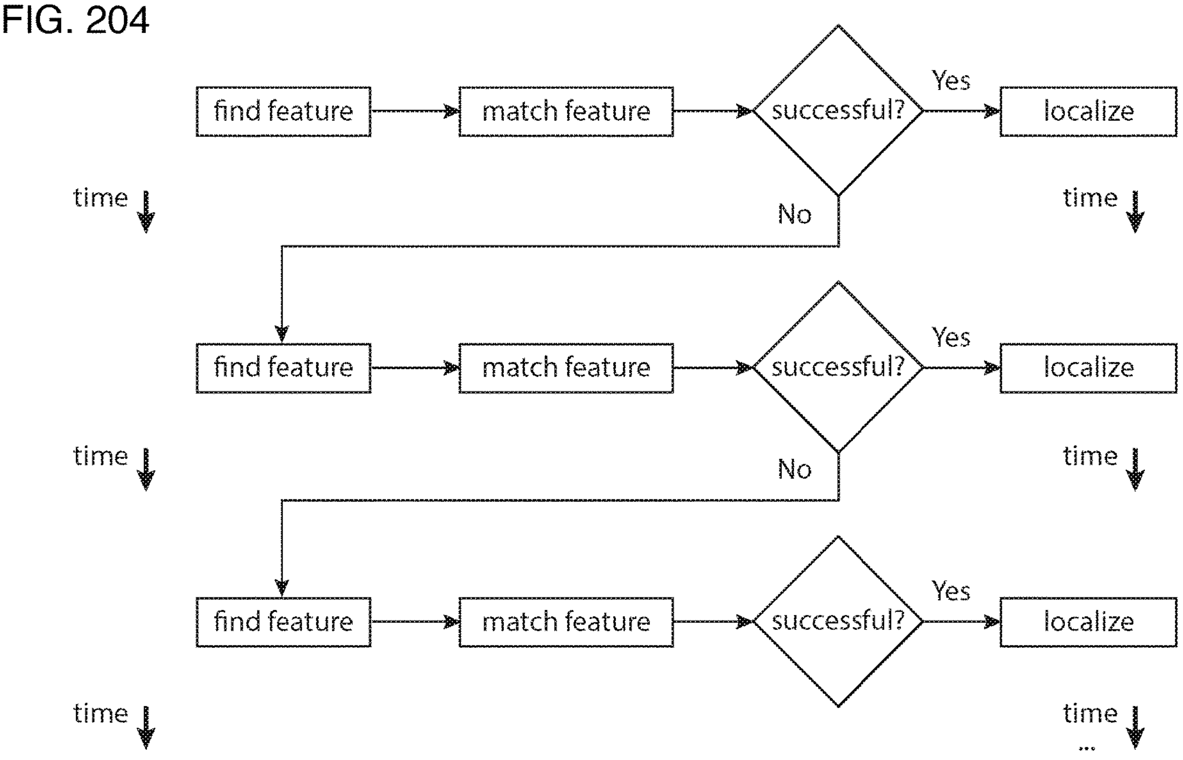

FIGS. 203 and 204 illustrate an example of a process for localizing a robot.

FIGS. 205-207 illustrate associating pixels with depth data.

Figure 208:
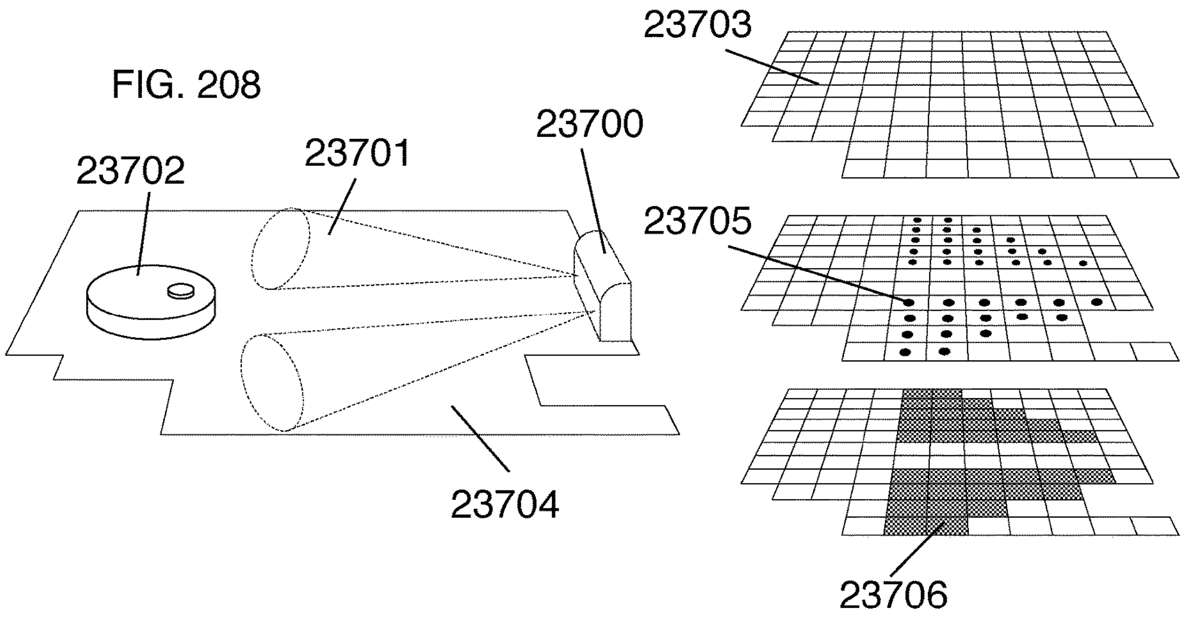
Figure 209:
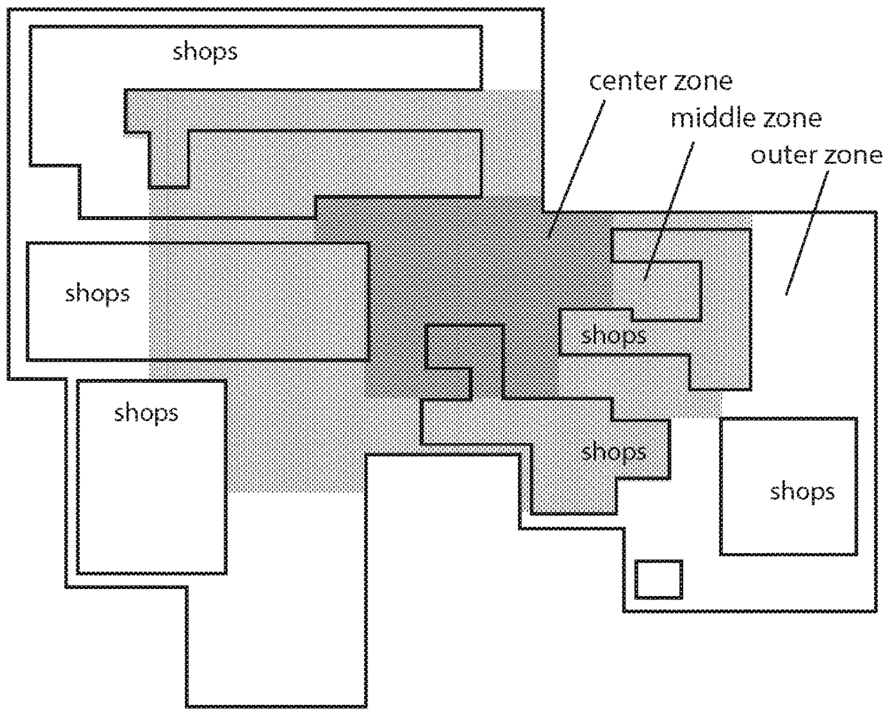
Figure 210:
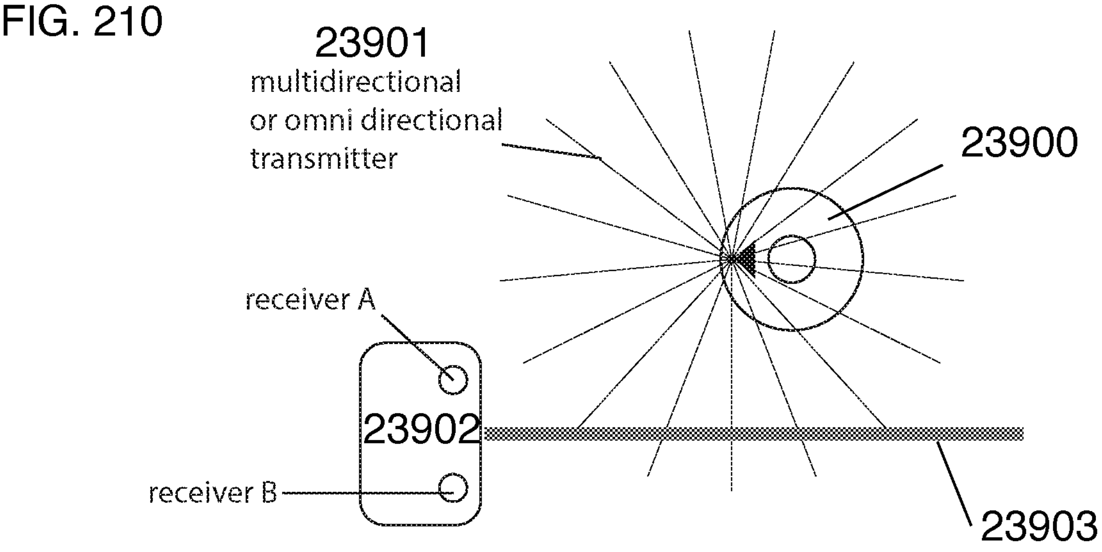

FIGS. 208-210 illustrate examples of active beacons.

Figure 211:
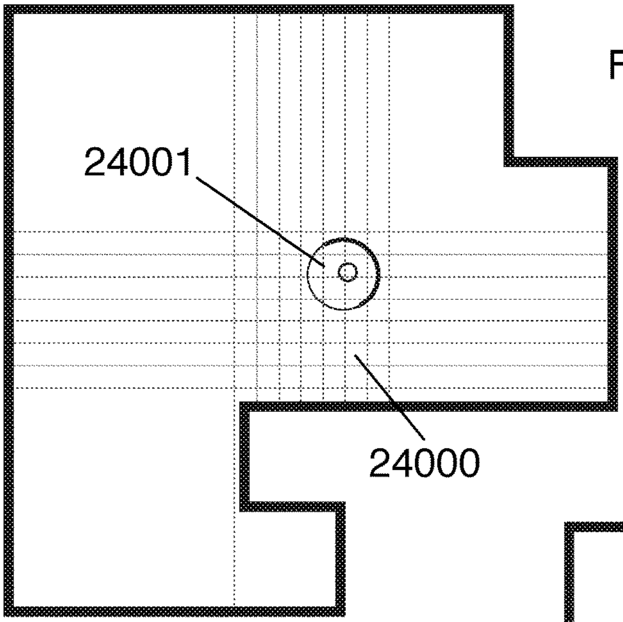
Figure 212:
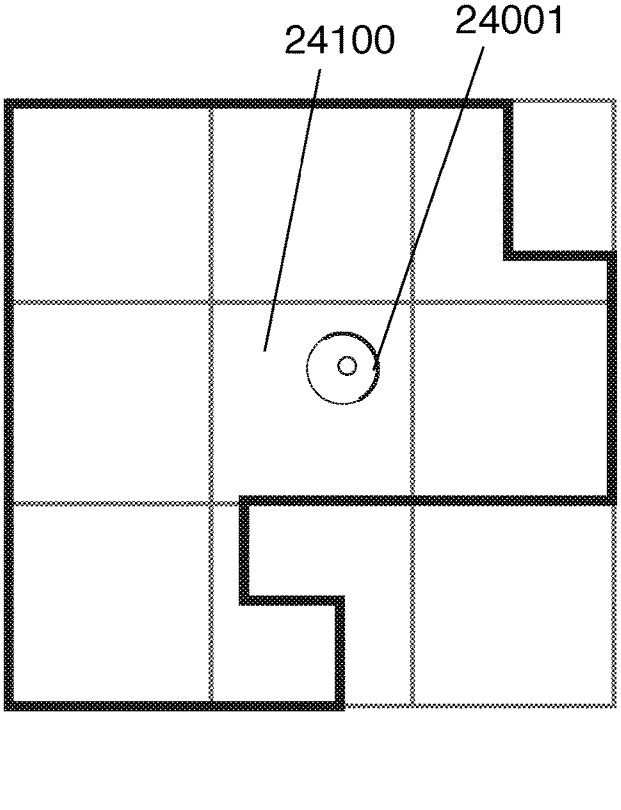
Figure 213:
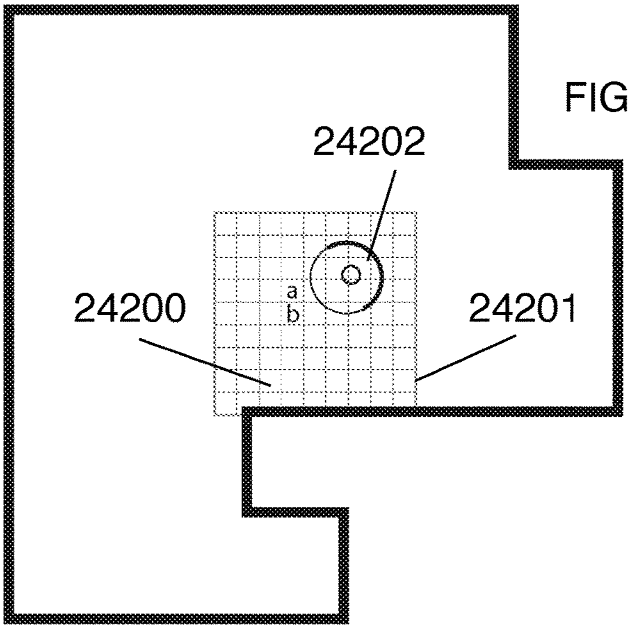

FIGS. 211-213 illustrate an example of localizing a robot within a grid map.

Figure 214:
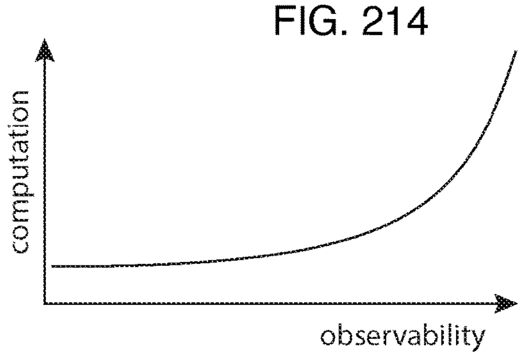

FIG. 214 illustrates a correlation between observability and computation needs.

Figure 215A:
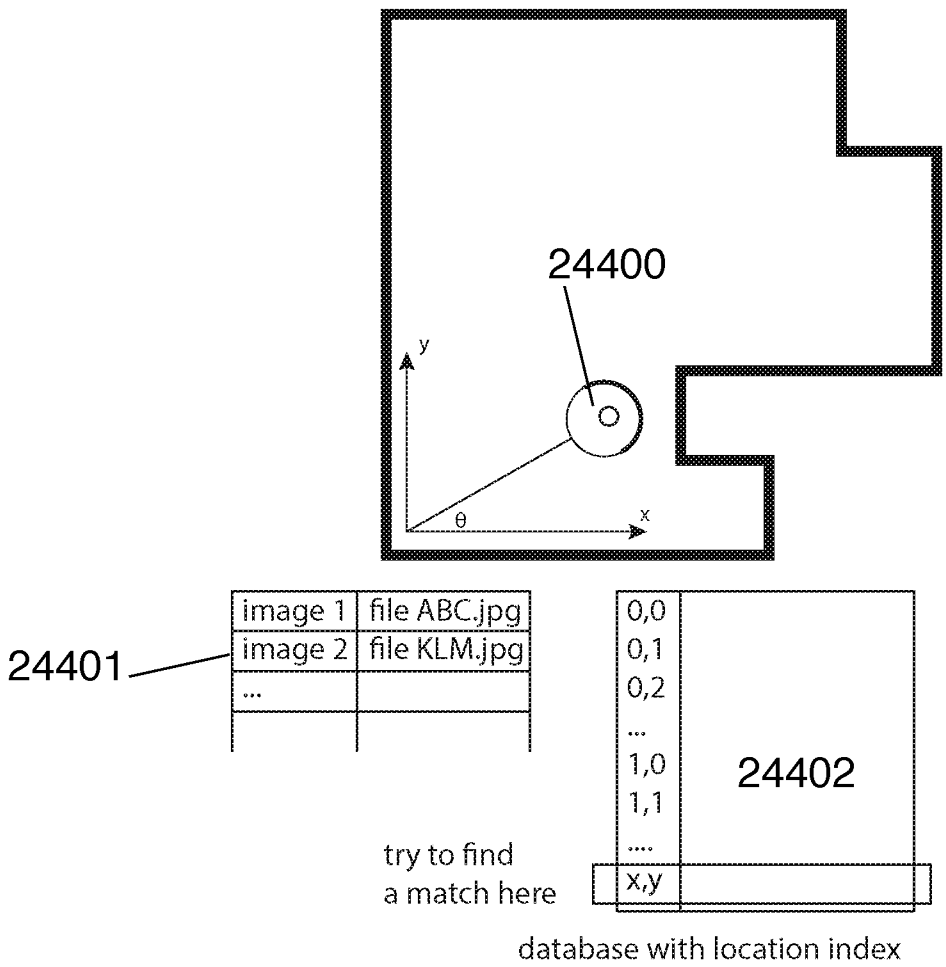
Figure 215B:
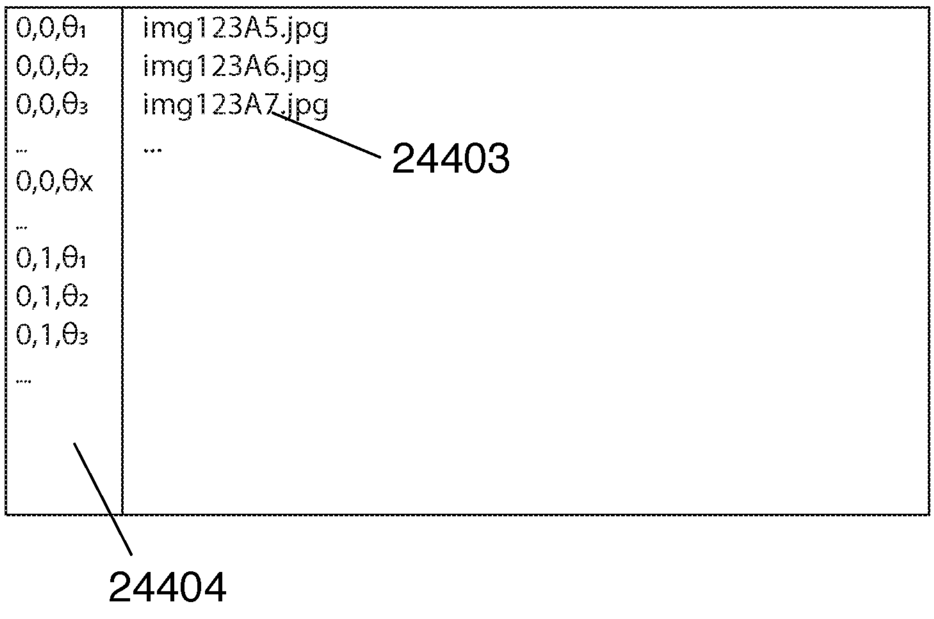

FIGS. 215A and 215B illustrate a process of matching an observed feature to previously captured image data.

Figure 216:
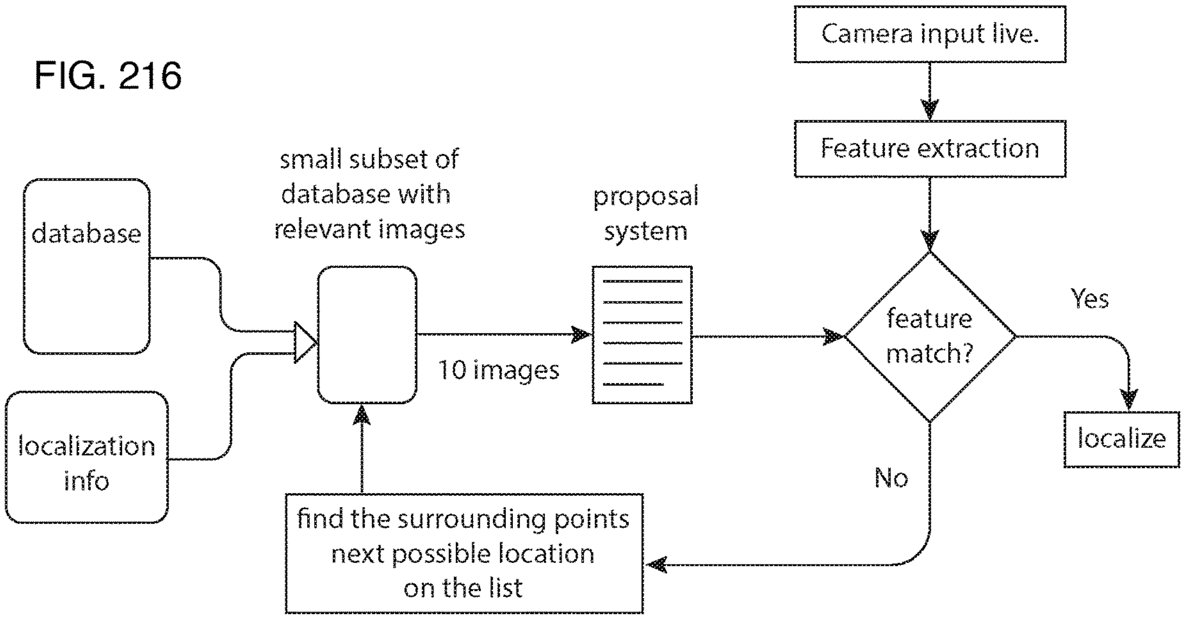

FIG. 216 illustrates an example of a process of localizing the robot.

Figure 217:
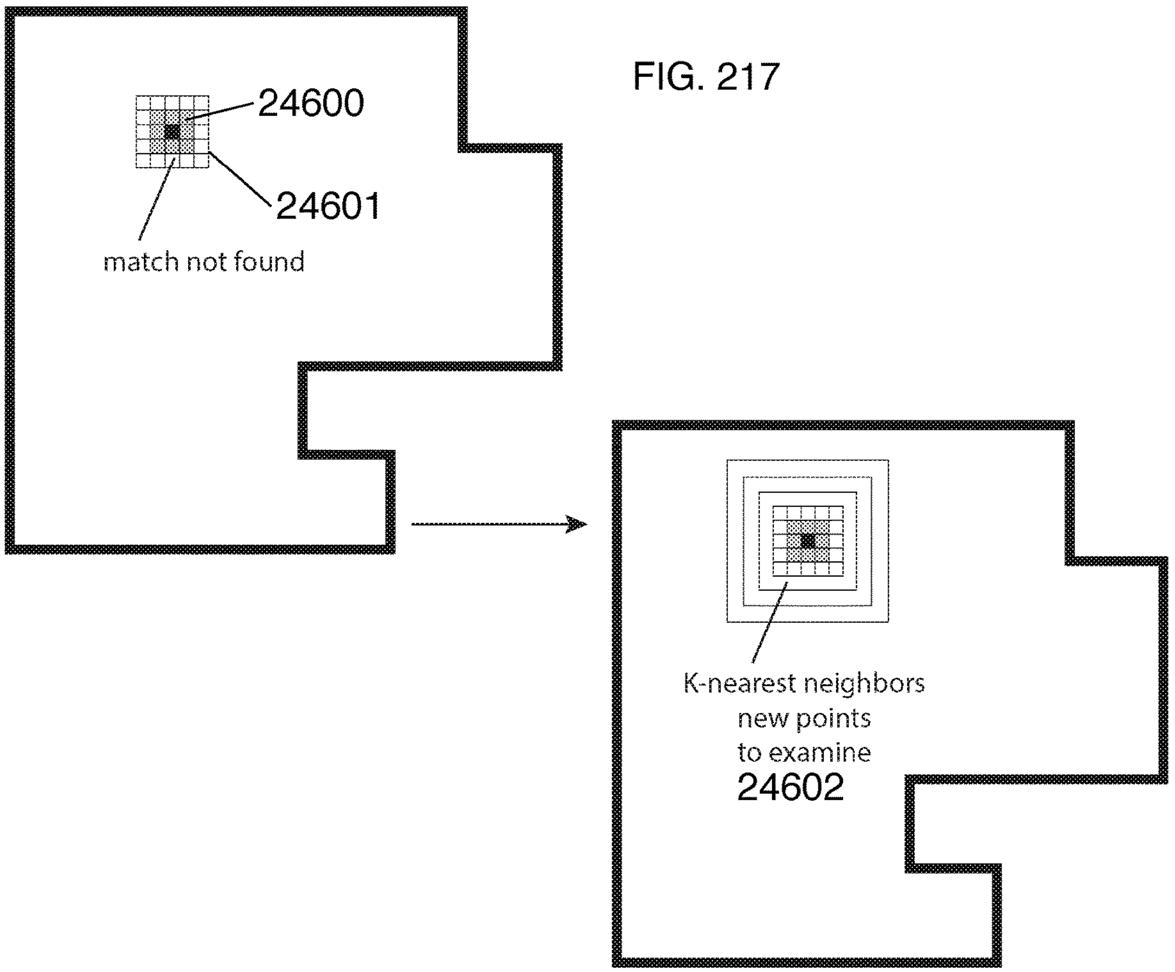

FIG. 217 illustrates a process of matching an observed feature to previously captured data.

Figure 218:
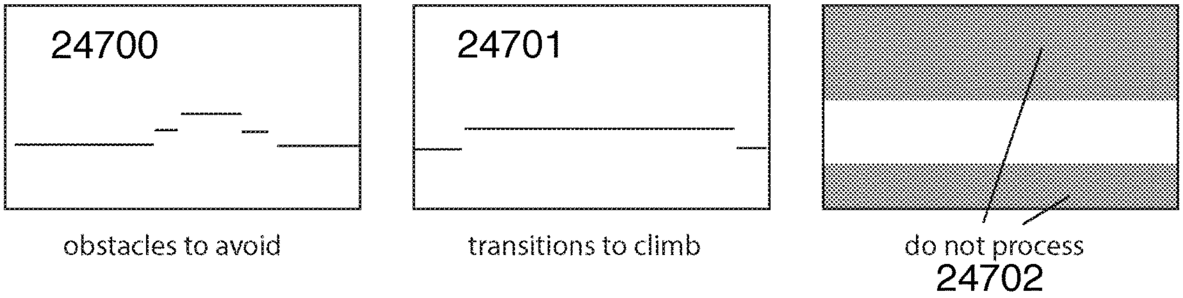

FIG. 218 illustrates processing of relevant regions of an image.

Figure 219:
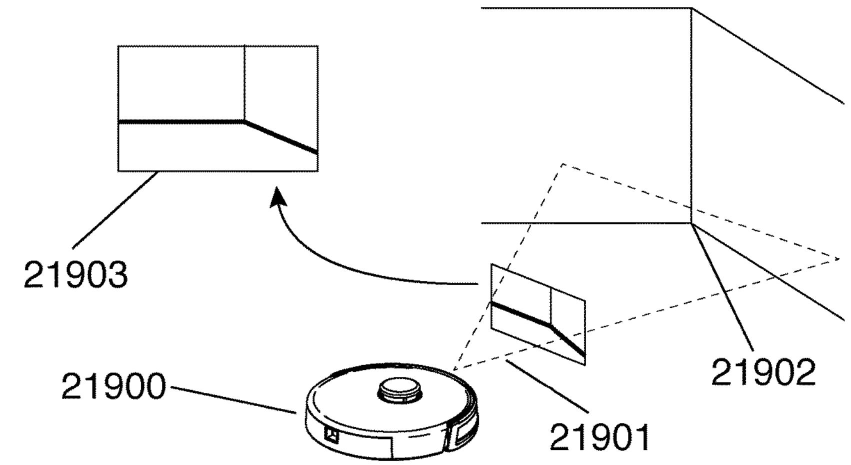
Figure 220:
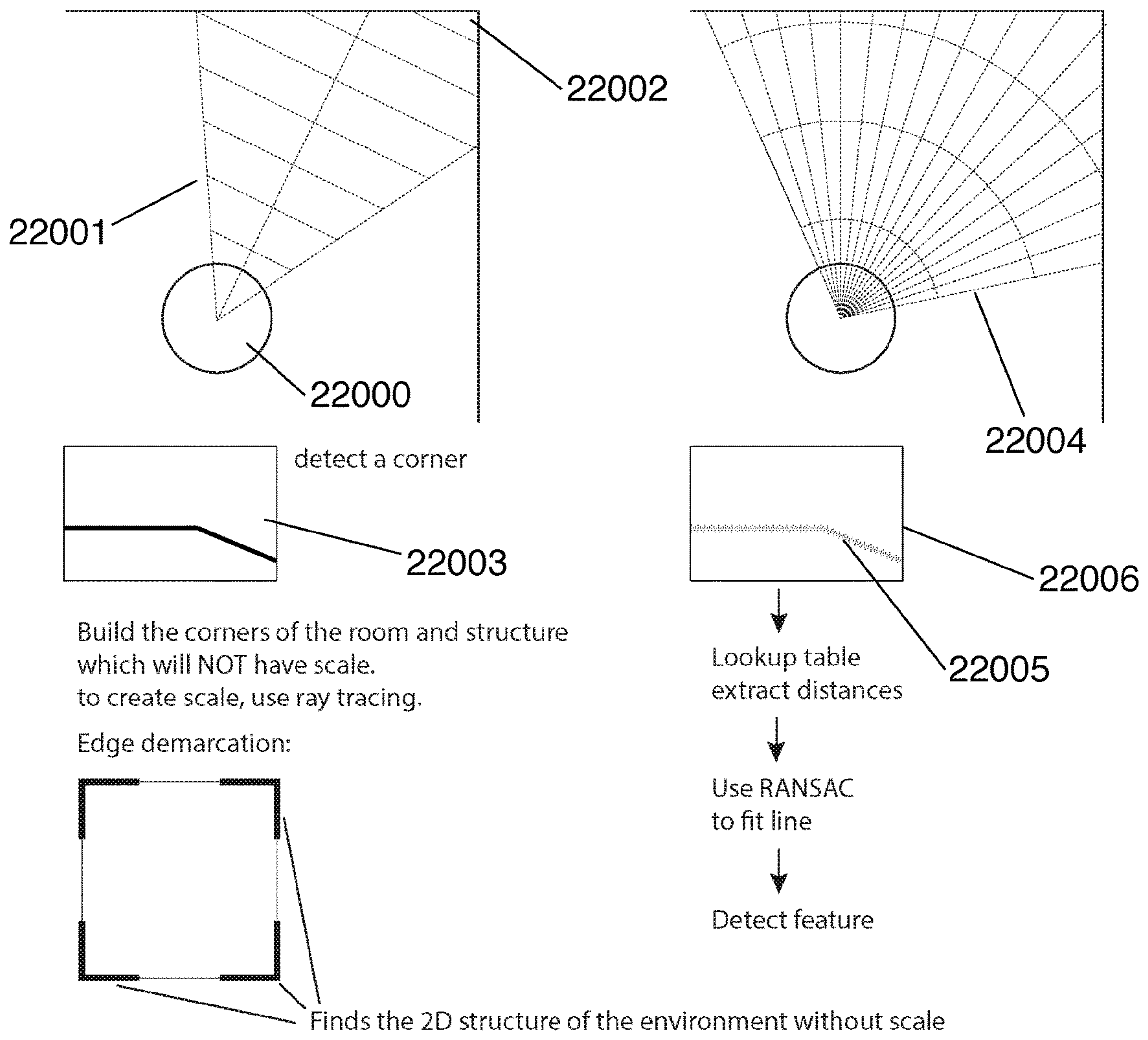

FIGS. 219 and 220 illustrate an example of a robot with a camera and structured light for measuring depth.

Figure 221:
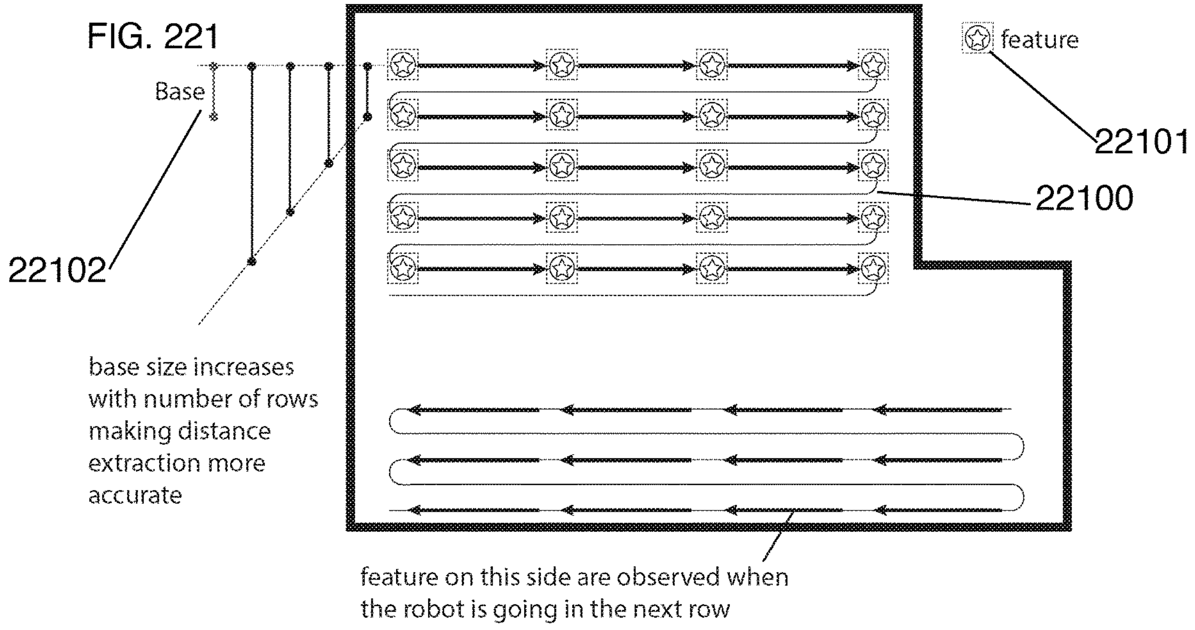

FIG. 221 illustrates an example of a boustrophedon coverage path.

Figure 222:
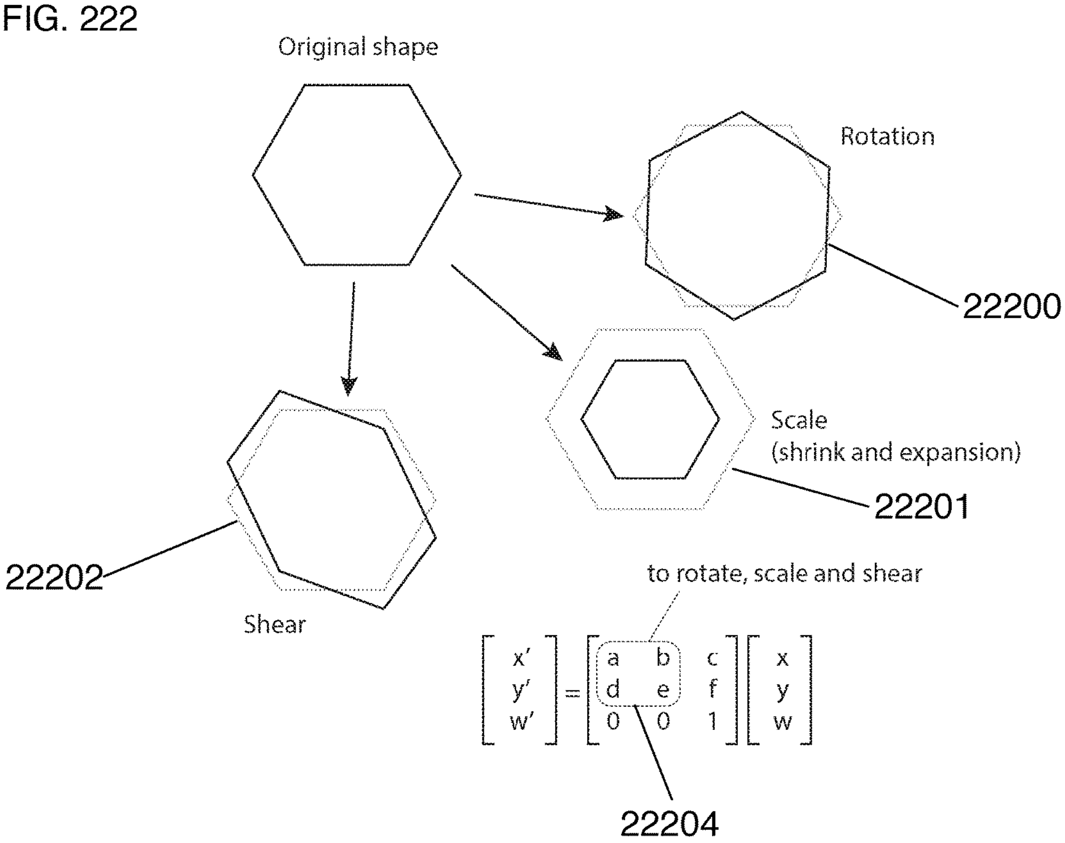
Figure 223:
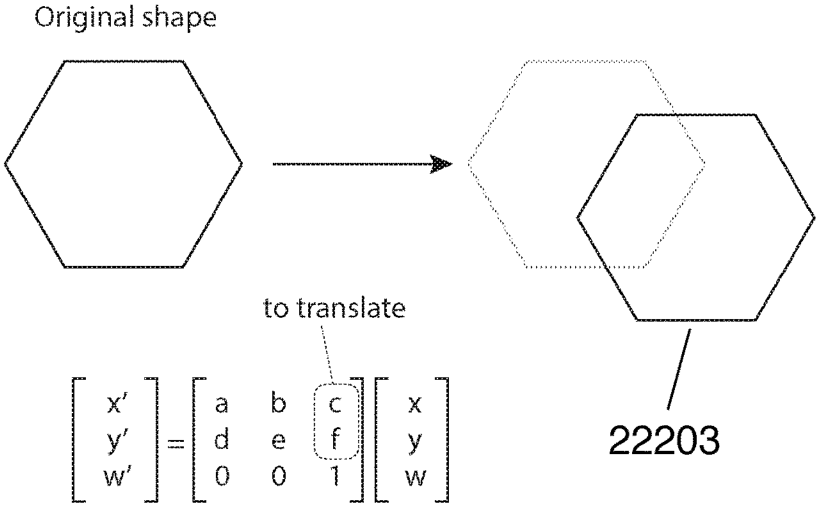

FIGS. 222 and 223 illustrate an example of decomposition of affine transformations.

Figure 224:
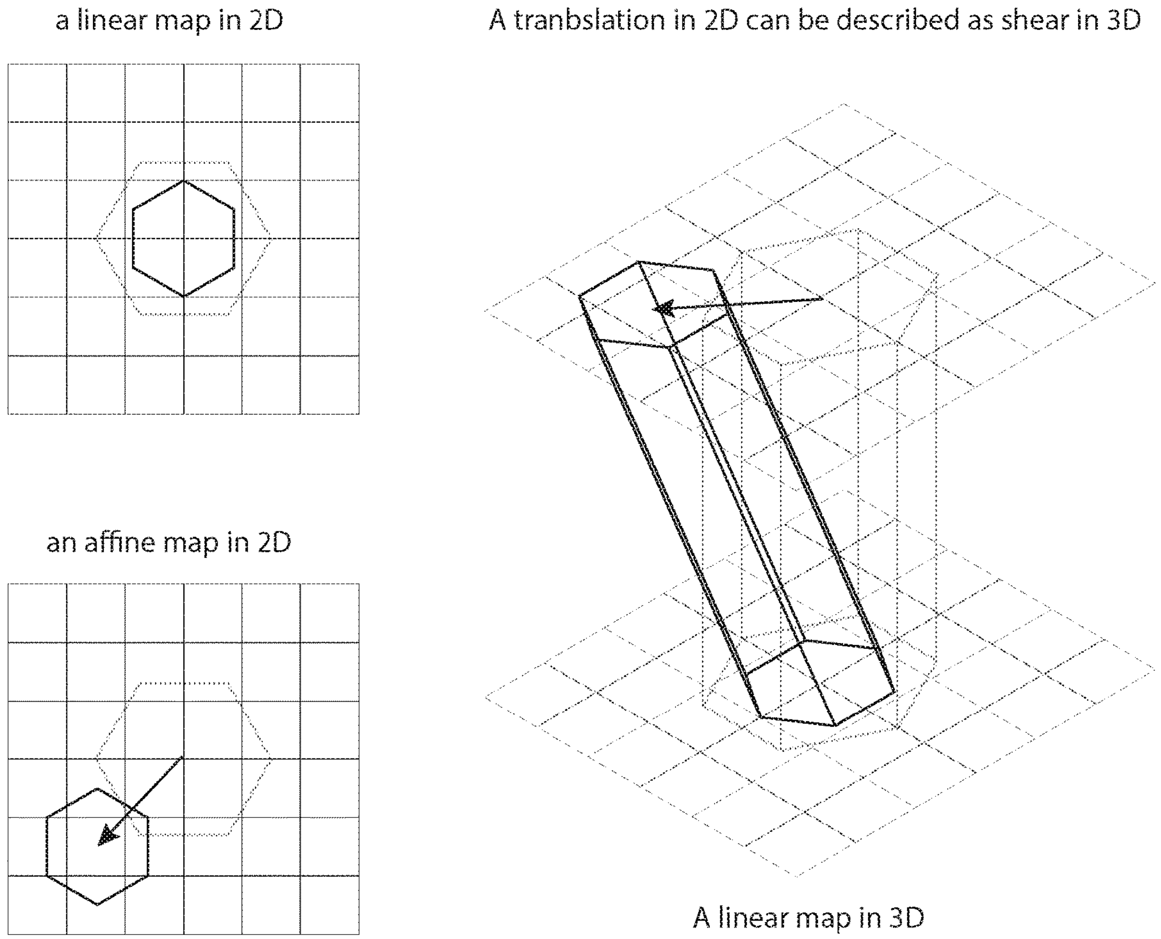

FIG. 224 illustrates a translation in 2D described as a shear in 3D.

Figure 225:
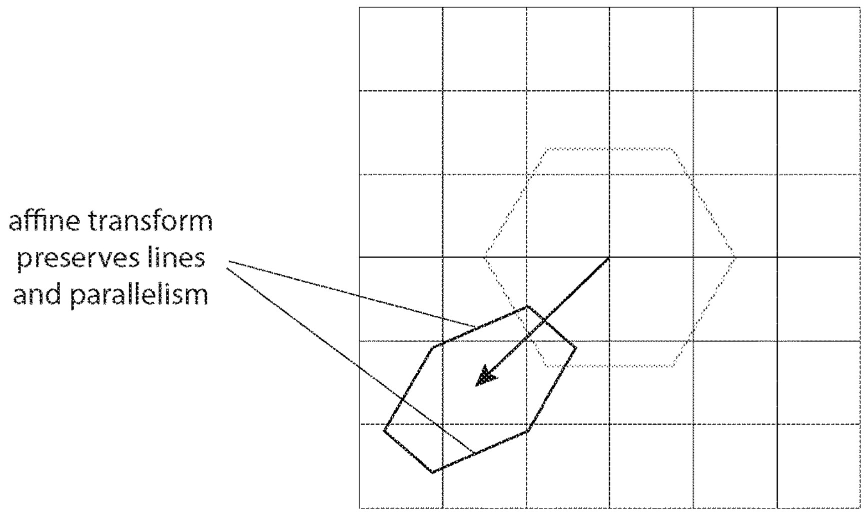

FIG. 225 illustrates preservations of lines and parallelism in affine transformation.

Figure 226:
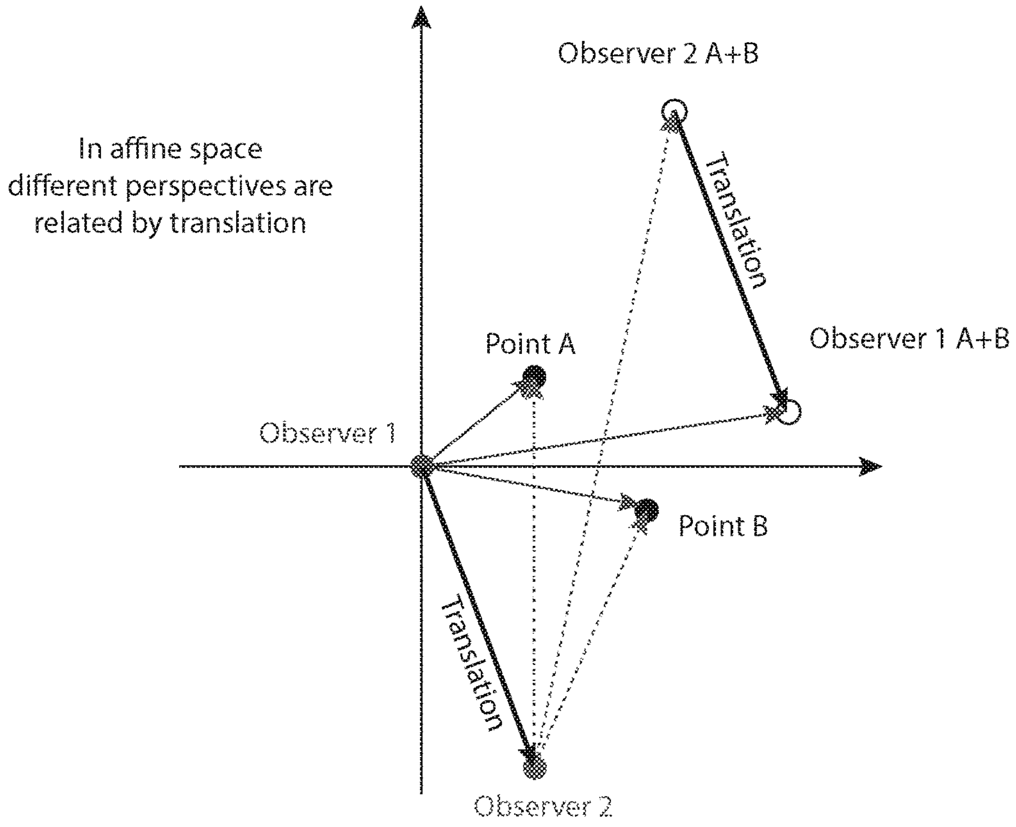

FIG. 226 illustrates translation relating different perspectives within an affine space.

Figure 227:
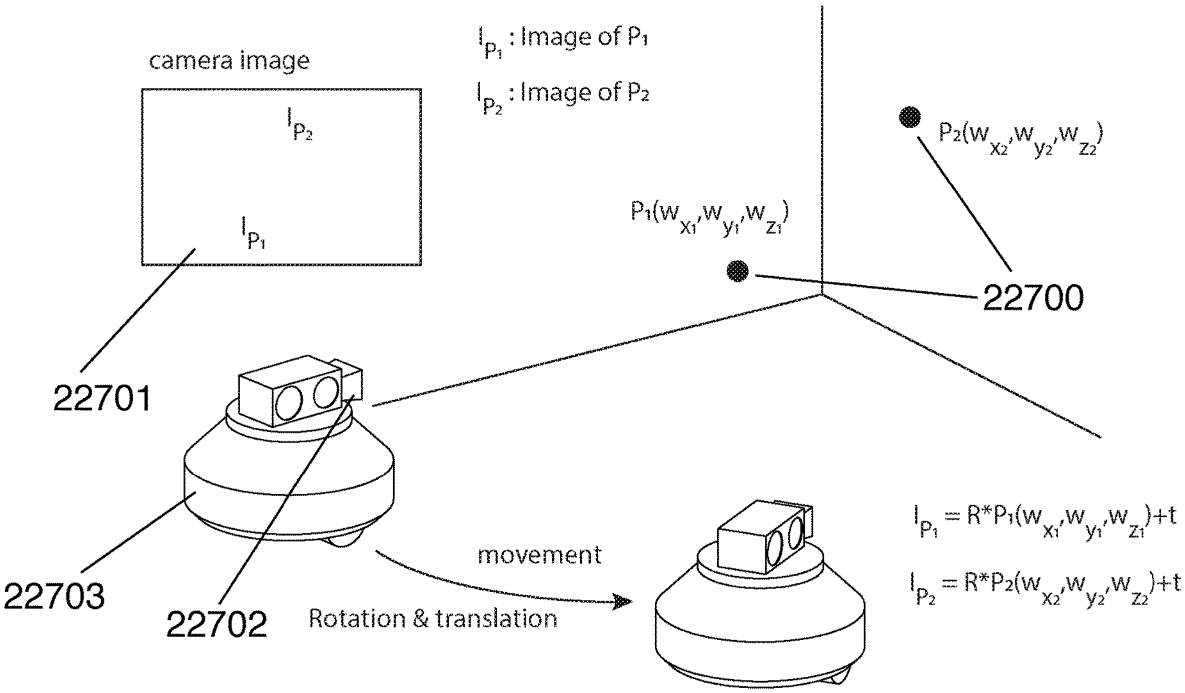

FIG. 227 illustrates transformation of points captured in an image.

Figure 228:
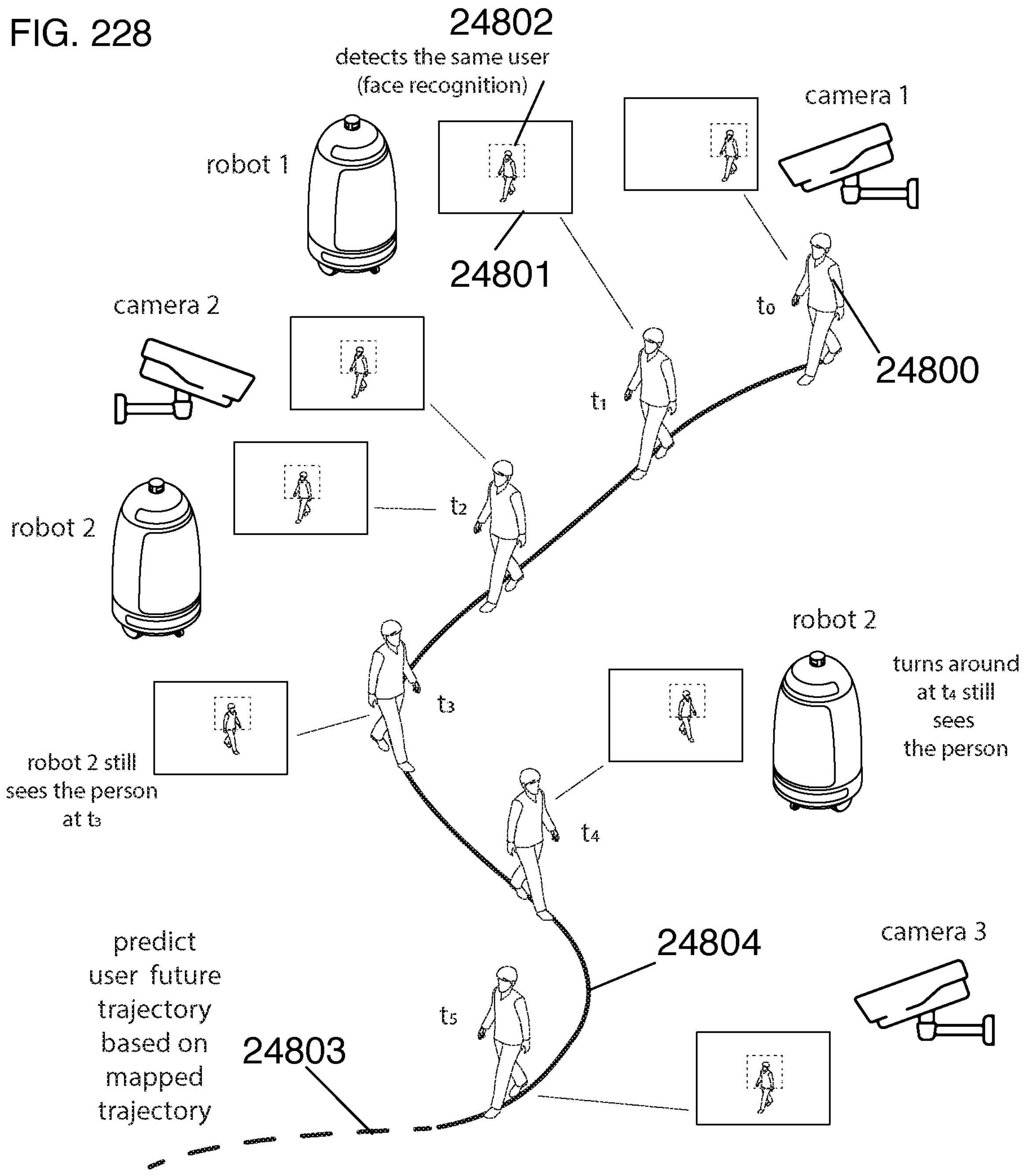

FIG. 228 illustrates tracking and predicting trajectory of an object.

Figure 229:
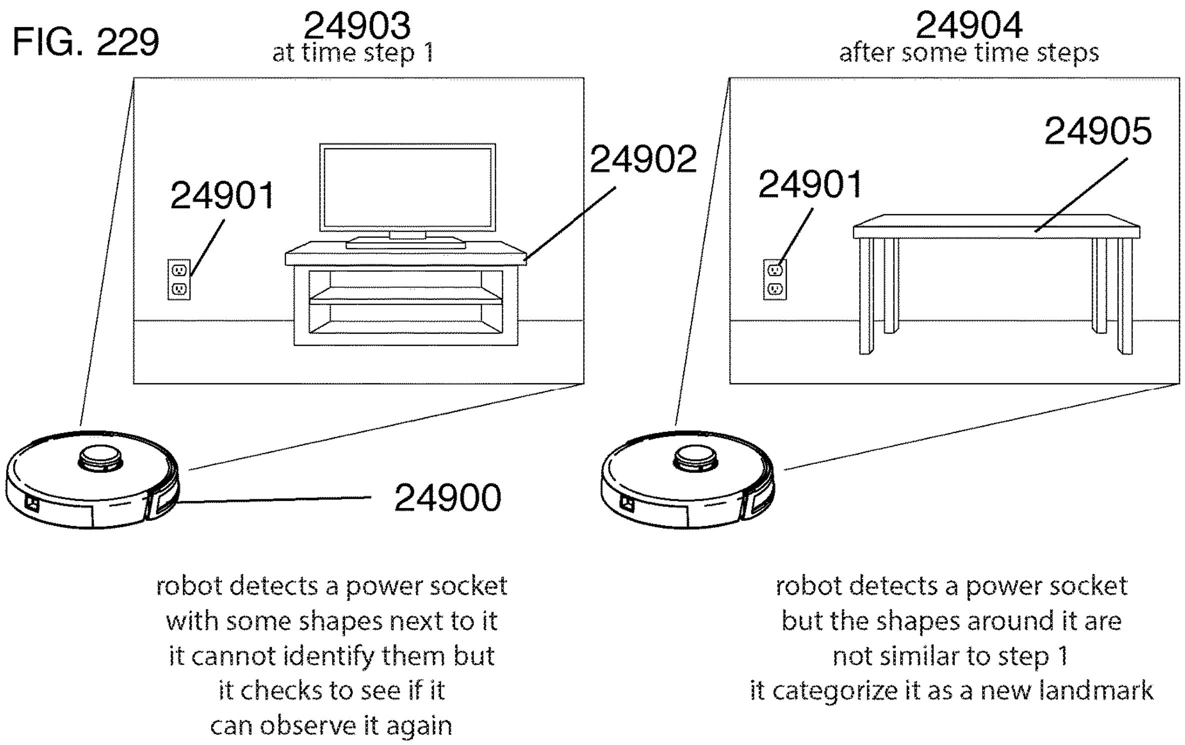

FIG. 229 illustrates an example of contextual visual localization.

Figure 230:
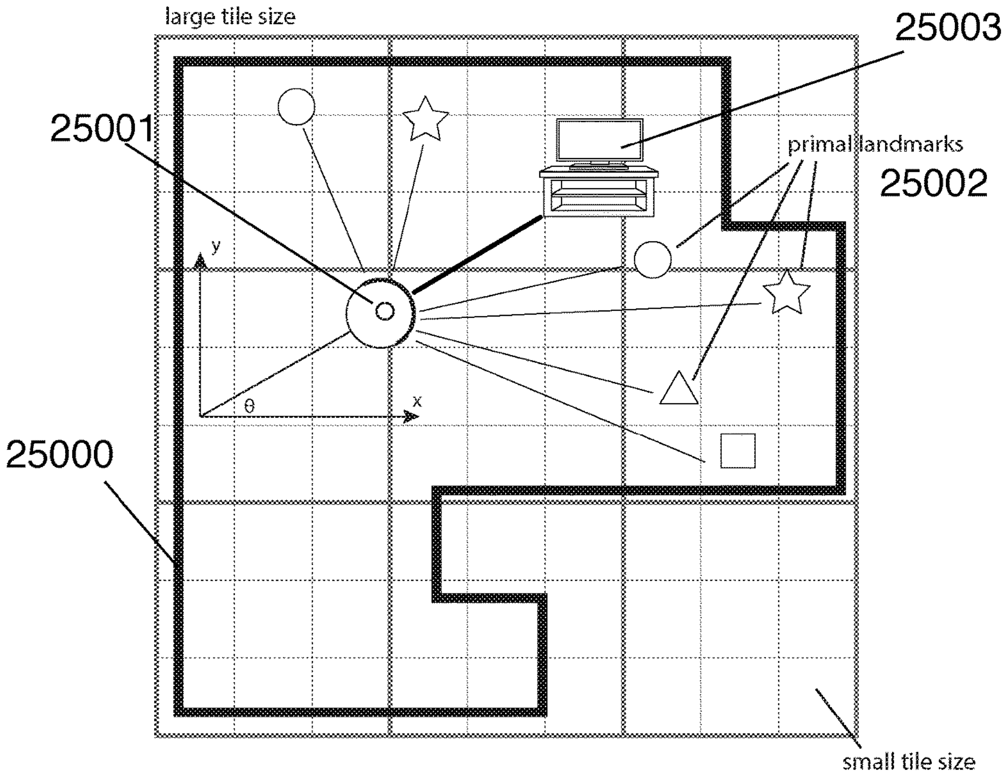
Figure 231:
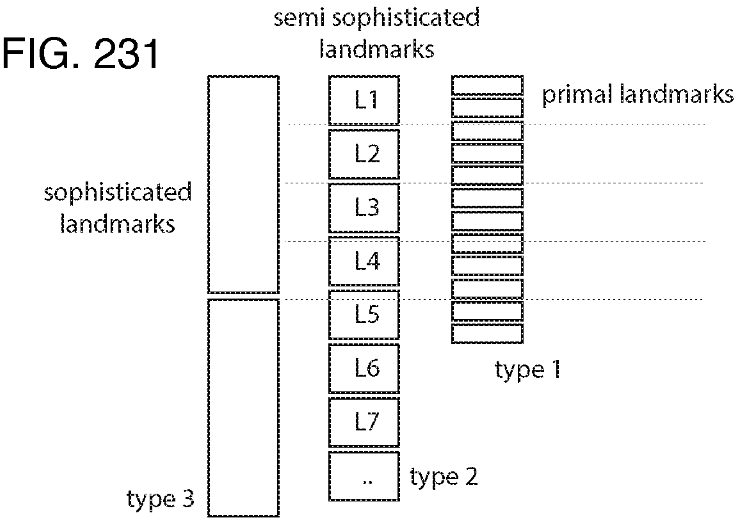

FIGS. 230 and 231 illustrate various types of landmarks.

Figure 232:
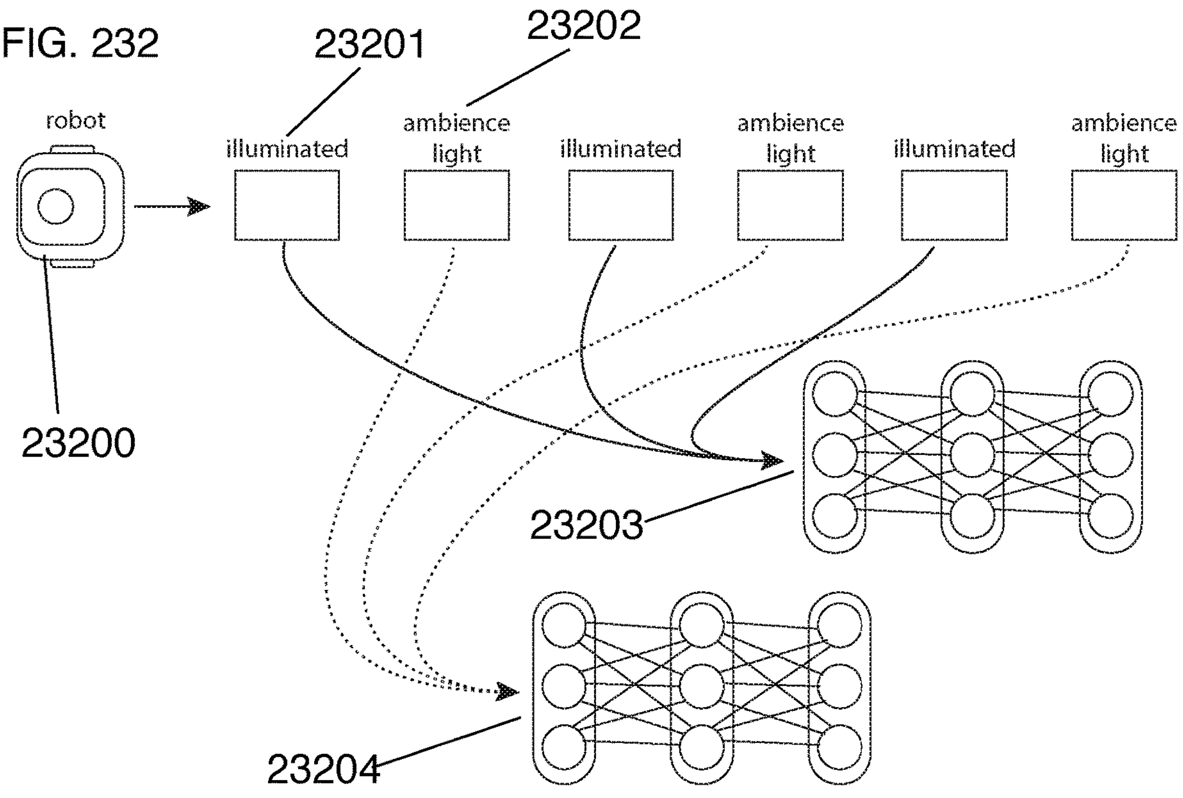

FIG. 232 illustrates an example of a robot capturing images with illumination and without illumination.

Figure 233:
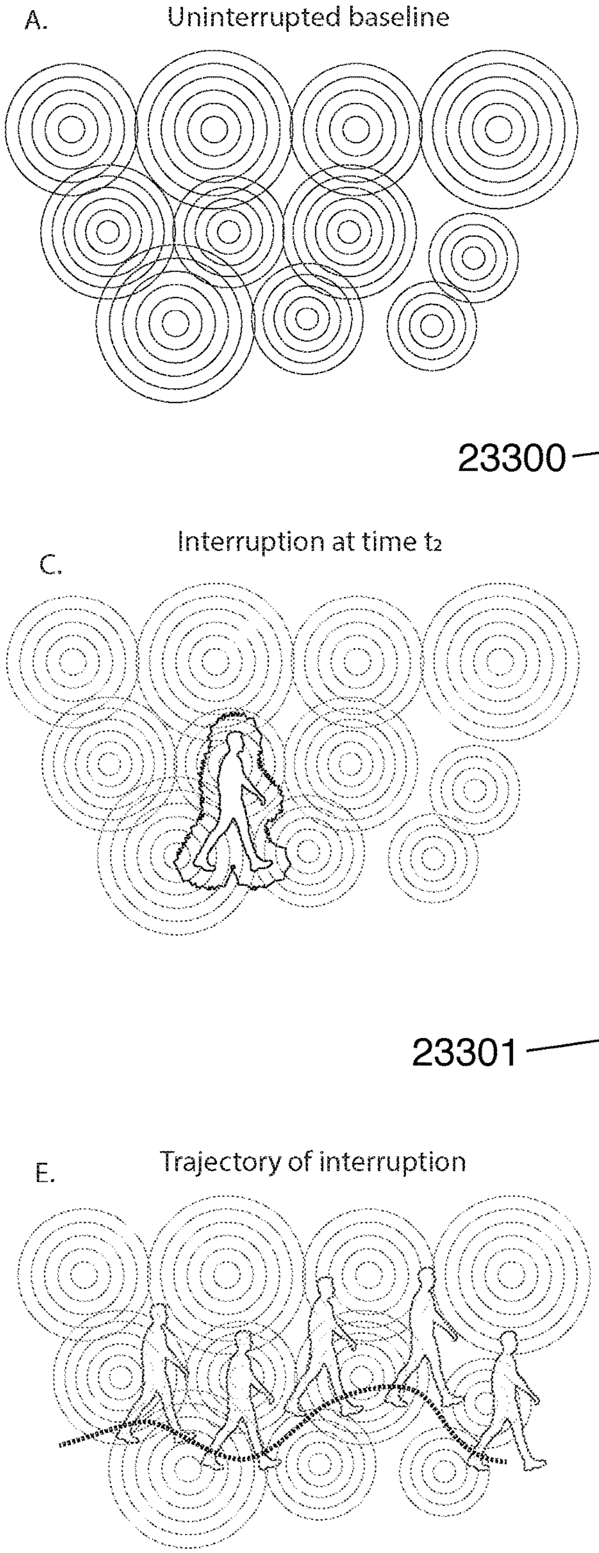
Figure 234:
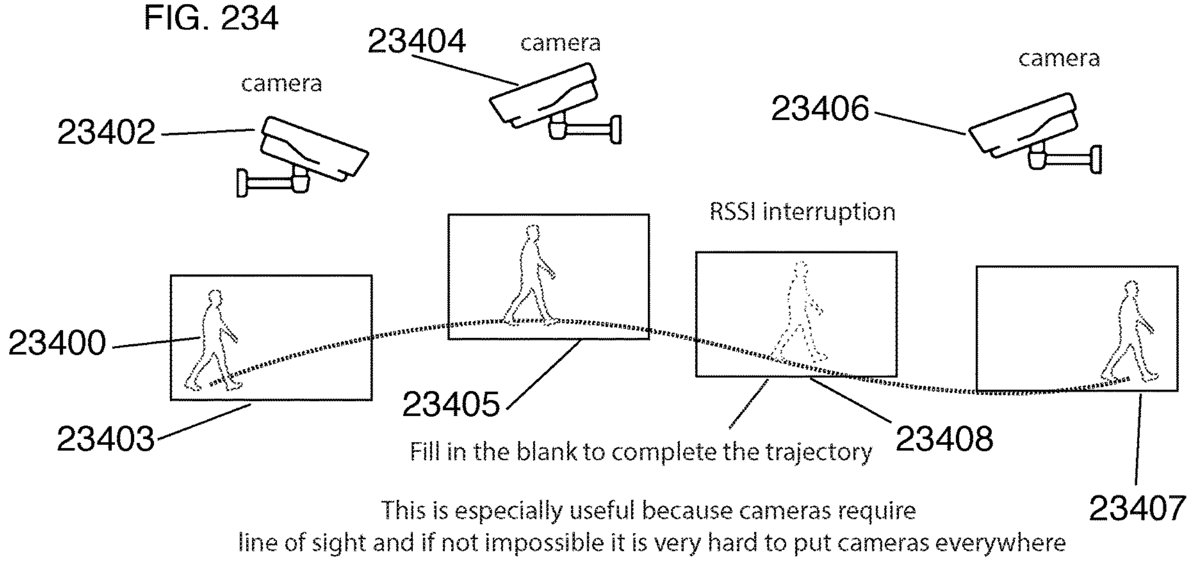

FIGS. 233 and 234 illustrate an example of a signal baseline and interruptions to the signal baseline.

Figure 235:
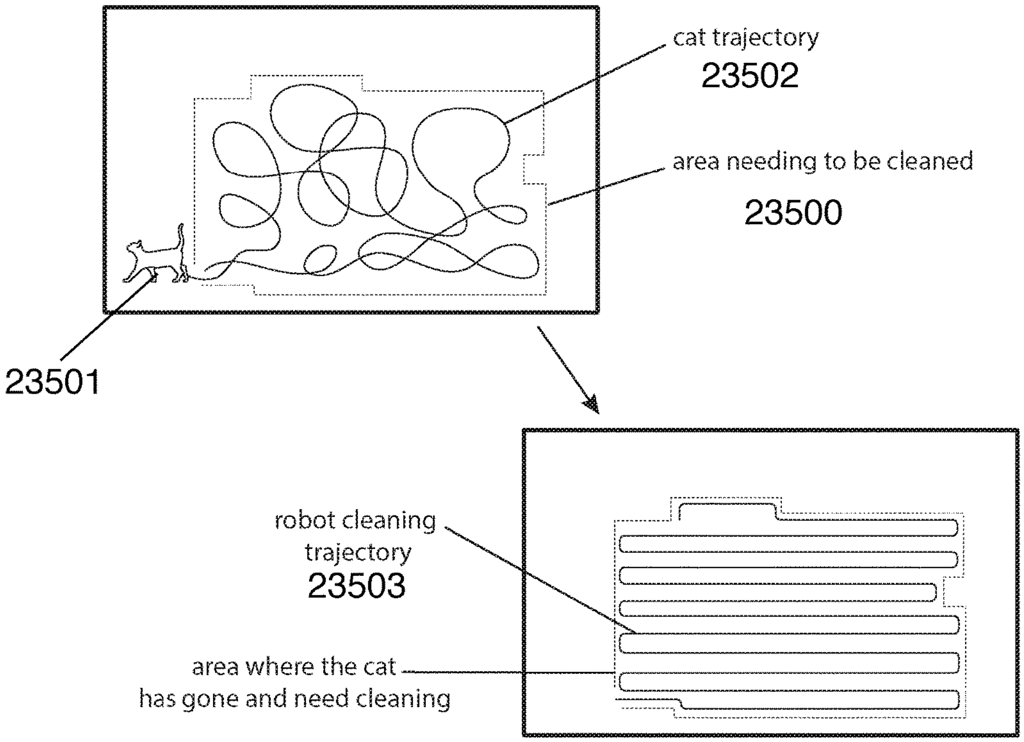
Figure 236:
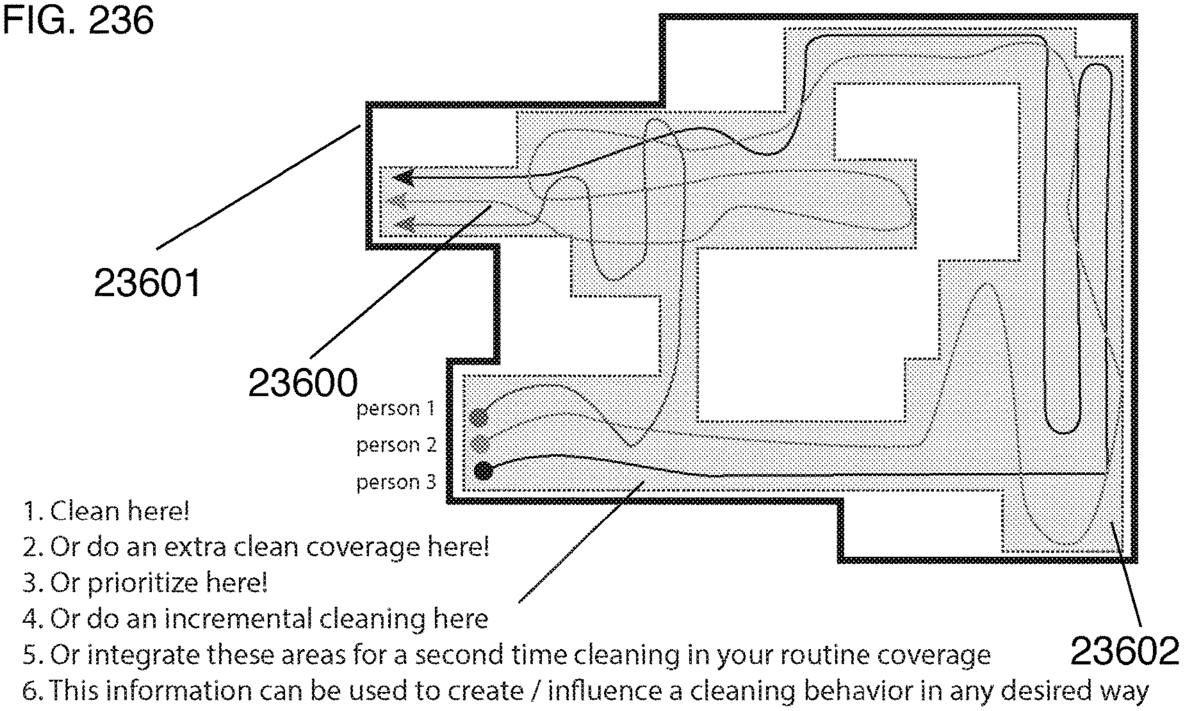

FIGS. 235 and 236 illustrate examples of using snail trail to determine a cleaning action.

Figure 237:
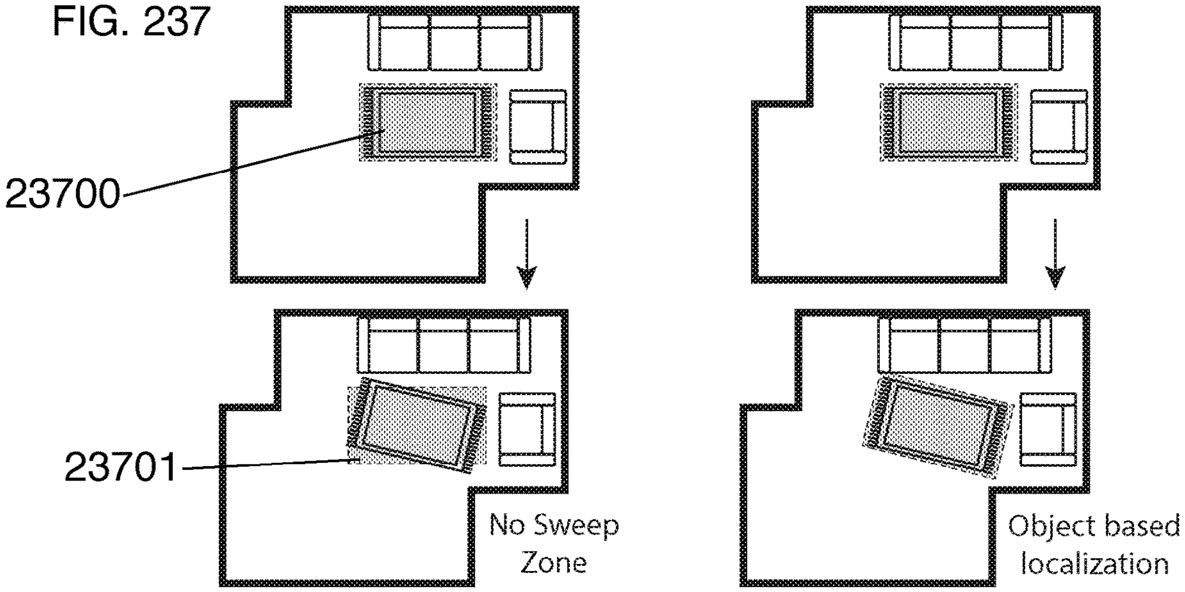
Figure 238:
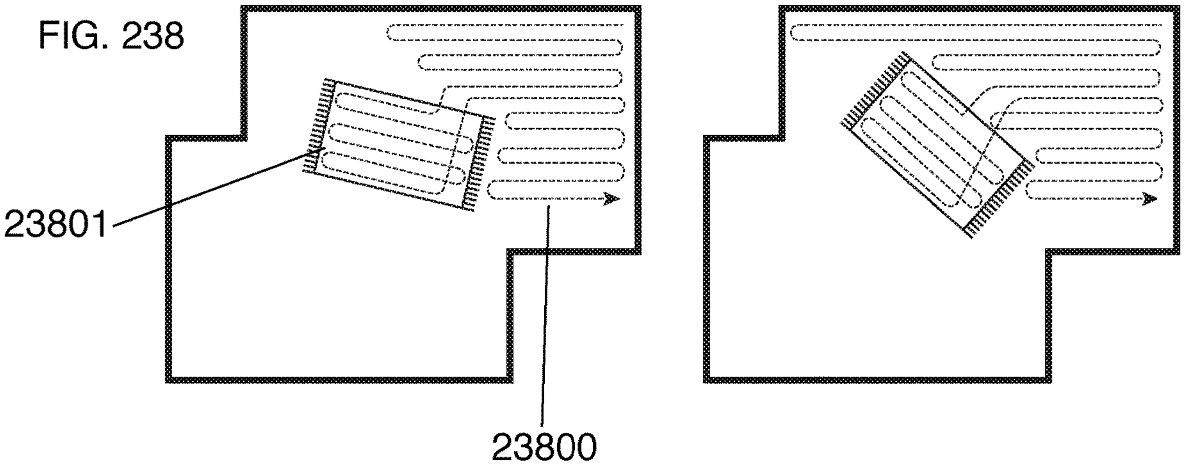

FIGS. 237 and 238 illustrate examples of object-based localization.

Figure 239A:
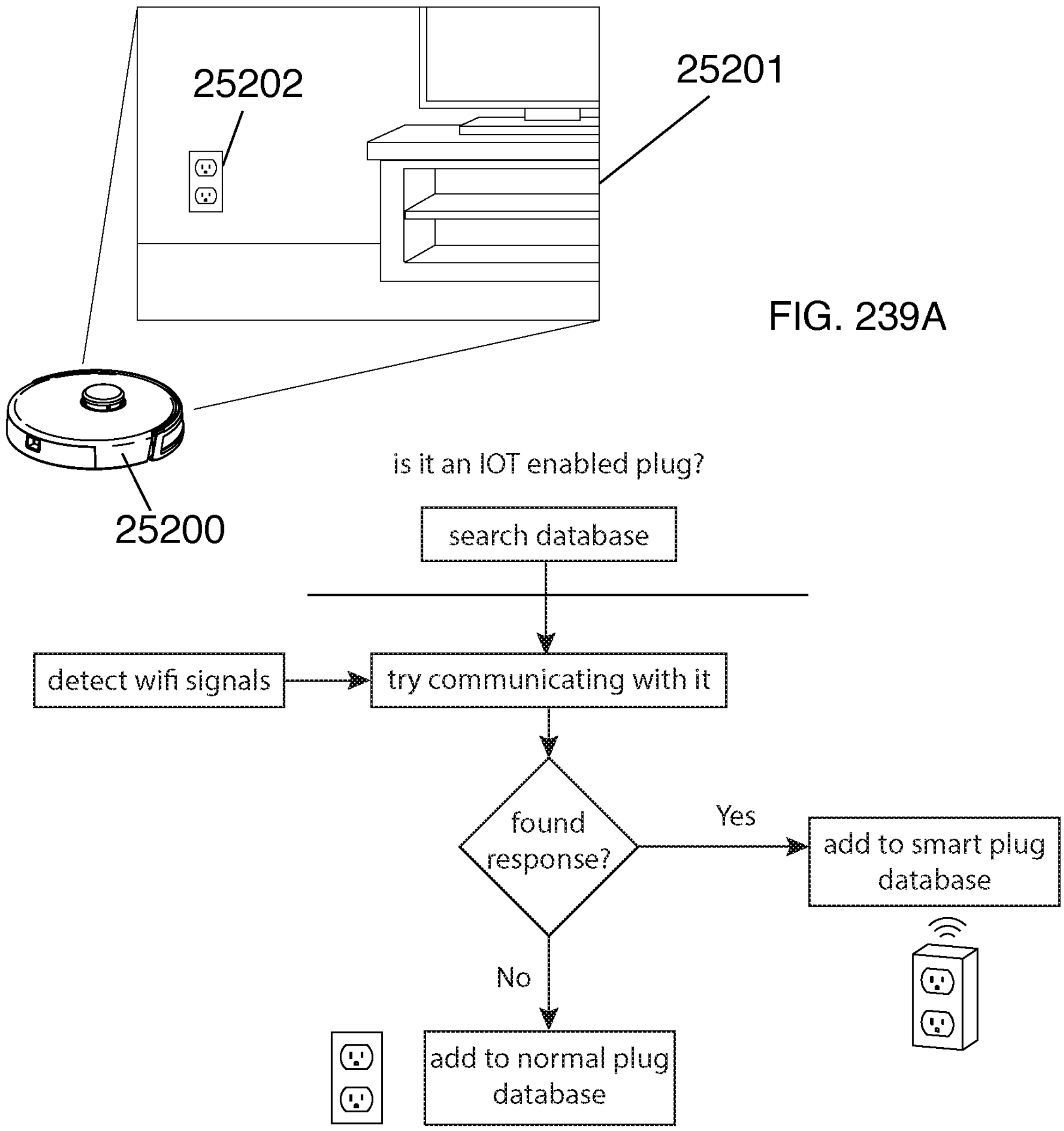
Figure 239B:
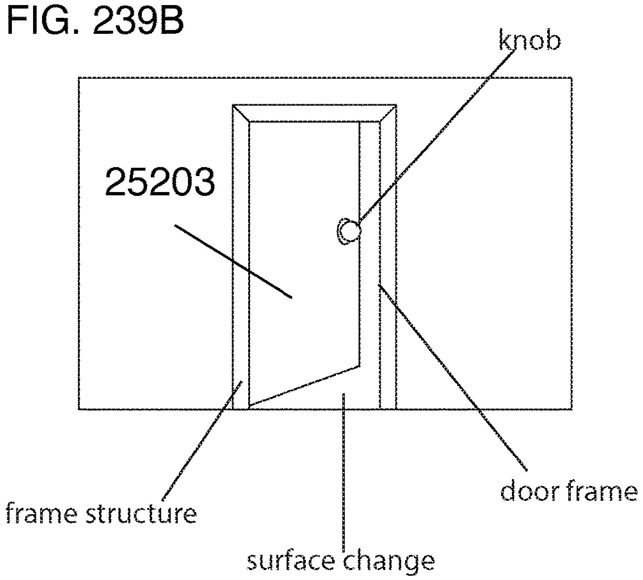

FIGS. 239A and 239B illustrate examples of object identification.

Figure 240:
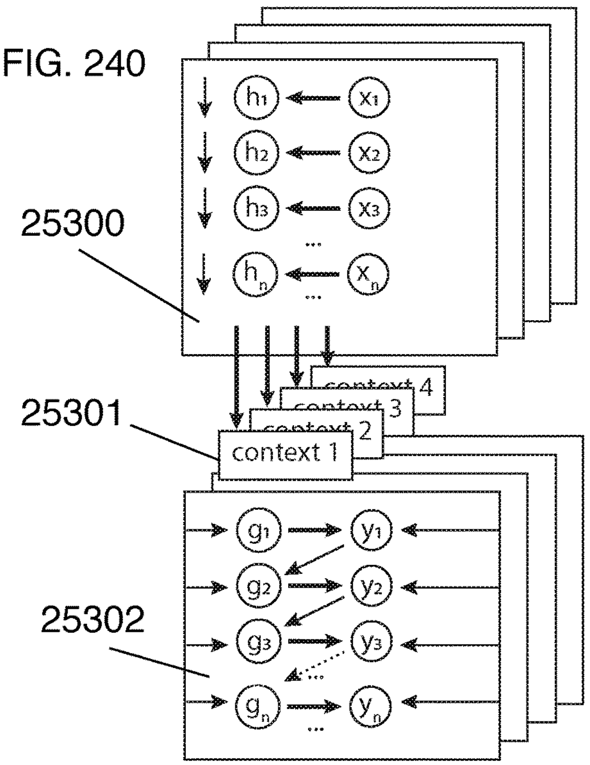

FIG. 240 illustrates an example of an encoder RNN and decoder RNN.

Figure 241:
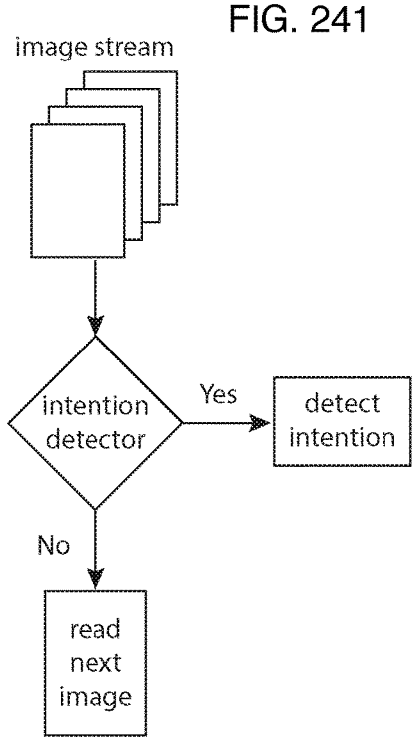

FIG. 241 illustrates an example of an intention detector.

Figure 242:
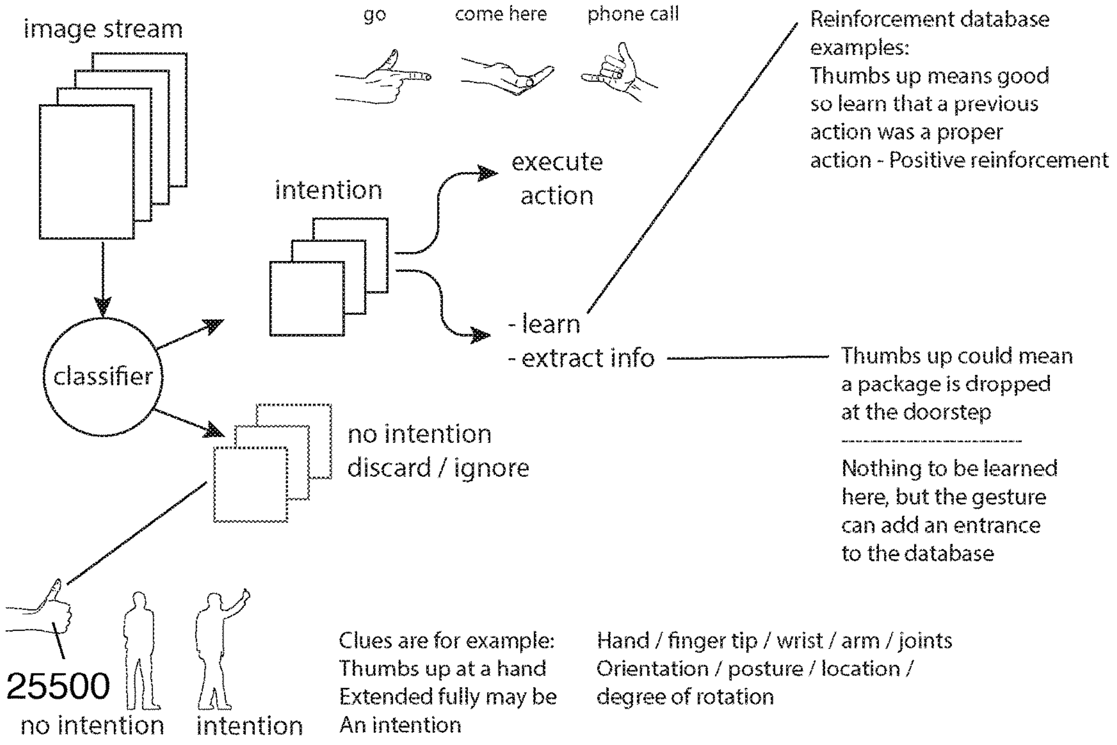

FIG. 242 illustrates an example of identifying intention using image classification.

FIG. 243 illustrates continuous tracking of gestures.

Figure 244:
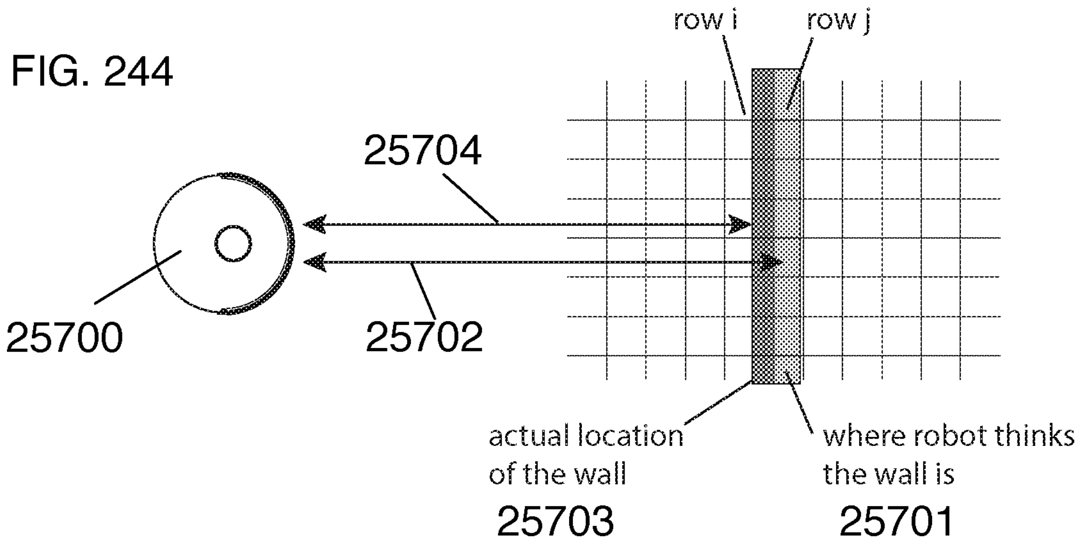

FIG. 244 illustrates an example of detecting a distance to a wall.

Figure 245A:
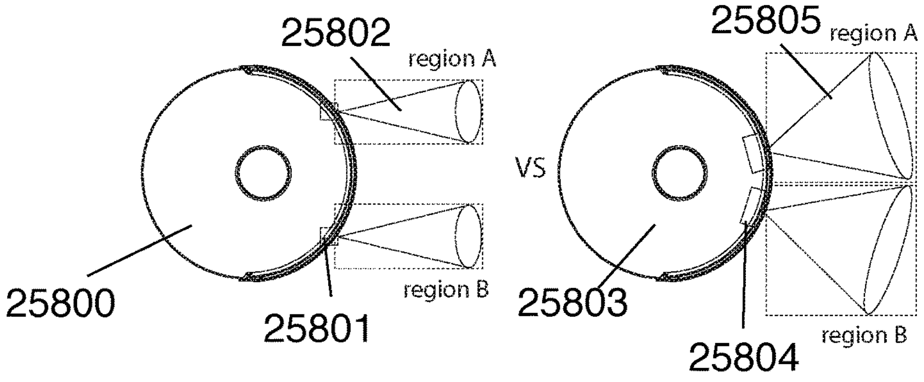
Figure 245B:
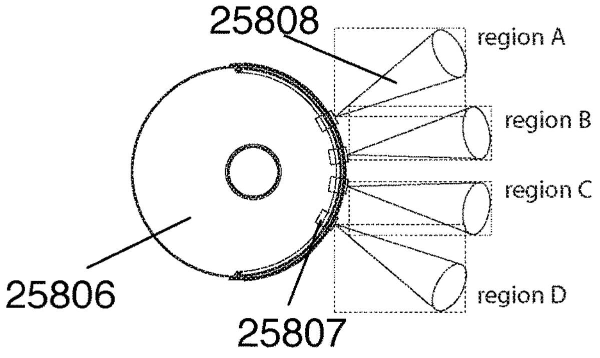

FIGS. 245A and 245B illustrate examples of detection cones of sensors.

Figure 246:
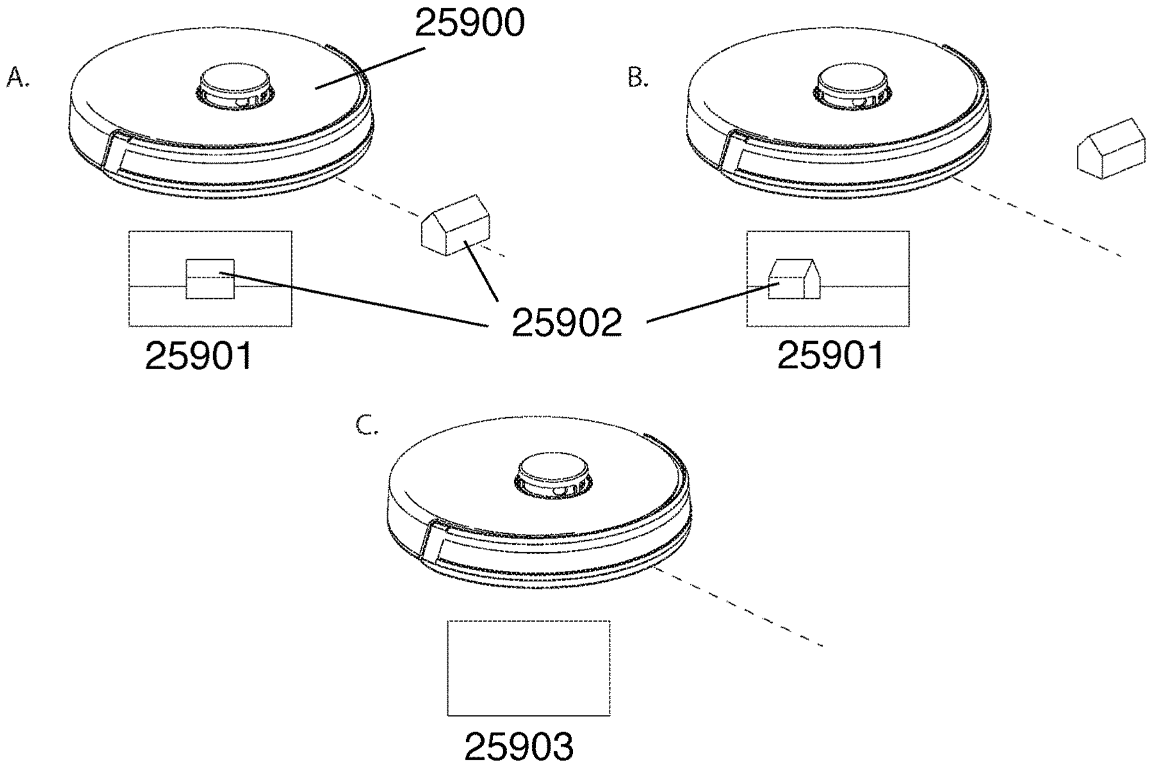

FIG. 246 illustrates an example of detecting a presence of an object based on image comparison.

Figure 247:
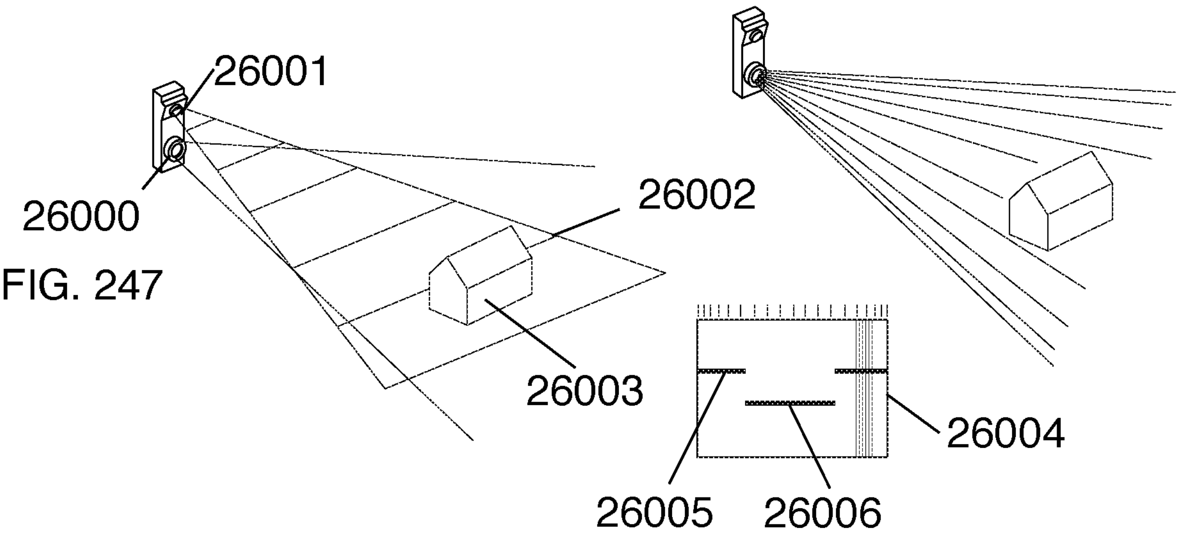

FIG. 247 illustrates an example of detecting a presence of an object based on a pattern of a laser line in a captured image.

Figure 248:
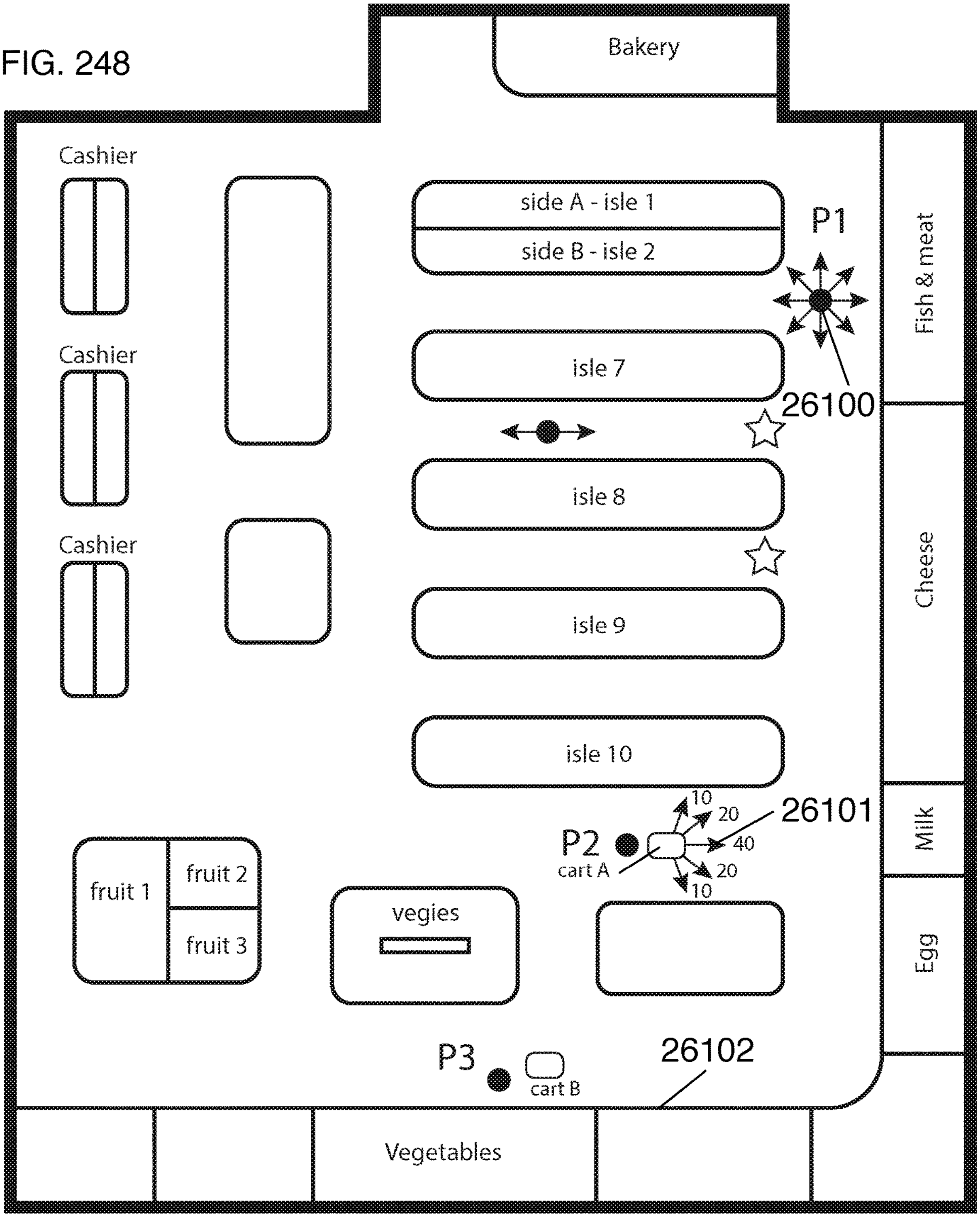
Figure 249:
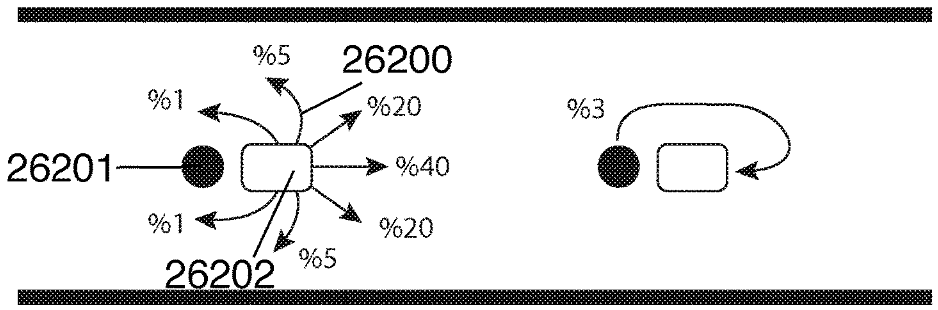

FIGS. 248 and 249 illustrate an example of predicting a trajectory of an object.

Figure 250:
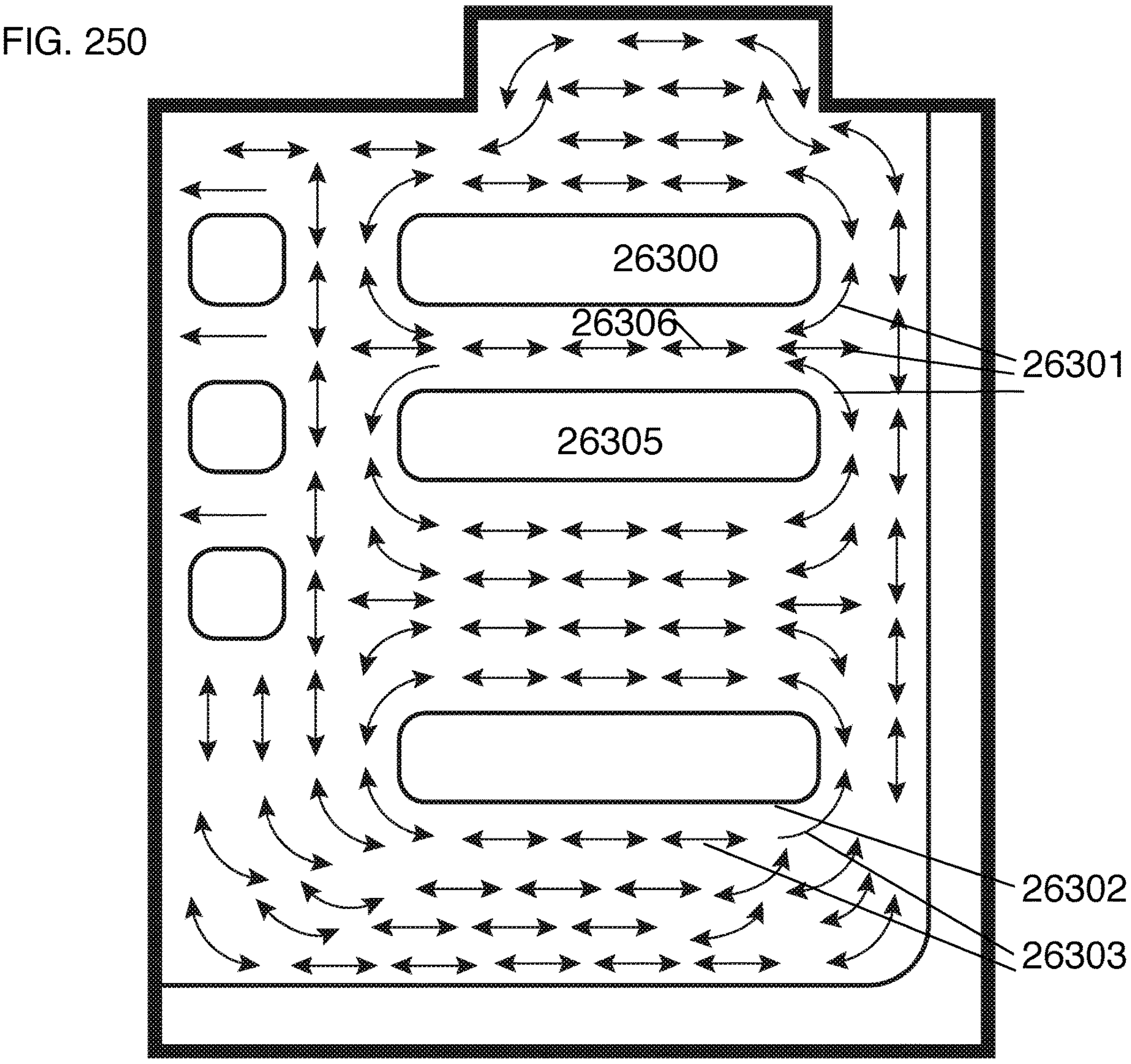

FIG. 250 illustrates an example of a vector field map.

FIG. 251 illustrates possible trajectories of an object.

FIG. 252 illustrates a vector field of an object.

FIGS. 253-255 illustrate an uncertainty cone of a robot.

Figure 256:
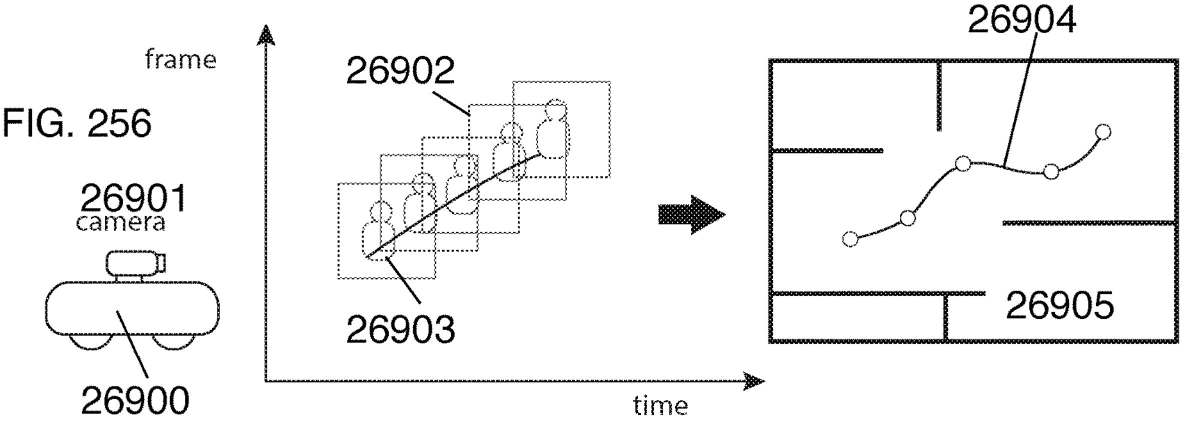
Figure 257:
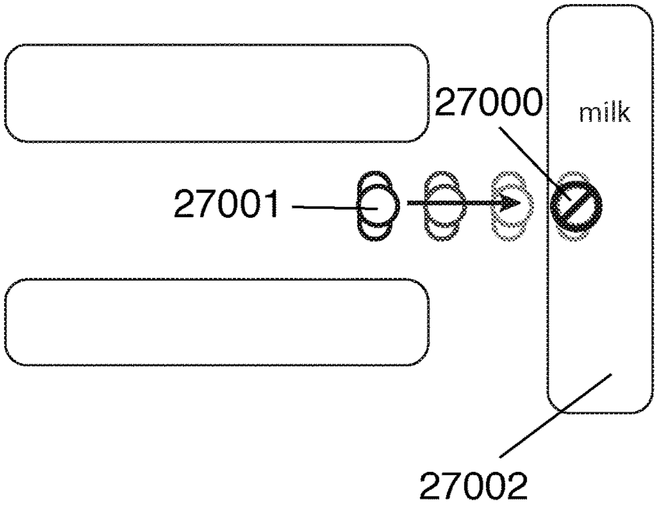

FIGS. 256 and 257 illustrate examples of predicting future locations of objects.

Figure 258:
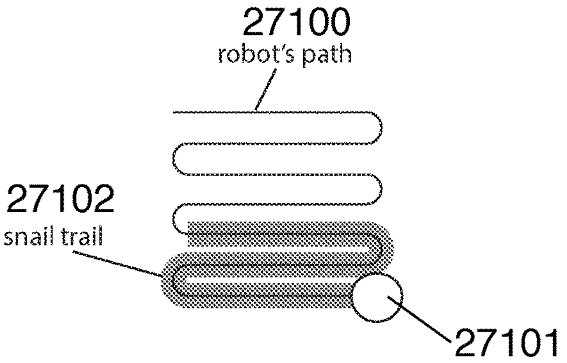

FIG. 258 illustrates an example of a path and snail trail of a robot.

Figure 259:
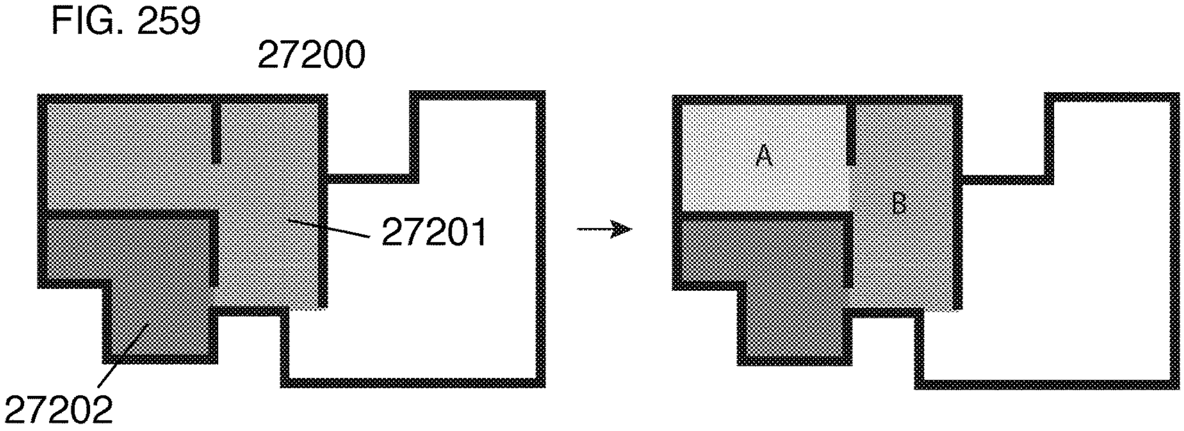

FIG. 259 illustrates an example of a room assignment.

Figure 260A:
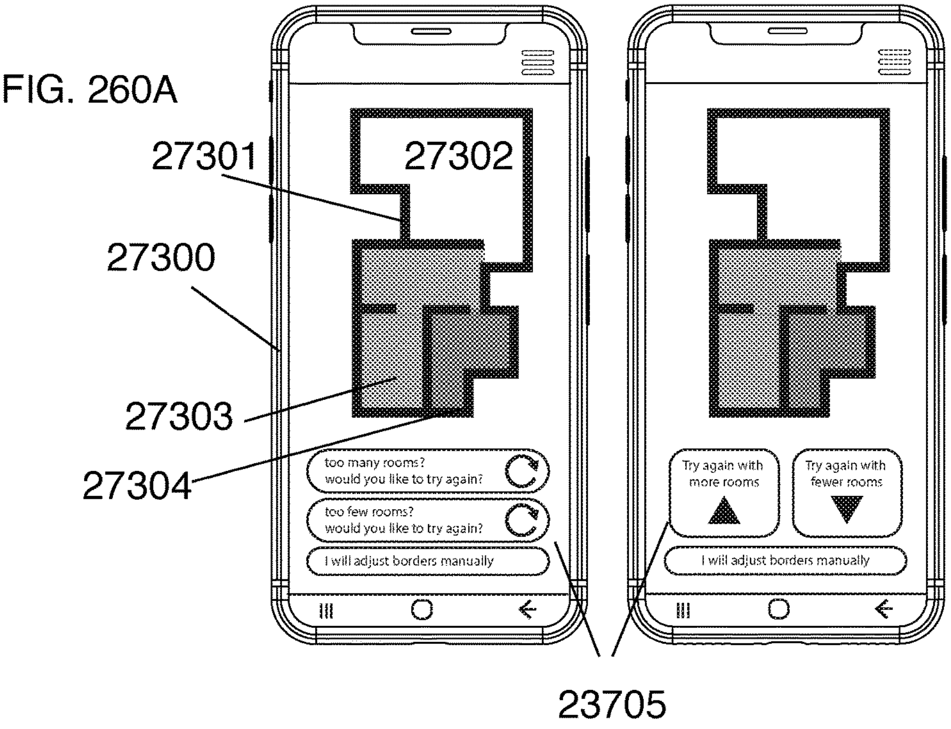
Figure 260B:
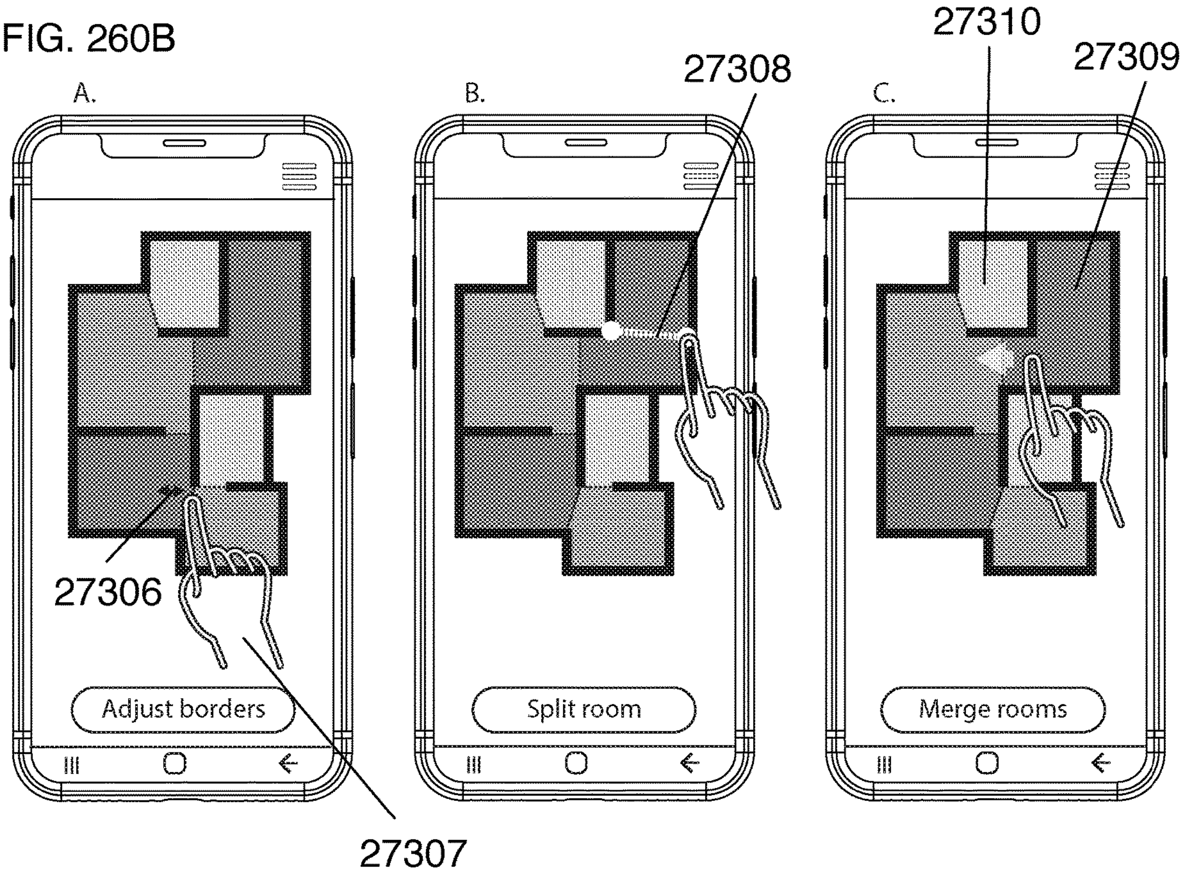

FIGS. 260A and 260B illustrate adjusting a room assignment using an application of a communication device.

Figure 261:
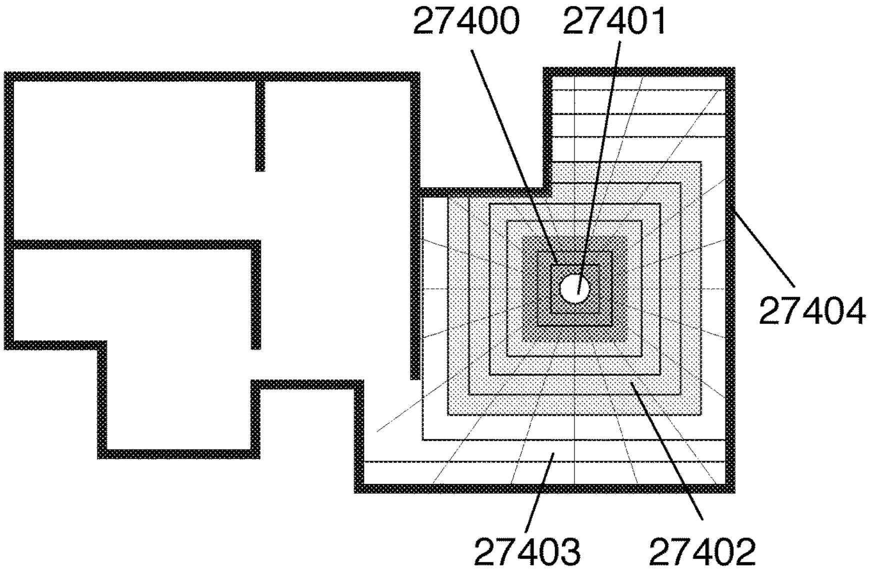

FIG. 261 illustrates a seed area of a robot while performing work.

Figure 262:
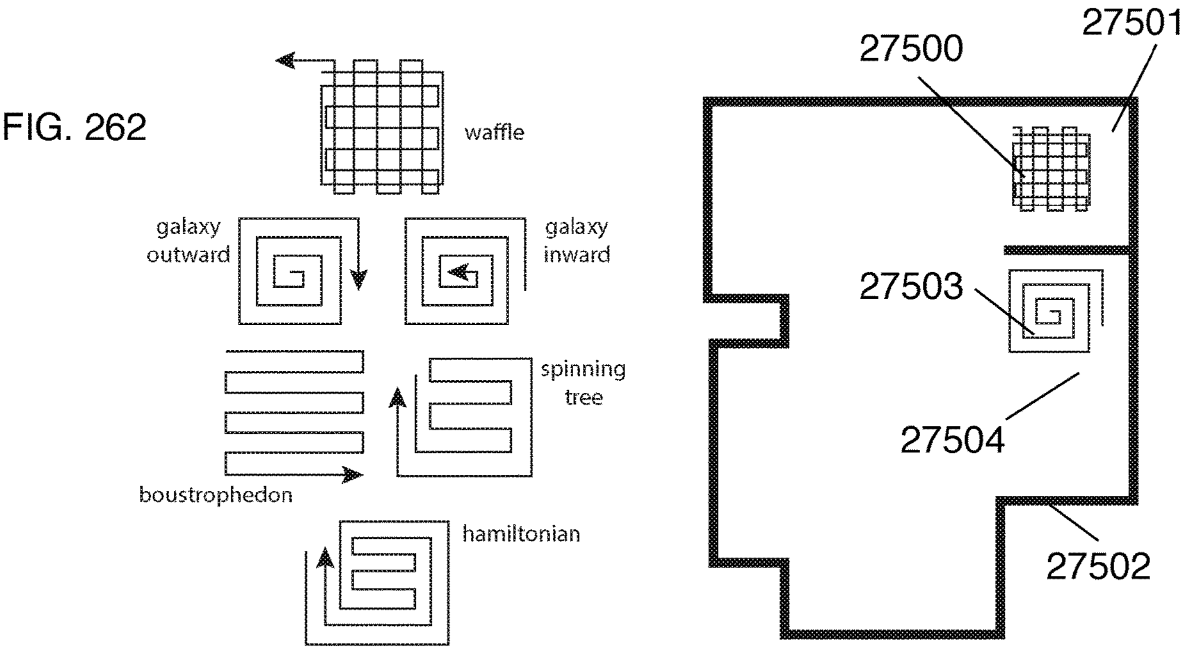

FIG. 262 illustrates examples of different types of movement paths.

Figure 263:
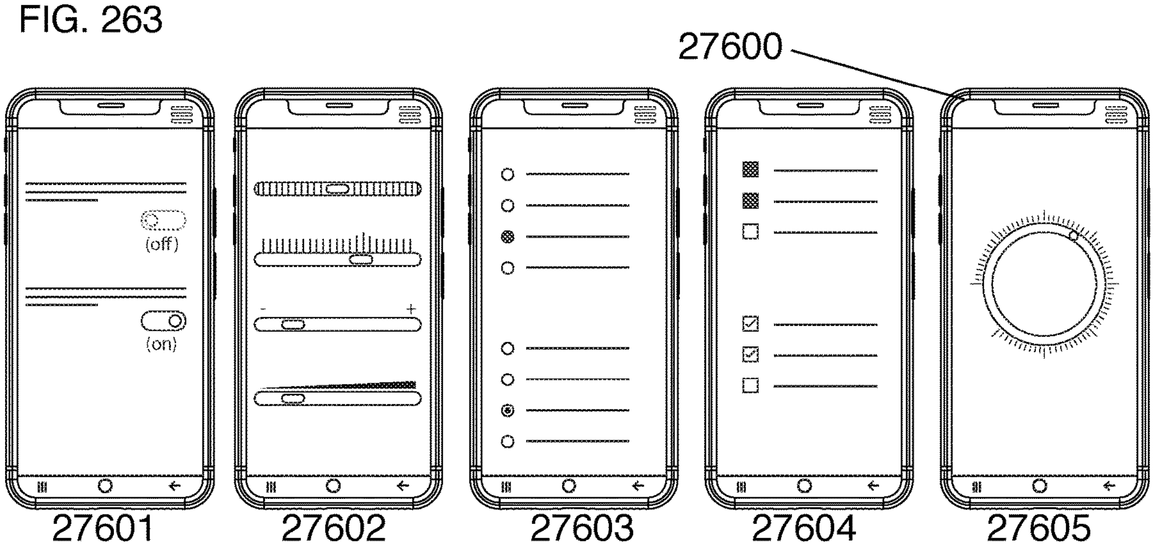

FIG. 263 illustrates examples of user interfaces of an application of a communication device.

Figure 264:
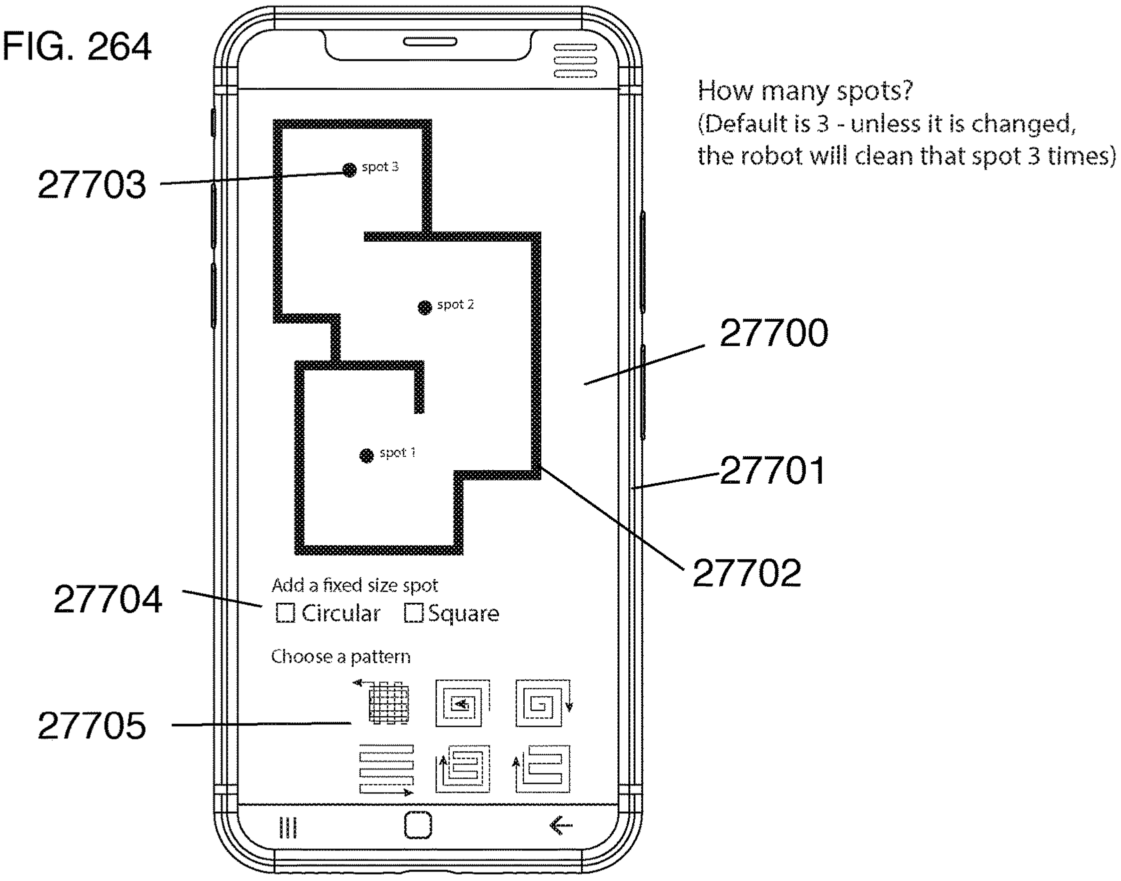
Figure 265:
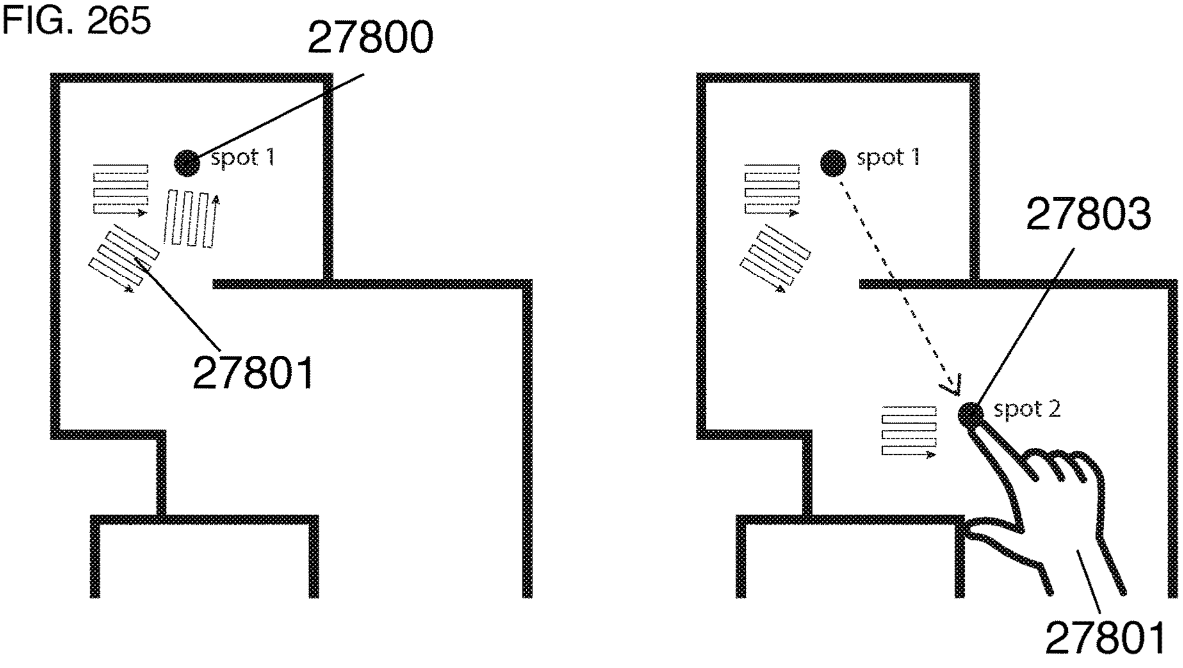

FIGS. 264 and 265 illustrate an application of a communication device displaying spot cleaning locations within a map.

Figure 266:
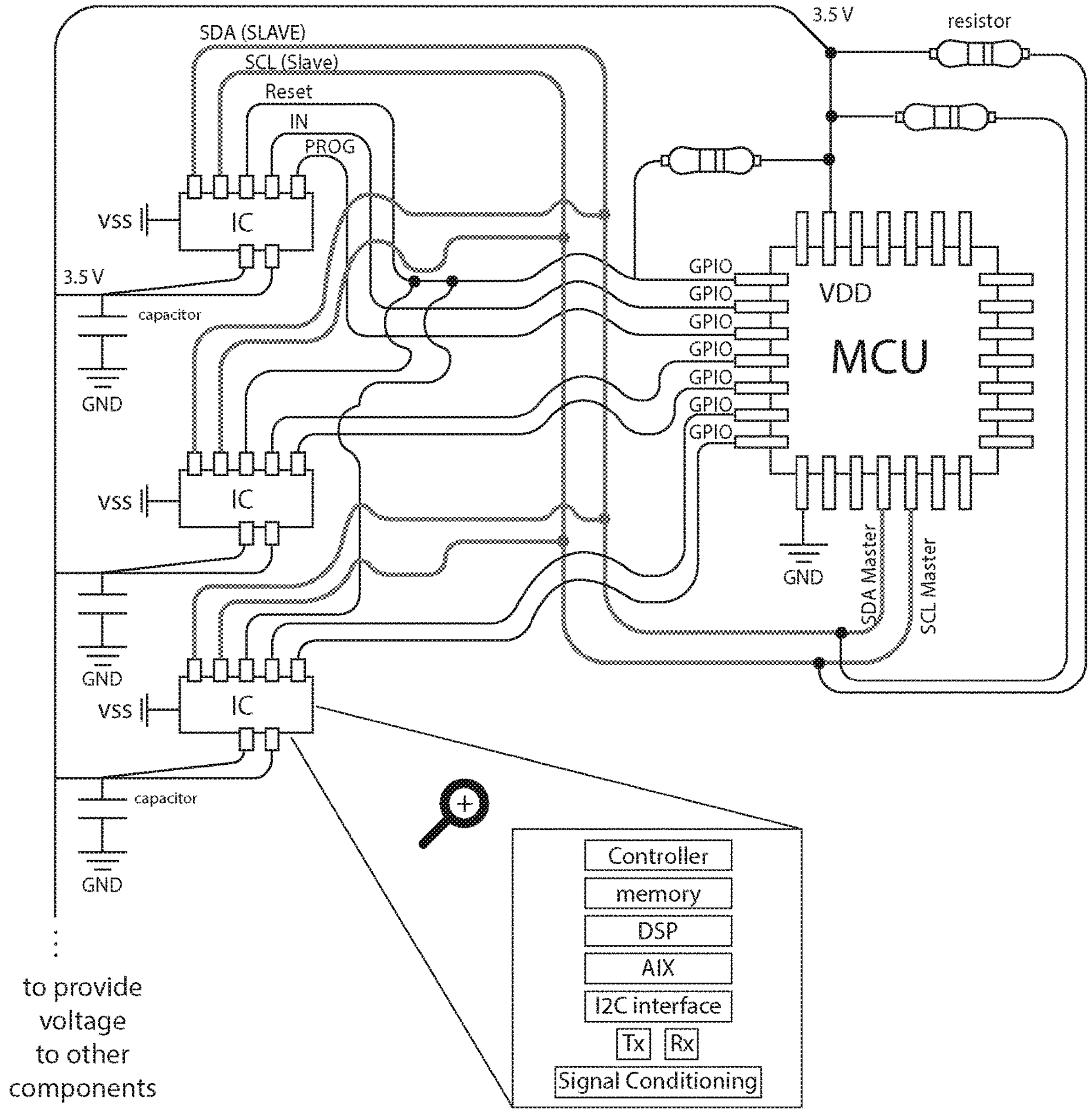

FIG. 266 illustrates an example of multiple sensors connected to a MCU.

Figure 267:

FIG. 267 illustrates idle time for waiting for read/write operations.

Figure 268:
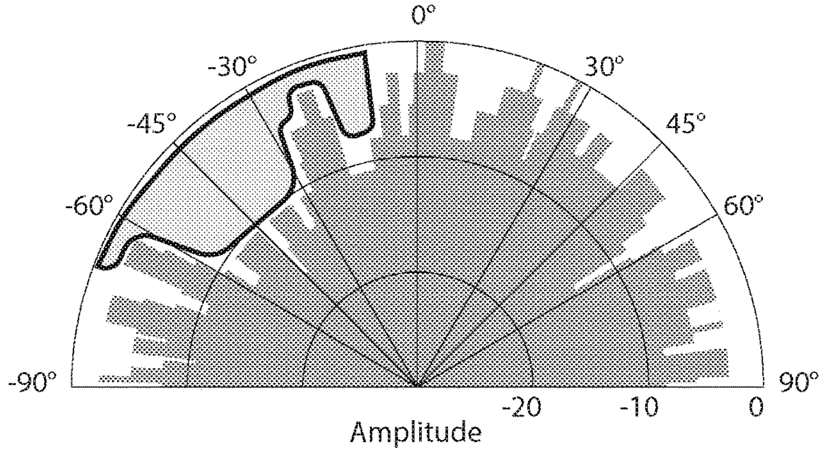

FIG. 268 illustrates an example of an acoustic range finder.

Figure 269:
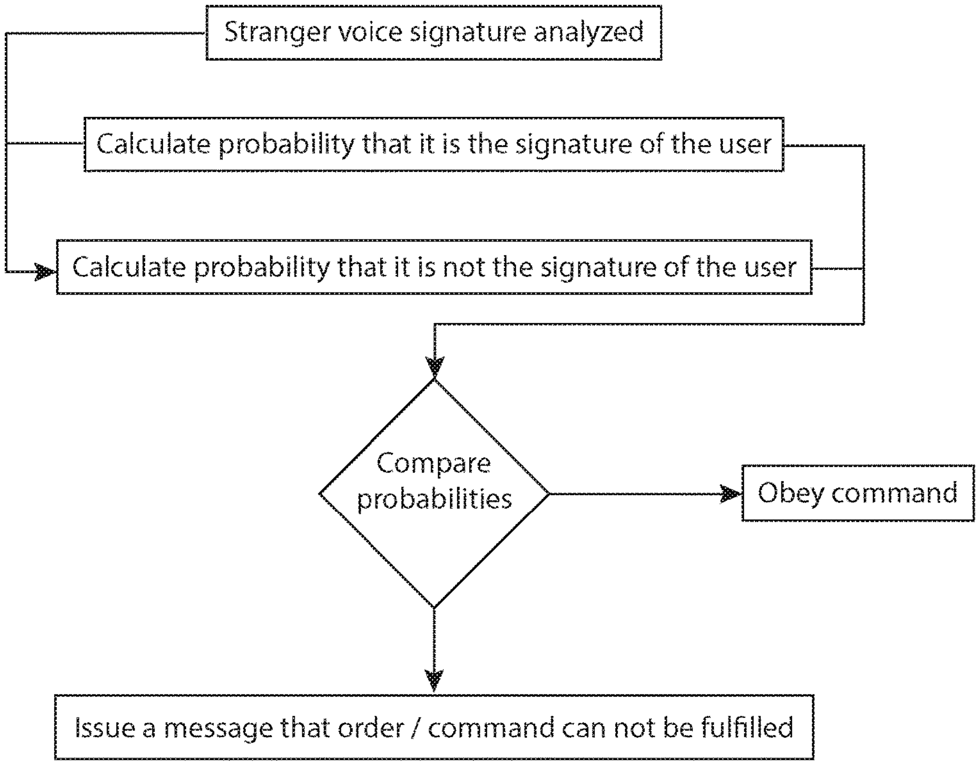

FIG. 269 illustrates an example of a process of voice signature analysis.

Figure 270:
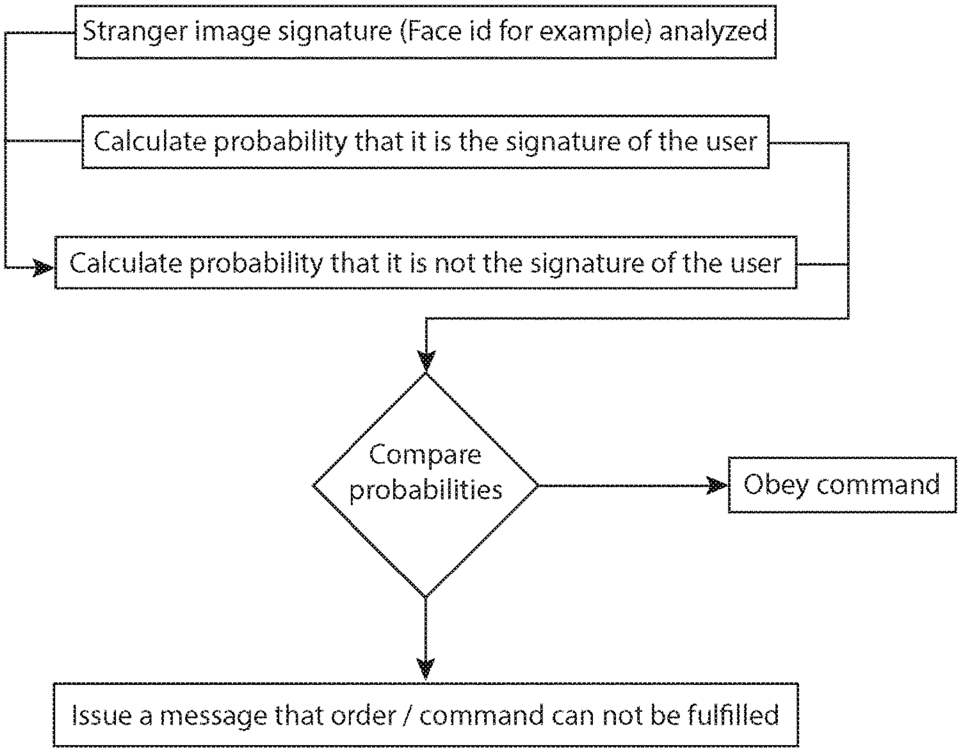

FIG. 270 illustrates an example of a process of image signature analysis.

Figure 271:
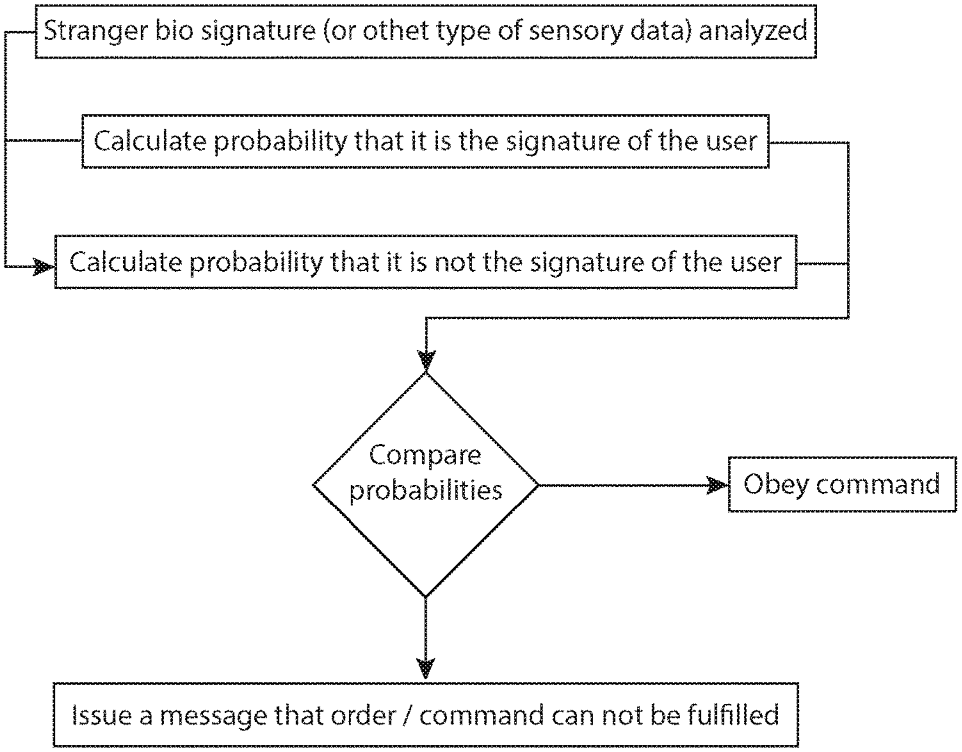

FIG. 271 illustrates an example of a process of biosensor signature analysis.

Figure 272:
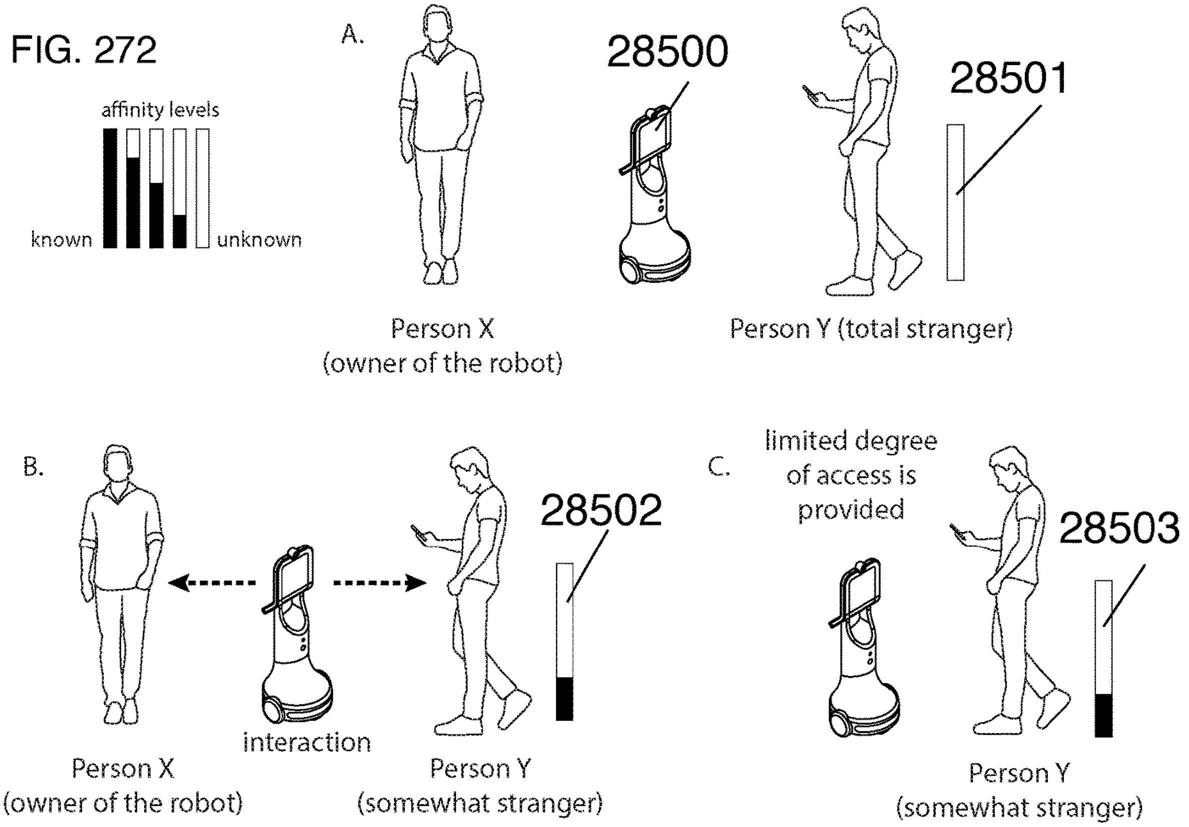

FIG. 272 illustrates levels of access to robots determined based on affinities.

Figure 273:
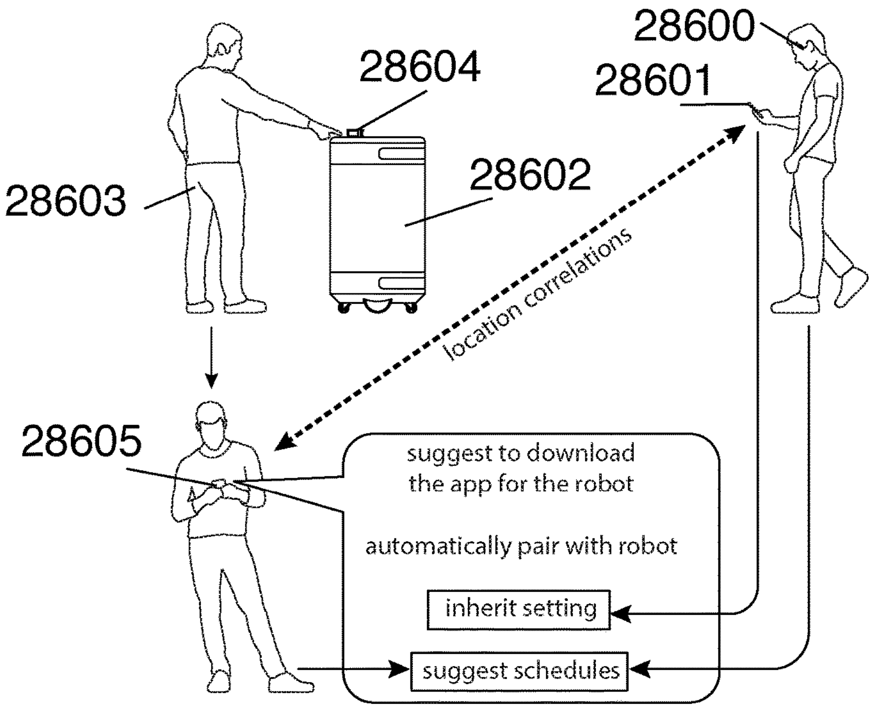
Figure 274:
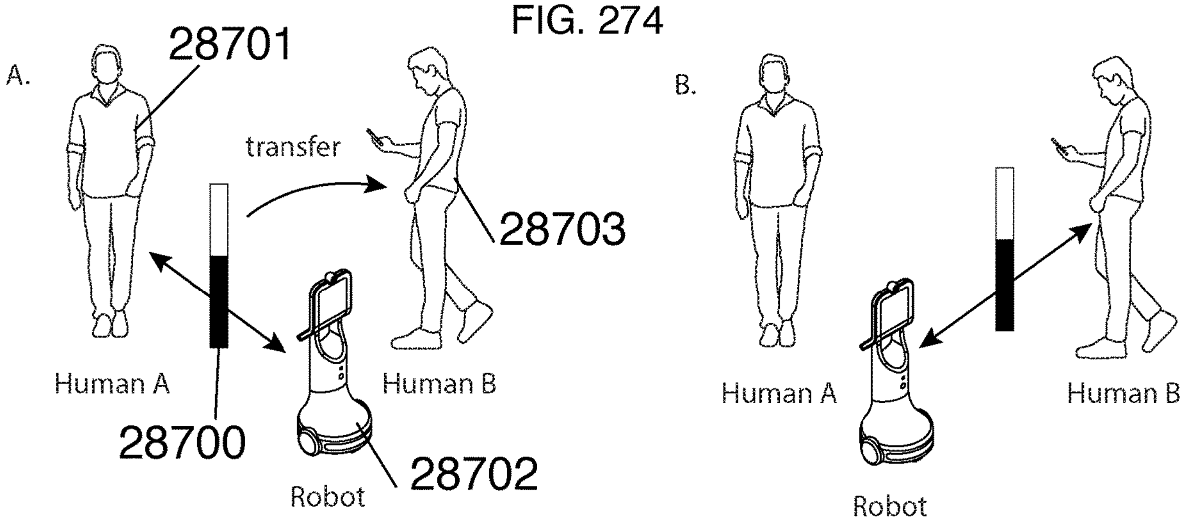

FIGS. 273 and 274 illustrate examples of a transfer of affinity.

Figure 275:
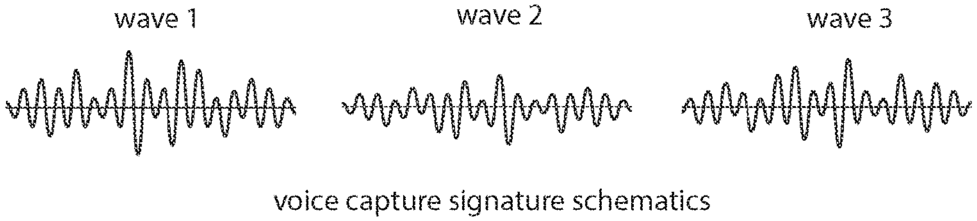

FIG. 275 illustrates examples of voice signature schematics.

Figure 276:
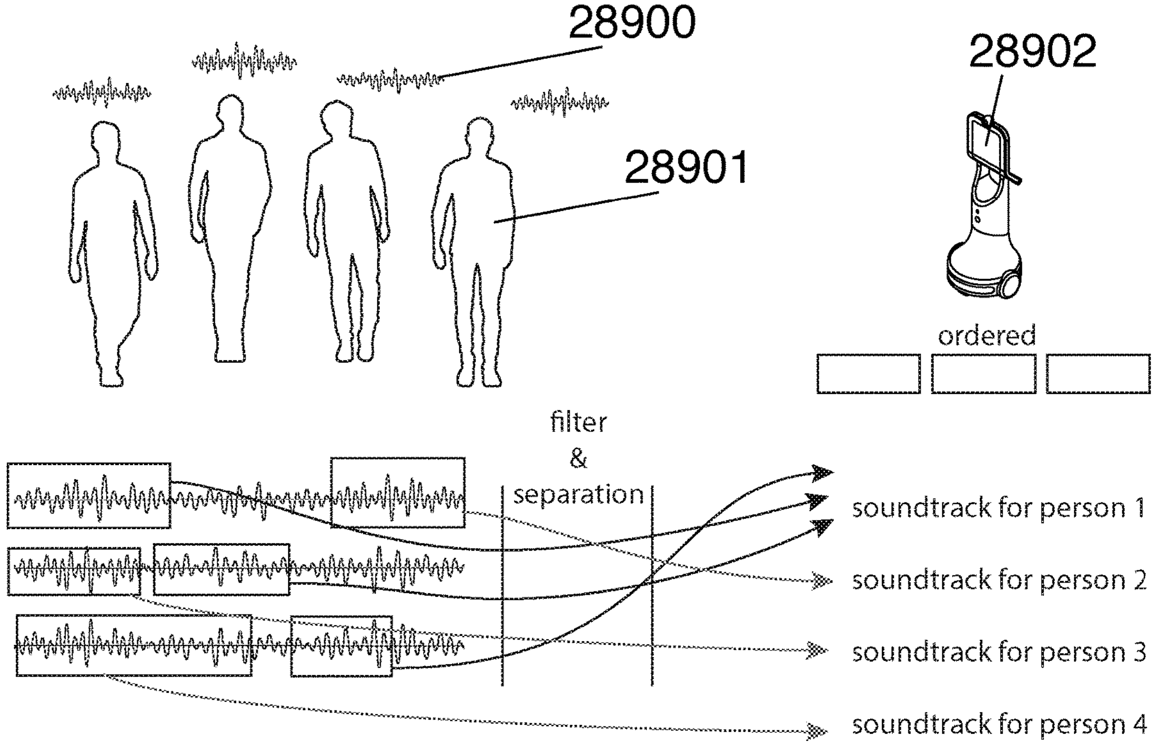

FIG. 276 illustrates a robot separating voice capture signatures of various persons.

Figure 277:
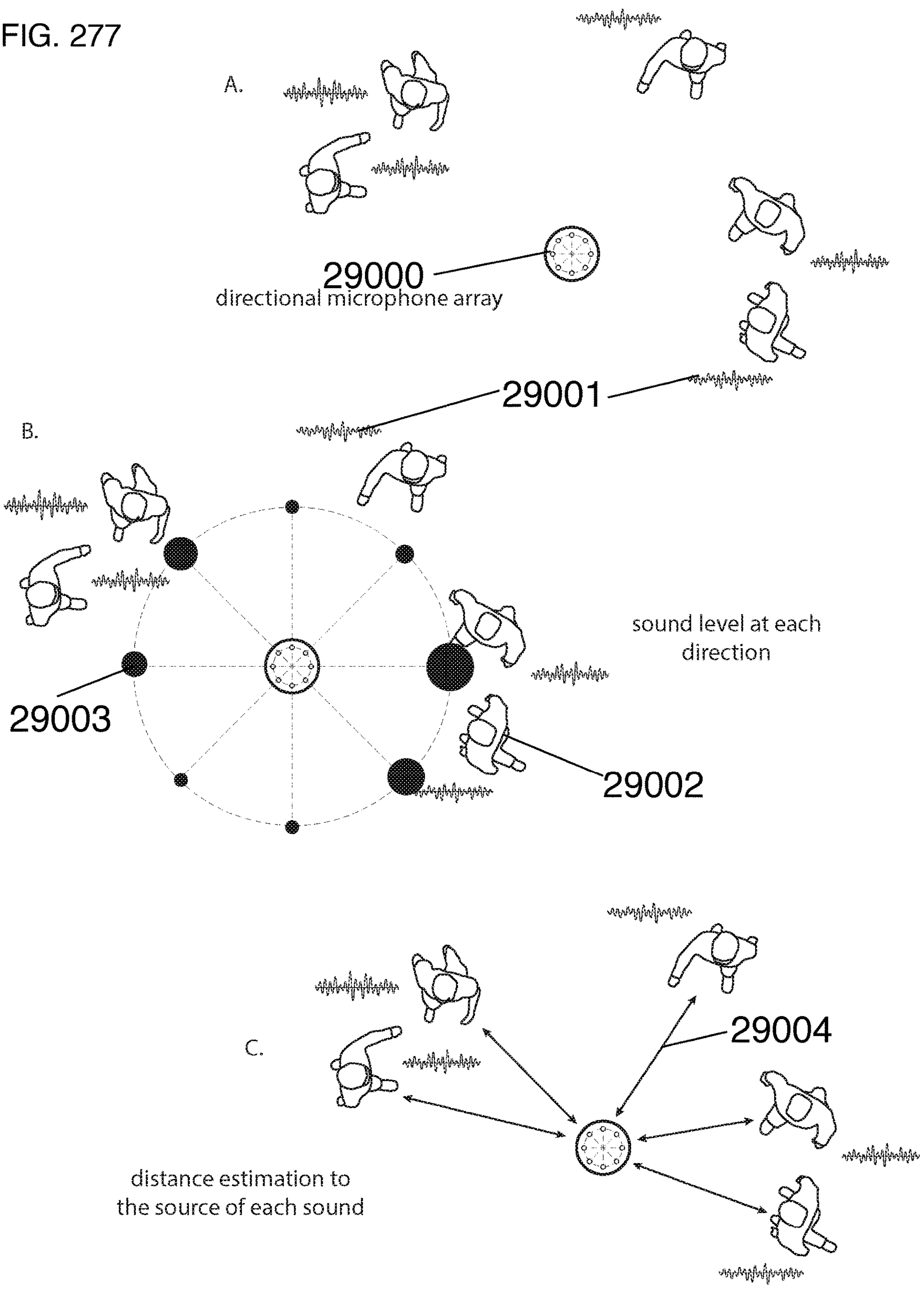

FIG. 277 illustrates a robot determining a location of persons using a directional microphone.

Figure 278:
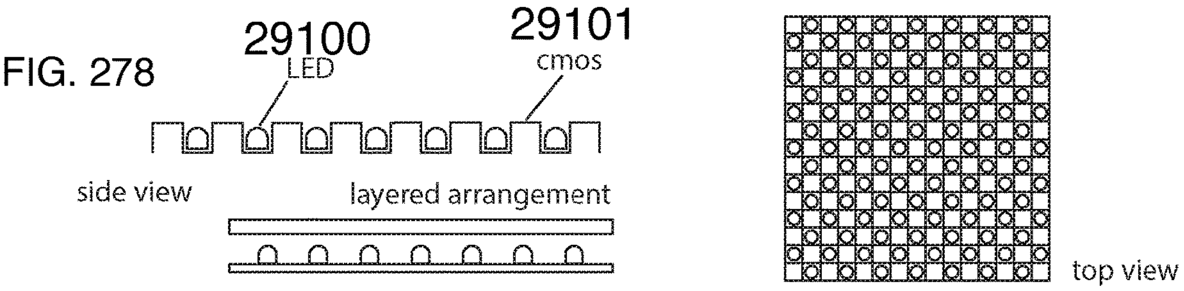

FIG. 278 illustrates an example of an optical arrangement.

Figure 279:
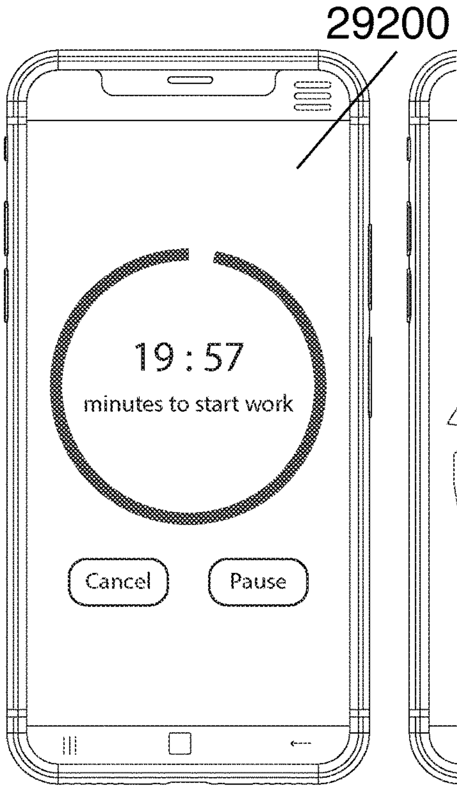

FIG. 279 illustrates an application of a communication device displaying a timer for a robot to perform work.

Figure 280:
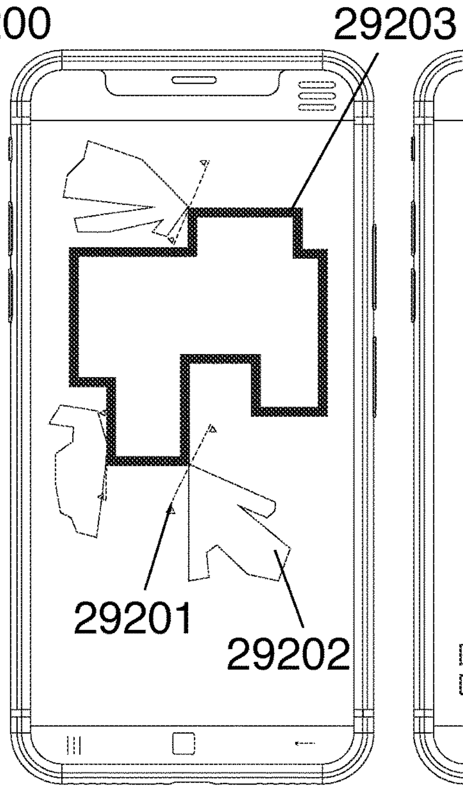
Figure 281:
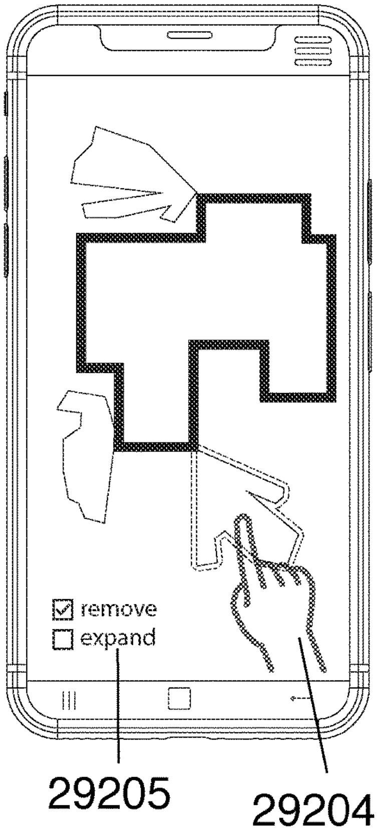

FIGS. 280 and 281 illustrate a slicer tool and a selection tool of an application of a communication device, respectively.

FIGS. 282A-282D illustrate adding a household member using an application of a communication device.

FIGS. 283A-283D illustrate adding a virtual space and furniture using an application of a communication device.

FIGS. 284A-284E illustrate a trading of virtual items using an application of a communication device.

Figure 285:
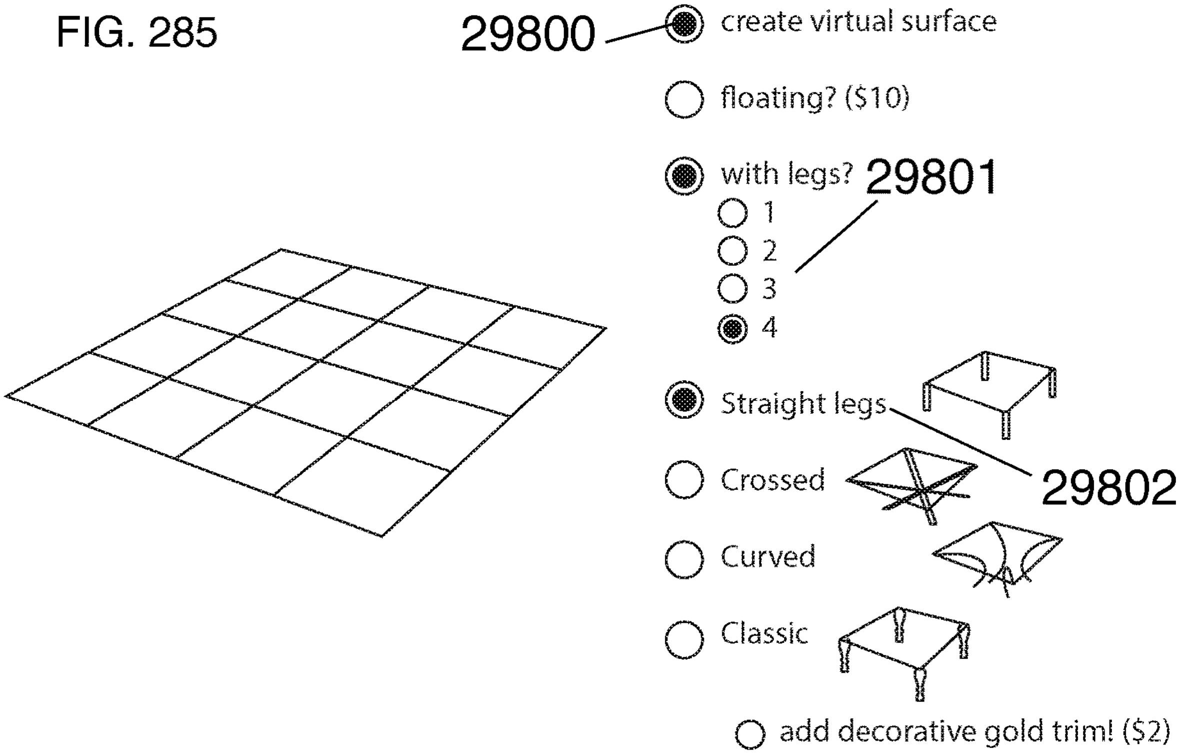

FIG. 285 illustrates creating a virtual object using an application of a communication device.

Figure 286:
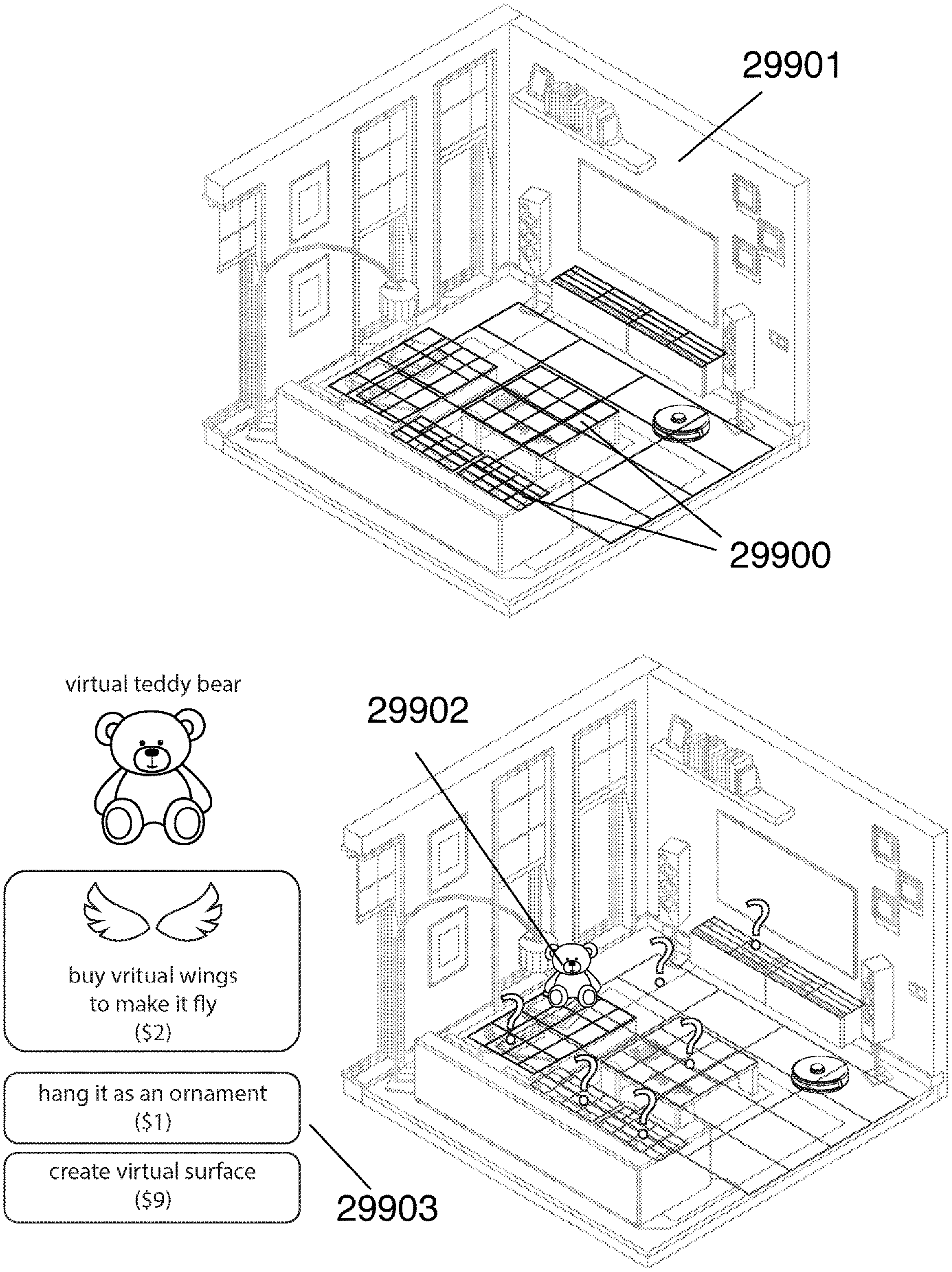

FIG. 286 illustrates recognizing a virtual space using an application of a communication device or other means.

FIGS. 287A and 287B illustrate an application of a communication device displaying a map and a path of a robot.

FIG. 288 illustrates a map displayed in a shape of a lion.

Figure 289:
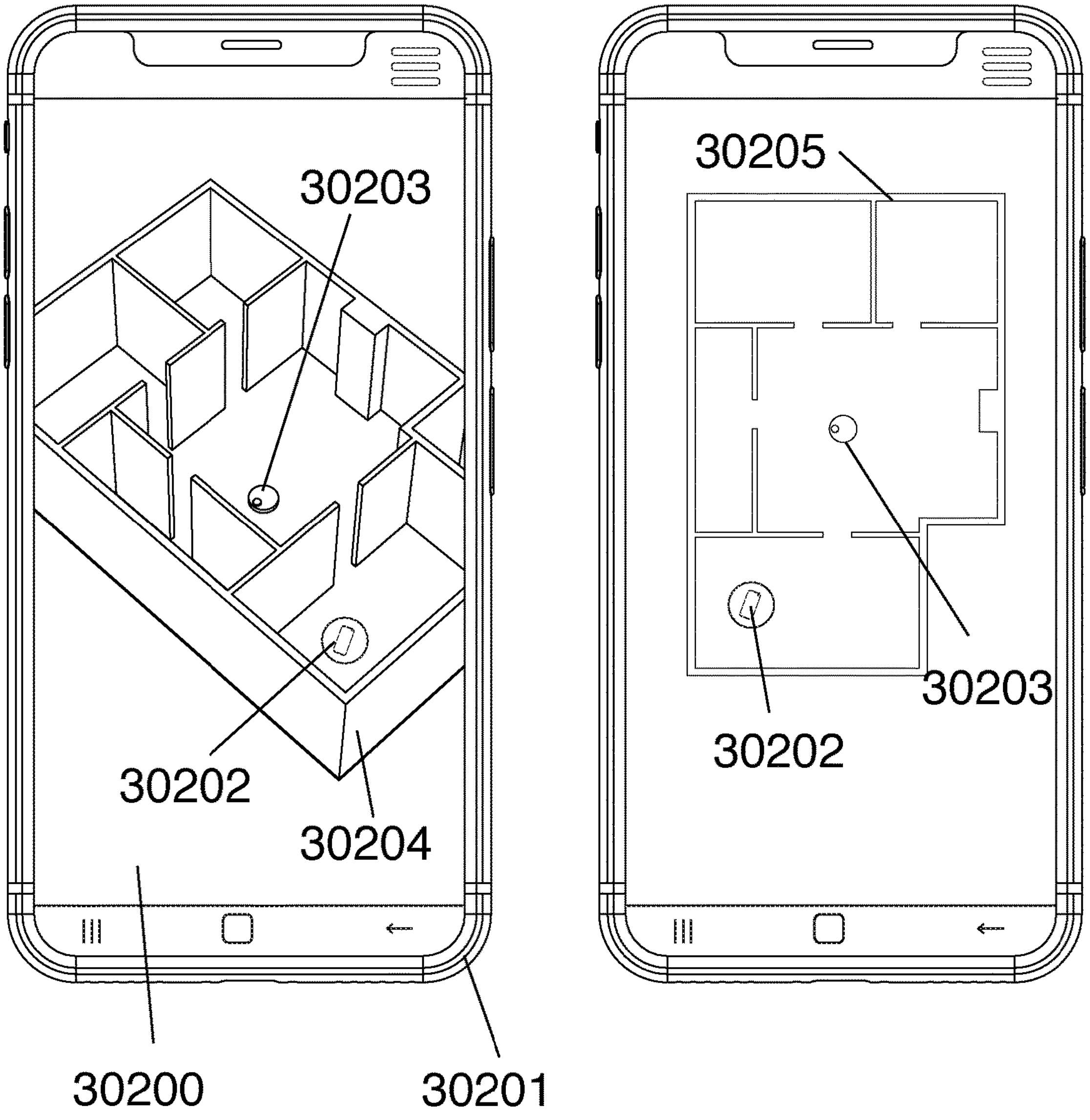

FIG. 289 illustrates an application of a communication device displaying a location of the communication device and a robot in a map.

Figure 290:
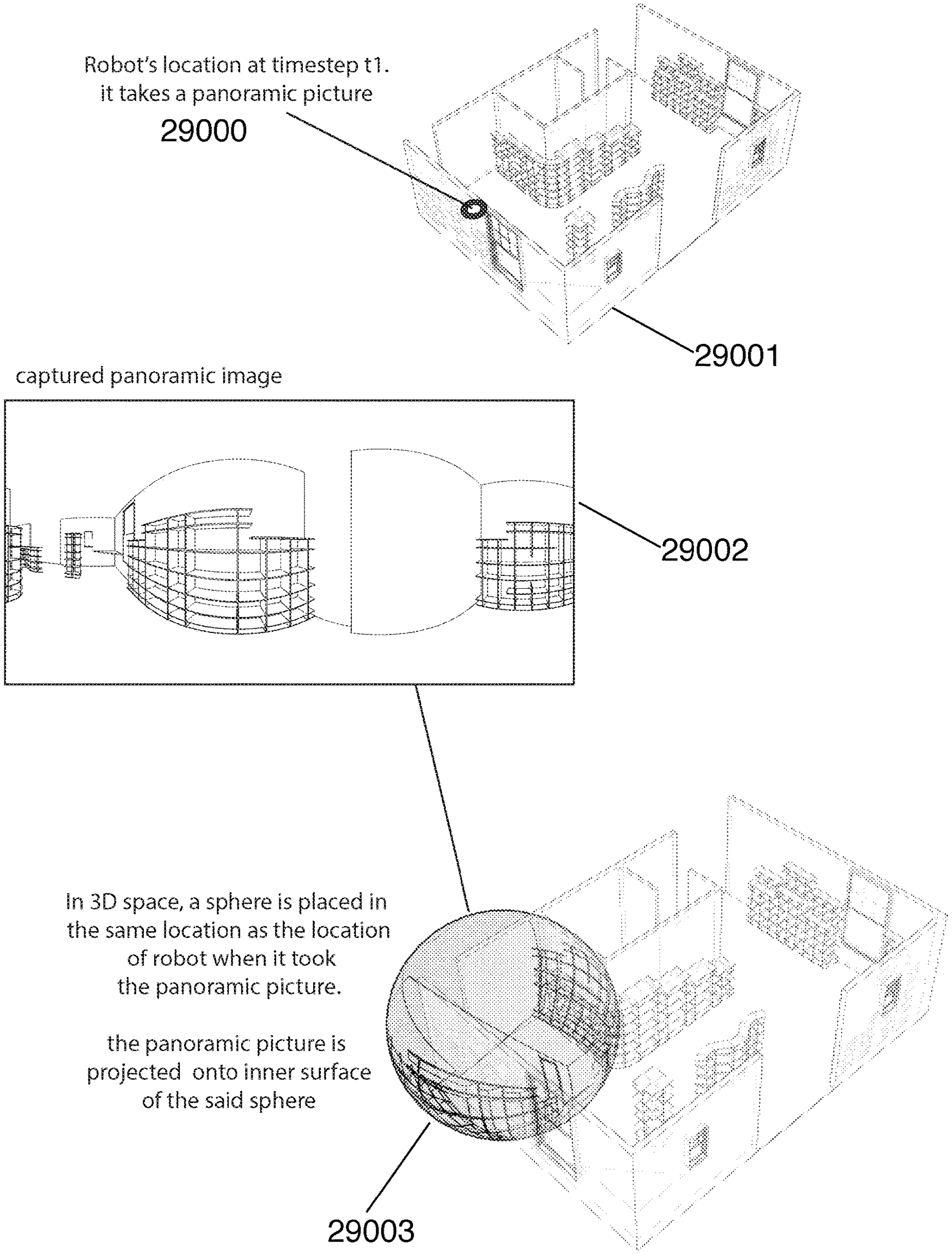

FIG. 290 illustrates a location of a robot from which a panoramic image is captured by a camera disposed on the robot.

FIG. 291 illustrates an example of a virtual camera view of a robot.

Figure 293:
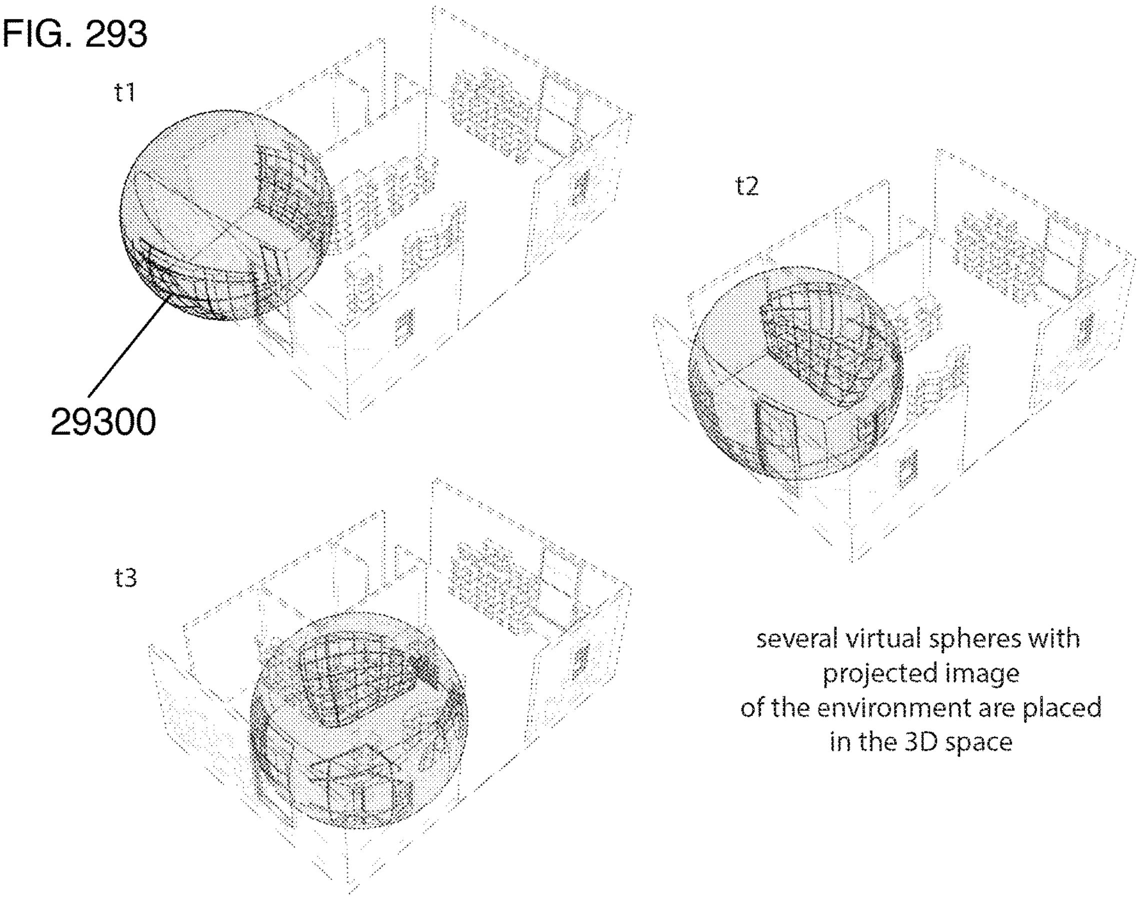

FIGS. 292 and 293 illustrate examples of panoramic images and a projection thereof.

Figure 294:
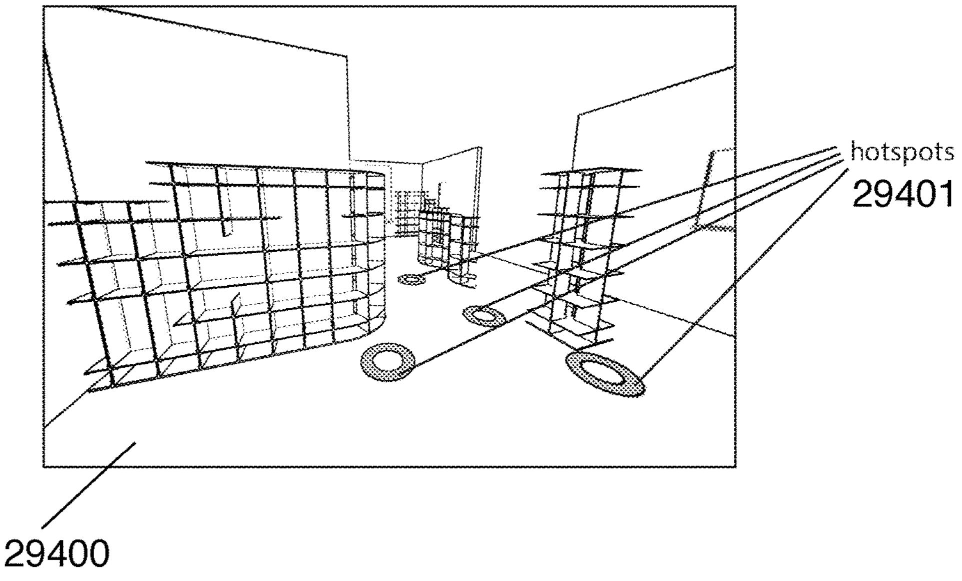

FIG. 294 illustrates an environment and hotspots displayed by an application.

FIG. 295 illustrates a user using a 3D cursor to determine different directions of surfaces.

FIG. 296 illustrates an example of a 2D map including hotspots.

Figure 297:
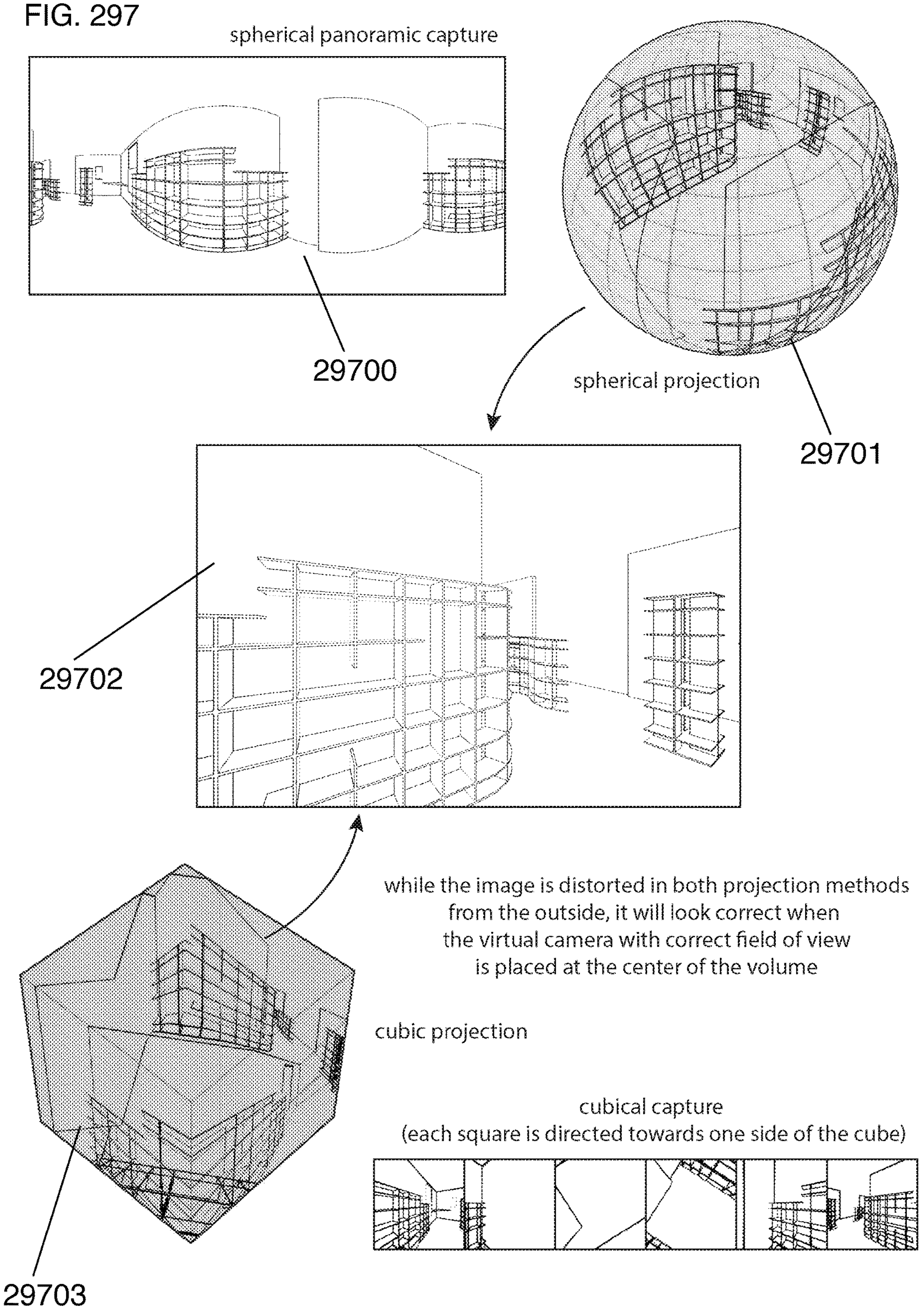
Figure 298:
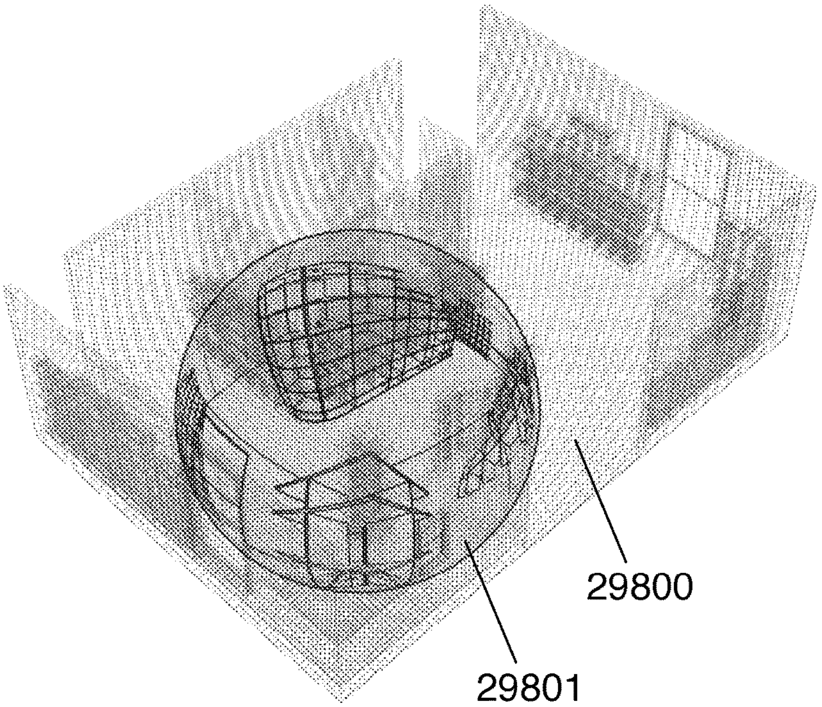
Figure 299:
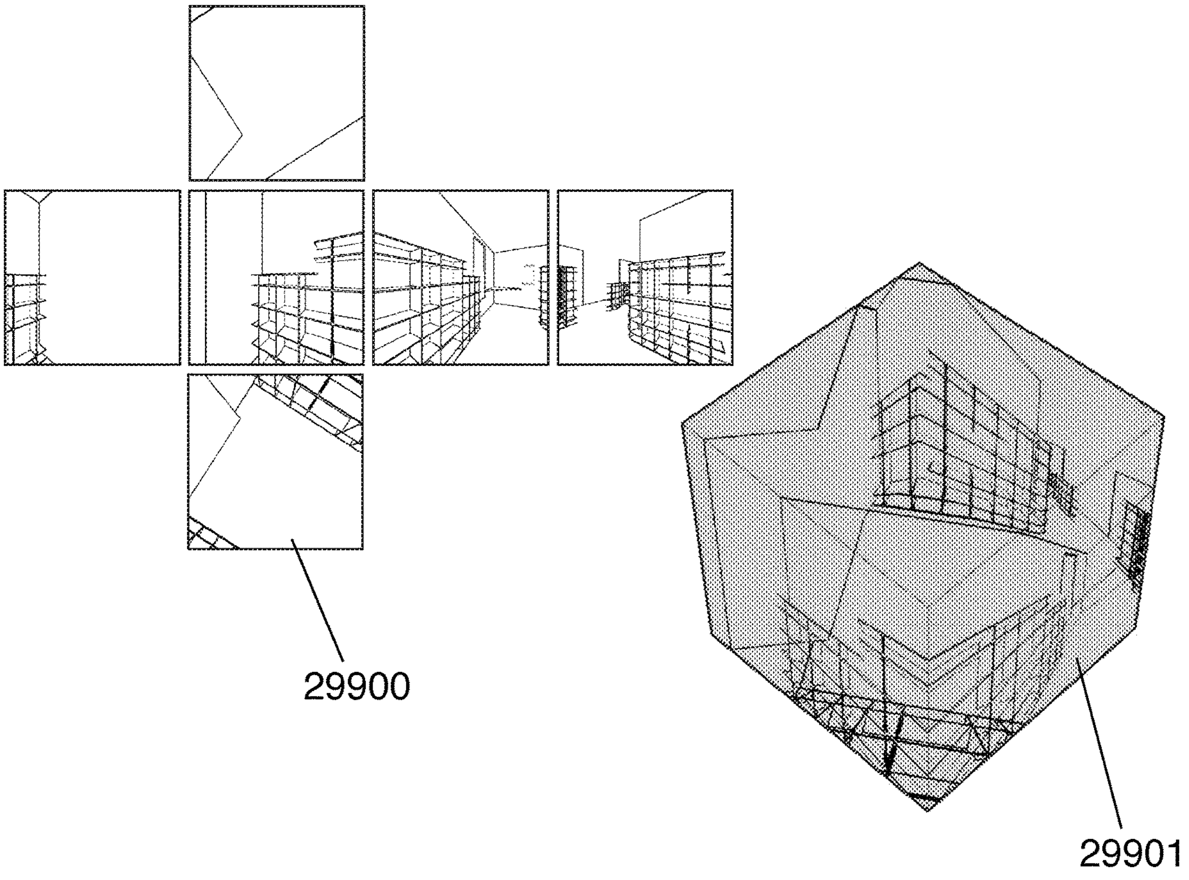

FIGS. 297-299 illustrate an example of panoramic image projections and data used in generating the panoramic images.

Figure 300:
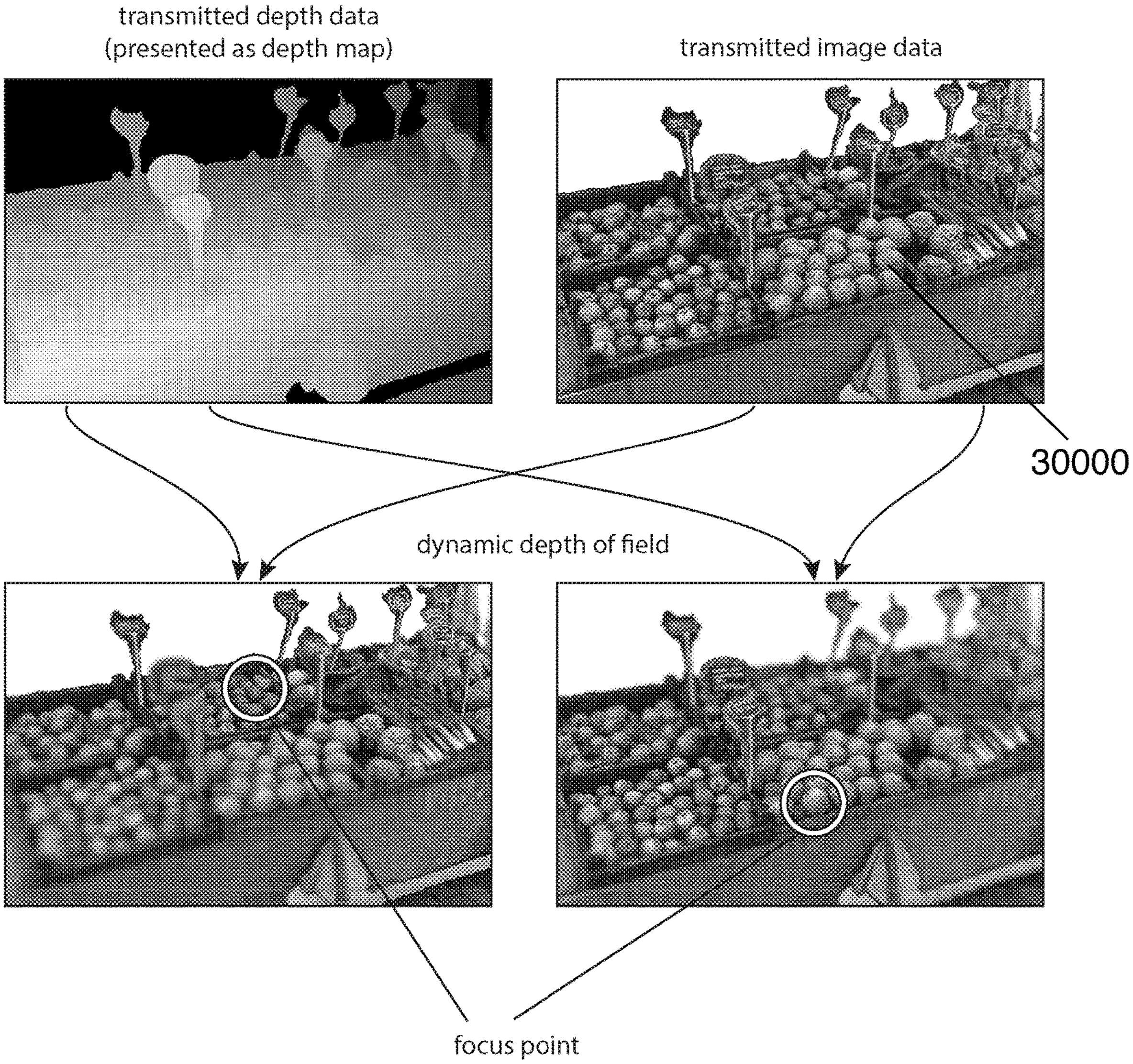
Figure 301:
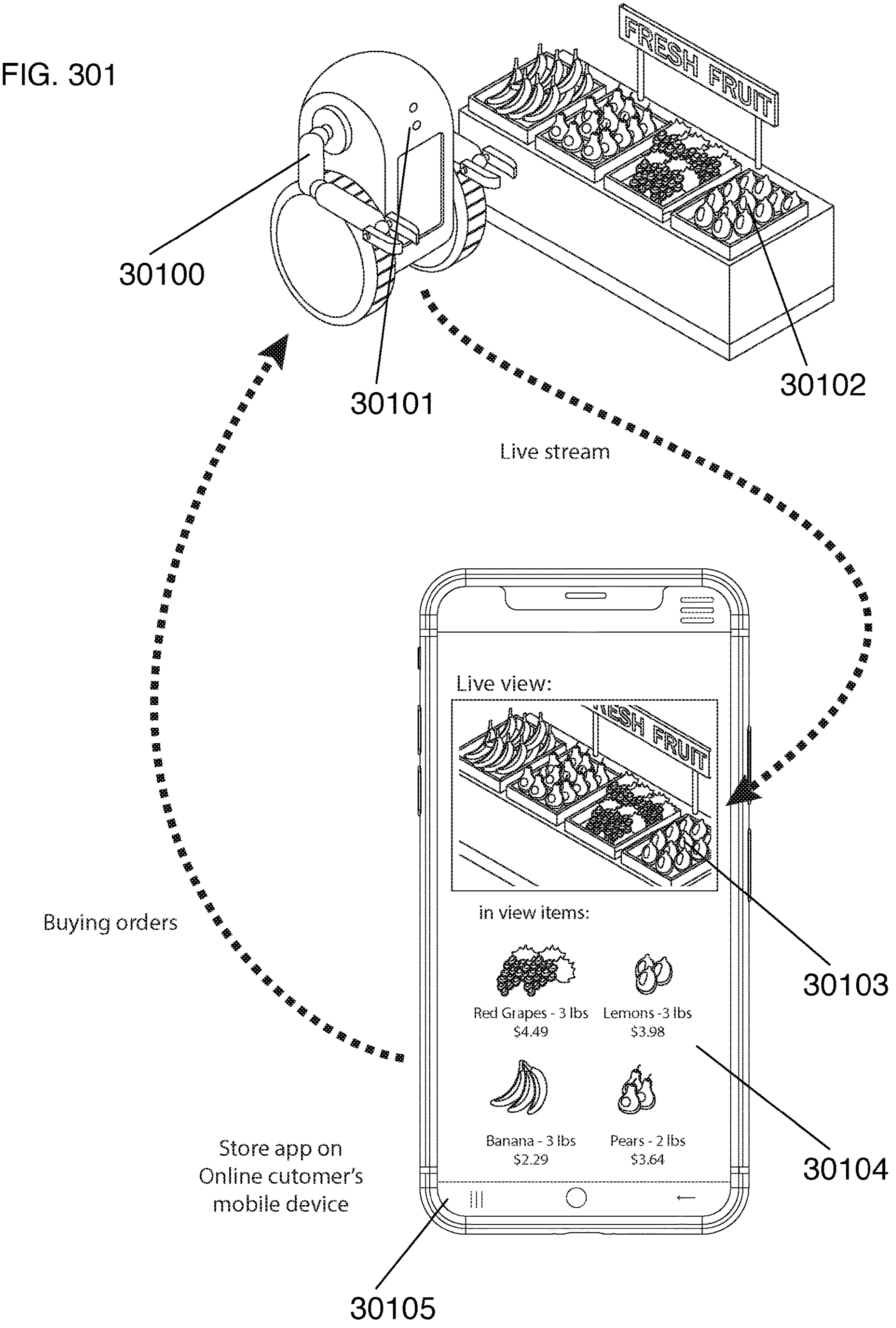

FIGS. 300 and 301 illustrate examples of data used in generating a dynamic depth of field.

Figure 302:
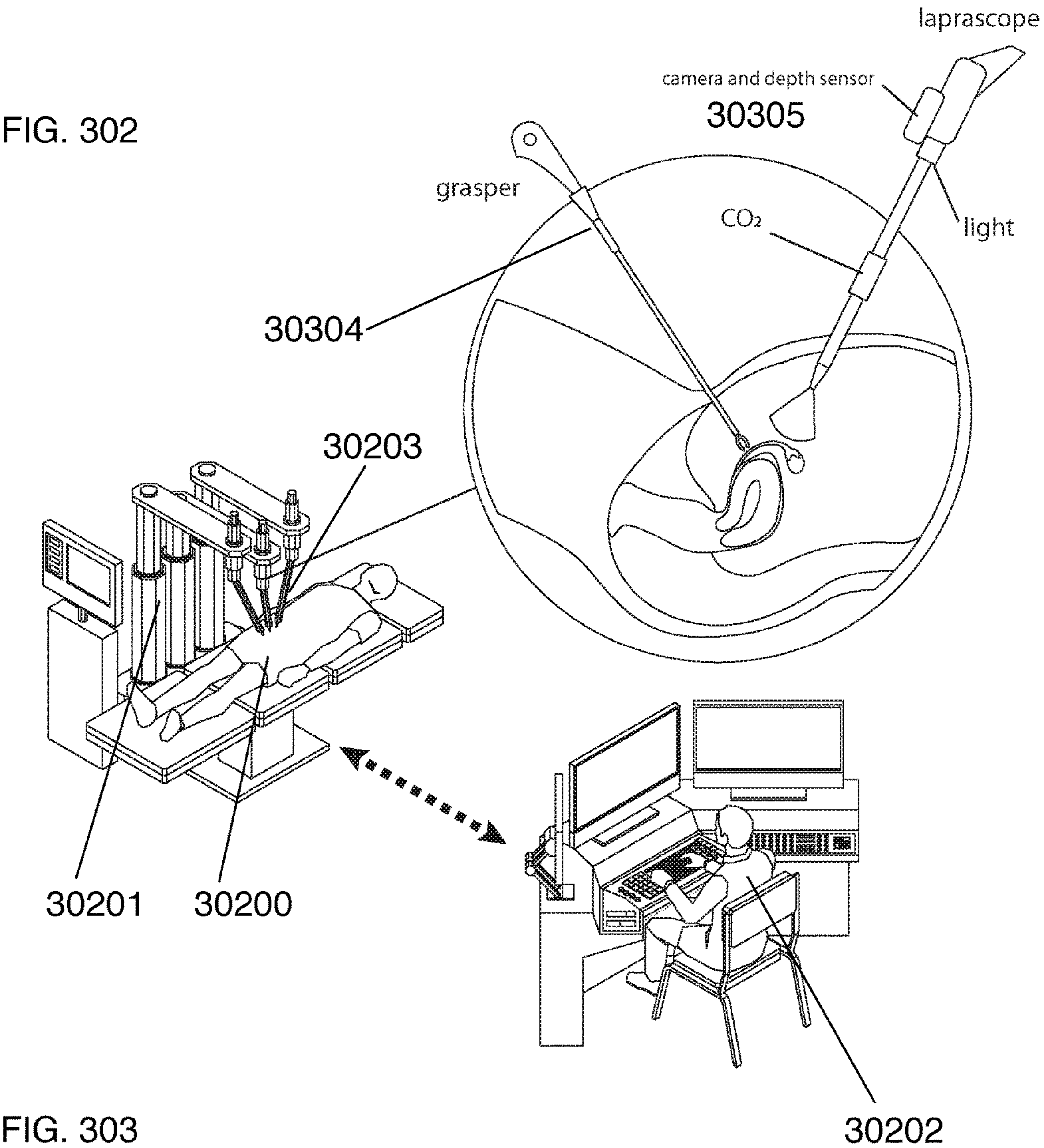

FIG. 302 illustrates an example of a person undergoing laparoscopic surgery.

Figure 303:
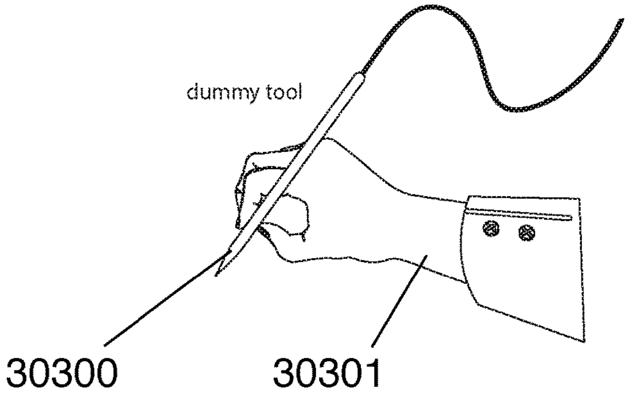

FIG. 303 illustrates an example of a dummy surgical tool.

Figure 304:
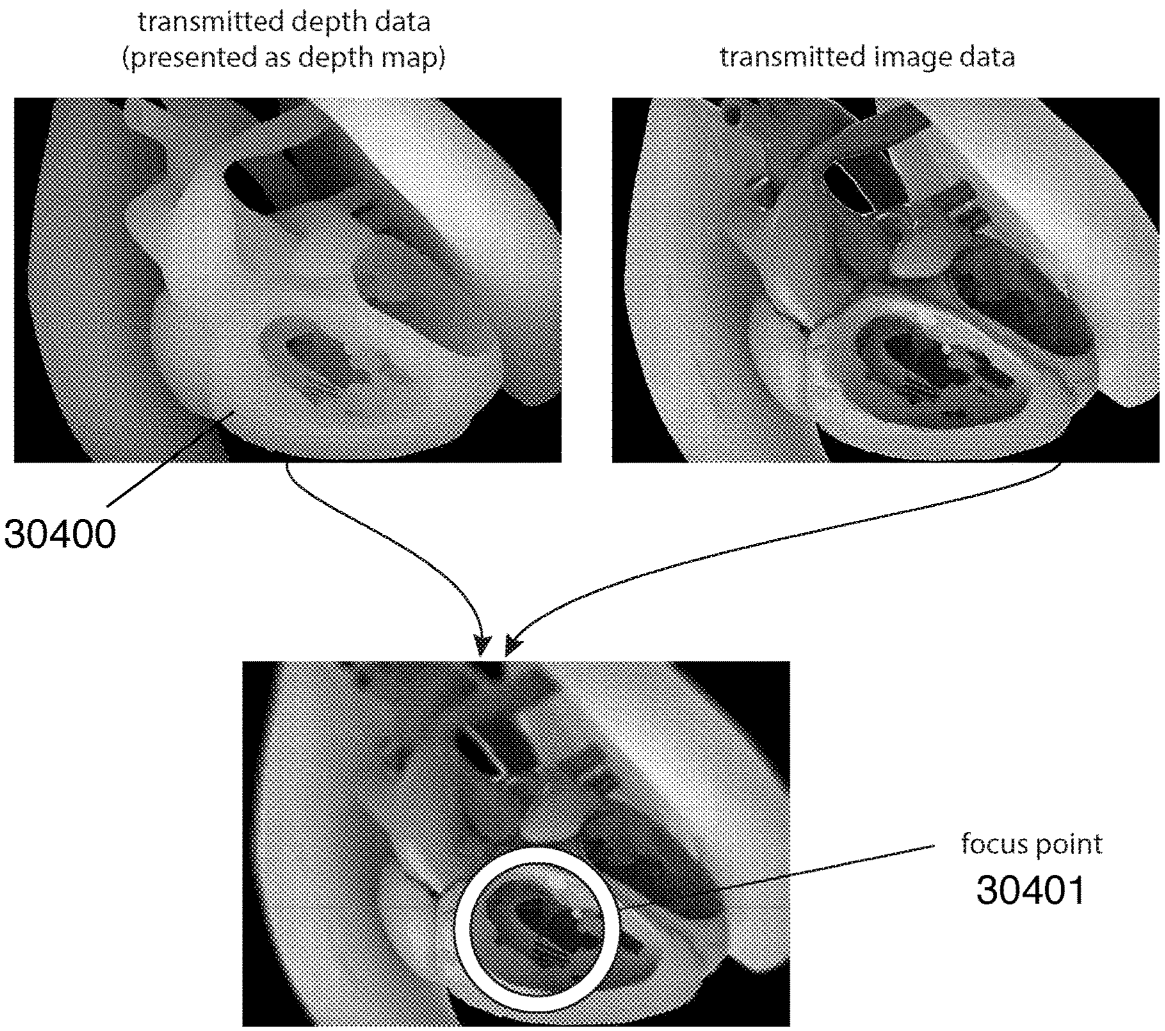

FIG. 304 illustrates using depth data and image data to generate a dynamic depth field.

Figure 305:
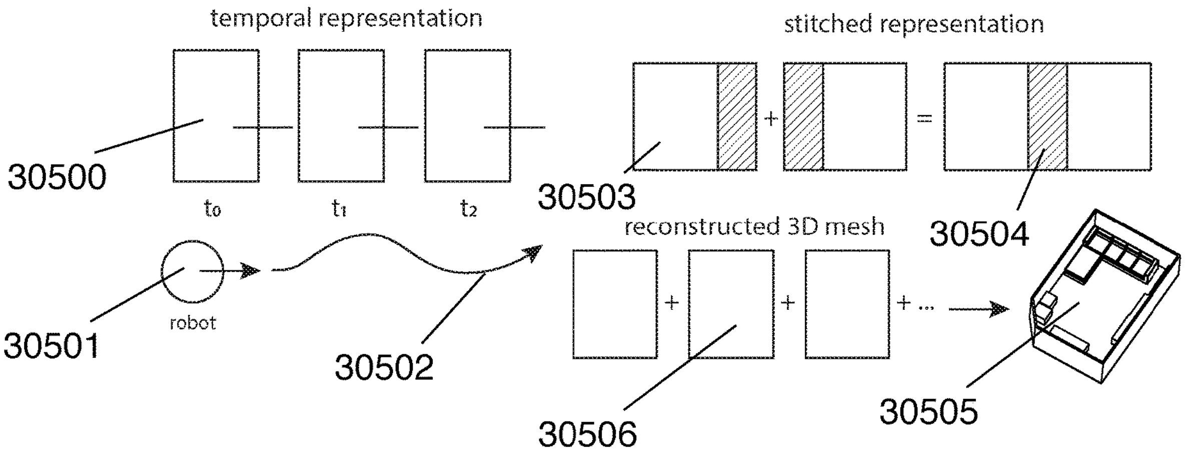

FIG. 305 illustrates examples of various representations of an environment.

Figure 306:
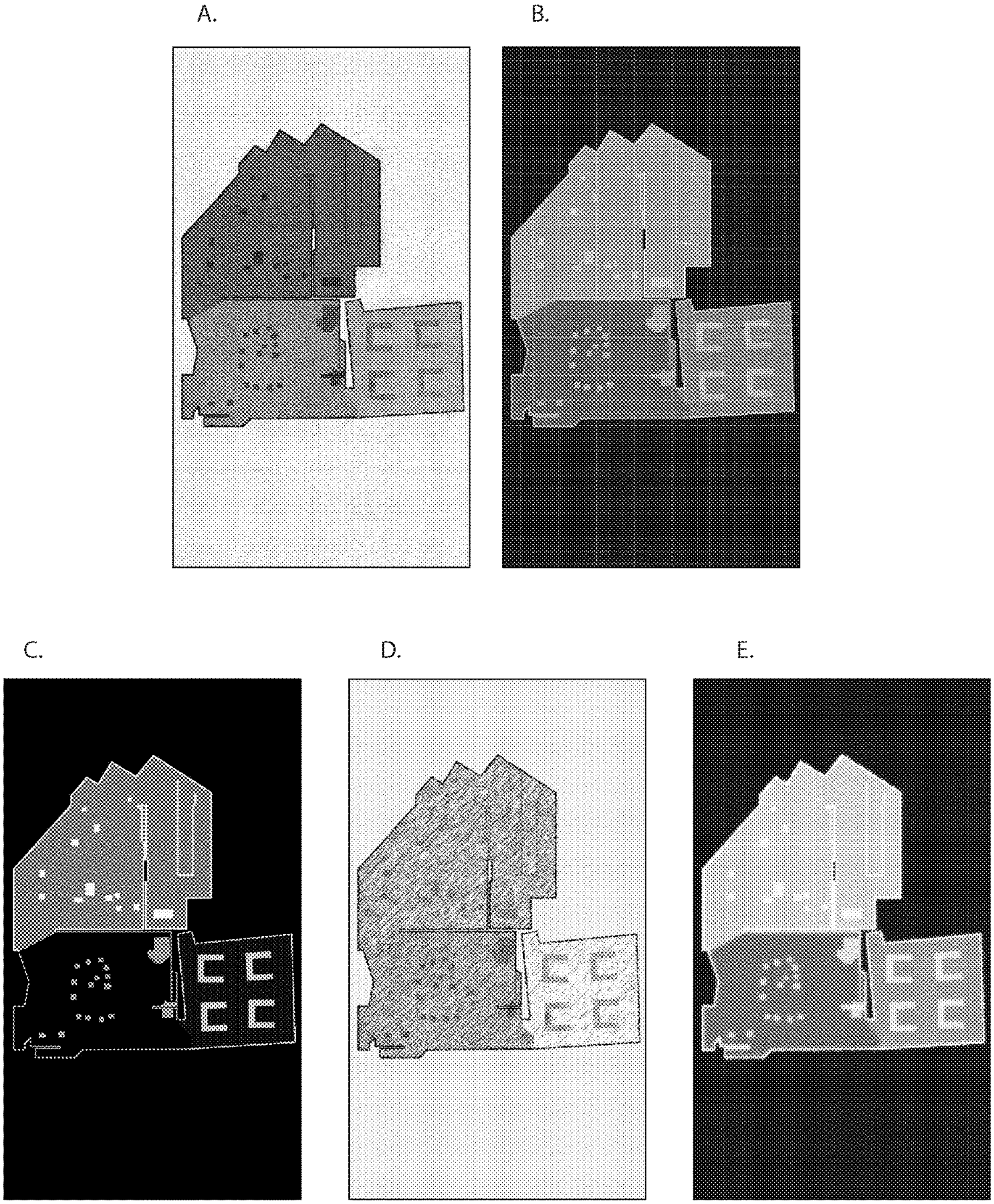

FIG. 306 illustrates examples of different styles for displaying a map.

Figure 307:
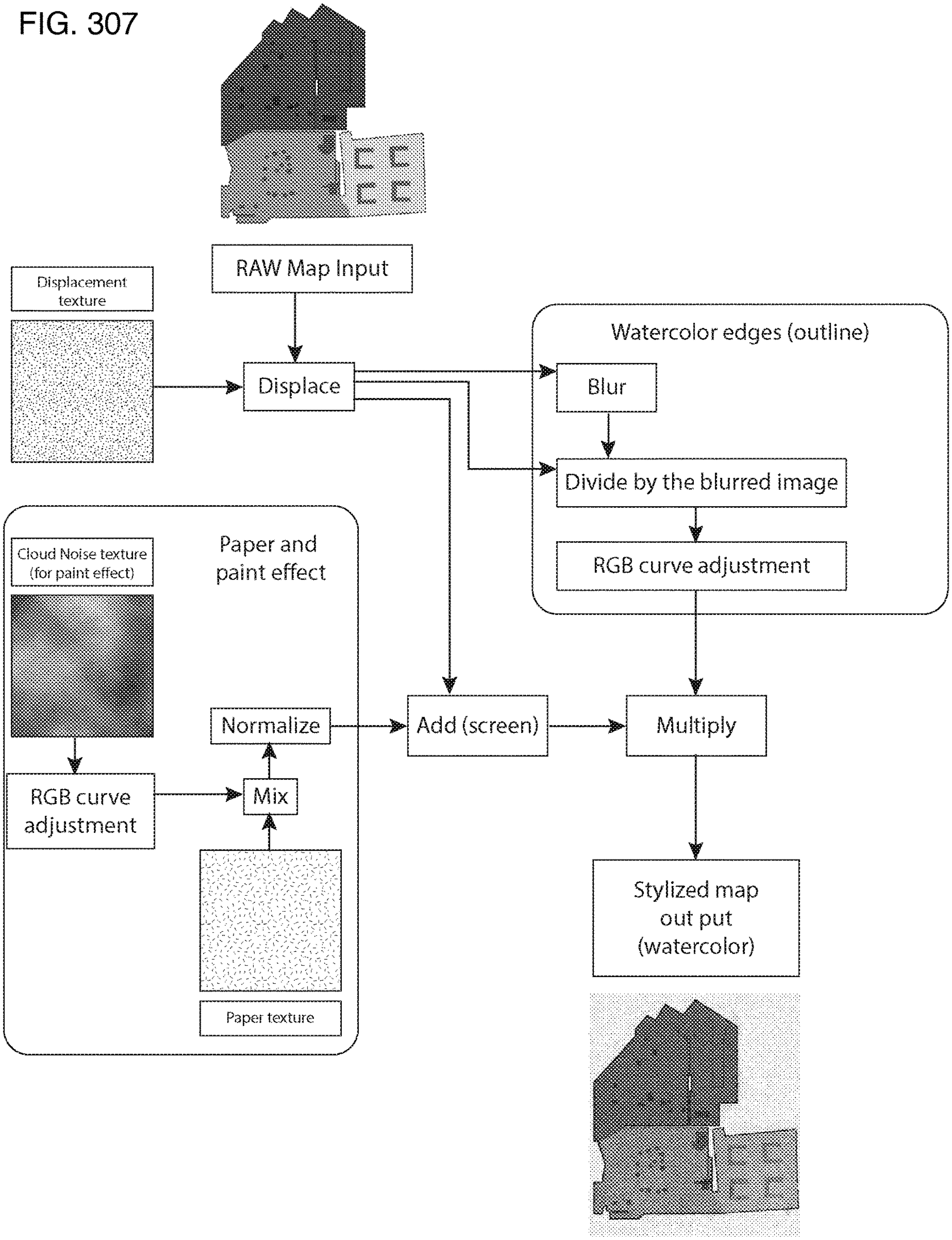

FIG. 307 illustrates an example of a process for generating a watercolor style for a map.

Figure 308:
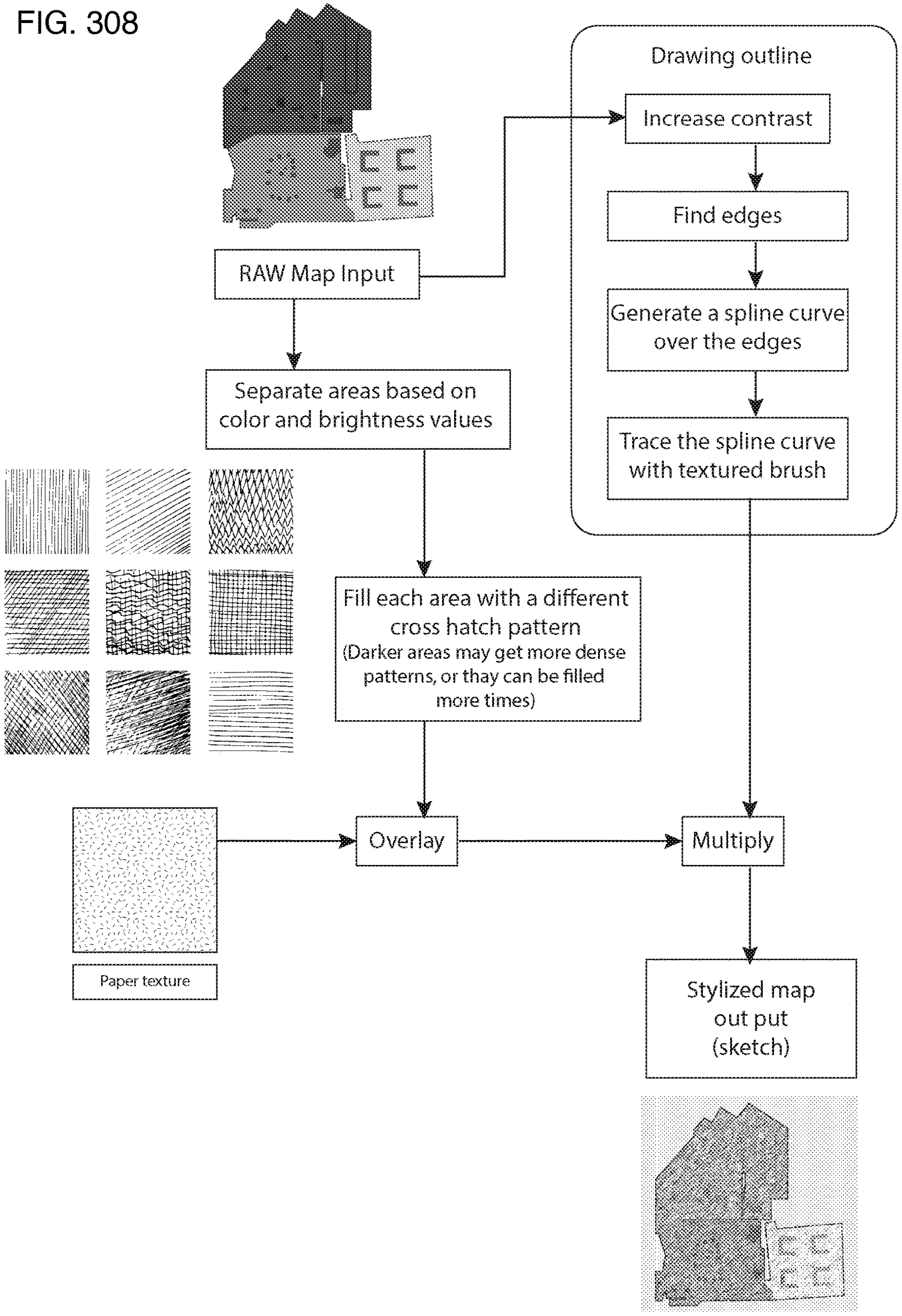

FIG. 308 illustrates an example of a process for generating a sketch style for a map.

Figure 309:
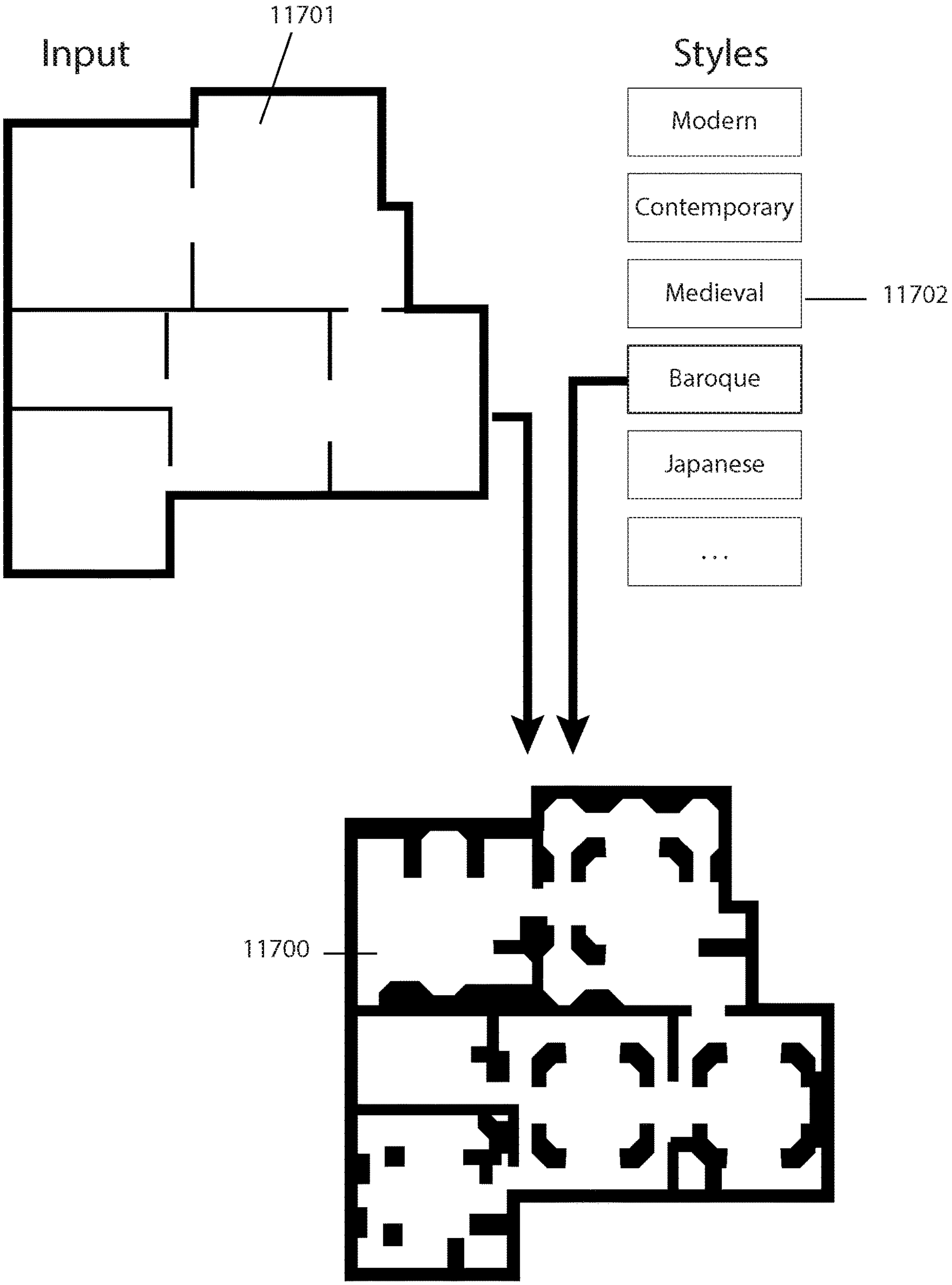
Figure 310:
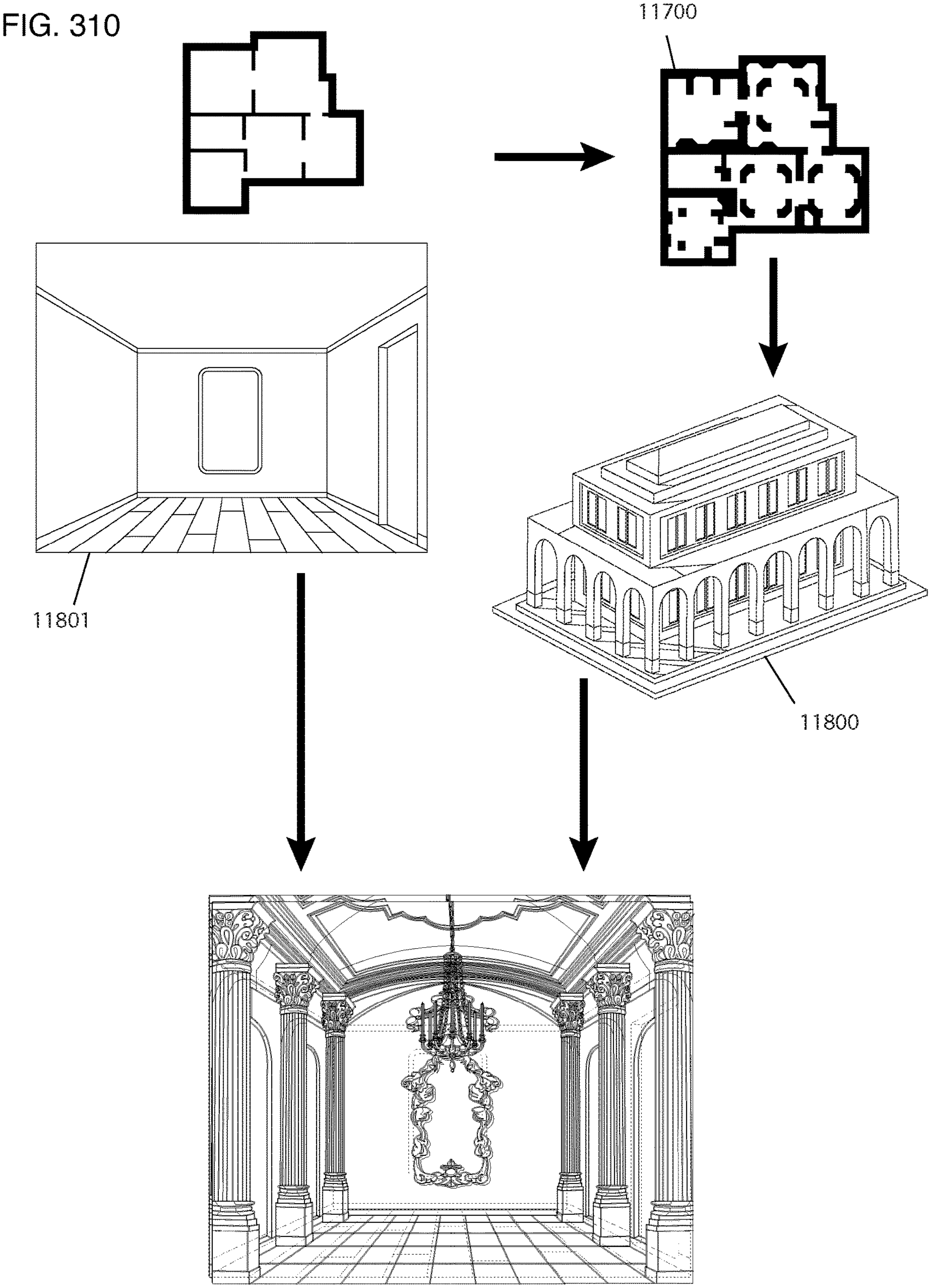

FIGS. 309 and 310 illustrate an example of a new floorplan generated based on an original floorplan and an architectural style and generating a new 3D map from the newly generated map.

Figure 311:
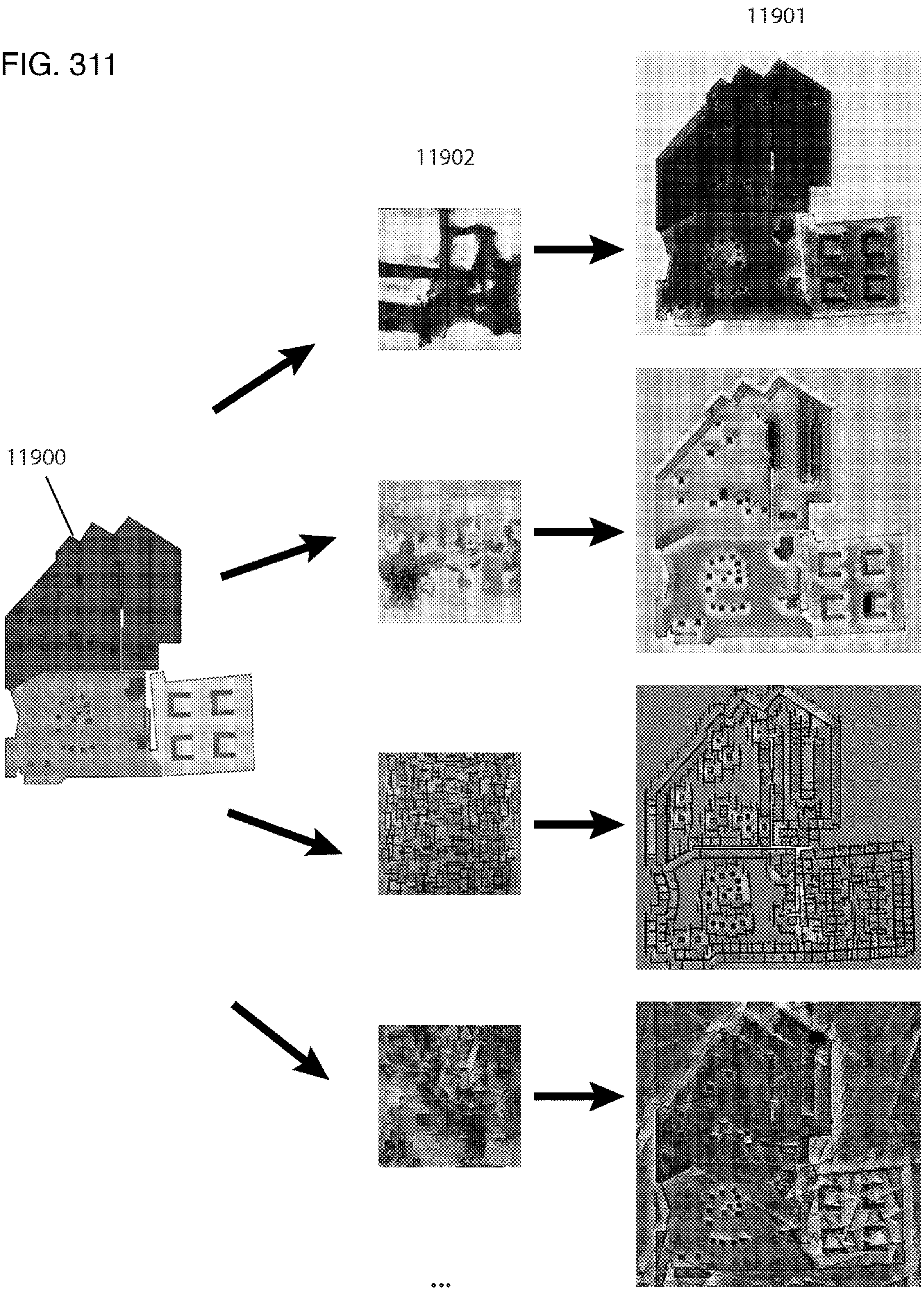

FIG. 311 illustrates examples of abstract arts generated based on a map and a secondary image or style.

Figure 312:
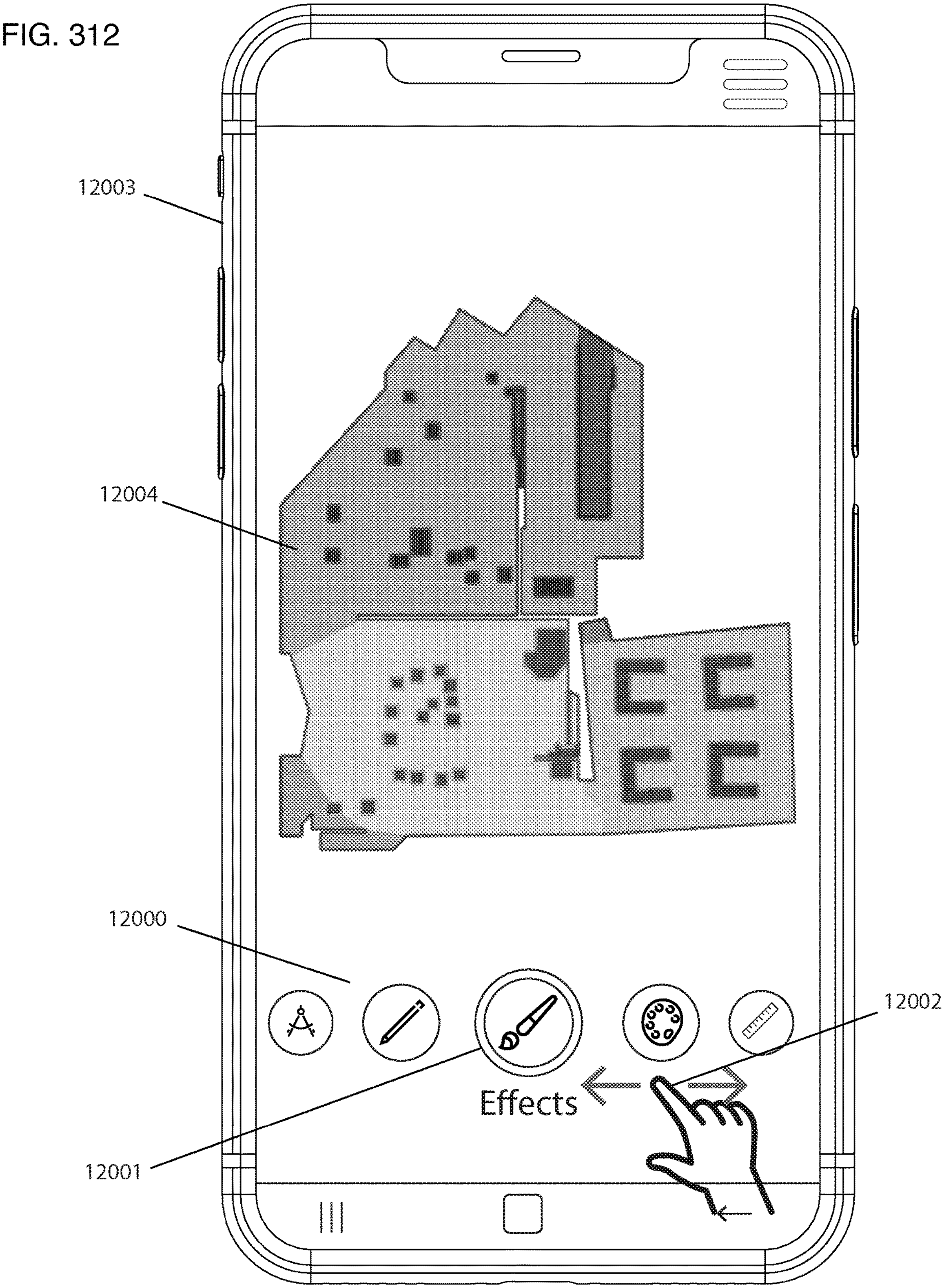

FIG. 312 illustrates an example of a user interface of an application from which effects and styles are selected.

Figure 313:
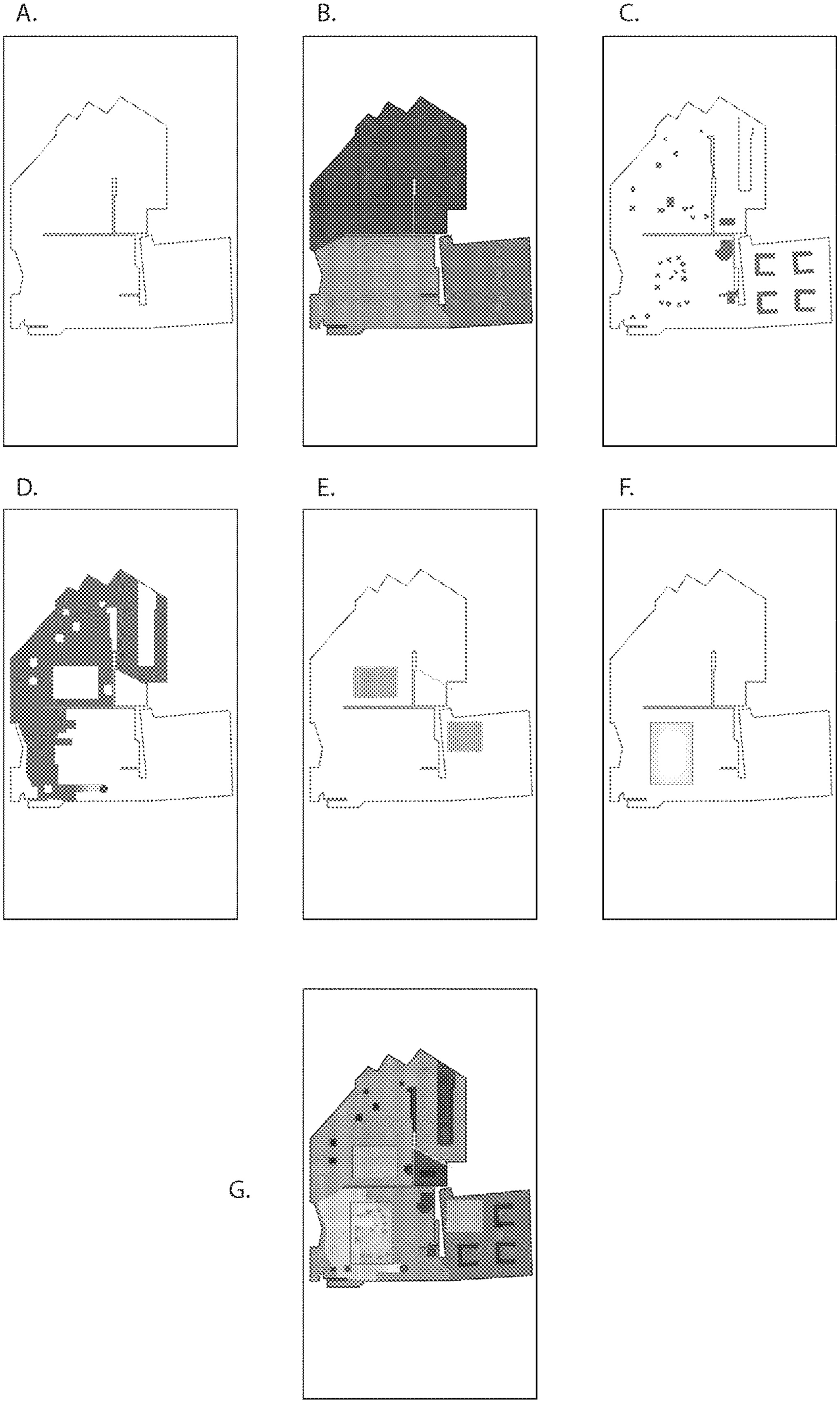

FIG. 313 illustrates examples of layers.

FIGS. 314-317 illustrate examples of a user interface of an application used to select layers.

Figure 318:
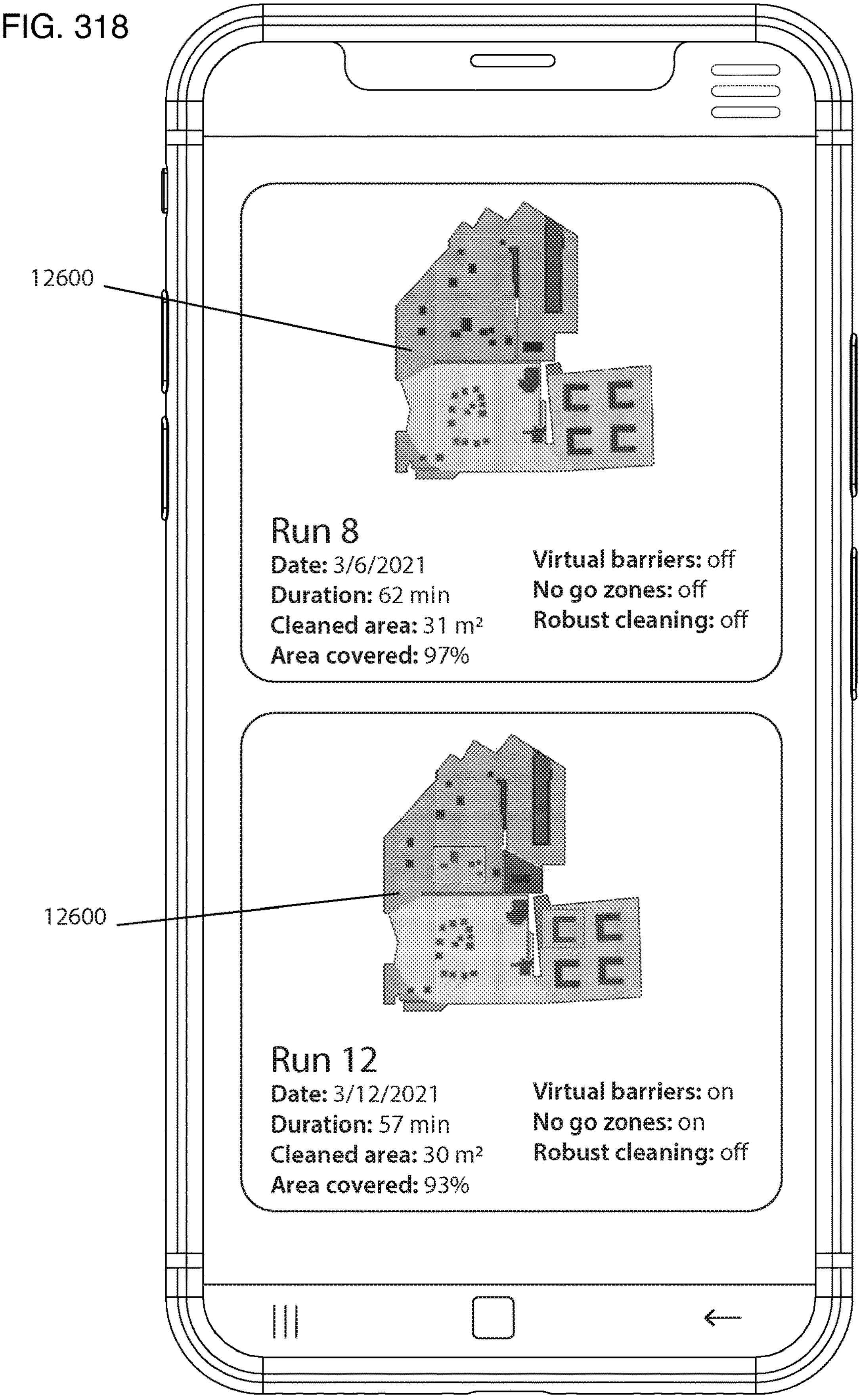

FIG. 318 illustrates an example of a user interface of an application displaying a comparison of runs.

Figure 319:
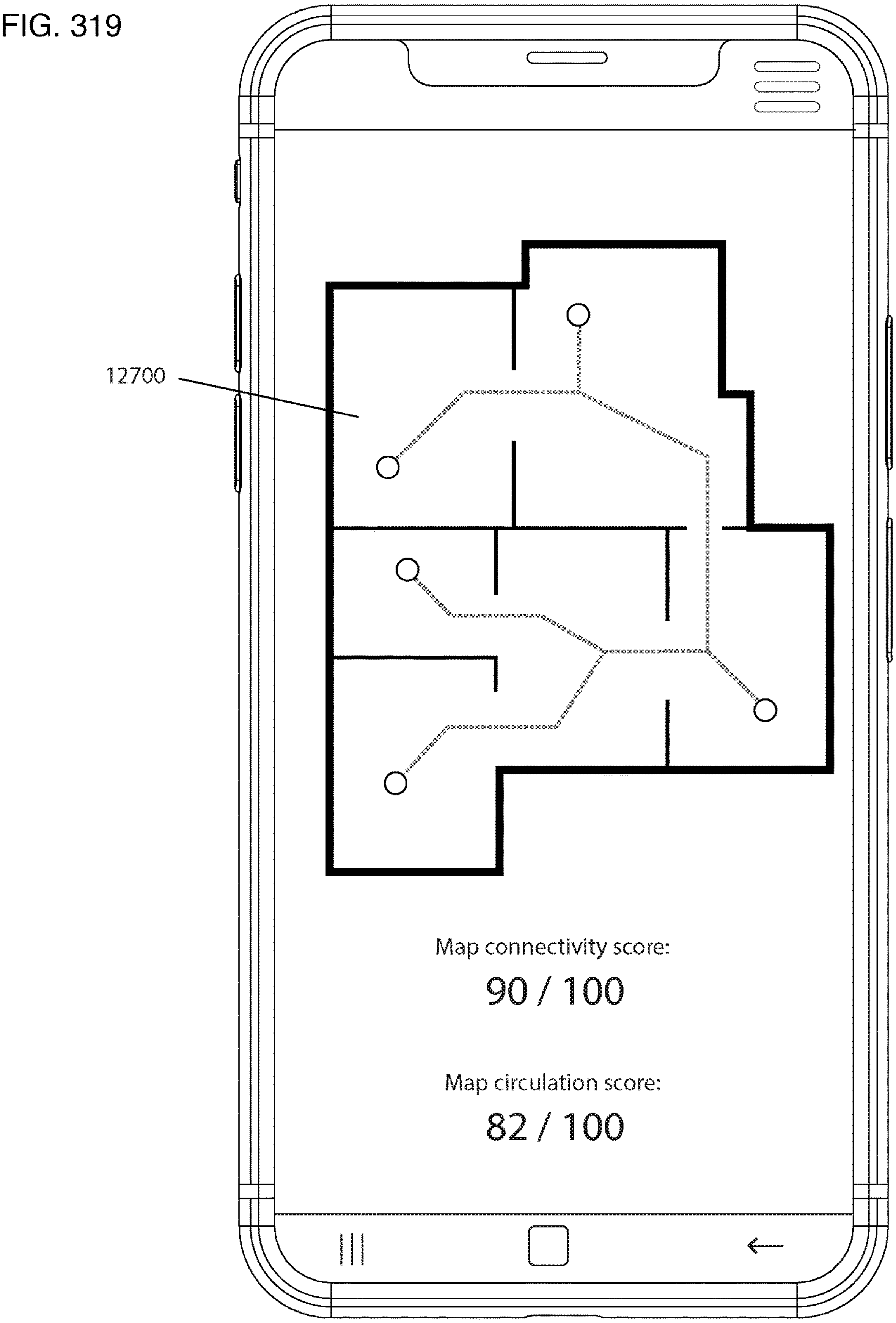

FIG. 319 illustrates an example of a user interface of an application displaying a map score based on connectivity and circulation.

FIGS. 320-324 illustrate examples of adjusting and reallocating room division of a map in real time and using an application.

Figure 325:
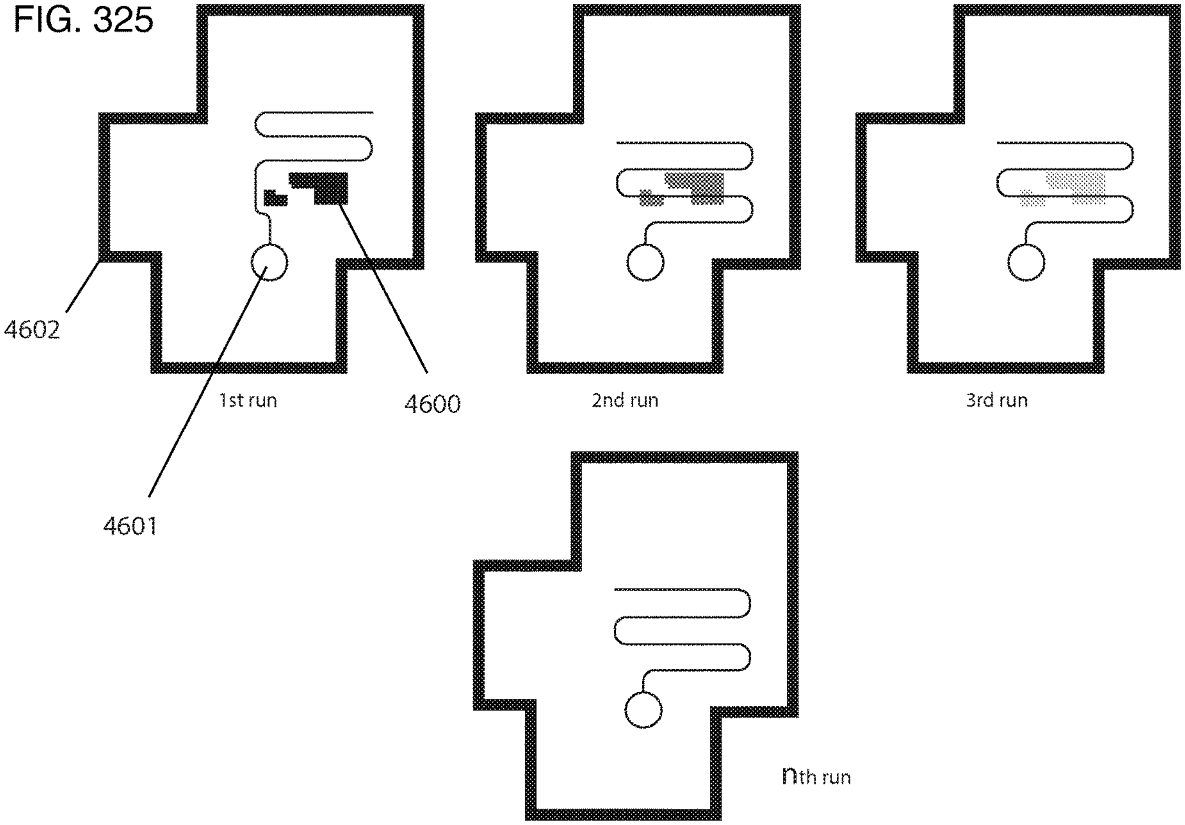

FIG. 325 illustrates an example relating to dynamic obstacles in a map.

Figure 326:
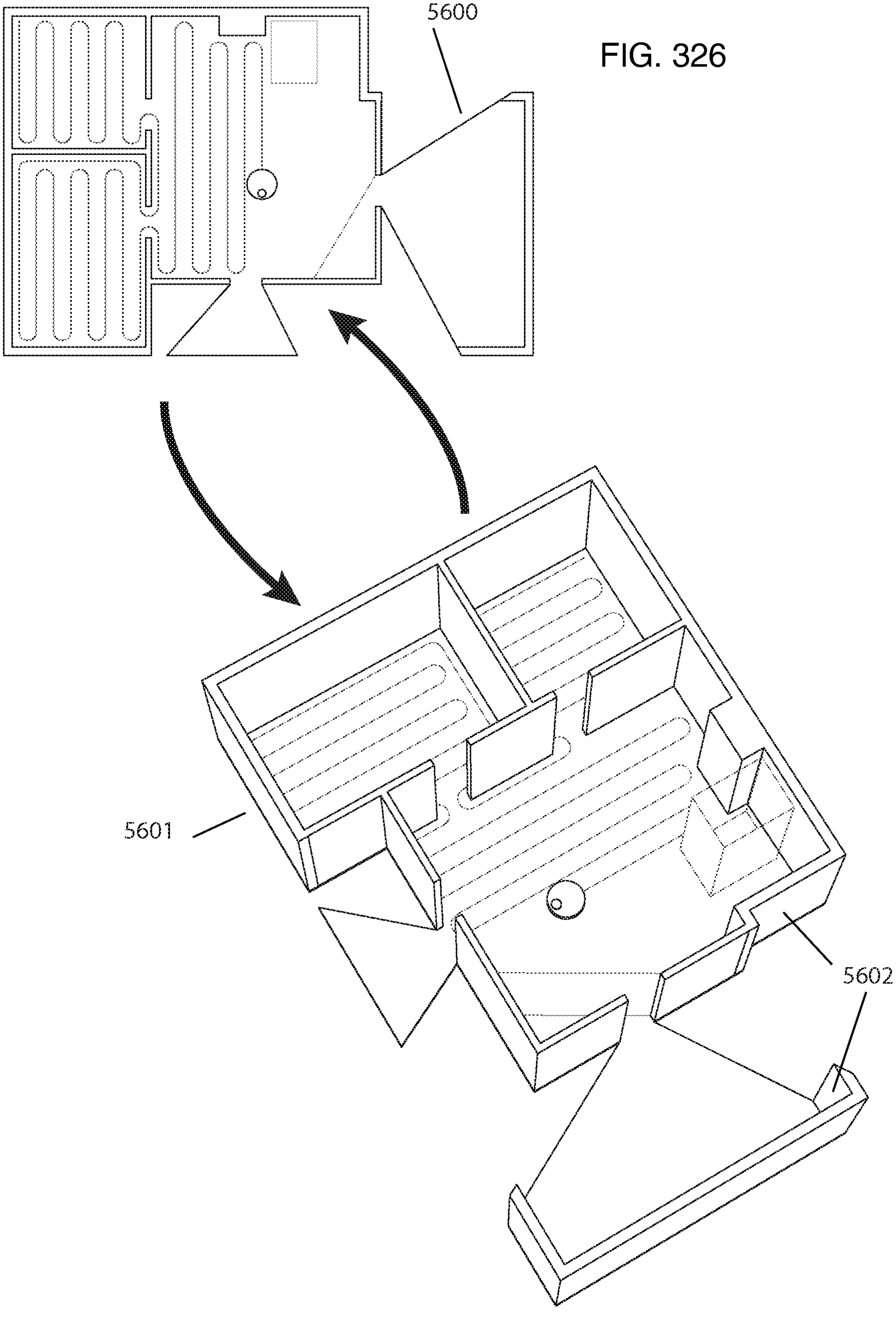

FIG. 326 illustrates an example of a conversion of a partial 2D map into a 3D map.

FIGS. 327-330 illustrate examples of modifications and elements added to a map.

Figure 331:
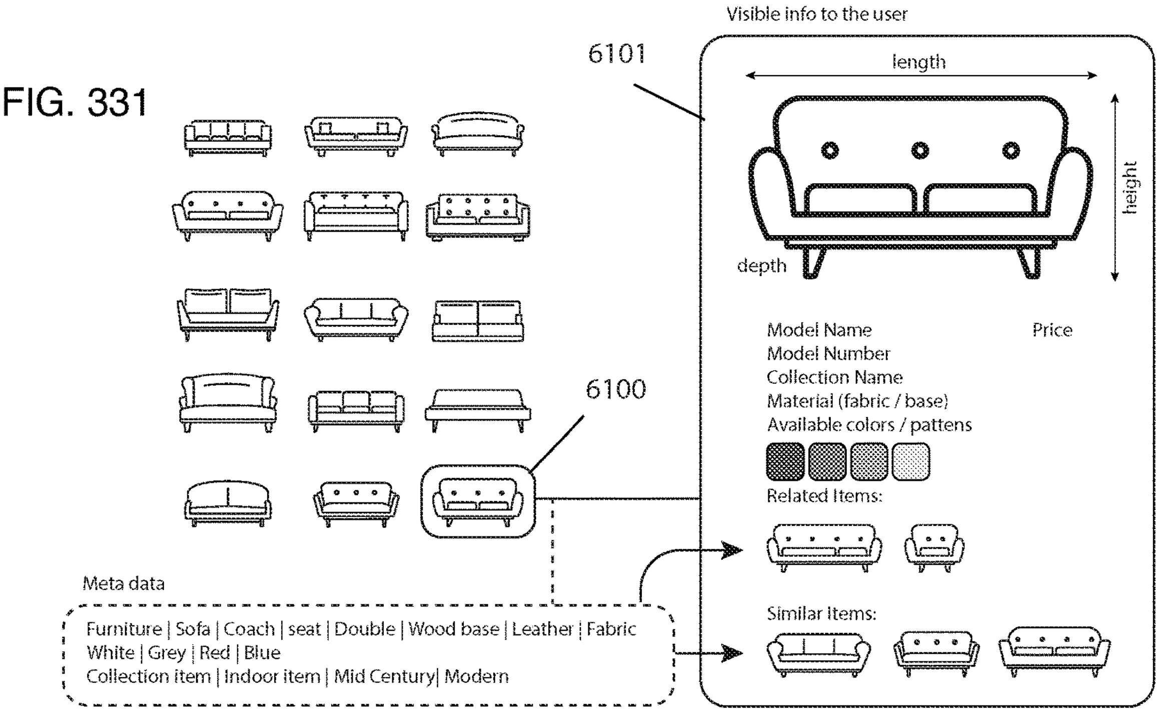

FIG. 331 illustrates an example of an asset and related information.

Figure 332:
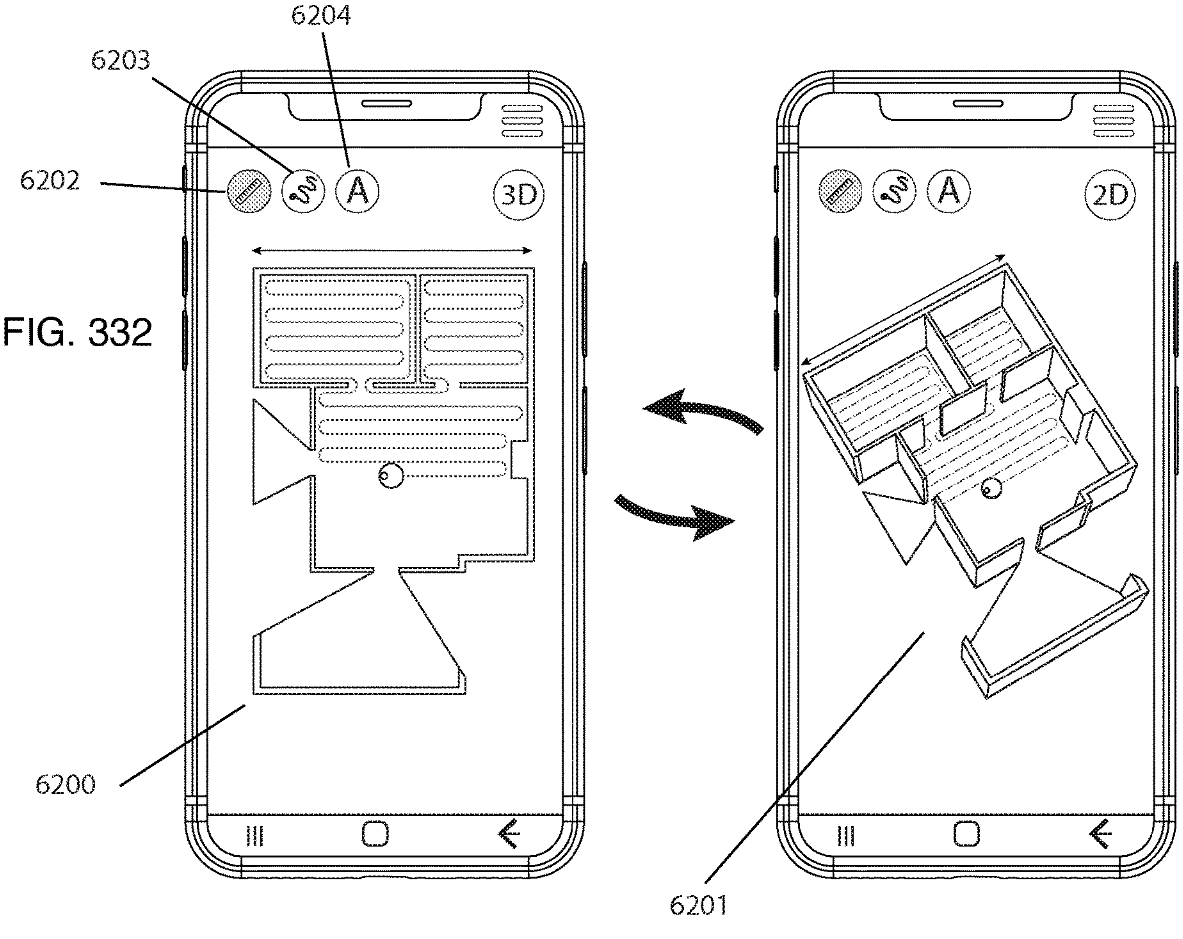
Figure 333:
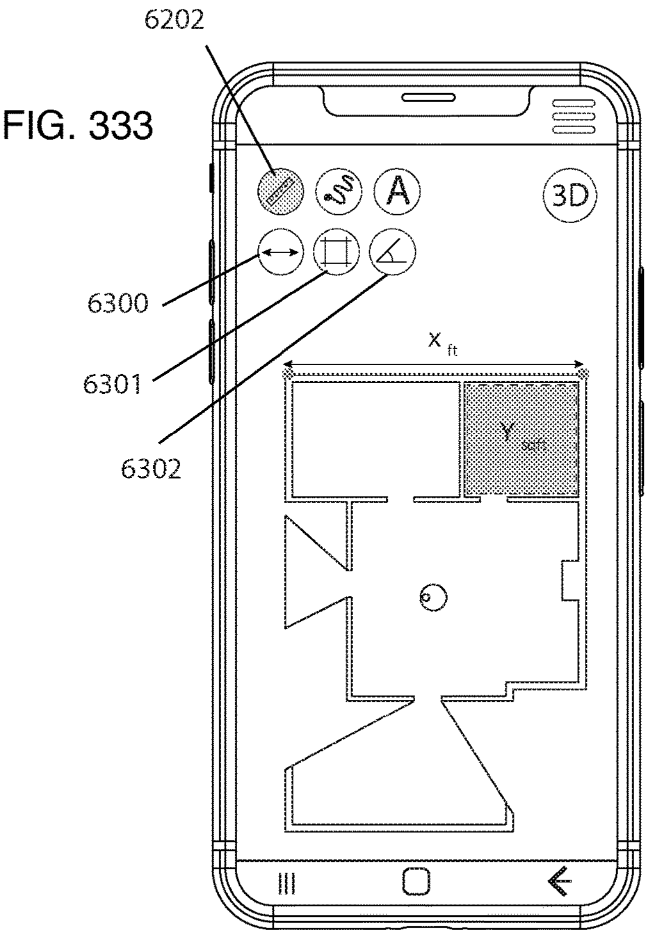
Figure 334:
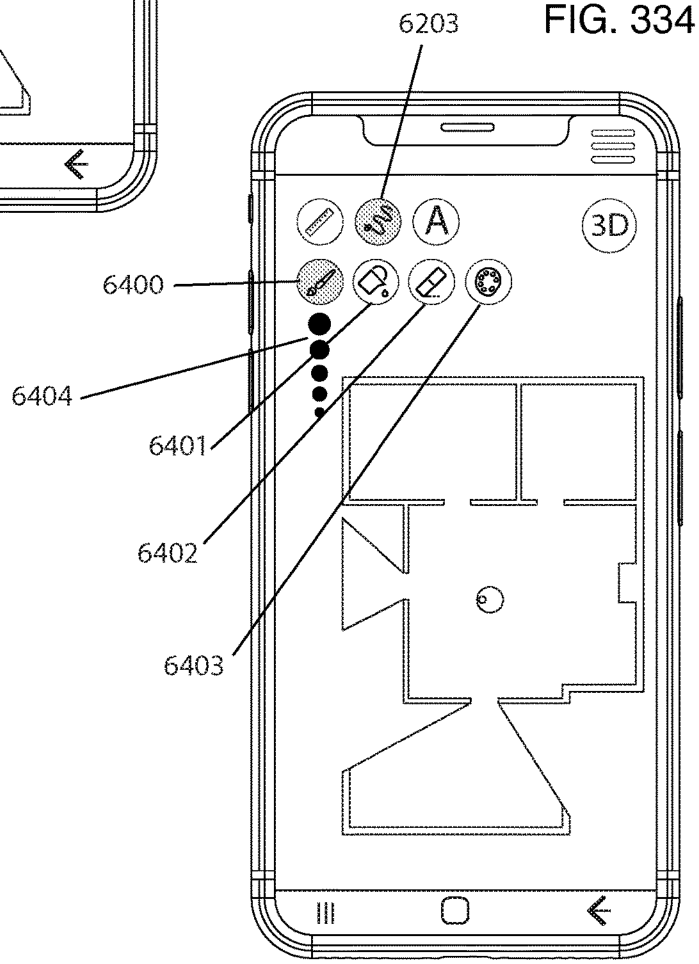

FIGS. 332-334 illustrate an example of toggling between 2D and 3D viewports and tools available in each of the viewports.

Figure 335:
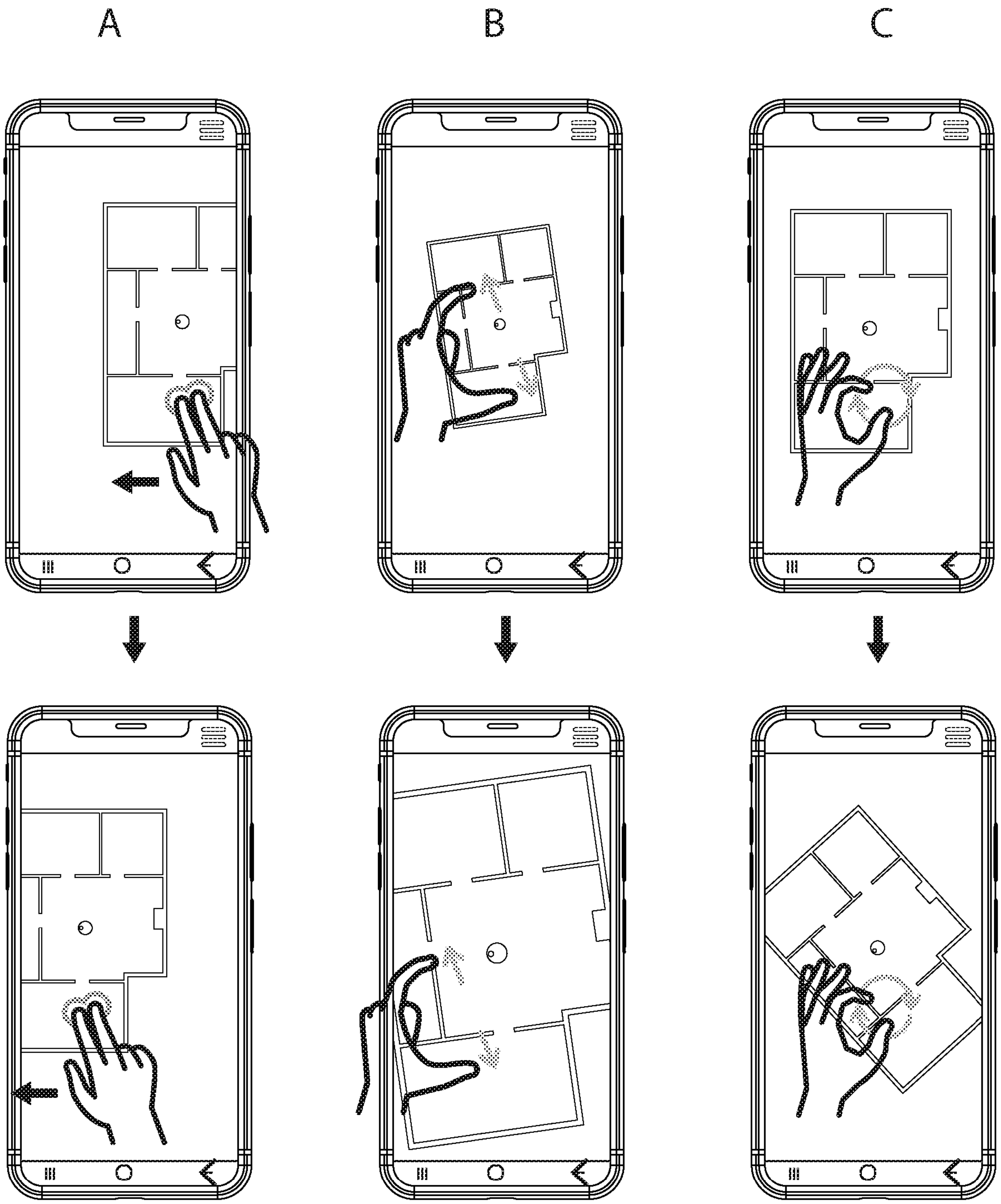
Figure 336:
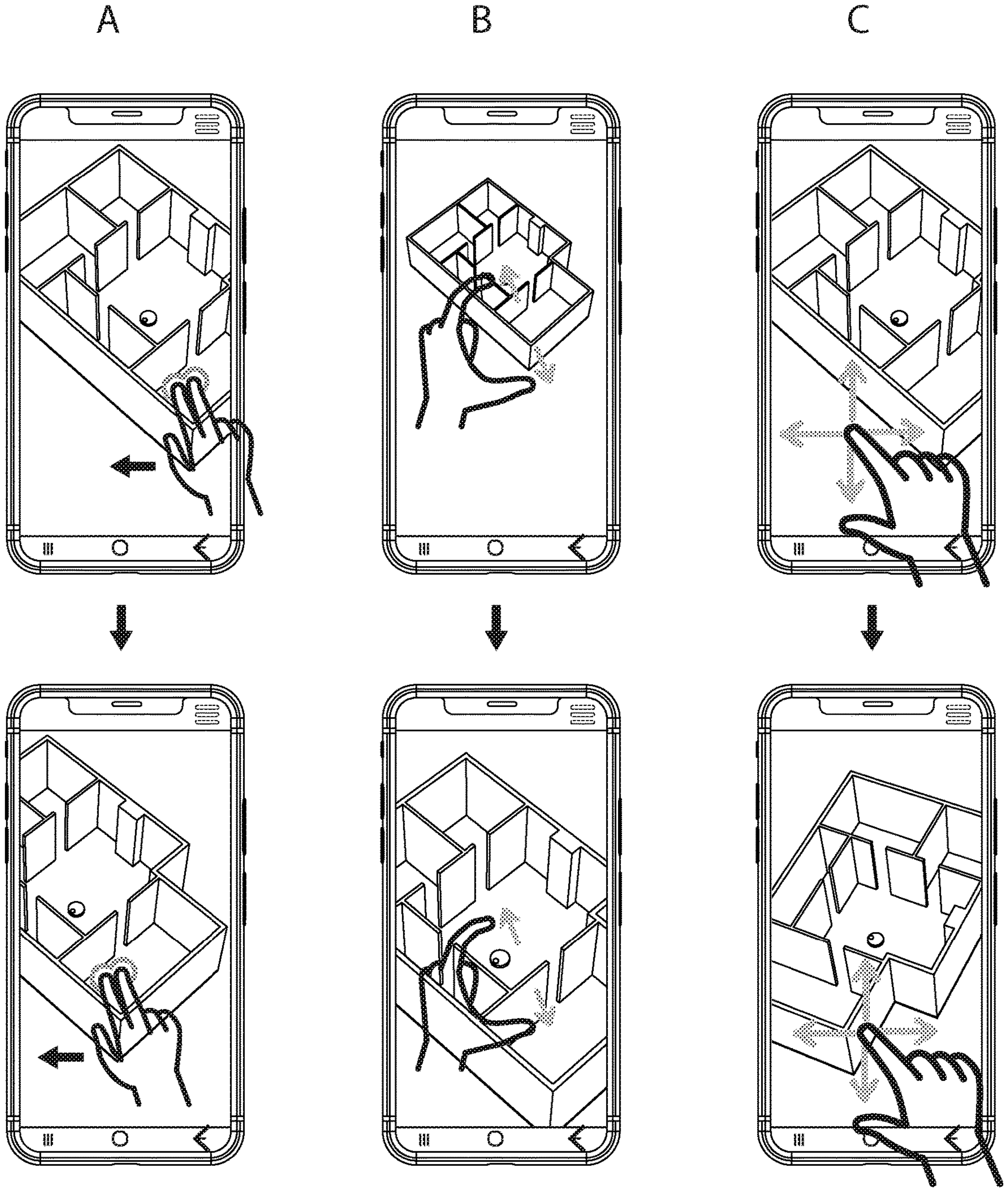
Figure 337:
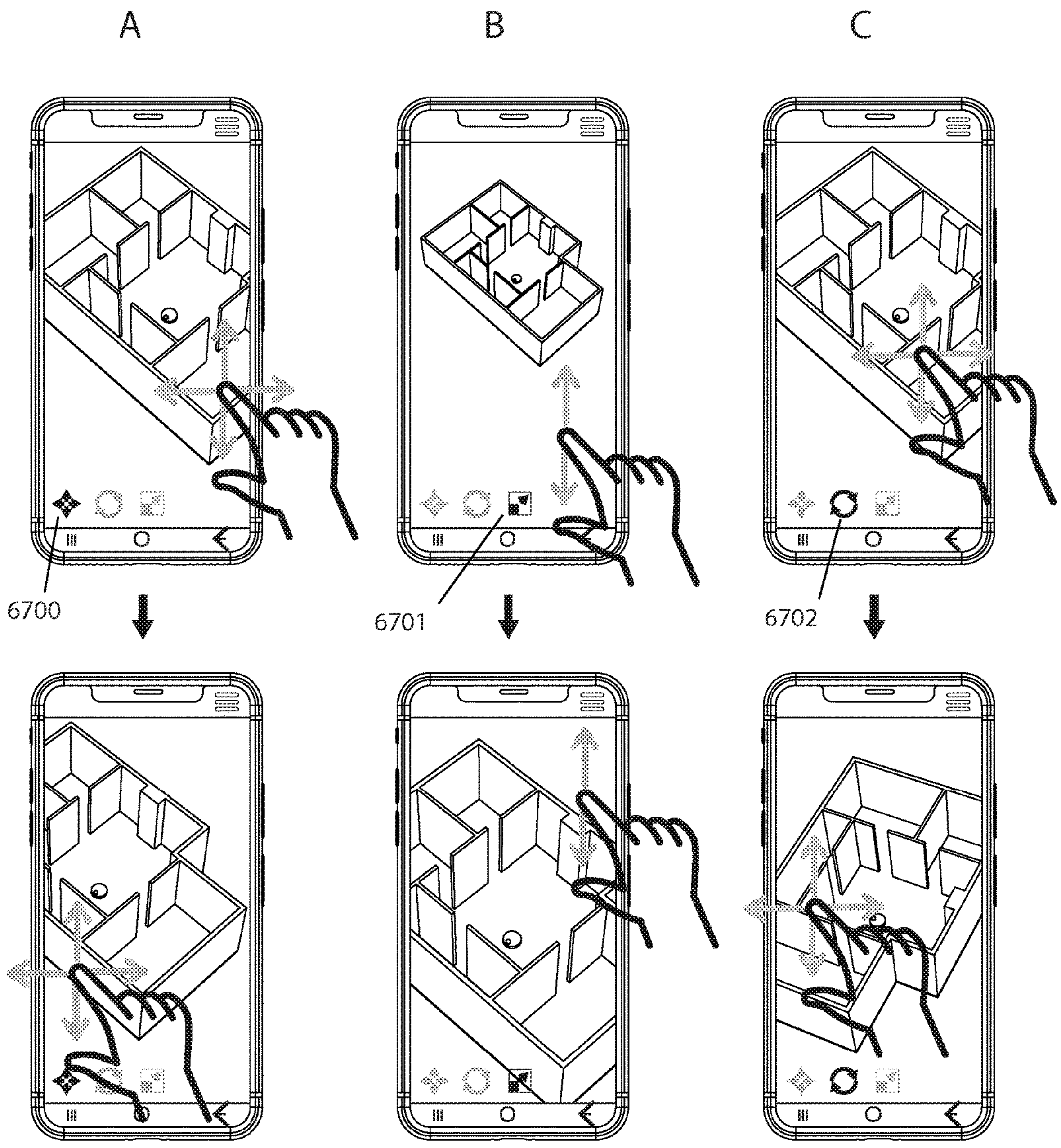

FIGS. 335-337 illustrate examples of navigation in 2D and 3D viewports.

Figure 338:
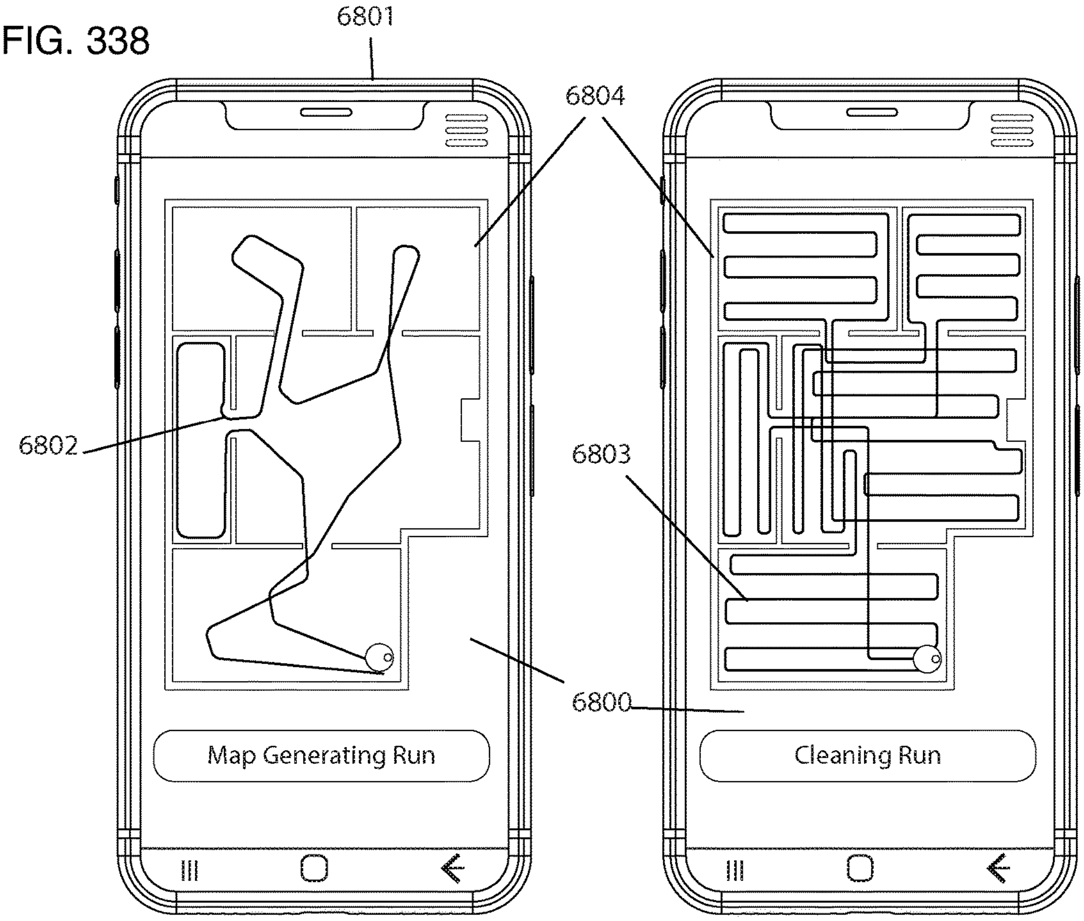

FIG. 338 illustrates an example of a difference between a map generating run and a work performing run.

Figure 339:
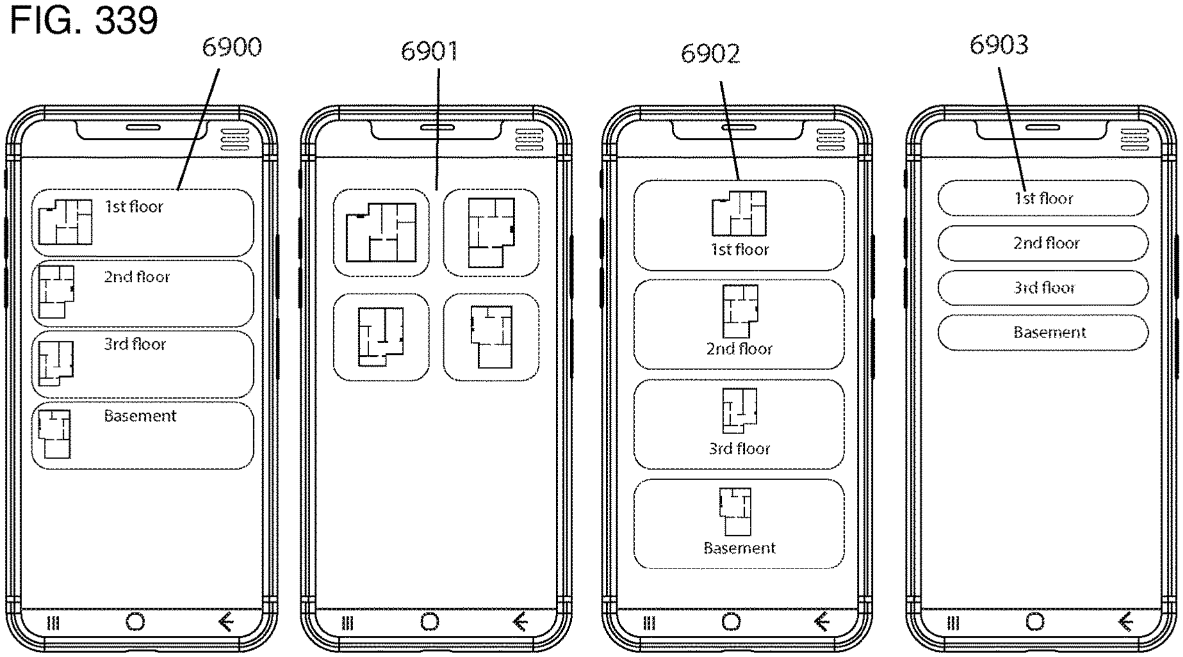
Figure 340:
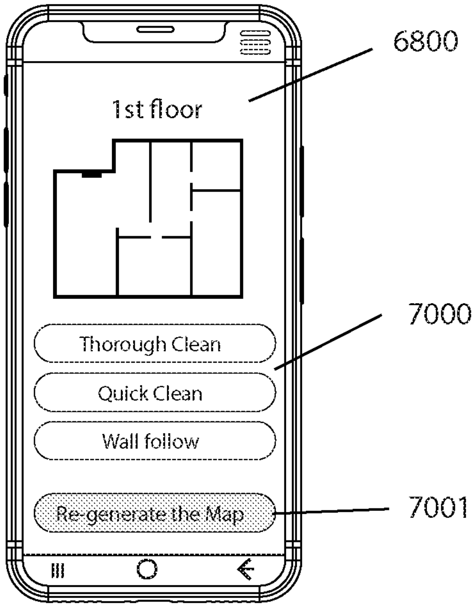

FIGS. 339 and 340 illustrate examples of user interfaces of an application displaying a map loading page.

Figure 341:
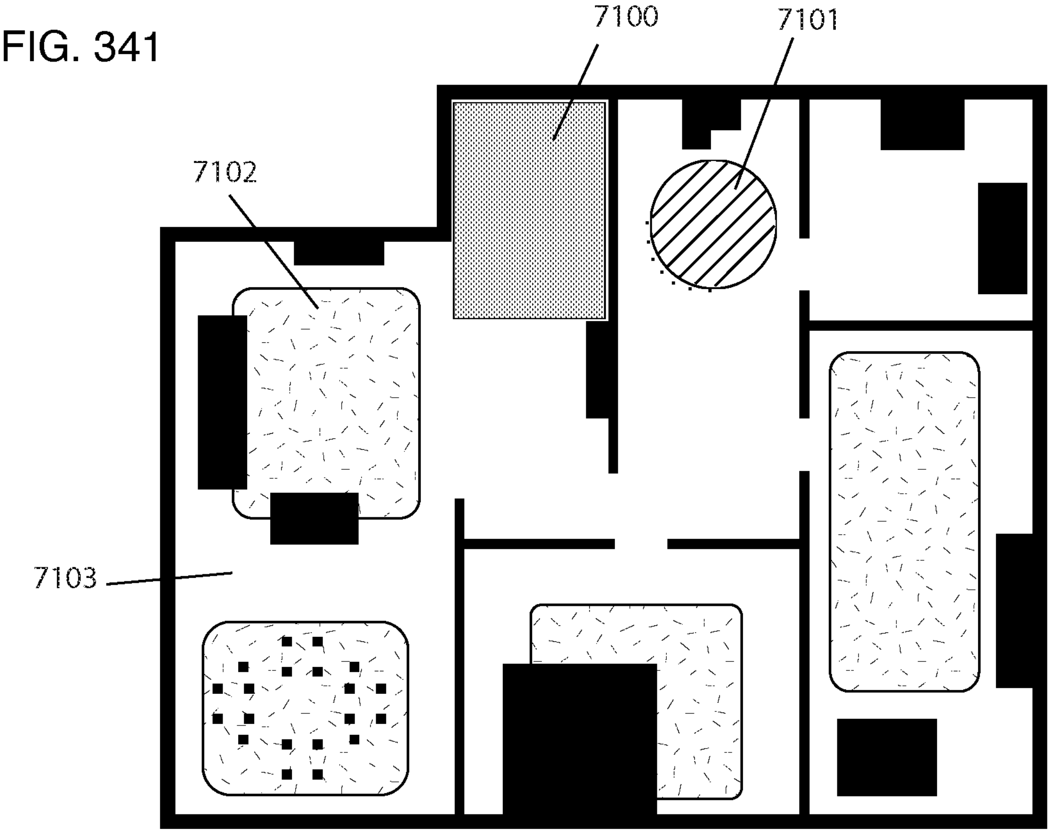

FIG. 341 illustrates variations on displaying floor types within a map.

Figure 342:
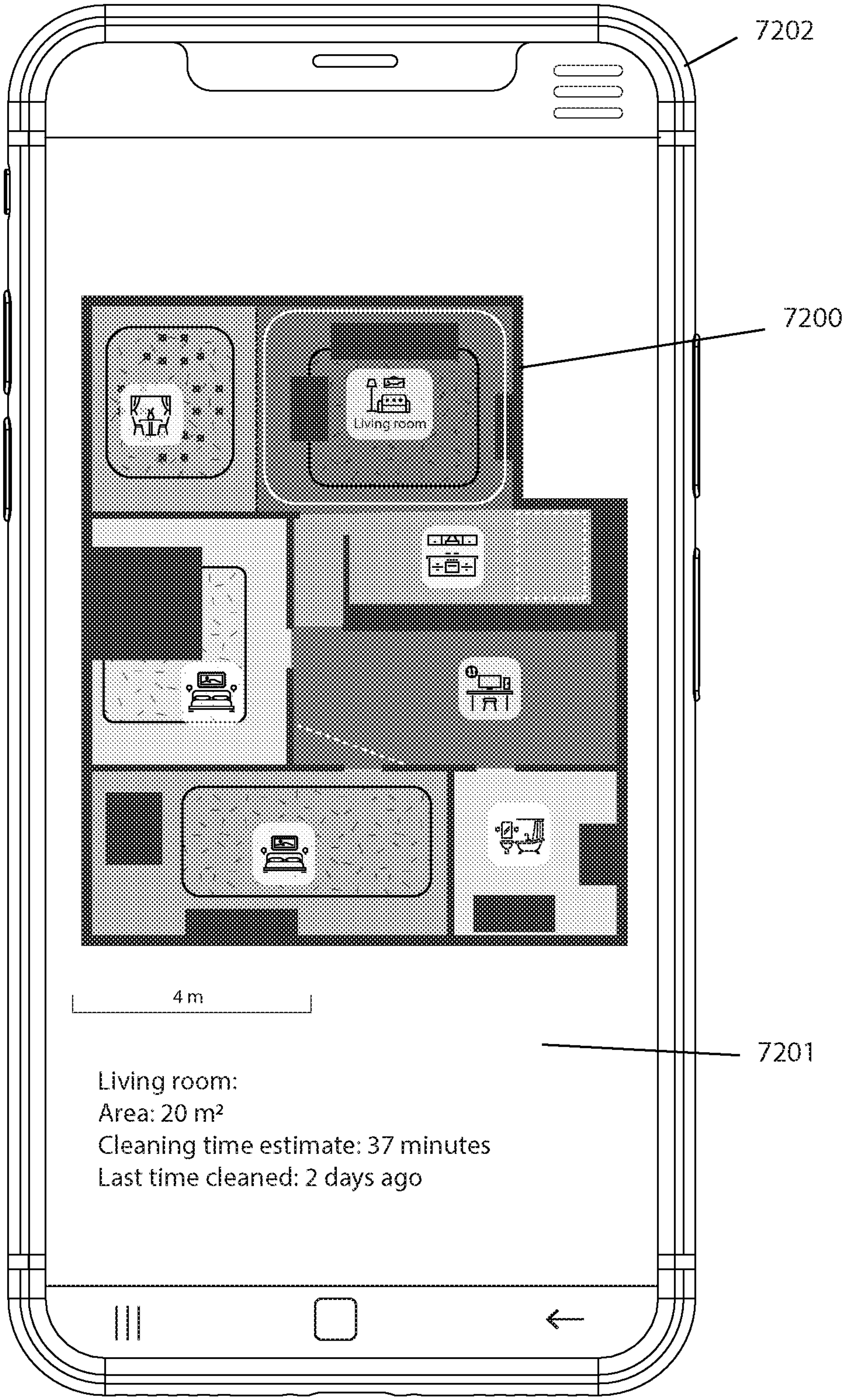

FIG. 342 illustrates examples of overlay elements in the map.

Figure 343:
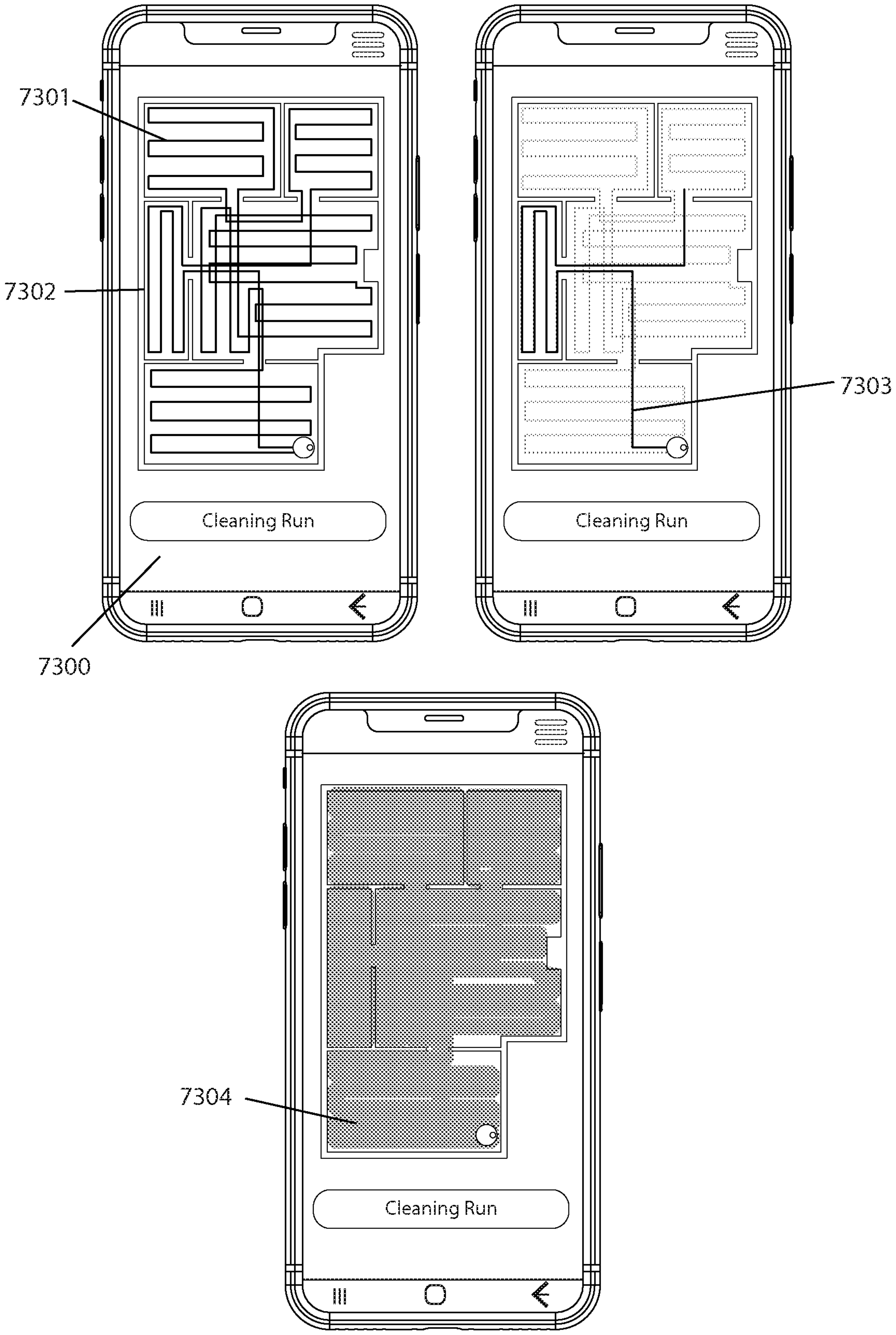

FIG. 343 illustrates variations on displaying a path of a robot within a map.

Figure 344:
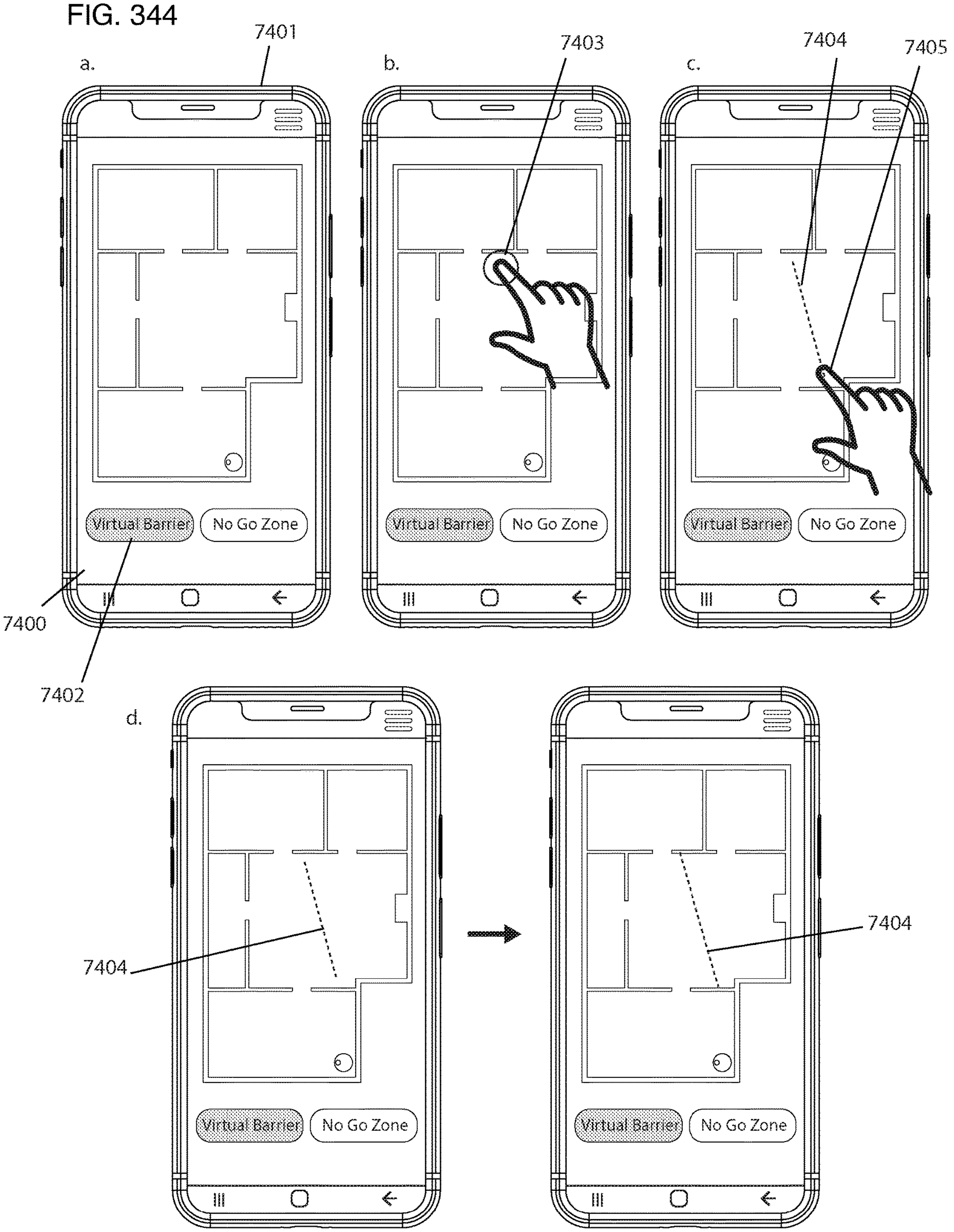
Figure 345:
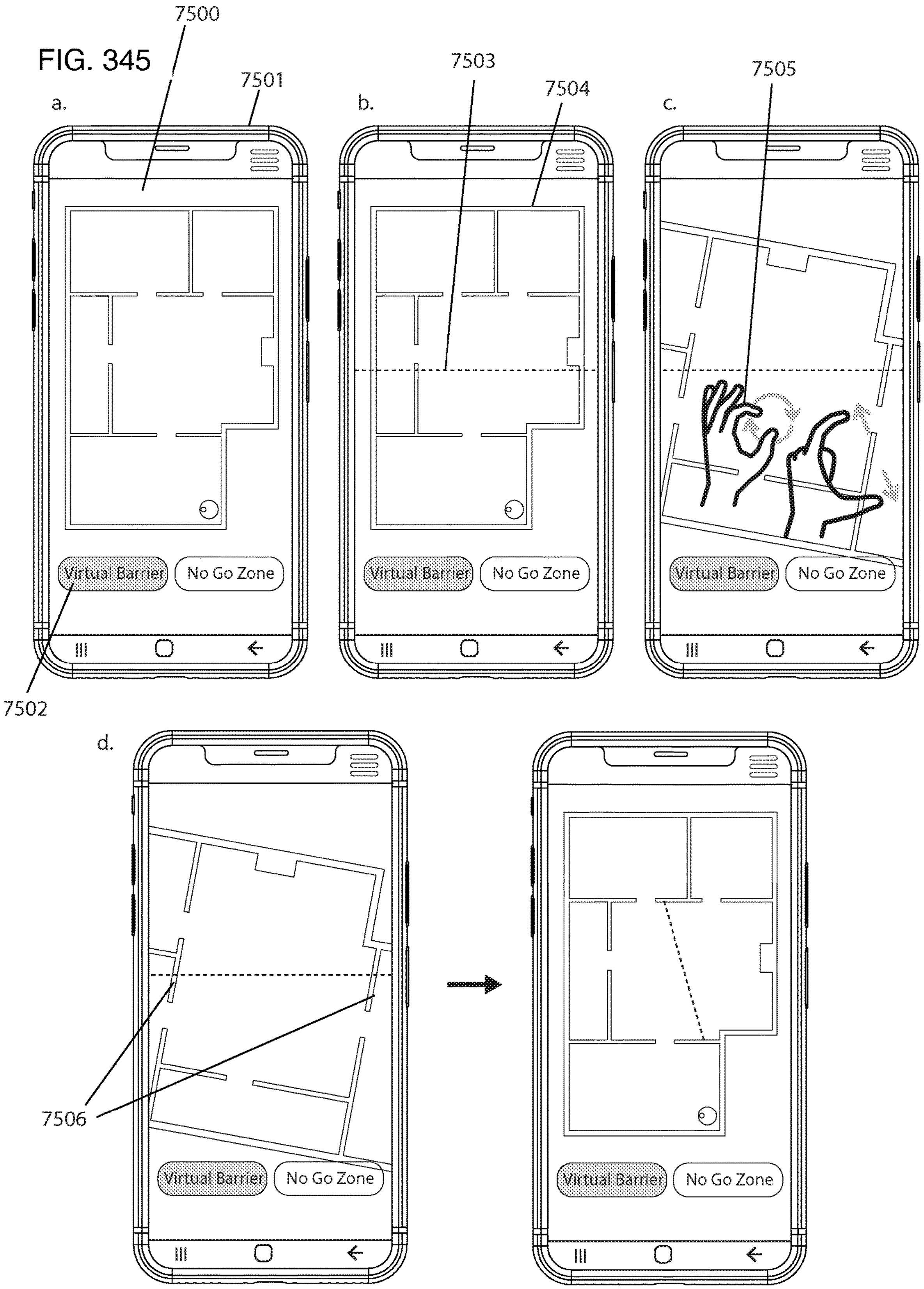
Figure 346:
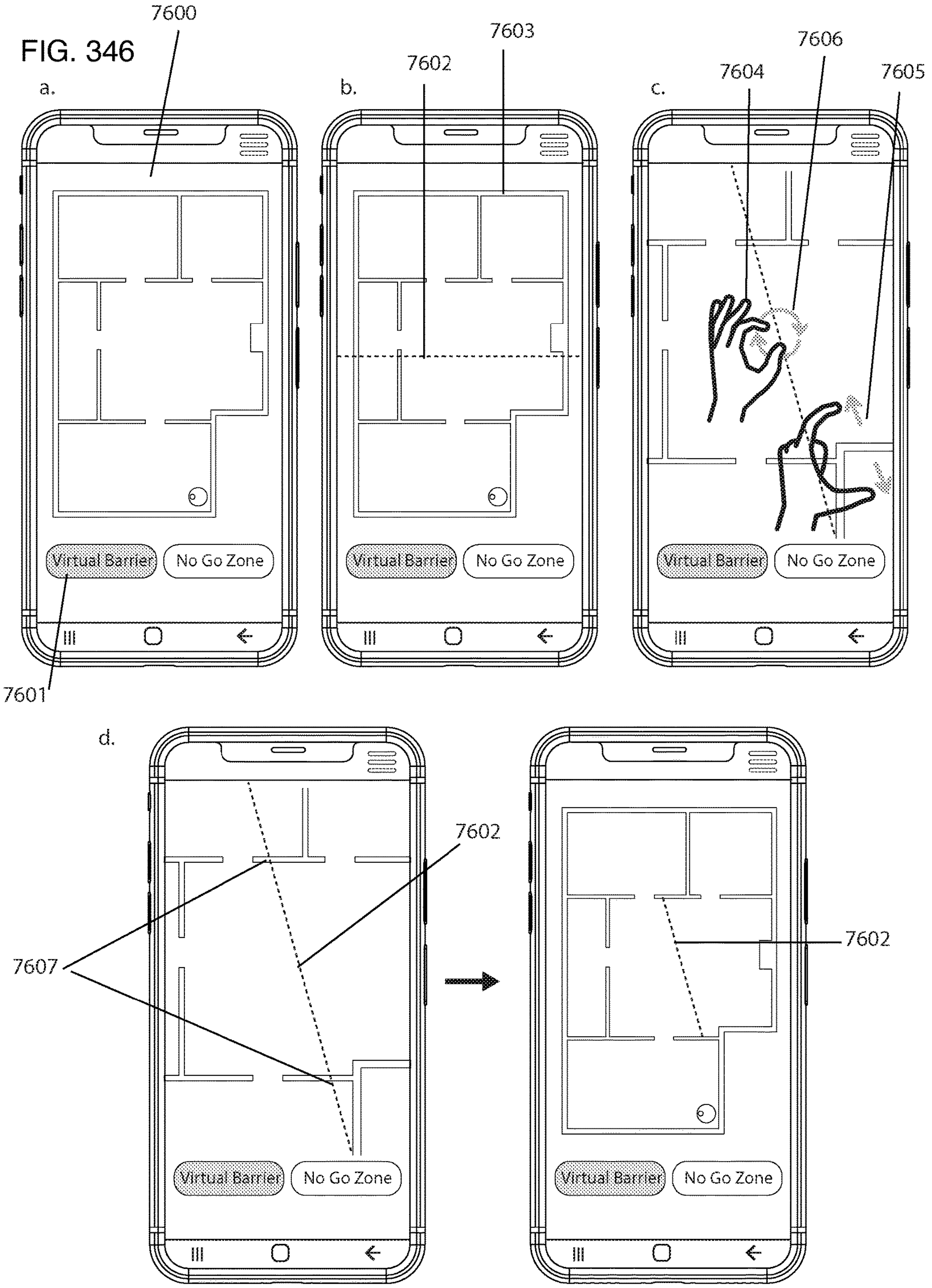

FIGS. 344-346 illustrate examples of methods for placing a virtual barrier within a map.

FIGS. 347-350 illustrate examples relating to manipulation of a location of an object in a map.

Figure 351:
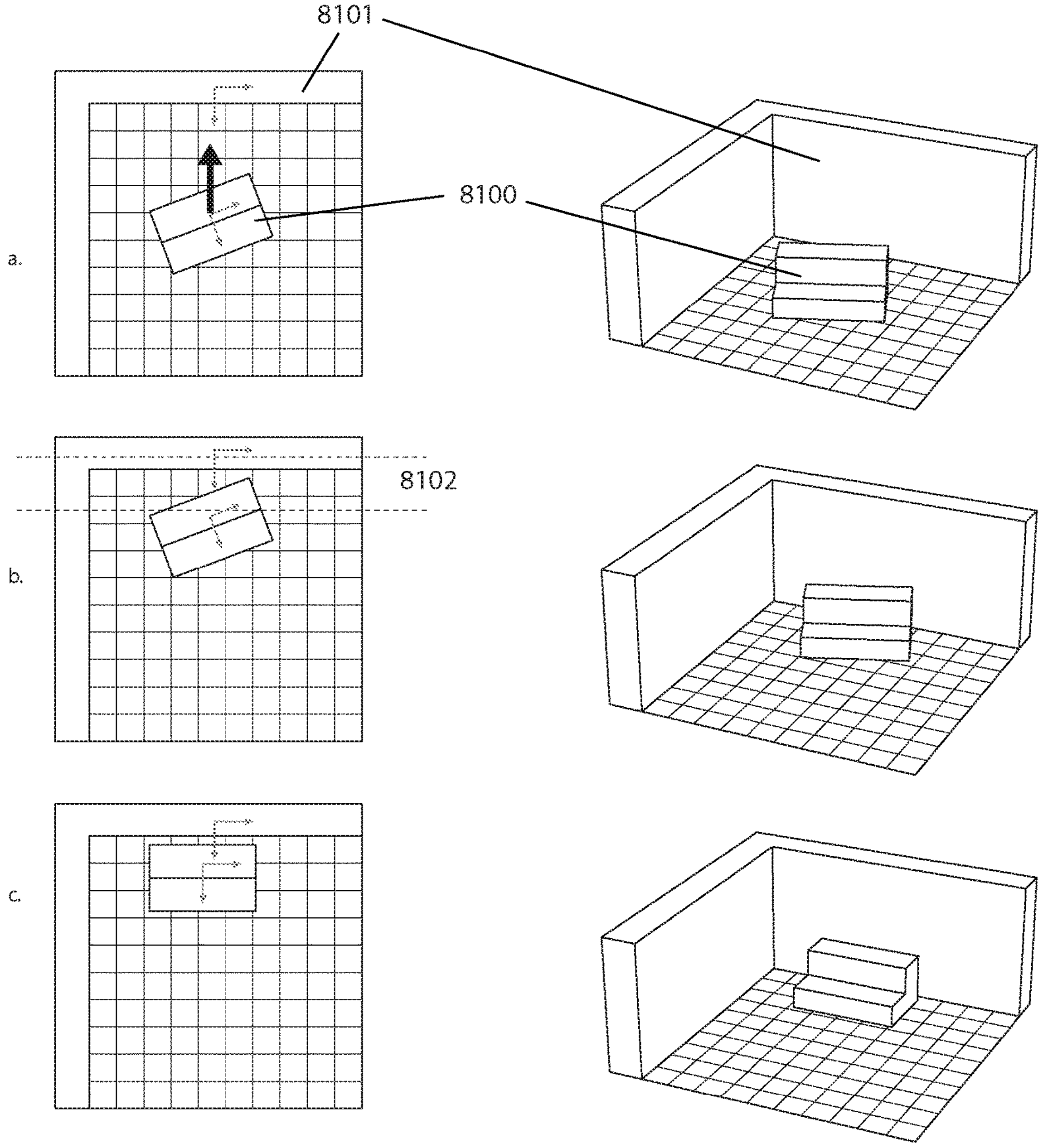
Figure 352:
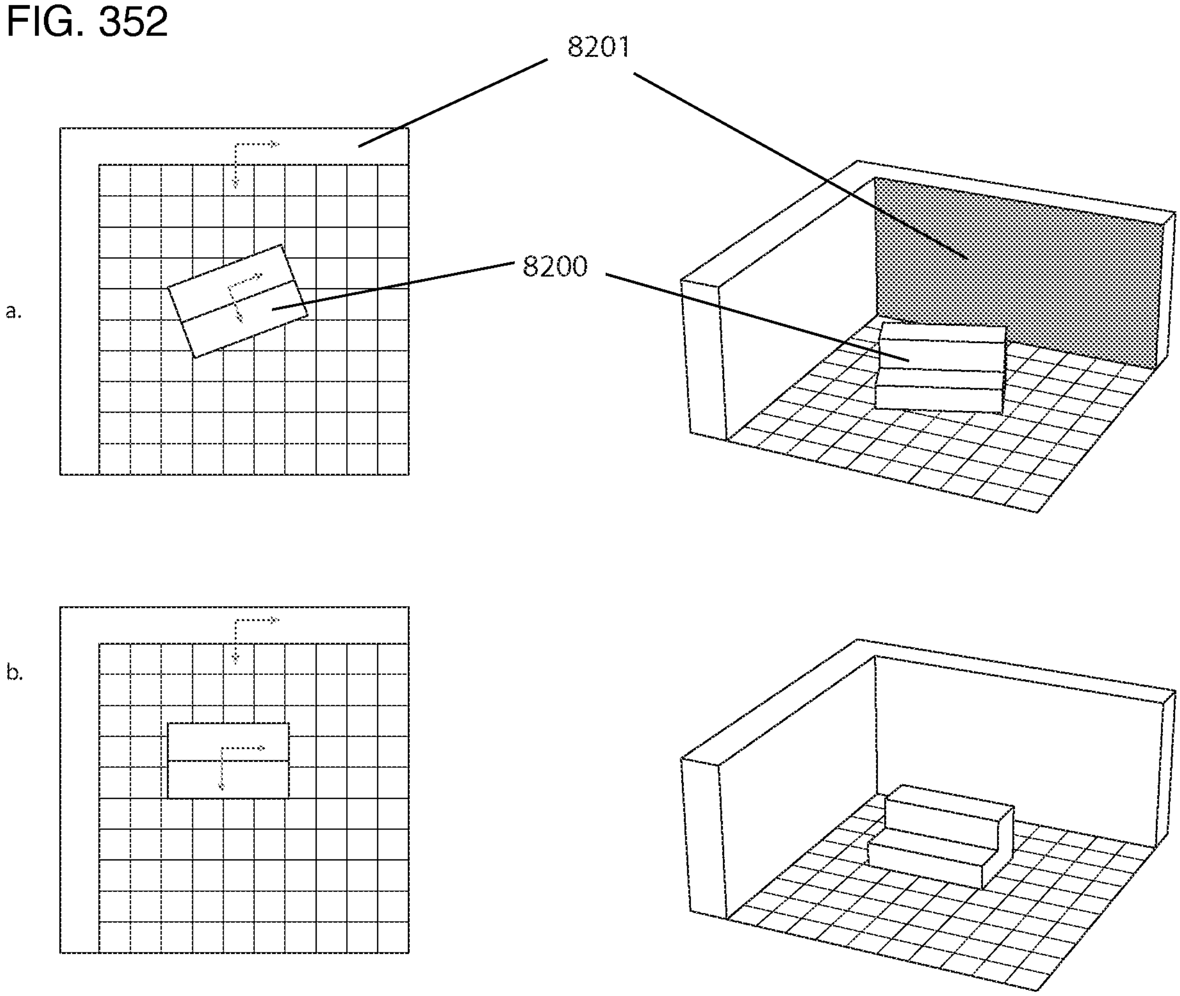

FIGS. 351 and 352 illustrate examples of alignment between two objects.

Figure 353:
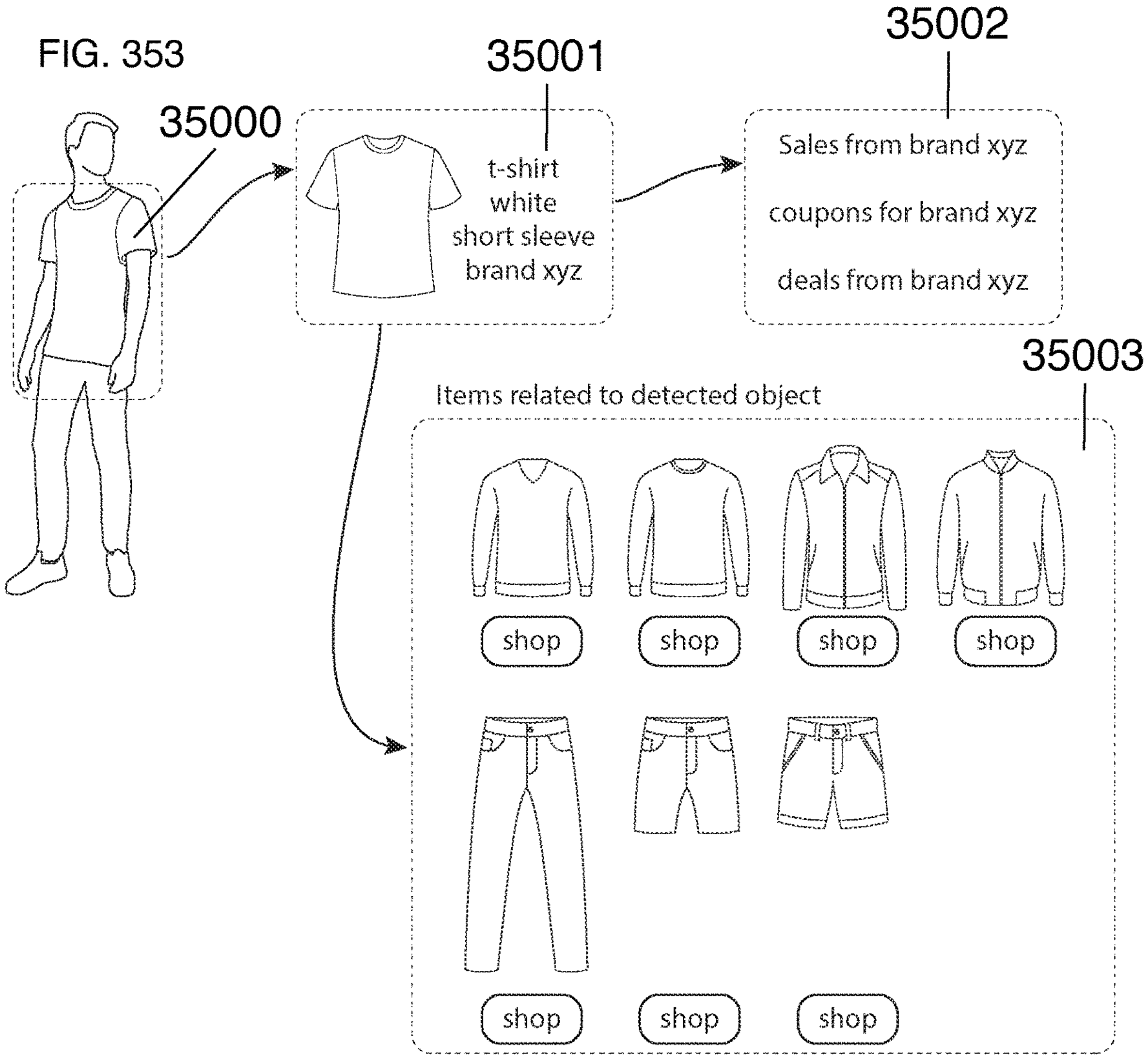

FIG. 353 illustrates a process of suggesting sales and coupons for clothing to a user based on extracted characteristics of a brand worn by the user.

Figure 354:
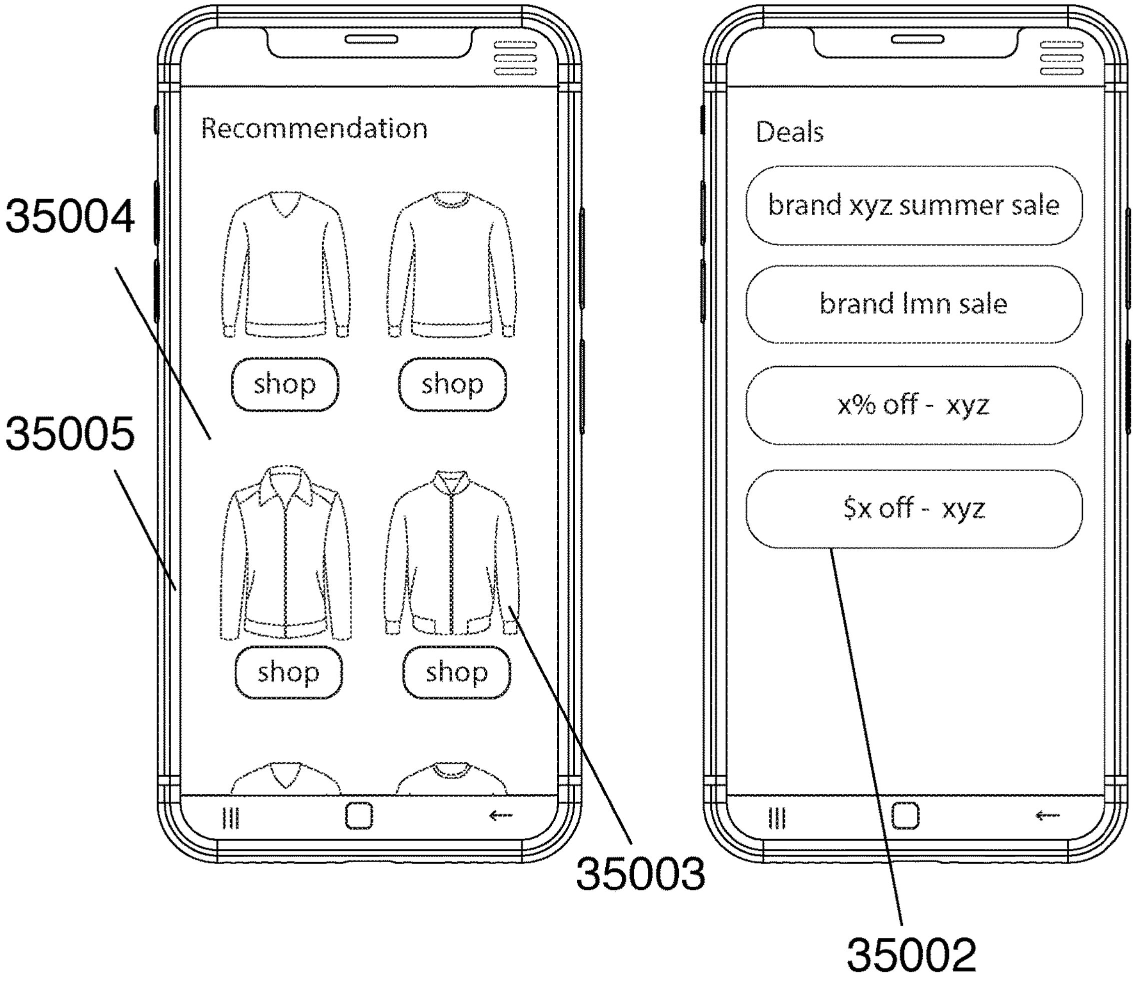
Figure 355:
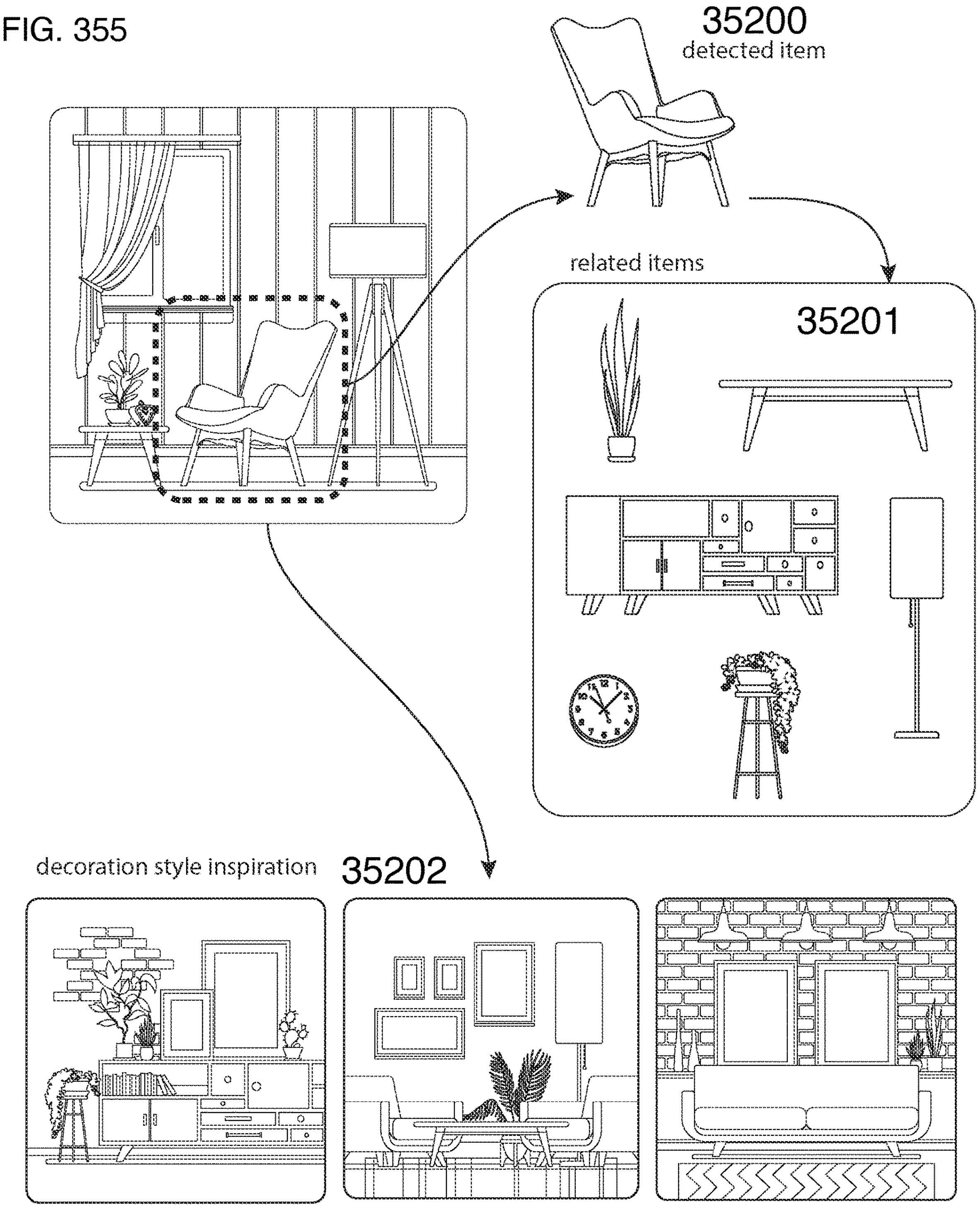

FIGS. 354 and 355 illustrate an application of a communication device displaying deals for items and items related to detected items used by a user.

FIG. 356 illustrates a metric for similarity distance.

Figure 357:
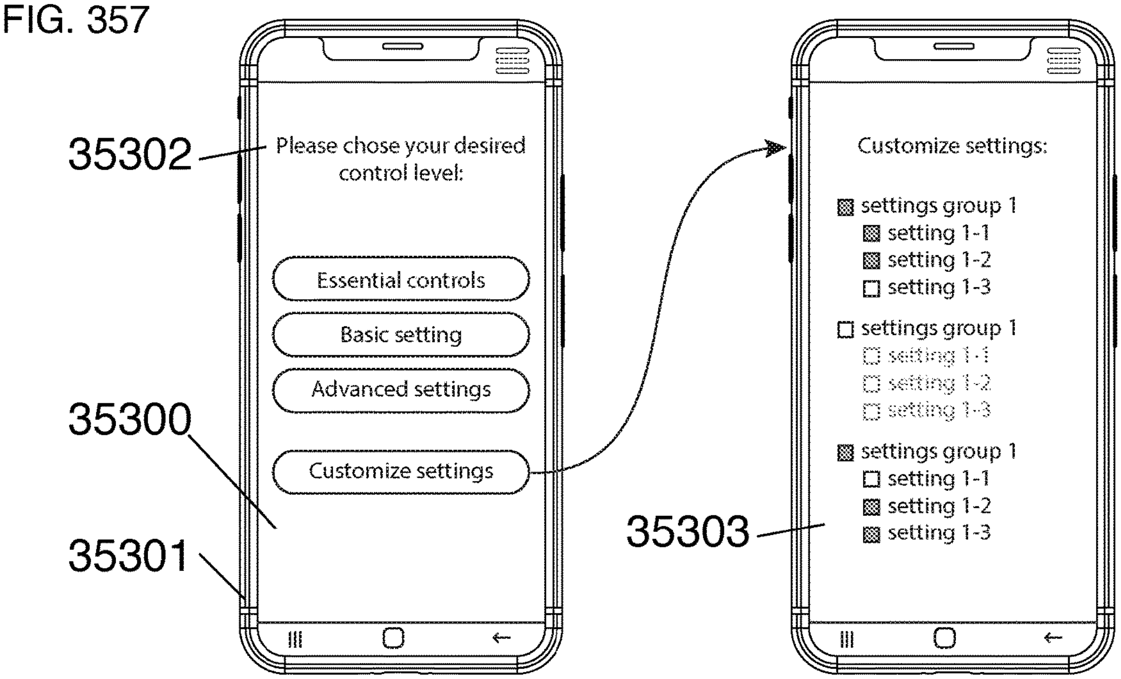

FIG. 357 illustrates selecting different levels of control settings of a robot using an application of a communication device.

Figure 358:
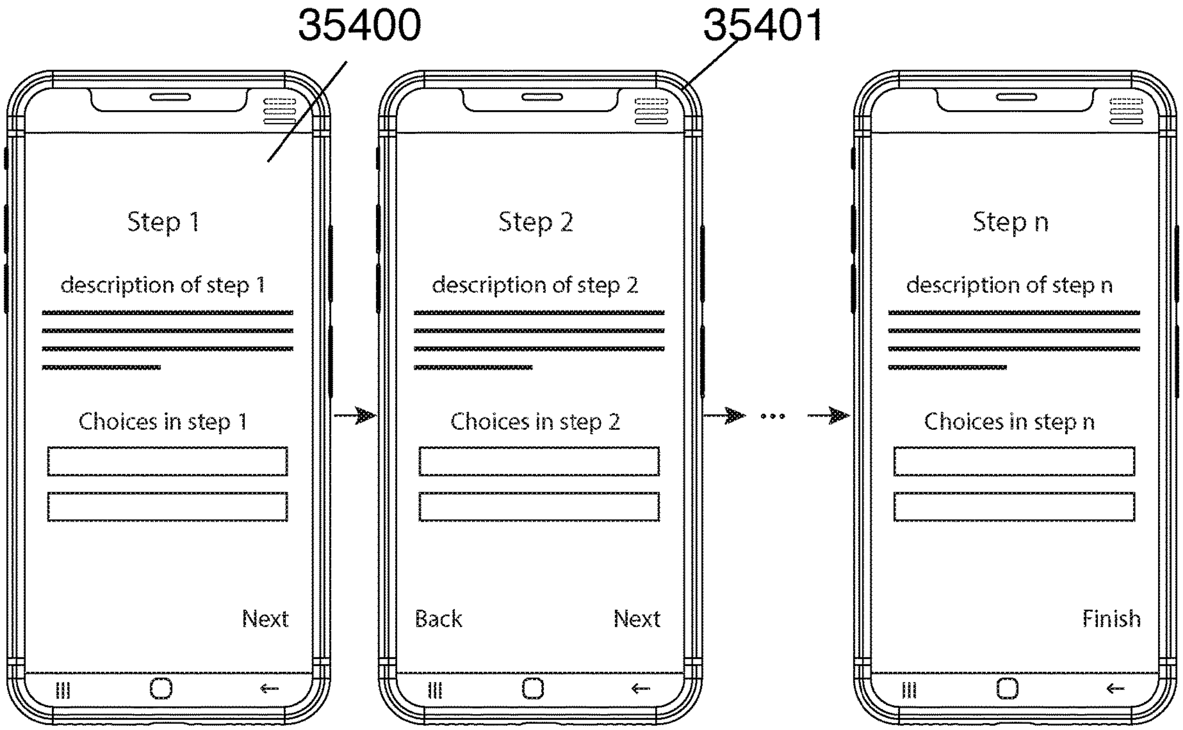

FIG. 358 illustrates a wizard tool of an application of a communication device.

Figure 359:
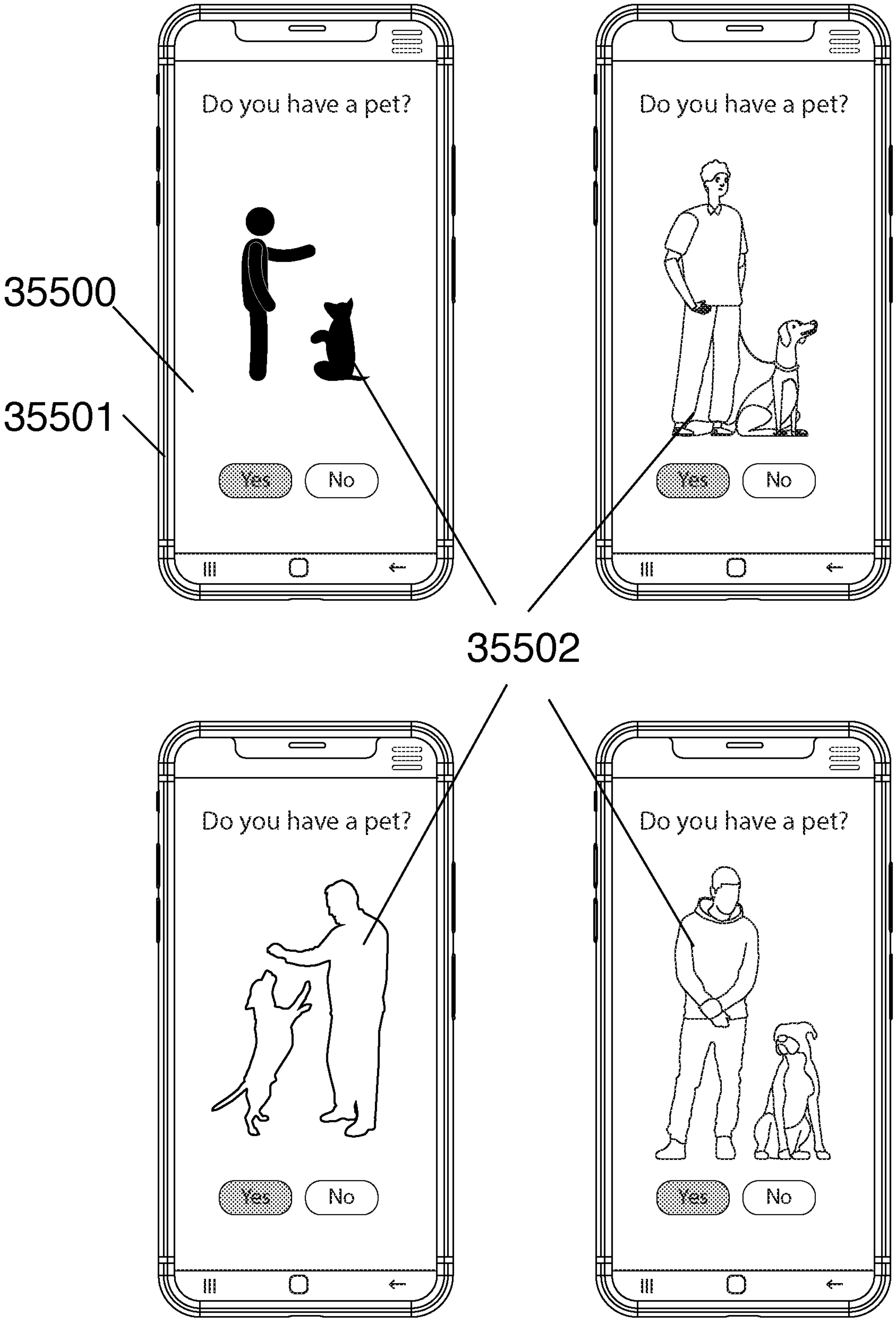

FIG. 359 illustrates examples of visual guides and questions displayed by an application of a communication device.

FIG. 360 illustrates device management operating on the cloud.

FIG. 361 illustrates an example of a means of security.

Figure 363A:
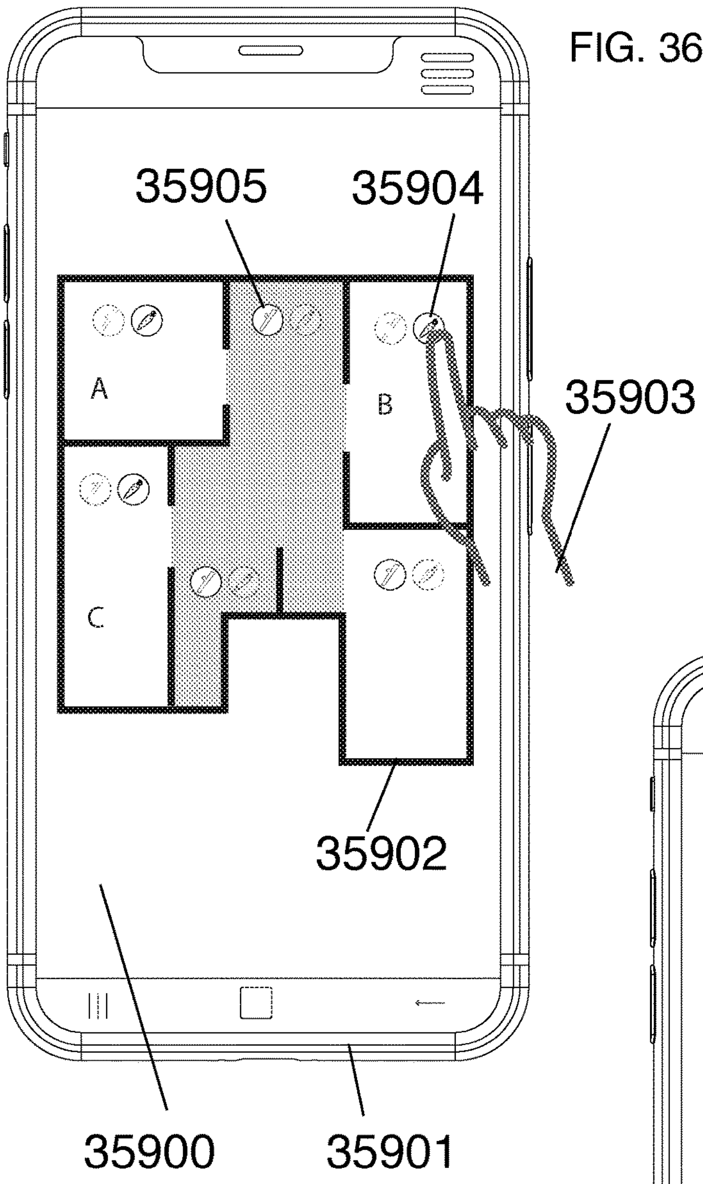
Figure 363B:
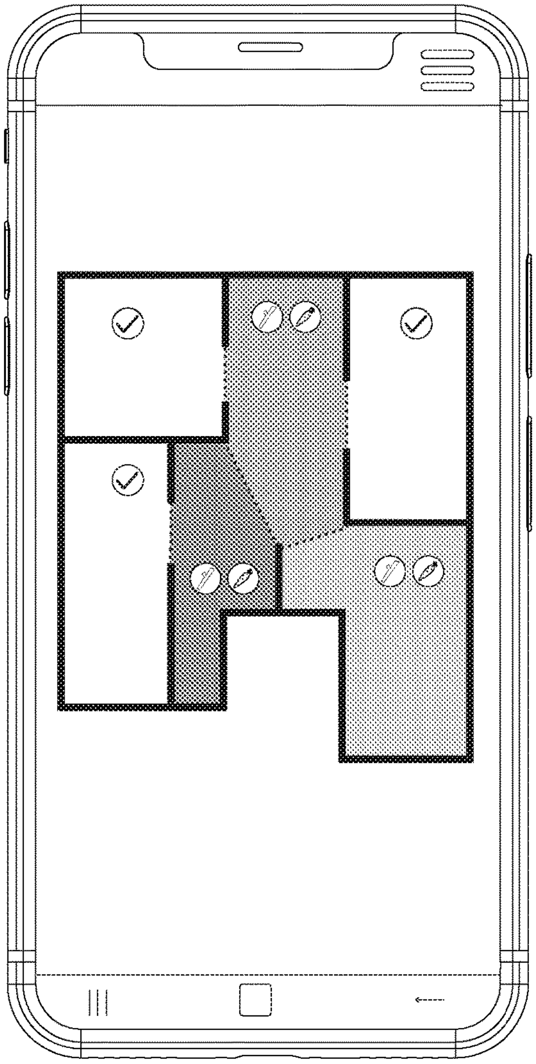

FIGS. 362, 363A, and 363B illustrate a user using an application of a communication device to provide settings to subareas within a map and training the application to segment the map.

Figure 364:
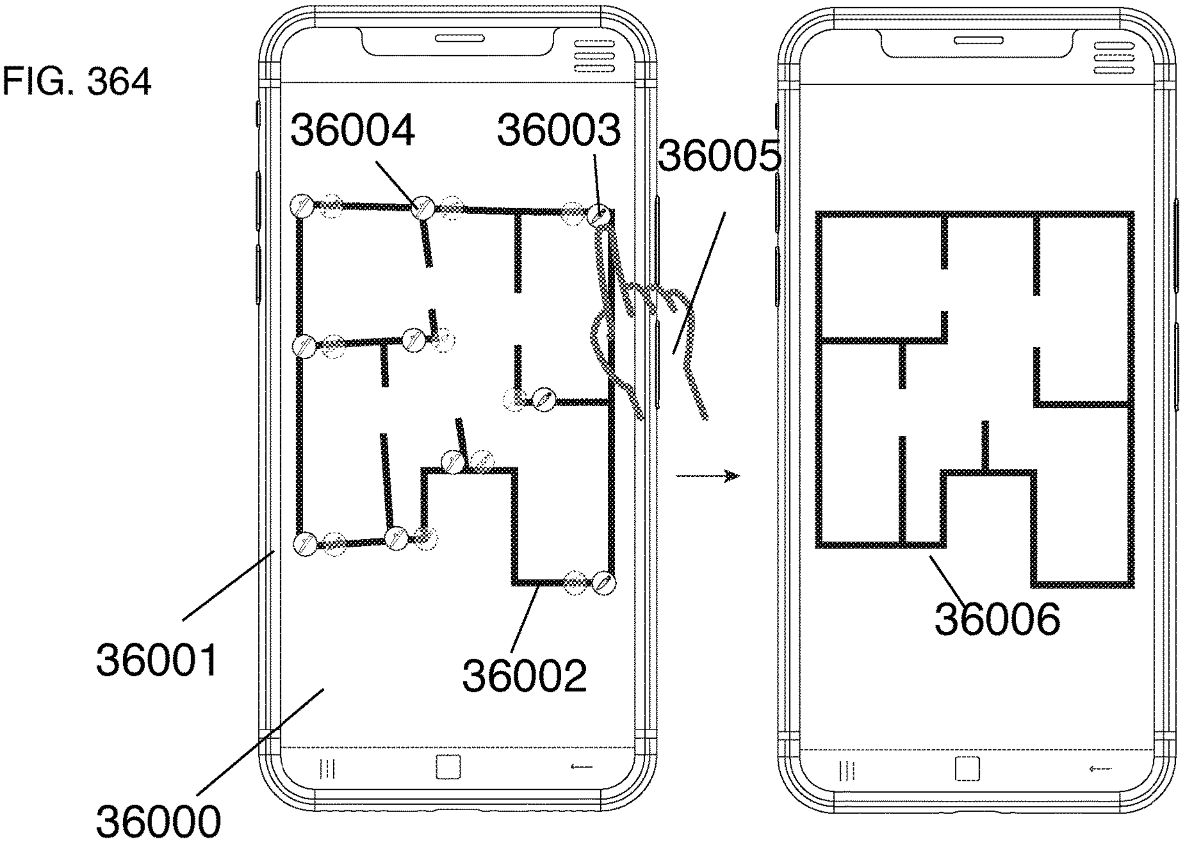

FIG. 364 illustrates a user using an application of a communication device to train the application to correctly map boundaries.

Figure 365:
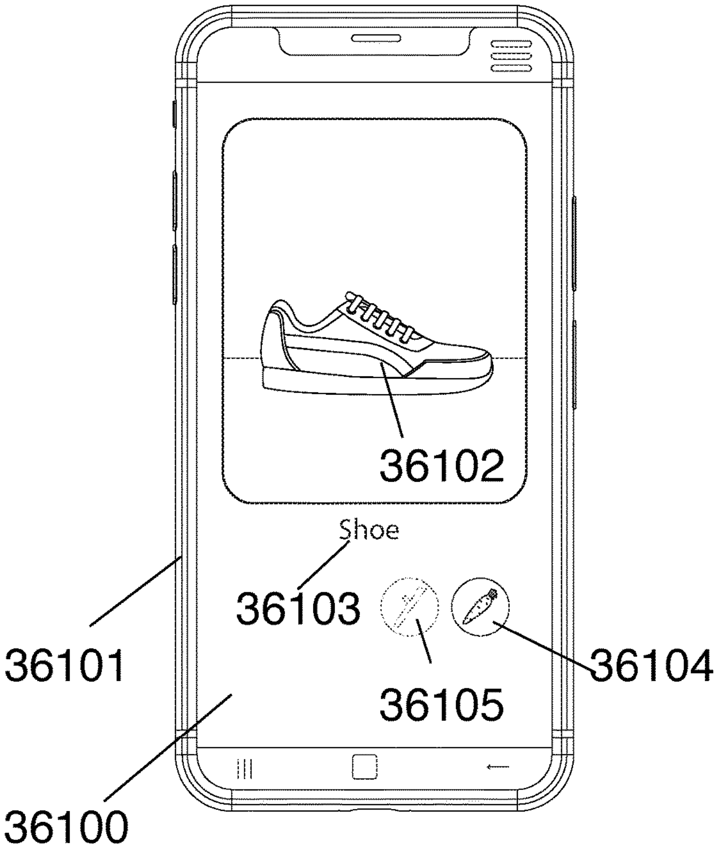

FIG. 365 illustrates a user using an application of a communication device to train the application to correctly identify object types.

Figure 366:
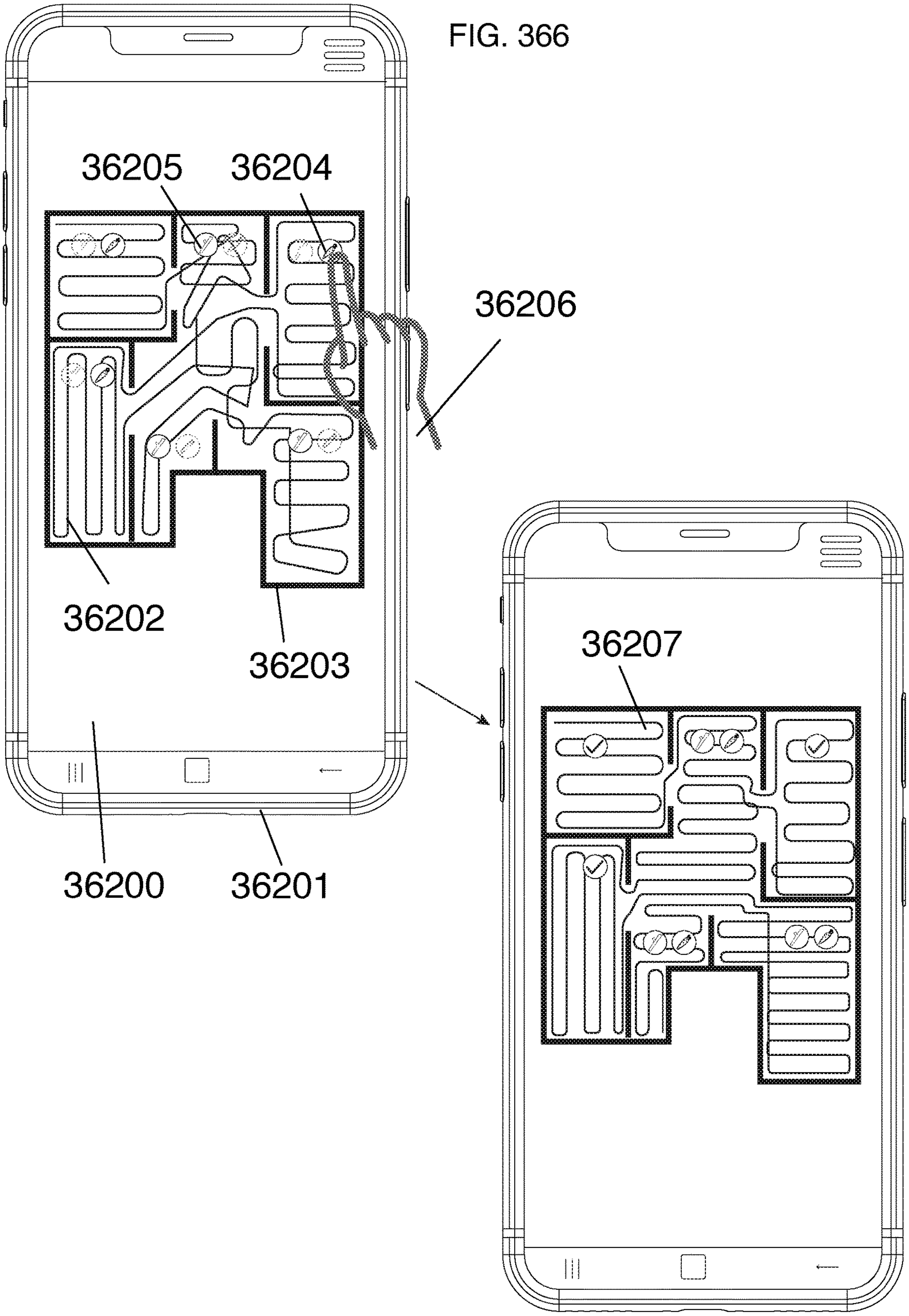

FIG. 366 illustrates a user using an application of a communication device to train the application to correctly plan paths.

FIGS. 367A-368C illustrate examples of training a robotic device to move along a planned path.

Figure 369:
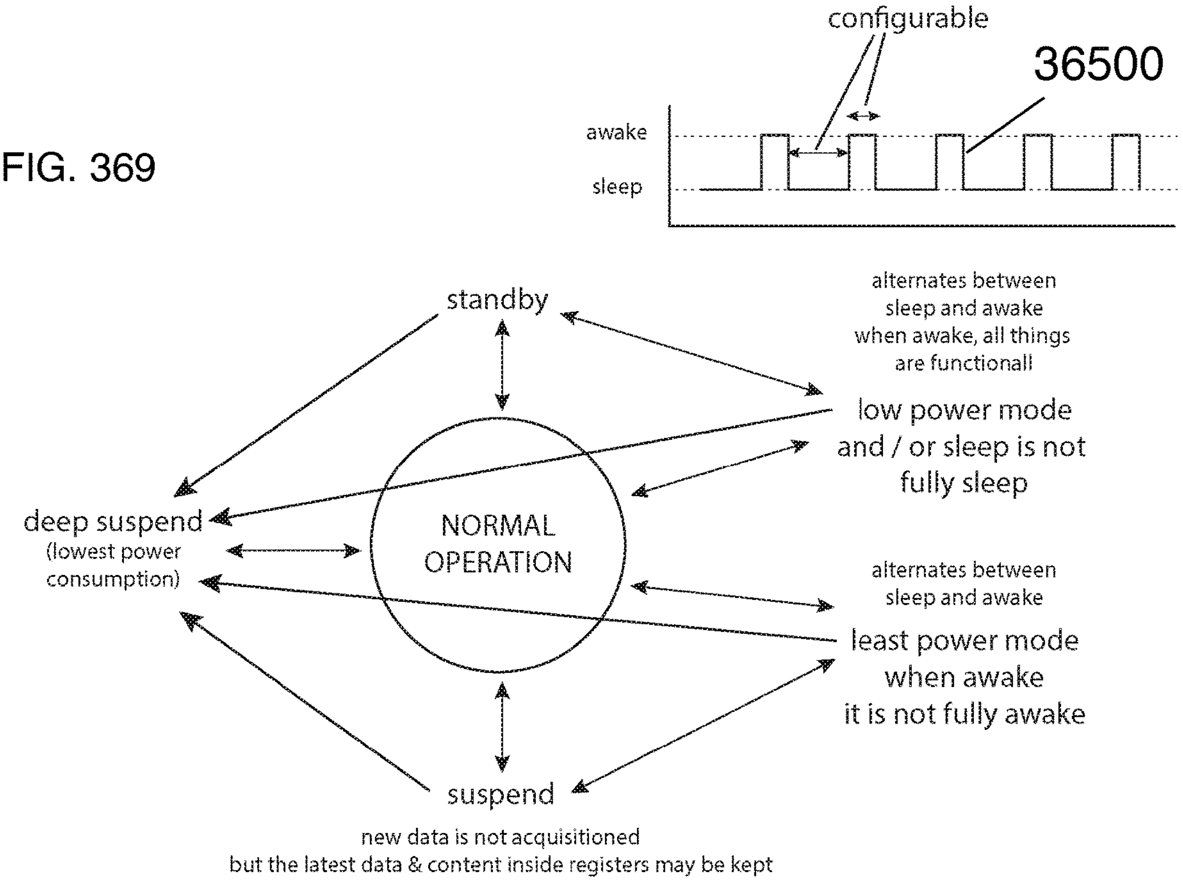

FIG. 369 illustrates various power modes of a robot.

Figure 370:
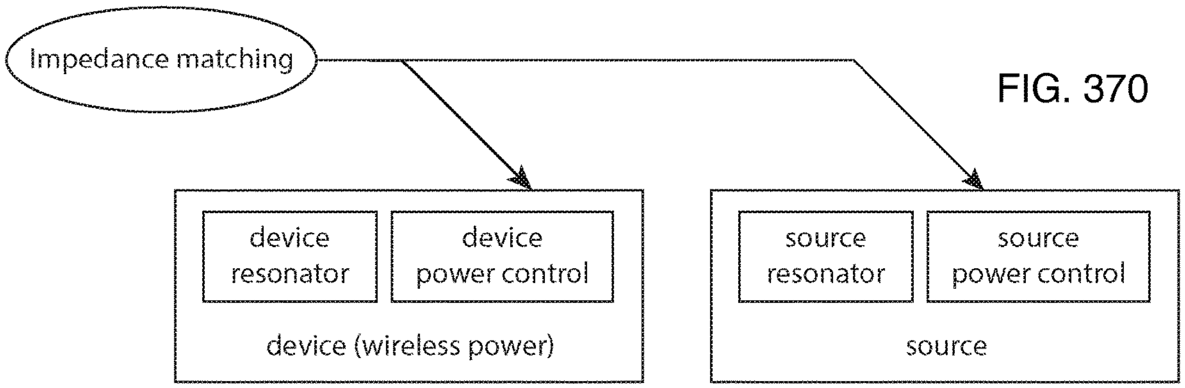

FIG. 370 illustrates impedance matching between a device and a source.

Figure 371:
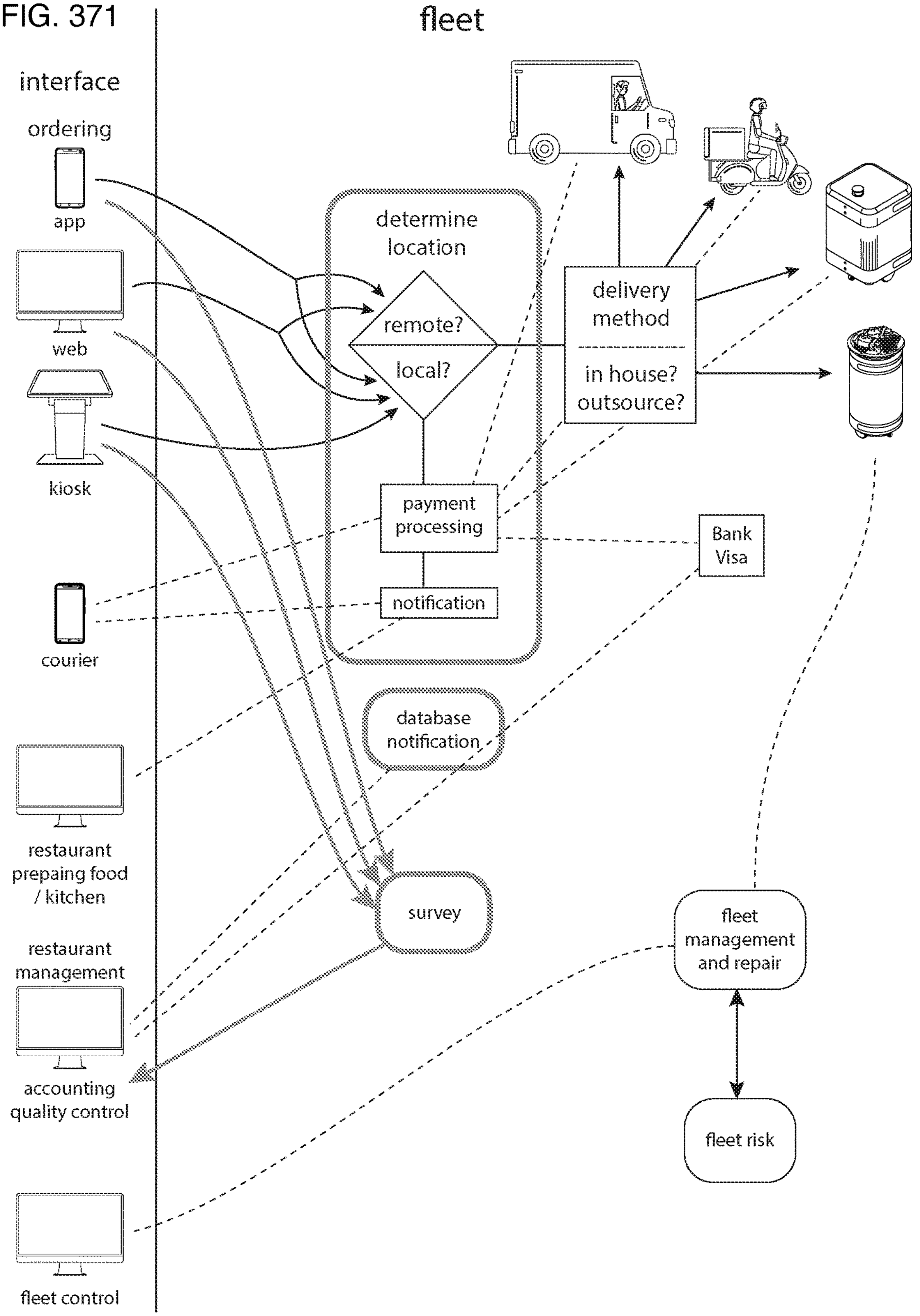

FIG. 371 illustrates an example of a fleet system for a restaurant.

FIG. 372 illustrates an example of a software application used for managing a fleet of robots.

Figure 373:
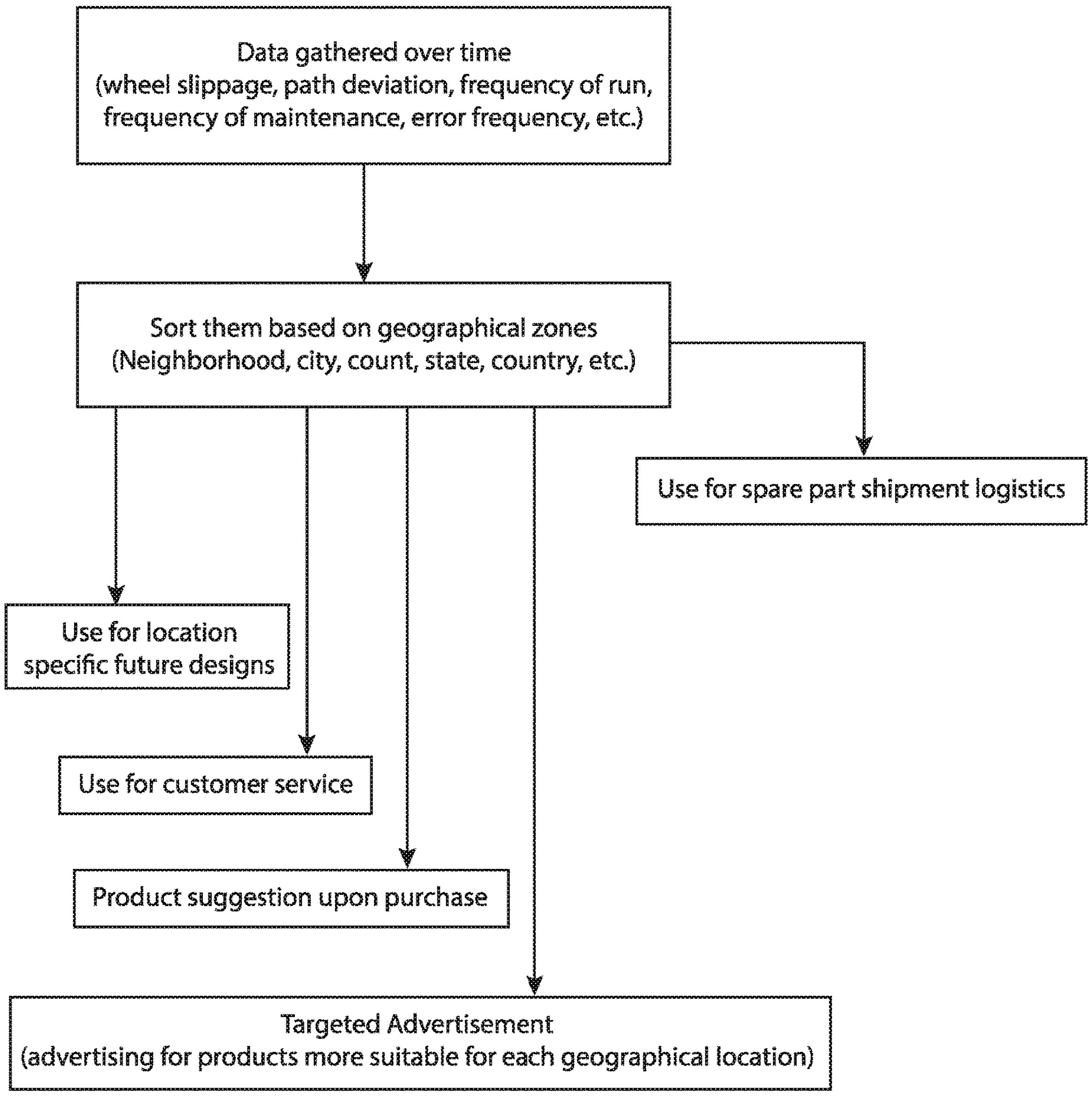

FIGS. 373 and 374 illustrate an example of a process of associating data gathered with regions.

Figure 375:
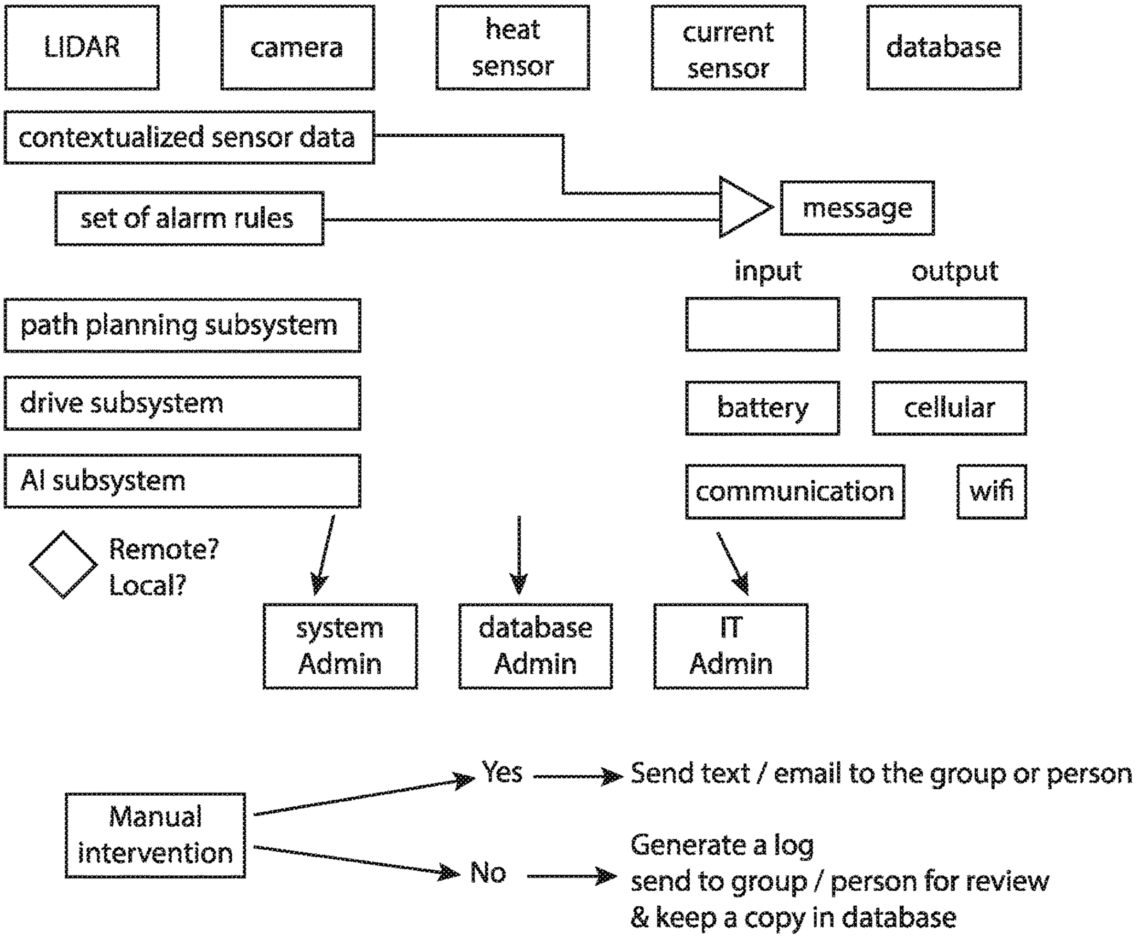

FIG. 375 illustrates an example of a process for generating and sending messages when human intervention is necessary.

Figure 376:
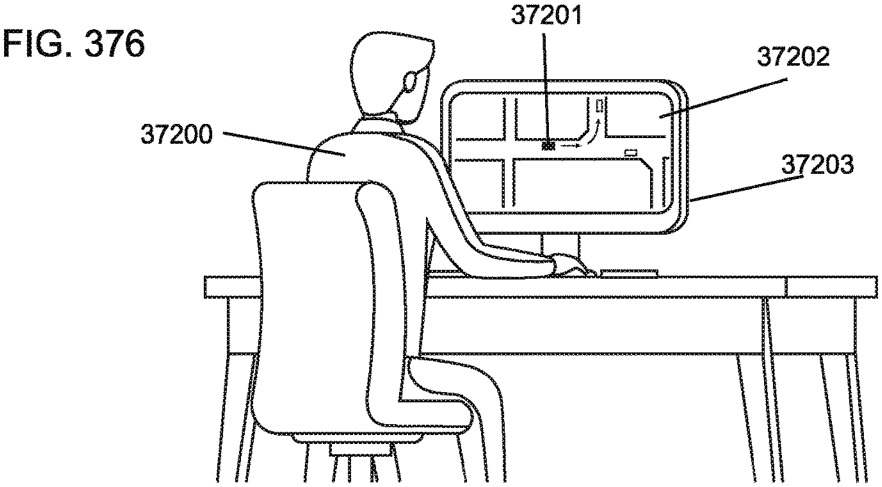

FIG. 376 illustrates an example of an operator remotely driving a robot.

Figure 377:
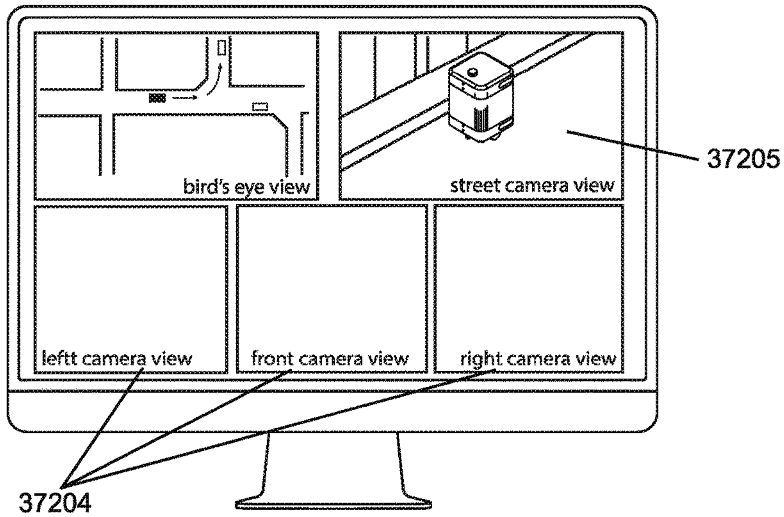

FIG. 377 illustrates an application of a communication device displaying different camera views.

Figure 378:
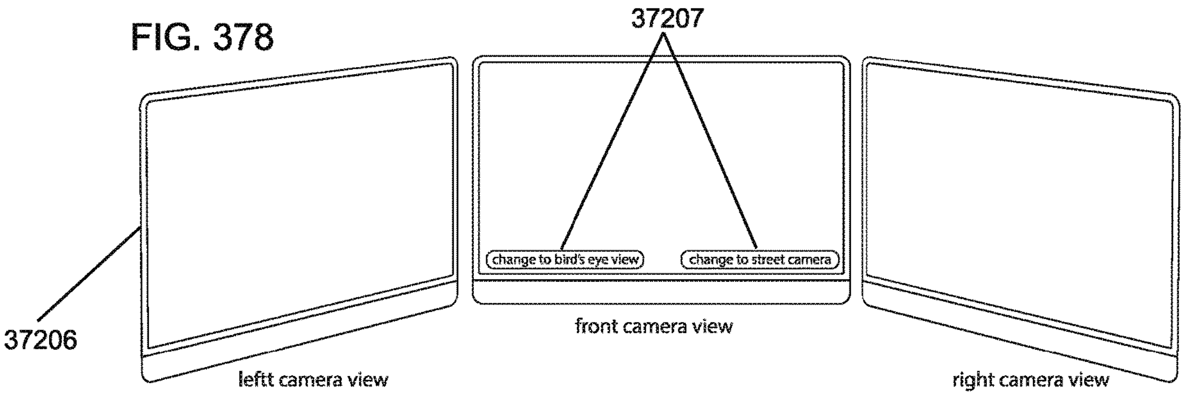

FIG. 378 illustrates multiple monitors displaying different camera views.

Figure 379:
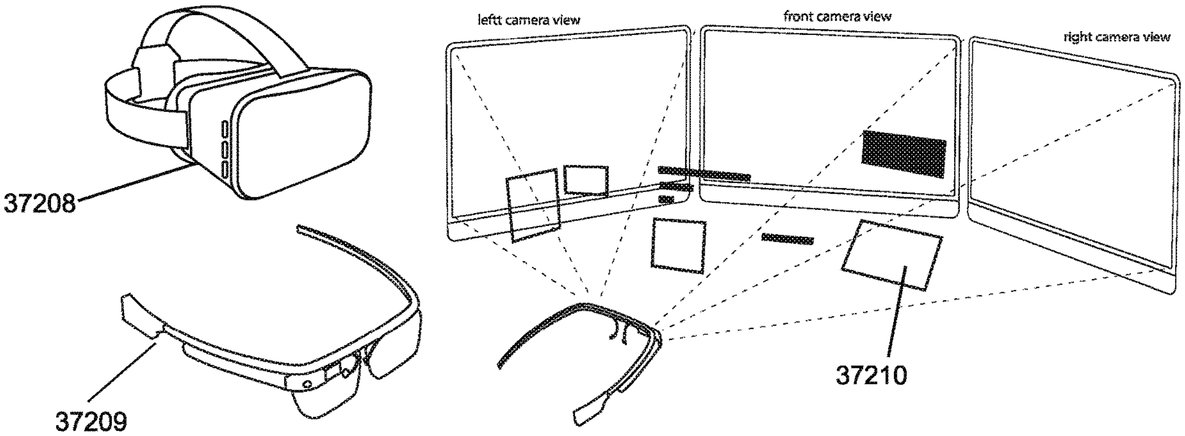

FIG. 379 illustrates a VR headset an operator uses to place themselves within an environment.

Figure 380:
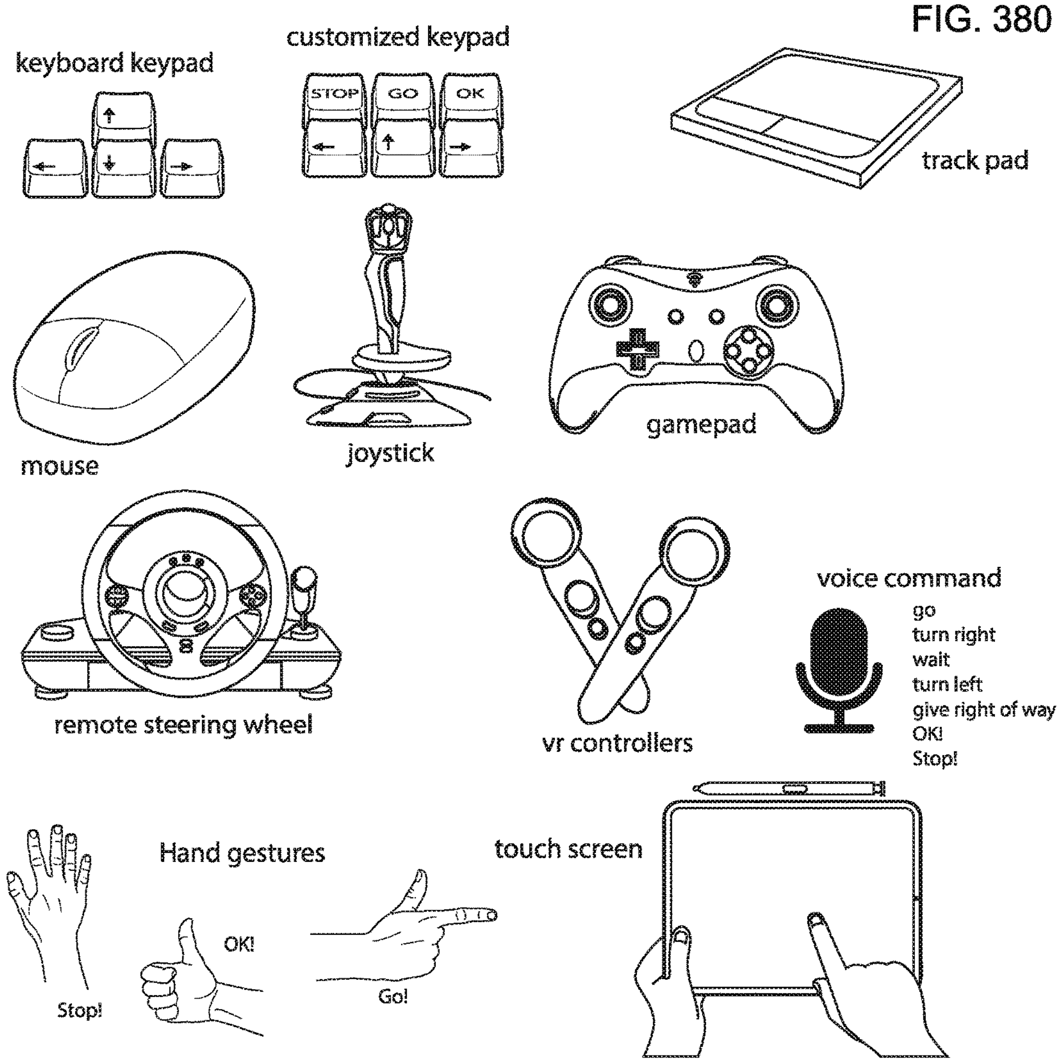

FIG. 380 illustrates examples of input devices.

Figure 381:
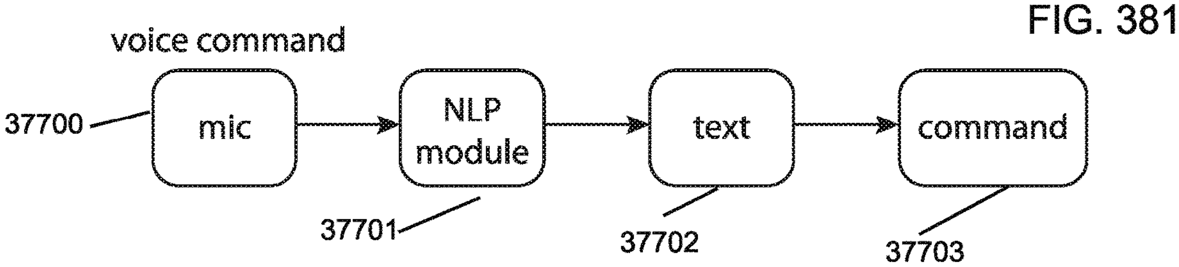

FIG. 381 illustrates an example of a process of translating a voice command into text.

Figure 382:
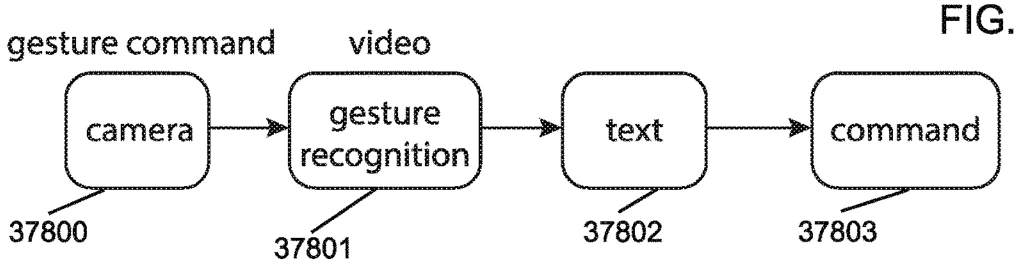

FIG. 382 illustrates an example of a process of translating a gesture command into text.

Figure 383:
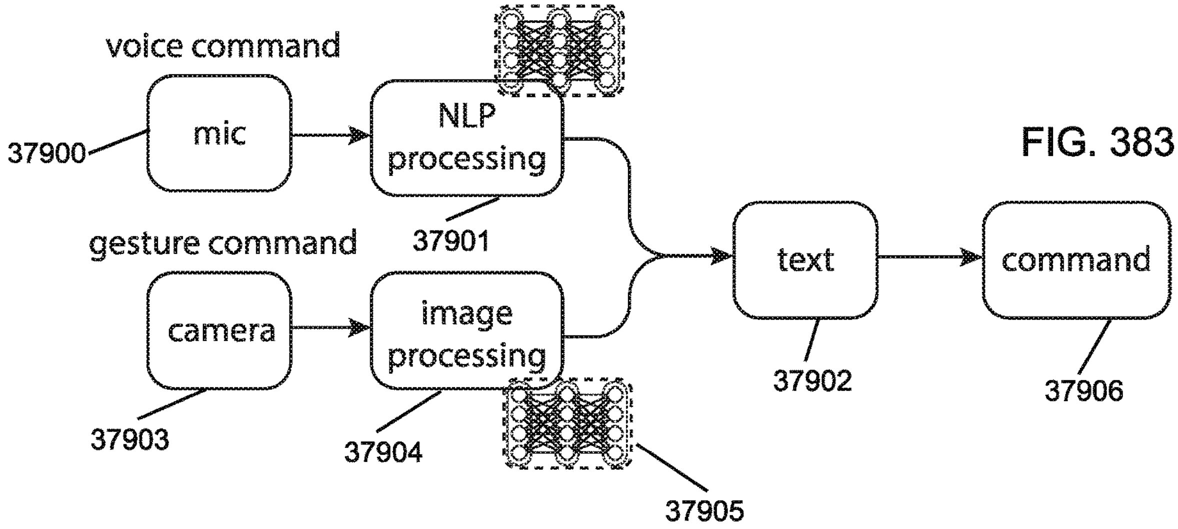

FIG. 383 illustrates an example of a process of translating a voice command into text.

Figure 384:
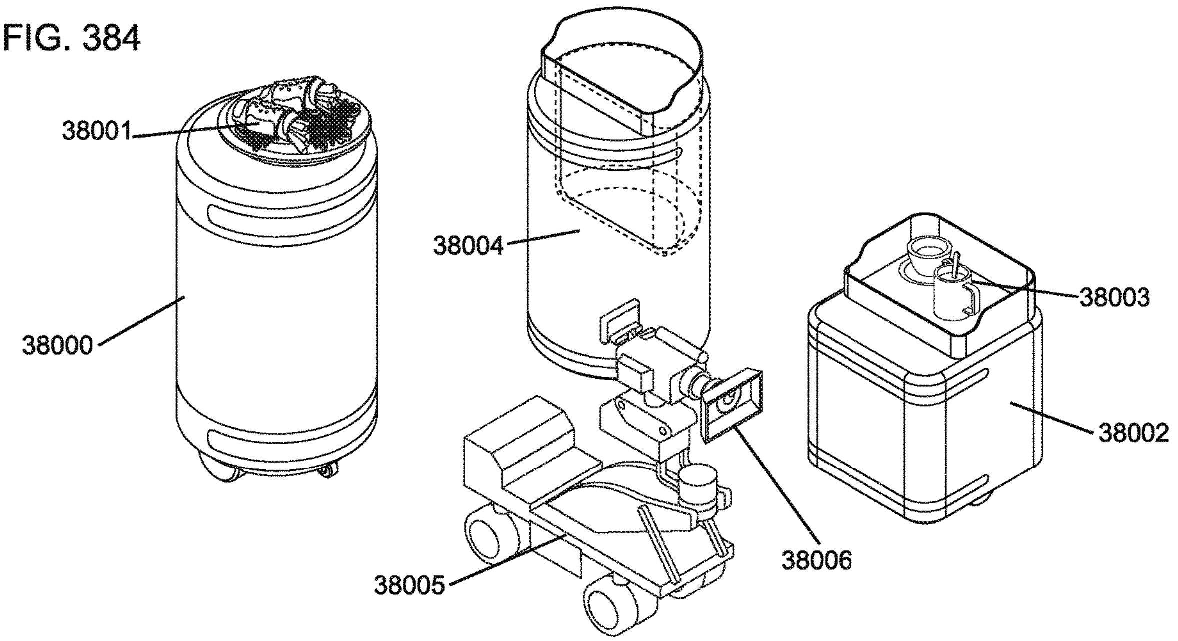
Figure 385A:
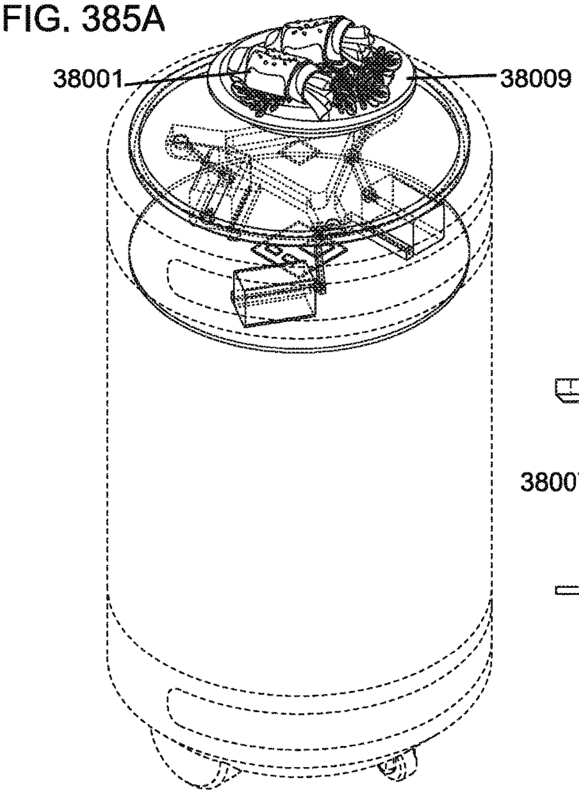
Figure 385B:
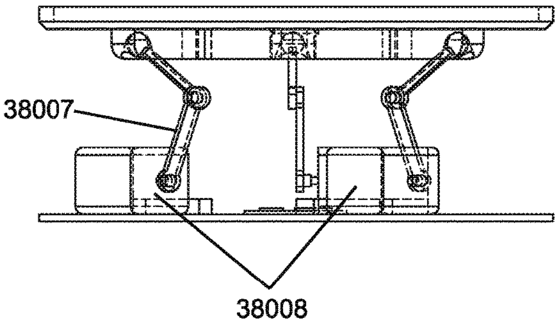

FIGS. 384-385B illustrate a mechanism for maintaining balance of a plate.

FIGS. 386-395 illustrate wheel mechanisms for maintaining a balance of a robot.

FIGS. 396-402 illustrate mechanisms for maintaining a balance of a plate.

Figure 403:
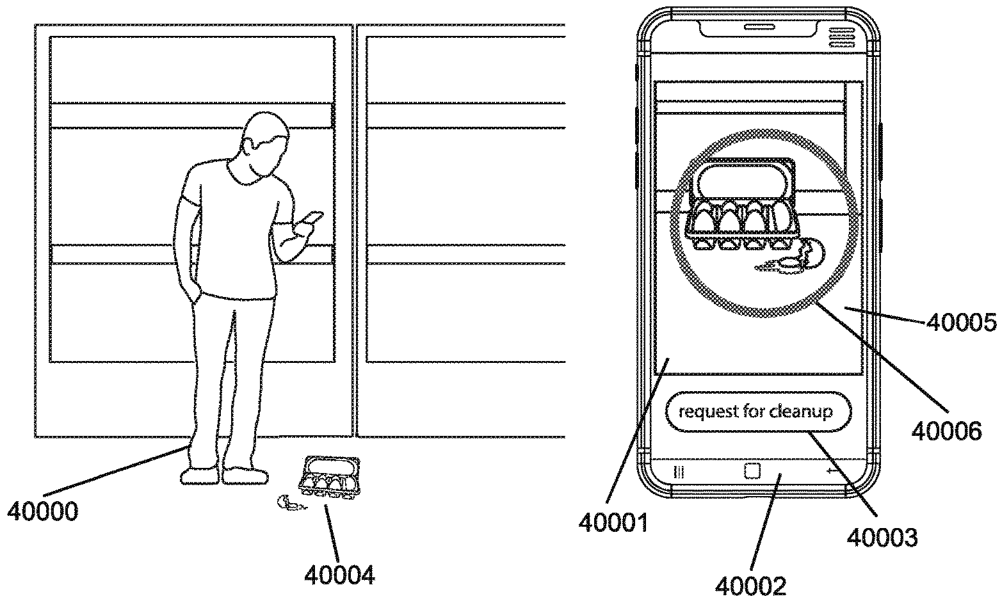

FIG. 403 illustrates a user using an application of a communication device to request cleanup of an area.

Figure 404:
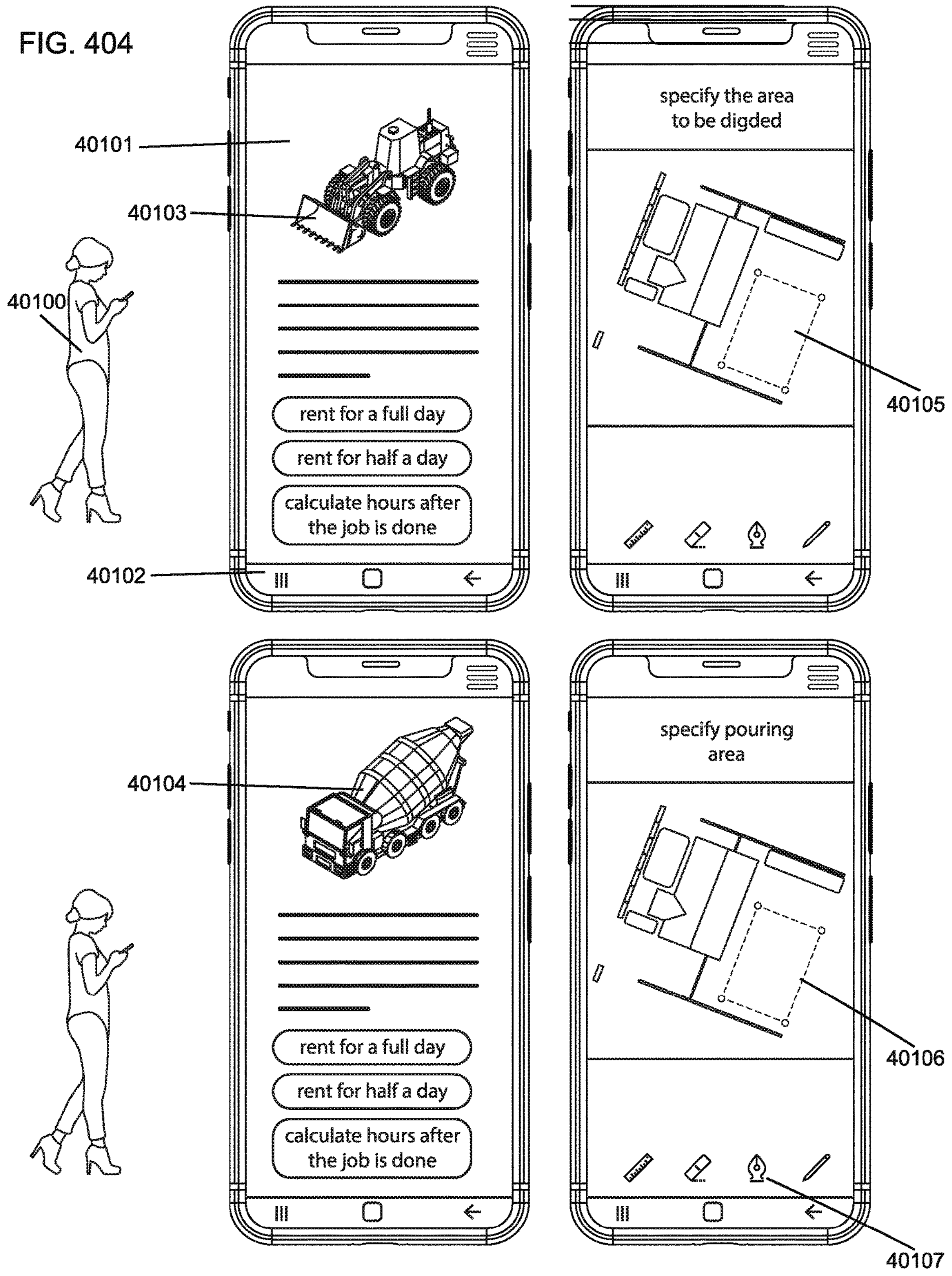

FIG. 404 illustrates an example of a user using an application of a communication device to rent machinery.

Figure 405:
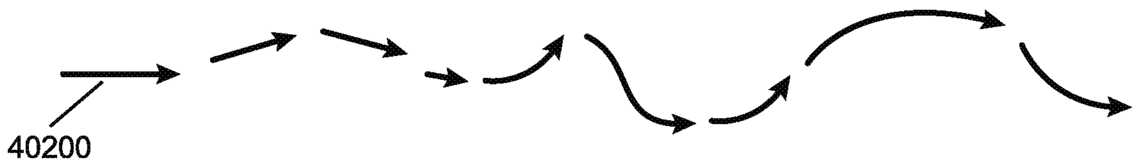

FIG. 405 illustrates an example of small maneuvers of a robot.

Figure 406A:
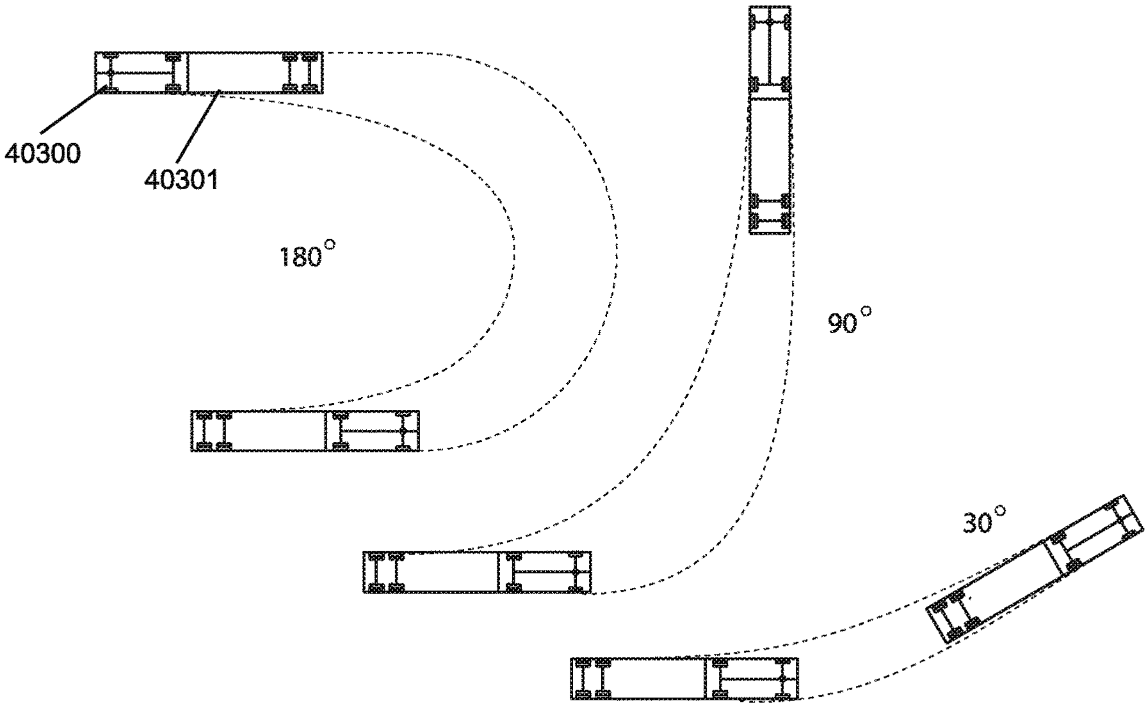
Figure 406B:
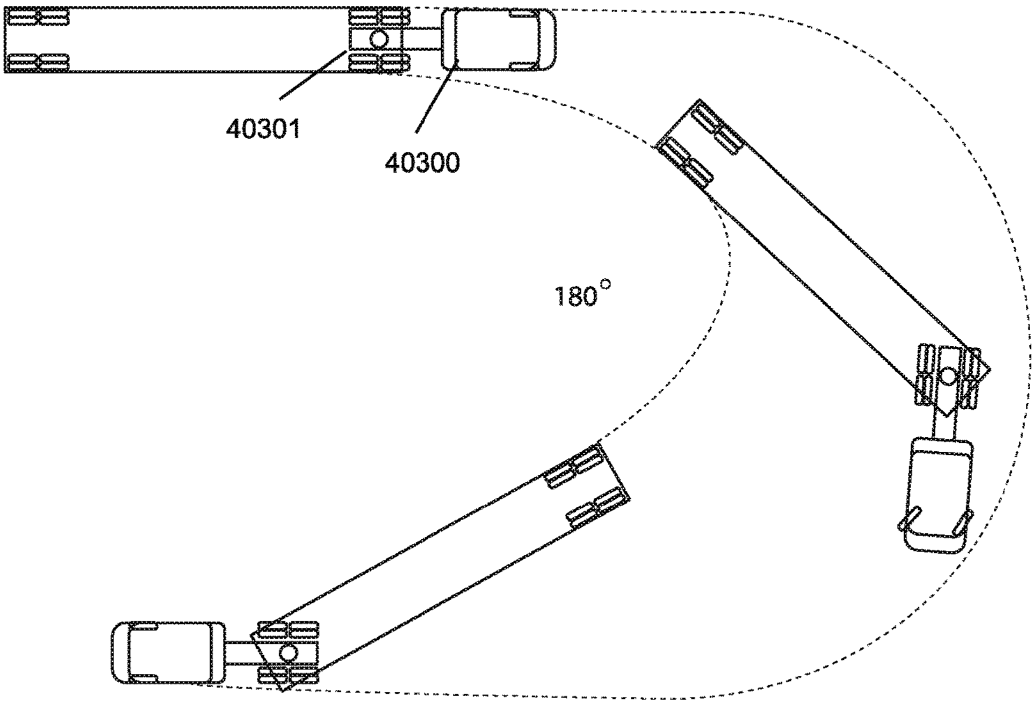

FIGS. 406A and 406B illustrate a robotic locomotive and passive trailer.

FIGS. 407-410 illustrate examples of humanoid robots.

Figure 411:
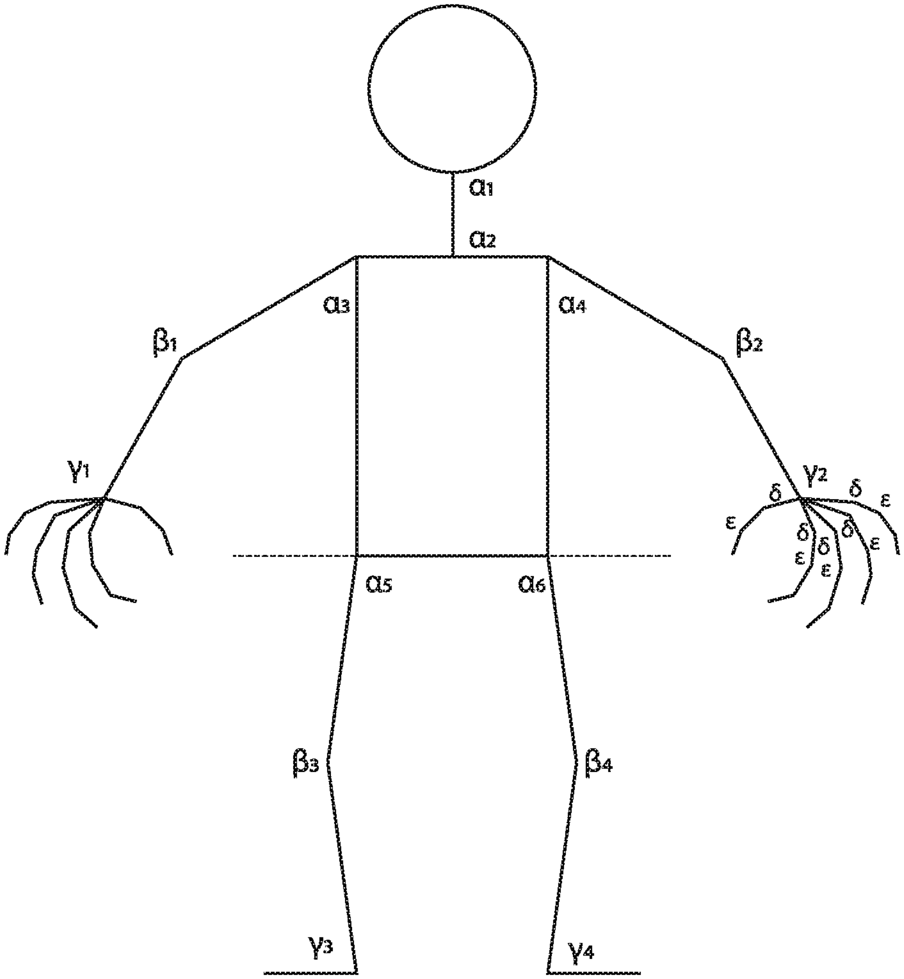
Figure 412:
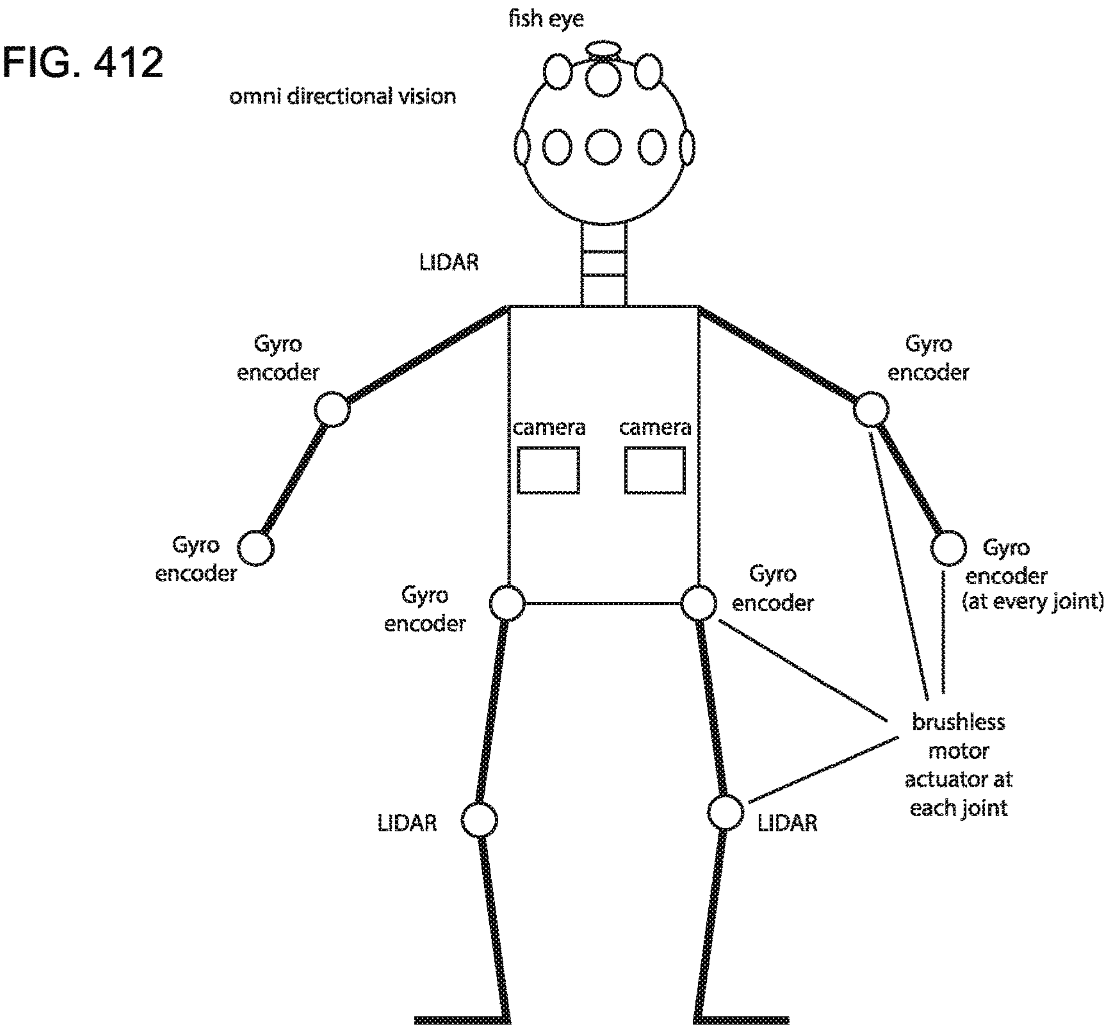

FIGS. 411 and 412 illustrate an example of a humanoid robot.

Figure 413:
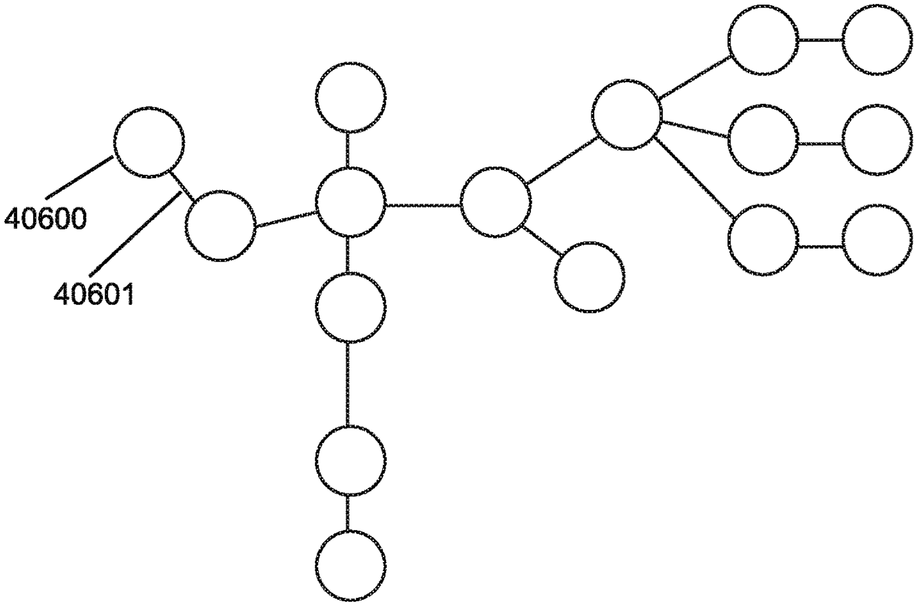

FIG. 413 illustrates an example of a graph comprising nodes connected by edges.

Figure 414:
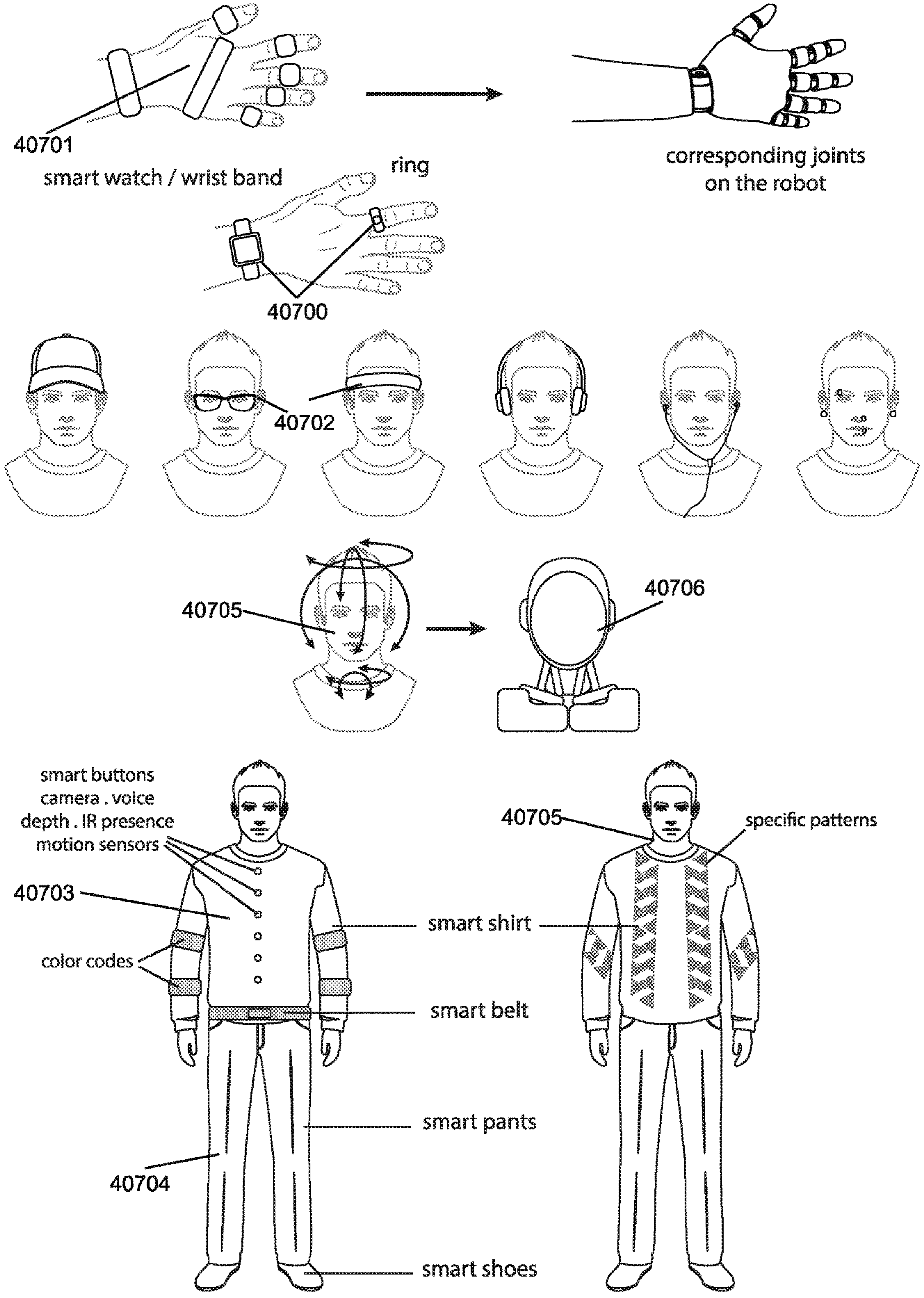

FIG. 414 illustrates examples of wearable devices.

FIG. 415 illustrates an example of a home assistant robot.

Figure 416:
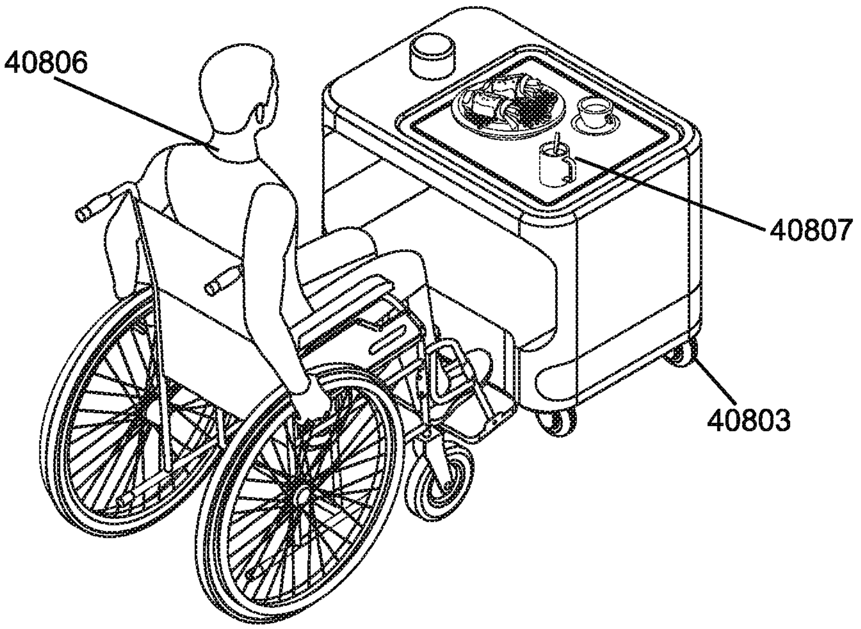

FIG. 416 illustrates an example of a user using a home assistant robot as a table.

Figure 417:
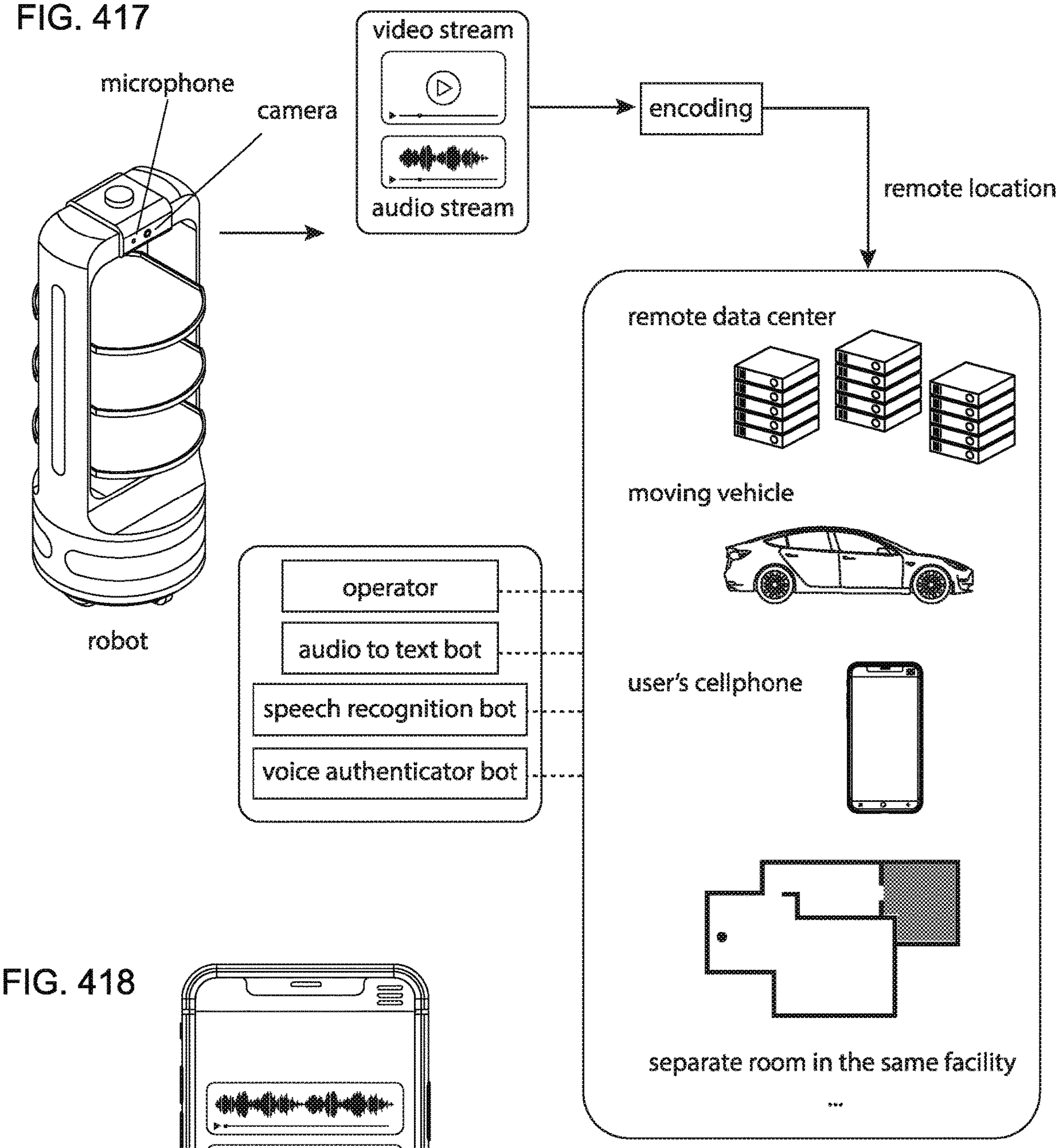

FIG. 417 illustrates an example of a robot including a microphone and camera.

Figure 418:
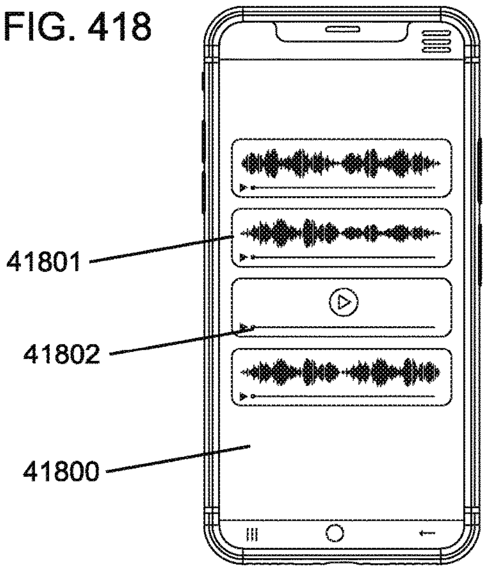

FIG. 418 illustrates an application on a mobile device displaying voice streams and a video stream.

Figure 419A:
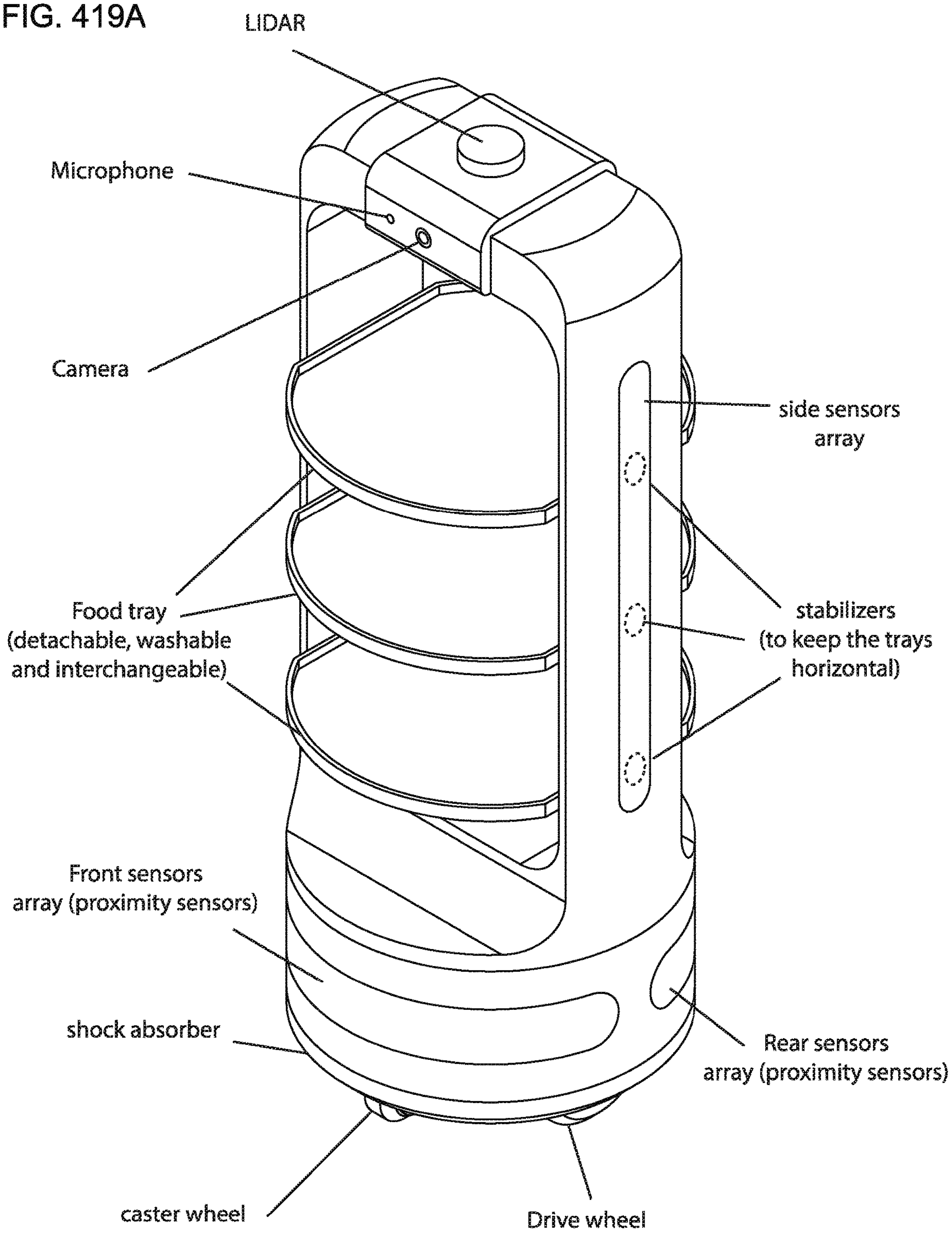
Figure 419B:
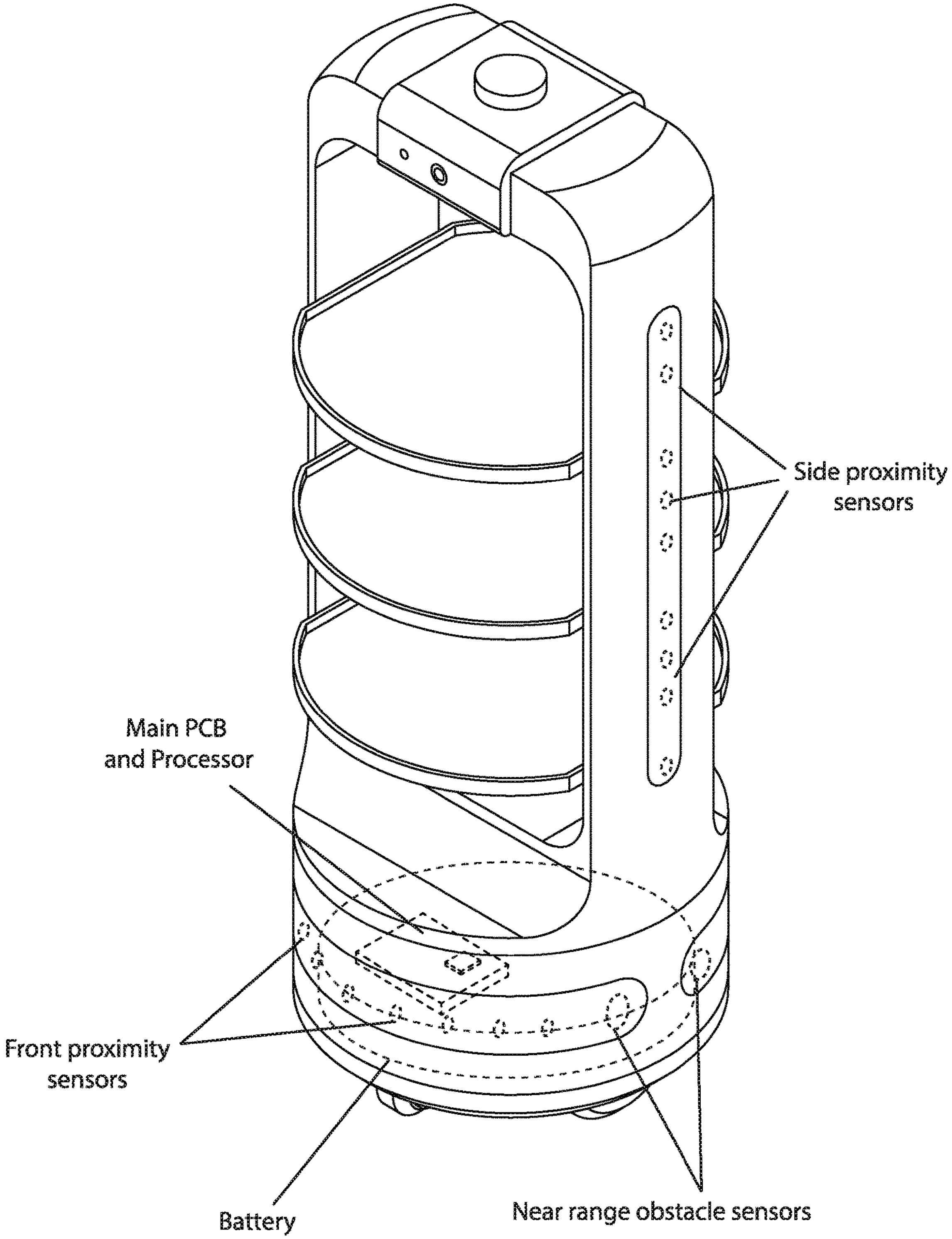

FIGS. 419A and 419B illustrate an example of a food delivery robot.

Figure 420:
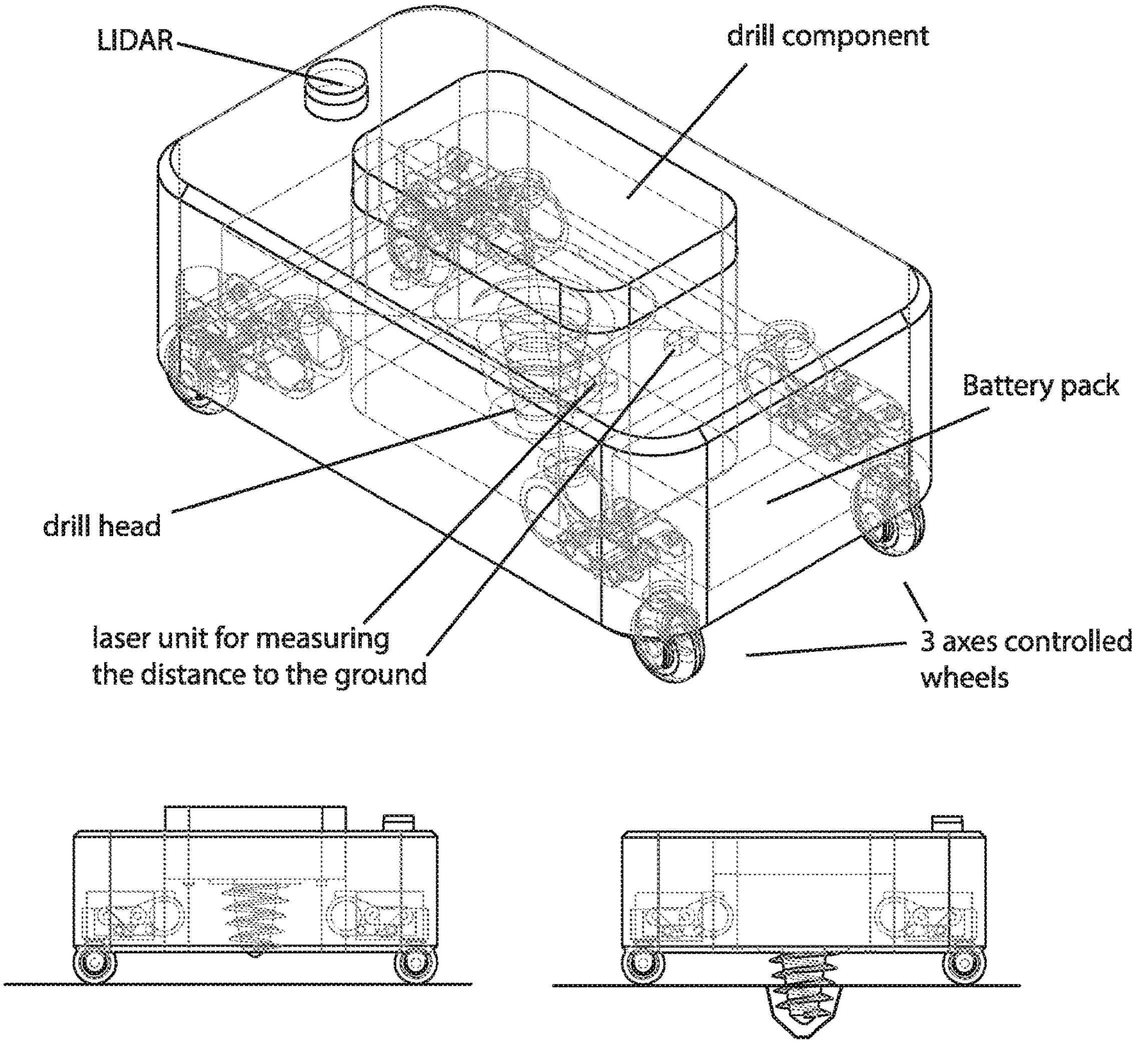

FIG. 420 illustrates an example of a drilling robot.

Figure 421:
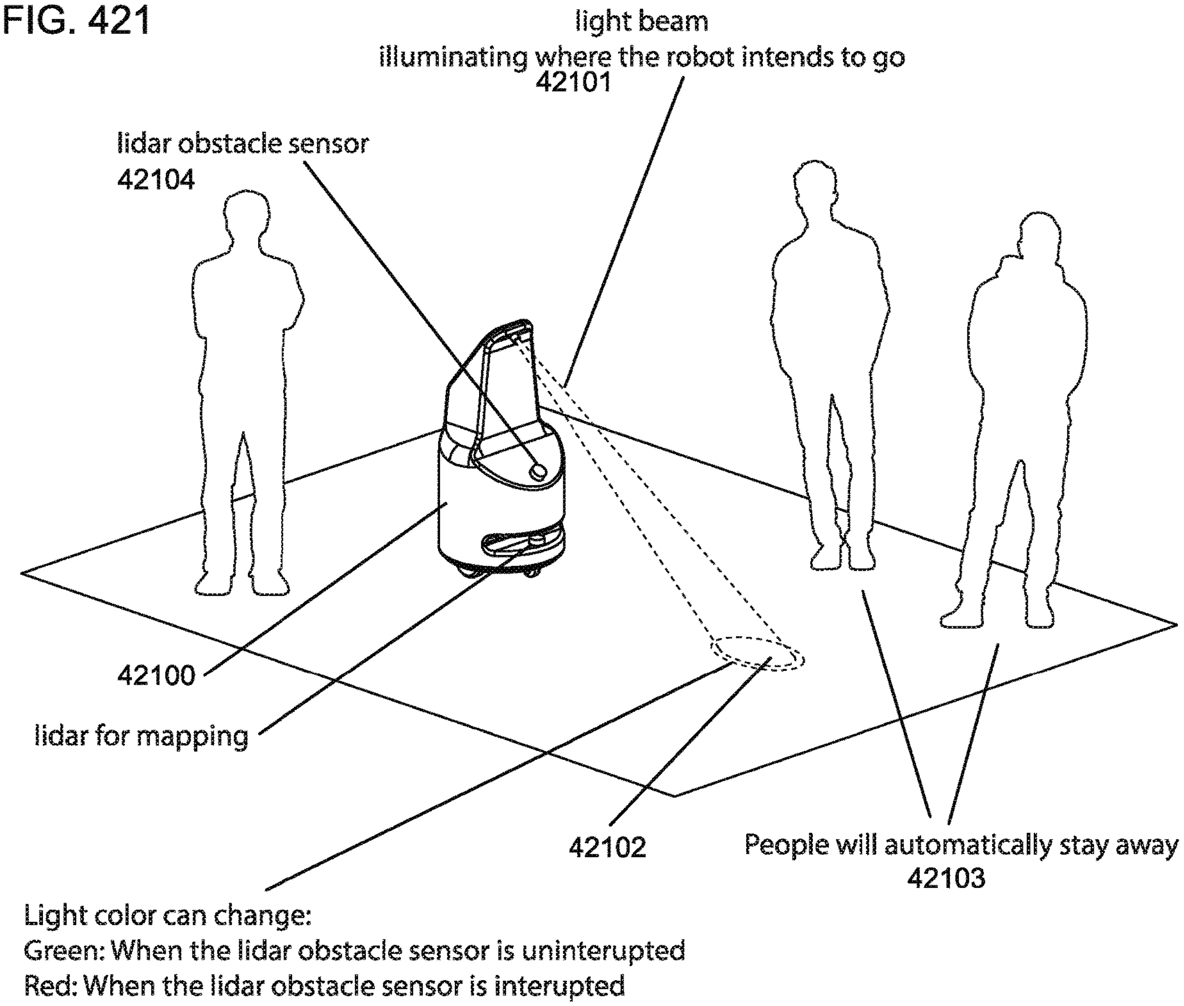

FIG. 421 illustrates a robot including a light beam illuminating a next intended location of the robot.

Figure 422:
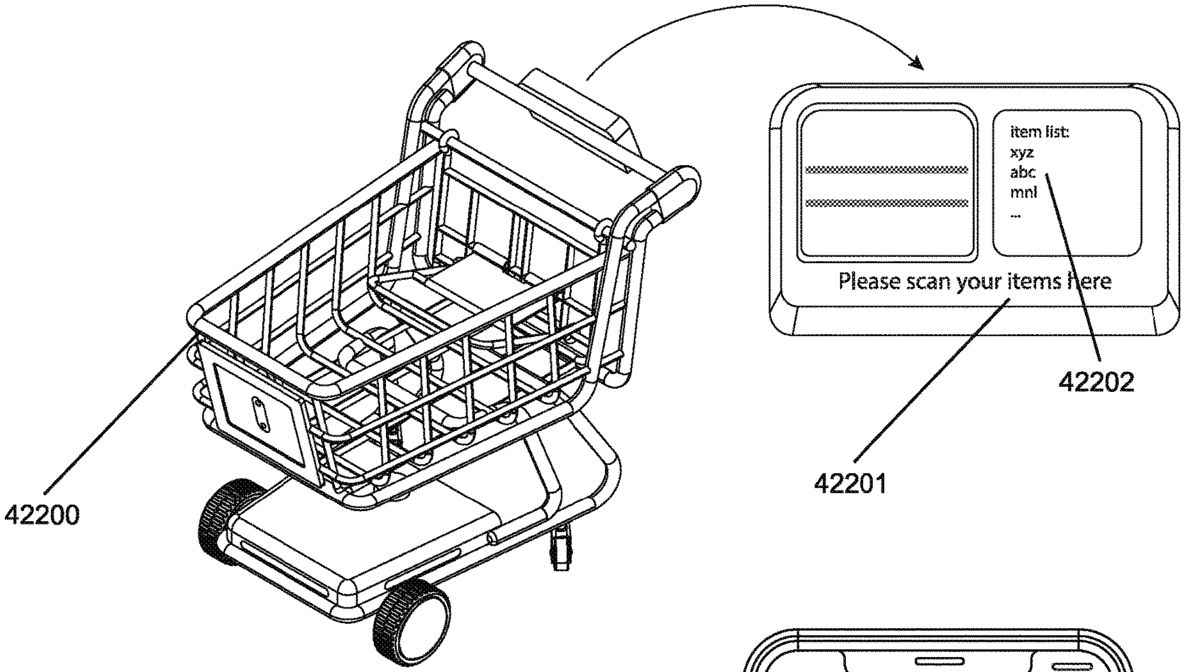

FIG. 422 illustrates an example of a smart shopping cart.

Figure 423:
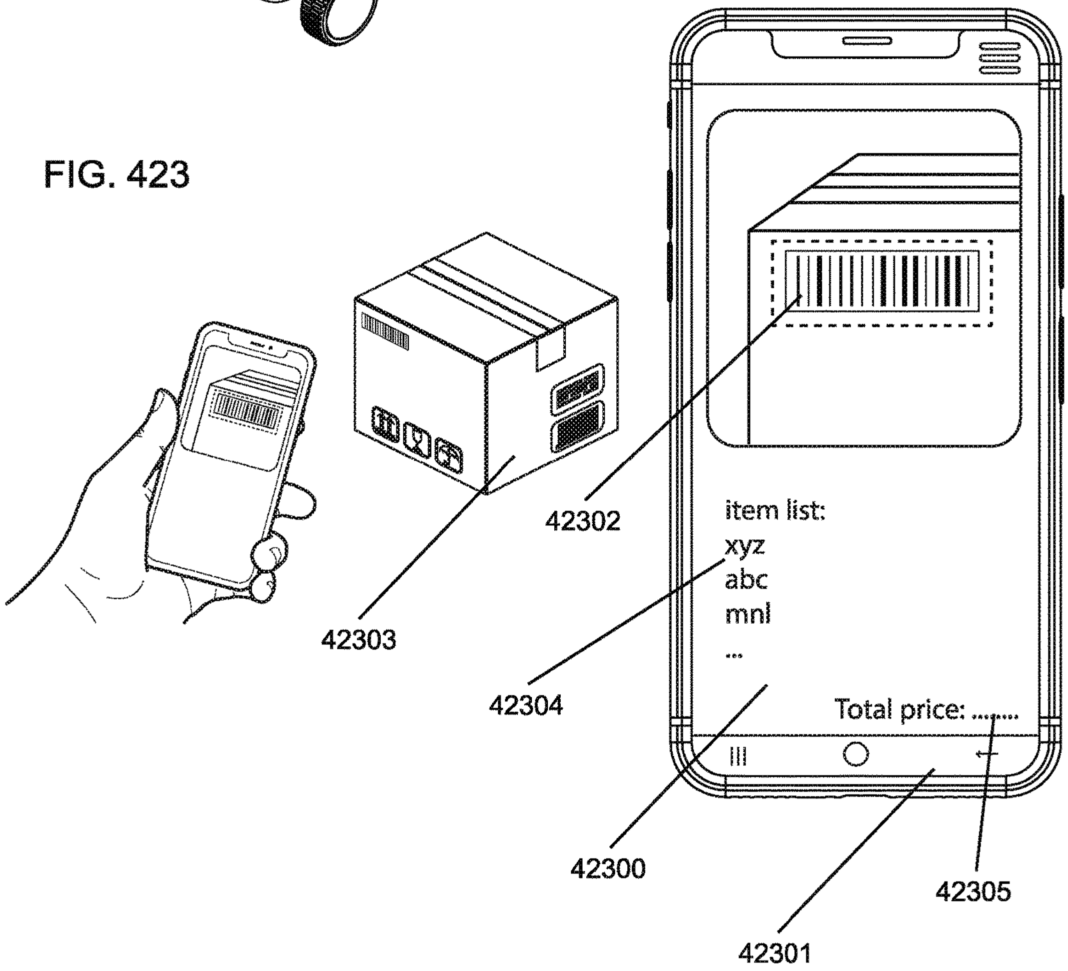

FIG. 423 illustrates an application of a mobile device with a barcode scanner.

Figure 424:
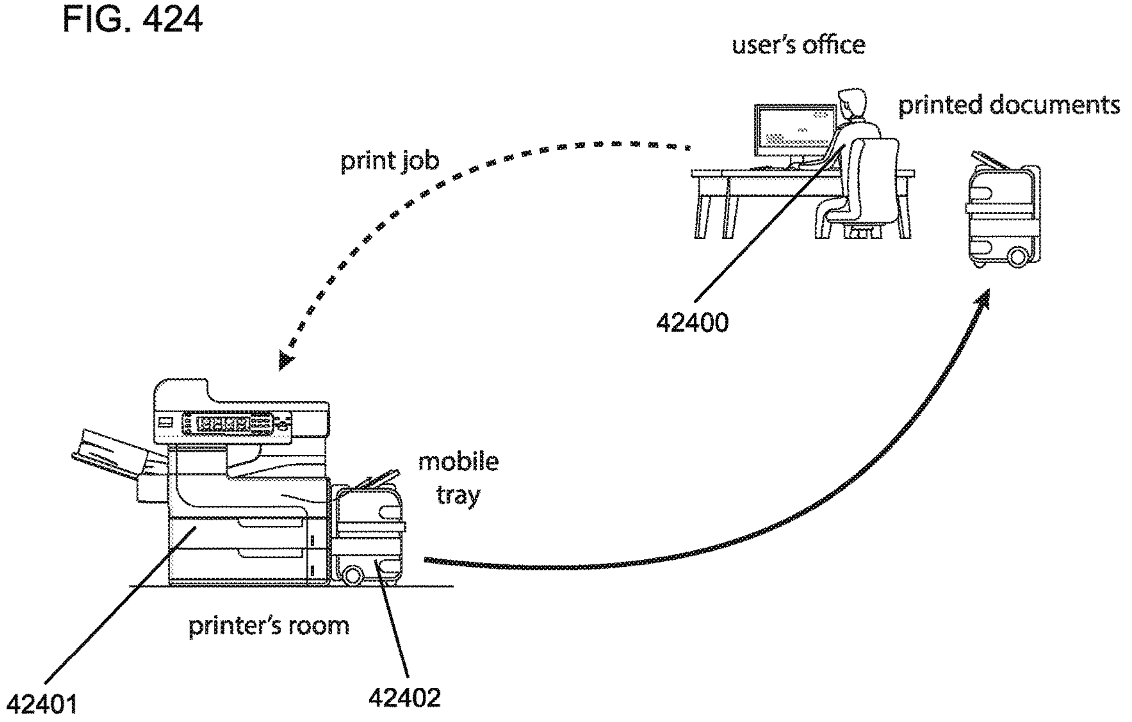

FIG. 424 illustrates an example of a mobile printer.

Figure 425:
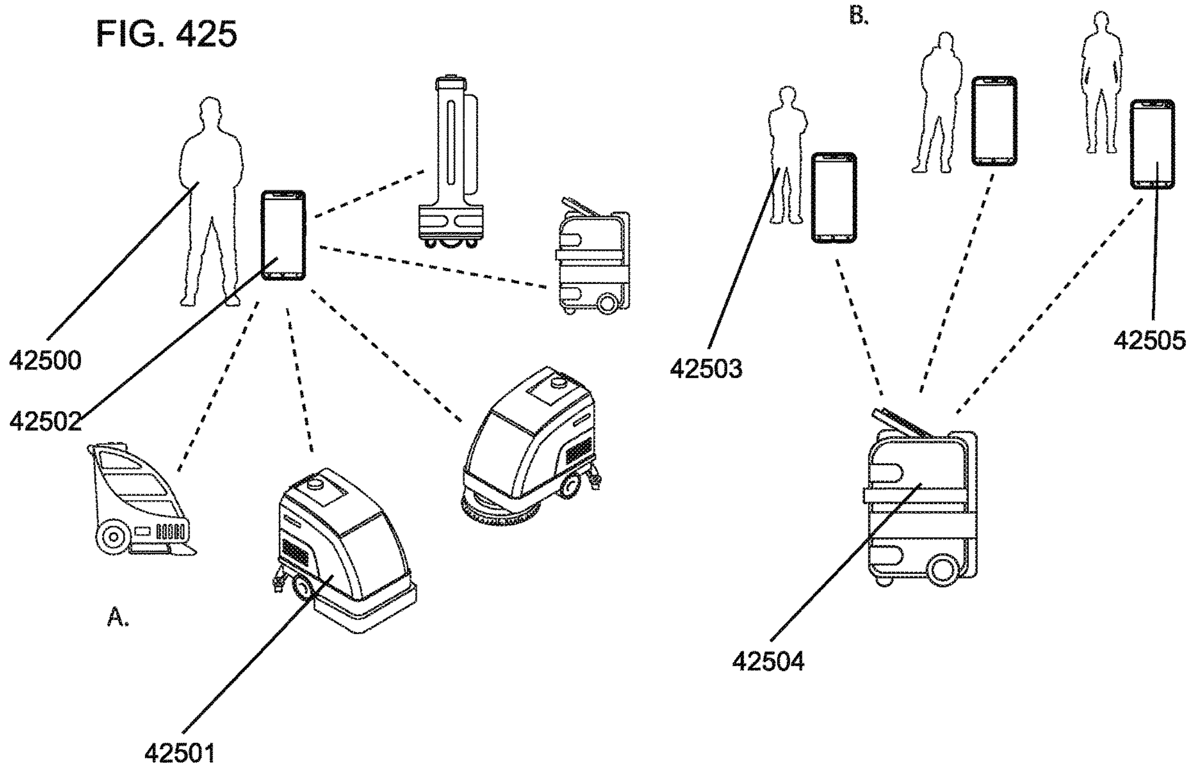

FIG. 425 illustrates examples of relationships between users and robots.

Figure 426A:
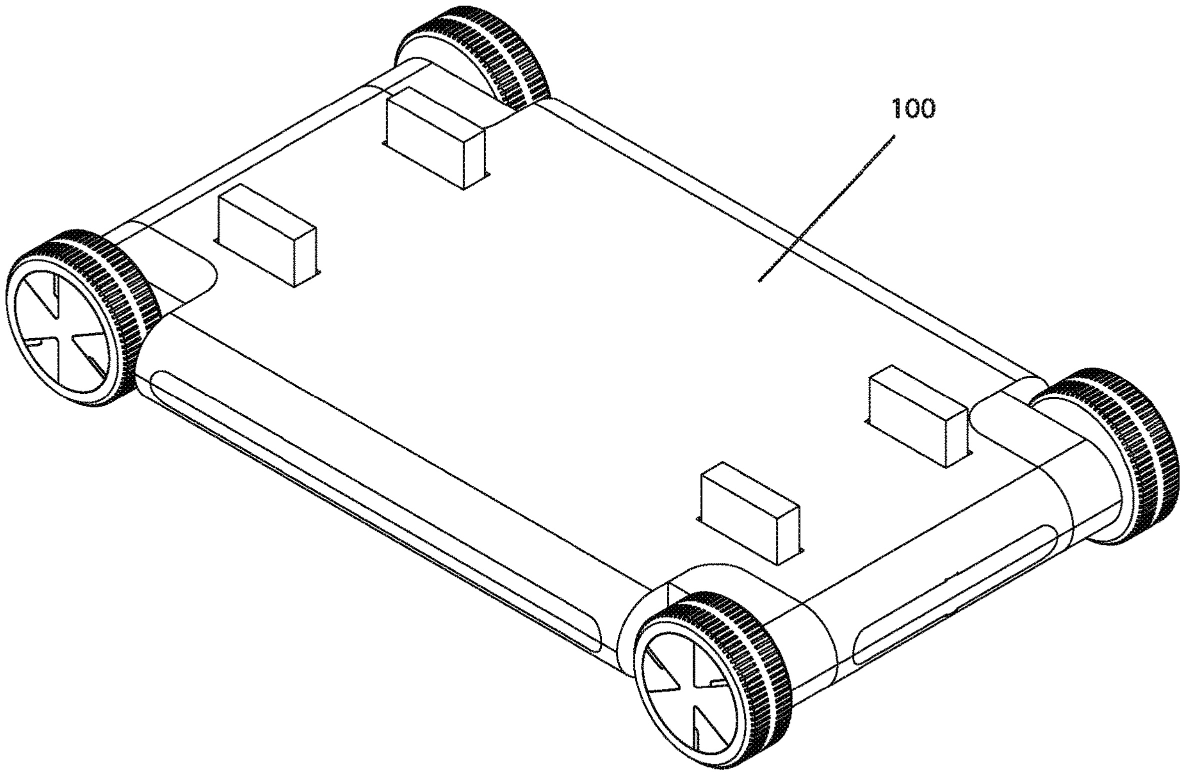
Figure 426B:
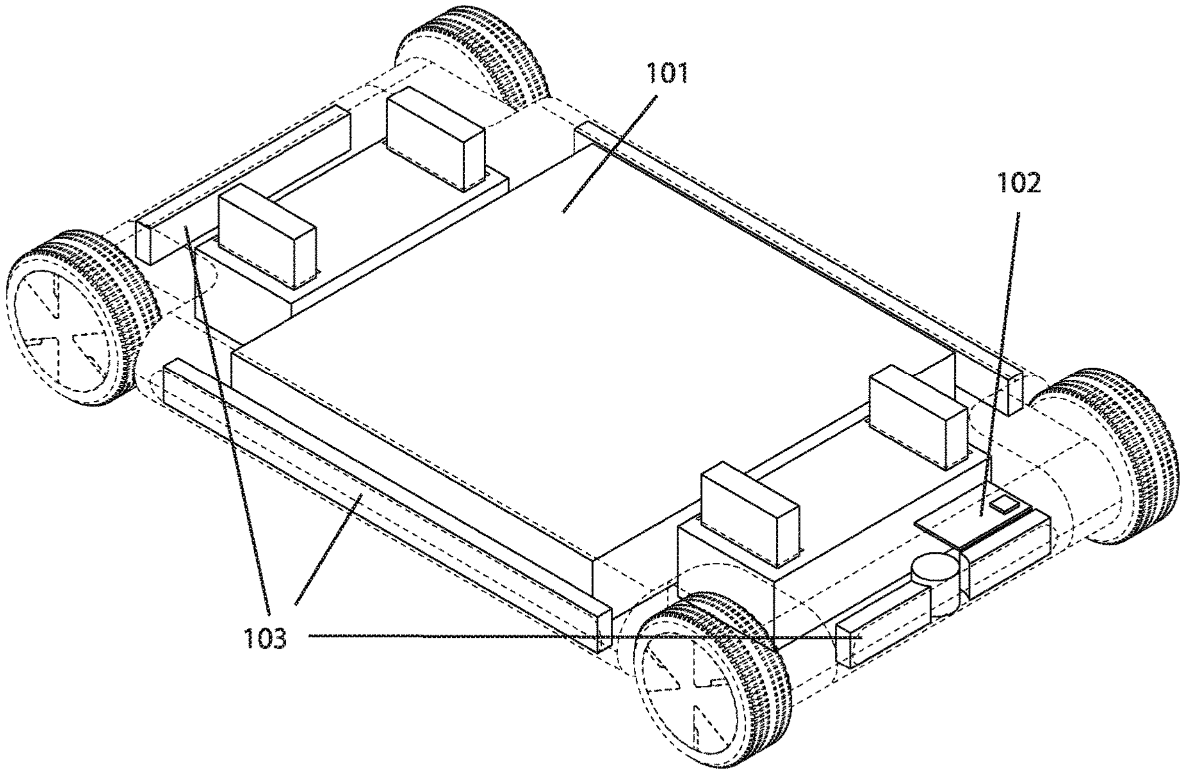

FIGS. 426A and 426B illustrate an example of a versatile mobile platform (VMP).

Figure 427:
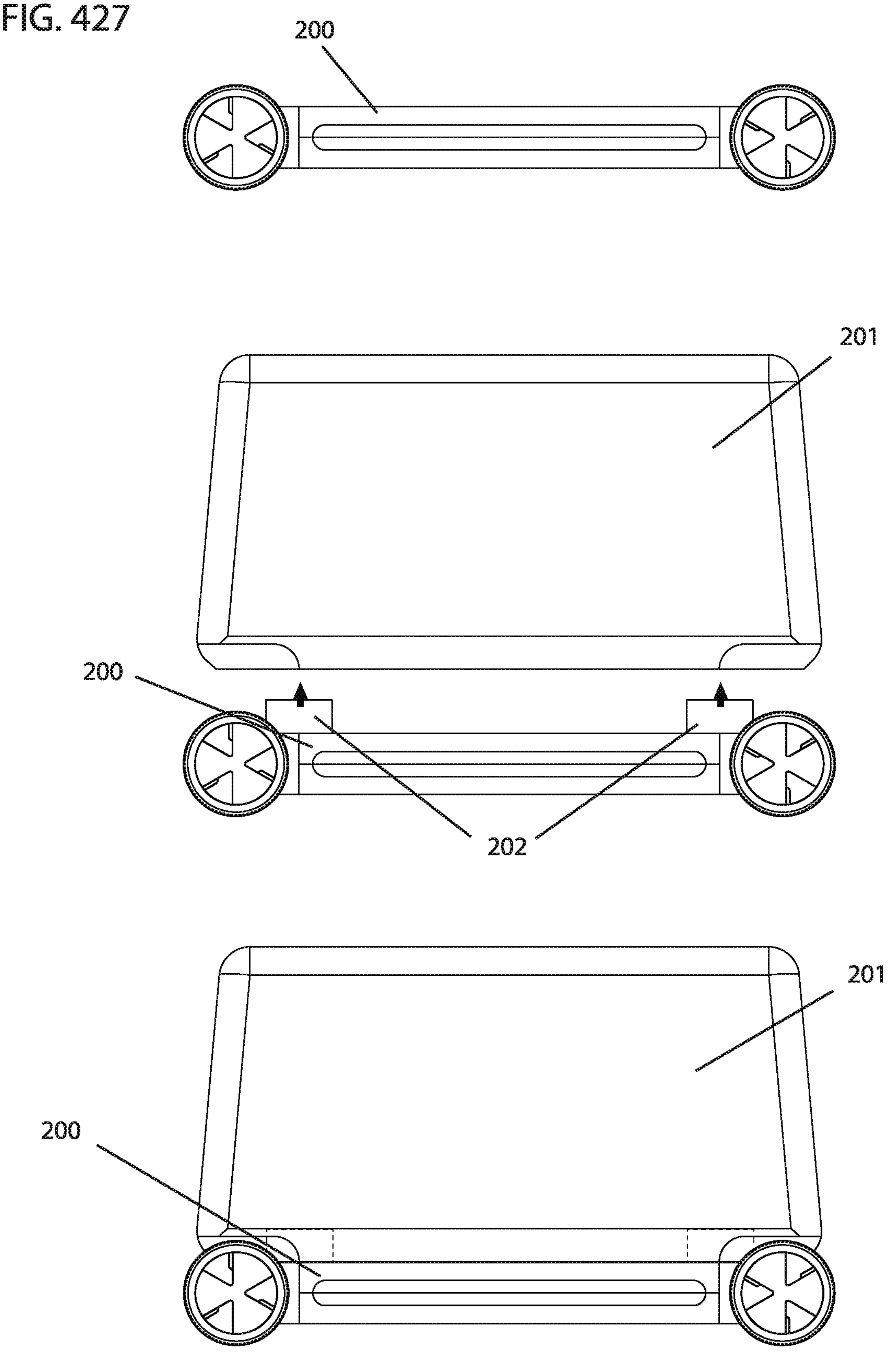
Figure 428:
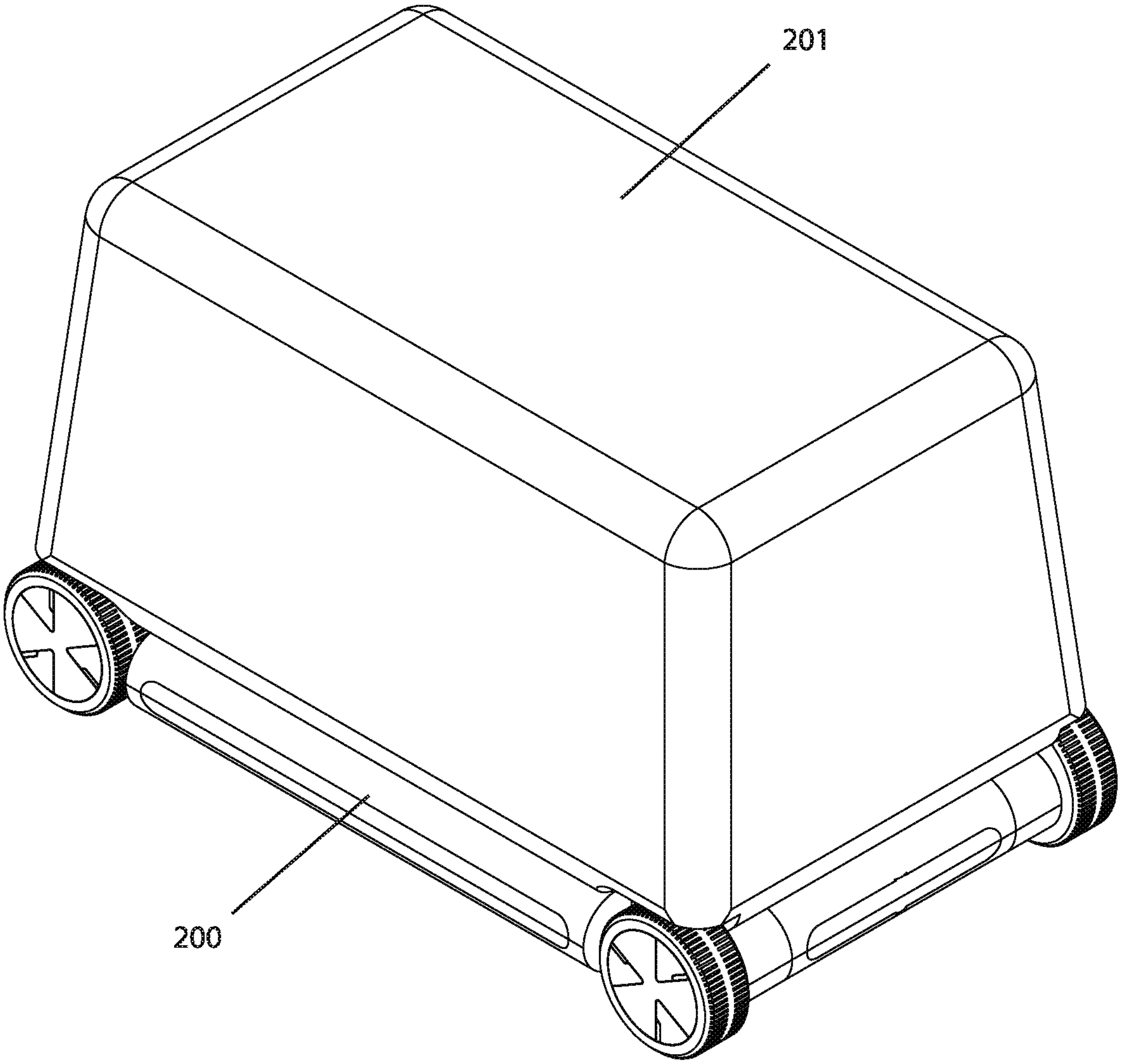

FIGS. 427 and 428 illustrate an example of a permanent coupling between a cabin and VMP chassis.

Figure 429:
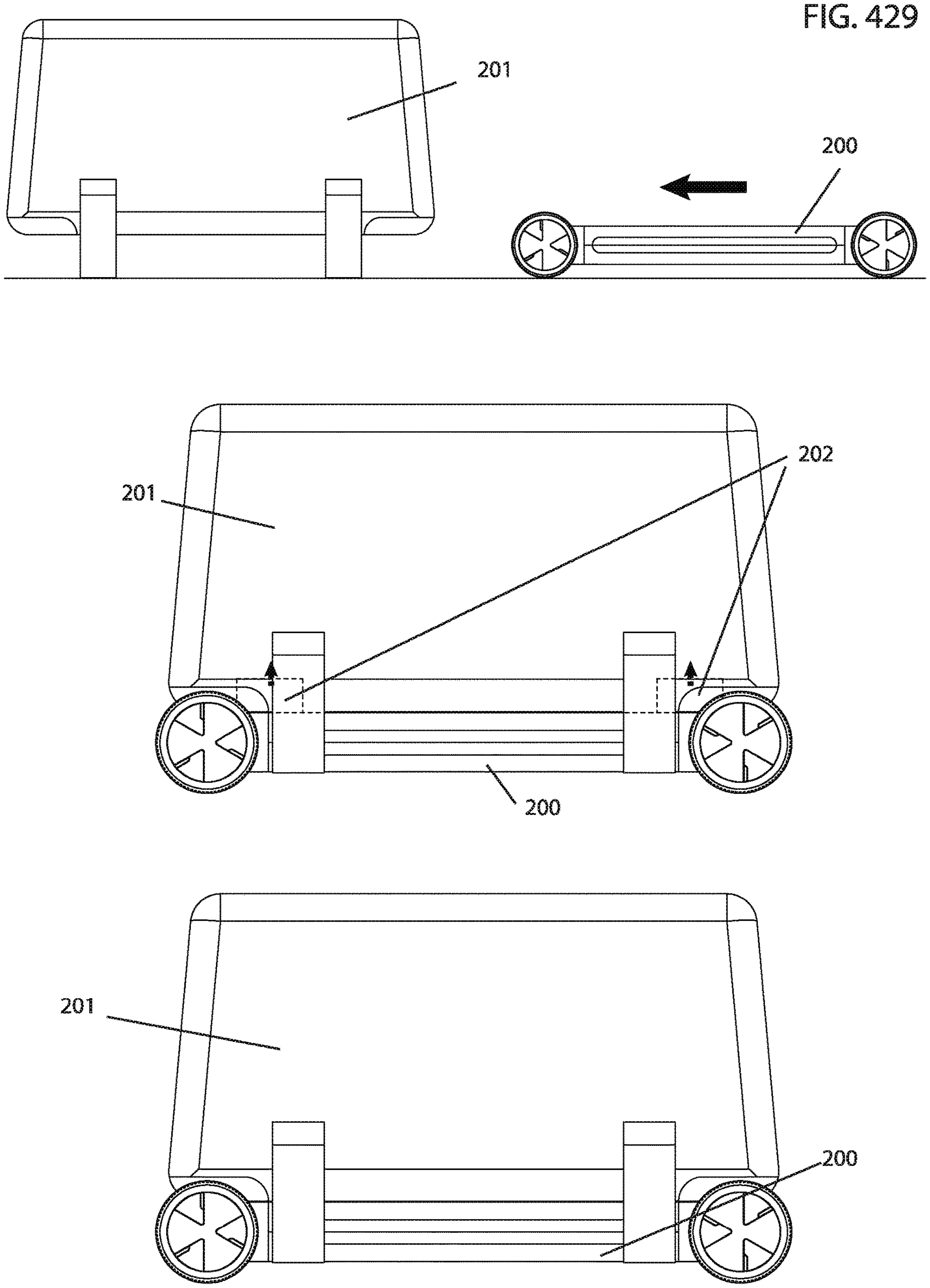
Figure 430:
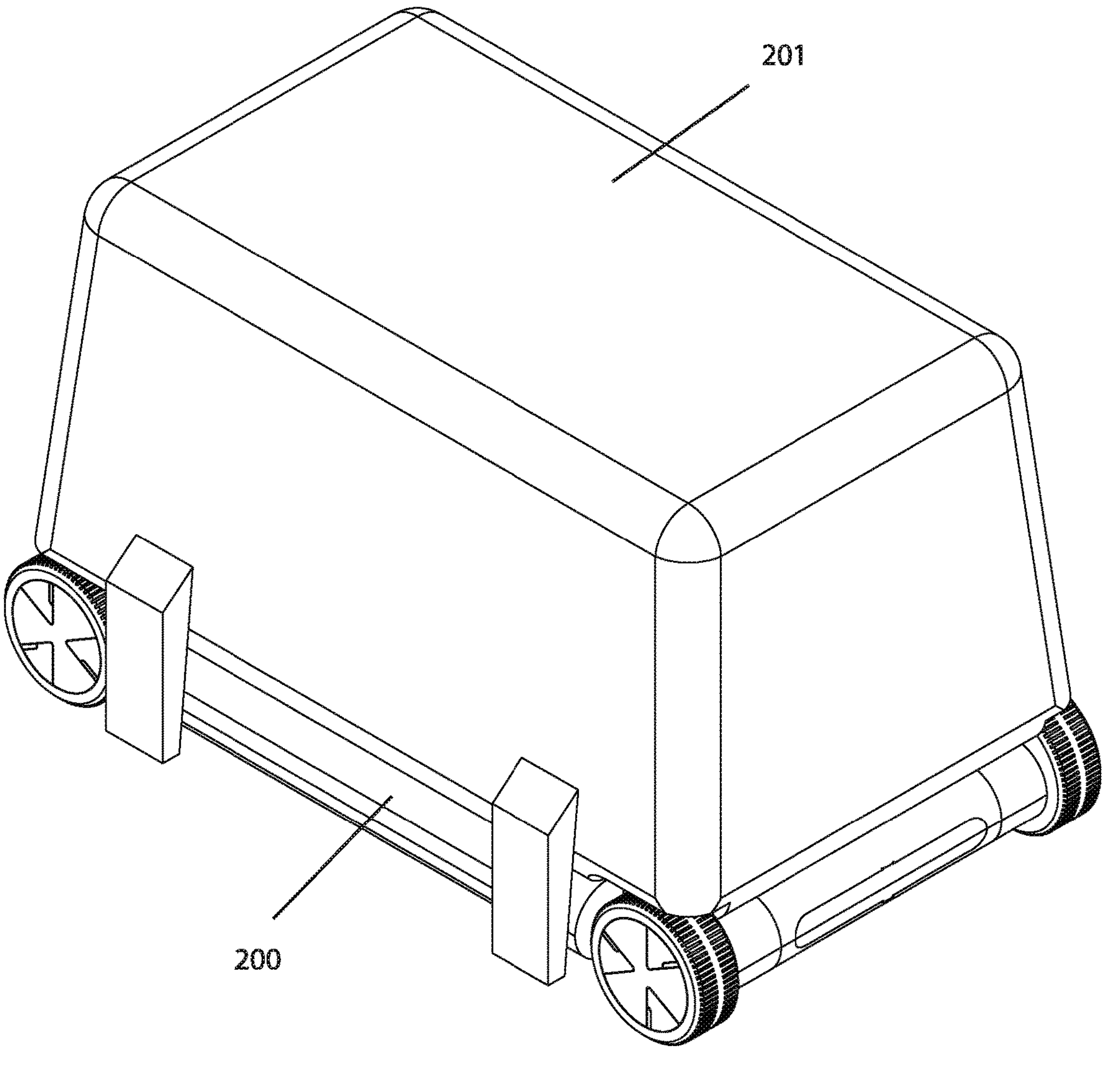

FIGS. 429 and 430 illustrate an example of a temporary coupling between a cabin and VMP chassis.

Figure 431:
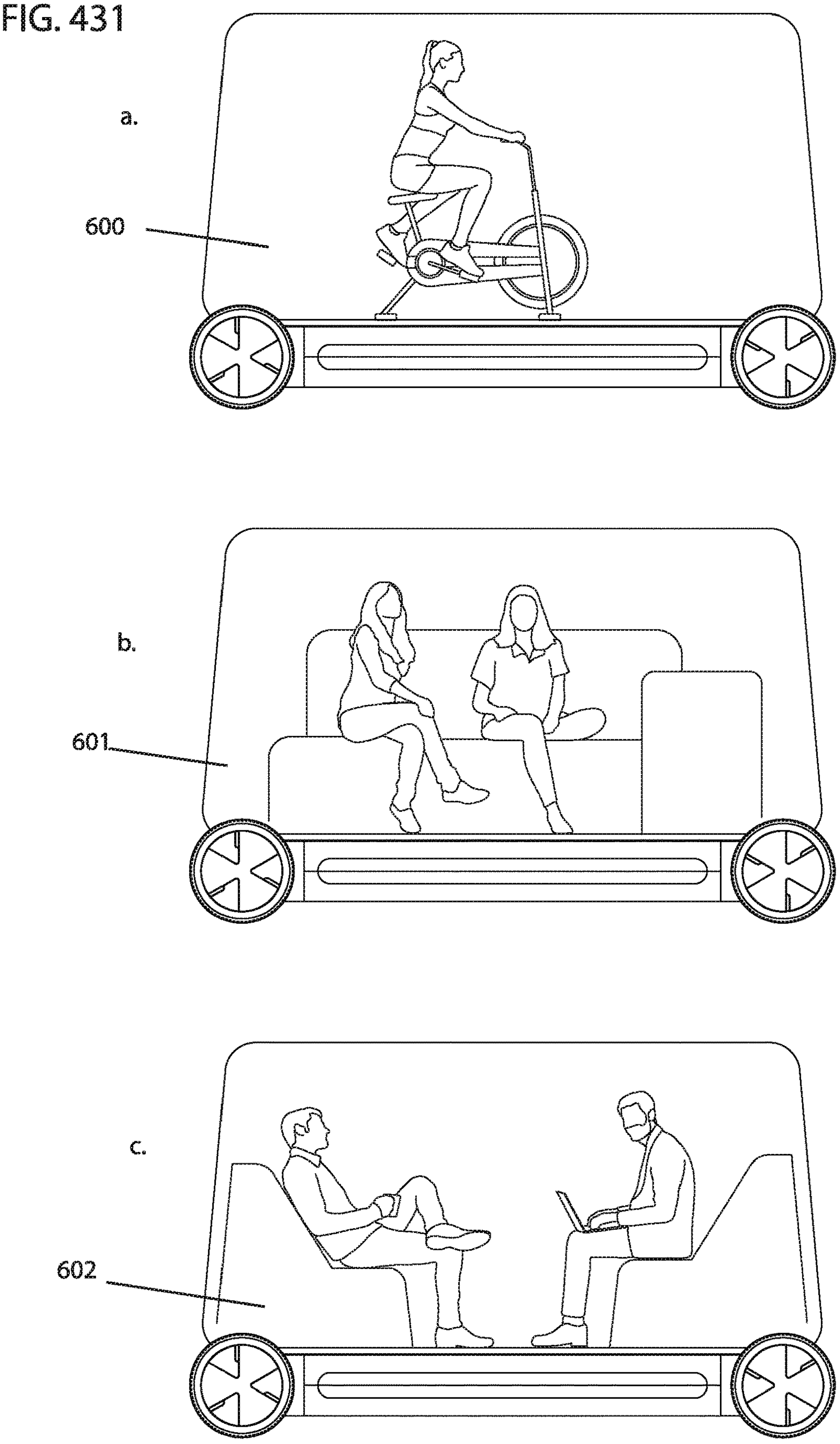
Figure 432:
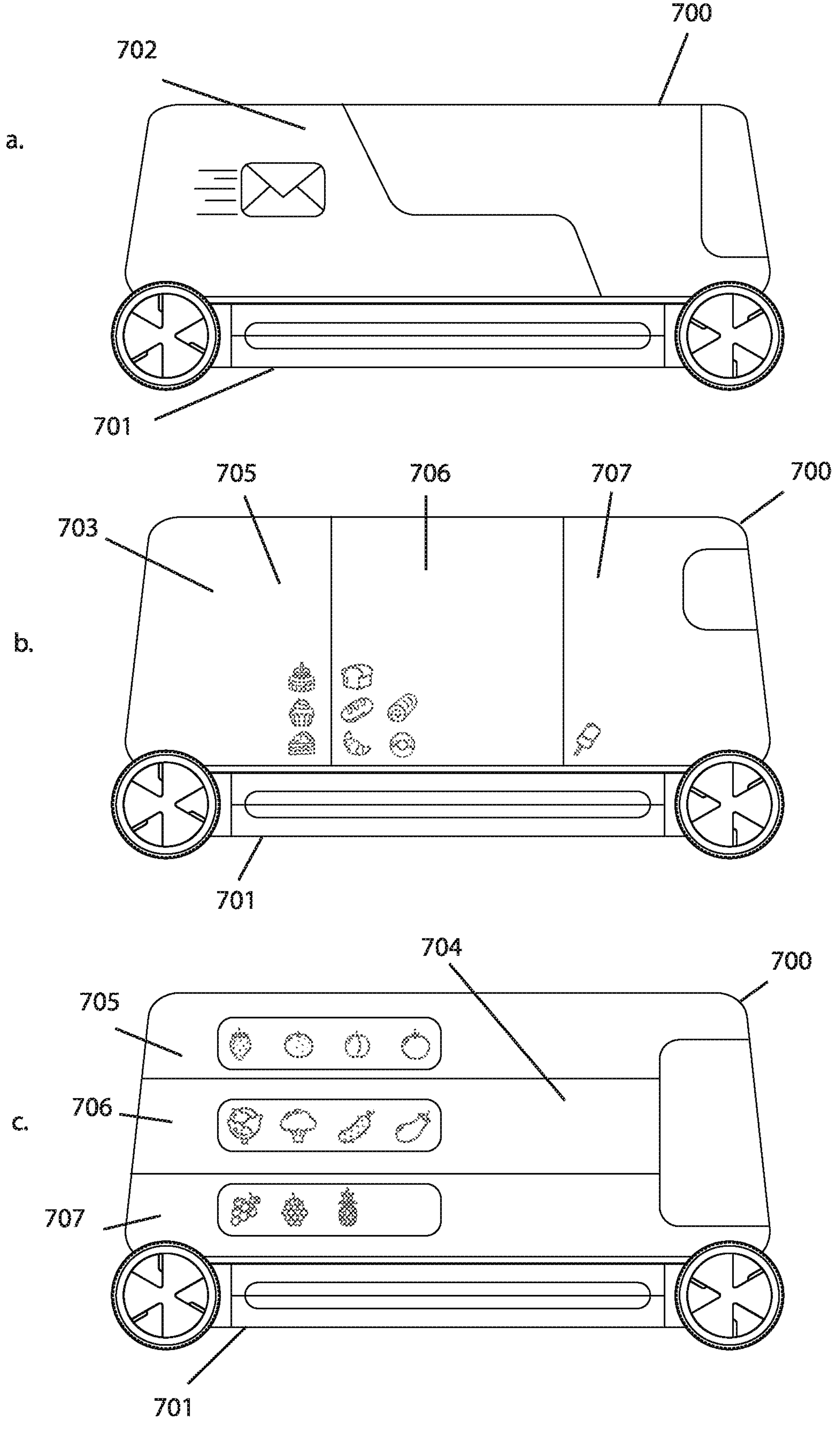

FIGS. 431 and 432 illustrate use case examples for a VMP.

Figure 433:
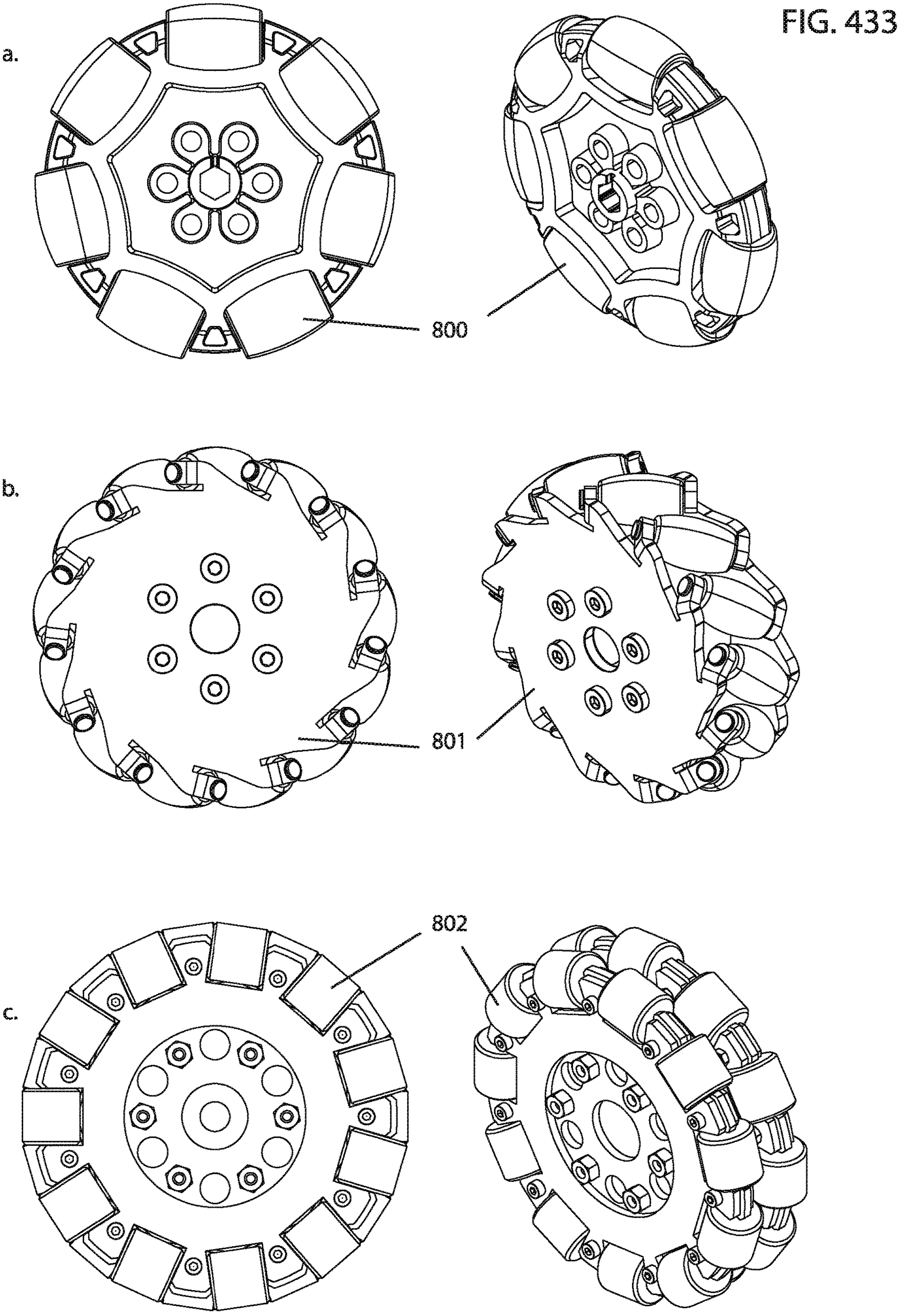

FIG. 433 illustrates examples of wheels of a robot.

FIGS. 434-438 illustrate various wheel types and wheel configurations of a robot.

FIGS. 439-442F illustrate various wheel axes configurations for wheels of a robot.

FIGS. 443-446C illustrate an example of a passenger pod use case for a VMP.

Figure 447:
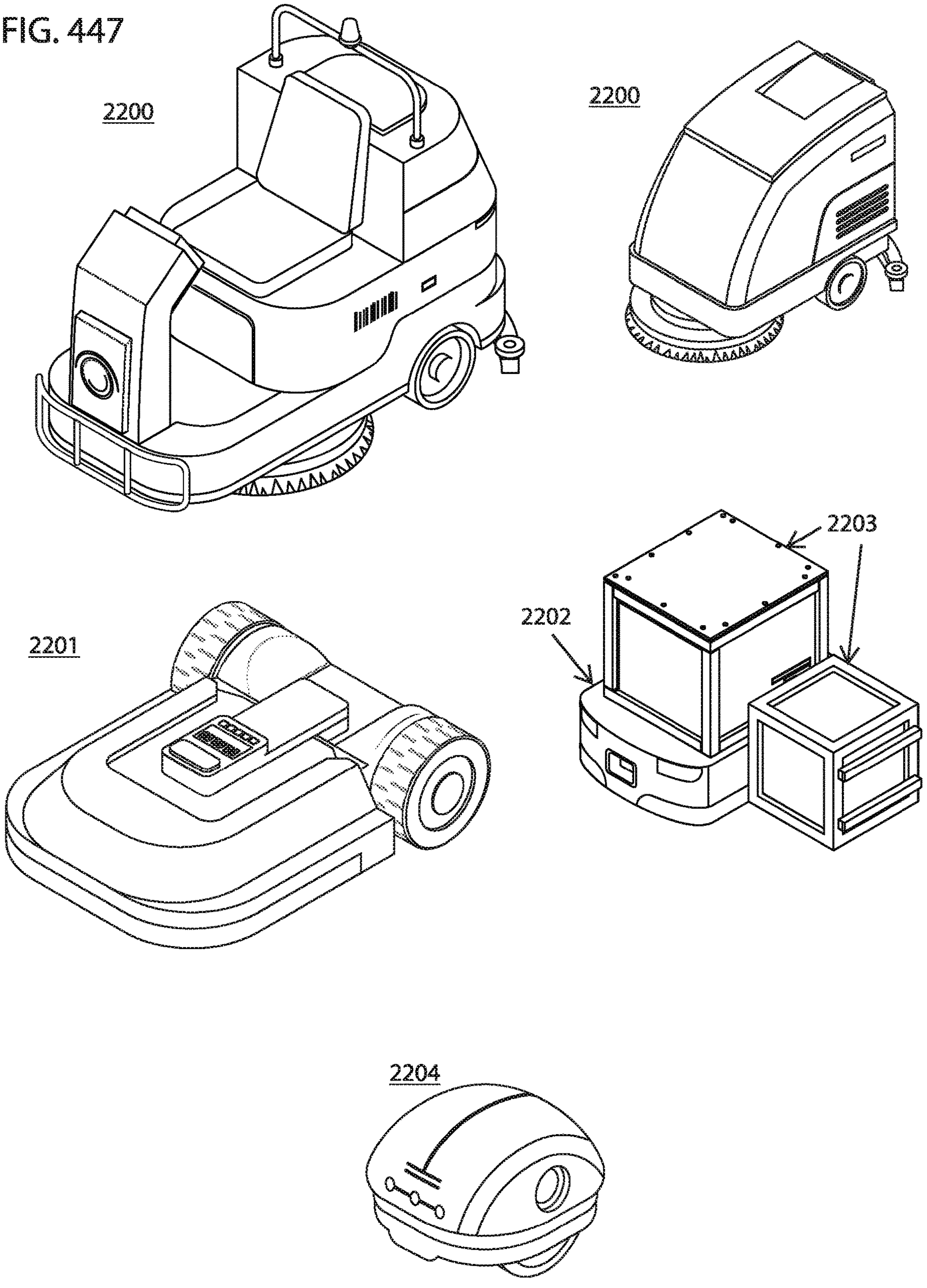

FIG. 447 illustrates use case examples for a VMP.

FIGS. 448-457 illustrate an example of a VMP customized to operate on a farm.

FIGS. 458-460C illustrate various examples cliff sensors of a robot.

Figure 461A:
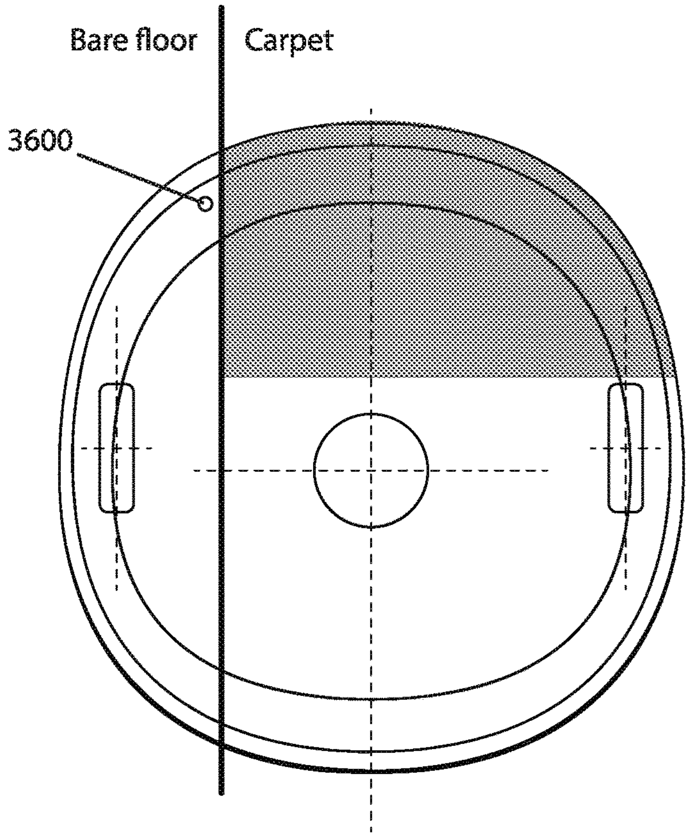
Figure 461B:
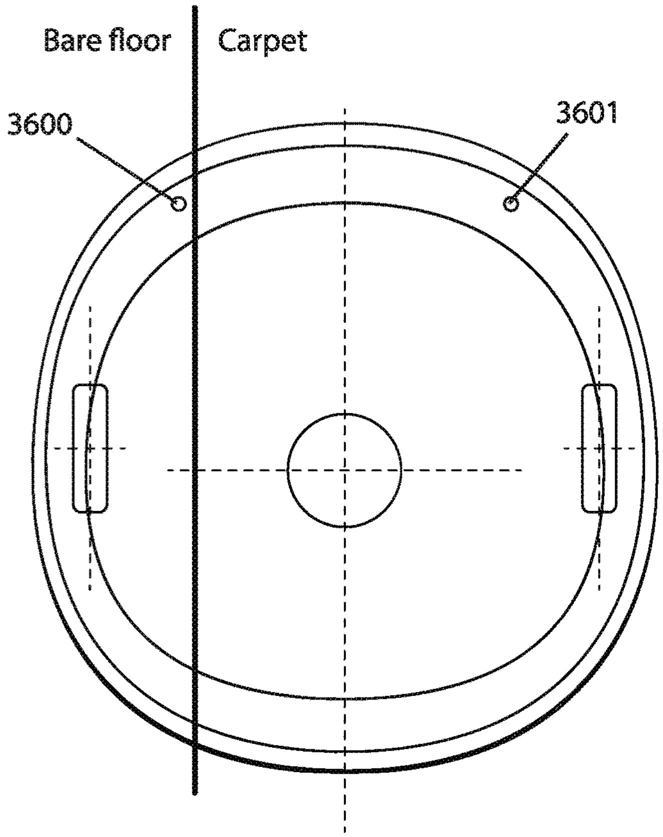

FIGS. 461A and 461B illustrate examples of floor sensors of a robot.

Figure 462A:
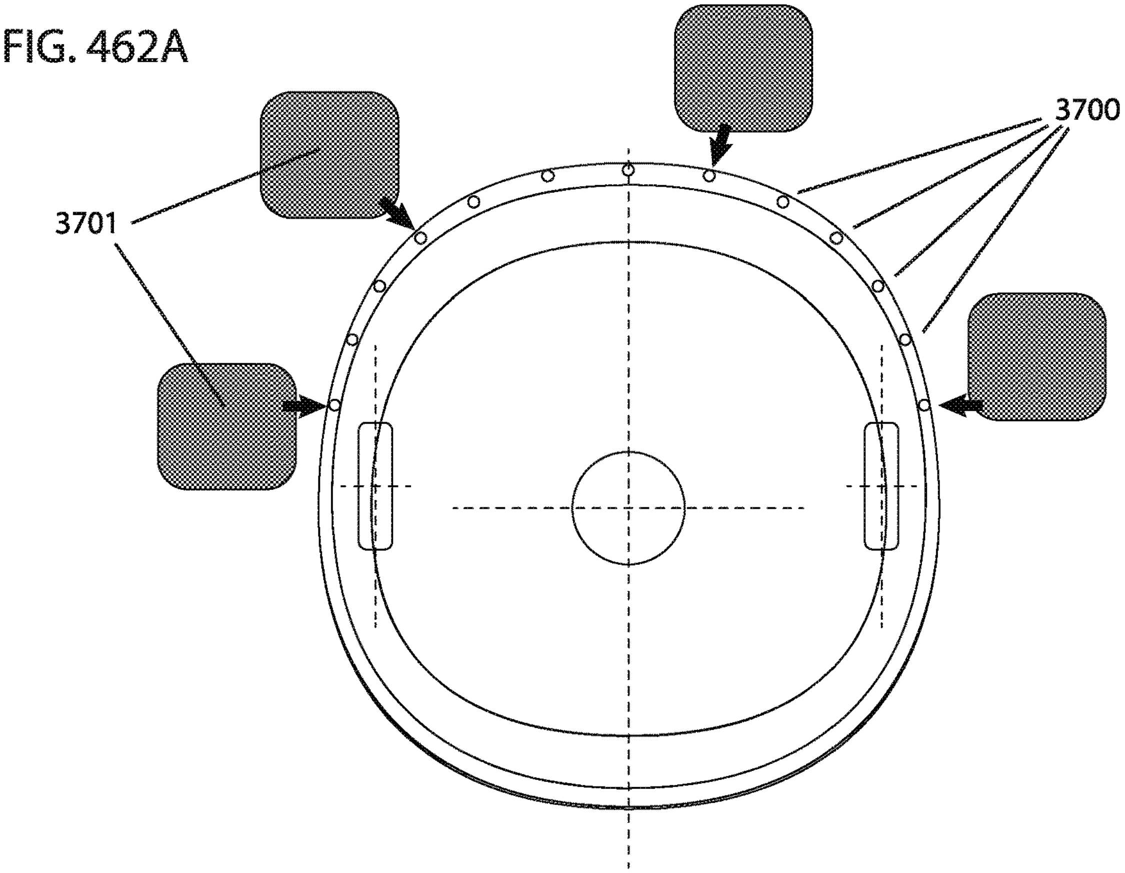
Figure 462B:
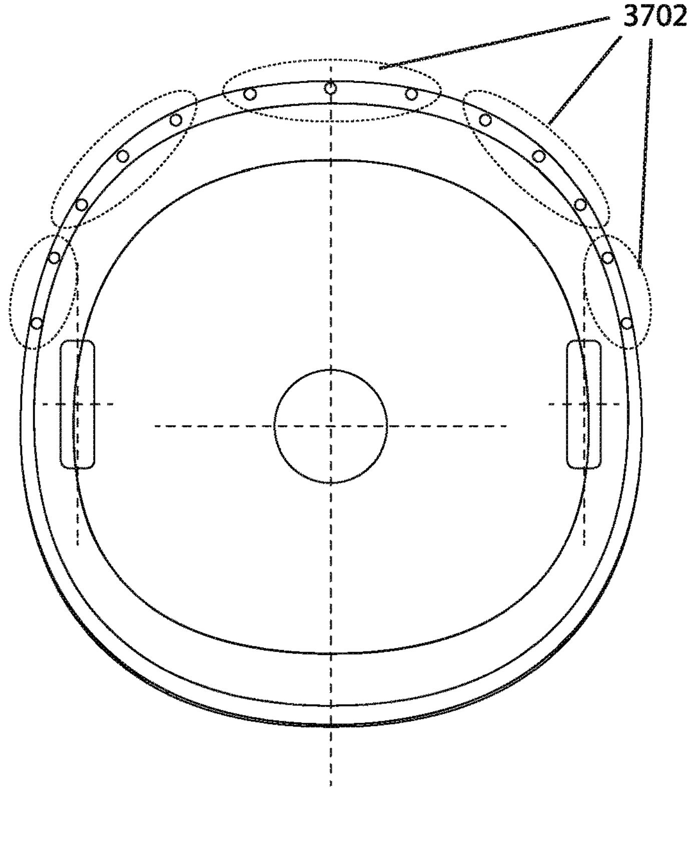

FIGS. 462A and 462B illustrate examples of bumper sensors of a robot.

Figure 463:
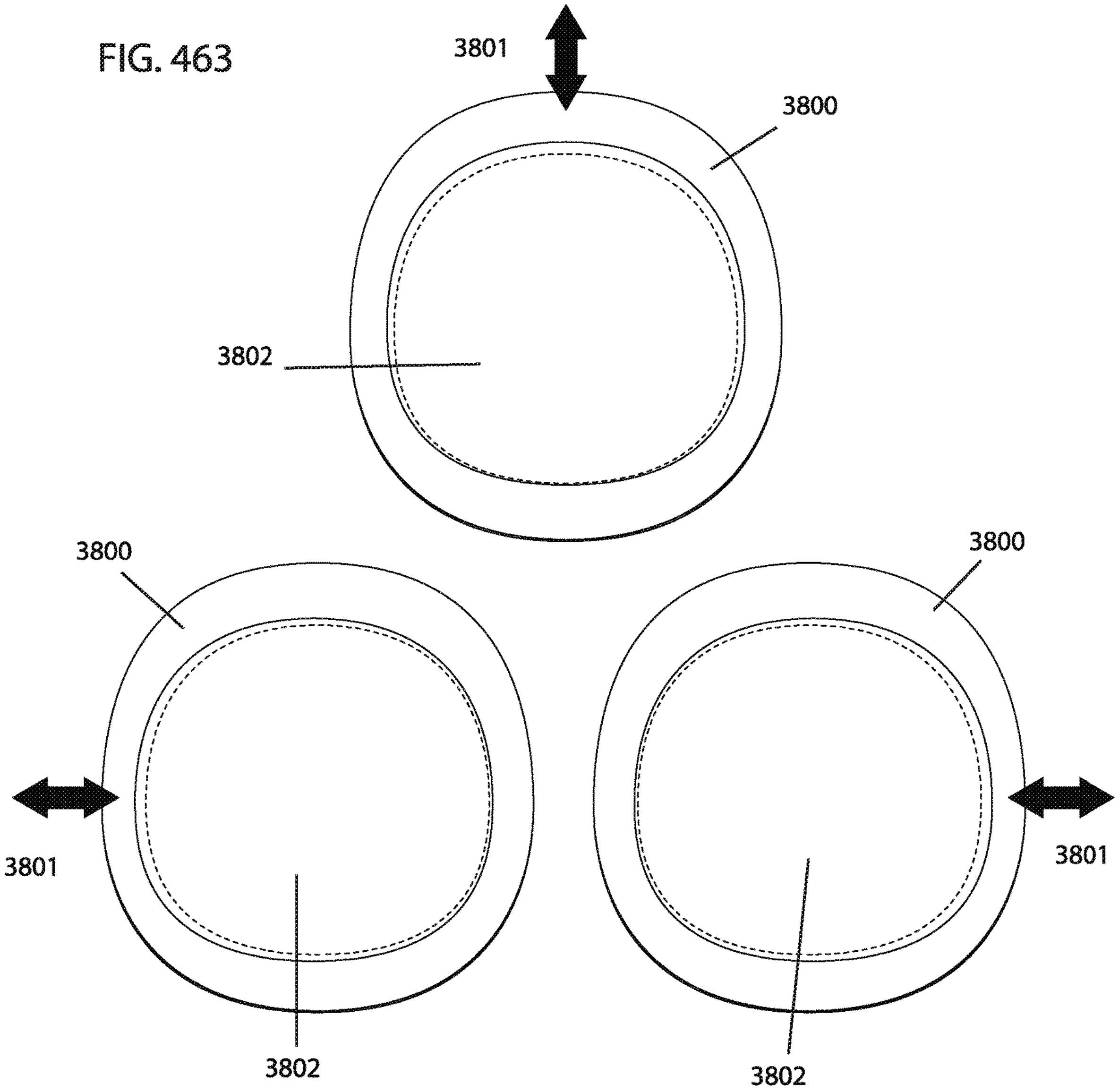

FIG. 463 illustrates an example of a bumper of a robot.

Figure 464:
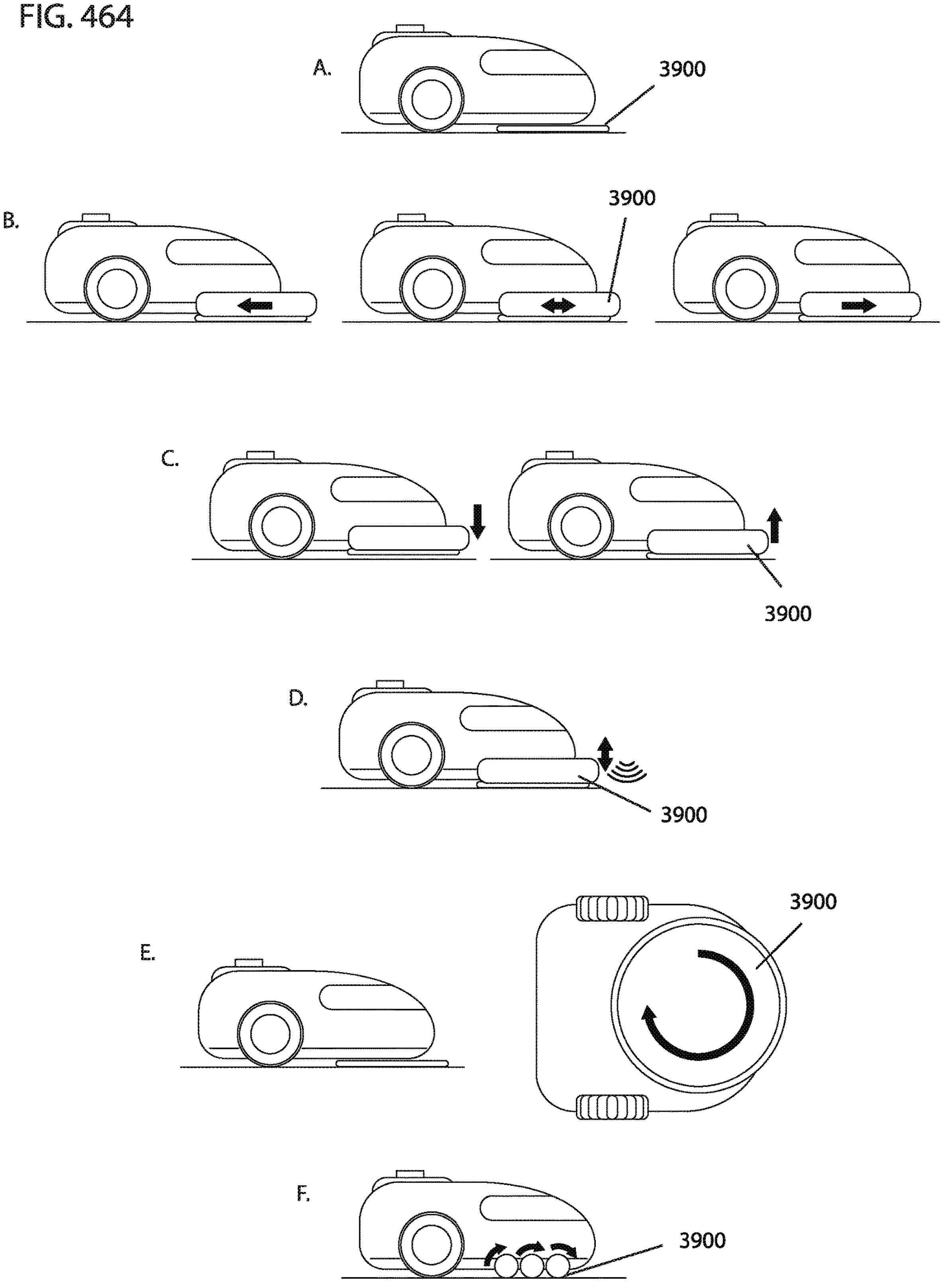

FIG. 464 illustrates examples of various mechanisms for a mopping attachment of a robot.

FIGS. 465A-475B illustrate an example of a VMP customized as a baby walker and a wheel assembly thereof.

FIGS. 476-480 illustrate using an application of a communication device paired with a baby walker to select settings and communicate with the baby walker.

FIGS. 481A-481G illustrate an example of a cleaning robot.

Figure 482:
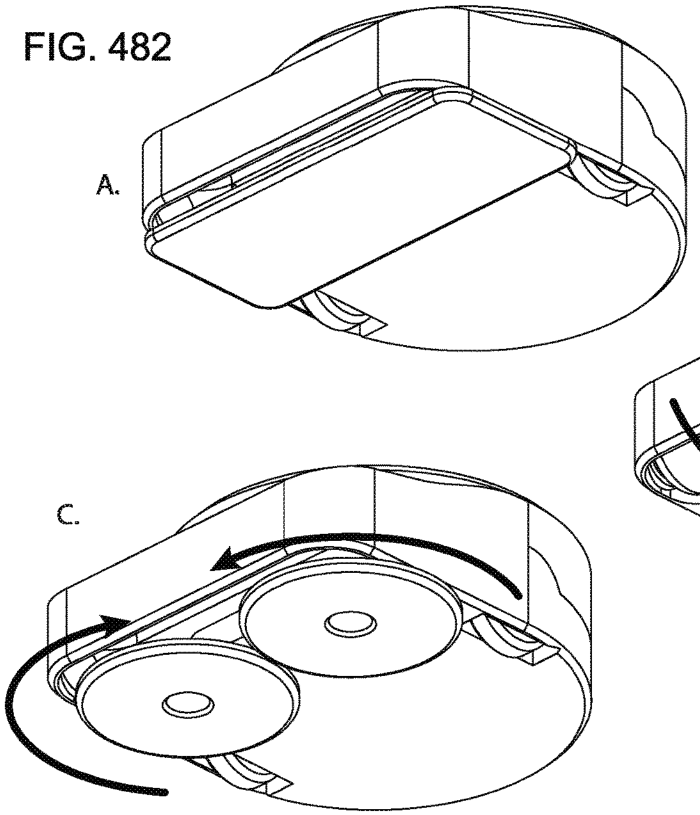

FIG. 482 illustrates different examples of cleaning pads.

FIGS. 483-486 illustrate an example of a handle attachable to a robot.

Figure 487A:
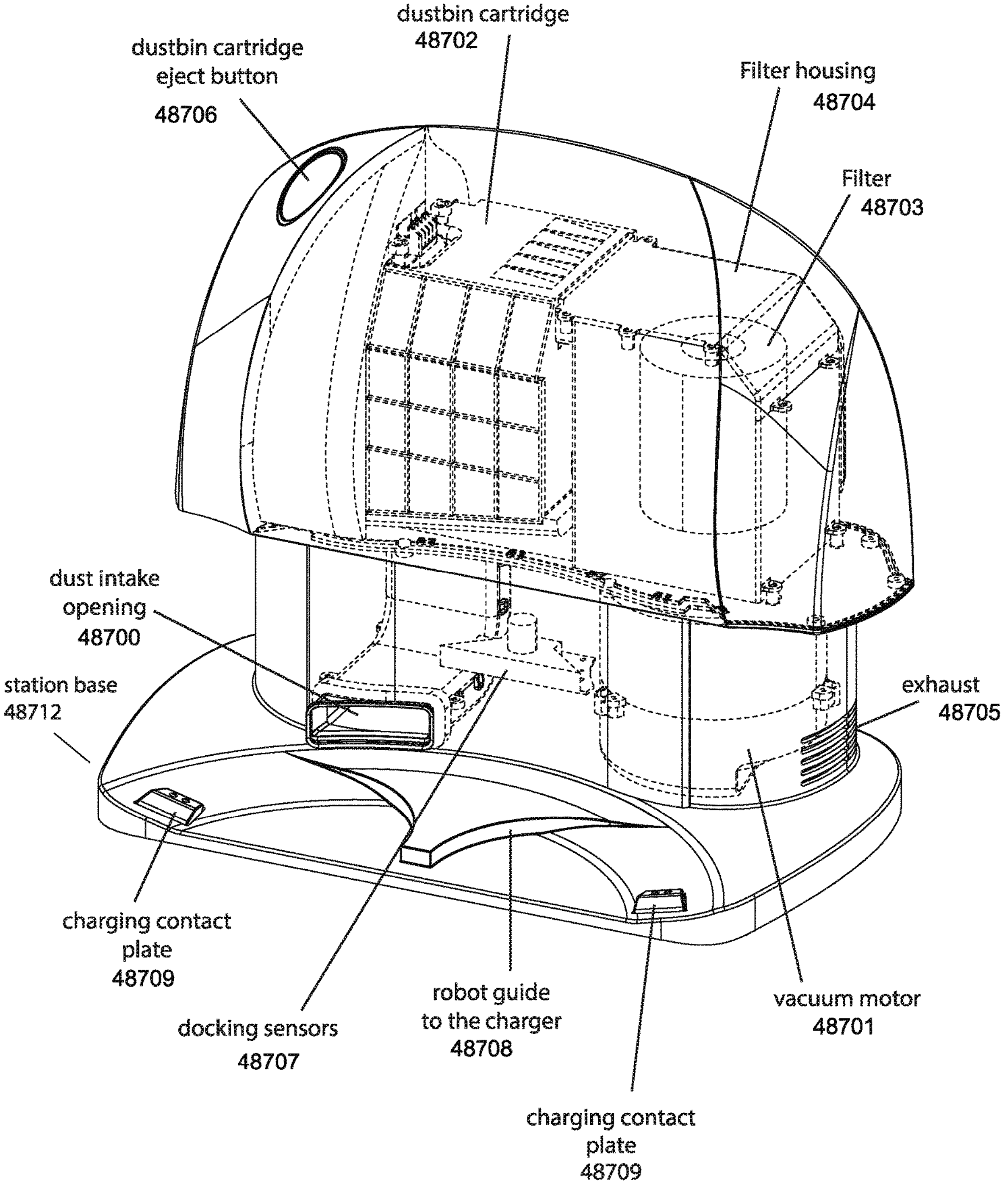
Figure 487B:
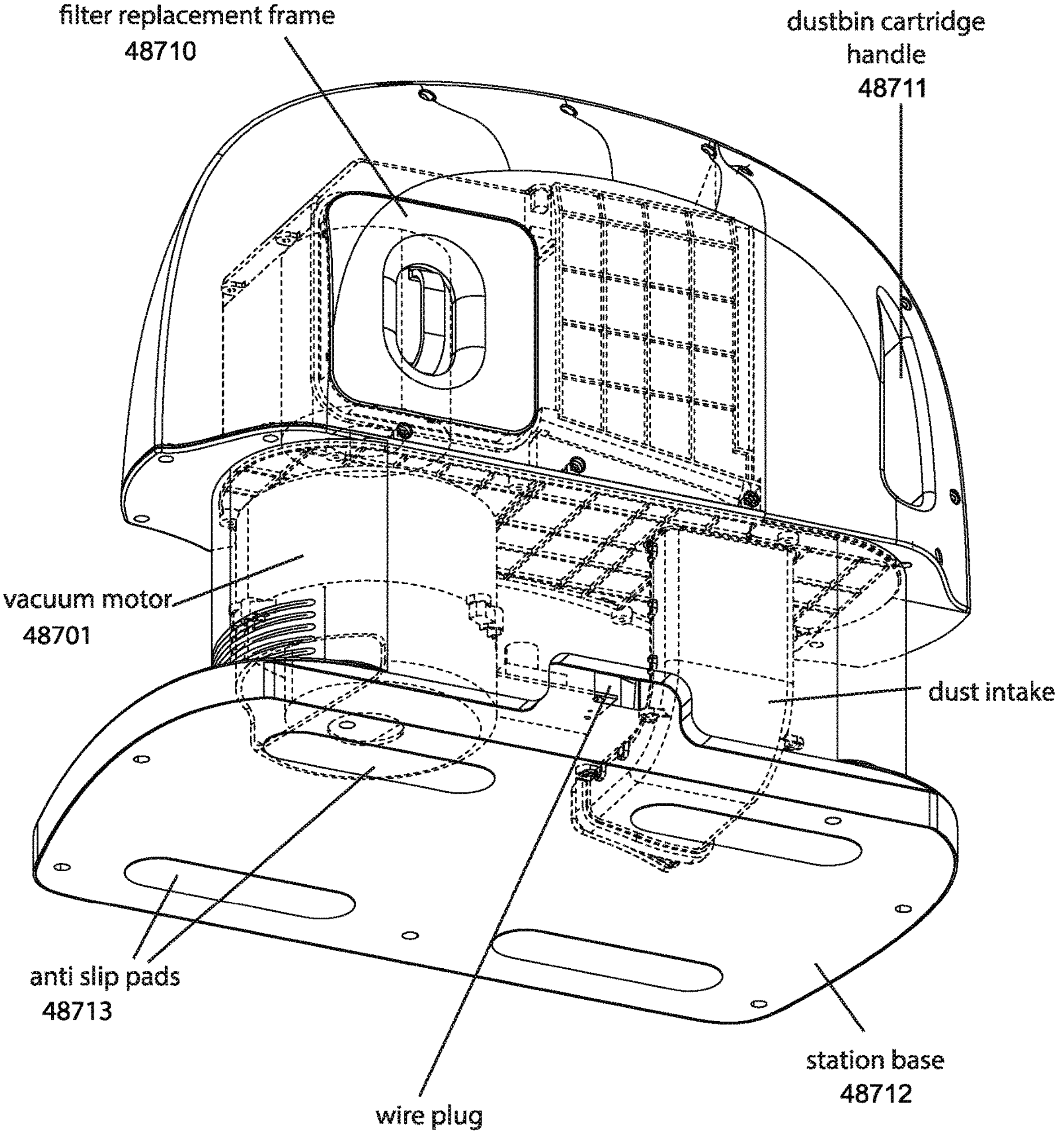

FIGS. 487A and 487B illustrate examples of a charging station of a robot.

Figure 488:
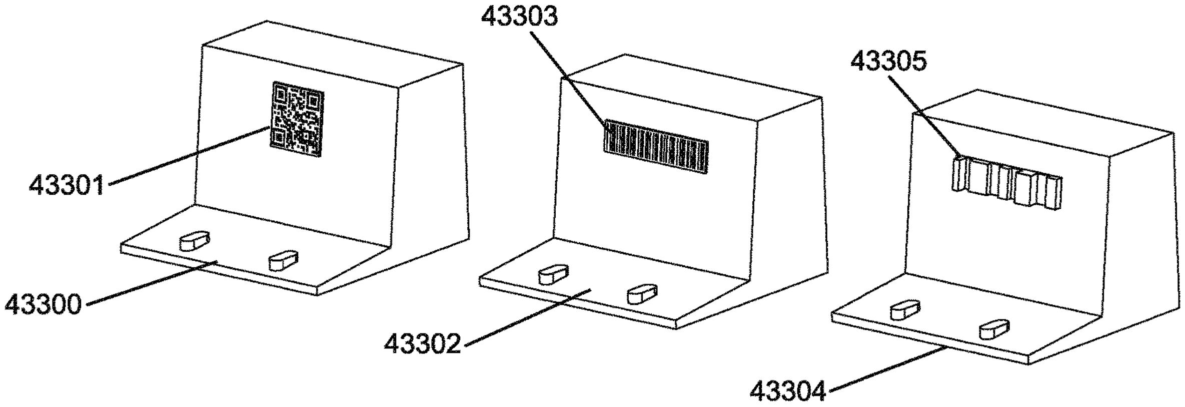

FIG. 488 illustrates an example of a charging station of a robot.

FIGS. 489-492 illustrate an example of a charging station with an auto empty feature.

FIGS. 493A-512 illustrate examples of a robot bumper.

Figure 513A:
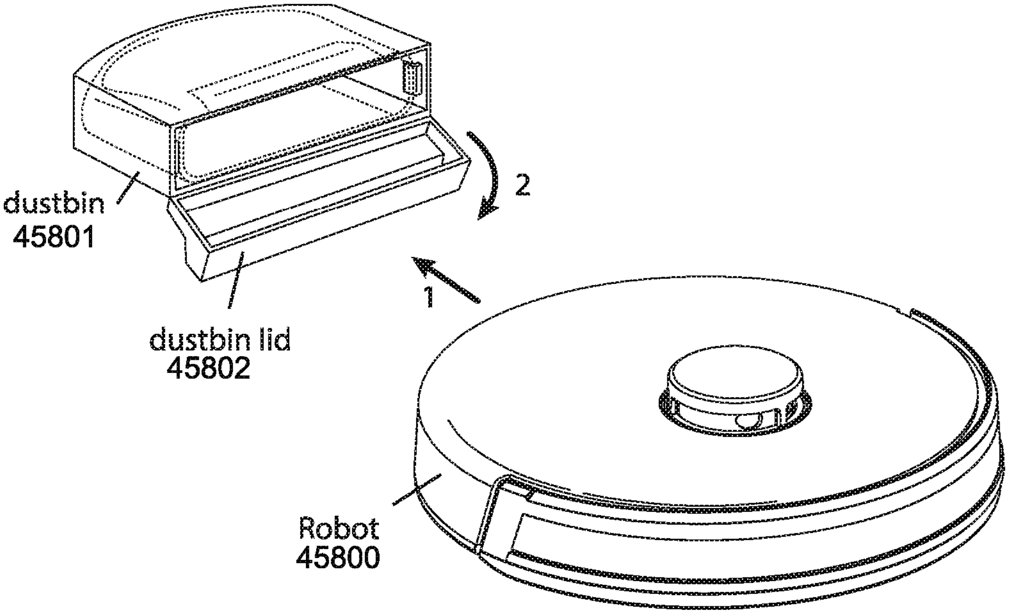
Figure 513B:
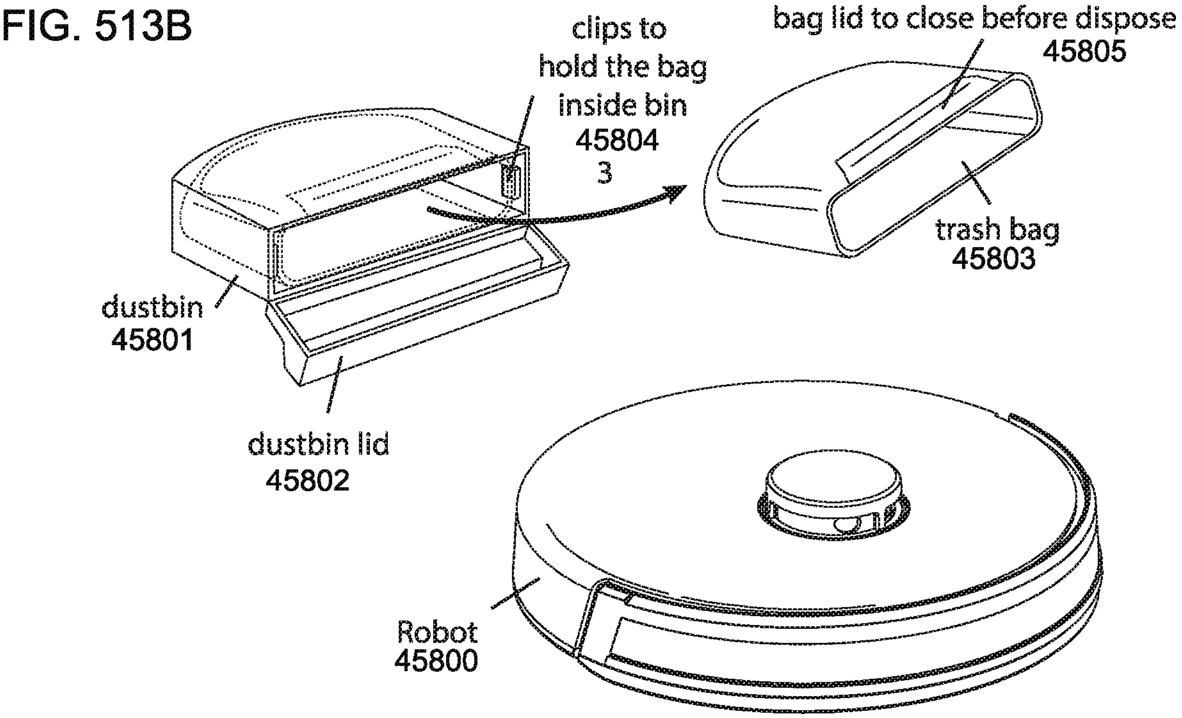

FIGS. 513A and 513B illustrate a robot vacuum cleaner with a detachable dustbin.

FIGS. 514A-514F illustrate an example of a robot.

Figure 515:
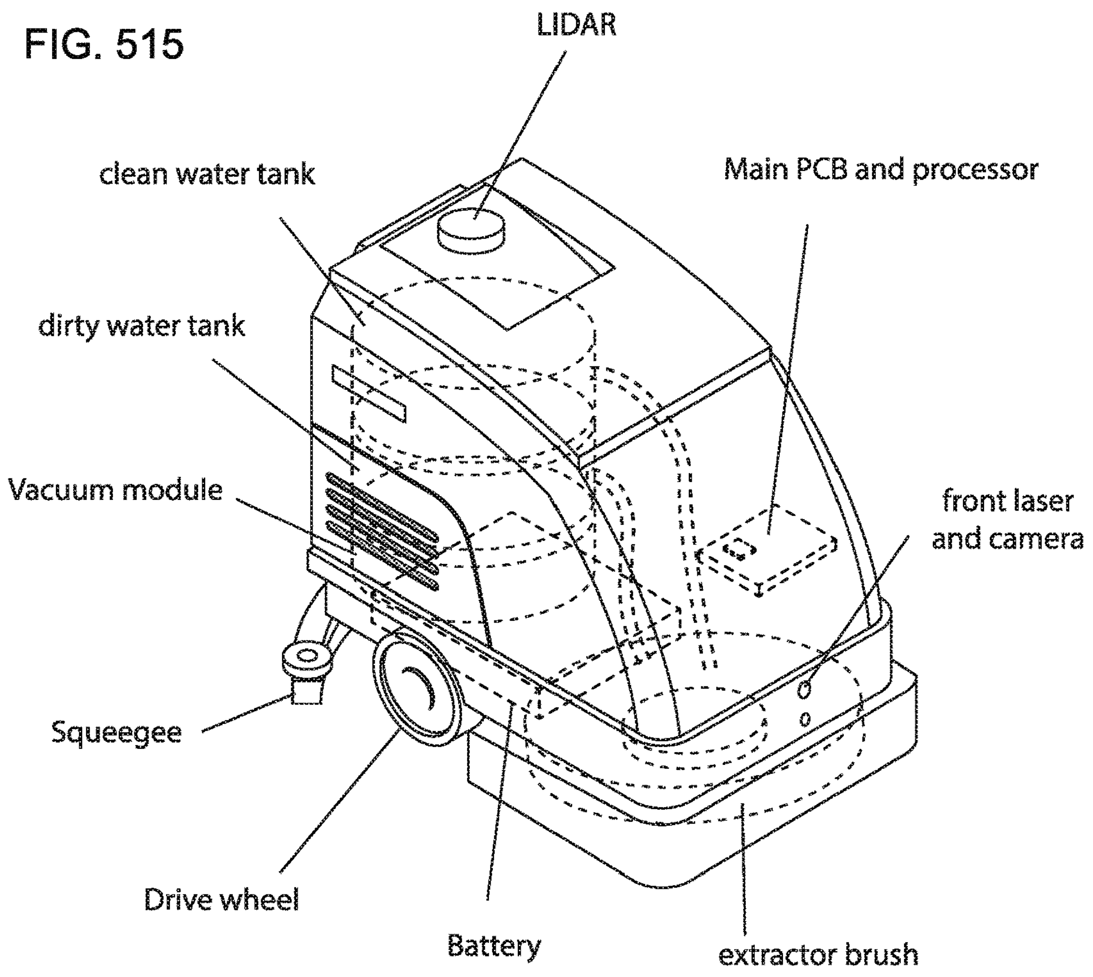
Figure 516:
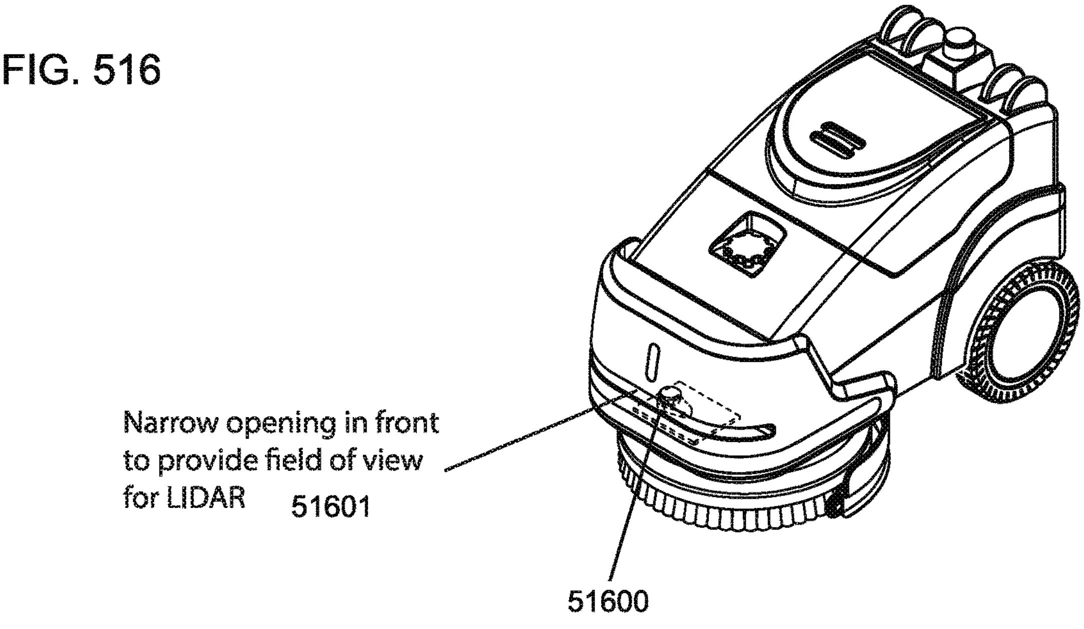

FIGS. 515 and 516 illustrate examples of commercial robotic cleaners.

FIGS. 517-549 illustrate examples of a built-in or standalone robotic vacuum maintenance station.

FIGS. 550-557 illustrate examples of a mobile robotic device and sensing components installed on loads to make them mobile and an application thereof.

FIGS. 558-564 illustrate examples of smart watches and their use in operating a robot.

FIGS. 565A-565E illustrate examples of an augmented reality (AR) headset viewport.

Figure 566:
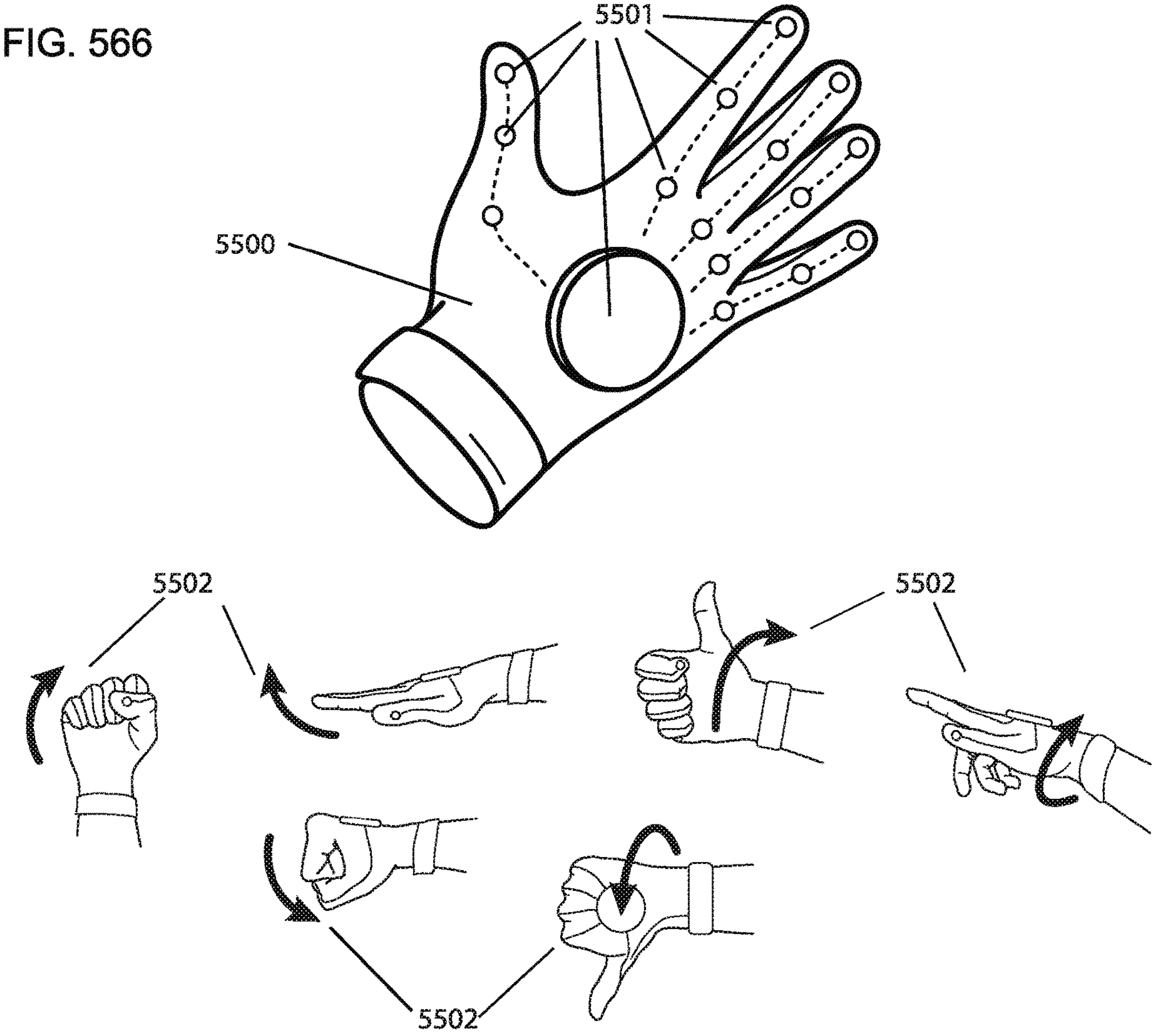

FIG. 566 illustrates an example of a virtual reality (VR) glove and associated gestures.

DETAILED DESCRIPTION OF SOME EMBODIMENTS

Embodiments provide a robot including, but not limited to including, one or more of a casing, a chassis including a set of wheels, a motor to drive the wheels, a receiver that acquires signals transmitted from, for example, a transmitting beacon, a transmitter for transmitting signals, a processor, a memory storing instructions that when executed by the processor effectuates robotic operations, a controller, a plurality of sensors (e.g., tactile sensor, obstacle sensor, temperature sensor, imaging sensor, LIDAR sensor, camera, depth sensor, TOF sensor, TSSP sensor, optical tracking sensor, sonar sensor, ultrasound sensor, laser sensor, LED sensor, etc.), network or wireless communications, RF communications, power management such as a rechargeable battery, solar panels, or fuel, and one or more clock or synchronizing devices. In some cases, the robot may include communication means such as Wi-Fi, Worldwide Interoperability for Microwave Access (WiMax), WiMax mobile, wireless, cellular, Bluetooth, RF, etc. In some cases, the robot may support the use of a 360 degrees LIDAR and a depth camera with limited field of view. In some cases, the robot may support proprioceptive sensors (e.g., independently or in fusion), odometry devices, optical tracking sensors, smart phone inertial measurement units (IMU), and gyroscopes. In some cases, the robot may include at least one cleaning tool (e.g., disinfectant sprayer, brush, mop, scrubber, steam mop, cleaning pad, ultraviolet (UV) sterilizer, etc.). The processor may, for example, receive and process data from internal or external sensors, execute commands based on data received, control motors such as wheel motors, map the environment, localize the robot, determine division of the environment into zones, and determine movement paths. In some cases, the robot may include a microcontroller on which computer code required for executing the methods and techniques described herein may be stored.

In some embodiments, at least a portion of the sensors of the robot are provided in a sensor array, wherein the at least a portion of sensors are coupled to a flexible, semi-flexible, or rigid frame. In some embodiments, the frame is fixed to a chassis or casing of the robot. In some embodiments, the sensors are positioned along the frame such that the field of view of the robot is maximized while the cross-talk or interference between sensors is minimized. In some cases, a component may be placed between adjacent sensors to minimize cross-talk or interference. In some embodiments, the robot may include sensors to detect or sense objects, acceleration, angular and linear movement, temperature, humidity, water, pollution, particles in the air, supplied power, proximity, external motion, device motion, sound signals, ultrasound signals, light signals, fire, smoke, carbon monoxide, GPS signals, RF signals, other electromagnetic signals or fields, visual features, textures, optical character recognition (OCR) signals, spectrum meters, and the like. In some embodiments, a microprocessor or a microcontroller of the robot may poll a variety of sensors at intervals.

Figure 1:
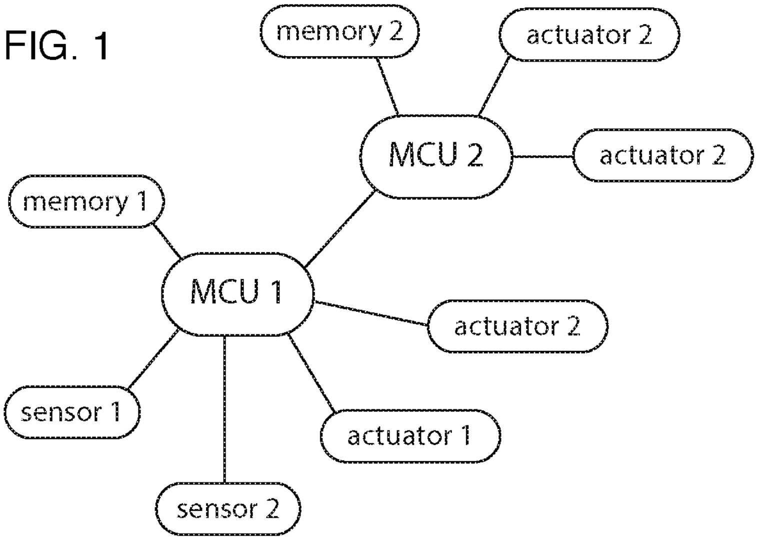
FIG. 1 illustrates a concept of local at a processor level.

In embodiments, local storage of the robot may comprise one or more memory locations that store software programs or code executed by the processor or a controller (e.g., MCU) of the robot to perform a specific function. A series of instructions may be coded into software, which, when executed, cause a predetermined function to occur on the robot or by the robot or a component thereof. Local storage may include multiple tiers or levels, some being closer to sensors and actuators and some further away. Therefore, the concept of local may include different levels and refer to the same processor or controller. FIG. 1 illustrates the concept of local at a processor level. Sensors 1 and 2, actuators 1 and 2, and memory 1 are local to MCU 1 while actuators 3 and 4 and memory 2 are local to MCU 2. In some contexts, local may have a meaning of the same physical embodiment. In this context, local is usually contrasted with cloud or remote or over the network. The network may be a LAN, AWAN, AMAN or another form of wired or wireless network or a combination of the above.

Figure 2:
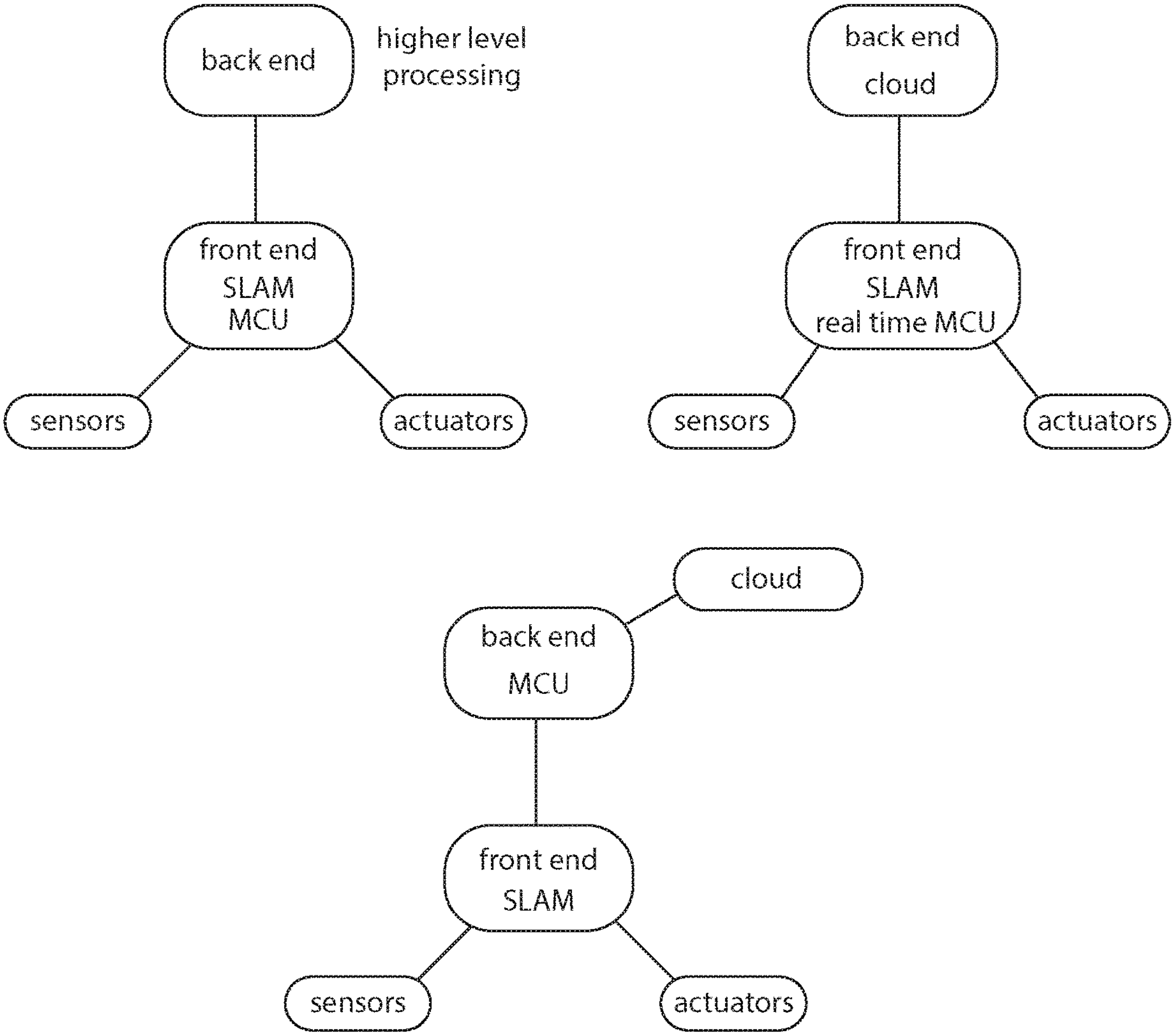
FIG. 2 illustrates examples of various processing architectures.

In embodiments, various processing architectures may be used. FIG. 2 illustrates examples of various processing architectures. FIG. 3 illustrates processing activities 300 executed on the cloud and process 301 for establishing connection with electronics 302 connected to the cloud as well as one another. Electronics may include a smart watch, mobile phone, laptop and desktop, robots, docking stations, router, etc.

Figure 4:
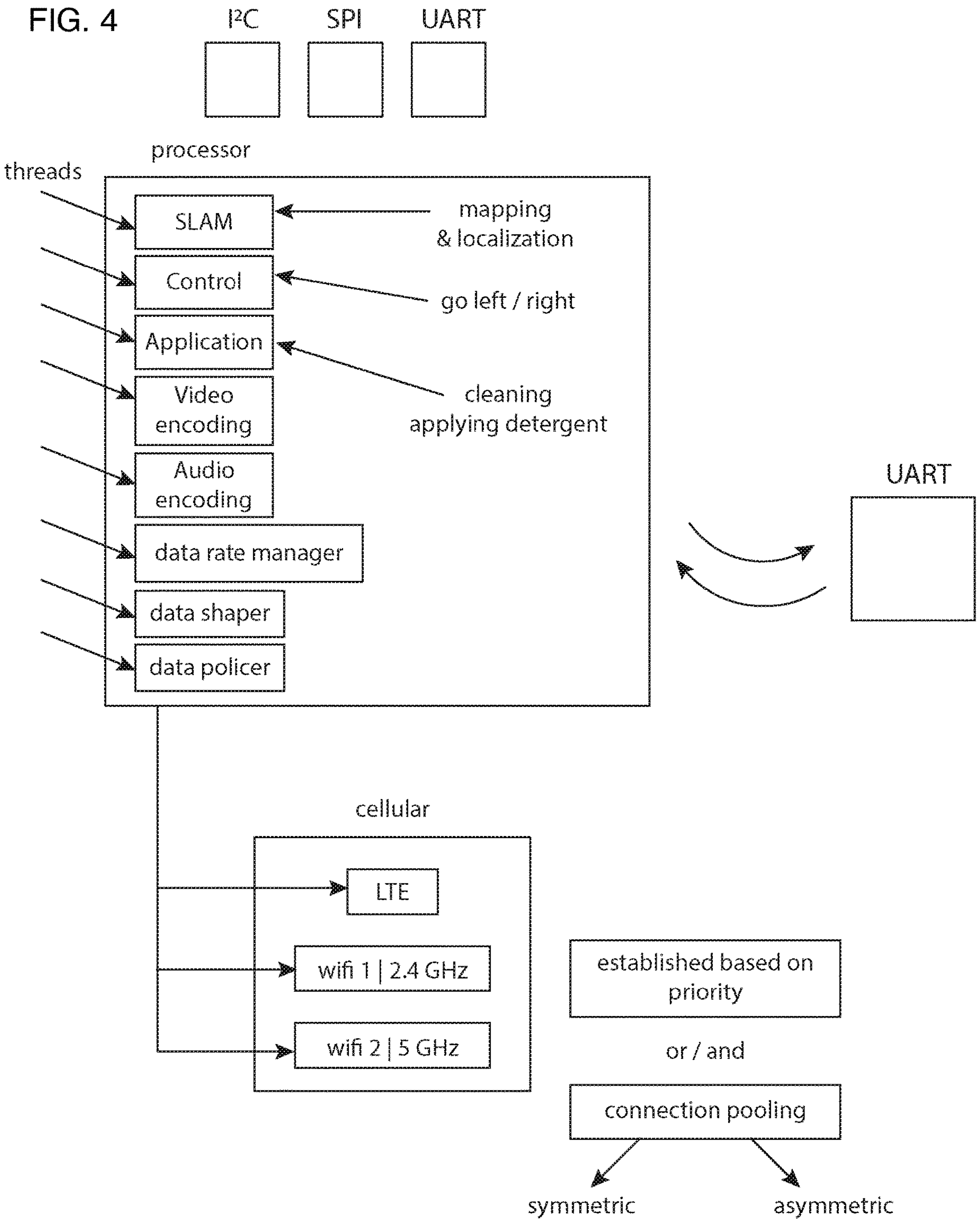
FIG. 4 illustrates examples of threads processed by the processor, bidirectional streams, and cellular connection.
Figure 5:
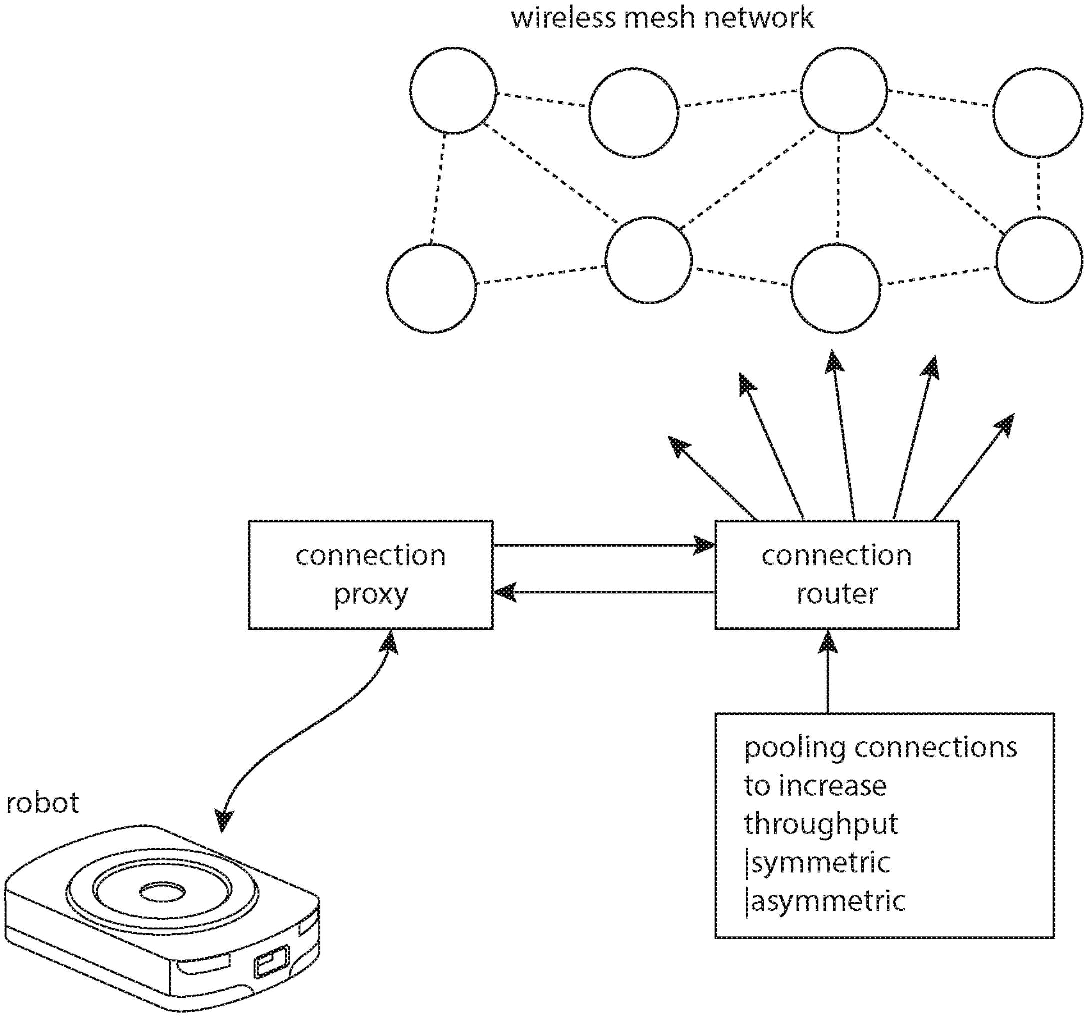
FIG. 5 illustrates a robot connected to a wireless mesh network via connection proxy and router.

In some embodiments, a homogeneous coordinate is formed by increasing dimensionality, such as increasing a dimensionality to a 3D vector such that rotation and translation are accommodated in a 4D linear. Some embodiments include a low throughput wireless node, a connected node, or a RF circuitry enabled node comprising a memory to store data and perform processing. In some embodiments, a depth capturing device is coupled with a processor of the node performing an act of coverage patrolling or point-to-point travel in an indoor environment, wherein the node performs the task and a map of environment generated by the node is sent to the cloud. In some embodiments, an image capturing component in the node recognizes objects. Some embodiments include a node in a network with RF circuitry with an antenna, a node that receives and transmits bidirectional RF communication, and a node that receives and transmits bidirectional data stream. Some embodiments include an apparatus with RF circuitry, a robot with RF circuitry capable of connecting to access points in a mesh network to transmit and receive information to and from the internet. Bidirectional packet streams may disconnect from one frequency when the quality of transmission is low or signal strength is low and connect to a different frequency or disconnect from one access point and connect to a different access point seamlessly. FIG. 4 illustrates threads processed by the processor, bidirectional streams, and cellular connection. FIG. 5 illustrates a robot connected to wireless mesh network via connection proxy and router. Connections are pooled symmetrically or asymmetrically to increase throughput.

In some embodiments, the robot comprises a machine learning system as described in U.S. Non-Provisional patents application Ser. Nos. 17/670,277, 17/344,892, and 17/494,251, each of which is hereby incorporated herein by reference, wherein the machine learning system is used in various tasks and operations of the robot. In some embodiments, the robot comprises a machine learning system including one or more connected computational entities organized in a graph comprised of nodes grouped in a series of layers. In some embodiments, the grouping of nodes in each layer may be linear, planar, spatial, or any other format, thus forming 1D, 2D, 3D, 4D or more dimensional arrangements. In some embodiments, data is fed into the input layer, serially propagating to a next layer such that output of a first layer is fed as input to a next layer, with at least one of the first or second layers being a hidden layer, and finally reaching an output layer, wherein a final output is one or more probabilities. In some embodiments, the output probabilities are associated with one or more inputs belonging to a category or class. In some embodiments, the output probabilities are a prediction, a judgment, or a classification. In some embodiments, a connection between the nodes, number of nodes, number of layers, arrangement of layers, and direction of flow of information are determined by a design. In some embodiments, the output of each layer at any point correlates to a set of values assigned to parameters of each layer, the values of parameter continuously updated after each iteration of a forward pass, extraction of gradient values, and in general, during network training. In some embodiments, upon training, the values of parameters converge such that when a never received input is fed into the network, a resulting output is reasonably consistent with expectation. In some embodiments, the neural network generates its own training to make reliable predictions on new (i.e., never-received) data. In some neural networks, connections between layers may be dense, sparse, or full mesh, while in other networks, all of dense, sparse, and full mesh connection types may be used depending on the specific layer. Some embodiments may contain a system wherein a filter may be provisioned after each layer. In some embodiments, a convolution is performed on the input of each node in each layer using a filter that generates an output. In some embodiments, a sparse connection may be used in hidden layers where a neuron in one hidden layer could receive input from a subset of nodes in the previous layer.

A ML system employing traditional ML, neural networks, transfer learning, or a combination of these is used to improve navigational experience (i.e., obstacle detection and avoidance), path planning, path rerouting, localization, mapping, sensing, positioning and repositioning, relocalization, increasing map density and dimensionality, speed adjustment, and such. A ML system may further be used for visual recognition (other than or in addition to obstacle recognition), speech recognition, facial recognition, emotional recognition (e.g., visual or audio based emotional recognition), personality recognition, etc. A ML system may further be used to improve experiences based on historic realizations/experiences, a strategy, a series of strategies, a behavioral pattern, a game plan, and an alliance with another robot or AI system. In some embodiments, learning is transferred, wherein a first learning system narrows down information, an identification, an action, etc. and transfers the learning down to a second learning system. A transfer learning system uses pre-trained weights on data sets including an enormous number of examples and then uses smaller data sets to fine tune a decision, a classification, an action, a plan, a prediction, etc. A causal structure is developed to design a transfer learning system. An example of a causal relation is sunshine (A)→use sunglasses (B). In this example, sunshine (A) causes the use of sunglasses (B) and when a probability of (A) changes, the ration between (A) and (B) does not change (i.e., probability p (B given A) does not change even though probability p (B) does change when probability p (A) changes). Formally, a domain includes a feature space X, wherein the marginal probability distribution is P(X), $X=\{x_1,x_2, \ldots ,x_n\}=X$ or $D=\{X, P(X)\}$, and a task has a label space Y and an objective predictive function $T=\{Y, f(x)\}$. Function f: X→Y, wherein function f predicts a label f (x) of a new instance of x and the task is learned from training data $\{x_i,y_i\}x_i \in X$ and $y_i \in Y$. A source domain $D_s$ and a learning task in a source domain $T_s$ is used to transfer learning to a target domain DT, different than source domain $D_s$, such that a learning task in a target domain TT is improved when a target predictive function $f_T$ uses an abstract learning from the source domain $D_s$ and $T_s$ in the target domain $D_T$. Transfer learning facilitates the use of successes, failures, penalty accumulations, reward accumulations of other robots within the workspace, thereby enhancing learning overall.

Machine learning processes may be executed onboard, locally on the robot, and in some cases, may be executed on a server on the cloud connected to the robot through a WAN. Communication between the server on the cloud and the robot and, in some cases, an application of a communication, is established through messaging, such as MQTT or the like. In some cases, machine learning processes are executed on both locally onboard the robot and on a server on the cloud, wherein a hybrid model is used. In some embodiments, traditional machine learning is used. In some embodiments, neural networks are used. In some embodiments, a deep network or a shallow network is used. In some embodiments, more than one channel is used. In some embodiments, each channel is processed differently. For example, one channel may be processed onboard and one channel may be processed on the cloud. In some embodiments, the same channel is used to provide more than one output. For example, an image may be used to extract depth as output or it may be used to detect an object. In some embodiments, different channels are used for each of the outputs. In embodiments, a common coordinate system is used or different coordinate systems are used. In some embodiments, different coordinate systems are compared or tracked against one other or are kept in a different layer. In some embodiments, different coordinate systems are merged or layers are superimposed. In some embodiments, a transform function relates two different coordinate systems. In some embodiments, the transform function is applied before merging or superimposition of the layers.

In some embodiments, multiple channels are generated from a same sensor, wherein each of the channels represents a different characteristic of sensed data. In embodiments, each channel is processed by different hardware locally on a same device or on the cloud on different servers. In some cases, all channels are processed on a single hardware. For the purposes of illustration, various components may be shown separately, however, in actuality they may be implemented on a same software stack. In embodiments, the software stack is executed on one processor or on multiple processors that are onboard and local to the robot or distributed across multiple geographies. In embodiments, output of a neural network or machine learning algorithm may be used for different purposes by different subsystems. For example, output of a room coloring machine learning algorithm may be used to display rooms colored strategically on an application of a communication device or for coverage planning to cover one room at a time without going back and forth between rooms too often or by a patrol subsystem to aid a robot in finding a cell phone by visiting each room to search for the cell phone. Data sets captured by different sensor types or data sets captured by a same sensor type are processed on a same or a different channel using different resolutions, depending on a purpose or use of the data set. For example, a camera is used in combination with a laser line to detect distances, however, at another time interval the laser is deactivated and camera data is provided to a channel that processes the data using a neural network to detect characteristics and contextual information of the environment based on a feature vector. Examples of characteristics and contextual information of the environment include a location of an intersection between a wall and a floor, a location of corners in a house/room or a location of aisles in a supermarket, an intersection between a road and a sidewalk. In some embodiments, characteristics are superimposed onto a grid map, forming a multidimensional dataset processed and stored as arrays of vectors, matrices of vectors, tensors, vectors, and tensors of high dimensions. In some embodiments, machine learning or a neural network superimposes various data types into combined layers of data to account for discrepancies and contradictory information using probabilistic and/or historical data. The combined data may be presented with probabilistic formats indicating a probability of a feature indicating an object detection, an object identification, an object classification, etc.

Figure 6:
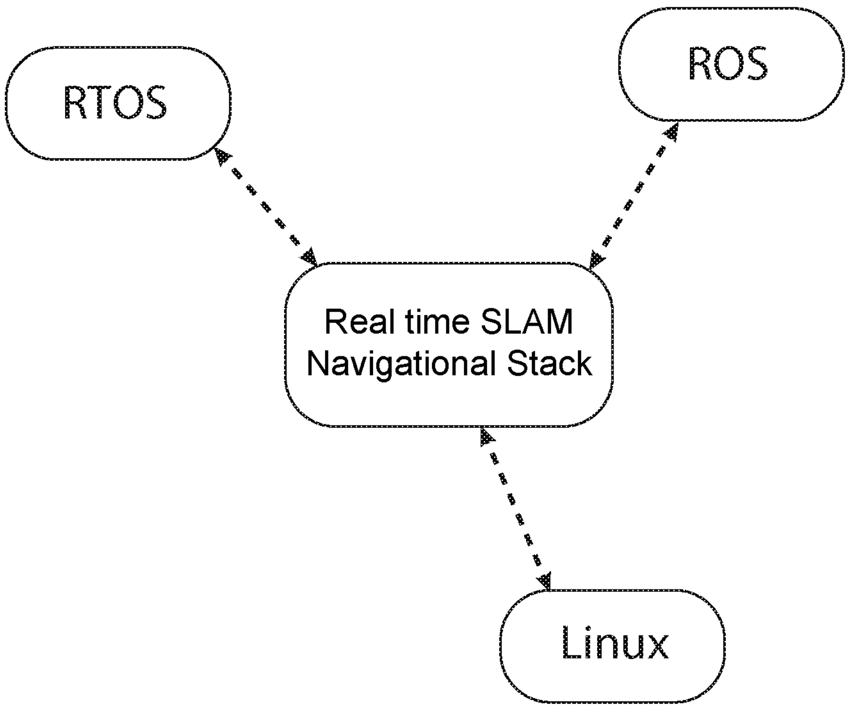
FIG. 6 illustrates a real time navigational stack used with different types of operating systems.

Some embodiments may provide a real-time navigational stack configured to provide a variety of functions. In embodiments, the real-time navigational stack may reduce computational burden, and consequently may free the hardware (HW) for functions such as object recognition, face recognition, voice recognition, and other AI applications. Additionally, the boot up time of a robot using the real-time navigational stack may be faster than prior art methods. In general, the real-time navigational stack may allow more tasks and features to be packed into a single device while reducing battery consumption and environmental impact. The collection of the advantages of the real-time navigational stack consequently improve performance and reduce costs, thereby paving the road forward for mass adoption of robots within homes, offices, small warehouses, and commercial spaces. In embodiments, the real-time navigational stack may be used with various different types of systems, such as Real-time Operating System (RTOS), Robot Operating System (ROS), and Linux, as illustrated in FIG. 6.

Figure 7:
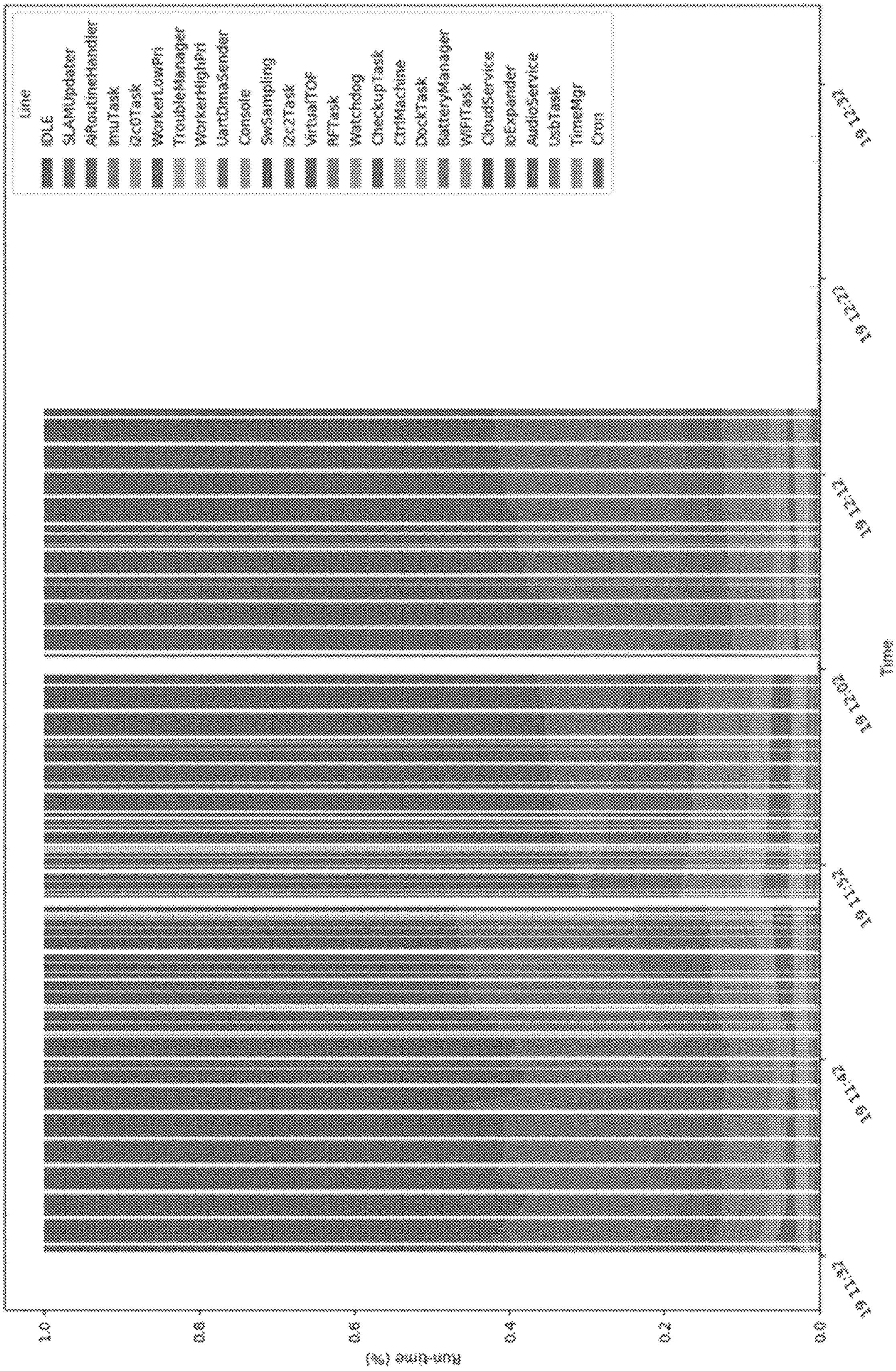
FIG. 7 illustrates a visualization of multitasking in real time on an ARM Cortex M7 MCU, model SAM70 from Atmel.

Some embodiments may use a Microcontroller Unit (MCU) (e.g., SAM70S MC) including built in 300 MHz clock, 8 MB Random Access Memory (RAM), and 2 MB flash memory. In some embodiments, the internal flash memory may be split into two or more blocks. For example, a lower block may be used as default storage for program code and constant data. In some embodiments, the static RAM (SRAM) may be split into two or more blocks. FIG. 7 provides a visualization of multitasking in real-time on an ARM Cortex M7 MCU, model SAM70 from Atmel. Each task is scheduled to run on the MCU. Information is received from sensors and is used in real-time by AI algorithms. Decisions actuate the robot without buffer delays based on the real-time information. Examples of sensors include, but are not limited to, inertial measurement unit (IMU), gyroscope, optical tracking sensor (OTS), depth camera, obstacle sensor, floor sensor, edge detection sensor, debris sensor, acoustic sensor, speech recognition, camera, image sensor, time of flight (TOF) sensor, TSOP sensor, laser sensor, light sensor, electric current sensor, optical encoder, accelerometer, compass, speedometer, proximity sensor, range finder, LIDAR, LADAR, radar sensor, ultrasonic sensor, piezoresistive strain gauge, capacitive force sensor, electric force sensor, piezoelectric force sensor, optical force sensor, capacitive touch-sensitive surface or other intensity sensors, global positioning system (GPS), etc. In embodiments, other types of MCUs or CPUs than that described in FIG. 7 may be used to achieve similar results. A person skilled in the art would understand the pros and cons of different available options and would be able to choose from available silicon chips to best take advantage of their manufactured capabilities for the intended application.

In embodiments, the core processing of the real-time navigational stack occurs in real-time. In some embodiments, a variation RTOS may be used (e.g., Free-RTOS). In some embodiments, a proprietary code may act as an interface to providing access to the HW of the CPU. In either case, AI algorithms such as SLAM and path planning, peripherals, actuators, and sensors communicate in real-time and take maximum advantage of the HW capabilities that are available in advance computing silicon. In some embodiments, the real-time navigation stack may take full advantage of thread mode and handler mode support provided by the silicon chip to achieve better stability of the system. In some embodiments, an interrupt may occur by a peripheral, and as a result, the interrupt may cause an exception vector to be fetched and the MCU (or in some cases CPU) may be converted to handler mode by taking the MCU to an entry point of the address space of the interrupt service routine (ISR). In some embodiments, a Microprocessor Unit (MPU) may control access to various regions of the address space depending on the operating mode.

Figure 8:
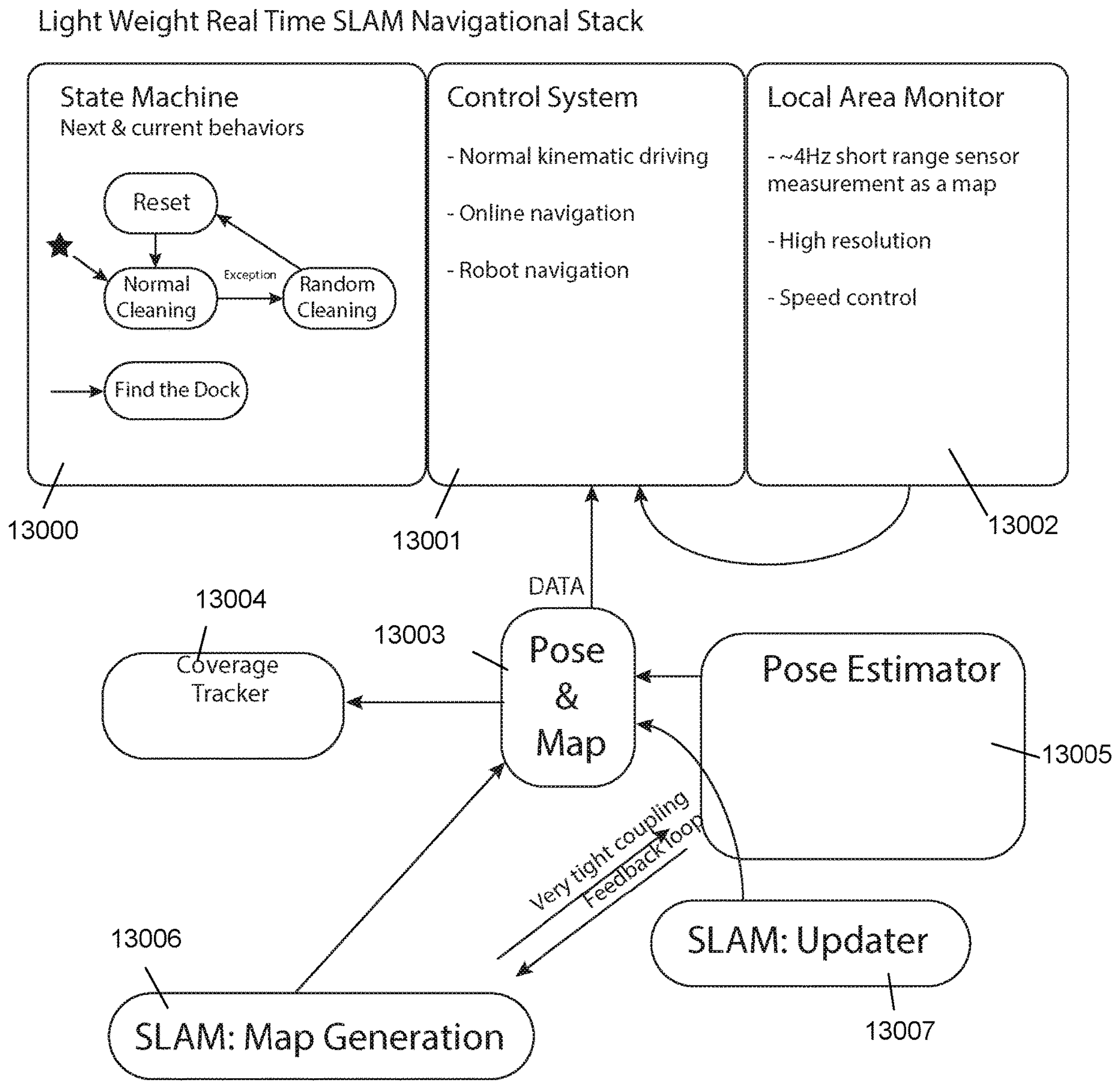
FIG. 8 illustrates an example of a light weight real time SLAM navigational stack algorithm.

In some embodiments, Light Weight Real-time SLAM Navigational Stack may include a state machine portion, a control system portion, a local area monitor portion, and a pose and maps portion. FIG. 8 provides a visualization of an example of a Light Weight Real-time SLAM Navigational Stack algorithm. The state machine 13000 may determine current and next behaviors. At a high level, the state machine 13000 may include the behaviors reset, normal cleaning, random cleaning, and find the dock. The control system 13001 may determine normal kinematic driving, online navigation (i.e., real-time navigation), and robust navigation (i.e., navigation in high obstacle density areas). The local area monitor 13002 may generate a high resolution map based on short range sensor measurements and control speed of the robot. The control system 13001 may receive information from the local area monitor 13002 that may be used in navigation decisions. The pose and maps portion 13003 may include a coverage tracker 13004, a pose estimator 1105, SLAM 13006, and a SLAM updater 13007. The pose estimator 13005 may include an Extended Kalman Filter (EKF) that uses odometry, IMU, and LIDAR data. SLAM 13006 may build a map based on scan matching. The pose estimator 13005 and SLAM 13006 may pass information to one another in a feedback loop. The SLAM updated 13007 may estimate the pose of the robot. The coverage tracker 13004 may track internal coverage and exported coverage. The coverage tracker 13004 may receive information from the pose estimator 13005, SLAM 13006, and SLAM updated 13007 that it may use in tracking coverage. In one embodiment, the coverage tracker 13004 may run at 2.4 Hz. In other indoor embodiments, the coverage tracker may run at between 1-50 Hz. For outdoor robots, the frequency may increase depending on the speed of the robot and the speed of data collection. A person in the art would be able to calculate the frequency of data collection, data usage, and data transmission to control system. The control system 13001 may receive information from the pose and maps portion 13003 that may be used for navigation decisions.

In embodiments, the real-time navigational system of the robot may be compatible with a 360 degrees LIDAR and a limited Field of View (FOV) depth camera. This is unlike robots in prior art that are only compatible with either the 360 degrees LIDAR or the limited FOV depth camera. In addition, navigation systems of robots described in prior art require calibration of the gyroscope and IMU and must be provided wheel parameters of the robot. In contrast, some embodiments of the real-time navigational system described herein may autonomously learn calibration of the gyroscope and IMU and the wheel parameters.

Since different types of robots may use the Light Weight Real-time SLAM Navigational Stack describes herein, the diameter, shape, positioning, or geometry of various components of the robots may be different and may therefore require updated distances and geometries between components. In some embodiments, the positioning of components of the robot may change. For example, in one embodiment the distance between an IMU and a camera may be different than in a second embodiment. In another example, the distance between wheels may be different in two different robots manufactured by the same manufacturer or different manufacturers. The wheel diameter, the geometry between the side wheels and the front wheel, and the geometry between sensors and actuators, are other examples of distances and geometries that may vary in different embodiments. In some embodiments, the distances and geometries between components of the robot may be stored in one or more transformation matrices. In some embodiments, the values (i.e., distances and geometries between components of the robot) of the transformation matrices may be updated directly within the program code or through an API such that the licensees of the software may implement adjustments directly as per their specific needs and designs.

In some cases, the real-time navigational system may be compatible with systems that do not operate in real-time for the purposes of testing, proof of concepts, or for use in alternative applications. In some embodiments, a mechanism may be used to create a modular architecture that keeps the stack intact and only requires modification of the interface code when the navigation stack needs to be ported. In some embodiments, an Application Programming Interface (API) may be used to interface between the navigational stack and customers to provide indirect secure access to modify some parameters in the stack. Further details of the real-time navigational system in addition to other system operations and components of the robot that may be employed herein are described in U.S. Non-Provisional patents application Ser. Nos. 17/670,277, 17/344,892, and 17/494,251, each of which is hereby incorporated herein by reference.

In embodiments, high dimensional maps, volumetric localization, vector field maps, and various AI based algorithms contribute to planning events, such as planning a path, a series of actions, a series of tasks, a sequence of actions and tasks, a modification to a previously planned event, reordering a series of actions or tasks, rearranging an order in which work is performed within an area, robot maneuvers, robot speed (e.g., slowing down or speeding up), engagement with one or more control systems or control units, transfer of data such as pull requests, pushing of a data packet to an external device, intelligent fusion of two or more sensory information, discards of some sensory information or minimization of contribution of some sensors, storage and retrieval of data, and information transfer or communication with external devices directly or through intermediary media or devices. High dimensional maps, volumetric localization, vector field maps, and various AI based algorithms may further contribute to forming decisions relating to running software routines or selecting an algorithm, communicating an occurrence to a user (e.g., a supervisory staff), triggering of a fail-safe mechanism or a backup mechanism, a distribution of computational tasks over processing capable devices within the system or external to the system, a value of a margin of safety, triggering of a suspension mechanism, triggering of a request for human intervention, triggering of a suggestion sent to the user, and the robot acting on partially observed data or gathering more information.

Figure 10:
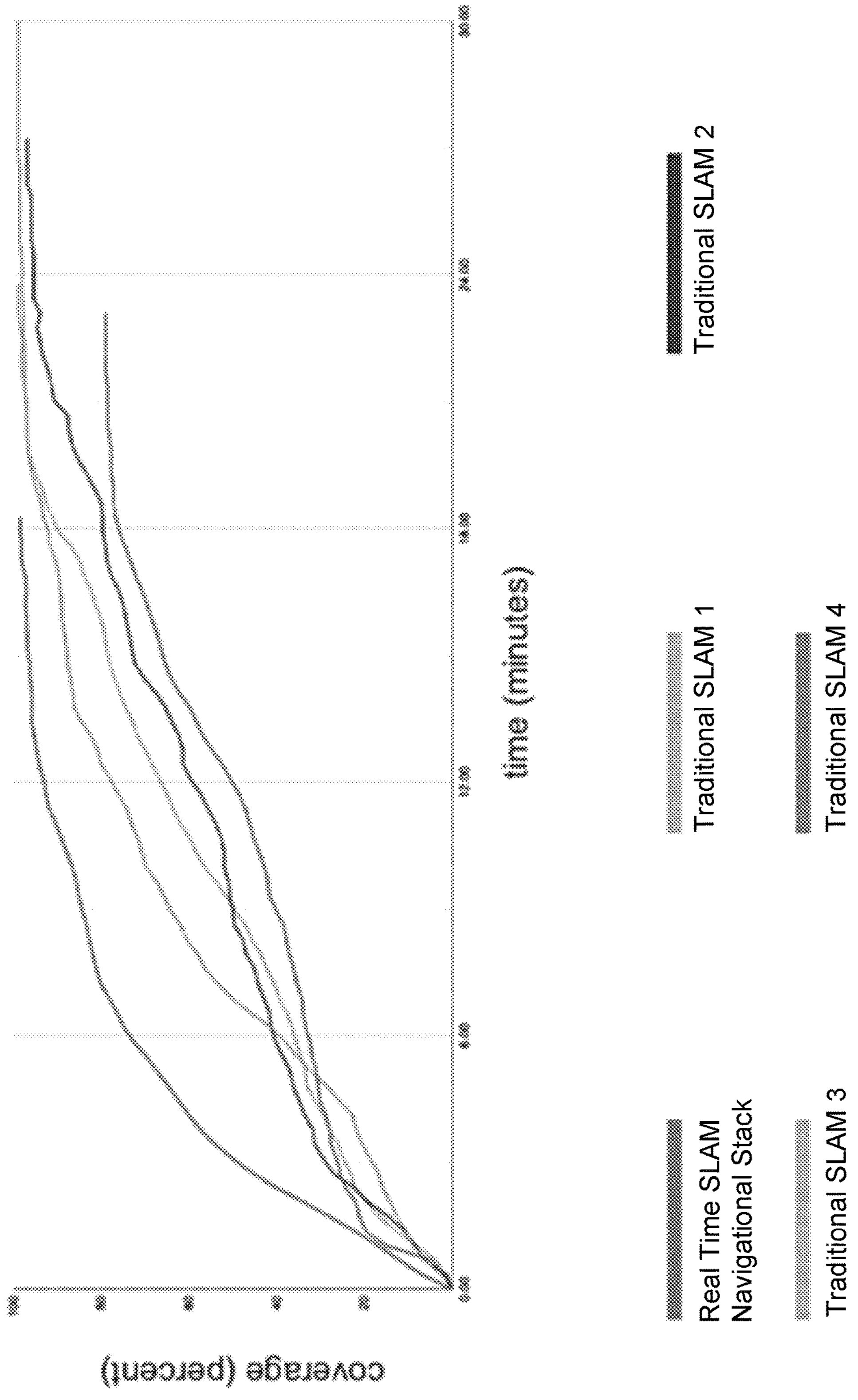
FIG. 10 illustrates room coverage percentage over time for a robot using light weight real time SLAM navigational stack and four robots using traditional SLAM methods.

In some embodiments, such as for a service robot, it may desirable for the processor of the robot to map the environment as soon as possible without having to visit various parts of the environment redundantly. For instance, a map complete with a minimum percentage of coverage to entire coverable area may provide better performance. FIG. 9 illustrates a table comparing time to map an entire area and percentage of coverage to entire coverable area for a robot using Light Weight Real-time SLAM Navigational Stack and a robot using traditional SLAM for a complex and large space. The time to map the entire area and the percentage of area covered were much less with Light Weight Real-time SLAM Navigational Stack, requiring only minutes and a fraction of the space to be covered to generate a complete map. Traditional SLAM techniques require over an hour and some VSLAM solutions require the complete coverage of areas to generate a complete map. In addition, with traditional SLAM, robots may be required to perform perimeter tracing (or partial perimeter tracing) to discover or confirm an area within which the robot is to perform work in. Such SLAM solutions may be unideal for, for example, service oriented tasks, such as popular brands of robotic vacuums. It is more beneficial and elegant when the robot begins to work immediately without having to do perimeter tracing first. In some applications, the processor of the robot may not get a chance to build a complete map of an area before the robot is expected to perform a task. However, in such situations, it is useful to map as much of the area as possible in relation to the amount of the area covered by the robot as a more complete map may result in better decision making. In coverage applications, the robot may be expected to complete coverage of an entire area as soon as possible. For example, for a standard room setup based on International Electrotechnical Commission (IEC) standards, it is more desirable that a robot completes coverage of more than 70% of the room in under 6 minutes as compared to only 40% in under 6 minutes. FIG. 10 illustrates room coverage percentage over time for a robot using Light Weight Real-time SLAM Navigational Stack and four robots using traditional SLAM methods. As can be seen, the robot using Light Weight Real-time SLAM Navigational Stack completes coverage of the room much faster than robots using traditional SLAM methods.

Figure 11:
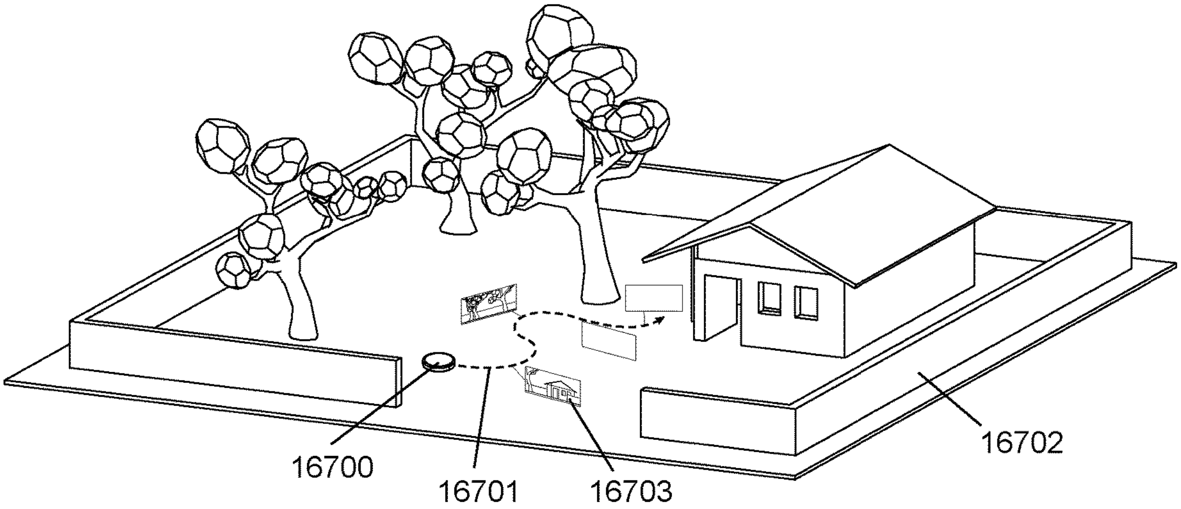
FIGS. 11 and 12 illustrate a robot capturing images along its trajectory.
Figure 12:
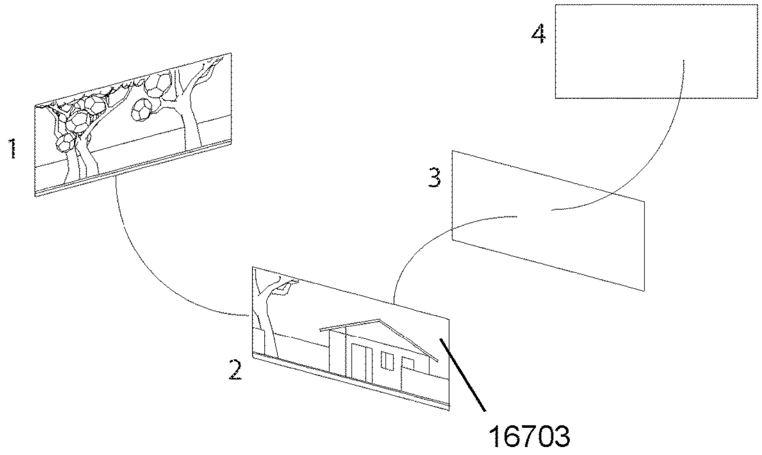
Figure 13:
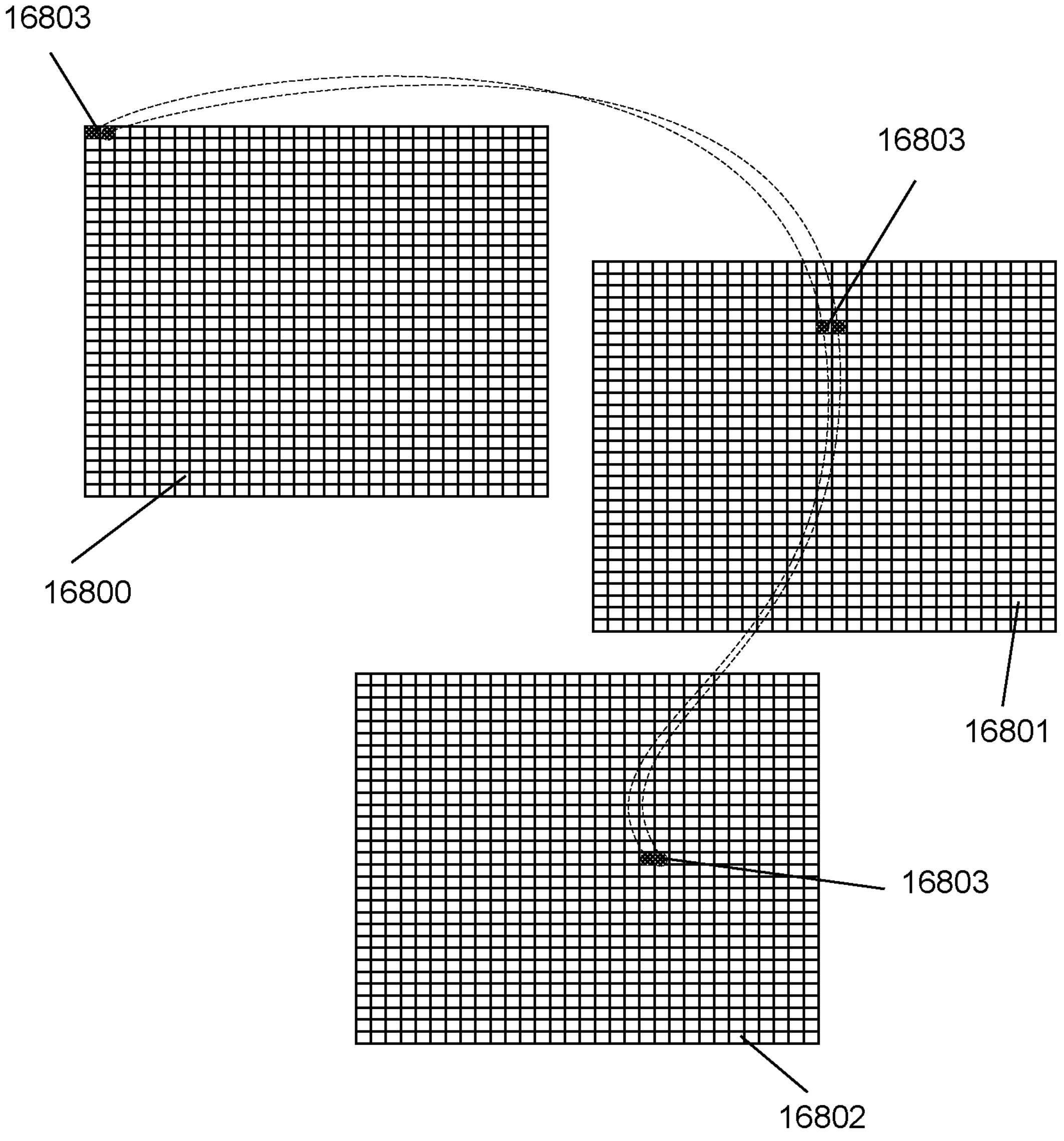
FIG. 13 illustrates three images captured during navigation of a robot.
Figure 14:
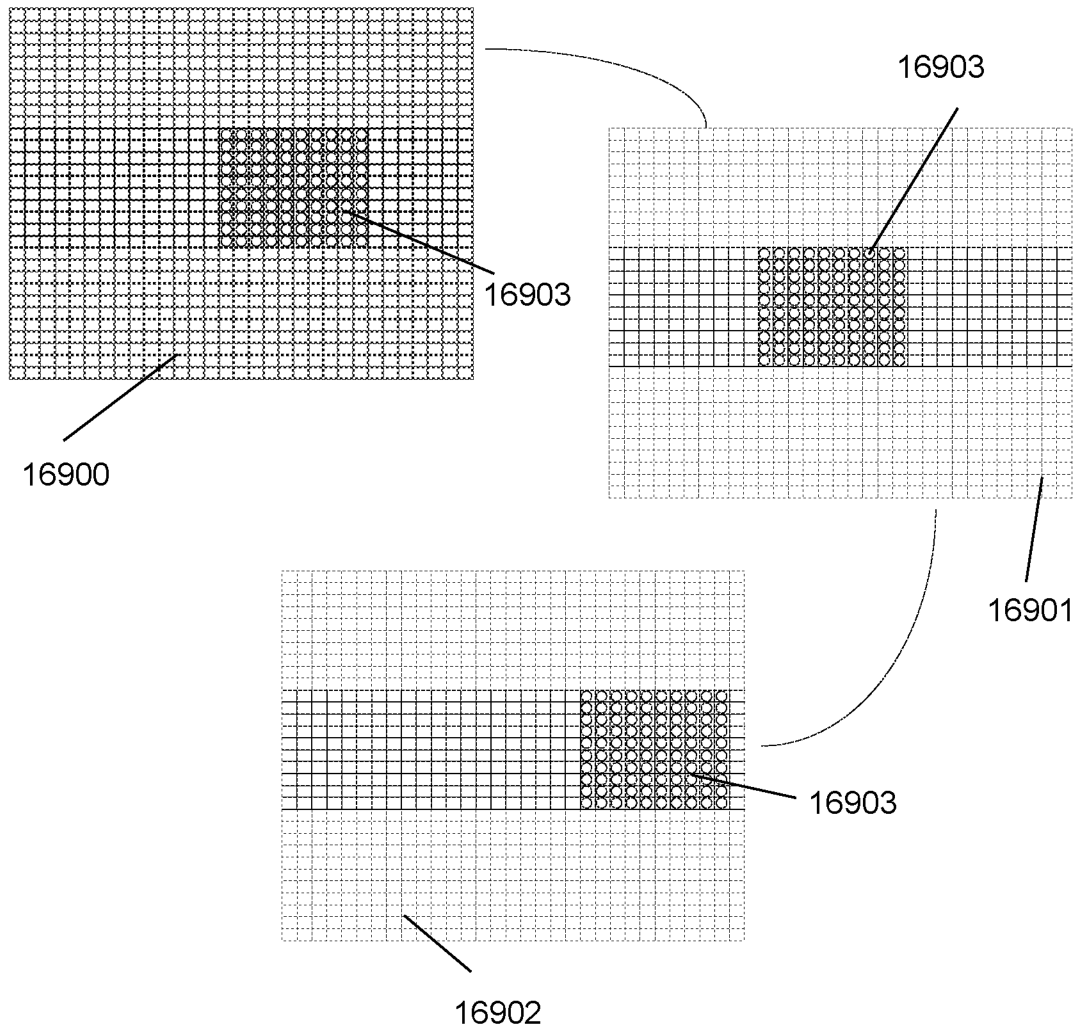
FIG. 14 illustrates three images captured during navigation of a robot.

In some embodiments, an image sensor of the robot captures images as the robot navigates throughout the environment. For example, FIG. 11 illustrates a robot 16700 navigating along a path 16701 throughout environment 16702 while capturing images 16703 using an image sensor. FIG. 12 illustrates the images 16703 captured as the robot 16700 navigates along path 16701. In some embodiments, the processor of the robot connects the images 16703 to one another. In some embodiments, the processor connects the images using similar methods as a graph G with nodes n and edges E. In some instances, images I may be connected with vertices V and edges E. In some embodiments, the processor connects images based on pixel densities and/or the path of the robot during which the images were captured (i.e., movement of the robot measured by odometry, gyroscope, etc.). FIG. 13 illustrates three images 16800, 16801, and 16802 captured during navigation of the robot and the position of the same pixels 16803 in each image. The processor of the robot may identify the same pixels 16803 in each image based on the pixel densities and/or the movement of the robot between each captured image or the position and orientation of the robot when each image was captured. The processor of the robot may connect images 16800, 16801, and 16802 based on the position of the same pixels 16803 in each image such that the same pixels 16803 overlap with one another when images 16800, 16801, and 16802 are connected. The processor may also connect images based on the measured movement of the robot between captured images 16800, 16801, and 16802 or the position and orientation of the robot within the environment when images 16800, 16801, and 16802 were captured. In some cases, images may be connected based on identifying similar distances to objects in the captured images. For example, FIG. 14 illustrates three images 16900, 16901, and 16902 captured during navigation of the robot and the same distances to objects 16903 in each image. The distances to objects 16903 always fall along the same height in each of the captured images as a two-and-a-half dimensional LIDAR measured the distances. The processor of the robot may connect images 16900, 16901, and 16902 based on the position of the same distances to objects 16903 in each image such that the same distances to objects 16903 overlap with one another when images 16900, 16901, and 16902 are connected. In some embodiments, the processor may use the minimum mean squared error to provide a more precise estimate of distances within the overlapping area. Other methods may also be used to verify or improve accuracy of connection of the captured images, such as matching similar pixel densities and/or measuring the movement of the robot between each captured image or the position and orientation of the robot when each image was captured.

Figure 15A:
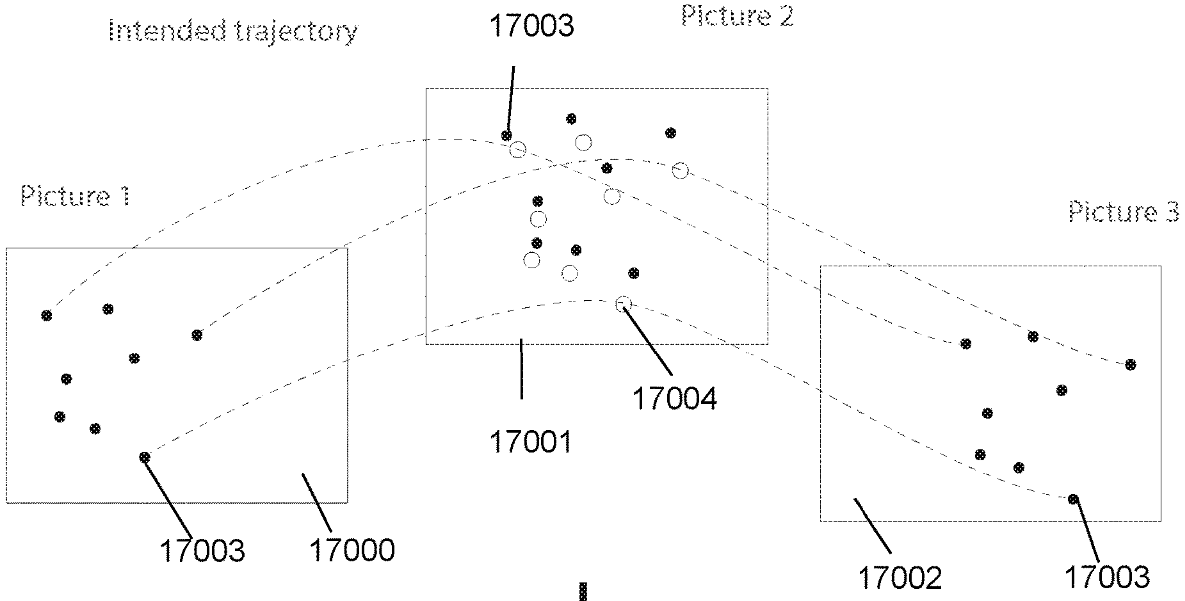
FIGS. 15A and 15B illustrate orientation adjustment of an image in a stream of images based on features in the images.
Figure 15B:
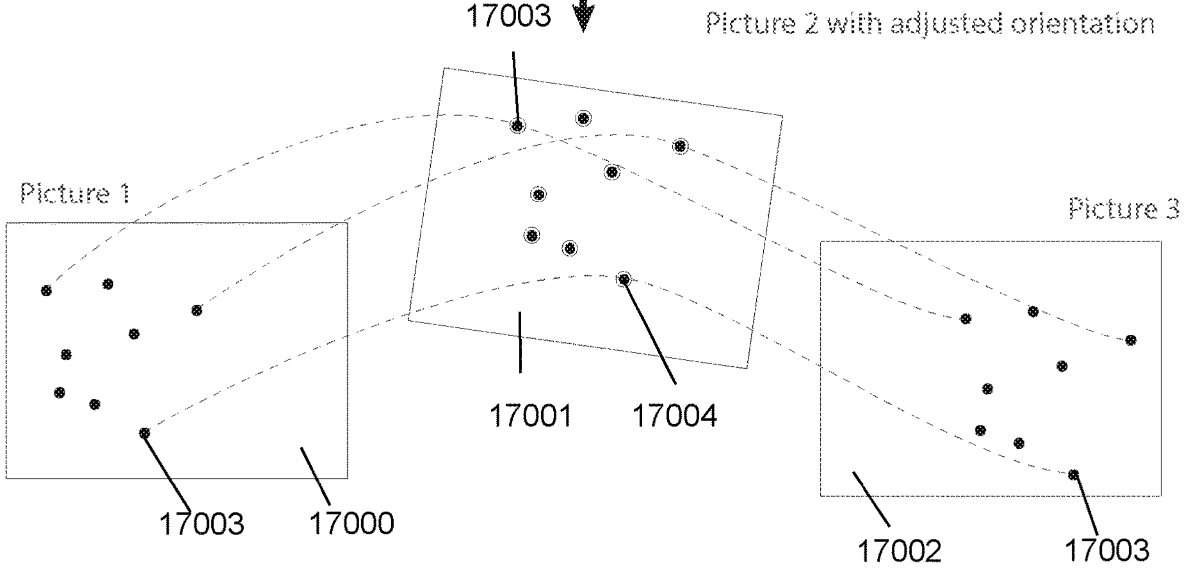
Figure 16:
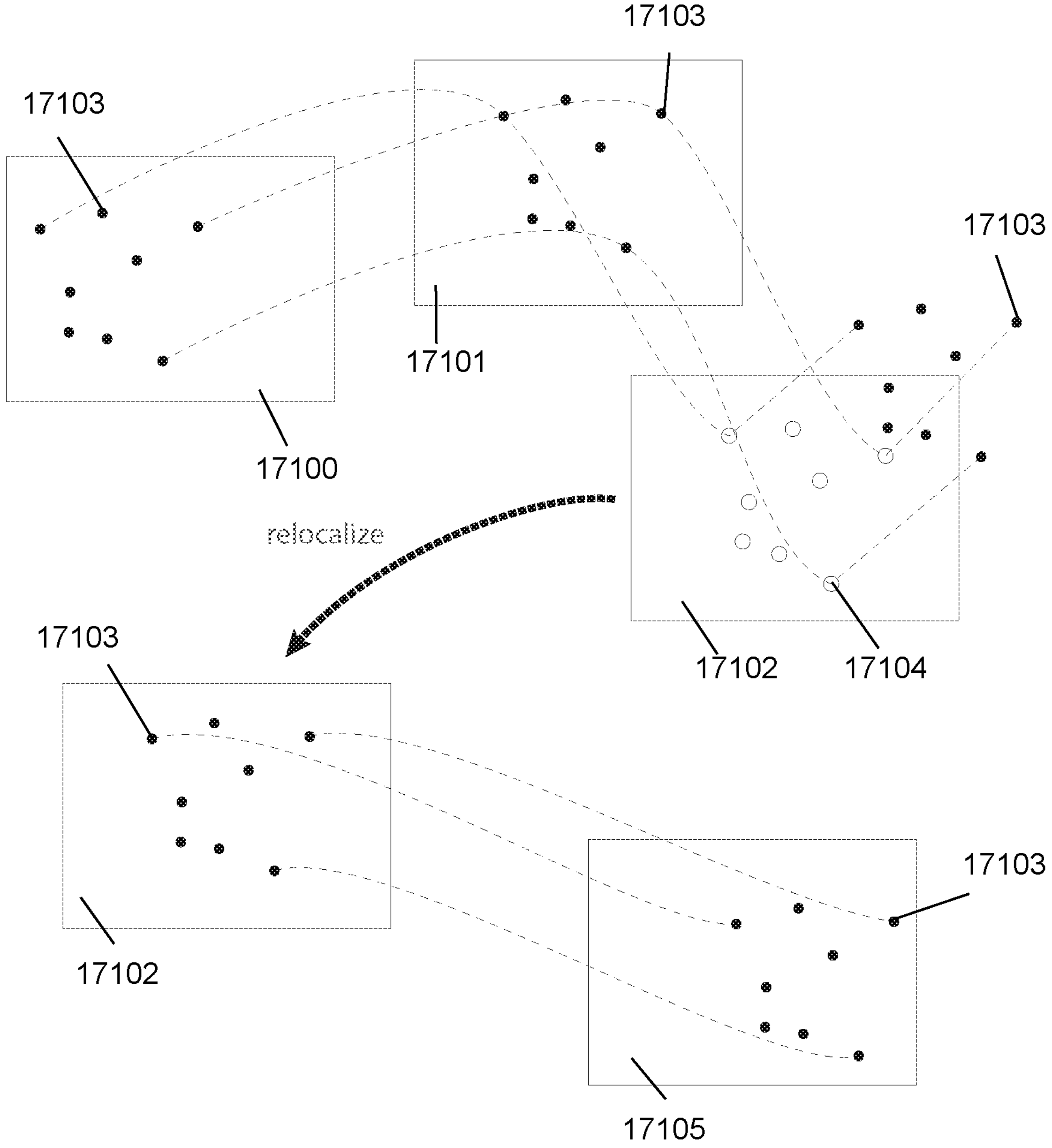
FIG. 16 illustrates a process of relocalization.

In some cases, images may not be accurately connected when connected based on the measured movement of the robot as the actual trajectory of the robot may not be the same as the intended trajectory of the robot. In some embodiments, the processor may localize the robot and correct the position and orientation of the robot. FIG. 15A illustrates three images 1700, 1701, and 1702 captured by an image sensor of the robot during navigation with same points 1703 in each image. Based on the intended trajectory of the robot, same points 1703 are expected to be positioned in locations 1704. However, the actual trajectory resulted in captured image 1701 with same points 1703 positioned in unexpected locations. Based on localization of the robot during navigation, the processor may correct the position and orientation of the robot, resulting in FIG. 15B of captured image 1701 with the locations of same points 1703 aligning with their expected locations 1704 given the correction in position and orientation of the robot. In some cases, the robot may lose localization during navigation due to, for example, a push or slippage. In some embodiments, the processor may relocalize the robot and as a result images may be accurately connected. FIG. 16 illustrates three images 17100, 17101, and 17102 captured by an image sensor of the robot during navigation with same points 17103 in each image. Based on the intended trajectory of the robot, same points 17103 are expected to be positioned at locations 17104 in image 17102, however, due to loss of localization, same points 17103 are located elsewhere. The processor of the robot may relocalize and readjust the locations of same points 17103 in image 17102 and continue along its intended trajectory while capturing image 17105 with same points 17103.

Figure 17:
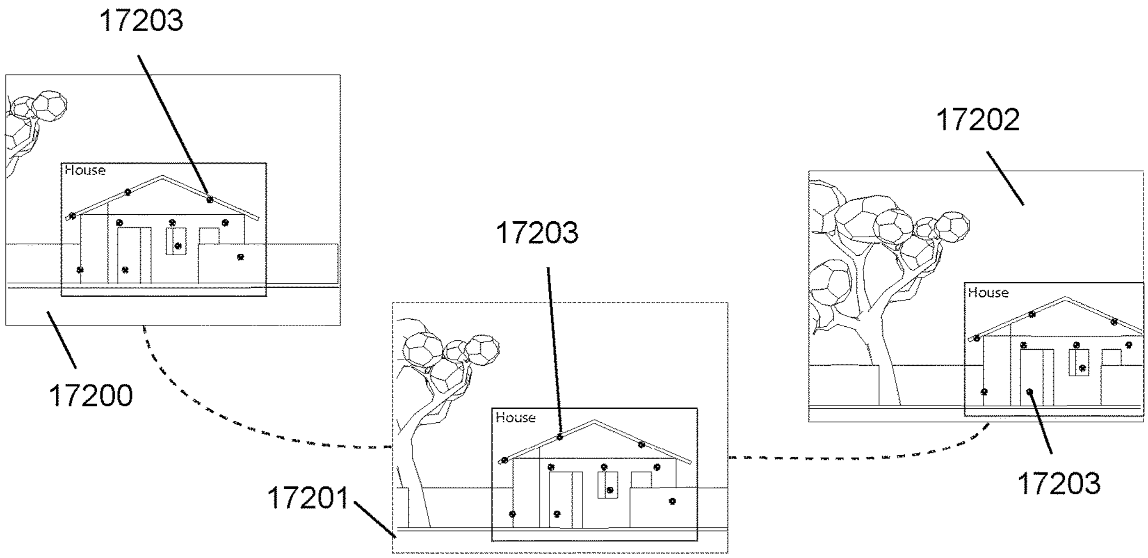
FIG. 17 illustrates a process of object identification.
Figure 18A:
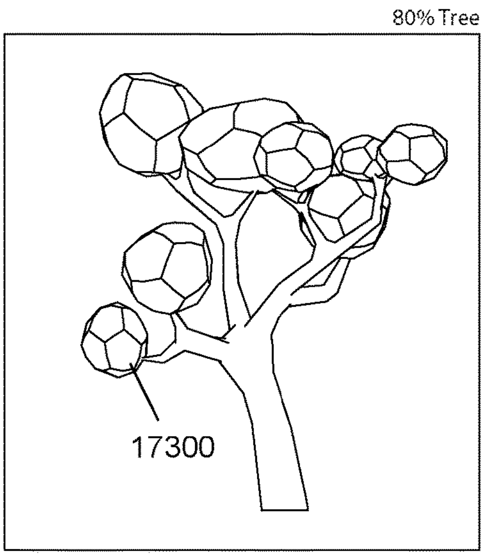
FIGS. 18A and 18B illustrate feature identification based on 2D image features and depth data.
Figure 18B:
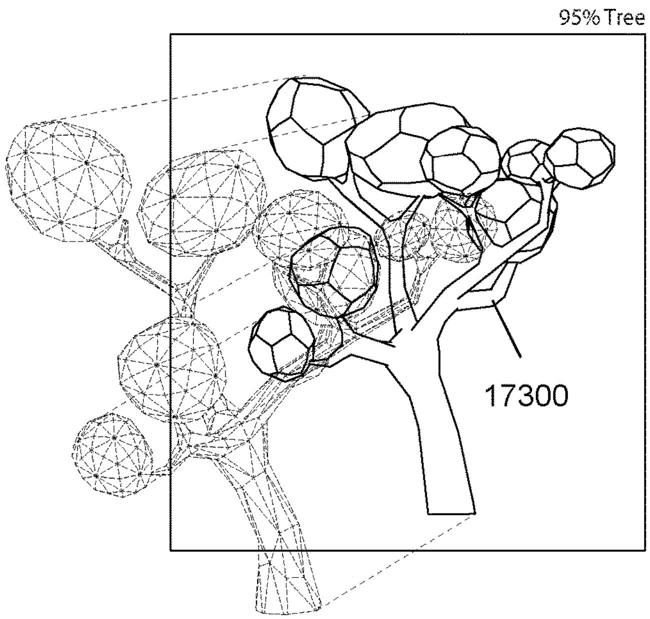

In some embodiments, the processor may connect images based on the same objects identified in captured images. In some embodiments, the same objects in the captured images may be identified based on distances to objects in the captured images and the movement of the robot in between captured images and/or the position and orientation of the robot at the time the images were captured. FIG. 17 illustrates three images 17200, 17201, and 17202 captured by an image sensor and same points 17203 in each image. The processor may identify the same points 17203 in each image based on the distances to objects within each image and the movement of the robot in between each captured image. Based on the movement of the robot between a position from which image 17200 and image 17201 were captured, the distances of same points 17203 in captured image 17200 may be determined for captured image 17201. The processor may then identify the same points 17203 in captured image 17201 by identifying the pixels corresponding with the determined distances for same points 17203 in image 17201. The same may be done for captured image 17202. In some cases, distance measurements and image data may be used to extract features. For instance, FIG. 18A illustrates a two dimensional image of a feature 17300. The processor may use image data to determine the feature 17300. In FIG. 18A the processor may be 80% confident that the feature 17300 is a tree. In some cases, the processor may use distance measurements in addition to image data to extract additional information. In FIG. 18B the processor determines that it is 95% confident that the feature 17300 is a tree based on particular points in the feature 17300 having similar distances.

Figure 19A:
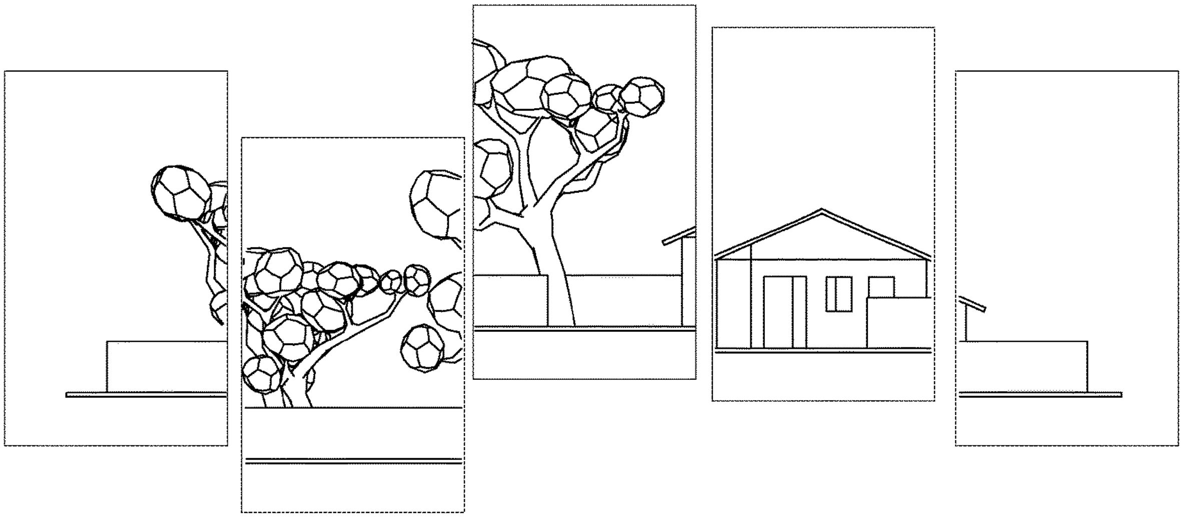
FIGS. 19A-19C illustrate a process of aligning and stitching images.
Figure 19B:
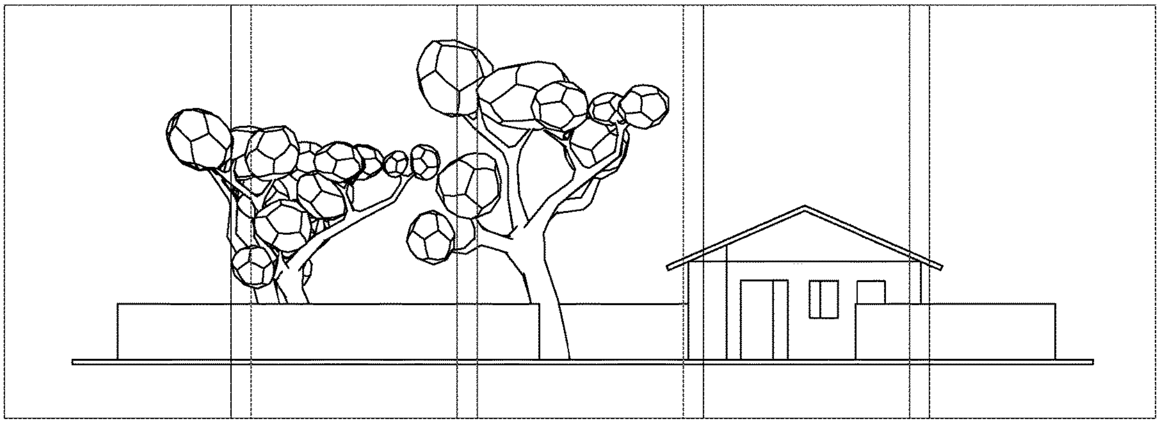
Figure 19C:
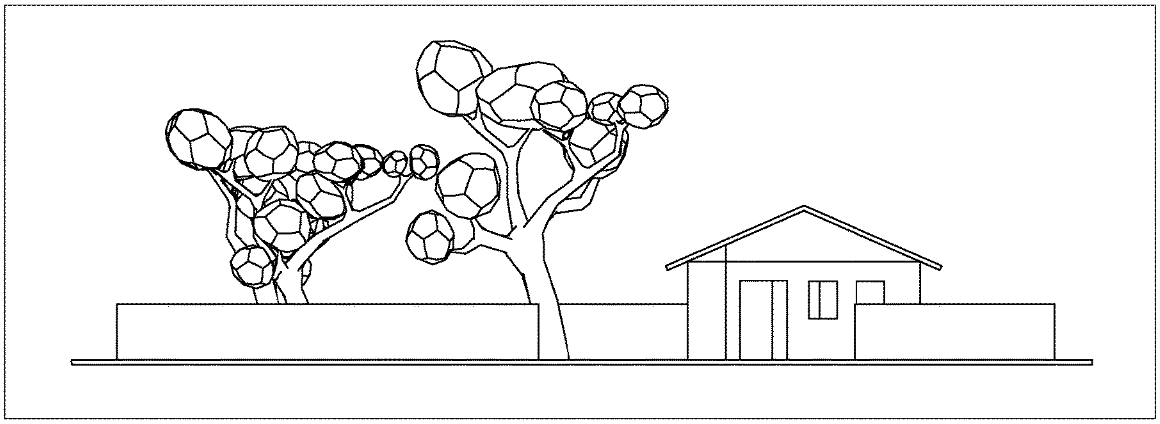

In some embodiments, the processor may use least squares, non-linear least squares, non-linear regression, preemptive RANSAC, etc. for two dimensional alignment of images, each method varying from the others. In some embodiments, the processor may identify a set of matched feature points $\{(x_i, x_i')\}$ for which the planar parametric transformation may be given by $x'=f(x;p)$, wherein p is best estimate of the motion parameters. In some embodiments, the processor minimizes the sum of squared residuals $E_{LS}(u)=\Sigma_i\|r_i\|^2=\Sigma_i\|f(x_i;p)-x'_i\|'$, wherein $r_i=f(x_i;p)-x_i'=x_i^{\sim 1}-x_i^{\sim 1}$ is the residual between the measured location $x_i^{\sim 1}$ and the predicted location $x_i^{\sim 1}=f(x_i; p)$. In some embodiments, the processor may minimize the sum of squared residuals by solving the Symmetric Positive Definite (SPD) system of normal equations and associating a scalar variance estimate $\sigma_i^2$ with each correspondence to achieve a weighted version of least squares that may account for uncertainty. FIG. 19A illustrates an example of four unaligned two dimensional images. FIG. 19B illustrates the alignment of the images achieved using methods such as those described herein, and FIG. 19C illustrates the four images stitched together after alignment. In some embodiments, the processor may use three dimensional linear or non-linear transformations to map translations, similarities, affine, by least square method or using other methods. In embodiments, there may be several parameters that are pure translation, a clean rotation, or affine. Therefore, a full search over the possible range of values may be impractical. In some embodiments, instead of using a single constant translation vector such as u, the processor may use a motion field or correspondence map $x'(x; p)$ that is spatially varying and parameterized by a low dimensional vector p, wherein x' may be any motion model. Since the Hessian and residual vectors for such parametric motion is more computationally demanding than a simple translation or rotation, the processor may use a sub block and approach the analysis of motion using parametric methods. Then, once a correspondence is found, the processor may analyze the entire image using non-parametric methods.

In some embodiments, the processor may not know the correspondence between data points a priori when merging images and may start by matching nearby points. The processor may then update the most likely correspondence and iterate on. In some embodiments, the processor of the robot may localize the robot against the environment based on feature detection and matching. This may be synonymous to pose estimation or determining the position of cameras and other sensors of the robot relative to a known three dimensional object in the scene. In some embodiments, the processor stitches images and creates a spatial representation of the scene after correcting images with preprocessing.

Figure 20:
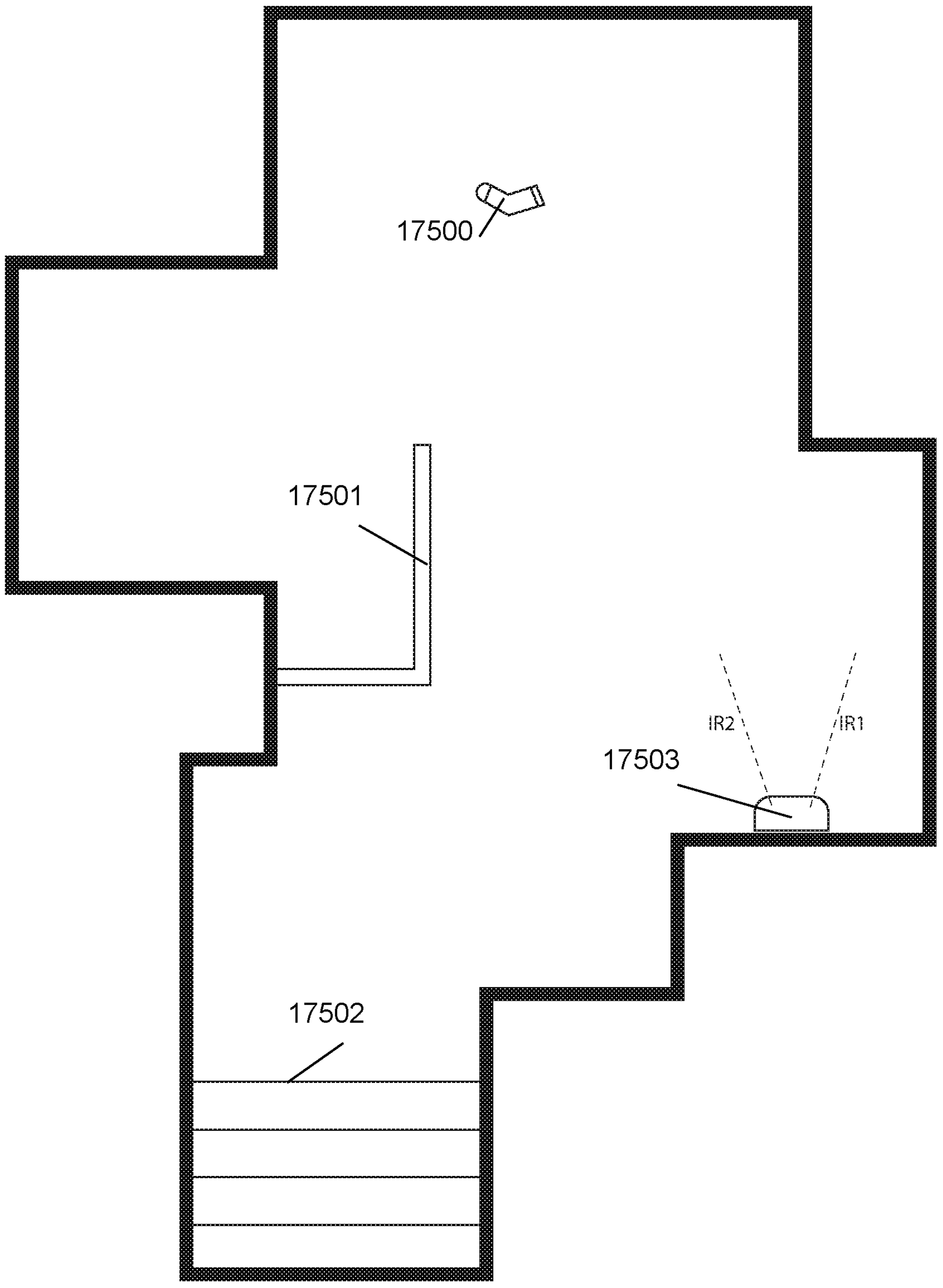
FIG. 20 illustrates different types of information added to a map.

In some embodiments, the processor may add different types of information to the map of the environment. For example, FIG. 20 illustrates four different types of information that may be added to the map, including an identified object such as a sock 17500, an identified obstacle such as a glass wall 17501, an identified cliff such as a staircase 17502, and a charging station of the robot 17503. The processor may identify an object by using a camera to capture an image of the object and matching the captured image of the object against a library of different types of objects. The processor may detect an obstacle, such as the glass wall 17501, using data from a TOF sensor or bumper. The processor may detect a cliff, such as staircase 17502, by using data from a camera, TOF, or other sensor positioned underneath the robot in a downwards facing orientation. The processor may identify the charging station 17503 by detecting IR signals emitted from the charging station 17503. In one example, the processor may add people or animals observed in particular locations and any associated attributes (e.g., clothing, mood, etc.) to the map of the environment. In another example, the processor may add different cars observed in particular locations to the map of the environment.

Figure 21:
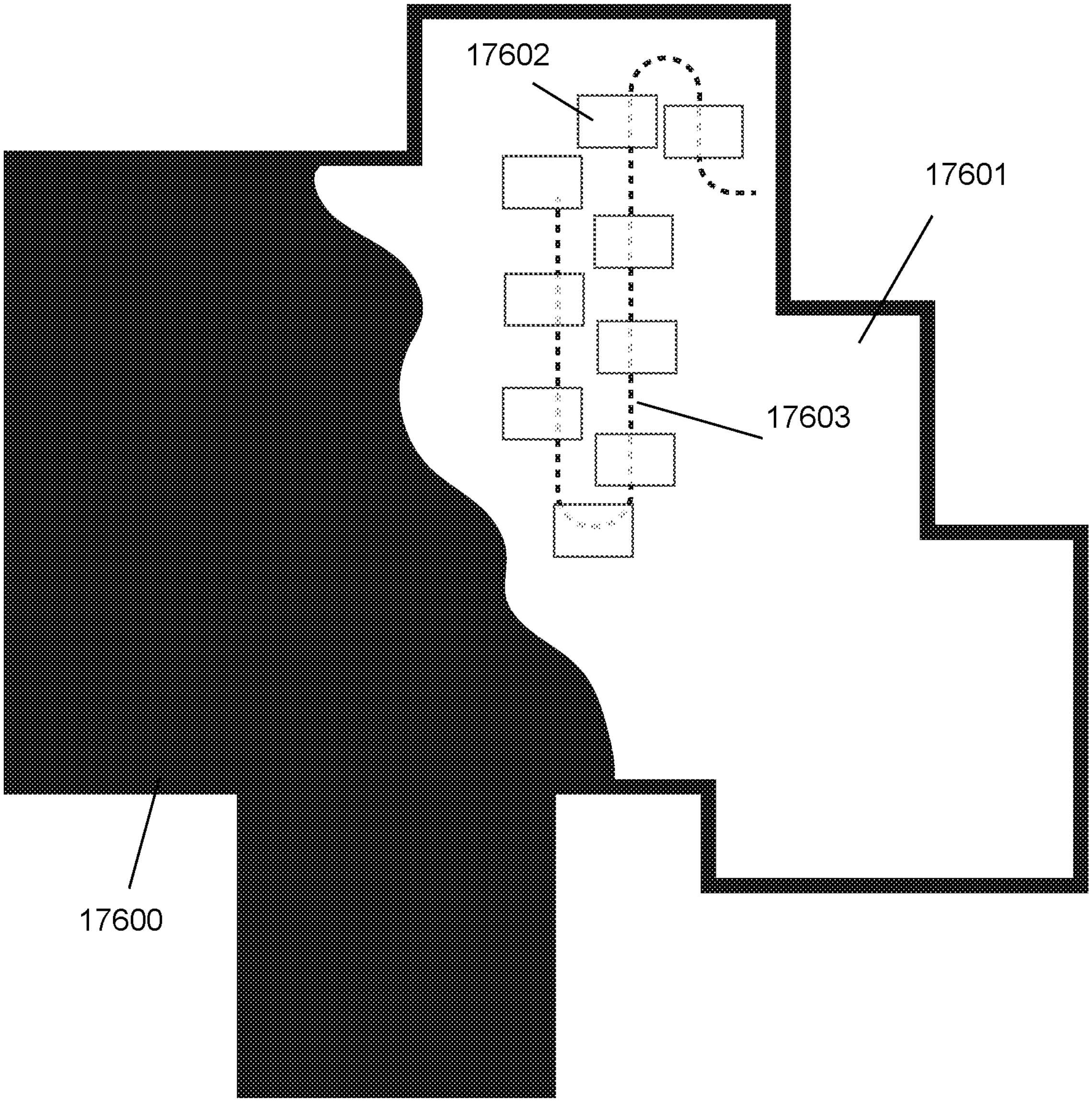
FIG. 21 illustrates an example of a map.
Figure 22A:
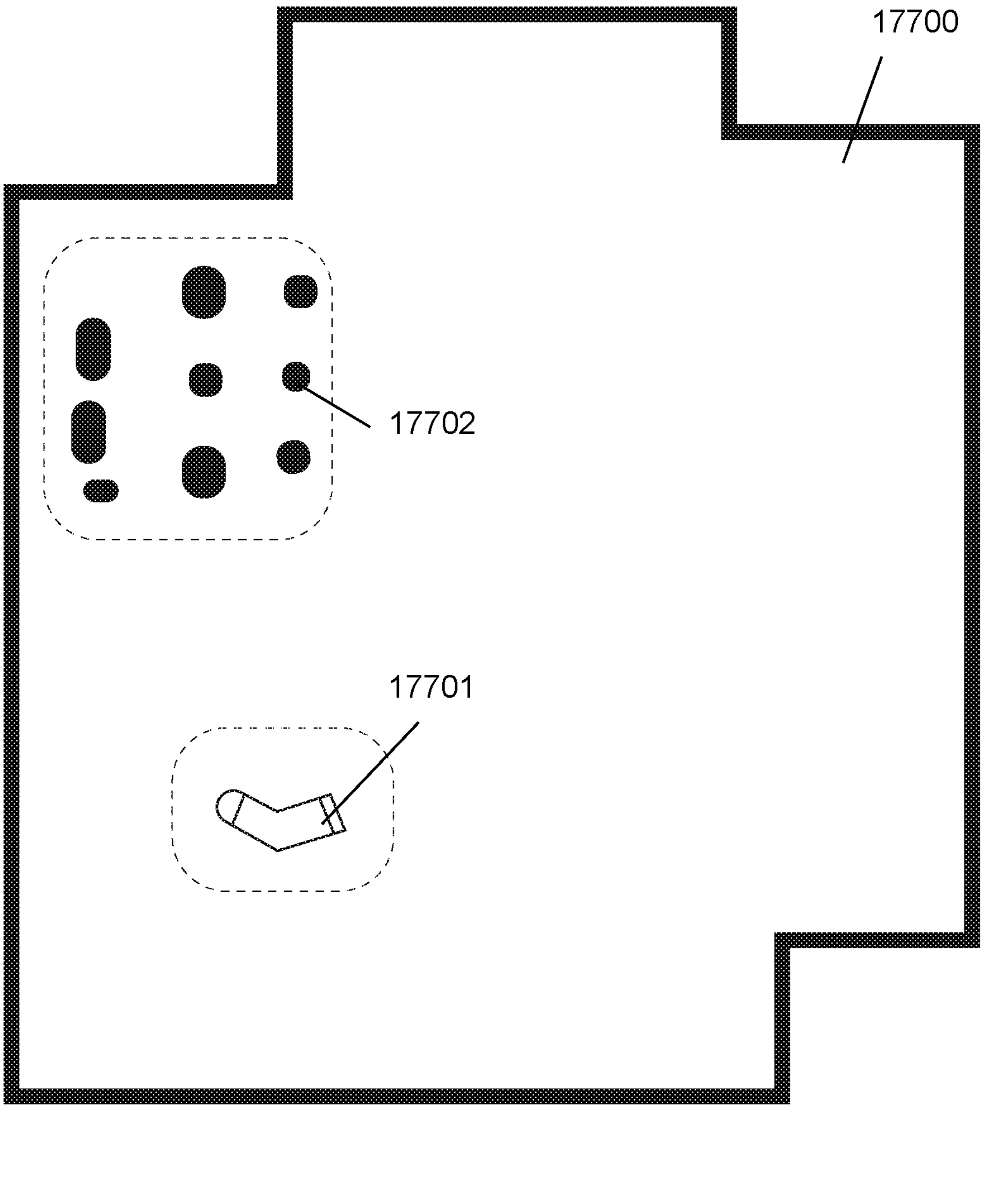
FIG. 22A illustrates an example of a map.
Figure 22B:
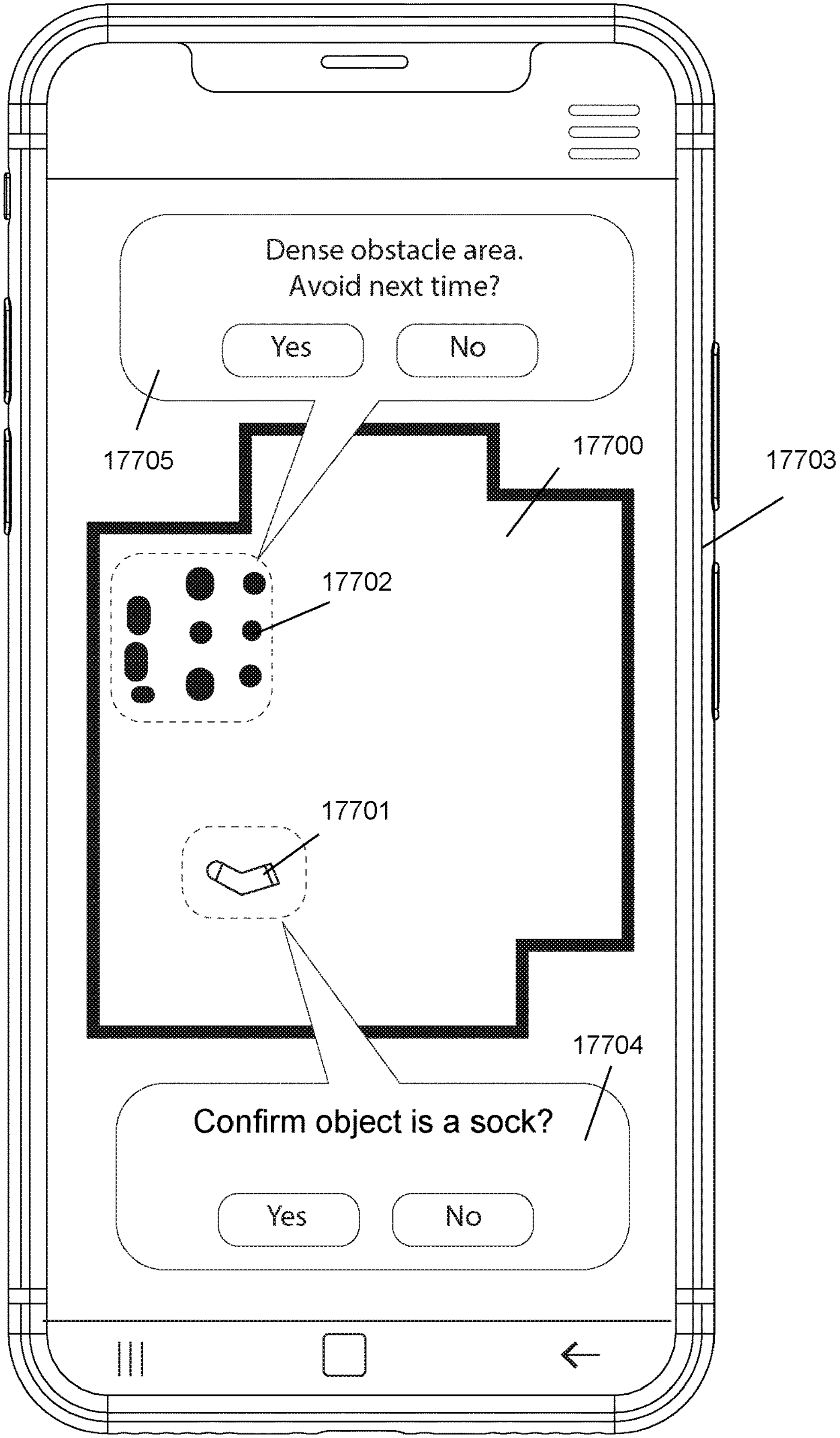
FIG. 22B illustrates a map viewed using an application of a communication device.

In some embodiments, the processor of the robot may insert image data information at locations within the map from which the image data was captured from. FIG. 21 illustrates an example of a map including undiscovered area 17600 and mapped area 17601. Images 17602 captured as the robot maps the environment while navigating along the path 17603 are placed within the map at a location from which each of the images were captured from. In some embodiments, images may be associated with a location from the images are captured from. In some embodiments, the processor stitches images of areas discovered by the robot together in a two dimensional grid map. In some embodiments, an image may be associated with information such as the location from which the image was captured from, the time and date on which the image was captured, and the people or objects captured within the image. In some embodiments, a user may access the images on an application of a communication device. In some embodiments, the processor or the application may sort the images according to a particular filter, such as by date, location, persons within the image, favorites, etc. In some embodiments, the location of different types objects captured within an image may be recorded or marked with the map of the environment. For example, images of socks may be associated with the location at which the socks were found in each time stamp. Over time, the processor may know that socks are more likely to be found in the bedroom as compared to the kitchen. In some embodiments, the location of different types of objects and/or object density may be included in the map of the environment that may be viewed using an application of a communication device. For example, FIG. 22A illustrates an example of a map of an environment 17700 including the location of object 17701 and high obstacle density area 17702. FIG. 22B illustrates the map 17700 viewed using an application of a communication device 17703. A user may use the application to confirm that the object type of the object 17701 is a sock by choosing yes or no in the dialogue box 17704 and to determine if the high density obstacle area 17702 should be avoided by choosing yes or no in dialogue box 17705. In this example, the user may choose to not avoid the sock, however, the user may choose to avoid other object types, such as cables. Further details of methods related to mapping and use of the map in operating the robot that may be employed herein are described in U.S. Non-Provisional patents application Ser. Nos. 17/670,277, 17/344,892, and 17/494,251, each of which is hereby incorporated herein by reference.

Figure 23:
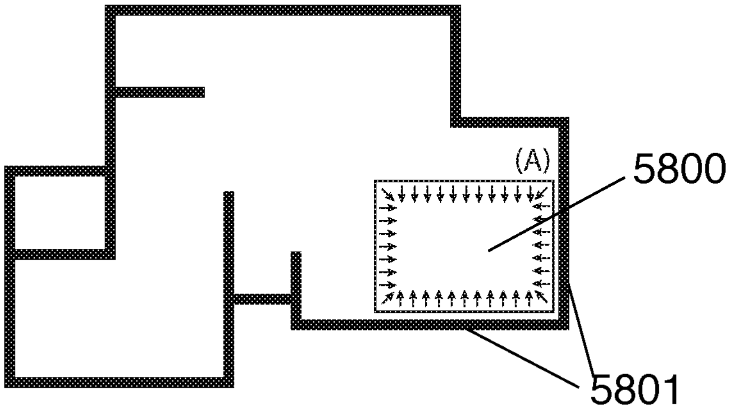
FIG. 23 illustrates an example of partial coastal mapping.

Some embodiments include a radially outward SLAM method for robots. In the radially outward SLAM method, a robot immediately begins performing work, as opposed to the commonly executed rigid box inward looking SLAM method. In the rigid box inward looking SLAM method, the robot initially follows along one or more walls while creating a rigid box by closing the loop at a starting point of the box before beginning coverage. After following one or more walls and establishing the one or more walls as the ground truth of one or more perimeters of a map with high certainty, the robot makes a substantially 90 degrees turn to close the loop and form a rectangle, or otherwise a ground truth area that may be covered by the robot. For example, FIG. 23 illustrates a rectangle 5800 including two ground truth perimeters coinciding with walls 5801 and two sides that do not coincide with a wall. This SLAM method may be viewed as partial coastal mapping, whereas in costal mapping the robot follows along all walls before beginning to perform work.

In some embodiments, global sensors, such as a LIDAR or a camera, are used to establish walls as ground-truth perimeter points. In some embodiments, a second sensor, such as a short-range distance sensor or a bumper sensor, also senses the walls as the robot follows along the walls. Sensing the walls with the second sensor confirms sensor readings of the global sensor, as the global sensors use remote sensing techniques with lower certainty and lower resolution. The additional sensor readings captured by the second sensor increases the confidence score of the map and localization of the robot within the map. Since the second sensor is limited to confirming the location of walls, only the global sensors are used in sensing the areas that do not coincide with a wall. However, given that the locations of walls used as ground truth perimeter points have a high certainty, even with the lower accuracy areas of the map that do not coincide with a wall, the overall stability of the map is high. In some instances, low certainty long range sensors are used for mapping directions that are not directed towards a wall which limits the FOV of uncertain areas.

Figure 24:
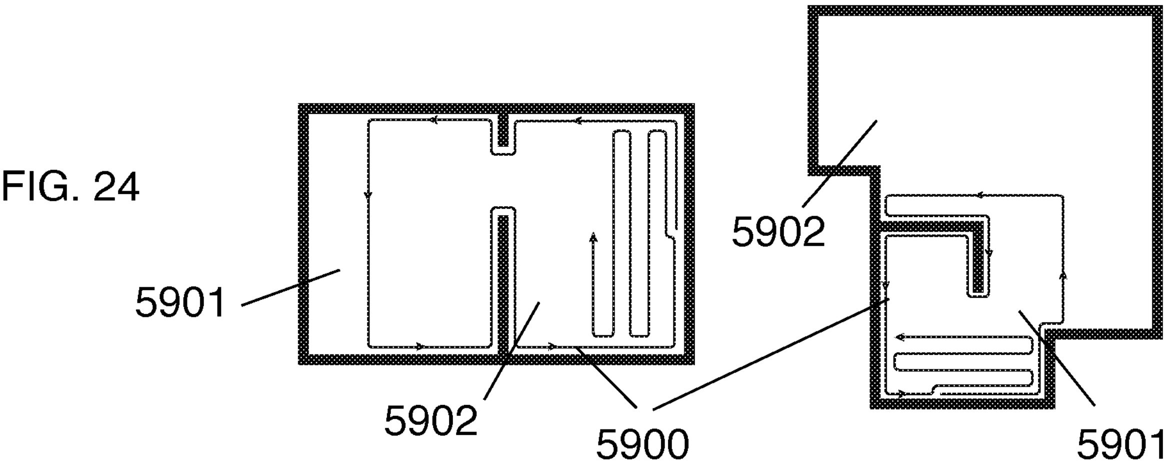
FIG. 24 illustrates an example of mapped rigid areas.
Figure 25:
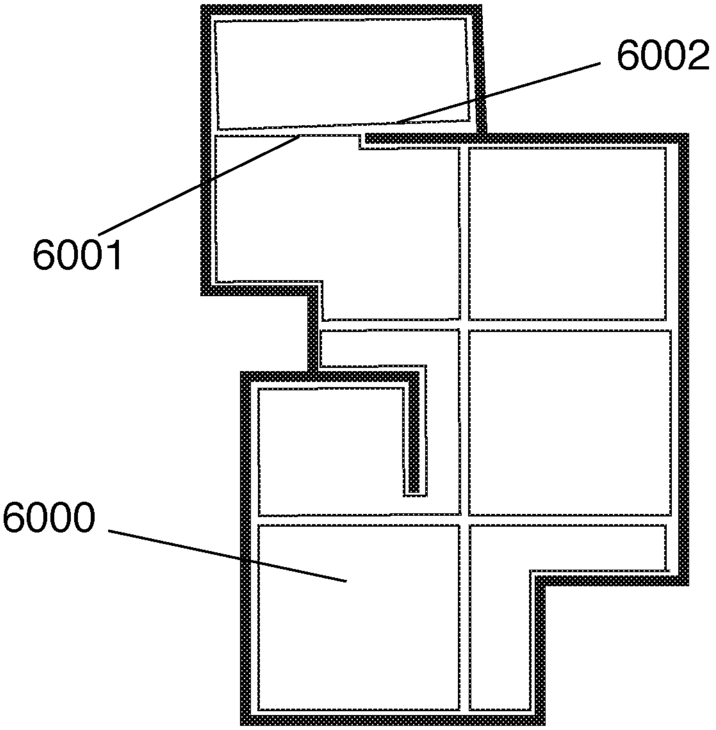
FIG. 25 illustrates an example of rigid geometries within which a robot performs work.

The rigid box inward looking SLAM method described above is limited by its rigid form, causing the robot to infringe on room boundaries in some instances and clean in an inorganic-looking way (i.e., cleaning rooms partially as opposed to cleaning from one room to another room, one at a time). For example, FIG. 24 illustrates two examples of mapped rigid areas 5900 within which the robot performs coverage. Both rigid areas 5900 span over two rooms 5901 and 5902. The areas 5900 in each case cover only a portion of room 5902, causing the robot to clean in a seemingly inorganic way. Additionally, with the rigid box inward looking SLAM method, alignment of rigid geometries may suffer as they are added one on top of another. FIG. 25 illustrates an example of areas 6000 with rigid geometries within which the robot performs coverage. As each area of the areas 6000 are mapped they are each added one on top of the other, and in some instances, issues with alignment arise, as in the case of perimeters 6001 and 6002 of adjacent areas. The rigid box inward looking SLAM method further requires a large computational expense (processing and memory) as the entire mapped area is formed by stitching each of the areas 6000. While consumer homes require enough processing to perform coverage within an area of a home (e.g., 240 square meters), commercial establishments such as shopping malls, hotels, and offices are much larger and require much more processing and memory. Therefore, if the entire mapped area is formed into a single area by stitching multiple smaller areas together, computational intensity increases exponentially, causing limitations on the amount of area that can be covered by the robot.

Figure 26:
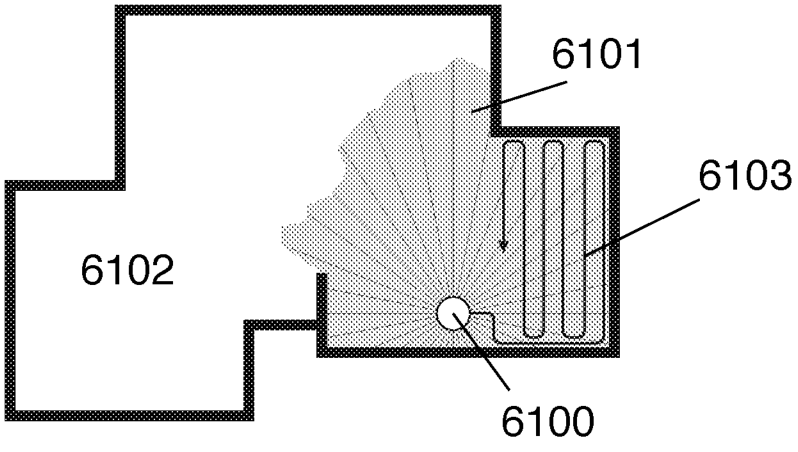
FIG. 26 illustrates an example of a robot performing work.

In contrast to the rigid box inward looking SLAM method, the radially outward looking SLAM method immediately begins map filling and localization upon startup of the robot and compensates for a lack of ground truth walls using probabilistic algorithms. The robot begins performing work soon after being turned on by using partial observation of the environment. FIG. 26 illustrates a robot 6100 with partial observation of subarea 6101 within an environment 6102. The robot 6100 begins performing work within observed area 6101 upon startup of the robot by following along path 6103. As the robot 6100 performs work, a processor of the robot continues to expand the areas observed using newly captured sensor data of the environment 6102. The processor continues to plan paths that cover the newly observed areas. The radially outward looking SLAM method uses rooms as opposed to being restricted to rigid geometries, as is the case in the rigid box inward looking SLAM method. For instance, FIG. 24 illustrates rigid geometries 5900 that violate the boundaries of rooms 5901 and 5902, respectively, as the SLAM method follows a substantially rigid pattern. This may be reasonable for a consumer home, however, for larger establishments, such as a hotel or a shopping mall, it is impractical for the robot to enter and exit a hotel room or a shop in a mall while cleaning the hotel room or shop.

Figure 27:
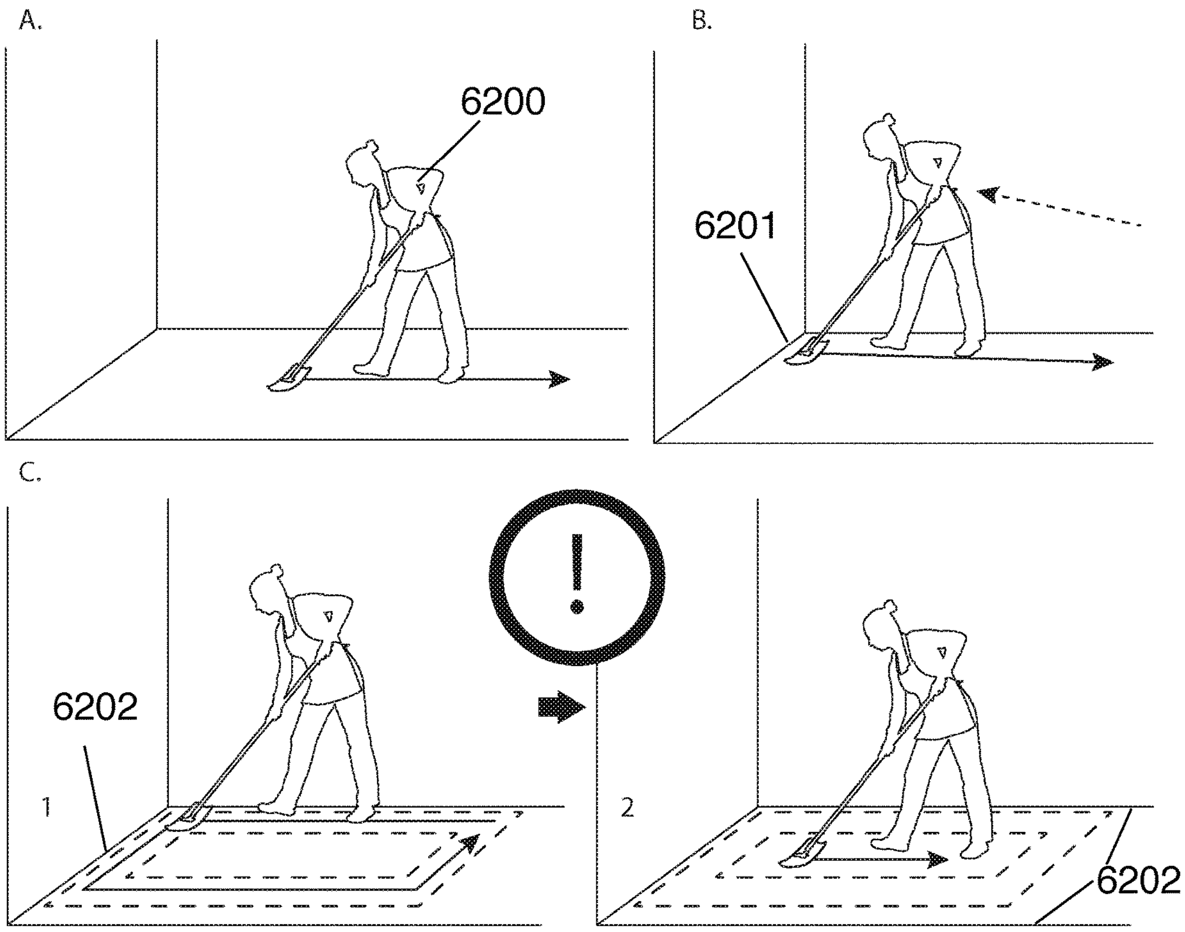
FIG. 27 illustrates examples of a person performing a cleaning task.

In embodiments, rigid box inward looking SLAM method is limiting for applications where coverage is not the goal. For example, scouting robots, surveillance robots, food delivery robots, or service robots do not need to follow along a wall to perform their function. It is unintuitive for such robot types to follow along some walls before performing their intended function. For a home cleaning robot or a commercial cleaning robot the wall following limitation is masked as the robot must cover areas along the walls as part of its coverage task. Typically, the robot initially covers some areas along the walls to establish ground truth perimeters for the map. However, even in a coverage task, it is inorganic to initially clean along some walls of a room rather than areas initially surrounding the cleaner. For instance, a human tasked to mop or vacuum a floor does not create a rigid box with one or two sides coinciding with one or two walls then clean inside the rigid box. The human is more likely to start cleaning areas initially surrounding a location of the human at the time the task was given or begin cleaning from one wall work inwards towards a center of the room and finally the wall opposite from where the cleaning began. It is unintuitive for a human to follow along a first wall, then a second wall without touching any other areas. FIG. 27 illustrates A. a person 6200 intuitively starting a cleaning task in areas surroundings the person 6200 or B. the person 6200 intuitively starting a cleaning task from a corner or wall 6201 and cleaning towards a center of the room and C. the person 6200 unintuitively following along walls 6202, drawing a narrow width rectangle 6203 and then cleaning inside the rectangle 6203.

In some embodiments, a robot comprising a camera, LIDAR, or depth camera with a controller stores a map previously created by the processor of the robot or by a processor of another robot. The LIDAR or camera capture readings indicative of boundaries and obstacles within the environment. The processor of the robot determines, based on a difference between the LIDAR or camera data and the map, whether the map requires revision or the robot has taken a detour or an alternate path without updating the map. In some embodiments, the processor of the robot refines and smoothens the map after a cartography run by the robot or a collaborating robot. This allows the mapping to rely more on online state estimation using filtering methods with a Markovian assumption. For example, EKF works based on such an assumption and removes the histories that have little impact on the current state. However, this assumption suffers from an update transforming a Gaussian distribution to a form wherein the act of linearization, by definition, ignores data that accumulates a sufficient size error over a series of stamps to invalidate the assumption. Prior art only considers the state estimation in an online sense, wherein the latest measurements are incorporated in real-time as they are captured, some or all sliding window methods, or a pose graph. In some embodiments herein, a dynamic sized sliding window is used and a size of the window changes with availability of computational resources. When a CPU engagement is below a certain threshold, the window size increases to make use of the resources that are available and would otherwise go unused. This keeps the residual errors from accumulating and becoming out of control and periodically in check on a best effort basis. In some intervals, loop closure occurs, however, in other instances, the robot runs minimal navigational tasks. Since a multithreading system allows for resource management, the threads with higher priority get served while some threads intending to apply smoothing when computational resources are available are pruned (or pre-empted) if the availability condition changes. This allows best use of resources in a cartography run, wherein the robot navigates while performing work and the processor applies filters such as EKF or particle filters.

After the cartography run, during which optimal use of resources is made, a full-pose graph optimization may be executed by a playback of recordings of states (similar to a deja vu for the robot). This may be thought of as the processor of the robot, now knowing the future, going back and avoiding the residual mistakes (i.e., errors) made, finding key frames and constructing BA between them, considering larger window sizes or a window size determined based on a co-visibility graph, or solving the complete full SLAM problem while the robot is stationary, charging, and waiting for a next run. In some embodiments, the playback smoothing is interrupted by a user instructing the robot to perform work, in which case the rest of the playback continues at a later time. In many environments, such as a house or a supermarket, the environment rarely changes structurally. As a result, an occasional or single smoothing or backend optimization has significant impact. This way, the available computational resources are spread more evenly and the SLAM optimization requirements are traffic shaped. In implementation, Schur Kron reduction or node elimination, Gaussian reduction, and other linear algebra may be used. In some embodiments, delayed smoothing occurs in the background as a very low priority task and is capped at a certain MCU/CPU usage percentage, MIPS, or clock rate. In some cases, cloud usage resources are capped to better use existing resources. In some embodiments, delayed smoothing occurs on the cloud concurrent with or after the cartography run. Delayed smoothing particularly works well with multi-type feature detection.

Figure 28:
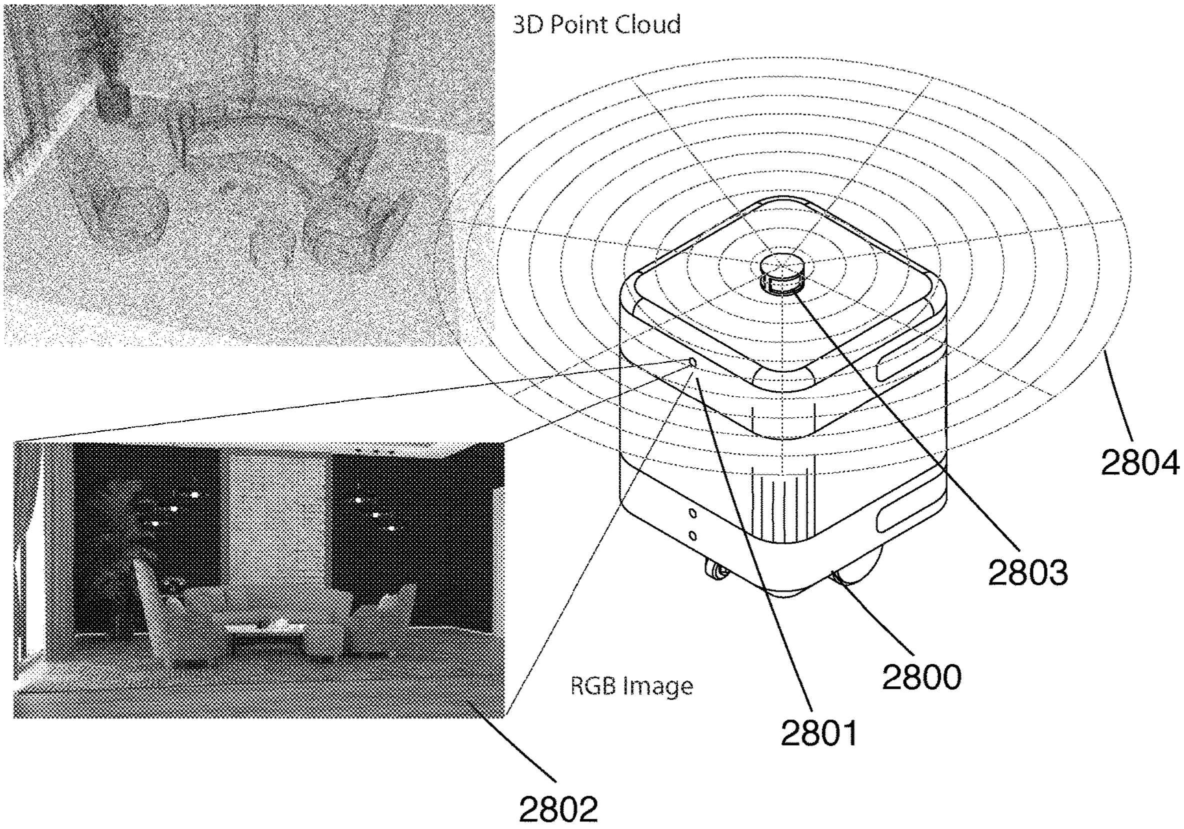
FIG. 28 illustrates an example of a robot comprising a camera and LIDAR sensor.

In some embodiments, readings from scans of the environment are merged and a 3D map of the structural environment, including objects, is created. RGB data may be integrated into point clouds to create a fully colorized HD map. The HD map may have multiple resolutions, such as a high resolution, a low resolution, and multiple resolutions in between high and low resolutions. For localization, a map resolution suitable for localizing the robot may be loaded. In some embodiments, the size of the map is a function of resolution. The size of the map for a fixed size indoor space does not grow after all points are mapped once. After a first HD map version, the map may be updated. As other robots localize with respect to the fixed map, their respective sensor readings may be merged into the HD map at a sub-sampled rate. The level of confidence of readings that each of the robots provides is based on their respective sensory equipment and determines how much weight their respective readings provide to the HD map. Logically, it is undesirable for a near-perfect HD map to be modified with readings from sensors of a low-cost consumer robot if high accuracy readings are required. Once a map with both point cloud and color exists, the processor of the robot localizing the robot against the map may use data from at least one of the camera and the LIDAR for localization. In some cases, the processor of the robot uses LIDAR depth readings to localize against a colorized voxel. Alternatively, the processor uses image data from the camera to localize against the color of each point into voxel. Each robot may be equipped with at least one of a camera and a LIDAR sensor or may use a fusion of both sensors depending on an application of the robot and a distance the robot needs to clear (e.g., depending on its speed). FIG. 28 illustrates a robot 2800 including a camera 2801 for capturing RGB images 2802 and a LIDAR sensor 2803 for capturing 3D point cloud data 2804.

Temporal captures of data between time steps $t_i$ to $t_n$ as the robot moves within the environment increases density of points, may be used to perform calibration, increases a number of perspectives of observation, thereby increasing the chance of a proper labeling, increases FOV, creates a virtual camera with different intrinsic parameters that are a function of the original intrinsic parameters, and serves many other benefits. In some embodiments, the temporal captures of data are combined by superimposition, wherein movement of the camera is accounted for. Points of interest are encompassed within a bounding box, wherein the contents within the bounding box are treated differently than peripheral portions within the frame, in terms of rate, resolution, sampling rate, sampling quantity, sampling weight, etc. In an extreme case, images may be cropped to only include the area of interest (i.e., the area within the bounding box). In some embodiments, a value for usefulness of each image and areas within each image is used after normalization. In some embodiments, the images captured as the robot moves at a constant speed have a higher value of usefulness in comparison to images captured as the robot is accelerating or decelerating.

Figure 29:
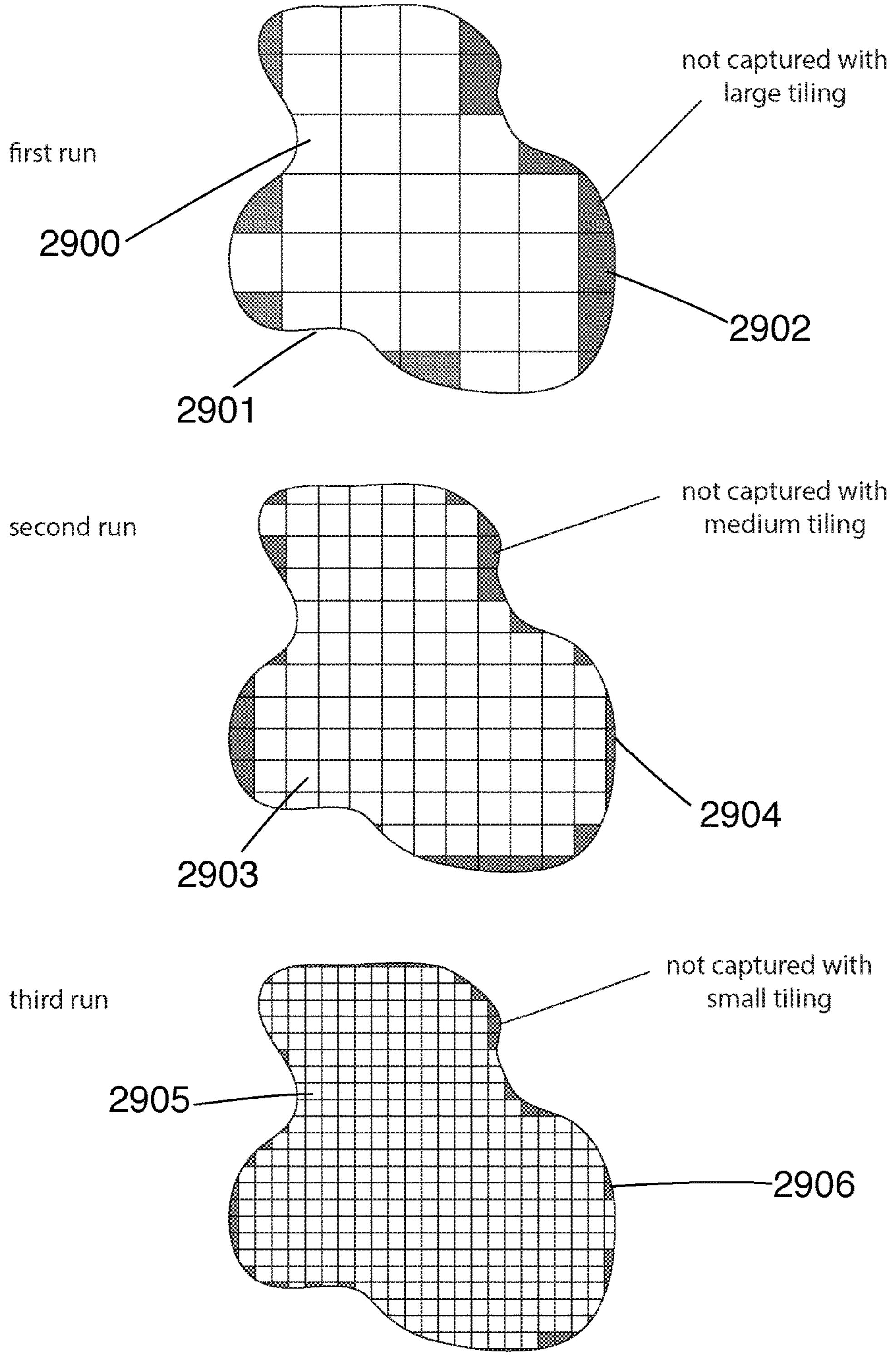
FIG. 29 illustrates an example of tile density.

In some embodiments, optimization algorithms are used, such as Riemannian staircase, hill climbing, simulated annealing, etc. Some embodiments increase tile density over run count for a same sensor resolution. FIG. 29 illustrates largest tiling 2900 of an environment 2901 and areas 2902 uncaptured by the largest tiling 2900 during a first run; medium tiling 2903 of the environment 2901 and areas 2904 uncaptured by the medium tiling 2903; and small tiling 2905 of the environment 2901 and areas 2906 uncaptured by the small tiling 2904. FIG. 29 illustrates that as a number of runs increases tile density and alignment with the contour of environment 2901 increase. For medium tiling, $$x = 2i,\ y = 2j, \quad \nabla P_{of\ medium\ tiling} = \frac{\delta P}{\delta x}(2i) + \frac{\delta P}{\delta y}(2j)$$

and $$\frac{\delta P(x, y)}{\delta x} \text{ of medium tiling} = 2\frac{\delta P(x, y)}{\delta x} \text{ for small tiling.}$$

This makes sense as the rate of change is higher when the step size is larger. This necessitates the homogenization of coordinate systems. Some embodiments find a surface with a smallest surface area enclosed within a volume in three dimensions or find a curve with a smallest arch enclosed in an area, known as a Dido problem, or more generally, isoperimetric inequality. In n dimensions $R^n$, the inequality finds the lower bound of the surface area of perimeter per(S) of a set SER, by the lower bound being volume of S. When n=2, the isoperimetric inequality associates a square of circumference of a closed curve and an area of a plane it encloses.

In some embodiments, a camera, installed on the robot, for example, measures the depth from the camera to objects within a first field of view. In some embodiments, a processor of the robot constructs a first segment of the map from the depth measurements taken within the first field of view. The processor may establish a first recognized area within the working environment, bound by the first segment of the map and the outer limits of the first field of view. In some embodiments, the robot begins to perform work within the first recognized area. As the robot with attached camera rotates and translates within the first recognized area, the camera continuously takes depth measurements to objects within the field of view of the camera. In some embodiments, the processor compares depth measurements taken within the second field of view to those taken within the first field of view in order to find the overlapping measurements between the two fields of view. The processor may use different methods to compare measurements from overlapping fields of view. An area of overlap between the two fields of view is identified (e.g., determined) when (e.g., during evaluation a plurality of candidate overlaps) a number of consecutive (e.g., adjacent in pixel space) depths from the first and second fields of view are equal or close in value. Although the value of overlapping depth measurements from the first and second fields of view may not be exactly the same, depths with similar values, to within a tolerance range of one another, can be identified (e.g., determined to correspond based on similarity of the values). Furthermore, identifying matching patterns in the value of depth measurements within the first and second fields of view can also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, can also be used to estimate the area of overlap. A Jacobian and Hessian matrix can be used to identify such similarities.

In some embodiments, the processor uses a neural network to stitch images together and form a map. Various methods may be used independently or in combination in stitching images at overlapping points, such as least square method. Several methods may work in parallel, organized through a neural network to achieve better stitching between images. Particularly with 3D scenarios, using one or more methods in parallel, each method being a neuron working within the bigger network, is advantageous. In embodiments, these methods may be organized in a layered approach. In embodiments, different methods in the network may be activated based on large training sets formulated in advance and on how the information coming into the network (in a specific setting) matches the previous training data.

In some embodiments, the movement pattern of the robot during the mapping process is a boustrophedon movement pattern. This can be advantageous for mapping the environment. For example, if the robot begins in close proximity to a wall of which it is facing and attempts to map the environment by rotating 360 degrees in its initial position, areas close to the robot and those far away may not be observed by the sensors as the areas surrounding the robot are too close and those far away are too far. Minimum and maximum detection distances may be, for example, 30 and 400 centimeters, respectively. Instead, in some embodiments, the robot moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robot, in some embodiments, (or sensor thereon if the sensor is configured to rotate independently of the robot) then rotates 180 degrees to face towards the open space of the environment. In doing so, the sensors observe areas in front of the robot and within the detection range. In some embodiments, the robot does not translate between the backward movement and completion of the 180 degrees turn, or in some embodiments, the turn is executed while the robot translates backward. In some embodiments, the robot completes the 180 degrees turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robot, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robot by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robot, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robot returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robot makes two 180 degree turns separated by some distance, such that movement of the robot is a boustrophedon pattern, travelling back and forth across the environment. In some embodiments, the robot may not be initially facing a wall of which it is in close proximity with. The robot may begin executing the boustrophedon movement pattern from any area within the environment. In some embodiments, the robot performs other movement patterns besides boustrophedon alone or in combination.

In other embodiments, the boustrophedon movement pattern (or other coverage path pattern) of the robot during the mapping process differs. For example, in some embodiments, the robot is at one end of the environment, facing towards the open space. From here, the robot moves in a first forward direction (from the perspective of the robot as defined above) by some distance then rotates 90 degrees in a clockwise direction. The processor determines the first forward distance by which the robot travels forward by detection of an obstacle by a sensor, such as a wall or furniture. In some embodiments, the first forward distance is predetermined (e.g., and measured by another sensor, like an odometer or by integrating signals from an inertial measurement unit). The robot then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robot returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robots, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robots brush size can be between 50-60 cm. The robot then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robot repeatedly makes two 90-degree turns separated by some distance before travelling in the opposite direction, such that movement of the robot is a boustrophedon pattern, travelling back and forth across the environment. In other embodiments, the directions of rotations are opposite to what is described in this exemplary embodiment. In some embodiments, the robot may not be initially facing a wall of which it is in close proximity. The robot may begin executing the boustrophedon movement pattern from any area within the environment. In some embodiments, the robot performs other movement patterns besides boustrophedon alone or in combination.

In some embodiments, the robot may enter a patrol mode during an initial run and the processor of the robot may build a spatial representation of the environment while visiting perimeters. In traditional methods, the robot executes a wall follow by detecting the wall and maintaining a predetermined distance from a wall using a reactive approach that requires continuous sensor data monitoring for detection of the wall and maintain a particular distance from the wall. In the wall follow method described herein, the robot follows along perimeters in the spatial representation created by the processor of the robot by only using the spatial representation to navigate the path along the perimeters (i.e., without using sensors). This approach reduces the length of the path, and hence the time, required to map the environment.

In embodiments, multiple sensors disposed on one or more robots and/or one or more stationary sensors contribute to building a vector field map. Alternatively, active and passive signs along a path of the robot help with localizations. In some embodiments, a vector field map comprises multiple layers. For example, a base layer is a simple grid map, a second layer includes historic data or additional dimensions for the base layer, a third layer includes features, images, and labels, a fourth layer includes a vector field, a fifth layer includes an effect of local participants at a certain degree of locality (e.g., vicinity), and a sixth layer includes an influence of local participants on the vector field. In general, an increased number of map layers and/or map dimensions lead to a reduction in spatial and temporal horizon.

Figure 30:
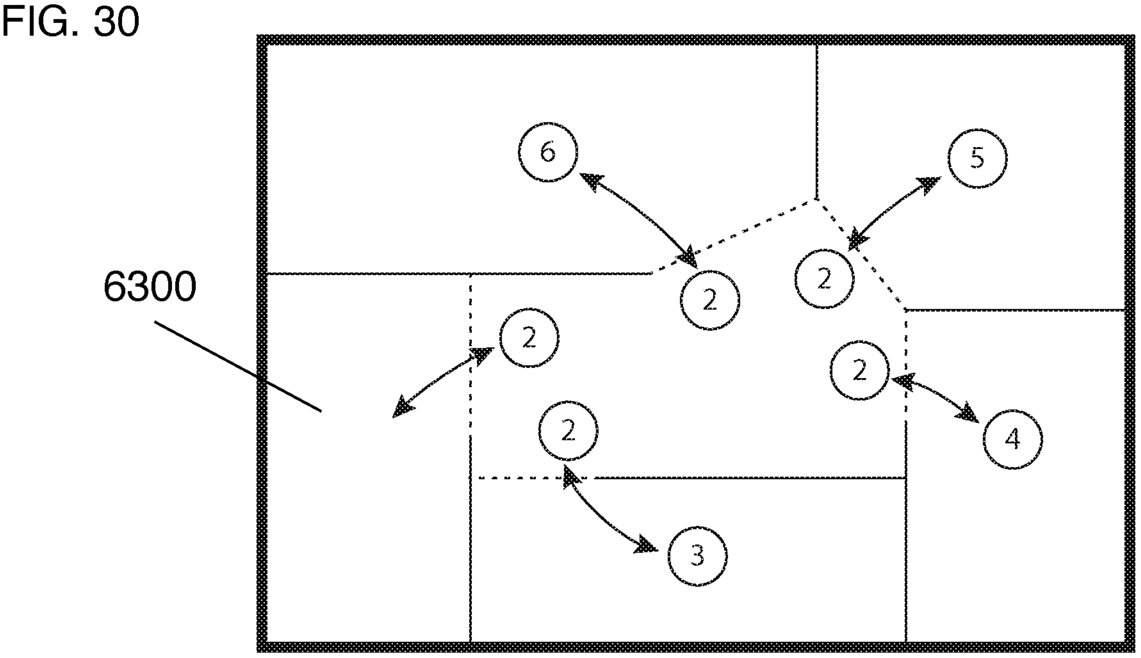
FIG. 30 illustrates an environment divided into logical area units.
Figure 31:
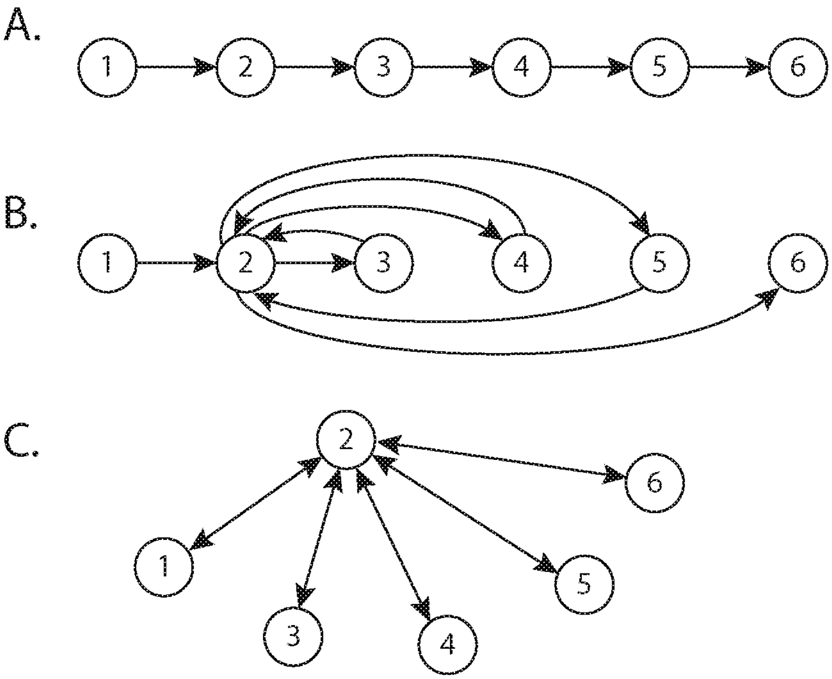
FIG. 31 illustrates graphs of connections between logical area units.

To reduce computational cost that increases exponentially with a size of a workspace, the processor of the robot divides the workspace into logical area units (e.g., rooms in a home, stores in a mall, suites in a hotel, etc.) and stores a map for each logical area unit, wherein each logical area unit is connected to other logical area units. In embodiments, a graph is used to represent the connections between logical area units. FIG. 30 illustrates an example of six logical area units in an environment 6300, each connected to at least one other logical area unit. Logical area unit 2 is connected to logical area units 1, 3, 4, 5, and 6 through openings (illustrated by dashed lines). FIG. 31A illustrates a graph of the connections of logical area units 1-6 within environment 6300. The graph is generated as a linear connection of vertices as the robot moves from one logical area unit to another in numerical order, ignoring redundant links. FIGS. 31B and 31C illustrate alternative graphs that represent the connections between logical area units in environment 6300 as the robot moves from one logical area unit to another in numerical order.

After an initial assignment of each logical area unit to a node, the processor offloads prior nodes (especially logical area units that are more than one edge away) into a location of memory storage that differs from active processing memory, as the robot explores and finds new logical area units. For example, a processor uses primary memory (sometimes on-chip) for immediate tasks, a secondary memory for less immediate tasks, and a third memory for tasks and information that are less likely to be needed in real-time. A primary memory often communicates directly with the processor, has a very high speed with limited capacity, and is sometimes built into the processor. A secondary memory offers more capacity but less speed. Often data present on the secondary memory is loaded to primary memory for processing and sent back to the secondary memory. Data is stored on storage memory, which often survives a power switch. Storage memory comprises NV-RAM or flash memory, as they provide a means to store data as opposed to being active in processing data. Through a process of paging and caching, the processor optimizes available memory spaces.

Upon entrance to a new logical area unit, the robot performs an initial exploration. Upon the processor identifying a particular logical area unit (e.g., room 2), the loads a map associated with the logical area unit. In some embodiments, the processor caches maps of previous logical area units visited. If the processor stores the map of the particular logical area unit, there is no need to offload and reload the map, as offloading and reloading requires computational cycles, and therefore, does not save significantly on efficiency.

In some embodiments, the processor keeps more than one logical area unit in the cache (e.g., 2, 3, 4, 5, and 10 hub rooms), depending on a shape of the graph, the processing power and other computational resources, and a current size of the workspace. For example, when computational resources of the robot permits storing 4000 sq. ft. of the workspace with a particular obstacle arrangement complexity and 3000 sq. ft. of logical area units are already discovered, there is no need to offload the vertices pertaining to the 3000 sq. ft. to secondary memory.

With a hierarchical graph approach, a size of the map scales to larger areas with controlled addition of computational intensity, such as a linear increase, reasonably more than a linear increase, or much more than a linear increase. There are more advantages to using a hierarchical approach as the workspace increases in size. In some embodiments, a set of attributes and properties are associated with each logical area unit, such as a label (e.g., type of room or a number), a size, a floor type, a number of floor types and the areas pertaining to each floor type, a set of features (e.g., corners), light sources (e.g., bulbs on the ceiling or walls), power outlet locations, objects (e.g., furniture or appliances) and their respective locations, objects on the floor in a current run or histogram of runs, a set of actions associated with detected objects on the floor, etc. For example, the processor instructs the robot to stay away from a detected object (e.g., socks) or grab the object using robotic arms and move the object to a box of objects the user may sort through later.

Figure 32:
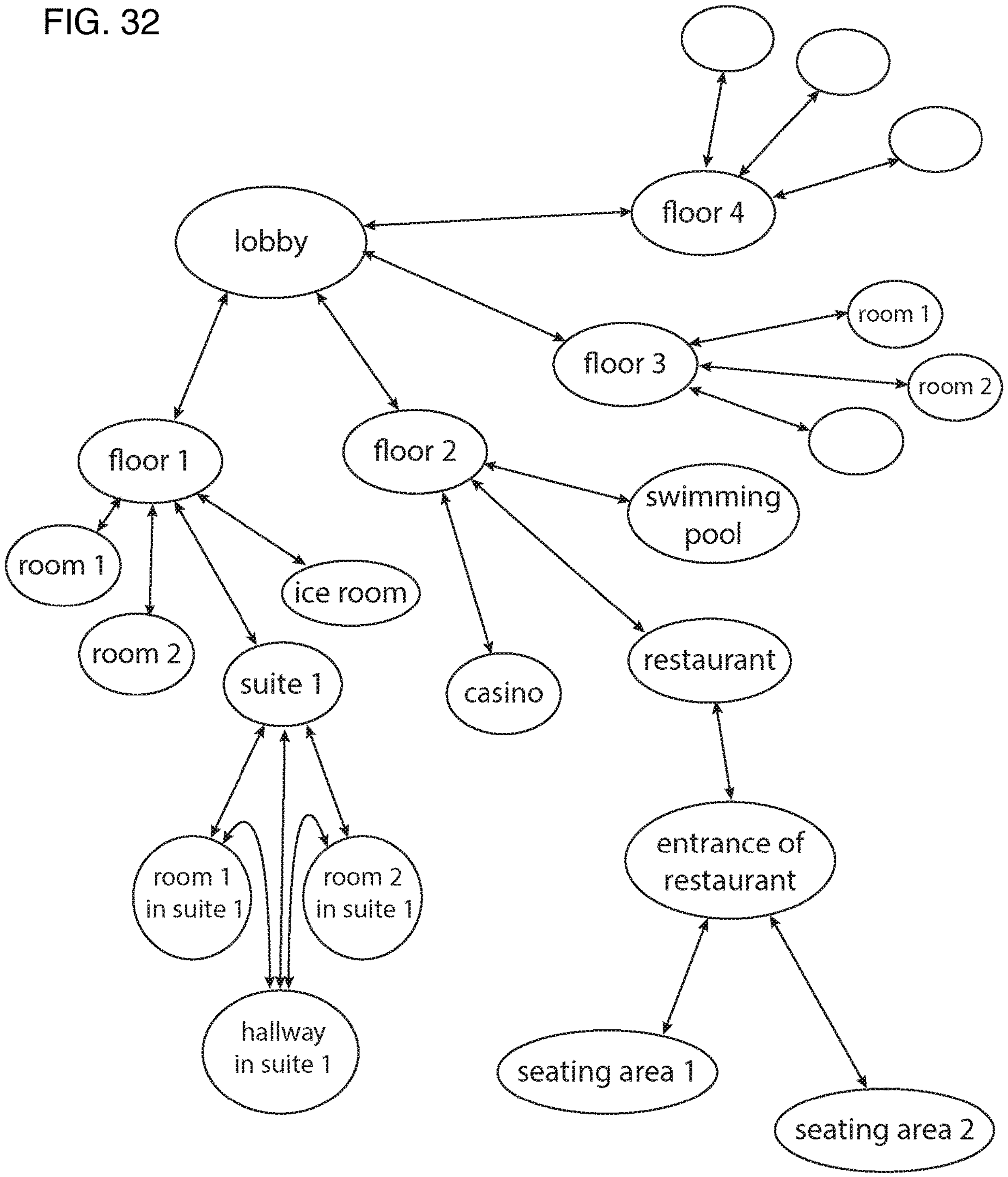
FIG. 32 illustrates an example of a graph of a hotel.

A logical area unit may comprise a room or a floor or another area. For example, a house with multiple floors includes multiple maps and each map is represented as a logical area unit. In some embodiments, a user uses a GUI or HMI interface of an application paired with the robot to choose a map of a current location of the robot manually as opposed to the processor of the robot automatically choosing the correct map via a relocalization process. In another example, a hotel with multiple floors, each floor with multiple rooms is represented using a graph architecture that allows for growth. FIG. 32 illustrates an example of a graph of a hotel, wherein the lobby, each floor and all rooms accessible from each of the floors are logical area units. The rooms in suite 1 and the entrance and seating areas of the restaurant are also logical area units.

The hierarchical approach is especially advantageous for managing computational resources required for storing a vector field map as the vector field map encompasses more data dimensions than a grid map or a combined grid map and feature map. While the concept of logical area units applies to various types of maps, implemented hierarchically or linearly, the concept logical area units is a subject of this invention and may be combined with other method and techniques described herein. For example, the processor of the robot identifies a room and the robot treats the workspace with coverage in a first run while honoring the constraints of a logical area unit, which may be combined with one or more methods and techniques described herein, such as room coloring.

Figure 33:
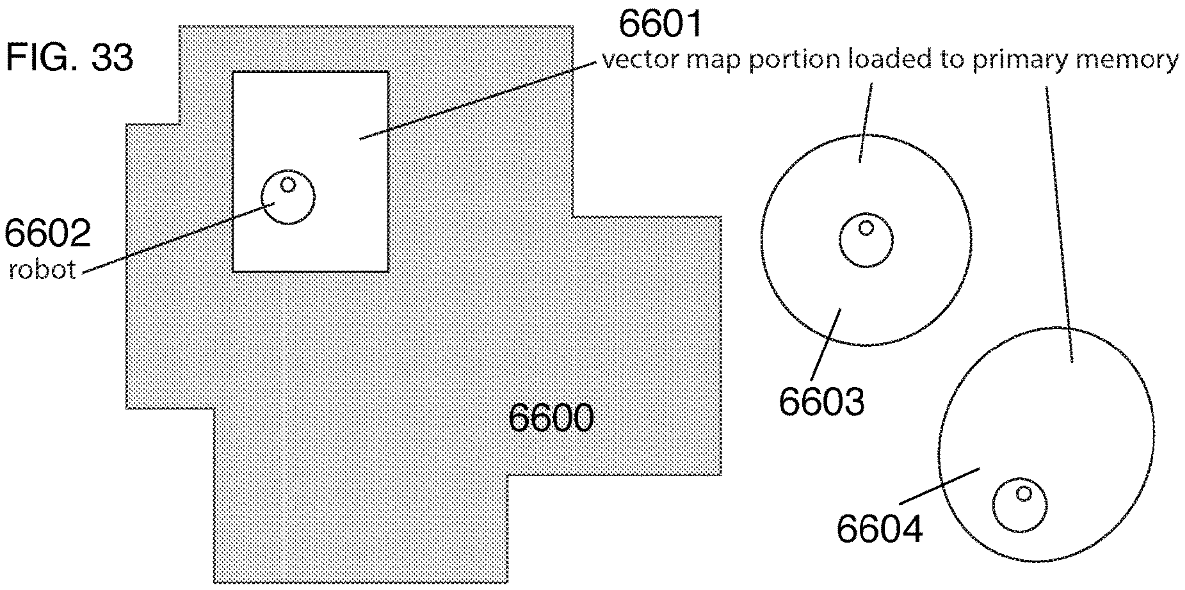
FIG. 33 illustrates an example of a vector field map.
Figure 34:
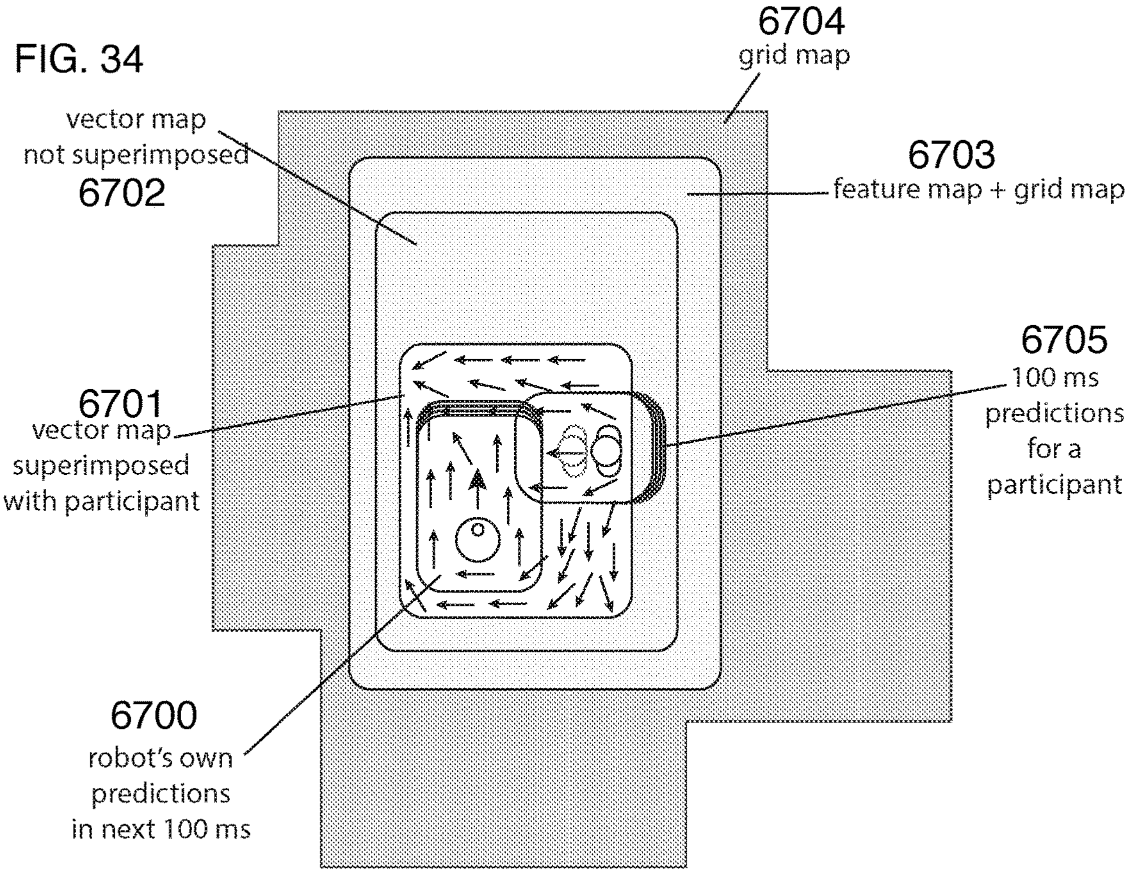
FIG. 34 illustrates an example of a vector field map, a feature map, and a grid map.

In some embodiments, the logical area unit is not used in conjunction with offloading and reloading map portions. A block of the feature map, grid map, or vector field map surrounding the robot is loaded, such as areas in front, behind and to the sides of the robot. FIG. 33 illustrates a vector map 6600 and a rectangular vector map portion 6601 surrounding robot 6602 loaded to primary memory. The vector map portion may be different shapes, such as circular vector map portions 6603 and 6604. Loading an area of a map that is immediately applicable to a location of the robot as well as areas that the robot is predicted to be located within in the next 100 ms, 299 ms, 300 ms, 1 second, 2 second, etc. saves computational processing. The processor may use the feature vector map superimposed with dynamic participants to formulate predictions of locations of the dynamic participants within the next 100 ms, 200 ms, 300 ms, etc. The parts of the feature vector map superimposed with pose predictions of the dynamic participants which the robot is unable to reach prior to the predictions expiring are not loaded. Only information within the vicinity of the robot is useful, as such, that is the information that is loaded, making processing practically feasible. In some embodiments, two or more regions within a vicinity of the robot are loaded. For example, FIG. 34 illustrates a vector field map of a first region 6700 within an immediate vicinity of the robot superimposed with a vector field map superimposed with predictions of participant locations 6701, a second region 6702 including a vector field map, a third region 6703 including a feature map and a grid map, and a fourth region including the grid map 6704. Predictions of a location of the robot in a next 100 ms 6700 and predictions of a location of the participant in a next 100 ms 6705 are also superimposed. Other portions of the grid map 6704 are not loaded to save on processing.

The use of rooms as logical units of area is organic. In some embodiments, the processor of the robot uses a hierarchical separation of rooms in a graph, wherein each room is a node in the graph. This helps with scaling the map, such as beyond the size of a consumer home, as a store in a shopping mall or a hotel room in a hotel, for example, are not required to be a part of a single flat humongous map. When presented to the user using an application of a communication device paired with the robot, logical units of areas, or otherwise a room, serve as a more intuitive way of communicating a status of the work relating to each room with the user. In some embodiments, rooms within the map are colored. In some embodiments, rooms within the graph are colored based on partial observability, wherein a color is assigned to an area that forms an enclosure as soon as the robot enters the area and perceives the area as the enclosure. Graph coloring or vertex coloring may be defined on an undirected graph G=(V, E), wherein a color C from a set C $\{C_1, C_2, C_3, \ldots, C_i\}$ is assigned to a vertex V from a set V $\{V_1, V_2, V_3, V_4, \ldots, V_i\}$ such that where an edge E between vertices $V_i$ and $V_j$ exists, $C(V_i) \not\equiv C(V_j)$. To formalize the problem for G=(V, E), a relating function R is required, A: V"S such that $V(V_i, V_j) \in V$, $R(V_i) \not\equiv R(V_j)$, wherein |S| is a minimum cardinal number, V has n members, and p is the probability of an edge existing between two vertices.

Since easily distinguishable colors are limited, minimizing the quantity of colors used may be beneficial. For example, on a small screen device it may not be easy for a user to distinguish one room colored a shade of orange from a second room colored a shade of red if the shades are similar to one another and the two room with the two colors are positioned next to each other. As a result, the two rooms may appear to be one room. In some embodiments, it may be desirable for rooms to each be colored with distinct colors without any adjacent rooms having a same color or substantially similar color. In some embodiments, reuse of a color may not be acceptable, while in other embodiments reuse of a color is acceptable given that adjacent vertices do not have a same color. In addition to graph coloring or vertex coloring, in some embodiments, edge coloring, face coloring or hatching may be used.

A graph colored with at least K colors is a K-chromatic graph. Each of the vertices that are colored with $K_i$ forms a subset of all vertices that are assigned to a color class. In some embodiments, four to six, seven to nine, ten or more, or another number of colors may be used. A chromatic polynomial P (G, t) provides a number of ways that a graph G may be colored using a particular number of colors t. The chromatic polynomial P(G, t) may be restricted by a set of rules and constraints. In one instance, a greedy coloring method assigns vertices in a set V $\{V_1, V_2, V_3, V_4, \ldots, V_i\}$ colors from an ordered set of colors C $\{C_1, C_2, C_3, \ldots C_i, C_j\}$. Vertices ordered in the set are each assigned a color from the color set with a smallest available index. In some instances, additional constraints may be used. For example, a set of colors assigned to a large number of hotel rooms wherein the cleaning schedule is based on a set of constraints (e.g., guest check out, room availability for check in time, etc.) and a single robot is unable to clean more than one room at a time, may use a modified graph coloring algorithm to accommodate the additional constraints. To find a solution for graph coloring, methods of dynamic programming (DP), linear programming (LP), or brute force (BF) may be used. For instance, a greedy coloring method counts through vertices one by one and assigns a first available color to the respective vertex. The greedy coloring method algorithmically performs the following steps: set $V_i \not\equiv 0$ to initialize vertex element to zero; $V_i = V_{i+1}$ wherein increment $V_i$ given $i \leq n$; assign $C_j$ to $(V_i)$ from the set C; and $C \sqsubset C_n$ wherein set C is a subset of $C_n$, $C_N = \{C_1, C_2, C_3, \ldots C_j, C_{j-1} \ldots C_n\}$, $C = \{C_j, C_{j-1}, \ldots C_N\}$ and j is an unused color. In some embodiments, a branch and bound algorithm is used for determining the chromatic number of a graph. In some embodiments, a Zykov tree may be explored from an upper bound to a lower bound.

Figure 36:
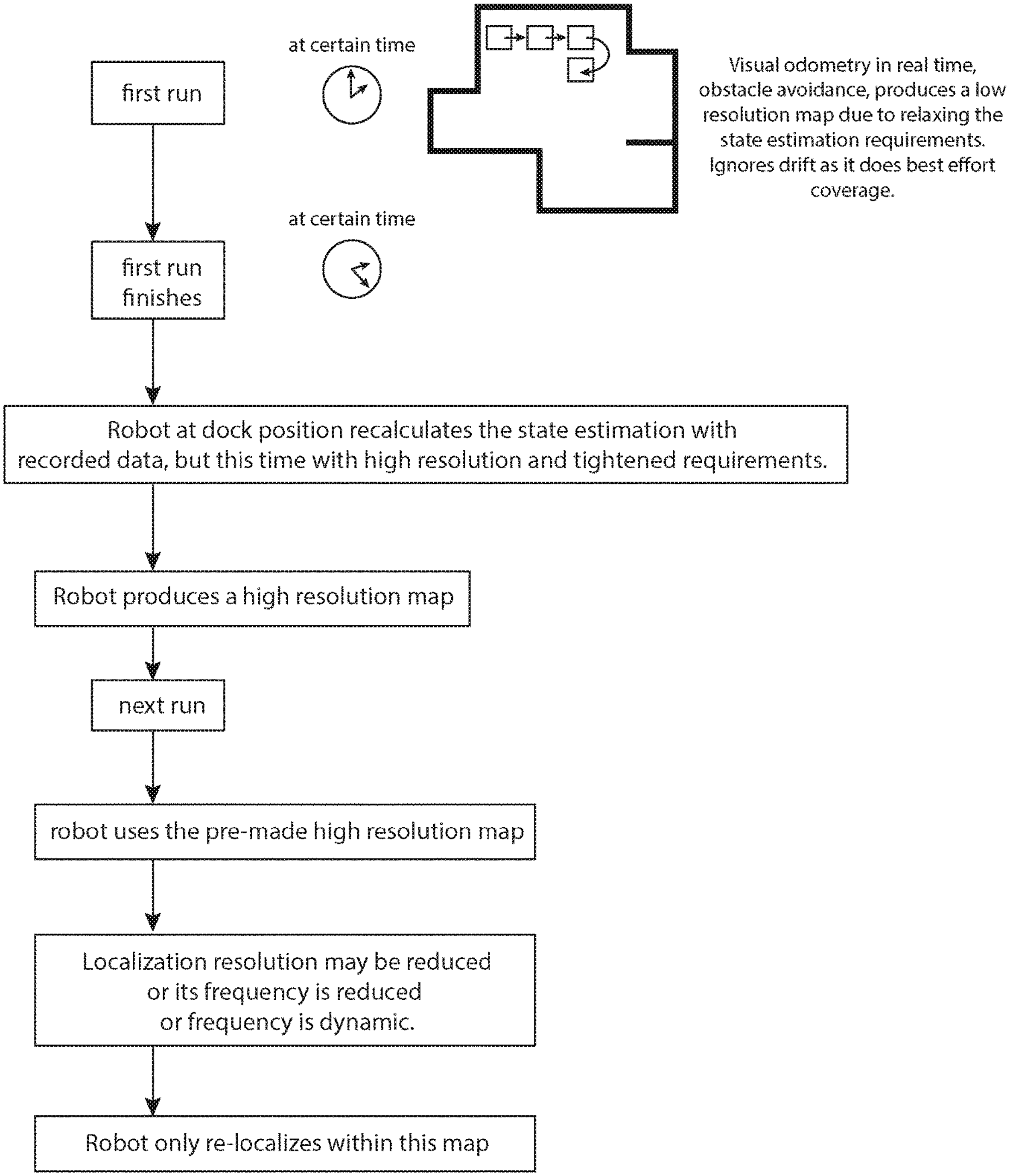
FIG. 36 illustrates an example of a process of SLAM.

FIG. 35 illustrates image and odometry data streams of a robot. The data is combined based on timestamp, some of which are discarded. Type 1 features (i.e., primal shapes) are extracted from images and are used in producing a dense map of primal shapes 3500. Type 2 features (i.e., sophisticated shapes forming objects) are extracted from images and are used in producing a sparse map of objects 3501. Visual odometry (VO) is also extracted from the images. The process includes a delayed high resolution back end optimization, real-time front-end visual odometry, and real-time low resolution back end optimization. From maps 3500 and 3501 topology is extracted into a graph. An overlay of maps 3500 and 3501 is presented to a user using an application of a mobile device. FIG. 36 illustrates a process of SLAM, wherein 1. a first runtime at a certain time is executed by the robot, wherein the processor uses visual odometry in real-time and obstacle avoidance to produce a low resolution map with relaxed state estimation requirements and by ignoring drift as the robot performs best effort coverage; 2. the first runtime finishes; 3. the robot docks and the processor of the robot recalculates the state estimation with recorded data with high resolution and tightened requirements; 4. the processor of the robot produces a high resolution map; 5. during a next run, the processor of the robot uses the high resolution map to avoid dealing with the backend or spatial uncertainty estimation and the processor only relocalizes the robot within the high resolution map; and 6. localization resolution or localization frequency is reduced or localization frequency is dynamic (e.g., at times the robot is localized within the high resolution map and at times localization resolution or accuracy is adoptively reduced). In some embodiments, loop closure is executed incrementally and trajectory drift and map misalignment are corrected at each point of loop closure. In some embodiments, a frontend estimates a current movement state of the robot, updates the movement state incrementally during runtime based on new data, and determines a postponed batch state estimation after the run is complete and the robot unengaged with activities such that plenty of computational power is available for slow processing. In some embodiments, some or all batch state estimation is performed on the cloud. In some embodiments, batch state estimation is performed during runtime at lower intervals to keep drift and error in control during the runtime. In some embodiments, batch state estimation is performed during runtime at lower resolution. In some embodiments, some or all batch state estimation is performed on the cloud. In embodiments, postponement of a portion of batch state estimation and reduced interval or resolution of batch state estimation provides a reduction of computational intensity during runtime. In some embodiments, incremental state estimation comprises the use of least square methods to solve maximum likelihood MAP/MLE problems. In a preferred embodiment, the least square methods are replaced by a Theil-Sen estimator to improve computational efficiency in comparison to RANSAC and other methods used in the art, wherein the Theil-Sen estimator fits a line to sample points. Theil-Sen estimator also provides advantages in terms of robustness against outliers and provides high asymptotic efficiency in comparison with least square estimation. Advantages in robustness and efficiency gains provided through the use of Theil-Sen estimation offsets the downside effects of postponing at least a portion of batch state estimation to after the completion of the run or reducing frequency of batch state estimation. Reducing the frequency of backend computations provides processing at a higher level of computational hierarchy.

Figure 37:
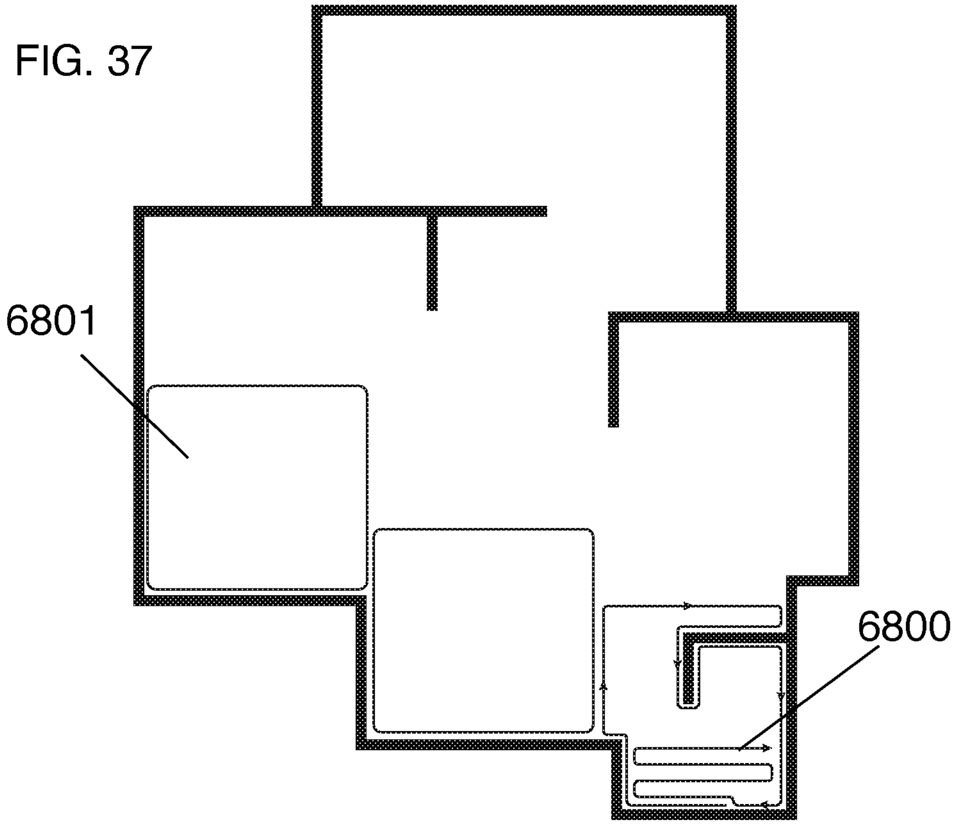
FIG. 37 illustrates an example of closing a loop during mapping.
Figure 38:
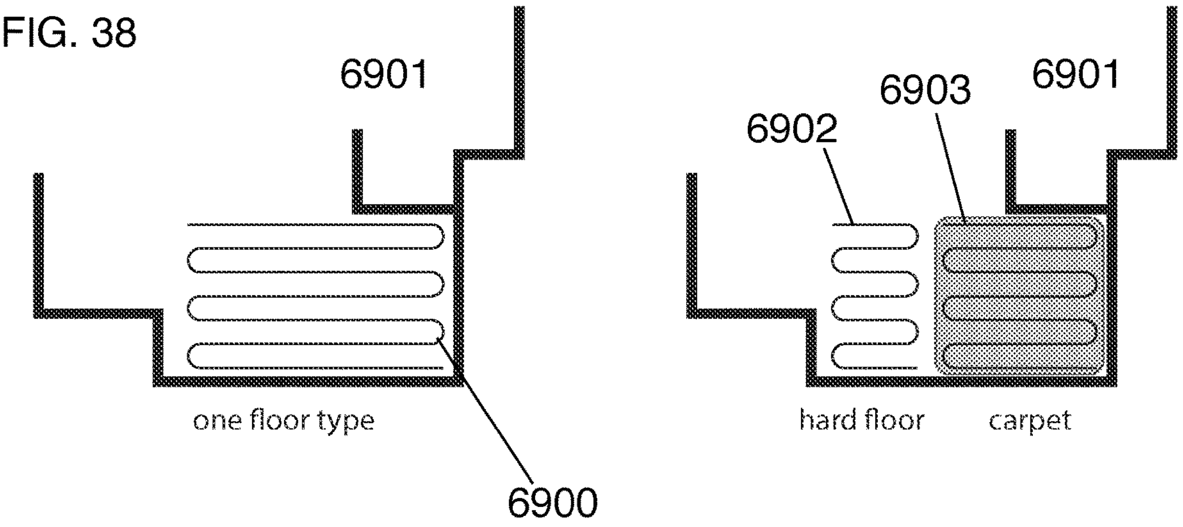
FIG. 38 illustrates a dynamic and real-time boustrophedon path.

Loop closure frequency, a size of loop to be closed, and nature of loop closure impact performance, consistency of the map, and accuracy of localization. FIG. 37 illustrates closing the loop during rigid box mapping and coverage 6800 within certain sized boxes 6801. Although consecutive boxes 6801 are not exactly the same size and conform to the environmental boundaries, they are restricted to a minimum and maximum size and certain shapes (i.e., rectangle and square). In some embodiments, loop closure occurs in the background while the robot performs coverage. In such a case, there is no observable behavior to an outside viewer (e.g., consumer) identifiable as loop closure. Seamless loop closure may also be used by robots performing tasks other than coverage. For instance, during polymorphic path planning, wherein a path is planned in real-time based on real-time observation of the environment, loop closure is dynamic in real-time and morphs into any shape (unrestricted to rectangles or squares) depending on environmental characteristics. For example, a boustrophedon path of a robot covering a room morphs into the shape of the room. In a room comprising a hard floor and soft carpeted floor, the robot covers the soft floor coherently and then the hard floor coherently. This is especially desirable when the work performed or settings are dependent on a type of floor. For example, speed of brush motors may be dependent on a type of flooring. Floor types may be detected by a camera, an ultrasound sensor, an optoelectronic sensor, an electrical current sensor, provided as input to an application paired with the robot by drawing zones within a map displayed by the application, or combination of the above. FIG. 38 illustrates a dynamic and real-time boustrophedon path 6900 of a robot when a floor type of environment 6901 is the same everywhere and dynamic and real-time boustrophedon paths 6902 and 6903 when environment 6901 has hard floor and carpet, respectively. The robot executes path 6902 then path 6903.

Some embodiments decouple a local map from a global map and merge it at runtime. FIG. 39 illustrates a global 2D, 3D, or higher dimension map 7000 captured using data from a LIDAR sensor, camera, and/or long-range depth sensor. A high-resolution map is generated for each grid cell 7001 using data from, for example, a line laser sensor. Depending on a location of the robot, a corresponding local map of a grid is decoupled from the global map and used by the processor of the robot. Some embodiments generate multi-layer maps. Low range line laser readings 7002 may indicate presence of an obstacle within a grid cell. For example, FIG. 40 illustrates a multi-layer map, each map 7100 maps a different height from the ground. For the robot to navigate all heights, a height of the robot is greater than the height from the ground of each map. FIG. 41 illustrates an example of a robot 7200 with a height over 15 cm that is capable of generating the maps shown in FIG. 40, mapped at heights of 5, 10, and 15 cm from the ground. FIGS. 42A and 42B illustrate a robot 7300 capable of clearing a path 7301. In some embodiments, the processor employs a strategy to maneuver challenging areas, wherein small maneuvers are executed one after another.

In some embodiments, a perfect map is corrupted with bad data points. For instance, map drift and warping may occur over a small time frame (e.g., a second) and may be the result of many different root causes. Though each root cause may require individual recovery, a protection mechanism may prevent several root causes of map corruption from occurring, ultimately reducing the occurrence rate of situations requiring recovery and the reliance on such recoveries. Some embodiments employ an umbrella map management method to prevent bad data from corrupting a perfect map. The map management method is inspired by the concept of critical mass, particularly in the context of statistical chance of survival for companies in the event of a catastrophic incident, wherein an index statistically measures an amount of tolerance a system has in dealing with various undesired situations. Herein, a scoring mechanism to score a map is combined with a shielding mechanism to prevent a highly reliable map from being corrupted by reducing a level of reliance on new data when necessary. The quality of a map is measured based on the quality of incoming sensor data using statistical analysis. This approach is beneficial in various respects, such as preventing thin obstacles from moving from one cell to another during a run. In prior art and older technology, map warping occurs when the robot encounters a glass obstacle, such as a glass wall. The glass wall acts as a mirror and a reflection of an opaque wall in the glass wall in line with a nearby opaque wall causes map drift. Further, reflections may sometimes cause a phantom wall to be detected. Another concern for map corruption relates to signal reflection. For instance, a LIDAR sensor and several other sensors rely on sensing a reflected signal. Often it is difficult for the processor to distinguish a reflected light signal of a current transmitted signal from reflected light signals of previously transmitted signals that have bounced off of some objects and reached the sensor at a same time. Another issue in the prior art and older technology related to the influence of reflectivity. Reflectivity is a determinant factor in the likelihood of detecting an object with a camera or an active illumination beam reflected off of an object. The likelihood of detection is probabilistically estimated with a normalized ratio calculated by dividing the number of successfully detected objects by the sum of all detected and undetected (i.e., objects expected to be detected but were not) objects in a series of experiments. Given reflectivity plays a role in the range within which a LIDAR sensor or camera can return reliable results and that reflectivity varies in different environments, times of day, seasons, weather conditions, etc., an unresolved challenge in the prior art is developing a method to overcome such issues reliably.

Herein, improvements to issues in the prior art and older technologies are proposed. Embodiments described herein disclose reducing map drift by reducing map filling strength in uncertain circumstances, introducing a non-linear probability map within the map using a sigmoid function, and increasing dynamic range within the map. In some embodiments, reducing map filling strength may be countered by non-linear mapping using the sigmoid function. This stabilizes the map and helps overcome map warping. Another improvement described herein includes bounding global planning and map analysis expansions by detecting boundaries, adding a map of boundaries of perimeter followed obstacles, and tracking perimeter followed boundaries by raytracing between added track poses, wherein boundary points added within a short time span from one another are assumed to be continuous boundaries. In embodiments, the track pose is offset to a right side of the robot for right side perimeter follows. In some embodiments, a minimum separation distance condition is used to decide whether to add candidate track poses, wherein only new poses that are less than the separation distance threshold are tracked when the angles from the last tracked pose are greater than a specified threshold. In some embodiments, navigation planning is bound by the wall followed boundaries except through robot snail trails. In some embodiments, global planning is not allowed to expand through the wall followed boundaries unless it is through the robot snail trails. In embodiments, wall followed boundaries bound (close or fence) areas. As the robot covers an area bound by boundaries, portions of the area covered are marked as completed and outlines of the area are tracked as open or candidate coverage directions. In some embodiments, map-analysis expansions through wall followed boundaries are not permitted except when expanding through robot snail trail areas. The conditions and algorithmic improvements disclosed above improve map stability, specifically the execution of radially outward mapping without falling into corner cases. Some embodiments implement a LIDAR scan pitch and roll correction to reduce map warping. In some embodiments, the bounding of global planning and map-analysis expansions by wall followed boundaries is implemented in combination with LIDAR scan pitch and roll corrections. In other embodiments, the bounding of global planning and map-analysis expansions by wall followed boundaries is solely implemented. LIDAR scan pitch and roll correction may be used to increase scan matching accuracy and consequently map stabilization. Some embodiments implement additional filtering of outliers and discards portions of data that does not fit well with the majority of the data.

In some embodiments, the robot comprises a solid state depth camera. To overcome the commonly limited FOV of solid state depth cameras, algorithms fill in missing data using machine learning techniques, temporal stitching of measurements is used, or data captured in multiple limited FOVs are combined (e.g., four 90 degrees FOVs, three 120 degrees FOVs, or two 180 degrees FOVs for 360 degrees coverage) with extrinsic calibration to associate the bundle. A combination of methods for overcoming limited FOVs may be used. For example, data captured by two cameras with 90 degrees FOVs are bundled with extrinsic calibration to create a 180 degrees FOV and used in combination with temporal stitching of measurements.

Some embodiments calibrate sensors that capture data for map building. For instance, a mapping method includes capturing sensor data of the environment to both create and continuously update a map by combining the sensor data, such as LIDAR data and other sensor data. When the robot traverses the environment, the scans captured by the LIDAR have a fixed relation with respect to the physics of the robot. The map is built based on the assumption of the LIDAR having a fixed relation with respect to the physics of the robot, though this is practically impossible. As such, the LIDAR is calibrated for a specific geometric relationship with each single robot. Some embodiments include a calibration routine that mimics the robot confined in an environment, continuously constructing and updating a map as the robot rotates around itself. Once calibration is complete, the robot navigates by capturing sensor data, comparing the sensor data to the map to determine a current location of the robot, and using sensor data to determine appropriate navigation actions. The calibration routine may be applied to various sensors, such as proximity sensors and cliff sensors. In some embodiments, the calibration routine mimics an environment and compares captured LIDAR data with geometric constraints of the robot. In some embodiments, the calibration routine navigates the robot in a controlled manner to serve the purpose of calibration. In some embodiments, the calibration routine navigates the robot along a circular path and measures deviation from a standard circular form. Ultimately, calibration routines improve the use of LIDAR sensor data, cliff sensor data, proximity sensor data, etc., and hence, improve navigation during operation of the robot.

In one example, a map corresponds to a particular run (i.e., work session) of the robot. The map includes objects that may vary between runs. Each map may also include debris data, indicating locations with debris accumulation, wherein the position of locations with high accumulation of debris data may vary for each particular time stamp. Depending on sensor observations over some amount of time, the debris data may indicate high, medium, and low debris probability density areas. Each map may also include data indicating increased floor height. Depending on sensor observations over some amount of time, the floor height data may indicate high, medium, and low increased floor height probability density areas. Similarly, based on sensor observations over some amount of time, obstacle data may indicate high, medium, and low obstacle probability density areas. In some embodiments, the processor may inflate a size of observed obstacles to reduce the likelihood of the robot colliding with the obstacle. For example, the processor may detect a skinny obstacle (e.g., table post) based on data from a single sensor and the processor may inflate the size of the obstacle to prevent the robot from colliding with the obstacle.

Figure 43:
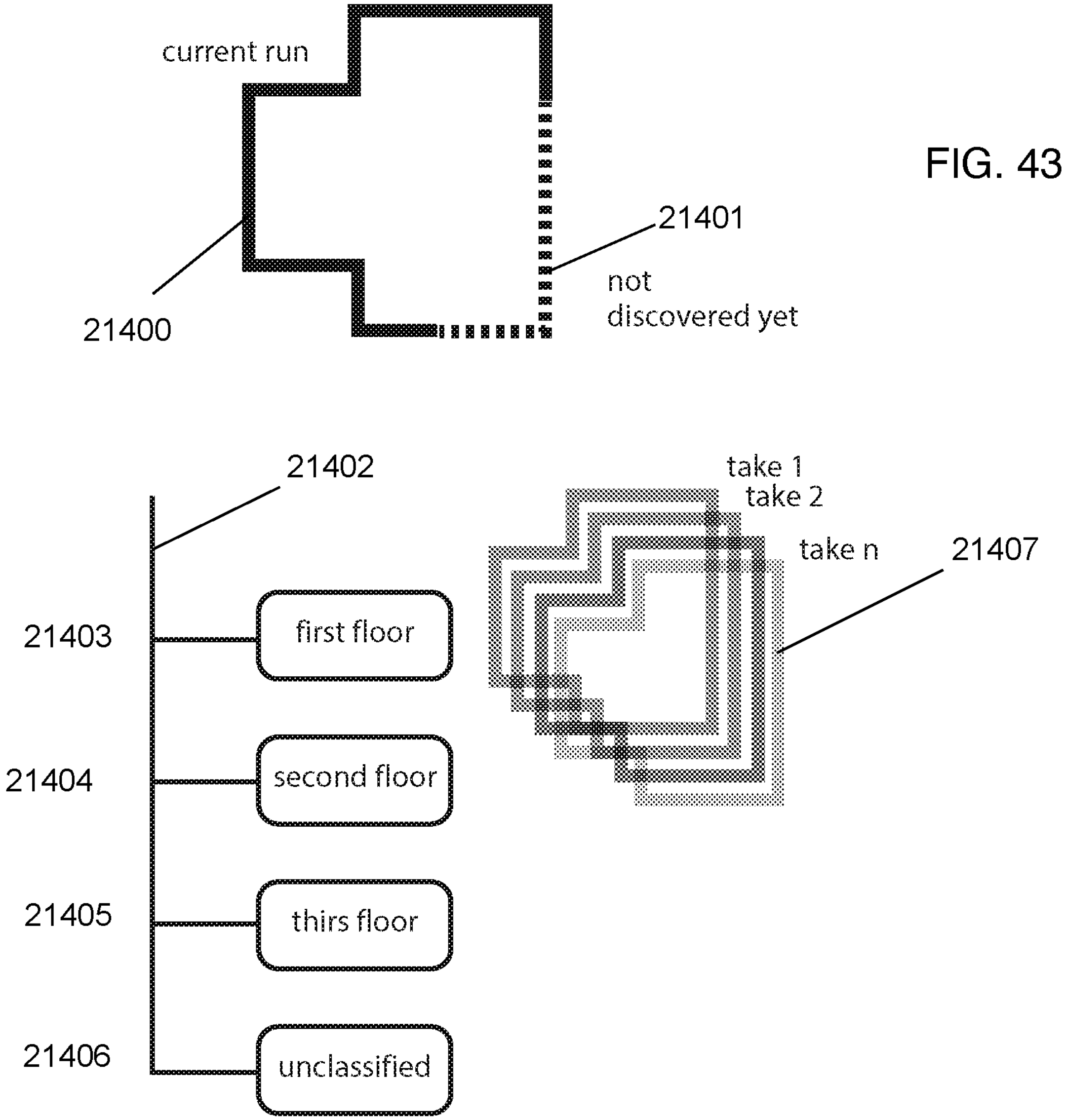
FIG. 43 illustrates a map generated by the processor during a current work session.

In some embodiments, the processor stores data in a data tree. FIG. 43 illustrates a map 21400 generated by the processor during a current work session. Portion 21401 is yet to be discovered by the robot. Various previously generated maps are stored in a data tree 21402. Data tree 21402 may store maps of a first floor in branch 21403, a second floor in branch 21404, a third floor in branch 21405, and unclassified maps in branch 21406. Several maps may be stored for each floor. For instance, for the first floor, there are first floor maps 21407 from a first work session, a second work sessions, and so on. In some embodiments, a user notifies the processor of the robot of the floor on which the robot is positioned using an application paired with the robot, a button or the like positioned on the robot, a user interface of the robot, or other means. For example, the user may use the application to choose a previously generated map corresponding with the floor on which the robot is positioned or may choose the floor from a drop down menu or list. In some embodiments, the user may use the application to notify the processor that the robot is positioned in a new environment or the processor of the robot may autonomously recognize it is in a new environment based on sensor data. In some embodiments, the processor performs a search to compare current sensor observations against data of previously generated maps. In some embodiments, the processor may detect a fit between the current sensor observations and data of a previously generated map and therefore determine the area in which the robot is located. However, if the processor cannot immediately detect the location of the robot, the processor builds a new map while continuing to perform work. As the robot continues to work and moves within the environment (e.g., translating and rotating), the likelihood of the search being successful in finding a previous map that fits with the current observations increases as the robot may observe more features that may lead to a successful search. The features observed at a later time may be more pronounced or may be in a brighter environment or may correspond with better examples of the features in the database.

In some embodiments, the processor immediately determines the location of the robot or actuates the robot to only execute actions that are safe until the processor is aware of the location of the robot. In some embodiments, the processor uses the multi-universe method to determine a movement of the robot that is safe in all universes and causes the robot to be another step closer to finishing its job and the processor to have a better understanding of the location of the robot from its new location. The universe in which the robot is inferred to be located in is chosen based on probabilities that constantly change as new information is collected. In cases wherein the saved maps are similar or in areas where there are no features, the processor may determine that the robot has equal probability of being located in all universes.

In some embodiments, measurements taken with spectrometers, sound recorders, barcode scanners and other measurement devices are associated with locations within the map, forming a high dimensional map, to provide more information about the surroundings of the robot. In some embodiments, such additional information includes information gathered by sensors of the robot. For example, an objective of a robot is to scan barcodes of items on shelves to determine current item pricing. Similarly, the objective of the robot may include inventory scanning, inventory arrangement, observing item quality, determining expiration date of items, etc.

Figure 44A:
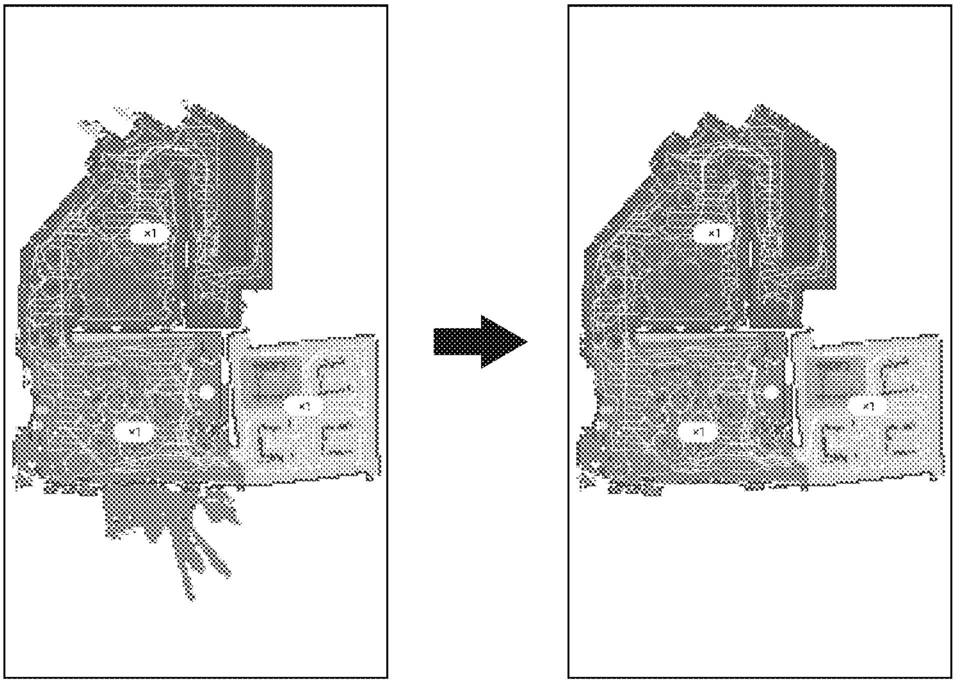
FIGS. 44A and 44B illustrate a map before and after cleaning and vectorization, respectively.
Figure 44B:
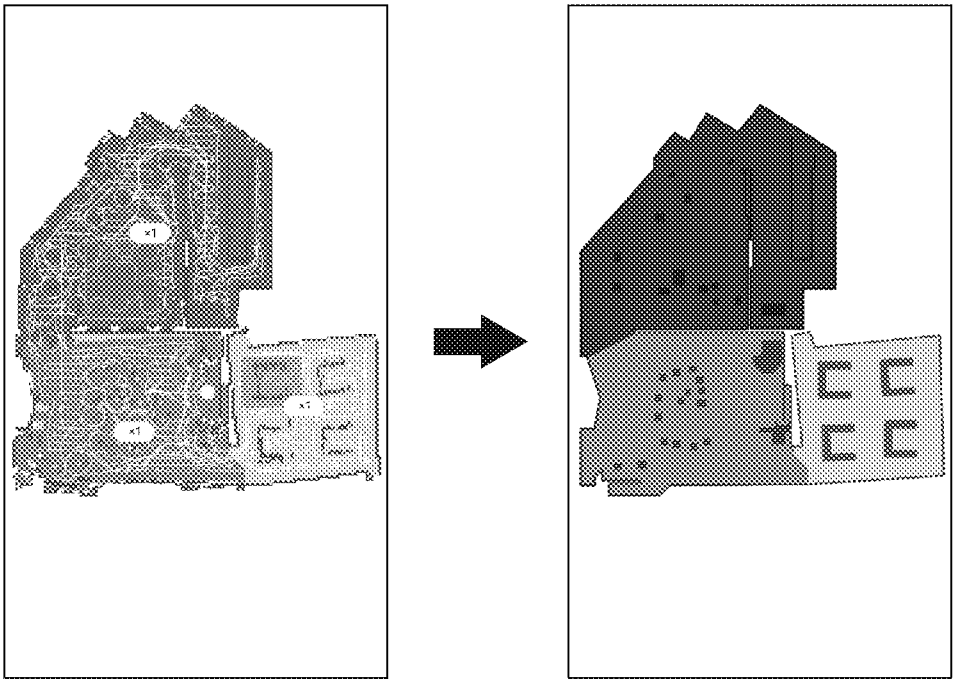

In some embodiments, the processor post-processes the map before the application displays the map. In some embodiments, the map is processed to clean unwanted areas and noise data. In some embodiments, the walls in the map are processed to straighten them (when the data points fall within a certain threshold). Similarly, corners may be processed to form sharp angles. FIG. 44A illustrates an example of generated map of an environment before and after being cleaned. The cleaned-up version of the map may be vectorized before being displayed by the application. FIG. 44B illustrates the generated map before and after vectorizing the map. Vectorizing the map has several benefits: vector data of subjects, such as a map or a room plan, need less space for storage in comparison to a raster version; vector data are resolution independent, therefor are scaled up without loss in quality; and with vector data paths are formed of lines and vertices instead of arrays of pixels, therefore paths may be traced in a variety of ways with different parameters. For example, for a path there is total control over a thickness (e.g., to modify wall thickness in the displayed map), color, texture, style (e.g., continuous, dashed, dotted, etc.), and many more parameters.

Figure 45:
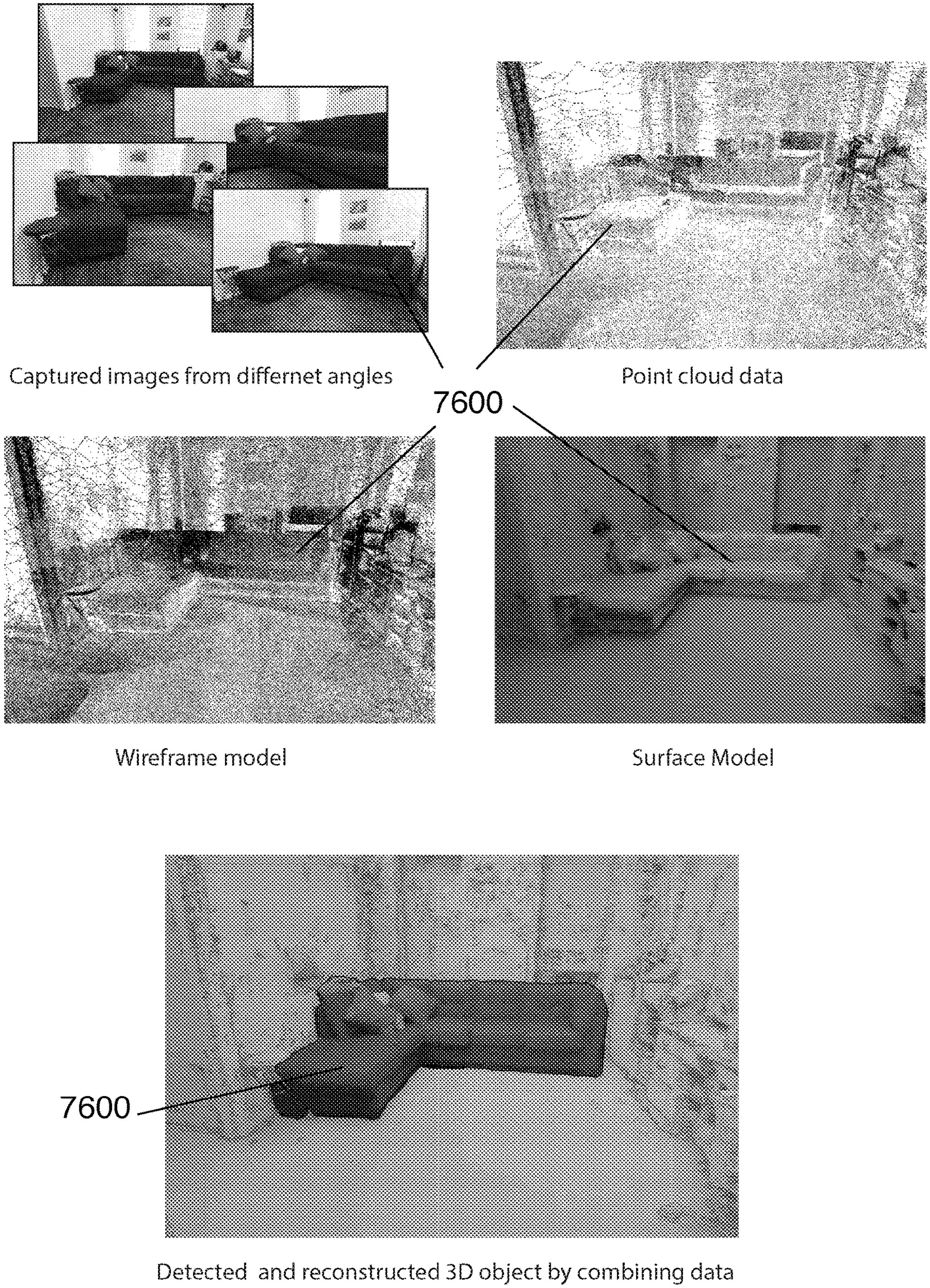
FIG. 45 illustrates a couch reconstructed from various forms of data.
Figure 46:
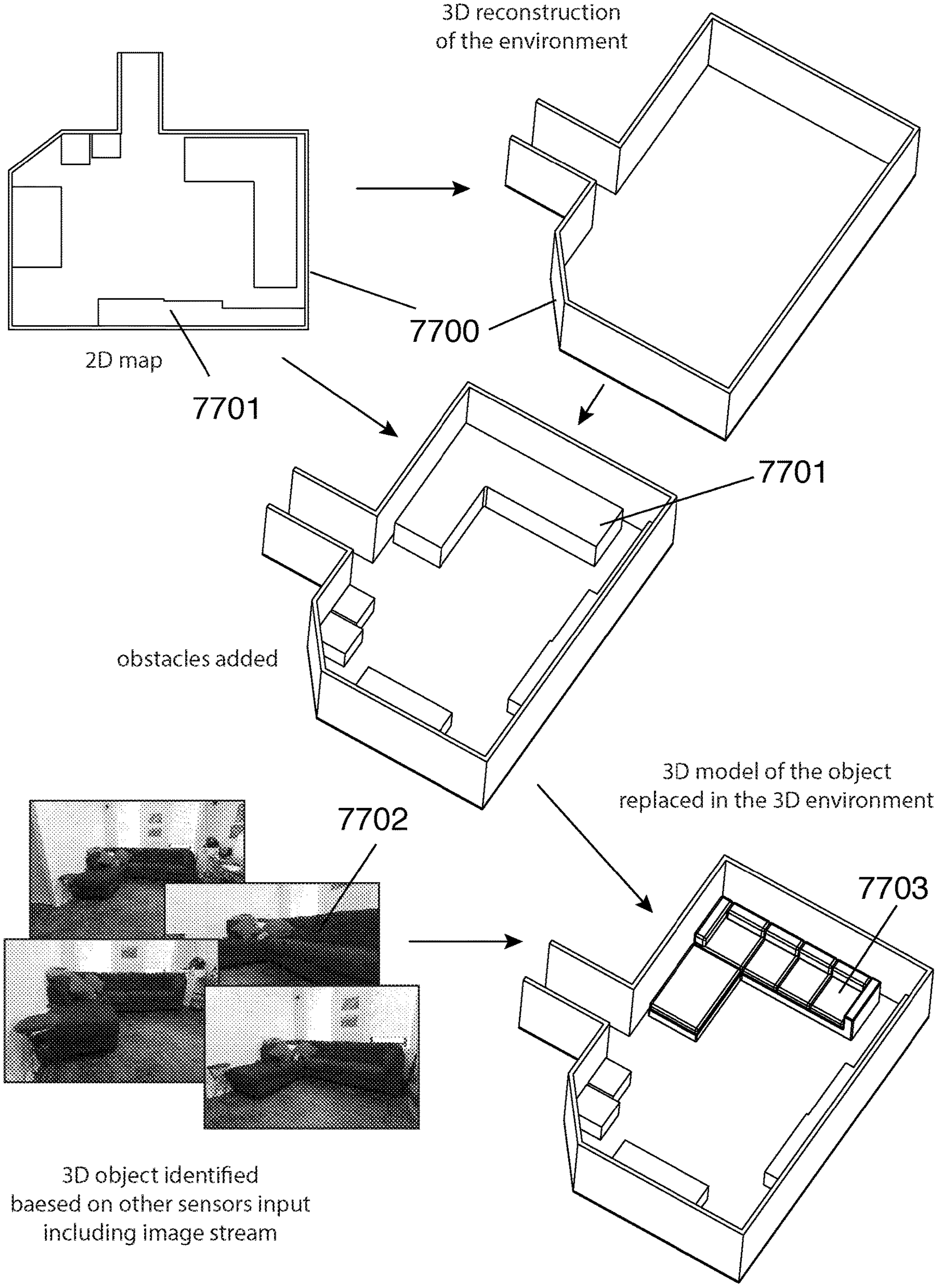
FIG. 46 illustrates a 3D map generated from a 2D map.

In some embodiments, the SLAM enabled robot generates a 3D model of the environment using data from various sensors. For example, the processor of the robot directly generates the 3D model of the environment as the robot runs within the environment when the robot is equipped with more sophisticated sensors for sensing the environment in 3D (e.g., 3D LIDAR, depth sensor). In some embodiments, upon the robot approaching a piece of furniture, the processor recognizes a type of the furniture and adds a 3D model of the furniture (or a model similar to the type of furniture) into the 3D environment. FIG. 45 illustrates various types of data including images and point cloud data as well as a wireframe model and surface model of a couch 7600. The couch 7600 is reconstructed in 3D by combining the data. In some embodiments, the processor of the robot generates a 2D map and build a 3D model of the environment based on the 2D map by extruding the walls in a vertical direction and placing doors, windows, and other architectural elements in the 3D model. The processor may place objects within the environment by recognizing objects (e.g., furniture) using sensors (e.g., camera and image sensors) and placing 3D model replicas of the objects within the 3D model of the environment. FIG. 46 illustrates an example of a 2D map and a 3D map generated from the 2D map by extruding walls 7700 and objects 7701 in a vertical direction. The processor of the robot identifies the objects 7701 based on sensor input including image data of the object, in this case couch 7702, and replaces objects 7701 with 3D models 7703 of the identified object.

Figure 47:
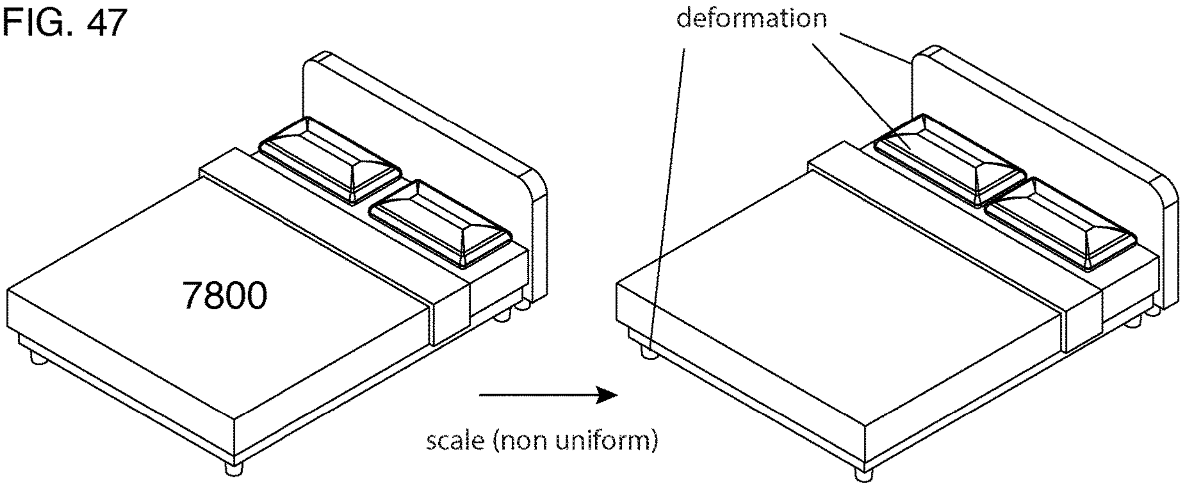
FIG. 47 illustrates scaling and changing properties of an object model.
Figure 48:
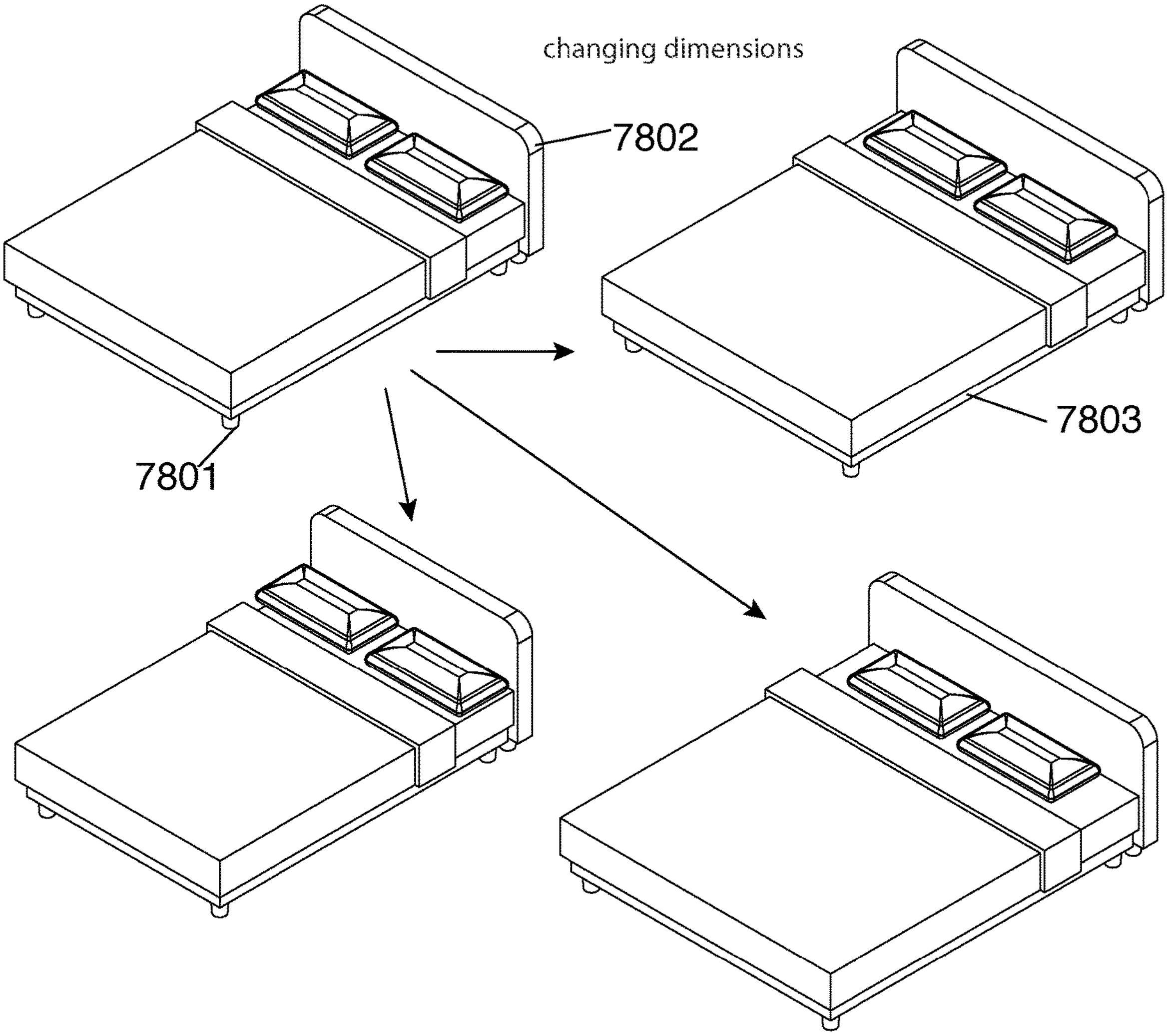
FIG. 48 illustrates maintaining a same size of components of an object model when changing dimensions of the object model.
Figure 49:
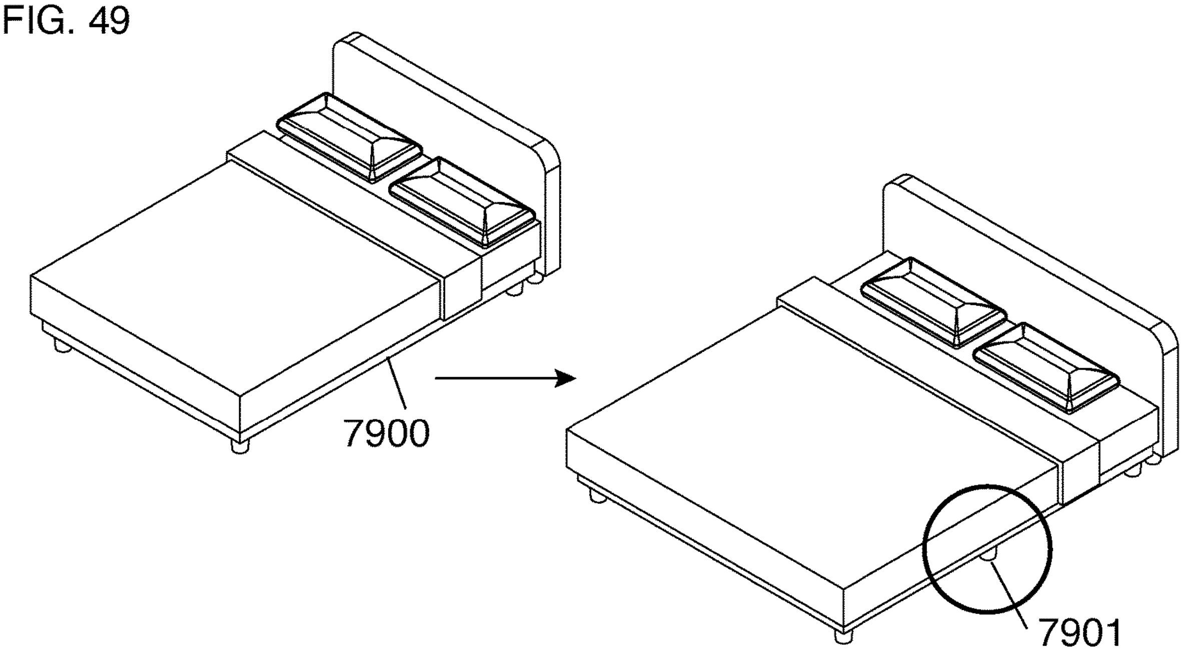
FIG. 49 illustrates an example of a smart property.

In some embodiments, the objects placed within the 3D model of the environment are pregenerated object models. Pregenerated object models may be parametric such that they may be adjusted to fit a particular environment. Properties, such as dimensions, colors, and style, may be modified to adjust the pregenerated object model to match the real furniture within the environment. Model properties may be categorized into two different groups, basic (or low level) properties, such as dimensions and colors, and smart (or high level) properties, such as material, style and existence of different compartments within the model. FIG. 47 illustrates a difference between scaling an object model 7800 and changing properties, in this case dimensions, of the object model 7800. When the object model is scaled in 3D space, all components of the object model are scaled accordingly. When the scaling process is non-uniform, wherein the scale factor for each dimension is different, deformation of some or all of the components of the object model is the result, which is usually undesirable. Changing dimensions of the object model, given relations between components of the object model are defined correctly, results in a change in overall size of the object model while maintaining the same size of the components of the object model. For example, in FIG. 48, legs 7801 and headboard curve 7802 of the bedframe 7803 remain the same size while the overall size of the bedframe 7803 is changed. In other examples, the bedframe may include 4, 6, 8 or more legs; be fabricated of steel, wood, composite, or a combination of these materials; may include a fabric covering the bedframe; may include different style of legs, such as modern, antique, classic, carved; etc. In embodiments, a database includes different options (e.g., material, style, color, number of components, etc.) for each component of the object model. In some embodiments, the AI algorithm chooses a best combination of properties based on observations of the real environment and update the object model accordingly. The smart (or high level) properties may be linked to other properties such as basic properties. For example, if the bedframe is larger than a predetermined size, the bedframe must include a minimum of 6 legs. FIG. 49 illustrates an example of a smart property, wherein the AI algorithm determines bedframe 7900 length and width are larger than a predetermined length and width, and as a result adds an extra pair of legs 7901 to the middle of the bedframe 7900.

Figure 50:
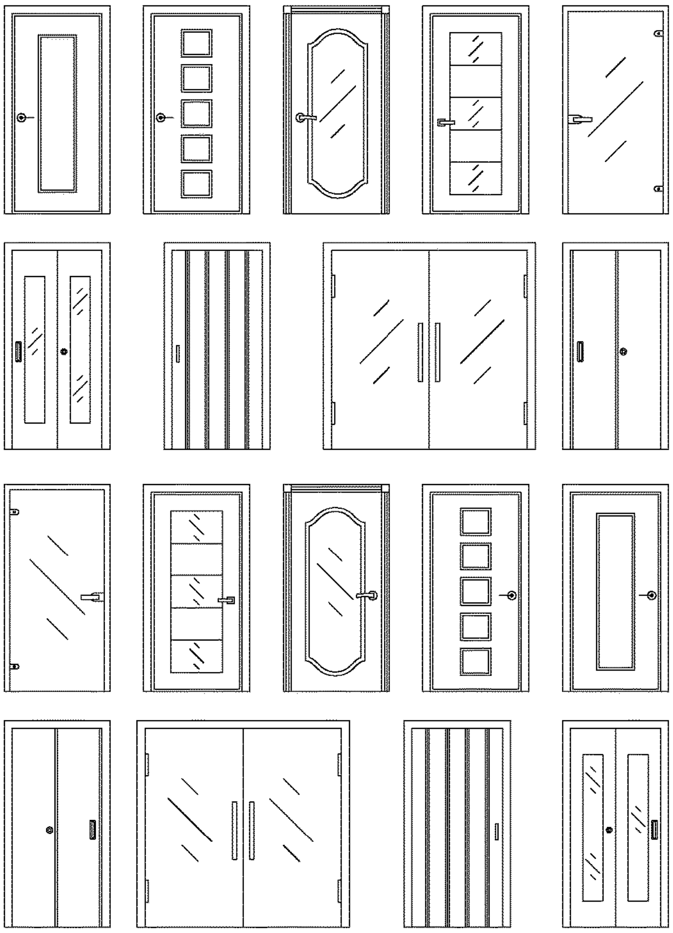
FIG. 50 illustrates different properties of a door.
Figure 51:
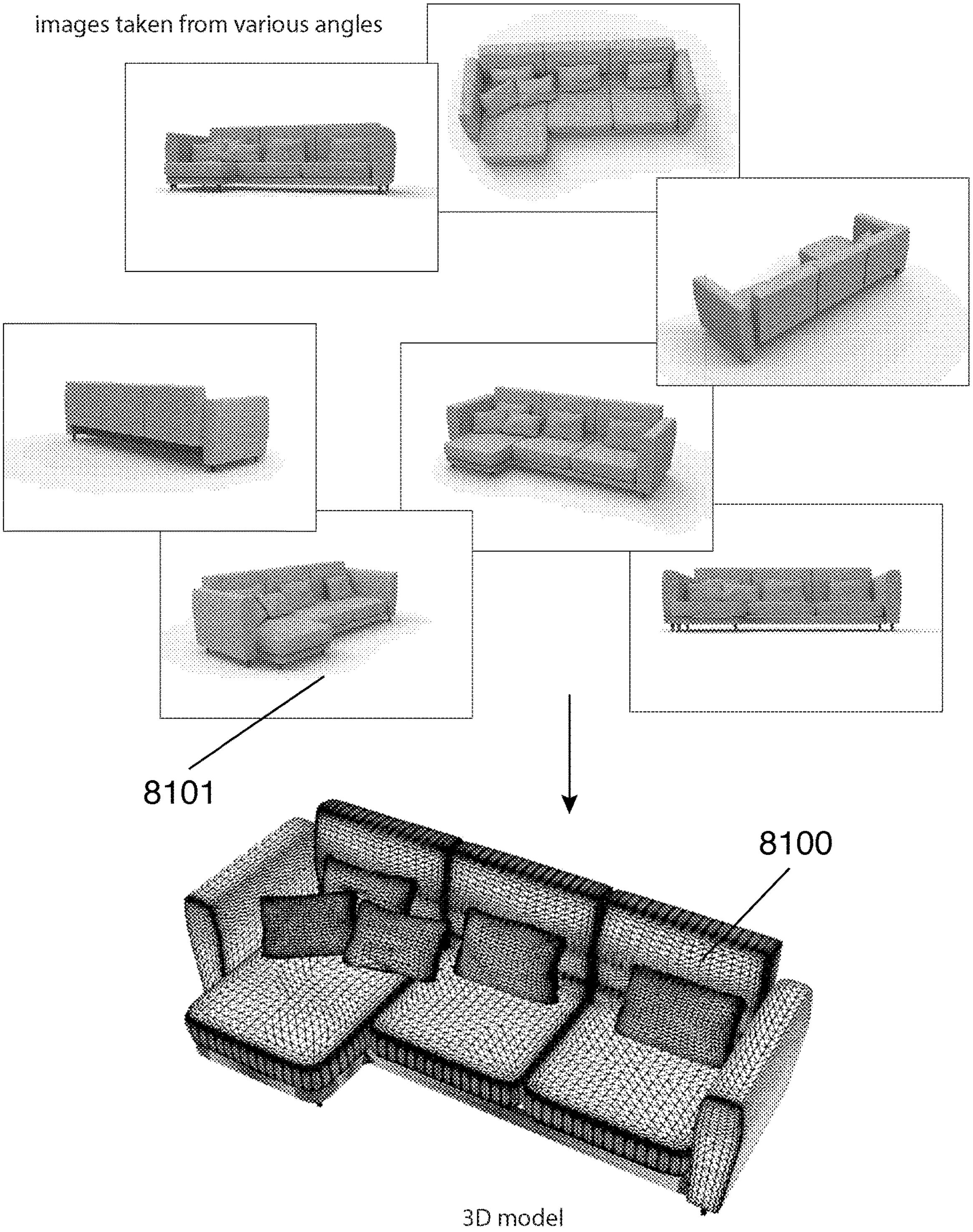
FIGS. 51 and 52 illustrate a 3D model of a couch generated from images.
Figure 52:
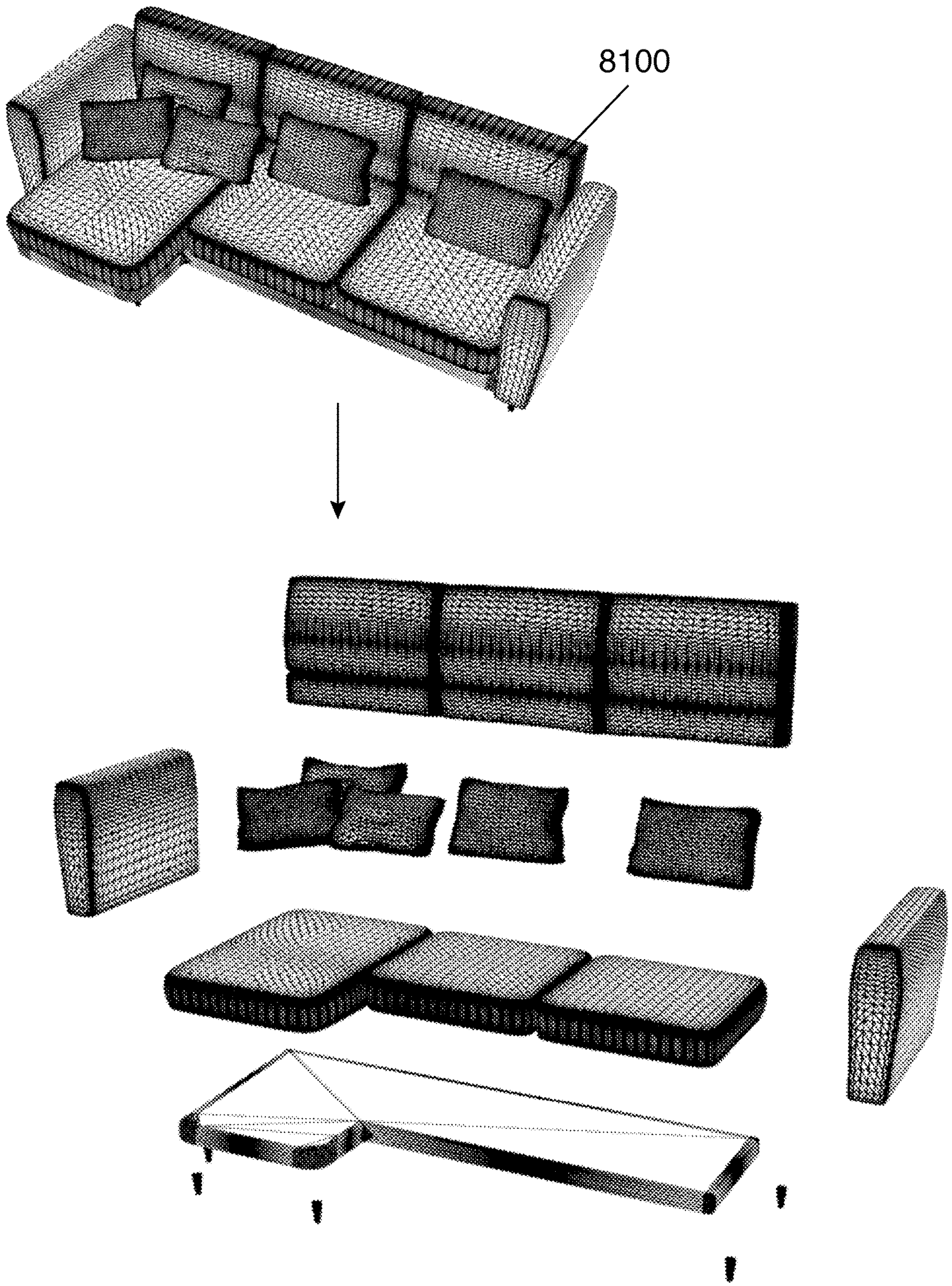

Another example of a property of an object model comprising a door includes a style of the door. Basic properties of the door may include, dimensions (i.e., width, height and thickness of the door), door frame dimensions (i.e., door frame width, thickness in relation to the door itself), color of the door and the door frame, etc. Smart properties of the door may include a number of doors (e.g., 1, 2, or more), a type of the door (e.g., regular, barn door, pocket door, sliding door, French door, etc.), hinge placement (e.g., left, right), a fastening means (e.g., rotating hinge or rails), a number of panels on each door and their dimensions in relation to each other and the door itself, type of door panels (e.g., wood, glass, etc.), a shape of each panel, a shape of frame around the panels, etc. FIG. 50 illustrates a variety of different doors that are generated by modifying a set of properties, such as dimensions, material, hinge side, number and shape of panels, number of doors, etc. In some embodiments, the AI algorithm generates a model of a piece of furniture within the environment based on various images captured from different angles, image sequences, depth images, point cloud data, etc. using NeRF, photogrammetry, or other methods. FIG. 51 illustrates a 3D model of a couch 8100 generated based on various images 8101 captured from different angles. FIG. 52 illustrates the generated model of the couch 8100 further analyzed to separate the model of the couch 8100 into different components, clean up the modeled components, optimize or recognize the type, style, brand, make and/or model of the piece of furniture 8100.

Figure 53:
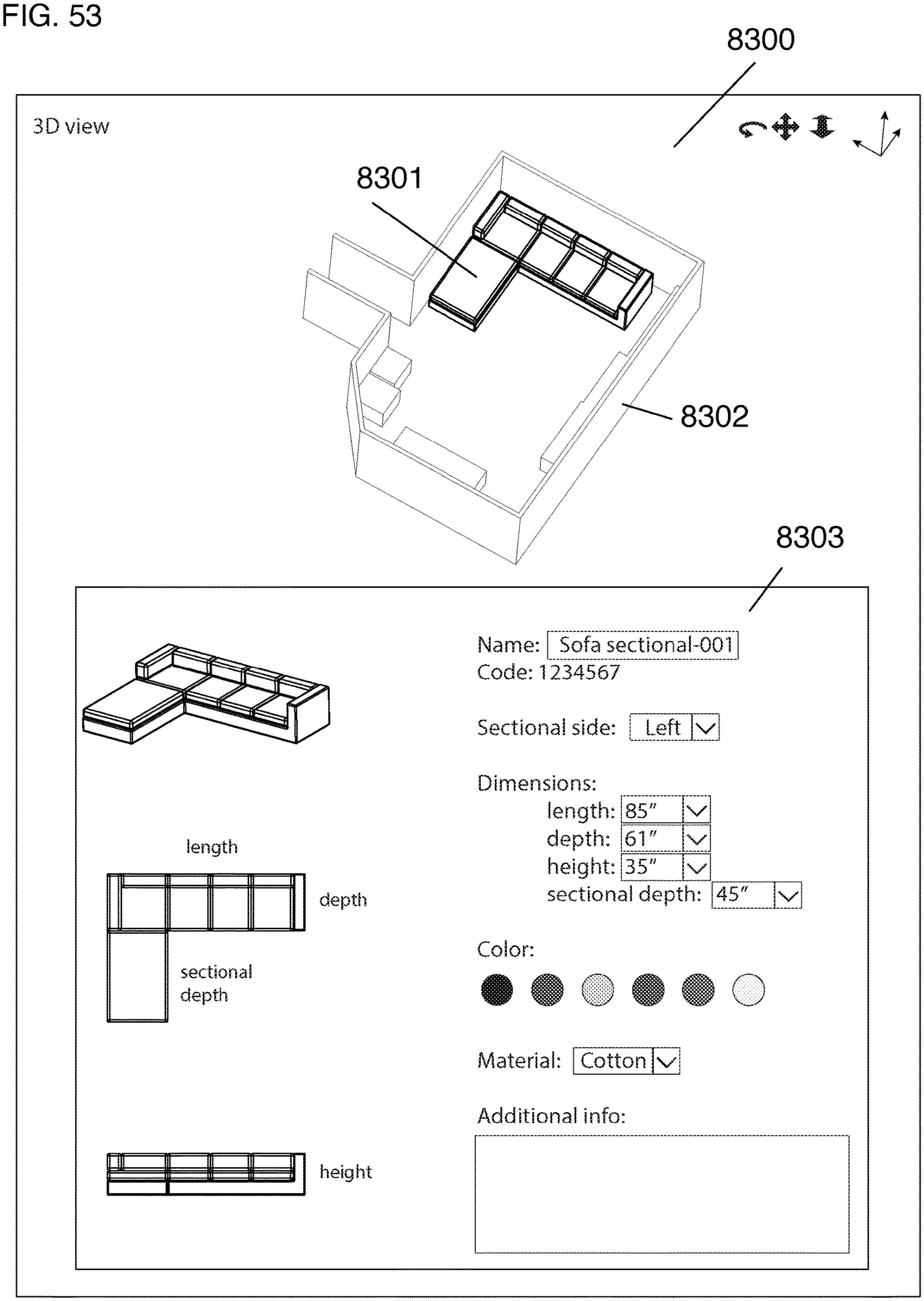
FIG. 53 illustrates an application of a communication device displaying a 3D model of a couch.

After placing an object model (e.g., furniture) within the 3D model of the environment, a user may use an application of a communication device to adjust properties of the model such that it more closely matches the real object within the environment. There may be different levels of control over the properties visible to the user. For example, the user may adjust a size of a component of the object model within a predetermined range. These controls prevent the virtual model from breaking. FIG. 53 illustrates an example of an application 8300 displaying a 3D model of a couch 8301 within a 3D model of the environment 8302 and properties 8303 that a user may adjust to more closely match the couch 8301 to a real couch of the user.

Figure 54:
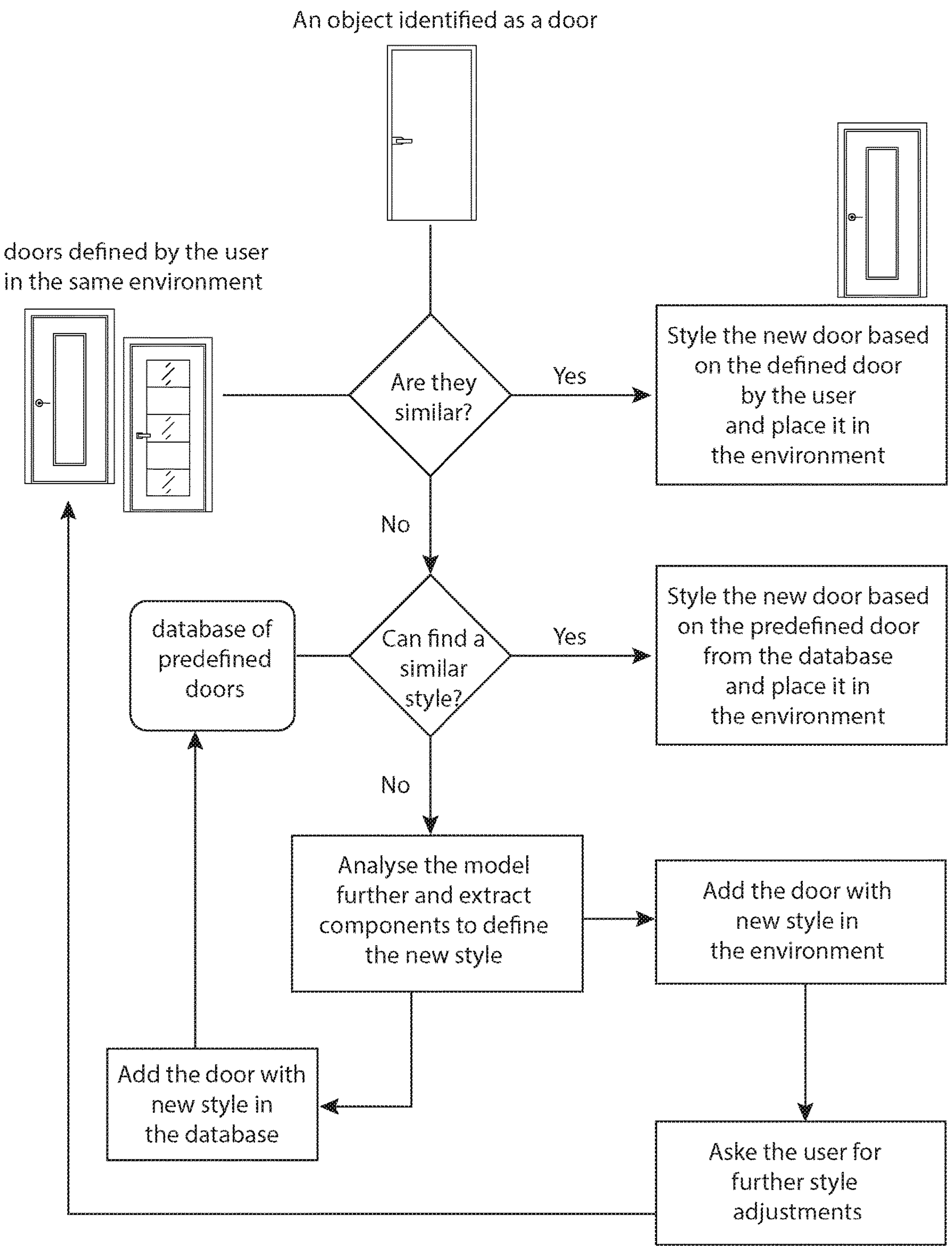
FIG. 54 illustrates a process of identifying properties of an object.

In some embodiments, the AI algorithm learns from user input to better analyze and generate 3D object models. The AI algorithm may include user input directly into a decision-making process and/or give user input higher priority. For example, a user adjusts properties of a door within a house or office environment. The AI algorithm determines there is a high probability that other doors within the same environment have similar properties and therefore first considers the user input when recognizing properties of other doors before examining other factors or searching within a database of doors. FIG. 54 illustrates a process of identifying properties of a door by an AI algorithm, wherein user input over is prioritized over a database of doors. In some embodiments, the AI algorithm cross references previously recognized furniture to identify other furniture.

Figure 55:
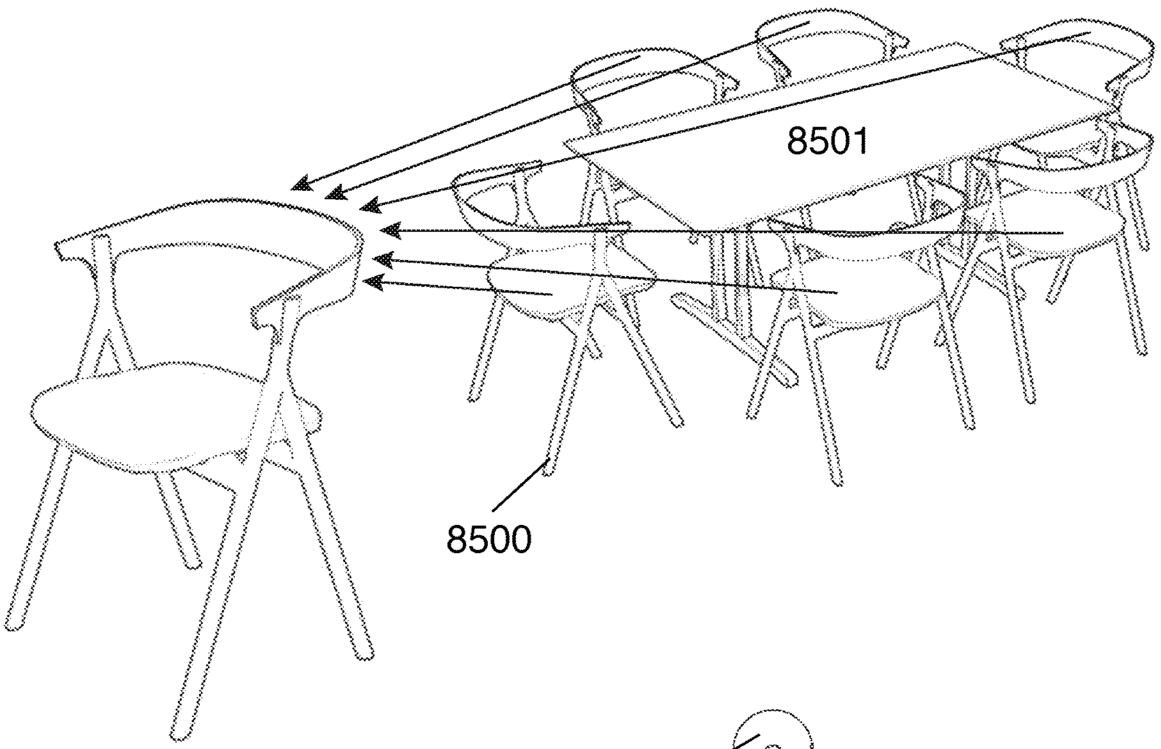
FIG. 55 illustrates a process of determining properties of an object.

For example, there is a higher chance for a couch in a living room to be from a same collection as a love seat in the same living room. In another example, given all chairs of a dining table are typically identical, the processor of the robot uses combined data gathered relating to different chairs at the dining table to build a chair model. The chair model is placed within the 3D model of the environment to represent all the chairs of the dining table. FIG. 55 illustrates, based on similarities of chairs 8500 of dining table 8501, a location of each chair 8500 in relation to one another, and the arrangement of chairs 8500 around the table 8500, there is a high probability that all chairs 8500 are identical and a same chair model can be used for all chairs 8500.

Figure 56:
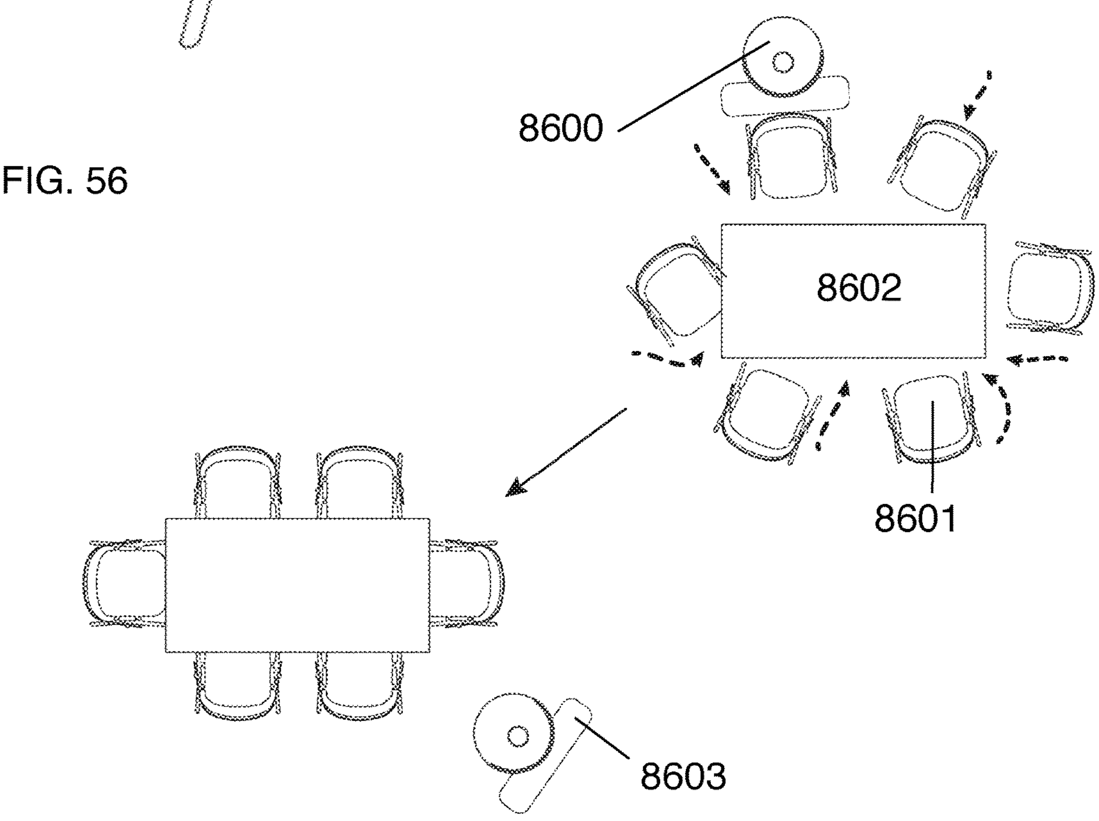
FIG. 56 illustrates a robot configured to move objects.

Having a virtual model of the environment with identified furniture and appliances provides different possibilities. For example, a user has an option to change a layout of furniture within the virtual environment and a robot configured to move furniture can relocate the furniture within the real environment accordingly. The processor of the robot plans an order of relocation for furniture by comparing a current layout and a desired layout of furniture, relocates the furniture, and evaluates the new layout after relocating the furniture. The robot configured to move furniture may be a same or a different robot than the robot that generates and builds the 3D environment. In another example, a similar process is used for tidying a place and placing furniture in their dedicated places. For example, after dinner the robot places dining chairs neatly around a dining table. In another example, the robot moves furniture to clean areas blocked by the furniture, such as an area under a dining table blocked by dining chairs, and returns the furniture (e.g., dining chairs) to their place after cleaning is complete. FIG. 56 illustrates a robot 8600 tidying up chairs 8601 around a dining table 8602 after dinner using tool 8603, such that the chairs 8601 are neatly arranged. In another example, a user uses an application displaying a virtual 3D model of the environment to select specific surfaces for cleaning, polishing, dusting or other treatment by the robot. For example, the user may specify the top surface of a table in the environment to be cleaned. FIG. 57 illustrates a user 8700 specifying a surface 8701 while exploring a 3D environment 8702 displayed by an application on a communication device. The surface 8701 may be used in providing tasks, such as cleaning, as a base for augmented reality, or as a reference point for the robot. As a user explores different areas of a 3D model of the environment using an application of a communication device, the AI algorithm may suggest new appliances and furniture based on objects already identified within the environment and a section of the environment the user is exploring. In some embodiments, the AI algorithm generates a suggested list of items with properties complementing dominant properties previously identified items (e.g., brand, make and model, style, collection, color, etc.). For example, the suggested list may include another piece of furniture or appliance from a same collection of furniture or appliance identified in the environment. FIG. 58 illustrates a process of generating a suggested list of items by an AI algorithm, as described above.

Figure 61:
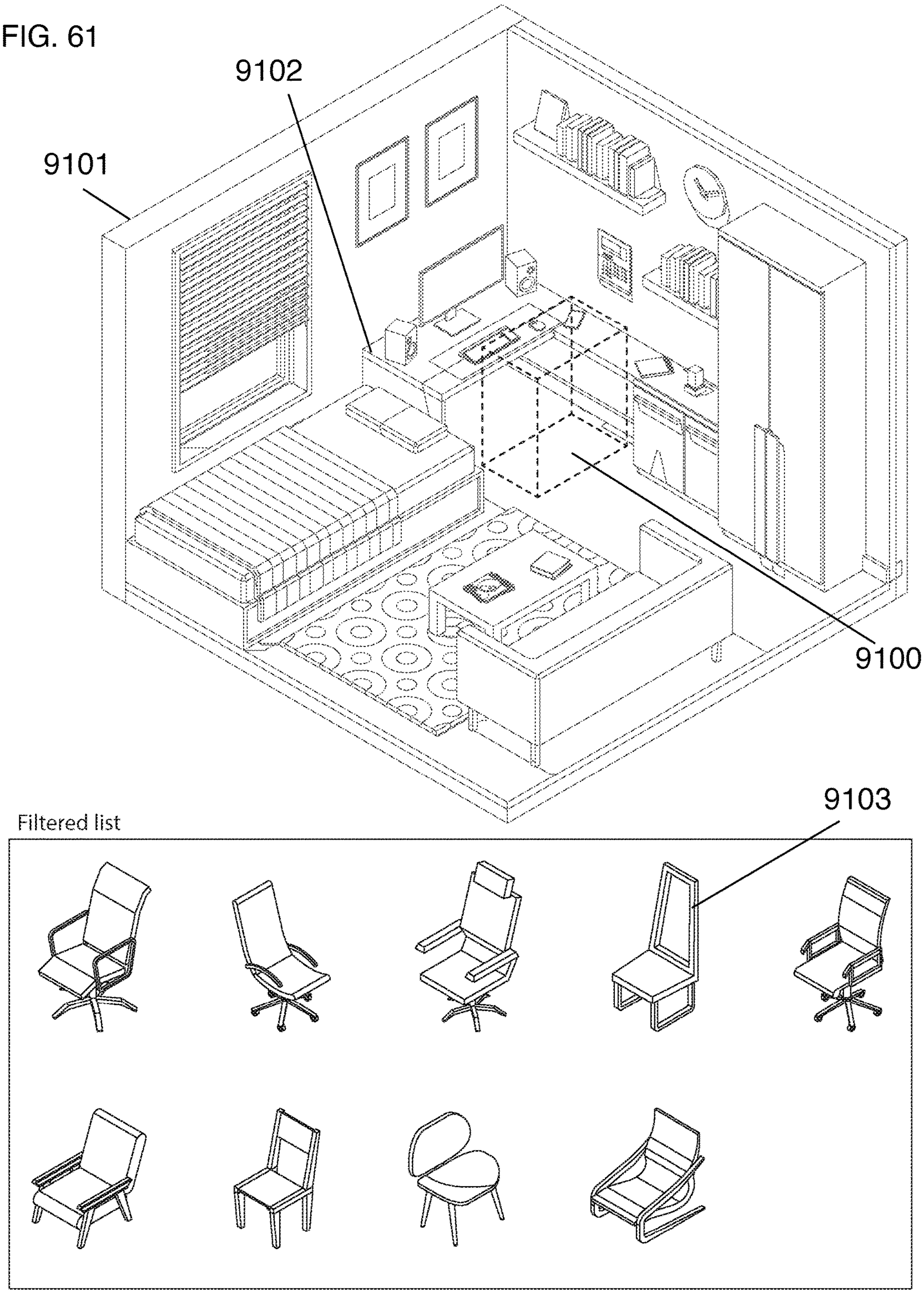
FIG. 61 illustrates identifying an empty space within an environment.
Figure 62:
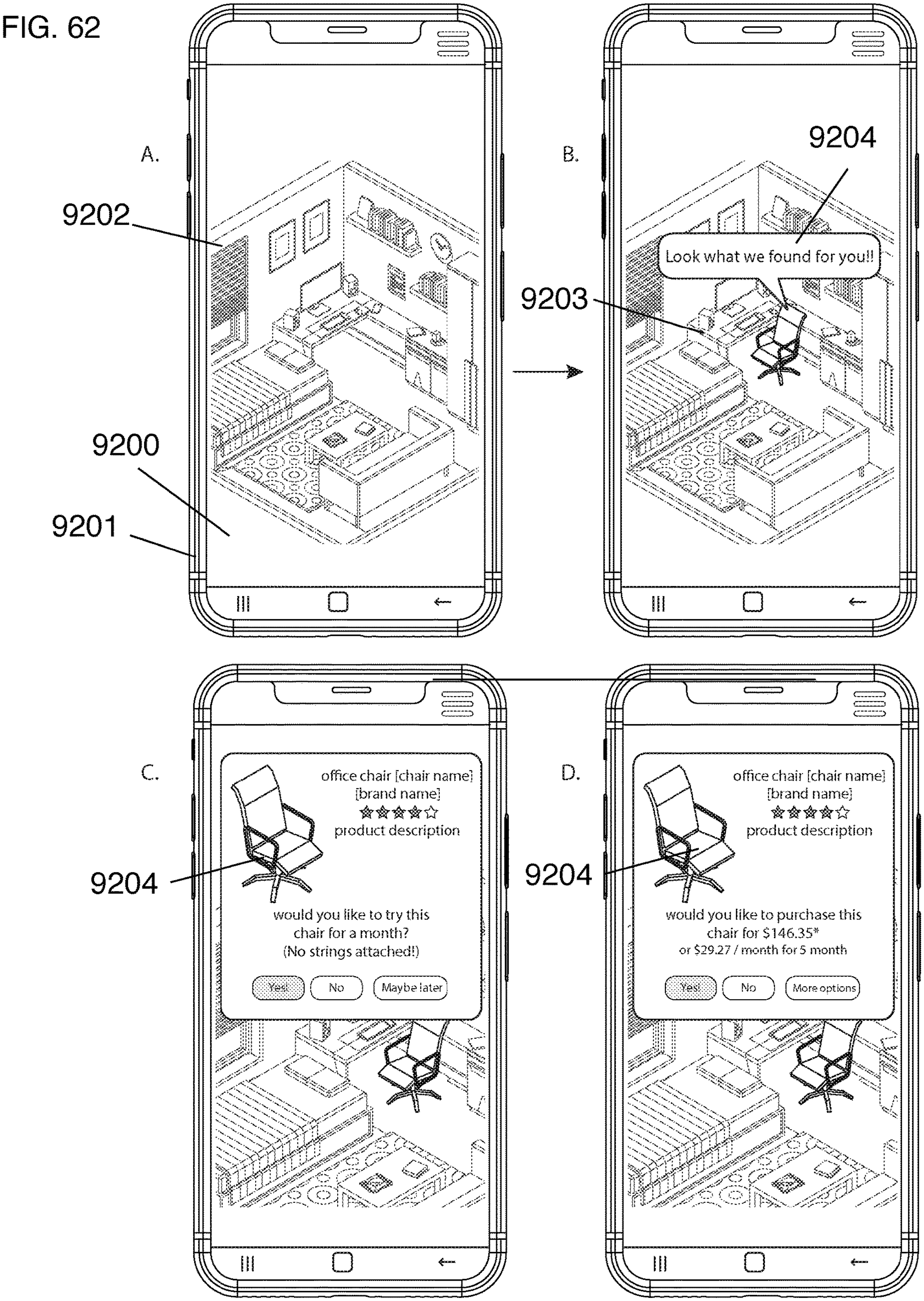
FIGS. 62 and 63 illustrate an application of a communication device promoting products to a user.
Figure 62:
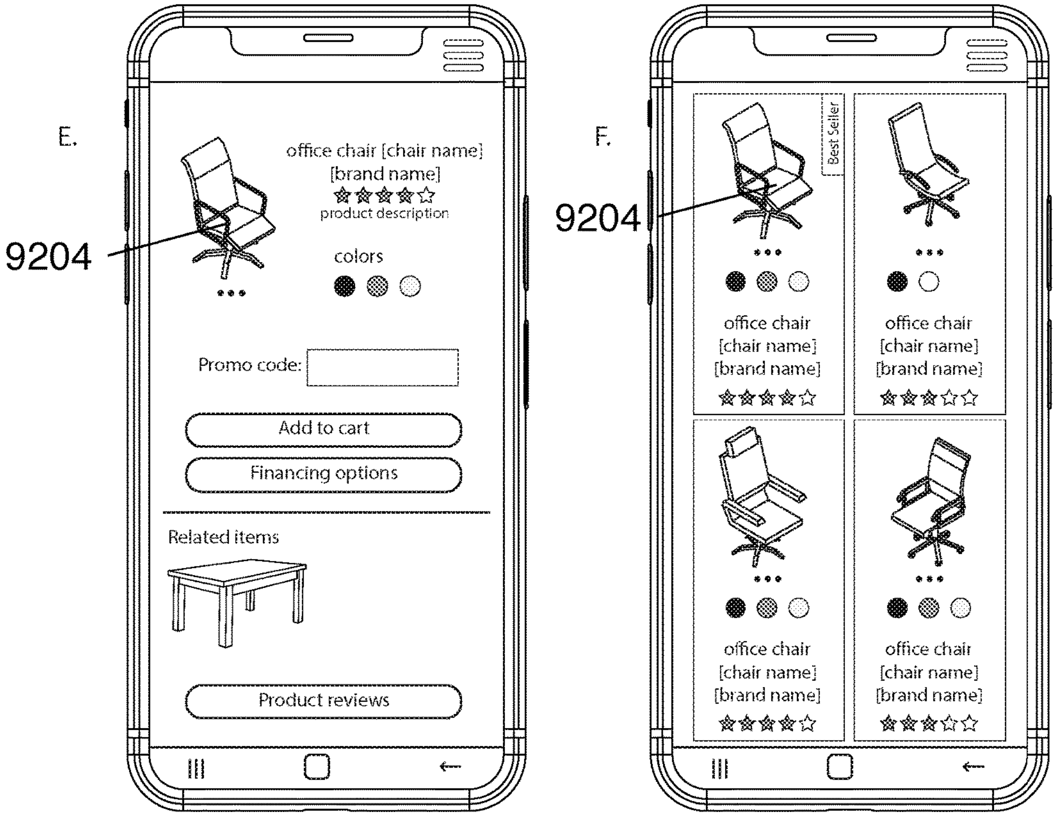
Figure 63:
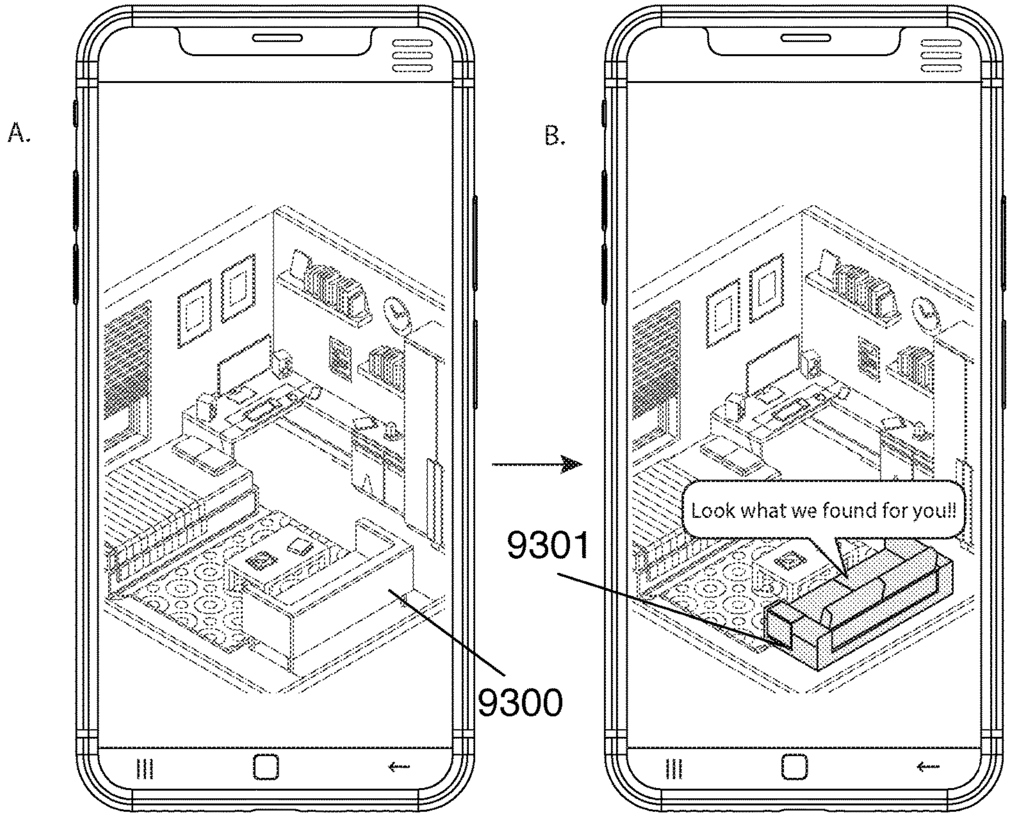
Figure 64:
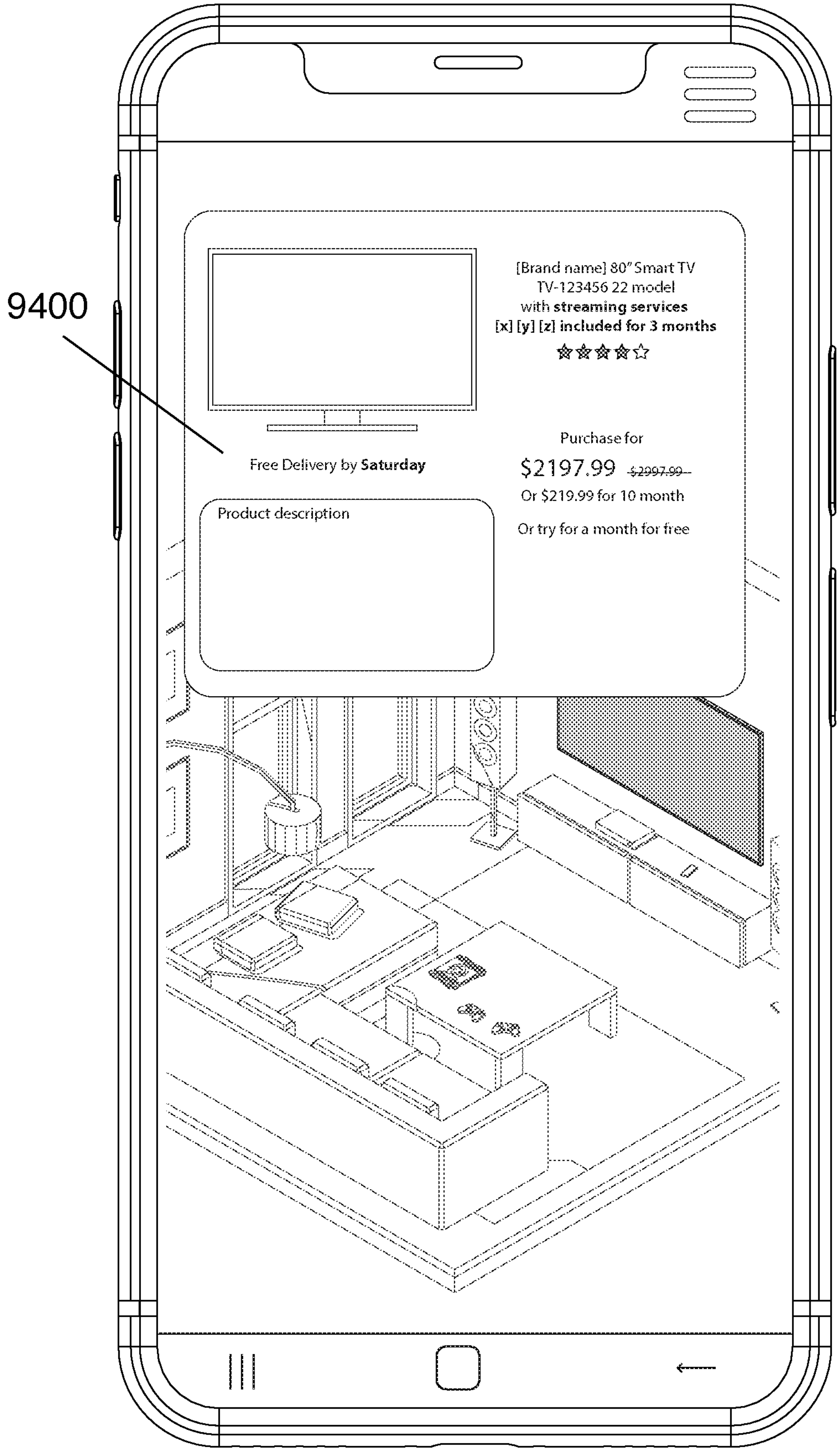
FIG. 64 illustrates an application of a communication device promoting products and services to a user.

In some embodiments, an object identification process is automatically executed by the AI algorithm, while in other embodiments, a user contributes to the process by labeling items and sections of the environment using an application of a communication device. During the labeling process, the user may provide some information and the AI algorithm may determine the rest of the properties by searching a local database or the web. For example, the user may provide a brand name, a serial number, or another piece of information of a product and the AI algorithm uses the information as keywords to search for the product and determines remaining properties of the product. FIG. 59 illustrates a process of determining remaining properties of a product by an AI algorithm given some user-provided product information and images of the product, wherein local databases (e.g., from affiliated brands) are prioritized over information from the web. The suggested list may vary depending on the section of the 3D environment the user is exploring. For example, when an area explored is a kitchen, the AI algorithm mainly suggests kitchen appliances or furniture found in a kitchen. When an area explored is a living room, the AI algorithm mostly suggests furniture typically found in a living room. FIG. 60 illustrates variations in prioritization of items on a suggested list for different section of the environment. In some embodiments, the AI algorithm suggests items from specific brands and the user purchases items using the application of the communication device. The AI algorithm and/or application provider may have contracts with different brands so as include all or part of their products directly in the application store. The application provider may earn revenue by selling a product integration option to brands. The application provider may earn revenue from a brand when users click on items from the brand. The application provider may earn revenue by earning a portion of a total dollar amount of the items sold through the application. In some embodiments, the AI algorithm suggests furniture or other products to purchase based on a layout and empty spaces within the environment. For example, the AI algorithm filters through a database of a particular type of furniture based on a size and suggests the filtered items to the user for a space within the environment. FIG. 61 illustrates an empty space 9100 of an environment 9101. Based on a size of the space 9100 and its proximity to a desk 9102 (or input from a user), the AI algorithm filters chairs for a particular chair type, in this case a desk chair 9103, and size. FIG. 62 illustrates an application 9200 of a communication device 9201 promoting items as a user uses the application 9200 to explore a 3D environment. A. the user explores a room 9202 in the 3D environment; B. an AI algorithm recognizes an empty space in front of a desk 9203 and suggests a product by placing 3D model of the product 9204 in the environment; C. the user selects the product 9204, more information pops up including the product brand, make and model, review score, and descriptions, a free trial of the product 9204 is offered for a period of time; D. the application offers an option to purchase the product 9204 and a financing option; E. the user chooses to purchase the product 9204 and the application provides option to add to cart and view related products; F. the user chooses to view similar options. FIG. 63 illustrates a similar concept, however, A. an existing item 9300 within a model of an environment 9301 is B. replaced with a new product 9301 to promote product 9301 and visualize the product 9301 within the model of the environment. FIG. 64 illustrates the application promoting a product and a service simultaneously, in this case, a smart TV with different streaming services 9400 are promoted.

Figure 65:
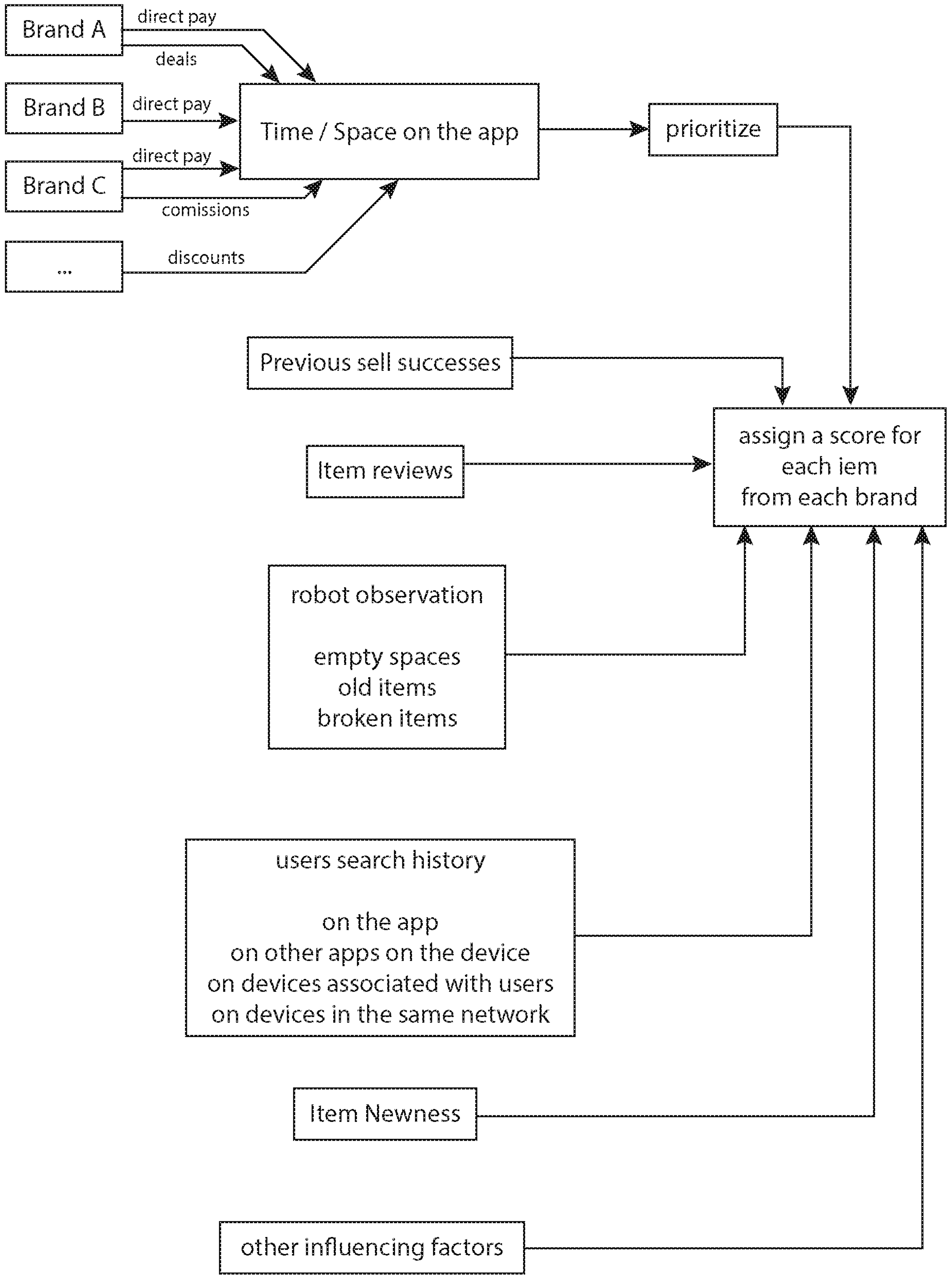
FIG. 65 illustrates factors influencing an item score.

Several factors may influence a process of choosing a product to promote on the application, including but not limited to: an amount of time and/or page space paid for by brands to feature their products, wherein a brand X may pay the application provider to feature all or some of their products for a particular period of time and on top of paying for featuring the product the brand may provide incentives such as discounts, deals, and commissions to the application provider to increase their chance of being featured more often; robot observation, wherein sensor data is used to identify empty spaces suitable for certain items; broken, old, or outdated items that may be replaced; user search history on the application, another application on the same device, one or more applications on all devices associated with the user, or one or more applications on devices within a same network provide some insight on items the users are looking for; previous success in selling particular items, wherein items sold successfully in the past have a higher chance of selling during promotion; reviews, wherein items with more reviews and more positive reviews have a higher chance of selling during promotion; and newness, wherein newer items equipped with better technology and aligned with current trends have a fear of missing out (FOMO) factor to them and attract a niche demographic of early adopters. By factoring in all the mentioned influences, the AI algorithm may assign a score for to a particular item from each brand. Items with higher scores appear on top of a suggested list for each category of item by default. The user may choose to sort the list based on other factors, such as price (ascending or descending), customer review score, newer items first, etc. The AI algorithm may consider item scores even with the new order requested by the user. For example, for two items with a same price, the AI algorithm places the item with a higher item score at a higher position on the list. In some embodiments, items with higher scores have a higher chance to pop up when the user is exploring the 3D environment. FIG. 65 illustrates factors influencing item score, and hence, prioritization during promotion, as described above.

The application may filter and sort products from different vendors based on certain properties. For example, the application may filter for and display chairs with long legs, cotton upholstery, and a green color. Other properties may include price and shipping time. In some embodiments, the AI algorithm recognizes a style, color scheme, layout, circulation, lighting, etc. of a home based on sensor data and generates the suggested item list based on the style of the home. Based on the observed environment and user behaviors, the AI algorithm may suggest different layouts with current furniture of the environment to provide better circulation, the application displaying the suggested layout.

In some embodiments, a map is used to create virtual presence experience. For example, a user virtually attends a basketball game, virtually sitting within the basketball court. In some embodiments, a height of the virtual view is adjusted to match a height of the user for a more realistic experience. In embodiments, an angle of the view, a view perspective (e.g., top, side, etc.), and a height of the view are adjustable. For instance, the virtual environment is adjusted to appear larger than the real world, wherein all objects appear large in comparison to the user (e.g., giant basketball players). In another example, a user virtually attends a reality TV show recording, virtually positioned at a recording location, such that those filming the TV show are not disturbed by live viewers. In some embodiments, the user moves within the virtual environment, from one area to the next, using a joystick, a computer interface, or an application of a smart phone. In some embodiments, the user moves within the virtual environment by physically walking, wherein motion of the user is captured and translated to motion of a FOV of the virtual environment. For example, the user virtually attending the reality TV show recording physically walks within their own home to virtually move different areas within the reality TV show production set. As such, the user can virtually visit a location of the filming crew and positioned themselves in a chair of a show director. In another example, a user virtually visits a locker room area of a sports team, virtually follows an individual player or the team, and virtually attends team discussions prior to and after a game. In one example, a user virtually attends a concert from within a stadium, virtually sits next to performers, virtually follows a performer through makeup and wardrobe, and virtually attends an after-show event with the performer, as if having a VIP pass or personally knowing the performer. Virtual experiences may be extended to political debates, congressional hearings, trade negotiations, court hearings, depositions, etc. Extra visibility provides a rich and more emotional experience to a viewer during a game, a concert, a reality show, a movie, news, etc. In some embodiments, virtual experiences are bought by the user (e.g., a fixed amount or an amount dependent on an amount of time of viewing). For example, virtually attending a movie set costs a fixed fee or is free and extra virtual experience access cost a fixed amount. In some embodiments, virtual experiences are used as promotional material to help selling or promoting a product, a service, or real experience to a user (e.g., football game tickets, movie tickets, etc.).

In some embodiments, a light pattern may be emitted onto objects surfaces within the environment. In some embodiments, time division multiplexing may be used for point generation. In some embodiments, an image sensor may capture images of the light pattern projected onto the object surfaces. In some embodiments, the processor of the robot may infer distances to the objects on which the light pattern is projected based on the distortion, sharpness, and size of light points in the light pattern and the distances between the light points in the light pattern in the captured images. In some embodiments, the processor may infer a distance for each pixel in the captured images. In some embodiments, the processor may label and distinguish items in the images (e.g., two dimensional images). In some embodiments, the processor may create a three dimensional image based on the inferred distances to objects in the captured images. Some embodiments may include a light source, such as laser, positioned at an angle with respect to a horizontal plane and a camera. The light source may emit a light onto surfaces of objects within the environment and the camera may capture images of the light source projected onto the surfaces of objects. In some embodiments, the processor may estimate a distance to the objects based on the position of the light in the captured image. For example, for a light source angled downwards with respect to a horizontal plane, the position of the light in the captured image appears higher relative to the bottom edge of the image when the object is closer to the light source. In some embodiments, the processor may determine the distance by using a table relating position of the light in a captured image to distance to the object on which the light is projected. In some embodiments, using the table comprises finding a match between the observed state and a set of acceptable (or otherwise feasible) values. In embodiments, the size of the projected light on the surface of an object may also change with distance, wherein the projected light may appear smaller when the light source is closer to the object. In some cases, other features may be correlated with distance of the object. The examples provided herein are for the simple case of light project on a flat object surface, however, in reality object surfaces may be more complex and the projected light may scatter differently in response. To solve such complex situations, optimization may be used to provide a value that is most descriptive of the observation. In some embodiments, the optimization may be performed at the sensor level such that processed data is provided to the higher level AI algorithm. In some embodiments, the raw sensor data may be provided to the higher level AI algorithm and the optimization may be performed by the AI algorithm.

In some embodiments, an emitted structured light may have a particular color and particular color. In some embodiments, more than one structured light may be emitted. In embodiments, this may improve the accuracy of the predicted feature or face. For example, a red IR laser or LED and a green IR laser or LED may emit different structured light patterns onto surfaces of objects within the environment. The green sensor may not detect (or may less intensely detects) the reflected red light and vice versa. In a captured image of the different projected structured lights, the values of pixels corresponding with illuminated object surfaces may indicate the color of the structured light projected onto the object surfaces. For example, a pixel may have three or four values, such as R (red), G (green), B (blue), and I (intensity), that may indicate to which structured light pattern the pixel corresponds to. Structured light patterns may be the same or different color and may be emitted by the same or different light sources. In some cases, sections of the image may capture different structured light patterns at different times. In some cases, the same light source mechanically or electronically generates different structured light patterns at different time slots. In embodiments, images may be divided into any number of sections. In embodiments, the sections of the images may be various different shapes (e.g., diamond, triangle, rectangle, irregular shape, etc.). In embodiments, the sections of the images may be the same or different shapes.

In some embodiments, the processor uses a neural network to determine a distance of an objects based on images of one or more laser beams projected on the objects. The neural network may be trained based on training data. Manually predicting all pixel arrangements that are caused by reflection of structured light is difficult and tedious. A lot of manual samples may be gathered and provided to the neural network as training data and the neural network may also learn on its own. In some embodiments, an accurate LIDAR is positioned on a robot and a camera of the robot captures images of laser beams of the LIDAR reflected onto objects within the environment. To train the neural network, the neural network associates pixel combinations in the captured images with depth readings to the objects on which the beams are reflected in the captured images. The processor trains a neural network by associating pixel combinations in the captured images with depth readings to the objects on which the beams are reflected in the captured images. Many training data points may be gathered, such as millions of data points. After training, the processor uses the neural network to determine a distance of objects based on a position of beams reflected on the objects in a captured image and actuates the robot to avoid the objects.

In some embodiments, a sequence of raw sensor measurements in one dimension $X \in R$ are obtained, wherein R is a one dimensional continuation of numbers from $-\infty$ to $+\infty$ and a function y=f (x) outputs distance based on the raw sensor measurements. As environmental factors are limitless and unpredictable and motion blur is variable and influences how raw measurements translate to distance, y=f (x) is unknown and difficult articulate and hard code. As a result, a lot of measurements are captured and included into a data set, wherein a measurement $x_i$ is associated with a distance $y_i$ and the pair are considered an example. In some embodiments, the robot comprises two sensors, a first sensor is trained and a second sensor is used as ground truth for the first sensor. In one example, a bucket $B_1$ includes n associations that have been poured into the bucket $B_1$ during a first round. After a second round, bucket $B_1$ includes m associations that are poured into a second bucket $B_2$. After a third round, bucket $B_2$ includes p associations that are poured into a third bucket $B_3$ and so forth, wherein $B_1=\{(x_i,y_i)\}$, $1 \le i \le n$; $B_2=\{(x_i,y_i)\}$, $n \le i \le m$; and $B_3=\{(x_i,y_i)\}$, $m \le i \le p$. From the n associated in bucket $B_1$, a hypothesis is created that approximates y=f (x) in unseen $x_i$, such as when $n \le i \le m$ or $m \le i \le p$. A level of luckiness in the hypothesis approximating y=f(x) is defined as a cost function that penalizes unlucky approximations to enforce a luckier approximation. The hypothesis is tested using the m associations in $B_2$, which are also used for fine tuning imperfections of a replacement function $\hat{y}=h(x)$. The replacement function is one instance of class H, wherein a value assigned to a parameter w of the class H causes the instantiation and good/lucky values of w minimize penalties.

Figure 66:
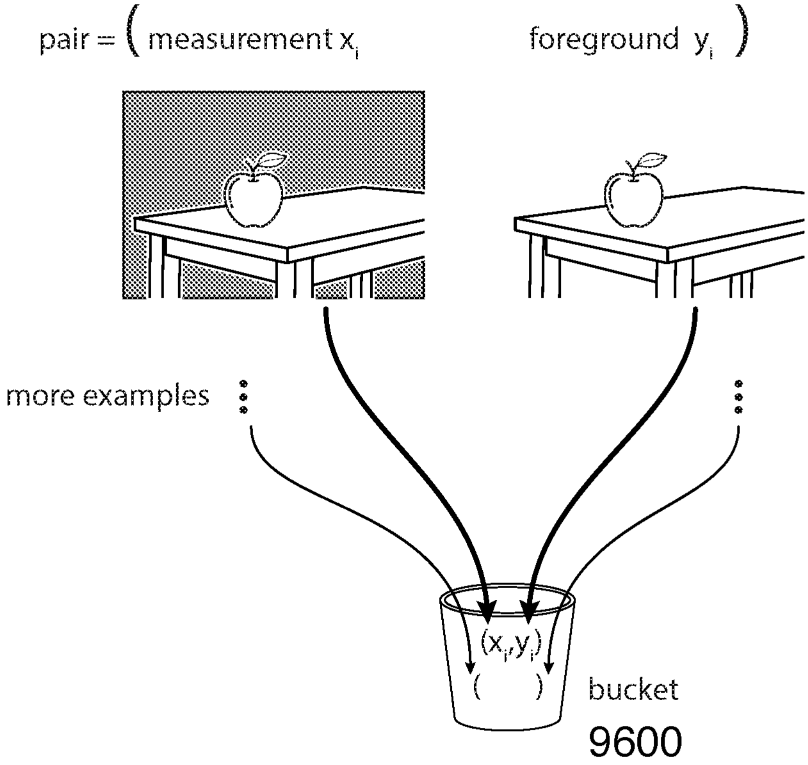
FIG. 66 illustrates an example of a bucket including a pixel pair and associated foreground or background.

Raw measurements do not necessarily provide distances. In some cases, distances are used to simplify explanations herein. In one example, a measurement comprises a sequence of images captured as the robot moves within the environment. Due to motion blur, some boundaries of colors intermix. In this particular case, y=f (x) is therefore used to assign a blurred area to foreground or background colors. In this example, a bucket includes pixel values and a foreground or background assignment to each pixel value. For example, FIG. 66 illustrates a bucket 9600 that includes pairs, each comprising a pixel pair $x_i$ and associated foreground or background $y_i$. In mathematical notation, $$\begin{bmatrix} \hat{y}_1 \\ \vdots \\ \hat{y}_n \end{bmatrix} = \begin{bmatrix} X_1^T \\ \vdots \\ X_n^T \end{bmatrix} \begin{bmatrix} w_1 \\ \vdots \\ w_k \end{bmatrix},$$

wherein k<<<n.

In some embodiments, least square methods are used to articulate a cost function, where linearity is dominant and ridge regression is not. Measurements and their association with an output are noisy, as such the noise is modeled using a variation of a Gaussian, uniform, Laplacian, etc. distribution. In some embodiments, maximum likelihood estimation and maximum a posteriori are used to resolve probabilistic nature of environmental impact on sensor measurements. Some embodiments synthesize sensor results in iteration for possible poses, wherein a direct comparison with an actual sensor input validates or invalidates a hypothesized pose. Analysis by synthesis methods optimizes all parameters before the hypothesis pose is validated, invalidated or is selected as a seed in a group of next generation of synthetics. A genetic algorithm governs the evolution of synthetics, accounting for a parametrized solution space and environmental factors.

In the definition above, sensor measurement X is defined as a real number. It is also shown that a same mathematical modeling is applicable when X is an ordered pair, such as a pixel of an image. Instead of a pair, a n-vector of n-ordered list is used. A bra-ket/Dirac notation may be used to represent a vector of three in an ordered list, $$|\Psi\rangle = \begin{bmatrix} \Psi_1 \\ \Psi_2 \\ \Psi_3 \end{bmatrix}.$$

The ordered list may also be represented in a form of a row instead of column, wherein each component is replaced with its transpose, $\langle\Psi| = (\Psi_1^* \Psi_2^* \Psi_3^*)$. With such Dirac notations, $\Psi_1^*$ refers to a complex conjugate. However, as there is no need for interpretations of complex numbers, the notation is used without much focus on the quantum interpretations. A dual vector, a row vector rather than a column vector, is denoted by $\langle\Psi|$. A dual of a dual vector results in a normal vector, or otherwise a column vector, as a dual of a vector is an involution operation.

In embodiments, angular resolution depends on a resolution of a camera. Various class 1 line laser arrangements and cameras priced below $5 achieve an angular resolution of 0.3 degrees and a field of view between 90 to 120 degrees. Lower resolution cameras may provide 1 degree angular resolution in a 100 degrees FOV, providing 100 readings per interval. In embodiments, sensor readings may be in text, decimal number, or hex number format, wherein a first number indicates a distance reading at a first angle (e.g., 1 degree), a second number indicates a distance reading at a second angle (e.g., 2 degrees for 1 degree angular resolution). The sensor readings may be separated by a space or another separator. FIG. 67A illustrates a robot 9700 driving parallel to a wall 9701 while a sensor measures distances 9702 to the wall 9701. A processor of the robot 9700 uses the distances to the wall 9701 to maintain smooth (consistent distance) wall following along the wall 9701. Each of the sensor readings are used as a point reading and since there are several readings, such as 90 readings, the processor has a better sense of alignment of the robot 9700 with the wall 9701. FIG. 67B illustrates a sensor reading of A cm for a point reading taken from a first angle, a sensor reading of C cm for a point reading taken from a second angle, and a sensor reading of B cm for a point reading taken from a fifth angle. The point reading of B cm taken from the fifth angle indicates a distance to the wall 9701 in a direction perpendicular to a movement 9703 of the robot 9700. The larger sensor reading of A cm from the first angle in comparison to the sensor reading of C cm from the second angle indicates that the wall 9700 ahead is angled away from the robot and the robot must move towards the wall 9700 upon reaching or just before the dotted line 9704.

In some embodiments, the distance sensor is used for detecting obstacles in front of the robot. FIG. 68 illustrates A. a robot 9800 with a distance sensor with a FOV 9801 of less than 90 degrees observing object 9802, B. the robot 9800 with two distance sensors with non-overlapping FOVs 9803 and 9804 of 90 degrees each observing object 9803, and C. the robot 9800 with three distance sensors with overlapping FOVs 9805 and 9806 of less than 90 degrees each observing object 9803 and FOV 9807 for measuring distance to a wall for wall following. An imaging sensor captures respective images 9808 of illumination emitted onto a surface of the object 9803 and the presence of the object 9803 and a distance of the object 9803 from the robot 9800 is determined.

Figure 69A:
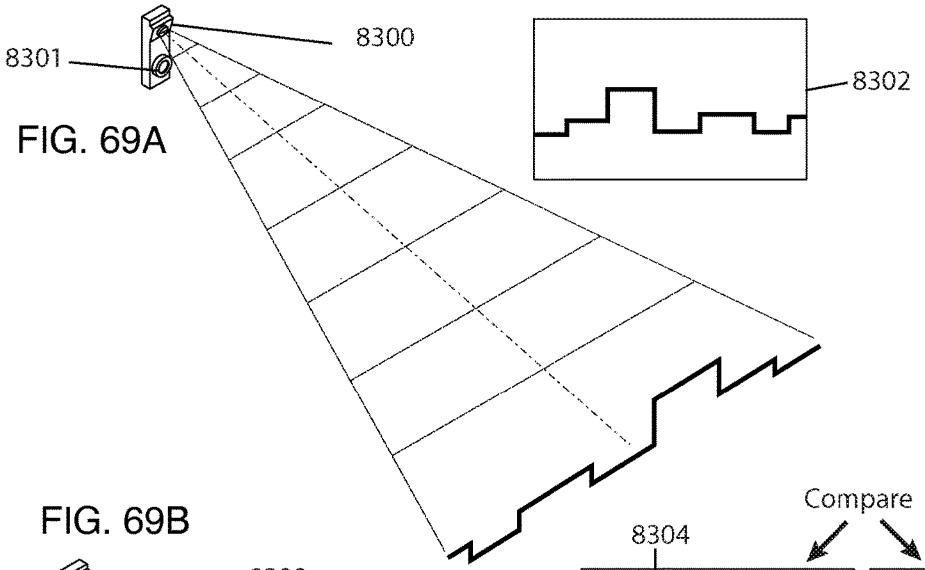
FIGS. 69A-71 illustrate examples of a module comprising at least one of a line laser and at least one of an image sensor.
Figure 69B:
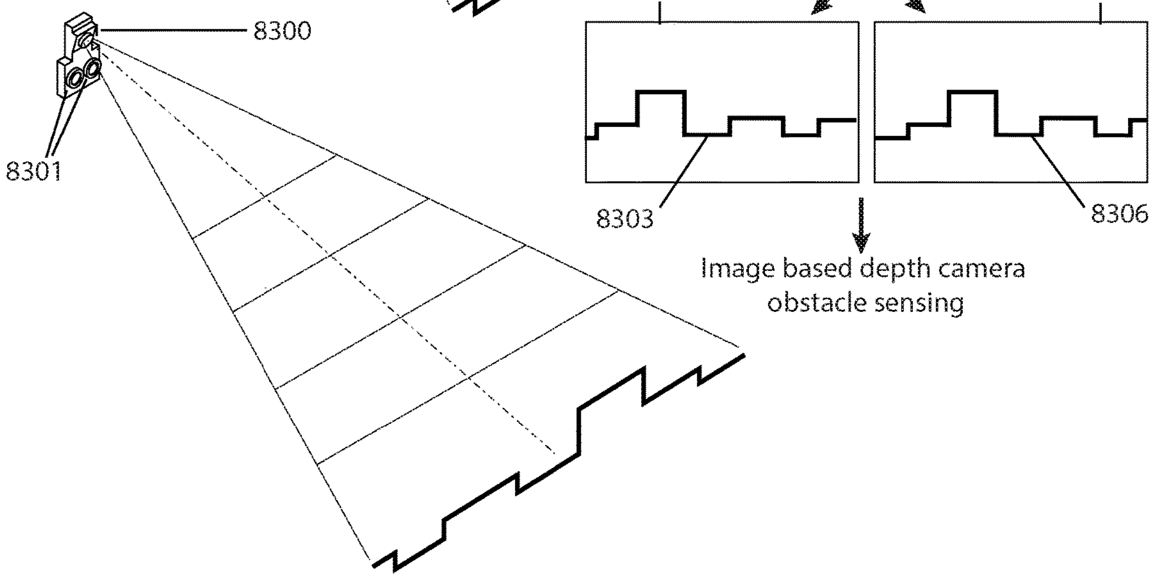
Figure 70A:
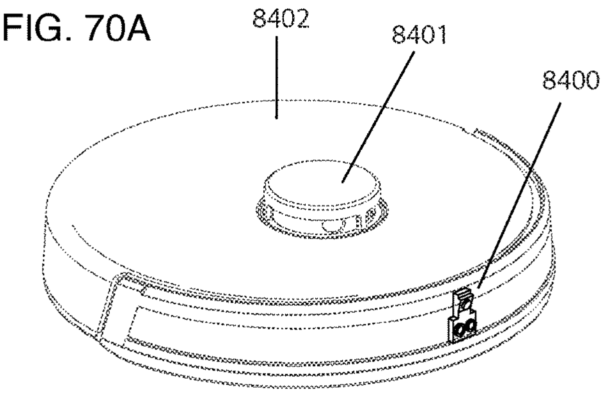
Figure 70B:
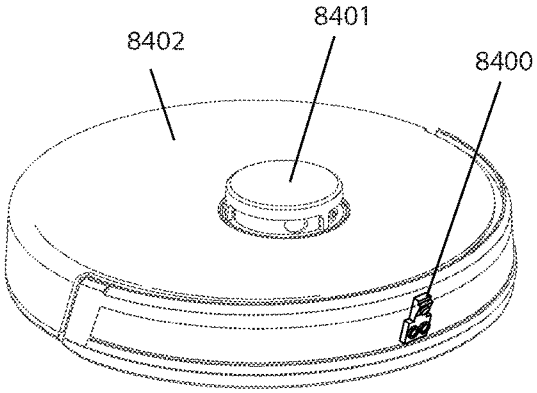

In some embodiments, a combination of a short-range line laser distance measurement device and a depth camera are used to locate near range obstacles. FIGS. 69A and 69B illustrate examples of combinations of line laser 8300 and depth cameras 8301, FIG. 69B including two depth cameras 8301. In FIG. 69A, the line laser 8300 is projected onto obstacles within the environment and the camera 8301 captures an image 8302 of the projected line laser. In FIG. 69B, the projected laser line profile 8303 in image 8304 captured by the cameras 8301 is compared to a saved image 8305 of a laser line profile 8306. Laser line profiles may be unique to a particular object on which the laser line was projected and may therefore be used in identifying the particular object. Laser line profiles may also be unique to a particular location within the environment and may therefore be used in localizing the robot. A position of the lines forming the laser line profile within captured images may also be used to determine a distance of the object on which the laser line was projected. For example, for the line lasers 8300 angled downward, lines of the laser line profile 8303 positioned lower relative to a top edge of the image 8304 are further away. A position of a line may be correlated with a true distance to the object one which the line is projected. In embodiments, the combined line laser and depth camera are disposed on the robot. In FIGS. 70A and 70B, the combined line laser and depth camera 8400 is positioned lower than a LIDAR 8401 on robot 8402. In FIG. 70A, the combined line laser and depth camera 8400 is positioned perpendicular to a driving surface of the robot 8402 and in FIG. 70B is positioned at an angle such that the line laser points towards the driving surface.

Figure 71:
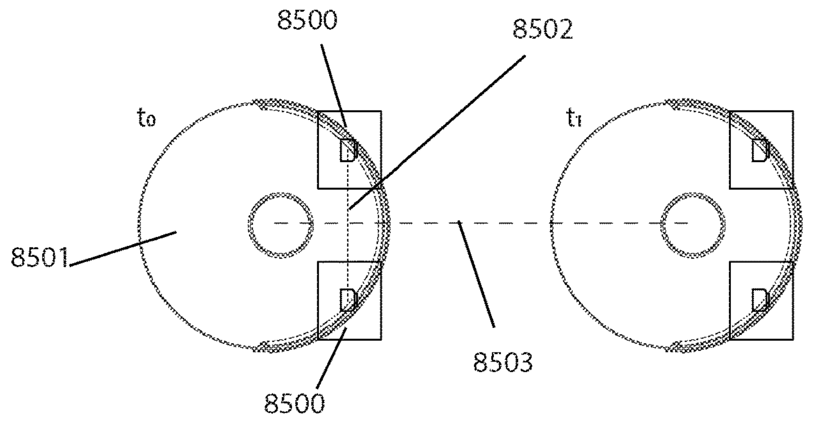

In some embodiments, the processor of the robot finds conjugate points in a pair of images based on a similarity between the two images. The images may be captured by two cameras positioned at a base distance from each other or by a single camera at two consecutive time slots, the robot having traveled a distance between the two time slots. In some cases, there is a large overlap of spatial information, indicating the two images include a lot of similar information, due to a small base distance or a small travel distance. In such cases, the processor finds a conjugate point for every pixel or group of pixels that form a feature detected in both images. The number of features detected used in finding correspondences between the two images may be one or more. At times, a single distinct feature may provide a desirable result while at other times multiple features may form an optimization problem that may be estimated or solved. A hybrid form, an adaptive version, or a primary/secondary scheme may be used to complement the pros and cons of each method. For example, in cases where a feature cannot be found, disparity values may be monitored from one image to another over a period of time with some cost function to be minimized. FIG. 71 illustrates an example of two cameras 8500 positioned on robot 8501 at a base distance 8502 from each other and each capturing an image a first timeslot t0 and at a second time slot t1 after travelling some distance 8503. In such a case, the processor of the robot may then compare the following images for similarity: Camera 1 t0 with Camera 1 t1; Camera 2 t0 with Camera 2 t1; Camera 1 t0 with Camera 2 t0; Camera 1 t1 with Camera 2 t1; Camera 1 and Camera 2 t0 with Camera 1 at t1; Camera 1 and Camera 2 t0 with Camera 2 t1; and Camera 1 and Camera 2 t0 with Camera 1 and Camera 2 t1. As demonstrated, the number of comparison search options to find correspondences between images increases very quickly. However, as it becomes increasingly difficult to fit all the criteria, a lower number of correspondences are found. Here, it may be distinguished that for comparisons between images that are fixed in relation to one another, the geometrical relations form a rigid base tied to the intrinsics of the camera and geometrical parameters while for comparisons between images captured at consecutive time slots the geometrical relations are soft and subject to uncertainties and/or speed of motion. For example, a video stream captures 30 frames per second at a fixed rate regardless of travel speed of a vehicle. When uncalibrated reconstruction is used, distance and angle information of the spatial capture is lost.

Figure 72:
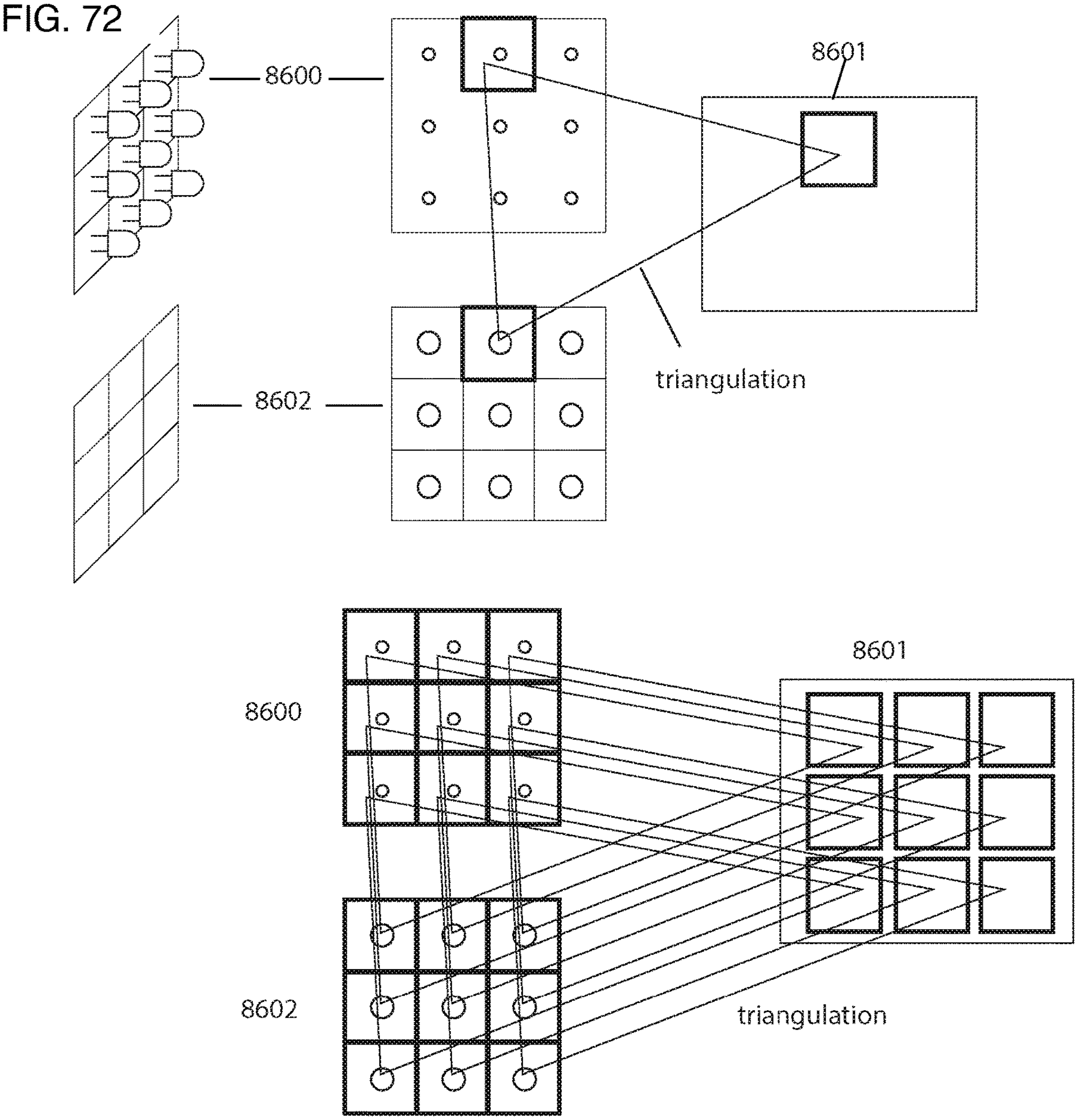
FIGS. 72 and 73 illustrate examples of structured light and measuring distances using triangulation.
Figure 73:
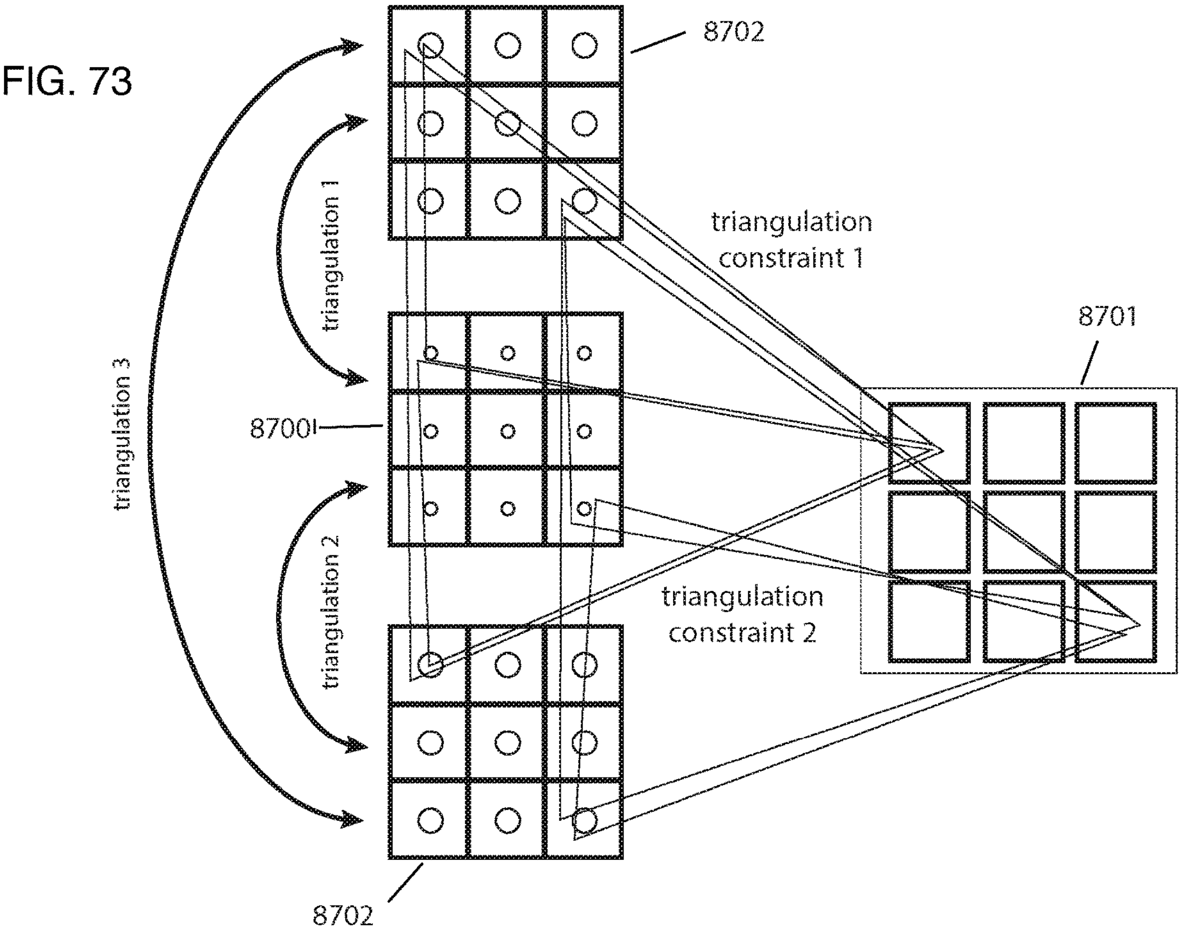
Figure 74:
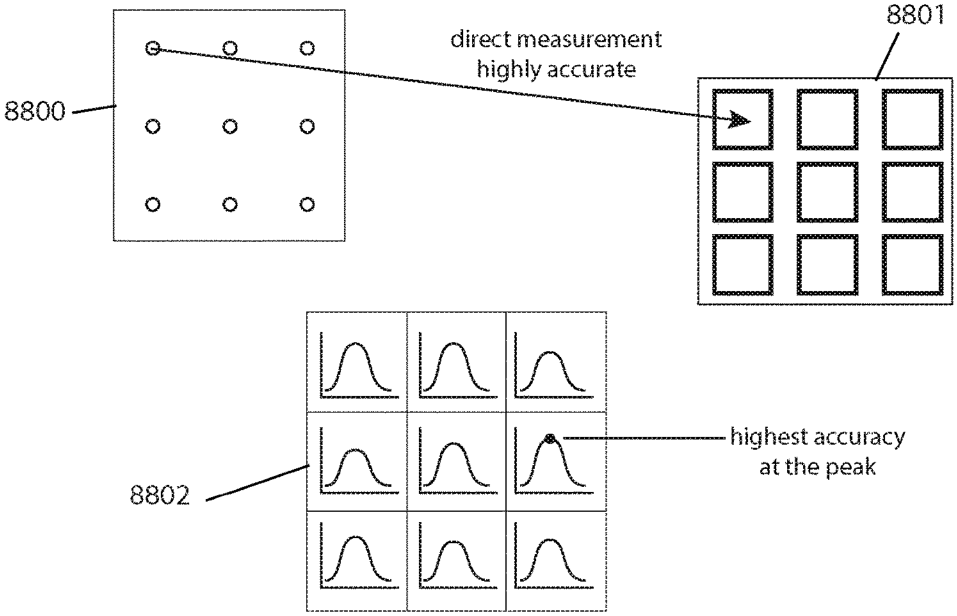

In some embodiments, the processor of the robot uses triangulation. FIG. 72 illustrates an example of triangulation between a structured illumination 8600, a scene 8601, and an image 8602 of the scene 8601. FIG. 73 illustrates an example of three different triangulations between a structured illumination 8700, a scene 8701, and two images 8702 of the scene 8701, triangulation one and two each having their own constraint. In some cases, structured light illumination may be used with TOF sensors, such as ST micro FlightSense. A TOF sensor provides an accurate (i.e., occlusion free) reading from a single point that has an incident with the surroundings whereas triangulation provides less accurate data for a larger area of the scene. FIG. 74 illustrates structured illumination using structured TOF sensors 8800 instead of structured light, each TOF sensor directly measuring a distance from a scene 8801 with high accuracy. For each reading of the final readings 8802, the highest accuracy is at the peak. FIG. 75 illustrates the accuracy of each distance measurement point in an image 8900 of the scene 8801 with color intensity. After a time step, the accuracy of measured distances decreases. FIG. 76 illustrates a in accuracy after a time step 9000 for TOF sensor measurement points and for measurements derived through triangulation. The decrease in accuracy is illustrated by a reduction in a height of the peaks and increase in a wideness of the peaks. In some embodiments, point measurements use direct pulse modulation. Pulsed light provides a high energy pulse in a short time, permitting light signals to noise ration, which performs well under ambient light. The light receiver or a stop-watch sets a start of a counter when a pulse is transmitted from an LED or laser diode while waiting for a return signal. The return signal is often heavily attenuated due to surrounding conditions and the nature and material of objects from which the light is reflected. In embodiments, it is unessential for an emitter and a receiver to be a pair in a structured TOF illumination. For example, a single transmitter may be received by multiple receivers. FIG. 77 illustrates a relation between confidence score and a location of transmitters Tx and receiver Rx in an illuminator positioned behind a lowpass filter and optical components and illuminating the scene. Since a transmitter and receiver are only co-located in location 9100, the confidence score of measurement 9101 is increased as the position corresponds to the location 9100. The remaining confidence scores are decreased as they are positioned a distance from the receiver. In some embodiments, continuous wave modulation may use homodyne amplitude modulation to modulate a sinusoidal or square wave.

Given camera virtualization, it may be shown that structured light depth cameras are mathematically equivalent irrespective of the number of cameras used. For instance, one, two, three, or more cameras may be used with a single illumination if the geometrical constraints are arranged properly. Therefore, in the examples provided herein, having one, two or more cameras, are for the purpose of adding clarity to the concept and its implementation. In some embodiments, a depth camera, LIDAR, or TOF measuring device has a maximum measurement range. In cases where walls or obstacles surrounding the robot are further than the maximum range, measurements value may be invalid and not ideal for map building. However, lack of an obstacle may be used by the processor of the robot to identify areas free of obstacles. When there is a wall or obstacle within an area, a reflection of laser or light emitted by a transmitter may be captured by a receiver and used to determine distance to the wall or obstacle. In some embodiments, a number of points of reflection are correlated with distance or angular resolution of the LIDAR or depth camera. The points of reflection may comprise a number of points whose connections form a map of the surroundings including obstacles that are visible from a location of the robot. In cases where the obstacle observed is something other than a wall (i.e., perimeter), the processor of the robot observes behind the obstacle. In some embodiments, a mathematical formula or probabilistic method is used to connect the points. As the robot moves, noise is introduced and some of the points appear off in position after adjusting for the motion of the robot. Therefore, a probabilistic method may be used to connect the points in a way that has a highest chance of being a reflection of the environment. When the robot is displaced or the processor loses a location of the robot in the map or is transported to another floor by a human, escalator, or elevator, the processor may search current surrounding points against one or more previously known maps to rediscover the location of the robot.

Figure 78A:
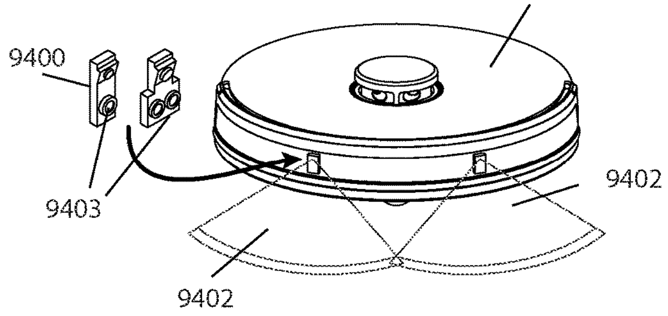
FIGS. 78A-79 illustrate examples of positioning of obstacle sensors on a robot.
Figure 78B:
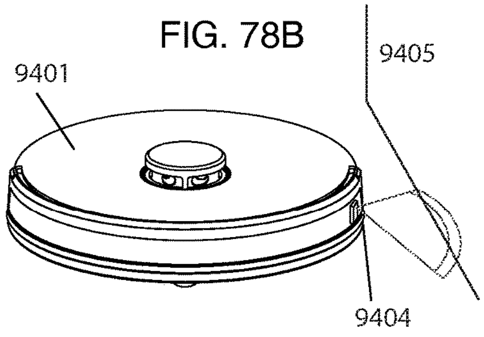
Figure 79:
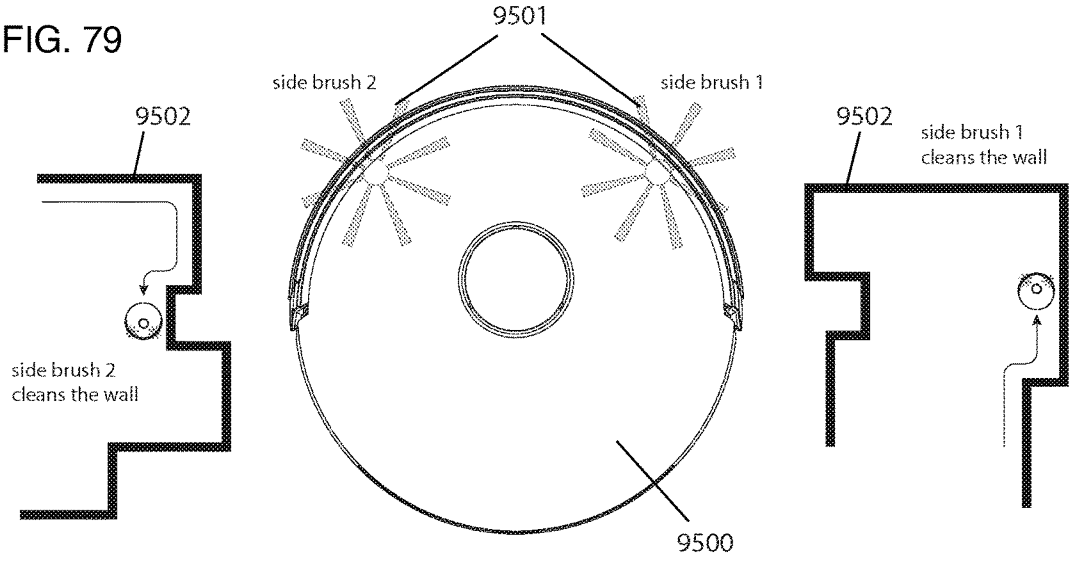
Figure 80:
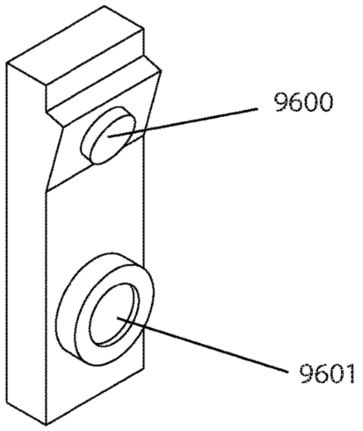
FIGS. 80-93 illustrate examples of a module comprising a line laser and at least one camera.
Figure 81:
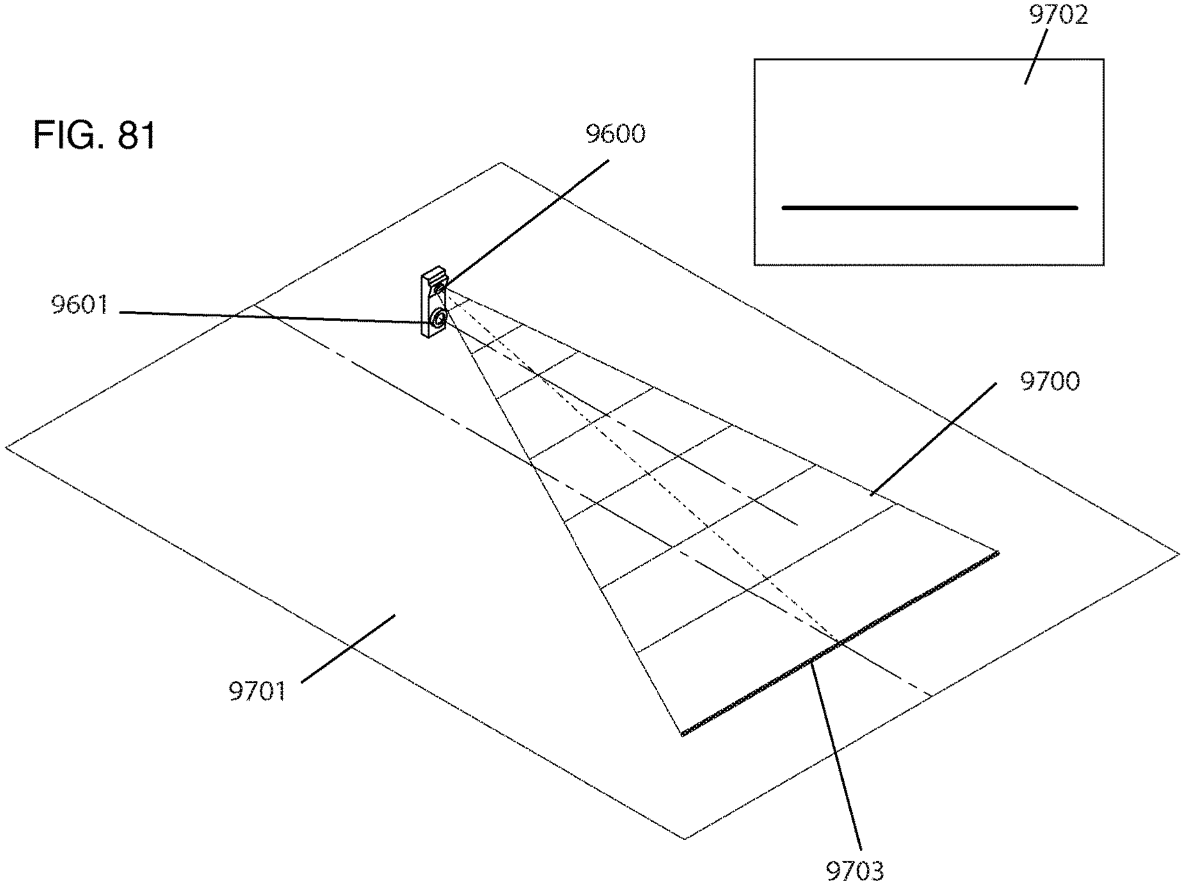
Figure 82:
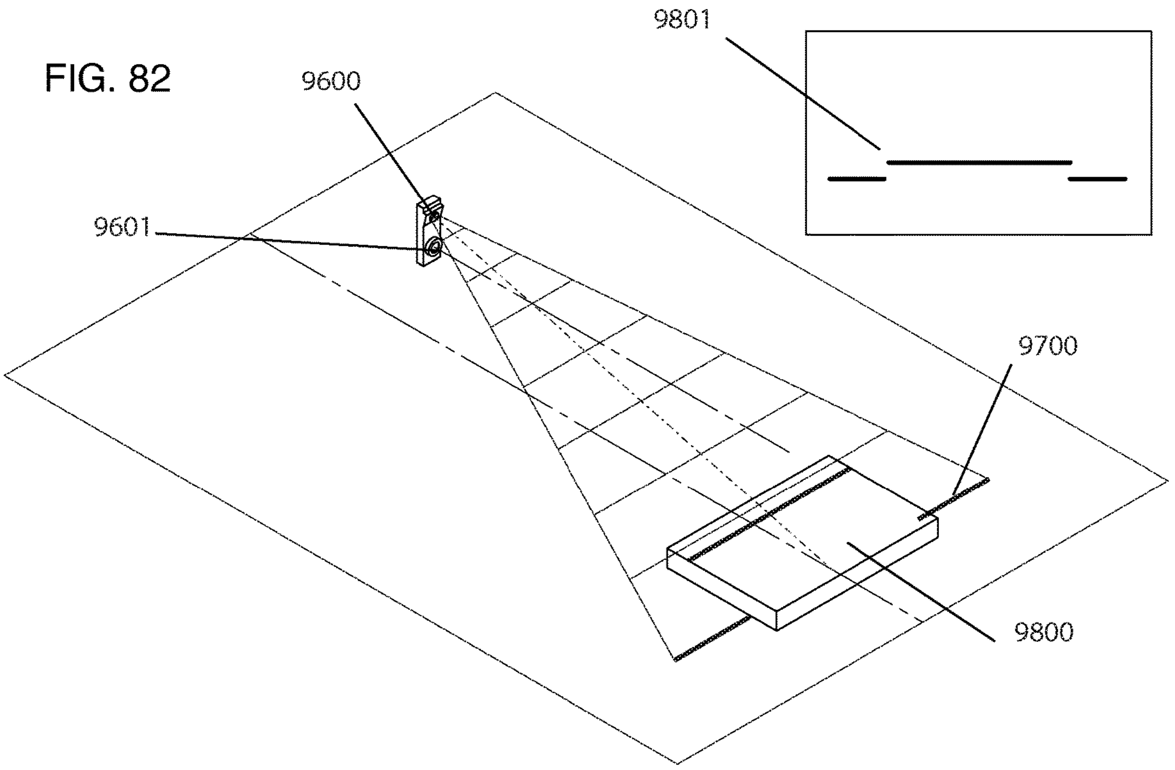
Figure 83:
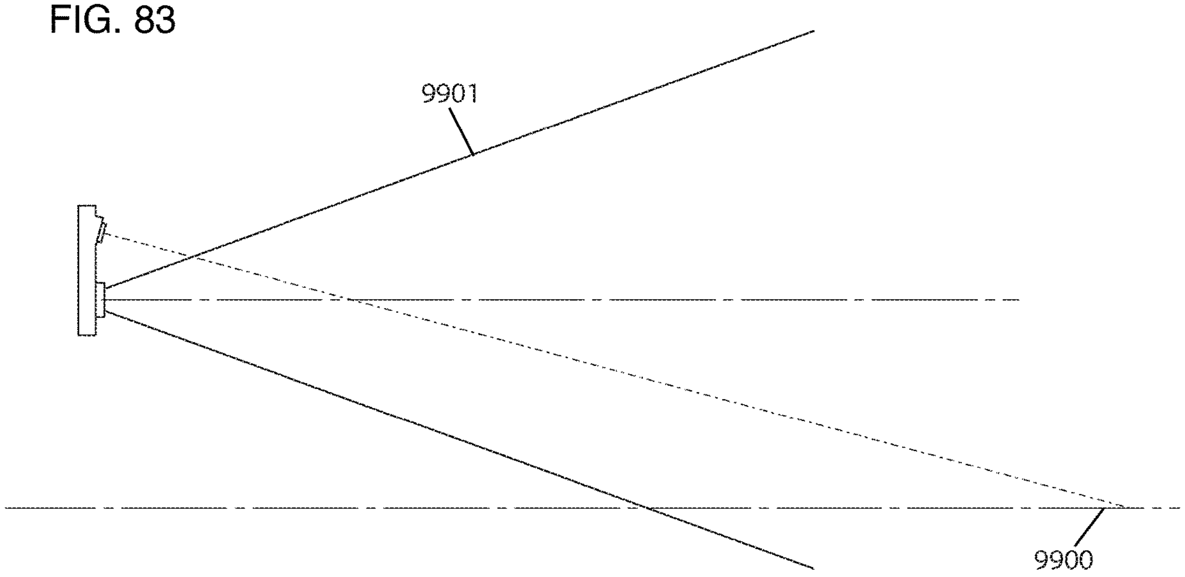
Figure 84:
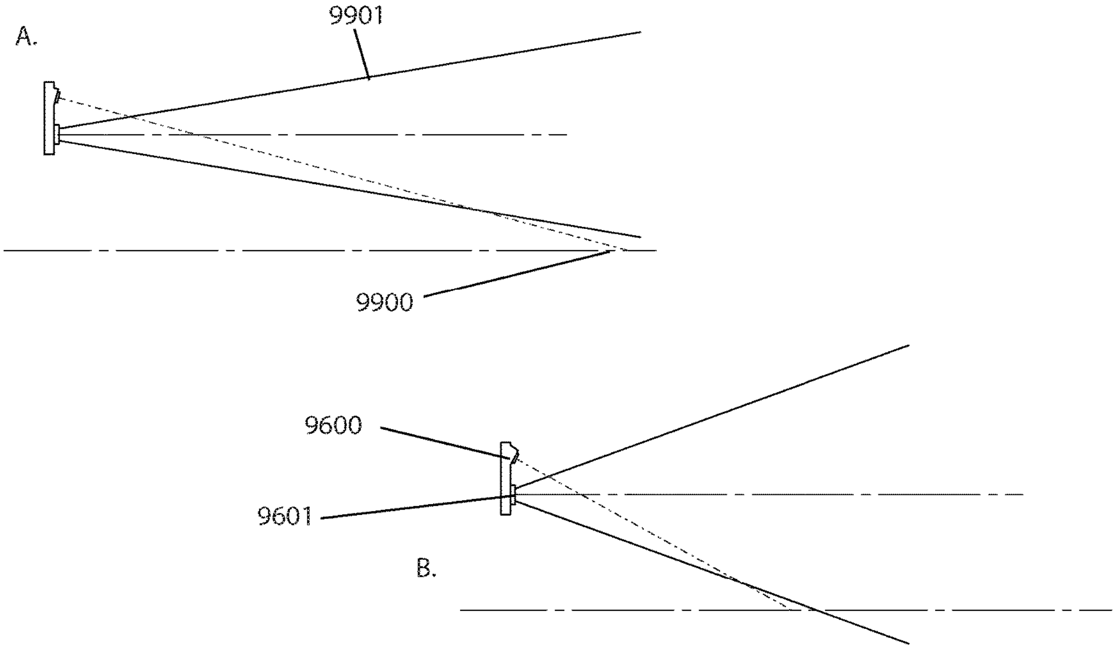

In embodiments, obstacle sensors break a circuit, close a circuit, or send a message to the MCU or the MCU polls the obstacle sensor and reads the information. FIG. 78A illustrates an example of two near range obstacle sensors 9400 disposed on a front portion of a robot 9401 to cover observation in areas 9402 in front of the robot 9401. Each sensor may have one or two image sensors (e.g., cameras) 9403. FIG. 78B illustrates an example of a near range obstacle sensor 9404 disposed on a side portion of the robot 9401 to measure its distance from a wall 9405. FIG. 79 illustrates a robot 9500 with two side brushes 9501 on each side. Both side brushes 9501 may be active at all times and clean walls 9502 depending on the orientation of each side brush 9501 in relation to walls 9502. Having a near range sensor on each side of the robot, such as in FIG. 78B, helps the robot keep a minimum distance from a wall without hitting it during coverage. In some embodiments, a combination of a line laser or a structured light pattern and one or more cameras may be used to detect low height obstacles closer to the robot. In this setup, the line laser is directed towards a floor and projects a line on the floor at a constant distance. The line is captured by one or more cameras, and as long as the line captured in the image is straight, the processor assumes there is no obstacle in an area within a range of the line laser. FIG. 80 illustrates an example of a line laser 9600 and a camera 9601 combined in one module. Note that the line laser 9600 is positioned at an angle relative to the camera 9601 and directed towards a floor. FIG. 81 illustrates a line 9700 projected on a floor 9701 from the line laser 9600 and an image 9702 of the line 9700 captured by the camera 9601. The line 9700 is straight, therefore the processor determines there is no obstacle in area 9703 within a range of the line laser 9600. FIG. 82 illustrates an obstacle 9800 (or a step) entering the area 9702 within the range of the line laser 9600. The image 9801 of the projected line 9700 is broken into segments that appear higher or lower to the camera 9601. (The processor may determine there is an obstacle close by based on the line 9700 no longer being straight. The processor may decide to stop or change a course of the robot to avoid the obstacle 9800. For the camera to capture the line projected onto the floor, the line laser intersection with the floor must fall within the camera FOV. FIG. 83 illustrates the line laser intersection with the floor 9900 within the camera FOV 9901. If the intersection does not fall within the camera FOV, a sharper angle of emission or a camera with a wider FOV may be used. FIG. 84 illustrates (A) the camera FOV 9901 is too narrow to capture the laser line intersection with the floor 9901 and (B) a large angle difference between the camera 9601 and the line laser 9600 resulting in the line laser intersection with the floor 9901 falling behind the camera FOV 9900.

Figure 85:
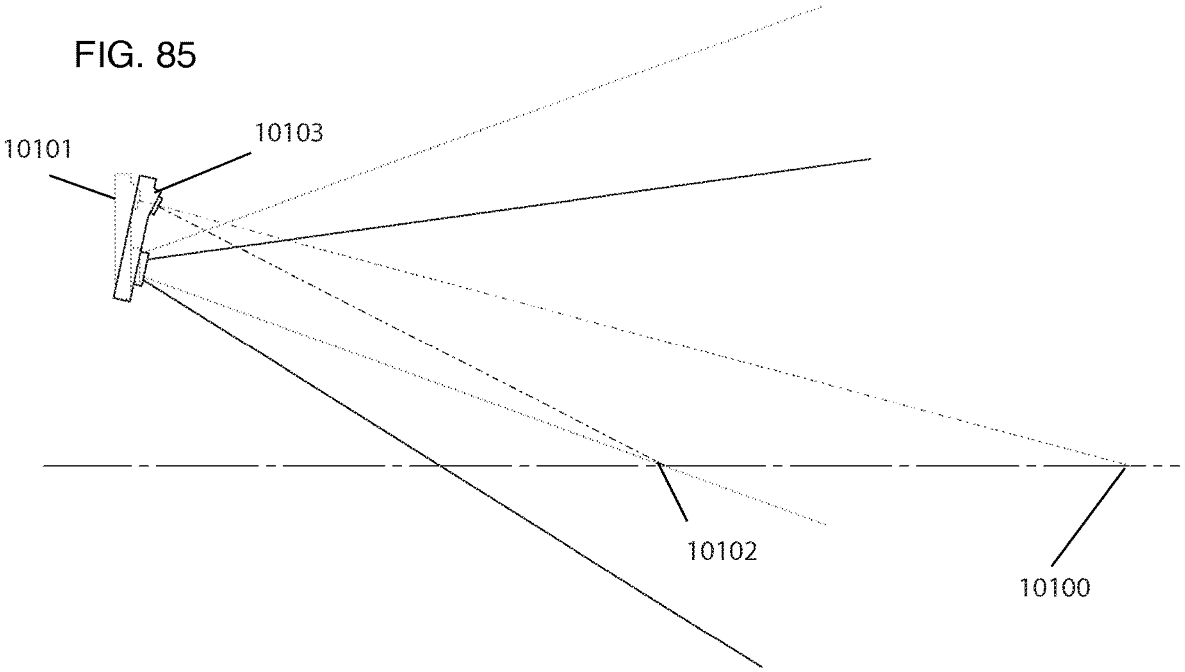
Figure 86:
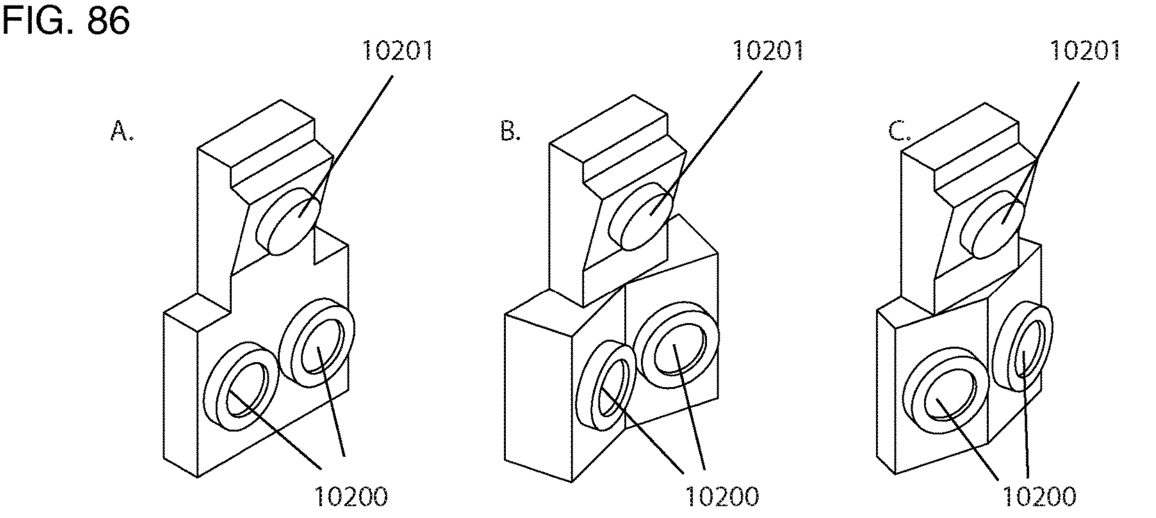
Figure 87:
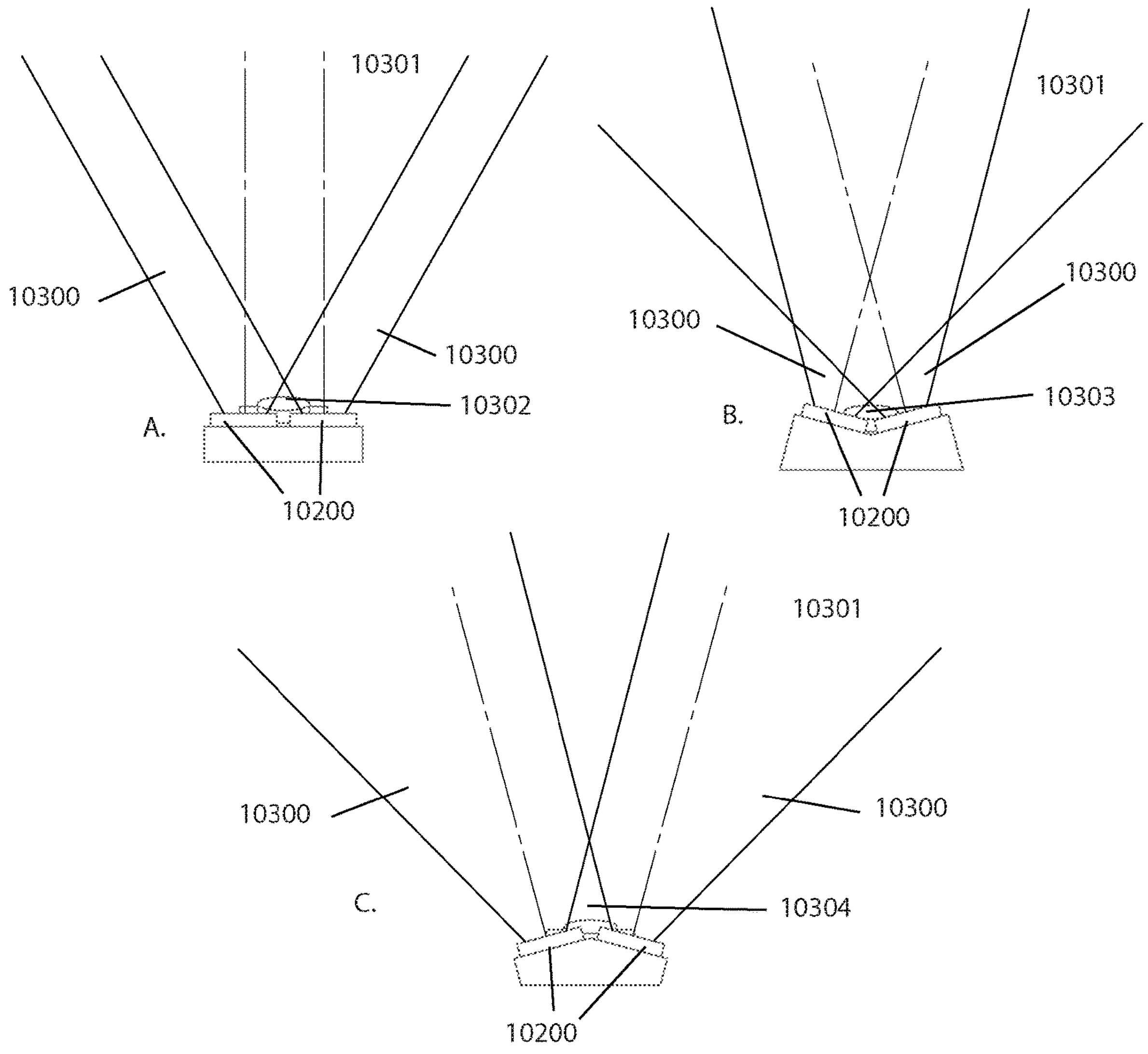

To solve these issues, the camera FOV may be widened such that the line laser intersection with the floor falls within the FOV, however, this may introduce line distortion (mostly towards ends of the line) as wider lenses cause more distortion in the captured image. Or, the angle of the line laser relative to the camera may be adjusted such that the line laser intersection with the floor falls within the FOV, however. this increases a blind spot of the robot in near range as the line laser intersection with the floor is further from the robot. Alternatively, the entire module may be tilted towards the floor to bring the line laser intersection with the floor closer to the robot wherein the camera covers areas of the floor closer to the robot, as illustrated in FIG. 85, wherein the line laser intersection with the floor 10100 of an untilted module 10101 is further from the line laser intersection with the floor 10102 of a tilted module 10103. In some embodiments, two cameras capture a same projected line laser from different angles. Usually, wide angle lenses have more distortion, however, this setup may help increase the FOV of observation by combining the FOVs of two cameras while also reducing the emitted line distortion near the edges of the captured image. FIG. 86 illustrates alternative solutions for covering a wider FOV with less line distortion by using two cameras 10200 with line laser 10201, the two cameras providing a larger combined FOV. The two cameras 10200 may be positioned on the same plane (A) or at an angle in relation to one other (B and C). FIG. 87 illustrates individual FOVs 10300 of cameras 10200 and combined FOVs 10301 of cameras 10200 for modules illustrated in FIG. 86. Assuming the individual FOVs of the cameras remain constant, then for module (A) there is some expansion in the combined FOV given the two cameras are on a same plane, a small blind spot 10302 between the two cameras 10200 that is negligible and a large amount of overlap; for module (B) the combined FOV is narrower for a short distance and wider for further distances given the planes of the two cameras 10200 have less than 180 degrees angle towards each other, a large overlap and an even smaller the blind spot 10303; and for module (C) the combined FOV is larger given the planes of two cameras have greater than 180 degrees angle towards each other, the overlapping area is smaller and the blind spot 10304 is larger but still negligible.

Figure 88:
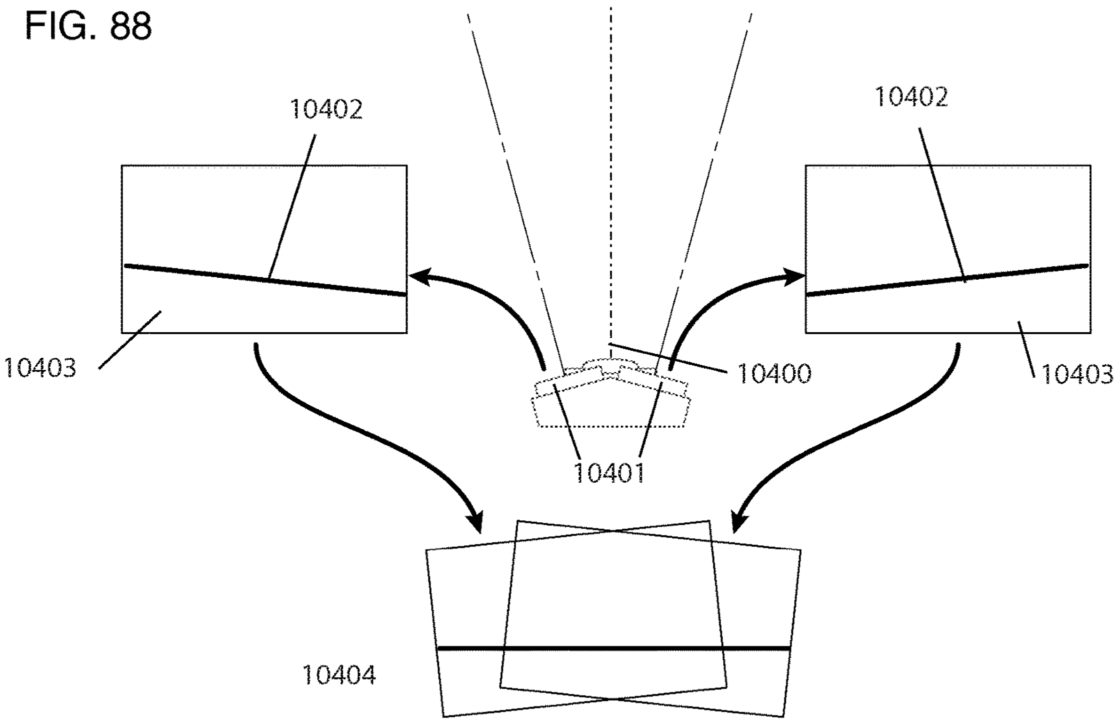
Figure 89:
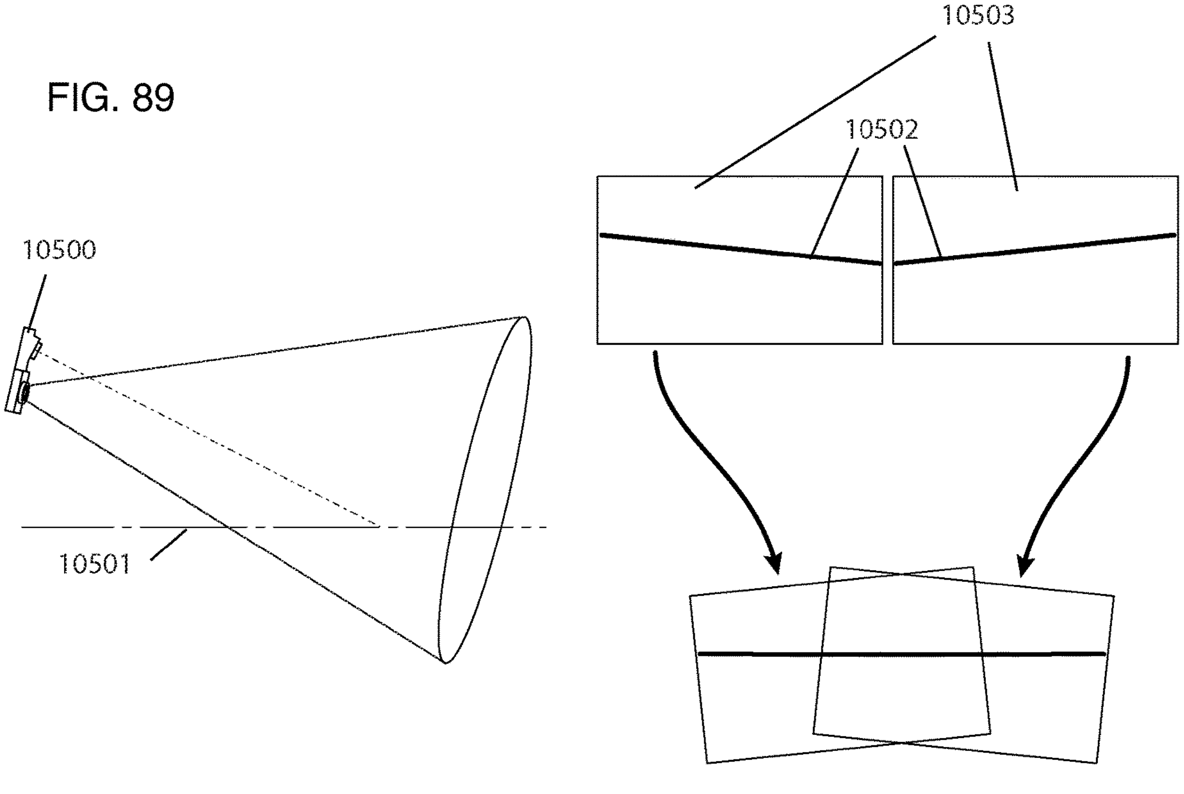

In embodiments, the data captured by each camera is calibrated to compensate for angular deviation, then combined with each other before processing for obstacle detection. FIG. 88 illustrates a bottom view of a line laser 10400 and two cameras 10401. A viewing direction of the cameras 10401 diverge from each other. The projected the line laser 10402 each camera 10401 captures in images 10403 is not perfectly horizontal because the camera viewing direction and the line laser emitting direction are positioned at an angle in relation to one another. The images 10403 captured by each camera 10401 may need to be adjusted before being stitched together 10404. FIG. 89 illustrates a line laser and camera module 10500 tilted towards a floor plane 10501, causing the projected line laser 10502 captured in images 10503 to be positioned higher in relation to a bottom edge of the respective images 10503. The ideal location of the projected line laser is in a middle section of an image as the lens has less distortion and there is room for deviation of the laser line upon encountering an obstacle or a valley.

Figure 90A:
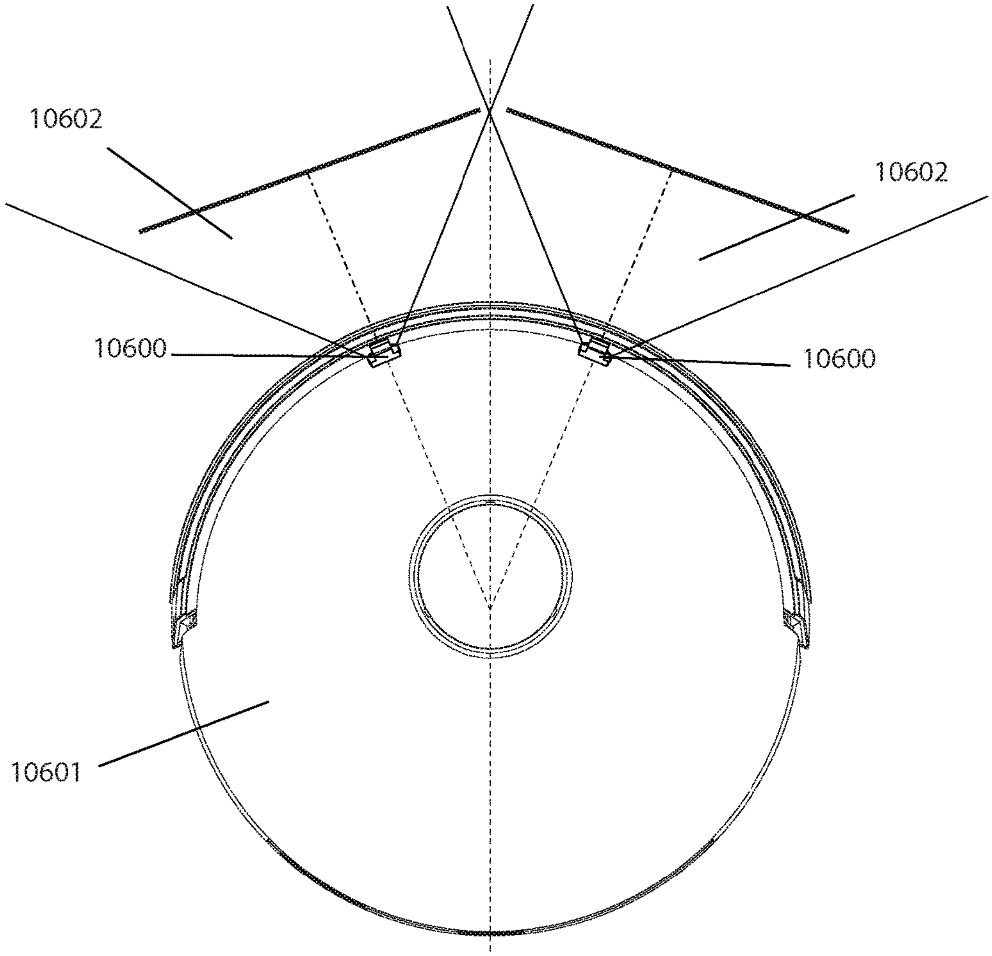
Figure 90B:
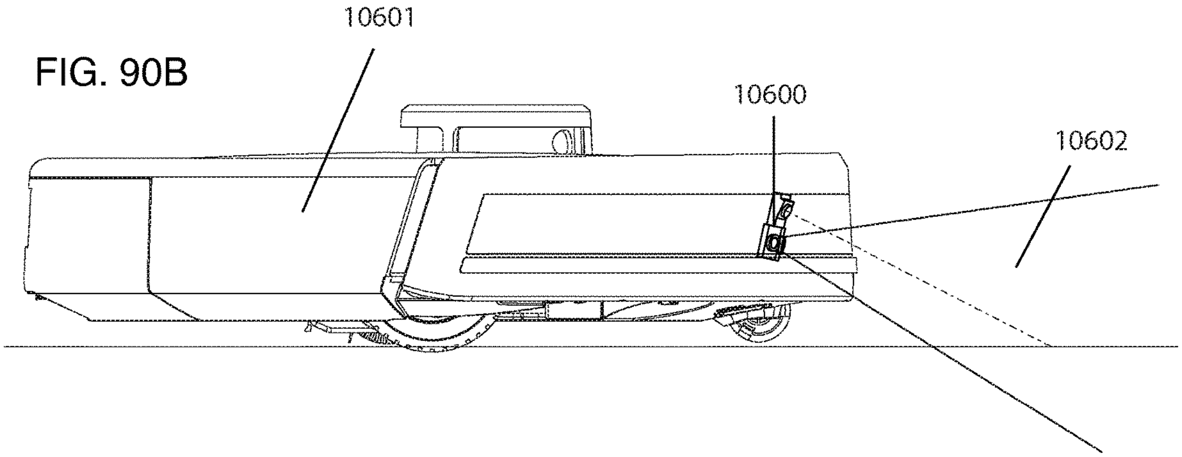
Figure 91A:
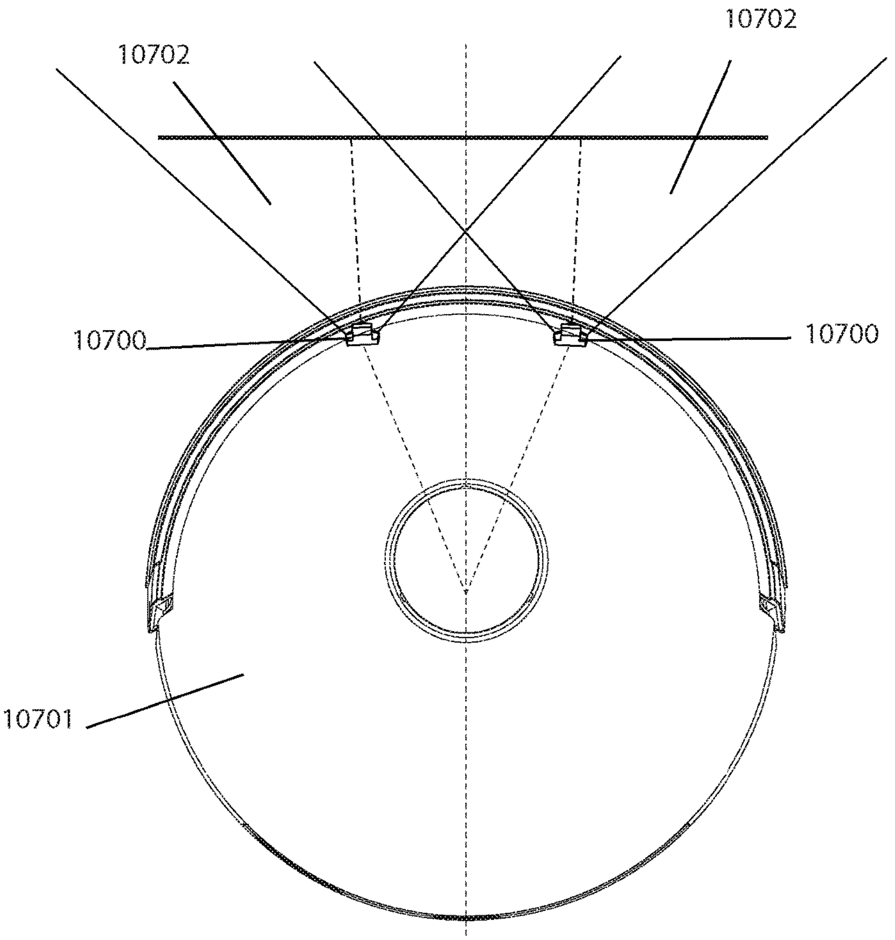
Figure 91B:
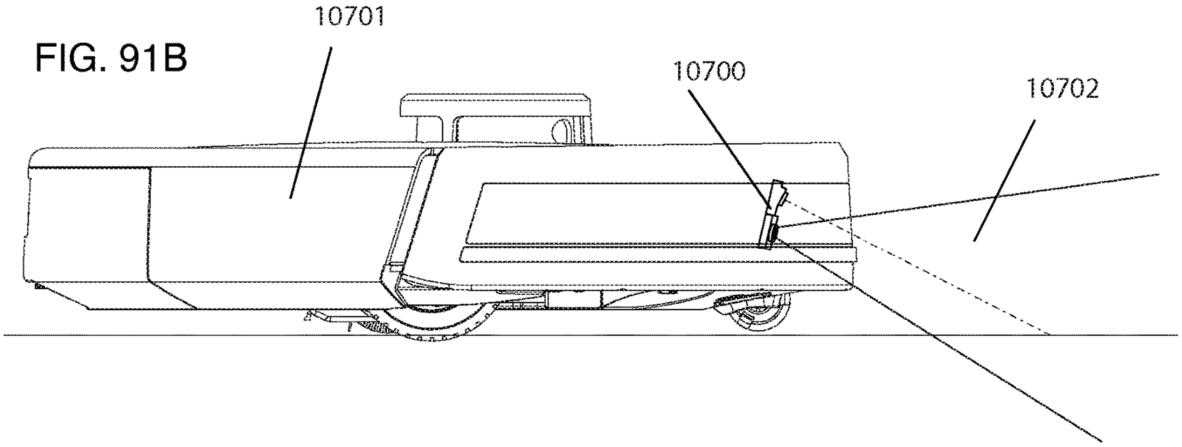
Figure 92:
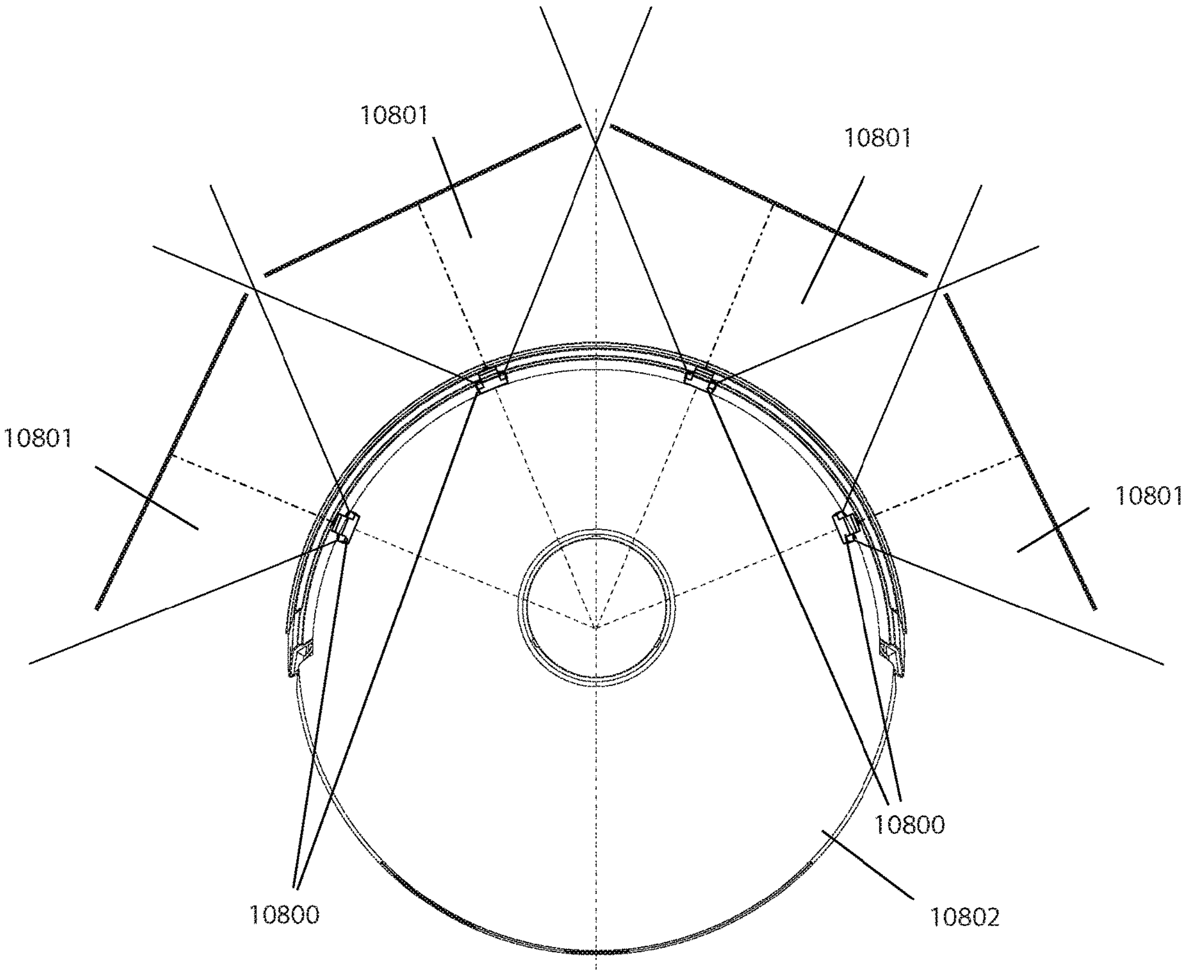
Figure 93:
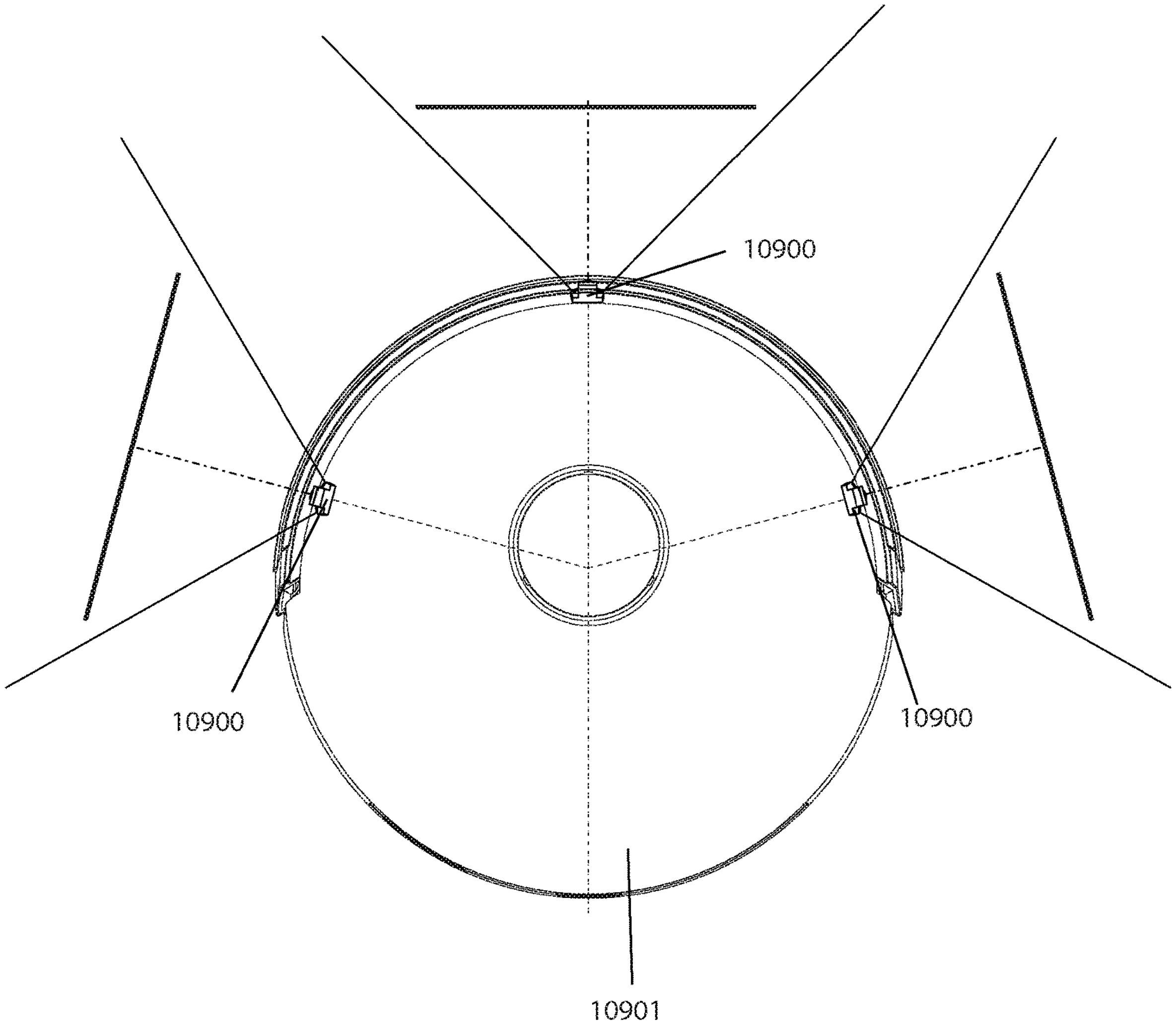
Figure 94A:
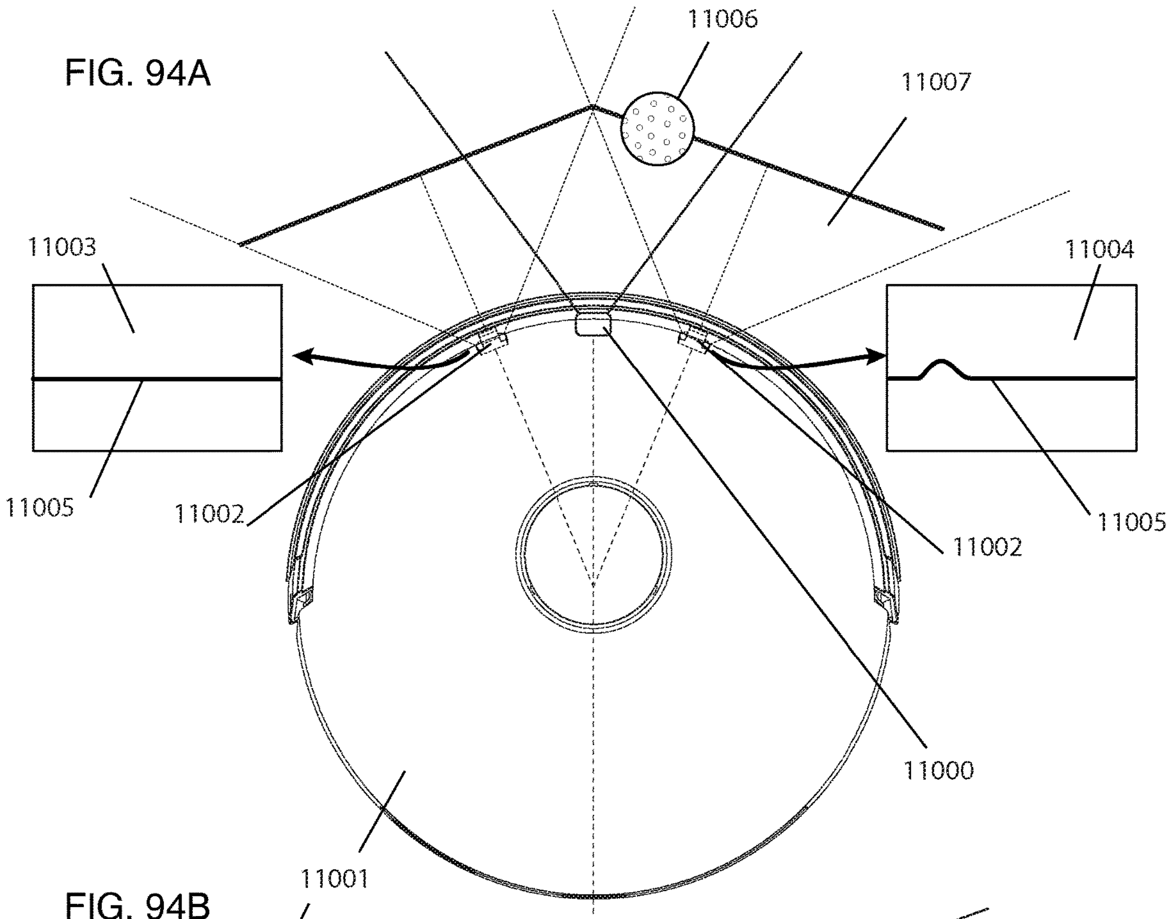
FIGS. 94A and 94B illustrate a camera and a module comprising a line laser and at least one camera.
Figure 94B:
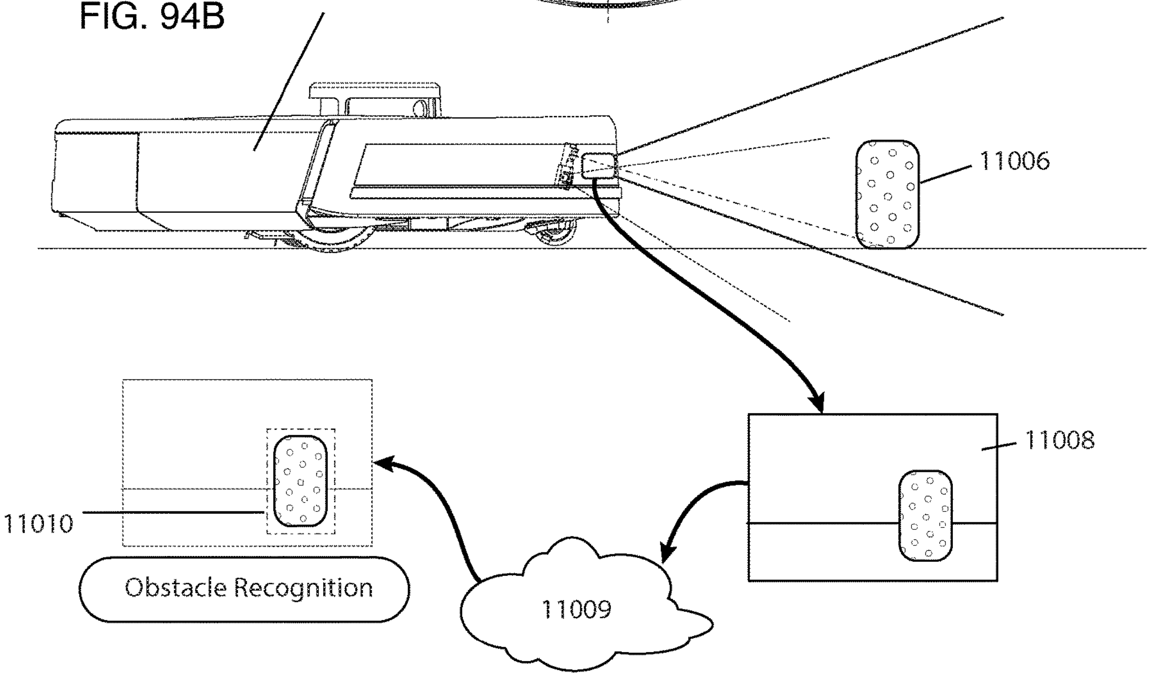

In some embodiments, line laser and camera modules may be disposed along a front perimeter of the robot cover. The camera FOV of each module may overlap with the camera FOV of adjacent modules. The laser of each module may be modified to operate in different frequencies to avoid cross readings between adjacent modules. FIGS. 90A and 90B illustrate a combination of two line laser and camera modules 10600 disposed on a front portion of a robot 10601. The overall laser emitting and camera FOV directions 10602 of the modules 10600 diverge from one another thereby providing a wider FOV. However, the FOV direction of each of the modules 10600 is at an angle in relation to a forward moving direction of the robot 10601. The camera FOVs of the two modules 10600 overlap and the line lasers of each module 10600 are adjusted to have different bandwidths to avoid cross reading. FIGS. 91A and 91B a combination of two line laser and camera modules 10700 disposed on a front portion of a robot 10701. The overall laser emitting and camera FOV directions 10702 of the modules are parallel to each other and a forward moving direction of the robot. However, this setup provides a narrower FOV. FIG. 92 illustrates a combination of four line laser and camera modules 10800 whose FOVs 10801 collectively cover areas in front of a robot 10802 on which they are disposed. Ideally, this setup provides a near range obstacle detecting shield around a front section perimeter of the robot. FIG. 93 illustrates a combination of three line laser and camera modules 10900 disposed on a robot 10901, a module disposed on a front portion, a right side portion and a left side portion of the robot 10901. Upon detecting an obstacle by a camera, another camera disposed on the robot (preferably in a front/center section of the robot) captures a high-quality image of the obstacle and the processor transmits the image to the cloud for image processing and obstacle type detection. FIGS. 94A and 94B illustrate an additional camera 11000 disposed centrally in a front section of a robot 11001 in addition to two line laser and camera modules 11002. FIG. 94A illustrates images 11003 and 11004 of projected laser lines 11005 captured by cameras of the modules 11002. The line 11006 is distorted in the image 11004 due to an obstacle 11006 positioned within a FOV 11007 of the respective camera. FIG. 94B illustrates, upon a processor of the robot 11001 sensing the obstacle 11006 using any or both of the modules 11002, the camera 11000 capturing a high-resolution image 11008 of the obstacle 11006 that is transmitted to the cloud 11009 for further image processing and obstacle recognition 11010. The images captured by modules 11002 may be transmitted to the cloud as well. The line distortion in the images captured by modules 11002 may indicate a location of the obstacle 11006 within the image 11008. Based on the location, only a portion of image 11008 is processed as opposed to the entire image 11008. In some embodiments, the processor executes object classification using neural networks to classify objects captured in images of the environment. In some embodiments, the robot comprises an obstacle avoidance system comprising an array of photon detectors arranged on a single silicon chip that capture spatial information of the environment. In some embodiments, spatial information is captured passively and comprises natural light reflected off of the surroundings and objects. In some embodiments, the spatial information captured includes light that is emitted bounces back.

In some embodiments, the processor of the robot performs fine calibrations upon the robot beginning navigation within the workplace or during a work session. For example, the processor identifies and analyzes disagreements in data collected by different sensors or a same sensor. For instance, a LIDAR sensor may receive bouncing signals from a highly reflective surface (e.g., glass or mirror), causing phantom obstacles to emerge or two sets of perimeter points, a closer point cloud and a further point cloud. The calibration mechanism identifies mismatch in data and filters unrealistic readings. For example, when two sets of perimeter points appear, the processor of the robot observes the perimeter from a different location of the robot or the robot moves closer towards the two sets of perimeter points and existence of the true perimeter is checked using short range sensors or a bumper disposed on the robot. If a location of the set of perimeter points closest to the robot does not coincide with the short range sensor readings or activate the bumper, the processor assumes the set of perimeter points furthest from the robot represent the true perimeter. In some cases, checks an existence and location of the set of perimeter points furthest from the robot using similar methods. In some embodiments, the robot drives along a path configured in a pattern or shape, such as a square, and the processor compares displacement sensor data with displacement of the robot within a map. For example, an OTS sensor disposed on the robot measures one meter of displacement. The processor determines movement of the robot based on the set of perimeter points furthest from the robot is two meters and movement of the robot based on the set of perimeter points closest to the robot is one meter. As such, the processor assumes the perimeter point cloud closest to the robot represent the true perimeter and the perimeter point cloud furthest from the robot is a phantom wall.

Figure 95:
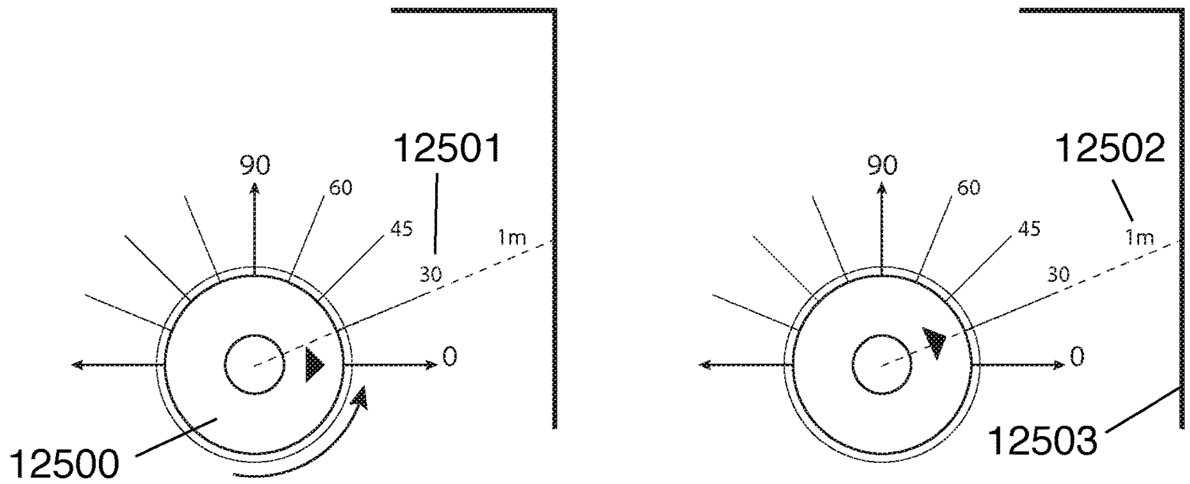
FIGS. 95 and 96 illustrate an example of calibration of a sensor.
Figure 96:
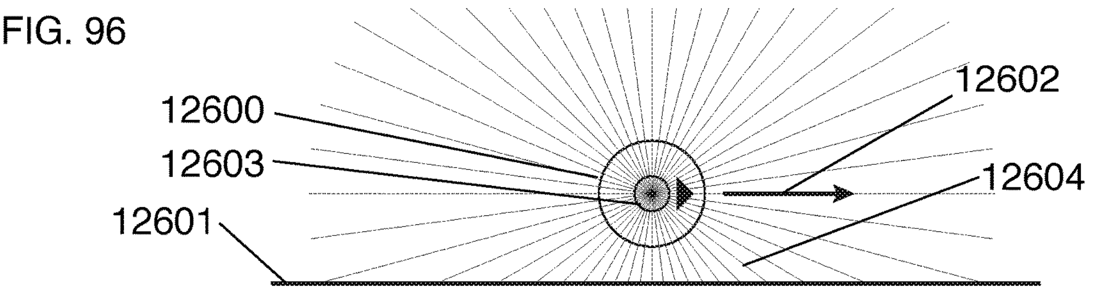

In some embodiments, the robot executes a 360 degrees turn at a beginning of a work session, during times of uncertainty, upon entrance into a logical area unit, or before exiting a logical area unit. The processor compares a distance reading to a perimeter at each consecutive angular increment. A wall positioned a distance from the robot must measure substantially a same distance at each angular increment and from any angle. Executing the 360 degrees turn and performing such a check reaffirms alignment of a point cloud and the map readings are deemed of higher confidence value. FIG. 95 illustrates a robot 12500 rotating to a next angular increment 12501, in this case 30 degrees, and measuring a distance 12502 of one meter to wall 12503. The distance 12502 of one meter must measure approximately the same distance 12502 of one meter regardless of the angle from which the wall 12503 is measured. A similar form of calibration may be performed as the robot drive along a path parallel to a wall. FIG. 96 illustrates the robot 12600 driving along a path parallel to a wall 12601 in a direction 12602 while a LIDAR sensor 12603 disposed on the robot 12600 rotates and measures a distance 12604 to the wall 12601, which must remain substantially the same regardless of the angle from which the distance 12604 is measured.

In some embodiments, the robot selects a specific feature (e.g., wall or corner) to calibrate against. For instance, one type of sensor confirms a presence of a feature (e.g., wall or corner) and a second type of sensor validates the presence of the feature. In some embodiments, calibration is based on a comparison between an image and a 3D depth cloud. In some embodiments, calibration is based on a comparison between a 2D planar depth reading and images. In some embodiments, calibration is based on a comparison between stereo images and a 3D point cloud. In some embodiments, calibration is based on a camera and a light source. In some embodiments, the calibration encompasses alignment of a portion of an image comprising the point of interest (e.g., an object) with a depth point cloud such that correct pixels of the image align with correct depth values of the depth point cloud. In some embodiments, the point of interest is deemed a point of attention. In some embodiments, the point of interest is limited with a bounding box or bounding volume. In some embodiments, an object of interest is assigned a location of $\{(x_1 \text{ to } x_2), (y_1 \text{ to } y_2), (z_1 \text{ to } z_2)\}$ in a coordinate system where $x_2$-$x_1$ is a length of the object, $y_2$-$y_1$ is a height of the object, and $z_2$-$z_1$ is a depth of the object. In some embodiments, $x_2$-$x_1$ is a length of a bounding box, $y_2$-$y_1$ is a height of the bounding box, and $z_2$-$z_1$ is a depth of the bounding box. In some embodiments, the object or the bounding box is associated with a direction in a frame of reference that defines the yaw, pitch, and roll of the object with respect to a volumetric frame of reference. In some embodiments, a volume of the object is defined at its location in a frame of reference, wherein a volumetric radius is drawn from a center of the object to define a boundary of the object. In some embodiments, a central point is extended to (+x, −x), (+y, −y), and (+z, −z) to define a boundary of the object. In some embodiments, a right, a left, a top, a bottom, a top right, a top left, a bottom right, a bottom left, etc. is assigned as a point from which a boundary extends in an x, y, or z direction to define the boundary of the object. In some embodiments, a bounding volume is stretched in a direction of movement. In some embodiments, the bounding box or volume is behind partial or fully occluding objects.

Figure 97:
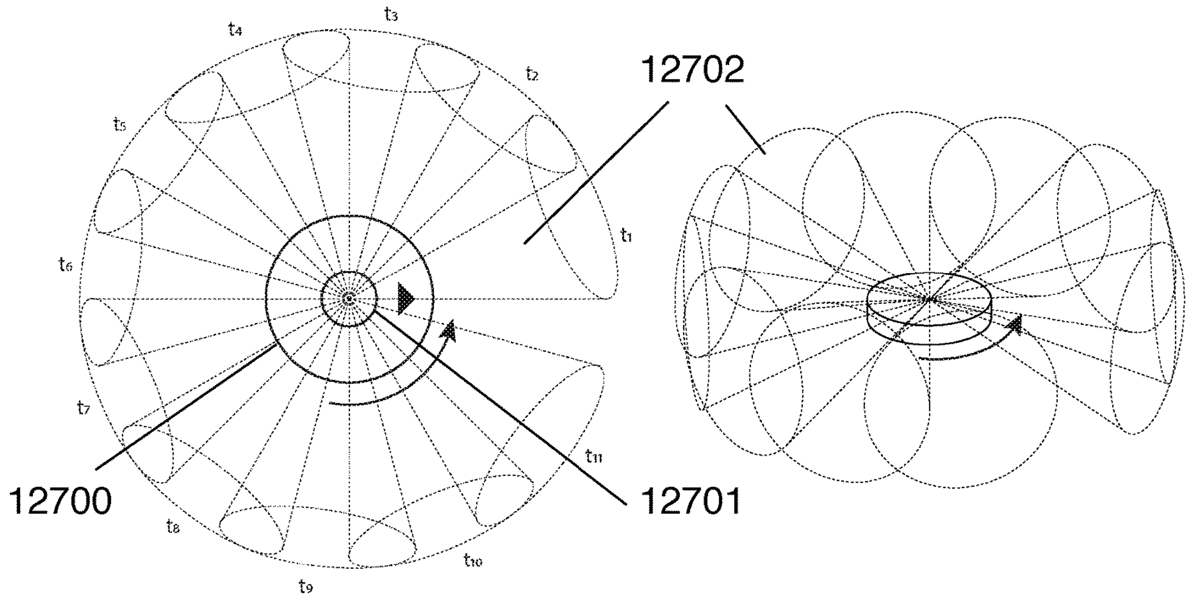
FIG. 97 illustrates an example of a constructing a frame of reference.
Figure 98:
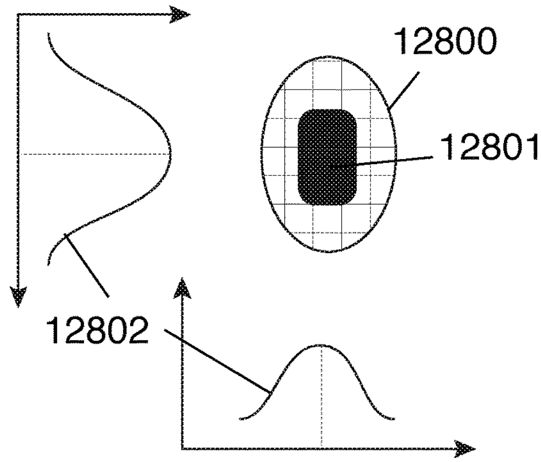
FIG. 98 illustrates an example of a bounding volume of an object.

In embodiments with limited field of view of sensors of the robot, a frame of reference is constructed in multiple time steps. For example, a robot comprising sensors with a 45 degrees 3D field of view requires multiple time steps to construct a frame of reference. FIG. 97 illustrates an example of a robot 12700 comprising a LIDAR sensor 12701 with a limited field of view 12702, as such a frame of reference is constructed over time steps t1 to t11. In some embodiments, a bounding volume is used to visualize an obstacle. FIG. 98 illustrates a bounding volume 12800 surrounding object 12801 with an uncertainty cloud including mean and variance 12802. The bounding volume inflates or deflates depending on a confidence score of the identified object 12800. In embodiments, inflation or deflation is determined using naïve methods or MDP (i.e., reinforcement learning).

In some embodiments, the input data of a neural network comprises spatial correlation with objects in a surrounding environment. In some embodiments, each dimension in a layer is associated with a dimension in the input. In some embodiments, the input data comprises an image or a stream of images. In some embodiments, width and height dimensions may correlate to 2D features of an image. In some embodiments, width, height, and depth dimensions may correlate to 2D features and depth of a depth image. In some embodiments, an area of an image comprising an object of interest is identified and analyzed to determine a likelihood of a presence of the object based on probability scores of the object belonging to various categories or classes of objects. In simulation tools, a boundary box may be used to determine a perimeter of a detected object. In some embodiments, the system is designed to reduce computational cost of detection of objects with no loss of accuracy. In some embodiments, an early determination is made as to whether processing a portion of a high-resolution image is likely to return a spent value.

In some embodiments, network output is based on training and is not hard coded by a human written algorithm. In some embodiments, training is executed on a hardware separate from a hardware implemented in the robot. In some embodiments, a network design is the same for a network executed on the training hardware and the robot hardware. In some embodiments, design of a network layer and their logical operations does not necessitate a separation of hardware or software along logical separations. In some embodiments, training input data comprises examples labeled by a human or an algorithm that automatically generates labeled data or both. In some embodiments, training input data comprises 2D images captured by a camera or depth information captured by a 3D or 2D LIDAR or depth camera. In some embodiments, classification may be executed for 2D images captured by a camera or for 3D or 2D depth data captured by a LIDAR or depth camera. In some embodiments, classification may be executed for images captured by a camera or for 3D or 2D depth data captured by a LIDAR or depth camera, separately or in combination.

In some embodiments, initial processing uses lower resolution to quickly determine if further high-resolution processing is required. This decision may be made in real-time. In some embodiments, upon determining a probability exceeding a threshold that an object of interest is identified in the input data, further processing is executed to return a more accurate prediction. In some embodiments, after initial processing, unnecessary input data is pruned and is not further processed to provide faster processing of select input data. Processing of the select data may occur in real-time. In some embodiments, low accuracy processing requiring lower computational budget is carried out on a wider group of inputs while high accuracy processing requiring higher computational budget is carried out on a select group of inputs. In some embodiments, separation of inputs into high and low computational budgets permits real-time processing of both. In some embodiments, training input data comprises an image with a label of an object within the image, a label of an object within the image and a bounding box defining an area of the image within which the object appears, multiple labels of multiple objects within the image, multiple labels of multiple objects each with a bounding box, or a selection of labels of objects within a bounding box. In some embodiments, training input data comprises multiple channels, one for each color and/or one for grayscale color. In some embodiments, training the network using labeled examples occurs over a series of runs, wherein during each run at least backpropagation is used to decide proper values for parameters. In some embodiments, the final values for parameters are used as a reference model to predict labels and bounding boxes for objects detected in new input data.

In some embodiments, regions in an image corresponds to regions in a spatial proximity of the robot. In some embodiments, a 2D image is illuminated using one of a light, an IR sensor, and a laser, to provide depth information. In some embodiments, the illumination may occur during alternating time slots and/or for alternating images. In some embodiments, a 2D image may include multiple channels, such as R, G, B, depth, and grayscale. In some embodiments, a machine learning network is applied to each of the channels individually, acting as a subsystem, the results of which are combined at the end. In some embodiments, the network may be applied to a combination of channels. In some embodiments, the network may be applied to a group of RGB or greyscale channels as a subsystem and separately applied to depth, the results of which are combined in weighted manner. In some embodiments, illumination on a 2D image may be achieved by a LIDAR that measures depth. In some embodiments, the LIDAR provides depth information that is fed into a separate network of computational nodes independent of a network that receives 2D images as input. In some embodiments, the results obtained from each of the networks independently provides probabilities of existence of an object within a near field or far field vicinity of the robot.

In some embodiments, a first subsystem network validates a result of a second subsystem network to provide a highly reliable system. In some embodiments, a LIDAR projects active illumination, a reflection of which is received by its receiver for depth measurement. In some embodiments, the illumination is simultaneously captured by a 2D camera, the illumination falling within a FOV of the camera and the receiver of the LIDAR. In some embodiments, a neural network of nodes generates a probability score indicating a likelihood that a region in an image includes an object belonging to a category or class of object present in the surroundings of the robot. In some embodiments, objects detected in the surroundings of the robot are stationary or dynamic in nature. In some embodiments, possible trajectories, speed, and direction of movement of dynamic objects are scored to predict their location in a next time slot. A dynamic object may be a pet, a human, a battery powered or unpowered vehicle, or another self-moving object. In some embodiments, probability scores are determined based on training examples rather than pre-coded algorithms. In some embodiments, probability scores obtained based on training examples are used for formulating navigation decisions of the robot. In some embodiments, probability scores and corresponding categorization are transmitted to a remote control center where human assistance is provided to help in making more complicated decisions. In some embodiments, probability scores may be communicated to a user (e.g., driver of a vehicle) via a light, sound, LCD display, or another method. In some embodiments, active illumination sensing is comprised of measuring any of a distance, a turnaround time, a direction, an intensity, and a phase shift reflected from a surface on which an illumination signal is projected.

Figure 99:
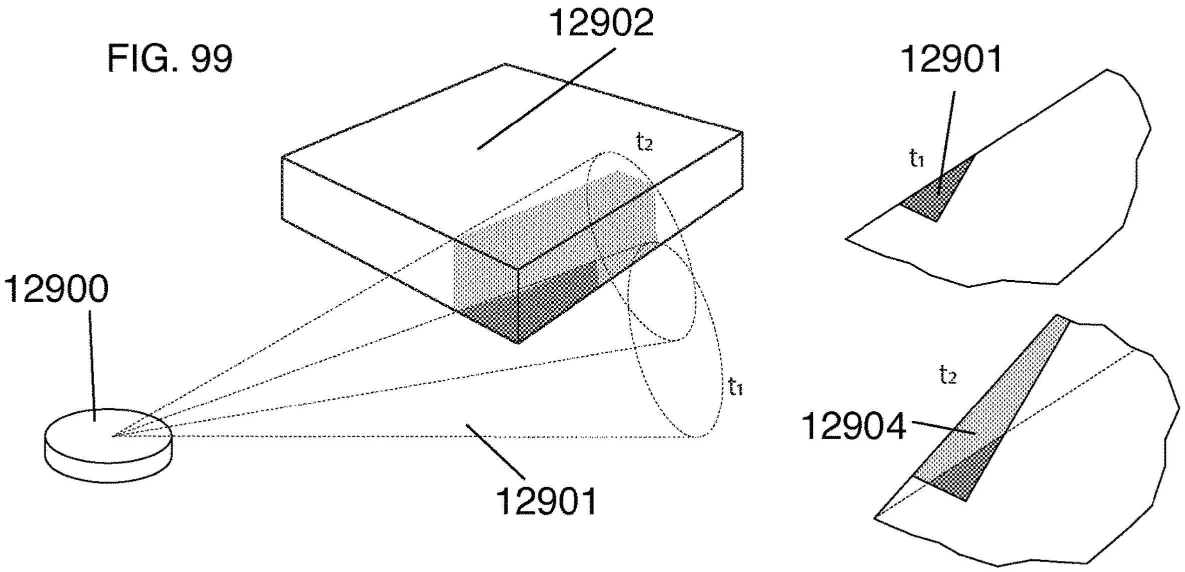
FIG. 99 illustrates an example of a robot including a sensor with a limited field of view.

In some embodiments, as a map is constructed, object bounding boxes emerge and complete over multiple time steps or sensor scans. FIG. 99 illustrates an example of a robot 12900 comprising a LIDAR sensor with a limited field of view 12901. As such, an object bounding box of object 12902 emerges and is completed over multiple time steps t1, t2, and so on. Portions 12903 and 12904 of object 12903 are observed over time steps t1 and t2, respectively. Concurrently, as the processor builds the map, the processor of the robot localizes the robot, the object of interest solidifies, and more characteristics of the object are discovered. Examples of characteristics include size and a distance from the robot and/or relation to a frame of reference of the workspace and/or a logical area unit as a subset of the workspace. As more areas are observed, the object becomes better defined, wherein probabilities of its size, distance, and nature (i.e., an object type of the object) converge to more solid estimations (i.e., estimations with greater confidence). At some point, the object of interest is classified with reasonable accuracy. Similarly, as sensors of the robot scan more areas of the environment, more boundaries and objects within the boundaries are discovered and logical area units (e.g., rooms) are identified. A probability of an area being a logical area unit increases and decreases as a shape of the room (i.e., its borders) are identified and change until a convergence is reached, wherein parameters solidify and a classification or identification of the area is determined.

Figure 100:
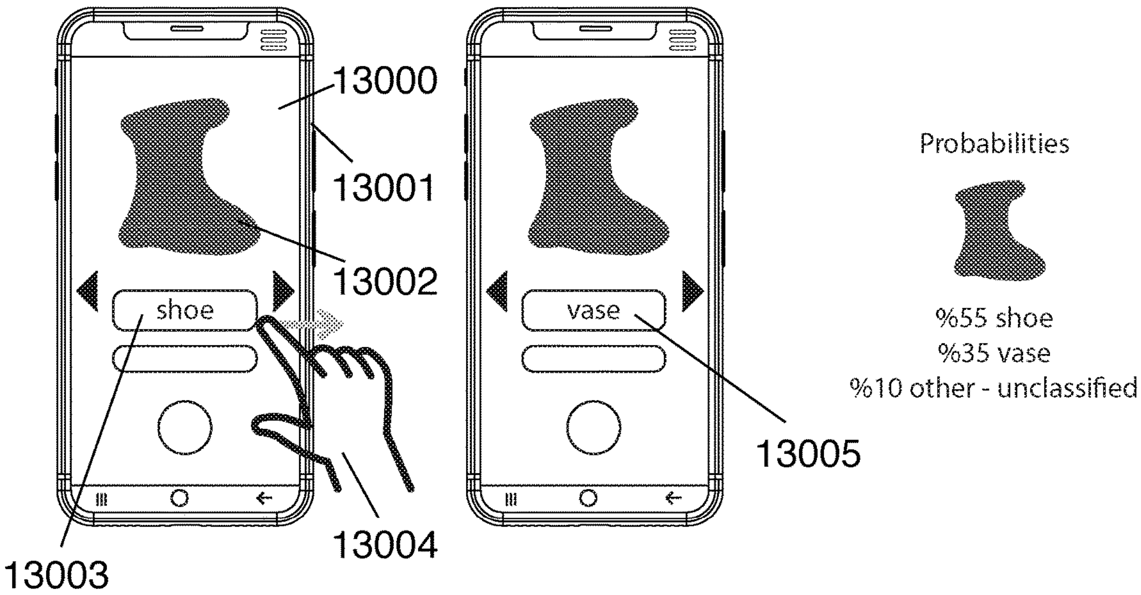
FIG. 100 illustrates an application of a communication device displaying a predicted object type.
Figure 101:
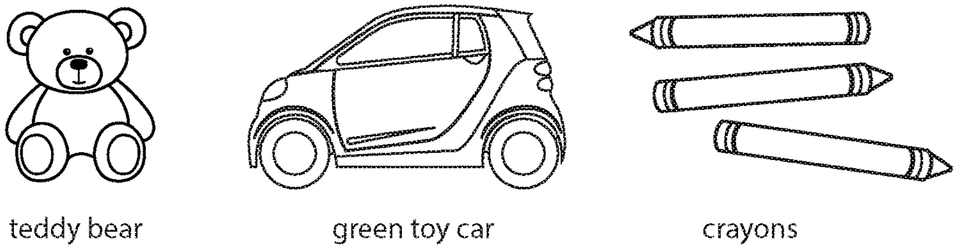
FIGS. 101-103 illustrate toys found in a home and a robot response upon identifying the toys.
Figure 102:
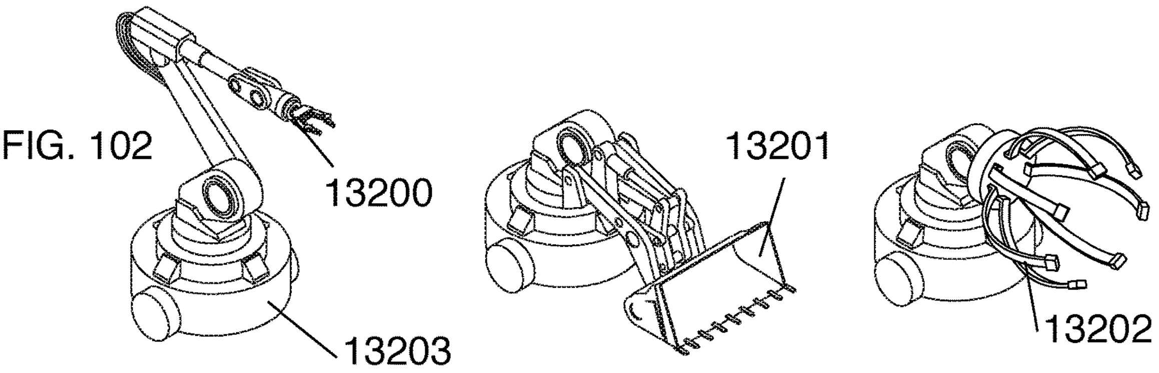
Figure 103:
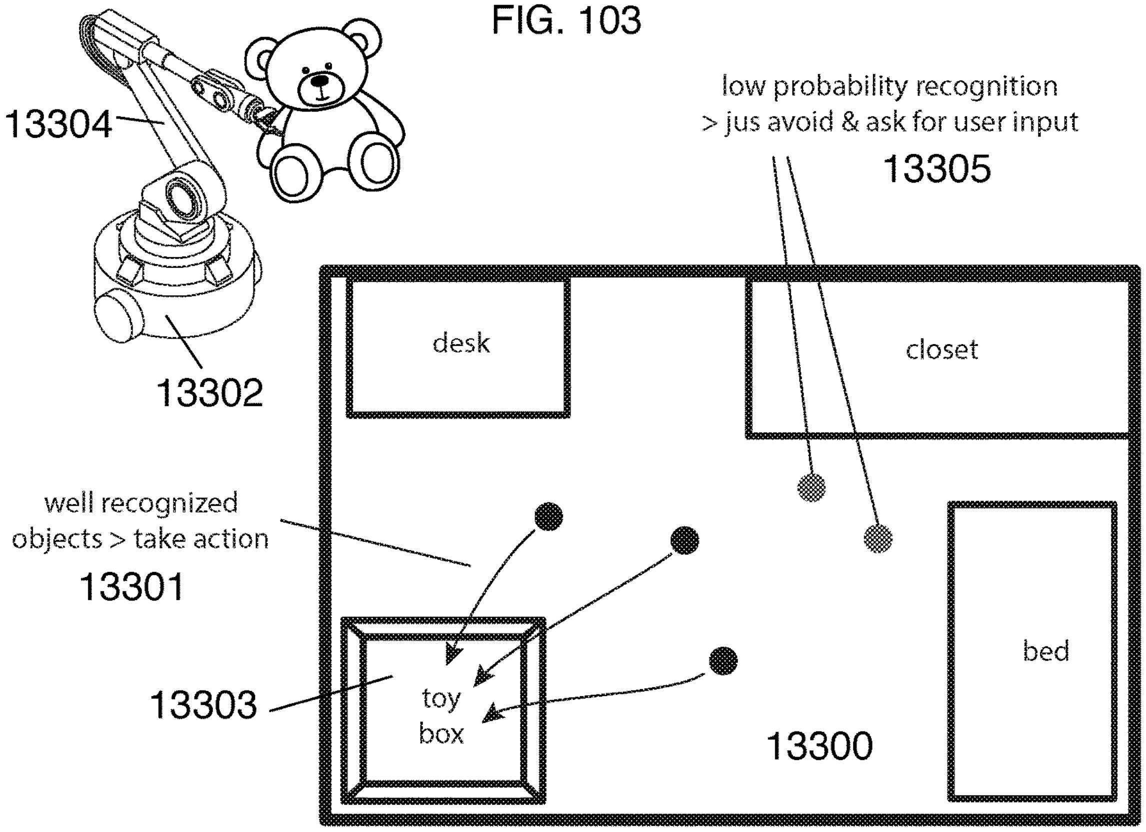

Upon completion of a map or a first work session, rooms or objects discovered including their proposed labeling are presented to a user using an application of a communication device paired with the robot. The user uses the application to accept or reject the proposed labeling by, for example, swiping right or left or using another gesture on the screen of the communication device or by providing another form of user input. This helps train the algorithm to properly label areas and objects. Some embodiments use training methods. For example, upon the user swiping left to reject room assignments, the application or the processor of the robot re-attempts to identify logical unit areas such as rooms, hallways, etc. and proposes new room assignments. However, upon the user swiping right to accept room assignments, the algorithm reinforces the learning mechanism for future classifications. In another example, the application proposes labeling a discovered object as a shoe. Upon swiping right to indicate a correct classification, the label-object pair is provided as input to the ML or DNN algorithm and the reinforcement is used in improving future classifications. However, upon swiping left to indicate an incorrect classification, the label is removed from the object and is recognized as a misclassification. The information is provided as input to the ML or DNN algorithm to improve future classifications. In some embodiments, another label for the object is proposed to the user using the application based on a next best prediction of an object type of the object. For example, FIG. 100 illustrates an application 13000 of a communication device 13001 displaying an object 13002 and a shoe 13003 as the predicted object type. A user 13004 swipes right indicating a misclassification and the application 13000 displays a vase 13005 as the next most probable object type. The algorithm determines there is a 55% chance the object is a shoe, 35% chance the object is a vase, and 10% chance the object has an unknown classification. When an object type of an object is identified an action is assigned to the object. In some embodiments, a default action assigned to an object type comprises adjusting a path of the robot to avoid the object. In an environment, such as a house, where a same object repetitively appears due to a domain of possibilities being finite, the processor of the robot develops a good sense for recognizing particular objects. In some embodiments, the robot uses manipulation capabilities (e.g., robotic arms) to handle an object type in a particular way. For example, the processor of the robot actuates the robot to pick up toys spread on a floor of a child's room and put them in a toy box. FIG. 101 illustrates an example of toys that may be found in a bedroom or other room in a house. FIG. 102 illustrates components 13200, 13201, and 13202 attached to a robot 13203 that may be used to pick up objects. Robotic arm 13200 includes pincers that picks up objects. Robotic arm 13201 includes a bucket for scooping up objects. Robotic arm 13202 includes a claw for grasping objects. FIG. 103 illustrates a child's bedroom 13300 including objects 13301 that are identified as a toy with a high probability, as such a robot 13302 performs an associated action, in this case placing the objects 13301 within toy box 13303 using robotic arm 13304. Objects 13305 are identified as an object type with low probability of being correct, as such the robot 13302 avoids contact with the objects 13304. A camera disposed on the robot 13302 captures an image of the objects 13305 and an application of a communication device paired with the robot 13302 displays the image such that the user may identify the object.

Figure 104:
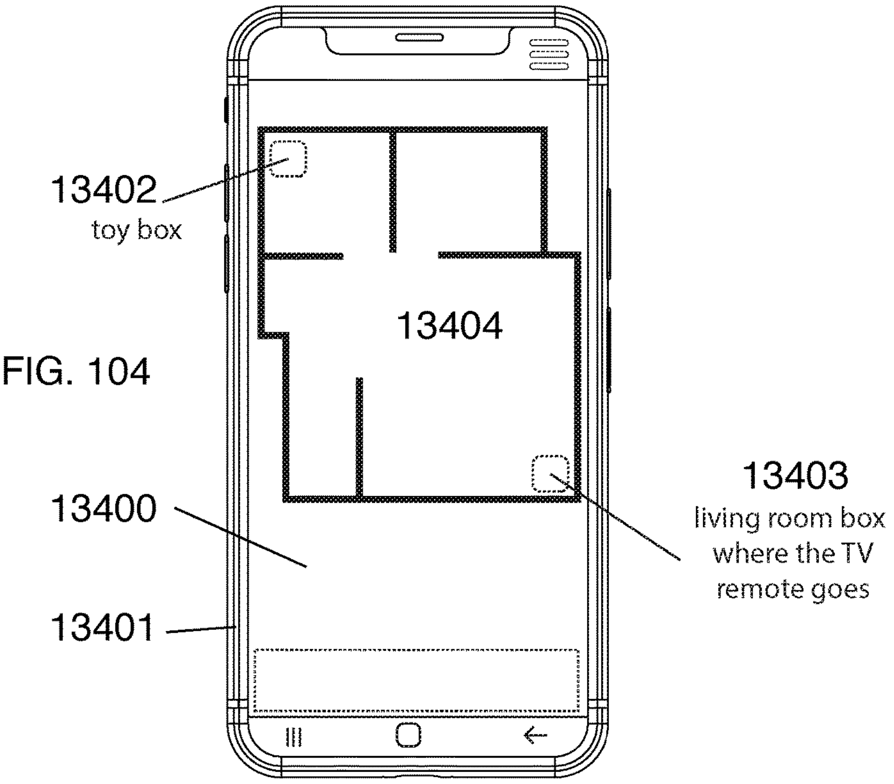
FIG. 104 illustrates an application of a communication device displaying a location of a toy box and living room in a map.
Figure 105:
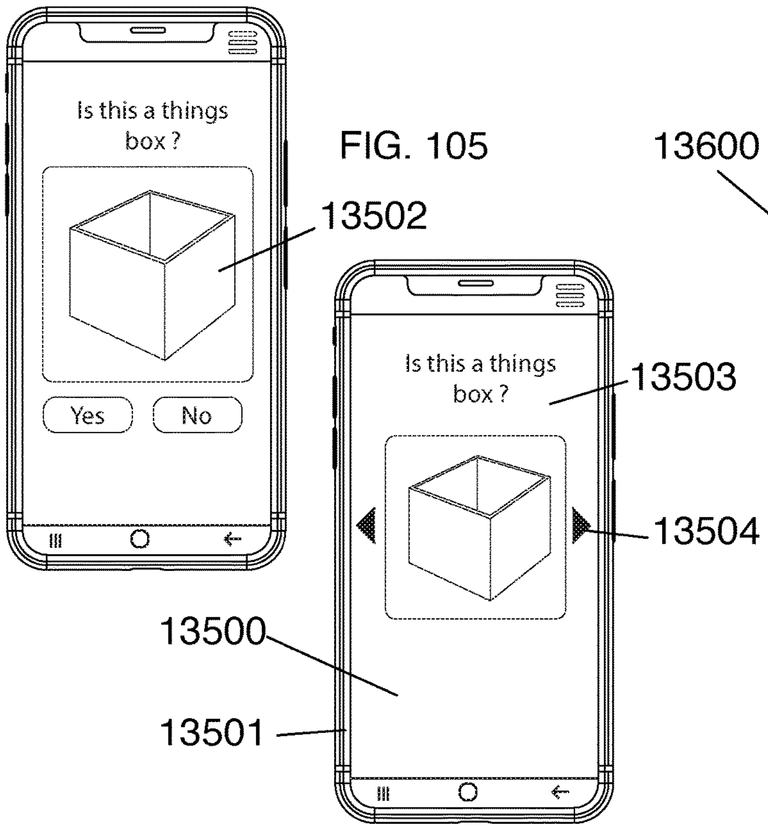
FIG. 105 illustrates an application of a communication device displaying an object and awaiting user input.

In some embodiments, an action associated with an identified object is rule based and is defined in advance or by example. For instance, during or after a work session run images of objects are shown to the user using the application and the user assigns a task associated with each object. Or, in some instances, the robot plays a sound track that verbally notifies the user of an object being detected and the user verbally responds by commanding the robot to, for example, pick up the object and place it in the toy box. In some embodiments, a voice command is translated to text using algorithms performing speech to text using natural language processing (NLP) to extract the text and an associated meaning or desired action and translate it to a command that is provided to the robot. In some embodiments, the robot provides context when verbally notifying the user of an object being detected. For example, the robot may verbally announce teddy bear detected or what to do with Ted or green toy car detected or green ford fusion detected. As such, the user may provide a more verbally targeted command given more information of the object is known, such as put the object in the toy box or put the object in the living room box, wherein each of the toy box and living room box were previously identified on the application. FIG. 104 illustrates an application 13400 of a communication device 13401 paired with the robot displaying a location of a toy box 13402 and living room box 13403 within a map 13404 of the environment of the robot. In some embodiments, an object, for example a toy box or another type of storage box, is automatically detected by the robot. In a simplest implementation, a QR code helps the robot identify the object, wherein a scanner disposed on the robot identifies the object upon scanning a QR code associated with the object. In another embodiment, the robot recognizes accessories (e.g., storage box such as a toy box or things box) that are sold with or separately from the robot from a same manufacturer of the robot or another manufacturer that designs accessories compatible with the robot. In some embodiments, the robot recognizes a particular object, such as a storage box, based on its shape and dimensions and the items within the storage box. In some embodiments, an image of a particular object is displayed by the application and the user confirms an identification of the particular object. For example, FIG. 105 illustrates an application 13500 of a communication device 13501 displaying an image of object 13502 and awaiting input from a user to confirm whether the object 13502 is a things box. In one instance, the user responds by selecting yes or no 13503 or in another instance, the user responds by swiping left or right 13504 to indicate yes or no. In some embodiments, the robot verbally asks the user in a voice format using text to speech whether the object is a particular accessory, such as a things box. The user verbally responds to the robot using yes or no, which the processor of the robot translates into text and a meaning associated with the text. In some embodiments, the user responds to the robot using a physical gesture that is captured by a camera disposed on the robot or a smart house connected with the robot. The processor of the robot translates the physical gesture into a meaning associated with the gesture.

Figure 106:
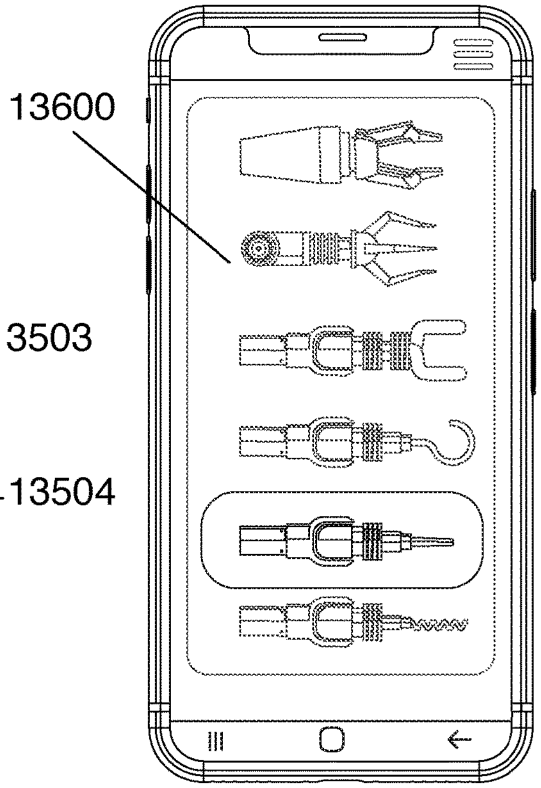
FIG. 106 illustrates an application of a communication device displaying different tools that may be selected by a user.

In some embodiments, upon initiation by the robot, upon the robot asking, or during a training session, the user demonstrates an action the robot is to perform upon identifying a particular object. For example, the user demonstrates an action the robot is to perform upon identifying a teddy bear by physically picking up the teddy bear and placing the teddy bear in a toy box while sensors of the robot observe the actions of the user. In some embodiments, the user demonstrates an action the robot is to perform upon identifying a particular object using virtual reality. For example, in a mixed VR/AR interface, the user selects a manipulator arm with a claw and grabs an object of interest using the claw and places the object where it belongs, thereby demonstrating the action the robot is to perform upon identifying the object as wheel as which manipulator arm (or other tool types for other application) to use. In some embodiments, the user demonstrates an action the robot is to perform upon identifying a particular object using the application. For example, FIG. 106 illustrates selecting a tool 13600 of multiple possible tools of a robot using an application of a communication device. Using the application, the user instructs the robot on how to pick up or handle a particular object (e.g., pick up object from its top, side, bottom, etc., lift or scoop object, push object, etc.).

Figure 107:
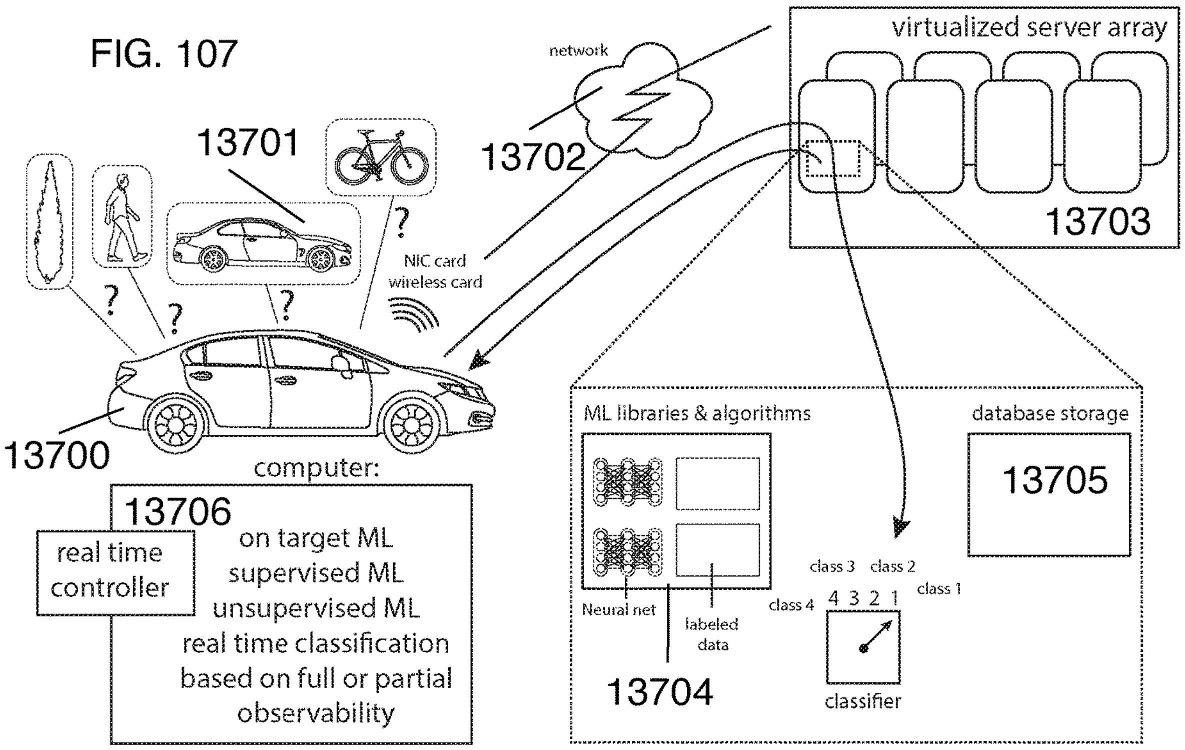
FIG. 107 illustrates an example of an autonomous vehicle configured to classify objects.

Collecting objects in one place helps the user clean an area, makes it easier for the user to place the objects back in their correct locations, and makes it easier for the robot to perform other cleaning tasks, such as vacuuming and mapping. As such, a learning mechanism may be comprised of two separate subsystems. One subsystem of the learning mechanism is global and the global training subsystem comprises a large data set of labeled images, wherein the images comprise images labelled by staffed human operators and/or crowd sourced images labelled by users and/or auto-generated labelled images, and/or a combination of the above. The other subsystem of the learning mechanism is local, wherein the local training subsystem includes fewer objects and classes that are typically found in a specific house with more granular labelling. For example, in a specific house a teddy bear is labelled as Ted and a doll is labelled with a particular name (e.g., Tracey or Lisa). In some embodiments, the global training and object classification subsystem is used as an a priori to narrow down an object type of an object, while the local training and object classification subsystem provides further fine tuning in determining the object type. In some embodiments, an unsupervised method is locally used to cluster objects into categories, then a supervised method is applied only a subset of the data (e.g., each category or the images of that category). For example, an unsupervised method separates furniture from toys within a house. The furniture at particular locations within the house is constant and appears substantially the same, as furniture in the house typically remains the same over a reasonably long period of time. FIG. 107 illustrates an autonomous vehicle 13700 disposed with sensors observing objects 13701. Using wireless capabilities 13702 of the vehicle 13700 sensor data corresponding to observed objects 13701 is provided as input to a sever 13703 that executes a ML algorithm 13704 to classify objects 13701 based on the sensor data. A database storage 13705 stores information such as characteristics associated with different object types and other data. A real-time controller 13706 executes on any of target ML, supervised ML, unsupervised ML and real-time classification based on full or partial observability.

Figure 108A:
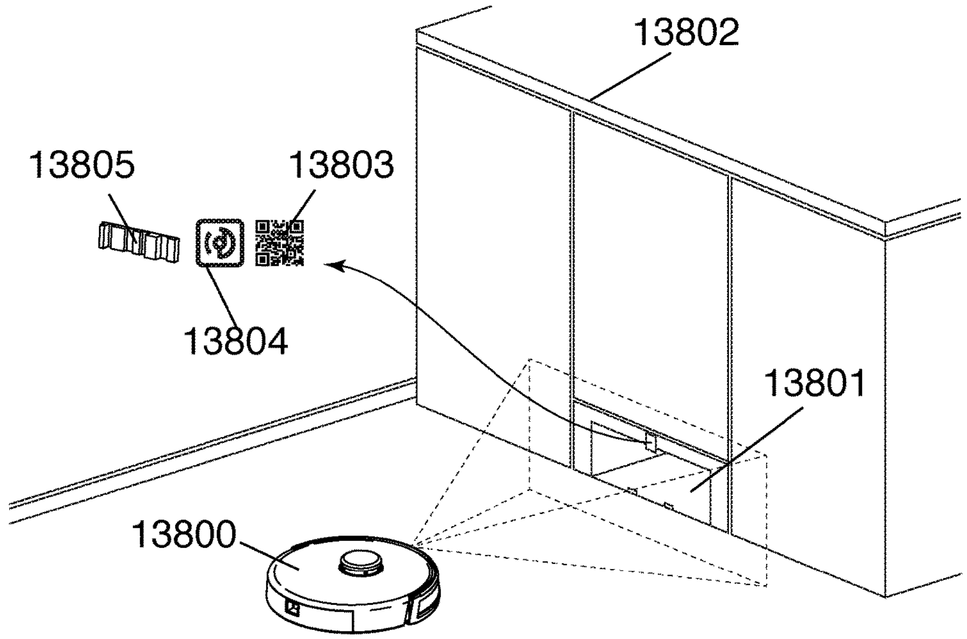
FIGS. 108A and 108B illustrate a robot docking at a charging station.
Figure 108B:
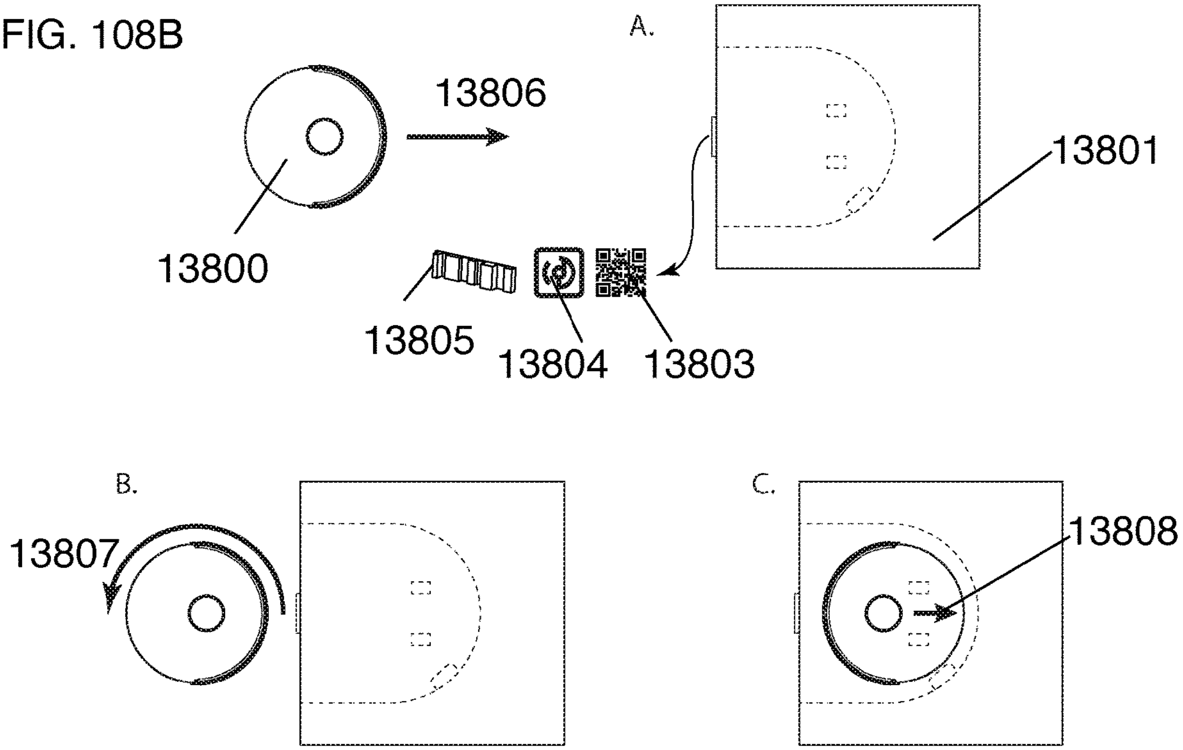

In some embodiments, the processor of the robot identifies a particular object based on a visual cue, such as a QR code or an object-specific pattern. For example, the processor of the robot identifies an object as a charging station based on observing a particular QR code or a specific pattern. In some embodiments, the processor of the robot identifies a particular object based on recognizing a 3D structure with an indentation pattern unique to the object using a LIDAR sensor or line laser and image sensor. Visual cues help the robot align with a secondary device in cases where alignment is important and/or space is limited. For example, FIG. 108A illustrates a robot 13800 attempting to dock at a charging station 13801 integrated into a cabinet 13802 of a home. The robot 13800 aligns itself with the charging station 13801 using QR code 13803, an image pattern 13804, or a 3D structure with a unique indentation pattern 13805, any of which is disposed on a front 13806 of the charging station 13801, before attempting to enter the hollow space of the charging station 13801. Alignment of the robot 13800 with the charging station 13801 is particularly important when the robot 13800 docks backwards (e.g., to empty a dustbin of the robot). FIG. 108B illustrates A. the robot 13800 driving in a forward direction 13806 and using any of QR code 13803, an image pattern 13804, or a 3D structure with a unique indentation pattern 13805 to initially align with the charging station 13801. Upon the robot 13800 aligning with the charging station 13801, B. the robot 13800 rotates 180 degrees 13807, then C. moves in a backwards direction 13808 until positioned on the charging station 13801.

In some embodiments, obstacles are detected using a short range structured light and camera pair. In some embodiments, obstacles are detected using stereo matching on two cameras. In some embodiments, at least one camera is used for object detection or finding a volume of an object. In some embodiments, two or more cameras are used. In some embodiments, patches of a first image and patches of a second image captured by a first camera and a second camera, respectively, are matched by a sum of absolute differences, a sum of squared differences, cross correlation, census transform and similar methods, bundle adjustment, etc. In some embodiments, the Levenberg Marquardt algorithm is used for optimization. In some embodiments, corners of an object are used as the patch using SIFT. In some embodiments, Harris, Shi Tomasi, SUSAN, MSER, HOG, FAST or other methods are used for detecting and matching patches of images. In some embodiments, SURF and other methods are used to identify a desired patch among multiple patches in each of the images. In some embodiments, features or identified patches are tracked over multiple time steps. In some embodiments, decomposition methods are used to separate localization from feature tracking. In some embodiments, the Lukas-Kanade method is used to assume a constant optical flow in tracking features or patches over time steps. In some embodiments, median filtering or other methods of filtering are used. In some embodiments, convolutional neural networks are used to solve the SLAM problem.

In some embodiments, motion vectors or optical flows in an image stream are used as clues to detect whether an object is moving. Upon classifying an object as a moving object, speed and direction of the object are extracted. In some embodiments, a bounding box defines borders within an image surrounding the moving object. In some embodiments, the image is further processed to yield a velocity and an acceleration relationship between the moving object and the robot or a frame of reference established by the processor of the robot. In some embodiments, further details are extracted from a stream of images, such as object type and object related details (e.g., make and model of the object such as a toy car or a real car, price of the object, owner of the object, etc.).

In embodiments, processing of an image or point cloud includes, but is not limited to, any of object noise reduction, object classification, object identification, object verification, object detection, object feature detection, object recognition, object confirmation, object separation and object depth determination. Such image and/or point cloud processing is used to extract meaningful evidence from noisy sensors to, for example, determine a category of a sensed object, an object type or identification (e.g., human recognition or a type, make, and model of a car), whether an object exists within a vicinity of the robot and how the object is detected from a series of sensed input, which features from sensed data determine existence of objects within the environment, how an object is separated from other spatially sensed data and which borders form the separation, depth of an object, direction of movement of an object, and acceleration or speed of an object.

In some embodiments, machine learning is used to extract an attribute of an object or the environment. In some embodiments, objects or features or radio signals are encoded with a particular instruction. Upon detection of a particular object or feature or receiving a radio signal, the robot executes an associated instruction. For example, signage may encode various instructions, including but not limited to, a speed limit sign, exit information, a yield sign, a stop sign, a crosswalk sign, a parking sign, and other signs that are installed by driving authorities. Artificial neural networks or machine learning methods perform recognition, predictions, classifications, etc. by learning how to solve a problem using data sets without any programmed logic or enablement, wherein the algorithm forms decisions independently. Deep networks arrange multiple layers of learning using data sets. Some embodiments set up machine learning at a deeper level to extract a correct approach at executing something in particular by using large data sets without explicitly defining the correct approach. Deep belief networks, recurrent neural networks, convolutional neural networks, are similar in a sense that they perform well with large data sets. Convolutional neural networks preserve spatial information carried by an image. Each convolutional kernel is an independent feature detector. As a result, the CNN provides a translational invariant detector that sweeps an entire image for detection, similar to a sliding window. Some embodiments employ an encoder CNN to perform extraction of features while a decoder CNN uses the extracted features to make predictions. CNNs or other neural networks use an activation function, such as ReLU, Tanh, Sigmoid, Stochastic Binary, or Linear activation functions.

In some embodiments, a LIDAR sensor and camera are used in combination to detect far or near objects. In embodiments, the camera is aligned such that the FOV of the camera falls within a FOV of the LIDAR sensor. In some embodiments, a center of the camera is aligned with a center of the FOV of the LIDAR sensor. In some embodiments, a most left column of the camera aligns with a particular angle of a radial LIDAR sensor. In some embodiments, sensors are calibrated during manufacturing. In some embodiments, sensors are calibrated at run time. In some embodiments, a calibration monitoring module is provisioned for checking calibration data and providing a message or notification when calibration is lost. In some embodiments, an auto calibration module automatically recalibrates the sensors. In some embodiments, a particular ray of LIDAR illumination falls within a particular column, row, or series of pixels within a frame of the camera. When the particular ray of LIDAR illumination is not detected within the particular column, row, or series of pixels within the frame of the camera, calibration is lost. When illumination is detected elsewhere in the FOV of the camera, a transform function adjusts the discrepancies to recalibrate the sensors. In some embodiments, various sensors are time synchronized.

Figure 109:
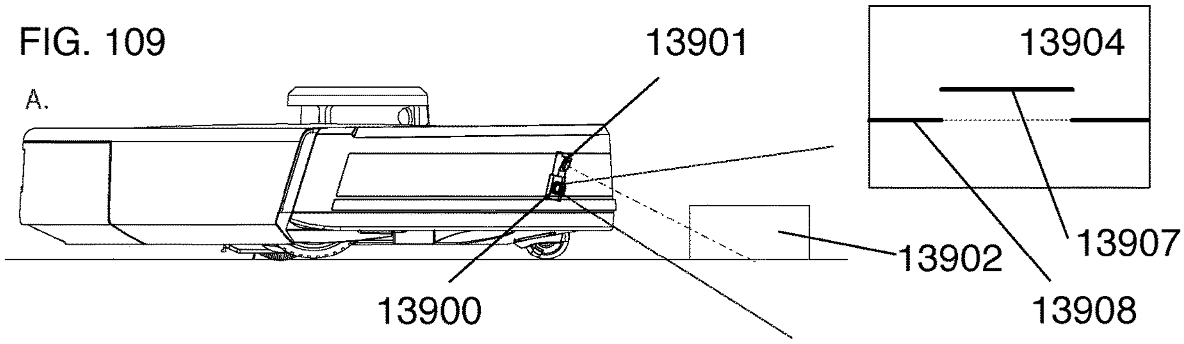
FIGS. 109-112 illustrate an example of a robot including a near range obstacle sensor approaching an obstacle and a floor transition and resulting line distortions in images.
Figure 110:
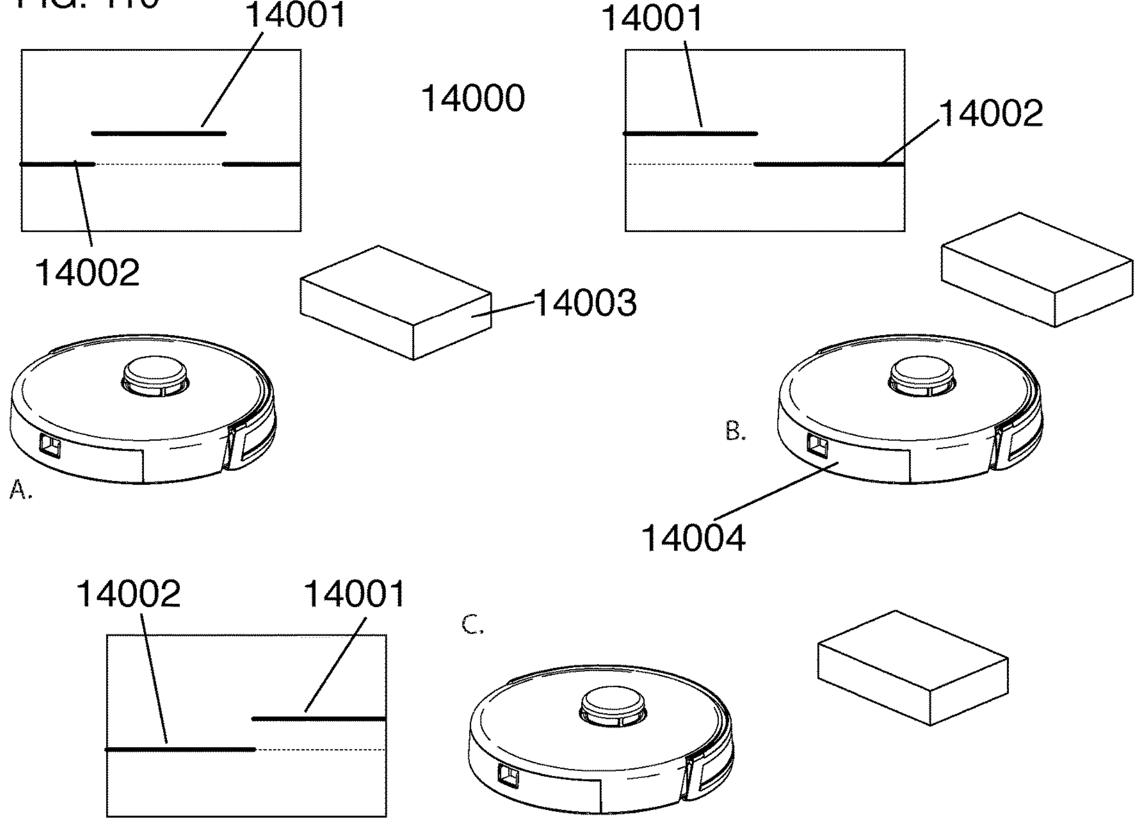
Figure 111:
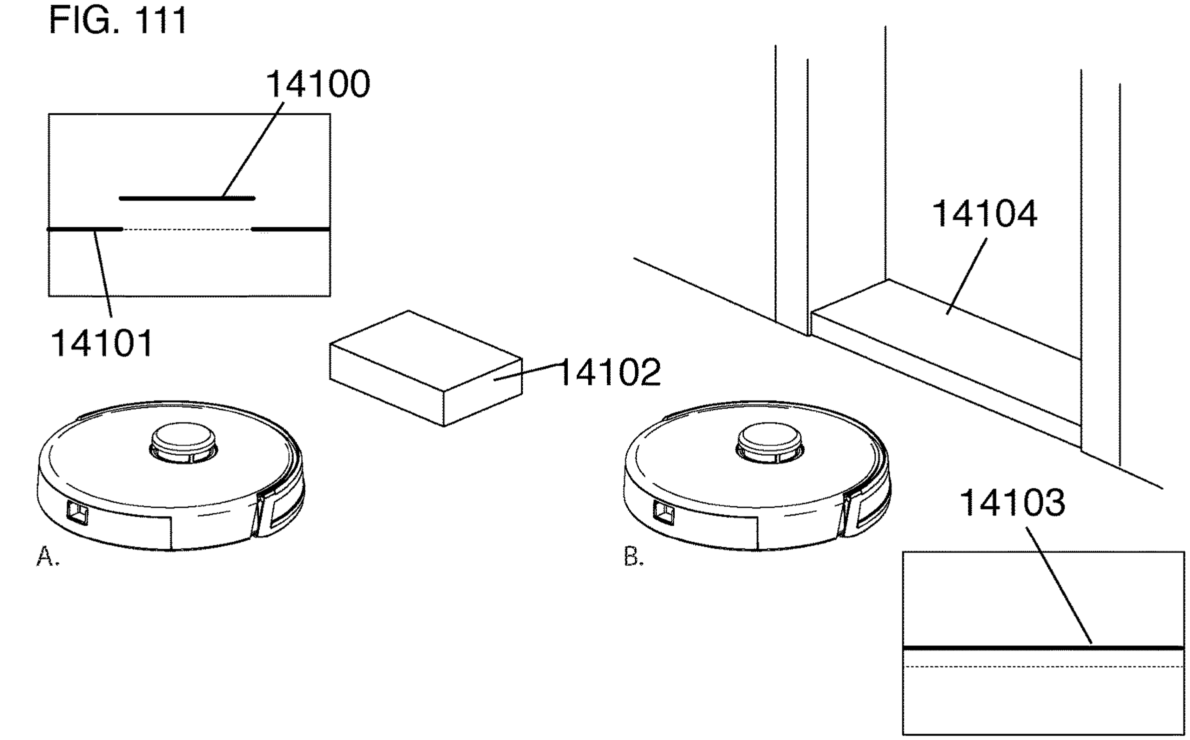
Figure 112:
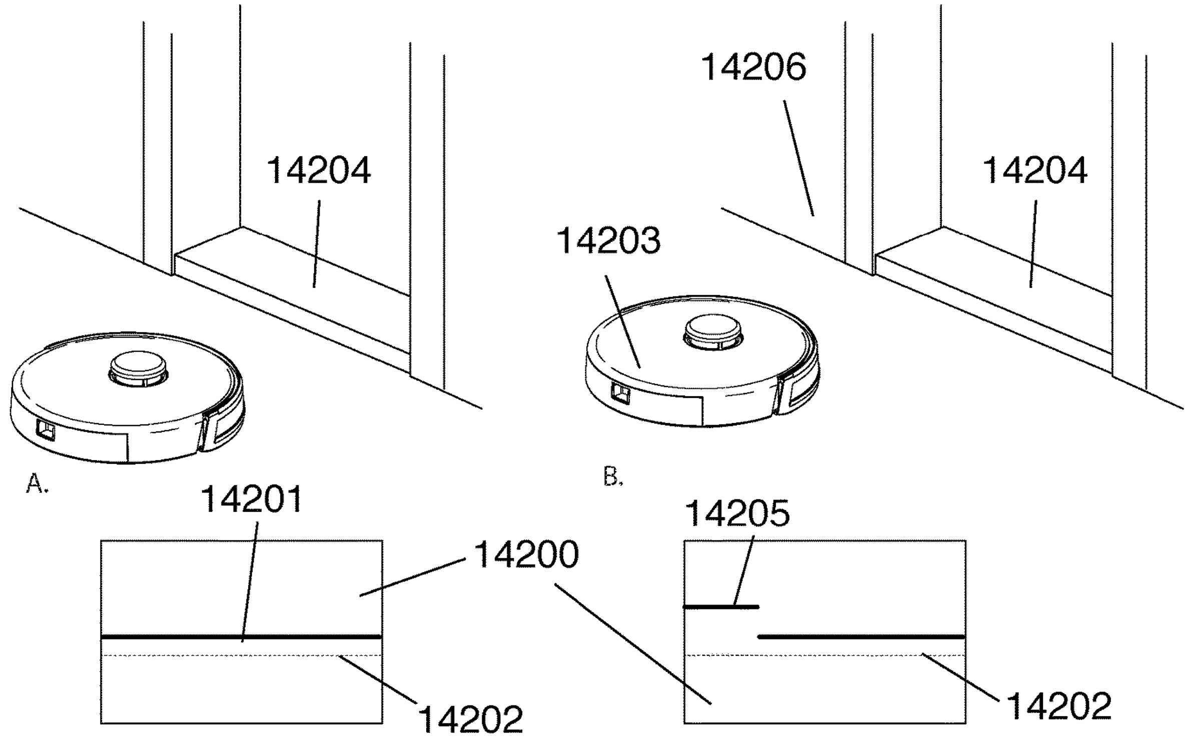

In some embodiments, the processor of the robot detects obstacles using near-range obstacle detection sensors, such as combination of a line laser sensor and an image sensor, based on a vertical shift of a line projected by the line laser captured in images. In some embodiments, the processor determines whether the vertical shift is due to an obstacle or a floor transition. In some embodiments, user input via an application of a communication device paired with the robot helps in distinguishing between obstacles and floor transitions. For example, the user provides an input to the application designating a maximum height for floor transitions. Any vertical shift of the line in the captured images that is greater than the maximum height is an obstacle and any vertical shift below the maximum height is a floor transition. The processor decides a next move of the robot based on this information. FIG. 109 illustrates a robot with a near range obstacle sensor including an image sensor 13900 and line laser 13901 approaching A. an obstacle 13902 and B. a floor transition 13903. Corresponding images 13904 and 13905 of the projected laser line 13906 are captured by the image sensor 13900. A portion 13907 of the laser line 13908 in image 13904 that is vertically shifted due to encountering the obstacle 13902 is not as wide as the laser line 13909 in image 13905 vertically shifted due to encountering the floor transition 13903 because the floor transition 13903 is wide enough to cover the entire field of view of the image sensor 13900. However, a width of the portion of the laser line vertically shifted in an image may not always distinguish an obstacle from a floor transition. FIG. 110 illustrates some examples of images 14000 of laser line distortion due to a vertical shift of at least a portion 14001 of the line 14002 upon encountering an obstacle 14003, when A. the obstacle 14003 is aligned with a centerline of a robot 14004, B. the obstacle 14003 is on a left side of the robot 14004, and C. the obstacle 14003 is on a right side of the robot 14004. The location of the obstacle 14003 relative to the robot 14004 changes a location of the portion 14001 of the line 14002 vertically shifted in the captured images 14000. FIG. 111 illustrates a portion 14100 of a laser line 14101 captured in the image that is vertically shifted due to encountering an obstacle 14102 is not as wide as the laser line 14103 in the captured image that is vertically shifted due to encountering a floor transition 14104 (door threshold), as the floor transition 14104 is wide enough to cover an entire field of view of an image sensor of the robot. FIG. 112 illustrates an example of images 14200 of laser line distortion due to a vertical shift of at least a portion 14201 of the laser line 14202 upon a robot 14203 encountering a floor transition 14204 when A. the robot 14203 is centered with the floor transition 14204 and B. the robot 14203 is further towards a left side of the floor transition 14204, wherein a second portion 14205 of the laser line 14202 is vertically shifted due to a greater height of a wall 14206 detected in a field of view of an image sensor capturing images 14200.

Figure 113A:
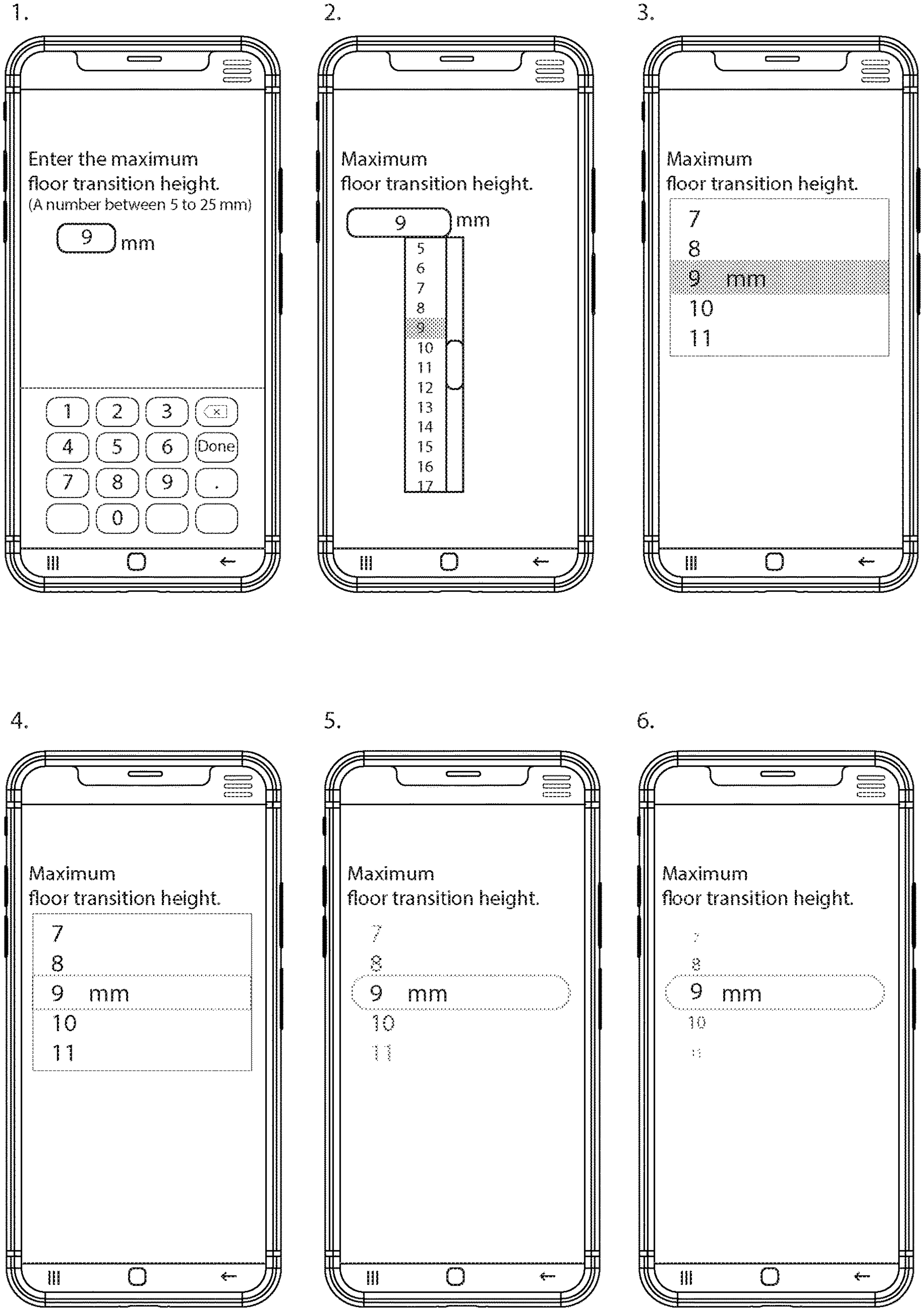
FIGS. 113A-113C illustrate a user providing floor transition height using an application of a communication device.
Figure 113B:
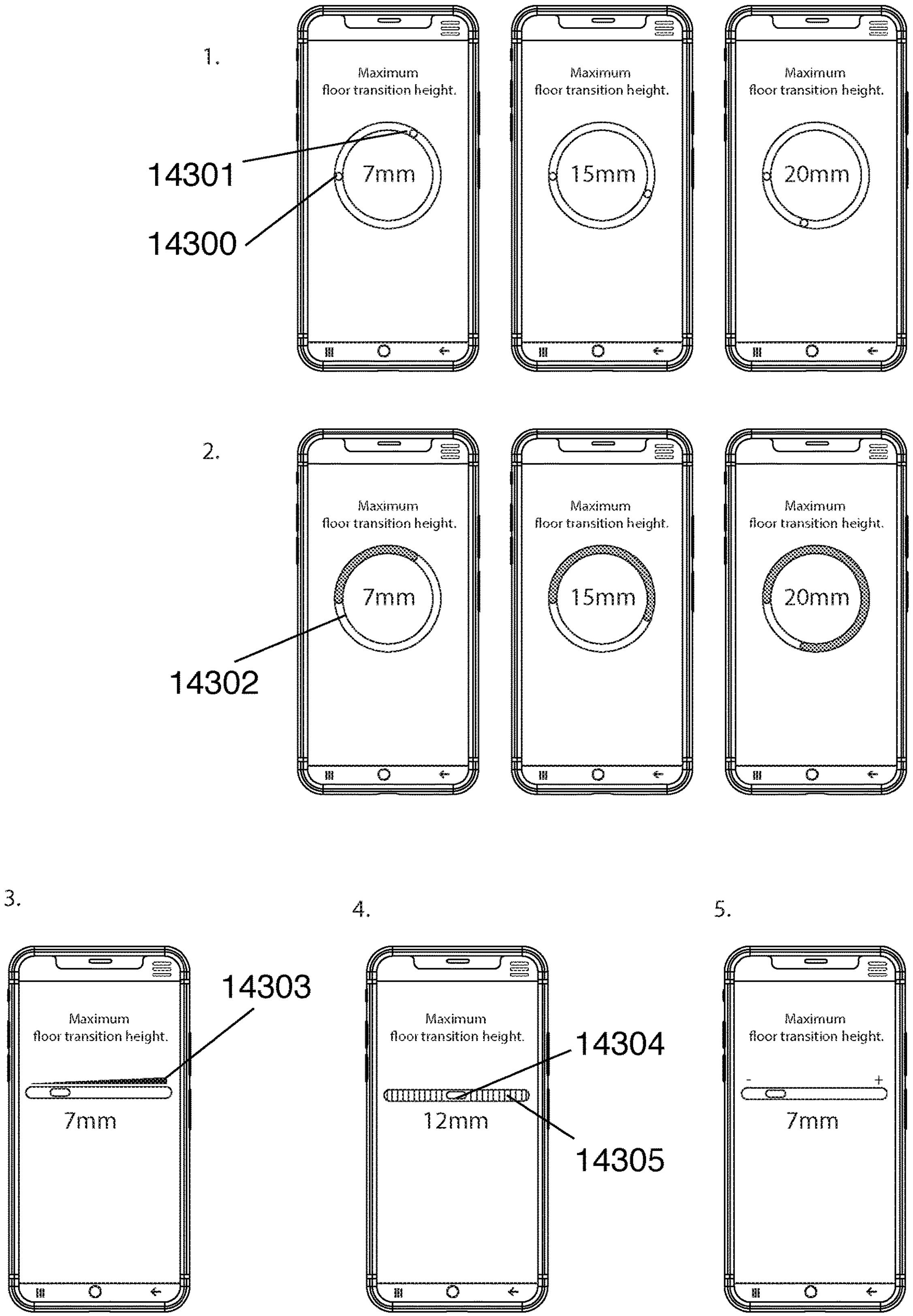
Figure 113C:
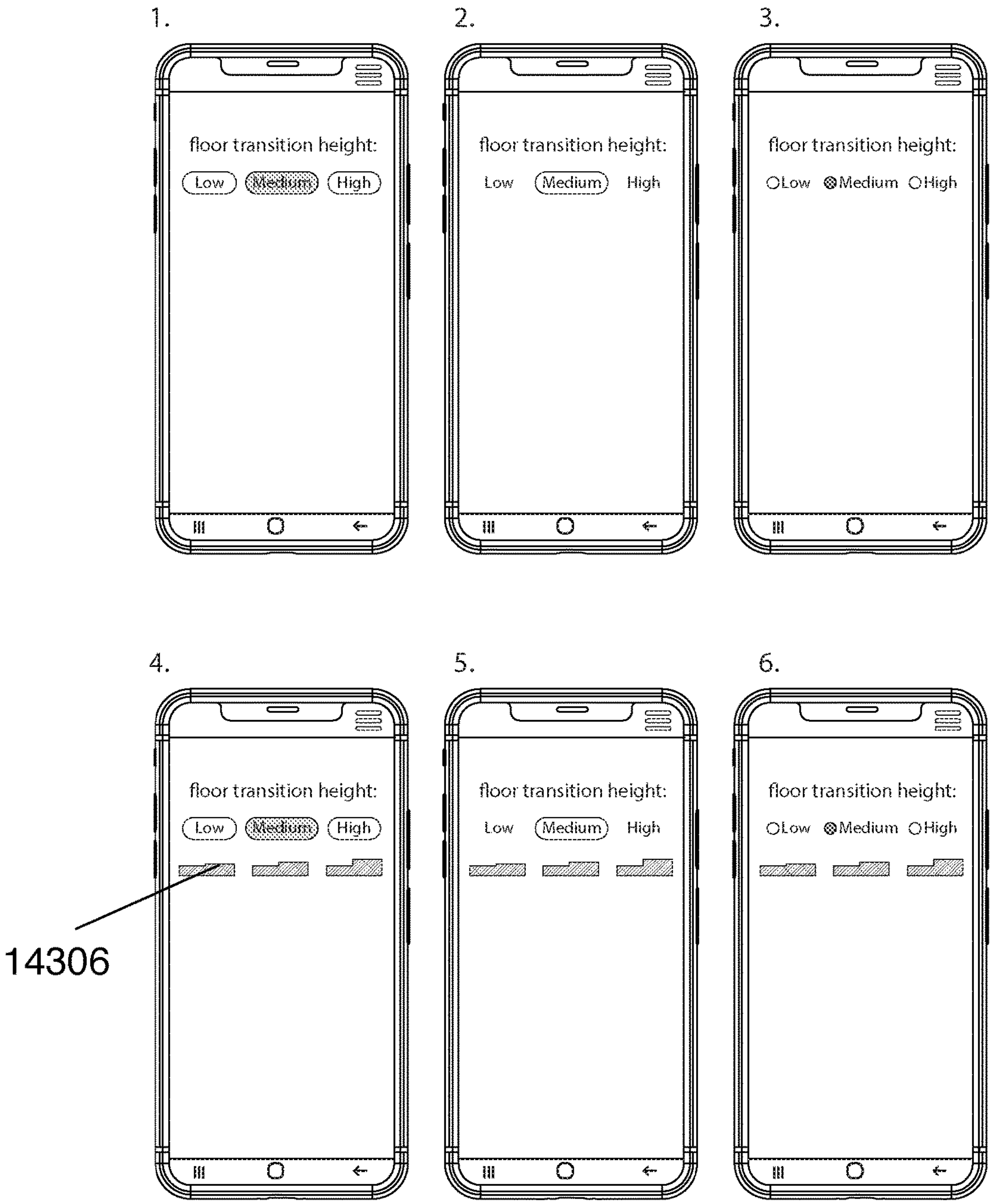

Different user interfaces may be used to provide input to the application designating the maximum height for floor transitions. In some embodiments, the maximum height is provided to the application as text using a number with a unit length of mm, cm, inches, etc. In some embodiments, the maximum height is provided to the application using a slider or a dial. In some embodiments, the application displays possible options from which the user chooses. For example, options for floor transition height may include small/medium/large. FIGS. 113A-113C illustrate user interface examples of an application of a communication device used to provide a maximum floor transition height. FIG. 113A illustrates providing the maximum floor transition height by 1. text, 2. drop down list, 3. a vertical scroll list wherein a chosen number is highlighted, 4. a vertical scroll list wherein a chosen number is framed in a rectangle, 5. a vertical scroll list wherein a chosen number is framed in a rectangle with rounded corners and unchosen numbers are faded, and 6. a vertical scroll list wherein a chosen number is framed in a rectangle with rounded corners and unchosen numbers are faded and reduced in size. FIG. 113B illustrates providing the maximum floor transition height by using 1. a dial controlled by sliding a first circle 14300 towards a second circle 14301, wherein a distance between circles 14300 and 14301 correlates with a magnitude of the maximum floor transition height, 2. a dial controlled by coloring ring 14302, wherein an amount of the ring 14302 colored correlates with a magnitude of the maximum floor transition height, 3. horizontal slider, wherein a visual guide 14303 illustrates a direction of increasing height values, 4. a horizontal slider dial, wherein an indicator 14304 remains in position while the background 14305 of the slider moves to increase or decrease height value, and 5. a horizontal, wherein a plus and minus illustrates a direction of increasing and decreasing height values. FIG. 113C illustrates providing a level of the maximum floor transition height (in this case options are low, medium, high, but may vary in other embodiments), wherein 1. a selected level is highlighted, 2. a selected level is framed by a rectangle with rounded corners, and 3. a radio button next to a selected level is highlighted. Examples 4., 5., and 6. are the same as 1., 2., and 3., respectively, but include visual guides 14306 corresponding to the different levels. In embodiments, an upper limit for floor transitions is defined based on mechanical features and limitations of the robot.

Figure 114:
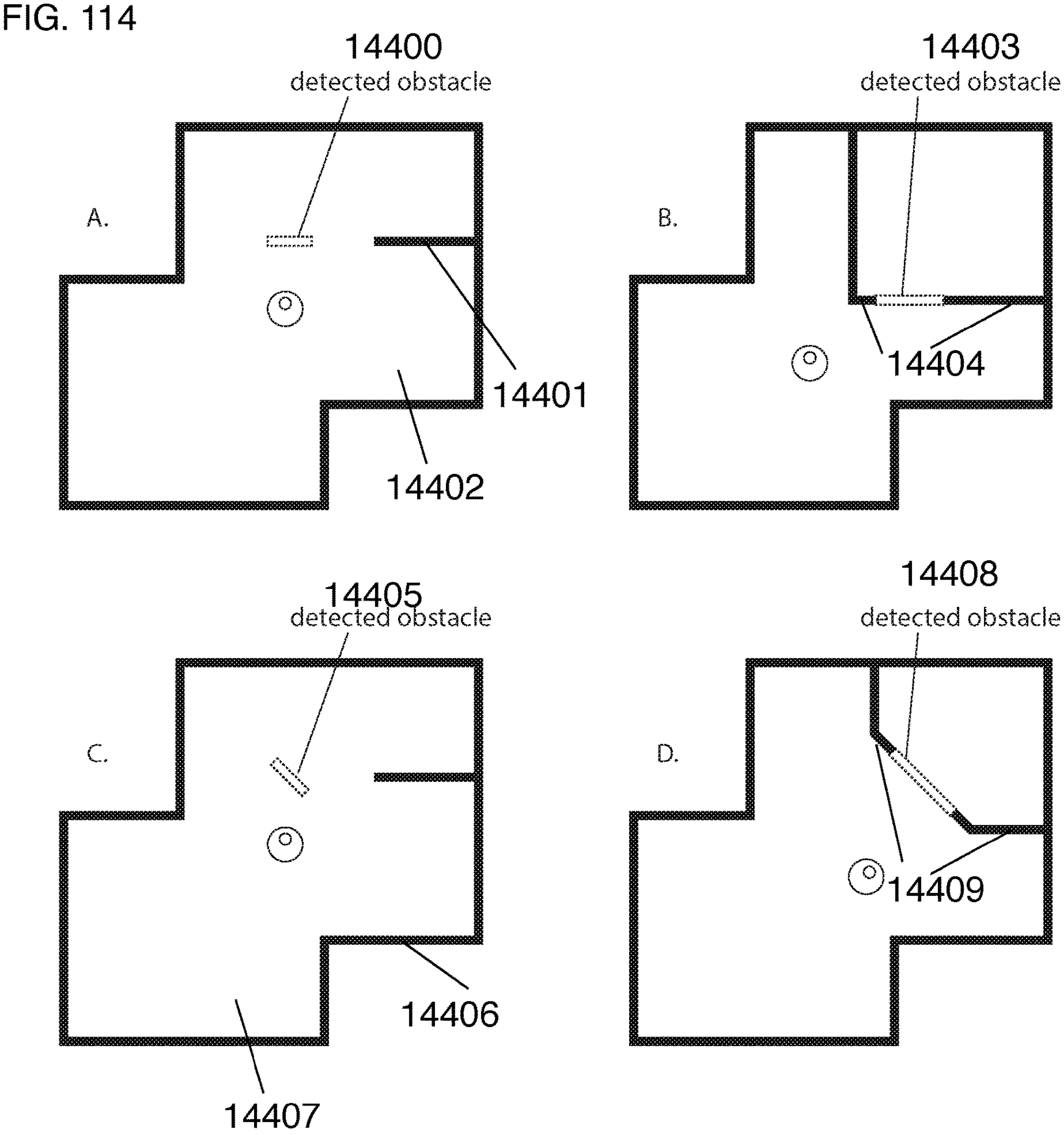
FIG. 114 illustrates a use of location and alignment as an indicator of an obstacle type.
Figure 115:
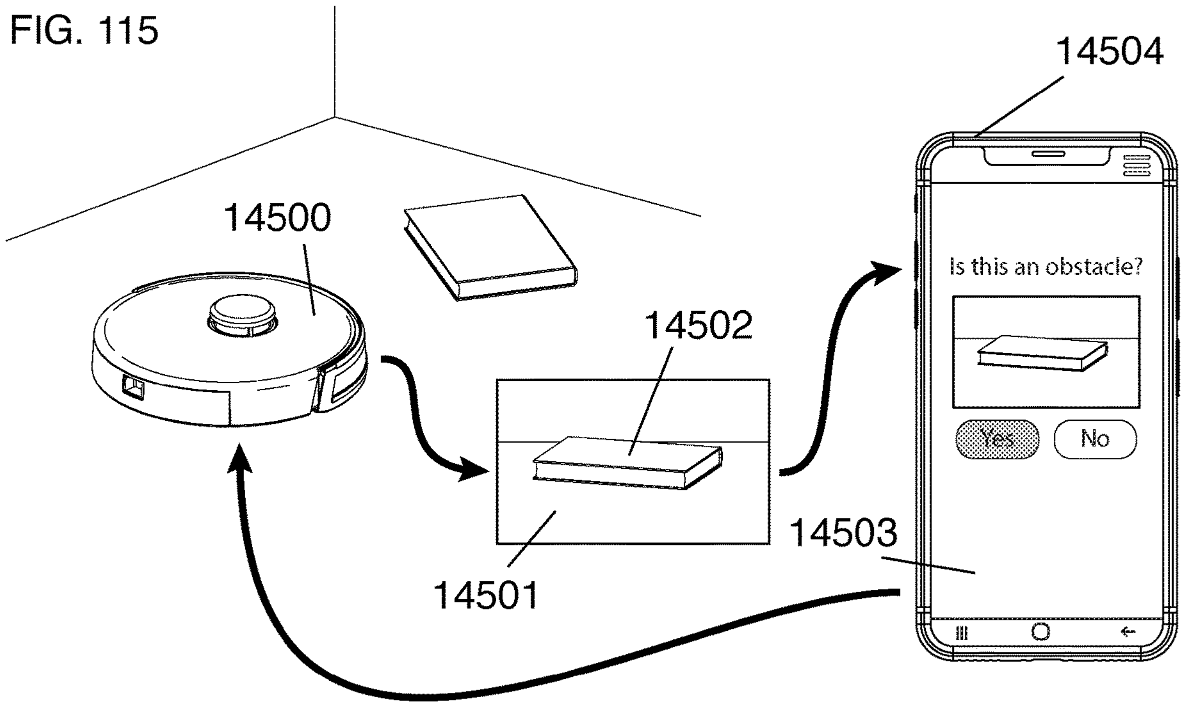
FIG. 115 illustrates an application of a communication device displaying an image of an object captured by a camera of a robot and awaiting user input.
Figure 116:
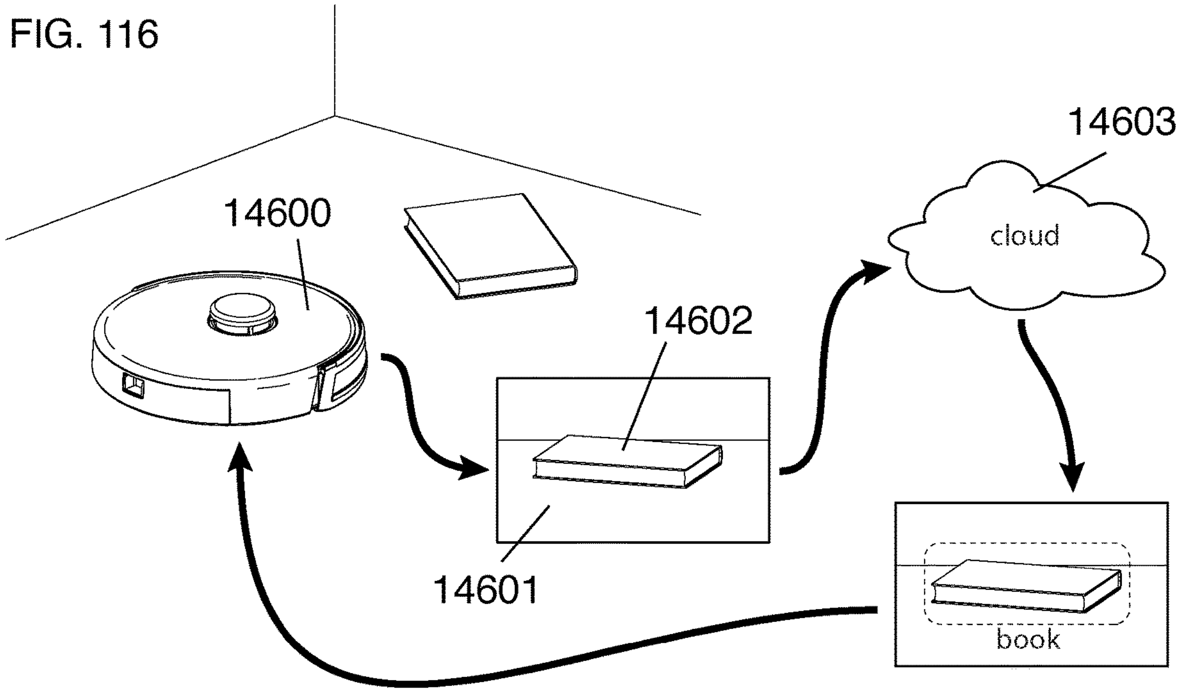
FIG. 116 illustrates an image of an object captured by a camera of a robot transmitted to the cloud for further processing.

In some embodiments, the processor of the robot learns to distinguish between floor transitions and obstacles using a neural network and AI. In some embodiments, additional data is used to help recognize obstacles and floor transitions. In addition to the vertical shift of the line in captured images, a width of a detected distortion of the line in the captured images is further indicative of an obstacle or a floor transition. For example, in a case where a vertical shift of 20 mm is indicative of both an obstacle (such as a book on the floor) and a floor transition (such as a door threshold), a width of distortion of the line in the captured images is used to determine whether an obstacle or a floor transition is encountered as line distortion of a door threshold is significantly wider than line distortion of a book. Another helpful indicator for distinguishing an obstacle from a floor transition is an alignment of detected distortion in comparison to a global map. For example, a floor transition, such as a door threshold, is usually aligned with adjacent walls while an obstacle is no always aligned with permanent structural elements. A location of detected distortion is another helpful indicator for distinguishing an obstacle from a floor transition. For example, it is unlikely for a book to be positioned at a doorway while a door threshold is always positioned at a doorway (i.e., a detected opening between two rooms). A probability of the encounter being a floor transition in comparison to an obstacle increases, solely based on the location of the encounter. FIG. 114 illustrates using a location and an alignment of a detected obstacle for determining whether the detected obstacle is a floor transition. In scenario A. the obstacle 14400 is aligned with major walls 14401 of the map 14402, as such there is a chance the obstacle 14400 is part of the permanent structures of the environment. In scenario B. the obstacle 14403 is aligned and co-linear with walls 14404, as such there is a high chance the detected obstacle 14403 is a door threshold. In scenario C. the detected obstacle 14405 is not aligned with any walls 14406 of the map 14407, as such the probability of the obstacle 14405 being part of the permanent structures of the environment is much lower. In scenario D. the obstacle 14408 is aligned and co-linear with walls 14409, therefore, based on the location of the detected obstacle 14408 there is a high chance of the obstacle 14408 being a door threshold. Although it is not aligned with main walls 14410, the obstacle 14408 is aligned with walls 14409. In some embodiments, a user uses the application to choose whether an encounter is an obstacle or floor transition, particularly in cases where the processor is unsure. A camera disposed on the robot captures an image of the obstacle or the floor transition, the application displays the image to the user, and the user provides input to the application indicating an obstacle or a floor transition. FIG. 115 illustrates an image sensor of a robot 14500 capturing and transmitting an image 14501 of an obstacle 14502. Given that a processor of the robot 14500 is confused and is unsure if the obstacle 14502 is an obstacle or a floor transition, the image 14501 is transmitted and displayed by an application 14503 of a communication device 14504 paired with the robot 14500. A user uses the application 14503 to indicate whether the captured image includes an obstacle by selecting yes or no. The response is transmitted to the robot such that the processor may react appropriately to the obstacle 14502. In some embodiments, such user input is provided to the neural network to further learn differences between obstacles and floor transitions. In some embodiments, the captured image of the obstacle or floor transition is transmitted to the cloud for further processing to determine whether an obstacle or floor transition is encountered or an object type of the obstacle, such that the processor may decide a next move of the robot accordingly. FIG. 116 illustrates an image sensor of a robot 14600 capturing and transmitting an image 14601 of an obstacle 14602. Given that a processor of the robot 14600 is confused and is unsure if the obstacle 14602 is an obstacle or a floor transition, the image 14601 is transmitted to the cloud 14603 for further processing. The cloud determines the obstacle in the captured image is an obstacle with an object type of a book. The response is transmitted to the robot such that the processor may react appropriately to the obstacle 14602 and/or object type of the obstacle 14602.

Figure 117:
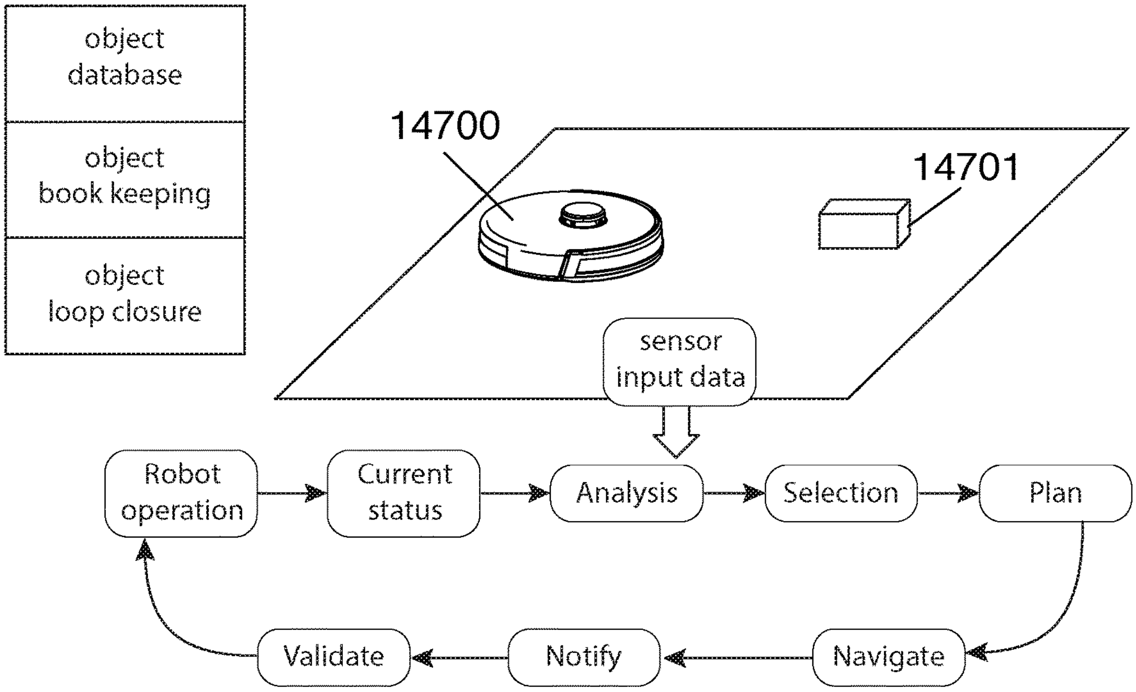
FIG. 117 illustrates an example of a process of object identification.

In embodiments, various detectors may be used in detecting objects, including, but not limited to, Canny, Sobel, Harris, Harris & Stephan, SIFT, Haar, Stephan/Plessey, SOSAN, Hessian, MSER, PCBR, BLB, character detection, Shi & Tomasi, Level curve curvature, face detection, a Laplacian of Gaussian, light line detector, neural net detector, a differential of Gaussian detection, etc. FIG. 117 illustrates an example of a process of object identification. During operation of the robot 14700, the processor determines a current status of the robot, performs an analysis based on input of sensor data of object 14701, selects an object type of object 14701 based on an object database and the sensor data, formulates a plan based on the object type, executes the plan, notifies a user of the object type observed by, for example, displaying an image of the object 14701 via an application of a communication device paired with the robot 14700, and receives validation from the user, via the application, to perform a particular action when the object 14701 is observed. An image of the object 14701 or the object type of the object 14701 and a respective reactive action may be recorded.

Figure 118:
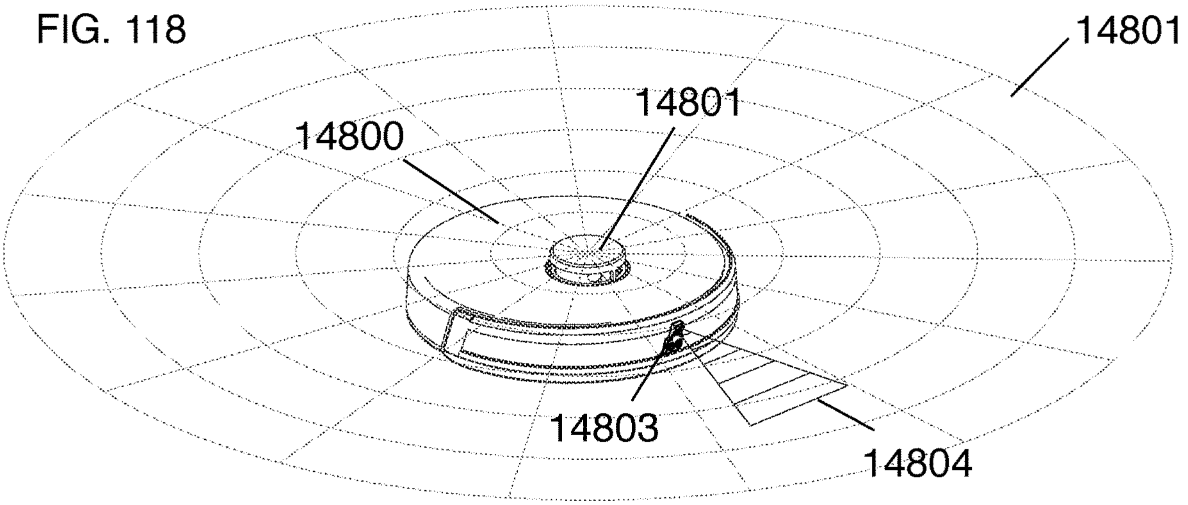
FIG. 118 illustrates an example of a robot including a LIDAR and a camera.
Figure 119:
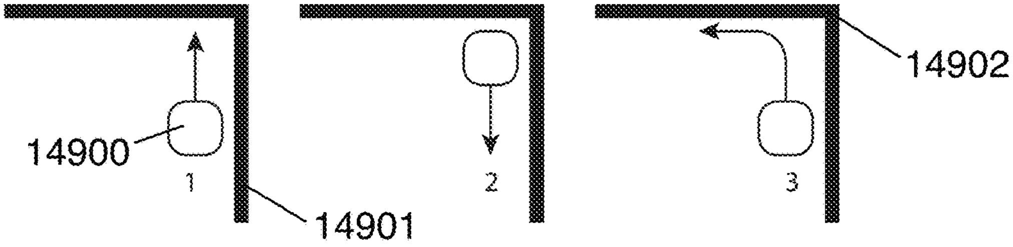
FIG. 119 illustrates an example of a robot using a near range sensor.

In some embodiments, the robot comprises a long range sensor and near range sensor for use while performing work. For example, a LIDAR sensor may be used to observe a presence or a lack of objects, including walls, within a long range while a depth camera or camera may be used for identifying obstacles within a near range or positioned at a height above the floor. FIG. 118 illustrates an example of a robot 14800 including a LIDAR sensor 14801 for observing objects within a long range 14802 and a camera 14803 for observing objects within a near range 14804. In embodiments, the long range and near range sensor data may be used for different purposes and at different levels of criticality. For example, the long range sensor data may be used for global planning and overall coverage decisions while the near range sensor data may be used for obstacle detection, safety, alignment with walls, and improved corner coverage and treatment. Wall alignment and corner coverage may be different based on a shape of the robot. For example, FIG. 119 illustrates a robot 14900 moving in a first direction 1 and a second direction 2 along a wall 14901 and curving 3 to cover a corner 14902. The robot 14900 uses a near range sensor to remain aligned with the wall 14901 and cover the corner 14902. In some embodiments, the near range sensor has a mandatory clearance requirement, a real-time response time requirement, or deterministic response time requirement. Mandatory clearance requirement prevents the robot from moving unless a space in front of the robot is clear of any obstacles. With real-time response, at least a system responsible for applying breaks or stopping the robot from moving is capable of real-time computing. Deterministic response time requires the robot deterministically execute certain actions (e.g., stop) before a predetermined amount of time elapses or the robot moves a certain amount of distance, wherein the requirement is defined using a table dependent on a distance from an obstacle and an angle at which the obstacle appears.

Figure 120:
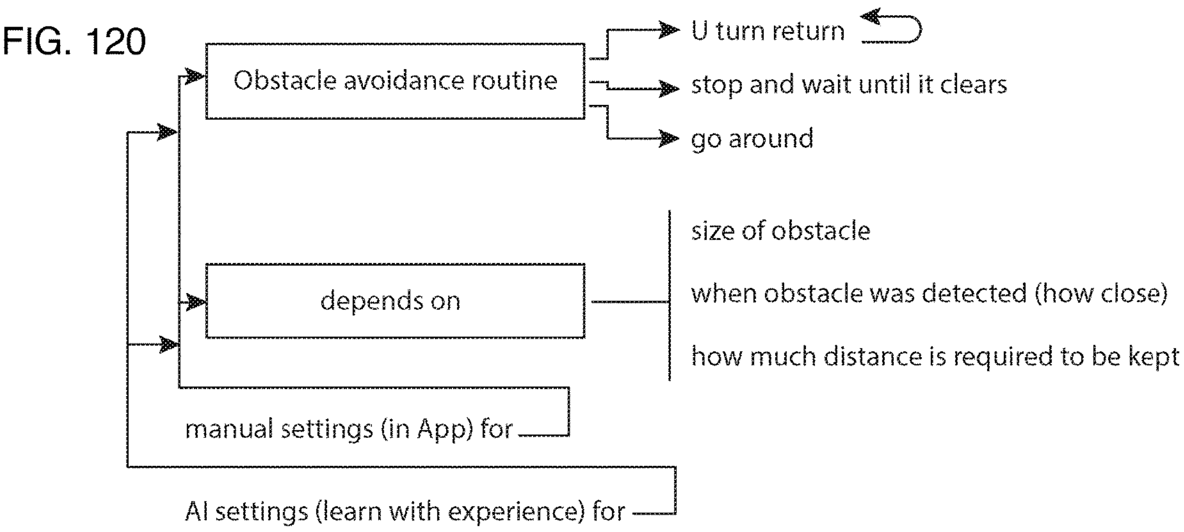
FIG. 120 illustrates an example of an obstacle avoidance routine.

In some embodiments, the robot executes an obstacle avoidance routine. Obstacle avoidance routines may include the robot performing a U-turn, stopping and waiting until an obstacle clears or driving around the obstacle. The action of the robot depends on a size of the obstacle, when obstacle was detected (i.e., how close the obstacle is to the robot), and a distance required between the robot and the obstacle. There may be manual settings in the application and/or learned AI settings (e.g., learned with experience) for controlling the obstacle avoidance routine. FIG. 120 illustrates the obstacle avoidance routine described.

Figure 121:
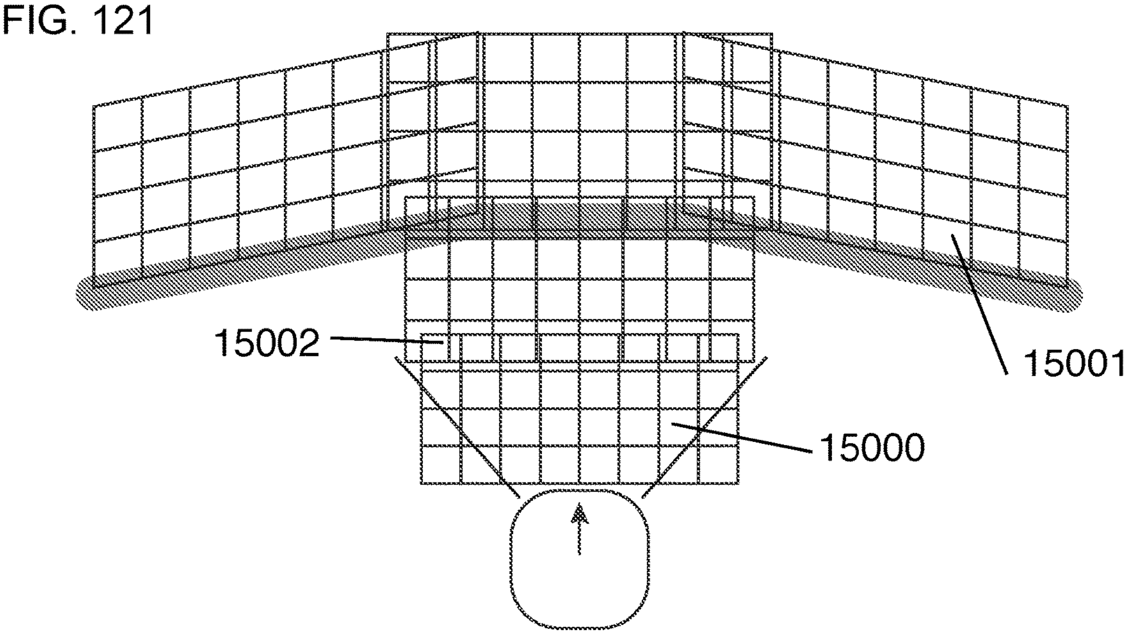
FIG. 121 illustrates an example of partially overlapping zones.
Figure 122:
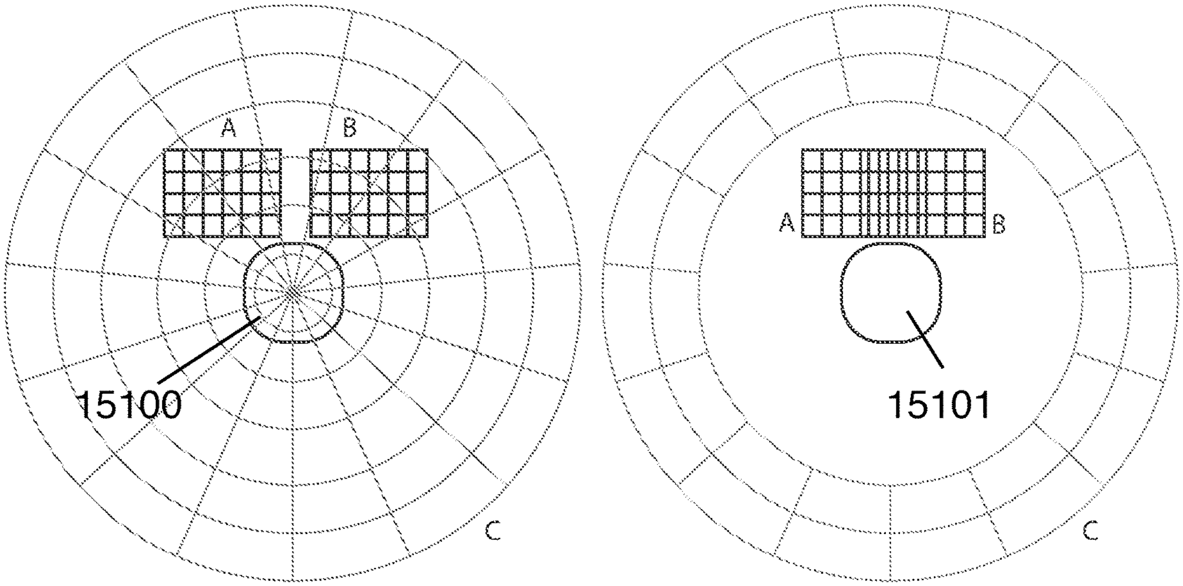
FIG. 122 illustrates an example of overlapping zones.

In embodiments, zones within which objects are detected are discovered and traced with different sensors. Zones may partially or fully overlap. For example, FIG. 121 illustrates near range object detection zones 15000 within which near range objects are detected and long range object detection zones 15001 within which long range sensors are detected. Zones 15000 and 15001 partially overlap in areas 15002. FIG. 122 illustrates a robot 15100 with non-overlapping near range object detection zones A and B which overlap with long range object detection zone C. In another case, FIG. 122 illustrates a robot 15101 with overlapping near range object detection zones A and B which does not overlap with long range object detection zone C. In embodiments, near range sensor data and long range sensor data are processed separately or in combination. When near range sensor data and long range sensor data are processed separately, the near range sensor and the long range sensor data processing may include a built in object detection method. Alternatively, only one of the near range sensor and the long range sensor data processing includes object detection. In embodiments, at least one of near range sensor data and the long range sensor data is further processed for object identification and object characteristics which may be used in predicting one or more possible behaviors of the robot for a particular object type identified. For instance, in response to detecting an object that is an obstacle, the robot responds by avoidance of the obstacle. Upon detecting an object that is a car positioned in front of the robot, identifying characteristics of the car may be used in determining possible behaviors of the robot. For example, a car in front of the robot and moving at a same speed of the robot at a distance may be outside an object zone. However, upon the car applying breaks, the car may fall within an object zone and be detected as an obstacle that requires avoidance. In another example, a bike has a particular range of motion within which the bike may move in a next time step, the movement of which may be useful in identifying the object as a bike.

Since some objects have similar dynamic characteristics, further identification of objects may be required. For example, a human and a pet, such as a cat or another animal, may both move within a certain speed range and have likelihood of suddenly turning 180 degrees. In another example, an object positioned close to a floor is mistakenly assumed to be a transition between rooms while in actuality the object is a cell phone cord. As a result of the incorrect object type assumption, the robot traverses over the object, potentially damaging the cell phone cord. In such cases it is beneficial to determine the type of object such that a correct action may be executed by the robot. For instance, upon identifying the object as the cell phone cord the robot drives around the object or stops operating brushes and drives over the object.

In some embodiments, the processor chooses to classify an object or chooses to wait and keep the object unclassified based on the consequences defined for a wrong classification. For instance, the processor of the robot may be more conservative in classifying objects when a wrong classification results in an assigned punishment, such as a negative reward. In contrast, the processor may be liberal in classifying objects when there are no consequences of misclassification of an object. In some embodiments, different objects may have different consequences for misclassification of the object. For example, a large negative reward may be assigned for misclassifying pet waste as an apple. In some embodiments, the consequences of misclassification of an object depends on the type of the object and the likelihood of encountering the particular type of object during a work session. The chances of encountering a sock, for example, is much more likely than encountering pet waste during a work session. In some embodiments, the likelihood of encountering a particular type of object during a work session is determined based on a collection of past experiences of at least one robot, but preferably, a large number of robots. However, since the likelihood of encountering different types of objects varies for different dwellings, the likelihood of encountering different types of objects may also be determined based on the experiences of the particular robot operating within the respective dwelling.

In some embodiments, the processor of the robot may initially be trained in classification of objects based on a collection of past experiences of at least one robot, but preferably, a large number of robots. In some embodiments, the processor of the robot may further be trained in classification of objects based on the experiences of the robot itself while operating within a particular dwelling. In some embodiments, the processor adjusts the weight given to classification based on the collection of past experiences of robots and classification based on the experiences of the respective robot itself. In some embodiments, the weight is preconfigured. In some embodiments, the weight is adjusted by a user using an application of a communication device paired with the robot. In some embodiments, the processor of the robot is trained in object classification using user feedback. In some embodiments, the user may review object classifications of the processor using the application of the communication device and confirm the classification as correct or reclassify an object misclassified by the processor. In such a manner, the processor may be trained in object classification using reinforcement training.

In some embodiments, the processor classifies the type, size, texture, and nature of objects. In some embodiments, such object classifications are provided as input to the navigational algorithm, which then returns as output a decision on how to handle the object with the particular classifications. For example, a decision for an autonomous car may be very conservative when an object has even the slightest chance of being a living being, and may therefore decide to avoid the object. For a robotic vacuum cleaner, the robot may be extra conservative in its decision of handling an object when the object has the slightest chance of being pet bodily waste.

In some embodiments, the processor may determine a generalization of an object based on its characteristics and features. For example, a generalization of pears and tangerines may be based on size and roundness (i.e., shape) of the two objects. Using the generalization, the processor may assume objects which fall within a first area of a graph are pears and those that fall within a second area of a graph are tangerines. Generalization of objects may vary depending on the characteristics and features considered in forming the generalization. Due to the curse of dimensionality, there is a limit to the number of characteristics and features that may be used in generalizing an object. Therefore, a set of best features that best represents an object is used in generalizing the object. In embodiments, different objects have differing best features that best represent them. For instance, the best features that best represent a baseball differ from the best features that best represent spilled milk. In some embodiments, determining the best features that best represent an object requires considering the goal of identifying the object; defining the object; and determining which features best represent the object. For example, in determining the best features that best represent an apple it is determined whether the type of fruit is significant or if classification as a fruit in general is enough. In some embodiments, determining the best features that best represents an object and the answers to such considerations depends on the actuation decision of the robot upon encountering the object. For instance, if the actuation upon encountering the object is to simply avoid bumping the object, then details of features of the object may not be necessary and classification of the object as a general type of object (e.g., a fruit or a ball) may suffice. However, other actuation decisions of the robot may be a response to a more detailed classification of an object. For example, an actuation decision to avoid an object may be defined differently depending on the determined classification of the object. Avoiding the object may include one or more actions such as remaining a particular distance from the object; wall-following the object; stopping operation and remaining in place (e.g., upon classifying an object as pet waste); stopping operation and returning to the charging station; marking the area as a no-go zone for future work sessions; asking a user if the area should be marked as a no-go zone for future work sessions; asking the user to classify the object; and adding the classified object to a database for use in future classifications.

In some embodiments, the processor may localize an object. The object localization may comprise a location of the object falling within a FOV of an image sensor and observed by the image sensor (or depth sensor or other type of sensor) in a local or global map frame of reference. In some embodiments, the processor locally localizes the object with respect to a position of the robot. In local object localization, the processor determines a distance or geometrical position of the object in relation to the robot. In some embodiments, the processor globally localizes the object with respect to the frame of reference of the environment. Localizing the object globally with respect to the frame of reference of the environment is important when, for example, the object is to be avoided. For instance, a user may add a boundary around a flower pot in a map of the environment using an application of a communication device paired with the robot. While the boundary is discovered by the local frame of reference with respect to the position of the robot, the boundary must also be localized globally with respect to the frame of reference of the environment.

In embodiments, the objects may be classified or unclassified and may be identified or unidentified. In some embodiments, an object is identified when the processor identifies the object in an image of a stream of images (or video) captured by an image sensor of the robot. In some embodiments, upon identifying the object the processor has not yet determined a distance of the object, a classification of the object, or distinguished the object in any way. The processor has simply identified the existence of something in the image worth examining. In some embodiments, the processor may mark a region of the image in which the identified object is positioned with, for example, a question mark within a circle. In embodiments, an object may be any object that is not a part of the room, wherein the room may include at least one of the floor, the walls, the furniture, and the appliances. In some embodiments, an object is detected when the processor detects an object of certain shape, size, and/or distance. This provides an additional layer of detail over identifying the object as some vague characteristics of the object are determined. In some embodiments, an object is classified when the actual object type is determined (e.g., bike, toy car, remote control, keys, etc.). In some embodiments, an object is labelled when the processor classifies the object. However, in some cases, a labelled object may not be successfully classified and the object may be labelled as, for example, "other". In some embodiments, an object may be labelled automatically by the processor using a classification algorithm or by a user using an application of a communication device (e.g., by choosing from a list of possible labels or creating new labels such as sock, fridge, table, other, etc.). In some embodiments, the user may customize labels by creating a particular label for an object. For example, a user may label a person named Sam by their actual name such that the classification algorithm may classify the person in a class named Sam upon recognizing them in the environment. In such cases, the classification may classify persons by their actual name without the user manually labelling the persons. In some instance, the processor may successfully determine that several faces observed are alike and belong to one person, however may not know which person. Or the processor may recognize a dog but may not know the name of the dog. In some embodiments, the user may label the faces or the dog with the name of the actual person or dog such that the classification algorithm may classify them by name in the future.

In some embodiments, dynamic obstacles, such as people or pets, may be added to the map by the processor of the robot or a user using the application of the communication device paired with the robot. In some embodiments, dynamic obstacle may have a half-life, wherein a probability of their presence at particular locations within the floor plan reduces over time. In some embodiments, the probability of a presence of all obstacles and walls sensed at particular locations within the floor plan reduces over time unless their existence at the particular locations is fortified or reinforced with newer observations. In using such an approach, the probability of the presence of an obstacle at a particular location in which a moving person was observed but travelled away from reduces to zero with time. In some embodiments, the speed at which the probabilities of presence of obstacles at locations within the floor plan are reduced (i.e., the half-life) may be learned by the processor using reinforcement learning. For example, after an initialization at some seed value, the processor may determine the robot did not bump into an obstacle at a location in which the probability of existence of an obstacle is high, and may therefore reduce the probability of existence of the obstacle at the particular locations faster in relation to time. In places where the processor of the robot observed a bump against an obstacle or existence of an obstacle that was recently faded away, the processor may reduce the rate of reduction in probability of existence of an obstacle in the corresponding places. Over time data is gathered and with repetition convergence is obtained for every different setting. In embodiments, implementation of this method may use deep, shallow, or atomic machine learning and MDP.

In some embodiments, it may be helpful to introduce the processor of the robot to some of the moving objects the robot is likely to encounter within the environment. For example, if the robot operated within a house, it may helpful to introduce the processor of the robot to the humans and pets occupying the house by capturing images of them using a mobile device or a camera of the robot. It may be beneficial to capture multiple images or a video stream (i.e., a stream of images) from different angles to improve detection of the humans and pets by the processor. For example, the robot may drive around a person while capturing images from various angles using its camera. In another example, a user may capture a video stream while walking around the person using their smartphone. The video stream may be obtained by the processor via an application of the smartphone paired with the robot. The processor of the robot may extract dimensions and features of the humans and pets such that when the extracted features are present in an image captured in a later work session, the processor may interpret the presence of these features as moving objects. Further, the processor of the robot may exclude these extracted features from the background in cases where the features are blocking areas of the environment. Therefore, the processor may have two indications of a presence of dynamic objects, a Bayesian relation of which may be used to obtain a high probability prediction.

In some embodiments, the processor of the robot may recognize a direction of movement of a human or animal or object (e.g., car) based on sensor data (e.g., acoustic sensor, camera sensor, etc.). In some embodiments, the processor may determine a probability of direction of movement of the human or animal for each possible direction. For example, for four different possible directions of a human, a processor of the robot has determined different probabilities 10%, 80%, 7%, and 3%, based on sensor data. For instance, if the processor analyzes acoustic data and determines the acoustics are linearly increasing, the processor may determine that it is likely that the human is moving in a direction towards the robot. In some embodiments, the processor may determine the probability of which direction the person or animal or object will move in next based on current data (e.g., environmental data, acoustics data, etc.) and historical data (e.g., previous movements of similar objects or humans or animals, etc.). For example, the processor may determine the probability of which direction a person will move next based on image data indicating the person is riding a bicycle and road data (e.g., is there a path that would allow the person to drive the bike in a right or left direction).

In some embodiments, the processor may use speed of movement of an object or an amount of movement of an object in captured images to determine if an object is dynamic. Examples of some objects within a house and their corresponding characteristics include a chair with characteristics including very little movement and located within a predetermined radius, a human with characteristic including ability to be located anywhere within the house, and a running child with characteristics of fast movement and small volume. In some embodiments, the processor compares captured images to extract such characteristics of different objects. In some embodiments, the processor identifies the object based on features. The processor may determine an amount of movement of the object over a predetermined amount of time or a speed of the object and may determine whether the object is dynamic or not based on its movement or speed. In some cases, the processor may infer the type of object.

In some embodiments, the processor executes facial recognition based on unique facial features of a person. In some embodiments, the processor executes facial recognition based on unique depth patterns of a face. For instance, a face of a person may have a unique depth pattern when observed. In some embodiments, the processor may first form a hypothesis of who a person is based on a first observation (e.g., physical facial features of the person (e.g., eyebrows, lips, eyes, etc.)). Upon forming the hypothesis, the processor may confirm the hypothesis by a second observation (e.g., the depth pattern of the face of the person). After confirming the hypothesis, the processor may infer who the person is. In some embodiments, the processor may identify a user based on the shape of a face and how features of the face (e.g., eyes, ears, mouth, nose, etc.) relate to one another. Examples of geometrical relations may include distance between any two features of the face, such as distance between the eyes, distance between the ears, distance between an eye and an ear, distance between ends of lips, and distance from the tip of the nose to an eye or ear or lip. Another example of geometrical relations may include the geometrical shape formed by connecting three or more features of the face. In some embodiments, the processor of the robot may identify the eyes of the user and may use real time SLAM to continuously track the eyes of the user. For example, the processor of the robot may track the eyes of a user such that virtual eyes of the robot displayed on a screen of the robot may maintain eye contact with the user during interaction with the user. In some embodiments, a structured light pattern may be emitted within the environment and the processor may recognize a face based on the pattern of the emitted light. In some embodiments, the processor may also identify features of the environment based on the pattern of the emitted light projected onto the surfaces of objects within the environment.

In order to save computational costs, the processor of the robot does not have to identify a face based on all faces of people on the planet. The processor of the robot or AI algorithm may identify the person based on a set of faces observed in data that belongs to people connected to the person (e.g., family and friends). Social connection data may be available through APIs from social networks. Similarly, the processor of the robot may identify objects based on possible objects available within its environment (e.g., home or supermarket). In one instance, a training session may be provided through an application of a communication device or the web to label some objects around the house. The processor of the robot may identify objects and present them to the user to label or classify them. The user may self-initiate and take pictures of objects or rooms within the house and label them using the application. This, combined with large data sets that are pre-provided from the manufacturer during a training phase makes the task of object recognition computationally affordable.

Some robots are equipped with floor sensors for recognizing floor types and floor characteristics. For example, the processor of the robot uses sensor data of the floor sensors to determine if the floor is reflective, such as highly reflective stone, ceramic, and epoxy floor types or vinyl and concrete floor types coated with a reflective coating. In some embodiments, the processor uses changes in floor reflectivity to make inferences. For example, a higher than normal reflectivity of a floor indicates liquid on the floor (e.g., a spill) or a lower than normal reflectivity of a floor indicates an accumulation of dust, dirt and debris on the floor. Other indicators such as a difference in color of a floor, a speed of the wheels of the robot for a particular amount of power, and a specific detected shape of a spot on a floor (e.g., a shoe print) are indicators of a slippery or sticky floor. Recognizing floor types and changes in certain characteristics help the robot perform better. For example, upon detecting sticky areas of a floor or dirt accumulation in certain areas of the floor within a supermarket, a cleaning robot responds by cleaning the areas of the floor that are sticky or dirty more thoroughly and/or pays immediate attention to those area before dirt spreads.

Some embodiments implement spatial awareness and use of spatial awareness to enhance the driving experience of the robot. For example, a drive surface texture is an important factor in the processor of the robot formulating decisions. Driving on mud, asphalt, wet asphalt, or frozen (i.e., iced) asphalt, for instance, requires different human operated controls. In some embodiments, the processor of the robot uses secondary information and sensor data to deduce conclusions and mimic the human operated controls used on different driving surface textures. Some embodiments use a Bayesian network to help in reaching a conclusion (e.g., on the driving surface type) based on signatures of various motor behaviors under different conditions. Strict signal conditioning is required for such inferred information to be reliable enough to use in formulating decisions. For example, an indoor cleaning robot determines which cleaning tools to operate based on the driving surface type, wherein a vacuum is operated on carpet and a wet mop is operated on hardwood or tile.

In some embodiments, granularization data is used to deduce conclusions on detection of a stall condition of various actuators. In some embodiments, special conditions are detected based on feedback from actuators, which is distinct and different from gathered sensor information. Feedback from actuators and gathered sensor data may be fused together with a Bayesian network. In some embodiments, an impeller motor speed is adjusted based on environmental conditions, such as floor type, a motor jam, a wheel jam, or a stuck state. Some embodiments adjust motor voltages at runtime based on actual battery voltages of the robot in combination with basic fixed pulse width modulation (PWM) frequency. In prior art, electrical current draws are used in formulating conclusions, wherein current drawn by a wheel motor spikes when the robot is operating on a high friction surface. However, electrical current draws provide less reliability as spikes are short lived, inconsistent, show variations, and are not easily detectable with an umbrella one-fits-all strategy. For example, electrical current drawn varies for different types of motors, driving surfaces, etc. and has a different spike duration for different conditions. As such, the wave forms of current exhibited do not generalize well with basic algorithms. In some embodiments, signal signatures are determined during a development phase and used in operation of the robot. Some embodiments use accurate signal conditioning and statistical methods to interpret the minuet behaviors. In some embodiments, a previously extracted baseline of a signal signature is used as a seed value during operation of the robot and is refined in the real time using machine learning. First order and second order derivative data may be used to mark the beginning of a rate change in a signal, after which the incoming data may be examined and compared with the baseline signal signature. Signal signature information may be combined with explicitly sensed data, such as light, sound, and sonar reflections and degree of scatter off of the floor. Baselines and signatures may be established for various types of sensed data. The various types of data may be used independently or in combination within one another, wherein the number of types of data used depends on how mission critical the robot is. The sensor data may be used in other contexts as well, wherein detection of data deviations may indicate a jammed state of a wheel motor or a brush motor, a floor type, and other environmental characteristics of the robot. In another example, the sensor data is used to adjust brush motor voltages at runtime based on actual battery voltages of the robot, rather than using fixed PWM frequency.

Figure 123:
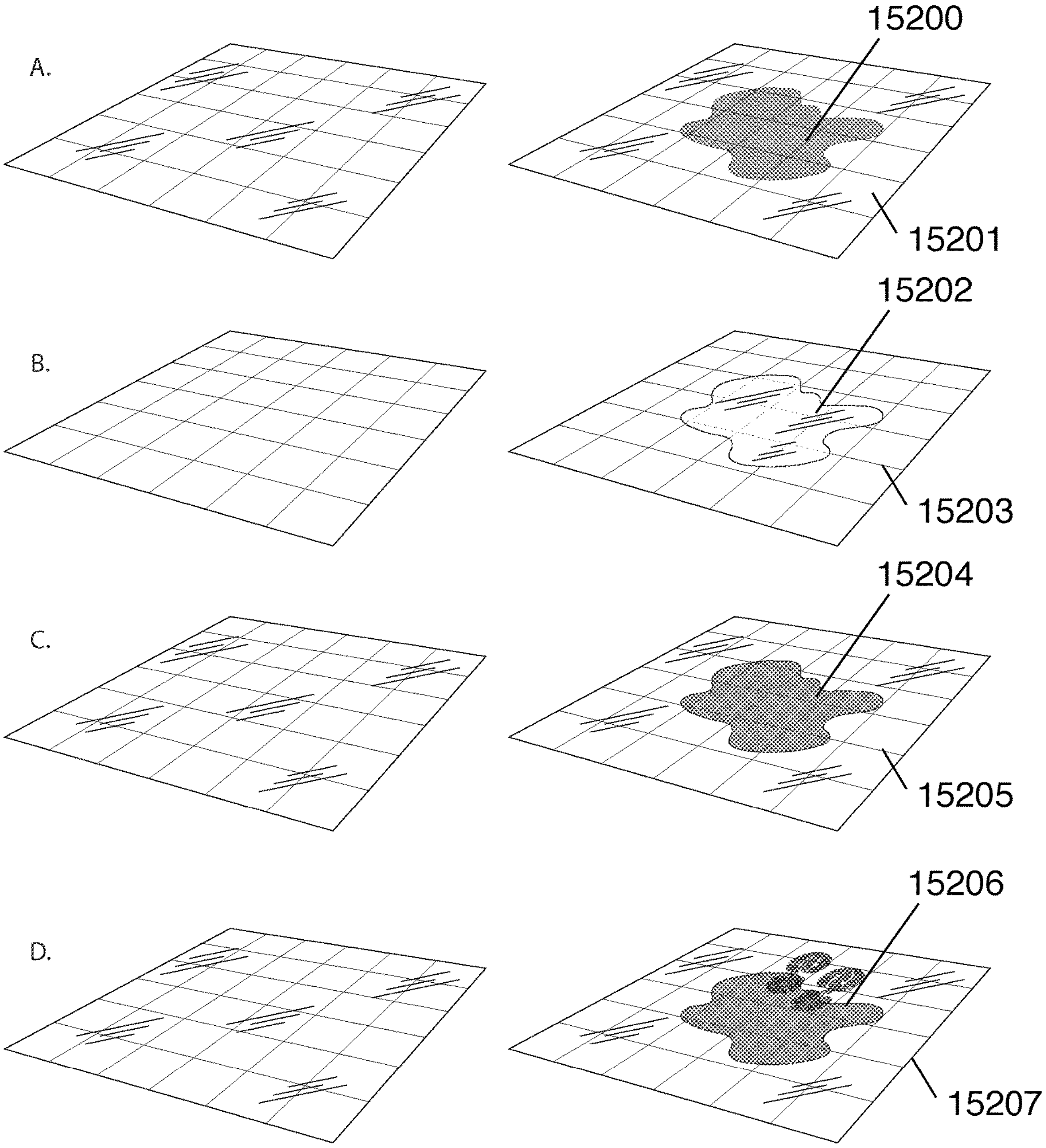
FIG. 123 illustrates an example of using reflectivity of a floor as an indicator of floor status.

Within commercial facilities, such as a supermarket, the cleaning robot usually has a larger footprint and is designed to move slowly to cover floors more thoroughly. The cleaning robot also cleans the floors routinely and may not tend to the sticky or dirty areas in reasonable time. FIG. 123 illustrates A. a dirty spot 15200 reducing a reflectivity of an area of floor 15201 coinciding with the dirty spot 15200, B. a wet spot 15202 increasing a reflectivity of an area of floor 15203 coinciding with the wet spot 15202, C. a color or glossiness of a spot 15204 indicating a dirty area of a floor 15205, and D. a color and shape of a spot 15206 indicating a slippery or sticky area of a floor 15207.

Figure 124:
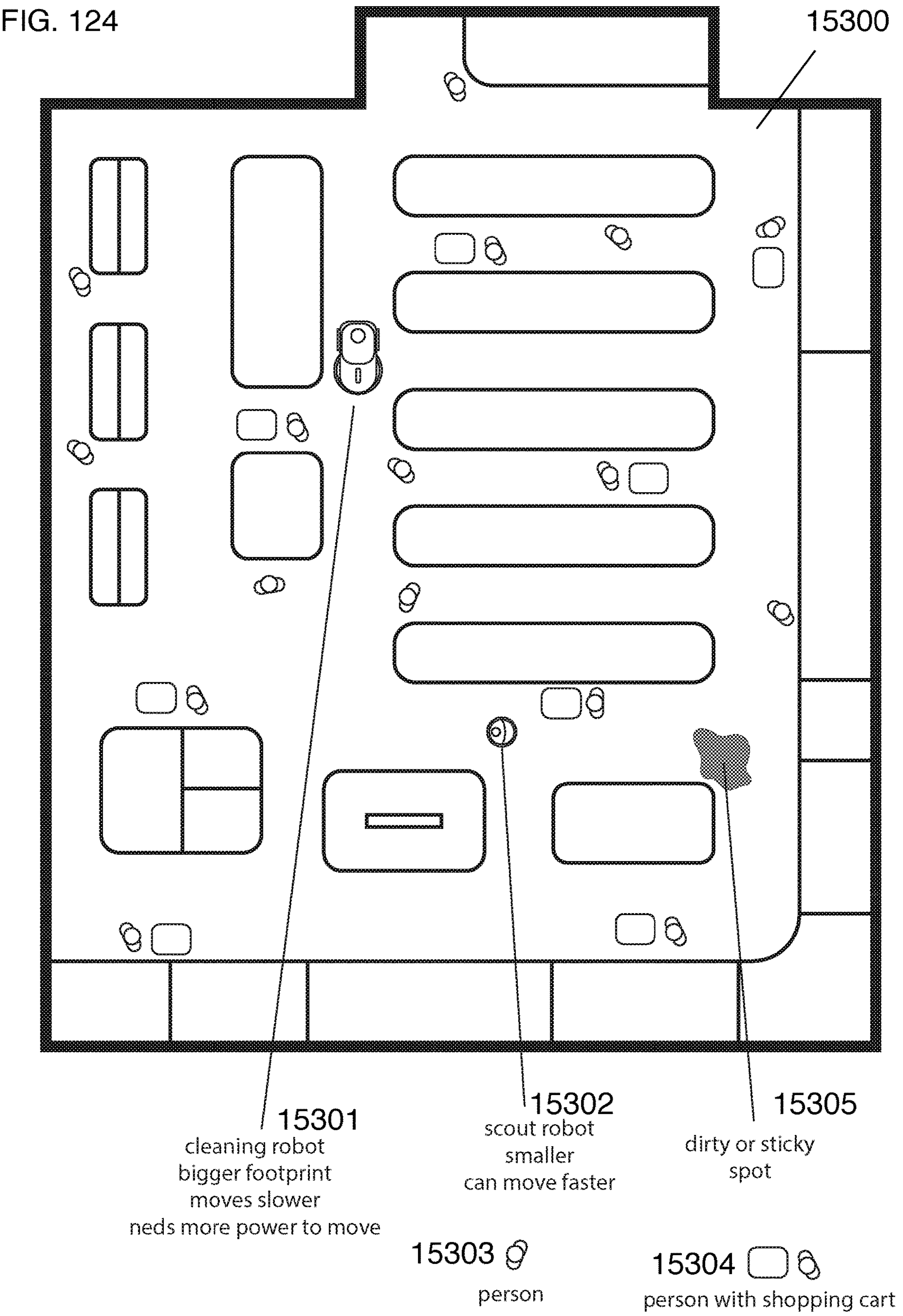
FIGS. 124 and 125 illustrate an example of a cleaning robot and a scout robot.
Figure 125:
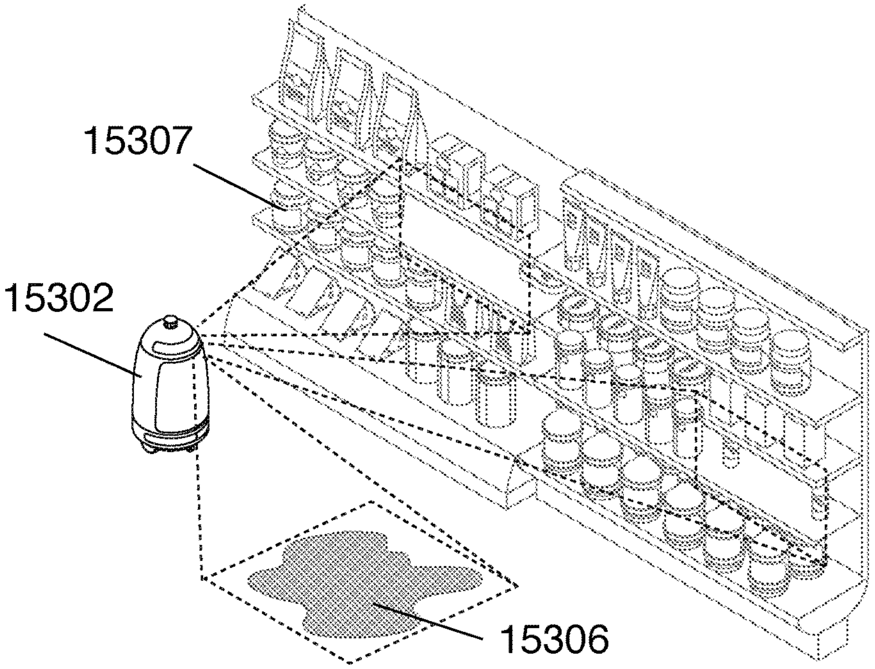

Further, given the larger size of the robot, navigation of the robot while searching for areas of dirt accumulation may not be cost efficient. In some embodiments, a secondary scout robot detects changes in the environment, such as those changes in floor characteristics described above. The scout robot uses using collaborative AI technology to communicate with the larger cleaning robot upon approaching or observing a dirty area. The scout robot is smaller, faster, and equipped with more sophisticated sensors to detect changes in the environment including and beyond those related to floor types. FIG. 124 illustrates a supermarket 15300, a cleaning robot 15301, a scout robot 15302, persons 15303, shopping carts 15304, and a dirty or sticky spot 15305 with surface characteristics that differ from a floor of the supermarket. The scout robot 15302 moves faster and is more cost-effective due to its smaller size in comparison to the larger cleaning robot 15301 designed to move slower to cover areas it is cleaning. The scout robot 15302 easily navigates through indoor traffic of shoppers and staff as well. In one example, the scout robot uses sensors to observe shelves of a supermarket, determine inventory based on the observation, and provide notification for restocking items with low inventory. The notification for restocking may be provided to another robot, a person via an application of a communication device paired with the robot, or an in store fleet control for transmission of the restocking notification to another robot or person. FIG. 125 illustrates the scout robot 15302 observing a spot 15306 with floor characteristics that differ from the floor of the supermarket and items 15307 for determining their inventory and determining which items need restocking. The scout robot 15302 may tend to the spot 15306 immediately or provide notification that the area of the spot 15306 requires attention. In another example, the scout robot uses sensors to observe status of items or areas for purpose of maintenance, such as broken lamps, misplaced items, temperature controlled areas, etc. In another example, the scout robot checks for item quality. For instance, the scout robot checks produce (i.e., fruits and vegetables) quality by visually observing the produce for indicators of quality, such as changes in color or bugs/flies surrounding the produce, or by detecting unwanted odors. In some embodiments, the scout robot moves on the floor, while in other embodiments, the scout robot is a drone robot that flies above customer traffic, or moves using a combination.

Predictions of obstacles or active participants becoming an obstacle in a future state of the robot may turn out to be true or false. Embodiments determine precision by dividing true positives by a sum of the true positives and false negatives. Embodiments determine recall and sensitivity by dividing true positives by false negatives. Embodiments determine specificity by dividing true negatives by a sum of true negatives and false positives. An ROC curve demonstrates a tradeoff between sensitivity and false positive rate. In some embodiments, a camera, stereo cameras, or other sophisticated device for collection of data over a period of time is used to find, track, and predict future locations of an active participant. In some embodiments, dimension reduction uses methods to find a new set of feature vectors where the data spread aligns well in a direction of the feature vectors and analyzes the data based on an order of such alignment, wherein the data points have maximum variance in a first feature vector (with maximum information) and a minimum variance in a last feature vector (with minimum information).

In some embodiments, the vector field map is used to predict where in the environment a robot (e.g., cleaning robot) should position itself to provide a maximum efficiency performing work (e.g., cleaning). For example, in a supermarket, a probability of a mess occurring is greater in the egg isle in comparison to the potato chips isle based on historical data. In response, a processor of a cleaning robot plans a cleaning path of the robot such that the robot is close to the dairy section during peak hours. One example includes a method for maximizing efficiency of a fleet of autonomous passenger pod chassis based on predicting demand for pickup requests in a passenger pod and historical data of demand and locations and times of previous pickup requests. For example, in the morning there is a high demand for pickup requests within residential areas as residents need a ride to work or school while in the afternoon there is high demand in city centers where workplaces and schools are located as people need rides back home at the end of the work or school day. AI based autonomous scheduling may be used for scheduling of various types of robots or a towing robot. Robots operating within a same environment may collaborate to, for example, execute path planning and work division, using peer to peer communications or using a server to oversee and control the robots.

To provide a maximum efficiency in performing work, various factors, in addition to those described above, are considered. For example, in addition to considering a current location and a prediction of user demand, a battery charge level, a capacity (e.g., maximum number of passengers or maximum payload), a type (e.g., comprises a work desk and a computer, a TV, a fridge, storage, a food warming module, etc.) are considered in determining actions of one or more robots (e.g., a fleet of food delivery robots). For a fleet of commercial cleaning robots, additional factors such as detergent supply, dustbin volume, dirty water bin volume, prediction for future availability of service, and prediction for future availability of charging stations are considered in determining actions of the robots to maximize service efficiency. For semi-autonomous or manually operated robots, predictions provide suggestions to a human operator (e.g., a physical driver of a robot or a remote driver driving or assisting in driving a robot using an application executed on a computing device from a remote location such as a home or central facility).

Figure 126:
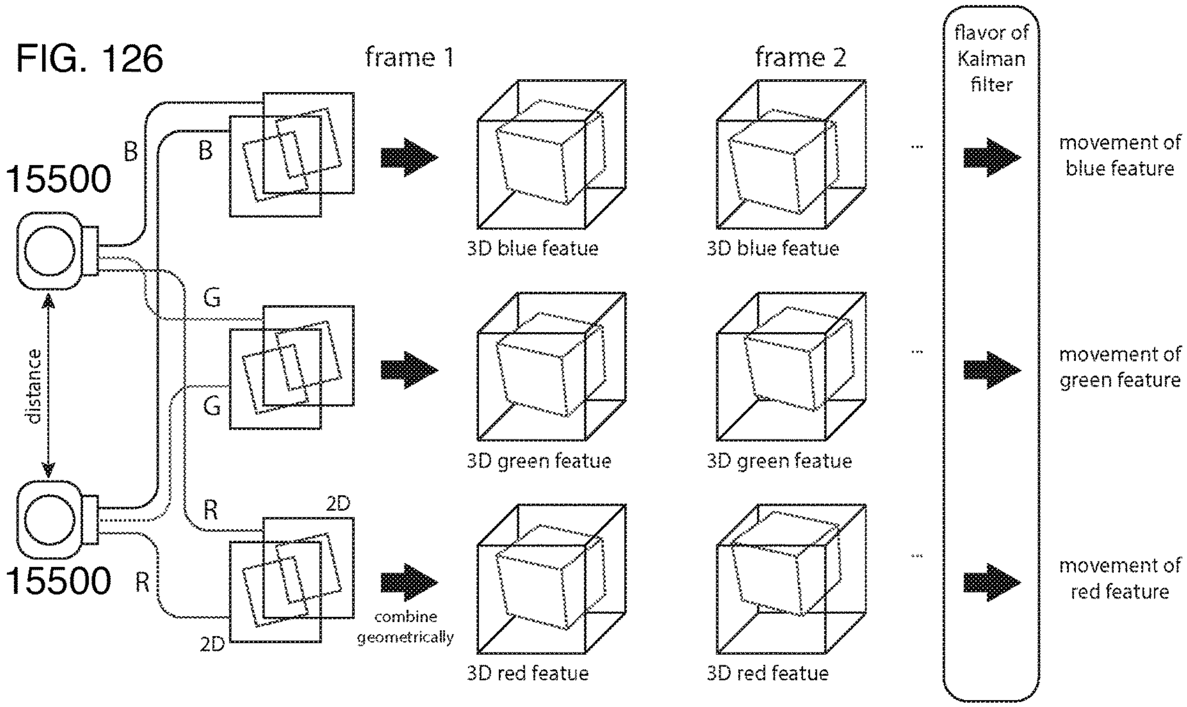

In some embodiments, each data channel is processed for a different clue or feature during image analysis. For example, data output from red, green, and blue (R, G, B) channels are each processed for a specific feature. The green channel is processed for feature 1, wherein feature 1 is detected and tracked from frame to frame using a tracking method, such as Lukas Kanade. In a different channel, such as the red channel, a different feature, feature 2, is dominant and tracked from frame to frame. As such, multiple features are tracked, wherein each channel tracks only one feature. In some embodiments, multiple cameras capture data and corresponding channels are combined based on a geometric association between the cameras defined by a base distance and angle of FOV of the cameras. FIG. 126 illustrates two cameras 15500 positioned a distance from each other. Each camera outputs R, G, and B channels and corresponding channels from each of the cameras 15500 are combined based on a geometric association between the cameras 15500, in this case the distance between the cameras 15500. Each channel tracks a different feature from frame to frame and using a Kalman filter, wherein movement of the tracked features is provided as output. FIG. 127 illustrates the same concept as FIG. 126, however, 2D point cloud data 15501 captured by a 2D LIDAR sensor 15502 is also combined with corresponding R, G, B channels tracking the features based on a geometric association between the cameras 15500 and the LIDAR sensor 15502. FIG. 128 illustrates the same concept as FIG. 126, however, 3D point cloud data 15503 is also combined with corresponding R, G, B tracking the features based on a geometric association between the cameras 15500 and the LIDAR sensor 15504. Different objects or features may naturally be more visible in one channel in comparison to other channels, which may decide the feature tracked by a channel. Alternatively, a feature tracked by a channel is predetermined and preset.

Color spaces provide visualization of all possible colors (in general or in relation to a device) in a 2D or 3D coordinate space. Each dimension of the coordinate system represents one aspect of color properties. Color spaces may be built based on different color models. CIELAB (or LAB) color space expresses color using three values L, a, and b, wherein L represents lightness and a and b represent the four unique colors of human vision, a representing red and green and b representing blue and yellow. CIELAB is intended to be a perceptually uniform color space where a given numerical change corresponds to a similar perceived change in color. It is useful in spotting small differences in color. RGB color model describes each color by its chromaticity components, red, green, and blue. It is a useful additive model for reproducing colors in various displays (CRT and LED). Some common RGB color spaces include standard RGB, intended as a common color space for displaying and viewing images on the internet; Adobe RGB, designed to encompass most of the color achievable on CMYK color printers using RGB values thereby increasing the accuracy and coherency of colors seen on a display device and printed colors and encompassing 50.6% of visible colors specified by LAB color space); Adobe Wide Gamut RGB, capable of storing a wider range of color values in comparison to standard RGB and encompassing 77.6% of visible colors specified by LAB color space; and ProPhoto RGB, offering a large gamut designed for photographic purposes and encompassing over 90% of visible colors specified by LAB color space and 100% of likely occurring real-world surface colors. Some other RGB color spaces include scRGB, SCI-P3 (used for digital movie projection), SMPTE 240M/SMPTE "C" (used in NTSC analog TVs), Rec. 601 (used for SDTV), Rec 709 (used for HDTV), Rec 2020 (used for UHDTV). In the RGB color model, lightness and chroma are linked to one another, wherein an increase in the value of R, G or B causes an increase in the brightness. YUV is the analog and YCbCr is the digital method attempting to separate lightness from chroma signals in an RGB input. Human eyes have less resolution in their color perception compared to lightness perception. By separating lightness from chroma values in YUV and YCbCr, the chroma values can be compressed to occupy less space without reducing the perceived quality of the image drastically. It is also beneficial to have the lightness information of the image in a separate channel for further manipulation or processing.

Some embodiments apply segmentation of foreground and background. For example, an image sensor disposed on the robot captures an image of a wall (i.e., a background) and one or more objects such as furniture, socks, a cord, etc. The processor of the robot uses pixel similarities and spatial proximity to separate the image to different segments. Some embodiments partition size of groups with similarity and proximity to cut costs using methods such as K-means clustering, Chan-Vese model energy, wherein a collection of closed curves separates the image into regions, and other clustering methods.

Figure 129:
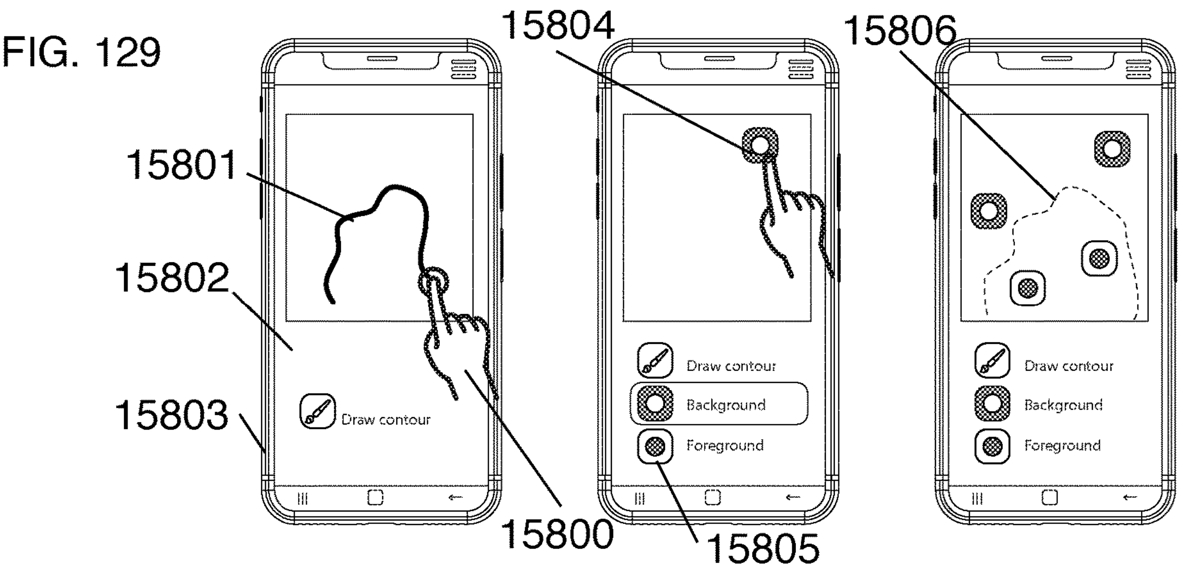
FIG. 129 illustrates a user drawing a contour using an application of a communication device.
Figure 130:
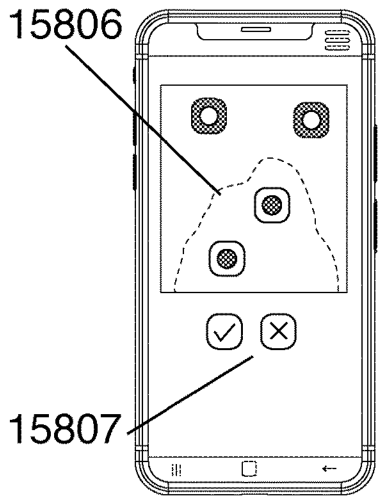
FIGS. 130 and 131 illustrate an application of a communication device displaying a segment cut and a correction to the segment cut, respectively.
Figure 131:
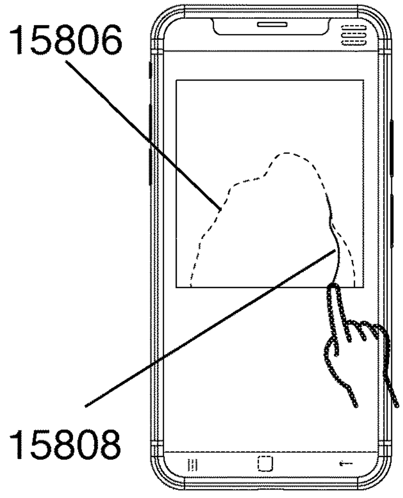

Some embodiments use a graph cut to segment an image. A graph cut splits a directed graph into two or more disconnected graphs. Using a graph cut an image is segmented into two or more regions, wherein similar pixels in close proximity to each other remain in a same segment. In embodiments, cost of a graph cut is determined as a sum of edge weights of the cuts, wherein the cut comprises a subset of all edges. In embodiments, the edges selected are within the cut set such that the sum of the edge weights is minimized. In some embodiments, a source node and sink node (i.e., vertex) are used and only a subset of edges separating the source node and sink node are viable options to form a cut set. Some embodiments employ maximum flow and minimum cut theorem, wherein finding a minimum weight cut is equivalent to finding the maximum flow running between the sink node and the source node. Some embodiments select a sink node such that every pixel node has an outgoing edge to the sink node and select a source node such that every pixel node has an incoming edge from the source node, wherein every pixel node has one incoming edge and one outgoing edge to each of its neighbor pixels. Each pixel connects to the foreground and background (i.e., the source and the sink, respectively), with weights having an equal probability. In some embodiments, pixel similarities are weighted and an algorithm executed by the processor decides a contour of a segment cut. In some embodiments, an online version of a segment cut is combined with a previously trained algorithm. For example, FIG. 129 illustrates an operator 15800 drawing a contour 15801 using an application 15802 of a communication device 15803 during a training session. Alternatively, or in addition, the operator 15800 places an icon 15804 to label an area as background and an icon 15805 to label an area as foreground. Alternatively, or in addition, the operator is presented with a segment cut 15806 and the operator 15800 provides feedback 15807 on the segment cut 15806, as illustrated in FIG. 130, or provides a score reflecting the feedback. Alternatively, or in addition, the segment cut 15806 is presented to the operator 15800 and the operator 15800 provides a correction 15808 to the segment cut 15808, as illustrated in FIG. 131.

Segmentation of foreground and background is easiest when the robot is stationary, however, motion blur occurs as moving objects in the scene cause fluctuating pixel values which influence the spatial and proximity methods described. Some embodiments employ motion compensation using a range of methods, such as phase image differences when the robot moves linearly in relation to the environment or the environment moves linearly in relation to the stationary robot. In cases where the robot moves with constant speed and some objects within the environment move, sensors of the robot observe linear change in relation to the fixed environment but not in relation to the moving objects. Some embodiments employ opposite FOV optical flow analysis to identify and distinguish moving objects from the stationary environment, however, the blur from motion still remains a challenge with the above-described methods. In some embodiments, as a complementary measure, a TOF camera captures distances to objects. Although distance measurements also blur as a result of motion, the additional information contributes to an increasingly crisp separation. In addition, in some embodiments, an illumination light with a modulation frequency emitted and phase shift of the returning signal is measured. When an incoherent IR light is emitted, the frequency is changed at different time stamps and each frequency is compared with the frequency of the respective returned IR light.

While the blur effect worsens at higher robot and/or object speeds, in some embodiments, knowledge of movement of the robot via sensor data helps transpose the pixel values as a function of time, a function of measured motion, or a weighted combination of both functions. In embodiments, a transpose function of raw pixel values of pixels is defined to shift the pixel values linearly and according to a motion model, which is verified with new sensor data input at a next time step. In some embodiments, there is more than one candidate transpose function. In some embodiments, sum of squared differences is used to select the best transpose function from all candidate transpose functions. A transpose function may include a linear component and an angular component. In some embodiments, optical flow is used to estimate the transpose function when the robot is vision-based. During movement, the robot may not end at a location intended by a control system of the robot, however the control commands of the control system may be used to predict a range of possible transpose functions, thereby reducing the search space. In some embodiments, various methods and techniques may be combined, such as multiple phase shift imaging and phase unwrapping methods, or a Fourier transform may be used to model the phase nature of such methods.

Figure 132:
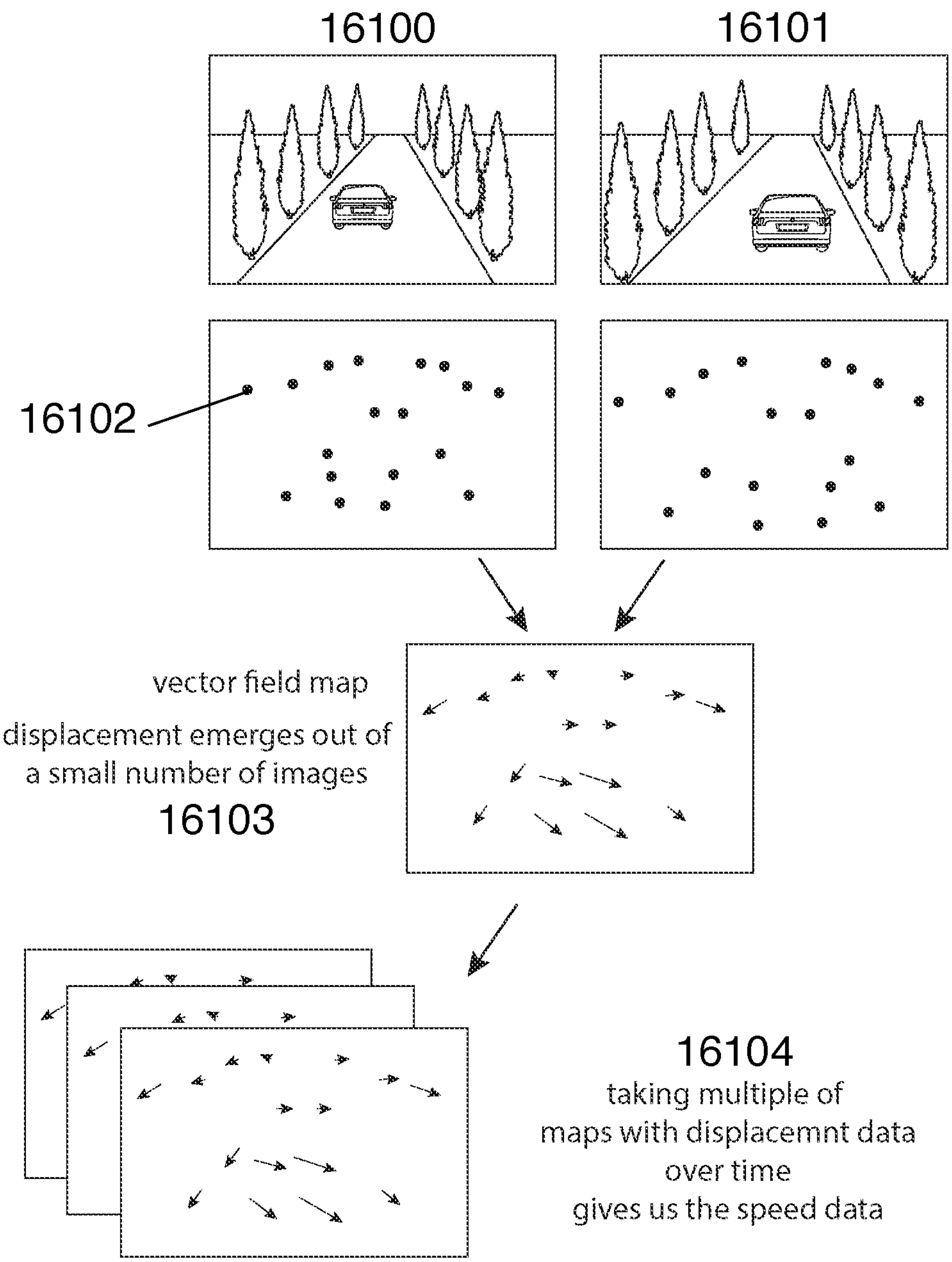
FIG. 132 illustrates an example of generating a vector field map.

Some embodiments use a vector field map generated from associating two consecutive images or a sequence of images describing an evolution of pixels and their relation to displacement, speed, and direction of the robot. FIG. 132 illustrates consecutive images 16100 and 16101, pixels 16102 of the images 16100 and 16101 corresponding to objects at different depths, and vector field map 16103 generated from images 16100 and 16101 from which displacement is determined. Speed is determined based on multiple vector field maps 16104. Some embodiments follow a contour of colors and shapes. Some embodiments separate closed contours from open contours. Some embodiments separate internal contours from external contours. Some embodiments compare a dominance of all closed shapes in terms of vividness, size, and distinct borders, assign a weight to the closed shapes, normalize, and select one closed shape to follow or track. Some embodiments select one or more closed shapes as feasible successors. Some embodiments track feasible successors with lower resolution to reduce computational intensity. For computational purposes, simple geometric shapes may be preferred, such as a square, a blob, a circle, an oval, a rectangle, and a triangle. In some embodiments, a tracking function inspects the contour being followed at intervals to ensure it is not another similar contour belonging to a different object.

Some embodiments use polyadic arrangement of layers, synaptic connection, and homodyne AM modulation. Some embodiments use semantic segmentation, wherein each segment is associated to a specific category of objects. Some embodiments use semantic depth segmentation, wherein each segment is associated to a depth value. Each type of segmentation may be used to enhance the other or used separately for different purposes. Some embodiments use scene segmentation, wherein scene elements are separated from the rest of the image. For example, a grass lawn is separated from the rest of the scene, helping a mowing robot correctly mow the lawn. In another example, a floor of a shopping mall or grocery store is separated to determine presence or absence of an object, person, or a spill. For instance, in a training session, the floor is observed to include particular color characteristics, luminance, and such. When an area of the floor is dirty or has a spill on it during a later session, the floor segmented from a captured image has different pixel values compared to those from images captured during the training session. As such, the processor can infer the area is dirty or a spill occurred. In embodiments, a training session accounts for various lighting conditions within an environment. In some embodiments, a floor is an advantageous color, texture, and material. For example, a factory uses a green floor color as it is advantageous when separating the floor from other objects in the scene.

In the simplest embodiment, a pixel is assigned a probability of belonging to foreground, background, or unclassified. In a more sophisticated embodiment, multiple depth intervals are defined. Each interval is related to the resolution of the distance measurement. The algorithm sweeps through each pixel of the image, determines an associated probability for each pixel, and performs a classification. For better performance and less computational burden, some pixels may be grouped together and analyzed in a batch. In some embodiments, the probability is determined based on at least neighboring pixel values and probabilities and/or distance measurements associated with pixels. In some embodiments, only pixels of importance are examined. For example, pixels subject to motion blur need resolution as to whether they belong to foreground or background. In some embodiments, depth values known for some pixels are extrapolated to other pixels based on color segmentation, contour segmentation, and edge finding. In some embodiments, a depth sensor associates four data elements with each pixel, depth and R, G, B.

Figure 133:
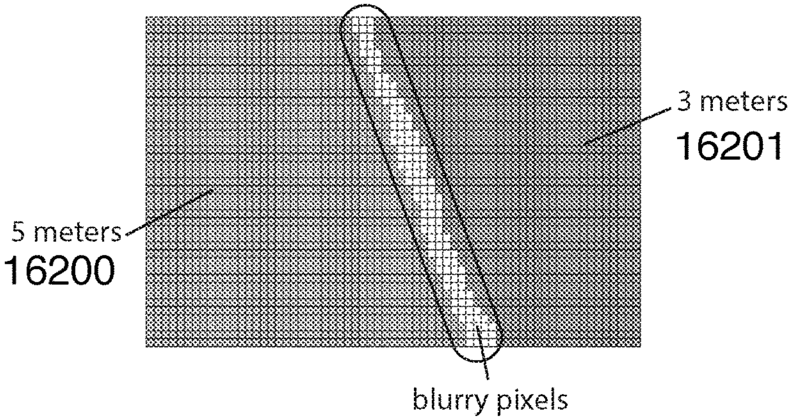
FIG. 133 illustrates resolving blurry pixels into a group.

As the robot moves, motion blur occurs and the blurry pixels require identification as foreground or background in relation to pixels surrounding them. FIG. 133 illustrates an image with pixel 16200 corresponding to depth of 5 meters and pixels 16201 corresponding to depth of 3 meters. Blurry pixels need to be resolved into one or the other group of pixels. Before or after such resolution occurs, each pixel may have a probabilistic confidence score associated with it. In some embodiments, each pixel is a node in a graph, wherein the edges provide a relation between the connected nodes. In some embodiments, a cost function relates depth values read with color values read. Alternatively, depth values are compared against a combined metric derived from R, G, B, such as grayscale or a more complex metric. Motion blur occurs due to movement of the robot and movement of objects and dynamic obstacles (e.g., people, pets, cars, bikes, etc.). In some embodiments, Gaussian Mixture Model, Bayesian methods, and/or statistical weight assignment, are used in one, two or all four data channels (i.e., depth, R, G, B) for improved segmentation. In some embodiments, an HD map, prior training phase map, and/or a vector field map are created with readings captured during an absence of dynamic obstacles, readings captured with a slow-moving robot, or readings captured with highly accurate sensors. In subsequent work sessions, such as cleaning, inventory, item transportation, etc. work sessions, the processor of the robot uses previously captured readings as a ground truth reference.

Figure 134:
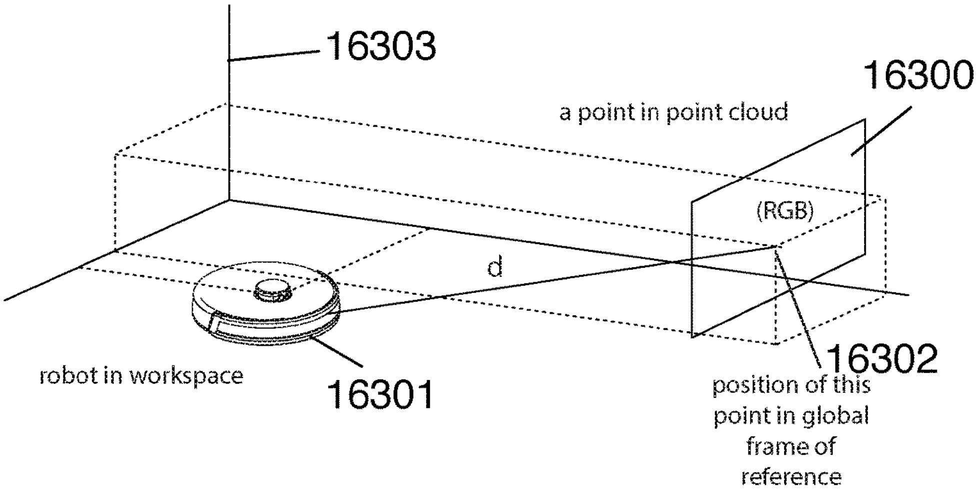
FIG. 134 illustrates an example of associating pixels with depth.

Some embodiments use a depth image as a stencil to shape or mold a color image. A depth image may be visualized as a grayscale image, has more clear-cut boundaries, and is unaffected by texture and pattern. Challenges remain in touching objects or depth camouflage. In embodiments, a pixel of a 2D image is associated with R, G, B color values that may be used as an input for various processing algorithms. In embodiments considering depth (d), a six-dimensional data structure is formed, wherein instead of associating R, G, B values to an i, j pixel, R, G, B values are associated with an i, j, and d pixel. When such data is used in creating a map of the environment, an outside frame of reference is used. Therefore, depth is translated into a 3D coordinate system of the environment within which the robot is moving. R, G, B values are associated with the translated depth coordinate in the frame of reference of the environment. This is equivalent to creating a colored map from a colored point cloud. FIG. 134 illustrates an image 16300 captured within an environment of the robot 16301. A pixel 16302 within the image is at a depth d in a frame of reference of the depth sensor. A processor of the robot translates the depth d into a global frame of reference 16303 of the environment and associates the translated depth d with R, G, B values of the pixel 16302.

Figure 135:
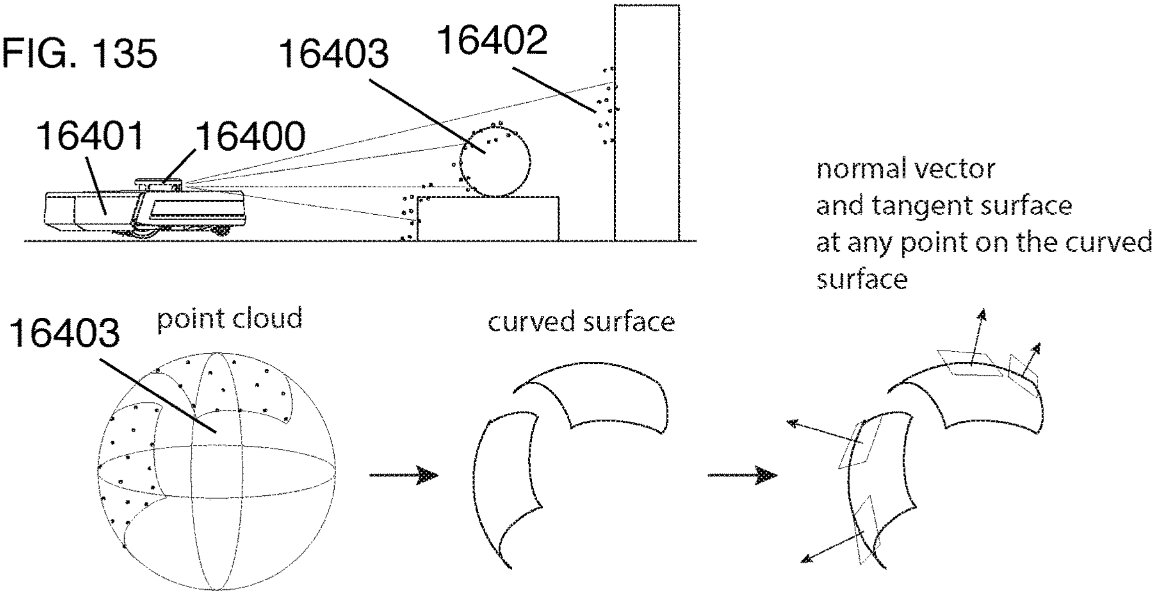
FIG. 135 illustrates a sensor of a robot capturing point cloud data to analyze an object.

Clustering may be performed on a pixel for depth, color, or grayscale. Examples of clustering methods include K-means, mean-shift, and spectral clustering. Derivatives and gradient, intensity, and amplitude of depth measurement may be used in understanding how objects in a scene are related or unrelated. For example, FIG. 135 illustrates a sensor 16400 of the robot 16401 capturing point cloud data 16402. The point cloud of object 16403 is analyzed to determine the object 16403 is curved. At any point on the surface, gradient of depth is normal to the surface which may be used in distinguishing the object 16403 from others in the environment. In some embodiments, features are extracted using SIFT, HOG, CANNY, etc, methods and are crafted manually. In some embodiments, a raw image is provided as input to a deep network for preprocessing before classification of pixels. Classification methods such as Randomized Decision Forest, SVM, Conditional Random Field, etc. may be used to categorize pixels into depth categories/depth segmentations, wherein there is a depth value for each pixel and/or an object label for each pixel. In addition to pixels having depth and object labels, other labels, such as dynamic or stationary labels, approaching or moving away labels, speed of approach labels, direction of approach labels may be defined.

Figure 136:
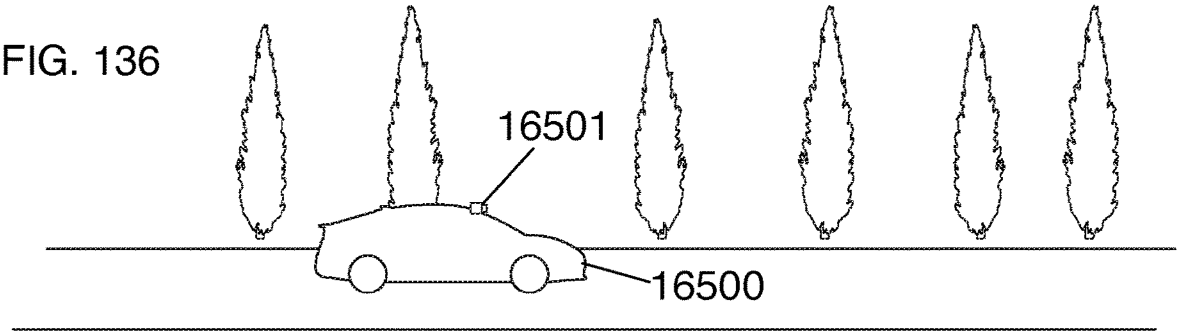
FIGS. 136-138 illustrate an autonomous vehicle with variations of a front-facing and backwards-facing camera.
Figure 137:
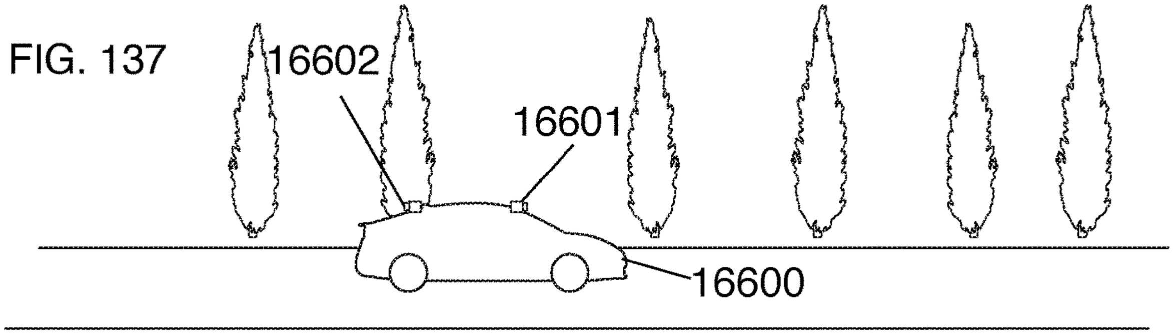
Figure 138:
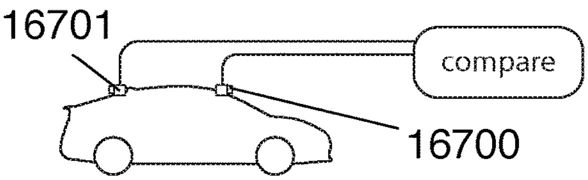

In some embodiments, a foreground camera captures images of the environment, including objects the robot is moving towards and the objects moving in front of the robot. FIG. 136 illustrates an autonomous vehicle 16500 with a front-facing camera 16501 capturing images of surroundings and objects in front of the vehicle 16500. When a neural network is used to process the motion of the robot in relation to the environment, dynamic obstacles may influence the perceived motion. A backwards-facing image capturing device takes images of a path or areas the robot has already passed. When this information is provided as input to the neural network, it provides pixel variations resulting from movement of dynamic obstacles behind the robot as well as the motion of the robot in relation to the environment. FIG. 137 illustrates the autonomous vehicle 16600 with the front-facing camera 16601 as well as a backwards-facing camera 16602. A comparison of the pixel evolution in images captured using the front camera and the rear camera agree on the motion of the robot in relation to the environment. As a result, when the image trend of images captured by the front camera does not agree with the image trend of images captured by the rear camera, a dynamic obstacle is inferred to be present. FIG. 138 illustrates images from the front-facing camera 16700 and the backwards-facing camera 16701 being compared.

A comparison of a front camera optical flow against a rear camera optical flow does not require use of a neural network based algorithm. In some embodiments, a differential of the front camera and the rear camera optical flow is based on engineered features (e.g., an edge) and tracking algorithms (e.g., Lucas Kanade or other tracking algorithms). While a feature detected and tracked by the front camera is different from a feature detected and tracked by the rear camera, movement of the robot in relation to the tracked feature and the corresponding visual motion tracking agrees, but in opposite directions. In some embodiments, such comparison is implemented to account for visual motion tracking resulting from motion of the robot itself and motion of objects within the surroundings.

Figure 139:
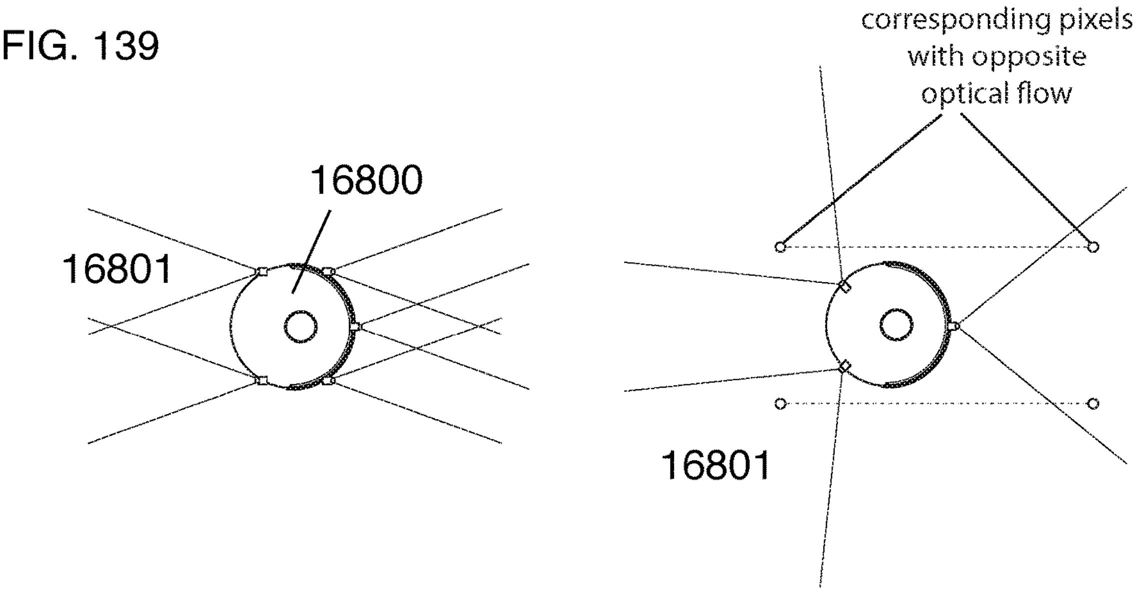
FIG. 139 illustrates positioning of sensors on a robot.
Figure 140:
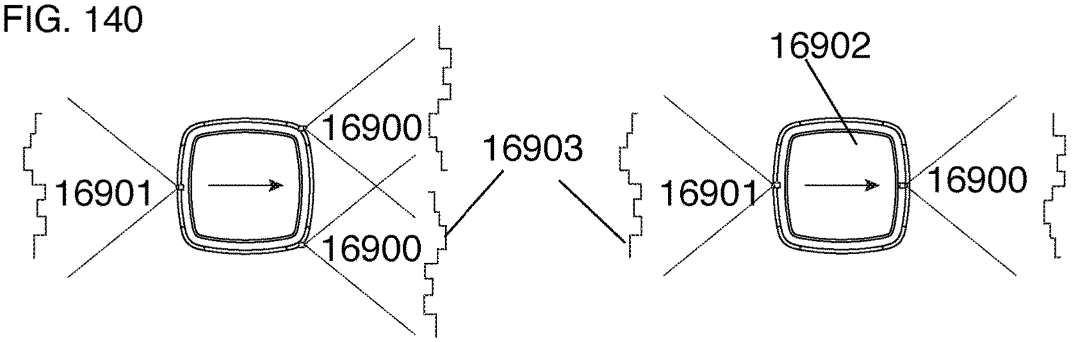
FIG. 140 illustrates a robot including a front-facing and backwards-facing camera.
Figure 141:
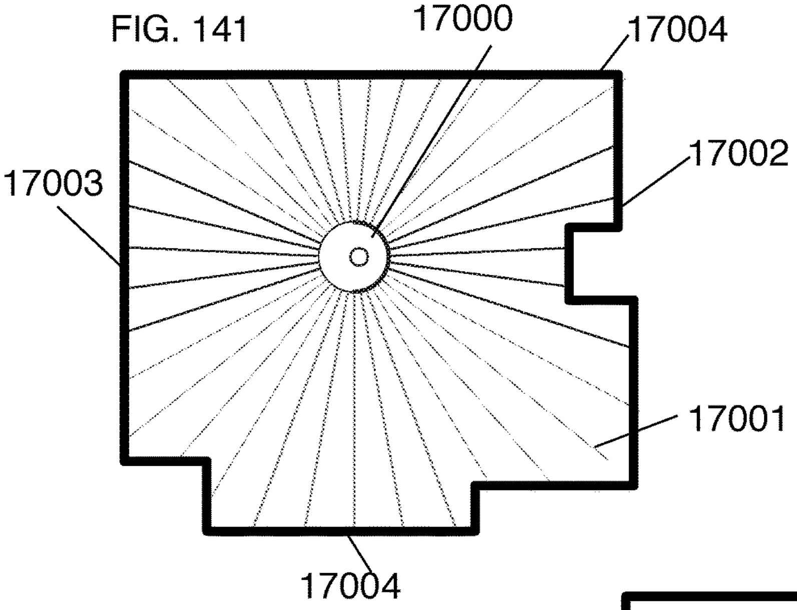
FIG. 141 illustrates a robot including a LIDAR.
Figure 142:
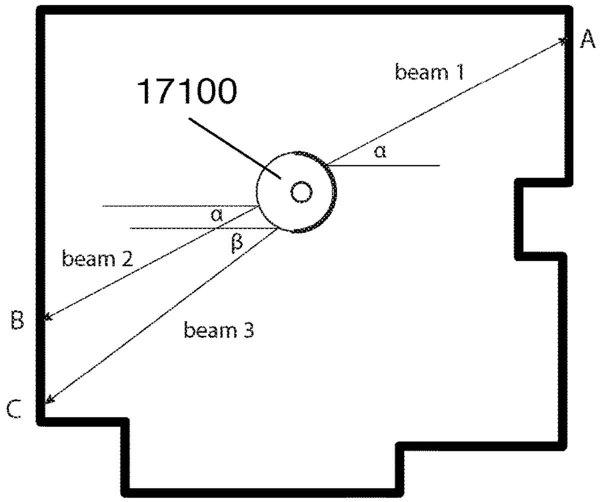
FIG. 142 illustrates angular measurement of light beams of a LIDAR disposed on a robot.
Figure 143:
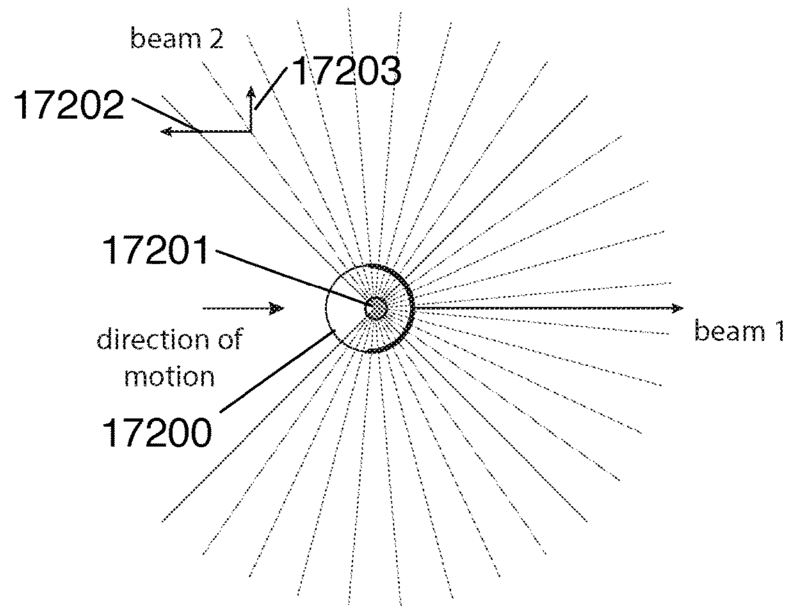
FIG. 143 illustrates a robot including a LIDAR.

The placement of cameras in a front and a rear of the robot is merely for simplification of the concept. In other implementations, cameras may be positioned elsewhere on the robot. Any radially placed camera may provide, to an extent, an outcome similar to that shown in FIG. 139, wherein the robot 16800 includes sensors with FOVs 16801. The type of sensors used may also vary, wherein two or more strategically placed line laser distance measurement devices may provide the same outcome as cameras. However, it is important that the rate and speed at which robot is approaching a stationary structural surrounding is the same as the rate and speed at which the robot is moving away from the stationary structural surrounding. For example, FIG. 140 illustrates front-facing cameras 16900 and rear-facing cameras 16901 of the robot 16902 observing the structural stationary structure 16903 at a same rate and speed, wherein the structure appears opposite in comparison to the front-facing camera 16901 when observed by the rear-facing camera 16902. A 360-degrees LIDAR or a LIDAR a smaller FOV may provide similar information as the cameras 16901 and 16902. For example, FIG. 141 illustrates a robot 17000 with a LIDAR sensor emitting light beams 17001. As the robot moves forward, the measured distances to the wall 17002 in the front of the robot are decreasing at a same rate as the measured distances to the wall 17003 behind the robot are increasing, while the measured distances to walls 17004 remain the same. Triangulation may be used to determine the rate of change of measured distance for each angular resolution. FIG. 142 illustrates a light beam 1 positioned at an angle $\alpha$ with respect to a direction of motion of the robot 17100. A distance to point A is reduced proportionally to the angle $\alpha$. A light beam 2 is positioned at an angle $\alpha$ with respect to the direction of motion of the robot 17100. A distance to point B increases proportionally to the angle $\alpha$. A LIDAR sensor with a 360-degrees fOV is not required. FIG. 143 illustrates the robot 17200 with a LIDAR 17201 with a 270-degrees fOV. In this case, light beam 2 is used to measure distances that change with respect to time, a horizontal component 17202 and a vertical component 17203, the horizontal component 17202 being opposite to the direction of motion. In FIG. 142, light beam 3 is positioned at an angle $\beta$ with respect to a direction of direction of motion of the robot 17200. A distance to point C changes proportionally to the angle $\beta$.

Figure 144:
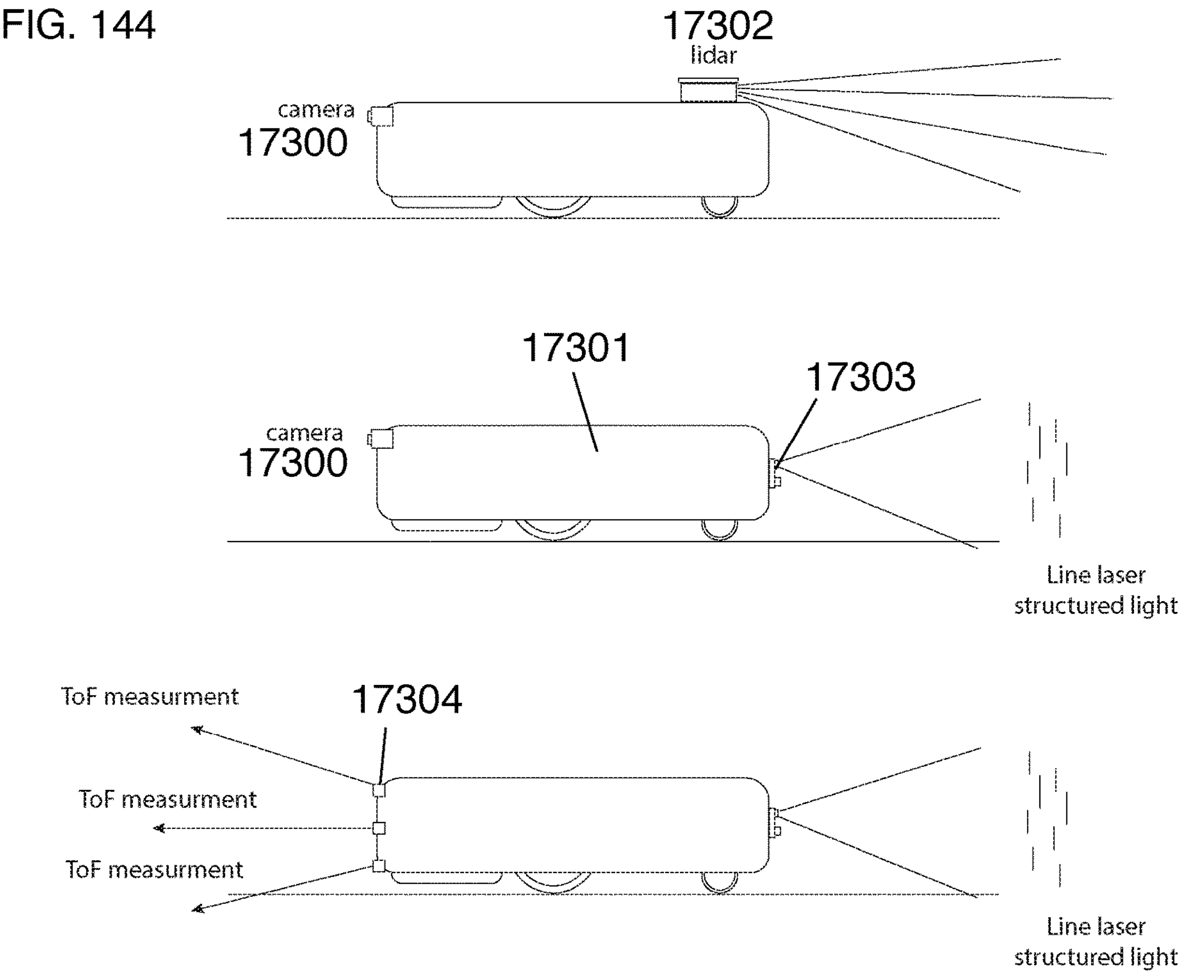
FIG. 144 illustrates various sensors that may be used by a robot to measure distance.

Some embodiments segment LIDAR light beams dynamically or statically. Compare the LIDAR readings as the robot moves provides valuable information. Two different kinds of sensors may be used in tracking speeds in opposite direction and isolating changes resulting from motion of the robot or a dynamic obstacle. For example, a LIDAR may be disposed in a front portion of the robot and a camera may be positioned to observe a rear of the robot. FIG. 144 illustrates example of different sensors that may be used. A camera 17300 may be positioned on a rear of a robot 17301 and a LIDAR 17302 or a line laser distance measuring device 17303 may be positioned to observe in front of the robot 17301. Or the line laser distance measuring device 17303 may be positioned to observe in front of the robot 17301 may be combined with TOF sensors 17304 positioned in a rear of the robot. In examples herein, only linear movement and tracking motion in opposite directions for decoupling measurement relating to the robot movement and obstacles are discussed, however, with simple triangulation and geometry, angular displacement and rotation may be computed to provide meaningful information.

Most dynamic obstacles move continuously. For example, FIG. 145 illustrates a robot 17400 moving forward while observing a person 17401 as they move continuously within a FOV 17402. A dynamic object that appears in a front FOV of a sensor (e.g., LIDAR, camera, etc.) follows a trajectory that spans multiple captures of sensor data unless the dynamic object moves outside the FOV or the robot maneuvers such that the dynamic object no longer appears within the FOV of the sensor. In some embodiments, a speed and direction of motion of a dynamic object is determined from multiple captures of sensor data. The current speed and direction of the dynamic obstacle may be useful in predicting a next position of the dynamic obstacle in a next capture of sensor data. In some embodiments, a new capture of sensor data is combined with a group of previously captured sensor data. In some embodiments, new sensor data is combined with all previously captured sensor data. In some embodiments, a new capture of sensor data is combined with a group of previously captured sensor data having a different weight than all previously captured sensor data. In some embodiments, a new capture of sensor data is combined with a different weight than a group of previously captured sensor data. In some embodiments, some previously captured sensor data is excluded from being combined with newly captured sensor data.

Integration of new data with older data may undergo a filtering mechanism or additive, multiplicative, or convolution integration. Integration of new data with older data may depend on a confidence score, time stamp, nature, and resolution of the sensor capturing the data. For example, given a highly confident map, a new low confident reading is rejected to avoid destruction of a good map. In contrast, a new high confidence reading improves a low confident map, thus integration of the new reading is allowed. Integration of data as described may be applied in other cases, for example, an obstacle, an object, etc.

In embodiments, frame transmission delay occurs, the delay being the time required to place all of the data packet bits on the link. Propagation delay also occurs, the delay being the time required for a given bit to travel from a source to a destination. Switching time also occurs, switching time being the time required for a network switch to transfer one bit received at a layer 2 port to a destination port. This may or may not include the switch ingress delay or the switch egress delay, which each includes or does not include a que delay and includes the switch processing time (the time for the switch to process up to layer 2 of a packet to determine which port the packet must go to).

When a dynamic object moves outside a visual periphery or FOV of sensors of the robot, the object is not ignored as it may only be positioned in a blind spot temporarily and may reappear in a next time stamp. In some embodiments, an object exiting a FOV of a first sensor is searched for in a FOV of another sensor complimentary to the FOV of the first sensor. For example, a robot may comprise a sensor with a long FOV and a sensor with a short FOV. FIG. 146 illustrates a robot 17500 observing an obstacle at position A within FOV 17501 of a short range sensor. As the robot 17500 moves in direction 17502, the obstacle at position A is no longer within FOV 17501. After movement of robot 17500 and the obstacle to position B, the obstacle is within FOV 17503 of a long range sensor and is thus tracked by the long range sensor. Combinations of different variations or same type of sensors may be used in tracking objects by one sensor to another, such as a camera, LIDAR, etc. Switching the sensor tracking an object may be due to a range of a sensor, a type of sensor, and other factors. For example, when a LIDAR detects an object unseen by a camera on a sunny day, a provisional object is created and tracked by the camera.

In some embodiments, clues are placed within the environment for the robot to follow or localize within the environment. In some embodiments, detection of a surface indentation pattern of an object may trigger the robot to execute a specific instruction. For example, depth captured by a laser scan of a LIDAR may include a specific pattern in the depth values, such as rising and lowering values. Specific patterns may be unique to each distance from which the respective readings are captured. FIG. 147 illustrates an example of an object 17600 with a unique indentation pattern. A laser line 17601 is emitted onto a surface of object 17600 and a camera 17602 captures an image 17603 of the laser line 17601 projected onto the surface of object 17600. A processor of the robot 17604 extracts the laser lines 17605 from the image 17603. The pattern of the laser lines 17605 may be associated with a particular instruction, such as an instruction to turn to avoid an area surrounding the object 17600. Alternatively, the processor may determine a distance from the robot to the surface of the object 17600 associated with each segment of the laser lines 17605, wherein a laser line 17605 closer to a bottom edge of the image 17603 are associated with a further distance to the surface of the object 17600 than a laser line further from the bottom edge of the image 17603. A pattern of the distances associated with each segment may be associated with a particular instruction for the robot 17604 to execute. FIG. 148 illustrates a similar concept, wherein a LIDAR 17700 disposed on a robot 17701 emits light 17702 onto a surface of object 17703. Detection of a particular pattern of distances resulting from the indentation pattern of the surface of object 17703 triggers the robot 17701 to execute a particular instruction. For each distance, the corresponding pattern may indicate a different instruction or information. As the robot gets closer to an object, a particular pattern in depth values is associated with a particular closer distance from which the measurement is taken. FIG. 149 illustrates a robot 17800 positioned at different distances 20 cm, 15 cm, 10 cm, 5 cm from an object 17801 with a particular surface indentation pattern. For each distance, a detected corresponding pattern 17802 may indicate a different instruction or information. A step between distances (e.g., 1 cm, 2 cm, 3 cm, or 5 cm, 10 cm, 15 cm, or 10 cm, 20 cm, 30 cm) may depend on a desired resolution and how quickly the robot needs to react upon observing the pattern. For example, with a step of 1 cm, each cm of distance from the object has a corresponding depth value pattern. As the robot approaches 10 cm, the pattern corresponding to a distance of 10 cm from the object may not exactly match, however, the processor of the robot determines a probabilistic assumption which increases as the robot approaches 7 cm, 8 cm, 9 cm and the confidence of the match increases as patterns at a distance of 7 cm, 8 cm, 9 cm match.

Figure 150:
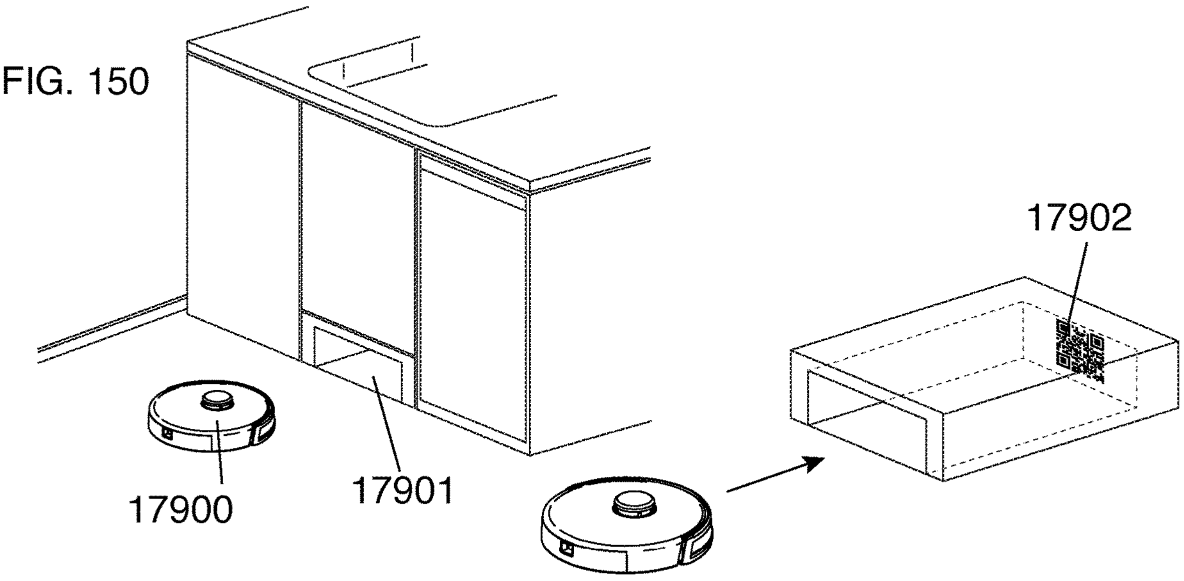
FIGS. 150 and 151 illustrate a robot docking at a docking station using IR transmitter and receiver.
Figure 151:
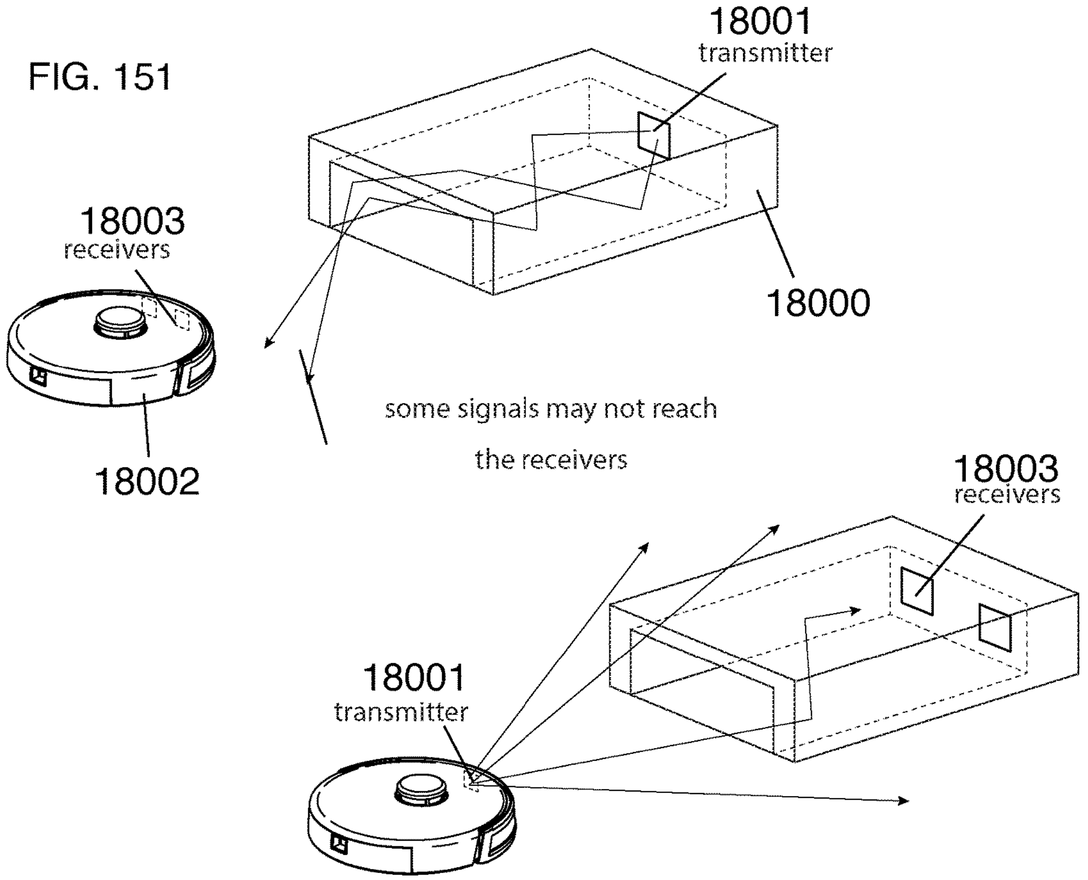
Figure 152:
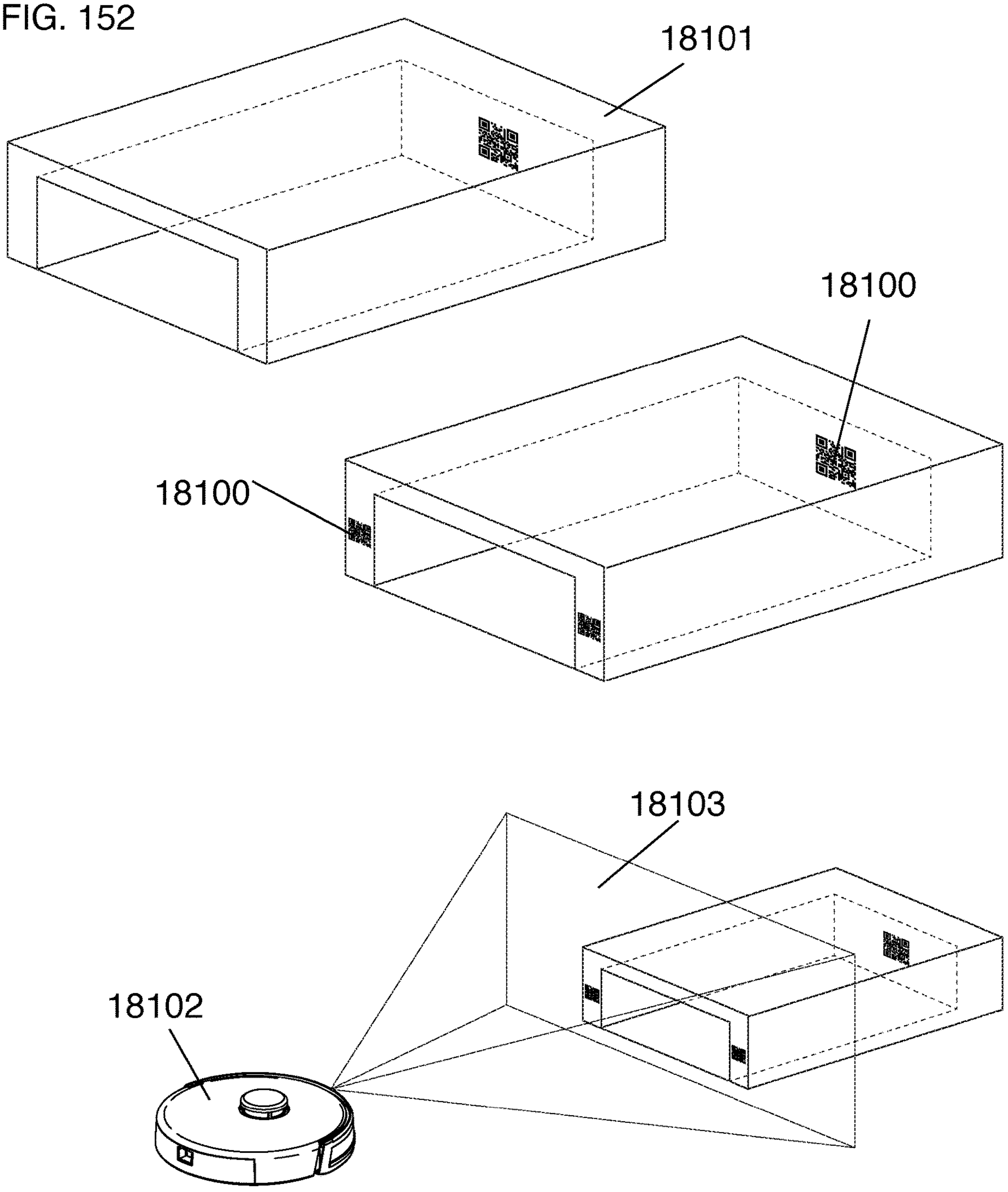
FIGS. 152 and 153 illustrate a robot docking at a docking station using QR codes.
Figure 153:
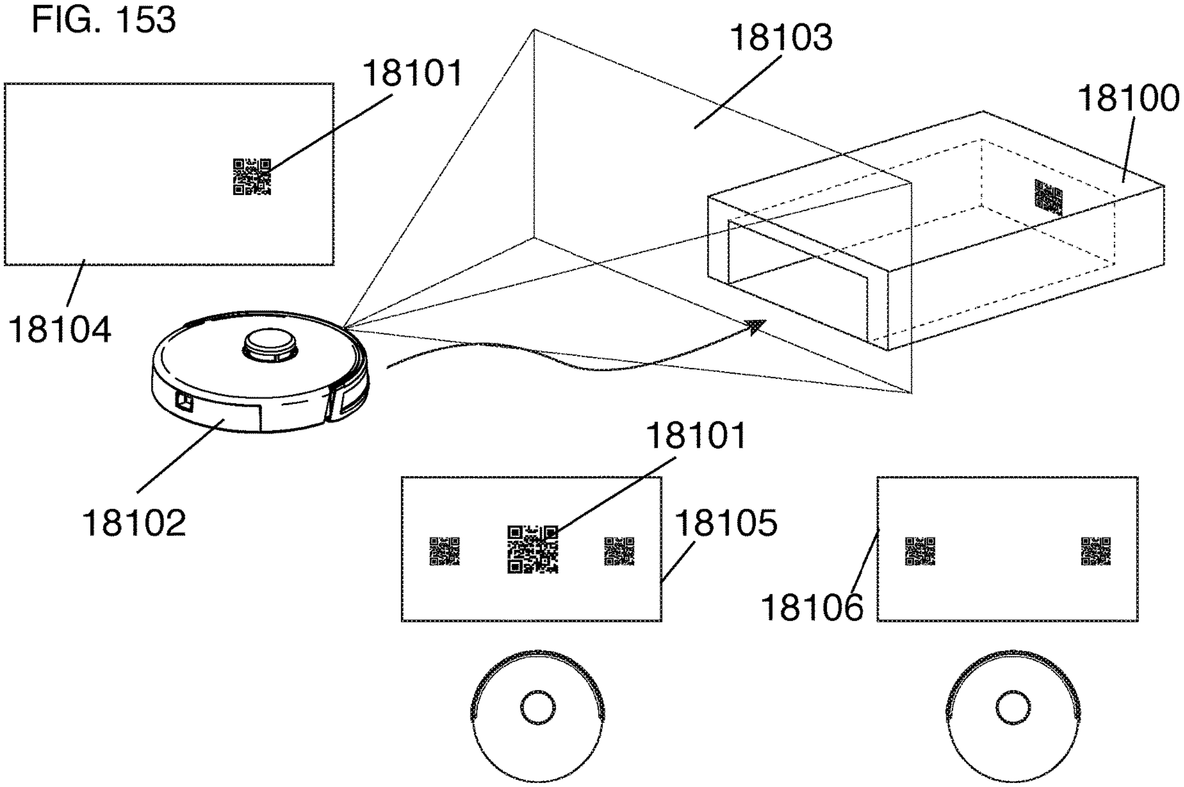
Figure 154:
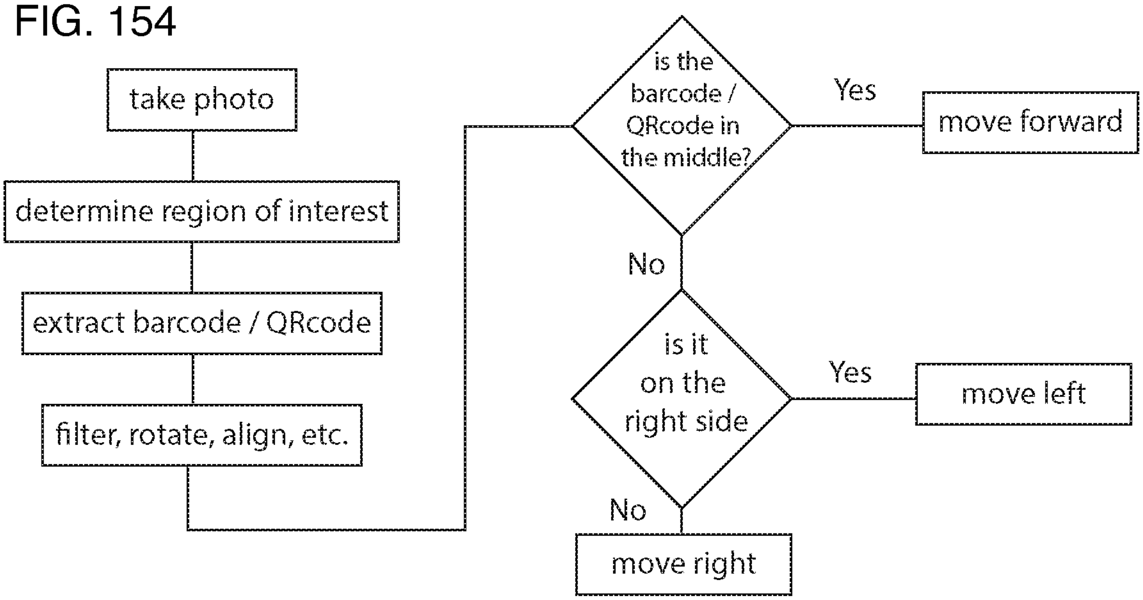
FIG. 154 illustrates a process of a robot docking at a docking station using QR codes.

In some embodiments, the robot detects a QR code or a barcode associated with a particular instruction. For example, upon detecting a barcode, a message is transmitted to the robot. The barcode may be read using a laser scanner. Laser scanners often operate in a same IR range as a LIDAR sensor or a depth camera. A camera may be used to read a barcode, a QR code, or surface indentations of objects. QR codes are used for various purposes. For example, a QR code may be generated by an application for a purpose of easily pairing the robot with a smartphone executing the application and transferring parameters to join a network. In another example, a schedule of the robot is transferred to the robot using a QR code generated by the application. In one example, a charging station communicates with the robot using a QR code. For example, the robot may use a QR code positioned in front of the robot on a charging station to align itself to the charging station. For example, in a case of a built in robot cleaner, the robot must enter an enclosed docking station for charging. FIG. 150 illustrates a robot 17900 with a built-in docking station 17901. A QR code 17902 is strategically positioned within the docking station 17901 to help the robot 17900 align during docking. In such an environment, IR signals may bounce off of the surrounding enclosure and confuse the robot. The problem is present regardless of whether the robot is configured to transmit the IR signals or receive the IR signals during docking. FIG. 151 illustrates an enclosed docking station 18000 including a transmitter 18001 and a robot 18002 including receivers 18003 and vice versa. IR signals of the transmitter, in either case, bounce off of the enclosure, creating false signals and confusing the robot 18002 during alignment for docking. By placing QR codes strategically the robot may be guided along a path to dock properly. A camera of the robot captures images and determines locations of QR codes. The robot may be configured to approach the QR code such that the QR code is centrally aligned with the robot. FIGS. 152 and 153 illustrate QR codes 18100 strategically positioned on an enclosed docking station 18101. A robot 18102 uses a camera to capture the QR codes 18100 within its FOV 18103 for help in aligning during docking. Images indicate whether the robot 18102 is centrally aligned with the docking station 18101. For instance, image 18104 of a single QR code centrally positioned within the docking station 18101 (as in FIG. 153) indicates the robot 18102 is not centrally aligned with the docking station 18101. Images 18105 and 18106 of centrally and peripherally positioned QR codes (as in FIG. 152) or solely peripherally positioned QR codes indicate the robot 18102 is centrally aligned with the docking station 18101. FIG. 154 illustrates an example of a process of docking using QR codes. A camera of a robot captures an image, a processor extracts the QR code, performs adjustments to the image, determines where in the image the QR code is positioned, and based on the position of the QR code actuates the robot to move forward or left or right.

Figure 155:
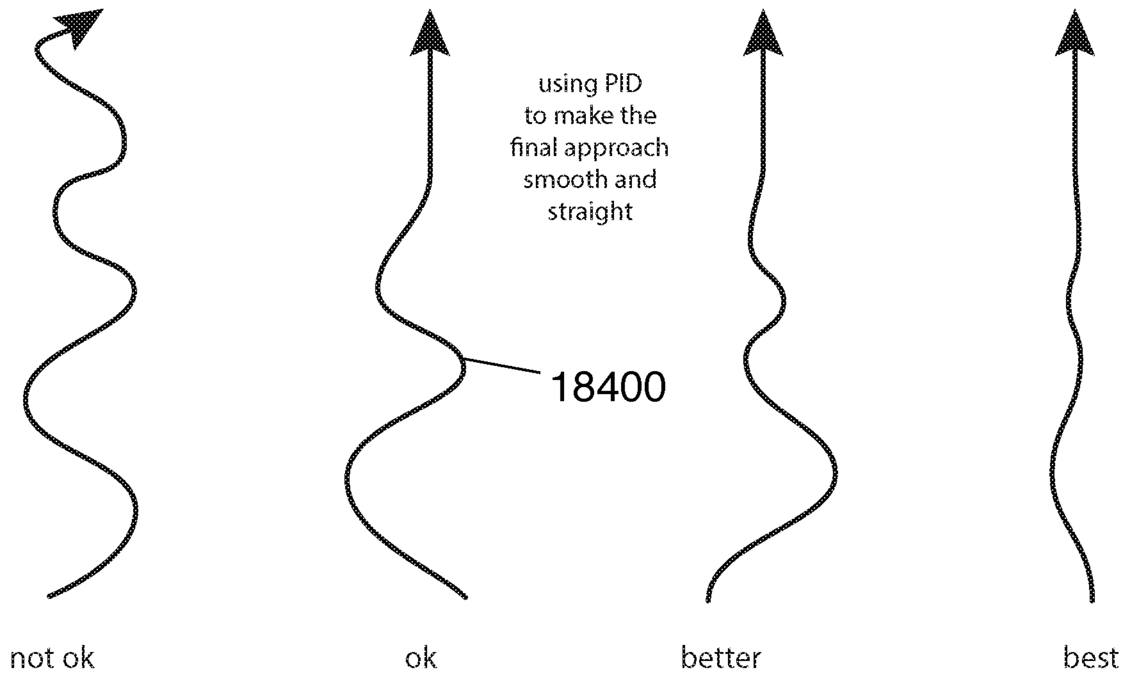
FIG. 155 illustrates a final approach path of a robot during docking.
Figure 156:
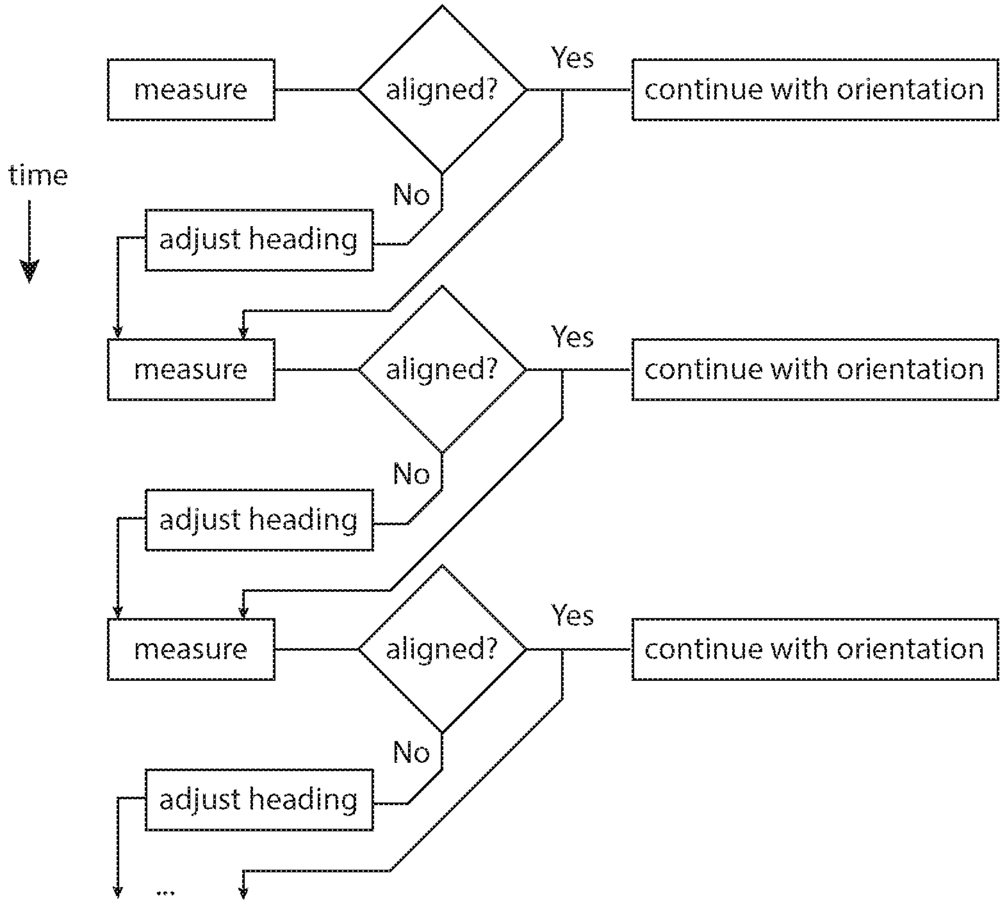
Figure 157:
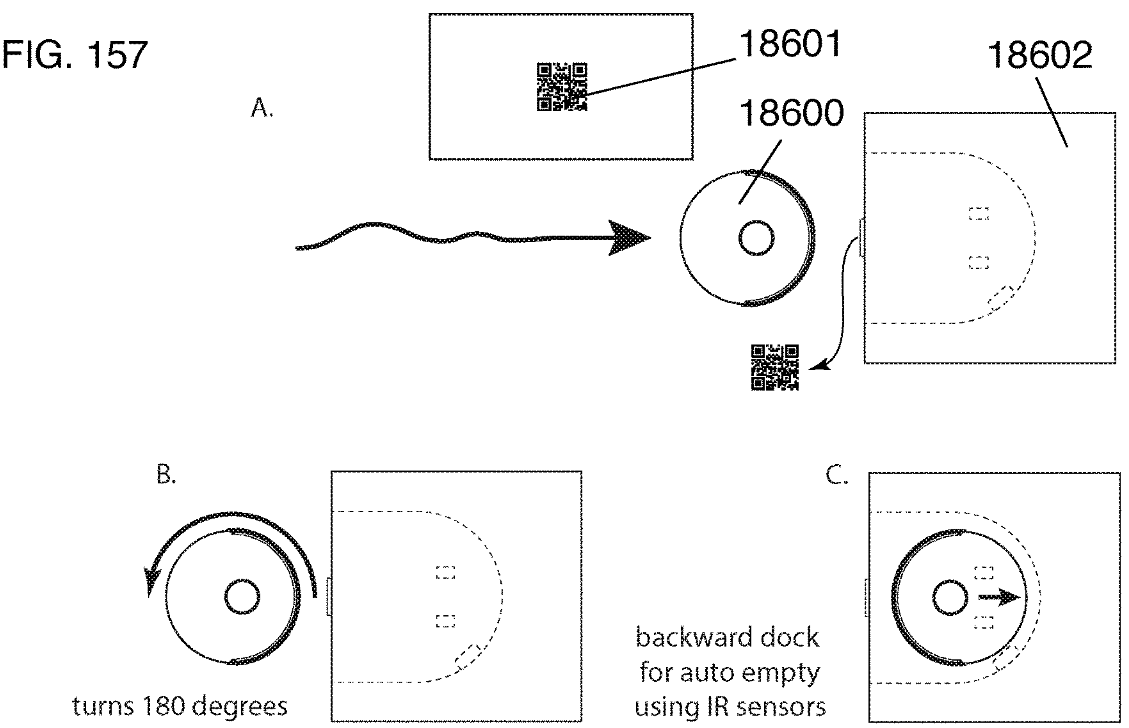
Figure 158:
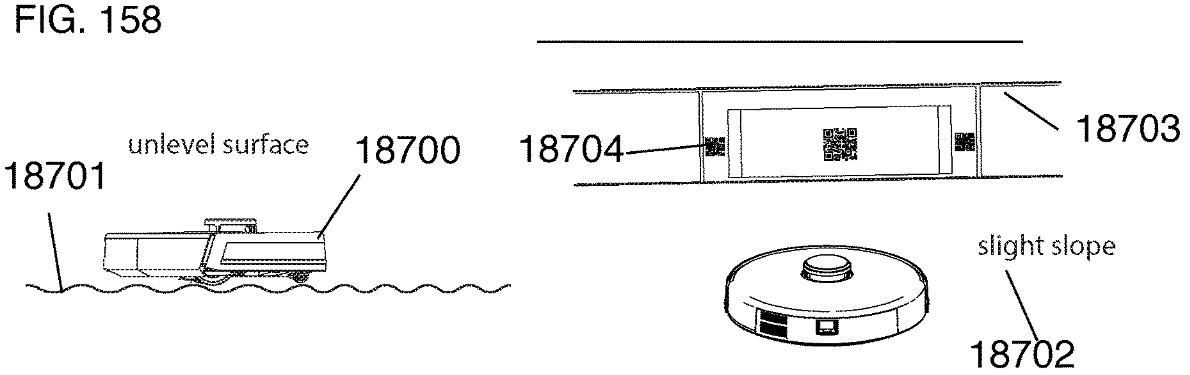
Figure 159:
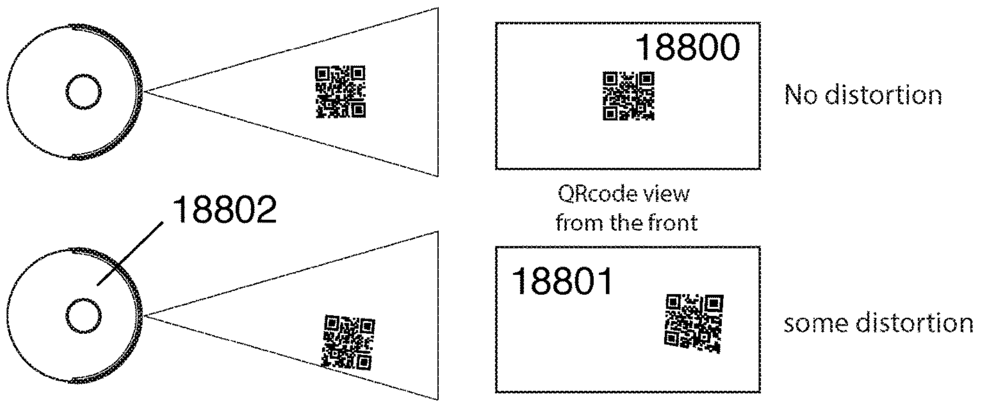
Figure 160:
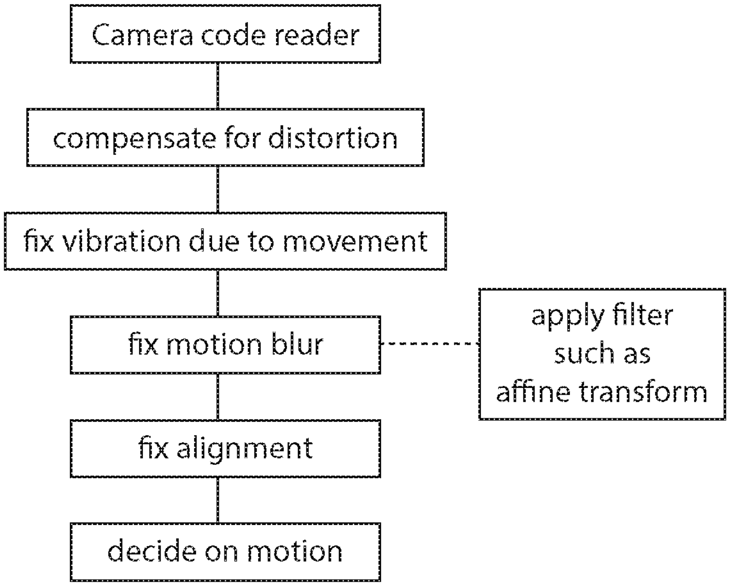

In some embodiments, PID is employed to smoothen and straighten a final approach of the robot during docking. FIG. 155 illustrates various variations 18400 of a final approach of a robot during docking. PID is used to avoid an unsmooth final approach and to attain a smooth and straight final approach, as in the best case. FIG. 156 illustrates an example of a process of ensuring a smooth and straight final approach during docking, wherein heading is continuously measured and adjusted for to ensure alignment is attained. In some embodiments, the robot may use a camera to initially align with the charging station, then at a final step, turns and docks using IR. FIG. 157 illustrates A. a robot 18600 using a camera to capture QR code 18601 to align with docking station 18602; B. the robot 18600 rotating 180 degrees; and C. docking backwards using IR sensors. A bin of the robot 18600 may then autonomously be emptied. In a first step, a region of interest is identified, misalignments are amended, and offsets are adjusted. Misalignment and offsets may be due to a slight tilt, wherein one wheel of the robot is on a platform of the charging station while the other wheel is not or a driving surface is imperfect (e.g., unleveled or sloped). FIG. 158 illustrates an example of a robot 18700 on an uneven surface 18701 and a slight slope 18702 during docking at charging station 18703. The robot 18700 uses QR codes 18704 to align with charging station 18703 during docking. In some cases, lighting conditions may be imperfect and prevent or impair identification of black stripes of the barcode or smaller dots of the QR code. Other patterns of code, such as cloud patterns, may be used instead of the QR code. The camera capturing a barcode, a QR code, or a surface indentation pattern may capture a distorted image. FIG. 159 illustrates images 18800 and 18801 of a QR code positioned centrally on a charging station captured by a camera of a robot 18802. Image 18800 is undistorted, however, image 18801 is distorted. FIG. 160 illustrates an example of a process used to interpret a distorted image. An image is read and adjusted to compensate for any distortion. Adjustments are also employed to fic vibration due to movement, motion blur (e.g., using affine transform), and alignment, after which a decision on motion is made.

Figure 161A:
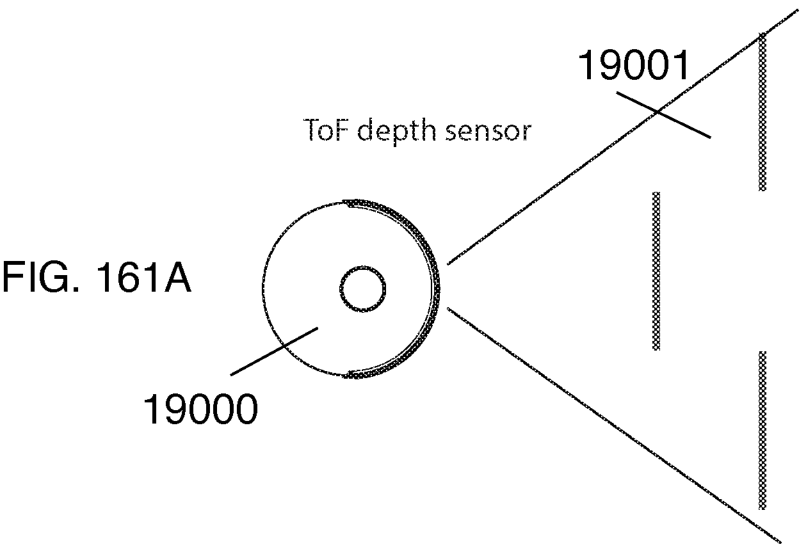
Figure 161B:
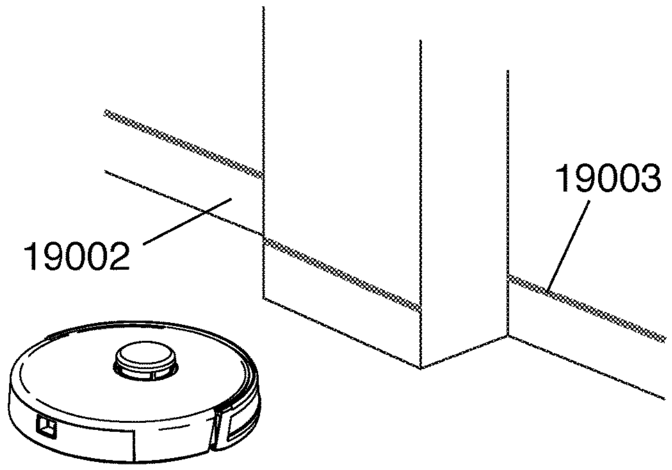
Figure 162A:
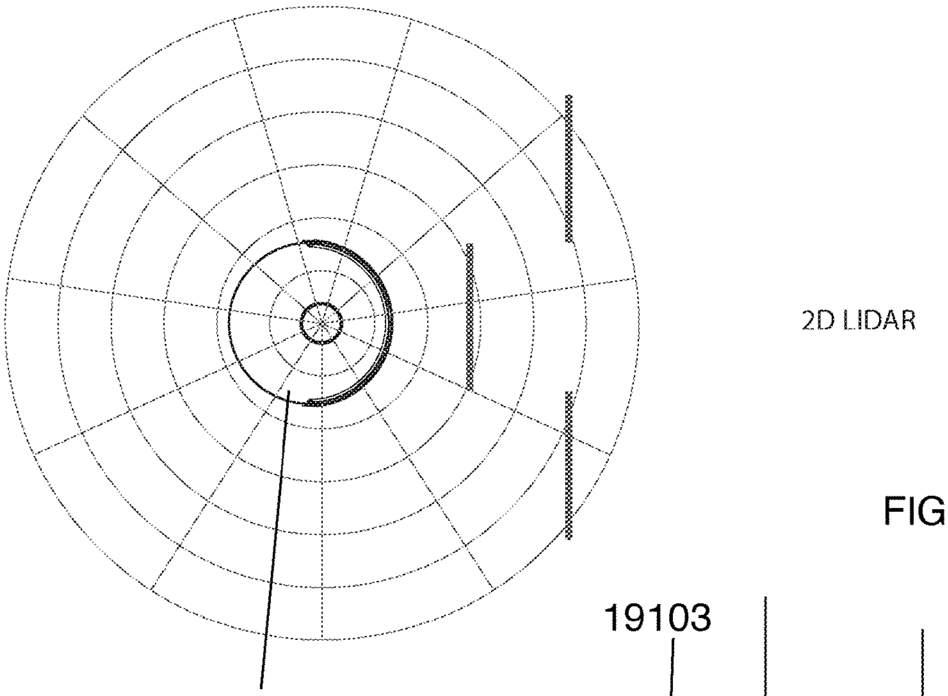
Figure 162B:
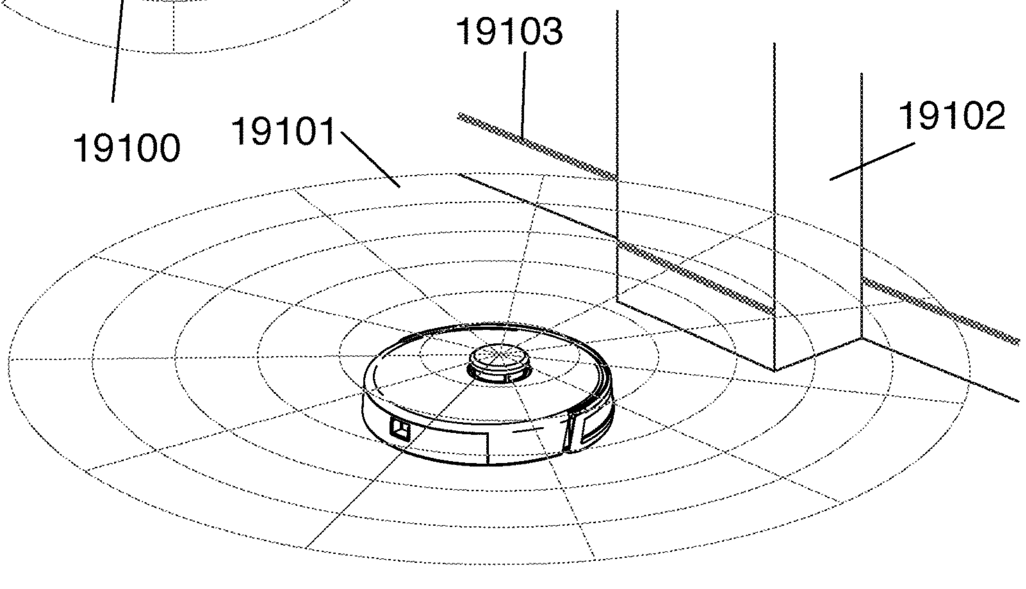
Figure 162C:
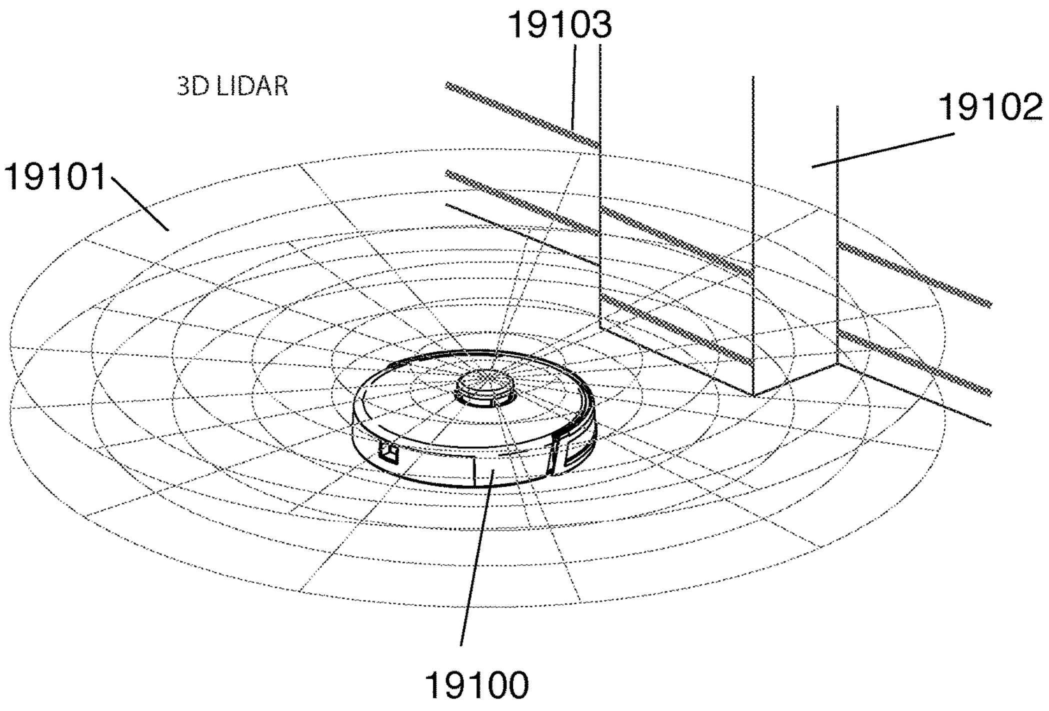

In a similar manner to image segmentation, depth readings may benefit from foreground and background segmentation algorithms. FIGS. 161A and 161B illustrate a robot 19000 including a TOF depth sensor for measuring depth to objects within FOV 19001. A light is emitted towards wall 19002 forming light lines 19003. FIGS. 162A-162C similarly illustrate a robot 19100 including a 2D LIDAR sensor (FIGS. 162A and 162B) and 3D LIDAR sensor (FIG. 162C) for measuring depth to objects within range 19101. A light is emitted towards wall 19102 forming light lines 19103. RANSAC is used to extract major lines in the environment using a least square estimation to fit lines that run through point clouds corresponding with the major lines. Once the background is detected (in this case the wall 19102), the foreground stands out (in this case the light lines 19103).

Alternatively, or in addition, clustering is used to separate readings close to each other from readings further away. A graph method may also be used in combination with a sink node and source node method similar to that described above to separate a point cloud. Each point in the point cloud is connected to its neighbors by an edge and a weight is associated with the edge. Initially the weights of all edges are equal. Some embodiments create a graph cut and the cost of the graph cut is a sum of the edge weights participating in the cut or a sum of the edge weights in a set of edges forming the graph cut. In some embodiments, a cost function minimizes the sum by selecting the edges from a subset separating the source and sink. A sink node is selected such that every point in the point cloud has an outgoing edge to the sink node and a source node is selected such that every point in the point cloud has an incoming edge from the source node, wherein each point in the point cloud has one incoming edge and one outgoing edge to each of its neighbors.

Figure 163:
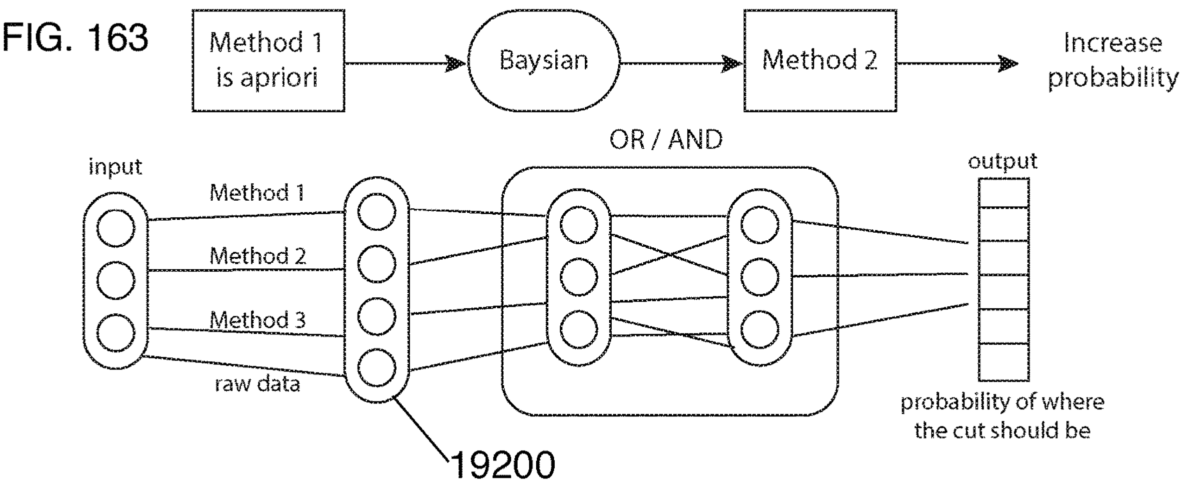

Each of the segmentation methods explained above may be used independently or combined with another segmentation method using a Bayesian network. Each of the segmentation methods may be used without a priori in an inline form or with prior training. Prior training may be implemented using ML methods or neural network methods. FIG. 163 illustrates combining segmentation method 1 with segmentation method 2 using a Bayesian network to more accurately predict a best segmentation, wherein segmentation method 1 is a priori. A neural network 19200 is also illustrated, wherein three segmentation methods are used in combination to predict segmentation of the point cloud.

In embodiments, segmentation processing is executed on the edge, on a device, on the cloud, on a server, or on a combination of the listed options, within a LAN or across a WAN. For example, a security robot is equipped with a camera to detect events qualified as anomalies. Since an anomaly is not a security breach or a cause for concern, the anomaly is processed further on an upstream device with more processing power to examine the anomaly in more detail. In some embodiments, local processing is used to identify unnecessary video feed that may be excluded from transmission over the network. For example, an entire video feed of a stationary scene with no detected movement is detected does not need to be streamed up to the network. Samples of the video feed at fixed or random intervals may suffice. In embodiments, separation of foreground and background is helpful in determining which information to send upstream for further processing.

Figure 164A:
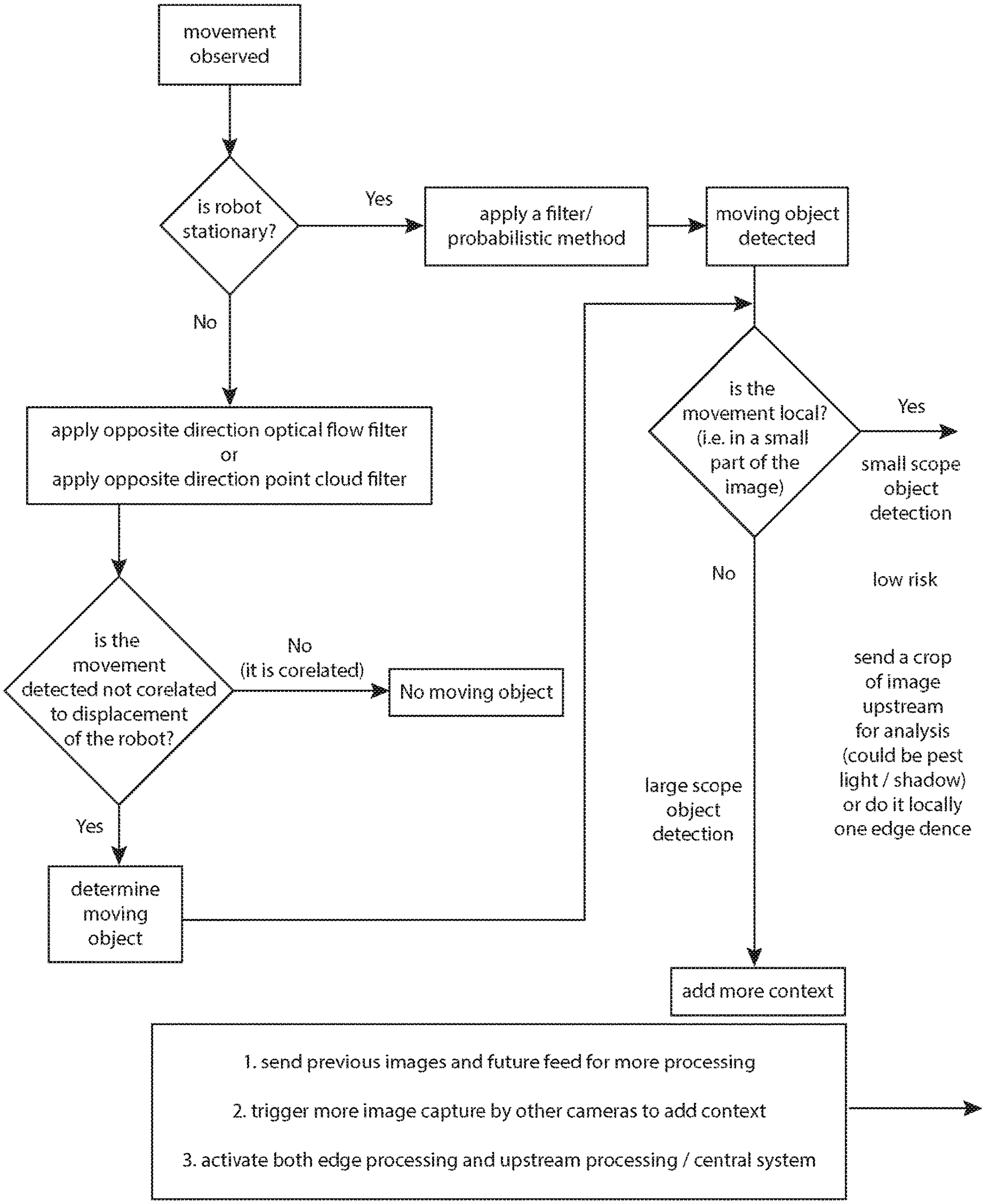
Figure 164C:
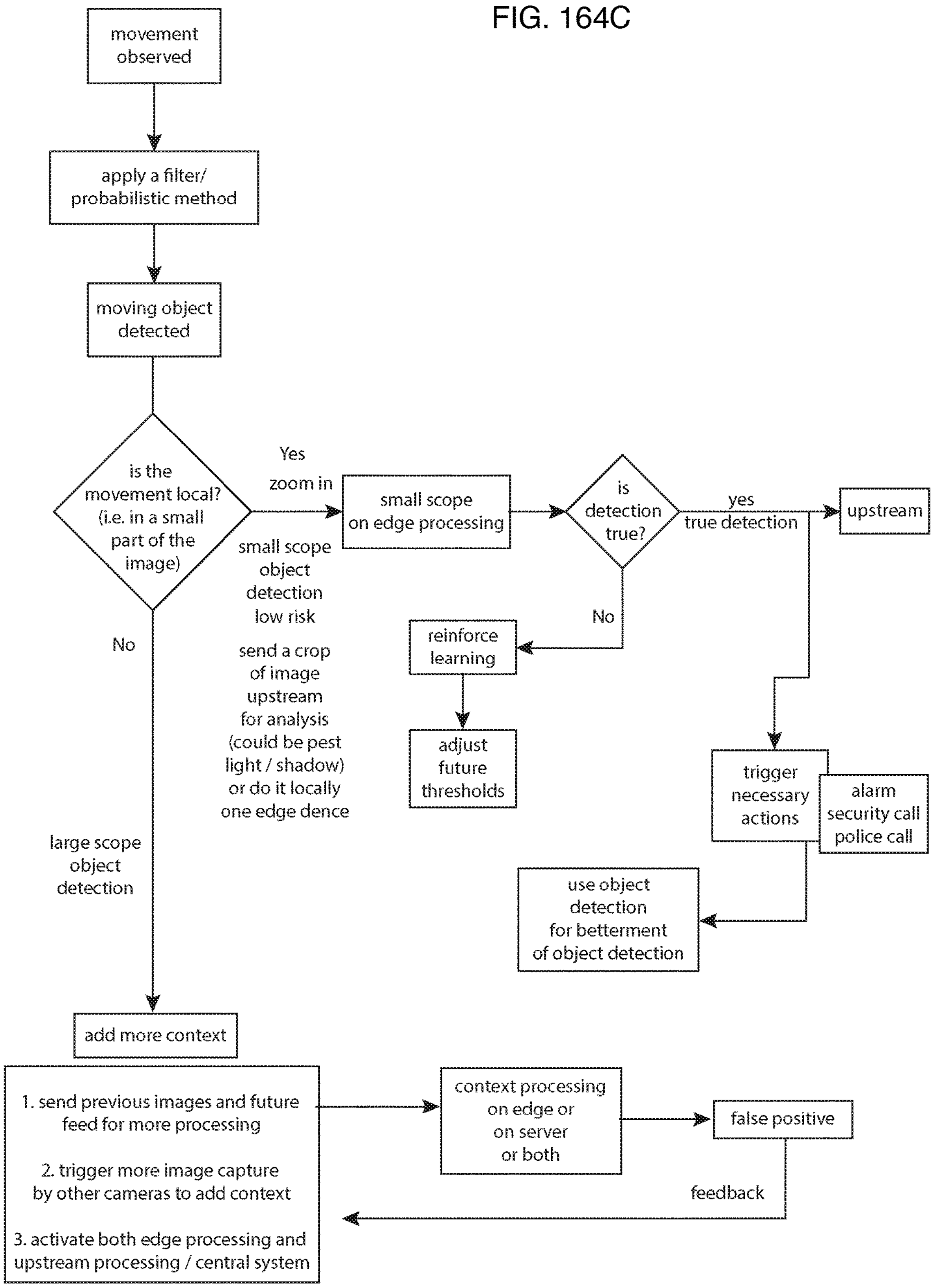

In embodiments, segmentation of foreground and background is used in landmark selection. Landmarks that have a high chance of being repeatedly observed and are easily distinguishable from different POVs are selected. It is important that the landmark is stationary as the robot moves about the environment or is stationary. FIG. 164A illustrates an example of an image analysis process upon observing movement. Initially the process determines whether the robot is stationary. When the robot is moving, different filters are applied and if movement detected is correlated to the displacement of the robot then no moving object is detected and if there is no correlation, a moving object is detected. When the robot is stationary, a filter and/or probabilistic method is applied and the moving object is detected. After detecting a moving object, the process determines if the movement is local. If the movement is not local, a crop of the image is sent upstream for further analysis. Additional data (items 1, 2, and 3) may be used to add more context during analysis. FIG. 164B illustrates an example of a process of transmitting the portion of the image upstream for further analysis, wherein it determined whether detection of movement is true, and if so, actions taken in addition to transmission upstream. In cases where there is a false positive (e.g., due to natural phenomena), feedback is provided. FIG. 164C illustrates a similar image analysis process as FIG. 164A for a stationary camera observing the scene.

Figure 165:
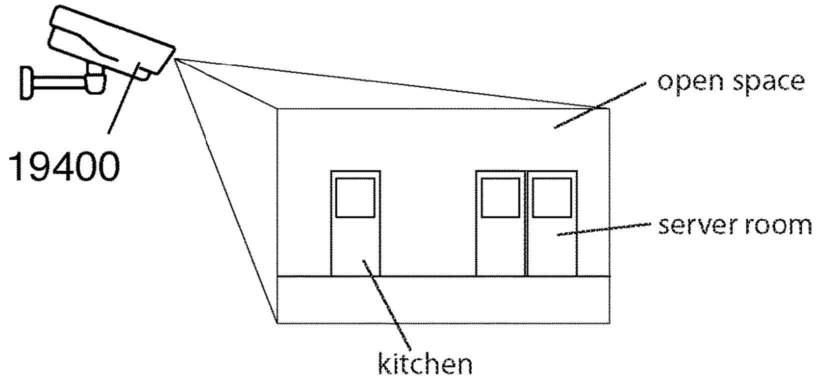

Observed movement is not confined to a standalone object. For example, movement of a door when opening or closing may be observed. Motion detection of various types of objects may be implemented in a vision-based system. In some embodiments, a stationary camera configured to analyze a subset of pixels is strategically placed within a server room or a security control room for monitoring purposes, thereby saving processing resources. For example, FIG. 165 illustrates a stationary camera 19400 strategically positioned to monitor the doorways of a server room and a kitchen. This way, more frames are processed per second (e.g., 30, 60, 120, or another frame rate. Such monitoring prevents a person from cutting the camera feed or battery source of the control system. For such a critical area, any movement may be considered critical during particular hours (e.g., overnight). In some embodiments, a priori information from other cameras, (stationary, rotating or mobile) may be used to describe a sequence of events in a context. For example, a vehicle detected outside does may not provide a lot context on a situation, however, combined with detection of a door opening at a similar timeframe, more context of the situation is provided.

In some embodiments, false positives arise as a result of natural phenomena, such as natural light changes during the day or seasons. In some embodiments, historical information is used as a baseline to detect false positives. Some false positives may be detected despite the use of historical information. For example, lighting outside a window may be detected as motion. In this scenario, a depth image shows no movement and may therefore be used to avoid a false positive.

In embodiments, the processor of the robot determines a displacement of the robot when the robot moves, given a starting position of the robot and the position of the robot in relation to a frame of reference, such as a frame of reference of a room. An absolute frame of reference and/or position may be assigned and/or a seed location may be provisioned by the processor as a point, a set of points, or a landmark against which all relative positions of the robot are measured and calculated. For example, a charging station or a station at which a dustbin of the robot is emptied may be used as a ground zero landmark. In some embodiments, a charging station includes IR LED emitters and the robot includes a receiver or the charging station includes receivers and the robot includes an omnidirectional transmitter. The robot may use signals emitted by the emitters of the charging station to detect and align with the charging station for docking. FIG. 166A illustrates a charging station 19500 including IR LED emitters 19501 and a robot 19502 including a receiver 19503. Alternatively, FIG. 166B illustrates the charging station 19500 including receivers 19504 and the robot 19502 including an omnidirectional transmitter 19505.

When uncalibrated reconstruction is used, distance and angle information of the spatial capture is lost. Therefore, in some embodiments, a method of calibration may be used. Calibration may be performed at a time of manufacturing the robot at a factory, dynamically each time the robot starts up to perform work, when the robot starts to perform work, or while the robot is in execution of a working mission using ML and AI procedures. Often, a tracker algorithm, such as Lucas Kanade, keeps track of observations captured within one frame at a first time step to to a next frame in a next time step t1. For example, FIG. 167 illustrates an example of tracking observations from one frame to the next. Tracking creates correspondences 19600 between features 19601 observed in frames $X_0$, $X_1$, and $X_2$ captured at different time steps, while features 19601 disappear and reappear and new features appear as the robot moves within the environment.

When tracking with two or more cameras that are fixed on a rigid base and geometrically spaced apart from another, more equations are required and the process of tracking becomes more computationally expensive. One way to solve the equation comprises merging camera readings at each time step and comparing them with the merged camera readings of the next time step when making correspondences between features. For example, FIG. 168 illustrates the three cameras 19700, each with a different FOV capturing a frame of readings 19701, 19702, and 19703 at each time step $t_0$, $t_i$, and $t_2$, respectively. FIG. 169 illustrates the three cameras 19700 and the frame of readings 19702, each captured at to by a different camera, merged 19705. The frame of readings 19703, each captured at $t_i$ by a different camera, are merged 19706 and compared with the merged 19705 frame of readings 19702 captured at to when making correspondences between features. The frame of readings 19704, each captured at $t_2$ by a different camera, are merged 19807 and compared with the merged 19706 frame of readings 19703 captured at $t_i$ when making correspondences between features. In some embodiments, merging may result in a disparity map or multidimensional spatial image. As a result, a disparity map or spatial image composed in a first time step is compared against a next disparity map or spatial image composed in a next time step. At each merging point, a translation function relates an image captured at a first time step to an image captured at a next time step. As new data is obtained, an extended Kalman filter or any flavor of Kalman filter may be used to iteratively make better sense of the environment. Some embodiments employ an alternative method, wherein an output of all the cameras are captured for a predetermined number of time steps and are solved for a best fit. For example, FIG. 170 illustrates, in step 1, the cameras 19700 capturing the frame of readings 19701, 19702, and 19703 for three time steps, and in step 2, the cameras 19700 capturing the frame of readings 19708, 19709, and 19710 for the next three time steps, and so on. The processor of the robot then solves for a best fit. This resembles a graph representation of localization and mapping.

In some embodiments, a pose reading comprises a translation vector and a rotation quaternion, $[x, y, z, q_x, q_y, q_z, q_w]$. In some embodiments, global shutter or rolling shutter cameras are used. Some embodiments use RGBD cameras for unified semantic SLAM. There may be some moments wherein a wheel of the robot slips or encoder or IMU readings are unreliable or delayed and the processor relies on exteroceptive readings. For a camera based device, those moments reduce to a structure from motion (SFM) problem. In some embodiments, an integrity check is performed on IMU or odometry readings. In some embodiments, a first sensor, such as an encoder, is a primary source of sensor data, and a second sensor, such as an OTS, is a secondary source of sensor data, wherein the two sources of data form a Bayesian. In some embodiments, encoder data is a control (u) and OTS data is an observation (z). This data may be further tuned and corrected using data from an IMU or gyroscope. In some embodiments, the type of sensor data preferred may be determined based on the current environment of the robot. For example, when the robot is driving on carpet, OTS sensor data is preferred, while odometry and gyroscope sensor data are preferred when the robot is driving on hard flooring. Depending on the actual sensor hardware and floor type, odometer data may be preferred for carpet and OTS data may be preferred for hard flooring in some cases.

In some embodiments, a management system is used to control the integrity of data. For example, an OTS may provide faulty data on very reflective driving surfaces. In such a case, the management system may cut the stream of data from the OTS and prevent it from being integrated with other sensor data. In some embodiments, a Kalman filter is used to determine a level of trust of readings from the encoder and/or the OTS before integration or consideration of integration with camera, LIDAR, or depth sensor data. A pre-filter may be used to clean up the data. In cases wherein the encoder is of higher accuracy, the OTS and gyroscope are of high quality, and the robot does not require high precision (as a robot vacuum does), a camera or LIDAR may not be necessary. This may be the case when an onsite calibration automatically accounts for on-the-mission adjustments based on a large number of datasets collected and organized in a neural network. As such, the accuracy of matching with encoder, OTS and IMU/gyroscope data may reach a level where the map of the robot is produced without the need for a LIDAR or camera, thereby reducing costs. A training run allows sensors of the robot to examine various parts of the environment (e.g., a house of a user) and the processor of the robot to create a map based on the data collected during the training run. In some embodiments, active signals to/from a charging station assists the processor of the robot in determining an orientation of the robot.

With a Bayesian network setup, a posterior probability may be found from a likelihood and a prior. While it may be hard to find the posterior distribution in non-linear systems, it is often feasible to find optimal points to maximize the posterior, known as maximizing a posterior (MAP). Based on Bayes rule, a maximum posterior probability may be inferred from maximum likelihood and a priori, and in cases wherein a prior is unknown, the maximum posterior probability may be derived from maximum likelihood estimation from observation data. This concept may apply to any two different types of sensor data sets and the output may serve as a priori to a next two sensor data sets, expanding the application of MAP/MLE to a broader sense. In some embodiments, a seed value is provided by an ICP method or PnP. In some embodiments, a Bayesian network is arranged in a graph comprising vertices and edges to represent optimization variables and errors, respectively, thereby forming a graph optimization problem that may be solved using least-square methods.

Various methods may be used to determine which images may be used for localization, context identification, object detection, a stream etc. Supervised learning methods may be applied when a database of labels is available for features detected in an image. For classification purposes, SVM, discriminant analysis, Naïve Bayes, and nearest neighbor may be used individually or in combination with one another or in combination with neural networks. When labels are unavailable in abundance, a mix of supervised and unsupervised learning methods are used for clustering and classification. When the labels are not present or the nature of the data is such that the labels are not easily used, association and clustering of data may be achieved with unsupervised methods. As more data is generated, more labels are often generated, either manually (e.g., by an operator or an end user) or automatically for future needs. Outcomes of reinforcement learning methods may be used as labels when deemed accurate or when confirmed by a human operator or a human end user. Some embodiments include sensors capturing measurements of the environment, the processor of the robot finding a match between currently observed perimeter points and a premade representation of the workspace including the boundaries thereof, the processor of the robot localizing the robot in the workspace and the digital representation of the environment, and the robot avoiding crossing boundaries of zones defined by the user. Some embodiments include the processor loading a premade representation of the workplace in memory, the representation consisting of boundaries discovered using sensors disposed on the robot and boundaries added by the user to the representation of the environment previously generated, sensors capturing measurements (i.e., readings) in real-time and the processor of the robot finding perimeter points that coincide with the new measurements, the processor of the robot finding a location of the robot in relation to the coincident points, the processor inferring a position of the robot in the workspace and the digital representation, and the robot avoiding crossing boundaries added by the user. Some embodiments include, upon start of the work session, the processor of the robot relocalizing the robot by comparing current readings from a sensor with a premade representation of the workplace, the robot performing a task of coverage while honoring boundaries that were added into the premade representation by the user using the application. In some embodiments, the robot starts with a radially outward mapping. The robot covers a discovered bounding area, then moves on to explore far reaching areas, and at intervals, upon a perimeter aligned navigator being invoked, the robot covers along perimeter areas. Managing the balance between exploration, coverage, perimeter aligned coverage, and a series of local optimizations based on observations heuristically leads to an optimal coverage.

Enhancing localization in more rigorous circumstances requires the robot to survive situations wherein the processor of the robot loses track of the robot by falling back to alternative navigation mode or best effort tracking until the processor recovers and relocalizes the robot. Some embodiments implement Markov localization. Markov localization uses a probabilistic framework, wherein a probability density over all possible robot positions in a position space is maintained throughout navigation. Initially, the position of the robot is represented by a uniform distribution, given the location of the robot is unknown, or a Gaussian distribution, given the location of the robot is known with high certainty. When the sensor data lacks landmarks or the robot is reset or teleported and loses the landmark, localization is prone to failure. In some embodiments, the iterative nature of optimization is encoded as cycles that evolve with time, like a wave function that is carried forward in a phase space, inspired by Schrödinger's equation of motion. In embodiments, robot localization survives dynamic environments, wherein obstacles move or sensor readings are intermittent or blocked from observing landmarks for extended periods of time. Carrying forward a wave function with time allows for sensor information to be used as its received, with intermittent and dynamic loop closure or bundle adjustment. An adjustment may be seen as a collapse of a wave function upon observation. Upon failing to localize the robot, a robot reset may be triggered.

In embodiments, the processor of the robot relocalizes the robot after a reset or an unexpected teleport. Embodiments herein disclose methods for the robot to survive a reset, wherein a previous map against which the robot is relocalized disappears. For instance, suppose a previous map of the environment is saved locally or on the cloud and is reinstated upon startup of the robot. A difference between a temporary map generated upon startup and the saved map is measured to be below a predetermined threshold, as such the processor of the robot relocalizes the robot based on its current surroundings matching the saves map and the robot resumes its task. In some embodiments, a LIDAR data reliability qualification metric is used to prevent offset in the map caused by false positive matches between a temporary map and a saved map. Some embodiments employ a seamless real-time relocalization of the robot. In some embodiments, a delay factor in loading a map and data integration when a reset is triggered is added for incoming data to stabilize before integrating the data into the map. This delay may be proportional to data mismatch, for example, when rate of wheel rotation is not proportional to driving speed. The delay factor helps prevent map warping. In some embodiments, the algorithm loops a number of predetermined times or for a predetermined number of seconds. When the robot boots up in a previously unknown environment, the processor of the robot starts building a temporary map. When the robot enters a previously known environment the processor detects the known environment and appends newly discovered areas to the previously known environment.

Global localization techniques may be enhanced to accommodate scenarios with a lack of landmarks or matches between currently observed data and previously observed data. When data has a lack of landmarks or the processor of the robot cannot find a match between currently observed landmarks and landmarks in the saved map, the processor concludes the robot is in a new environment and creates a new map. The new map may be temporary and later merged with an older saved map. The processor of the robot constantly checks for matches and upon finding a match, stitches the sensed data with the saved map at overlapping points. However, when a previously detected feature is undetected initially but detected later, appending an already discovered area to the map causes an invalid extension to the map.

At startup of the robot, an algorithm executed by the processor of the robot starts building a new map while performing repeated exploration and frequently attempting to match the new map with the persistent (i.e., saved) map in storage a predetermined number of times. In some embodiments, exploration is implemented by triggering a frontier exploration. When the algorithm is successful in matching the new map with the persistent map, the algorithm successfully merges the new map with the persistent map, relocalizes the robot, and continues to a next state. When the algorithm is unsuccessful in matching the new map with the persistent map, the algorithm continues to build the new map or exits with a 'cannot relocalize' message when there are restricted zones, cleaning settings, etc. When a map is initially undistinguished but later distinguished, the algorithm merges the new map with the persistent map at points of overlap. The algorithm may apply a transform to the new map to align the new map with the persistent map, merge data from the new map with the persistent map, and use the persistent map for navigation thereafter. A mathematical fusion strategy using probabilities may be used for cases of an unassigned cell from the persistent map and the new map to determine the fused value. In some cases, relocalization fails when the algorithm cannot find a match between the new map and the persistent map. Upon failure of finding a match, the algorithm continues to build the new map and the robot navigates using the new map. Relocalization failure may also during the algorithm successfully finding a match between the new map and the persistent map, correctly rotating the new map by +45 degrees to match the coordinate system of the persistent map, fusing the two maps together, and correcting the pose of the robot in the fused map. Reloclization failure may also occur when the processor does not initially relocalize the robot, but relocalizes the robot sometime during the work session, after starting to build a map. Another example of relocalization failure includes the processor incorrectly identifying an area as a place previously observed (i.e., a false positive match between newly observed features and previously observed stored features).

In some embodiments, disruption of sensors or manipulation of the surroundings prevents the algorithm from relocalizing the robot or adds unrealistic extensions to an otherwise perfect map. In some embodiments, at startup, the algorithm starts building a new map and attempts to import the persistent map data from the persistent memory to check for a match with the new map by rotating the new map and filling in the persistent map. After this step, the algorithm determines a failure to build the merged map, a failure to match the persistent map with the new map or starts exporting the successfully merged maps back to the persistent memory. Some embodiments implement a method for the algorithm to recover from incorrectly determining the robot is starting work in a previously seen environment, in which case the processor optimizes the path of the robot based on the previous map. Some embodiments implement a method for the algorithm to recover from incorrectly determining the robot is starting work in a new environment, in which case the algorithm builds a map. In some embodiments, a score is implemented for distinguishing a previously seen environment from a newly discovered environment to aid in preventing misinterpretation of data or situation or to recover from misinterpretation early on, before further damaging the map. In some embodiments, the algorithm monitors runs in two instantiations, in tandem, for continuously comparing a previously stored map with a new map, tracing potential mismatches between the two maps, forming new hypothetical maps from the two maps, and keeping a score based on viability of the previous map being a distinct entity from the current new map. The intent is to avoid false feature association and corruption of a perfect persistent map with the merging of irrelevant data pertaining to an environment other than that of the persistent map.

In some embodiments, localization of the robot is lost due to the robot becoming stuck and relocalization is required. To determine context from sensor readings, such as a stuck state of the robot, sensor data captured by IMU, accelerometer, odometer, and LIDAR are compared, validated, then fused to improve inference of context, such as a stuck state. For example, when odometer data indicates significant acceleration of the wheels but the IMU data indicates no such spike, a linear stuck state is concluded. Or when there is a strong mismatch between odometer angular rate and gyroscope z-axis data, an angular stuck state is concluded. In some embodiments, the ratios of change have different meanings when measured translational movement of the robot contradicts the actual movement of the robot, whereby the degree of incorrect estimation of the location of the robot varies and is used to extract context. For instance, it is determined that the robot is an angular stuck state when the angular rate from the odometer data and gyroscope z-axis are mismatched. When there is a consistent mismatch, the angular traction estimate is provided. To determine linear traction, the algorithm determines whether the robot is idle, accelerating, decelerating, or driving based on the IMU sensor data. The robot is assumed idle when all recent samples are below a certain magnitude; accelerating when short-term integration is above a +5 cm/s difference or recent data contains at least two more acceleration spikes (threshold 1 $m/s^2$) than deceleration spikes; decelerating when the opposite of the accelerating logic above occurs; and driving in all other cases. In some embodiments, the algorithm identifies sharp acceleration/deceleration phases based on odometer data. The robot experiences a sharp acceleration when a single difference of at least 7.5 cm/s is detected and nearby measured samples have a difference greater than-2 cm/s; and a sharp deceleration when a single difference of −7.5 cm/s is detected and nearby measured samples have a difference less than 2 cm/s. In some embodiments, the algorithm reports linear stuck state when the odometer data indicates acceleration/deceleration but the IMU data does not. In some embodiments, the robot frees itself from a stuck state upon detection of the stuck state by, for example, executing a 30 degrees rotation, and if the robot times out a first time, driving forwards 8 cm to 18 cm, and if the robot times out a second time, driving backwards 8 cm to 18 cm. In some embodiments, wherein the robot is stuck under a chair and during the past 25 seconds there was less than 0.2 m diagonal direction movement or 90 degrees rotation, the robot attempts to free itself by executing a curated first curved backup (e.g., at 10 cm/s speed and 5 cm radius) with a distance less than the previous backup distance, rotating in place, and if the rotation does not return the reached goal for the curved backup, executing a second curved backup in an opposite direction to the first curved backup.

In some embodiments, a solid state depth camera using structured light or TOF principals or a combination of both is used to extract odometry information. Odometry information may also be extracted from data captured by a camera or a solid state depth camera using structured light. Or TOF principals at interleaved time stamps may act as a camera and capture images from which odometry data may be calculated. In some embodiments, a camera disposed on the robot captures a stream of images and the processor of the robot compares a previous image captured with a next image captured and infers a certain displacement of the robot. This complements and improves an encoder measurement that relies on counting wheel rotations as encoders are unreliable when the wheels of the robot continue to rotate but the robot is not actually moving or the wheels of the robot rotate at a slower rate than expected. Odometry data may be compared with other types of sensor data to detect when the robot is stuck and the wheels of the robot slip, thereby improving detection of a stuck state or wheel slippage. Temporal image comparison may use a 3D or 2D approach. A key point may be detected with or without a descriptor. A tracking method may be used to take advantage of optical flow with the assumption that the flow is constant. An estimated rotation and translation based on a set of detected features and their position in two images is achieved by extracting and matching the features between the raw images, estimating relative rotation and translation (up to scale) between the two image frames, and triangulating features to obtain 3D world points. In some embodiments, computing pose from a 3D-to-2D or 2D-to-2D match using the triangulated features from a last iteration is used. In some embodiments, triangulation based on features from multiple image frames is used.

In embodiments, the processor of the robot relocalizes the robot after a reset or an unexpected teleport. Embodiments herein disclose methods for the robot to survive a reset, wherein a previous map against which the robot is relocalized disappears. For instance, suppose a previous map of the environment is saved locally or on the cloud and is reinstated upon startup of the robot. A difference between a temporary map generated upon startup and the saved map is measured to be below a predetermined threshold, as such the processor of the robot relocalizes the robot based on its current surroundings matching the saves map and the robot resumes its task. In some embodiments, a LIDAR data reliability qualification metric is used to prevent offset in the map caused by false positive matches between a temporary map and a saved map. Some embodiments employ a seamless real-time relocalization of the robot. In some embodiments, a delay factor in loading a map and data integration when a reset is triggered is added for incoming data to stabilize before integrating the data into the map. This delay may be proportional to data mismatch, for example, when rate of wheel rotation is not proportional to driving speed. The delay factor helps prevent map warping. In some embodiments, the algorithm loops a number of predetermined times or for a predetermined number of seconds. When the robot boots up in a previously unknown environment, the processor of the robot starts building a temporary map. When the robot enters a previously known environment the processor detects the known environment and appends newly discovered areas to the previously known environment.

Global localization techniques may be enhanced to accommodate scenarios with a lack of landmarks or matches between currently observed data and previously observed data. When data has a lack of landmarks or the processor of the robot cannot find a match between currently observed landmarks and landmarks in the saved map, the processor concludes the robot is in a new environment and creates a new map. The new map may be temporary and later merged with an older saved map. The processor of the robot constantly checks for matches and upon finding a match, stitches the sensed data with the saved map at overlapping points. However, when a previously detected feature is undetected initially but detected later, appending an already discovered area to the map causes an invalid extension to the map.

At startup of the robot, an algorithm executed by the processor of the robot starts building a new map while performing repeated exploration and frequently attempting to match the new map with the persistent (i.e., saved) map in storage a predetermined number of times. In some embodiments, exploration is implemented by triggering a frontier exploration. When the algorithm is successful in matching the new map with the persistent map, the algorithm successfully merges the new map with the persistent map, relocalizes the robot, and continues to a next state. When the algorithm is unsuccessful in matching the new map with the persistent map, the algorithm continues to build the new map or exits with a 'cannot relocalize' message when there are restricted zones, cleaning settings, etc. When a map is initially undistinguished but later distinguished, the algorithm merges the new map with the persistent map at points of overlap. The algorithm may apply a transform to the new map to align the new map with the persistent map, merge data from the new map with the persistent map, and use the persistent map for navigation thereafter. A mathematical fusion strategy using probabilities may be used for cases of an unassigned cell from the persistent map and the new map to determine the fused value. In some cases, relocalization fails when the algorithm cannot find a match between the new map and the persistent map. Upon failure of finding a match, the algorithm continues to build the new map and the robot navigates using the new map. Relocalization failure may also during the algorithm successfully finding a match between the new map and the persistent map, correctly rotating the new map by +45 degrees to match the coordinate system of the persistent map, fusing the two maps together, and correcting the pose of the robot in the fused map. Reloclization failure may also occur when the processor does not initially relocalize the robot, but relocalizes the robot sometime during the work session, after starting to build a map. Another example of relocalization failure includes the processor incorrectly identifying an area as a place previously observed (i.e., a false positive match between newly observed features and previously observed stored features).

In some embodiments, disruption of sensors or manipulation of the surroundings prevents the algorithm from relocalizating the robot or adds unrealistic extensions to an otherwise perfect map. In some embodiments, at startup, the algorithm starts building a new map and attempts to import the persistent map data from the persistent memory to check for a match with the new map by rotating the new map and filling in the persistent map. After this step, the algorithm determines a failure to build the merged map, a failure to match the persistent map with the new map or starts exporting the successfully merged maps back to the persistent memory. Some embodiments implement a method for the algorithm to recover from incorrectly determining the robot is starting work in a previously seen environment, in which case the processor optimizes the path of the robot based on the previous map. Some embodiments implement a method for the algorithm to recover from incorrectly determining the robot is starting work in a new environment, in which case the algorithm builds a map. In some embodiments, a score is implemented for distinguishing a previously seen environment from a newly discovered environment to aid in preventing misinterpretation of data or situation or to recover from misinterpretation early on, before further damaging the map. In some embodiments, the algorithm monitors runs in two instantiations, in tandem, for continuously comparing a previously stored map with a new map, tracing potential mismatches between the two maps, forming new hypothetical maps from the two maps, and keeping a score based on viability of the previous map being a distinct entity from the current new map. The intent is to avoid false feature association and corruption of a perfect persistent map with the merging of irrelevant data pertaining to an environment other than that of the persistent map.

In some embodiments, localization of the robot is lost due to the robot becoming stuck and relocalization is required. To determine context from sensor readings, such as a stuck state of the robot, sensor data captured by IMU, accelerometer, odometer, and LIDAR are compared, validated, then fused to improve inference of context, such as a stuck state. For example, when odometer data indicates significant acceleration of the wheels but the IMU data indicates no such spike, a linear stuck state is concluded. Or when there is a strong mismatch between odometer angular rate and gyroscope z-axis data, an angular stuck state is concluded. In some embodiments, the ratios of change have different meanings when measured translational movement of the robot contradicts the actual movement of the robot, whereby the degree of incorrect estimation of the location of the robot varies and is used to extract context. For instance, it is determined that the robot is an angular stuck state when the angular rate from the odometer data and gyroscope z-axis are mismatched. When there is a consistent mismatch, the angular traction estimate is provided. To determine linear traction, the algorithm determines whether the robot is idle, accelerating, decelerating, or driving based on the IMU sensor data. The robot is assumed idle when all recent samples are below a certain magnitude; accelerating when short-term integration is above a +5 cm/s difference or recent data contains at least two more acceleration spikes (threshold 1 $m/s^2$) than deceleration spikes; decelerating when the opposite of the accelerating logic above occurs; and driving in all other cases. In some embodiments, the algorithm identifies sharp acceleration/deceleration phases based on odometer data. The robot experiences a sharp acceleration when a single difference of at least 7.5 cm/s is detected and nearby measured samples have a difference greater than −2 cm/s; and a sharp deceleration when a single difference of −7.5 cm/s is detected and nearby measured samples have a difference less than 2 cm/s. In some embodiments, the algorithm reports a linear stuck state when the odometer data indicates acceleration/deceleration but the IMU data does not. In some embodiments, the robot frees itself from a stuck state upon detection of the stuck state by, for example, executing a 30 degrees rotation, and if the robot times out a first time, driving forwards 8 cm to 18 cm, and if the robot times out a second time, driving backwards 8 cm to 18 cm. In some embodiments, wherein the robot is stuck under a chair and during the past 25 seconds there was less than 0.2 m diagonal direction movement or 90 degrees rotation, the robot attempts to free itself by executing a curated first curved backup (e.g., at 10 cm/s speed and 5 cm radius) with a distance less than the previous backup distance, rotating in place, and if the rotation does not return the reached goal for the curved backup, executing a second curved backup in an opposite direction to the first curved backup.

In some embodiments, a solid state depth camera using structured light or TOF principals or a combination of both is used to extract odometry information. Odometry information may also be extracted from data captured by a camera or a solid state depth camera using structured light. Or TOF principals at interleaved time stamps may act as a camera and capture images from which odometry data may be calculated. In some embodiments, a camera disposed on the robot captures a stream of images and the processor of the robot compares a previous image captured with a next image captured and infers a certain displacement of the robot. This complements and improves an encoder measurement that relies on counting wheel rotations as encoders are unreliable when the wheels of the robot continue to rotate but the robot is not actually moving or the wheels of the robot rotate at a slower rate than expected. Odometry data may be compared with other types of sensor data to detect when the robot is stuck and the wheels of the robot slip, thereby improving detection of a stuck state or wheel slippage. Temporal image comparison may use a 3D or 2D approach. A key point may be detected with or without a descriptor. A tracking method may be used to take advantage of optical flow with the assumption that the flow is constant. An estimated rotation and translation based on a set of detected features and their position in two images is achieved by extracting and matching the features between the raw images, estimating relative rotation and translation (up to scale) between the two image frames, and triangulating features to obtain 3D world points. In some embodiments, computing pose from a 3D-to-2D or 2D-to-2D match using the triangulated features from a last iteration is used. In some embodiments, triangulation based on features from multiple image frames is used.

In some embodiments, seamless on-the-fly relocalization of the robot using SLAM technology capable of lightweight computing is required for a true embedded solution. In some embodiments, the robot is configured to execute a fail-safe behavior or reset when a sensor is covered. A range of unexpected teleportation of the robot may be used to examine localization resilience. In embodiments, wherein the robot resets the previous map used is expected to remain accessible. In embodiments, the algorithm builds a temporary map of the surroundings of the robot and uses the new map temporarily when there is no previous map data to compare the new map against. When there is previous map available to compare the new map against and a comparison returns a match, the new map is superimposed on the previous map with which the match was found. A previous map of the environment may be saved locally and/or on the cloud and is reinstated upon startup of the robot. A difference between the temporary new map and a particular map saved is measured and at a predetermined threshold, the robot is relocalized. Relocalization of the robot (based on its current surroundings matching the particular previous map) resumes the current task based on a previously observed map, overcoming challenges of partial observability. When relocalization occurs, user set boundaries and preferences are respected and accounted for. In some cases, an unexpected high electric voltage applied to the robot causes the robot to reset and lose localization. In current state of the art, a sudden change as such causes the processor of the robot to generate an offset in the map and the robot continues working using the incorrect map. This means the robot may attempt to enter places that the offset map incorrectly shows as uncovered space, which in fact is space that does not exist. Such situations cause the robot to perform coverage in an unhomogenized manner, repeating coverage in some areas more than other areas.

In some cases, a false positive match between the temporary map and a saved map occurs. Herein, methods disclose minimizing false positive matches by using a LIDAR data reliability qualification metric. A dynamic algorithm speeds up map filling in known areas and avoids high rejection rates of map filling when the robot is driving towards unknown areas, consequently reducing the risk of losing localization. A dynamic map filling increases the aggressiveness of map filling during ideal times while maintaining a stable map by reducing the aggressiveness of map filling in uncertain areas. For example, when the robot is unexpectedly shifted, a lower LIDAR data reliability qualification metric prevents the LIDAR data from corrupting the map. In another example, the LIDAR data reliability qualification metric changes when the wheels of the robot are spinning and acceleration is not proportional to driving speed or there is a mismatch (temporary or continuous). In some embodiments, a delay or lag in loading a map after a map pull is implemented. In some embodiments, a decay factor is implemented. In some embodiments, the algorithm loops a number of predetermined times or seconds or a dynamic number of times or seconds. When the robot sensor is occluded for a time period and then unoccluded, a relocalization on-the-fly occurs, in a similar manner to when the robot boots up in a previously unknown environment. In some embodiments, the algorithm starts building a map based on visited locations and a footprint of the robot or tracked footprint coverage of the robot in a last known good map when the sensor is occluded. When the sensor is unoccluded, the algorithm resolves offsets built during occlusion of the sensor. When the robot enters a previously known environment, the algorithm recognizes the known environment and appends the mapped newly discovered area to the mapped previously known area.

In some embodiments, global localization techniques use Markov localization. Markov localization is iterative in nature and may be modeled or encoded in a cyclic data structure. In some embodiments, a Fourier transform is used in conjunction with a probabilistic framework, wherein a probability density over all possible robot positions in a position space is maintained throughout navigation. Initially, the position of the robot is represented by a uniform distribution if the location of the robot is unknown or by Gaussian distribution at times when the location of the robot is known with a degree of certainty. A cyclic counter may determine a degree of confidence as it increases or decreases with time. At startup, the algorithm starts building a new map with repeated exploration and frequently attempts to match the new map with a saved map loaded from storage. When data does not contain any landmarks, the algorithm concludes that it is in a new environment and at intervals checks for known landmarks such that the algorithm knows the robot has entered a previously known environment and stitches the new temporary map to a previous map to which a match was found based on overlapping points or features. The algorithm may attempt to find a match a predetermined number of times or at intervals. The interval may be longer as time passes. A frontier exploration may be used to help find a match if the algorithm fails to find a match initially. When a match is found, the new map is merged and be superimposed with the previous persistent map with which a match was found. The algorithm may successfully merge the new map with the persistent map, relocalize the robot, and continue to a next state. If the algorithm is unsuccessful in finding a match, the algorithm continues to build the new map or exits with a cannot relocalize message when there are restricted zones, cleaning setting, etc. In its literal sense, SLAM techniques are used to generate or update a map of the environment of the robot while simultaneously keeping track of the location of the robot within the map. However, in a broader sense, the goal is not to only create a map, but also contextual understanding and situational awareness of the robot in the workspace and reacting to situations or making decisions to prevent undesirable scenarios. While the literal aspect of SLAM technology is largely resolved in prior art, the broader expectation of the technology is still the forefront challenge in the robotics field and SLAM.

Odometer data, from which movement is inferred, may be misleading to a certain degree. In such case, data from a gyroscope may provide more context by providing angular movement of the robot or an accelerometer may be used to add color to odometer readings. Similarly, when point swarm data indicate the coordinate of the robot is stationary, the respective rate of discrepancy creates clues that are used to deduce conclusions and act on them. In some embodiments, context from sensor readings to detect a stuck state of the robot is created by fusing sensor data captured by a gyroscope, accelerometer, odometer, and point swarm when they resonate and eliminating such sensor data when they contradict one another (along with creating a hypothesis according to the nature of contradiction). Each type of sensor data may create a different signature, such as the systems used in signal conditioning or network intrusion systems. For example, a type of context is a stuck state. Some embodiments employ a dynamic algorithm to detect a linear stuck state when odometer data indicates a significant acceleration of the wheels but IMU data indicates no such spike, a linear stuck state can be concluded and an angular stuck state when there is a strong mismatch between odometer angular rate extracted from the odometer data and gyroscope z-axis data extracted from the IMU data. The details and rations of sensor recordings within a single sensor and multiple sensors may infer different meanings. If there is a consistent mismatch between two types of sensor data, a second or third data source may be used as an arbitrator. If the mismatch is a spike or momentary, an angular traction or linear traction may be detected. In some embodiments, after detecting the stuck state of the robot, the robots frees itself from the stuck state as described above. In some embodiments, the detection of a stuck state is improved by monitoring a requested and an actual (derived from an encoder sensor) speed of a side wheel of the robot. The algorithm may report a stuck state upon detecting a mismatch.

Some embodiments employ a method for solving SLAM using EKF techniques for the construction of maps with parameters different for each of the sensors. For example, a TOF LIDAR is less accurate in a near FOV but more accurate in a far FOV and when both of these are used, the variations and specifics may be accounted for. This is the opposite of data behavior from a triangular robot. It is not given that an algorithm could be generalized to use both data types. In embodiments, a generalization algorithm accounts for mismatching data and strength and weakness of various types of sensing and extract the proper data.

In some embodiments, the processor of the robot may track the position of the robot as the robot moves from a known state to a next discrete state. The next discrete state may be a state within one or more layers of superimposed Cartesian (or other type) coordinate system, wherein some ordered pairs may be marked as possible obstacles. In some embodiments, the processor may use an inverse measurement model when filling obstacle data into the coordinate system to indicate obstacle occupancy, free space, or probability of obstacle occupancy. In some embodiments, the processor of the robot may determine an uncertainty of the pose of the robot and the state space surrounding the robot. In some embodiments, the processor of the robot may use a Markov assumption, wherein each state is a complete summary of the past and used to determine the next state of the robot. In some embodiments, the processor may use a probability distribution to estimate a state of the robot since state transitions occur by actuations that are subject to uncertainties, such as slippage (e.g., slippage while driving on carpet, low-traction flooring, slopes, and over obstacles such as cords and cables). In some embodiments, the probability distribution may be determined based on readings collected by sensors of the robot. In some embodiments, the processor may use an Extended Kalman Filter for non-linear problems. In some embodiments, the processor of the robot may use an ensemble consisting of a large number of virtual copies of the robot, each virtual copy representing a possible state that the real robot is in. In embodiments, the processor may maintain, increase, or decrease the size of the ensemble as needed. In embodiments, the processor may renew, weaken, or strengthen the virtual copy members of the ensemble. In some embodiments, the processor may identify a most feasible member and one or more feasible successors of the most feasible member. In some embodiments, the processor may use maximum likelihood methods to determine the most likely member to correspond with the real robot at each point in time. In some embodiments, the processor determines and adjusts the ensemble based on sensor readings. In some embodiments, the processor may reject distance measurements and features that are surprisingly small or large, images that are warped or distorted and do not fit well with images captured immediately before and after, and other sensor data that appears to be an outlier. For instance, optical components or the limitation of manufacturing them or combing them with illumination assemblies may cause warped or curved images or warped or curved illumination within the images. For example, a line emitted by a line laser emitter captured by a CCD camera may appear curved or partially curved in the captured image. In some cases, the processor may use a lookup table, regression methods, or AI or ML methods to create a correlation and translate a warped line into a straight line. Such correction may be applied to the entire image or to particular features within the image.

In some embodiments, the processor may correct uncertainties as they accumulate during localization. In some embodiments, the processor may use second, third, fourth, etc. different type of measurements to make corrections at every state. For instance, measurements for a LIDAR, depth camera, or CCD camera may be used to correct for drift caused by errors in the reading stream of a first type of sensing. While the method by which corrections are made may be dependent on the type of sensing, the overall concept of correcting an uncertainty caused by actuation using at least one other type of sensing remains the same. For example, measurements collected by a distance sensor may indicate a change in distance measurement to a perimeter or obstacle, while measurements by a camera may indicate a change between two captured frames. While the two types of sensing differ, they may both be used to correct one another for movement. In some embodiments, some readings may be time multiplexed. For example, two or more IR or TOF sensors operating in the same light spectrum may be time multiplexed to avoid cross-talk. In some embodiments, the processor may combine spatial data indicative of the position of the robot within the environment into a block and may processor the spatial data as a block. This may be similarly done with a stream of data indicative of movement of the robot. In some embodiments, the processor may use data binning to reduce the effects of minor observation errors and/or reduce the amount of data to be processed. The processor may replace original data values that fall into a given small interval, i.e. a bin, by a value representative of that bin (e.g., the central value). In image data processing, binning may entail combing a cluster of pixels into a single larger pixel, thereby reducing the number of pixels. This may reduce the amount data to be processor and may reduce the impact of noise.

In some embodiments, the processor may obtain a first stream of spatial data from a first sensor indicative of the position of the robot within the environment. In some embodiments, the processor may obtain a second stream of spatial data from a second sensor indicative of the position of the robot within the environment. In some embodiments, the processor may determine that the first sensor is impaired or inoperative. In response to determining the first sensor is impaired or inoperative, the processor may decrease, relative to prior to the determination that the first sensor is impaired or inoperative, influence of the first stream of spatial data on determinations of the position of the robot within the environment or mapping of dimensions of the environment. In response to determining the first sensor is impaired or inoperative, the processor may increase, relative to prior to the determination that the first sensor is impaired or inoperative, influence of the second stream of spatial data on determinations of the position of the robot within the environment or mapping of dimensions of the environment.

In some embodiments, the processor associates properties with each room as the robot discovers rooms one by one. In some embodiments, the properties are stored in a graph or a stack, such the processor of the robot may regain localization if the robot becomes lost within a room. For example, if the processor of the robot loses localization within a room, the robot may have to restart coverage within that room, however as soon as the robot exits the room, assuming it exits from the same door it entered, the processor may know the previous room based on the stack structure and thus regain localization. In some embodiments, the processor of the robot may lose localization within a room but still have knowledge of which room it is within. In some embodiments, the processor may execute a new relocalization with respect to the room without performing a new re-localization for the entire environment. In such scenarios, the robot may perform a new complete coverage within the room. Some overlap with previously covered areas within the room may occur, however, after coverage of the room is complete the robot may continue to cover other areas of the environment purposefully. In some embodiments, the processor of the robot may determine if a room is known or unknown. In some embodiments, the processor may compare characteristics of the room against characteristics of known rooms. For example, location of a door in relation to a room, size of a room, or other characteristics may be used to determine if the robot has been in an area or not. In some embodiments, the processor adjusts the orientation of the map prior to performing comparisons. In some embodiments, the processor may use various map resolutions of a room when performing comparisons. For example, possible candidates may be short listed using a low resolution map to allow for fast match finding then may be narrowed down further using higher resolution maps. In some embodiments, a full stack including a room identified by the processor as having been previously visited may be candidates of having been previously visited as well. In such a case, the processor may use a new stack to discover new areas. In some instances, graph theory allows for in depth analytics of these situations.

In some embodiments, the robot may be unexpectedly pushed while executing a movement path. In some embodiments, the robot senses the beginning of the push and moves towards the direction of the push as opposed to resisting the push. In this way, the robot reduces its resistance against the push. In some embodiments, as a result of the push, the processor may lose localization of the robot and the path of the robot may be linearly translated and rotated. In some embodiments, increasing the IMU noise in the localization algorithm such that large fluctuations in the IMU data are acceptable may prevent an incorrect heading after being pushed. Increasing the IMU noise may allow large fluctuations in angular velocity generated from a push to be accepted by the localization algorithm, thereby resulting in the robot resuming its same heading prior to the push. In some embodiments, determining slippage of the robot may prevent linear translation in the path after being pushed. In some embodiments, an algorithm executed by the processor may use optical tracking sensor data to determine slippage of the robot during the push by determining an offset between consecutively captured images of the driving surface. The localization algorithm may receive the slippage as input and account for the push when localizing the robot. In some embodiments, the processor of the robot may relocalize the robot after the push by matching currently observed features with features within a local or global map.

In some embodiments, the processor may localize the robot using color localization or color density localization. For example, the robot may be located at a park with a beachfront. The surroundings include a grassy area that is mostly green, the ocean that is blue, a street that is grey with colored cars, and a parking area. The processor of the robot may have an affinity to the distance to each of these areas within the surroundings. The processor may determine the location of the robot based on how far the robot is from each of these areas describes. FIG. 171 illustrates the robot 23000, the grassy area 23001, the ocean 23002, the street 23003 with cars 23004, and the parking area 23005. The springs 23006 represent an equation that best fits with each cost function corresponding to areas 23001, 23002, 23003, and 23005. The solution may factor in all constraints, adjust the springs 23006, and tweak the system resulting in each of the springs 23006 being extended or compressed.

In some embodiments, the processor may localize the robot by localizing against the dominant color in each area. In some embodiments, the processor may use region labeling or region coloring to identify parts of an image that have a logical connection to each other or belong to a certain object/scene. In some embodiments, sensitivity may be adjusted to be more inclusive or more exclusive. In some embodiments, the processor may use a recursive method, an iterative depth-first method, an iterative breadth-first search method, or another method to find an unmarked pixel. In some embodiments, the processor may compare surrounding pixel values with the value of the respective unmarked pixel. If the pixel values fall within a threshold of the value of the unmarked pixel, the processor may mark all the pixels as belonging to the same category and may assign a label to all the pixels. The processor may repeat this process, beginning by searching for an unmarked pixel again. In some embodiments, the processor may repeat the process until there are no unmarked areas.

In some embodiments, the processor may infer that the robot is located in different areas based on image data of a camera at the robot navigates to different locations. For example, FIG. 172 illustrates observations 23100 of a camera of a robot at a first location 23101 at a first time point, a second location 23102 at a second time point, and a third location 23103 at a third time point. Based on the observations 23100 collected at the locations 23101, 23102, and 23103, the processor may infer the observations correspond to different areas. However, as the robot continues to operate and new image data is collected, the processor may recognize that new image data is an extension of the previously mapped areas based previous observations 23100. Eventually, the processor integrates the new image data with the previous image data and closes the loop of the spatial representation.

In some embodiments, the processor infers a location of the robot based on features observed in previously visited areas. For example, FIG. 173 illustrates observations 23200 of a camera of a robot at a first time point to, at a second time point t1, and at a third time point t1. At the first time point to, the processor observes a chair 23201 based on image data. At the second time point t1, the processor does not observe the chair 23201 but rather observes a window 23202 based on image data. At the third time point t2, the processor does not observe the window 23202 but rather observes a corner 23203 based on image data. As the robot operates, the processor may recognize an area as previously visited based on observing features 23201, 23202, and 23203 that were previously observed. The processor may use such features to localize the robot. The processor may apply the concept to determine on which floor of an environment the robot is located. For instance, sensors of the robot may capture information and the processor may compare the information against data of previously saved maps to determine a floor of the environment on which the robot is located based on overlap between the information and data of previously saved maps of different floors. In some embodiments, the processor may load the map of the floor on which the robot is located upon determining the correct floor. In some embodiments, the processor of the robot may not recognize the floor on which the robot is located. In such cases, the processor may build a new floor plan based on newly collected sensor data and save the map as a newly discovered area. In some cases, the processor may recognize the floor as a previously visited location while building a new floor plan, at which point the processor may appropriately categorize the data as belonging to the previously visited area.

In some embodiments, the maps of different floors may include variations (e.g., due to different objects or problematic nature of SLAM). In some embodiments, classification of an area may be based on commonalities and differences. Commonalities may include, for example, objects, floor types, patterns on walls, corners, ceiling, painting on the walls, windows, doors, power outlets, light fixtures, furniture, appliances, brightness, curtains, and other commonalities and how each of these commonalities relate to one another. FIG. 174 illustrates an example of different commonalities observed for an area, such as a bed 23300, the color of the walls 23301 and the tile flooring 23302. Based on these observed commonalities 23303, the processor may classify the area.

In some embodiments, the processor loses localizations of the robot. For example, localization may be lost when the robot is unexpectedly moved, a sensor malfunctions, or due to other reasons. In some embodiments, during relocalization the processor examines the prior few localizations performed to determine if there are any similarities between the data captured from the current location of the robot and the data corresponding with the locations of the prior few localizations of the robot. In some embodiments, the search during relocalization may be optimized. Depending on the speed of the robot and change of scenery observed by the processor, the processor may leave bread crumbs at intervals wherein the processor observes a significant enough change in the scenery observed. In some embodiments, the processor determines if there is significant enough change in the scenery observed using Chi square test or other methods. FIG. 175 illustrates the robot 23400 and a trajectory 23401 of the robot 23400. At a first time point to, the processor observes area 23402. Since the data collected corresponding to observed area 23402 is significantly different from any other data collected, the location of the robot 23400 at the first time point to is marked as a first rendezvous point and the processor leaves a bread crumb. At a second time point t1, the processor observes area 23403. There is some overlap between areas 23402 and 23403 observed from the location of the robot at first and time points to and t1, respectively. In determining an approximate location of the robot, the processor may determine that robot is approximately in a same location at the first and second time points to and t1 and the data collected corresponding to observed area 23403 is therefore redundant. The processor may determine that the data collected from the first time point to corresponding to observed area 23402 does not provide enough information to relocalize the robot. In such a case, the processor may therefore determine it is unlikely that the data collected from the next immediate location provides enough information to relocalize the robot. At a third time point t2, the processor observes area 23404. Since the data collected corresponding to observed area 23404 is significantly different from other data collected the location of the robot at the third time point t2 is marked as a second rendezvous point and the processor leaves a bread crumb. During relocalization, the processor of the robot 23400 may search rendezvous points first to determine a location of the robot 23400. Such an approach in relocalization of the robot is advantageous as the processor performs a quick search in different areas rather than spending a lot of time in a single area which may not produce any result. If there are no results from any of the quick searches, the processor may perform more detailed search in the different areas.

In some embodiments, the processor generates a new map when the processor does not recognize a location of the robot. In some embodiments, the processor compares newly collected data against data previously captured and used in forming previous maps. Upon finding a match, the processor merges the newly collected data with the previously captured data to close the loop of the map. In some embodiments, the processor compares the newly collected data against data of the map corresponding with rendezvous points as opposed the entire map as it is computationally less expensive. In embodiments, rendezvous points are highly confident. In some embodiments, a rendezvous point is the point of intersection between the most diverse and most confident data. For example, FIG. 176 illustrates confidence in the map/localization 23500, change in the scenery data observed 23501 and intersection 23502 of the confidence 23500 and the change in data observed 23501. Intersection point 23502 is the rendezvous point. In some embodiments, rendezvous points may be used by the processor of the robot where there are multiple floors in a building. It is likely that each floor has a different layout, color profile, arrangement, decoration, etc. These differences in characteristics create a different landscape and may be good rendezvous points to search for initially. For example, when a robot takes an elevator and goes to another floor of a 12-floor building, the entry point to the floor may be used as a rendezvous point. Instead of searching through all the images, all the floor plans, all LIDAR readings, etc., the processor may simply search through 12 rendezvous points associated with 12 entrance points for a 12-floor building. While each of the 12 rendezvous points may have more than one image and/or profile to search through, it can be seen how this method reduces the load to localize the robot immediately within a correct floor. In some embodiments, a blind folded robot (e.g., a robot with malfunctioning image sensors) or a robot that only know a last localization may use its sensors to go back to a last known rendezvous point to try to relocalize based on observations from the surrounding area. In some embodiments, the processor of the robot may try other relocalization methods and techniques prior returning to a last known rendezvous point for relocalization.

Figure 177A:
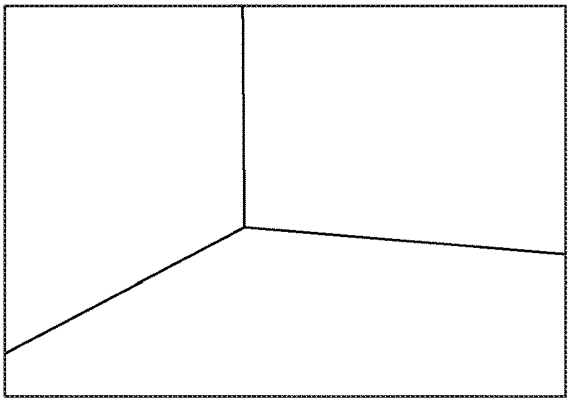
Figure 177B:
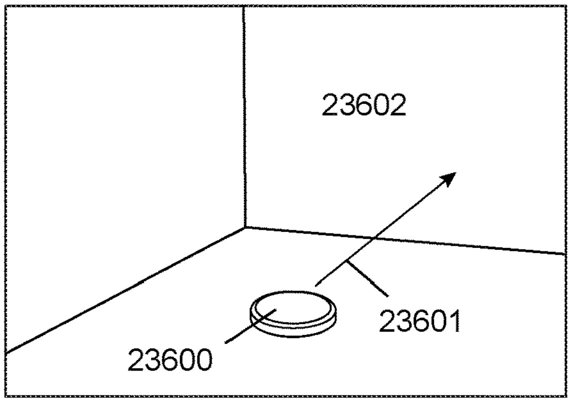
Figure 177C:
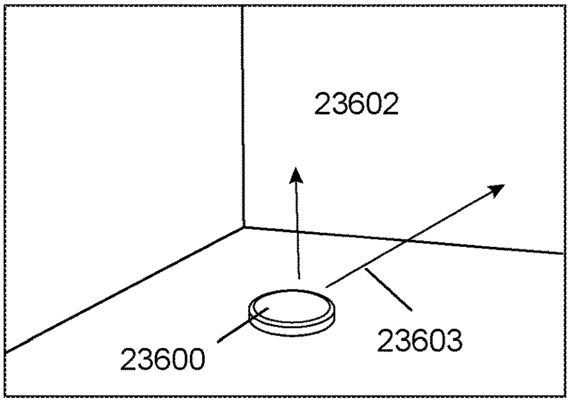
Figure 178A:
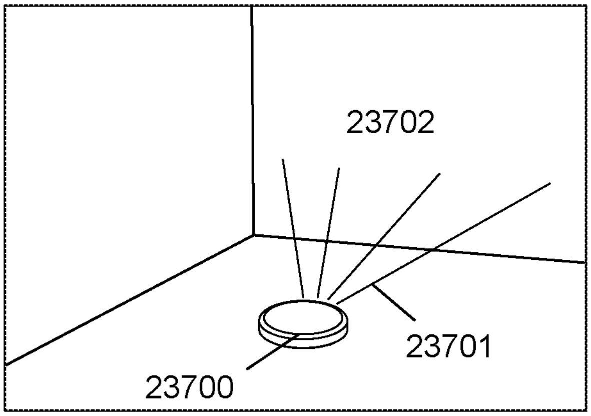
Figure 178B:
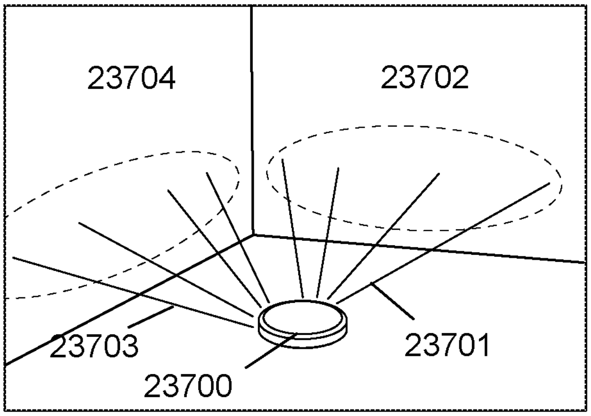
Figure 178C:
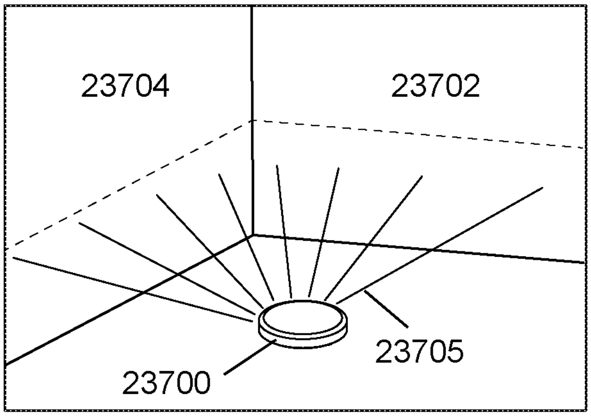

In some embodiments, the processor of the robot may use depth measurements and/or depth color measurements in identifying an area of an environment or in identifying its location within the environment. In some embodiments, depth color measurements include pixel values. The more depth measurements taken, the more accurate the estimation may be. For example, FIG. 177A illustrates an area of an environment. FIG. 177B illustrates the robot 23600 taking a single depth measurement 23601 to a wall 23602. FIG. 177C illustrates the robot 23600 taking two depth measurements 23603 to the wall 23602. Any estimation made by the processor based on the depth measurements may be more accurate with increasing depth measurements, as in the case shown in FIG. 177C as compared to FIG. 177B. To further increase the accuracy of estimation, both depth measurements and depth color measurements may be used. For example, FIG. 178A illustrates a robot 23700 taking depth measurements 23701 to a wall 23702 of an environment. An estimate based on depth measurements 23701 may be adequate, however, to improve accuracy depth color measurements 23703 of wall 23704 may also be taken, as illustrated in FIG. 178B. In some embodiments, the processor may take the derivative of depth measurements 23701 and the derivative of depth color measurements 23703. In some embodiments, the processor may use a Bayesian approach, wherein the processor may form a hypothesis based on a first observation (e.g., derivative of depth color measurements) and confirm the hypothesis by a second observation (e.g., derivative of depth measurements) before making any estimation or prediction. In some cases, measurements 23705 are taken in three dimensions, as illustrated in FIG. 178C.

In collaborative SLAM, a source of information may be another mobile robot and/or a stationary device, such as a stationary camera. In some embodiments, the processor of the robot localizes the robot based on recognition of a stationary camera. In some embodiments, two mobile robots within a vicinity of one other may exchange captured sensor data (e.g., images) while accounting for their respective movements and changes in their respective positions in relation to one another. When a portion of or all data points are missing due to, for example, network congestion, a phase-space of the robot may evolve with time.

In some embodiments, the processor of the robot may use visual clues and features extracted from 2D image streams for local localization. These local localizations may be integrated together to produce global localization. However, during operation of the robot, streams of images coming in may suffer from quality issues arising from a dark environment or relatively long continuous stream of featureless images arising due to a plain and featureless environment. Some embodiments may prevent the SLAM algorithm from detecting and tracking the continuity of an image stream due to the FOV of the camera being blocked by some object or an unfamiliar environment captured in the images as a result of moving objects around, etc. These issues may prevent a robot from closing the loop properly in a global localization sense. Therefore, the processor may use depth readings for global localization and mapping and feature detection for local SLAM or vice versa. It is less likely that both sets of readings are impacted by the same environmental factors at the same time whether the sensors capturing the data are the same or different. However, the environmental factors may have different impacts on the two sets of readings. For example, the robot may include an illuminated depth camera and a TOF sensor. If the environment is featureless for a period of time, depth sensor data may be used to keep track of localization as the depth sensor is not severely impacted by a featureless environment. As such, the robot may pursue coastal navigation for a period of time until reaching an area with features.

In embodiments, regaining localization may be different for different data structures. While an image search performed in a featureless scene due lost localization may not yield desirable results, a depth search may quickly help the processor regain localization of the robot and vice versa. For example, depth readings impacted by short readings caused by dust, particles, human legs, pet legs, a feature that is located at a different height, or an angle, may remain reasonably intact within the timeframe in which the depth readings were unclear. When trying to relocalize the robot, the first guess of the processor may comprise where the processor predicts the location of the robot to be. Based on control commands issued to the robot to execute a planned path, the processor may predict the vicinity in which the robot is located. In some embodiments, a best guess of a location of the robot may include a last known localization. In some embodiments, determining a next best guess of the location of the robot may include a search of other last known places of the robot, otherwise known as rendezvous points (RP). In some embodiments, the processor may use various methods in parallel to determine or predict a location of the robot.

FIG. 179 illustrates an example of a corner 23800 that may be detected by a processor of a robot based on sensor data and used to localize the robot. For instance, a camera positioned on the robot 23801 captures a first image 23802 of the environment and detects a corner 23803 at a first time point t0. At a second time point t1, the camera captures a second image 23804 and detects a new position of the corner 23802. The difference in position 23805 between the position of corner 23802 in the first image 23803 and the second image 23804 may be used in determining an amount of movement of the robot and localization. In some embodiments, the processor detects the corner based on change in pixel intensity, as the rate of change in pixel intensity increases in the three directions that intersect to form the corner.

In some embodiments, the displacement of the robot may be related to the geometric setup of the camera and its angle in relation to the environment. When localized from multiple sources and/or data types, there may be differences in the inferences concluded based on the different data sources and each corresponding relocalization conclusion may have a different confidence. An arbitrator may choose and select a best relocalization. For example, FIG. 180 illustrates an arbitrator proposing four different localization scenarios, the first proposal (proposal 1) having the highest confidence in the relocalization proposed and the last proposal (proposal 4) having the lowest confidence in the relocalization proposed. In embodiments, the proposal having the highest confidence in the relocalization of the robot may be chosen by the arbitrator.

In some embodiments, the processor of the robot may keep a bread crumb path or a coastal path to its last known rendezvous point. For example, FIG. 181A illustrates a path 24000 of the robot, beginning at a charging station 24001 and ending at 24002, wherein the processor of the robot has lost localization. A last known rendezvous point 24003 is known by the processor. The processor also kept a bread crumb path 24005 to the charging station 24001 and a break crumb path 24006 to the rendezvous point 24003. FIG. 181B illustrates a safe bread crumb path 24007 that the robot follows back to the charging station 24001. The bread crumb path 24007 generally remains in a middle area of the environment to prevent the robot from collisions or becoming stuck. FIG. 181C illustrates a coastal path 24008 that the robot may follow to return to the charging station 24001. FIG. 181D illustrates a coastal path 24009 that the robot may follow to last known point 24010 in which a reliable localization was determined. Although in going back to the last known location 24010 the robot may not have functionality of its original sensors, the processor may use data from other sensors to follow a path back to its last known good localization as best as possible because the processor kept a bread crumb path, a safe path (in the middle of the space), and a coastal path. In embodiments, the processor may be any of a bread crumb path, a safe path (in the middle of the space), and a coastal path. In embodiments, any of the bread crumb path, the safe path (in the middle of the space), and the coastal path comprise a path back to a last known good localized point, one point to a last known good localized point, two, three or more points to a last known good localized point, and to the start. In executing any of these paths back to a last known good localization point, the robot may drift as it does not have all of its sensors available and may therefore not be able to exactly follow a trajectory as planned. However, because the last known good localized point may not be too far, the robot is likely to succeed. The robot may also succeed in reaching the last known good localized point as the processor may use other methods to follow a coastal localization and/or because the processor may select to navigate in areas that are wide such that even if the robot drifts it may succeed.

FIG. 182 illustrates an example of a flowchart illustrating methods implemented in a localization arbitrator algorithm. The localization arbitrator algorithm constantly determines confidence level of localization and examines alternative localization candidates to converge to a best prediction. The localization arbitrator algorithm also initiates relocalization and chooses a next action of the robot in such scenarios.

Figure 183A:
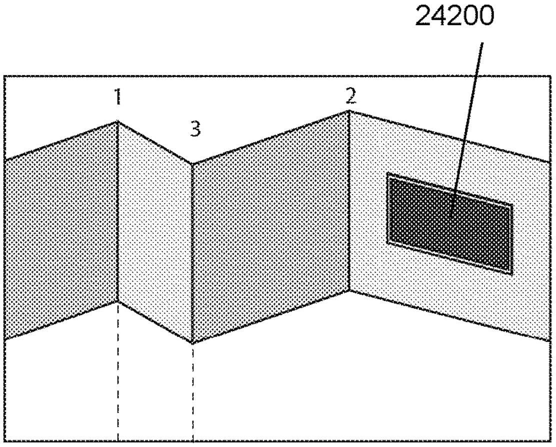
Figure 183B:
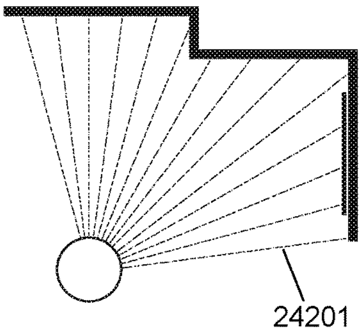
Figure 183C:
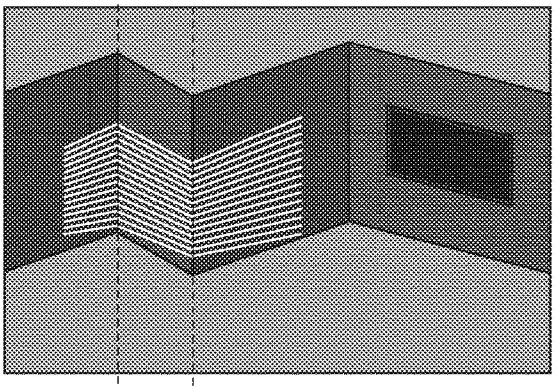
Figure 183D:
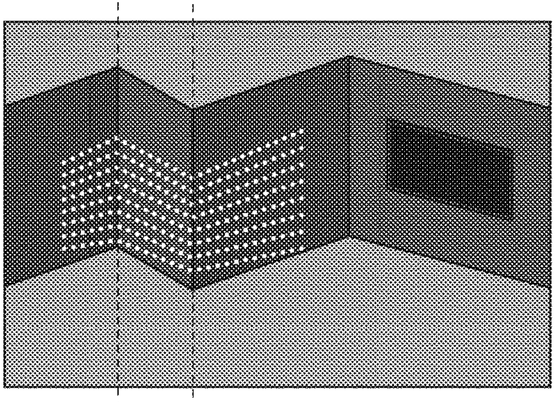
Figure 183F:
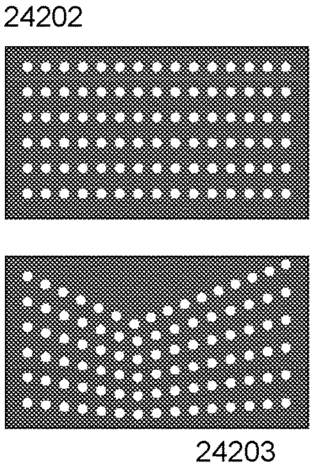
Figure 183E:
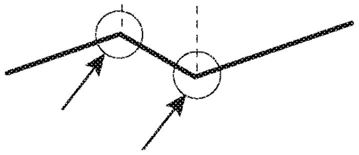

In yet another example, a RGB camera is set up with a structured light such that it is time multiplexed and synched. For instance, the camera at 30 FPS may illuminate 15 images of the 30 images captured in one second with structured light. At a first timestamp, an RGB image may be captured. In FIG. 183A, the processor of the robot detects a set of corners 1, 2 and 3 and TV 24200 as features based on sensor data. In FIG. 183B, a next time slot, the area is illuminated and the processor of the robot extracts L2 norm distances 24201 to a plane. With more sophistication, this may be performed with 3D data. In addition to the use of structured light in extracting distance, the structured light may provide an enhanced clear indication of corners. For instance, a grid like structured light projected onto a wall with corners is distorted at the corners. This is illustrated in FIGS. 183C and 183D, wherein the distortion is shown to correlate with the corners shown in FIGS. 183A and 183E. In a close-up image of the structured light, FIG. 183F illustrates the structured light when projected on a flat wall 24202 in comparison to the distorted structured light when projected on a wall with a corner 24203. The distorted structured light extracted from the RGB image based on examining a change of intensity and filters correlates with corners. Because of this correspondence, the illumination and depth may be used to keep the robot localized or help regain localization in cases where image feature extraction fails to localize the robot.

In some embodiments, an image may be segmented to areas and a feature may be selected from each segment. In some embodiments, the processor uses the feature in localizing the robot. In embodiments, images may be divided into high entropy areas and low entropy areas. In some embodiments, an image may be segmented based on geometrical settings of the robot. FIG. 184 illustrates various types of image segmentations. For instance, image segmentation for feature extraction based on entropy segmentation 24300, exposure segmentation 24301, and geometry segmentation 24302 based on geometrical settings of the robot. In embodiments, the processor of the robot may extract a different number of features from different segmented areas of an image. In some embodiments, the processor dynamically determines the number of features to track based on a normalized trust value that depends on quality, size, and distinguishability of the feature. For example, if the normalized trust value for five features are 0.4, 0.3, 0.1, 0.05, and 0.15, only features corresponding with 0.4 and 0.3 trust values are selected and tracked. In such a way, only the best features are tracked.

In some embodiments, the processor implements deep bundling for localization of the robot. For example, FIG. 185 illustrates an example of deep bundling wherein given the robot is at a position A and that the processor knows the robot's distance to point 1 and point 2, the robot knows how far it is from both point 1 and point 2 when the robot moves some displacement to position B. In another example illustrated in FIG. 186, the processor of the robot knows that Las Vegas is approximately X miles from the robot. The processor of the robot learns that L.A. is a distance of Y miles from the robot. When the robot moves 10 miles in a particular direction with a noisy measurement apparatus, the processor determines a displacement of 10 miles and determines approximately how far the robot is from both Las Vegas and Los Angeles. The processor may iterate and determine where the robot is. In some embodiments, this iterative process may be framed as a neural network that learns as new data is collected and received by the network. The unknown variable may be anything. For example, in some instances, the processor may be blind with respect to movement of the robot wherein no displacement or angular movement is measured. In that case, the processor would be unaware that the robot travelled 10 miles. With consecutive measurements organized in a deep network, the information provided to the network may be distance readings or position with respect to feature readings and the desired unknown variable may be displacement. In some circumstances, displacement may roughly be known but accuracy may be needed. For instance, an old position may be known, displacement may be somewhat known, and it may be desired to predict a new location of the robot. The processor may use deep bundling (i.e., the related known information) to approximate the unknown.

Figure 188A:
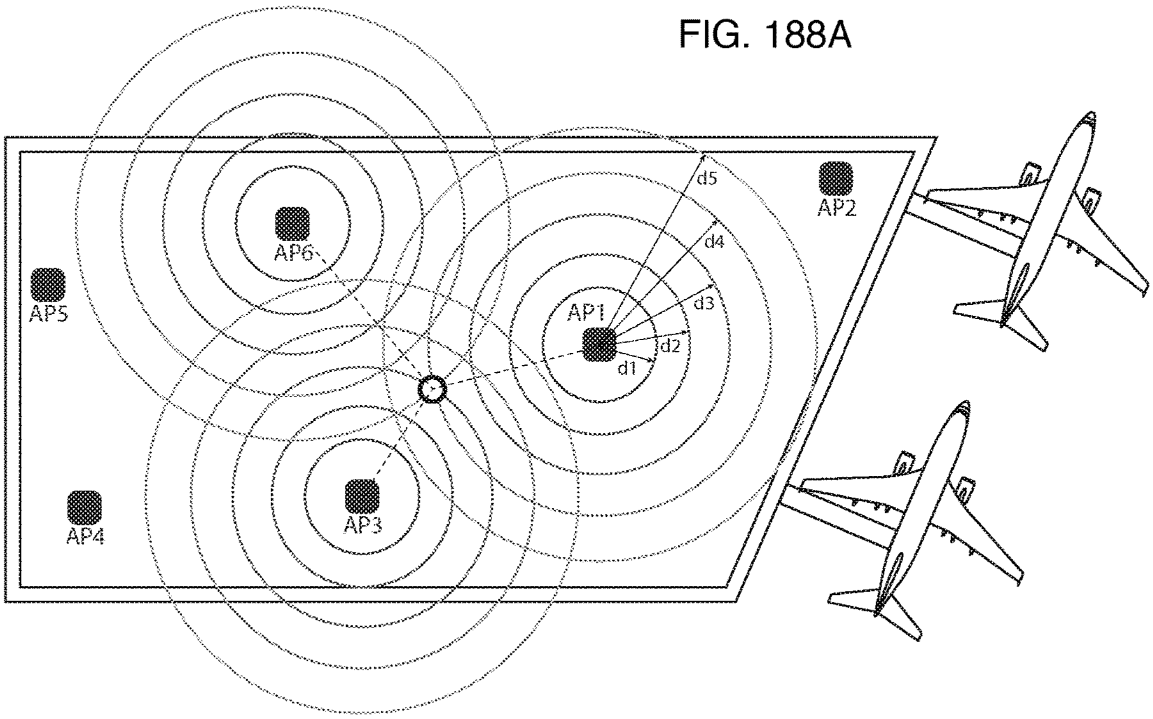
Figure 188B:
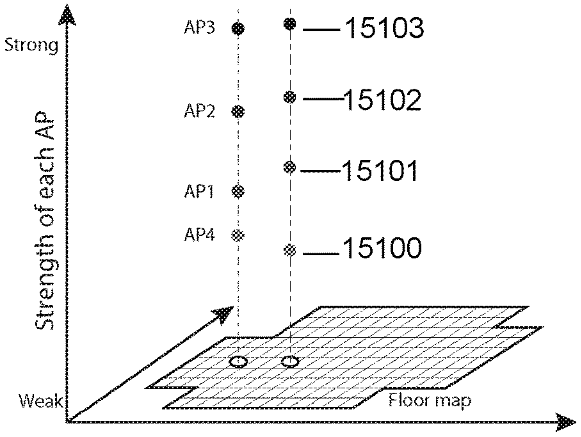
Figure 188C:
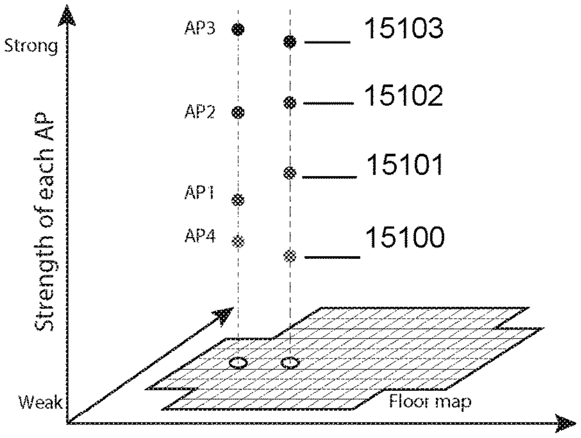

Neural networks may be used for various applications, such as object avoidance, coverage, quality, traversability, human intuitiveness, etc. In another example, neural networks may be used in localization to approximate a location of the robot based on wireless signal data. In a large indoor area with a symmetrical layout, such as airports or multi-floor buildings with a similar layout on all or some floors, the processor of the robot may connect the robot to a strongest Wi-Fi router (assuming each floor has one or more Wi-Fi routers). The Wi-Fi router the robot connects to may be used by the processor as an indication of where the robot is. In consumer homes and commercial establishments, wireless routers may be replaced by a mesh of wireless/Wi-Fi repeaters/routers. For example, FIG. 187 illustrates wireless/Wi-Fi repeaters/routers 15000 at various levels within a home. In large establishments such as shopping malls or airports they may be access points. For example, FIG. 188A illustrates an example of an airport with six access points (AP1 to AP6). The processor of the robot may use a neural network to approximate a location of the robot based on a strength of signals measured from different APs. For instance, distance d1, d2, d3, d4, and d5 are approximately correlated to strength of the signal that is received by the robot which is constantly changing as the robot gets farther from some APs and closer to others. At timestamp t0, the robot may be at a distance d4 from AP1, a distance d3 from AP3, and a distance d5 from AP6. At timestamp t1, the processor of the robot determines the robot is at a distance d3 from AP1, a distance d5 from AP3, and a distance d5 from AP6. As the robot moves within the environment and this information is fed into the network, a direction of movement and location of the robot emerges. Over time, the approximation in direction of movement and location of the robot based on the signal strength data provided to the network increases in accuracy as the network learns. Several methods such as least square methods or other methods may also be used. In some embodiments, approximation may be organized in a simple atomic way or multiple atoms may work together in a neural network, each activated based on the training executed prior to runtime and/or fine-tuned during runtime. Such Wi-Fi mapping may not yield accurate results for certain applications, but may be as sufficient as GPS data is for an autonomous car when used for indoor mobile robots (e.g., a commercial airport floor scrubber). In a similar manner, autonomous cars may use 5G network data to provide more accurate localization than previous cellular generations.

In some embodiments, wherein the accuracy of approximations is low, the approximations may be enhanced using a deep architecture that converges over a period of training time. Over time, the processor of the robot determines a strength of signal received from each AP at different locations within the floor map. This is shown for two different runs in FIGS. 188B and 218C, wherein the signal strength from AP1 to AP4 is determined for different locations within the floor map. In the first run, sensors of the robot observe signal strengths from APs as a function of time and a location of the robot. In the first run, as the robot moved from position 1 to position 2, signal 15100 weakened a little, signal 15101 strengthened and signals 15102 and 15103 remained substantially the same. In the second run, the robot moves from position 1 to position 2. Note trajectory does not have to be the same as long as the processor obtains measurements from each position. Sensors of the robot may collect multiple measurements from each position in the same run. Although the places of the APs are fixed, because of different noise factors and other variables, the signal strengths are not deterministic. In the second run, the signal strength 15102 at position 1 remained almost the same but at position 2 reduced in strength by a minimal amount. Signal 15103 slightly increased in strength in moving from position 1 to 2 at a faster pace than in run 1. The same was observed with signal 15101 while the signal strength of 15100 remained substantially the same. FIG. 188D illustrates run 1 to run n combined. Eventually, the data collected on signal strength at different locations are combined to provide better estimates of a location of the robot based on the signal strengths from different APs received. In embodiments, stronger signals translate to less deviation and more certainty. In some embodiments, the AP signal strength data collected by sensors of the robot are fed into the deep neural network model along with accurate LIDAR measurements. In some embodiments, the LIDAR data and AP signal strength data are combined into a data structure then provided to the neural network such that a pattern may be learned and the processor may infer probabilities of a location of the robot based on the AP signal strength data collected, as shown in FIG. 189.

Some embodiments execute a search to determine a location of the robot, wherein a number of distances to points visible to the robot may be chosen to be searched against available maps (e.g., maps of different floors) to locate the robot. The denser the population of distances, the higher the confidence, however, more computational resources become at stake. A low resolution search based on a subset of distances may initially be executed to determine areas with a high probability of matching that may be searched in more detail during a next step. FIG. 190 illustrates an example of a process of relocalizing a robot based on partial data of an existing map, wherein (A) the robot 9200 uses sensors to measure distances 9201 to walls 9202 of the environment 9203, the measurement device hitting the wall in some areas 9204 and missing contact with an object in other areas 9205. A processor of the robot observes (B) a partial map 9206, based on the distance measurements 9201. The processor may (C) perform a search in a low resolution version of a previous map 9207 of the environment 9203 to determine areas with a high probability of matching the partial map 9206 then performs a detailed search within those areas. During the search, the processor may (D) rotate the partial map 9206 to see if it fits with different the previous map 9207 after being rotated. In some embodiments, the processor may not find a match between current surroundings and a first previous map. In such cases, the processor may begin searching for a match with other previously generated floorplans. In some embodiments, distinct features extracted from the distance readings may be searched for in previous maps. If the distances indicate a planar wall in a 3D scan or a line in 2D scan, too many matches are possible and a proper search result is not yielded. When the processor is unable to localize the robot or a confidence score is below a predetermined threshold, the robot moves to a secondary position to gather more distance measurements and repeat the process. In some cases, in moving to the secondary point, the robot may not follow restrictive instructions provided by the user. For example, the robot may enter a no-go zone without the processor knowing as the location of robot is unknown until the processor relocalizes the robot. As the robot moves to the secondary location, data is gathered along the way to the secondary location and at certain points the robot may rotate to scan the surroundings.

In some embodiments, the robot starts performing work (e.g., cleaning coverage or security surveillance) while the processor tries to relocalize. In some embodiments, the processor spends a predetermined amount of time/effort to relocalize before attempting to perform work. If the processor does not find a match to or an association of its current surroundings to a previous map, it builds a new map. In some embodiments, a new map building process starts as soon as the robot turns on and continues while the processor attempts to relocalize the robot. If relocalization or finding a match with the proper map fails, the processor loads and adapts the newly built map. This way, the processor does not have to start the map building process only after its attempts to relocalize the robot fails. The processor may load and adapt the areas mapped so far at any point when it is determined or discovered that the newly built map matches with a previous map or is an extension of the previous map. In the event of the latter, the processor merges the new map with the previous map at overlapping points. In one example, a robot may begin working in a room within an environment of which the processor of the robot has a map of. However, the map does not include the room as the robot has not previously visited the room due to a door of the room being consistently closed. FIG. 191A illustrates the robot 9300 within the environment 9301 beginning work at point A. A door 9302 to room 9303 is closed during the first few runs of the robot 9300, therefor, the processor does not observe or map room 9303. FIG. 191B illustrates the robot 9300 in a later run. The robot 9300 is initially placed in room 9303, however, the processor cannot relocalize as the room 9303 has not been previously mapped. In the meantime, the processor begins building a new map. As a result of failed relocalization, the robot drive to position C and the processor scans the area and attempts to relocalize. Upon failing to relocalize again, the processor loads the new map it has been creating since point A and the robot 9300 starts working by covering the entire room 9303. The robot 9303 then drives outside of the room 9303 as it continues to work. At position E, the processor discovers that room 9303 is an extension to a previously known floorplan and modifies the map to include room 9303. This may prompt a confirmation or notification from a user on an application or other user interface confirming the addition of room 9303 to the map.

In some embodiments, the processor of the robot uses visual clues and features extracted from 2D image streams for local localization. These local localizations are integrated together to produce global localization. For example, FIG. 192 illustrates data captured by a first camera, a second camera, an odometer, and an IMU. The image captured by the second camera is compared with the image captured by the first camera to determine a displacement that is fed, together with data from the odometer and the IMU, to an online matching engine that matches the last few data captured by the three sources. The output of the matching engine and the first camera are used in calculating a first displacement from a last known position of the robot. The displacement is stored in a database with time stamp and is used to calculate a next actuation of the robot to remain on a planned path. Within the database, key frames for association are identified. A sparsifying engine receives the image captured by the first camera and the next actuation of the robot. Key features from the 3D point cloud are identified. As more data is captured associations between frames become denser. Upon completion of a work session, the processor solves for relations and closes the loop. When offline, larger sets are matched 22112. FIG. 193 illustrates a stack of masks.

During operation of the robot, streams of images may suffer from quality issues caused by dark environments; relatively long, continuous featureless images in cases where large areas of the environment are plain and featureless, preventing the SLAM algorithm from detecting and tracking continuity in the stream of images; a dynamic obstacle blocking the FOV of a camera long enough to prevent the SLAM algorithm from detecting and tracking continuity of the stream of images; and a rearrangement of objects within the environment resulting in the environment appearing unfamiliar. When the processor of the robot loses localization of the robot, or otherwise discovers that current readings (e.g., distance or image readings) do not match what is expected based on the map, the processor needs to regain localization of the robot. The processor searches for neighboring points within the map (e.g., distances to neighboring points or images pertaining to neighboring points) to discover a match, then uses the matching point or image as a current location of the robot. In some embodiments, the processor combines new sensor data corresponding with newly discovered areas to sensor data corresponding with previously discovered areas based on overlap between sensor data. FIG. 194A illustrates a workspace 18200. Area 18201 is the mapped area, area 18202 is the area that has been covered by the robot, and area 18203 is the undiscovered area. After covering area 18202, the processor of the robot may cease to receive information from a sensor used in SLAM at a location 18204. The processor may use sensor data from other sensors to continue operation. The sensor may become operable again and the processor may begin receiving information from the sensor at a location 18205, at which point the processor observes a different part of the workspace 18200 than what was observed at location 18204. FIG. 194B illustrates the workspace 18200, area observed by the processor 18206, remaining undiscovered area 18203, and unseen area 18207. The area of overlap 18208 between the mapped areas 18201 and the area observed 18206 may be used by the processor to combine sensor data from the different areas and relocalize the robot. The processor may use least square method, local or global search methods, or other methods to combine information corresponding to different areas of the workspace 18200. In some cases, the processor may not immediately recognize any overlap between previously collected sensor data and newly observed sensor data. For example, FIG. 195 illustrates a position of the robot at a first time point to and second time point t1. A LIDAR of the robot becomes impaired at second time point t1, at which point the processor has already observed area 18300. The robot continues to operate after the impairment of the sensor. At a third time point t2, the sensor becomes operable again and observes area 18301. In this example, other sensory information was impaired and/or was not enough to maintain localization of the robot due minimal amount of data collected prior to the sensor becoming impaired and the extended time and large space traveled by the robot after impairment of the sensor. The area 18301 observed by the processor appears different than the workspace previously observed in area 18300. Despite that, the robot continues to operate from the location at third time point t2 and sensors continue to collect new information. At a particular point, the processor recognizes newly collected sensor data that overlaps with sensor data corresponding to area 18300 and integrates all the previously collected data with the sensor data corresponding with area 18301 at overlapping points such that there are no duplicate areas in the most updated map.

After building the map, it is easier for the processor of the robot to relocalize the robot within the environment. Under normal circumstances and a relatively static environment, the processor gains high confidence in a location of the robot upon initial relocalization. Therefore, there is no need for the robot to move much for the processor to gain enough confidence to consider the robot relocalized within the map. However, when the environment is changing (e.g., with dynamic obstacles, movement of the charging station, or accidental bumping of the robot), the robot may move a longer distance to increase the confidence level and before the processor approves the map. In this particular situation, an initial move of the robot may be in a direction of a virtual barrier if the virtual barrier is placed too close to an initiation point of the robot and the robot may cross the virtual barrier during its attempt to relocalize. The robot may turn back to a correct side of the virtual barrier after the processor realizes (i.e., upon relocalization) that the robot is in a restricted area. FIG. 196 illustrates a robot 4500 crossing a virtual barrier 4501 into a restricted zone 4502 during relocalization 4503 and leaving the restricted zone 4502 after relocalization 4503. This behavior may be configured based on a preference of the user.

Some embodiments employ resilient real-time teleporting tracing. For example, the processor of the robot uses QSLAM to successfully relocalize after being forcibly displaced by three meters. FIG. 197 illustrates a table of various robot brands and a number of successful relocalizing attempts after being forcibly displaced by one, two, and three meters. In some embodiments, the processor of the robot uses data from an imaging device or distance measuring device to perform volumetric localization. FIG. 198 illustrates an example of an HD depth map formed using data from a depth sensor and an HD map formed using data from an image sensor.

In some embodiments, a user or an operator is localized. For example, FIG. 199 illustrates clothing 22800 of a user 22801 including particular features, such as color label 22802 and QR codes 22803 that are used for localization. Movement of the user 22801 is captured, wherein a location of particular points 22804 align with joints of the user 22801 and features 22802 and 22803 on the clothing are used to determine the location of points 22804. Movement of joints of the user 22801 are translated to corresponding robotic joints of a robotic arm 22805. A gyroscope and/or an encoder in combination with a camera and SLAM are used to measure movement of the robotic arm 22805 and correct noise and deviations.

In some embodiments, a first sensor captures depth and a second sensor captures an image. Using depth data and image data, each pixel or group of pixels are associated with a depth value. FIG. 200 illustrates a FOV 22900 of an image sensor capturing an image of a scene. Groups of pixels 22901 of an image are each associated with different depth values. In some embodiments, image data and depth data are combined to form a map wherein each pixel is associated with a depth value in a particular frame of reference. In some embodiments, the processor localizes the robot depth-wise and pixel-wise in a vertical direction and horizontal direction. In some embodiments, multiple camera and depth measuring units simultaneously capture images and depth information for generating a high dimension map for high dimension localization. When multiple devices capable of high dimensional mapping and localization are used in combination for mapping and localization, a hyper dimensional map is created and evolves over time. FIG. 201 illustrates an example of a process for navigation of a robot, wherein the process determines whether a feature and measured distance are a match. If there is a match, a processor of the robot uses the information to navigate. If there is no match, the process is repeated. FIG. 202 illustrates an example of a process for navigation of a robot, wherein data from two sensor types are fused, from which a position of the robot is inferred and a map is determined. The process then checks for blind spots, if there are no blind spots the robot continues. If there is a blind spot the robot slows down such that the blind spot is eliminated and the blind spot is filled in from inferred information. FIG. 203 illustrates an example of a process for localizing a robot, wherein sensor data is fused, from which a processor of the robot localizes against a coordinate system and updates a reference coordinate system. The process is continuously repeated. FIG. 204 illustrates an example of a process for localizing a robot, wherein a feature is extracted from captured sensor data and an attempt to match the feature to known features within an environment is made. If there is a match, the robot is localized, and if not, the process is repeated.

In some embodiments, a depth is associated with every pixel. For example, FIG. 205 illustrates an image 23400 of an environment and a depth image 23401, wherein darker areas have greater depth values. A depth value from the depth image 23401 is associated with a corresponding pixel from the image 23400, as illustrated in three-dimensions 23402, wherein a depth for objects within the environment is shown. Some embodiments include semantic segmentation, wherein each pixel is labeled with an object to which it belongs. Some embodiments include depth segmentation, wherein each pixel is labeled with a depth of the object to which it is associated. As a result, a set of pixels is labelled with a same depth. For example, FIG. 206 illustrates a set of pixels 23500 associated with a same depth 23501. Assigning a depth to each pixel may be computationally intensive. An alternative comprises grouping pixels with a same depth and occupying nearby spaces in the image and assigning a depth class to the group of pixels. Another alternative comprises assigning a volume bounding box to each neighborhood of pixels and labeling each volume bounding box with a depth value. In some embodiments, the bounding box comprises a 2D box applied to a 2D image. FIG. 207 illustrates bounding boxes 23600 of pixels, each of the bounding boxes (and hence the pixels within the bounding boxes 23600) labelled with a depth, 3 and 4 meters.

Some embodiments comprise any of semantic segmentation, object extraction, object labeling, object depth assignment, bounding box depth assignment, tracking of bounding box, continuous depth calculation of bounding box of an object of interest (e.g., a human, a car, or a bike). In some embodiments, a distance or depth to an observer is associated an object. Other properties that may be associated with the object include dimensions and size of the object; surface characteristics of the object (e.g., level of reflectiveness, color, roundness, smoothness, texture, roughness); corners, edges, lines, or blobs of the object; a direction of movement of the object, including absolute movement and relative movement (e.g., in relation to an observer); a direction of acceleration or deceleration; static or dynamic property of the object; sensors of the robot from which the object is hidden; occlusion, partial occlusion, previous occlusion, or approaching occlusion of the object; and a level of influence of environmental factors on the object (e.g., lighting conditions). Some properties associated with the object depend on other observations. For example, absolute depth in relation to a frame of reference depends on processing/rendering of at least a portion of a map. Additionally, there is partial observability while data is gathered for processing/rendering the map, and while there is observance of some values of properties, a lower confidence level is assigned to those values. Probabilistic values or descriptions of one or more properties associated with an object depends on sample data collected at a current time and up to the current time. In cases wherein partial observable data is used, principals of central limit theorem are used, assuming a mean of a large sample population is normally distributed and approaches a mean of the population and a variance of the sample population approaches a variance of the original population divided by a size of the sample.

In some embodiments, consecutive observations are added to meet criteria or formulate a prediction. Once a prediction is formulated, consecutive observations added after the prediction contribute to a re-prediction or reassessment of the prediction or are used to fine tune the prediction. In some embodiments, multiple sensor inputs are fused to contribute to a map building or localization process. In some embodiments, multiple sensor inputs independently contribute to the map building or localization process. In some embodiments, statistical interaction of two independent observations are considered, as the effect of one independent variable may have dependencies on the other independent variable. Use of high biased learning methods, such as linear regression or logistic regression, may lead to underfitting (particularly if a number of features is low), while use of Decision Trees, K-NN, and SVM methods may have lower bias and higher variance. As the complexity of the model increases, generalization improves as well as performance of the model with unseen data. However, complexity of the model increases sensitivity and causes overfitting. For example, for a K-nearest neighbor model, a value of K or a number of neighbors is increased to compensate for low bias and high variance. In another example, for a SVM model, a number of followed violations of a margin is adjusted to account for low bias and high variance.

To defeat overfitting, distinctive feature selection is used by pruning less distinguishable features, introducing artificial noise, using dropout methods, and L1/L2 regularization. In embodiments, a bigger training set is used to reduce chances of overfitting with a complex model. As such, complexity of the model is selected based on a size of the training set. Other methods complementing the above techniques include K-folds cross validation, early stopping, and boosting and bagging. In some embodiments, a constant multiple, such as L1 (lasso, $|a|$) or L2 (ridge, $a^2$) is added to a set of weight vectors for fine tuning (i.e., regularization). In some embodiments, cross validation is used to help generalize previously unseen observed data. In some embodiments, a data set is shuffled, the shuffled data set is split into K groups, each group is divided into a training set and a test set, and for each group the training set is used to fit a model and the test set is used to validate the model.

In some embodiments, a map includes active beacon points to break dawn large areas into smaller areas or for localization of the robot. For example, a grid map identifies grid squares associated with active IR emission. FIG. 208 illustrates a charging station 23700 emitting IR signals 23701 towards a robot 23702 and grid map 23703 of environment 23704. Grid squares that overlap with active IR emission are identified using dots 23705 or shading 23706. Active beacon points are useful large areas or areas including many logical area enclosures, such as a shopping mall with many stores. In some embodiments, apart from declaring a presence or dividing an area, the active beacon carries information. For example, frequency manipulation of an IR signal of a beacon is used to encode a code word. The code word is used identify a particular beacon and associated characteristics, such as a number of area hops from a center of an environment. For example, FIG. 209 illustrates center, middle, and outer zones. Active beacons are positioned within the center, middle, and outer zones each active beacon encoded with a unique code word used by the processor of the robot to identify a zone within which the beacon is located. In some embodiments, each active beacon serves as a space divider or bread crumbs such that the processor of the robot can navigate the robot from one location to another.

In addition to SLAM methods, a secondary fail-safe mechanism, such as the use of beacons, may be used to ensure a high rate of localization success. For example, a built-in robotic cleaning system, one appliance of a set of appliances bought together and installed in a home, requires as much determinism and reliability as a fridge, meaning the built-in robotic cleaning system must not fail. In some embodiments, the active beacon comprises one or more emitters, while in other embodiments, the active beacon comprises one or more receivers. For example, FIG. 210 illustrates a robot 23900 comprising an omnidirectional transmitter 23901 and an active beacon 23902 comprising receiver A and receiver B. When only receiver A receives the signal transmitted by transmitter 23901, the active beacon 23902 concludes the robot 23900 is positioned to a right side of a line 23903 aligned with a center of the active beacon 23902. When only receiver B receives the signal transmitted by transmitter 23901, the active beacon 23902 concludes the robot 23900 is positioned to a left side of the line 23903. When both receiver A and receiver B receive the signal transmitted by transmitter 23901, the active beacon 23902 concludes the robot 23900 is positioned on the line 23903. The active beacon transmits the information to a processor of the robot 23900 such that the processor localizes the robot 23900 with high certainty, actuates the robot 23900 to move in a particular direction to remain on a particular side of the line 23903, or adds a clue to the map.

In some embodiments, the map is divided into small, medium and large tiles. For example, each large tile of the map is divided into a number of smaller tiles. This concept is similar to multiple resolution maps. In a multiple resolution map, the processor of the robot determines which large tile the robot is positioned on, then determines which small tile from a subset of tiles that form the large tile the robot is positioned on. FIG. 211 illustrates a subset of small tiles 24000 on which a robot 24001 is positioned. Upon determining a large tile on which the robot is positioned, a processor of the robot 24000 determines which small tiles 24001 the robot is positioned on. In some embodiments, the processor of the robot determines one or more tiles the robot is positioned on with a certain probability. In embodiments, tile size is determined based on a need for performing timely control measures. In one example, the desired probability of the one or more tiles on which the robot is positioned is 95%. Depending on measurement noise and reading accuracy, a certain minimum number of readings (n) are required. To solve an equation with n inputs, a certain amount of computational time is required. However, during the certain amount of computational time the robot moves onto another tile. As a result, the objective of having a control measure based on tile size is not met. A constraint of accurate estimation (e.g., maximum tile size) is a contribution to the estimation being obsolete by the time the estimation is completed. Even in tightening the constraint and using a smaller tile size, the robot leaves the tile faster while more time is required for the processor to estimate which tile the robot was positioned on at the time the process of estimation started. Rather than reducing the tile size or tightening the constraints, constraints are loosened, requiring a certain probability (e.g., % 95) of the tile on which the robot is positioned, and a larger tile is used, such as tile 24100 the robot 24001 is positioned on in FIG. 212. Assuming measurement accuracy and noise are the same as the previously described scenario, a smaller number of readings, and therefore, a smaller number of equations and computational time are required to estimate to localize the robot on a larger tile. With less computational time passing from a beginning of the estimation process until the output estimate, the robot moves less and the estimation is more relevant. It is more likely the robot is still positioned on the estimated tile at an end of the estimation process in a case where tiles are larger and robot speed is constant. However, knowing the tile on which the robot is positioned does not fully solve the problem but is a step towards the solution. Though a smaller number of inputs are required for estimating a location of the robot, the inputs are chosen intelligently. Readings that fit a certain criterion of being different from others are selected, thereby preventing a waste of computational time on counting redundant measurements.

Once the processor of the robot estimates which large tile the robot is positioned on, the processor uses new incoming measurements to determine which small tile from a set of small tiles the robot is positioned on. New incoming measurements are compared against observation of the surroundings corresponding with different small tiles to determine which observations fits well with the new incoming measurement. FIG. 213 illustrates a set of small tiles 24200 within a large tile 24201. The observations of the surroundings corresponding with a position of the robot 24202 on tile a does not fit well with the newly coming measurements and is an even worse fit with a position of the robot on tile b. With a simple search in a small state space, the processor determines a location of the robot within the small tile map. This second step may be performed using multiple approaches, such as a statistical ensemble, simulation method, or search. In one instance, a particle filter method imagines a number of robots, each robot positioned on a different small tile and each observing a respective map corresponding with their location. Multiple particles are carried forward, reducing a number of particles needed. In another instance, a simple search or comparative validation continuously localizes the robot for a small tile criteria of a set of tiles forming a larger tile robot is estimated to be positioned on (determined in the first step). As such, in some embodiments, a multivariate estimation problem with highly dense data points necessary to meet a high certainty/accuracy requirement is decomposed to a lower resolution requirement in a fort step followed by a comparative search to achieve the required resolution. A coarse to fine localization allows for quick localization with minimal computation time and refinement after. This decomposition is not specific to a grid map localization and further allows multithreading.

As explained herein, in multi-type landmark extraction, observation of a sophisticated type landmark may be used sparsely and at intervals to determine which group of clusters of primal landmarks to search for in order to find a match. In some embodiments, images are clustered to reduce the search domain, as explained elsewhere herein. In some embodiments, content-based image retrieval is used to match similar images in a large database. Similarity may be defined based on color, texture, objects, primal shapes, etc. In some embodiments, a query image is captured in real-time and the processor determines which image in a database the query image correlates to. In some embodiments, a vector space model is used to create visual words from local descriptors, such as SIFT, wherein a visual vocabulary is the database of previously captured images. A subset of images may include objects of interest or a detected object. In some embodiments, images are indexed in a database. The localization methods described herein are not restricted to one implementation of SLAM. For example, a first type of landmark may be a visual type (e.g., primal shape in an image), a second type of landmark may be a grid map type, a third type of landmark may be an object detected in image, and a fourth type of landmark may be an enclosure in a 2D representation of the map (e.g., a room).

In embodiments, the different types of landmark may have geometric relations, topological relations, or graph relations with one another (direct or indirect). The relations between different types of landmarks may be perceived, extracted gradually, or may remain unknown to the SLAM algorithm. It is not necessary for all relations to be discovered for SLAM. As relations are discovered they are used where beneficial and when undiscovered, the SLAM continues to operate under circumstances of partial observability. The SLAM algorithm is always in a state of partial observability, even as more observations are made and relations are inferred. FIG. 214 illustrates a correlation between observability and computation needs. A real-time system suffers as constraints are added, especially during occasions of peak processing. As a result, some embodiments process basic SLAM at a low level. In some embodiments, features are extracted to provide a degree of sparsity rather than directly tracking a point cloud or pixels. For example, RANSAC extracts a line or edge from a point cloud and Haar extracts a line or edge from an image. In embodiments, the processor of the robot executes pose estimation and tracking serially or in parallel. Multi-threading is most advantageous when a multicore architecture is used.

When the processor approximately knows a location of the robot, the processor does not have to search through all images within the database to localize the robot at a next time step. To match a feature observed in a newly captured image with the environment, the processor searches for the feature within a subset of images associated with (x, y, Θ). FIG. 215A illustrates the robot 24400 located at (x, y, Θ), captured images 24401, and database 24402 with location index. The processor attempts to find a match at location (x, y). FIG. 215B illustrates an image database 24403 indexed with pose 24404 as well. When a match to the feature is not found at (x, y, Θ) then the processor attempts to find a match at (x±1, y±1, Θ±1). In some cases, the database may not have entries for all possible poses or cells within the map. In such cases, ML algorithms select nearest neighbors that have a highest chance of matching the observed feature. Near may be defined based on Euclidean or Mahalanobis or is defined probabilistically. For a highest chance of success in matching the feature, matches occur in parallel, wherein a group of images are matched against another group of images. The algorithm may sort through a database and propose a set of potential matching images. FIG. 216 illustrates an example of a process of localizing the robot. Based on localization information, a small subset of the database with relevant images are provided to the proposal system which sorts through the subset and proposes a set of potential matches. Features are extracted from images captured by a live camera and compared against the images with a high likelihood of matching. If there is a match, the robot is localized, otherwise another subset of the database corresponding to areas close to the first considered subset are provided to the proposal system to find a match. For example, FIG. 217 illustrates a first set of potential matches 24600 from a subset 24601 of the database of which there is no match found. As such, a set of k-nearest neighbors 24602 are a second set of potential matches to examine. For each cell, there may be multiple poses, depending on an angular resolution. For example, a cell may have 12 poses, angles $\Theta_1$ to $\Theta_{12}$, each 30 degrees apart. Matching features using such a process helps with detecting absence of an object and categorization of objects that are potentially movable. In some embodiments, a distinction between dynamic objects (e.g., a person, a bike, a pet) and static objects that may be removed from a part of a scene is created. For example, a food sampling station may be set up for a month to give out samples of a new product upon its launch and is no longer present after the month passes. Detection of absence of an object in a scene is also an important part of simultaneous localization, mapping and object tracking.

In some embodiments, the database is not pre-sorted or has inaccuracies. K-means clustering may be used to create K clusters, wherein K is a possible number of poses of the robot (including coordinate and heading). Sum of squared distance may be used to create an elbow curve. Hierarchical clustering may be used to create a dendrogram and identify distinct groups. In some embodiments, the first two images close to one another (based on a distance of their histograms or plotted pixel densities), wherein distance may be Mahalanobis or Euclidean, are representative of a cluster. In embodiments, a vertical height of a dendrogram represents such distance.

When localization information is used in creating a proposal image, a region of interest may be identified in the image. The feature matching algorithm may analyze a region containing a feature of interest. For example, the algorithm only compares a portion of an image containing a floor of an environment with a previous reference image in cases where a goal is to detect objects for object avoidance or liquids/spills for cleanup. A camera positioned underneath the robot captures images used to check for debris and sticky floors. The processor of the robot processes images. Images are compared against images of a clean floor to detect debris or sticky floors or with an ultrasonic floor type detection in a Bayesian network. Upon detecting debris or spill the user may be notified to clean or the robot or another may clean the dirty area. In another example, the algorithm discards pixels likely related to a floor of an environment in cases where a goal is localization of the robot using images of walls or a ceiling. In another example, the algorithm discards pixels likely related to all regions a particular object or obstacle is unlikely to be located in cases where a goal is to determine a distance to the particular object or distinguish an obstacle to avoid a transition to a climb. FIG. 218 illustrates images 24700 and 24701 of a line laser emitted within an environment, the line laser indicating a likely location of an obstacle and a transition, respectively. Regions 24702 of the images 24700 and 24701 are not processed as the obstacle and transition are not likely located within regions 24702.

Clustering may be used to organize previously captured images and/or depth readings when creating a proposal of images to match a new reading against. Clustering comprises an assigning a label to each data element when a previous labeling is non-existent. While labeling may have been performed for places visited by the robot in a previous session, the labelling may not work well or may not be practical for all parts of a workspace or for all workspaces. In some embodiments, clustering is combined with chronicle labeling of a previous session or a current session. For instance, $X=\{x_1,x_2, \ldots x_i, \ldots X_n\}$ is a set of N data elements and cluster $C_1,C_2, \ldots C_k$ is a subset of set X, wherein each C is disjoint from the others and has elements presented by one of the elements in the subset of set X. Algorithms, such as Lloyd's algorithm, may be used to cluster a given set of data elements. Some embodiments use soft K-means clustering, wherein a soft max function is used. Once soft assignments are computed, centroids may be found using a weighted average. Some embodiments use a latent variable model to observe hidden variables indirectly from their impact on the observable variables. An example is a Gaussian mixture model wherein an expectation-maximization is employed to compute the MLE.

If $y=W^T_x$ is non-linear and the measurements of a sensor of a robot in a planar workspace comprise $Y_i \in R$ from sensor 1 to n with their position $x_i \in R^2$ fixed, and position as function of weight $w(w_1\ w_2)$ or $f(x; w)=\|x-w\|_2$ is estimated, a non-linear objective function is defined as a sum of squared residuals and the equation is solved with MLE formulation by finding critical points using Jacobian and Hessian matrices. Gradient descent flavors, such as stochastic gradient descent, batch gradient descent, and mini-batch gradient descent may be used for approximation. Polyak's heavy ball method may be used to prevent a deviation from a direction of updates and dampen oscillations using momentum. Momentum adds inertia to each iteration when a step to approximate a function in a direction of steepest descent is taken. While Polyak's method uses past iterations to determine the direction of steepest descent, Nesterov's accelerated gradient descent considers potential future iterations, one or more steps into the future, to prevent oscillations about to materialize. Moving in the direction of steepest descent may converge to a local minimum, depending on a starting point or initialization point chosen. Some embodiments use a greedy algorithm to move in a direction of the steepest descent, in other embodiments a convex function and convex optimization are used. In cases where gradient descent is used in the convex function, strong convexity provides a lower bound as it is lower bounded by a quadratic function and a smoothness function provides an upper bound. Some embodiments may use second order differentiation objective function and iteratively minimize second order Taylor expansion of the objective function. Such method iteratively approximates the gradient until finding the root, which in a context of optimization is referred to as Newton's method. In some embodiments, Gauss-Newton algorithm may be used. In some embodiments, a line search may be used.

In some embodiments, the processor of the robot finds an enclosure, such as a room in a house, based on data captured by a camera, depth camera, a LIDAR, a TOF camera, a structured light in combination with a camera or a LIDAR, a distance sensor, etc. As the robot moves within the environment, sensors disposed on the robot capture readings sequentially from different positions. In some embodiments, the processor of the robot uses detection of particular features in a sequence of captured images and a change in position of those features to extract depth values from a volumetric function or a cross section of a volume in a plane parallel to a driving surface of the robot. In some embodiments, features are detected directly within a captured image. In some embodiments, the processor generates a point cloud using captured depth readings. In some embodiments, the processor detects particular features within the point cloud. In some embodiments, the processor uses a combination of captured images and depth readings. In some embodiments, structured light is used as it eases detection of features. In some embodiments, a structured light highlights corners to ease their identification. In some embodiments, a reflection of structured light captured by a camera is used to detect corners of the environment. In some embodiments, depth is extracted from reflection of structured light. FIG. 219 illustrates a robot 21900 emitting a structured light 21901 towards a corner 21902 and an image 21903 captured by a camera disposed on the robot 21900. The structured light emitted 21901 causes the corner 21902 to be highlighted in the captured image 21903 and thus be easily detected. In some embodiments, corners detected using structured light and a camera are compared with corners detected using depth readings. FIG. 220 illustrates (a) a robot 22000 emitting structured light 22001 towards a corner 22002 and an image 22003 captured of the structured light 22001 emitted towards corner 22002. A processor of the robot uses the captured images of corners to build a structure of a room with no scale. To obtain a scale ray tracing may be used. FIG. 220 also illustrates (b) the robot 22000 capturing depth readings 22004 to a same corner 22002. A table is used to extract depths based on a location of the point readings 22005 within a captured image 22006. The processor uses RANSAC to fit a line to the depths from which the corner connecting the two lines is detected. Approach (b) may be used by the processor to build an initial map of the environment to scale. Approach (b) may be used in conjunction with approach (a) or with computer vision based feature detection at intervals, wherein illumination is not emitted into the environment. For relocalization within a completed map, approach (a) may be sufficient. In some embodiments, approach (a) is used in conjunction with approach (b), wherein approach (b) is used at a lower frequency or interval. A training run of the robot may use approach (b) or both approach (a) and (b) for mapping, however, after the training run a subset of approaches (a) and (b) may be used.

In one embodiment, wherein the robot performs coverage in a boustrophedon pattern, depth is extracted from a monocular camera based on viewing a feature observation at each alternating row as a binocular observation, with a base that is twice the distance between each row. FIG. 221 illustrates a boustrophedon coverage path 22100 of a robot and a feature 22101 observed. A base size 22102 increases with a number of rows, resulting in a higher accuracy extraction of distance. With a growing base distance and adding feature observations at a base distance to legacy methods of forming an image pyramid, high resolution depth is achieved. This overcomes a maximum base distance that is possible on the robot based on a size of the robot (i.e., the base distance cannot exceed a physical size of the robot). In some embodiments, a bundle adjustment is applied to incorporate readings captured in a previous row, multiple previous rows, or all rows with a same direction of robot movement. In some embodiments, a confidence score dynamically prunes undesired data. In some embodiments, a loop closure mechanism is applied at the end of each row or at the end of each boustrophedon box (i.e., the box within which the boustrophedon path is executed). In some embodiments, sequences of images captured from a first direction of robot movement are bundled and sequences of images captured from a direction of robot movement opposite the first direction are bundled separately. In some embodiments, the processor uses two directions of robot movement and creates two sets of bundles or uses multiple directions of robot movement and creates multiple bundles that match each direction. In an occasional situation, wherein an image incorrectly falls into a wrong image set of a particular angular orientation, outlier detection may fix the issue by removing the unmatching image from the image set. In some embodiments, clustering methods adjust the bundling or verify the bundling. In some embodiments, an angular position of the robot at the end of each boustrophedon line is determined. In some embodiments, an angular degree of rotation of the robot is determined using a gyroscope or an IMU. In some embodiments, the angular degree of rotation of the robot is determined using visual methods and an error function and comparing pixels of consecutive images to find overlaps. In some embodiments, features are detected before comparing two consecutive images. It is unworthy to feed a prior depth extraction (such as from a previous row) or depth derived from a first row (e.g., using a camera angled to a horizon) and optical flow into a network as an input to get fine-tuned in a next stage. As more time steps pass, more samples are captured and fed into a 2D or 3D CNN, or alternatively, a sparser convolution wherein a LSTM is used.

Similar to fine-tuning depth extraction with a sequence of captured images, object recognition may be enhanced using a sequence of images and depth information. Depth information may be extracted from a sequence of images passively from which a point cloud is formed. A sequence of point clouds arranged in a data structure like an image forms a data cube. The point cloud and depth information do not need to be extracted from passive images. Active illumination, whether in an optical method (such as structured light) or in a TOF method, may separately add accuracy, density, and dimension to the passive method. A temporal tuning of a depth extraction or object recognition over a sequence of readings captured from a single point of view or from a moving source (such as the robot equipped with an encoder, gyroscope, optical tracking sensor, IMU, etc.) increases density and improves the likelihood of a better depth extraction or object recognition. A depth may be associated with a recognized feature in an image or a point cloud may be featurized by overlaying two readings. In some embodiments, a biholomorphic map is written as a transformation $w=f(z)$ which preserves angles. Conversely, an isogonal map preserves the magnitude of angles but not the orientation. When the condition of orientation preservation of local angles is met, conformal mapping or a biholomorphic map is achieved. A similarity transformation is a conformal mapping that transforms objects in space to similar objects, wherein mathematically A and A' are similar matrices and $A'=BAB^{-1}$. A similarity transformation allows uniform scaling with at least one more degree of freedom than Euclidean transformation. The transformation is an affine transformation when the condition of preserving collinearity is met, wherein all points on a line still form a line after an affine transform and ratios of distances remain preserved. Affine transformation may be decomposed to rotations, translation, dilations, and shears. FIGS. 222 and 223 illustrate affine transformations decomposed to rotation 22200, scale 22201, shear 22202, and translation 22203 and the variable in the matrix 22204 applying the transformation. FIG. 224 illustrates a translation in 2D described as a shear in 3D. FIG. 225 illustrates preservations of lines and parallelism in affine transformation. FIG. 226 illustrates translation relating different perspectives within the affine space. FIG. 227 illustrates transformation 22700 of P1 and P2 captured in image 22701 by a camera 22702 disposed on a robot 22703 after rotation and translation of the camera 22702 and the robot 22703.

In some embodiments, active illumination helps with feature association, whereas in embodiments with no illumination, image associations between two time steps relies on brute-force matching and sorting the matches based on a metric such as Euclidean distance and hamming distance. As an alternative to active illumination, the search domain may be reduced based on real-time localization information obtained from a point cloud/distance data or a previous run. Motion estimation may also be used to reduce a search domain. In some embodiments, methods such as clustering are used to organize images. Methods such as ICP and PnP, discussed in detail elsewhere herein, may be used. In some embodiments, a mono-camera setup is used to add an active illumination point to enhance and ease key point extraction by reducing the search space. A neighborhood surrounded by the illumination may be used to extract descriptors, which often demands high computational resources, and in the prior art, may be discarded. However, with the number of key points heavily reduced due to a high reliability of key points (through the use of illumination), descriptors may be preserved. Further, active illumination improves sparse optical flow algorithms such as Lucas-Kanade that traditionally suffer from constant grayscale assumption. In a preferred embodiment, an effect of ambience light is automatically reduced as active illumination impacts image brightness. In some embodiments, a coarse to fine optical flow is traced in a pyramid scheme of image arrangement.

For localization within a previously generated map, computational requirements are eased as boundaries within the environment are already mapped. In subsequent runs, a new measurement captured that agrees with a previous measurement to within a predetermined threshold localizes the robot. Cases where the new measurement does not agree with previous measurements of the map indicate the robot is not localized correctly or, if it is determined the robot is localized correctly, the environment has changed. The environment may have changed due to permanent changes or a dynamic/temporary obstacle. The dynamic/temporary obstacle may cause interruptions in measurements used for determining size, shape, and nature of dynamic obstacles for navigation planning. In some embodiments, an image of the dynamic obstacle or a digital icon representing the dynamic obstacle is displayed within the map of the environment using the application of the communication device. In some embodiments, during the training run, multiple approaches are used to confirm a physical boundary. An example of an approach includes the robot moving around the environment and observing the physical boundary with a second set of sensors, such as a near field IR sensor or a tactile sensor. In some embodiments, the processor determines the dynamic nature of obstacles using opposite direction optical flow comparison and extraction of moving obstacles from the structural boundaries. In some embodiments, the disagreement between the new measurement and previous measurements of the map is due to a previously unobserved area, such as a closed off room inaccessible during a training run that is now accessible and observed in the new measurement. In some embodiments, the application of the communication device prompts the user to confirm a map generated at an end of a training run, a first run, or subsequent runs until the user confirms the map. In some embodiments, computational saving methods are applied only after confirmation of the map. In some embodiments, a newly discovered area is added to the previously generated map even after computational savings were already implemented. In some embodiments, the map is updated to amend disagreements between new measurements and previous measurements of the map. In some embodiments, disagreements are not amended when the disagreement is due to a dynamic obstacle. In some embodiments, a coordinate descent iteratively minimizes a multivariate function along a direction of a first variable followed by a direction of a next variable in a cyclic manner such that each variable is treated one at a time before the first variable is treated again.

When there are multiple robots and/or multiple cameras, a trajectory of movement may be extracted using differential tracking. FIG. 228 illustrates multiple cameras 1, 2, and 3 and image sensors of robots 1 and 2 observing a user 24800 over time. Camera 1 observes the user 24800 at time to. At time steps $t_1$ and $t_2$ the processor of robot 1 analyzes a captured image 24801 of the image sensor of the robot 1 to recognize a face 24802 of the user 24800 and confirm the user 24800 is detected. At time step $t_2$, camera 2 also detects the user 24800. At time steps $t_3$ and to the image sensor of robot 2 captures and recognizes the user 24800. Robot 2 moves to a new location and turns until the image sensor captures the user 24800 at time step $t_4$. A future trajectory 24803 of the user 24800 is predicted based on the trajectory 24804 mapped using data captured by the cameras 1, 2, and 3 and the robots 1 and 2. Some embodiments use analytical derivative or recursive Newton-Euler algorithm (RENA). In some embodiments, nonlinear MPC or nonlinear Model Predictive Control iteratively optimizes a feasible future trajectory in a discrete state space for a certain time horizon. Time horizon describes the number of future state spaces taken into account. In some embodiments, the robot receives an instruction to establish a video stream or an audio stream, which may be symmetrical (e.g., such as for a telepresence or service robot) or asymmetrical (e.g., such as for a surveillance robot). In some embodiments, the video streamed is viewed using a display screen and the audio streamed is heard using a speaker. The display screen and/or speaker may be a component of the robot or another electronic device (e.g., cell phone, tablet, computer, smart TV, a car, etc.) depending on the application/type of robot and a direction of communication. In some embodiments, audio (e.g., environmental noises, voice of a user, etc.) is captured by a microphone of the robot or another electronic device (e.g., cell phone, tablet, computer, smart TV, a car, etc.). In some embodiments, the audio and video captured is accessible on the cloud and is viewed, edited, and/or deleted by a user in real-time, at a later time, or based on a preset setting by the user or a service provider. A user account may be associated with one side of communication or both sides of communication. Multiple users may use the robot, each user having their own account. In some embodiments, the user communicating is identified and associated with their respective account automatically based on smart authentications, such as voice recognition, face recognition, or other seamless recognitions.

When an object to be observed by the robot or another device is known, such as in the example of FIG. 228, or when a landmark is repeatedly observed, the association problem is reduced to a hierarchical search problem. For example, in the case of tracing a user trajectory, each camera is not required to perform facial recognition to identify the user from a database of possibly a billion users. In traditional facial recognition, with no a priori, facial features are extracted then a comparison of the features with features of all possible persons in a database is performed. However, when the user is identified by facial recognition in a first image captured by a first camera, a nearby second camera knows or infers that the identified person is likely to be in a second image captured by the second camera. The second camera extracts the features of a user captured in the second image and compares them directly to the features of the person identified by facial recognition in the first image captured by the first camera. In this way, the second camera only needs to determine if the features of the user in the second image match the expected set of features of the identified person in the first image. This approach may also be used with landmark association. When the processor of the robot has previously extracted a set of landmarks, the processor does not need to search and determine whether a newly observed landmark is associated with all previously observed landmarks. The processor only needs to run a search against landmarks expected to be observed within the vicinity of the robot.

In a first run, landmarks that are extracted from a laser scan or camera data are compared against any number of landmarks that have been observed a sufficient amount of times to determine if the newly observed landmarks are newly observed landmarks or previously observed and identified landmarks. When a landmark observation undergoes probabilistic criteria and is categorized as a previously observed and identified landmark, the landmark is categorized in a same category set as the previously observed landmark to which it matches. The category set then has one more variation of the landmark wherein the observation may be captured from a different angle, under different lighting conditions, etc. When no match to a previously observed landmark is found, the observed landmark becomes a first element of a new category set. As more observations are collected, a number of elements within the category set increases. When a number of elements in a category set is large enough, the landmark is considered highly observable. The larger the category set is, the more important the landmark is. In some embodiments, only category sets with a number of elements above a predetermined threshold are used for comparison against a landmark observation when determining the category. When a landmark is observed, the robot evaluates its own position and orientation in relation to the landmark with a probability of error.

In some prior art, landmarks are not identified, as extracting an edge or a line connecting a ceiling or floor to a wall was sufficient. However, with advancement of object recognition and algorithms, landmarks are identified as context associated with landmarks provides useful information. For example, instead of a line, an arch, or a blob on a ceiling, context oriented features are extracted and used as landmarks. For example, a TV, a fridge, a door frame, a window, a power socket, a bed, a dining table, a kitchen cabinet, may be observed as objects and their object types identified. A landmark database may include labels associated with different types of objects. In some embodiments, labels are probability based, wherein upon repeated observation and recognition of a same object type the probability of the object type increases to reach a confidence level. As identified objects may not constitute a sufficient number of landmarks, the identified landmarks may be used in addition to more primitive landmarks in legacy visual SLAM systems. While not all the landmark objects may be identified to have a human classification associated with them, the mere process of extracting a more sophisticated shape than just an arc, circle, blob, line, edge provides significantly more certainty upon repeated observation. For instance, a primal shape, such as a blob, can be easily mistaken. The blob may pertain to a light bulb or a white decorative object on a dark wall. A particular object, such as a power outlet, has a very distinctive shape with a degree of sophistication that prevents the object from being confused with other shapes or objects. Even in a case where the classification algorithm fails to identify the particular object type of the object, extraction of such a sophisticated shape without the particular object type still provides a degree of certainty when it is observed again. A downside of extracting an object without any further knowledge on context is repetition throughout the surroundings. Therefore, contextual visual localization is required, as proposed herein as a superior method over the prior art. For example, FIG. 229 illustrates a robot 24900 observing a power outlet 24901 and unidentifiable sophistically shaped objects 24902 in close proximity to the power outlet 24901 at a first time step 24903. At a later time step 24904, the robot 24900 detects the same power outlet 24901, however, this time the sophistically shaped objects 24902 are not observed and instead a differently shaped object 24905 is extracted and categorized as a new landmark.

As the robot travels within the environment, the processor uses EKF to estimate a position and an orientation of the robot from contextual landmarks. The position and orientation of the robot is iteratively updated, based on displacement of the robot, new observations of previously observed contextual landmarks, and new observation of previously unobserved contextual landmarks. When a landmark is categorized, the landmark may have a hierarchical importance value. For example, a primitive shape, such as an edge, a line, a blob, or an arc, may be found more often and at shorter distances while more sophisticated objects, such as a TV, a window frame, or a door frame, may be detected less frequently but are distinct. Covariance of two variables provides an indication of an existence or strength of correlation or linear dependence of the variables. A covariance matrix in the current state of the art provides a single type of landmark, while herein multiple types of landmarks (e.g., primal landmarks, sophisticated landmarks such as furniture) are provided. In the proposed method, covariance between a robot state and a first type of landmark is different and distinguished from a covariance between a robot state and second type of landmark. While a first type of landmark may be more densely present or frequently observed in the surroundings in comparison to a second type of landmark that may be scarcer or difficult to detect, the second type of landmark provides higher confidence and helps close the loop in larger environments. FIG. 230 illustrates an example of a mapped environment 25000. A robot 25001 observes primal landmarks 25002 and sophisticated landmark 25003 comprising a television and stand. FIG. 231 illustrates an example of three types of landmarks, primal, semi-sophisticated, and sophisticated landmarks. There are many primal landmarks, some semi-sophisticated landmarks, and few sophisticated landmarks. The more sophisticated landmarks provide higher confidence during SLAM. There is no requirement of a specific number of primal landmarks per sophisticated landmark. In some cases, the robot may not encounter multiple types of landmarks, such as when cleaning a small and relatively empty room.

Though a detected primal feature may be unlabeled or unidentified the feature may provide enough clues for online requirements. Optical flow and visual odometry require feature detections such as basic shapes, edges, and corners, or otherwise a key point and a descriptor. In some embodiments, object recognition is used as a secondary and more reliable landmark to localize against, in particular stationary and structural objects. Identification of these objects relies on detecting a series of primal features in a specific arrangement. In some embodiments, a structure is first identified, then labeled. Even if the structure is labeled incorrectly, the mere identification of the features in a specific arrangement may still be used as a landmark for localization as localization is solely based on recognizing the particular features in the specific arrangement, the label being unnecessary. For example, as long as the structure is captured in an image and a localization algorithm detects the features in a specific arrangement forming the structure, a loop may be closed. Labeling the structure depends on existing data sets, examples of the structure, lighting conditions, and such. A user may label examples of structures captured in images using the application paired with the robot to improve local recognition success results. Structures labelled by the user may be given more weight within a home as a same structure is likely to be encountered repetitively. User labelling may also improve global recognition success as users collectively provide a large amount of labelling, providing both labeling volume and labeling diversity (important for objects and situations that are very difficult to artificially stage and ask operators to label).

For both structural object identification and labeling, illumination, depth measurement, and a sequence of images are useful. Illumination is helpful as the addition of some artificial light to the environment reduces the impact of the ambient environment. Illumination may be employed at intervals and illuminated images may be interleaved with non-illuminated images. Depth measurements may be captured with a depth camera, built-in TOF sensors, a separate TOF coupled to the robot, a structural light, or a separate measurement device for depth based object recognition. A sequence of images may also improve object identification and labeling success rate. For example, an image with illumination followed by an image without illumination may provide better insight than images without any illumination. A sequence of two, three, five, six, ten or another number of frames captured one after another as the robot is moving captures the structure of the object from slightly different angles. This provides more data, thereby reducing false positives or false negatives. The number of image frames used may be fixed in a sliding window fashion or dynamic in a dynamic window fashion.

In some embodiments, clustering and K-means algorithm are used to group similar images together. Similarity may be based on a gray scale image or may be based on type 1 features (primal structures) or type 2 features (sophisticated structures). In either case, an estimate of localization and organization of images in a grid reduces the search space drastically. Inside the grid or a group of grids, clustering may be used to further organize the proposal domain into a structured system wherein creative search methods may be used to match a current run input with pre-saved data (such as an image). Some embodiments use search methods implementing a K-d tree or a Chou-Liu hierarchy. As opposed to prior art that use a simple tree, a two (or more) type feature detection may interleave feature types or create separate trees for each feature type with sparse or dense association with other feature types. When a search is performed for a type 2 feature the search domain is small, however, the search phrase is complex and comprises a structure formed of primal features. For a match to occur, a more sophisticated criterion is required. For a type 1 feature, the search domain is small and the term is simple. Several matches are likely to be found quickly, however, false positives are more likely. An example data set may be previously generated and available or may be built during a run (e.g., a cartography run or a subsequent run). The example data set does not have to be labeled, although a labeled data set may be used.

When a grid clustering hybrid is used, key frames may be selected based on grid positioning to maintain the sparsity and avoid disconnect in similarity. Creating more evenly selected key frames helps with smoothing, reducing complexity by sparsifying the pose graph. The proposed echosystem of lightweight methods with selective postponed backend processing performs well with the semantic aspect of the proposed SLAM method proposed herein. For example, only image data corresponding to grid points at which objects are located or walls are located is required. In another example, a floor area, except where there is an occasional rug, is of less interest. As such, with just a few images, the processor is able to determine a generic floor type (e.g., carpet, wood, stone, concrete, asphalt, dirt, sand, synthetic material such as PVC, etc.). However, floor type information is easier to extract from a floor sensor such as a sonic sensor that measures how a sound beam reflecting off of a surface. The sonic sensor data is then compared with labeled sonic sensor data to determine the floor type. In some embodiments, vision data may be used as a complementary source (perhaps organized in a Bayesian setup) for determining a floor type. With vision data, floor type may be inferred with good enough certainty in most cases based on a few image frames. In some embodiments, floor type is modified and over written by user input provided to the application paired with the robot. In some embodiments, the floor-only grids (i.e., not containing any objects) are disregarded or regarded with a much lower resolution. In embodiments, a multiresolution system for processing and especially in data transmission allows for other levels of lightweightness. For example, an image may be processed locally or transmitted over a network with the portions of the image that are of interest (such as an object for labeling or an object found) transmitted in high resolution and the other portions of the image transmitted in low resolution with a lower frame rate or a lower priority (such as best effort transmission). The grid-feature system proposed may be used with hand crafted features (e.g., ORB, SURF, etc.) or directly with learned methods. Further, some illumination (e.g., illumination intervals) and use of binary-descriptors in an interleaved setup of illuminated and unilluminated sequence, each fed into a different network, adds more viability of a semantic yet reasonably lightweight SLAM. FIG. 232 illustrates a robot 23200 capturing images with illumination 23201 and without illumination (only ambient light) 23202. Images with illumination 23201 are fed into a network 23203 while images with only ambient light 23202 are fed into a different network 23204. Similarly, a pose graph may be built for illuminated data and a separate pose graph may be built for unilluminated data. A pose graph may be based on crafted features or direct methods and may be associated with grid identification data in a previously cartographed environment.

Feature enhanced grid mapping may have applications other than semantic mapping, such as SLAM, navigation, or a map based shopping experience as discussed elsewhere. In some embodiments, other features are visually detected (e.g., with a camera) and are added manually or automatically. For example, the robot may operate in a house with more than one Wi-Fi node for providing a better distribution of a signal. With the robot detecting signal presence and a signal power of each signal, the robot hops from one Wi-Fi node to another based on localization of the robot. Robots in prior art are often unable to take advantage of hopping from one wireless node to another seamlessly. A first level of seamlessness proposed includes the robot automatically switching from a weak signal source to a stronger signal source upon sensing in the moment the current signal is weak, a better signal is available, or based on the current signal strength falling below a predetermined signal strength threshold. The reactive switch may be a switch from 2.4 GHz and 5 GHz and vice versa. A second level of seamlessness may be achieved based on discoveries of a previous cartography run, some prior runs, all prior runs, recent prior runs, etc. The second level of seamlessness proposed includes the robot anticipating entrance into an area where the signal is weak. Before communication suffers from the weak signal, the robot proactively searches for a better signal or the robot proactively knows which node is the best to connect to depending on where the robot plans to go. Each of the nodes has a signal coverage area, and while from a certain location two or more of the nodes may have a similar signal strength, one may be advantageous depending on where the robot plans to be in a next series of time steps.

In some embodiments, features include devices within the area or sensors within the area that enable the robot to be aware of other equipment and sensors and their capabilities (e.g., connected (IoT), disconnected, or indirectly connected capabilities). The area may be an indoor area, a near-indoor area, an outdoor metropolitan area, etc. A combination of sensory information forming a mesh of data producing devices may have many applications, such as securing the area (e.g., via motion sensing, occupancy sensing, intrusion sensing, etc.) or heating and cooling the area (e.g., automatically adjusting a level of window shading based on lighting/temperature sensing or serving wireless radio coverage, baby monitors, child care, cleaning robots, etc.). All the devices in such an echo-system of collaborative AI technology may be connected to a control system, form a peer mesh, or form a tree hierarchy topology. A synchronization protocol may be implemented to manage communication with upstream devices in a tree hierarchy topology and with downstream devices when the device is not an end node or stub (i.e., has only one upstream connection). The tree hierarchy topology or a mesh topology of connected devices may be connected to one another wirelessly or by wire. In a CAIT system, sensors may be activated by an event and transmit a signal that triggers a physical or non-physical actuation. For example, a signal triggering an alarm to go off or a message to be transmitted to the police are examples of actuations that are not physical. Another example of a non-physical actuation includes all devices and sensors transitioning from a sleep mode to an awake mode upon a sensor detecting an event and transmitting a signal causing the actuation. Active streaming may be initiated by all or a subset of sensors participating in CAIT.

Each of the IoT sensors and the robot with its sensors may communicate through Wi-Fi or via cellular network using LTE protocol, 3G, 5G, GPRS, EDGE, HSDPA, direct satellite connection, and such. The processor of the robot may at all times or in a cartography run monitor Received Signal Strength Indicator (RSSI). The processor may form a baseline over a period of time. In some embodiments, the robot proactively switches from one node in a mesh network to another based on localization information, its planned path, and instantaneous measurement of a received signal strength. As such, the robot switches nodes before a low measurement is received, thereby avoiding transmission sufferings associated with low signal strength. In some robotic missions, the processor of the robot plans a path around an area historically known to have poor signal strength and poorly covered by Wi-Fi nodes to avoid a potential loss of communication. In some embodiments, a baseline strength map of signal strengths is useful in inferring intrusion, change in occupancy, or other undesired changes. In some embodiments, a deviation may indicate presence of an intruder when the deviation is above a particular threshold. In some embodiments, a pattern of deviation may indicate a trajectory of movement of an intruder. FIG. 233 illustrates (a) an uninterrupted signal baseline; (b) a signal interruption caused by a person 23300 at a time $t_1$; (c) a signal interruption caused by the person 23300 at a time $t_2$; (d) temporal overlaid data from $t_1$ to $t_4$; and (e) a trajectory of interruption 23301 from $t_1$ to $t_4$. The interruption data may serve as a priori to other available data, such as a window opening, a door opening, or a frame captured by a camera. For example, FIG. 234 illustrates a camera first camera 23402 capturing a frame 23403 of person 23400, a second camera 23404 capturing a frame 23405 of person 23400, and a third camera 23406 capturing a frame 23407 of person 23400. The interruption data obtained from signal strength data fills in a blank 23408 of person 23400 caused by RSSI interruption.

In some embodiments, the robot may interrupt the RSSI values as it moves. Therefore, participating nodes may record data during all times including times the robot moves around and all the data may be compiled. A neural network or a basic ML algorithm may be employed and a signature profile may be created for various influencers. For example, a cat creates a different signature than a robot and a human based on differences in a height, a speed, trajectory, and other characteristics of the cat, the robot, and the human. A properly trained ML neural network may distinguish one signature from another. FIG. 235 illustrates an example wherein an area 23500 within which a cat 23501 moves, determined based on a trajectory 23502 of the cat, is cleaned by a cleaning robot 23503 by following along trajectory 23504 after the cat 23501 leaves the area 23500. The cleaning may be performed with a delay such that the cat 23501 is not followed by the robot 23503. FIG. 236 illustrates another example wherein snail trail trajectories 23600 of persons 1, 2 and 2 within a supermarket 23601 are overlaid to create an area 23602 requiring cleaning. A robot may be instructed to perform any of the instructions 1-6 listed. In another example, the robot may be instructed to avoid areas that are currently occupied by humans based on their snail trails. The robot may take a detour to avoid the areas currently occupied by persons. This may be desirable in houses, supermarkets, and in general in all places. The area occupied by persons may be dynamic, no-sweep, no-clean, no-cover area for a window of time. A dampening method may reduce the time window while a new detection of a person within the area may increase the time window.

In embodiments, multi-feature type SLAM, wherein features ranging from primal shapes derived from images (such as those used by ORB) to more sophisticated arrangements of primal shapes (labeled or unlabeled) and features that are not image based (e.g., Wi-Fi signals, IoT devices, sensory data indicating floor type, sonic mapping, etc.), add to the dimensionality of data, thereby impacting real-timeness. In embodiments herein, a lightweight implementation is proposed, wherein lower dimensionality data is used for solving online aspects of a problem and higher dimensionality data is postponed or even ignored at times. When real-timeness is maintained and processing is available, higher dimensionality data is taken into consideration. This approach prevents frame losses during peaks in processing time because instead of pure loss, these frames are processed at a later time. In fact, this is traffic shaping of data wishing to be processed.

By using a hierarchical threading system, an online implementation runs on a MCU (e.g., s ARM Cortex M7) or a real-time processor (e.g., ARM Cortex R series). It is also possible to run RTOS on ARM Cortex A series to implement real-timeness. In an upper stream processing node, a sliding window or a pose graph produces smoothing data or loop closure at intervals to the real-time system. Smaller loops are closed in first processing nodes, while concurrently, larger loops are sent upstream for processing. Once larger loops are processed, the result is sent back to a downstream processor. When traffic is sent upstream for processing, a rate manager determines the resolution for encoding data, such as an image and parts of the image. For instance, a part of the image comprising an object may be encoded with original resolution and sent upstream for labeling. The potential object may be identified within a bounding box, where all content within the bounding box is sent upstream with original resolution. Anything outside one or more bounding boxes (wherein the bounding boxes comprise content of interest) may be down-sampled and the rate manager may dedicate a different priority or a different rate for transferring data, in effect traffic shaping the data passing through the data path. The data rate manager may discard areas of the image that are outside the one or more bounding boxes, crop out the areas outside the one or more bounding boxes, differ the transmission of the areas outside the one or more bounding boxes, and subject the areas outside the one or more bounding boxes to availability of bandwidth. The data rate manager may select key frames to be sent upstream and treat other frames on a best effort basis or postpone their transmission to when bandwidth is available. Such rate management may occur in the interval BUS system or in between devices when data is passed through network cards. Similarly, landmarks in an image may be sent with a different bit rate than peripheral views within the image. At the upstream processing unit destination, a signal may be sent to the data rate manager indicating a quality of shaping based on a success rate of matches, labeling, etc. When the shaping turns data into junk data the data rate manager may interfere less and allow more data to pass through. Multiple factors may be examined by both the data rate manager and the receiving end, such as peak signal to noise ratio, structural similarity of images, the original resolution of images, blur level of images and such. Such methods may be used in a network communication (wired or wireless) or within internal parts of a circuit going through various kinds of BUSes, I2C interfaces or PCI interfaces, intra core communications and inter core communications and such.

In embodiments, various components, such as a MCU, a CPU, a NPU, a GPU, sensors, and tensor processors, may be used. In some embodiments, a LIDAR sensor and cameras share a FOV, creating a colored point cloud or an image with depth of each pixel as a fourth dimension. In some embodiments, the processor extracts objects from a point cloud with or without neural network training. In some embodiments, the processor fuses point cloud data with RGB data in a neural network or a Bayesian network. In some embodiments, the processor extrapolates depth information to increase density of depth data. In some embodiments, algorithms learn from depth data and RGB data in isolation or in tandem. In some embodiments, isolated learnings are merged one after another in both a Bayesian network or neural network. Some embodiments employ association between two networks, late association, and associations at multi stages. In a late association, one isolated network may be used as a priori or as pre-filter information fed into the other isolated network. A dynamic association finding may merge data at points where association is found and close the loop before further data comes in. In some embodiments, one network may be used in transfer learning.

Some embodiments employ semantic object-based localization. For example, FIG. 237 illustrates a rug 23700, around which a no-sweep zone 23701 is established. In A. the no-sweep zone 23701 remains in a same place, despite the rug 23700 being moved. With object-based localization, the rug 23700, is localized such that the no-sweep zone 23701 remains surrounding the rug 23701 despite the position of the rug. In some embodiments, an object is overlaid on a. a top view as a 2D image, a 2D icon, or a 3D construction; b. a 3D reconstruction as a 2D image, a 2D icon, or a 3D construction; and c. an immersive setup as a 2D image, a 2D icon, or a 3D construction. The objects may be presented as an icon, an image, a 3D reconstruction on a grid/floor plan. In some embodiments, the robot generates a time lapse cleaning video and the user may have the option to share the video on social media. Some embodiments employ a polymorphic path planning may be based on object localization, wherein in an absence of an object the processor plans the path of the robot according to the room, and in a presence of the object the object is identified and localized, and the path is planned and adjusted accordingly. For example, FIG. 238 illustrates a path of the robot 23800 with the rug 23801 positioned differently in two scenarios. In each case, the rug 23801 is treated as a singular object and the path of the robot 23802 enters and exits the rug 23801 once. In both cases the robot treats the rug as a whole object and does not go on and off of it. Also, no sweep areas may be attached to object localization. For example, no-sweep for rug tassels changes in each run as the rug's position changes with the frame of reference of the room.

In semantic SLAM, data structure and scalability are issues. In some embodiments, data observations are considered a set of points that live on a manifold rather than a Euclidean space to reduce computational complexity. Instead of applying gradient based optimization in Euclidean space, they are performed on Riemannian manifolds. As such, the search domain lives on the manifold and the decision domain associates with the tangent Euclidean space. In this context, the relationship among coordinates (e.g., spherical, cylindrical, affine, polar, Cartesian, etc.) and the generalization of them come into light as changing from one to another becomes the matter at hand. First order methods and second order methods in Euclidean spaces may be generalized to live in Riemannian manifold spaces.

In some embodiments, the processor of the robot identifies an object type of an object and adds the object to an object database for use in future classification. FIG. 239A illustrates a robot 25200 capturing an image 25201 using a camera disposed on the robot 25200. The processor searches an existing object database to determine an object type of object 25202 in the image 25201. At a same time, the processor determines whether Wi-Fi signals associated with the object 25202 are detected. If no Wi-Fi signals are detected, the processor adds the object 25202, in this case identified as a plug, to the object database. If Wi-Fi signals are detected, the processor adds the plug 25202 to a smart plug database. In another example illustrated in FIG. 239B, the camera of the robot 25200 captures an image of a door 25203 within the environment. The processor uses a similar process as in FIG. 239A to determine whether the door 25203 is IoT enabled. The processor may further determine a state of the door 25203 (e.g., open, closed, etc.), localize against the door 25203, lock/unlock the door 25203 remotely by the robot or an application paired with the robot, transmit a request for control of the door to the application, and recognize a room boundary based on identifying Wi-Fi signals, the particular door frame, knob, or a surface change.

In some embodiments, data flows through a CNN from an input layer and hidden layers until reaching an output layer outputting a classification result compared against an actual classification. An error is measured using a loss function, such as MAE, MSE, Huber for regression and cross entropy, and Hinge loss for classification. Trainable weights may be determined and updated through back propagation. Some embodiments use a pooling layer, which is untrainable and changes a size of a feature map. Max pooling or average pooling decreases a spatial size of an input by selecting either the maximum or average of a value. Some embodiments use sequence to sequence RNNs comprising two RNNs. One RNN is an encoder iteratively updating its hidden state and producing a context output that is fed to the other RNN, a decoder translating the context to a sequence of outputs. FIG. 240 illustrates an example of an encoder RNN 25300 that produces context outputs 25301 which are provided as input to a decoder RNN 25302 that translates the context output to a sequence of outputs. Some embodiments use long term short term memory or LSTM networks capable of remembering information and dependencies for a long period of time, similar to multiple copies of a same network, each passing a message to a successor. This is helpful when both historical information and most recent information are needed. Some embodiments use feature selection methods, such as linear discrimination analysis, ANOVA, Chi-Square, etc. Some embodiments use a Fourier transform, wherein a function is decomposed into a superposition of symmetric functions by finding a set of cycle speeds, amplitudes, and phases to match any time signal and a signal is converted from a time domain to a frequency domain to extract features from sensor data or audio data.

Some embodiments employ an intention detector. For instance, FIG. 241 illustrates an intention detector receiving an image stream as input. The intention detector analyzes an image to detect intention. When no intention is detected, the intention detector analyzes a next image to detect intention. FIG. 242 illustrates a classifier receiving an image stream and classifying an image as having an intention or no intention, wherein an intention is detected in images 24200 as captured hand gestures 24201 indicate an intention (e.g., go, come here, phone call) and no intention is detected in images 24202 as no hand gestures 24203 are captured. Images wherein no intention is detected may be discarded or ignored. Clues for an intention may be observed, such as an extended arm with a thumb up may indicate an intention. Hands, fingers, wrists, arms, and other joints may be used to indicate an intention, as well as their particular orientation, posture, location, and degree of rotation. Upon detecting a hand gesture, a respective intention may be executed. Or a hand gesture may be used in reinforcement learning, wherein a thumb up indicates positive reinforcement and a thumb down is negative reinforcement. Or a hand gesture may simply provide information. For instance, a thumb up may indicate a package has been dropped off at a door. While nothing is learned here, the gesture may be used to add an entrance to the database. Some embodiments continuously track, search, and detect gestures, as shown in FIG. 243. A static gesture (e.g., a single gesture snapshot of, for instance, a thumb up) and a gesture of continuous motion (e.g., continuously opening and closing a hand) are both tracked. Tracking may be performed actively or passively using a marker, such as receipt of an electronic signal triggering a start of tracking (i.e., active tracking) or a particular color (i.e., passive tracking). In another example, skin color may be used for tracking. For instance, upon a robot 25600 being filled with cargo, a signal is transmitted triggering tracking to begin. Some embodiments experience challenges with continuous tracking due to self-occlusion. For example, curled fingers prevent a camera from observing a palm of a hand. In some embodiments, sign language is used to communicate commands to the robot.

It is desirable that trajectory planning is not influenced by limitations imposed by mapping or localization and have criteria that benefit coverage. In some embodiments, trajectory planning comprises a graph wherein each node is a point within a workspace and connections between two points form a line, an arc, or a path that is free from collision with surrounding obstacles, including walls. In some embodiments, an obstacle sensor disposed on the robot is tasked with detection of obstacles as the robot travels. The obstacle sensor may also be used to detect a wall in front of the robot as the robot travels, however, a wall is typically detected with a camera or LIDAR sensor. In some cases, a detected wall may be closer than determined by the processor of the robot due to a lower resolution of a global map. For example, FIG. 244 illustrates a robot 25700 detecting a wall 25701 at a distance 25702 from the robot 25700 using a camera or LIDAR sensor, however, the actual wall 25703 is only a distance 25704 away from the robot 25700. Considering errors in measurement of the sensor and noise and given the map resolution indicates a wall located in row i or j, the processor of the robot determines there is a possibility the wall is located in row j and may actuate the robot to move forward past row i. In such a case, the robot may avoid colliding with the wall 25703 in row i by using an obstacle sensor to sense the wall 25703 in row i prior to the robot making contact. The actual location of the wall 25703 is fed back into the system to correct errors that may be caused by its incorrect location. Alternatively, or in addition, the actual location of the wall 25703 is stored in a local map of perimeter areas. As the robot enters perimeter areas, the processor of the robot uses the local map to have a better and clearer understanding of how to approach the obstacle or wall. In some embodiments, an obstacle sensor is also used for alignment with a wall.

The obstacle sensor may be a point distance measuring sensor and may detect a presence or an absence of an obstacle based on receiving or a lack of a returned illumination signal. A detection cone of an obstacle sensor may vary in size. For example, FIGS. 245A and 245B illustrate a first robot 25800 including obstacle sensors 25801 with smaller detection cones 25802 in comparison to a second robot 25803 including obstacle sensors 25804 with larger detection cones 25805. Despite having only two obstacle sensors 25804 with wider detection cones 25805, a presence or absence of obstacles in two regions is detectable. If a total of two regions suffice, a wider detection cone may be beneficial at there are no blind spots. If more regions are needed for better navigation, narrow detection cones are preferred as multiple detection cones can be used without overlap. A third robot 25806 includes obstacle sensors 25807 with narrow detection cones 25808. Some obstacle sensing methods may use more than single point obstacle sensing. For example, a camera may capture an image of an area and compare the image to an image of the same area but free of any obstacles and to identify a presence of an obstacle. For example, FIG. 246 illustrates A. and B. a camera of a robot 25900 capturing images 25901 of object 25902 in an area, given the object 25902 falls within a FOV of the camera, and C. the camera capturing an image 25903 of the same area but free of the object 25902. A processor of the robot may determine in the case of A. and B. that the object 25902 is present based on a comparison of images 25901 with image 25903 of the same area. In some embodiments, active illumination in combination with an imaging sensor may be used in detecting obstacles or their absence. FIG. 247 illustrates an image sensor 26000 and an illumination line source 26001 positioned at a downwards angle and emitting illumination line 26002 onto a surface of object 26003 within a FOV of the image sensor 26000. The image sensor 26000 captures an image 26004 of the illumination line 26002 projected onto the surface of object 26003. A processor of the robot extracts the illumination lines 26005 and 26006 from the captured image 26004 and determines an obstacle is present based on the illumination line being broken into segments, the lowest positioned segment 26006 indicating presence of object 26003. Had the illumination lines 26005 and 26006 been a single continuous segment, presence of an object is not likely. Additionally, a position of illumination line 26006 in relation to a bottom edge of the image 26004 is indicative of a distance of the object 26003 from the image sensor 26000, wherein the closer the object 26003 is to the image sensor 26000 the closer the illumination line is to the bottom edge of the image 26004 as the illumination source 26001 is tilted at a downwards angle.

In some embodiments, the robot captures a video of the environment while navigating around the environment. This may be at a same time of constructing the map of the environment. In embodiments, the camera used to capture the video may be a different or a same camera as the one used for SLAM. In some embodiments, the processor may use object recognition to identify different objects in the stream of images and may label objects and associate locations in the map with the labelled objects. In some embodiments, the processor may label dynamic obstacles, such as humans and pets, in the map. In some embodiments, the dynamic obstacles have a half-life that is determine based on a probability of their presence. In some embodiments, the probability of a location being occupied by a dynamic object and/or static object reduces with time. In some embodiments, the probability of the location being occupied by an object does not reduce with time when they are fortified with new sensor data. In such cases, a location in which a moving person was detected and eventually moved away from reduces to zero. In some embodiments, the processor uses reinforcement learning to learn a speed at which to reduce the probability of the location being occupied by the object. For example, after initialization at a seed value, the processor observes whether the robot collides with vanishing objects and may decrease a speed at which the probability of the location being occupied by the object is reduced if the robot collides with vanished objects. With time and repetition this converges for different settings. Some implementations may use deep/shallow or atomic traditional machine learning or Markov decision process.

Further details of image segmentation and object detection, classification, and tracking methods that may be employed here are described in U.S. Non-Provisional patents application Ser. Nos. 17/670,277, 17/344,892, and 17/494,251, each of which is hereby incorporated by reference.

FIG. 248 illustrates a person P1 that may travel in any direction 26100 at a time step. Based on a previous trajectory of person P1, probabilities that person P1 is walking toward a particular direction is inferred by a machine learning algorithm, wherein a probability of person P1 walking in a same direction as the previous trajectory is higher. A walking speed of person P1 or other details may also be used to make inferences. For instance, when person P1 walks at a faster speed (e.g., runs), it is inferred that person P1 likely has a determined destination in mind. Or, when person P1 is walking with a companion, it is inferred that person P1 is likely to turn back and look at the companion, such as in a case where the companion asks person P1 to turn back to see something. In another example, there is likely less consistency in direction when person P1 is a child or when person P1 is accompanied by a child. Person P1 is pushing a cart A, as such possible directions of travel 26101 of person P1 is limited since a range of motion of the cart A is limited. Given the range of motion of the cart A, probabilities of direction of travel 26101 are more in some directions and less in other directions (e.g., such as directions that are more challenging to execute with a cart). However, when person P2 reaches an end of aisle 10, there is increased likelihood that person P2 turns in a right direction and a left direction as a likelihood that person P2 moves in a forward direction to obtain milk is low as milk is only one item of many possible desired grocery items. However, if milk was replaced by a less popular grocery item, the probability of person P2 moving in a right and left direction is higher and the probability of the person P2 moving in a forward direction is even lower. If person P2 is accompanied by children, probability of person P2 moving in a forward direction increases as milk is a common child drink. In some cases, an external source of information is available, such as a subscription service that provides information on typical shopping habits of person P2 or a construct of a family of person P2 (e.g., one child, one dog, etc.), and probabilities of a next movement/trajectory direction of the person P2 are assigned by the machine learning algorithm based on at least the information. Given the machine learning algorithm is provided a pattern of grocery items purchased by person P2 (e.g., purchases milk once a week), probabilities may be more accurately inferred. Or given the machine learning algorithm is provided a shopping list of person P2 or refrigerator contents of a refrigerator of person P2 (given user consent or instruction, from which a proposed grocery list may be generated), probabilities may be more accurately inferred. Person P3 is too close to an edge 26102 of an aisle, as such directions of movement are limited. FIG. 249 illustrates an example of probabilities of direction of movement 26200 of a person 26201 pushing a cart 26202, the probabilities determined based on various input data provided to a machine learning algorithm inferring the probabilities of direction of movement 26200. Given various information, a vector field may emerge, such as illustrated in FIG. 250. A priori vector field may depend on physical and geometric aspects of a store. For example, in a vector field of a store an end of aisle 26300 includes arrows 26301 with greater probabilities, even without considering details of a person positioned at the end of the aisle. In another example, a person standing at an edge 26302 of an aisle is limited on one side, as such possible directions are limited to directions 26303. In a case where aisles 26300 and 26305 are close to one another, a next direction of movement is likely one of directions 26306.

In embodiments, some areas are more dangerous than others. For example, a person with a shopping cart at intersections may not have visibility of an aisle positioned at a 90-degrees angle to a current direction of travel of the person. For example, FIG. 251 illustrates possible directions 26400 of a person upon reaching an end of an aisle 26401. FIG. 252 illustrates a person pushing cart 26402 reaching an end of aisle 26403 is blind to robot 26404 traveling in a direction 90 degrees to a direction of movement of person and cart 26402. Some embodiments create a heat map of such danger zones. Some embodiments assign a value to each location indicative of a level of danger of the location which may be used as a priori and superimposed on a vector field. In embodiments, a vector field of a person acts on an a priori vector field, disturbing the priori vector field, just as a magnet impacts a magnetic field. Similarly, FIG. 253 illustrates a robot 26600, attended or idle, with its own vector field 26601 that influences a priori vector field. This is the same for other devices, such as a powered cart, robots, other dynamic objects, each with their own vector field influencing a priori vector field. When the robot moves along a planned path, the processor of the robot account for all a priori along with an uncertainty of actuating the planned path of the robot. A true trajectory of the robot slightly varies from the planned path, which is shown using an uncertainty cone. FIG. 253 illustrates the robot 26600 moving along a planned path 26601 and uncertainty cone 26602, indicative of a certainty of movement.

For the processor of the robot to actuate the robot to move, the uncertainty cone must be probabilistically clear when superimposed onto a priori vector field. For example, FIG. 254 illustrates a robot 26700 with an uncertainty cone 26701. The uncertainty cone is not clear as it overlaps a cart pushed by person 26702, as such the processor of the robot 26700 does not actuate the robot to turn in that direction into aisle 26703. In some cases, the uncertainty cone may be visualized with multiple layers, each layer depicting a safety classification. For example, FIG. 255 illustrates the uncertainty cone 26701 of FIG. 254 comprised of three layers, each visually depicting a safety classification based on their respective colors of green, yellow, and red, wherein red is least safe. If cart 26702 were not overlapping with the uncertainty cone 26701, the green core of the uncertainty cone 26701 would likely be positioned in a middle of a path between aisles 26703 and 26704. However, given the position of the cart 26702, the green core falls at a third of a distance from aisle 26704 and two thirds from aisle 26703.

In some embodiments, an a priori vector field map is designed and created prior to commissioning an autonomous robot or fleet of robots. In some cases, the a priori vector field map is created from cameras and LIDAR sensors temporarily positioned on a ceiling for the purpose of creating the a priori vector field map. The sensors may also be permanently positioned with the environment to continuously update the a priori vector field map. In embodiments, an a priori vector field map is created using an architectural blueprint of a building, a layout map or floor plan of a store, a drone comprising downwards facing camera and LIDAR sensor and flown at a certain height above the ground, an HD mapping robot equipped with advanced cameras and LIDAR sensors that creates an HD map of the environment over one or more runs, an autonomous robot that creates a 2D bird's eye view map of the environment, and using a planogram of the environment (which may also be used to refine the a priori vector field map). In one example, a blueprint of a supermarket obtained from an engineering department provides structural information and a planogram of the supermarket the indicates a location of products within the supermarket (e.g., milk). An a priori vector field is created using one of or a combination of the methods described above. The a priori vector field may be refined by a human by adding specific details and checking for accuracy. Details of a method for generating architectural plans that may be employed herein are describes in U.S. Non-Provisional patent application Ser. No. 17/670,277 hereby incorporated herein by reference.

In embodiments, an a priori vector field is created prior to commissioning a fleet of robots and/or is continuously updated with all or some of elements contributing to the construction of the vector field. For example, an HD mapping robot creates a high resolution image and point cloud map for robots within a fleet to use. Updates to the map are then performed using SLAM methods employed by each of the robot within the fleet. Robots may use cameras and LIDAR sensors, and devices installed within the environment to continuously provide updates to the map. In some embodiments, cameras are stationary, such as a camera installed on a ceiling. In some embodiments, cameras are moving, such as cameras disposed on other robots. In some embodiments, an a priori vector field is continuously optimized, changed, and trained, wherein new observations are used as training data for newer runs. In some embodiments, an a priori vector field map is continuously enhanced with machine learning methods, such as a convolutional neural network (CNN), recurrent neural network (RNN), and long-short-term memory (LSTM). In embodiments, a vector field map includes active areas and passive areas.

From a perspective of a first object, a vector field map of a second object moving within an a priori vector field map impacts the a priori vector field map, causing the a priori vector field map to change as the dynamic second object moves. The first object is also a dynamic object moving within the a priori vector field map, and from a perspective of the second object, causes a change in the a priori vector field map as it moves. Areas of the a priori vector field map that include more moving objects have a higher entropy (i.e., active/dynamic areas) and areas of the a priori vector field map without or with less moving objects are passive/static areas. This makes a vector field map different and superior to a grid map, regardless of how many dimensions are incorporated into the grid map. While a grid map may include a lot of information, such as surface type, hazard information, traversability score, histogram of dirt presence, histogram of environmental variables, such as times of high levels of activity, etc., the grid map is static in nature in a real-time run. Though the grid map evolves with time in each run, the grid map does not interact with moving objects in a way a vector field does, it is rather moving objects that track each other. A vector field map is created on the go by a moving robot and is influenced by other moving objects in real-time.

One example where a vector field map is useful includes a service robot operating within a home to intelligently serve its owner, wherein it is helpful for the robot to know a likely location of the owner at a time the owner needs to take their medicine, such that the robot may serve the medicine to the owner. In another example, a vector field map helps a waiter robot monitor customers and other robots within a restaurant (e.g., other waited robots and cleaning robots), predicted trajectories of other robots, hazard points within the restaurant, etc. In another example, a vector field map helps a cleaning robot understand a nature of moving objects and track locations of the moving objects. The cleaning robot may anticipate a type of cleaning based on the dynamic object, such as a human or a pet. Or the cleaning robot may determine a certain type of cleaning in a kitchen based on tracking a child having breakfast in the kitchen before running to school, likely causing a mess of cereal or crumbs on a floor of the kitchen. For instance, the robot may determine wet cleaning is not required, as it may soak the cereal and crumbs, making it harder to clean. The robot may also infer greater suction (i.e., negative pressure) is required for cleaning, as opposed to greater air flow, which is a better option for lighter than air particles, such as dog hair. When larger items, such as cereal, are to be collected, the robot may reduce a speed of one or more side brushes, adjust motors, and/or disable all side brushes (e.g., when navigating to a location of the cereal for cleaning).

Potential trajectories are simulated and weighed against a vector field map (including vectors of participants) to determine if a safe path exists since the velocity space is restricted. A degree of safety of the path also depends on a type, size, and weight of the robot. In some embodiments, deterministic or mandatory clearance is required before the robot is allowed to move. In some (less critical) robotic applications methods, such as an elastic band approach, are used. In some embodiments, mandatory or deterministic clearance systems are implemented in an ASIC computer, or alternatively, on a FPGA to allow onsite customization and partial reconfiguration. Some degree of reconfiguration may be allowed at runtime without impacting underlying core features and safety mechanisms. In some embodiments, a degree of bias versus variance controls an amount of influence of newly learned data over previously learned data. In some embodiments, a single free space model is used to limit a search space. Alternatively, multiple free space models weigh a preferred free space for the robot to occupy. In some embodiments, a mandatory or deterministic path cleaner module runs at a higher frequency than other path planners. As a result, smaller windows of opportunity are used more effectively, allowing actuation of a planned path.

A logical area unit AU, a location in which the robot operates in a current state and loads a map, comprises a node on a graph S of nodes and vertices, wherein $AU=\{(x,y): x,y \in R\}$, $AU \sqsubset S(statespace)$. The AU is decomposed into (1) actuation horizon of the robot (AHR) (ignoring a possibility of teleportation), (2) actuation horizon of a mobile participant (AHP), (3) non-horizon area, and (4) non-traversable areas (i.e., areas in which static/fixed obstacles are positioned). A requirement is to minimize a probability of an overlap of $\text{Vector map}|AHR \cap AHP \rightarrow \text{minimize}$ in the next time step $t=t+1$. Given a vector map of the space.

In some embodiments, a vector field map of an environment is created using a series of images or point clouds (3D or 2D). The images or point clouds are provided as input to a ML or DL algorithm over a period of time to predict a probabilistic future for mobile participants within a physical environment. A mobile participant comprises, for example, an autonomous device (e.g., a robot, a vehicle, etc.), a human, a shopping cart, a pet, a motorized wheelchair (in some cases, including a cart), an indoor wheeled device for children, a motorbike, a human driven vehicle, a bicycle or tricycle, etc. In some embodiments, the probabilistic future is used by an autonomous robot to avoid possible future conflict or accidents. In some embodiments, a mobile participant is tracked from frame to frame over a progression of time using an optical flow method. The optical flow method tracks a group of pixels from a vertical point of view and is used to construct a bird's eye view of past trajectories, which when superimposed on the vector field map of the environment, predicts a near future of locations of the mobile participants. For example, FIG. 256 illustrates a robot 26900 and a camera 26901 disposed on the robot 26900 for capturing images 26902 of a person 26903 over time. Using the optical flow method of tracking a group of pixels associated with the person 26903, a bird's eye view of past trajectories 26904 within a map 26905 of the environment is generated. Some embodiments assume a flow remains constant from frame to frame for at least a group of neighboring pixels when tracking a participant using optical flow. In some embodiments, a selected group of neighboring pixels tracked are identified using a 2D or 3D bounding box or cube, respectively. In some embodiments, a set of near future predictions are associated with a tracked participant prior to superposition on a vector field map. For example, a current velocity and direction is independent of a vector field map. Therefore, a prediction is formulated using the current velocity and direction without a need for superimposing the velocity and direction on the vector field map of the environment. However, once the velocity and direction is superimposed on the vector field map, a more accurate prediction of the future is formulated. For example, a current velocity and direction matrix of a person pushing a shopping cart at an end of an isle is used to predict a next position based on where the velocity would place the person and shopping cart. However, superimposing the same velocity and direction matrix on the vector field map indicates a wall positioned in front of the person and shopping cart, and therefore, predicts the person is likely to apply a brake force to stop the shopping cart from bumping into the wall. FIG. 257 illustrates using a velocity and direction matrix to predict a future location 27000 of a person and a shopping cart from a current location 27001, which falls within unseen milk storage 27002. However, superimposing the velocity and direction matrix on the vector field map shows the milk storage 27002 positioned in front of the current position 27001 of the person and shopping cart, resulting in a prediction of the person turning a left or right or a stopping, thereby influencing the prediction of the future location of the person and shopping cart.

A vector field map adds to a sophistication of a feature map labeled automatically or by a human operator. For example, a feature indicates that at a stop sign a vehicle stops behind a stop line associated with the stop sign. However, unlike the vector field map, the feature map does not provide information on how many cars can turn left or right at a certain time of the day (e.g., morning, evening, 3 PM, etc.). In another example, a feature map provides insight based on labels, such as a lane, a pedestrian crossing, an intersection, and a current red, yellow, or green color of a traffic light. However, a vector field map provides additional information, such as a percentage of cars that drive through a yellow light, at a particular time of the day, within a particular city, when traveling from a first city to a second city, within a portion of a city, during a particular season, etc. For instance, persons residing in a large metropolitan city (e.g., downtown Toronto) are less responsive to a yellow light than persons living in small quaint and quiet towns in the suburbs. In another example, traffic trends of a large metropolitan city, such as Las Vegas, are influenced by a volume of tourists on holidays or attending events.

Predictions associated with each mobile participant, determined based on a grid map or the grid map superimposed on a featured/labeled grid map or a vector field map, produces a probability for a next, 100 ms, 200 ms, 300 ms, Is and so on. The prediction may comprise a matrix of locations, such as grid map coordinates or geographical coordinates and include direction or may comprise a vector field matrix of probabilities. The matrix associated with each mobile participant may include mass, current velocity, and acceleration/deceleration, each with an associated covariance matrix and probability distribution over an entire state space or adjacent state space of the robot. The predictions may encompass alternative possibilities and multi-modality.

Some embodiments are an autonomous robotic cleaning device with one or more processors and one or more environmental sensors (e.g., sensors that sense attributes or can observe or provide data from which inferences can be made about characteristics of an environment, such as those of a floor, a wall, or a surface of an obstacle). In some embodiments, the environmental sensor is communicatively coupled to the processor of the robotic cleaning device and the processor of the robotic cleaning device processes the sensor data (a term which is used broadly and may refer to information based on sensed or observed or inferred data at various stages of a processing pipeline). In some embodiments, the sensor includes its own processor for processing the sensor data. Examples of sensors include, but are not limited to (which is not to suggest that any other described component of the robotic cleaning device is required in all embodiments), floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like or randomly as determined by an algorithm) and the processor obtains the sensor data. In some embodiments, the sensed data is associated with location data of the robot indicating the location of the robot at the time the sensor data was obtained. In some embodiments, the processor infers environmental characteristics from the sensory data (e.g., classifying the local environment of the sensed location within some threshold distance or over some polygon like a rectangle as being with a type of environment within a ontology, like a hierarchical ontology). In some embodiments, the processor infers characteristics of the environment in real-time (e.g., during a cleaning or mapping session, for example, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred (in some cases in real-time according to the preceding sliding windows of time). In some embodiments, the processor activates or deactivates (or modulates intensity of) functions (e.g., vacuuming, mopping, UV, etc.) based on the environmental characteristics inferred (a term used broadly and that includes classification and scoring). In other instances, the processor adjusts a cleaning path, operational schedule (e.g., time when various designated areas are worked upon, such as when cleaned), and the like based on sensory data. Examples of environmental characteristics include floor type, obstacle density, room type, level of debris accumulation, level of user activity, time of user activity, etc.

In some embodiments, the processor of the robotic cleaning device marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the robotic cleaning device (e.g., cleaning history). For example, in some embodiments, the processor determines the probability of a location having different levels of debris accumulation (e.g., the probability of a particular location having low, medium and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of a working environment according to various dimensions, e.g., classifying by floor type in a hierarchical floor type ontology or according to a dirt-accumulation score by debris density or rate of accumulation.

In some embodiments, the processor associates each or a portion of the environmental sensor readings with the particular cell of the grid map within which the robotic cleaning device was located when the particular sensor readings were taken. In some embodiments, the processor associates environmental characteristics directly measured or inferred from sensor readings with the particular cell within which the robotic cleaning device was located when the particular sensor readings were taken. In some embodiments, the processor associates environmental sensor data obtained from a fixed sensing device and/or another robotic cleaning device with cells of the grid map. In some embodiments, the robotic cleaning device continues to cover the surface of the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a floor type, a room type, a type of floor transition, a level of debris accumulation, a type of debris, a size of debris, a level of user activity, a time of user activity, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the robot) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the robotic cleaning device.

In some embodiments, the processor uses the aggregated stored data for optimizing (a term which is used herein to refer to improving relative to previous configurations and does not require a global optimum) cleaning of the environment by adjusting settings of components such that they are ideal (or otherwise improved) for the particular environmental characteristics of the location being serviced or to be serviced.

In some embodiments, the processor of the robotic cleaning device generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the robotic cleaning device. In some embodiments, the processor also aggregates all or a portion of sensor data collected by sensors of other robotic cleaning devices or fixed sensing devices monitoring the environment.

In some embodiments, the processor (e.g., of a robot or a remote server system, either one of which (or a combination of which) may implement the various logical operations described herein) determines probabilities of environmental characteristics (e.g., an obstacle, a floor type, a type of floor transition, a room type, a level of debris accumulation, a type or size of debris, etc.) existing in a particular location of the environment based on current sensor data and sensor data collected during prior work sessions. For example, in some embodiments, the processor updates probabilities of different floor types existing in a particular location of the environment based on the currently inferred floor type of the particular location and the previously inferred floor types of the particular location during prior working sessions of the robotic cleaning device and/or of other robotic cleaning devices or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the robotic cleaning device such that they are ideal for the environmental characteristics predicted. For example, based on aggregate sensory data there is an 85% probability that the type of floor in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the robot that are to be applied.

In some embodiments, the processor uses the aggregate map to predict areas with high risk of stalling, colliding with obstacles and/or becoming entangled with an obstruction. In some embodiments, the processor records the location of each such occurrence and marks the corresponding grid cell(s) in which the occurrence took place. For example, the processor uses aggregated obstacle sensor data collected over multiple work sessions to determine areas with high probability of collisions or aggregated electrical current sensor of a peripheral brush motor to determine areas with high probability of increased electrical current due to entanglement with an obstruction. In some embodiments, the processor causes the robot to avoid or reduce visitation to such areas. In some embodiments, the processor uses the aggregate map to determine a navigational path within the environment, which in some cases, may include a coverage path in various areas (e.g., areas including collections of adjacent unit tiles, like rooms in a multi-room work environment). Various navigation paths may be implemented based on the environmental characteristics of different locations within the aggregate map. For example, the processor may generate a cleaning path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a cleaning path that covers areas with high probability of having high levels of debris accumulation, e.g., a cleaning path may be selected that covers a first area with a first historical rate of debris accumulation and does not cover a second area with a second, lower, historical rate of debris accumulation.

In some embodiments, the processor of the robotic cleaning device uses real-time environmental sensor data (or environmental characteristics inferred therefrom) or environmental sensor data aggregated from different working sessions or information from the aggregate map of the environment to dynamically adjust the speed of components and/or activate/deactivate functions of the robot during operation in an environment. For example, an electrical current sensor may be used to measure the amount of current drawn by a motor of a main brush in real-time. The processor may infer the type of floor based on the amount current drawn and in response adjusts the speed of components such that they are ideal for the particular floor type. For instance, if the current drawn by the motor of the main brush is high, the processor may infer that the robotic vacuum is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduces the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of flooring, as carpet, for example, requires more current to be drawn by the motor to maintain a particular speed as compared to hard flooring.

In some embodiments, the processor infers presence of users from sensory data of a motion sensor (e.g., while the robot is static, or with a sensor configured to reject signals from motion of the robot itself). In response to inferring the presence of users, the processor may reduce impeller speed to decrease noise disturbance. In a further example, the processor identifies a user in a particular area of the environment using obstacle sensor data collected during a cleaning session. In response, the processor reduces the speed of the impeller motor when operating within the particular area or avoids the particular area to reduce noise disturbances to the user.

In some embodiments, the processor adjusts speed of components, selects actions of the robot, and adjusts settings of the robotic cleaning device, each in response to real-time or aggregated sensor data (or environmental characteristics inferred therefrom). For example, the processor may adjust the speed or torque of a main brush motor, an impeller motor, a peripheral brush motor or a wheel motor, activate or deactivate (or change luminosity or frequency of) ultraviolet (UV) treatment from a UV light configured to emit below a robot, steam and/or liquid mopping (e.g., modulating flow rate of soap or water), sweeping, or vacuuming (e.g., modulating pressure drop or flow rate), set a cleaning schedule, adjust a cleaning path, etc. in response to real-time or aggregated sensor data (or environmental characteristics inferred therefrom). In one instance, the processor of the robotic cleaning device may determine a cleaning path based on debris accumulation data of the aggregate map such that the cleaning path first covers areas with high likelihood of high levels of debris accumulation (relative to other areas of the work environment), then covers areas with high likelihood of low levels of debris accumulation. Or the processor may determine a cleaning path based on cleaning all areas having a first type of flooring before cleaning all areas having a second type of flooring. In another instance, the processor of the robotic cleaning device may determine the speed of an impeller motor based on most likely debris size or floor type marked in the aggregate map such that higher speeds are used in areas with high likelihood of large sized debris or carpet and lower speeds are used in areas with high likelihood of small sized debris or hard flooring.

In some embodiments, the processor may use machine learning techniques to predict environmental characteristics using sensor data such that adjustments to speed of components of the robotic cleaning device can be made autonomously and in real-time to accommodate the current environment. Examples can include, but are not limited to, adjustments to the speed of the main brush, wheels, impeller and peripheral brush, activating/deactivating UV treatment, sweeping, steam or liquid mopping, and vacuuming, adjustments to cleaning path and cleaning schedule, etc. In some embodiments, the processor may use a classifier such as a convolutional neural network to classify real-time sensor data of a location within the environment into different environmental characteristic classes such as floor types, room types, levels of debris accumulation, debris types, debris sizes, and the like.

In some cases, path planning methods described in prior art cover open areas and high obstacle density areas simultaneously without distinguishing the two. However, this may result in inefficient coverage as different tactics may be required for covering open areas and high obstacle density areas and the robot may become stuck in the high obstacle density areas, leaving other parts of the environment uncovered. This may result with a large portion of the open areas of the environment uncovered by the time the battery of the robot depletes as covering high obstacle density areas can be time consuming due to all the maneuvers required to move around the obstacles or the robot may become stuck in the high obstacle density areas. In some embodiments, the processor of the robot described herein may identify high obstacle density areas.

In some embodiments, the processor of the robot may determine a next coverage area. In some embodiments, the processor may determine the next coverage based on alignment with one or more walls of a room such that the parallel lines of a boustrophedon path of the robot are aligned with the length of the room, resulting in long parallel lines and a minimum the number of turns. In some embodiments, the size and location of coverage area may change as the next area to be covered is chosen. In some embodiments, the processor may avoid coverage in unknown spaces until they have been mapped and explored. In some embodiments, the robot may alternate between exploration and coverage. In some embodiments, the processor of the robot may first build a global map of a first area (e.g., a bedroom) and cover that first area before moving to a next area to map and cover. In some embodiments, a user may use an application of a communication device paired with the robot to view a next zone for coverage or the path of the robot.

The processor of the robot may load different cleaning strategies depending on the room, zone, floor type, etc. Examples of cleaning strategies may include, for example, mopping for the kitchen, steam cleaning for the toilet, UV sterilization for the baby room, robust coverage under chairs and tables, and regular cleaning for the rest of the house. In UV mode, the robot may drive slow and may spend 30 minutes covering each square foot. In some embodiments, the robot may adjust settings or skip an area upon sensing the presence of people. The processor of the robot may sense the presence of people in the room and adjust its performance accordingly. In one example, the processor may reduce its noise level or presence around people. In some embodiments, the user may choose an order of coverage of rooms using the application or by voice command. In some embodiments, the processor may determine which areas to clean or a cleaning path of the robot based on an amount of currently and/or historically sensed dust and debris. In some embodiments, the processor or the user determines an amount of overlap in coverage based on an amount of debris accumulation sensed.

In some embodiments, the robot performs robust coverage in high object density areas, such as under a table as the chair legs and table legs create a high object density area. In some embodiments, the robot may cover all open and low object density areas first and then cover high object density areas at the end of a work session. In some embodiments, the robot circles around a high object density area and covers the area at the end of a work session. In some embodiments, the processor of the robot identifies a high object density area, particularly an area including chair legs and/or table legs. In some embodiments, the robot cleans the high object density area after a meal. In some embodiments, the robot skips coverage of the high object density area unless a meal occurs. In some embodiments, a user sets a coverage schedule for high object density areas and/or open or low object density areas using the application of the communication device paired with the robot. For example, the user uses the application to schedule coverage of a high object density area on Fridays at 7:00 PM. In some embodiments, different high object density areas have different schedules. For instance, a first high object density area in which a kitchen table and chairs used on a daily basis are disposed and a second high object density area in which a formal dining table and chairs used on a bi-weekly basis are disposed have different cleaning schedules. The user may schedule daily cleaning of the first high object density area at the end of the day at 8:00 PM and bi-weekly cleaning of the second high object density area.

In some applications, the robot performs a task of coverage that reaches all areas of the working environment, wherein perimeter points are covered without bumps. Traditionally, this is achieved via coastal navigation techniques. Coastal navigation is inspired from imagining a blindfolded human walking along a coast by feeling whether water is felt at their feet at each step. When water is felt, the human slightly moves away from the water and vice-versa. The human plans their trajectory such that a balance of both water and dry sand is felt within a time window. Similarly, a near field IR sensor may help the robot feel an existence or absence of a wall. A real-time point swarm (i.e., cloud) perimeter alignment, as opposed to near field IR sensor coastal navigation, may add to capabilities of IR or be implemented on its own. Coastal navigation methods are prone to failure as their planning depends on a sensing that is only reliable when the robot is near a wall. A point swarm sensing has information about a wall long before approaching the wall and therefore devising a better plan with a longer visibility horizon is possible. In coastal navigation methods, particularly for a first map build, the robot must visit perimeter points first and then cover inner areas. In some costal navigation methods, the robot finds a first wall, drives along the first wall, finds a second wall, and drives along the second wall, etc. and eventually closes a rectangular shape that exists within the walls sensed. In some other coastal navigation methods, especially for a coverage robot, the robot does not explicitly follow a wall but discovers the wall when the robot hits the wall (e.g., with a bumper, a tactile sensor, a fork IR bump sensor, etc.) or when the senses the wall (e.g., with an IR sensor or a near field line laser combined with camera in a structured light depth sensing apparatus, or any other kind of near field sensor). After combining wall points sensed (with or without physical contact), the coastal points (i.e., the wall) are discovered. Both of these methods of coastal coverage may be justified for a coverage robot as the coverage robot is expected to visit all points on a surface. In one case, the robot may start with the walls, and in another case, the robot has sufficient time to go back and forth enough number of times to distinguish enough number of coastal points to form the walls. The coastal navigation methods rely on establishing ground truth points by touching, reaching, and/or sensing the walls and does not work well when the task is a patrol mission or point to point travel. For example, when a robot is given the task of going from point 1 to point 2, it would be awkward for the robot to visit the perimeter points before driving to point 2 as the robot is expected to immediately drive to point 2 without the need for establishing ground truth.

In embodiments, it is desirable that SLAM be seamless and executed in the background. In embodiments, it is desirable that the user is not limited or does not notice the need for ground truth establishment. To achieve these desires, some robots start with a training run, wherein the robot wanders the environment (perhaps in best effort back and forth boustrophedon motion) using its camera, LIDAR, or other sensors. The robot is ready to take commands in a run following the training run. Herein, point swarm information may be used to extract perimeter points from afar and obstacle points locally when the robot is close to an obstacle. Images may also be used in the same manner as point swarms. Often point swarm data and image data offers higher resolution in the near field and low resolution as the distance increases. A camera may generate a 2D image from a 3D environment, wherein each pixel is lossy in terms of preserving the depth data. Point swarm data is also subject to divergence of each ray from one another when they extend radially outward. Point swarms are often used in global planners in prior art. However, in determining the perimeter points in a global planner, accuracy is bound by sensor accuracy and map resolution. This means at a resolution with a unit distance x, the perimeter may fall at ux or (u+1) x, wherein u is a multiple of the unit. As such, a global planner may plan either for a path that falls outside the real perimeter, or alternatively, plan for a path that falls too far inside the actual perimeter. Herein, the best of each situation is taken advantage of by including a perimeter aligned navigator using point swarm and implementing a specific point cloud based perimeter and obstacle extraction.

In some embodiments, a path alignment using perimeter points is implemented to the reduce time the robot drives along a wall. The path alignment using perimeter points also allows the processor of the robot to plan for multiple next steps with a longer visibility horizon, such that the path appears smooth and decisive. In prior art, there are times the robot curves away too much while aligning with perimeters around an obstacle and bumps the obstacle when curving back in to realign, particularly while moving around skinny obstacles. Multiple hits and backing up to realign increases coverage time. This is common in the prior art as the algorithm solely relies on data from a dedicated near field distance sensor for maintaining a particular distance from the obstacle perimeters or uses the global map and global planner data with low resolution at perimeter points. Lower resolution at further distance creates uncertainty at perimeter points unless the robot continuously changes the global map as the robots gets closer. This creates instability in the global map and complicates the global planner's responsibility. Another issue is that longer distance sensors and point swarm data struggle to continuously detect thin obstacles, which impact continuous alignment. Herein, the best of both scenarios is used by the global map and global planner using the point swarm as done in the prior art. However, herein a point swarm perimeter sensing subsystem is added. If there is a lack of sensor data from the near distance sensor, then LIDAR sensor data may be obtained for that particular area near the robot. Point swarm data is filtered to a reasonably chosen local region, and a target point is picked. This target point may be either the further point of the closest points or follow a specific filtering method to be picked. In some embodiments, if a target point is ahead of a center of the robot, the robot goes forward, otherwise it pivots.

The applied methods reduce robot over-shoot and prevent the robot from failing to align well with or avoid wide following of skinny obstacles. In some embodiments, the robot drives around a skinny obstacle by curving at a radius wherein the skinny obstacle is not followed too wide or too narrow (which may lead to a bump). This improves the situation where the near field sensor does not reliably detect the skinny obstacle as signals deteriorate (or disappear) as the robot moves along where no more length of the skinny obstacle remains. In some embodiments, the robot drives in a hexagon, or octagon, or a circular pattern around the obstacle as a result of correcting its position with respect to the obstacle when the sensor catches a glimpse of the obstacle. In some embodiments, rather than attempting to continue to track the obstacle when the distance sensor loses sight of it, the robot algorithm actuates the robot to drive straight until a time out (depending on external settings such as interrupt counters, sensor position, etc.) then to curve with approximately the robot radius towards the obstacle until the obstacle is observed again.

In some embodiments, additional tracking methods are implemented to prevent a repeat perimeter coverage of areas, particularly when the robot is paused then resumed. In some embodiments, the processor exports a map to a specific subsystem (process) which exclusively tracks wall-following coverage within the map. Preventing repeated perimeter following improves overall experience and reduces runtime for coverage. Substituting a coastal navigation with a specific perimeter path planning subsystem that may or may not use near field sensors increases performance at perimeter points, wherein the robot continuously adapts to the contour of the environment. In some embodiments, this improves the robot's reaction to moving obstacles and a dynamic environment. This also further satisfies a route-plan polymorphism condition.

Non-polymorphic systems, such as those available on the market or explained in the prior art, may use algorithms, such as Spanning Tree Algorithm (STA), that allow a methodical coverage along the Hamiltonian Graph but require a complete map be present prior to running the algorithm. Such algorithms suffer adaptably to partial observability and real-time change as they require a global map and global path plan. While this approach provides an even and controlled coverage in parallel rows, the approach suffers because structure of the pattern cannot adapt to changes in the environment and dynamic obstacles create a situation where the robot needs to re-run the algorithm from the beginning. Alternative to STA, is a rigid box path planning method for covering all areas of the environment, may not provide the most efficient movement path in real-life scenarios, as described above. These path planning methods particularly get worse in complex environments or large environments. The path planning method proposed herein reduces coverage time drastically in comparison to similar products on the market. This optimization is achieved while other advantages, such as response to dynamic obstacles, remain in place. In some embodiments, planning a path iteratively on-the-fly without a complete map of the environment and based on incoming point swarm data is optimized based on semi-observability. To optimize for time, based on partial observability, a radially outward mapping algorithm provides partial observations of the vicinity sensors of the robot observe. If an optimal plan is generated within the neighborhood of the robot, it is expected that an optimal plan exists and may be found for the next neighborhood of the robot. The overall completion time is also expected to be minimized.

In some embodiments, the processor of the robot acts decisive in a path the robot executes, combining multiple primal path segments into a longer coherent trajectory. Choppy robot movement, such as movement along a small primal path segment, pausing, and rotating right and left before executing another small primal path, is robotic as opposed to organic, decisive, and smooth movement. Overshooting, undershooting, and many corrections over small distances is undesirable. Such poor movement behaviors are hidden when the robot drives straight or executes a simple turn. However, when the area is complex, choppy movements being to show, and as complexity increases, the issue becomes more observable. For example, a robot pivots in place towards the left by 10 degrees, then pivots in place towards the right by 20 degrees, then pivots in place back towards the left by 5 degrees, and then moves forward. The result of this sequence of movements could have been achieved by pivoting towards the right by 5 degrees. When the robot pivots in place, the issue is easy to recognize and avoid. However, the same indecisiveness happens when the robot is moving. For example, when the path is straight choppy movement is obvious but often the path is not straight and does not include a single curve. In one example, the robot oscillates left and right as the robot attempts to drive along a straight line. In another example, the robot completes a complex path including curves and straight lines. In an example wherein choppy movement is unobvious, the robot pivots to the left by 10 degrees but does so while completing a curved path, then the robot pivots right by 20 degrees though not in place and incrementally, then the robot pivots back to the left by 5 degrees, all while executing a more complex path that avoids obstacles and reach a particular destination. To achieve smooth and graceful movement, the overall pivot of 5 degrees to the right is spread over as long of a distance as possible.

In some embodiments, a boustrophedon movement of the robot accumulates error as the robot moves and does not compensate for that error frequently enough. In some embodiments, a curving controller or a curving manager subsystem is used to keep the robot on track frequently, rather than blindly driving from start-of-curve to end-of-curve and only correcting for the error at the end-of-curve. Linear controllers and curve controllers must blend in their commands in such a way that the path is interleaved with a proper combination of the two. In some embodiments, the algorithms for the robot combine a few of their minute future decisions into a coherent and decisive plan without overshooting, undershooting, and jerky movements. In some embodiments, a linear acceleration controller is blended with a heading line controller with an added derivative and integral term to the PID and a cost function. In some embodiments, predictive functional controllers are used, such as well-known controllers (e.g., a Stanley controller) or custom ones. In some embodiments, a lag between speed calculation and execution of motors benefits from a squared sum error function and the emphasis between heading error and linear error is balanced.

In some embodiments, if after the robot pivots in place or while moving and finds itself having committed an overshoot, the robot postpones a corrective reaction to combine it with the next movement.

In some embodiments, the robot always undershoots a bit and makes up for the undershoot in the next movement. This prevents possibility of an overshoot and a need for correction. For example, in a U-turn, instead of aiming for a 180 degrees turn, the robot turns 170 degrees and the next commands fix the last 10 degrees. Compensating for 10 degrees in the next movement looks better than the robot overshooting by 10 degrees then correcting the overshoot. In general, an undershoot of X degrees is preferred. The amount of X degrees may be determined based on a fixed table, wherein the undershoot amount of X degrees is proportional to the total degrees of the turn. In another example, based on a table, an automatic reduction of 10 degrees is implemented when a U turn is required and reduction of 5 degrees is implemented when a left turn or a right turn is required. Another method dynamically adjusts the undershoot amount of X degrees based on several criteria, X being a range. For example, for a 180 degrees U turn, X is a range of 8 to 12 degrees and the exact undershoot amount is calculated in real time based on some criteria, such as the floor type. For example, when the floor type is carpet, X is 11 or 12 degrees and when the floor type is hardwood, X is 8 or 9 degrees. Alternatively, for a same floor type, an amount of degrees is chosen from the range such that the robot slightly moves differently to avoid appearing robotic (i.e., perfectly even and exact every time). A path that a coverage robot takes should be perceived as intuitive by a human observer. For example, in a coverage task, it is insufficient for a robot to merely follow a systematic pattern crossing the floor in parallel rows to cover all areas. Even with a systematic pattern performed in the least possible amount of time, the appearance is insufficient to a human observer because a path strategy to minimize coverage time may not produce a path that appears intuitive to a human. A path that may appear intuitive to a human may at times be slower than the fastest possible way. A human expects the robot to perform coverage by completing coverage of a series of connected smaller rectangles (or other geometric shape) and working from one rectangle (or other geometric shape) to another in a continuous fashion, even if the goal of optimization for time is sacrificed at times.

Optimization for time within various complex areas is a matter further addressed in the disclosure elsewhere. The constraint of a path being perceived as intuitive adds a layer of complexity to mere optimization for time. While intuitive coverage may seem trivial to a human, intuitive coverage is not well defined and its meaning changes from one floor layout to another. The p robot does not understand human chosen path priorities and the problems scale in complex environments. In prior art, the position of the robot has traditionally been tracked within a static global map of the environment during cleaning to ensure all areas are reached. In prior art, the robot may take a very strange and convoluted path to cover all areas in the minimum amount of time. This satisfies the requirement for optimization for time, but a human observer would not readily understand the strategy by observing the robot. In one example, a robot follows along a first wall, a second wall, and a third wall of a room then turns 90 degrees to go back to its starting position, forming a rectangle or a square. The robot then covers inside the rectangle in parallel lines. The robot then creates another rectangle, and one after another. This is not organic as a human cleans from where they are currently standing and works their way gradually to other points. While this is a restriction enforced by older technologies, this is concurrently an example of unintuitive coverage. It is insufficient for the robot to merely follow a systematic pattern crossing the floor in parallel rows covering all areas and minimizing the time to do so. A global planner may plan a path for an entire space consisting of rectangles for coverage, one after another, however this is due to a limitation in prior art and older technology imposed by suboptimal mapping methods. In this disclosure, improvements over the prior art are explained.

Some embodiments employ polymorphic characteristic, wherein the path of the robot is adjusted in real-time based on the observed environment. That is extended by requiring a polymorphic behavior and real-time response time with yet another set of constraints, partial observability, minimized time to cover, and performing all of the listed intuitively. For instance, in prior art or current products on the market, the robot may be observed to abort cleaning a subarea to prefer a portion of a different subarea and then return to the first subarea. In prior art, a selected area is defined by a small number of cells and these small areas are created within another room as a result of adaptive map updates. This disclosure proposes dynamic consolidation of subareas and splitting of areas where it makes sense. For example, if an area or a combination of areas fit within certain criteria, such as the areas all being too small, then the areas are merged and are treated as one. In some circumstances, an area should be split. For example, if the room is of a certain size (e.g., too large) or certain shape (e.g., L shape), the room is split into two or more areas, each of which is treated in order, wherein one area is completed before entering another area. When the robot moves from one subarea to the next, it is desirable that the coverage path is devised such that an end point in one rectangular subarea falls at a beginning point of the next rectangular subarea. In prior art, coverage efficiency is impacted by the robot overdriving during initial exploration of a room. Exploration drives the robot astray from where the robot needs to be for the next subarea, requiring the robot to come to the next subarea. The more unnecessary navigation, the more risk for hitting obstacles or hidden obstacles. This disclosure limits exploration within a boundary that is within where the robot is intuitively expected to perform work. Explicit frontier exploration is prohibited and favors a logic wherein frontiers are explored as a side effect of covered areas being extended. This means exploitation is favored and exploration takes place as a side effect or the robot visits further areas already explored. Only if necessary a frontier exploration is conducted. Also, instead of choosing which zone to cover next at random, a method for choosing an order of zone coverage improves coverage efficiency. In some embodiments, the method comprises choosing a next zone based on diagonal distance between zone centroids, the closest zone being chosen next. In some embodiments, the algorithm chooses the closest plannable area within planning distance. In the prior art, the robot sometimes becomes trapped by hidden obstacles and the algorithm is unable to find a path to the coverage area. This causes a problem, as the algorithm tries to navigate it falls into loop planning. Theoretically, the algorithm exits the loop eventually as it reduces the coverage area size by a few cells during each planning attempt, however, when the area is large this takes a long time. This disclosure adds aborting attempts to plan for an unplannable task and actuates the robot to complete its other remaining tasks. If there are no navigable tasks, the robot fails with a notification passed to a paired mobile application to notify its user. This disclosure blends boustrophedon and wall-follow while keeping their autonomy as fully separate states. In some embodiments, a wall-following and boustrophedon work in tandem, wherein wall-following tasks are scheduled within the boustrophedon coverage rectangle. During boustrophedon coverage, if there is a start point from a wall-follow task in the immediate path of the robot, the robot transitions to that wall-follow task at the end of the current boustrophedon line. In some embodiments, the path planning algorithm includes a heat map showing areas covered and a time tracker for coverage, wall-follow, and navigation.

In some embodiments, coverage methods are executed by robots used for agricultural purposes (e.g., robots for planting, harvesting, and soil treatment) as the robots move along a path of back-and-forth boustrophedon pattern. Other examples of coverage robots include surface treatment, lawn mower, and cleaning robots. Coverage robots often follow a systematic pattern to cover the entire area once and do so efficiently. Algorithms known in the prior art are Spanning Tree Algorithm (STA), Reverse Spiral Algorithm (RSA), Hamiltonian path planning, and radially inward coverage in a rigid box with periodical loop closures. With systematic movement paths, such as those in prior art, the robotic vacuum often follows a predetermined and preprogrammed cleaning pattern based on a global planner of the robot that works on a global map created from SLAM. Although this approach provides an even and controlled coverage method for the robot, there are restrictions such as the need for periodic loop closure in SLAM, suffering from scalability due to the rigid sized squares dictating the path, and large map size. Systematic movement paths are preprogrammed within a rigid box, and the structure of the pattern cannot adapt to different working environments. These movement paths may be too rigid for covering all areas or their structure may not provide the most efficient movement path for the robotic vacuum, particularly in complex environments.

This disclosure introduces radially outward coverage without the need for periodic loop closure, wherein the map expands gradually and radially outward, and because the coverage method does not follow a rigid structure, the coverage method is dynamic in nature and readily adapts with the position of objects changing or new objects introduced and also deals with the issue of partial observability. In some embodiments, the robot successfully initiates and operates a task of coverage in a continuous state of partial observability, wherein the robot starts working without having steps in the beginning to determine the special structure of the environment. Getting to know the environment happens in the background and is seamless, occurring while the robot performs its actual task with the little information available by the time the robot gets to a starting place of the task. When a full map is not built yet, it is challenging to use the partial information due to the partial observability, in many circumstances, not coinciding with the assumed case. To better explain the issue, consider one driving in extreme fog. A part of area near the car is visible but making a decision based on that area is much more difficult in comparison to when the road is visible on a sunny day. With radially outward mapping, the robot uses the available partial information to make path planning decisions and more areas become observable as the area is expanded due to the radial outward path. In some embodiments, the robot does not have a full map until near the end of the work session, wherein the last parts of the area are discovered. Another requirement requires the path planning to lead to more or faster discovery of unknown areas without having all the information. In some embodiments, the path planning algorithm continuously exports and imports a full robot pose into a buffer bucket of memory which holds the partial and temporary map; plans a path based on areas that are confidently distinguished as traversable; iterates in updating the bucket with new point swarm data, areas covered and areas not covered; and creates a cost function to minimize redundancy to create an optimal path at all times. The same method may be used to store the latest state of the map and coverage, however, instead of using RAM, a kind of non-volatile memory or the cloud is used for exporting to and restoring the data when needed. This includes known areas of the map, ray traced areas, covered areas, and uncovered areas. Old data is continuously cleaned and memory spaces are managed very carefully to keep the operation from growing outside the computational resources that are available. Some embodiments implement a method using a flag, wherein a platform of the robot indicates to the algorithm that the robot wants to resume a previous run, restore coverage area by re-inflating imported coverage, and actuate the robot to resume the previous run.

In some embodiments, boustrophedon coverage is implemented, wherein the robot treats perimeter points seamlessly as they are encountered and coverage is along the paths of perimeter. Any unexpected reset, particularly excluding back to dock, power-OFF/-ON, routine changes (e.g., docking, then invoking cleaning), and cloud request for map reset cases, are treated seamlessly. In some embodiments, the pause state is implemented as a single control machine state and the application paired with the robot is used to pause the robot during a work session.

When a map is not formed yet, planning a coverage may not always succeed but the challenge is to use the areas that are sure to be traversable even though the entire space is unknown. In some of the prior art, a training run before performing work is implemented, these methods being inferior to those disclosed herein. In some of the prior art, a path is planned based on radially inward mapping with periodic loop closure, wherein the robot drives along a rectangle with one or two edges adjacent or aligned to one or two walls, and then starts cleaning or covering inside the rectangle. Herein, the disclosure focuses on how, without having explored a rectangular area or the entire area, the robot makes an educated guess that reliably leads to a correct decision in determining how to successfully plan coverage based on a partially observed and unmapped space. The point swarm data or images from a camera are used to distinguish a guaranteed traversable area for the robot to begin task of coverage based on minimal recognition of the area. This traversable area is a subset of the entire area. The robot moves along a boustrophedon path within the traversable area and simultaneously synthesizes and gradually completes the map by temporal integration of point swarm data or images. For a robot with heavy weight or used in critical missions, deterministic computing is required, wherein deterministically, upon an IRQ invoked, a service response code is reached within a certain number of CPU cycles. SLAM is substrate of AI, in particular, a form of spatial computation allowing the robot to perceive its surroundings based on sensory input that is often noisy and has minimal meaning when considered individually. Temporal integration of readings while the robot moves allows for the point swarm (generated by an active illumination reflection that is received by a sensor) to be combined in a meaningful way and gradual reconstruction of the environment. The reconstructed environment forms a simulation in which the robot observes its pose as it evolves with time. As the robot moves, its sense of location suffers uncertainties associated with motion. This uncertainty is often modeled by creating multiple simulated robots each having a slightly different trajectory and modeling an instance of the noise that could happen. As such, the robot carries multiple hypothesis and for each calculates a posterior. While this field is the forefront of intersection of science and technology, methods that are common in the field often require massive computational resources, such as a miniaturized desktop PC. However, a desktop PC does not satisfy real-time computing requirements. In this disclosure, probabilistic algorithms that provide the accuracy and sophistication of advanced algorithms while maintaining a lightweight nature are developed. The probabilistic algorithms are suitable for meeting real-time computing and deterministic computation constraint requirements.

Some embodiments require scheduling of a particular run time for a subset of the work area and a different run time or a different kind of treatment (e.g., mopping, sweeping, vacuuming, cleaning with a certain detergent, etc.) for a different subset of the work area. This requires that each subarea is identified as a standalone area. In some embodiments, multiple layers of the map are developed, each with a characteristic, resolution, and data structure that is used for a specific purpose. In some embodiments, a decomposition in the boustrophedon coverage planner serves multiple purposes including more granular access to boustrophedon box control. A series of boustrophedon boxes may be arranged next to each other in an area to form rectangles of subareas inside an area. In some embodiments, the robot is configured to end at a beginning of the next adjacent line by checking how far the robot is from the next adjacent line and how much the robot still needs to rotate to get to the line. Some embodiments actuate the robot to pre-rotate if the chosen curve radius is not enough to turn the required distance and determines an amount of pre-rotation given the distance to the next adjacent line. When the last line in a boustrophedon box is narrower than a width of the robot, the robot adjusts the boustrophedon box polymorphically. Some embodiments strategize boustrophedon box coverage order such that the robot exits the boustrophedon box at the last line of the boustrophedon. In some embodiments, the algorithm provides polymorphical decomposition with an atomic architecture, wherein if one map or path is invoked, the other layers do not occupy memory space.

In some embodiments, the overall path planner and a next point navigation planner are fused into a series of electric ticks provided to the motors. In some embodiments, the robot takes the same waypoints or meets the same anchor points when navigating in-between zones, whether the robot is tasked to perform a patrol walk, a point-to-point walk, or a coverage task. For example, for a robot displaying an advertisement in a shopping mall, though the robot has some flexibility in where it goes, it may be ideal for the robot to drive from one zone to another in a specific order or for the robot to touch certain points as the robot moves from one area to another. Another example comprises a security robot that drives from area to area to perform certain checks in each area. Another example comprises a coverage robot that uses navigation anchors as a highway, wherein the robot goes and comes back along the same path that has once been cleared to ensure the most efficiency. In another example, a patrol robot looks for specific items that are placed at specific locations. As such, the robot creates or accepts anchor points and uses them. This particular case investigates creation of anchor points and using the anchor points in a boustrophedon coverage as the robot crosses a floor in parallel rows. Traditional path planning methods do not allow for creation of anchor points or following anchor points that are created. In some cases, path planning methods based on a static global map without adaptability may lead to planning of hazardous movement paths. In some embodiments, the algorithm creates anchor points and the robot navigates to the anchor points along a trajectory. In some embodiments, the anchor points are picked within certain areas of the surroundings using a water shed like algorithm, starting from a central point and expanding the radius to include other areas. Along the center of an area with a least amount of course corrections possible is a path that would be desirable for the robot to visit as an anchor point. In practice, a human organically follows a similar pattern. For example, if a person is looking for their lost keys, the person goes to a relatively central point of each room, takes a glance, then leaves the room and goes to another room.

Organic navigation mimicks how humans naturally navigate through an area. Humans are unlikely to walk within five centimeters of obstacles or walls by choice and neither should the robot. In some embodiments, a path planning algorithm places navigation anchors in areas at every two meters, preferably in the center of areas, given they are obstacle free. The algorithm plans navigation between the different areas by determining paths between navigation anchors. This is less computationally expensive and faster, as paths and the distances between navigation anchors are pre-computed. In some embodiments, a first map analysis is performed to generate a grid with anchor points, wherein the graph includes nodes that are representative anchors and edges that connect nodes where there is direct and open space for navigable connection between them. The anchor points are at least a robot diameter away from obstacles. When a node is on the x- and y-grid, the algorithm checks all eight neighbors and adds edges accordingly. When the node is on the x-grid but not on the y-grid, the algorithm finds the closest y-grid points and checks the closest six grid positions and adds edges accordingly. The opposite is performed when a node is on the y-grid but not the x-grid. The algorithm also performs a y-sweep along y-lines for each grid x-axis, and if a valid y-segment does not contain an anchor point, adds one. An x-sweep is similarly performed.

In some embodiments, the algorithm is then programmed to plan a route from a start location to a goal location using the graph of anchor points and edges from the map analysis. To encourage the algorithm to plan paths that travel to nodes and along edges, travel along edges and to nodes causes a decrease in cost in a path planning function. For example, the step cost is discounted 10% for edges, 30% for nodes, 50% for one time repeated node, 70% for second time repeated node. In some embodiments, to discourage the algorithm from planning paths too close to walls, the use of edges that are particularly close to walls cause an increase in cost in the path planning function. In some embodiments, to discourage the algorithm from planning zigzagging paths, nodes that have a different direction than a direction out cause an increase in cost in the function. It is often desired that a robot not only complete a task, but perform the task in a way that a human perceives as reasonable. For example, in an autonomous vehicle, it is possible for the algorithm to avoid any collisions and be totally safe but accelerate and apply the breaks or take turns that are perceived as uncomfortable by a human. Even though a robot is likely to maneuver in certain ways that humans can't and safety is still ensured when the robot drives fast and agile, merely the safety and getting the task done is not enough.

In some embodiments anchor points are developed in navigation to mimic more reasonable seeming performing of the task that adapts to the current environment. In some embodiments, the algorithm causes the robot to navigate to anchor points with multiple use cases. In one example, a human does not walk from one room to another by following along walls at a 10 cm centimeter distance from the walls, although that would be completely safe. If a robot does that, it can be tolerated and the task gets done, however it is perceived as slow, inefficient, inorganic, and dissuades the human from delegating a task to the robot. In prior technologies, coastal navigation is used to navigate from one room to another, of which is improved herein.

In some embodiments, a path planning method generates a grid comprising anchor points strategically placed and used, and together with a uniquely formed cost function, is used in planning routes that travel along a center of an area and away from walls, along straight lines, as opposed to routes with multiple turns and curves, and minimizes course corrections. In spatial computing and semantic context based mapping, it is desirable for the robot to detect the perimeter and devise a plan that appears methodical but also understands desirable concepts understood by humans. A room, for example, easy to identify by a human, does not have any specific geometrical definition though it is expected a coverage robot avoid going back and forth between rooms when performing a task of coverage. However, definition of a room, rather than being precise and crisp, is a loose one but it is well understood by a human. In order for a robot to exercise room-based navigation, the robot must first be able to identify one. Furthermore, it is desired that a room is distinguished and honored even if the robot is not familiar with the environment. Currently, the prior art is lacking a robot that recognizes a room immediately upon observing one without the robot having completed a first run and having the entire map to divide into areas. As such, the approach is a segmenting algorithm rather than an AI algorithm that can classify a room on-the-fly as soon as an enclosure is observed. Additionally, segmentation approaches are widely inaccurate based on test data.

This disclosure explains an improvement over prior art, wherein the AI algorithm detects an enclosure and classifies the enclosure as room when it makes sense to do so and early on when the robot reaches the enclosure, similar to a human. Based on such detection, the robot completes coverage of one room before entering another. With semi-observability of the area and point swarm data, an enclosure that is a room candidate is detected and adjusted for accordingly. The robot starts in a room with a seed graph color, and then the second room is a second node in a graph identified with a second graph color, and so on. In some embodiments, a data format is defined and used to identify rooms, wherein zero indicates no room and all other numbers are numerical identifiers for rooms. Random ordering of room IDs is supported and a function that suggests a next room to cover is implemented. Room identification identifies areas and enclosures as rooms in real-time using a wave expansion technique rather than segmenting a given complete map, as is done in prior art. In some embodiments, a first room is chosen for coverage by checking if there is a room that is partially cleaned, and if so, setting it as the initial room for coverage. Then a closest room from a list of room IDs is picked by determining a diagonal distance to a map centroid of each room and choosing the closest one to the robot, wherein a closest uncleaned room is selected for cleaning next and a second closest room is selected as a next candidate for cleaning. In some embodiments, the algorithm manages room based coverage by implementing a data object containing past, current and future cleaning zones, a zone manager that handles switching of cleaning zones (i.e., when the robot is done cleaning a zone the manager moves the zone from current to past), and a map analysis tool that identifies current and future cleaning zones.

In some embodiments, the algorithm manages parameter settings (e.g., cleaning intensity) for a current room of a robot by using sensor data and building a map to attempt to identify the current room of the robot. If the room is identified, the room parameters are set to the current room parameters saved, otherwise, the room parameters are set to the default parameters. If the room is unidentified, the room parameters are set to the default parameters. In some cases, a robot begins scheduled work and aborts partway through due to low battery. To maintain a same planned order of room coverage and room settings as prior to aborting the session, the algorithm exports a location of the robot prior to aborting, covered areas, room settings, and an order of room IDs for room coverage to the cloud. After recharging, the algorithm actuates the robot to resume the session by restoring the exported data. Further, to ensure all areas are covered after room based coverage, the algorithm actuates the robot to wall follow the perimeter of each room after coverage of the respective room, identifies any remaining uncovered areas at the end of a session, and actuates the robot to perform a robust coverage of those uncovered areas.

There exists many instances that the rooms are not perfectly separated or the logical separation does not align with human intuition. As the robot goes about performing the task of coverage, partial observability gradually becomes closer to full observation by the end of a session. The newly found information is accounted for and the robot amends or fixes its initial mistakes in identifying a room, given that the entire area is now observed. The new information is merged and an initial finding is reconsidered. The path planning algorithm further supports user initiated resegmentation of a map into rooms using a user interface. Graph theory is used to identify each room as a node and the path to its neighbors as a link. A room manager for high-level management that maintains a room state, the room state encoding different rooms and their neighbors, is devised as well as a zone manager for high-level tracking of rooms to be covered and order of room coverage. The path planning algorithm further supports user initiated resegmentation of a map into rooms via the cloud. The features include the following: map re-segmentation, wherein the user requests resegmentation, causing the algorithm to clear all current rooms and repartition the map into a new set of rooms; room division, wherein the user selects a room and splits the room as desired by positioning a line, causing the algorithm to repartition the room based on the line; and room merge, wherein the user selects two rooms to merge, causing the algorithm to merge the two rooms into a single room. The three functions implemented in the algorithm perform resegmentation, merging, and dividing of rooms prior to pushing the information to the mobile application for display. For a user to select rooms, the mobile application includes a room manager for high-level management that maintains a room state, the room state encoding different rooms and their neighbors; a zone manager for high-level tracking of rooms to be covered and order of room coverage, wherein the room manager neighbor graph is used to determine a coverage order; and an analysis component room detector that reuses current room state from the room manager to conservatively update the rooms (e.g., when a map slightly changes or during a map build) and notify the zone manager if a room significantly changes (e.g., to reconsider for coverage).

In some embodiments, the robot immediately starts cleans after turning on. In some embodiments, the processor discovers more areas of the environment as the robot cleans and collects sensor data. Some areas, however, may remain as blind spots. These may be discovered at a later time point as the robot covers more discovered areas of the environment. In embodiments, the processor of the robot builds the complete map of the environment using sensor data while the robot concurrently cleans. By discovering areas of the environment as the robot cleans, the robot is able to being performing work immediately, as opposed to driving around the environment prior to beginning work. In some embodiments, the application of the communication device paired with the robot displays the map as it is being built by the processor of the robot. In some embodiments, the processor improves the map after a work session such that at a next work session the coverage plan of the robot is more efficient than the prior coverage plan executed. For instance, the processor of the robot may create areas in real time during a first work session. After the first work session, the processor may combine some of the areas discovered, to allow for an improved coverage plan of the environment.

In some embodiments, the processor of the robot identifies a room. In some embodiments, the processor identifies rooms in real time during a first work session. For instances, during the first work session the robot may enter a second room after mapping a first room and as soon as the robot enters the second room, the processor may know the second room is not the same room as the first room. The processor of the robot may then identify the first room if the robot so happens to enter the first room again during the first work session. After discovering each room, the processor of the robot can identify each room during the same work session or future work sessions. In some embodiments, the processor of the robot combines smaller areas into rooms after a first work session to improve coverage in a next work session. In some embodiments, the robot cleans each room before going to a next room.

In some embodiments, the processor of the robot detects rooms in real time. In some embodiments, the processor predicts a room within which the robot is in based on a comparison between real time data collected and map data. For example, the processor may detect a particular room upon identifying a particular feature known to be present within the particular room. In some embodiments, the processor of the robot uses room detection to perform work in one room at a time. In some embodiments, the processor determines a logical segmentation of rooms based on any of sensor data and user input received by the application designating rooms in the map. In some embodiments, rooms segmented by the processor or the user using the application are different shapes and sizes and are not limited to being a rectangular shape.

In some embodiments, the processor determines when to discover new areas and when to perform work within areas that have already been discovered. The right balance of discovering new areas and performing work within areas already discovered may vary depending on the application. In some embodiments, the processor uses deep reinforcement learning algorithms to learn the right balance between discovery and performing with in discovered areas.

In embodiments, the processor of the robot observes the robot within a first room and actuates the robot to begin covering the room based on sensor data, such as sensor scan information and point cloud information, used in building a small portion of a map within the first room. While the robot performs work, the processor executes an exploration algorithm. The exploration may be executed concurrently with coverage or the processor may switch a mode of the robot to solely exploration for further exploration into unknown areas without coverage. Upon observing an area that may be enclosed into a second room, the processor assigns a color to the second room and discovers the first area as the first room. As opposed to some prior art, the robot performs work using partial observability prior to the processor creating the map of the environment using real-time information collected up until that particular point in time. As the robot moves along a path during coverage, the processor of the robot creates a snail trail of where the robot has been and covered. FIG. 258 illustrates a path 27100 of a robot 27101 and a snail trail 27102 of the robot 27101. As the robot moves along its path, the processor of the robot determines and stores in memory areas with a high chance of object entanglement with the robot, areas with high obstacle density, floor types of areas, amounts of debris accumulation in areas, and plans a better path for future runs. The processor of the robot does not often have to replan several times before reaching an acceptable coverage. In most areas and environments, one reroute of the path and maintenance of the map suffices to provide a satisfactory coverage. Maintenance of map or reroute may be executed at an end of a session, a beginning of a new session, or when the robot is fully charged, momentarily wakes up and cleans up its map. A user can trigger a map clean up, a path reroute, or a room assignment manually using an application of a communication device paired with the robot. The user may enter information manually or may choose the robot automatically perform the task, such as rerunning a room assignment for a map. The processor of the robot may rerun the room assignment using different parameters for the room assignment algorithm. For instance, the processor may use a total area covered by the robot and a number of rooms to adjust room discovery. For example, given an entire area is estimated to be 700 square feet and initial room assignment discovered two rooms, upon rerunning room assignment using the application, the room assignment algorithm may be less conservative and define more of the separations as rooms. However, based on knowledge of room sizes, the room assignment algorithm is not likely to discover less rooms and identify the entire area as one room instead of the initial two rooms. A similar situation occurs when a small area is discovered to be a room. For example, given an area of 80 square feet is identified as a room, upon rerunning room assignment using the application, the room assignment algorithm may merge the area of 80 square feet with a larger adjacent area.

Training the room assignment algorithm in advance may be useful in determining what a good room division and a poor room division of an environment, assuming training examples can be provided. Training may be executed before real-environment use by a user or using examples of environment room divisions received from one or more users. To train the room assignment algorithm in advance, a set of floor plans are provided as input into the algorithm so that it may learn division of different environments into rooms. The room assignment algorithm then outputs division of each floor plan and a human classifies the output as a good room division or a poor room division, from which the algorithm learns what classifies as a good room division. In a more sophisticated algorithm, the human classifying may further split areas in the output and provide it back to the algorithm as input. For example. FIG. 259 illustrates an initial room assignment 27200 of rooms 27201 and 27202. The human classifying may split room 27201 into two rooms A and B and provide the information as input to the algorithm as an acceptable room separation for further learning of room assignment.

In some embodiments, the room assignment algorithm is trained using machine learning, which serves as ground truth data. The training may be based on input into the algorithm and human classification, where the input is gathered from sources other than the end user. This training is often executed prior to runtime or the robot being deployed to perform work. However, training the room assignment algorithm goes beyond training executed prior to deployment of the robot. While the robot performs work, data gathered by sensor of the robot provide more insight and training evolves as new data is used to further train the room assignment algorithm, which also evolves the ground truth for other robots or future runs of the same robot. The room assignment algorithm may also continue to learn from actions of users, such as when users choose to split or merge rooms or request rerunning the room assignment.

In some embodiments, the application of the communication device paired with the robot is used to adjust a room assignment. For instance, FIG. 260A illustrates an application of a communication device 27300 displaying an initial room assignment of a map 27301 including rooms 27302, 27303, and 27304. Using the application, a user can choose to rerun the room assignment for more rooms or for less rooms or can choose to adjust borders manually 27305. If more rooms are desired, the room assignment algorithm attempts to split more areas. If less rooms are desired, the algorithm focuses on areas that could be merged, such as two small adjacent rooms or two areas split based on a borderline gap. In some embodiments, the application is used to adjust borders, split rooms, and merge rooms manually. FIG. 260B illustrates using the application to A. adjust borders by sliding borders 27306 using a finger 27307 on the screen, B. split rooms by drawing a border 27308 using the finger 27307, and C. merge rooms by using the finger 27307 to choose rooms 27309 and 27310 to merge.

In some embodiments, morphological methods may be used to expand a seed circle, rectangle, or other shape from a location from which the robot begins to perform work until hitting an obstacle recognized by a point cloud created from LIDAR sensing. The seed shape dilates to cover a minimum area and continues to expand until the dilated shape is enclosed on all sides by perimeters or until reaching a predetermined size. For instance, FIG. 261 illustrates an initial seed rectangle 27400 starting from a location of a robot 27401 and progressively expanding to larger sized rectangles 27402 until the expanded rectangle 27403 is enclosed on all sides by perimeters 27404. When the seed area size reaches a predetermined area size, the seed area erodes to find a best match where there is some form of enclosure.

In some embodiments, the robot may execute various types of movement paths. FIG. 262 illustrates examples of different types of movement paths. In some embodiments, the robot may execute one type of movement path in a first area of an environment and a second type of movement path in a second area of the environment. FIG. 262 illustrates a first movement path type 27500 of the robot in an area 27501 of an environment 27502 and a second movement path type 27503 of the robot in an area 27504 of the environment 27502. In some embodiments, a user may use the application of the communication device to choose a location for the robot to cover within a map of the environment and in some cases, may select a movement path type for the robot to execute at the location. In some embodiments, the robot spot cleans the location. In some embodiments, the user may use the application to choose multiple locations within the map for spot cleaning and a number of times to coverage of each location selected. FIG. 263 illustrates a communication device 27600 executing an application and various user interfaces that may be used in selecting settings of the robot, such as on/off toggles 27601, sliders 27602, radio buttons 27603, check boxes 27604, and dial 27605. FIG. 264 illustrates an application 27700 of a communication device 27701 displaying a map 27702 and three locations 27703 selected for spot cleaning by a user. The user may use the application 27700 to select a circular or square fixed size spot 27704 to add to the map 27703 and a movement path type 27705 for the robot to execute at the locations 27703. The robot may cover each location 27703 one or more number of times, however, the user may use the application 27700 to customize a number of times the robot covers each of the locations 27703. In some embodiments, a default of three or another number of spot cleans may be selected at a time. In some embodiments, the user may choose a location for spot cleaning by touching a location within the map using the application. FIG. 265 illustrates a first selected location 27800 with a default of three spot clean coverages using boustrophedon movement path 27801. FIG. 265 also illustrates the user 27802 distributing the three spot clean coverages by creating a second location 27803 for cleaning by touching the first location 27800 and dragging their finger across the screen to the second location 27803. A third location may be similarly chosen, resulting in three spot cleaning locations, each with boustrophedon movement path coverage.

In some embodiments, the robot may encounter stains on the floor during a working session. In some embodiments, different stains (e.g., material composition of stain, size of stain, etc.) on the floor may require varying levels of cleaning intensity to remove the stain from, for example, a hardwood floor. In some embodiments, the robot may encounter debris on floors. In some embodiments, debris may be different for each encounter (e.g., type of debris, amount of debris, etc.). In some embodiments, these encounters may be divided into categories (e.g., by amount of debris accumulation encountered or by size of stain encountered or by type of debris or stain encountered). In some embodiments, each category may occur at different frequencies in different locations within the environment. For example, the robot may encounter a large amount of debris accumulation at a high frequency in a particular area of the environment. In some embodiments, the processor of the robot may record such frequencies for different areas of the environment during various work sessions and determine patterns related to stains and debris accumulation based on the different encounters. For example, the processor may identify particular areas as being likely to have hard to clean stains and may actuate the robot to perform a deep clean in such areas. In some embodiments, the processor may adjust cleaning strategies based on the derived patterns. In some embodiments, observations captured by sensors of the robot may be visualized by a user using an application of a communication device. For instance, a stain observed by sensors of the robot at a particular location may be displayed in a map of the environment at the particular location it was observed. In some embodiments, stains observed in previous work sessions are displayed in a lighter shade and stain observed during a current work session are displayed in a darker shade. This allows a user to visualize areas in which stains are often observed and currently observed. In some embodiments, the user may choose an actuation based on the visualization displayed to the user, such as observed locations of stains or high debris accumulation. Examples of actuations include increasing cleaning frequency, reducing the speed of the robot, decrease a distance between parallel lines in the robot path or increasing coverage overlap, adding extra coverage for an area, autonomous AI actuation, etc.

In some embodiments, a sensor of the robot comprises micro-machined collection of small components packaged into a standalone component configured to provide digital or analog output readings through $I^2C$ or SPI. The sensor component may be connected to a main MCU or CPU of the robot though GPIOs. FIG. 266 illustrates an example of multiple sensors connected to a MCU. In this example sensors are of a same type, however, sensors are likely to be a combination of different types and same types of sensors. I-C write access is used to write one or more data bytes. For example, a sequence may begin with a start condition generated by a master and be followed by a 7 bit slave address. The slave sends ACK=0 and releases the BUS, after which the master sends one register address. The slave ACKs again and waits for 8 bits of data that are written in the register with an address given by the master. $I^2C$ read sequence may comprise a one byte 12C write followed by the 12C read phase. The two parts of transmission are separated from one another. A watchdog timer may be used to prevent the $I^2C$ slave from locking the BUS. An idle time may be required as waiting time for consecutive read/write operations, as illustrated in FIG. 267. Sensors of the robot may provide various types of data. For example, an IMU may provide information relating to a tilt, a tap, double taps, a step count, a freefall, a wake up, a click, a pedometer, motion tracking, gesture detection, vibration information for compensation, and the like. A distance sensor may provide distance information of a point or an angular range (e.g., sensor FOV).

In some embodiments, the robot comprises an acoustic range finder. For instance, FIG. 268 illustrates an example of an acoustic range finder. Some embodiments employ audio localization, wherein the processor of the robot localizes the robot based on acoustic sensor data. In some embodiments, the processor analyzes acoustic sensor data and recognizes a user based on the acoustic sensor data. In some embodiments, only select users are authorized and can activate, use, and issue a command to the robot. In some embodiments, a memory of the robot includes a voice signature of one or more users. The processor of the robot analyzes acoustic sensor data and, based on the voice signatures of the one or more users, probabilistically identifies a particular user. The robot then executes orders based on a permission and access level associated with the identified user. FIG. 269 illustrates an example of a process of voice signature analysis, wherein upon a command given to a robot, a processor of the robot analyzes the voice signature and determines a probability of the voice signature matching and mismatching a voice signature of a user of the robot. The processor actuates the robot to obey the command or issue a message relaying that the command could not be fulfilled based on the probability indicating the voice signature is the user or is not the user, respectively. A similar process of identifying the user may be employed based on image analysis, such as facial recognition. FIG. 270 illustrates a similar process as described for voice signature identification, however, identification of the user is based on image signature analysis. FIG. 271 illustrates a similar process as described for voice signature identification, however, identification of the user is based on other biosensor signature analysis.

In some embodiments, the robot has more than one user. In some cases, the robot provides some level of service to a guest user, given the services are enabled by the user owning the robot. For example, the robot provides a Wi-Fi connection to a guest visiting a home of the owner, delivers water or heats water for tea, brews a coffee, etc. upon such request from a guest user. The robot may therefore form one or many relationships with human beings, each relationship possibly varying. A person may also be a guest user of many robots while also owning their own robot. In some cases, robots are connected in a fleet management system. In one example, FIG. 272 illustrates A. robot 28500 owned by user X perceiving user Y as a stranger, thereby having a low affinity level 28501. In a case B., wherein the user Y interacts with user X through robot 28500 via video call. As a result, some affinity 28502 exists between user X and user Y as they are no longer total strangers. This affinity may be configured to control access. In case C., user X preconfigures the robot 28500 to provide a degree of access to a stranger or another user depending on the strength of the affinity 28503. Affinities may be used for scheduling service of a service robot. For example, FIG. 273 illustrates a first house occupant 28600 pressing a go button on an application of a smartphone 28601 paired with a robot 28602 to trigger the robot 28602 to clean, while a second house occupant 28603 uses a physical button 28604 on the robot 28602 to provide a command. Based on location correlations or other clues, a smartphone 28605 of the second occupant 28603 suggests downloading the application. Given configurations and settings allow, the application downloaded on the smartphone 28605 of the second occupant 28603 automatically pairs with the robot 28602 and automatically inherits the settings from the application used by the first occupant 28600. The application downloaded on the smartphone 28605 of the second occupant 28603 automatically suggests a schedule that includes cleaning patterns associated with the first occupant 28600 and the second occupant 28603, despite the second occupant 28603 only recently downloading the application. In the above example, affinity is transferred from a human-robot relation to another human-robot relation, wherein the humans are different but the robot is the same. FIG. 274 illustrates A. affinity 28700 transferred from a first human 28701 and robot 28702 relationship to B. a second human 28703 and robot 28702 relationship. Similarly, the transfer of affinity is possible for robot-robot relationships, human-human relationship, and group of humans-group of robots relationships.

In some embodiments, loyalty index transfers along with affinity. For example, a food service robot working in a restaurant is commanded by staff to deliver an order of a customer to table 8. Soon after the robot begins delivering the order, the customer changes to table 9. Though the customer is not a staff commander of the robot, the robot responds to the customer command to deliver the order to table 9 given the affinity created based on the customer purchasing food from the restaurant. The table of the customer is updated for all future matters and the previous table 8 is noted as available for other customers. A strength of affinity may be dynamic and change (i.e., decrease or increase) over time or accumulate. Affinity may be a normalized number between zero and one. In some cases, there is a decay gamma associated with each strengthening element. In one example, two users, each with a certain degree of affinity, request conflicting services. User 1 commands the robot wait outside for a pizza order and user 2 commands the robot play music inside. A number of settings may act as a tiebreaker to decide which command to execute. For instance, the settings may incorporate strength of affinity of each user or loyalty index.

In some embodiments, a voice command is provided directly to the robot through a directional microphone of the robot, using an application of a smartphone paired with the robot, or using a home assistant (e.g., Siri, Alexa, Google Home, etc.). FIG. 275 illustrates examples of voice signature schematics. In some embodiments, a voice is transcribed to text then translated or transformed into visual language. In some embodiments, affinity is used to perform localization based on intangible clues. FIG. 276 illustrates voice capture signatures 28900 of various persons 28901 captured or provided to a robot 28902. A processor of the robot applies a filter and separation to determine to which person of persons 28901 each voice capture signature 28900 belongs. Separation may be based on time sequence (i.e., a same user cannot be saying two mixed sentences concurrently); extraction of words and ordering of words into meanings; lip reading, facial expression, proximity of persons, etc.; voice signatures, either from known users or unknown samples, wherein some frequencies resonate and others don't; noise reducing methods to clear background noise; and relative localization, wherein a directional microphone on the robot is used to identify where each person is in relation to the robot. FIG. 277 illustrates A. a directional microphone 29000 capturing audio data 29001 of persons 29002; B. a sound level 29003 in each direction; and C. an estimated distance 29004 to a source of each audio data 29001. In some embodiments, the processor of the robot understands location from context. For example, from a voice command of 'help John', a processor of a robot understands a person is within a vicinity of the robot and is perhaps on a contact list or in a social network of the robot. The processor quickly identifies John from a group of people that may each potentially be John. The identification may be probabilistic in nature. Settings may be configurable and thresholds for various tasks may be set.

In some embodiments, the robot comprises an optical arrangement. A portion of radiation from an illuminator passes through an optical component and a polarizer placed at a distance from the illuminator. A reflector or partial reflector may be arranged at a transmission path at an angle, fixed or rotating. A curvature on an optical element may converge or diverge radiation, depending on whether the curvature is a negative or positive angle and the optical element is transparent or reflective. Transparent material may comprise triacetyl cellulose (TAC) or Polymethyl methacrylate (PMMA). In some embodiments, the shaped optical element comprises a curved lens with a curvature radius, a film, a built-in wire mesh, an interleaving illuminator with a camera or interleaving light receiver cells with light emitter cells. FIG. 278 illustrates an optical arrangement of the robot comprising LED illuminators 29100 and CMOS sensor 29101 from a side view and top view.

In some embodiments, an application of a communication device paired with the robot may display the map of the environment as it is being built and updated. In some embodiments, while the robot creates a map of the environment, a method and interface is developed such that the user may interact with the map. This interaction takes place over the cloud, wherein the robot presents the map to the user through an interface (e.g., web, application, or smart phone), and the user defines the boundaries and pushes that data back to the robot. In some embodiments, conflicting situations may be resolved. For example, when a robot is manually placed inside an off-limit area, the robot requires a course of action that is defined based on the specific application of the navigation system. In some embodiments, the robot remains in place and does not move because any work in the area causes a massive inconvenience. In some embodiments, the robot is allowed to violate the no-entry rule while searching for a way out or moving out of the area if a path exists. In some embodiments, a path out may be the closest path. In some embodiments, safe paths may be defined by the user. In some embodiments, a safe path out of the no-entry zone may have a pre-setting. In some embodiments, the pre-settings provide a set of choices for the user to select from. In some embodiments, the pre-settings are over-ridden or de-prioritized by the user defined settings. A robot algorithm synthetizes a map from a temporal point swarm created from LIDAR sensor input. Similarly, the robot algorithm may synthetize a map from temporal image data from a camera. When boundaries are created on a user interface or the application, the boundaries merge with the map and a path plan that avoids the areas marked as off-limits is devised. An off-limit area may be a zone, such as a rectangle or another geometrically shaped zone or a line that the robot cannot cross or pass.

In some embodiments, various map customizations may be implemented using a communication device (e.g., mobile phone, tablet, laptop, etc.). An area to avoid may be defined or an area to cover may be defined. An area to cover may also be determined using other methods, such as a human driving the robot to create an enclosure, thee inside of which is to be covered. In some embodiments, the device is used to create virtual boundaries within the map of the environment displayed by the application. On a mobile phone, a boundary may be created by using a finger to draw the virtual boundary into the map. The application of the communication device may be wirelessly paired with the robot such that any updates to the map by the robot or made using the application are wirelessly transmitted to the application or the robot, respectively. During operation, the processor of the robot tracks its position within the map and avoids crossing any virtual boundaries created within the map.

To avoid issues in robot implementation of settings chosen on the application, the settings need to go through a cloud and reach the robot. For example, a keep-out setting may be set on the application but not replicated to or implemented by the robot. As such the user thinks the robot will stay out of some areas but in reality, the robot had never received that instruction as the application and/or robot was not synched with the cloud. Implementation of a comprehensive set of rules and acknowledgement ensures the settings set on the application are replicated to the robot before the robot starts the next run. The set of rules are integrated in the robot, the application, and the cloud. A synching mechanism may protect the circumstances where the robot was offline and the application received configurations. An algorithm may deterministically ensure the settings are observed by the robot. The implementation included adding a function to check if the current position of the robot is inside one of the fenced-out areas; adding a function to interrupt coverage, direct-drive, wall-follow, and docking when the robot wanders into a fenced-out areas; handling driving out of bounds during coverage by driving along the outline of the infringed map fence until either a sensor event occurs or the robot reaches an adjacent subtask; and adding a function to determine a path around the outline.

The application may also be used to define a path of the robot and zones and label areas. In some cases, the processor of the robot may adjust the path defined by the user based on observations of the environment or the use may adjust the path defined by the processor. In some cases, the application displays the camera view of the robot. This may be useful for patrolling and searching for an item. In some embodiments, the user may use the application to manually control the robot (e.g., manually driving the robot or instructing the robot to navigate to a particular location). In some embodiments, a historical report of prior work sessions may be accessed by a user using the application of the communication device. In some embodiments, the historical report may include a total number of operation hours per work session or historically, total number of charging hours per charging session or historically, total coverage per work session or historically, a surface coverage map per work session, issues encountered (e.g., stuck, entanglement, etc.) per work session or historically, location of issues encountered (e.g., displayed in a map) per work session or historically, collisions encountered per work session or historically, software or structural issues recorded historically, and components replaced historically.

In some embodiments, the user may use the user interface of the application to instruct the robot to begin performing work (immediately. In some embodiments, the application displays a battery level or charging status of the robot. In some embodiments, the amount of time left until full charge or a charge required to complete the remaining of a work session may be displayed to the user using the application. In some embodiments, the amount of work by the robot a remaining battery level can provide may be displayed. In some embodiments, the amount of time remaining to finish a task may be displayed. In some embodiments, the user interface of the application may be used to drive the robot.

In some embodiments, the user may use the user interface of the application to instruct the robot to perform a task in all areas of the map. In some embodiments, the user may use the user interface of the application to instruct the robot to perform a task in particular areas within the map, either immediately or at a particular day and time. In some embodiments, the user may choose a schedule of the robot, including a time, a day, a frequency (e.g., daily, weekly, bi-weekly, monthly, or other customization), and areas within which to perform a task. In some embodiments, the user may choose the type of task. In some embodiments, the user may use the user interface of the application to choose preferences, such as detailed or quiet disinfecting, light or deep disinfecting, and the number of passes. The preferences may be set for different areas or may be chosen for a particular work session during scheduling. In some embodiments, the user may use the user interface of the application to instruct the robot to return to a charging station for recharging if the battery level is low during a work session, then to continue the task. In some embodiments, the user may view history reports using the application, including total time of working and total area covered (per work session or historically), total charging time per session or historically, number of bin empties (if applicable), and total number of work sessions. In some embodiments, the user may use the application to view areas covered in the map during a work session. In some embodiments, the user may use the user interface of the application to add information such as floor type, debris (or bacteria) accumulation, room name, etc. to the map. In some embodiments, the user may use the application to view a current, previous, or planned path of the robot. In some embodiments, the user may use the user interface of the application to create zones by adding dividers to the map that divide the map into two or more zones. In some embodiments, the application may be used to display a status of the robot (e.g., idle, performing task, charging, etc.). In some embodiments, a central control interface may collect data of all robots in a fleet and may display a status of each robot in the fleet. In some embodiments, the user may use the application to change a status of the robot to do not disturb, wherein the robot is prevented from working or enacting other actions that may disturb the user.

In some embodiments, the application may display the map of the environment and allow zooming-in or zooming-out of the map. In some embodiments, a user may add flags to the map using the user interface of the application that may instruct the robot to perform a particular action. For example, a flag may be inserted into the map and the flag may indicate storage of a particular medicine. When the flag is dropped a list of robot actions may be displayed to the user, from which they may choose. Actions may include stay away, go there, go there to collect an item. In some embodiments, the flag may inform the robot of characteristics of an area, such as a size of an area. In some embodiments, flags may be labelled with a name. For example, a first flag may be labelled front of hospital bed and a characteristic, such size of the area, may be added to the flag. This may allow granular control of the robot. For example, the robot may be instructed to clean the area front of the hospital bed through verbal instruction or may be scheduled to clean in front of the hospital bed every morning using the application.

In embodiments, a user may add virtual walls, do not enter zones or boxes, do not mop zones, do not vacuum zones, etc. to the map using the application. In embodiments, the user may define virtual places and objects within the map using the application. For example, the user may know the its cat has a favorite place to sleep. The user may virtually create the sleeping place of the cat within the map for convenience. In some embodiments, a user may manually determine the amount of overlap in coverage by the robot. For instance, when the robot executes a boustrophedon movement path, the robot travels back and forth across a room along parallel lines. Based on the amount of overlap desired, the distance between parallel lines is adjusted, wherein the distance between parallel lines decreases as the amount of desired overlap increases. In some embodiments, the processor determines an amount of overlap in coverage using machine learning techniques. For example, the processor may increase an amount of overlap in areas with increase debris accumulation, both historically and in a current work sessions. In some embodiments, the processor may determine the amount of overlap in coverage based on a type of cleaning of the robot, such as vacuuming, mopping, UV, mowing, etc. In some embodiments, the processor or a user may determine a speed of cleaning based on a type of cleaning of the robot.

In some embodiments, the application of a communication device may display a map of the environment. In some embodiments, different floor types are displayed in different colors, textures, patterns, etc. For example, the application may display areas of the map with carpet as a carpet-appearing texture and areas of the map with wood flooring with a wood pattern. In some embodiments, the processor determines the floor type of different areas based on sensor data such as data from laser sensor or electrical current drawn by a wheel or brush motor. For example, the light reflected back from a laser sensor emitted towards a carpet is more distributed than the light reflected back when emitted towards hardwood flooring. Or, in the case of electrical current drawn by a wheel or brush motor, electrical current drawn to maintain a same motor speed is increased on carpet due to increased resistance from friction between the wheel or brush and the carpet. In some embodiments, a user may provide an input to the application to designate floor type in different areas of the map displayed by the application. In some embodiments, the user may drop a pin in the displayed map. In some embodiments, the user may use the application to determine a meaning of the dropped pin (e.g., extra cleaning here, drive here, clean here, etc.). In some embodiments, the robot provides extra cleaning in areas in which the user dropped a pin. In some embodiments, the user may drop a virtual barrier in the displayed map. In some embodiments, the robot does not cross the virtual barrier and thereby keeps out of areas as desired by the user. In some embodiments, the user may use voice command or the application of the communication device to instruct the robot to leave a room. In some embodiments, the user may physically tap the robot to instruct the robot to leave a room or move out of the way.

In some embodiments, an application of a communication device paired with the robot may be used to execute an over the air firmware update (or software or other type of update).

In some embodiments, more than one robot and device (e.g., medical car robot, robot cleaner, service robot with voice and video capability, and other devices such as smart appliances, TV, building controls such as lighting, temperature, etc., tablet, computer, and home assistants) may be connected to the application and the user may use the application to choose settings for each robot and device. In some embodiments, the user may use the application to display all connected robots and other devices. For example, the application may display all robots and smart devices in a map of a home or in a logical representation such as a list with icons and names for each robot and smart device. In some embodiments, the user may choose that one robot perform a task after another robot completes a task. In some embodiments, the user may choose schedules of both robots using the application. In some embodiments, the schedule of both robots may overlap (e.g., same time and day). In some embodiments, a home assistant may be connected to the application. In some embodiments, the user may provide commands to the robot via a home assistant by verbally providing commands to the home assistant which may then be transmitted to the robot. Examples of commands include commanding the robot to disinfect a particular area or to navigate to a particular area or to turn on and start disinfecting. In some embodiments, the application may connect with other smart devices (e.g., smart appliances such as smart fridge or smart TV) within the environment and the user may communicate with the robot via the smart devices. In some embodiments, the application may connect with public robots or devices. For example, the application may connect with a public vending machine in a hospital and the user may use the application to purchase a food item and instruct the vending machine or a robot to deliver the food item to a particular location within the hospital.

In some embodiments, different objects within an environment may be associated with a location within a floor plan of the environment. For example, a user may want the robot to navigate to a particular location within their house, such as a location of a TV. To do so, the processor requires the TV to be associated with a location within the floor plan. In some embodiments, the processor may be provided with one or more images comprising the TV using an application of a communication device paired with the robot. A user may label the TV within the image such that the processor may identify a location of the TV based on the image data. For example, the user may use their mobile phone to manually capture a video or images of the entire house or the mobile phone may be placed on the robot and the robot may navigate around the entire house while images or video are captured. The processor may obtain the images and extract a floor plan of the house. The user may draw a circle around each object in the video and label the object, such as TV, hallway, living room sofa, Bob's room, etc. Based on the labels provided, the processor may associate the objects with respective locations within the 2D floor plan. In some embodiments, the floor plan may be a bird's eye view of the environment. Then, if the robot is verbally instructed to navigate to the living room sofa to start a video call, the processor may actuate the robot to navigate to the floor plan coordinate associated with the living room sofa.

In one embodiment, a user may label a location of the TV within a map using the application. For instance, the user may use their finger on a touch screen of the communication device to identify a location of an object by creating a point, placing a marker, or drawing a shape (e.g., circle, square, irregular, etc.) and adjusting its shape and size to identify the location of the object in the floor plan. In embodiments, the user may use the touch screen to move and adjust the size and shape of the location of the object. A text box may pop up after identifying the location of the object and the user may label the object that is to be associated with the identified location. In some embodiments, the user may choose from a set of predefined object types in a drop-down list, for example, such that the user does not need to type a label. We can select from a list. In other embodiments, locations of objects are identified using other methods. In some embodiments, a neural network may be trained to recognize different types of objects within an environment. In some embodiments, a neural network may be provided with training data and may learn how to recognize the TV based on features of TVs. In some embodiments, a camera of the robot (the camera used for SLAM or another camera) captures images or video while the robot navigates around the environment. Using object recognition, the processor may identify the TV within the images captured and may associate a location within the floor map with the TV. However, in the context of localization, the process does not need to recognize the object type. It suffices that the location of the TV is known to localize the robot. This significantly reduces computation. There are certain ways to do this.

In some embodiments, an application of a communication device paired with the robot controls the robot using one or more of: switches or toggles for transitioning between two or more states; sliders for choosing setting between a minimum and a maximum; multiple choice radio buttons or checkboxes to choose between one or more options; and text for providing commands to the robot. In some embodiments, the application is also used to select a theme and a color. In some embodiments, the application, the robot, or another computational device generates a message indicating that human intervention is necessary to continue operation of the robot. In some embodiments, the message is sent through a network or cloud using a Wi-Fi or cellular module from the robot to the application of the communication device of a user responsible for maintaining the robot. In some embodiments, the message comprises a map of a workplace and a last known location of the robot with the map. In some embodiments, connectivity between the robot and the application is diagnosed to determine where a disconnect in the connection is. In some embodiments, a blocked status of the robot is cleared upon the robot (or a user or other device) clearing a problem of the robot. In some embodiments, the message is escalated when the robot is not assisted within a predetermined period of time from when a problem is detected. In some embodiments, escalation comprises any of: notification, involving additional users, repeating messages at higher-than-normal frequency, adding audio alerts, adding more attention-grabbing language.

In some embodiments, a graphical user interface (GUI) of an application (e.g., a native application or web application) of a communication device is used to modify, add, and/or delete information to the map of the environment. Examples of a communication device include, but are not limited to, a smartphone, computer, tablet, laptop, dedicated remote control, or any device that may communicate with and display data from the robotic cleaning device and receive inputs from a user. In some embodiments, input into the application of the communication device specifies or modifies environmental characteristics of different locations within the map of the environment. For example, floor type of locations, locations likely to have high and low levels of debris accumulation, locations likely to have a specific type or size of debris, locations with large obstacles, etc. are specified or modified using the application of the communication device. In other embodiments, input into the application of the communication device modifies, adds, and/or deletes perimeters, doorways, subareas, etc. of the map and/or cleaning path. Input into the application also chooses or modifies functions and settings of the robotic cleaning device such as cleaning mode (e.g. vacuuming, UV treatment, sweeping, mopping, etc.), cleaning schedule (e.g., day and time of cleaning, subarea to be cleaned, frequency of cleaning, etc.), order of coverage of subareas of the environment, impeller speed, main brush speed, wheel speed, peripheral brush speed, etc.

Figure 283A:
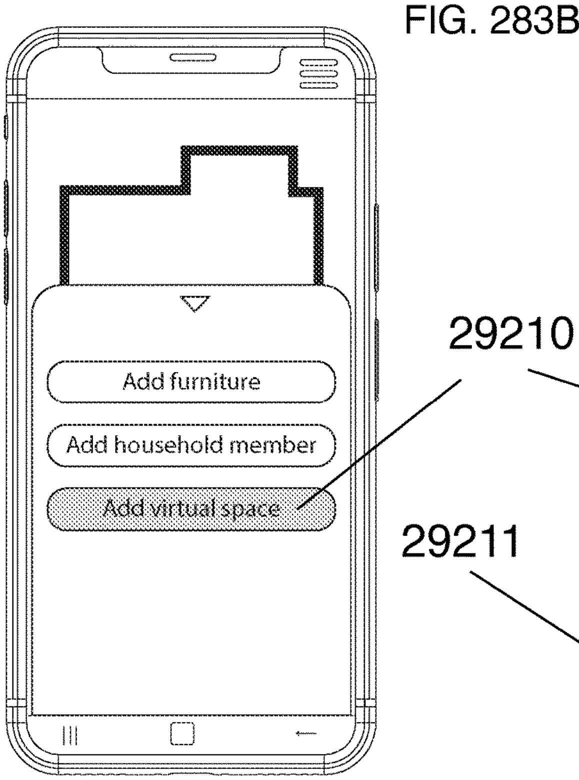
Figure 283B:
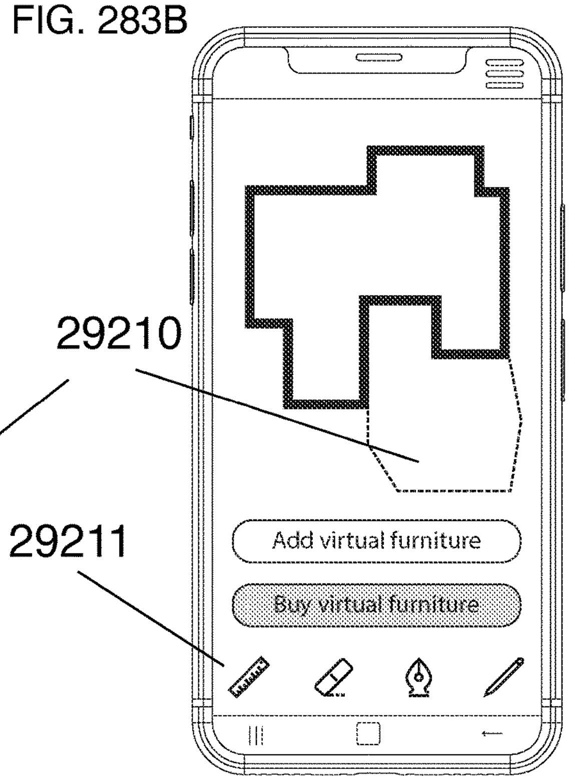
Figure 283C:
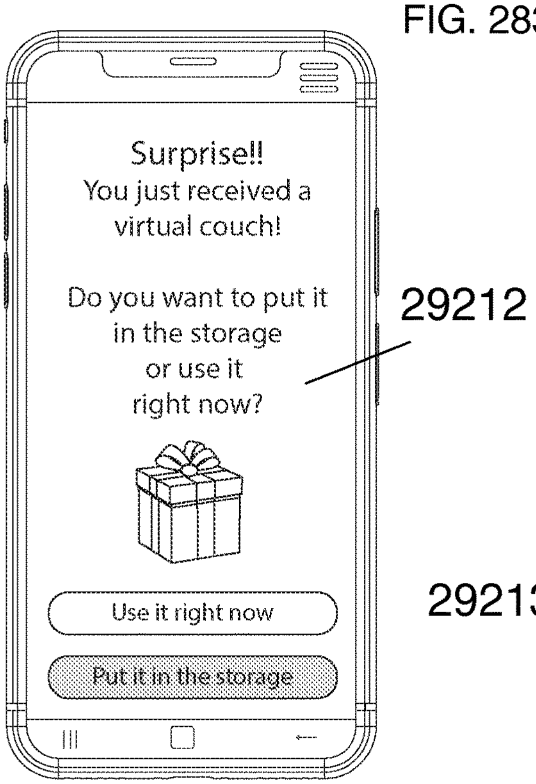
Figure 283D:
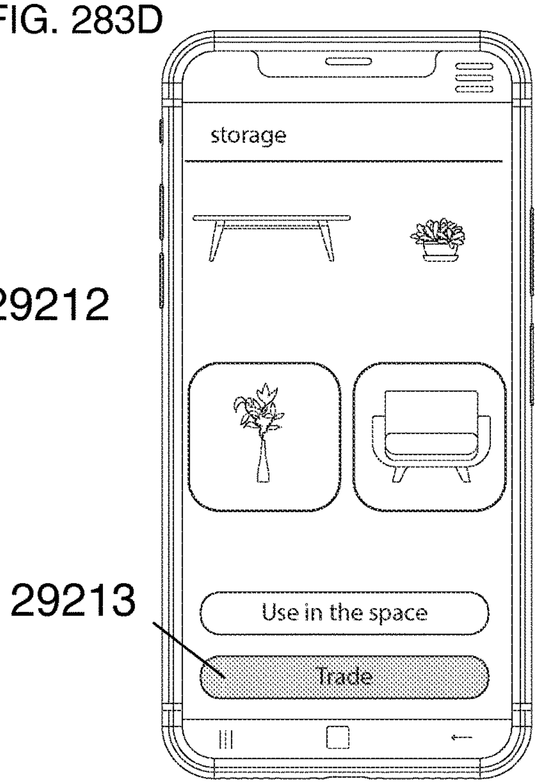
Figure 284A:
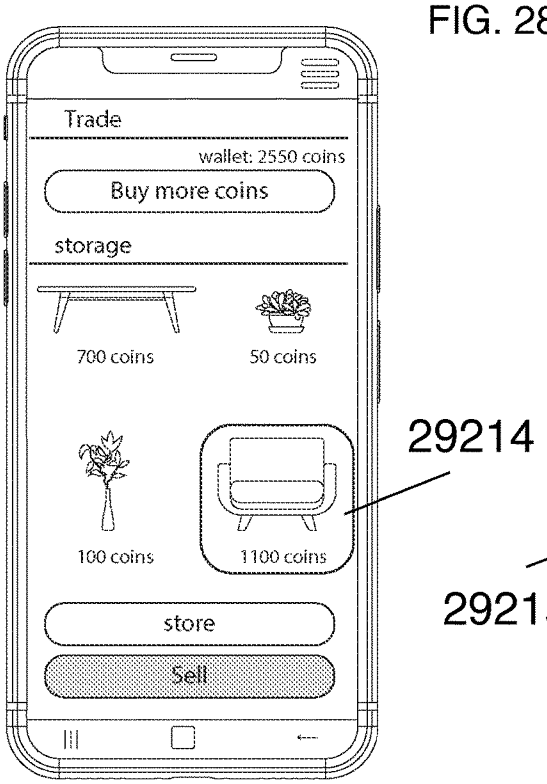
Figure 284B:
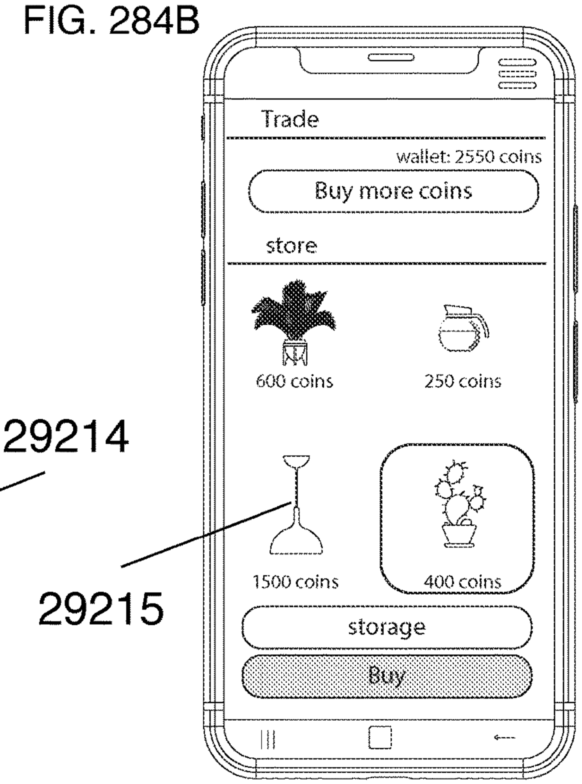
Figure 284C:
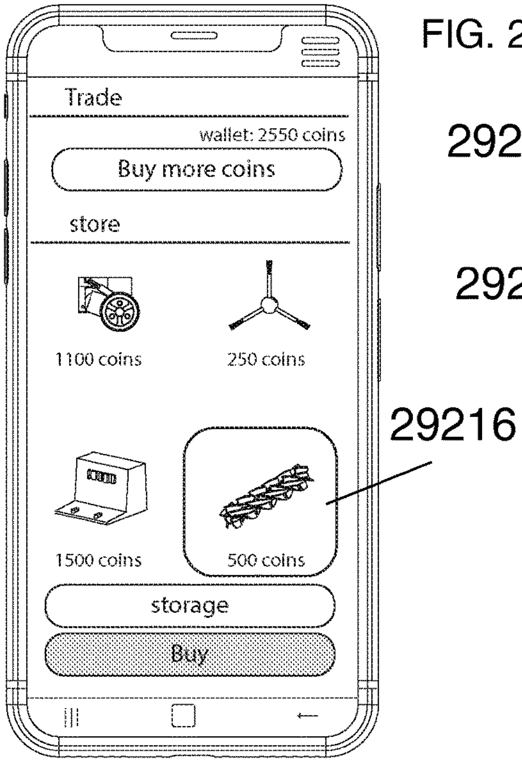
Figure 284D:
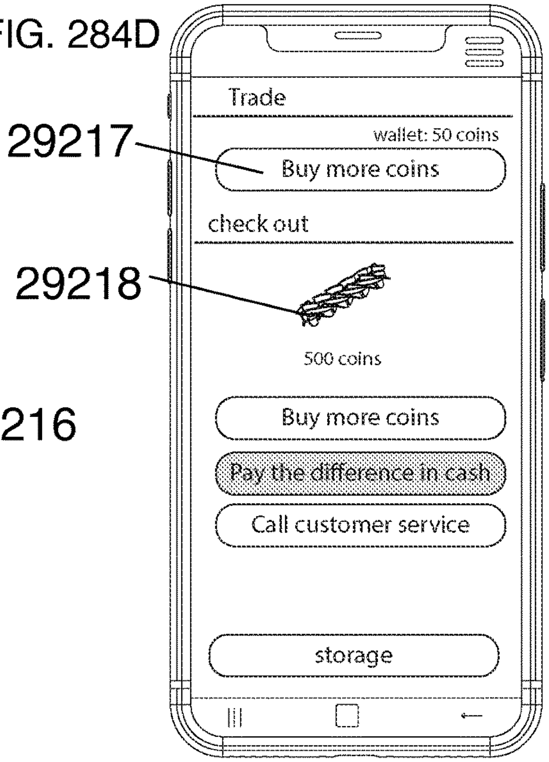
Figure 284E:
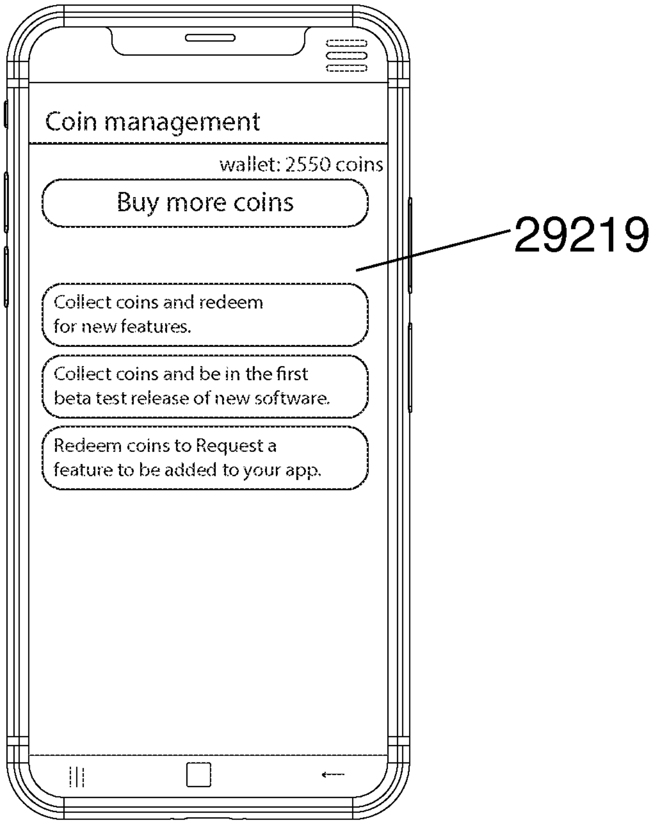

In some embodiments, a user sets a timer for the robot to begin working using an application of a communication device. FIG. 279 illustrates an application 29200 displaying a timer counting down to a time when the robot is to perform work. In some embodiments, the user uses the application to select areas of a map that are not representative of the environment. FIG. 280 illustrates a slicer tool 29201 of the application 29200 to cut areas 29202 from a map 29203 of an environment as they are not representative of the true environment. FIG. 281 illustrates a user 29204 using a selection tool 29205 to cut areas 29202 from the map 29203 of the environment as they are not representative of the true environment. In some embodiments, the user adds information to the map using the application. FIGS. 282A and 282B illustrate the user 29204 swiping upwards 29206 to add furniture, a household member, or a virtual space 29207. FIG. 282C illustrates information 29208 that is added for a household member, including a picture of the member, a name, a voice sample, and a room of the member. FIG. 282D illustrates settings and instructions 29209 that may be selected or set for a particular member. Selecting settings returns the user to the page displayed in FIG. 282C. FIG. 283A illustrates selecting addition of virtual space using the application 29200. FIG. 283B illustrates a virtual space 29210 added using a tool 29211 of the application 29200. The user 29204 can use the application 29200 to add virtual furniture or buy virtual furniture. FIG. 283C illustrates a message 29212 displayed by the application 29200 upon a company or service provider providing a free piece of virtual furniture to a user. The user 29204 can use the application 29200 to use the virtual furniture immediately or place in storage. FIG. 283D illustrates storage of the virtual furniture, which may be added to a map or traded for other virtual furniture or real robot accessories 29213. While the robot cannot enter a virtual space physically, the robot can enter virtually. In some embodiments, a task is scheduled for a virtual area, wherein the task is simulated using the application or VR equipment. Some embodiments include application purchases of virtual and physical products using application currency. FIG. 284A illustrates the application 29200 displaying a trading page, wherein the user 29204 uses the application 29200 to sell items 29214 from their storage for application currency (i.e., coins). FIGS. 284B and 284C illustrate the application 29200 displaying virtual items 29215 and real physical robot accessories 29216 the user may purchase using their application currency. The user may purchase more coins 29217 using real currency. In some cases, the user pays for an item using coins and real currency, as in FIG. 284D, wherein the user check outs and has the option to purchase more coins or pay the difference for the product 29218 in real currency or call customer service (e.g., to negotiate or waive the difference in cost). FIG. 284E illustrates the application 29200 displaying other features 29219 the user 29204 may redeem coins for. FIG. 285 illustrates an example of a process for creating a virtual object, wherein a user can select to create a virtual surface 29800, add a number of legs 29801, and a shape 29802 of the legs. Some embodiments employ surface recognition for placement of virtual object. In some embodiments, surfaces are discovered or recognized by a stationary or mobile device or robot, smart watch, smart phone, HMD, glasses, VR headset or other user interfaces. FIG. 286 illustrates an example of recognizing surfaces 29900 of a virtual environment 29901 by a mobile device or using a smart watch, an interface of an application of a smart phone, virtual glasses, or a VR headset. A user may choose to add a virtual teddy bear 29902 to the virtual environment 29901 and pay for other selectable options 29903.

Some embodiments create a 2D or 3D floor plan from the map that is viewable using an application of a communication device paired with the robot. In some embodiments, the application displays any of a path of the robot, obstacles, a location of the robot, a border of a room, and rooms in different colors such that they are distinguishable. For example, FIG. 287A illustrates a room 30000 displayed in a solid dark color, the robot 30001 displayed in white, and a path 30002 of the robot displayed in a shade of color lighter than the shade of color of the room 30000. FIG. 287B illustrates a room 30000 displayed in solid color and a border 30001 of the room 30000 and obstacle 30002 within the room 30000 displayed in a darker shade of color than the color of the room 30000. In some embodiments, the application generates an illustration of an object or animal having a similar shape to the map displayed by the application. FIG. 288 illustrates a map 30100 displayed by an application of a communication device and a lion 30101 generated and displayed by the application as its shape is similar to that of the map 30100. In some embodiments, the lion 30101 acts as a screen saver for the application.

In embodiments, the robot may be instructed to navigate to a particular location, such as a location of the TV, so long as the location is associated with a corresponding location in the map. In some embodiments, a user may capture an image of the TV and may label the TV as such using the application paired with the robot. In doing so, the processor of the robot is not required to recognize the TV itself to navigate to the TV as the processor can rely on the location in the map associated with the location of the TV. This significantly reduces computation. In some embodiments, a user may use an application paired with the robot to tour the environment while recording a video and/or capturing images. In some embodiments, the application may extract a map from the video and/or images. In some embodiments, the user may use the application to select objects in the video and/or images and label the objects (e.g., TV, hallway, kitchen table, dining table, Ali's bedroom, sofa, etc.). The location of the labelled objects may then be associated with a location in the two-dimensional map such that the robot may navigate to a labelled object without having to recognize the object. For example, a user may command the robot to navigate to the sofa so the user can begin a video call. The robot may navigate to the location in the two-dimensional map associated with the label sofa.

In some embodiments, the robot navigates around the environment and the processor generates map using sensor data collected by sensors of the robot. In some embodiments, the user may view the map using the application and may select or add objects in the map and label them such that particular labelled objects are associated with a particular location in the map. In some embodiments, the user may place a finger on a point of interest, such as the object, or draw an enclosure around a point of interest and may adjust the location, size, and/or shape of the highlighted location. A text box may pop up and the user may provide a label for the highlighted object. Or in another implementation, a label may be selected from a list of possible labels. Other methods for labelling objects in the map may be used.

In some embodiments, items of interest, such as items a user intends to purchase, are placed within the floor plan or map using the application. In some embodiments, a schematic map or a map reconstructed from images is used to display a realistic view of an environment of a user, such as their home, for the purpose of, for example, observing anomalies. In some embodiments, a user uses the application to control a device, such as a TV, from within the displayed map. For example, a user may select the TV by tapping a displayed TV icon within the map on a screen of the communication device. Upon selecting the TC, a control panel of the TV or an application control screen for the TV is displayed by the application. In some embodiments, an application of a device is embedded within the application of the communication device paired with the robot such that a single application is used to operate the robot and the device. In some embodiments, the application transmits the virtual reality of the home of the user to another device, such as a communication device of another user, such that another user can experience the virtual reality of the home.

In embodiments, the application of the communication device displays the map in 2D or 3D. In some embodiments, a location of the robot and a location of a charging station of the robot are shown within the map. In some embodiments, a location of the communication device is shown within the map, which in many cases coincides with a location of the user by whom the communication device is owned. This helps the user locate themselves within the map and in relation to the robot. FIG. 289 illustrates an application 30200 of a communication device 30201 displaying a location 30202 of the communication device 30201 and a robot 30203 within a 3D map 30204 and a 2D map 30205 of the environment. In some embodiments, given appropriate consent is obtained, a location of other devices, such as communication devices of other persons within a household, are shown within the map. In some embodiments, the robot is equipped with a GPS module which is useful for placing the map in the context of a larger geographical location, such a location of the map in relation to a city. In some embodiments, the map, the robot, and the communication devices are displayed by the application in a same view using their global location data. In some embodiments, the processor of the robot uses wireless signal strength, access points, and Bluetooth signals to locate the communication device in relation to the robot, upon which the application highlights the location of the communication device within the map. In some embodiments, the communication device includes a camera or depth sensor. In some embodiments, a processor of the communication device executing the application determines a location of the communication device based on an image captured by the camera or spatial data captured by the depth sensor using relocalization methods for the robot described herein. Various combinations of localization and relocalization methods described herein may be used to locate and display the location of the communication device within the generated map.

In some embodiments, the processor of the robot or an external processor digitally recreates the environment of the robot and the application of communication device (e.g., mobile device, desktop, laptop, smart TV, smart watch, etc.) paired with the robot displays the digital environment to the user in 2D, 3D, VR, AR, or mixed reality format. The 3D digital representation of the environment may be shown to the user in different levels of detail. For example, if the accuracy is unimportant, a camera of the robot may capture a panoramic image of the surroundings of the robot and the processor may transmit the image to the application for viewing by the user. Depending on a method used in capturing the panoramic image, the image may be projected back onto inner surfaces of a cube, a cylinder, or a sphere. FIG. 290 illustrates a location of a robot 29000 at a time step $t_1$ within surroundings 29001, from which panoramic image 29002 is captured by a camera of the robot 29000. An application paired with the robot displays the panoramic image 29002 projected onto an inner surface of sphere 29003 positioned at the location of the robot 29000 at the time the image 29002 was captured. In some embodiments, a virtual camera is positioned within a volume onto which an image is projected, giving the user an illusion of 3D space when viewed used the application. The user may use the application to view the surroundings from any direction, select different points within the surroundings to obtain more information, and guide the robot to drive to a particular point or face a particular direction. FIG. 291 illustrates a virtual camera view 29100 of the robot. When the virtual camera is positioned in a center of a sphere the viewer observes the surroundings as if the viewer were standing in place of the robot at the time the image is captured. The viewer may use the application to turn the viewing direction, however, as soon as the virtual camera translates the illusion of being in 3D space is broken. To compensate for this issue, the robot may capture images in different time or space intervals. The robot may capture and send these panoramic images from several points within the environment along with its own position data for each picture. In 3D space, the position data for each panoramic image is highlighted as a hotspot. When the user selects any of these hotspots, the virtual camera moves to that hotspot and the volume with the panoramic image of that spot projected onto the volume is presented to the user using the application. This method adds the illusion of movement to the experience. While the user still can't navigate within the virtual environment freely, they can see the environment from different selected locations. FIG. 292 illustrates a location of robot 29200 within environment 29201 at three different time points and corresponding panoramic images 29202, 29203, and 29204, respectively. The images 29202, 29203, and 29204 are displayed by the application for viewing by the user. FIG. 293 illustrates panoramic images projected onto an inner surface of sphere 29300 positioned at a location of the robot at different times the panoramic images were captured. FIG. 294 illustrates an environment 29400 and hotspots 29401 displayed by the application. A user may select any of the hotspots 29401 to relocate a virtual camera, the hotspots 29401 corresponding with previous locations of the robot at the time images for the respective hotspots were captured.

A next step includes using the 3D information in the experience. While raw 3D data (point cloud for example) is useful for robot navigation, it is usually too noisy for presenting it to the user, and further the points in the point cloud are scattered and need to be converted to a mesh surface before presentation. Even the generated mesh may lack certain details from areas that are not captured by the robot. One solution for representation here is to place the 3D generated model in the background in 3D space but not showing or rendering it in the viewport. In each hotspot location the panoramic image is shown, and the hidden 3D model is used to distinguish some 3D elements. For example, FIG. 295 illustrates the user using a 3D cursor to determine different directions of surfaces in the projected panoramic image view by the user. The 3D cursor aligns itself with different surfaces as the user moves in the viewport. This direction information is generated using the hidden 3D model.

The next step includes presenting the actual 3D generated model to the user, which is more accurate but needs more processing, optimization, and clean up. In this method, instead of projecting the panoramic images onto a simple volume, they are projected on the actual 3D model of the environment. The number of images, their distance, and the complexity of the generated 3D model are some of the elements contributing to the quality of the final model and the amount of processing needed to generate such a model. In all the different levels of presentation, the 3D view may be accompanied by a 2D map to show the location of the viewer within the map. This location may be similar to the robot's location or may be different. FIG. 296 illustrates a 2D map 29600 including hotspots 29601 that may be selected from a top-down view for a virtual camera view from the respective hotspot. A virtual camera 29602 is shown at the selected hotspot as well as the direction of view 29603. The projected image onto volume surfaces may look distorted from the outside but when the camera is placed at the exact location of the robot the images appear correctly. FIG. 297 illustrates a spherical panoramic image 29700 that is projected onto a surface of sphere 29701. However, when a virtual camera is centered within the sphere 29701, an undistorted image 29702 corresponding to a FOV of the virtual camera is displayed. This applied for the panoramic image 29700 projected onto a surface of the cube 29703, wherein 29704 illustrates the deconstructed cubical projection, each square corresponding to one side of the cube. While the images appear distorted from the outside for both projections 29701 and 29703, the images appear undistorted when the virtual camera with correct FOV is positioned at the center of either volume, Since the robot after several run sessions can generate a 3D HD map, the process of generating panoramic images can be done at any point in the map using the 3D data meaning the robot does not have to be physically present in the environment to capture the image. FIG. 298 illustrates 3D data 29800 of the environment from which the panoramic images projected onto 3D sphere 29801 are generated. Additionally, the panoramic image does not have to be a single image. It can be a combination of several images taken from different angles. FIG. 299 illustrates multiple images 29900 captured from different angles used in generating a panoramic image projected onto 3D cube 29901. Images may need to be deformed (e.g., stretched) before projection.

Using this 3D representation, the user may control the robot remotely in the real environment in real-time. The user may use the robot to perform different tasks in a remote facility by seeing what sensors of the robot observe and controlling manipulative components of the robot (such as arm, claw, connectors, plugs, etc.). For example, the user may remotely control the robot to fix the equipment in a remote facility that is hard to reach or dangerous for human beings. Remote robot control may also be helpful in facilities such as factories, power plants, oil rigs, etc. Using this remote method of robot operation, few trained professionals may assess the issues and address them in facilities around the world without actually traveling to those locations, reducing the cost of operation noticeably. Another example included remote robot shopping. For example, a store has several robots dedicated for remote shopping. A robot is assigned to an online customer when they start shopping. Using this method, the customer sees what products are in the store and examines and chooses the products desired accordingly. This is more intuitive in comparison to seeing images of products. FIG. 300 illustrates both depth data and image data used in generating a dynamic depth of field, wherein produce 30000 may be examined up close (as if in the store) and chosen by the user. FIG. 301 illustrates a robot 30100 with such dynamic depth of field generated using data captured by sensors 30101. The robot 30100 observes the produce 30102 and transmits a livestream 30103 displayed by an application 30104 of a smartphone 30105. The application 30104 displays the items 30105 currently viewed and their price. A user uses the application 30104 to select items to purchase and the robot obtains the items for pickup by the user or delivery to the user.

Another example includes using the robot for remote surgery on a patient. There may be several reasons for the remote surgery, such as logistics (e.g., the surgeon and the patient can't be in the same physical environment due to surgeon shortage, scheduling conflicts, high cost (time and monetary) of long distance travel, etc. or they shouldn't be in the same physical environment for safety reasons like high risk of bacterial or viral infection, use of radiation, etc.); scale of operation (e.g., the operation area is too small for direct operation). In the case of a small operation area, the movements of the robot are scaled down versions of the operator movements, wherein the operator sees the scaled version of what the robot sees. Using the robot, the size opened area on the patient body is smaller compared to when traditional methods are used as the robot arm and tools are smaller and more flexible. A smaller opening in the body of the patient may allow the patient to recover faster after surgery. Depending on the needed accuracy, the operator may use different types of interfaces to control the robot remotely. The operator may use a specific joystick or keyboard controller designed to move different robot arms with several buttons by engaging, disengaging, gripping, and releasing tissues, switching tools, and such. FIG. 302 illustrates a person 30200 undergoing laparoscopic surgery using a robot 30201 controlled remotely by a user 30202. Arms 30203 of the robot 30201 are used to operate on the user 30200 using tools 30204. The tools 30204 include a camera and depth sensor 30205 such that the user 30202 may continuously view the incision site and control the robot 30201 accordingly. Another method includes using a dummy tool as the main instrument. The dummy tool can transmit its position and orientation to the robot such that the robot aligns and positions its own arm (and the real tool) accordingly. This may help the operator perform their job more intuitively. The dummy tool may be equipped with haptic sensors and triggers to transmit the pressure applied to the tool of the robot and trigger the hand of the operator when the robot tool touches different surfaces. FIG. 303 illustrates an example of a dummy tool 30300 held by a user 30301. One major difference for this method of remote operation compared to current methods of telesurgery (or other remote operating methods) is the inclusion of depth data in the data stream. Since the robot can capture and transmit the depth data in combination with image data, the operator has a better understanding of the situation in the remote area. The depth data may be presented as a separate image stream showing the order of layers and far to near objects in a grayscale format or in different hues. Alternatively, the depth data may be used to enhance the image stream itself by applying digital depth of field to the image. For example, a location of the tip of the current surgery tool is defined as the focus point and the area surrounding it may become defocused as the depth shifts from that point. Or in more sophisticated embodiments, the display system may be equipped with an eye tracker (e.g., implemented on the monitor, or the on VR, AR, XR headsets) and the area that the operator is observing is defined as the focus point. FIG. 304 illustrates using both depth data and image data to generate a dynamic depth field 30400, with the area of interest 30401 in focus. Another example of remote medical procedure is described in 63/412,486, hereby incorporated by reference.

In different embodiments, the environment is represented in various forms. FIG. 305 illustrates various representations of the environment, including temporal representation of the environment, wherein images 30500 are captured at time steps as the robot 30501 moves along a path 30502; a stitched representation of the environment wherein data 30503 of the environment is stitched together at overlapping points 30504; and a 3D mesh of the environment 30505 reconstructed from images 30506. Other representations of the environment may include temporal on grid representation; an immersive representation viewed from within VR or viewed on a flat screen or a web page; a 2D top view representation; a representation synthesized from point cloud and textured with semantic features; a representation texturized from images; and 2D top view representation with floors and walls textured.

In some embodiments, a 3D model of the environment is generated using methods described in U.S. Non-Provisional patent application Ser. No. 17/670,277, 17/344,892, and 17/494,251, hereby incorporated by reference. In embodiments, the map may be displayed by the application in various styles. The style may be chosen by the application automatically or the application may display a selection of styles for the user to choose from. FIG. 306 illustrates some examples of different map styles displayed by the application including (A) a watercolor style, (B) a blueprint style, (C) a CAD drawing style, (D) a sketch style, and (E) a glowing sci-fi style. In another example, the map may be displayed using thin lines to outline perimeters and each room may be colored with a different shade of a same color or with different colors. In some cases, the map may be displayed in a similar manner as an architectural technical drawing (or similar to a CAD drawing) with hatching, fenestration, and architectural element placement. In one example, the map may be displayed to appear as a hand drawn sketch with line thickness variation, cross hatching and some artificially introduced chaos. Paper texture may be added in the background. The map may also be displayed as a watercolor rendition using line strokes with wet edges, chaotic paint effect, splatter (i.e., paint and alcohol) effects, etc. In another example, the map may be displayed as a crayon or colored pencil drawing. In one case, the map may be displayed to appear as a blueprint by using white colors on a dark blue grid background. In one example, the map may be displayed to appear as a hologram with glowing edges or in a halftone style.

To generate such map styles, the application uses different elements from a vector or raster map and modifies them to achieve the desired look. The application combines the elements with each other using different blending modes. The number and type of modifications and blending modes may vary for each style. FIG. 307 illustrates an example of a process of parametric modifications used to achieve a watercolor style effect over a generated map. To achieve a watercolor style effect, the application may (1) obtains an image of the map; (2) distort the image based on a secondary displacement texture, wherein displacement texture is a grayscale texture and comprises values between 0 to 255 (black to white) and the application shifts the pixels of the image of the map in x or y or both directions based on the values of each pixel in the displacement texture; (3) blur the displaced image and divide the pixel values of the displaced image with the blurred image, the results providing a watercolor style to the edges of the map; (4) depending on the desired look of the style, apply a RGB curve adjustment function to the map to bring the edges out even more; (5) separately mix a cloud noise pattern (i.e., a type of fractal noise pattern) with a paper texture and normalize the result; (6) add the displaced image of the map from step (2) with the result of step (5) to achieve a painted look effect for the entire image of the map; (7) multiply the watercolor edges from step (4) with the result of step (6) to bring the watercolor edges back, the result providing a final output of the desired watercolor style. FIG. 308 illustrates an example of a process of parametric modifications used to achieve a sketch style effect over a generated map.

In addition to the parametric styles discussed above, the application may be trained to generate neural styles. For example, the application may be trained to obtain a picture or an art style (e.g., pointillism, impressionism, expressionism, cubism, etc.) and present the map in the style. Or the application may be trained to generate a new map with a similar layout but in another architectural style. For example, the application may generate new maps in a baroque or medieval style (i.e., thicker walls, columns, different window and door styles, etc.). FIG. 309 illustrates an example of the application generating a new floorplan 11700 based on input of an originally generated floorplan 11701 and a selection of baroque architectural style from a list of possible styles 11702. The application is trained to generate new maps based on the characteristics of the selected style. FIG. 310 illustrates the newly generated floorplan 11700 being used to generate a new 3D model of the floorplan 11800 in the selected baroque style. The new 3D model 11800 may be superimposed over an existing environment 11801 in AR, VR or XR. The application may be trained to also generate new artwork based on an input map and a selected picture or style. FIG. 311 illustrates an example of the application using an input map 11900 and a GAN based algorithm to generate different abstract arts 11901 based on a secondary image or style 11902. The application may be used to cycle through different possible effects and/or preview the map based on the effect and choose the desired effect for presentation of the map. FIG. 312 illustrates an example of the application user interface 12000 including effect and style icons 12001 that a user may cycle through by swiping their finger 12002 along the screen of the smart phone 12003. The application displays the map 12004 in the selected style.

Figure 314:
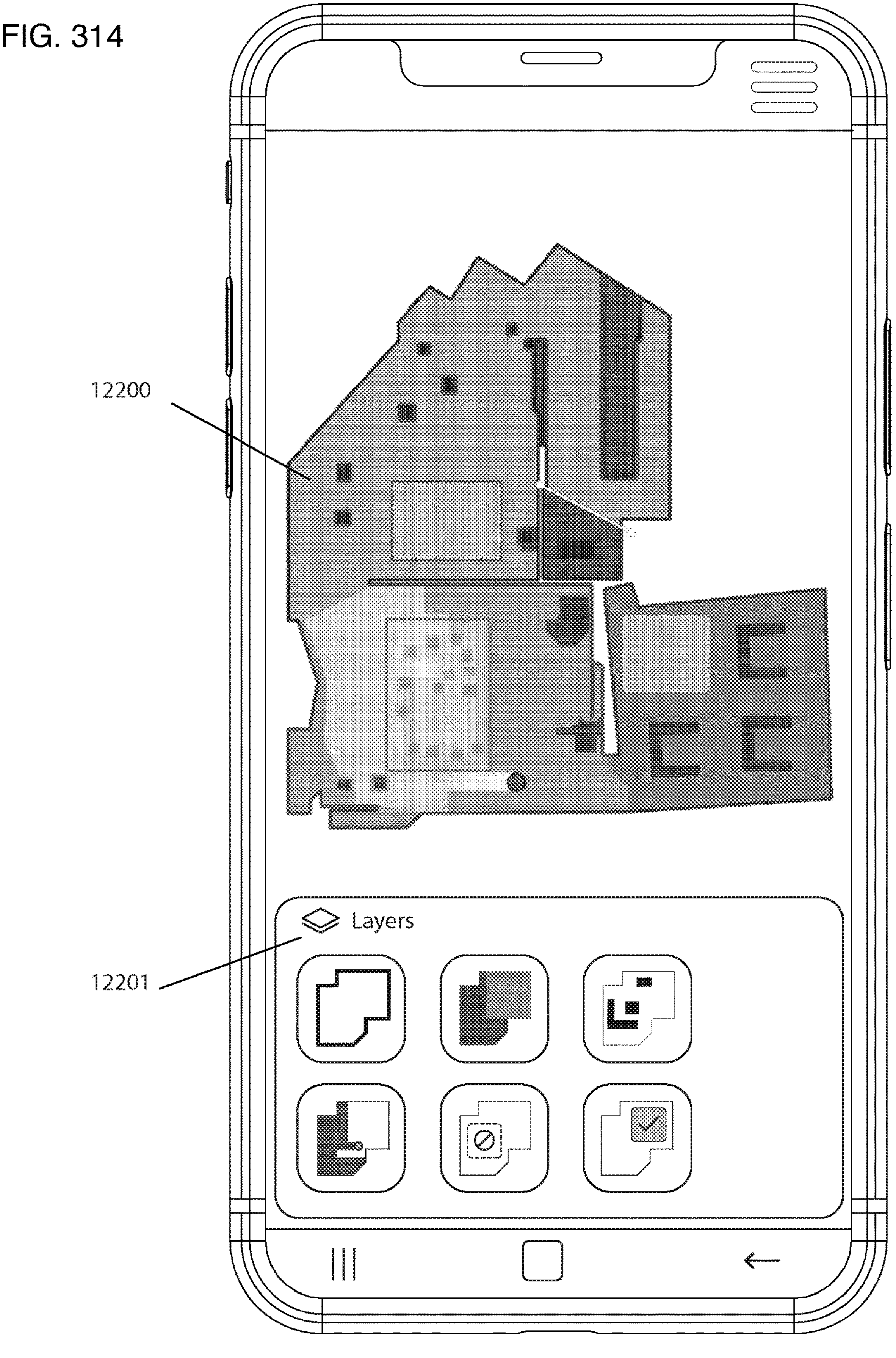
Figure 315:
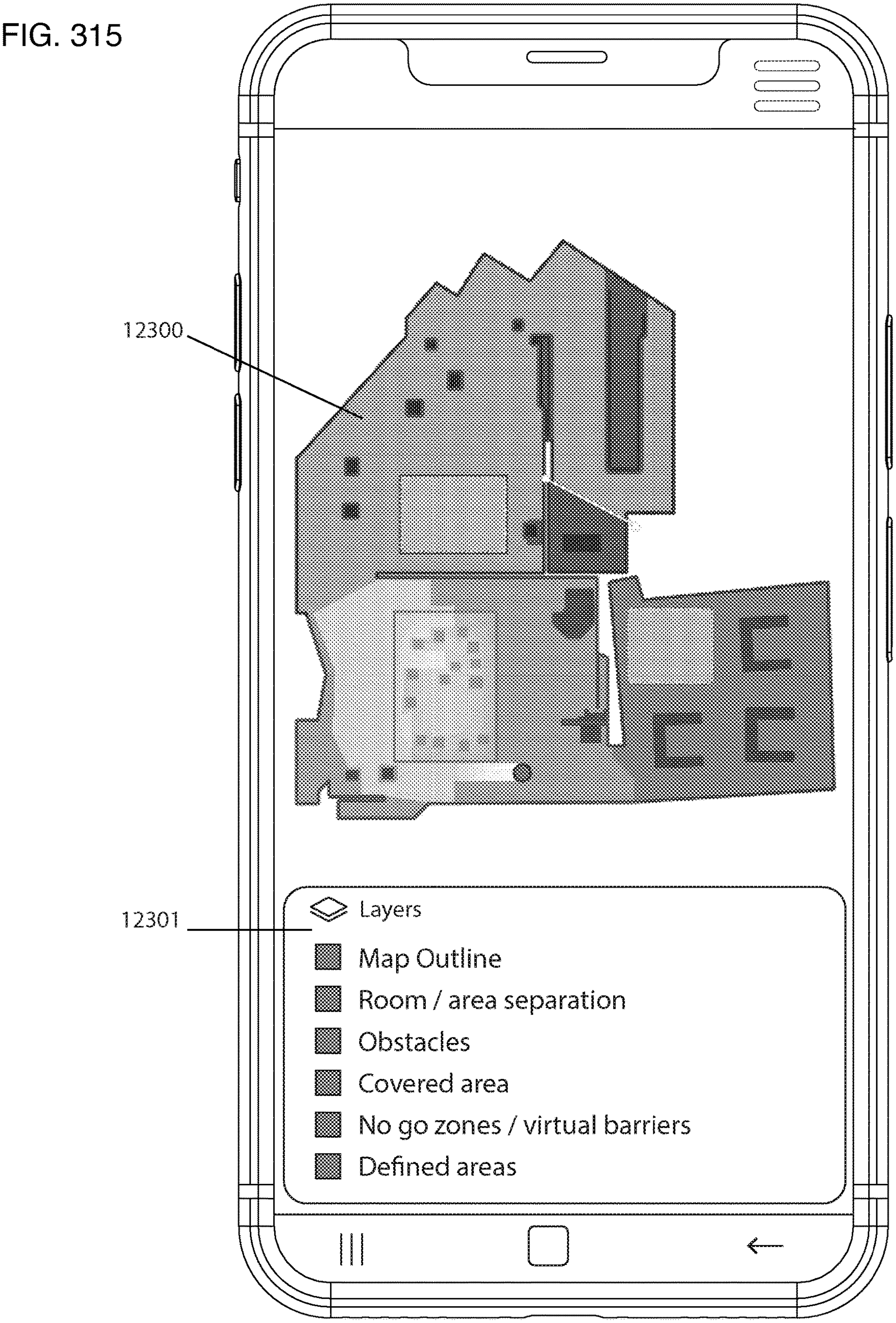
Figure 316:
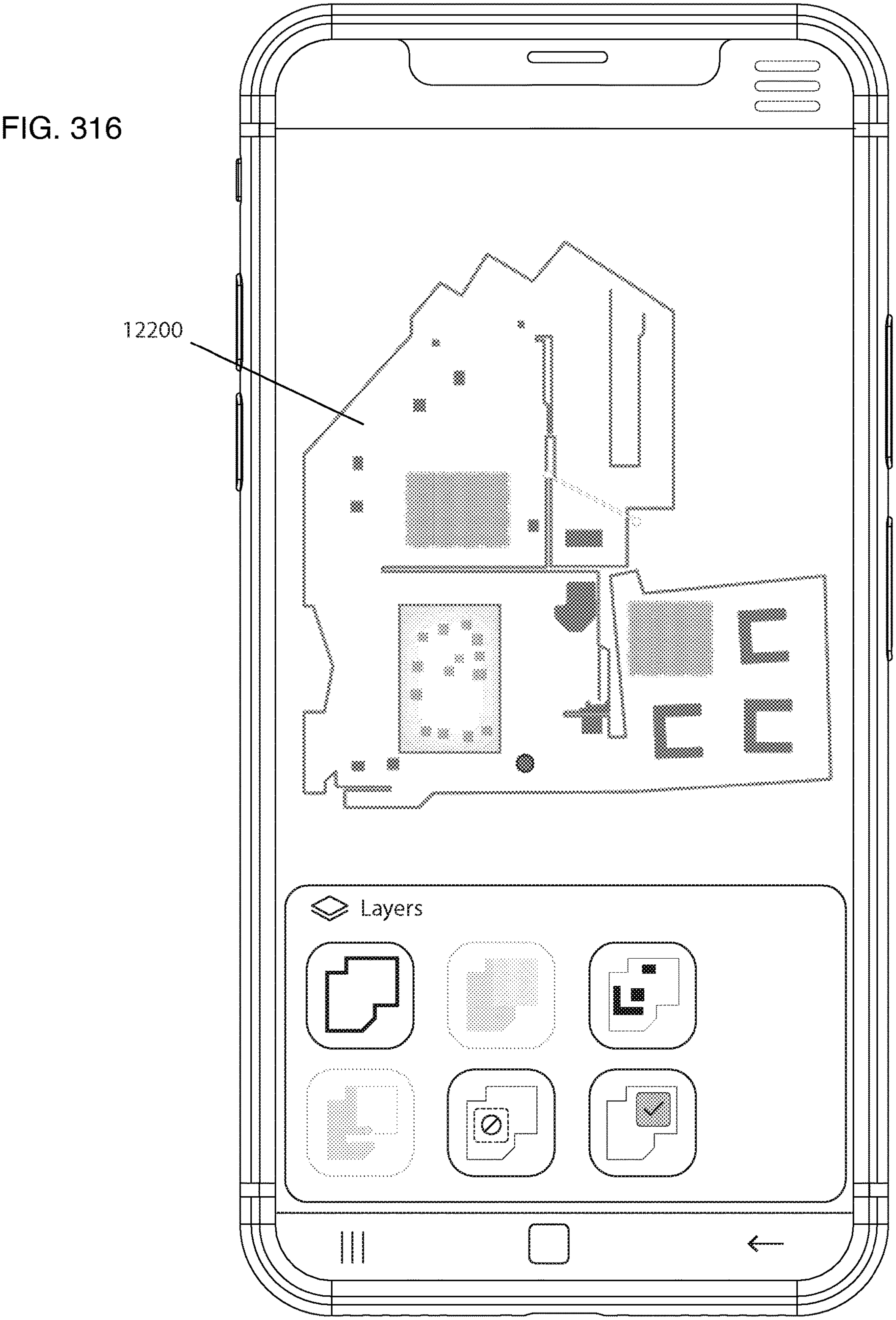
Figure 317:
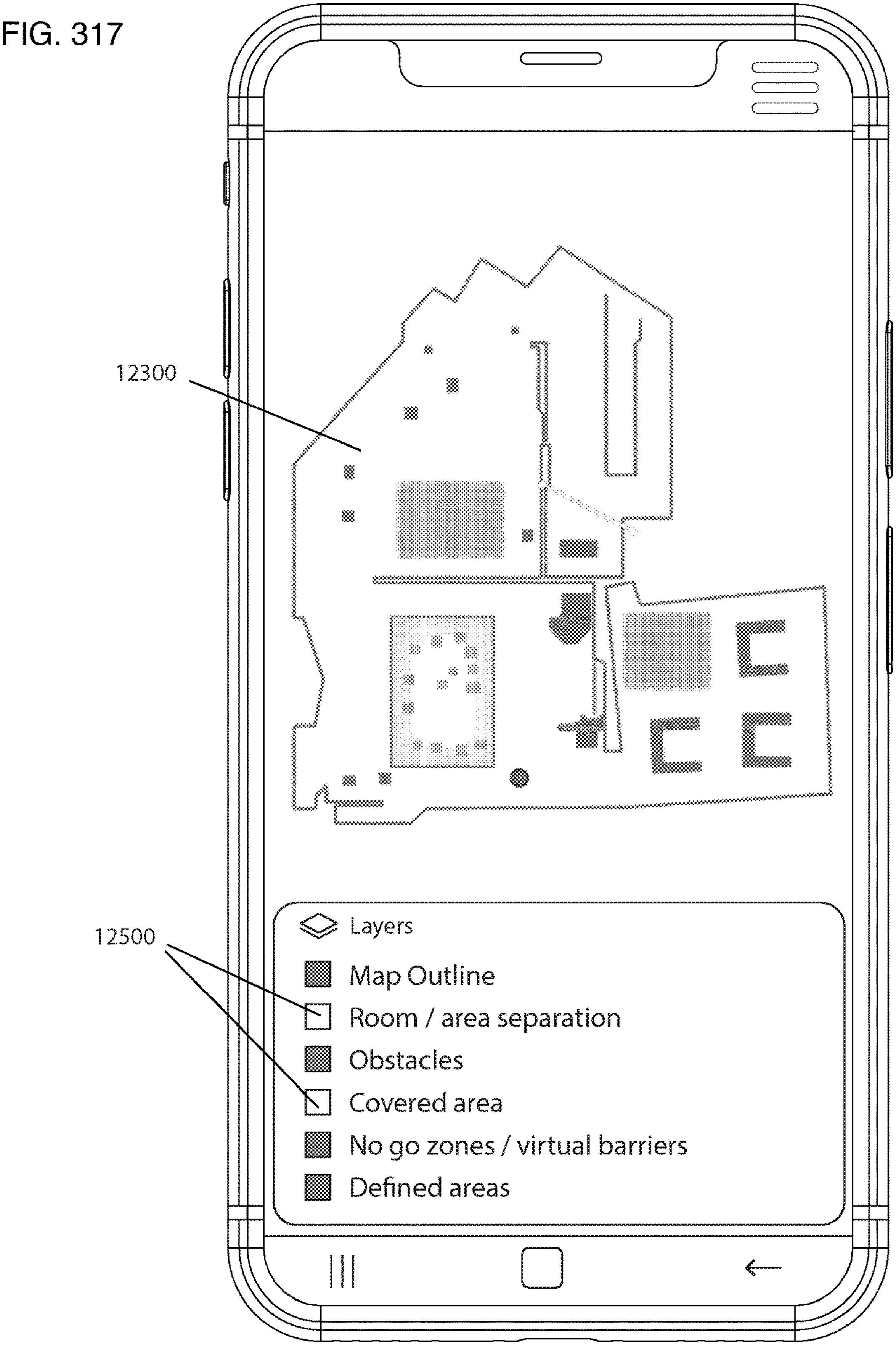

The map displayed by the application may include several layers. Each layer may include different types of information and the application may be used to turn each layer on or off. Some examples of layers include a base layer comprising architectural elements; a static obstacle layer comprising permanent obstacles that are not part of the architecture; a dynamic obstacle layer comprising obstacles the robot may have encountered during previous runs that are no longer observed to be present in the area in which they were encountered; a coverage layer comprising areas covered by the robot; a room separation layer comprising all rooms, each displayed in a different color or pattern and the name of each room and other room-related information displayed; a barrier layer comprising no-go zones and virtual barriers defined by the user using the application; a defined space layer comprising areas within which the robot is to perform certain tasks defined by the user using the application (e.g., areas a robot cleaner is to mop and/or vacuum or robustly clean). In some cases, there may be several layers, each layer defining areas for different tasks. Other layers include a current location layer that highlights the robot in its current location. Other related items such as the charging station may be placed in this layer or in a separate layer. Depending on the function of the robot, additional layers with specific information may be added onto the map. For example, a survey robot may have elevation data of a covered field, the information of which may be displayed in a separate layer. Or the survey robot may have captured several pictures during its run from different spots, the spots being highlighted in a hot spot layer on the map. The application may provide a link to images associated with the spot from which they were captured upon the user touching the spot displayed on the screen. In another example, a robot tasked with covering an area may add a layer that visualizes a difficulty of coverage of different areas onto the map based on previous data of an amount of coverage time spent by the robot in different areas of the map. In embodiments, layers may be live layers, wherein they depend on sensor data currently obtained and may therefore change in real-time. Layers may also include interactive properties. For example, the user may use the application to modify virtual walls and no-go zones in a barrier layer or select a point in a hot spot layer to cause the application to display the image captured from the selected point. FIG. 313 illustrates examples of different layers including (A) a base layer comprising an outline of a map, (B) a room/area separation layer; (C) an obstacle layer, (D) a covered area layer, (E) a no-go zone/virtual barrier layer, (F) a defined area layer, (G) a combination of layers (A) to (F). FIG. 314 illustrates an example of the application user interface displaying the map 12200 with a combination of layers (A) to (F). Each layer is identified with an icon 12202 that may be used to toggle each layer on or off. FIG. 315 illustrates another example of the application user interface displaying the map 12300 with a combination of layers (A) to (F). Each layer is identified by a layer label 12301. The application may be used to toggle each layer on or off. FIG. 316 illustrates the same user interface as FIG. 314, however in this case, some layers, namely unselected room separation and covered area layers, are toggled off, as shown in the displayed map 12200. Unselected layer icons appear in lighter color, grey or monochrome, while selected layer icons appear darker with more contrast and/or in full color. FIG. 317 illustrates the same user interface as FIG. 315, however in this case, some layers, namely unselected room separation and covered area layers, are toggled off as indicated by the unfilled boxes 12500 and as shown in the displayed map 12300. The application may save the map and its additional layers used in different runs and display them upon request. The application may also display a comparison between two or more runs, wherein the map information related to each run are displayed by the application. In some embodiments, the application compares runs internally based on parameters such as speed of coverage, covered areas, number of difficulties during the run, efficiency, etc. and provide and display a score for each run for comparison purposes. FIG. 318 illustrates an example of the application user interface displaying information related to two runs of the robot, each using a same map 12600 but on different dates.

In some embodiments, the application is trained to compare the map with subjects from different topics and display the comparison as a fun fact. For example, the application may display "Fun fact: the outline of this floorplan appears to be similar to that of a cat" and an image of the cat that has a similar silhouette to the map. In some embodiments, the application generates images based on an outline of the map. For example, using the application the user may provide a subject or a topic and the application generates a new image related to the topic but in a shape of the map. In some embodiments, the application builds a 3D model of a user home but in a different style, such as the styles described above. The 3D model may be superimposed in AR, VR, or XR such that the user may explore their home in a different style. This is similar to what is shown in FIG. 310.

In some embodiments, the application is trained to determine a score for each map generated based on circulation, connectivity, layout, etc. FIG. 319 illustrates an example of the application user interface displaying a determined map connectivity and map circulation score of the displayed map 12700. In some embodiments, the application is trained to suggest different layouts for each room. In some cases, the application assists in designing different layouts for special use case scenarios such as commercial facilities (e.g., supermarkets, mall, and stores), industrial facilities (e.g., factories and warehouses), or residential buildings (e.g., house).

Figure 320:
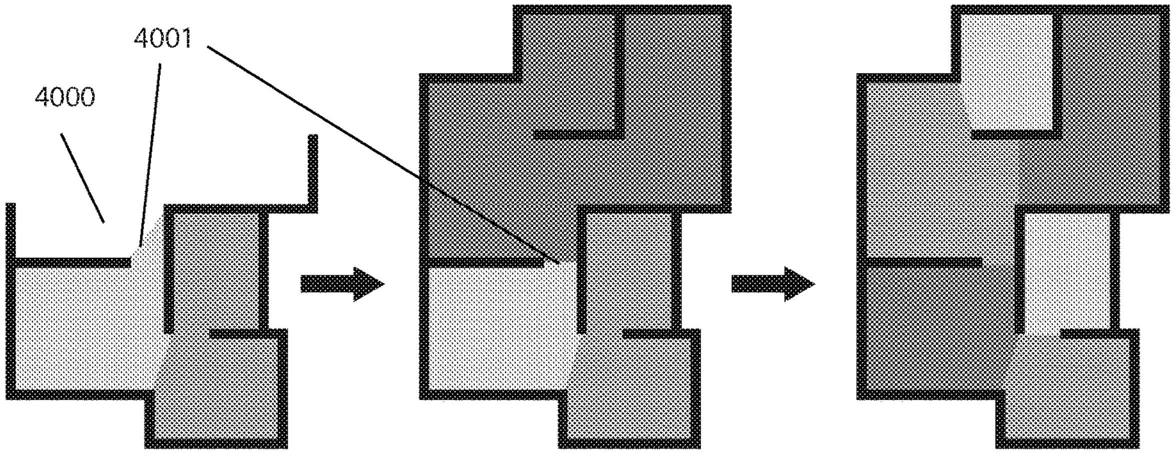
Figure 321:
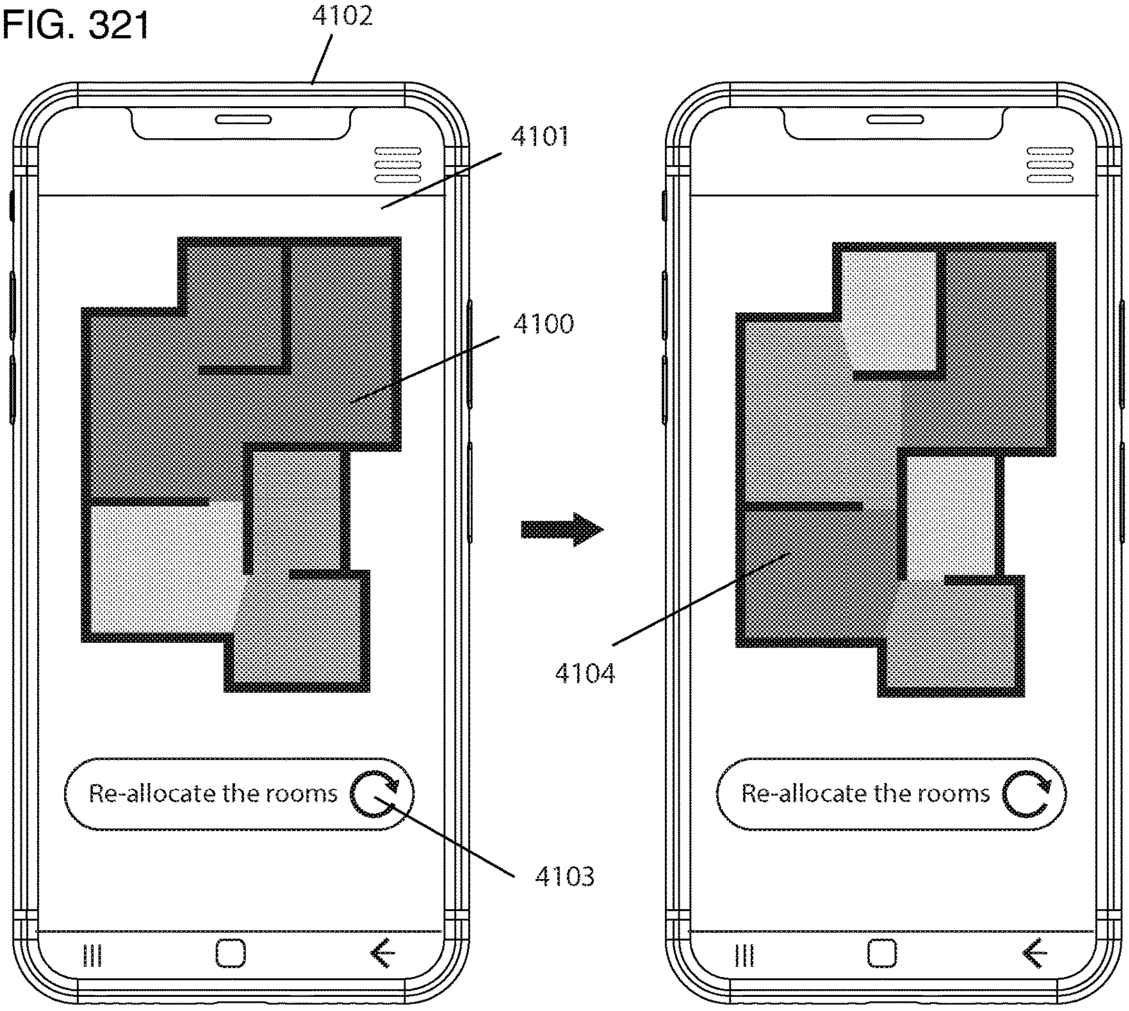
Figure 322:
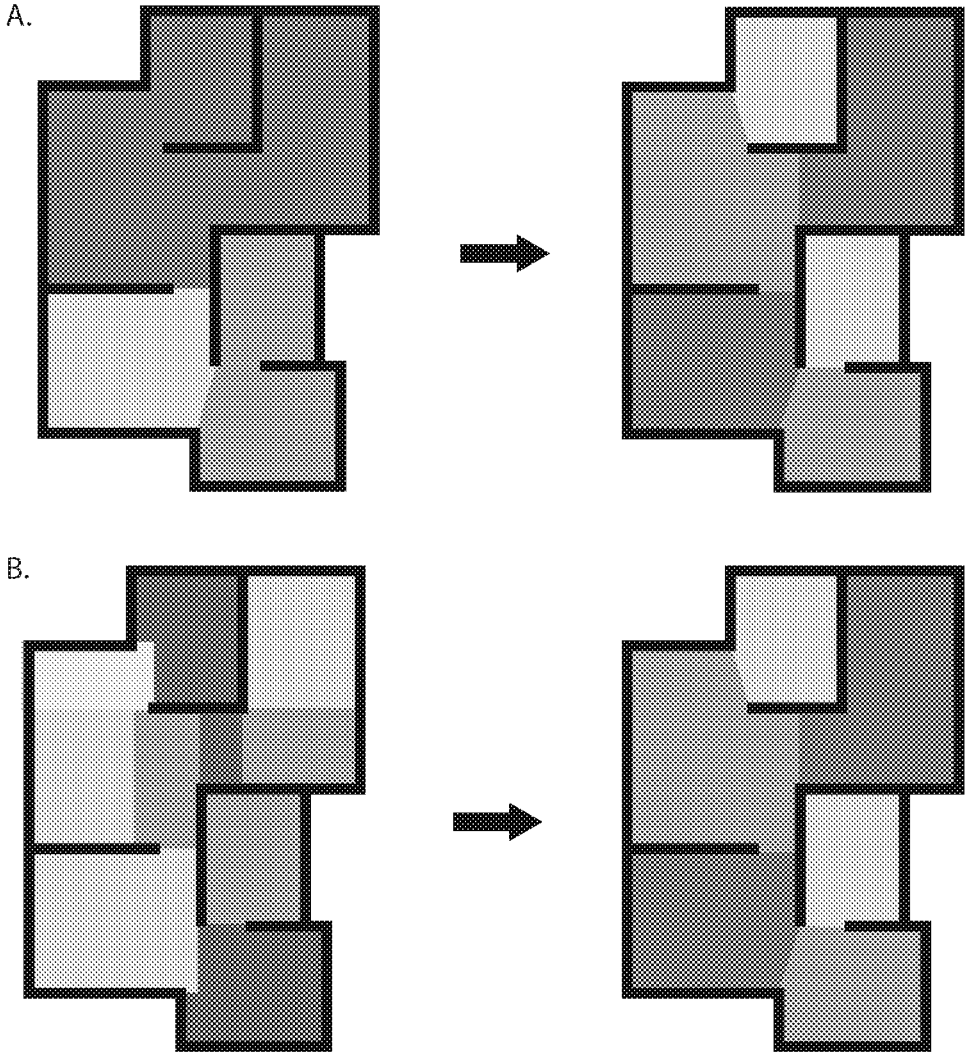
Figure 323:
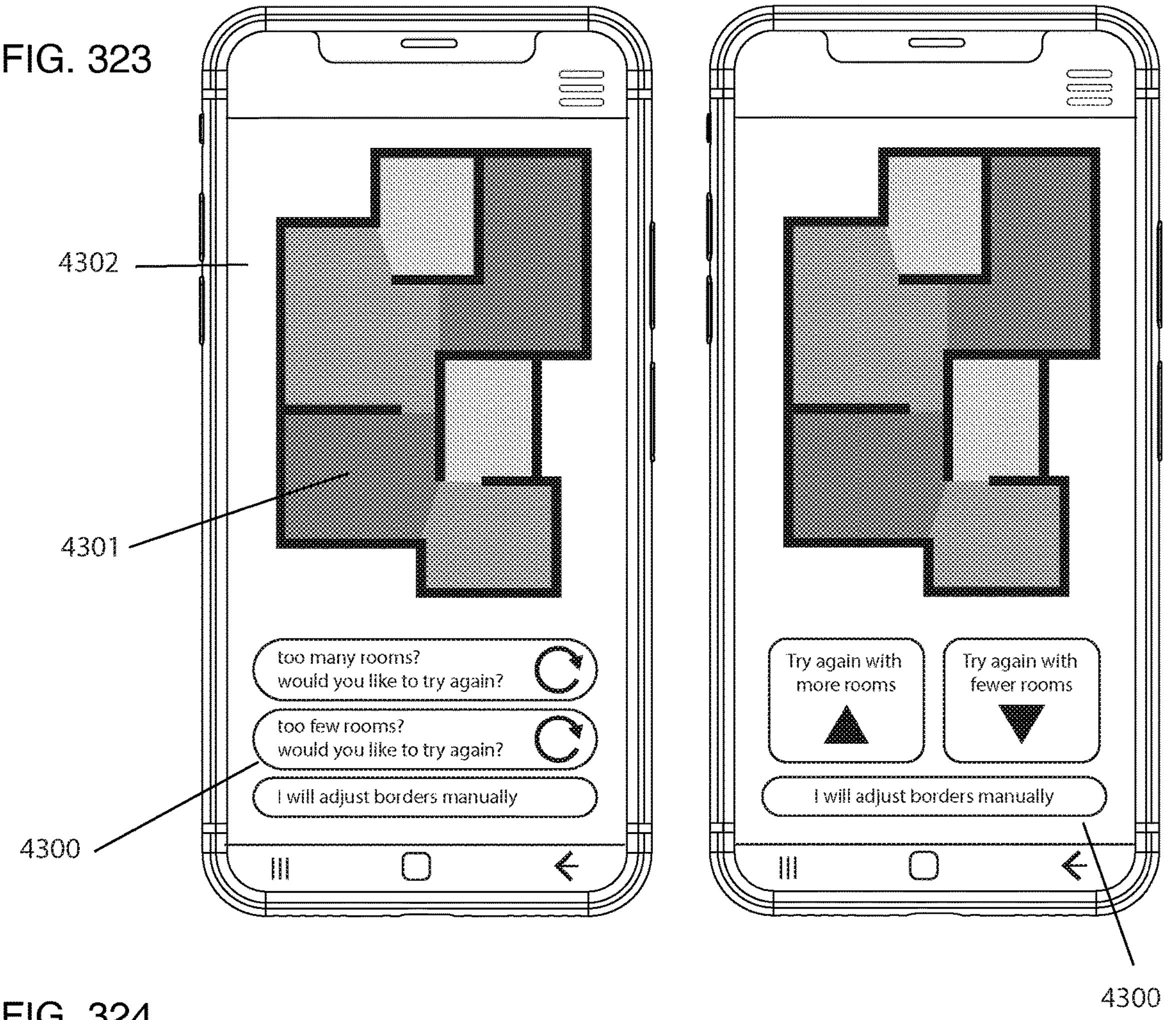
Figure 324:
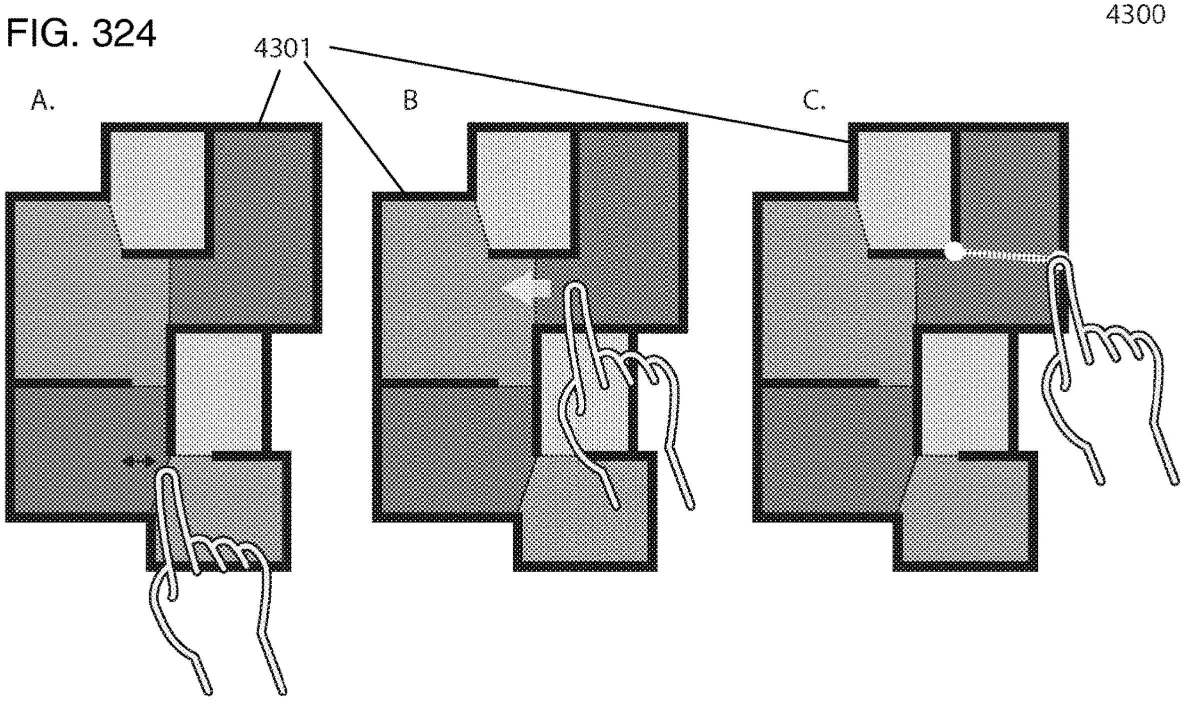

In some embodiments, the processor of the robot generates a map of the environment in real-time. As the robot navigates through the environment, the processor obtains sensor data of the environment from sensors disposed on the robot, maps the environment, and divides the map into separate rooms in real-time. After the first work session, upon observing the entire work area, the processor of the robot obtains a better understanding of the environment and adjusts the room divisions automatically. This is illustrated in FIG. 320, wherein the map 4000 progressively expands to include the entire working area and the dividers 4001 dividing the map 4000 are correspondingly adjusted as a better understanding of the environment is obtained by the processor. In some embodiments, a user may use an application of a communication device paired with the robot to re-allocate the division of rooms. FIG. 321 illustrates a map 4100 with an initial division displayed on an application 4101 of a communication device 4102. A user may use a touch screen to provide an input to re-allocate the rooms by touching icon 4103. As a result, the application determines a new and different layout for room division displayed in map 4104. In some cases, the processor of the robot may choose to adjust the room division based on a number and size of rooms. Two examples (A and B) of an adjustment of room division are illustrated in FIG. 322. If there are too few rooms, the processor may divide the map to include more rooms for better separation (A) or if there are too many rooms, the processor may merge some rooms to generate a better layout (B). In one embodiment, the application may provide an option to re-allocate the rooms such that the room division include more or fewer rooms or to manually re-allocate the rooms, as illustrated in FIG. 323. Icons 4300 may be used re-allocate the rooms in map 4301 displayed by the application 4302 such that the room division include more or fewer rooms or to manually re-allocate the rooms. FIG. 324 illustrates action a user may take in manually dividing the map 4301. The application displays borders of each room that the user may manipulate by dragging (A and B), rotating, and deleting. The user touch and hold their finger on a room for the application to display an option to merge the room with an adjacent room. The user may also draw new lines (C) to split a room into two rooms.

When the robot encounters a temporary obstacle during an initial run, the processor marks the obstacle on the map. This is illustrated in FIG. 325, wherein obstacle 4600 observed by sensors of robot 4601 during a first run is marked in map 4602. When an obstacle is removed during a future run, the robot traverses the area which the obstacle occupied previously despite the processor remembering the area occupied by the obstacle previously, as illustrated for the second run in FIG. 325. As more runs are executed, the processor updates a certainty of a presence of the obstacle on the map. The reduction in color intensity in the third run illustrated in FIG. 325 indicates a reduction in certainty of the presence of the obstacle 4600 as it is not observed again in the third run. After several runs in which the obstacle 4600 is not observed at the same location, the processor removes the obstacle 4600 from the map, shown in the nth run illustrated in FIG. 325.

Figure 327:
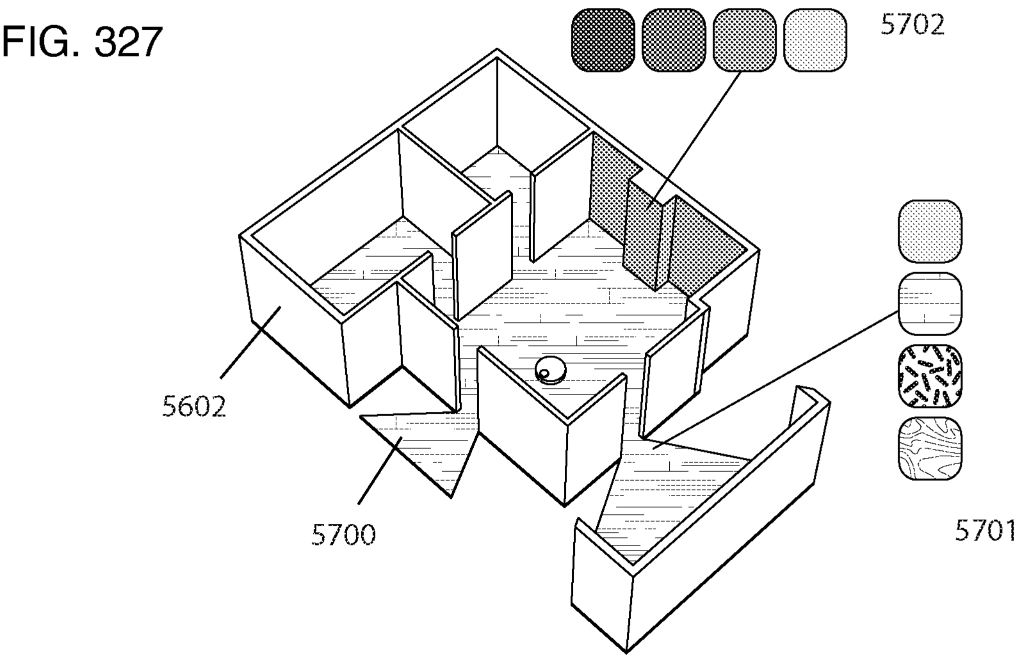
Figure 328:
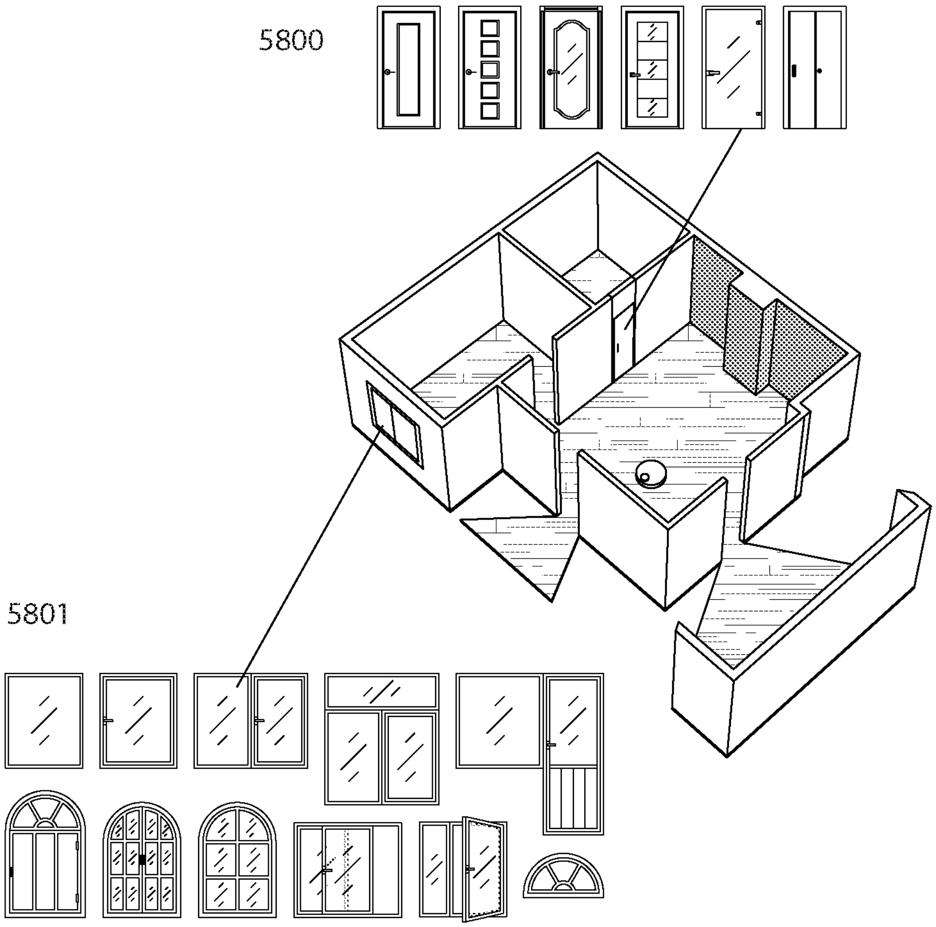

In some embodiments, the processor of the robot (or another external processor) converts the 2D map into a 3D map for better representation of the environment. In embodiments, the 2D map includes different features, the most common feature being the walls of the environment. In some embodiments, the shape of the walls in the 2D map are extruded in a vertical axis corresponding to a direction of a height of the walls to generate the walls in 3D. The extrusion height may be an estimate based on architecture standards or the VMP may comprise sensors for measuring floor-to-ceiling distance or otherwise the height of the walls. For example, FIG. 326 illustrates a conversion of a partial 2D map 5600 into a 3D map model 5601 by extruding the walls 5602 in a direction corresponding with a direction of a height of the walls 5602. Additional data such as areas covered (i.e., robot path), no-go zones, and virtual barriers are converted in the 3D map model as well. The map may be switched from 2D to 3D and vice versa at any time using an application of a communication device (e.g., smart phone, tablet, laptop, desktop computer, smart TV, smart watch, etc.) paired with the robot. Another feature of the 2D map includes a floor. In some embodiments, the processor of the robot may separate the floor from the walls as the robot covers the environment. The robot may also may be equipped with sensors used in distinguishing hard floors (e.g., hardwood, ceramic, stone, concrete, tiles, etc.) from soft floors (e.g., carpet, rugs, etc.). FIG. 327 illustrates an example of separation of a floor 5700 and the walls 5602. The processor of the robot or a user via the application adds textures 5701 to the floor 5700 to indicate a type of floor (e.g., hardwood, carpet, etc.) and colors 5702 to individual walls to distinguish between characteristics or for aesthetic purposes. Colors may also be applied to floors and textures may also be added to walls. In some cases, the processor translates the floors into planes in the 3D space. In embodiments, the conversion from 2D to 3D happens in real-time while the robot is covering the environment and building the map, wherein the partial 2D map is converted into 3D. The processor updates the 3D map as more areas are discovered and mapped. Additional data such as covered areas, no-go zones and virtual barriers may be transferred into the 3D map as well. In some embodiments, the processor decimates or re-tessellates the 3D map to form a cleaner and more representable map while using less memory. In addition, the processor may clean the shapes of the floor and the walls in the 2D map before extrusion or conversion into the 3D map. This provides a cleaner map with less vertices that require less memory and are faster to render and easier to generate texture coordinates for. A location of architectural elements such as doors, windows, stairs and vanities are another feature that the processor may extract from the 2D map and include in the 3D map. FIG. 328 illustrates architectural elements such as doors 5800 and windows 5801 positioned within the 3D map model by the application in places recognized by the processor of the robot. In some embodiments, the application is used to choose a different architectural element that is more suitable to the real-life equivalent than the architectural element autonomously chosen by the application. In some embodiments, the processor may use generic models of architectural elements comprising parameters such as width and height in placing them as schematics in a location within the generated 3D model. A similar approach may be used for other elements such as furniture (e.g., sofas, chairs, tables, beds, etc.), wherein generic and simplified models of these elements comprising parameters such as element type and size are used in placing them within the 3D space.

Figure 329:
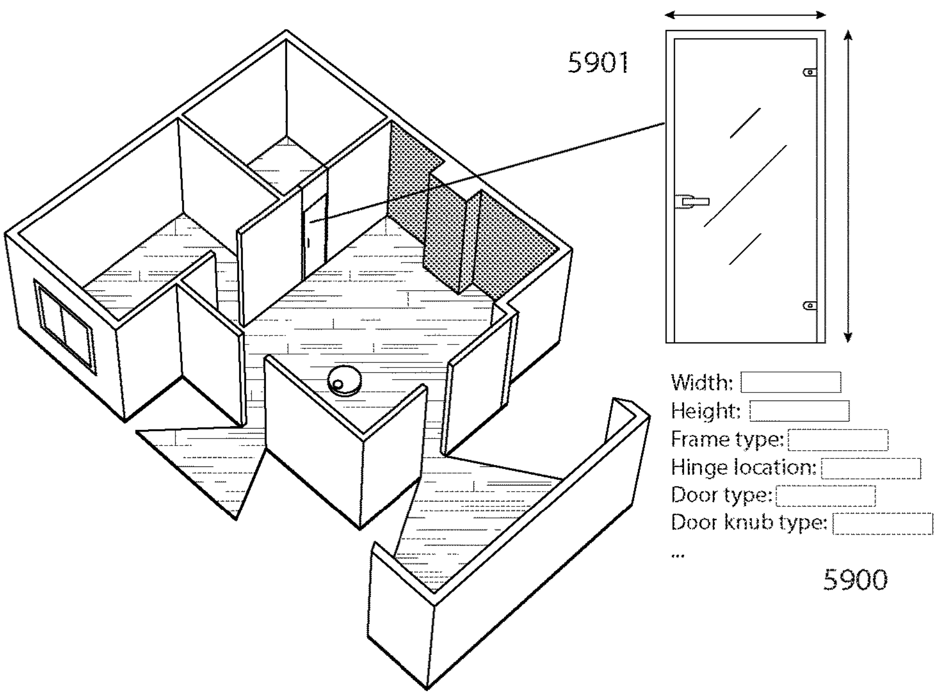

In embodiments, the user may have the option to customize different aspects of the generated map model using, for example, the application of the communication device paired with the robot. For example, the user may change a color or texture of the walls and the floors to better match the model with the real environment. In another example, the user may change a type of door, window, other architectural elements, and furniture. The process of customization may be implemented in two ways. In one instance, customization of the map model is implemented by changing parameters of the map model. These parameters may include, for example, size, width, length and height, color, etc. of an element. For example, FIG. 329 illustrates an example of using the application to customize parameters 5900 of a door 5901. In some cases, adjustable parameters are specific to the model or an element. For example, adjustable parameters of a door may also include a way a door opens or a hinge location of the door, inclusion of panels or a number of panels on the door, a single pane or double pane door, etc. In another example, adjustable parameters of a stair system may include a number of stairs, a depth and a height of the stairs (changing one of these parameters may change the other two), a type of the stair system (e.g., straight, L shape, C shape, spiral, etc.), a type of a hand rail, etc. In another instance, customization of the map model is implemented by changing the map model itself. For example, the processor may guess an incorrect type of a furniture piece (e.g., mapping a sofa instead of a bed) and the user corrects the type of the furniture mapped in the 3D scene. In another example, the user accesses a catalogue or a library of possible element types of various elements (e.g., architectural and furniture). This helps in customization in comparison to using generic models. In some cases, the robot may be equipped with more sophisticated sensors such as image sensors and the processor may process the sensor data to recognizes a type of the furniture or other elements within the environment by automatically searching the library for the specified element with features closest to the element observed.

In some embodiments, assets such as libraries and catalogues are stored on a server and/or on the cloud and are downloaded upon request. A thumbnail image or video may be displayed by the application to represent the asset and upon selection, the asset is downloaded and directly imported to the 3D scene. Another type of asset that may be used in customizing the map model comprises various looks with different color schemes, materials, and textures. For example, the user may choose a particular look for one of the walls within the map model, such as brick. The asset may include a variety of brick wall patterns that the user may choose from. Upon selecting the desired pattern, a brick shader comprising a series of textures is applied to the wall. The textures control different aspects of the look of the wall. Common textures include diffuse comprising color data of the texture without any lighting data; specular or roughness which determine how each part of the texture reacts to the light; and bumps which fakes minor bumps on a surface so it appears more 3D. Bumps may be implemented using a simple grayscale map that affects a local height of any given point on the surface. Or the bumps may be implemented using a RGB map (known as a normal map) that maps the (R, G, B) values of the texture to the normal vector (X, Y, Z) of a corresponding point on the surface. Each point with a different normal vector act differently upon receiving light, mimicking a case where the bumps are placed on the surface at different angles. Other textures include displacement which displace the surface points based on a value of the texture (this is most accurate, however is process intensive); opacity or transparency which determines how light passes through or reflects from the surface; and self-illumination which determines whether the surface is illuminating or not, affecting the surface look upon receiving light and other objects casting a shadow on the surface. In embodiments, the implementation of these customizations is processed on the backend, however, the user may have some control over the scale and orientation of the textures. In another example, the user chooses a specific color for an element, such as the wall. The user may choose the color from a provided color wheel, however not all the colors of the color wheel are available in paint form, or may choose the color from color catalogues/libraries. These libraries may be provided by paint companies with their specific codes. This way the user is sure the color chosen can be replicated in real life.

In some embodiments, the user imports custom assets for the 2D and 3D map models. For example, the user may insert a 3D scan of a custom furniture or an artwork into the 3D scene of the environment. With scanning of 3D objects being more accessible (e.g., smartphones equipped with 3D imaging devices such as LIDAR), the user may scan objects themselves. The user may be required to save the asset in a particular file format. Some common neutral 3D file formats include gLTF/GLB, FBX, OBJ, USDZ/USD, STL, STEP, and collate. Depending on the file format, the 3D file may contain 3D geometry, texture data, and animation. Some assets may include secondary types of data in external files, making them less user-friendly for the user. In some embodiments, the application paired with the robot imports asset files as a package and sets the file formatting in the backend. 2D assets are more mainstream and are usually imported as images. 2D assets may comprise a shader or a series of textures. In some embodiments, the application imports these types of assets as a package. Some common image formats include BMP, JPG (smaller file size), PNG (have transparency), GIF (may be animated), EPS (common vector file type), and SVG (common vector file type).

In embodiments, lighting is required for the 3D scene to be visible. In one example, the lighting is a simple directional light, wherein the surfaces facing the light appear lighter and the surfaces not facing the light appear darker. The light may or may not cast a shadow. This type of lighting is one of the fastest methods of illuminating the scene, however, the result is less realistic and more schematic. In some embodiments, other types of lighting are added to the scene. Some common light types include point or omni light comprising a point in 3D space which emits light rays in all directions and spot light comprising a point in 3D space, wherein the direction of the light is specified and the light rays usually diverge from the emission point. Other parameters of the spot light, such as light cone dimensions, hot spot area and light decay, may also be adjusted using the application. Additional types of lighting also include directional light comprising a point in 3D space and a direction vector (this light mimics sunlight or light sources at a distance); area light comprising a light source that is a surface or a volume, resulting in softer and more accurate shadows; physically accurate light comprising a type of area light with parameters such as intensity and temperature based on IES standards; and image-based light (IBL) comprising a special type of lighting that is relatively fast with realistic results. With IBL, a high dynamic image of the surrounding environment (including light sources) is projected in a spherical, hemispherical (dome), cylindrical, or cubical geometry from the inside. This geometry surrounds the whole scene and lighting parameters, such as highlights, shadows, and reflections, are calculated based on the image projected on the geometry. In addition to the general lighting for illuminating the 3D scene, some assets may include light objects or emissive objects within them. For example, a light fixture may have parameters that facilitate turning on the light fixture and illuminating the scene as in real life. In another example, window objects may include area lights baked within them to simulate daylight.

Figure 330:
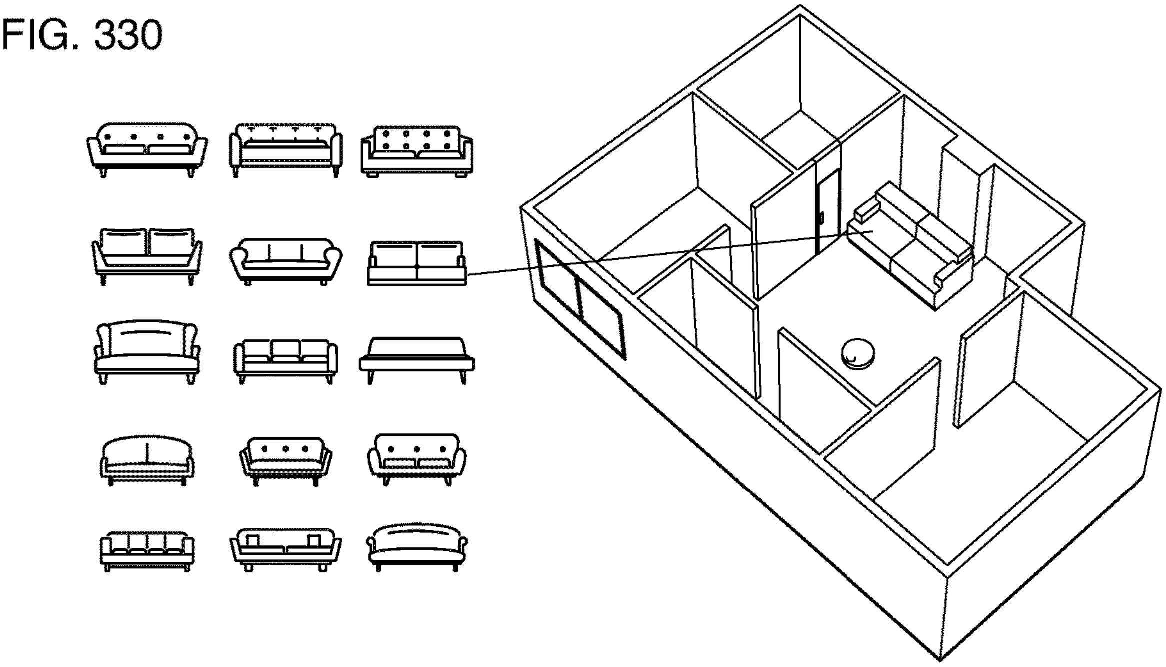

In embodiments, asset libraries may be provided by different vendors as a means to promote their products. In this way, the user may also gain a better understanding of how specific products may appear in their environment in real life. In some cases, each asset may be accompanied by some additional data that benefits the user and the vendor. For example, information such as availability, price, available colors, related items, similar items, etc. may be additional data presented to the user upon choosing an asset. In some cases, the application may suggest assets related to a certain asset selected by the user. For example, upon selection of a particular coffee table, the application suggests or displays side tables from a same design collection as the particular coffee table. In some embodiments, each asset is tagged such that they are easily searchable within different groups and categories. Some useful tags may be, but are not limited to, style, color, type, size, price range, material, etc. For example, FIG. 330 illustrates an example of using the application to choose a specific model of sofa. FIG. 331 illustrates that upon selecting a specific sofa model 6100, information 6101 pertaining to the sofa model 6100 is displayed, such as dimensions, model information, related and similar items, and meta data.

In some embodiments, it may be easier to adjust the location of assets in the 2D map model rather than the 3D map model when placing the asset into the scene. Therefore, in embodiments, the application comprises an option to switch between the 2D map model and the 3D map model. This feature is also beneficial for other purposes. For example, measuring areas and wall lengths is easier in a 2D top-down view of the map model. In each viewport, 2D and 3D, the application comprises different tools that the user may access. Examples of some useful tools include a measuring tool for measuring lengths of walls, areas of different spaces, angles, etc.; drawing tools (e.g., brushes, color selector, eraser, etc.) for drawing notes and ideas on top of the 2D map model; and an annotation tool for writing points and ideas within the 2D or 3D map model. FIG. 332 illustrates an example of a 2D viewport 6200 and 3D viewport 6201 displayed by the application. This application is used to switch between the 2D viewport 6200 and 3D viewport 6201. The application also includes measuring tool 6202, drawing tool 6203, and annotation tool 6204. FIG. 333 illustrates subtools of the measuring tool 6202 including length measurement tool 6300, area measurement tool 6301, and angle measurement tool 6302. FIG. 334 illustrates subtools of the drawing tool 6203 including brush tool 6400, paint bucket tool 6401, eraser tool 6402, and color selecting tool 6403. Upon selecting the brush tool 6400, brush sizes 6404 are displayed for selection. In embodiments, each viewport, 2D and 3D, comprises a different set of tools for navigation. For both the 2D and the 3D map model these navigation tools are activated by selecting icons displayed on the screen of the communication device or by using finger gestures. Navigation of the 2D map model in the 2D viewport may include the following navigation modes: panning by dragging two fingers on the screen to pan the map around; zooming by pinching two fingers towards or away from each other on the screen to zoom in or out, respectively; rotating by rotating two fingers on the screen to rotate the map; and reset rotation or refitting the map to the screen by double tapping the screen. FIG. 335 illustrates examples of basic navigation in the 2D viewport displayed by the application, including (A) panning, (B) zooming and (C) rotating. Navigation of the 3D map model in the 3D viewport comprises controlling a virtual camera using the following navigation modes: panning by dragging two fingers on the screen to pan the view towards the left, the right, up or down (in reality a real camera would move in the opposite direction to cause the scene to move in the intended direction); zooming by pinching two fingers towards or away from each other on the screen to zoom in or out, respectively (based on the use case of the map, zooming in or out may translate to moving the virtual camera closer to or further from the scene (known as dolly) or changing the focal lens of the virtual camera to zoom in or out, resulting in a different perspective); rotation about any of the three different axes by dragging a single finger on the screen to rotate the virtual camera around its target point (i.e., the center of viewport). FIG. 336 illustrates examples of basic navigation in the 3D viewport displayed by the application, including (A) panning, (B) zooming, and (C) rotating. In some embodiments, the application includes an orientation icon in the viewport that is used to align the viewport with standard views (e.g., front, back, top, bottom, left, and right views). In some embodiments, gizmos are used to navigate the 3D map model in 3D space. While this method may be less intuitive, the user has more control over navigation. In some embodiments, a specific gizmo appears upon selection of a type of navigation mode. Depending on the type of navigation mode, the gizmo may include different handles that the user may drag on the screen to change the viewport. For example, rotation may be represented by three rings each positioned on one of three perpendicular axes, each ring being selectable by the user for rotating the scene around a specific axis. In one case, there is a fourth ring aligned with the screen and used to rotate the scene around an axis perpendicular to the screen (similar to rolling the camera in real life). Gizmos may also be used to manipulate objects. For example, gizmos may be used to relocate, scale, or rotate objects within the scene which differs from navigating the scene itself. FIG. 337 illustrates an alternative method of navigation in 3D viewport displayed by the application, wherein the type of navigation (A) panning, (B) zooming, and (C) rotating is selected using icons 6700, 6701, and 6702, respectively. Once the specific type of navigation is selected, the user interacts with the touchscreen to perform the particular type of navigation. For example, dragging a finger upwards and downwards or left and right to pan when panning is selected or dragging a finger upwards or downwards to zoom in and out when zoom is selected or dragging two fingers in a circular motion to rotate when rotation is selected.

In embodiments, the application is used to export various types of data from the application. An example of data that may be exported includes image data. For example, the application may export a current viewport as an image. In some cases, the application is used to choose a quality for the exported image, such as quality providing better lighting (i.e., ray tracing and global illumination), texture resolution, higher image resolution, etc. Common image file formats include JPG, PNG (which supports transparency), TIFF or PSD (if the image can be exported in layers), and EXR (which includes additional data, however, is larger in file size and may not be easy to read by other programs). Another example of data that may be exported includes video data. For example, the application may be used to record a video while navigating through the 3D scene and export the view. Or the application may be used to highlight specific views and the application may create a video by translating a virtual camera between the views then export the video. Examples of video codecs that may be used are H264 and H265 and examples of video file formats that may be used are MP4 and MOV. Depending on the movements in the content of the video, a variable frame rate may be used for exporting rather than a constant frame rate. Another example of data that may be exported includes technical drawing data. For example, the application may export the 2D map as a technical drawing, including measurements and annotations added on the map manually by a user or autonomously. Some common drawing file formats that may be used are DWG and DXF or other vector file formats such as PDF, AI, EPS and SVG. The application may also export 3D map models (that may be imported and used in other programs) Examples of 3D map models comprise structural, electricity, plumbing, etc. 3D models. Some common 3D file formats that may be used include FBX and OBJ, FBX being especially useful as it has the option to include textures, animation, lighting and camera positions as well. The application may also export data sheets. Depending on the objects in the 3D scene, particularly the objects selected from libraries/catalogues), associated data of the objects may be exported as a sheet for further processing or use. For example, several types of furniture may have been selected from furniture store catalogues and placed within the environment using the application. The application may later export a sheet including all data associated with furniture pieces such as dimensions, available colors, selected color, price, shipping cost, shipment details, etc. such that a user may purchase the furniture or assess the furniture further for their real-life environment. In some cases, the application is used to purchase the furniture directly.

In some embodiments, a first run of the robot is a map-generating run. In some embodiments, the application displays a request to the user for the first run to be a map generating run, the user providing an input to the application that confirms or rejects the request. In this mode, the robot quickly traverses through the environment to generate the map without performing any other task. FIG. 338 illustrates an application 6800 of a communication device 6801 displaying a path 6802 of the robot during a map generating run and a path 6803 of the robot during a cleaning work session. The path 6802 is a shorter path executed by the robot to observe and generate the map 6804 while the path 6803 is a longer path executed by the robot to cover the area within the map 6804. In some embodiments, the processor of the robot chooses movement patterns that are suitable in identifying architectural elements (e.g., wall follow movement pattern for identifying walls, for example) to build the map faster. When saving the map, the application may save a snapshot of the map for display as a visual aid in a load map section of the application. For example, FIG. 339 illustrates various examples of user interfaces displayed by the application 6800. Available maps may be displayed using a map thumbnail and a corresponding map name as in user interfaces 6900 and 6901, a map thumbnail as in user interface 6902, or a map name as in user interface 6903. Upon choosing a certain map, different work options may be displayed by the application. In some embodiments, the application is used to select a map-generating run at any time, such as in cases where the environment of the existing is changed, to update the existing map. FIG. 340 illustrates different work options 7000 displayed by the application 6800 upon selecting a first-floor map from a list of available maps. The application 6800 also displays an option 7001 to re-generate the selected map, which upon selection actuates the robot to execute a map generating run to generate a new map of the first floor to replace the current map of the first floor. While generating the map, the processor may identify different floor types (e.g., carpet, hardwood, stone, etc.) based on floor sensor data and mark the floor types within the map. In some cases, the application is used to select areas with different floor types for exclusion or inclusion of the areas during execution of a particular task by the robot. The areas with different floor types may be highlighted to indicate that they are selectable in the application. In embodiments, the processor uses floor type data to adjust the performance of the robot. For example, a mopping robot may autonomously lift its mopping module when approaching or driving on a carpeted area. FIG. 341 illustrates an example of different floor types distinguished by different color 7100, pattern 7101, and texture 7102 in a map 7103.

In some embodiments, the processor identifies and labels room. In some embodiments, the application is used to label rooms or change a label of a room or delete a label of a room. The processor of the robot may have access to a database of different environment plans (in similar categories such as residential, commercial, industrial, etc.) to help in identifying and labeling rooms. Using these databases, the processor generates a pattern for a relation between rooms and uses the pattern to predict the rooms more accurately. For example, in a residential plan, there is a low chance of a room being a bedroom when it is adjacent to and has a door connecting to a kitchen and a higher chance of the room being a dining room or a living room.

In some embodiments, the map is divided into separate areas autonomously via the processor of the robot and/or manually via the application. In some embodiments, the application displays the divided map, each separate area being displayed as a different color and/or having a label for the particular area. In some embodiments, different icons are chosen and displayed for each area, the selection of the icon causing additional data related to the particular area to be displayed, thereby avoid cluttering of the map. The icon may be autonomously generated or may be chosen using the application. The additional data displayed may include, for example, a name of the room, a surface area of the room, a last time the robot performed a task in the room, scheduled times for the robot to perform a task in the room, debris accumulation in the room, floor type in the room, obstacle types in the room, obstacle density in the room, human activity levels in the room at different times, etc. In some embodiments, the application displays a scale reference (in feet or meters) with the map such that the user has a rough idea of a size of each room/area. In some embodiments, the processor of the application determines an estimate of an amount of time required to complete coverage of an area based on robot settings and the area, the estimate being displayed by the application. For example, the application may display an estimate of an amount of time to clean a specific area by a robotic vacuum cleaner. FIG. 342 illustrates a map 7200 displayed by application 7201 executed by communication device 7202. The application displays various overlay elements on the map as well as a scale factor, the selected room, area covered, a cleaning time estimate for finishing cleaning, and a last time the robot cleaned. In some cases, the processor of the robot may mark each area in the map with an actual time spent covering each area, which may be displayed by the application. In some embodiments, the application displays coverage of an area and a path of the robot as the robot covers the area, the moving trajectory of the robot displayed on the map in real-time. In one case, the application displays the path the robot executed on the map. In another case, the application displays an animation of the path, drawing the path on the map as the robot moves over time, thereby replaying the movement of the robot in a session. Since the path of the robot may become too complex of a shape quickly on the map, the application may display a portion of the path (e.g., the last 10 minutes) by autonomously choosing or manually selecting via the application to display a portion of the path generated between two particular timestamps. In some embodiments, the application only displays covered areas instead of the path. In this case, the footprint of robot may be used to inflate the path to show actual covered areas. In embodiments, the application is used to select different display settings of the path and the covered areas described above. FIG. 343 illustrates an application 7300 displaying different display options for a path of the robot including displaying a path 7301 of the robot in a map 7302 as the robot executed the path 7301 in real-time, displaying a most recent portion of a path 7303 executed by the robot, and displaying coverage 7304 of areas within the map 7302.

Different approaches may be used in placing and adjusting items, such as virtual barriers, room dividers and no-go zones, within the map using the application. In one approach, the application is used to select the desired item and draw the item. Upon selecting a specific item, the application displays tools that may be used to draw the selected item within the map. For example, a tool for drawing a straight line may be used to insert a room divider. In some cases, the line is extended to a closest wall after the line is drawn in the map. The line may be dragged on the screen at each end to adjust the divider. In this approach, the map location is relatively constant (unless the user chooses to navigate the map) and the user directly customizes the placed item. FIG. 344 illustrates using application 7400 of communication device 7401 to (a) select virtual barrier tool 7402, (b) select a wall 7403 from which a virtual barrier is to begin, and (c) draw the virtual barrier 7404 by dragging a finger 7405 across the screen of the communication device 7401. After drawing the virtual barrier 7404, (d) the application autonomously adjusts and extends the drawn virtual barrier 7404 to the nearest walls. In a second approach, the application is used to select the desired item and the application places the selected item in the middle of the screen. The application is used to navigate the map (using the navigation modes described above) to position the item in the desired position within the map. This approach is more useful on smaller screens such as cellphones as there is more control in placing the item accurately. FIG. 345 illustrates using application 7500 of communication device 7501 to a. select virtual barrier tool 7502 upon which b. a virtual barrier 7503 appears in a middle of a map 7504 displayed by the application 7500 and c. manipulate the map 7504 by dragging fingers 7505 on the screen in different to place the virtual barrier 7503 in the desired position in relation to the map 7504. After placing the virtual barrier 7503, d. the application keeps the segment of the virtual barrier 7503 that is in between the walls 7506 and trims the rest. A third approach is a combination of the first and second approaches. This approach provides the best of the previous two methods in a more intuitive way. For example, upon selecting a room divider, the divider is placed in the middle of the screen. Two-finger rotation on the screen may be used to rotate the divider, while two fingers dragging or pinching on the screen may relocate and zoom the map around the divider to position the divider in the desired location. FIG. 346 illustrates a combination of two previous approaches for placing a virtual barrier. The application 7600 is used to a. select a virtual barrier tool 7601 upon which b. a virtual barrier 7602 appears in the middle of a map 7603 and c. manipulate the map 7603 around the virtual barrier 7602 by dragging fingers 7604 in different directions along the screen to place the virtual barrier 7602 in the desired position in relation to the map 7603. In this case, dragging the fingers 7604 in a pinching gesture 7605 causes zooming in and out of the map while dragging fingers in a circular motion 7606 causes the virtual barrier 7602 to rotate around the center of the screen. After placing the virtual barrier 7602, d. the application keeps the segment of the virtual barrier 7602 that is in between the walls 7607 and trims the rest.

Figure 347:
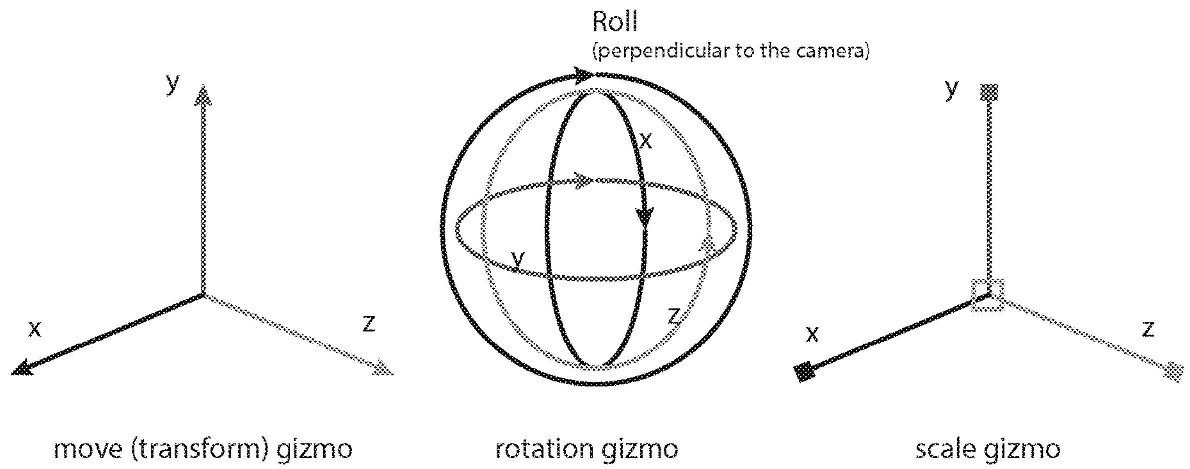
Figure 348:
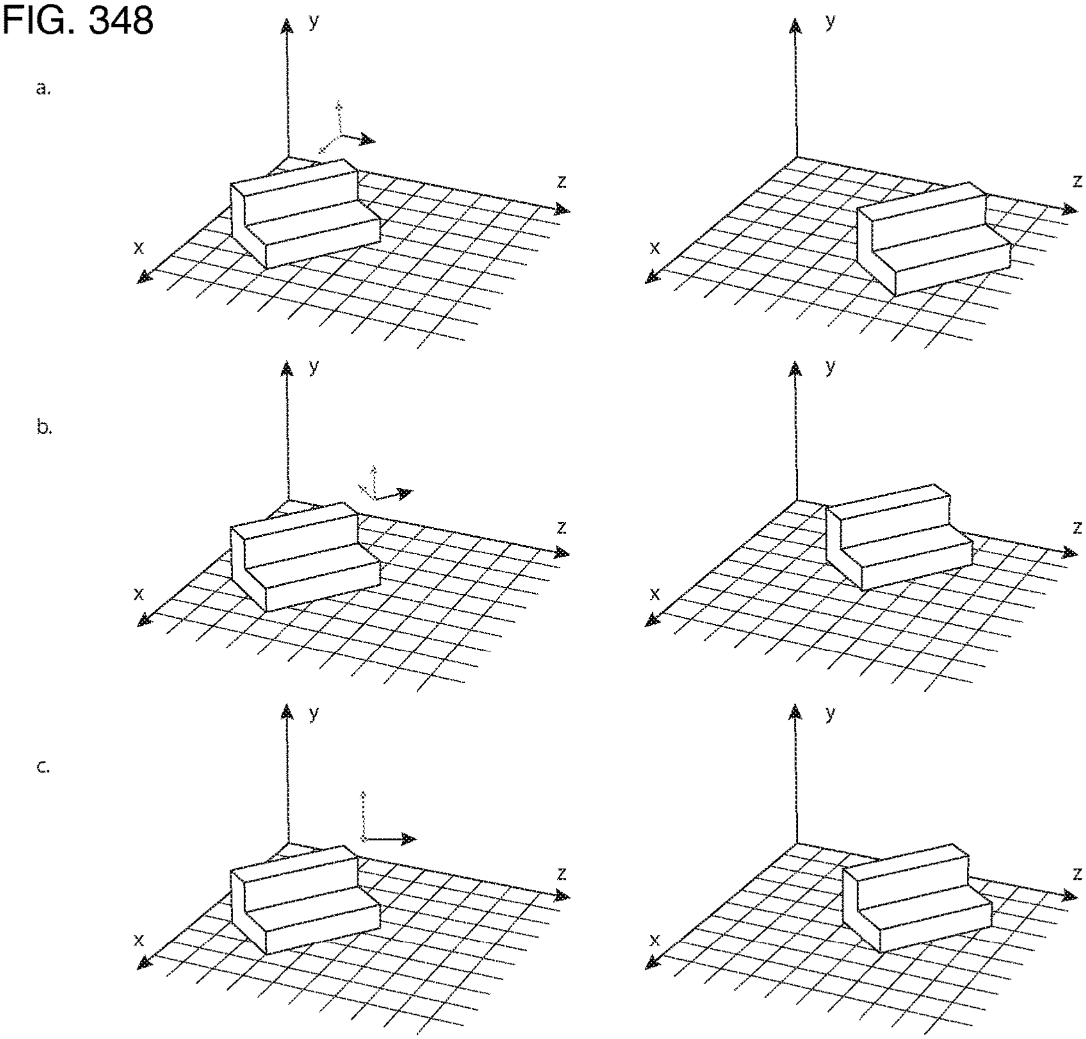

In some embodiments, the application displays tools that may be selected and used to manipulate a location, orientation, and scale of an object when an object (e.g., furniture) is added to the 3D map. Upon selecting a tool, a specific gizmo is displayed over the object for manipulating the object in a more precise way. In embodiments, the role of gizmos is to specify manipulation orientation. For example, a transform gizmo may consist of three different handles in three different orientations (x, y, z). FIG. 347 illustrates examples of gizmos for transformation, rotation, and scale of an object within a 3D scene. Each handle of a gizmo manipulates the object in the selected orientation. Object transformation may be executed in a local orientation, wherein the gizmo is aligned with the object such that a change in the orientation of the object causes a change in the orientation of the gizmo. Alternatively, object transformation may be executed in a global orientation wherein no matter the orientation of the object, the orientation of the gizmo is always aligned with the environment coordinates. In another case, the gizmo is aligned with the screen (i.e., camera), wherein the object may be transformed using the viewing angle of the user. FIG. 348 illustrates differences between a transform along a. global coordinates (i.e., environment's orientation), b. local coordinates (object's orientation), and c. screen space coordinates.

Figure 349:
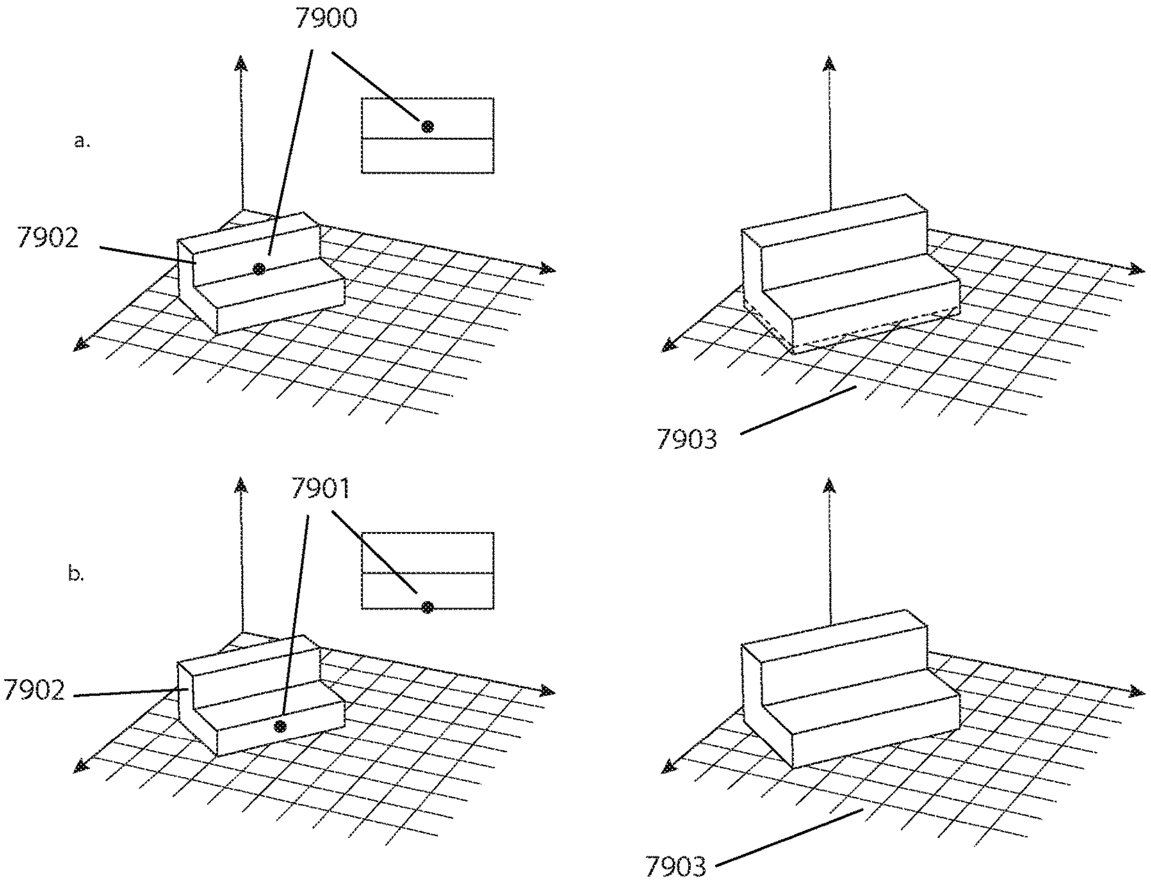

When transforming an object within a 3D scene, at least one point is needed to identify a location of the object in the coordinate system. This point, known as a pivot point, may also be used as a center point for rotation and scaling of the object. An object may have different pivot points for each type of transformation, which is helpful in transforming objects. For example, it is beneficial for a piece of furniture that is positioned on a floor to have pivot point positioned at a bottom of the object while for a ceiling lamp it is better for the pivot point to be positioned on a top of the object. Further, it is beneficial for a rotation pivot point to be positioned on a side or a corner of an object so the object may be rotated along their edge or corner. In addition to adjusting the location of the object, the pivot point may be used to determine the orientation of the object as well. The pivot point may include a vector data representing the orientation of the object in relation to a main coordinate system. This may be used for aligning the object with the environment coordinates or environment elements such as floors and walls and/or other objects within the environment. FIG. 349 illustrates how a location of a pivot point 7900 and 7901 of an object 7902 affects a transformation of the object 7902. In the case where a. the pivot point 7900 is in the middle of the object 7902, a portion of the object enters a region beneath a floor plane 7903 as the object 7902 is scaled around the pivot point 7900, which may be undesirable. In the case where b. the pivot point 7901 is at a bottom of the object 7900, the entire volume of the object 7900 is above the pivot point 7901 and thus the object 7900 remains above the floor plane 7903 upon scaling.

Figure 350:
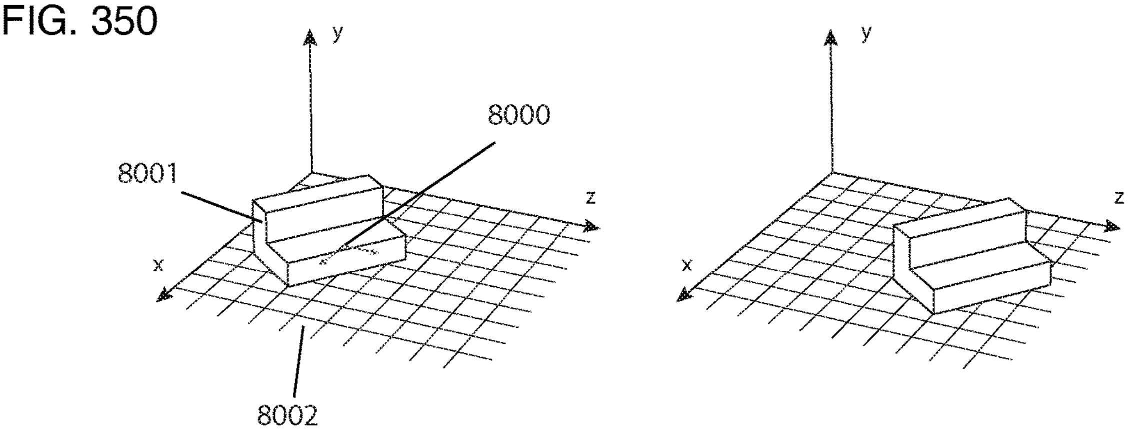

Depending on the use case, the application may limit the gizmos and their handles for particular objects to ease object manipulation and provide more control. For example, the application may block access to a scaling gizmo for a furniture with a specific size such that the furniture is always correctly scaled in relation to the environment. In another example, the application may remove a height handle from a transform gizmo for a furniture that is always positioned on the floor, such as a sofa or a table. FIG. 350 illustrates an example of a smart gizmo 8000, wherein the handle for moving an object 8001 along the y (height) axis is removed to always keep the object 8001 on a floor plane 8002. In some cases, the application includes a snap feature (the feature may be manually enabled or disabled). When the snap feature is enabled and depending on a type of snap selected or used, the location and/or orientation of an object is automatically adjusted as the object becomes closer to another element (e.g., object, edge, point, etc.) based on the location and orientation of the other element. For example, when a sofa is manually moved close enough to a wall, the application automatically adjusts the orientation of the sofa such that a back of the sofa is parallel to the wall. FIG. 351 illustrates an example of using a snap tool, wherein using the application a. a sofa 8100 is moved towards a wall 8101 upon which b. the sofa 8100 enters a snap threshold 8102 of the wall 8101 and c. the application automatically aligns the orientation of the sofa 8100 with the wall 8101. Or in another example, when a picture frame is manually moved close enough to a wall, the applications automatically snaps the picture frame object to the wall in a correct orientation, after which moving the object along the wall is prioritized over moving the picture frame away from the wall. When placing objects such as furniture in the environment, the application may snap the objects to the floor and/or snap to lower the objects, which may be particularly helpful as it emulates gravity within the scene. In some embodiments, snaps are applied to a current manipulation type of the object. For example, snaps may be applied when moving, rotating, or scaling the object and may be applied in increments (e.g., 10 cm, 20 cm, or another length increment in each direction when moving the object or 5 degrees, 10 degrees, 45 degrees, or another angular increment in each direction when rotating the object or 10%, 20%, 50%, or another percentage increment when scaling the object). In some embodiments, the orientation of the object is saved within the pivot point. The application may be used to select using the saved orientation information to align the object with another element within the scene. The alignment may be partial (e.g., orientation or location or scale in selected axes) or may be complete (e.g., orientation and location and scale in all axes). However, this may not be ideal in most use cases as in reality two objects are not placed in the exact same location (i.e., occupying the same space). As such, the application may limit the alignment so it is more user friendly and accounts for object collision. FIG. 352 illustrates an example of orientation alignment of a primary object 8200 to a secondary object 8201. In this scenario, a. the secondary object 8201 is selected using the application and is the object to which the primary object 8200 is aligned with. Using the pivot point orientation, b. the application aligns the primary object 8200 to the secondary object 8201.

Sensors of the robot observe different objects as the robot moves within the environment and interacts with users, a level of interaction of which may vary depending on a type of the robot. In one embodiment, items for purchase are suggested to a user using an application of a communication device paired with the robot or a user interface of the robot based on the objects observed. For example, upon observing an article of clothing from a specific brand and given the user previously purchased items of that brand, the article of clothing is suggested to the user for purchase using the application or user interface of the robot. FIG. 353 illustrates detection of a shirt 35000 of a user detected by a sensor of a robot, a processor of the robot extracting characteristics 35001 relating to the shirt 35000; sales, coupons, and deals 35002 relating to the brand xyz of the shirt 35000; and related items 35003 to the shirt 35000. An application of a communication device suggests sales, coupons, and deals of the same brand xyz and/or suggest related items 35003 to the user for purchase. FIG. 354 illustrates an application 35004 of a communication device 35005 displaying recommended related items 35003 and deals 35002 related to the characteristics 35001. In some cases, the application gathers deals from different sources and displays them in a single coherent layout. In another example, upon observing an article of clothing of the user with a specific style, color, or material, other articles of clothing or accessories that pair well are suggested to the user using the application or user interface of the robot. In some embodiments, the processor of the robot is pre-trained to find, mix, and match different styles of fashion. In some embodiments, the processor learns user preferences based on a rate of approval or denial of suggestions. In some embodiments, the processor combines local observations with external user data such as size data, budget data, shopping habits, preferred brands, user locations, etc., at least some of which is provided using, for example, the application. This enhances an understanding of the user preferences and results in improved suggestions. Similar to the examples of clothing suggestions, other items such as furniture, appliances, technology devices, etc. may also be suggested to the user for purchase using similar methods. FIG. 355 illustrates detected chair 35200, extraction of related items 35201, and related decoration style inspiration 35202. An application may be used to suggest deals and sales of items from a same brand as the chair 35200, recommend other items based on the same style as the chair, and gather, generate, and display interior design inspiration with the same style as the chair.

Similar personalities show similar patterns towards liking of products or services. Also, similar products are likely to be liked by those sharing similar personalities. FIG. 356 illustrates a metric for similarity distance. Example A illustrates a user personality match, wherein predictions are made based on behaviors provided by the users in the group. The goal is to form a database which can be sorted from top most relevant list of customers for a particular product in order. Example B illustrates a product match, wherein predictions are made based on the own behavior of a particular user. The goal is to form a database which can be sorted from top most relevant list of items for the particular user in order. In some embodiments purchase of a product is considered a positive interaction as is used to make more predictions. This is similar to a "like" button on social media which distinguishes a single state of preference from an otherwise uniform state. In some embodiments, a return of a product may however be an indication of dislike which is contrary to the "like" button and creates a binary state of like and dislike in otherwise uniform states. In some embodiments, a five category system may be implemented such as those in review systems. The system need not to necessarily rely on explicit interaction from users for the algorithm to work. Implicit interactions are often more abundant training sets which could bear weights like "positive but unlabeled" and such. The common problem is that the databases consisting of users and items are too sparsely filled with explicit data. In a relatively dense or even somewhat sparsity, the problem would be relatively treated with clustering or regression methods. In our particular application, there is not even much web interaction or browsing data to be used. In a spatial model where recommendations need to be made, the system must heavily rely on context. If a target person has a TV or particular brand and owns a fridge of that brand it may be safely assumed that if a consumer item from that brand is offered, at the very least would not offend the target user. There is no explicit rating involved but the system may create a profile based on features extracted, objects identified, layout of the house, etc.

In some embodiments, features are extracted from semantic mapping methods. Features may be associated with text labels. In some embodiments, a collection of text labels gathered from a particular workplace creates a context. The context may be generated from the absolute number of text labels observed in a map, an order of appearance, a frequency, etc. A histogram or a bag of words may be utilized. A processing may occur offline or online. A preprocessing or post processing may be used in addition to main processing. A training phase, a prediction phase, a test phase may be part of the process. A classification or regression model may be utilized. A data structure or a vector space representation may hold the data, the labels and the context. In some embodiments, a user is stored as a primary key in a database and a user specific model is extracted from the model that is associated with the user whose environment is being semantically mapped. As such behaviors or data that pertains to this user other than what is extracted from the workspace is used in isolation or in combination with extractions from the semantic map. For example, user purchase patterns may be extracted from web or from app or their previous shopping data or how they have rated prior purchases. Return or complaint is also a kind of rating. Answering a question asked by a prospect positively or negatively is also a kind of rating. For example, answering "I have had this product for 10 years and it is still running." to a question asked by a prospect "Is this product durable?" is a positive rating.

In some embodiments, a learning model is devised based on implicit and explicit training data. If the training data is categorical, classification may be used and if training data is continuous, a regression may be used. In some embodiments filtering methods may be used or may be fused with other methods to make recommendations that a particular user may like. A recommendation may not necessarily take the form of a product recommendation. It may be a service recommendation such as offering an internal design architecture for a home, remodeling design services, remodeling construction services, such as kitchen remodeling, bathroom upgrading or even landscape services. Recommendations can be anything from a product, to a service, to a vacation package, webpage, movie, book, music, etc. When semantic meaning is extracted from the map, some filtering may be applied to weed out information that is not necessary or not useful. For example, in some contexts, color of furniture may not be considered a feature while in others, color will be included in features and wall texture (paint, wallpaper)

may not be included. This is similar to steps taken in language processing such as removing the articles (a, the, an) or other stop words or perhaps considering all tenses as the same, plural and singular as the same and such. This means if 8 chairs of a certain brand and model are detected at a dining table, it does not mean the user likes that chair model and brand 8 times more than the brand/model of the dining table. Some overly common household items are down-weighted, dampened, or normalized. In some embodiments, the number of labels included in a recommendation increases as the system learns more about the user's behavior. This is necessary to avoid overfitting when the a priori knowledge about the user is small or noisy. In some embodiments, methods employed may include entropy or Gini index. In some embodiments, the expected number of co-occurrence of certain combinations of possibilities are normalized to arrive at recommendations. In some embodiments, normalized deviation, weighting, or statistical methods, such as X2-statistics, is utilized. In some embodiments, a support vector machine may be utilized to overcome scarcity of labeled data.

In some embodiments, Louvain method for community detection may be iteratively used to maximize graph's modularity and extract clusters of users with the same preference. It can also be used to group products. Other clustering methods may be used as well.

Some embodiments employ a wizard tool to walk the user through different steps of interaction and/or decision making. The wizard provides different options to the user at each step using the application of the communication device paired with the robot. When a goal of the wizard is to help with decision making the options are presented to the user in a form of questions. The wizard decides between available options based on the user-provided answers to the questions. For example, the wizard helps the user determine the best settings and/or a schedule for a robotic vacuum cleaner based on their answers to a series of questions related to their lifestyle. Examples of questions include: how many people are living in the household? do you have a pet? if yes, does your pet shed a lot? how often do you need to vacuum the floors in a week? do you prefer the vacuum to run in the morning or in the afternoon? Based on user answers to the questions, the wizard generates a schedule for the robot specifying days and times for cleaning different rooms. The user may modify and adjust the generated schedule using the application. FIG. 357 illustrates using an application 35300 of a communication device 35301 to select a control level 35302 of the robot. The user has the option to select between essential settings, basic settings, advanced settings, and custom settings, each of which is described in further detail below. Upon selecting custom settings, various customizable settings 35303 are displayed by the application 35300, of which the user can enable or disable. FIG. 358 illustrates an example of a wizard tool of an application 35400 of a communication device 35401. The wizard tool guides a user through a certain task by dividing the task into smaller subtasks/steps, such as Step 1, Step 2, . . . , Step n, wherein at each step a choice the user makes defines a linear pathway among multiple possible pathways to completing the certain task.

In some embodiments, visual guides are provided along with the questions. For example, the user uses the application to customize an avatar that may be displayed as a visual guide while using the wizard or other functions of the application. The visual guides may be presented using different styles, such as by using simple abstract figures and shapes, stylized figures, realistic illustrations, or photos to guide the users alongside the questions. The list of questions may be hierarchical. For instance, answering yes to a specific question leads to a subset of questions related to the specific question. For example, upon answering yes to a question that asks the user if they own a pet, a subset of questions related to the pet are presented to the user. The questions and visual guides may enhance knowledge of the user and provides the robot with a means to interact with the user in a personalized way. FIG. 359 illustrates an application 35500 of a communication device 35501 displaying four examples of a visual guide 35502 alongside a quiz question 35503.

Quizzes designed with a goal of selecting a most suitable option from an array of options assigns different weights to different options for each answer of a question posed. The weights are summed for each option as the user answers each question and at the end of the quiz, the option with a highest weight is selected and presented to the user. The weighting system may assign each answer to an option (i.e., one-to-one correlation) or distribute the weights of all options to each answer. For example, a quiz is designed to select a most suitable option from three possible options. Question one includes two selectable answers A and B, wherein option weights for answer A are 25% for option 1, 40% for option 2, and 35% for option 3 and the option weights for answer B are 55% for option 1, 20% for option 2, and 25% for option 3. The weights are normalized, however, can also be whole numbers. For example, option weights for answer A are 1 for option 1, 3 for option 2, and 2 for option 3 and the option weights for answer B are 2 for option 1, 1 for option 2, and 3 for option 3. In addition to each answer, the questions may have weights as well. In such cases, a weight of each question is multiplied by a weight of the selected answer and the result summed for each option.

Different users have different preferences and behaviors, as such user experiences are customizable. For example, a first user desires access to necessary options for operating a robot as they find too many options overwhelming while a second user prefers advanced, full control of the robot and the application of the communication device paired with the robot. In some embodiments, the user chooses between different levels of control using the application. Levels of control may include simplified, lite, or basic control for the necessary settings for operating the robot; full, advanced, or complete control for all the available settings relating to the operation of the robot; and custom, customized, or personalized control, wherein the user chooses which available settings to control. The user may change the level of control at any time using the application. In some embodiments, the advanced settings are accessible by selecting a button or a link displayed by the application and appears in a separate tab when the button or the link is selected. In some embodiments, the advanced settings are accessible by choosing advanced on each tab using the application. When advanced control is selected the entire tab is converted to display both basic and advanced settings in the same tab of the application. This is helpful with categorizing settings. For example, an application of a communication device paired with a vacuum cleaner displays a tab dedicated to virtual boundaries. With basic control, a simple rectangle tool for defining virtual boundaries, a line tool for defining virtual barriers, and an option to switch to advanced control are accessible in the tab. With advanced control, additional tools such as a free drawing tool, an ellipse tool, a brush tool, a boundary modification tool, and an eraser tool are accessible in the tab.

Upon purchasing a robot (e.g., robot cleaner or service robot), a user downloads a particular application onto their smart phone by searching and downloading the application from an application store or by scanning a QR code on a packaging of the robot. After downloading the application, the application displays a sign in page. Using the application, the user creates an account with a manufacturer or brand of the robot and accesses some services. In some embodiments, the same account is used to access other services via the web. Services accessed using the application and the web are accessible through computers, smart phones, tablets, wearables, smart watches, etc. Upon opening an account, some data storage capacity is assigned to the user for storing historical maps, logs, images, settings, etc. In some embodiments, the user manages storage space to prevent storage from overgrowth. Alternatively, the manufacturer deletes older information that is less useful to the user.

In some embodiments, a trusted digital certificate is used for security, privacy, confidentiality, reliability, integrity, and accessibility of the data and services. A digital signature for the client certificate is generated using a private key upon verification. When a device (e.g., a client smartphone, a self-driving vehicle, a manual Wi-Fi enabled vehicle, a computer, a network appliance, an OIT device, an OOT sensor, an IoT camera, a plant watering device, a door lock, a tablet, a robot vacuum, a service robot, a wearable client device, etc.) accesses services, an authentication, authorization and accountability (AAA) process provides the client certificate. A client device sends a request to be granted access to some services and the service responds by sending a challenge message to the client device. The client uses the private key from its digital certificate to generate a digital signature for the challenge message. If the service opens the response to the challenge message using the client public key, the service deems the response correct. If the response is incorrect, access is denied. From time to time a digital certificate expires or is revoked. Where it is seen fit, the system may allow an expired digital certificate to be used for a predetermined period of time, number of times, number of devices using the service, type of service, or a combination thereof. In some embodiments, a weighted threshold is defined. In addition to a digital signature, a source of connection, a type of connection, and detailed information relating to a connection initiating device, SW, HW, a user, etc. may be used. In some embodiments, previously successful connections, proven successful authentications, encrypted communications, TLS/SSL/IPSec/other protocols are used. In some embodiments, a certificate authority is implemented.

In some embodiments, a consumer product is regionally restricted to a geographical area. For example, DVDs are region-specific, wherein a DVD associated with a first region does not function in other regions. Products may be regionally restricted because of, for example, regulatory certificates (e.g., CE certificate for Europe and UL certificate for North America) and/or power voltage differences (e.g., 110 Volts versus 220 Volts) and/or frequency use restrictions (e.g., a radio spectrum module working in one frequency follows regulations in one country and is impermissible in a different country). It is desirable for a consumer product to function in multiple regions, such as for traveling purposes or when gifting a product to someone living in another region. Upon a consumer product initially connecting to Wi-Fi within a different geographical region, the product begins sending messages to the cloud to authenticate and use of the application associated with the consumer product. When determined the region the product was purchased within does not match the region from which the product is attempting to establish a connection from, a temporary token is generated to allow use for a limited amount of time. This may occur in the background for a first duration or a message may be sent to the user. In some embodiments, a message is sent to the application, prompting the user to accept a duration of temporary access will be extended. In some embodiments, the user uses the application to indicate how long a temporary access token is needed and an approval is granted manually or automatically depending on company policy. In some embodiments, the user uses the application to indicate that the product is moved permanently and a region of the consumer product is changed permanently. In some cases, a number of times a region of the product is changed during a life of the product is restricted. In some embodiments, changing ownership of the product has limitations. For example, a security robot cannot be sold to a different user without prior data being wiped from the security robot, which may be controlled on the cloud. In another example, a robot is leased or used on subscription basis, wherein the price per subscription is different for business use and personal use. For instance, a vacuum cleaning robot designed for use within a consumer home is purchased on a subscription basis for an all-inclusive (e.g., repair, parts, etc.) monthly fee cannot be used in a hair salon. FIG. 360 illustrates device management 35600 operating on the cloud. Upon operating a robot 35601 in a new region that differs from a region from which the robot 35601 was bought, the device management 35600 detects the robot 35601 is attempting to connect to the device management 35600 from the new region. The device management 35600 generates temporary or permanent token based on user input, company policy, and regulations of the new region to authenticate the robot 35601. An application 35602 associated with the robot 35601 prompts a user of the robot 35601 to provide input to specify details 35603 on the use of the product in the new region.

In some embodiments, a type of service is subjected to regional restrictions. For example, a service robot functions as a communication device to establish phone calls or video streams and such. When the service robot is purchased in North America, the purchase price includes free phone call and video streaming services within North America. As such, transportation of the service robot to Europe is a means for overcoming fees associated with international phone calls and video streaming services. Such service usage is managed by company policy, regulations, and such. For example, some or all services may be denied or charged an extra fee for usage. In one example, an automobile (e.g., autonomous, partly autonomous, or Wi-Fi enabled manual vehicle) may travel from one country to another for recreational or commercial purposes, such as cross border traveling buses and trucks. In another example, systems for control against gaming the system do not cause trouble for legitimate use. An access token is used to control various aspects and levels of access and permissions may be automatically granted or granted upon request from a user. The permissions may be automatically and/or manually approved. In some embodiments, a policy is the basis of permission approvals.

In some embodiments, geographical separations are more granular than a country level. For example, the US may be divided into US east and US west or US north and US south) or US coastal states and US inland states. In some embodiments, the robot requests a content stream. For example, a car traveling across a country or from country to country uses a music streaming service. It is more efficient for the music streaming service to provide the music stream from a source closer to a current location of the robot. As such, the music streaming service determines a content fragment geographically close to the location of the robot and starts streaming music. An estimate of bandwidth available to the robot may be determined from previous data packets or state of the buffered data. Accordingly, a fragment is sent based on the estimated bandwidth and buffering capabilities of the robot and a confidence score of those estimations.

In some embodiments, hardware security modules are used or the security functions are implemented in SW executed by the processor of the robot. For example, FIG. 361 illustrates an example of a means of security wherein 1. a certificate is generated and sent for validation to a certificate server, 2. the certificate server verifies and signs the certificate, 3. the signed certificate is presented to a communication device and stored in the certificate database including information of the issuer, the subject, the public key, and issuer signature, 4. the signed certificate including the information is encrypted and presented to the robot, and 5. the signed certificate including the information is stored by the robot.

In some embodiments, privacy and security settings may be configured by a user to define how information is stored, to what detail, for how long, and where logs and the information are stored. The user may provide a cloud service storage, where the data is stored and retrieved by a fleet system or other systems through an API. At any point, the user may access the data storage interface and modify or delete logs, data objects, etc. or change access permissions. Since the data storage cloud is a different entity than the fleet management system, the user may decide to deprive the fleet management system from data the user wishes to be inaccessible or unusable. This is an improvement over the current state of the art, wherein, for example, a social network has ownership or control over the access of data. For example, in a social network, the user may opt out of a service but can never be sure that data is physically removed from places the social network can access. Since fleets connect to the cloud storage service through an API, the user may configure the settings accessible through the API such that the actual data is never revealed and only abstract information that is unusable for future use or other purposes than the permission granted leaves the data storage cloud service.

Some embodiments employ encryption of messages with certificates payload encryption SSL/TSL authentication/ username and password for logging into the application of the communication device.

Figure 367A:
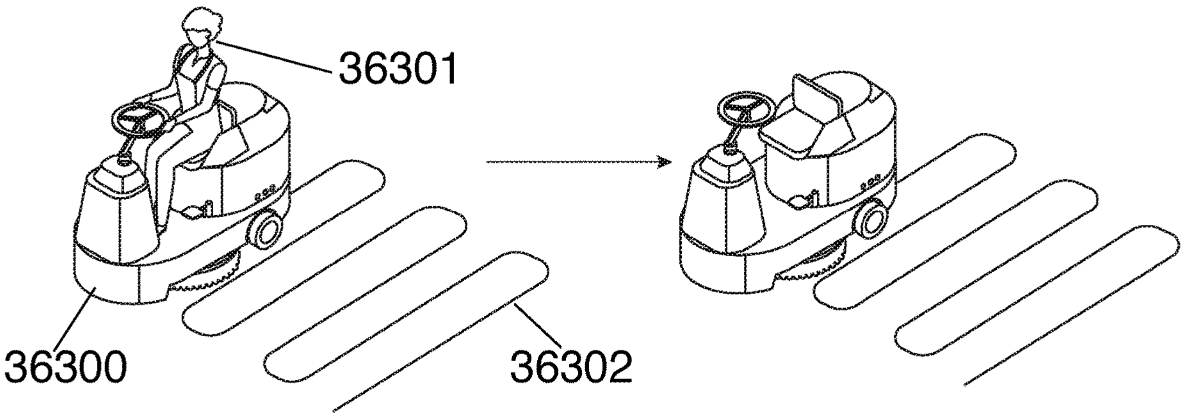
Figure 367B:
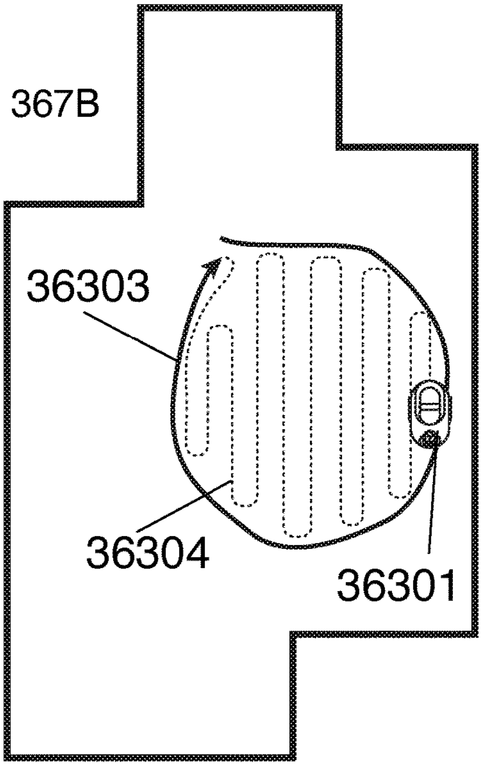
Figure 367C:
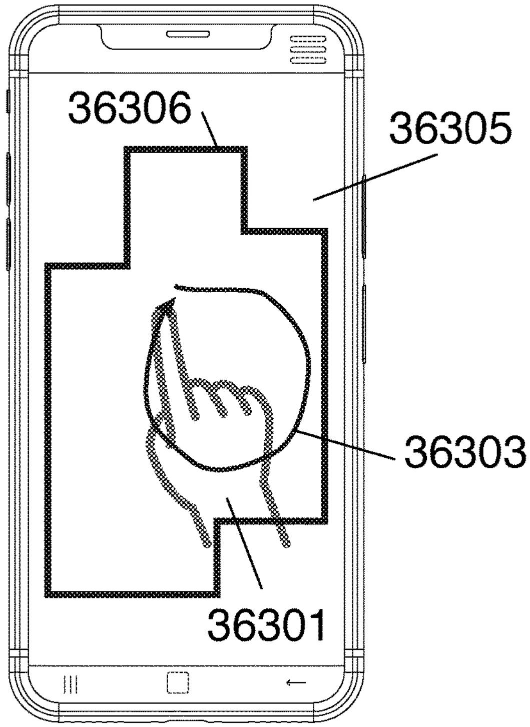
Figure 368A:
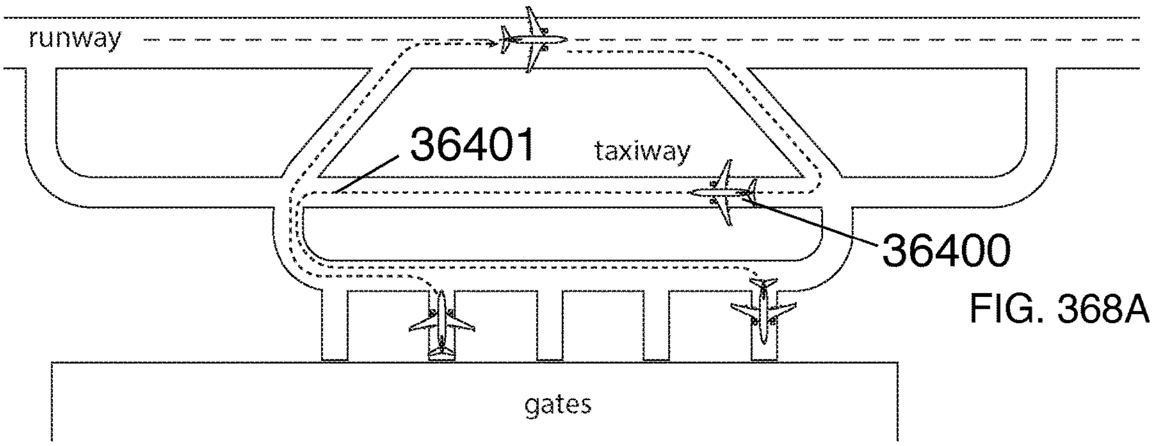
Figure 368B:
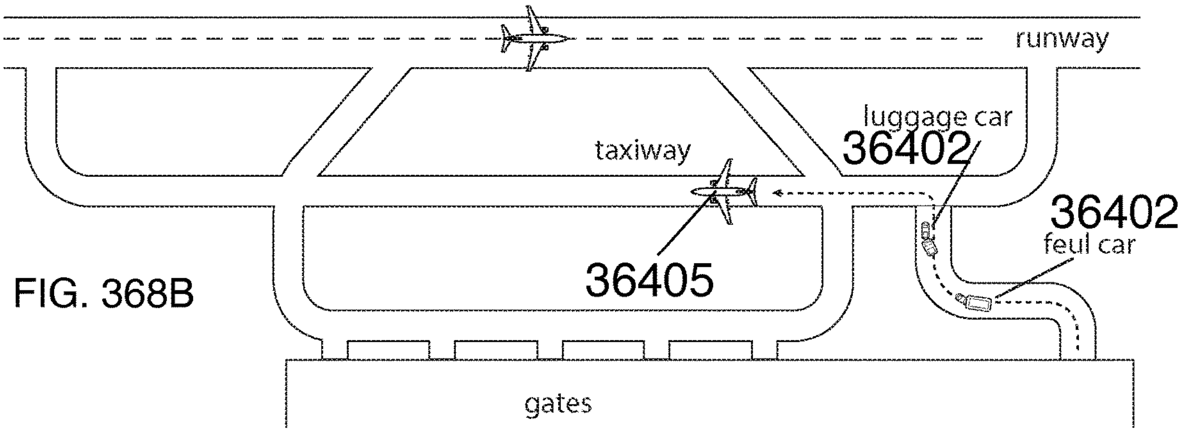
Figure 368C:
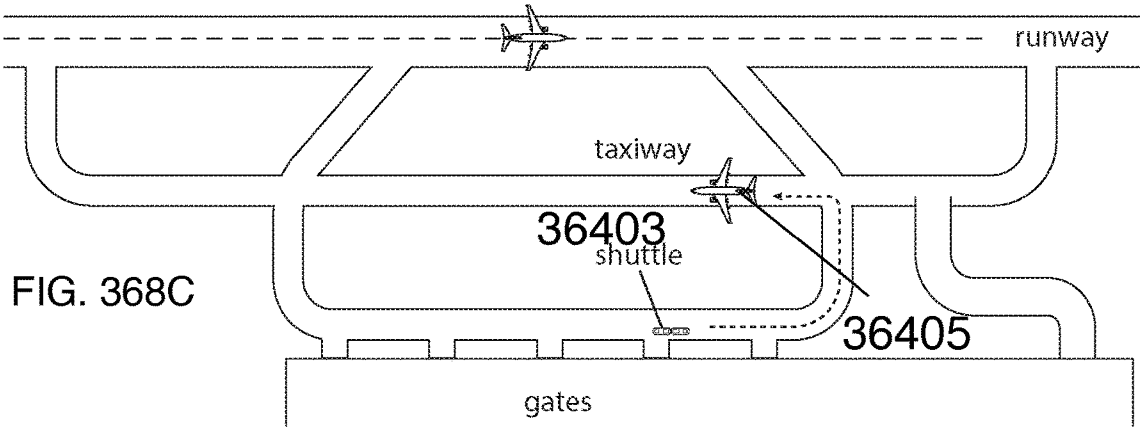

Some embodiments train the robot such that the robot performs a job better during a next episode. A job may be divided spatially or temporally and user feedback may be provided accordingly. For example, coverage of one area may be acceptable while coverage of another area may be unacceptable. Dividing an environment spatially allows instructions to be assigned to subareas. For example, division of an environment into rooms allows a user to select a room within which coverage is unacceptable, requiring the robot to execute an alternative path plan. FIG. 362 illustrates an example of an application 35800 of a communication device 35801 paired with the robot. A user 35802 selects a room 35803 by touching the room 35803 or double tapping the room 35803 displayed on the screen, after which room 35803 is displayed with possible instructions 35804 to assign to the room 35803. In one embodiment, the application comprises a training mechanism for each segment or subarea of the environment. FIGS. 363A and 363B illustrate an application 35900 of a communication device 35901 paired with the robot displaying a map 35902 divided into subareas. In FIG. 363A, a user 35903 selects a carrot icon 35904 within subareas A, B, and C, indicating an acceptable division of these subareas. The user 35903 select a stick icon 35905 within subarea D, indicating the division is unacceptable. The division of subarea D is removed and the application displays another possible division of the subarea D, as shown in FIG. 363B. In FIG. 363B perforated lines 35906 suggest division options that the user may accept by selecting the carrot icons 35904. FIG. 364 demonstrates a similar concept for map warping, wherein an application 36000 of a communication device 36001 paired with the robot displays a map 36002 of an environment. Carrot icons 36003 and stick icons 36004 are displayed at boundaries and a user 36005 selects the carrot icon 36003 to indicate a correct boundary or the stick icon 36004 to indicate an incorrect boundary, causing the application to adjust the respective boundary. Correction of the boundaries results in the map 36006. FIG. 365 demonstrates a similar concept for object recognition and classification, wherein an application 36100 of a communication device 36101 paired with the robot displays an image of an object 36102 and an object type 36103 of object 36102. Carrot icons 36104 and stick icons 36105 are displayed and a user 36105 selects the carrot icon 36104 to indicate a correct object type classification or the stick icon 36105 to indicate an incorrect object type classification. The feedback improves the classification algorithm for future classifications. FIG. 366 demonstrates a similar concept for path planning, wherein an application 36200 of a communication device 36201 paired with the robot displays paths 36202 of the robot within different subareas of a map 36203 of an environment. Carrot icons 36204 and stick icons 36205 are displayed for different paths 36202 executed in subareas and a user 36206 selects the carrot icon 36204 to indicate an acceptable path or the stick icon 36205 to indicate improvement is needed for the planned paths. The paths for which stick icons 36205 are selected are re-planned to paths 36207, wherein the user selects the carrot icon 36204 or stick icon 36205 to provide feedback on the re-planned paths 36207. The feedback improves a path planning algorithm of the robot such that over time efficient paths 36207 are planned. FIG. 367A demonstrates a similar concept for navigation, wherein a commercial cleaning robot 36300 is manually trained by a user 36301. The user 36301 drives the robot 36300 along a path 36302, which the robot 36300 then autonomously mimics while avoiding or driving around obstacles. The user 36301 provides feedback in a form of, for example, a carrot or stick badge, for each correctly autonomously executed segment. FIG. 367B illustrates an example of a segment, wherein the user 36301 drives the robot 36300 in a circle 36303, within which the robot 36300 must clean by driving along spaced parallel lines 36304 while avoiding obstacles. FIG. 367C illustrates the user 36301 using an application 36305 paired with the robot 36300 to draw the circle 36303 within the displayed environment 36306, rather than driving the robot 36300 in the circle 36303. FIG. 368A illustrates using a similar concept to that shown in FIGS. 367A and 363B for path planning training for an airplane 36400 such that the airplane 36400 can autonomously taxi to gates after landing or the runway before takeoff by driving along paths 36401. FIGS. 368B and 368C illustrate using a similar concept to that shown in FIGS. 367A and 367B of path planning training for a service airport vehicle 36402 (e.g., luggage transport, refueling) and shuttle busses 36403 such that the service vehicle 36402 and shuttle buses 36403 can autonomously drive along paths 36404 to and from airplane 36405.

Based on robot training, the robot re-executes a task immediately or improves execution of the task during a next work session. In embodiments, positive and negative reinforcement are used by the processor of the robot or other robots to improve judgment. Some algorithms may use positive and negative examples with different weights. Some embodiments may use passive training, wherein the user does not provide an input and an interpretation is formulated and considered with some lower weight than explicit training. Each training may actuate a correction during a current work session or a status and contributes to improved decision-making, with decisions having a higher probability of being a choice a human would make.

An electrical vehicle or robot use batteries to run and use battery chargers to charge. Power management is specifically important for electric vehicles (EV) and robotic devices due to the fact that they cannot carry an unlimited number of cells and the heavier the robot becomes, the more power they require. This disclosure explains battery management system (BMS) innovations that improve the state of the art. Lithium-ion batteries which are the de-facto battery cells used in such robotics and EV may suffer from undesired battery State of Charge (SOC) or instances of over-current, over-voltage, over-charging, and over-discharging. Cell aging is just one aspect of the issue to be considered. Use of Lightweight algorithms as explained in patent applications {insert} allows use of a fraction of computational resources of the older systems which means more power savings. Constant current (CC) charging, constant-voltage (CV) charging, and constant-current-constant voltage (CC-CV) charging are well known in the industry. However, each have a short coming which is why this disclosure explains a specific variation of multistage constant-current (MCC) which takes advantage of statistical sampling intermittently and probabilistic algorithms to avoid waste of energy and battery degradation.

A power management system is disclosed such that it manages power distribution, charging and in addition supports a sleep mode and a deep sleep mode. In some embodiments two step switches would provide 5V and 3.5V to the components. In preferred embodiments, a single step switch is used to provide 5V and an LDO is used to provide 3.5V from the 5V. The charging method includes several constant current stages, where in each stage the current is gradually decreased as the terminal voltage reaches each voltage step threshold until the terminal condition is reached. In some embodiments, the first stage starts with an aggressive ramped up CV charging method. In some embodiments, the multistage method is enhanced with dynamic predictive control with additional sample points to allow transition from one stage to the next. In run time, when the robot is in pause or in standby, some components may be shut down to save power and turned back on when there is any activity observed. To operate autonomously, mapping methods are implemented within robots such that they may autonomously create a map of the working environment and subsequently use it for navigation.

Minimizing power consumption in communication wirelessly or wired is an objective in robotic systems due to geometric and other limitations. As such, power aware communication protocols may be employed. Other methods may utilize sleep mode, deep sleep mode or standby mode. In some embodiments, the robot reduces or eliminates power supply to components where they may not be immediately used. User interface and LED lighting may also be dimmed or turned off. The system may be awakened by a Wi-Fi signal coming in through an app or a button or a human voice. For contextual mapping and recommending items that may belong to an understood map, naïve Bayes methods may be used. Supervised and unsupervised learning algorithms may be used. In some embodiments, conditional independence between items may be assumed. In some embodiments, Maximum a Posterior (MAP) estimation may be used.

In some embodiments, wireless power may be used to keep the robot in one mode of several power saving modes, such that the robot stays alive and responsive when the robot is not charging. FIG. 369 illustrates various power modes of the robot and possible transitions between modes indicated by arrows. The modes include normal operation, standby, suspend wherein new data is not acquisitioned but latest data and content inside registers are kept, deep suspend (the lowest power mode), low power and/or sleep mode when the robot is not fully asleep, and a least power mode when the robot is not fully awake. In the low power and/or sleep mode and the least power mode the robot alternates between sleep and awake, as shown in graph 36500. When the robot is awake, all functionalities are active. FIG. 370 illustrates impedance matching between a device and a source.

Some embodiments determine a risk associated with a particular event (e.g., fleet failure), wherein risk=frequency× consequence or Log of (risk)=log (frequency)+log (consequence). In embodiments, many small failures and delays lead to huge catastrophes. Examples of consequences of fleet failure include a need for human intervention (e.g., a robot leaves a facility and needs to be towed, which is costly), reputation of the fleet or time to deliver (e.g., fleet providing delivery services), accidents (e.g., damage of equipment or people), and incomplete or low quality completed jobs (e.g., poor cleaning by a commercial cleaning fleet of robot). Some embodiments employ preventive maintenance, such as changing wearables, inspecting wearables, inspecting moving parts, and logging hours. Some embodiments employ predictive maintenance, such as predicting wear and tear time, statistical processes, precision maintenance, and continuous improvements. Some embodiments employ emergency management, such as hazard identification, training maintenance staff, quality management, response time standards, and fail safe systems. Some embodiments consider additional factors such as impacts/hits/drops/bumps/punctures, misalignments, insufficient/ineffective lube, dirt/humidity/moisture/heat, sun/snow/rain/dust/sandstorm, and overloads/poor fit/poor quality components. FIG. 371 illustrates an example of a fleet system for a restaurant, including interfaces used for various tasks, such as a user ordering food, a courier receiving delivery instructions, a restaurant managing food preparation, accounting and quality, and an operator managing fleet control. The system determines whether the order is received remotely or locally and as a result determines the delivery method. The system processes payments via debit or visa and provides notification of the order to the courier and the restaurant and stores notifications in a database. The system obtains user response to surveys for quality control. The system employs fleet management and repair and fleet risk, ensuring the fleet is maintained such that risk is below a predetermined threshold. FIG. 372 illustrates an example of a software application 36800 used for managing a fleet of robots. The software application 36800 displays A. a location 36801 of fleet assets within a map 36802. Using the software application 36800, B. and C. a particular robot 36803 of a fleet is selected and information 36804 relating to the robot is displayed and settings 36805 are adjusted, such as when to change a battery of the robot.

In some embodiments, sensors of the robot collect data relating to robot behavior within different geographical regions. The data may be used to improve performance of the robot during runtime or in a design and manufacturing phase of the robot. For example, a level of wheel slippage on floors within certain regions indicates a need to fabricate the wheels from a different material for robots manufactured and shipped to those regions. In another case, at a time of purchase, a supplier offers a type of product or component of the product that is more suitable for a region the purchaser live in. The region may be determined based on location information of the purchaser or a destination the purchaser indicates the product is to be used. For example, a heavier robot with a lower center of mass and different types of tires may be more suitable for regions in which increased wheel slippage is expected. In another example, robots with mopping capabilities are suggested for regions having a higher number of homes with hard flooring. FIG. 373 illustrates an example of a process of an AI algorithm using data of the robot gathered over time and associated with different geographical zones or regions for future designs, customer service, product suggestions, targeted advertisements, and spare part shipment.

As multiple robots operate within their environments their sensors collect different types of data. Over time, large databases for different categories are formulated from the data. The big data may be used in different types of surveys, such as a number of rooms and room types (e.g., living room, bedroom, kitchen, bathroom, etc.) within homes in different regions; a percentage of different floor types (e.g., carpet, hardwood, laminate, ceramic, stone, etc.) within homes in different regions, useful information for flooring companies such that marketing of specific flooring types in different regions may be targeted; and a type of paint or wall coverings (e.g., wallpaper, paint, stucco, exposed concrete, wooden panels, etc.) used in homes in different regions, as well as dominant colors of wall covering or paint, frequency of changing wall covering or paint, etc. may be useful for paint/wall covering companies or distributors. Similarly, other data such as types of plants, furniture, appliances, etc. within homes in different regions is useful for vendors, suppliers, and distributors in those regions. These data may be combined and cross referenced with other data to achieve new conclusions. For example, a family of four change furniture or home décor more frequently in comparison to a single person; or people with pets purchase certain pet friendly furniture. By analyzing these data, the AI algorithm may estimate upcoming local trends with different probabilities. Estimations may be sold to different companies in a report format to aid in decision-making of future productions, designs, and distributions. FIG. 374 illustrates an example of a process of an AI algorithm using big data gathered over time and associated with different geographical zones or regions to predict future trends using machine learning (ML) and neural network (NN) and monetizing the gathered data and/or predictions.

In some embodiments, a message is generated on the robot, a communication device, or a user interface of an application of a communication device (e.g., a computer or smart phone) indicating human intervention is necessary to continue operation of the robot. In some embodiments, the message is sent from the robot to a user responsible for maintaining the robot via a network, the cloud, or a Wi-Fi or cellular module. In some embodiments, the message includes a map of the environment and a last known location of the robot within the map. In some embodiments, connectivity of the robot with the application may be diagnosed (e.g., to determine where the disconnect is). In some embodiments, a current status of the robot is cleared upon the issue being resolved or attended to. In some embodiments, the message is escalated when the robot is not assisted within an expected period of time, wherein escalation comprises any combination of (1) notification (i.e., a red flag), (2) involvement of additional users, (3) repeating messages at a higher than normal frequency, and (4) adding more attention-grabbing language. FIG. 375 illustrates an example of a process of generating and sending messages when human intervention is necessary to continue operation of a robot.

In some embodiments, the robot may include speakers and a microphone. In some embodiments, audio data from the peripherals interface may be received and converted to an electrical signal that may be transmitted to the speakers. In some embodiments, the speakers may convert the electrical signals to audible sound waves. In some embodiments, audio sound waves received by the microphone may be converted to electrical pulses. In some embodiments, audio data may be retrieved from or stored in or transmitted to memory and/or RF signals. In some embodiments, a user may instruct the robot to navigate to a location of the user or to another location by verbally providing an instruction to the robot. For instance, the user may say "come here" or "go there" or "got to a specific location". For example, a person may verbally provide the instruction "come here" to a robotic shopping cart to place bananas within the cart and may then verbally provide the instruction "go there" to place a next item, such as grapes, in the cart. In other applications, similar instructions may be provided to robots to, for example, help carry suitcases in an airport, medical equipment in a hospital, fast food in a restaurant, or boxes in a warehouse. In some embodiments, a directional microphone of the robot may detect from which direction the command is received from and the processor of the robot may recognize key words such as "here" and have some understanding of how strong the voice of the user is. In some embodiments, electroacoustic devices such as speakers or other audio components and/or electromechanical devices that convert energy into linear motion such as a motor, solenoid, electroactive polymer, piezoelectric actuator, electrostatic actuator, or other tactile output generating component may be used. In some cases, a directional microphone may be insufficient or inaccurate if the user is in a different room than the robot. Therefore, in some embodiments, different or additional methods may be used by the processor to localize the robot relative to the verbal command of "here". In one method, the user may wear a tracker that may be tracked at all times. For more than one user, each tracker may be associated with a unique user ID. In some embodiments, the processor may search a database of voices to identify a voice, and subsequently the user, providing the command. In some embodiments, the processor may use the unique tracker ID of the identified user to locate the tracker, and hence the user that provided the verbal command, within the environment. In some embodiments, the robot may navigate to the location of the tracker. In another method, cameras may be installed in all rooms within an environment. The cameras may monitor users and the processor of the robot or another processor may identify users using facial recognition or other features. In some embodiments, the processor may search a database of voices to identify a voice, and subsequently the user, providing the command. Based on the camera feed and using facial recognition, the processor may identify the location of the user that provided the command. In some embodiments, the robot may navigate to the location of the user that provided the command. In one method, the user may wear a wearable device (e.g., a headset or watch) with a camera. In some embodiments, the processor of the wearable device or the robot may recognize what the user sees from the position of "here" by extracting features from the images or video captured by the camera. In some embodiments, the processor of the robot may search its database or maps of the environment for similar features to determine the location surrounding the camera, and hence the user that provided the command. The robot may then navigate to the location of the user. In another method, the camera of the wearable device may constantly localize itself in a map or spatial representation of the environment as understood by the robot. The processor of the wearable device or another processor may use images or videos captured by the camera and overlays them on the spatial representation of the environment as seen by the robot to localize the camera. Upon receiving a command from the user, the processor of the robot may then navigate to the location of the camera, and hence the user, given the localization of the camera. Other methods that may be used in localizing the robot against the user include radio localization using radio waves, such as the location of the robot in relation to various radio frequencies, a Wi-Fi signal, or a sim card of a device (e.g., apple watch). In another example, the robot may localize against a user using heat sensing. A robot may follow a user based on readings from a heat camera as data from a heat camera may be used to distinguish the living (e.g., humans, animals, etc.) from the non-living (e.g., desks, chairs, and pillars in an airport). In embodiments, privacy practices and standards may be employed with such methods of localizing the robot against the verbal command of "here" or the user.

In some embodiments, the processor of the robot may monitor audio inputs, environmental conditions, or communications signals, and a particular observation may trigger the robot to initiate stationary services, movement services, local services, or remotely hosted services. In some embodiments, audio input triggers may include single words or phrases. In some embodiments, the processor may search an audio input against a predefined set of trigger words or phrases stored locally on the robot to determine if there is a match. In some embodiments, the search may be optimized to evaluate more probable options. In some embodiments, stationary services may include a service the robot may provide while remaining stationary. For example, the user may ask the robot to turn the lights off and the robot may perform the instruction without moving. This may also be considered a local service as it does not require the processor to send or obtain information to or from the cloud or internet. An example of a stationary and remote service may include the user asking the robot to translate a word to a particular language as the robot may execute the instruction while remaining stationary. The service may be considered remote as it requires the processor to connect with the internet and obtain the answer from Google translate. In some embodiments, movement services may include services that require the robot to move. For example, the user may ask the robot to bring them a coke and the robot may drive to the kitchen to obtain the coke and deliver it to a location of the user. This may also be considered a local service as it does not require the processor to send or obtain information to or from the cloud or internet.

Other devices may detect the name of the robot and transmit information to the processor of the robot including the direction and location from which the audio input originated or was detected or an instruction. For example, a home assistant, such as an Alexa, may receive an audio input of "Bob come here" for a user in close proximity. The home assistant may perceive the information and transmit the information to the processor of Bob (the robot) and since the processor of Bob knows where the home assistant is located, Bob may navigate to the home assistant as it may be the closest "here" that the processor is aware of. From there, other localization techniques may be used or more information may be provided. For instance, the home assistant may also provide the direction from which the audio input originated.

In some embodiments, the processor of the robot may intelligently determine when the robot is being spoken to. This may include the processor recognizing when the robot is being spoken to without having to use a particular trigger, such as a name. For example, having to speak the name Amanda before asking the robot to turn off the light in the kitchen may be bothersome. It may be easier and more efficient for a user to say "lights off" while pointing to the kitchen. Sensors of the robot may collect data that the processor may use to understand the pointing gesture of the user and the command "lights off". The processor may respond to the instruction if the processor has determined that the kitchen is free of other occupants based on local or remote sensor data. In some embodiments, the processor may recognize audio input as being directed towards the robot based on phrase construction. For instance, a human is not likely to ask another human to turn the lights off by saying "lights off", but would rather say something like "could you please turn the lights off?" In another example, a human is not likely to ask another human to order sugar by saying "order sugar", but would rather say something like "could you please buy some more sugar?" Based on the phrase construction the processor of the robot recognizes that the audio input is directed toward the robot. In some embodiments, the processor may recognize audio input as being directed towards the robot based on particular words, such as names. For example, an audio input detected by a sensor of the robot may include a name, such as John, at the beginning of the audio input. For instance, the audio input may be "John, could you please turn the light off?" By recognizing the name John, the processor may determine that the audio input is not directed towards the robot. In some embodiments, the processor may recognize audio input as being directed towards the robot based on the content of the audio input, such as the type of action requested, and the capabilities of the robot. For example, an audio input detected by a sensor of the robot may include an instruction to turn the television on. However, given that the robot is not configured to turn on the television, the processor may conclude that the audio input is not directed towards the robot as the robot is incapable of turning on the television and will therefore not respond. In some embodiments, the processor of the robot may be certain audio inputs are directed towards the robot when there is only a single person living within a house. Even if a visitor is within the house, the processor of the robot may recognize that the visitor does not live at the house and that it is unlikely that they are being asked to do a chore. Such tactics described above may be used by the processor to eliminate the need for a user to add the name of the robot at the beginning of every interaction with the robot.

In some embodiments, a single human remote driver is assigned to drive or provide driving assistance to more than one robot. For example, a robot operates autonomously in easy to navigate areas with low pedestrian or bike traffic, however, the robot requires human supervision when operating near school districts or a city center. In some embodiments, the robot navigates autonomously until reaching an area with a low confidence in information upon which the robot stops, sends an alarm to an application of a communication device of a human operator, and waits for human input via the application prior to moving into the area. For example, a delivery robot autonomously navigates along a path on a sidewalk and stops upon reaching a crosswalk and waits until a human remotely controls movement of the robot using a joystick or an application of a communication device paired with the robot to cross the crosswalk. Rather than several delivery persons working to deliver parcels across a city, multiple parcels are stored in a compartment of one or more robots that travel to multiple delivery drop off destinations and are supervised by a single human operator.

In some embodiments, the robot transmits a notification to an operator when assistance is required. The operator receives the notification on a computing device or an application executed by the computing device. In some embodiments, the notification is generated by a control system overseeing the robot as the control system is equally aware of the robot. In some embodiments, notifications are generated in advance based on a prediction of the robot reaching a point where assistance is required. In some embodiments, the notifications are presented to the operator in an order of receipt, a weighted order of receipt, based on a criticality of attention required from the operator, urgency of item delivery, etc., the order being determined by the processor of the robot using an AI algorithm. For example, a notification is given less priority when human assistance is required to cross the robot across a crosswalk after a stoplight turns green. In embodiments, the application used by human operator displays notification order changes in a background or only displays a current task, wherein a next task is displayed after the current task is complete. The next task is determined based the highest priority notification at the time of completion of the current task, as determined by the processor using the AI algorithm. In some embodiments, a human sorts tasks associated with notifications based on their nature, assigns notification priorities, and assigns the tasks to other human drivers. In some embodiments, the processor of the robot generates a planned path, the application displays the planned path for an operator to approve, and the operator approves the planned path by providing user input designating an approval or disapproval of the planned path (e.g., selecting a button or swiping a screen of the computing device in a particular direction). Since real-time data is used in determining a planned path or other decisions, proposals generated by the processor of the robot constantly change with time depending on the real-time data. A proposal to cross or move is not transmitted to a remote operator of the robot when the processor of the robot decides to wait for a path to clear. In some embodiments, methods of virtual reality, mixed reality, or augmented reality are used to improve driving instructions provided by the operator. FIG. 376 illustrates an example of an operator 37200 remotely driving a robot. The operator 37200 is viewing the robot 37201 within a bird's eye view map 37202 displayed using an application executed on computing device 37203. The map is constructed using data captured by cameras and LIDAR sensors disposed on the robot 37201 and/or prior spatial models created separately (e.g., HD maps created in advance or by crowd source HD map building methods wherein each autonomous or non-autonomous vehicle captures videos and distance readings using sensors and uploads them to a data center). FIG. 377 illustrates the application displaying different views, such as left, right, and front cameras views 37204 and street camera view 37205, in addition to the bird's eye view map 37202. FIG. 378 illustrates multiple monitors 37206, each with different camera views, left, front, and right camera views 37204. The operator 37200 changes a view by providing user input designating a selection to a particular type of view 37207. FIG. 379 illustrates a VR headset 37208 the operator 37200 uses to place themselves within an environment of the robot 37201 that is rendered realistically. The operator 37200 uses AR glasses 37209 to view enhanced camera views of the environment, wherein some information 37210 is superimposed on the monitors 37206. The AR system provides video captured by cameras disposed on the robot enhanced with any of depth values and statistics, visual signals (e.g., color), arrows, computer generated graphics, icons, sound tracks (e.g., audio data), simulated crossings, simulated future time steps, and the like.

In embodiments, the operator operates and provides instructions to the robot, such as an instruction to wait, cross an intersection, etc., using one or more of a variety of input devices. FIG. 380 illustrates examples of input devices, including but not limited to, keyboard, customized keypad, mouse, trackpad, joystick, a gamepad, a remote steering wheel, a touch screen device (using a hand or pen), voice command, VR or AR glasses and/or controllers, and hand gestures. Other options include mixed reality input devices, panel, etc. In some embodiments, voice commands are translated to text via a voice-to-text software using ML and deep learning capabilities. FIG. 381 illustrates an example of a process of translating a voice command received by a mic 37700 into text 37702 via the NLP module 37701. The text 37702 is then provided as a command 37703 to the robot. FIG. 382 illustrates an example of a process of translating a gesture command captured by a camera 37800 into text 37802 via gesture recognition 37801. The text 37802 is then provided as a command 37803 to the robot. FIG. 383 illustrates an example of a process of translating a voice command received by a mic 37900 into text 37902 via NLP processing 37901 using a neural network and a process of translating a gesture command captured by a camera 37903 into text 37902 via image processing 37904 using a neural network 37905. The text 37902 is then provided as a command 37906 to the robot.

In some embodiments, maintaining balance is critical for robots, such as those that carry loads. For example, robot waiters carrying food within a restaurant, delivery robots carrying delicate loads such as liquids, home assistant robots such as mobile tables and cabinets, and dolly robots carrying video cameras that need stability when recording. FIG. 384 illustrates an example of a robot waiter 38000 carrying food 38001, a delivery robot 38002 delivering drinks 38003, a home assistant robot 38004, and a dolly robot 38005 comprising a video camera 38006. FIGS. 385A and 385B illustrate the robot waiter 38000 comprising various types of sensors (e.g., gyro sensor, hall sensor, IMU sensor, image sensor, etc.) and motorized arms 38007 including motors 38008 for holding a plate 38009 carrying the load 38001 and balancing the plate 38009 in relation to the robot 38000.

Figure 386:
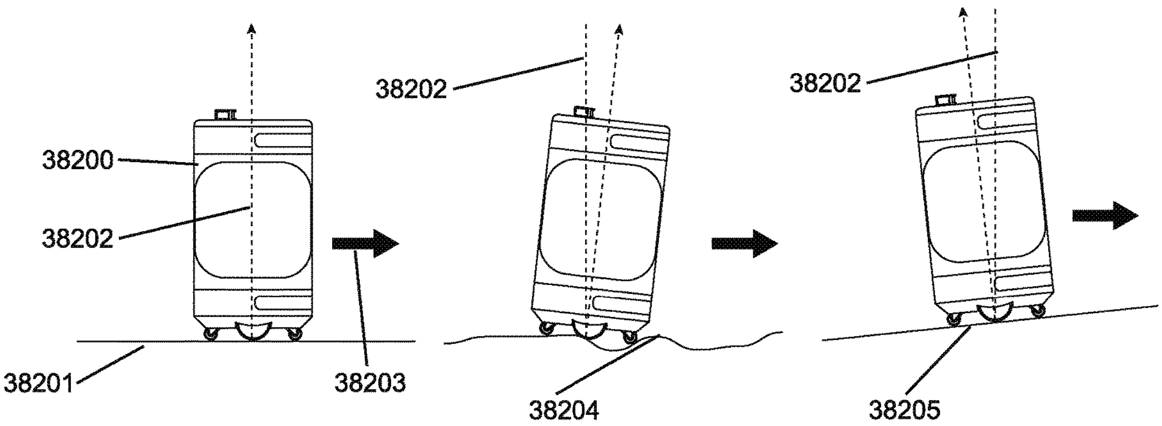
Figure 387:
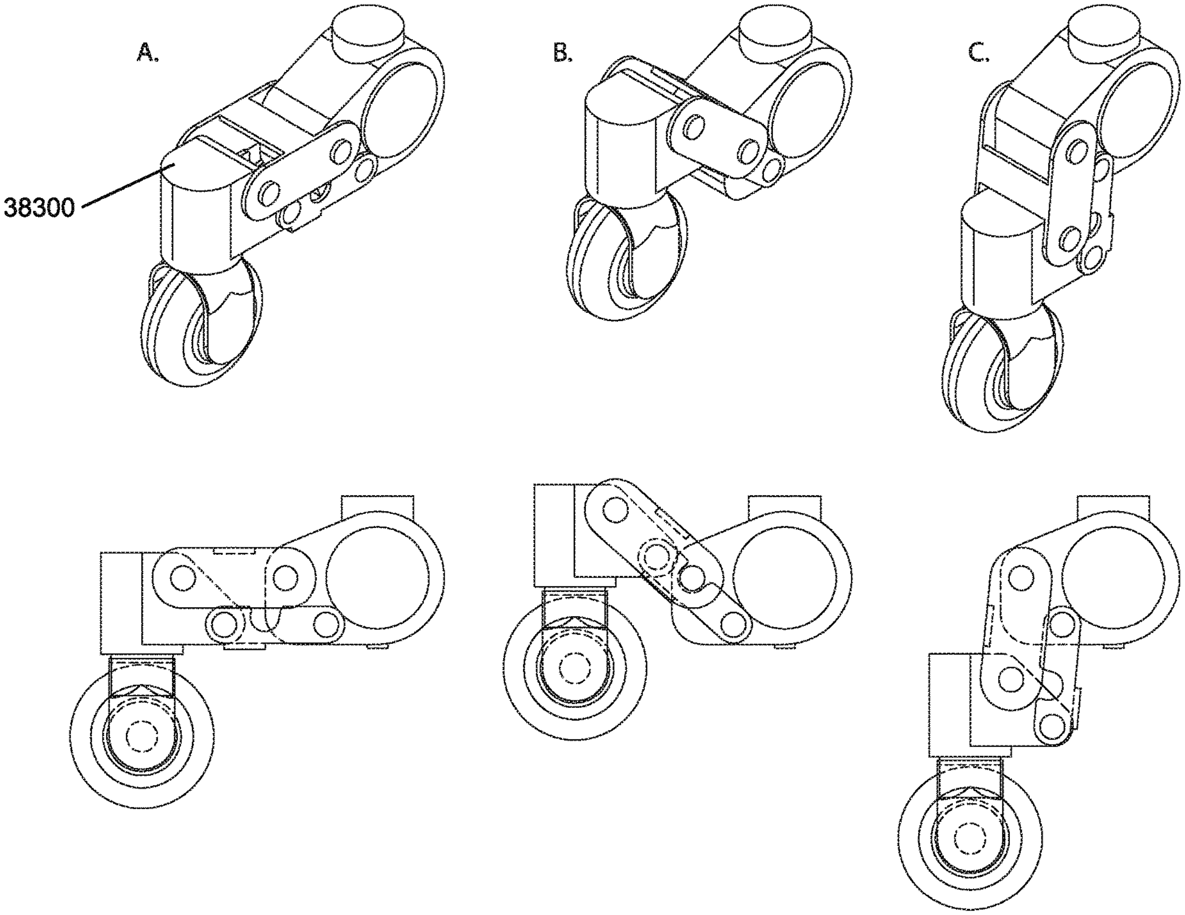
Figure 388:
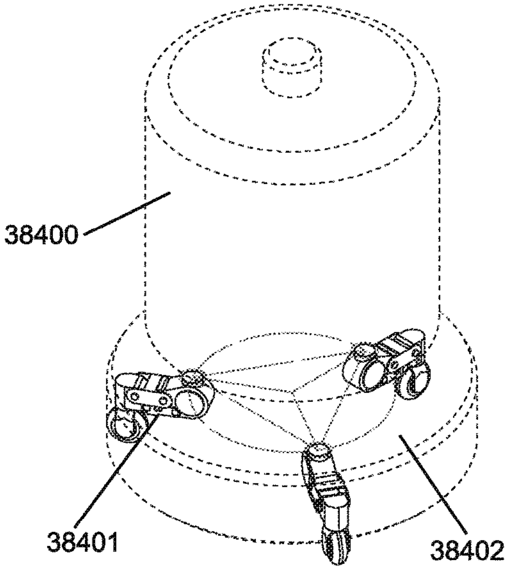
Figure 389:
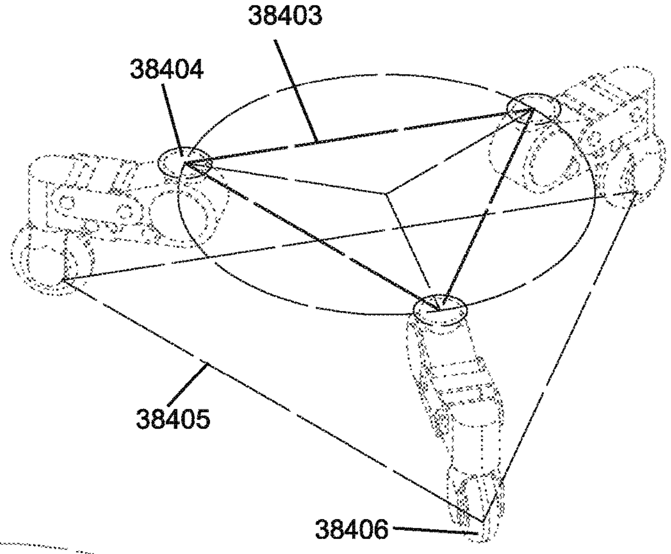
Figure 390:
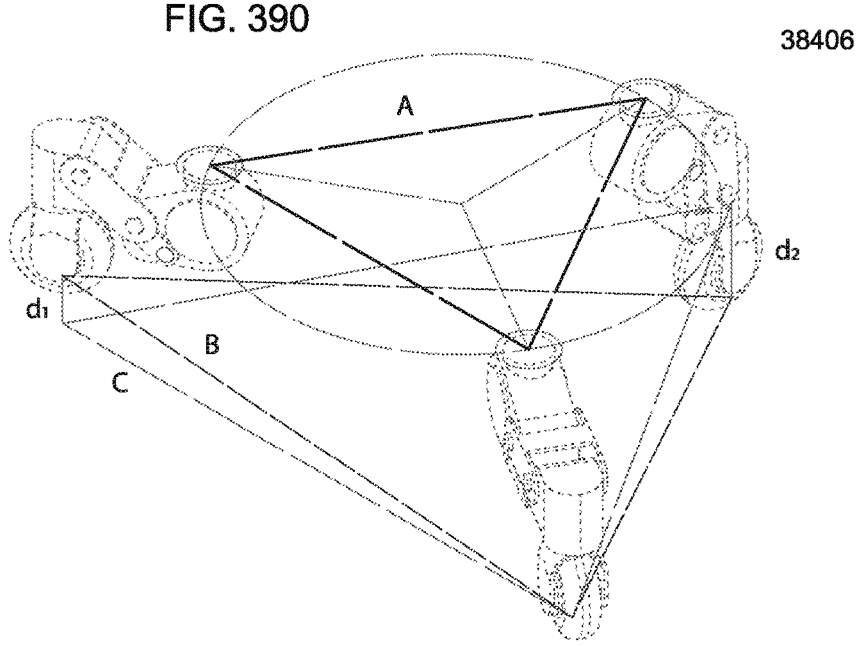

In some embodiments, robots travel over uneven or sloped terrain and in addition to maintaining balance of a component supporting a load carried by the robot, the robot itself must maintain its balance about a vertical axis during travel. FIG. 386 illustrates a robot 38200 driving along a flat surface 38201 maintaining balance about a vertical axis 38202 while moving in direction 38203 and robot 38200 driving along uneven terrain 38204 and sloped surface 38205 while maintaining balance about the vertical axis 38202. To maintain balance in such scenarios, wheels of the robot move vertically to compensate for a height change in the driving surface of the robot and a position of each wheel in a vertical direction is controlled individually. FIG. 387 illustrates an example of a wheel assembly 38300 of a robot positioned at three different positions A, B, and C in a vertical direction. The wheel assembly 38300 is shown positioned in A. a neutral position, B. a retracted position to accommodate for height increases in the terrain (e.g., bump), and C. an extended position to accommodate for height decreases in the terrain (e.g., pothole). A minimum of three wheels define and maintain a horizontal plane for a base of the robot. FIG. 388 illustrates an example of a robot 38400 including three wheel assemblies 38401 connected to a base 38402 of the robot 38400. FIG. 389 illustrates a horizontal plane 38403 for the base 38402 of the robot 38400 defined by connection points 38404 of the wheel assemblies 38401 that connect to the base 38402 of the robot 38400. Another plane 38405 is defined by wheels 38406 of the wheels assemblies 38401, which in this case are all at a same position in a vertical direction. FIG. 390 illustrates the horizontal plane A (38403) and planes B and C that are used in determining a vertical height $d_1$ and $d_2$ of the respective wheels.

Figure 391:
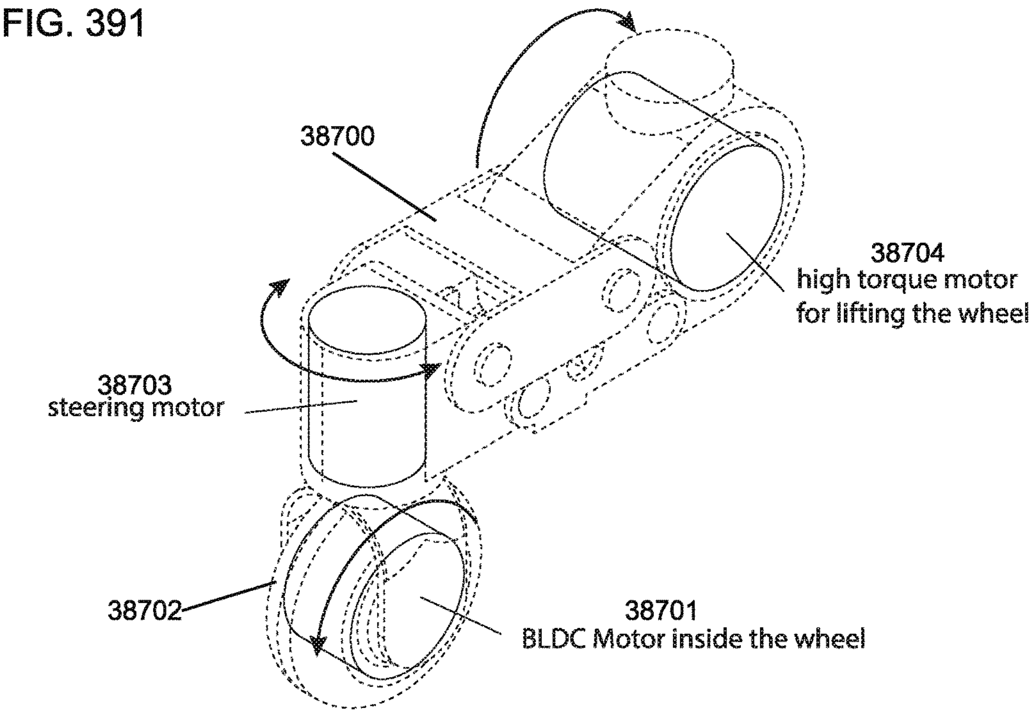
Figure 392:
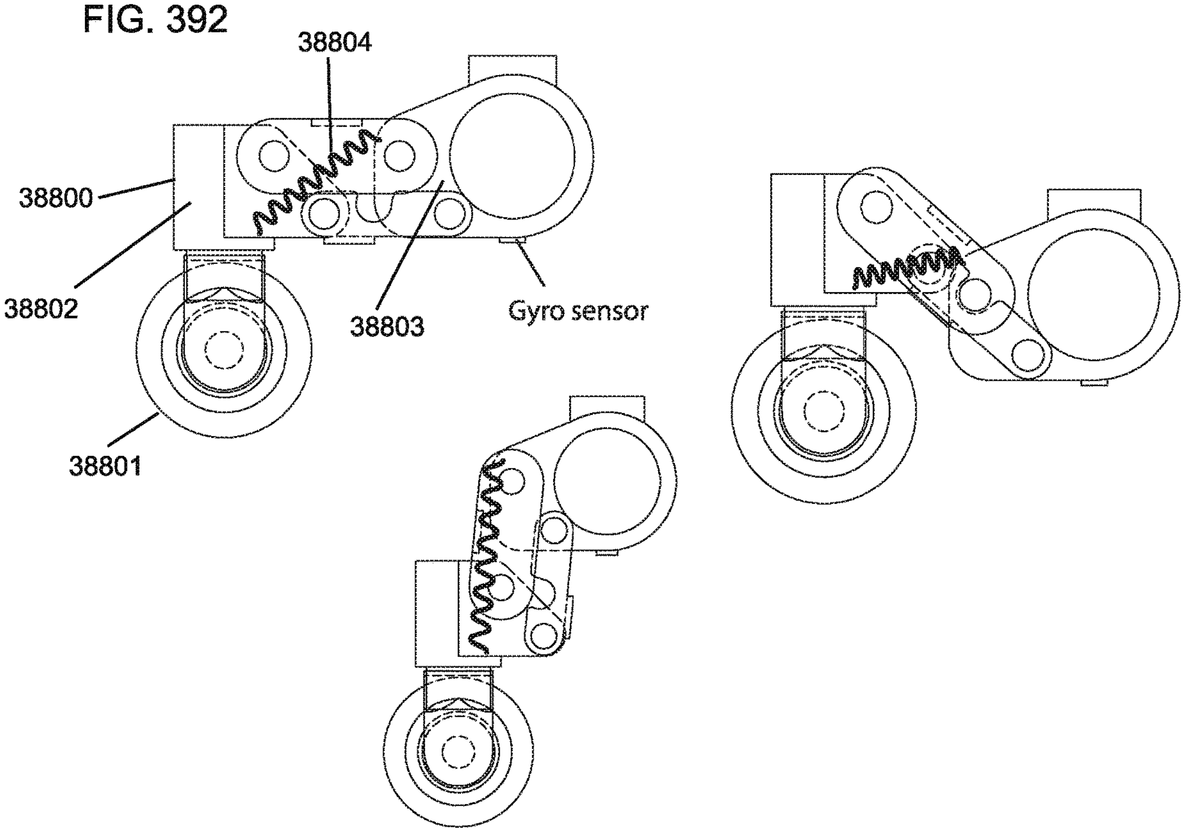
Figure 393:
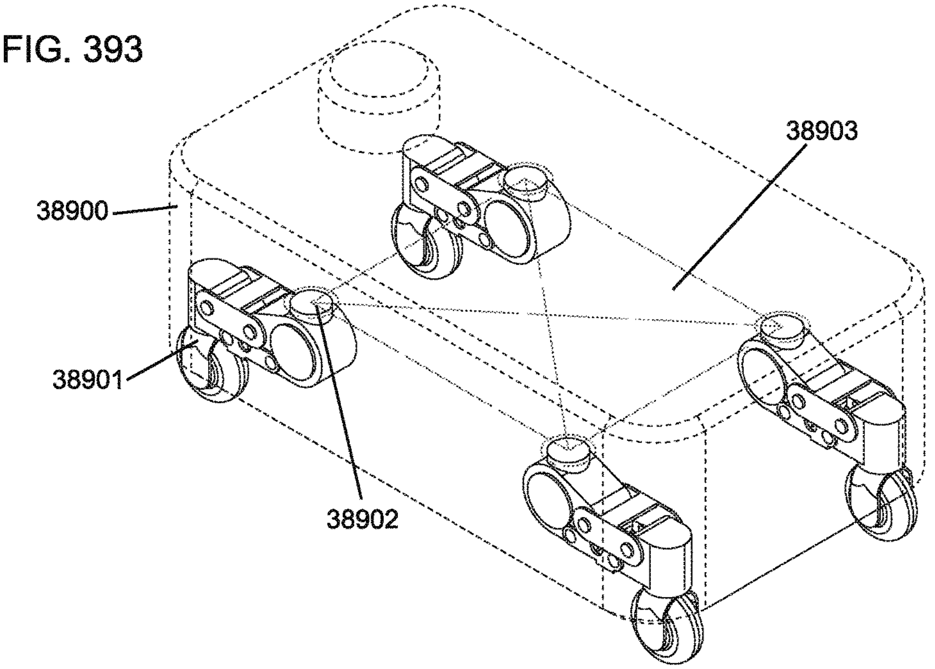

In some embodiments, each wheel comprises three separate motors. One motor is for driving the wheel, such as a high torque and brushless motor positioned within the wheel. A second motor is for steering the wheel by adjusting a direction of the wheel, wherein wheels positioned in different orientations in relation to one other provide different types of robot movement. A third motor is for height compensation, such as a high torque motor may be used to compensate for vertical displacement of the wheel caused by uneven terrain. FIG. 391 illustrates an example of a wheel assembly 38700 including a BLDC motor 38701 positioned within a wheel 38702, a steering motor 38703 and a high torque motor 38704 for height compensation. As each wheel travels over uneven surfaces, a gyro sensor positioned on a first component of the wheel assembly connecting the wheel to a second static component of the wheel assembly attached to the robot measures rotational motion of the first component. The motor for height compensation moves the wheel up or down to compensate for the rotational motion of the first component and attached wheel and returns the wheel to its original position. In some embodiments, the vertical motion transfer from the motor to the wheel is enhanced by a mechanical spring. FIG. 392 illustrates an example of a wheel assembly 38800 in various positions including a wheel 38801 rotationally attached to a first component 38802 pivotally connected to a second component 38803. The second component 38803 is fixed to a base of a robot. A gyro sensor is disposed on the first component 38802 and measures rotation of the first component and attached wheel 38801. A mechanical spring 38804 enhances vertical motion transfer from a motor to the wheel, as described above. In some embodiments, four or more wheels are used. For example, FIG. 393 illustrates an example of a robot 38900 including four wheel assemblies 38901. Connection points 38902 connected to a base of the robot 38900 form a planar horizontal surface 38903, in a similar manner as described for FIGS. 389 and 390.

Figure 394A:
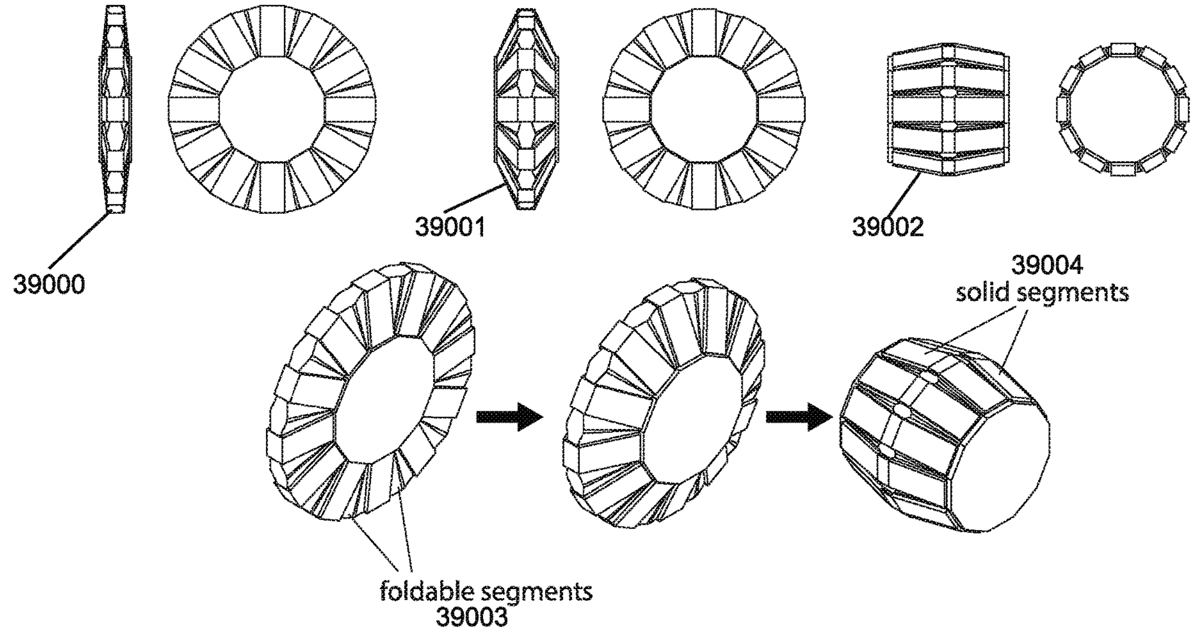
Figure 394B:
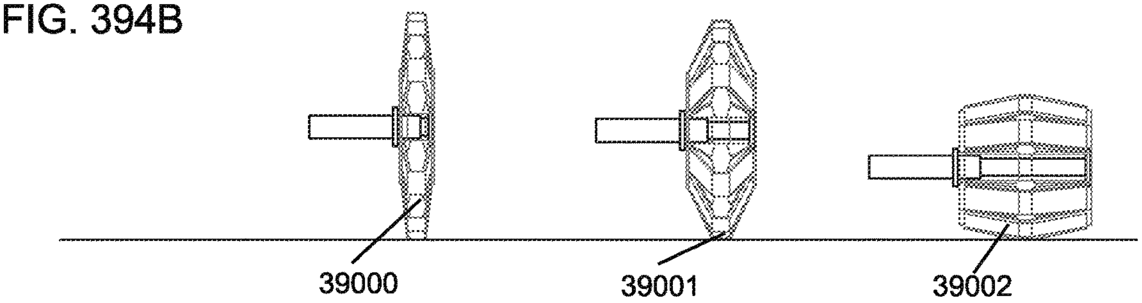
Figure 394C:
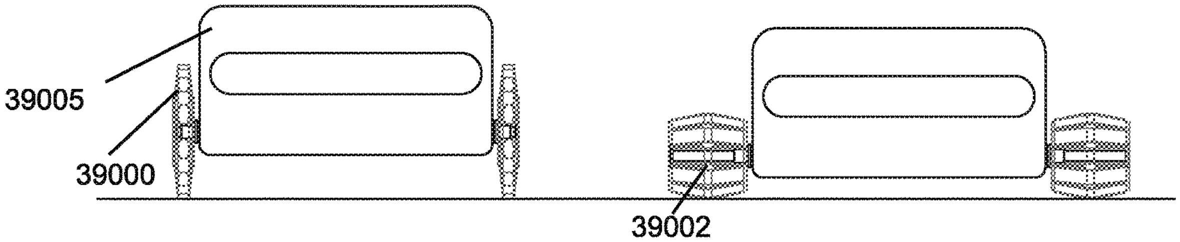
Figure 394D:
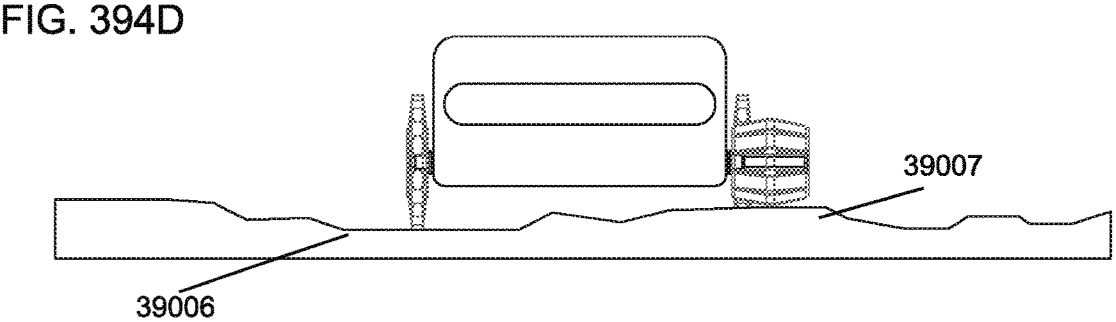
Figure 395:
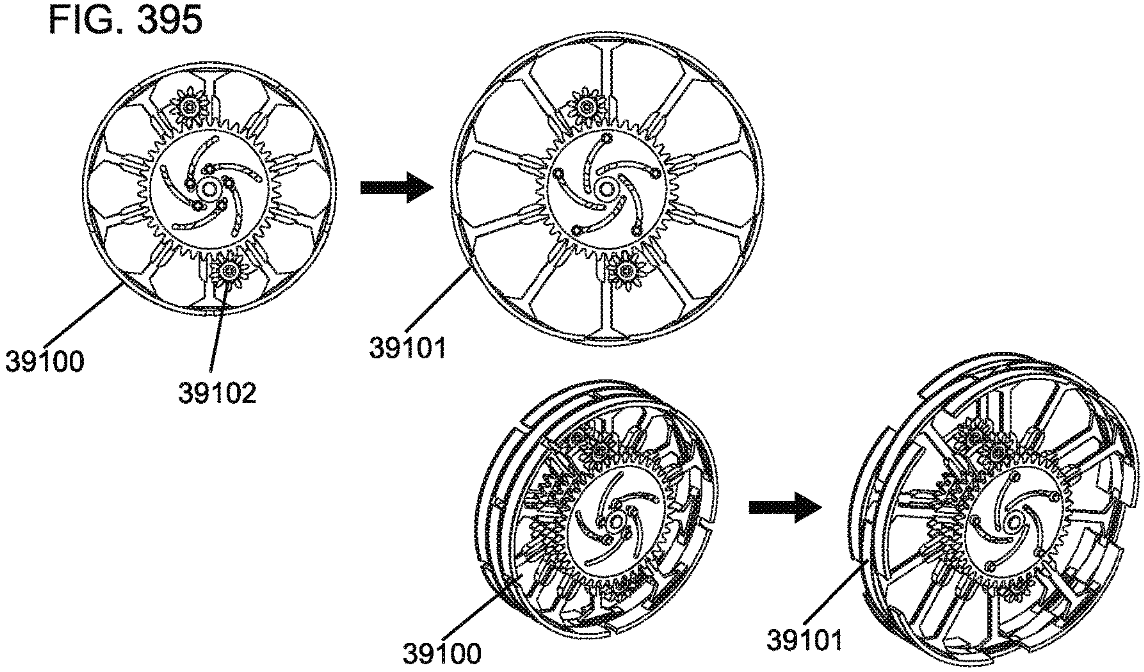

In some embodiments, a diameter of a wheel of the robot is adjustable for enhanced performance on various terrains. For example, FIGS. 394A and 394B illustrate an example of a wheel of a robot with a largest diameter 39000, a midsize diameter 39001, and a minimum diameter 39002. A width of the wheel increases as the diameter of the wheel decreases. The wheel comprises foldable segments 39003 that expand to decrease the diameter of the wheel and increase the width of the wheel and solid segments 39004. FIGS. 394C and 394D illustrate wheels with the largest diameter 39000 and smallest diameter 39002 attached to a robot 39005 for driving. In some embodiments, a processor of the robot autonomously adjusts the diameter and width of the wheel based on a sensed terrain. For example, in FIG. 394D one wheel has the largest diameter and smallest width as it drives on flat terrain 39006, while the other wheel has the smallest diameter and largest with as it drives on uneven terrain 39007. The larger width allows for more surface contact with the terrain, providing more stability. FIG. 395 illustrates an example of another mechanism for adjusting a diameter of a wheel from a smaller diameter 39100 to a larger diameter 39101. The mechanism comprises a gear system 39101 positioned within the wheel. The gears rotate in a first direction to increase the wheel diameter and rotate in a direction opposite the first direction to decrease the wheel diameter. A width of the wheel increases as the diameter of the wheel decreases.

In some embodiments, balance of the plate on which the load is carried is required, particularly when a weight of the load is distributed unevenly on the plate, as in cases where the weight is dynamic. For example, food and drink on a plate of a robot waiter may be placed off center on the plate and shift the center of mass. FIG. 396 illustrates a plate 39200 with a load 39201 applied at a center of the plate 39200 in comparison to a load 39202 applied off-center causing the plate 39200 to tilt 39203. To compensate, arms 39204 extend such that the plate 39200 maintains balance. In embodiments, various mechanisms are used to maintain balance of the plate. For example, in a similar manner to the wheel assemblies connected to the robot described in FIG. 392, a gyro sensor disposed on the plate measures rotational motion in the x and y axes and compensates for the rotation using three servo motors that each control a robotic arm attached to the plate. Since the weight of the load carried on the plate is dynamic (e.g., addition/removal of items from the plate or a change in position of items on the plate), two separate Proportional, Integral, Derivative (PID) controllers are used to account for the errors in two horizontal axes and adjust the motor speeds. For example, FIG. 397 illustrates a gyro sensor 39400 disposed on a plate 39401 on which a load is carried. Three robotic arms 39402 are attached to the plate 39401 and are controlled by servo motors 39403 attached to a base plate 39404. The base plate 39404 may be attached to a robot. PID controllers 39405 and PCV and processor 39406 are disposed on the base plate 39404.

Figure 398:
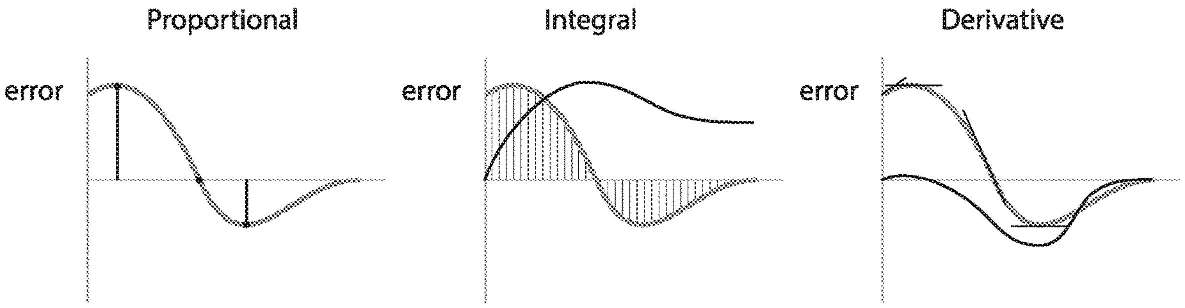

A PID controller is a control loop mechanism that employs feedback to a movement function. In this particular case, movement of each robotic arm caused by motor rotation speed and rotation direction. The PID controller continuously calculates an error value by comparing a desired position of each robotic arm at a given timestamp with an actual position of the respective robotic arm and applies a correction by adjusting a speed and direction of motor rotation based on proportional, integral and derivative terms. The proportional control measures a deviation of a current position of the robotic arm from a desired position of the robotic arm that is proportional to the amount of deviation. The integral control refers to cumulative error and accounts for the past values of deviation. For example, integral control finds and eliminates a residual error generated after applying the proportional control. Integral control is therefore useful in detecting constant error in the mechanism. The derivative control measures a rate of change in the error and is useful for estimating a future amount of error based on its current rate of change. The derivative control is sometimes referred to as anticipatory control since it is effective at seeking and reducing the effect of proportional error by influencing rates of applied controls based on the rates of change in error. FIG. 398 illustrates the proportional, integral, and derivative controls.

Figure 399:
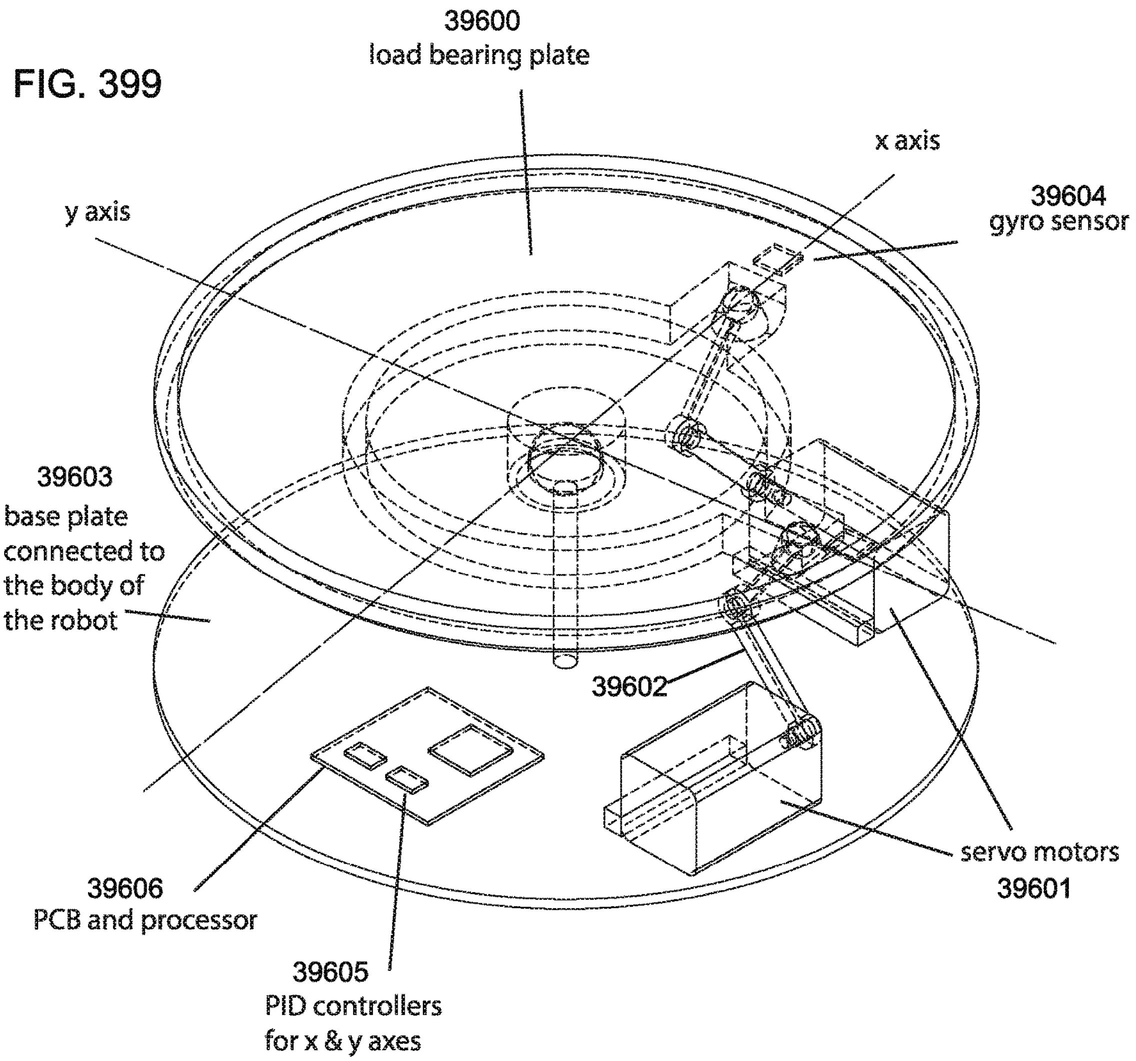
Figure 400:
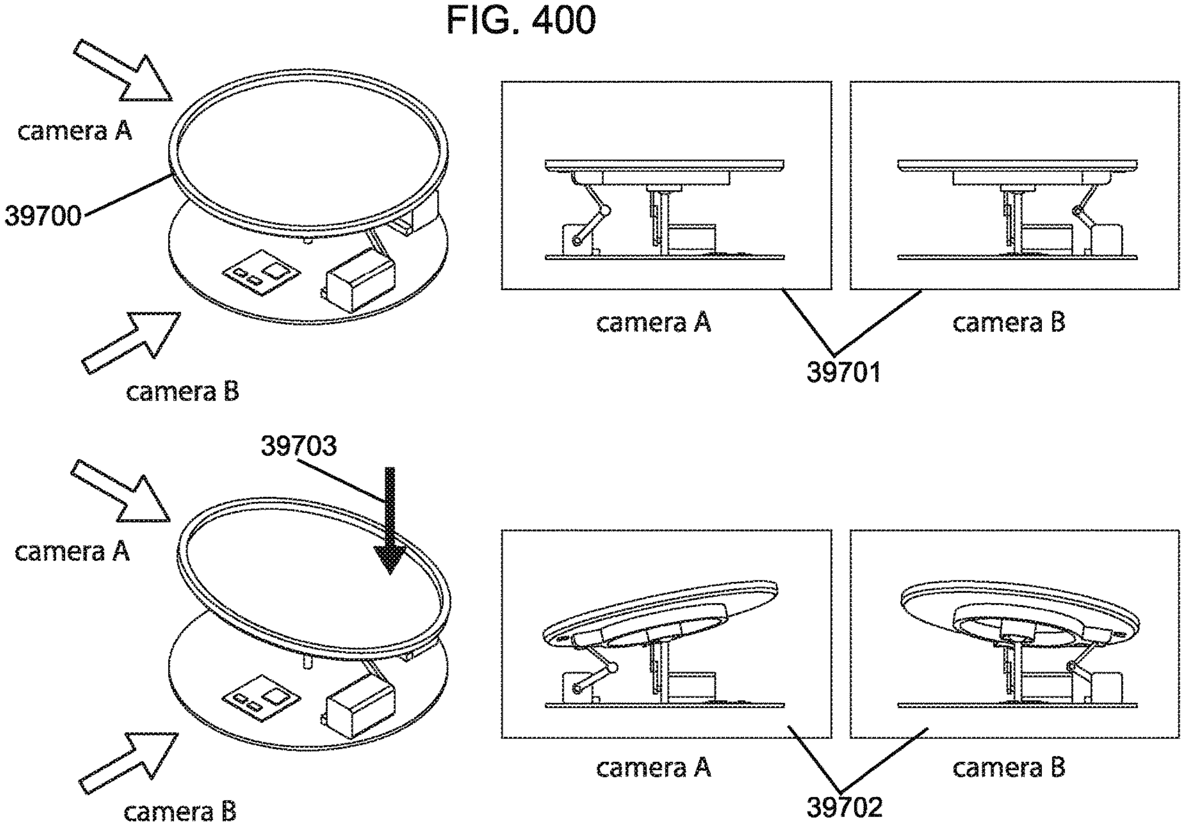
Figure 401:
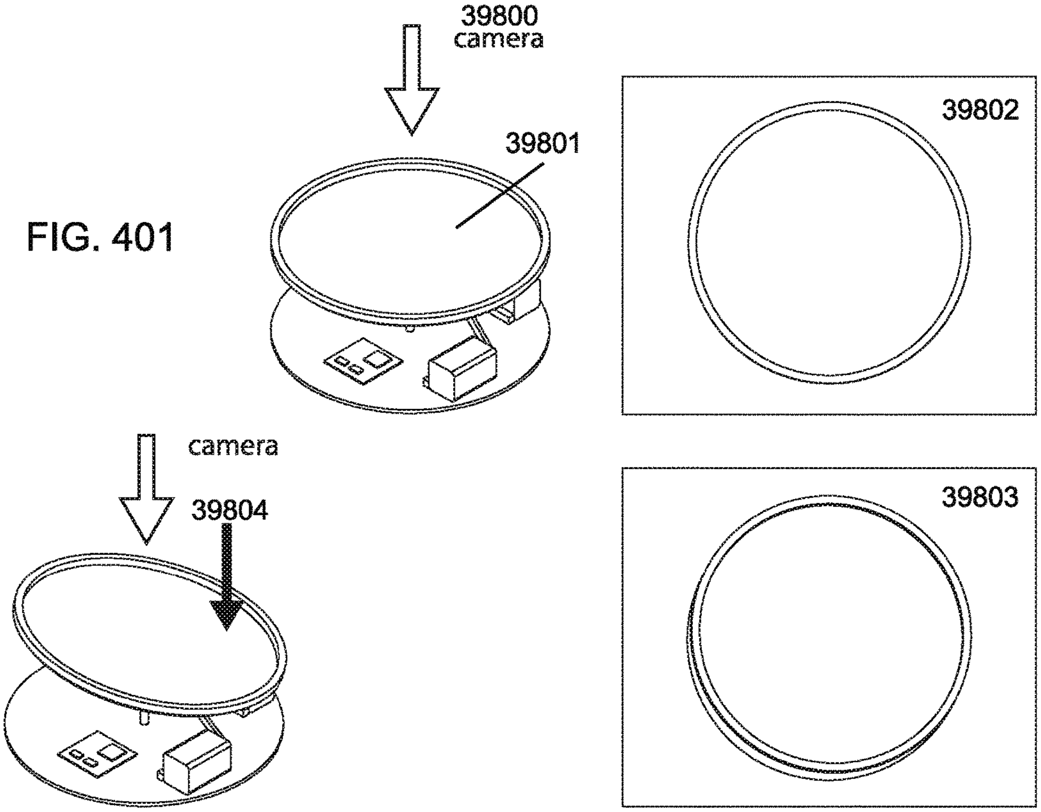
Figure 402:
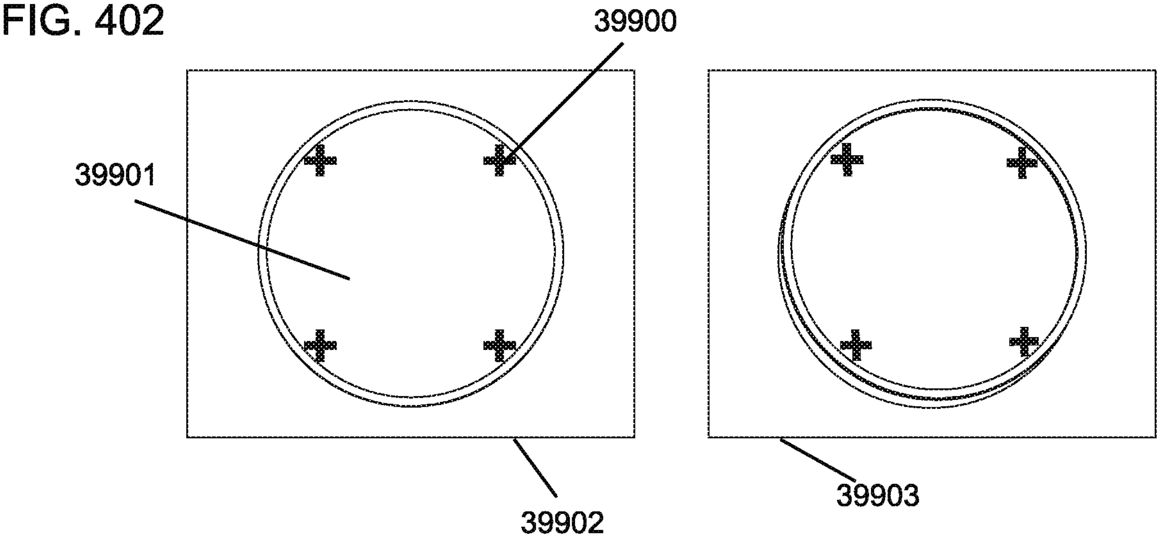

FIG. 399 illustrates an alternative mechanism for balancing a plate 39600 including two servo motors 39601 controlling robotic arms 39602 attached to the plate 39600, the servo motors compensating for rotational motion of the plate in two horizontal axes. Rotational motion of the load bearing plate is adjusted by pulling or pushing one point per axis. Similar to the mechanism illustrated in FIG. 397, the servo motors 39601 are disposed on a base plate 39603 attachable to a body of a robot. A gyro sensor 39604 is disposed on the plate 39600 to measure rotation in the two axes and two PIDs 39605 and PCB and processor 39606 are disposed on the base plate 39603. Another method for maintaining balance of the plate comprises the use of image sensors (e.g., cameras) to capture images from which an amount of tilt of the load bearing plate in relation to the robot is measured. FIG. 400 illustrates two cameras A and B disposed on sides of a plate 39700 to measure a tilt for each axis captured in images 39701 with no load applied or in images 39702 upon application of a load 39703. In another embodiment a camera is disposed on top or under the plate, a FOV of the camera aimed towards the plate. The processor determines tilt based on deformation of the plate captured in images. FIG. 401 illustrates a camera 39800 positioned above a plate 39801 to measure a tilt for each axis captured in image 39802 with no load applied or in image 39803 upon application of a load 39804 based on deformation of the plate 39801 in the images 39802 and 39803. The methods of maintaining balance of the plate employing image sensors are useful as movement of the plate is considered separately from a weight of a load as only visual cues are used in measuring and compensating for the rotational movement of the plate. Specific visual references may be used to ease detection of changes in tilt. For example, FIG. 402 illustrates visual references 39900 attached to plate 39901 captured in images 39902 and 39903. The visual references are to aid in detecting and measuring tilt of the plate 39901, as shown in image 39903.

Maintaining balance of a surface used for carrying loads and the robot itself may be useful for other applications. For example, a drilling robot used on a construction site or a planting robot used on a farm may benefit from maintaining balance. Driving surfaces within construction sites and farms are usually uneven, however, drilling or digging may need to remain vertical for building a straight foundation. If the robot maintains a balanced horizontal base, despite an uneven driving surface, drilling can be performed vertically.

In some embodiments, the robot is used as a tool or HW (but also has software) and is only activated or provides service when an application activates the robot. In some embodiments, a user requests service using an application of a communication device. FIG. 403 illustrates a user 40000 using an application 40001 of a communication device 40002 to request cleanup 40003 of an area 40004 by capturing an image 40005 of the area 40004 and drawing a circle 40006 around the particular area requiring cleanup. The application may charge the user per minute, hour, or other increment of use of the robot. The robot may provide service to one application at a time. For example, the robot may be publically used for neighborhood laundry, wherein users request the robot for laundry service when needed and pay for the service using coins, the application, credit card, etc. When done, the robot laundry machine is available for use by another person. Another example includes shared robotic bikes or shared electric scooters. In another example, a user obtains an idle lawn mower, scans a QR code on the lawn mower, and control the lawn mower using the application until the job is complete. After which the mower is available for someone else to use. Similarly, HW equipment may be used by the public as needed. For example, a user may order a heavy equipment machine online to dig a hole in a yard to install a pool. After the machine arrives, the user uses the application to draw a border of a desired hole within a 2D map of the environment displayed by the application, specifying a depth, after which the machine performs the job. A concrete machine may similarly be used as needed. FIG. 404 illustrates an example of a user 40100 using an application 40101 of a communication device 40102 to rent an excavator 40103 or concrete truck 40104. Using the application 40101, the user 40100 specifies a working area to be dug 40105 or to be poured with concreate 40106 using measuring and drawing tools 40107. In some embodiments, the user may attach a dongle to a device to activate it or use it.

Lightweight SLAM is advantageous for service robots. A service robot may act as an assistant, having capabilities of a robot, a computer, and a cell phone, with audio interactions enhanced with AI. Tasks service robots may perform include, but are not limited to, providing communication services (e.g., email, chat, video chat, audio chat, etc.), calendar programming, video conferencing, scheduling meetings, inviting people to meetings, preparing presentations, drafting articles in word processing software (e.g., MS word), editing, transcribing, spreadsheet filling or processing, retrieving information, arranging travel, acquiring quotes, finding nearby services, ordering products, fact checking, reading an audio book, playing a media (e.g., a podcast, a video clip, news), contacting a person or service (e.g., emergency services, consumer shops, offices, bureau, etc.), asking a question or a series of questions to obtain information about a topic, ordering a taxi or food, hotel reservations, etc. In embodiments, the service robot is able to perform everything a computer performs, including games, social networking, VR, XR, AR, and such. Therefore, with all such computational usages, mobility and navigation functions of the service robot cannot use all the computational resources. In current state of the art, several mobile robots use a CPU intended for a cell phone or a computer, often higher end CPUs. As processing power increases, there is more need for battery capacity, however, this results in a heavier, bigger, and less agile robot.

For the robot to pass a difficult area a strategy must be devised such that all surface cuts of a body of the robot are cleared within the difficult area of the environment (e.g., pot holes, ramps, curb, etc.). FIG. 405 illustrates an example of small maneuvers 40200 of the robot. In some embodiments, the robot comprises a passive trailer, wherein the trailer has no control, is unactuated, and has powerless wheels or motorized wheels. In such a case, path planning comprises a strategy for both the locomotive and the trailer combined. FIGS. 406A and 406B illustrate a robotic locomotive 40300 and passive trailer 40301 executing various maneuvers. Planning the maneuvers requires considering the path of the locomotive 40300 as well as the passive trailer 40301.

Figure 407:
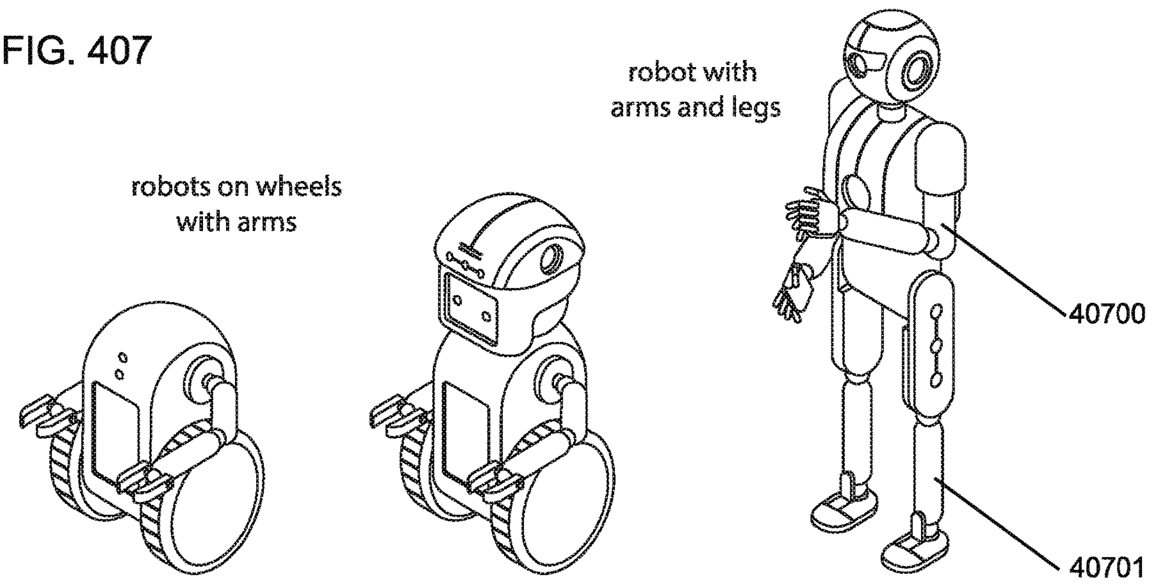
Figure 408:
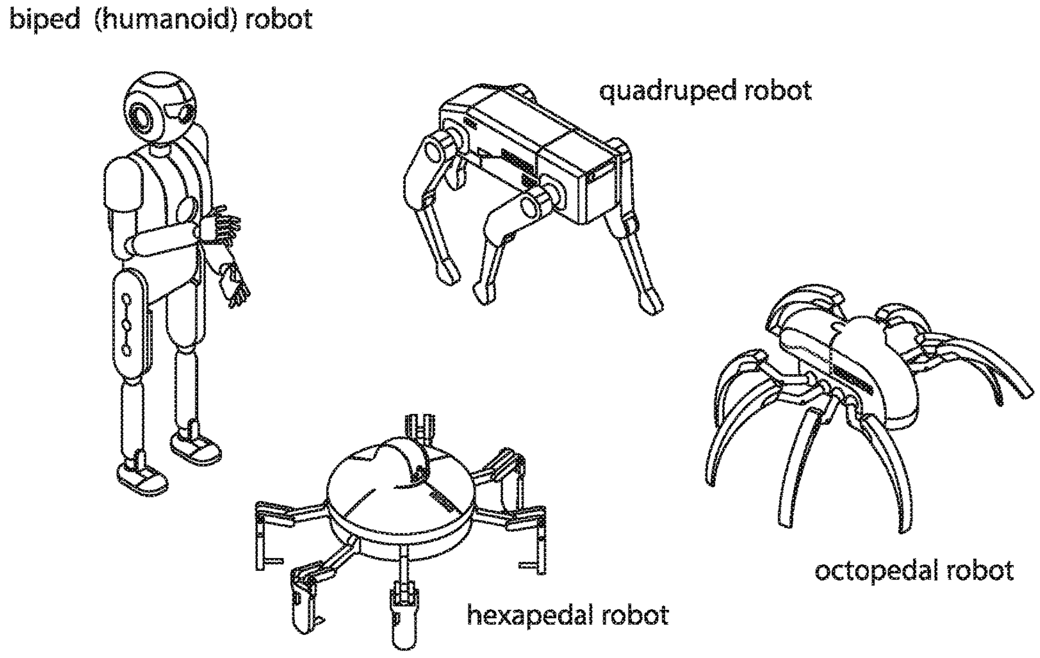

As robots get more sophisticated and capable of doing more complex tasks, their form factor changes as well. For example, more sophisticated robots may be equipped with arms and hands similar to human hands. FIG. 407 illustrates examples of robots with arms 40700 and legs 40701 that appear more human-like. They may still move using wheels which are easier to program and control and are more cost friendly. Or they may use legs similar to human legs which enables them to move on more complex surfaces and may add different abilities such as walking, running, jumping, sitting and climbing to the robot. Depending on the use case, the robot may be biped (two legs), quadruped (four legs), hexapedal (six legs), octopedal (eight legs, e.g., mimicking insect and arachnid movements), or more legs (e.g., mimicking centipede movements). FIG. 408 illustrates examples of robots with different number of legs. When a robot uses legs instead of wheels maintaining balance during movement and when the robot stands still becomes important. This is especially more important in biped and quadruped robots because when they are moving (walking, running) at least one leg of them will be detached from the floor and the robot has to maintain its balance using the other leg(s). In these cases, additional processing is required to shift the robot's center of mass to be on top of the remaining legs vertically. Lean SLAM processing frees up more computational resources to calculate this shift. Additionally, localization may happen in sub-levels for each foot of the robot which further helps with calculating the shift for the center of mass.

Figure 409:
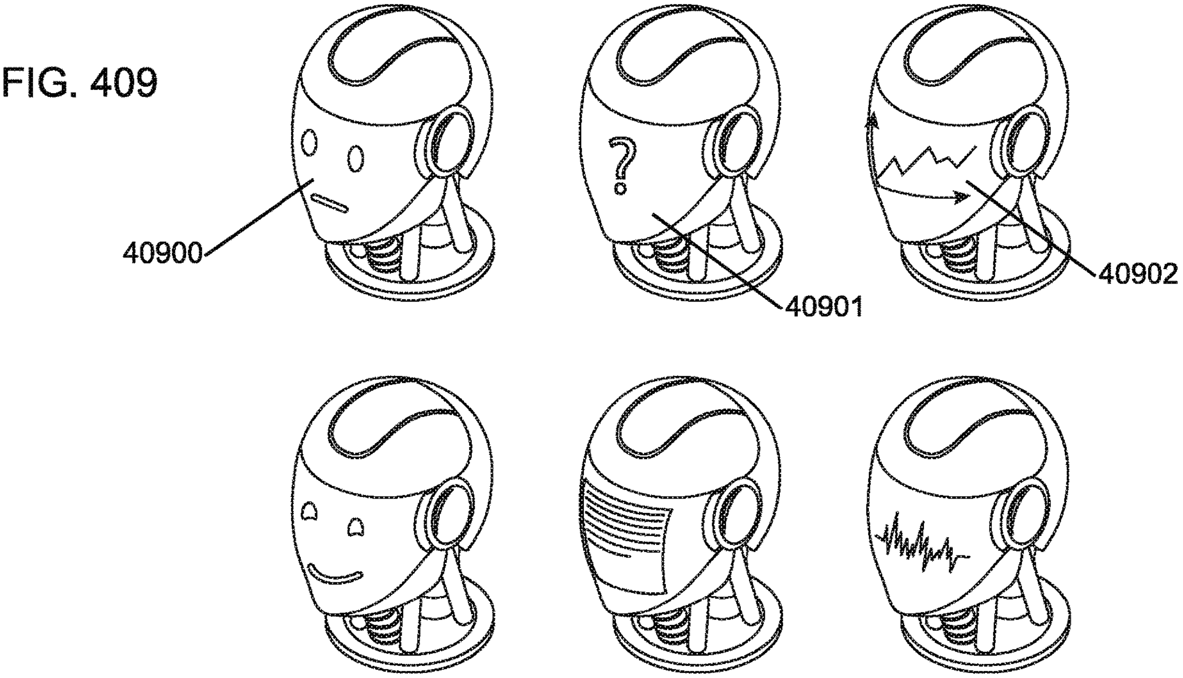
Figure 410:
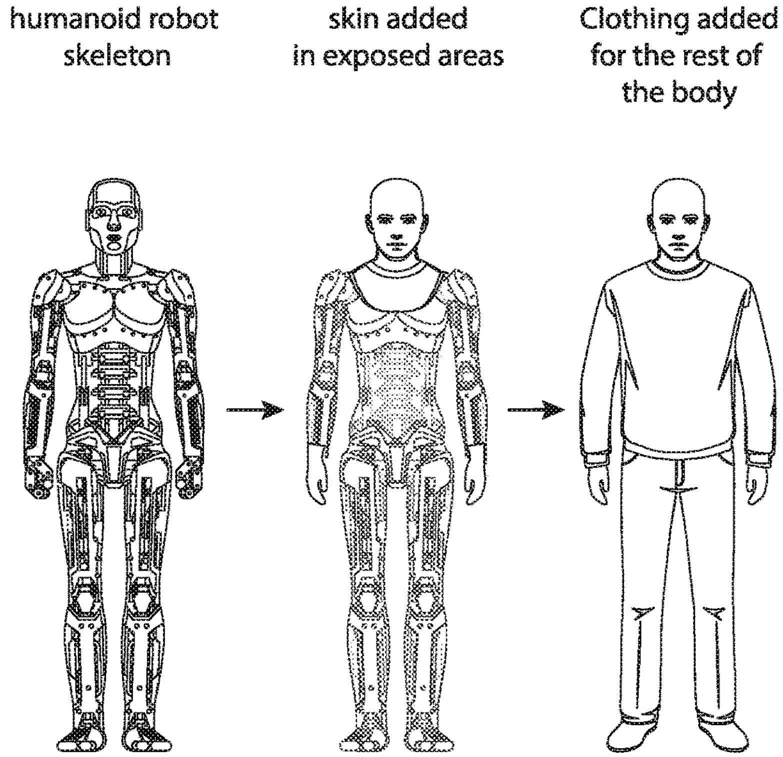

More sophisticated robots may need to interact with human users more often. While the traditional interfaces are useful for interaction, the robot having a face makes interacting with it more intuitive. The face may be implemented using different methods. It can range from a simple display system with facial features to a realistic 3D face with moving and functioning facial features. The display system with facial features has the benefit of using the display to present other information in addition to the face. For example, if the robot is tasked to search for something on the web it can present the results on the same display. Or if the robot is used for telecommunication, it can display the face of the call recipient. FIG. 409 illustrates examples of a displayed face of a humanoid robot, including facial expressions 40900, information requested by a user 40901, an audio or video stream 40902, etc. On the other hand, a face display with facial features may be used to convey emotions and different expressions which helps with the intuitiveness of the human-robot interaction. This can be true for the actual 3D face with facial features as well. However, in making the 3D functional face, as the face gets more similar to the human face, the small differences and deviations from the human face will look off to the human user. This is true both for the shape and composition of the features and for the movements of them. The reason is, humans are used to picking up nuance expressions and facial features of other humans on a subconscious level since humans have seen and interacted with other humans since birth. This phenomenon, called uncanny valley, describes how in the process of making a more realistic artificial face (and other humanoid features), first it appears borderline creepy before becoming acceptable by the human audience. While implementing facial features for interacting with the robot do not have function as their real-life counterparts. Meaning for example the robot's eye does not have to see (be a camera) or its ear does not have to hear (be a microphone). The sensing components may be placed in other locations where it is more convenient. However, the closer the sensing components are to their real-life equivalents (camera being closer to the robot's eye or microphone being closer to the robot's ear) the data they provide for the robot to react to will be more spatially accurate. For example, if there are two cameras near or on the position of the eyes with subject tracking enabled for both of them, they can provide necessary data for eyes to maintain their line of sight while looking at the subject. In this case if the subject is a human being the robot can maintain its eye contact with them during interaction which makes the interaction more believable and natural. Another way to make the robot (especially humanoid robots) more user friendly is by adding skin to the robot. The skinning process may be done in various ways. The simplest way is to cover the nonmoving sections of the moving parts of the robot with solid, rigid cover parts made of plastic with different surface finishes. For example, a robot's upper arm and lower arm can be covered by rigid parts while exposing the joint so it can move. While this method makes the overall look of the robot more pleasant, the robot still looks more like a machine. The other method is to cover the exterior of the robot with flexible and stretchable materials such as natural latex, foam latex, silicone rubber, silicone foam or silicone sponge. Natural latex may look more realistic but after excessive use and being exposed to environmental elements, it may change color and lose its flexibility and stretchiness. Silicone rubber is more durable but it is generally heavier meaning more power is needed for the robot to move its moveable parts. Silicone foam and foam latex are generally lighter but more prone to wear and tear. If the robot is in a human form, another option to skinning the robot is adding clothing or use of fabrics entirely or in combination with previous skinning methods. For example, exposed areas such as head and neck or hands may be skinned using silicone or latex materials, non-exposed parts can be covered using rigid plastic parts and then covered with clothing and fabrics. FIG. 410 illustrates a humanoid robot skeleton, skin added to the exposed areas of the robot, and clothing added to a body of the robot.

FIGS. 411 and 412 illustrate an example of a humanoid robot. Position of humanoid may be determined based on angles of various joints of the humanoid, such as the joint angles in FIG. 411. Each joint has brushless motor actuator and gyroscope and encoder. A neck and knee joints include a LIDAR, a head has omni-directional vision, and a chest includes cameras. The humanoid robot may use non-contact remote measurement methods. In some embodiments, illumination is emitted from one or more emitters strategically placed on the humanoid robot. In some embodiments, a vertical cavity surface emitting laser creates pulses of infrared laser. Optical shifters capture the light reflected off of the objects. To manipulate arms of the humanoid robot, a graph mode G (V, E) may be used, wherein the graph G comprises vertices V (i.e., nodes) and edge E. FIG. 413 illustrates an example of a graph comprising nodes 40600 connected by edges 40601. Each limb may be an edge and each joint may be a node. Each node carries information describing a relationship between the two edges connected to the node. Edges may comprise a length, a width, a number of degrees of freedom, a joint type, etc. Edges may be directed or undirected and have a weight associated with them. Embodiments employ collision detection prevention for robotic arms and manipulators of the humanoid, wherein enough free space for robot arms comprised of multiple rigid bars to execute a series of displacements without hitting the environment is provided. In some embodiments, wearable may be used by a user to control movement of a humanoid robot. FIG. 414 illustrates an example of wearable devices 40700 for a hand 40701, a head 40702, a core 40703, and legs 40704 that may be worn by a user 40705. The wearable devices 40700 include sensors that are used to determine movements of the user 40705. A humanoid robot, such as 40706 or FIG. 412, uses the determined movements to mimic the user 40705.

Some embodiments include a home assistant robot that moves within a living area of a user to aid persons with mobility (e.g., injured persons, elderly persons, etc.). The home assistant robot also relocates objects within the living area. For example, the home assistant robot obtains and transports food or beverages to a location of a user, wherein the robot locates both the items as well as the location of the user. In some embodiments, the home assistant robot includes a container and/or a plate for carrying objects. In one embodiments, the user uses the robot as a table, wherein a height of the robot is adjustable to accommodate needs of the user. In some embodiments, the robot includes a wireless charging component with various charging ports for charging electronic devices. In embodiments, the user command the home assistant robot using voice command, a remote, or an application of a communication device paired with the robot. In some embodiments, the home assistant robot is configured with a follow mode that actuates the robot to follow the user around. For example, the home assistant robot follows the user from room to room as the user collects items from each room and stores them in the container of the robot. In embodiments, the robot comprises a camera, a speaker and a microphone for communicating with a user. FIG. 415 illustrates multiple views of an example of such a home assistant robot 40800 comprising a LIDAR sensor 40801, sensor arrays 40802, three-axes wheels 40803 (adjustable in height to compensate for uneven terrain, as described above), a storage compartment 40804, and a self-balancing plate 40805 (compensates for uneven load distribution, as described above). FIG. 416 illustrates an example of a user 40806 using the home assistant robot 40800 as a table, wherein food and beverage 40807 are placed onto self-balancing plate 40805. The self-balancing plate 40805 maintains balance despite an uneven distribution of weight of the food and beverage 40807 on the plate 40805. In some cases, the robot 40800 is adjustable in height using the three-axes wheels 40803.

Any robot with a main purpose other than communication may still be equipped with a microphone and a camera for purposes such as, reconnaissance of the work environment, assistance to the user, or providing a means of convenience to people in the workspace to communicate with others. Audio and video communication may be symmetric (two ways) or asymmetric (one way). Audio may be picked up by a microphone on the robot and listened to remotely by an operator, user, bot (audio to text bot, speech recognition bot, voice authenticator bot, and so on), etc. physically present at a different location than the workspace of the robot. The remote location may be a datacenter in a different city/country, a different floor of the same facility, a different room in the same house, a car that is moving, or a cellphone of the user. A video stream may be picked up by a camera, encoded into a data stream, and sent over to a remote location to be watched by an operator or analyzed by a bot in the same fashion as explained for audio. FIG. 417 illustrates an example of a robot including a microphone and camera from capturing an audio stream and video stream, respectively. The audio and video stream are encoded and transmitted to a remote location (e.g., data center, vehicle, cell phone, another room in the same facility) for an operator to listen to or a bot to analyze.

An authentication and authentication, authorization, audit (AAA) security system may control who can and when access is given for a stream of audio or video. The stream may be sent to multiple destinations, viewed live at a destination, viewed with a lag at a different destination depending on the type of the destination and AAA clearance, etc. Viewing activation at one destination or starting of transmission by the robot or a stationary device at a source may be executed upon a command issued on an application, a computer program, or activating a physical button on the transmitting or receiving device. The activation may have an associated time duration or be continuous until stopped. As a result of a time limited activation, a clip (audio or video) is available at a destination. There may be a maximum time limit set. If a duration is long, the stream may be divided into smaller clips or indexed to facilitate a search. For example, at the end point it may be desired that a video is watched not from the start but from a certain point. The indexing or clip cuts may be a fixed size (i.e. 30 seconds, a minute) or based on identified content or change of scene. At the destination, availability of the audio/video may be shown with an indicator, such as a blinking LED/light, a popup on the application, and such. The data stream may be stored on the cloud and streamed to an end point upon request, such as clicking on a popup indication on the application. FIG. 418 illustrates an application 41800 on a mobile device displaying voice streams 41801 and a video stream 41802 a user may watch. FIGS. 419A and 419B illustrates an example of a food delivery robot including a LIDAR, a microphone, a camera, removable and washable food trays, stabilizers for keeping the food trays in a horizontal orientation, side, front, and rear sensor arrays (e.g., proximity sensors and near range obstacle sensors), drive wheels, caster wheel, shock absorber for uneven terrain, battery, and PCB and processor. When data is transmitted at a source, the data may be encoded at a single preferred bit rate or at a dynamic bit rate based on identified context. The length of the data fragment may be based on context. Fragments of different bit rates and resolutions may be generated. Some images may be cropped, divided to background and foreground, be zoomed in or out, all of which is decided by an adaptive algorithm. When data is sent to more than one location, a different encoding and resolution algorithms may be applied. This activity may happen at the source or any other nodes that are intermediary between the source and a viewer.

Some embodiments comprise a drilling and digging robot. Such a robot is useful in construction applications. For example, some footings for a foundation of a building require digging into the ground. This task may be automated by an autonomous SLAM enabled drilling and digging robot. In embodiments, the robot comprises digging and/or drilling tools, sensors for navigation, and a laser unit for measuring distance. In some embodiments, the tools are interchangeable. A digging plan is loaded onto a system of the digging and drilling robot. After placement calibration within a building site, the robot is actuated to autonomously execute the digging operation based on the digging plan. Alternatively, the robot is controlled manually using an application of a communication device paired with the robot. In either case, the digging and drilling robot broadcasts its actual position and the application displayed the position of the robot superimposed onto an image of the digging plan such that an operator can confirm the digging/drilling position prior to starting operation. FIG. 420 illustrates an example of a drilling robot 41000 comprising a LIDAR sensor 41001, a laser unit 41002 for measuring distance to the ground, a drill component 41003 including a drill head 41004, a battery 41005, and three-axes wheels 41006 (adjustable in height to compensate for uneven terrain, as described above). The drilling robot 41000 is illustrated with the drill head 41004 stowed 41007 and with the drill head 41004 in an operating mode 41008 as it digs into the ground 41009. In a similar endeavor, some embodiments comprise a planting robot for autonomously digging holes in the ground and planting seeds within the holes. The robot comprises a container for storing the seeds and is configured to dig holes at predefined distances from one another. Movement of the robot may be based on a predefined path or is controlled manually using a remote of an application of a communication device paired with the planting robot. Due to uneven terrain in a field, maintaining balance is important, as such use of three-axes wheels described above are useful to compensate for the uneven terrain.

In some embodiments, a light beam illuminates a next intended location of the robot. FIG. 421 illustrates a robot 42100 including a light beam 42101 illuminating a next intended location 42102 of the robot 42100, such that persons 42103 avoid the location 45202. The light beam may illuminate red when LIDAR obstacle sensor 42104 is interrupted and green when uninterrupted.

In some embodiments, the robot comprises a smart shopping cart. While shopping using a smart shopping cart, the cart may be equipped with a barcode scanner and the customer can scan items they pick instantly when they put them in their cart and pay for them using their mobile devices. Alternatively, the store may have an application with a barcode scanner for the customer to scan picked up items barcodes before putting them in their cart and not waiting for the checkout or self-checkout lines. FIG. 422 illustrates a smart shopping cart 42200 equipped with a barcode scanner 42201 for scanning items before placing them in the cart 42200. The scanner 42201 also displays a list of items scanned 42202. FIG. 423 illustrates an application 42300 of a mobile device 42301 with a barcode scanner 42302 for scanning items 42303. The application displays a list of items scanner 42304 and a total price 42305.

In large offices, some office equipment or parts of them may be mobile and autonomous. For example, a printer or a photocopier machine may have a mobile tray. The user may send a print job to the printer from their office to the printer room using wireless or wired network. Once the print job is done, the printer tray may move and find its way to the office of the user to deliver the printed documents. Or the user may summon a mobile scanner to scan the documents they want to make a copy of and the scanner sends the scanned document to the printer room and the rest of the process is as described for the printing process with the mobile tray. FIG. 424 illustrates a user 42400 wirelessly transmitting a print job to a printer 42401. A printer tray 42402 of the printer 42401 is mobile. Upon completion of the print job the mobile printer tray 42402 navigates to an office of the user 42400 for delivery of the documents. A similar process may be used for the vending machine. The user may select the item they want from the online version of the vending machine and pay them. The vending machine then drops the items into a moveable autonomous tray which will then bring them to the user. A user may control several robots using their cell phone and one or several applications. Alternatively, several users may control the same robot using their mobile devices. For example, FIG. 425 illustrates A. a single user 42500 controlling multiple robots 42501 using an application executed on a mobile device 42502 and B. multiple users 42503 controlling a single robot 42504 using an application executed on each corresponding mobile device 42505 of users 42503. The office equipment mentioned above is a good example for this. In a case of several users controlling the same robot, topics like user management and task management and prioritizing them becomes more important. Certain users may have different user privileges or the robot may prioritize their commands over other user commands. Similarly, the tasks and commands given to the robot can be indexed with different levels of priority or weight. The robot may receive all these tasks and commands and prioritize them based on the users and types of commands.

In some embodiments, the robot comprises a versatile mobile platform (VMP). In embodiments, a VMP comprises an autonomous robotic platform that is customizable for a variety of use cases. In some embodiments, the VMP comprises a chassis, a power supply, a processing unit, and sensing components. For example, FIGS. 426A and 426B illustrate an example of a VMP comprising a chassis 100, a power supply 101, a processing unit 102, and sensing components 103. In different embodiments, the chassis may vary in shape and size with a varied footprint, depending on the use case of the VMP. For instance, the chassis may be rectangular, circular, or another shape. In embodiments, the power supply, such as a battery, is housed within the chassis. In embodiments, the battery is rechargeable. In some embodiments, a depleted battery or a battery with low charge may be swapped during a work session for a battery with at least enough charge to complete the work session as it is faster than recharging the depleted battery. In embodiments, the processing unit executes decisions relating to autonomous driving of the VMP. For example, the processing unit may receive data from various types of sensing components, interpret the data, formulate an understanding of a surrounding area of the VMP based on the interpreted data, and decide a best next move of the VMP based on the formulated understanding of the surroundings. In some embodiments, the processing unit may generate a 3D model of the environment based on the data from the sensing components. Different levels of processing may be executed at a MCU, a CPU, a GPU, a NPU or the cloud level. In some embodiments, sensing components may comprise IR sensors, ultrasound sensors, TOF sensors, and imaging sensors such as cameras and LIDARs. In some embodiments, sensing components are positioned around the chassis to provide the processing unit of the robot with a maximum FOV.

In some embodiments, the VMP may comprises coupling mechanisms depending on the use case of the VMP. For example, the VMP may require coupling mechanisms to autonomously carry and transport components such as cabins, storage units, sitting spaces, mechanical or robots such as robotic arms, survey systems, and other components. In such a use case, the VMP needs to couple itself with the components to autonomously carry and transport them. The coupling mechanism may be temporary or permanent. A permanent coupling is provided in-factory or at headquarters during a customization phase of the VMP while with temporary coupling the chassis of the VMP may decouple from a coupled component during run time. For example, FIGS. 427 and 428 illustrate chassis 200 of the VMP permanently coupled with the component 201 by inserting static coupling blocks 202 into corresponding openings in the component 201. FIGS. 429 and 430 illustrate the chassis 200 of the VMP temporarily coupling with the component 201 during a work session by driving under the component 201 until aligned and extending coupling blocks 202 into corresponding openings in the component 201. To decouple, the VMP retracts coupling blocks 202 to release the component 201 and drives from underneath the component 201. In addition to the flexibility and customization temporary coupling provides, with temporary coupling the chassis may transfer its load to another VMP chassis if needed. For example, one VMP may transfer its load to another VMP when its battery is running low or when the load needs to be rerouted unexpectedly requiring a different route or path than the current VMP is executing. The loads of the VMP may vary. For instance, in the case of larger and outdoor VMPs, the load may comprise a space within which passengers may occupy while being transported from point A to point B. These spaces may be customized to include various features. For example, FIG. 431 illustrates various spaces coupled to a chassis 600 of a VMP, the spaces including a space 600 that functions as an exercise booth, a space 601 that functions as a lounge area, and a space 602 that functions as a business office. In other examples, the load may comprise a container for delivering goods, mail and packages, foods (such as fast food, pastries, etc.), groceries, or other items from point A to point B. Depending on the use case, the container may include specialized features. For instance, the container may comprise different temperature controlled sections for different types of food. FIG. 432 illustrates a container 700 coupled to chassis 701 of a VMP for delivering mail and packages 702 and container 703 and 704 coupled to chassis 701 of the VMP for delivering various foods 705 wherein each container includes different temperature controlled sections 706, 707, and 708.

Figure 434:
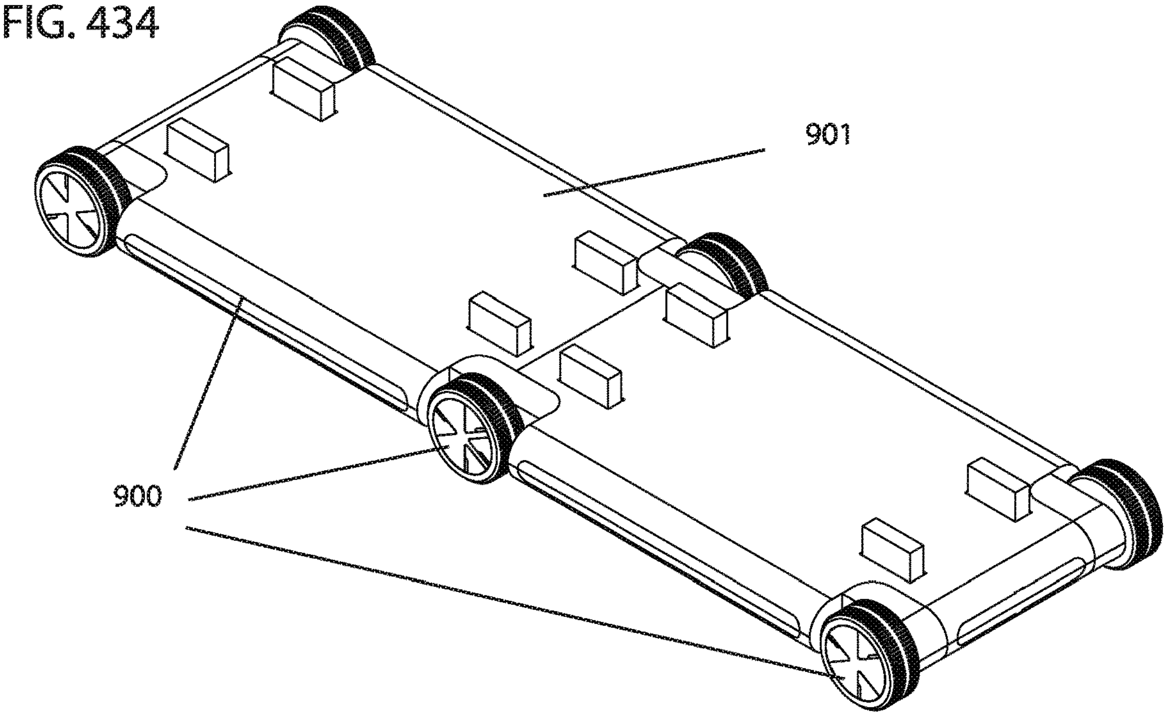
Figure 435:
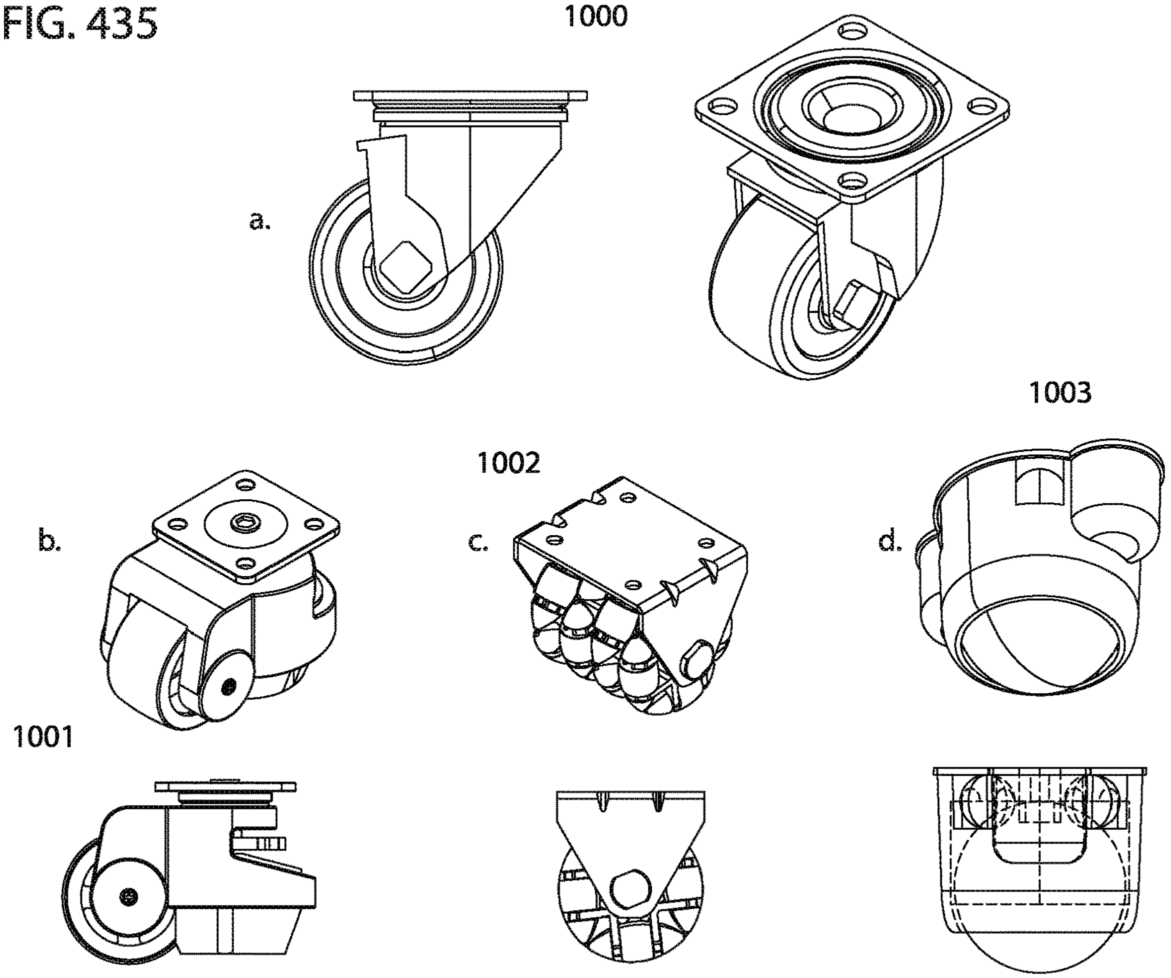
Figure 436:
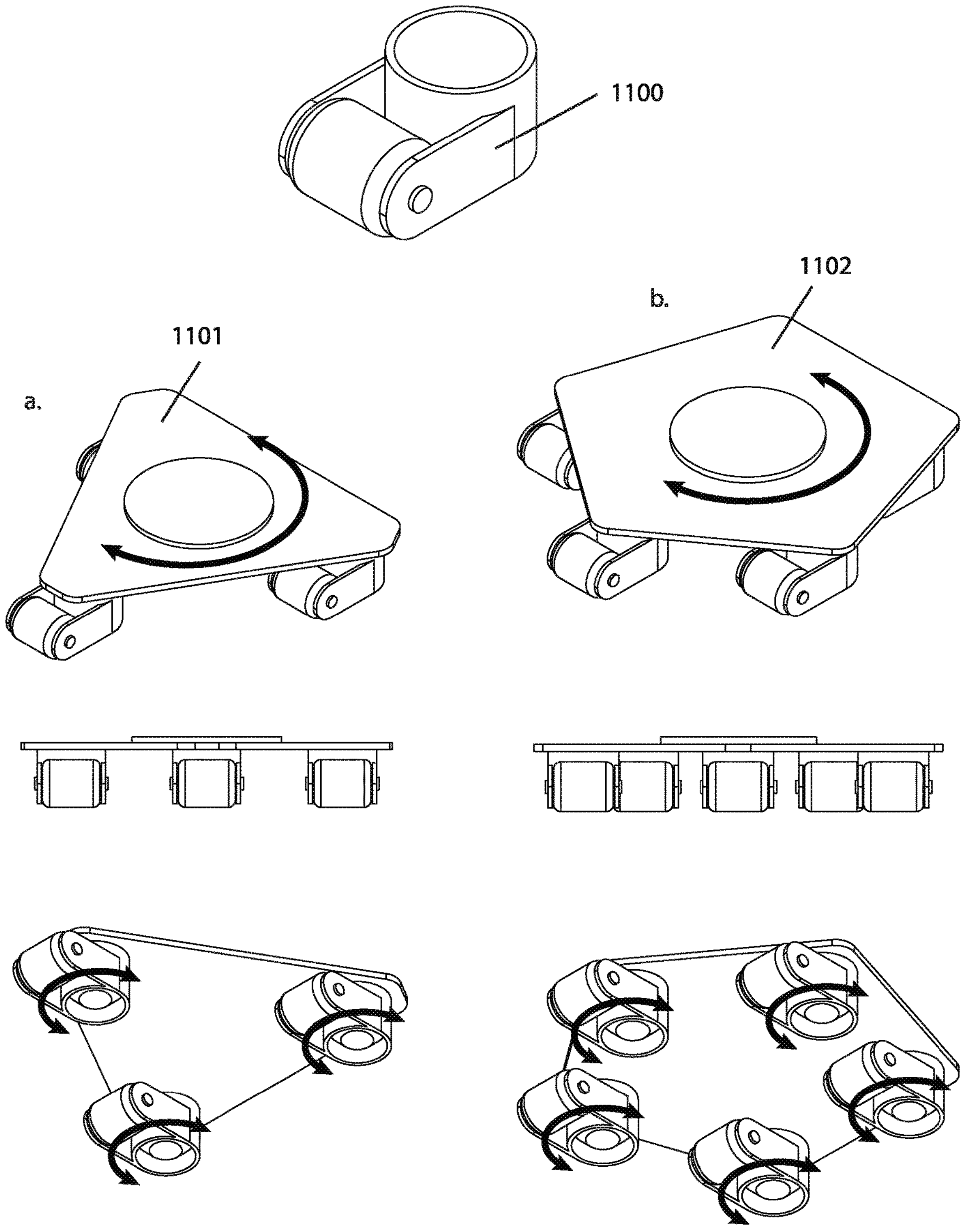
Figure 437:
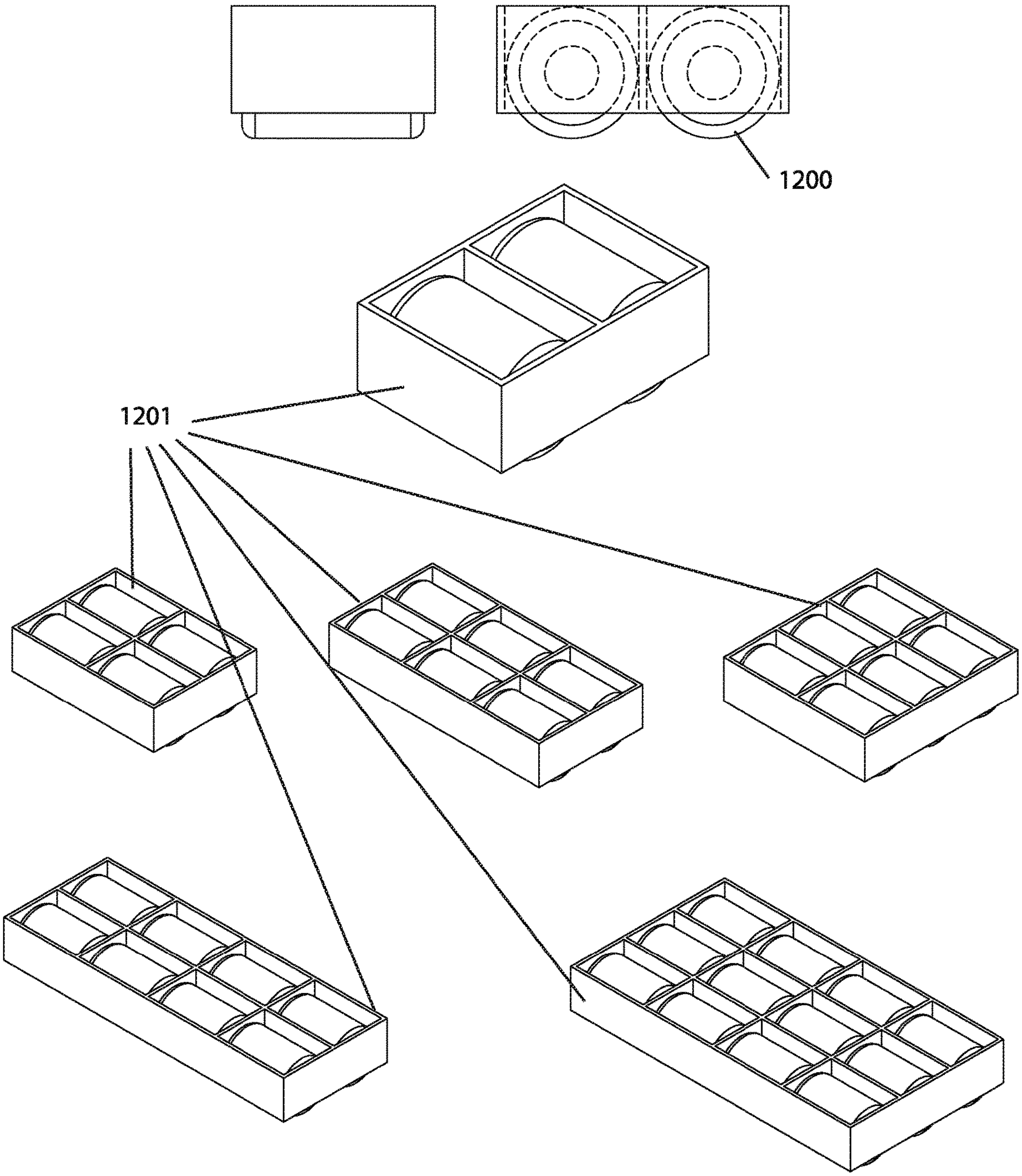
Figure 438:
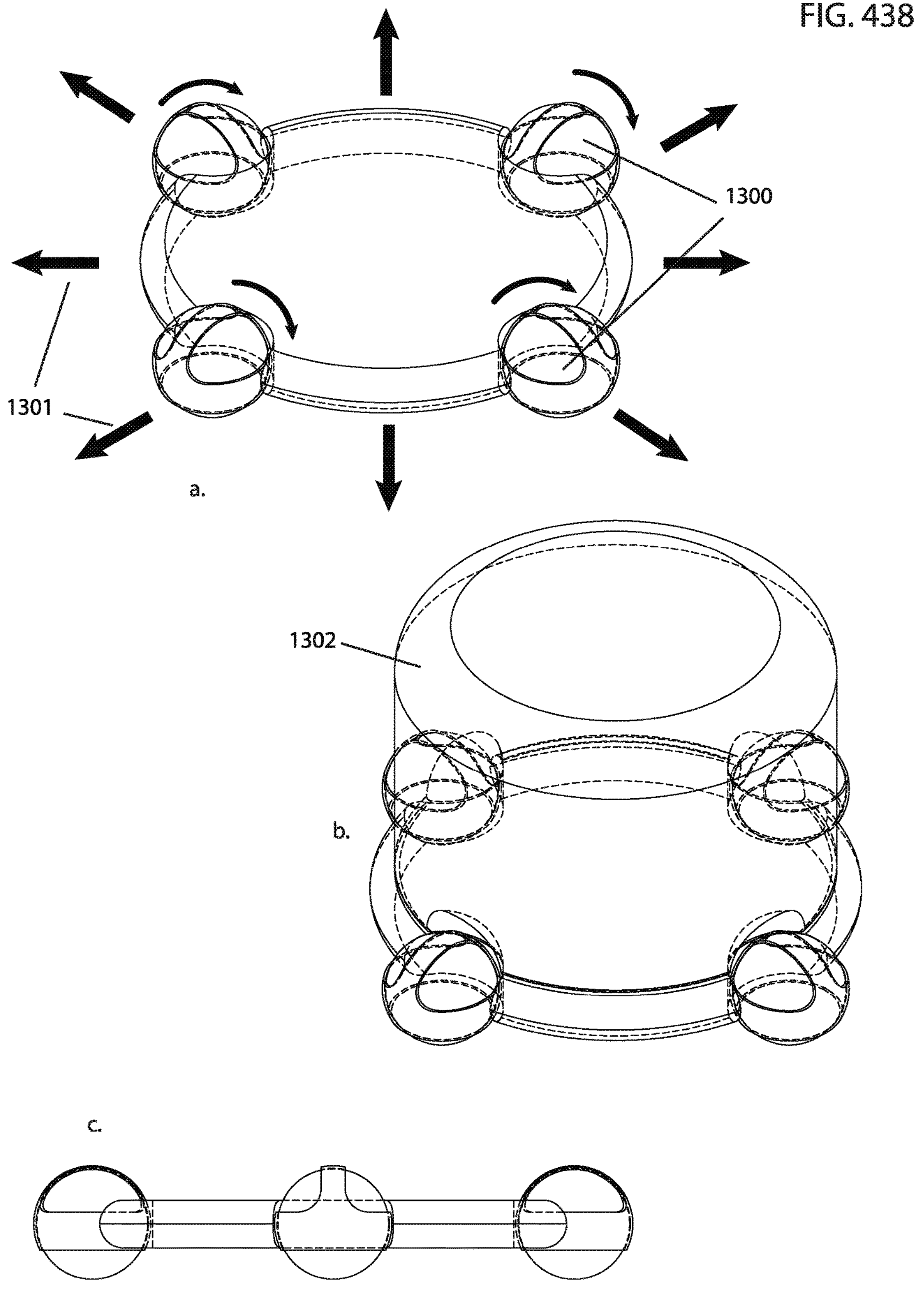
Figure 439:
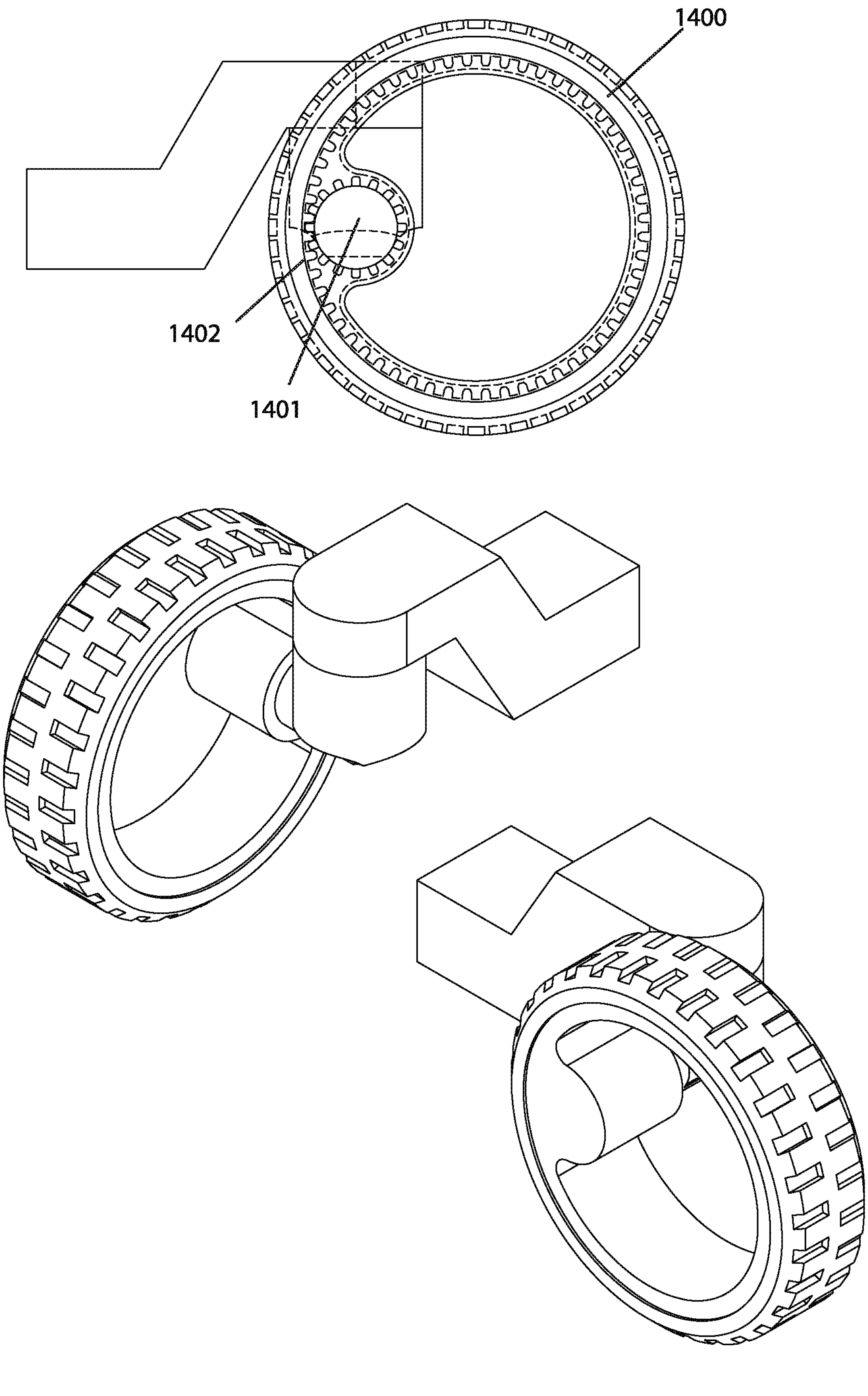
Figure 440:
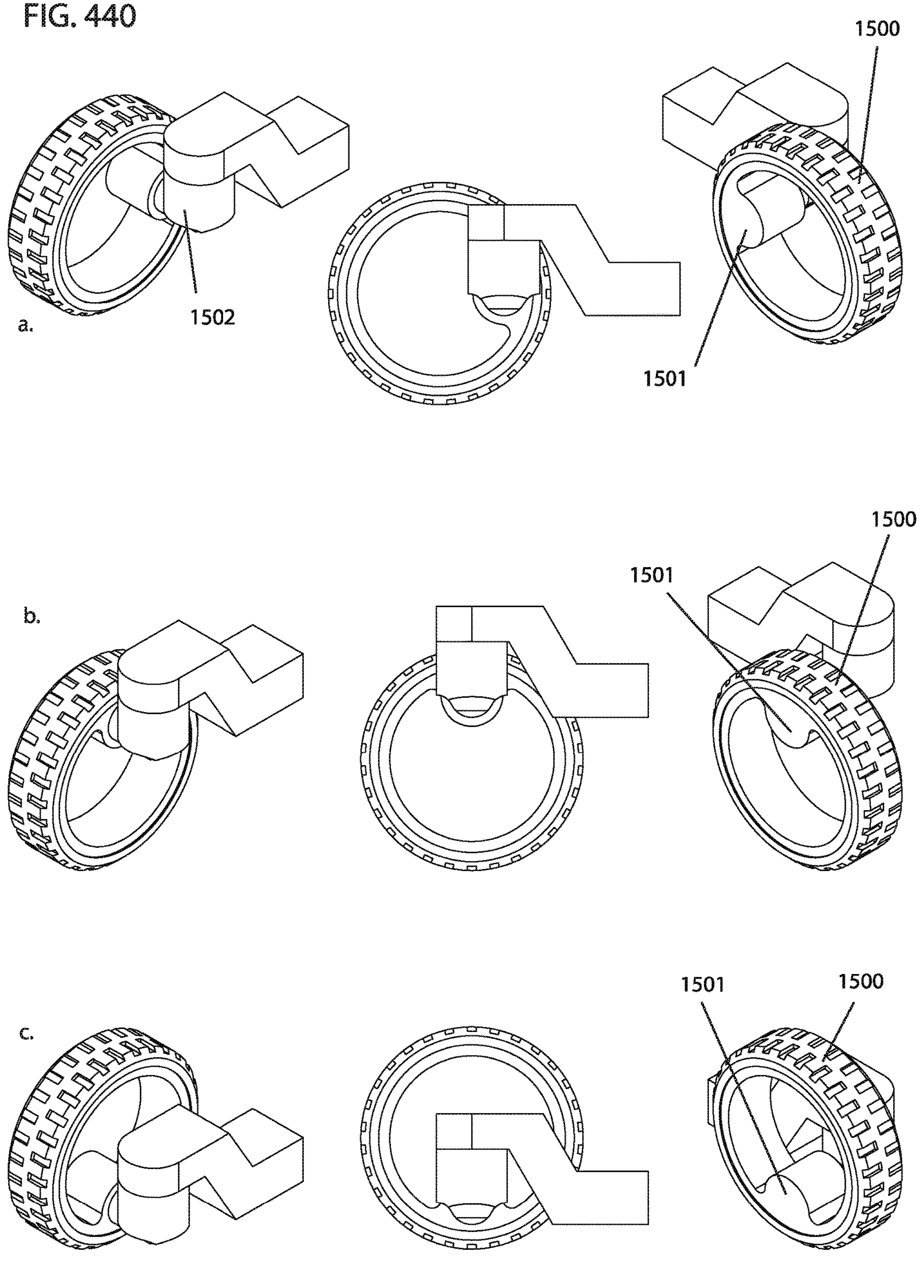
Figure 442A:
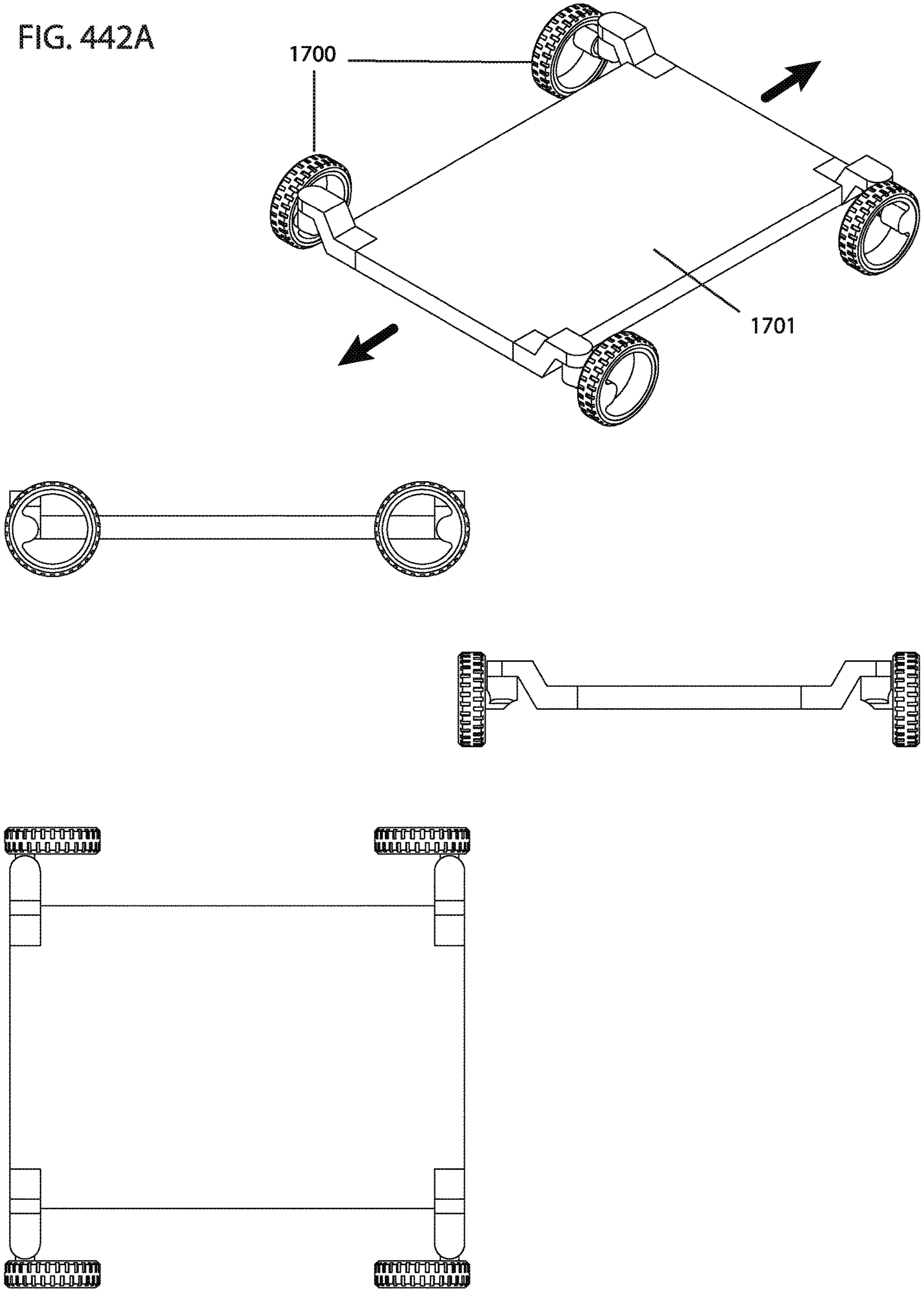
Figure 442C:
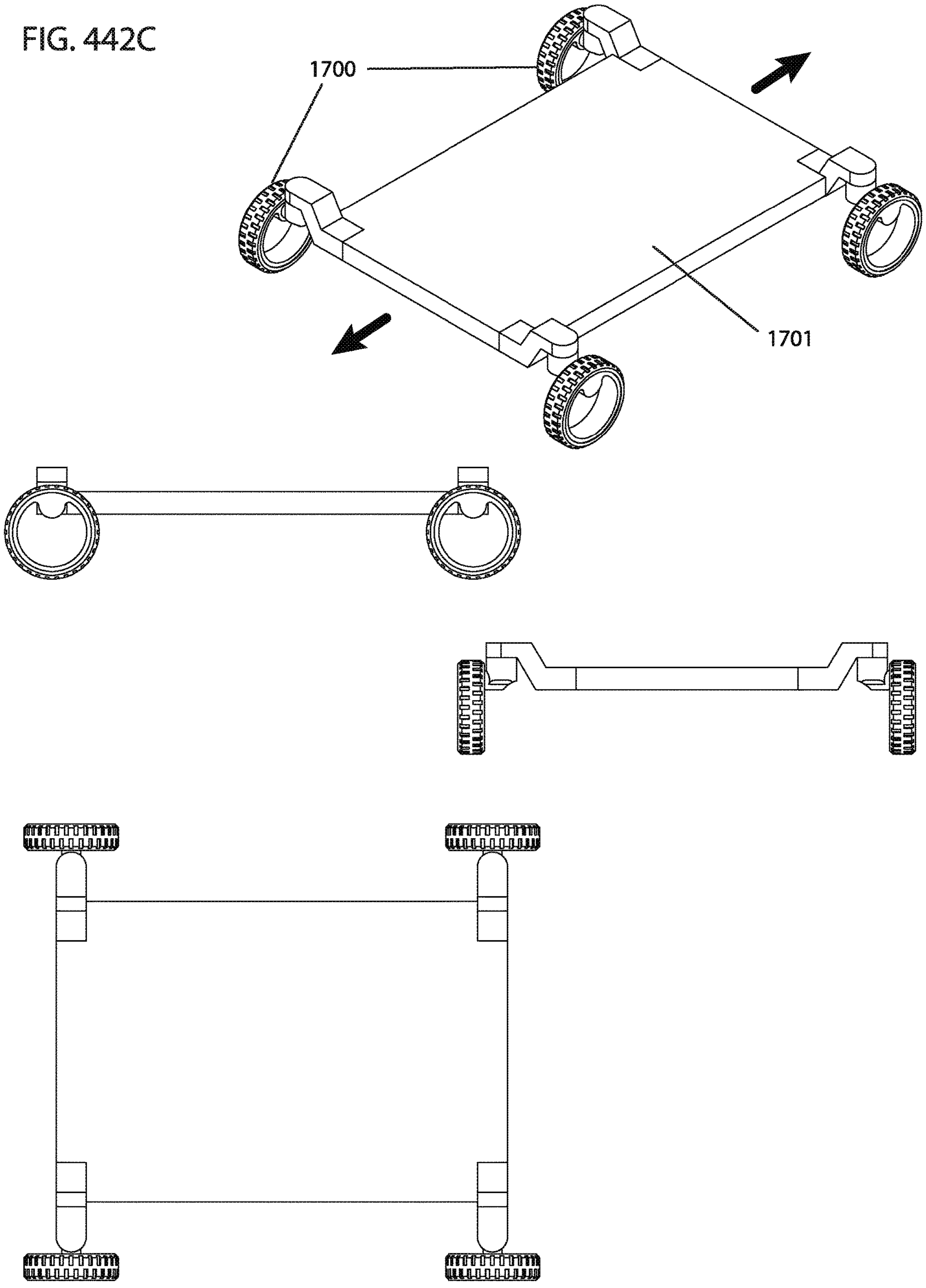
Figure 442E:
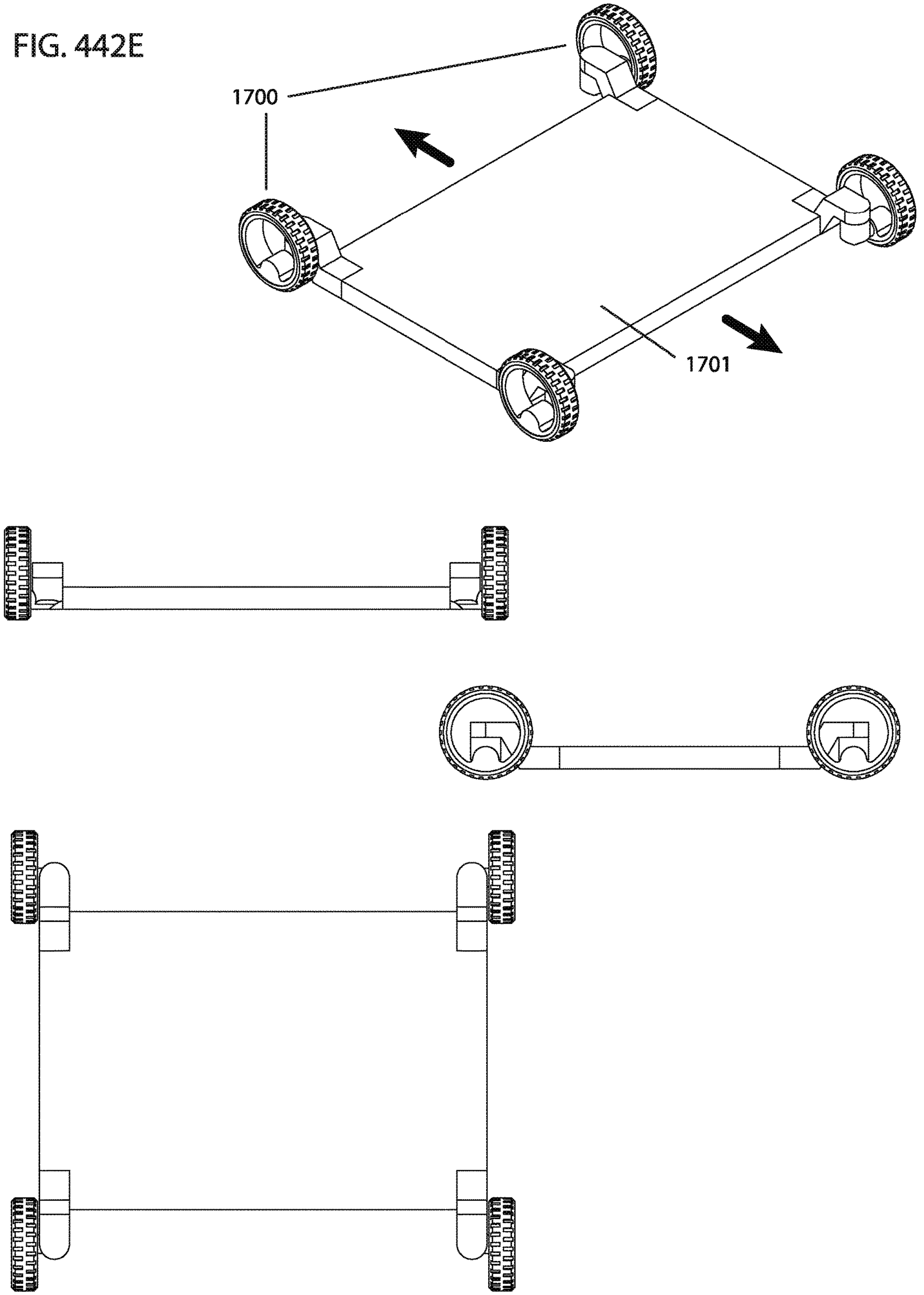
Figure 442F:
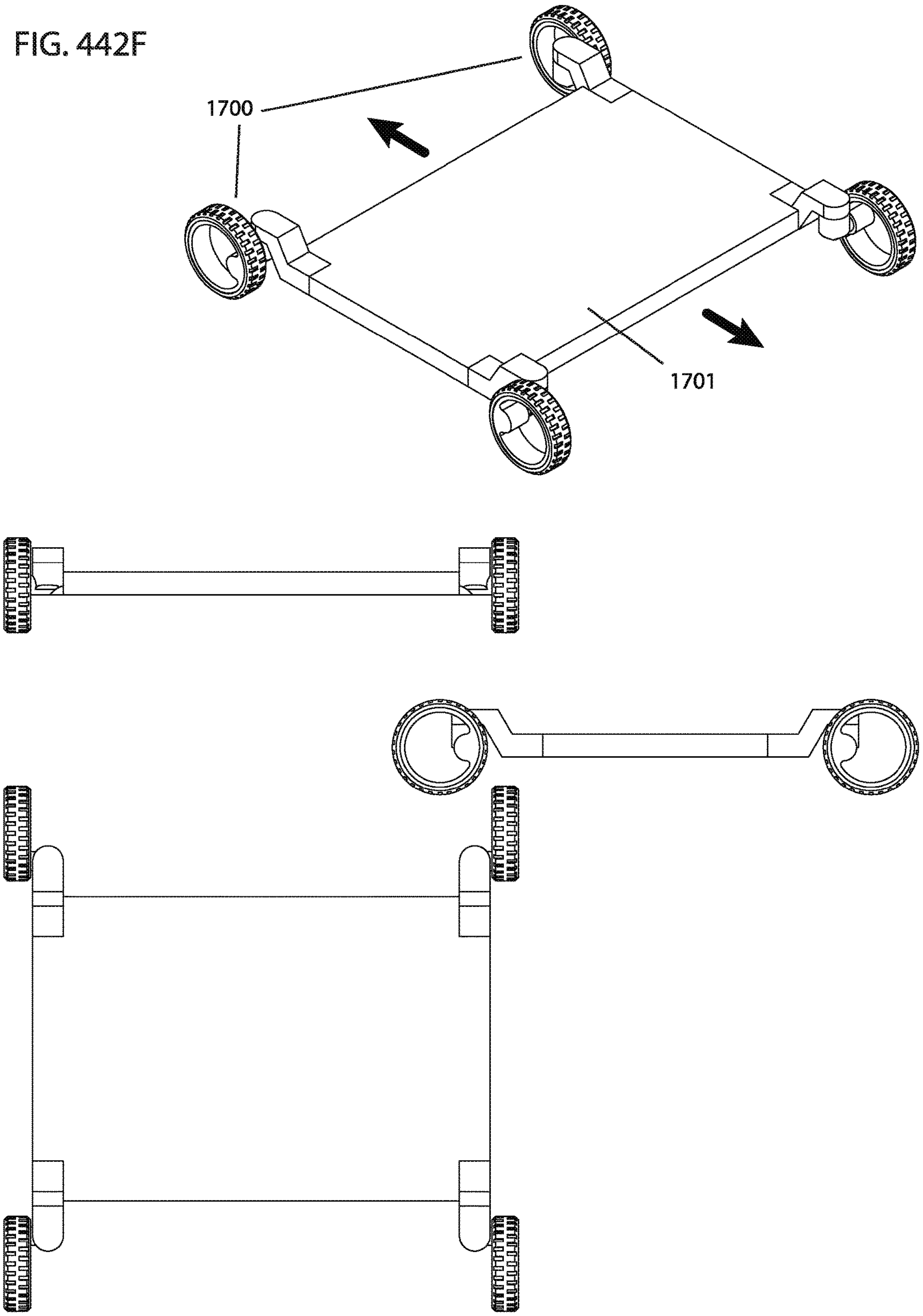

In embodiments, the VMP comprises a combination of drive wheels and caster wheels. In embodiments, the drive wheels of the VMP may vary. For example, FIG. 433 illustrates examples of possible wheels including regular wheels 800 powered by brushed or brushless DC motors, mecanum or omni wheels 801, and omnitrack 802 wheels. Other wheels, such as omnispherical wheels may be used as well. In embodiments, each drive wheel comprises a separate motor, a break system, a suspension mechanism (if needed), and a wheel. The number of drive wheels of a VMP depends on a shape and a size of the chassis. For example, FIG. 434 illustrates a longer VMP requiring drive wheels 900 coupled to a chassis 901 in a front, a middle and a rear of the VMP. Caster wheels may be placed under the chassis in strategic places to reduce the friction, aid the drive wheels, and distribute the weight better. The caster wheels may have their own suspension mechanism and brake systems. FIG. 435 illustrates examples of different caster wheels, such as regular wheels 1000 and 1001, omnidirectional wheels 1002 and spherical wheels 1003. Wheel 1000 is a simple caster wheel, wheel 1001 is a caster wheel with break and leveling mechanism, wheel 1002 is a combination of omnidirectional track wheels that rotate in two axes without turning in a height axis, and wheel 1003 is a spherical caster wheel that rotates in any direction. In some embodiments, a combination of wheels may be used at a single point for better weight distribution. This combination of wheels may comprise a set of wheels attached to a rotating plate, such as in FIG. 436 illustrating a combination of wheel 1100 attached to rotating plate 1101 or 1102. Both the wheels 1100 and plates 1101 and 1102 may rotate around a height axis. Alternatively, the combination of wheels may comprise a set of wheels (or rollers) positioned within a cage, such as in FIG. 437 illustrating a combination of wheel 1200 in various sized cages 1201. In embodiments, the cage-structure provides strength and improved weight distribution. In some embodiments, the drive wheels are spherical, wherein separate motors from inside or outside of the wheel determine direction and speed of rotation of each wheel individually. Such a wheel setup may be useful in avoiding or minimizing turns as the VMP is able to move in any direction without turning. FIG. 438 illustrates an example of a VMP 1300 including omnispherical wheels 1301, each driven separately and capable of driving the VMP in any direction, indicated by arrows 1302. The VMP may be customized with a coupled component 1303. In some embodiments, a connection axis of the drive wheel to the main rotating gear is shifted to a side, adjacent to the perimeter of the wheel on the inside. FIG. 439 illustrates an example of a wheel 1400 with a connection axis to the main rotating gear 1401 shifted to a side of the wheel 1400, adjacent to the perimeter 1402 of the wheel 1400. Similar examples are shown in FIG. 440 for wheel 1500 with a connection axis adjacent to a perimeter 1501 of the wheel 1500 and FIG. 441 for wheel 1600 with a connection axis adjacent to a perimeter 1601 of the wheel 1600. The main advantage of the position of such a connection axis being the connection axis height not being restricted to a height of a middle of the wheel. This is shown in FIGS. 440 and 441, wherein different chassis heights are illustrated based on a location of the connection axis. For instance, FIGS. 442A-442F illustrate a position of the connection axis of wheels 1700 to a chassis 1701 of a VMP can change a height of the chassis 1701 in relation to a driving surface of the VMP. With a variable chassis height, the VMP may lower the height of the chassis to drive beneath a load and increase the height of the chassis to engage and couple with to the load when positioned beneath the load. Further, in FIG. 441 the assembly 1602 connecting to the chassis 1600 is rotated 90 degrees around the vertical axis in comparison to assembly 1502 in FIG. 440. This changes an orientation of rotation of the wheels and a direction of movement of the VMP. This is also observed in comparing FIGS. 442A-442C to FIGS. 442D-442F wherein the directions of movement 1702 of the VMP changes. However, a disadvantage of the connection axis of the wheel being shifted to the side is the wheel motor requiring a stronger torque to provide a same amount of speed.

Figure 443:
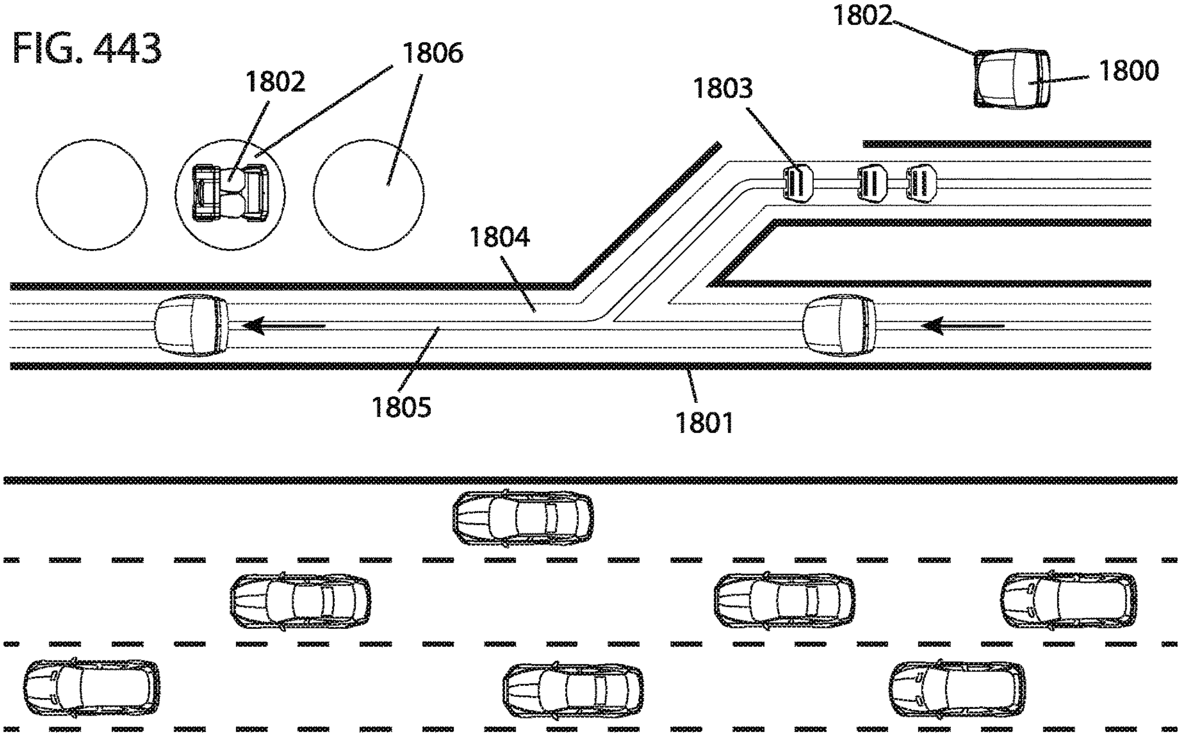
Figure 444A:
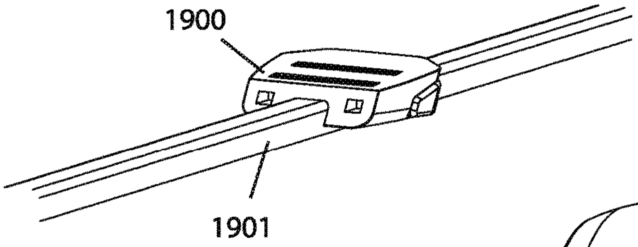
Figure 444B:
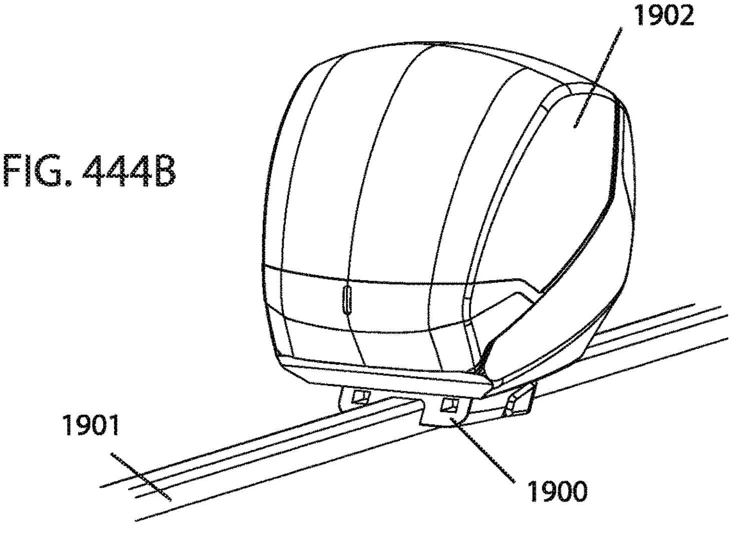
Figure 445A:
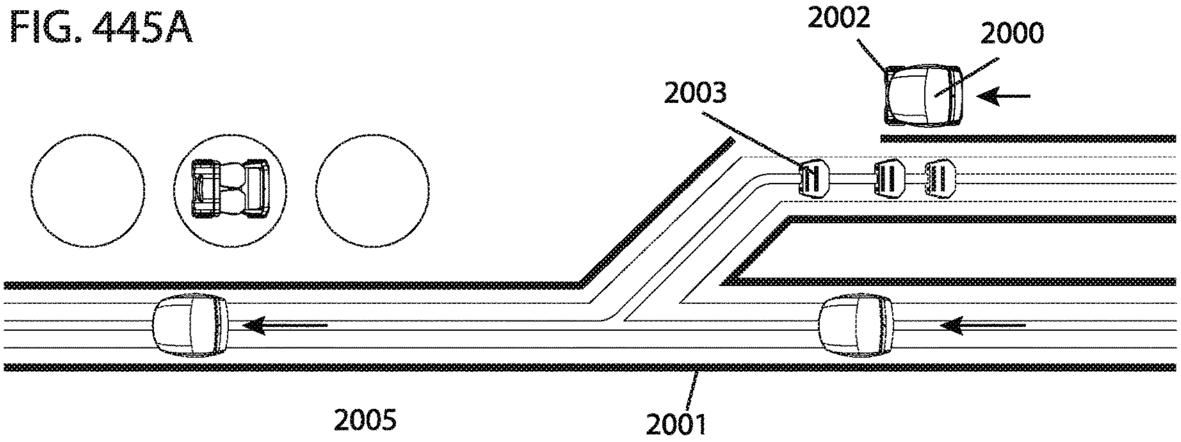
Figure 445B:
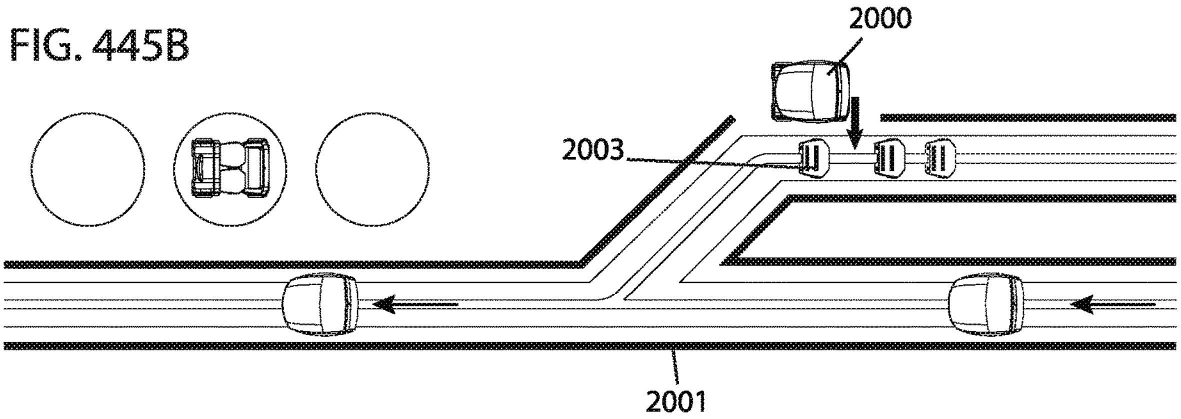
Figure 445C:
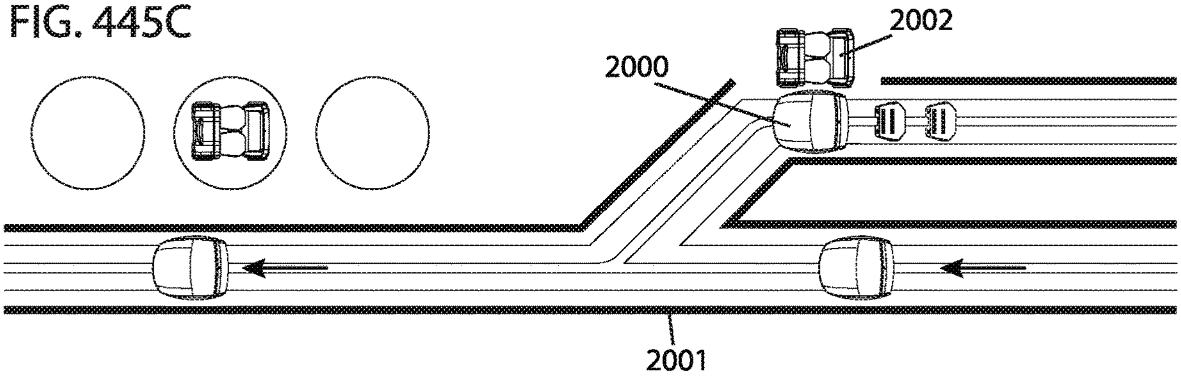
Figure 445D:
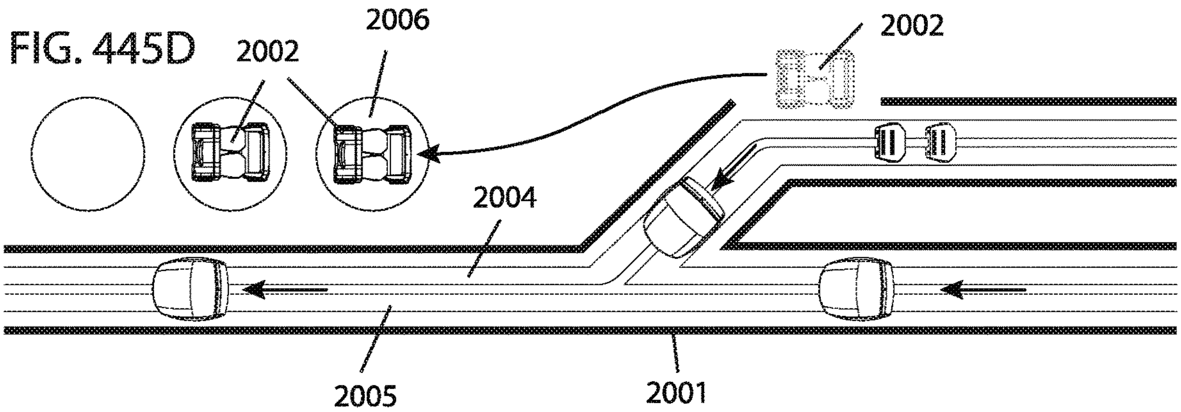
Figure 445E:
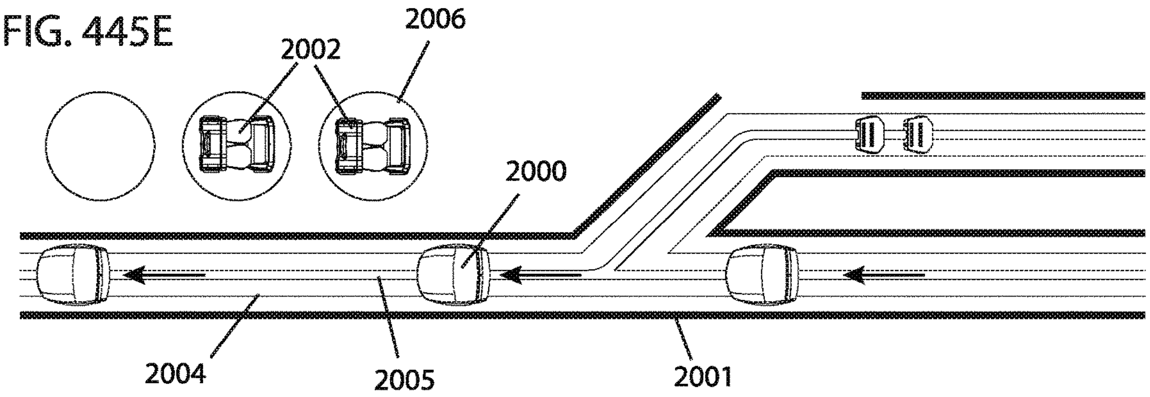
Figure 446A:
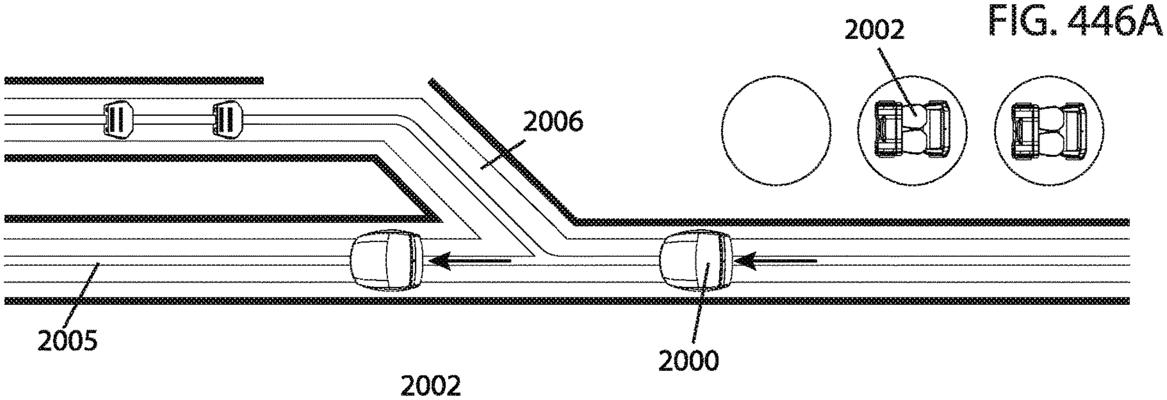
Figure 446B:
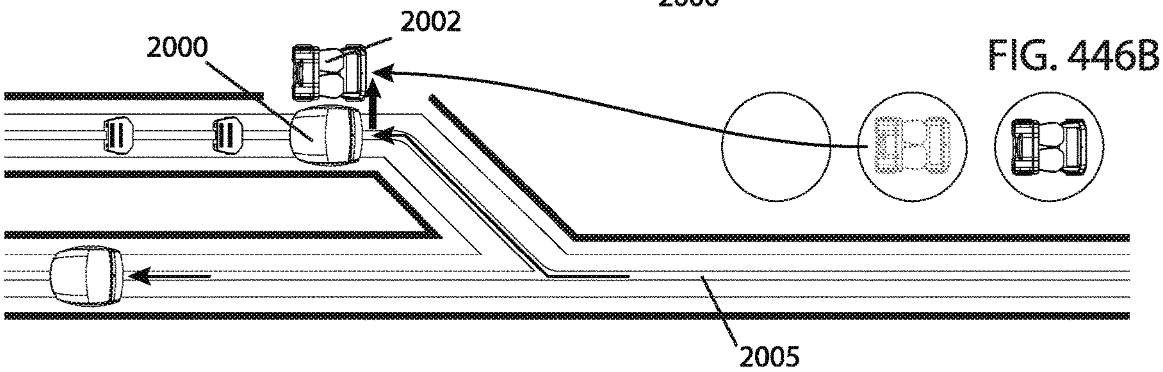
Figure 446C:
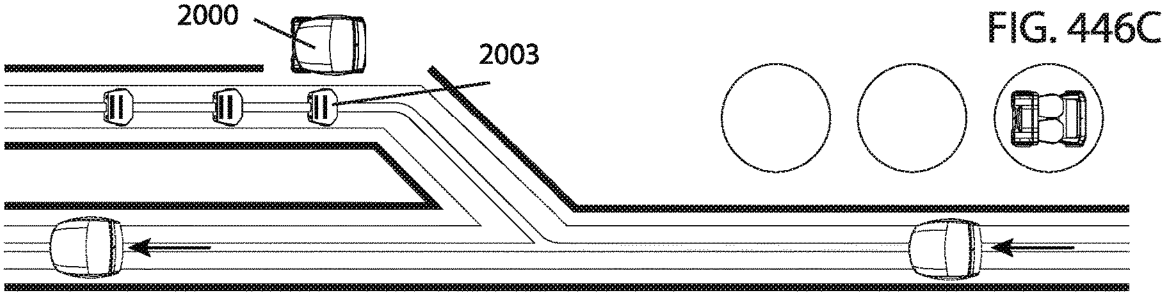

In some embodiments, VMPs may operate together as a fleet and collaborate by sharing information such as their locations, observations, and other data through collaborative artificial intelligent technology (CAIT) such that each VMP may have a better understanding of the environment in comparison to their understanding when working independently. In some embodiments, the VMPs are managed by a fleet control system for more efficient route planning and power supply management and improved customer service. In one embodiment, a fleet of VMPs may comprise passenger pods to transport passengers between locations. For example, FIG. 443 illustrates passenger pods 1800 with their own network of freeways 1801 for longer distance travel and faster travel. Passenger pods 1800 coupled to VMPs 1802 are transferred to carriers 1803 that move in a high-speed lane 1804 powered by a high-speed railing system 1805. After the transfer, VMPs 1802 may execute a next task, park at a storage location, recharge batteries at a docking station 1806. FIG. 444A illustrates a carrier 1900 installed on a high-speed rail 1901 onto which a passenger pod 1902 is transferred upon its arrival. FIG. 444B illustrates passenger pod 1902 transferred onto the carrier 1900 from a VMP. The passenger pod 1902 continues its travel via the high-speed rail 1901 while the VMP may recharge its batteries or execute a next task (e.g., pick up another passenger pod or a different type of load). FIGS. 445A to 445E passenger pods 2000 with their own network of freeways 2001 for longer distance travel and faster travel. Passenger pods 2000 coupled to VMPs 2002 are transferred to carriers 2003 that move in a high-speed lane 2004 powered by a high-speed railing system 2005. After the transfer, VMPs 2002 recharge batteries at a docking station 2006. FIGS. 446A to 446C illustrate a process of VMPs 2002 picking up passenger pods 2000 from the high-speed railing system 2005. When the passenger pods 2000 approach the exit lane 2007, they slow down and enter the exit lane 2007, as illustrated in FIG. 446A. Simultaneously, the fleet management system requests VMPs 2002 to pick up passenger pods 2000 from carriers 2003, as illustrated in FIG. 446B. Once the transfer of passenger pods 2000 from carriers 2003 to VMPs 2002 is complete, as illustrated in FIG. 446C, the VMP may transport the passenger pods 2000 within the urban area.

Figure 448:
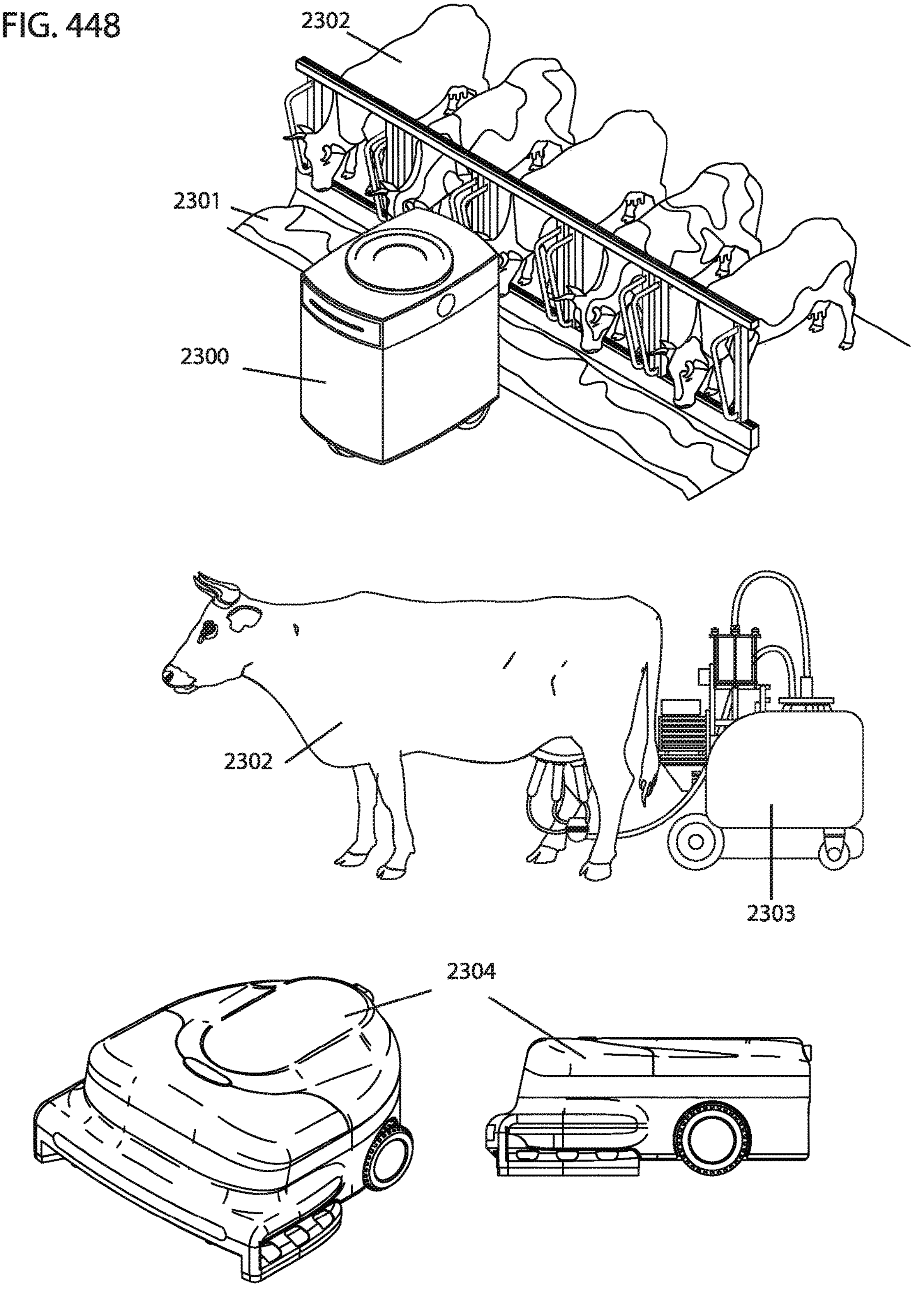

In different embodiments, VMPs may vary in size and shape and may be used within outdoor and/or indoor spaces. Examples of larger load VMPs include passenger pods, delivery containers, mobile office, mobile gym, etc. Examples of smaller load VMPs include commercial robot vacuum cleaners (e.g., for cleaning a mall, hotel, office building, or any commercial or industrial facilities), robotic floor scrubbers, robotic lawnmowers, delivery robots, factory robots (e.g., for moving loads), survey robots, etc. FIG. 447 illustrates some examples of customized VMPs, including robotic commercial cleaners 2200, robotic lawn mower 2201, factory robot 2202 for transferring loads 2203, and surveillance robots 2204. In some embodiments, a VMP is customized to perform specialized tasks that automate a particular industry task. For example, milking cows and collecting manure to use as fertilizer are particular tasks within the livestock industry. FIG. 448 illustrates VMPs customized as a robotic livestock feeder 2300 for autonomously providing food 2301 to livestock 2302, a milking robot 2303 for autonomously milking livestock 2302, and a manure collecting robot 2304.

Figure 449A:
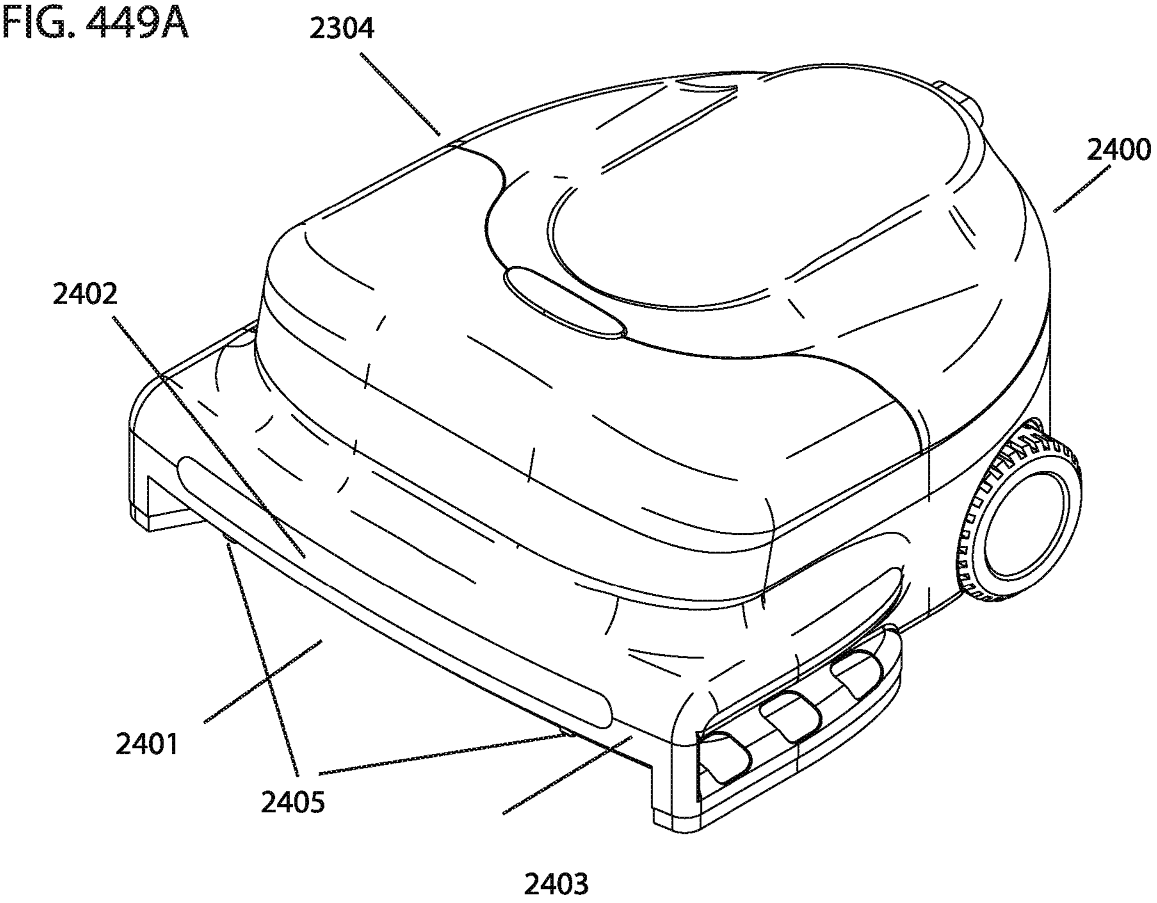
Figure 449B:
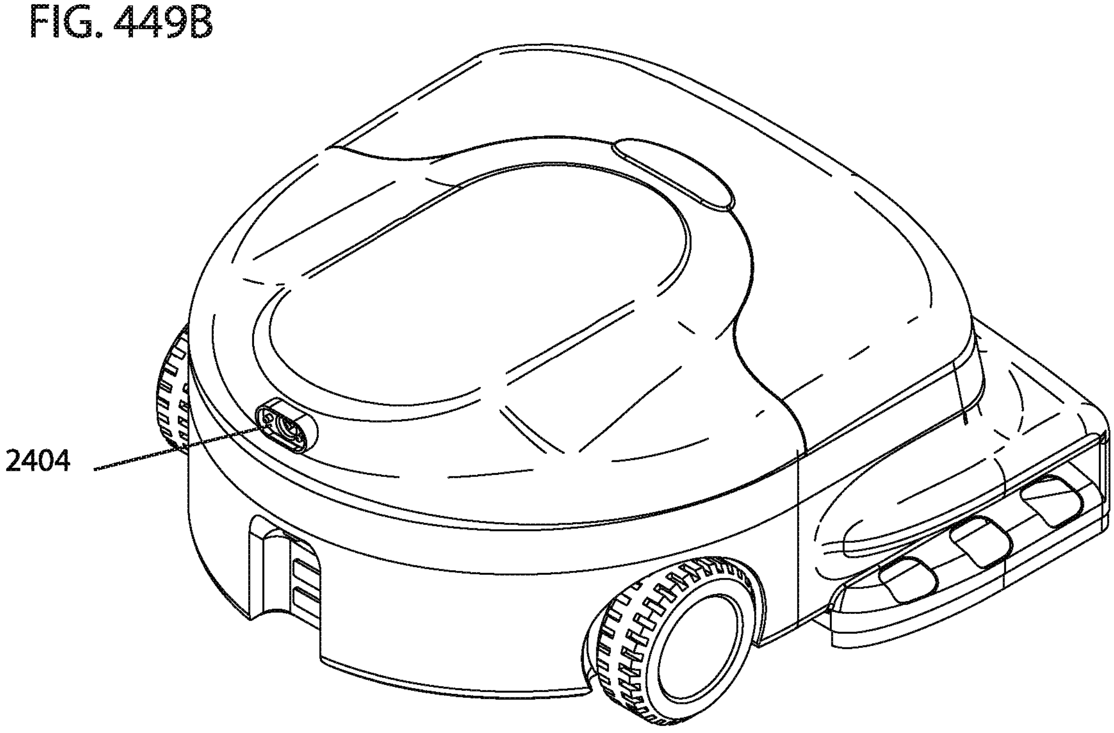
Figure 450A:
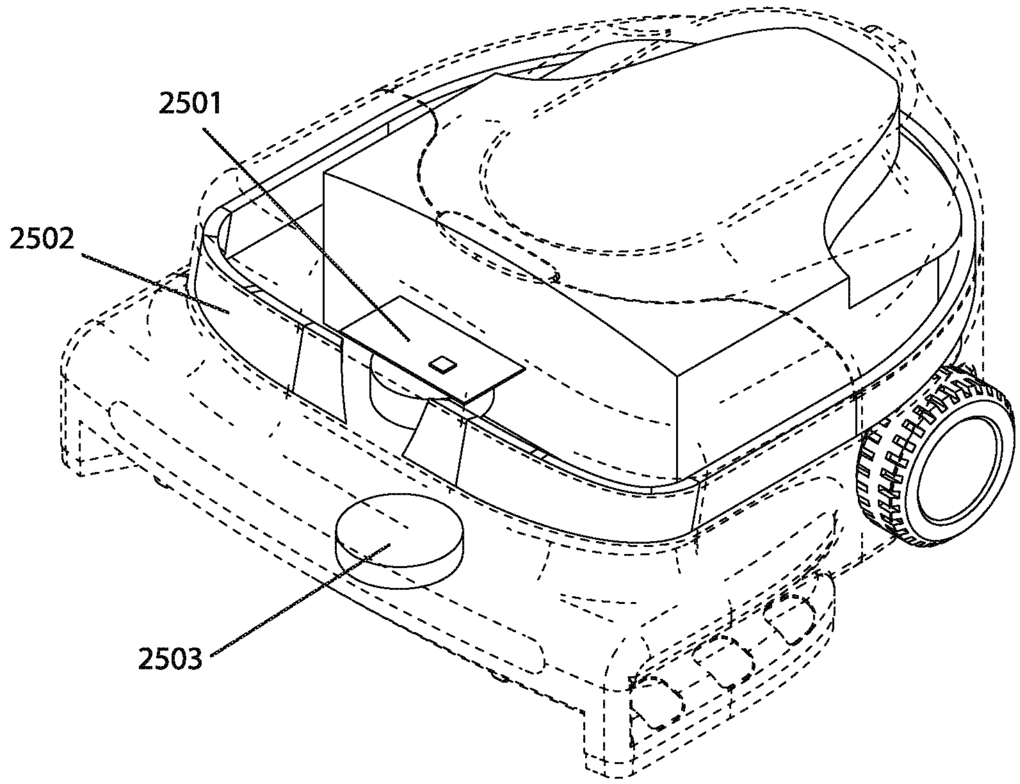
Figure 450B:
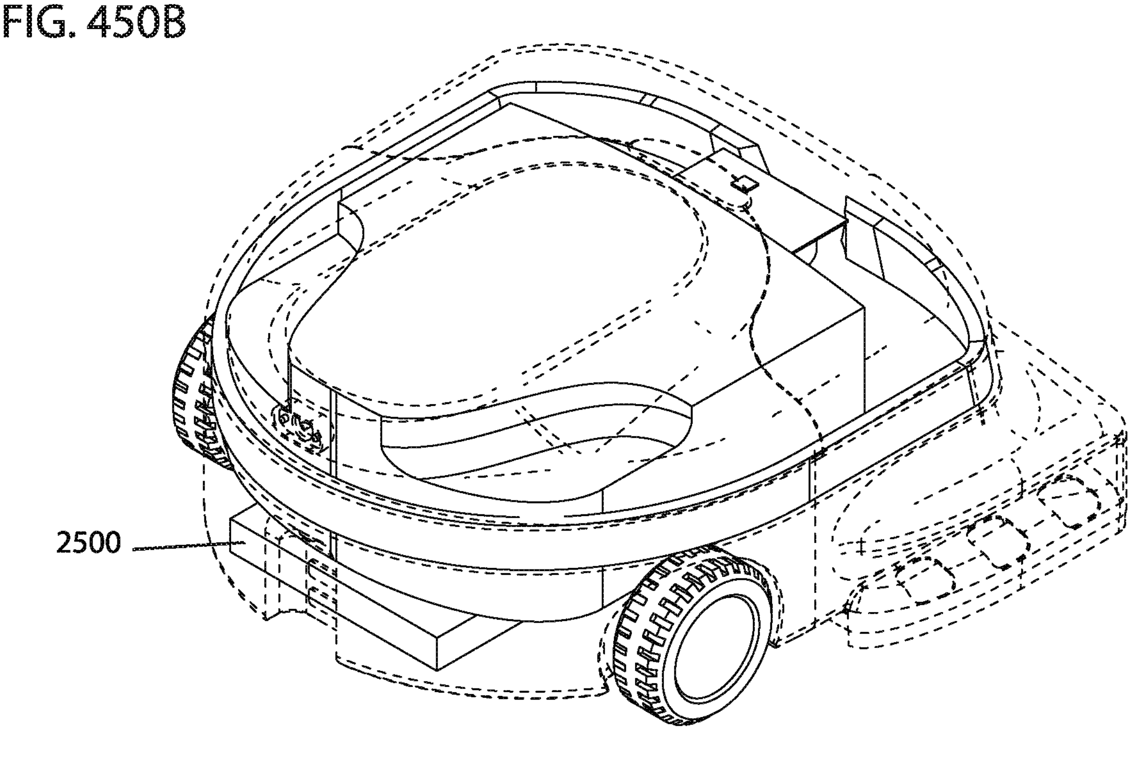
Figure 451:
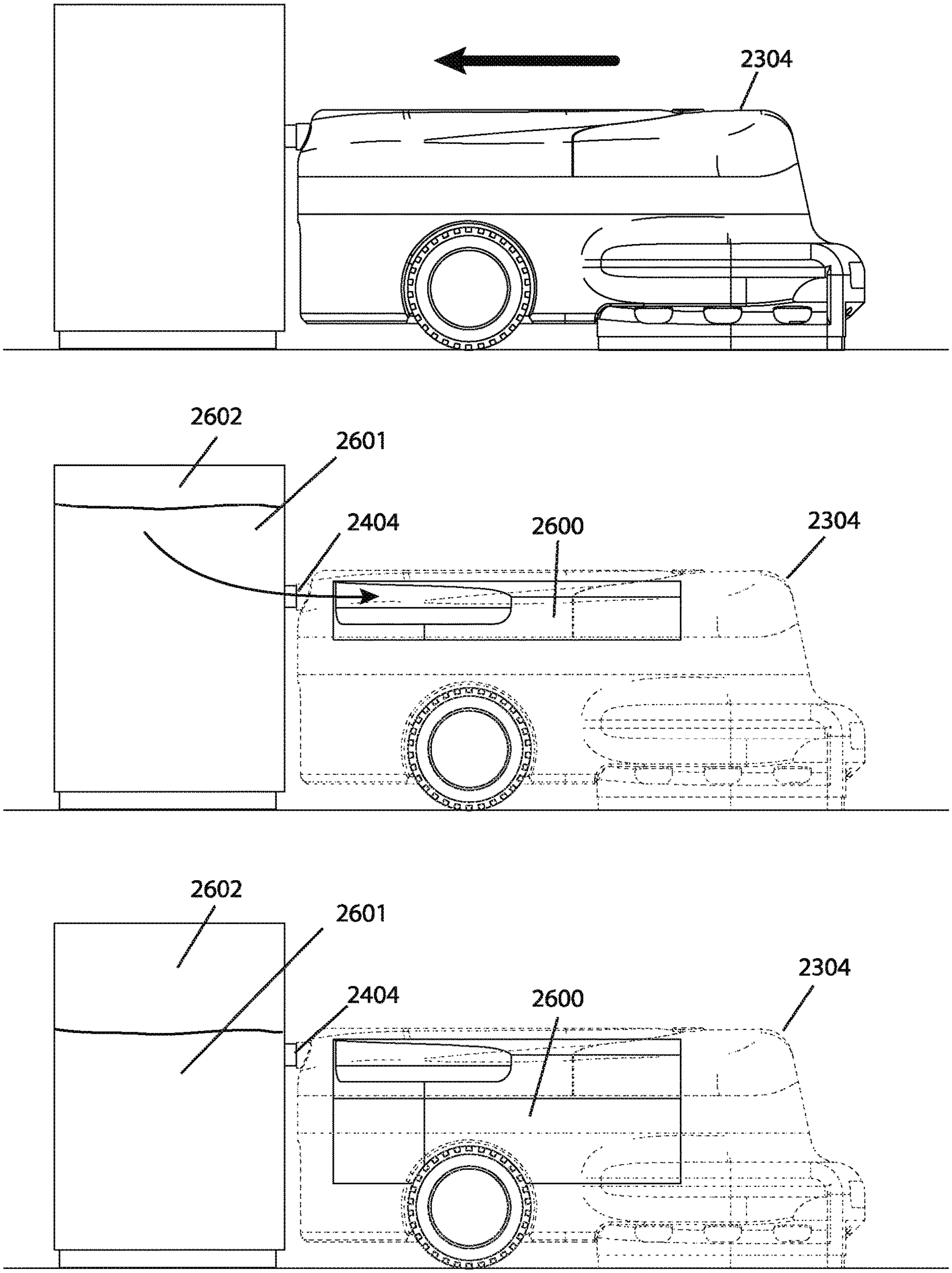
Figure 452:
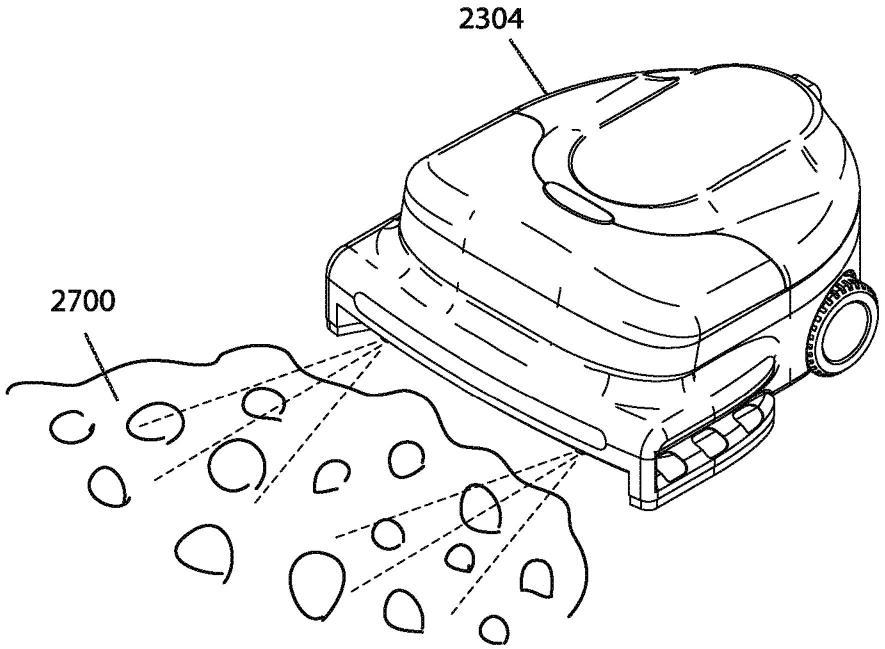
Figure 453:
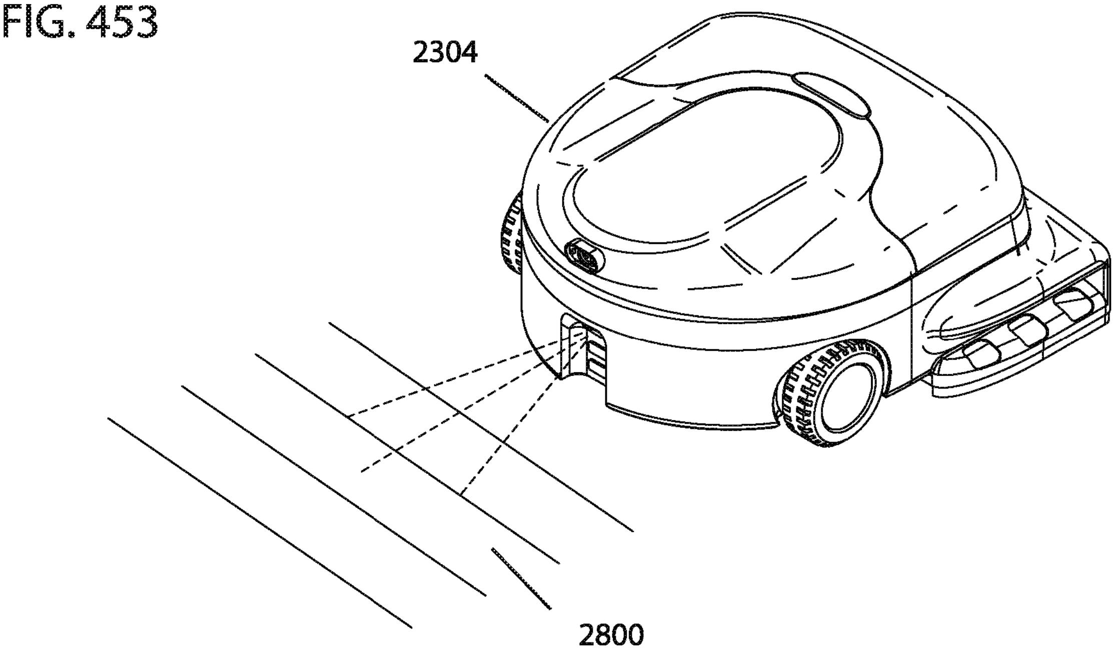
Figure 454:
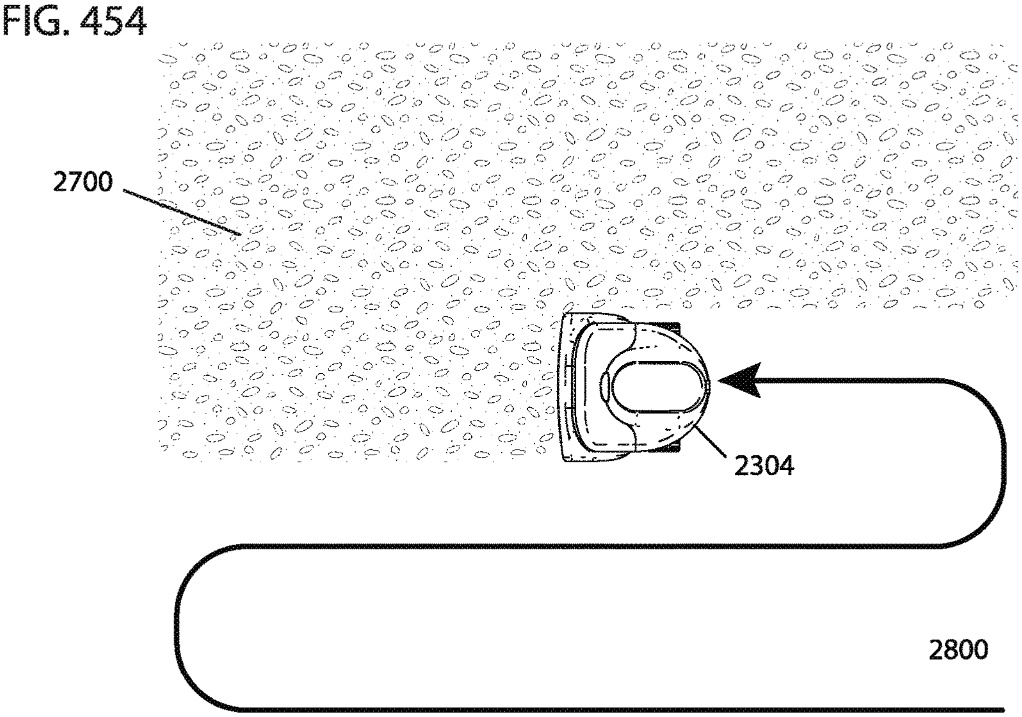
Figure 455:
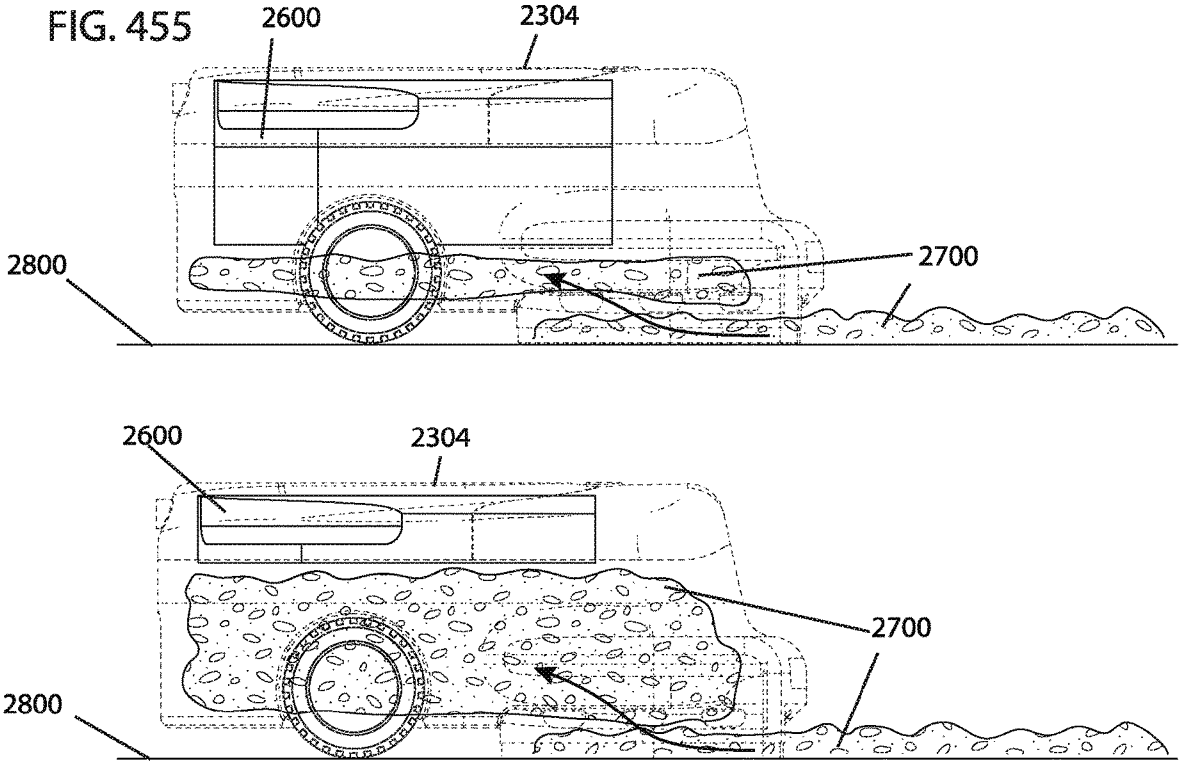
Figure 456:
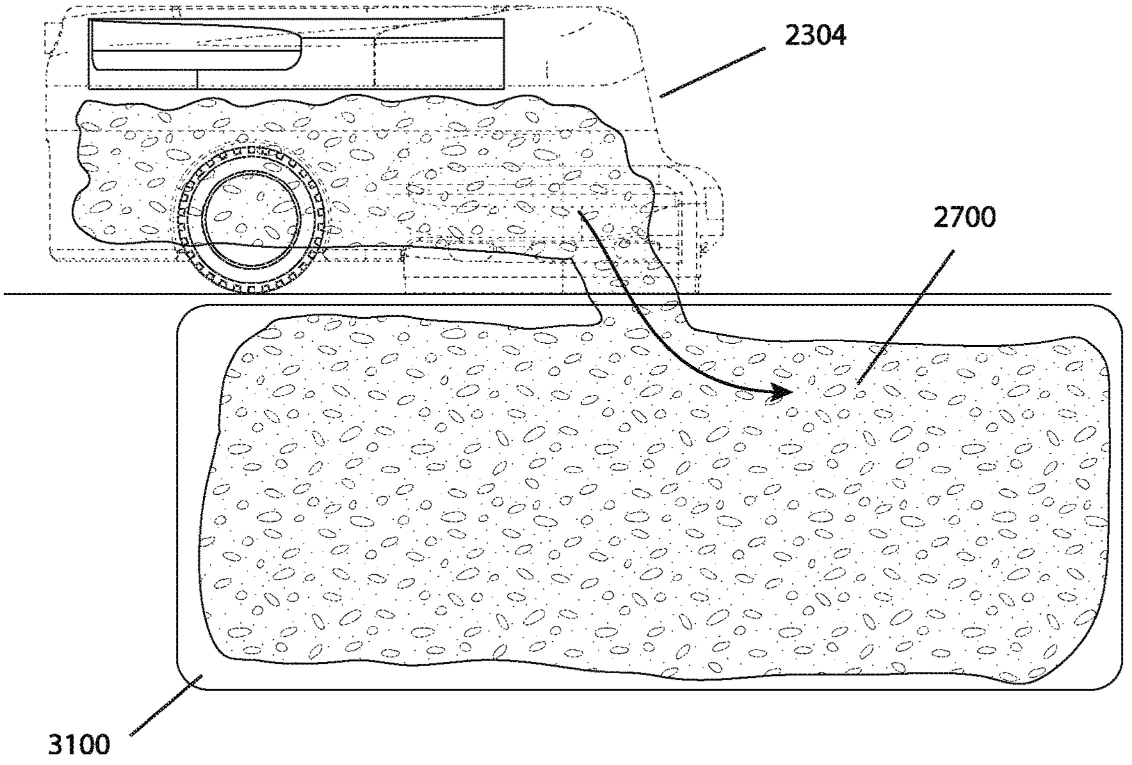
Figure 457:
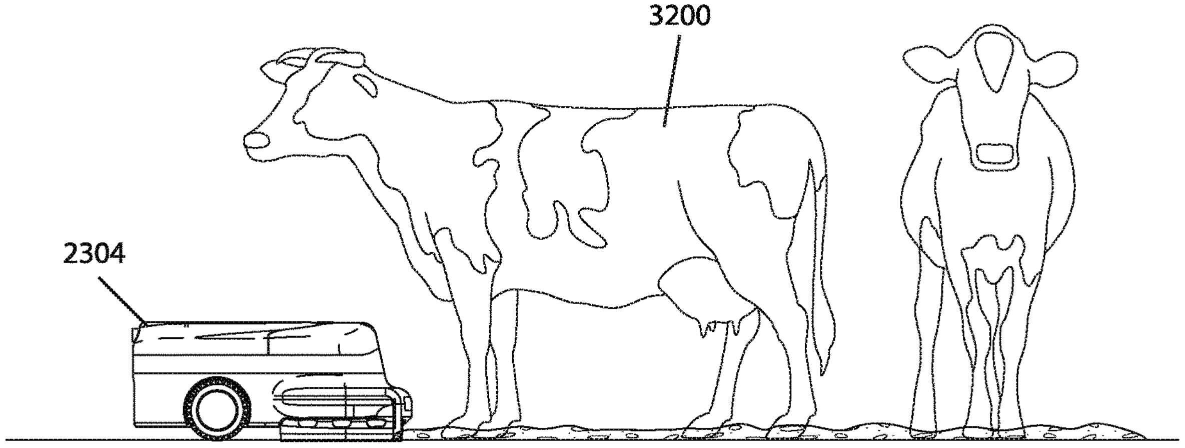

When VMPs are designed to perform specialized tasks, their form and structure may change to suit their desired functionalities. However, the core principles, structures, and navigation solutions are maintained for every VMP. For example, in FIGS. 449A and 449B, the overall shape of the VMP customized as the manure collecting robot 2304 is customized to form a D-shaped robot, wherein the VMP may have a curved surface 2400 on a back side for better maneuverability and flat face 2401 on a front side for better collecting performance. FIGS. 449A and 449B illustrate different components such as sensors behind windows 2402, water container (not shown), manure intake module 2403, water intake valve 2404, and a water spray module 2405 that are added to the VMP based on its intended functionalities. FIGS. 450A and 450B illustrate main components housed within the VMP including a power supply 2500, a main printed circuit board (PCB) and processor 2501, sensor arrays 2502, and LIDAR or camera 2503. These main internal components and drive wheels and caster wheels are included in each VMP, however, they may be optimized in terms of a type of the component and their position within or on the robot to achieve better performance. For example, FIG. 451 illustrates manure collecting robot 2304 customized with a water tank container 2600. The water container 2600 is stretchy and expands as it fills with water 2601 provided by station 2602 via water intake valve 2404. FIG. 452 illustrates the manure collecting robot 2304 spraying the manure 2700 with water from a front side to wet it for better collection. At the same time, FIG. 453 illustrates the manure collecting robot 2304 spraying the floor 2800 with water from a backside after collecting the manure 2700 to clean the floor 2800. FIG. 454 illustrates the manure collecting robot 2304 spraying the manure 2700 then collecting the manure 2700 while simultaneously spraying the floor 2800 at a same time to minimize travel on the cleaned portion of the floor. As the manure spraying robot 2304 uses water to spray the manure 2700 and clean the floor 2800, the water container 2600 shrinks, freeing up more space within the robot for the collected manure 2700, as illustrated in FIG. 455. This way, the manure collecting robot 2304 is designed with an overall smaller footprint. Once the manure collecting robot 2304 reaches its manure capacity or at the end of a work session, the manure collecting robot 2304 empties the collected manure 2700 to an underground tank 3100 for further processing in to fertilizer, as illustrated in FIG. 456. FIG. 457 illustrates the size of the manure collecting robot 2304 relative to the livestock 3200. The size of the manure collecting robot 2304 prevents it from being stomped on while also being unintimidating to the animals 3200.

Figure 458:
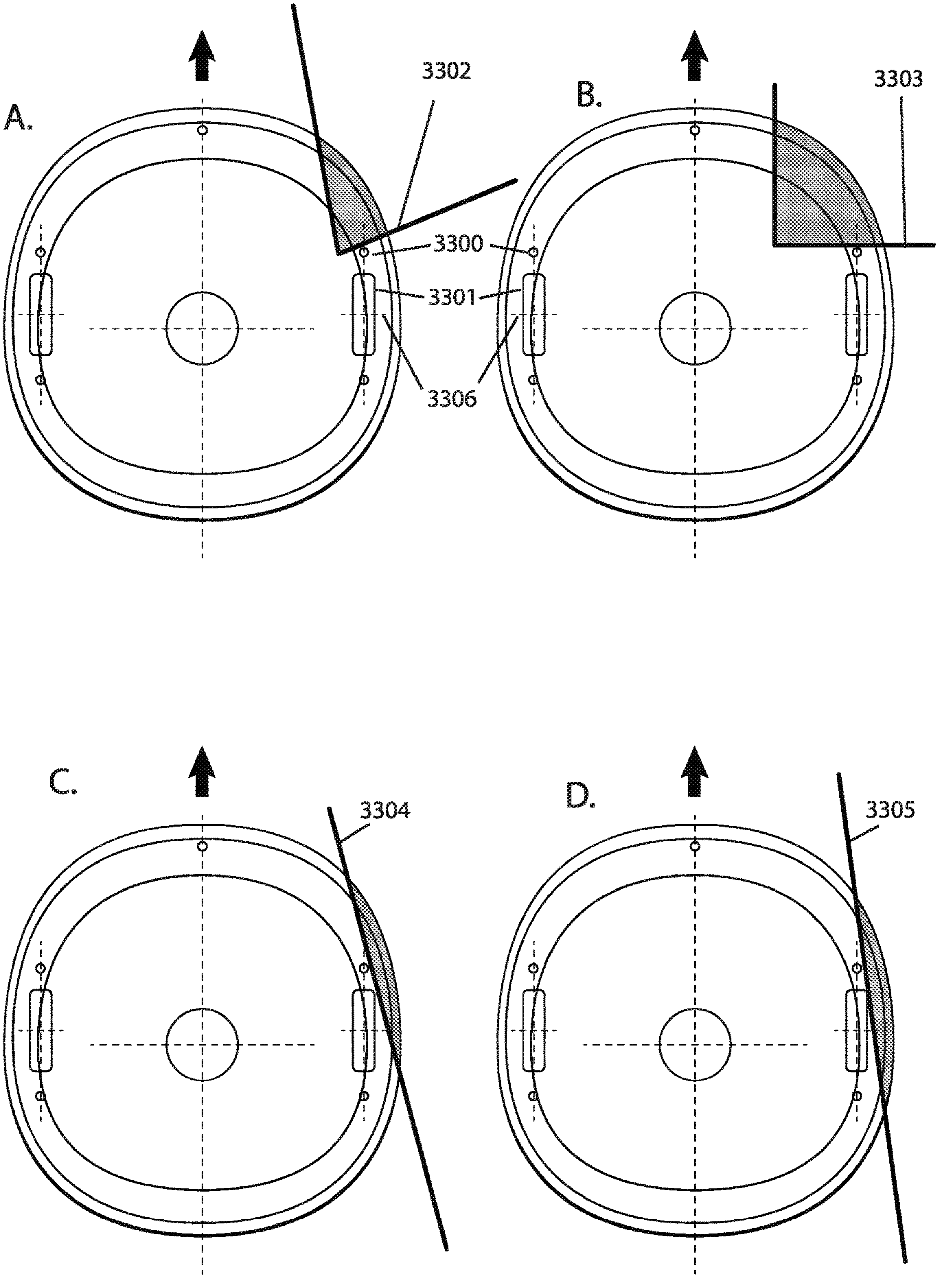
Figure 459:
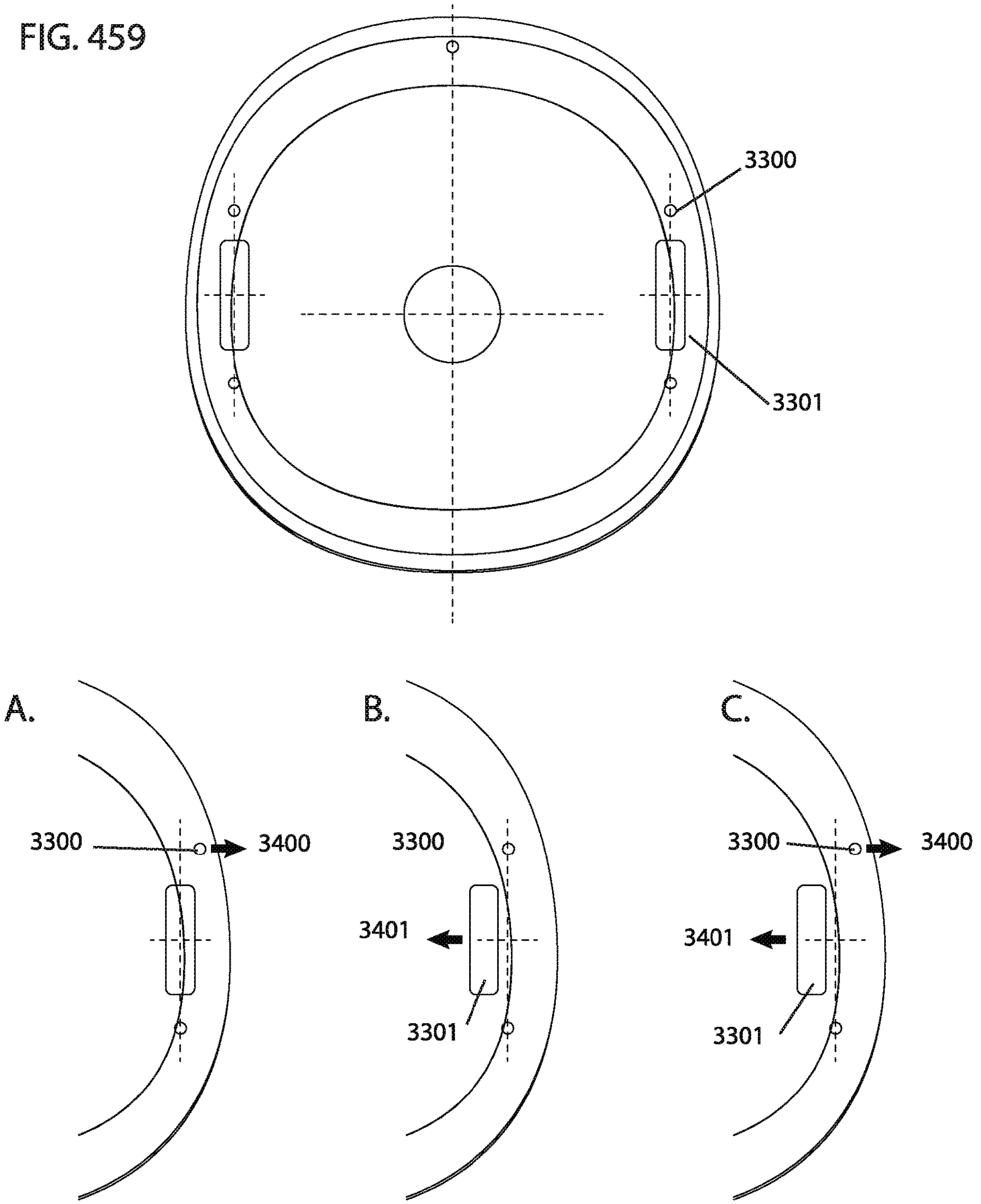

While several factors may affect the shape and structure of the VMP, the core principles and internal components of each VMP remain the same. A customizable VMP is advantageous because of the versatility. When customizing the VMP for a special use case, various factors such as sensor placement, wheel placement, and bumper movement are taken into consideration. FIGS. 458-463 illustrate some examples of these factors as applied to a VMP customized as a commercial floor cleaning robot. For instance, the placement of cliff sensors in relation to the wheels of the VMP is an important factor to consider. FIG. 458 illustrates cliff sensors 3300 and wheels 3301 of the VMP and cliffs 3302, 3303, 3304, and 3305 which the VMP approaches. The cliff sensors 3300 are aligned with the middle axis 3306 of the wheels 3301. While there are no issues in the sensors 3300 detecting the cliffs 3302 and 3303 with a wide angle and right angle, respectively, the cliff sensors 3303 fail to detect the cliffs 3304 and 3305 as the angle at which the cliffs are approached are narrow. This is solved by shifting the sensors 3300 closer to the edge 3400 of the VMP or by shifting the wheels 3301 towards the middle 3401 of the VMP or both, as illustrated in FIG. 459. The position and number of cliff sensors on the VMP also determine an amount of overhang of the VMP over cliffs 3500, as illustrated in FIGS. 460A-460C. Depending on the use case and the environment this may or may not cause problems. Depending on the use case of the VMP, a type and field of view of the cliff sensors used may vary. For example, data from an ultrasonic cliff sensor 3600 may be used to distinguish between a bare floor and carpeted floor, as illustrated in FIG. 461A. Use of a sonar cliff sensor 3601 may result in blind spots for the VMP, wherein a portion of the VMP may be on the carpet without the processor of the VMP detecting it, as illustrated in FIG. 461B.

In designing a bumper for the VMP, an angle of impact with the bumper must be considered as the VMP may not always collide with obstacles head on. FIG. 462A illustrates tactile sensors 3700 positioned on a VMP that may be activated from impact with obstacles 3701 from different angles. FIG. 462B illustrates the tactile sensors 3700 grouped together in groups 3702 to help in determining a direction of impact, which the processor may use in a further decision-making process. In embodiments, the bumper itself moves in different directions in relation to the VMP chassis. FIG. 463 illustrates a bumper 3800 of a VMP moving in three different directions 3801 in relation to the VMP chassis 3802 upon impact with an obstacle. In customizing a VMP for different tasks, various mechanisms may be considered for executing the same task. For example, FIG. 464 illustrates a VMP customized as a commercial floor cleaner comprising various forms of a mopping attachment 3900.

The mopping attachment 3900 is of various forms and includes different mechanisms for performing work. The mopping attachment 3900 may be a stationary mop (A), include a mechanism facilitating a back and forth motion for mopping (B), include a mechanism facilitating up and down motion for lifting and lowering the mop (C), include a mechanism facilitating ultrasonic vibration or shaking (D), include a spinning disk mop (E), and/or including spinning rollers (F). In addition to these variations, the mopping attachment 3900 may include a steaming mechanism or a water dispensing mechanism for dispensing warm or cold water to dampen a mop cloth for better cleaning. In some cases, the mopping attachment 3900 may be combined with a dirt suction mechanism to clear excess dirty water or debris before or after mopping.

Some embodiments include an autonomous baby walker. In some embodiments, the baby walker employs SLAM and other robotic automations. In some embodiments, the baby walker comprises a versatile mobile platform (VMP) as a base, on which additional components are added to build the baby walker. In some embodiments, the SLAM-enabled walker assists the baby walker with a direction of movement. In embodiments, a processor of the baby walker senses an initial movement direction based on sensor data and in response enables actuators to facilitate movement in that direction. In some embodiments, the baby walker provides extra safety features for the baby using different types of sensors. For example, obstacle and cliff sensors are used to prevent the baby walker from hitting any obstacle or tumbling over any step or floor transition. In some embodiments, the baby walker comprises separate sections. In some embodiments, the baby walker comprises a chassis or a base including wheel assemblies, low height obstacle detection sensors, near range obstacle detection sensors, cliff sensors, and a navigation unit configured for SLAM. The chassis or base may include three or more drive wheels, however having at least four wheels maintains a stable balance. Each wheel assembly comprises a wheel, a drive motor (e.g., a BLDC motor positioned within the wheel), and a brake mechanism (e.g., a lift up brake mechanism). A set of cliff sensors may be positioned in front and behind each of the wheels such that the cliff sensors detect changes in floor height in directions that are misaligned with a direction of movement of the baby walker. In some embodiments, each wheel assembly includes a lift-up brake mechanism, wherein upon triggering the brake a component extends down to a floor, lifting the wheel up to disable the wheel. This allows the baby walker to lock in place and convert into a chair. In some embodiments, a section of the baby walker comprises the LIDAR sensor and obstacle sensors positioned at a front portion of the baby walker at a higher height. In some embodiments, a compartment for supporting the baby is positioned on top of the chassis or base. The compartment may include a sitting platform with an adjustable height and holes through which legs of the baby may fit and a handle with grips for babies that can stand on their own. In some embodiments, a table for feeding or embedded toys is positioned on a front portion of the baby walker.

Figure 465A:
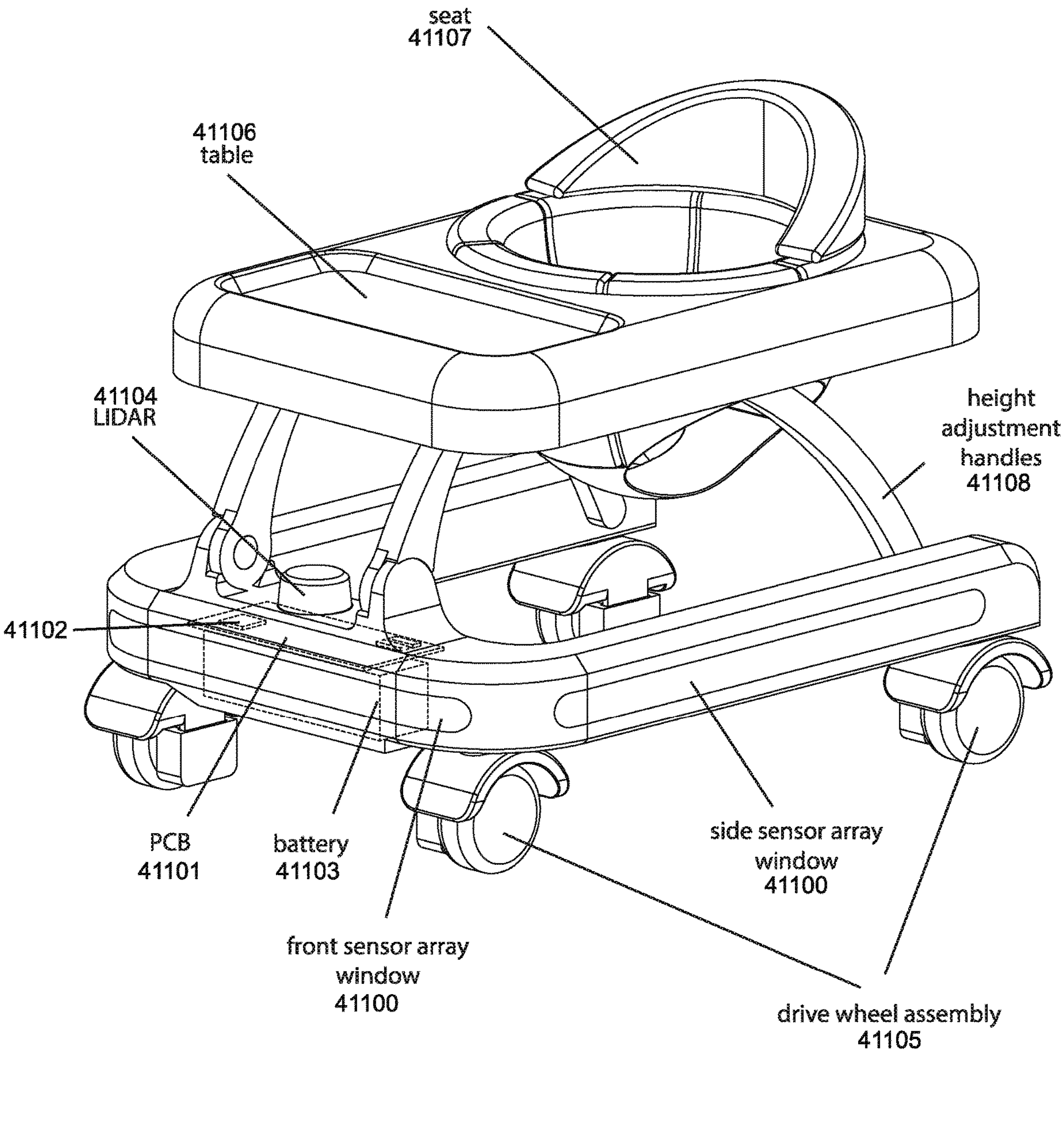
Figure 465B:
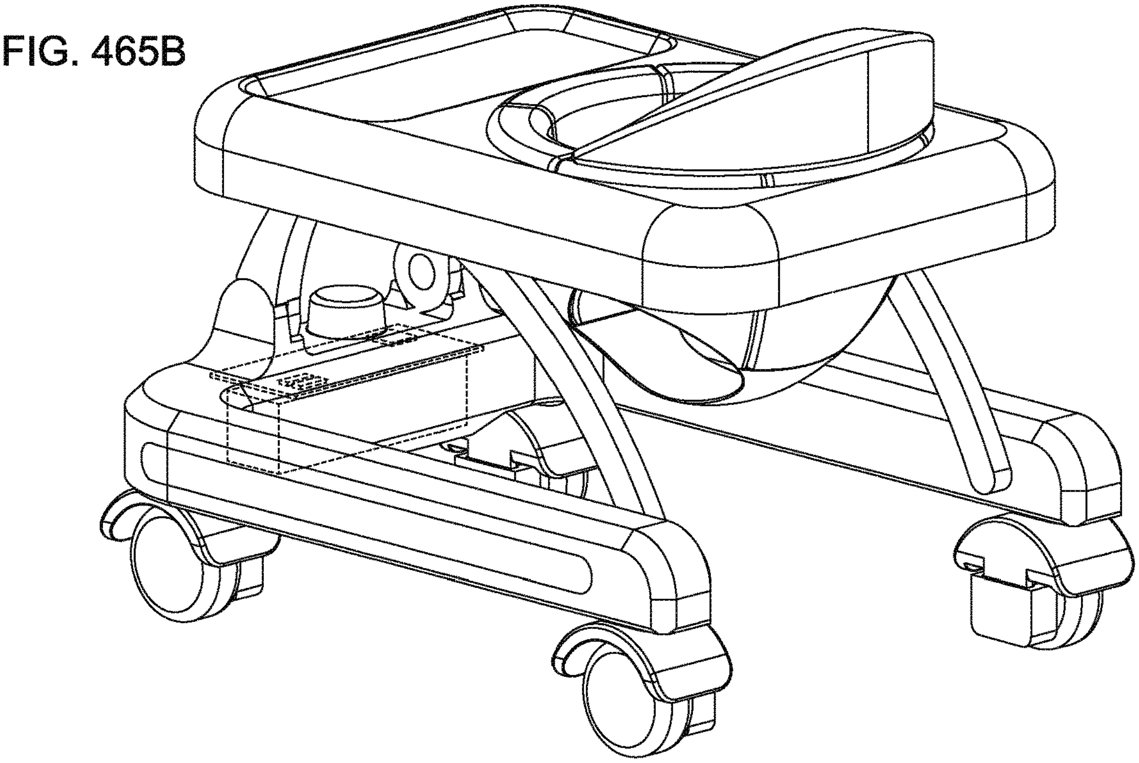
Figure 465C:
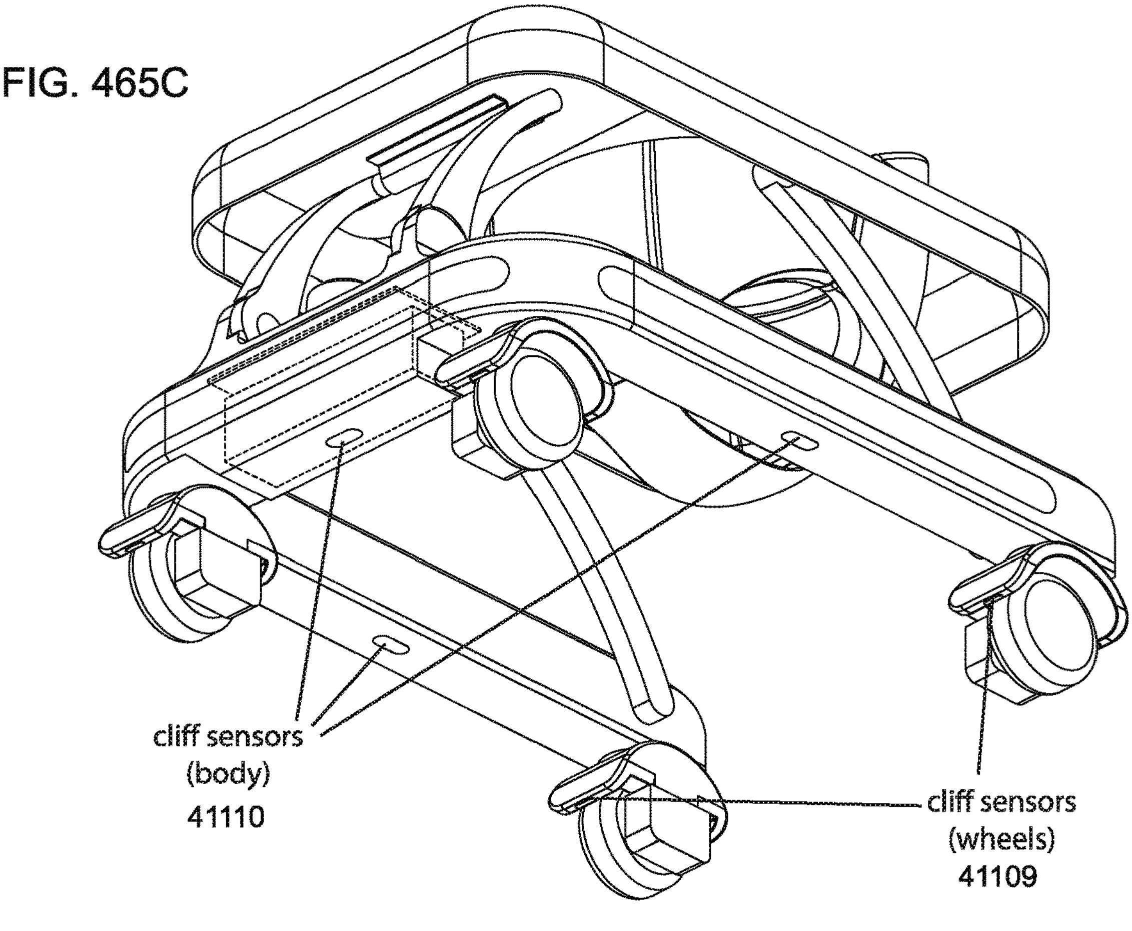
Figure 466:
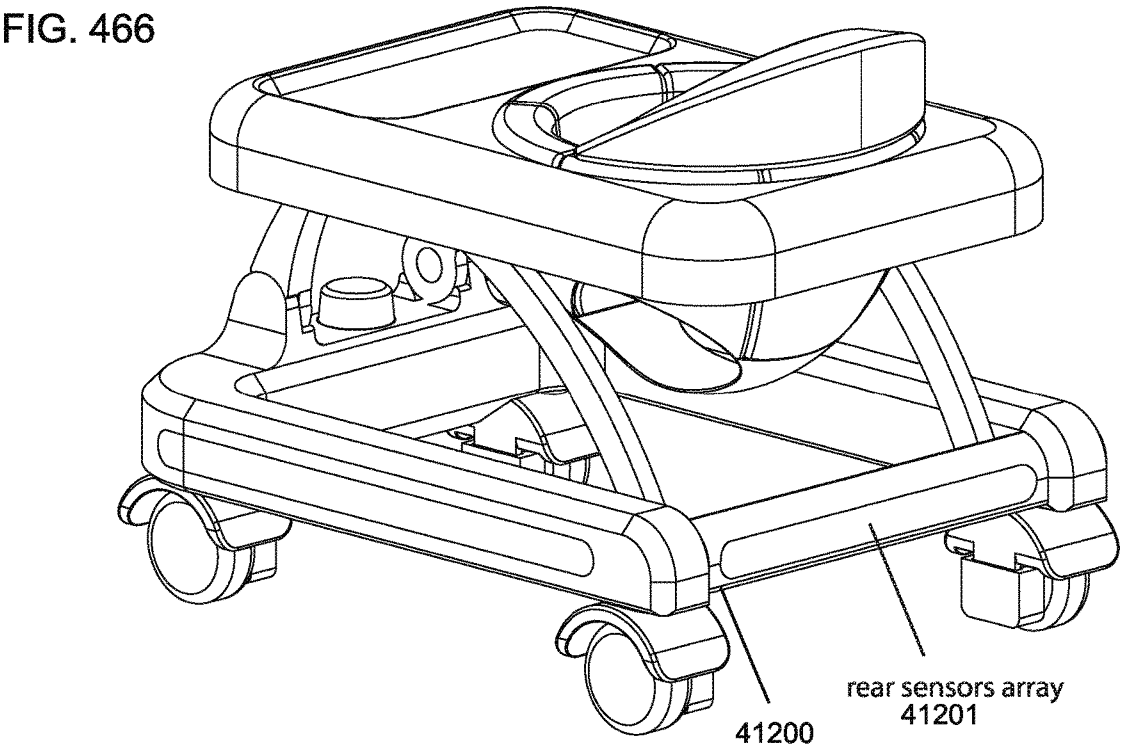
Figure 467:
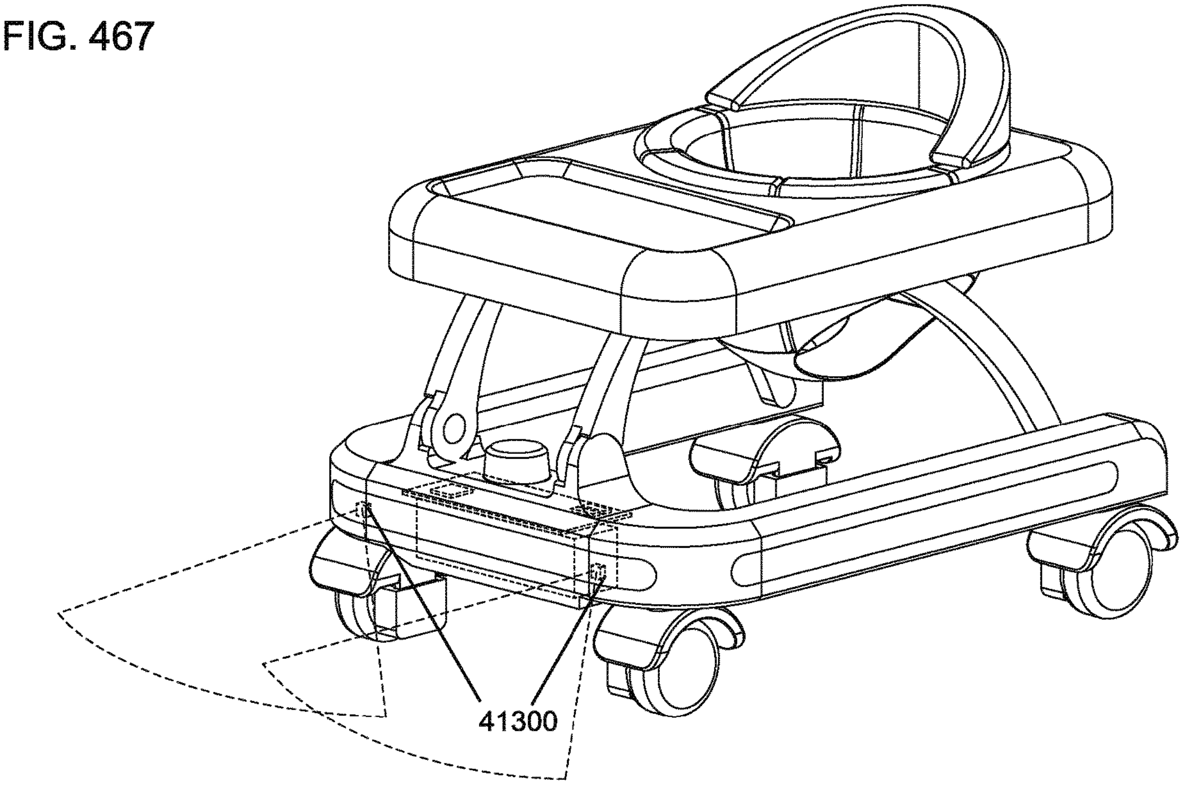
Figure 468:
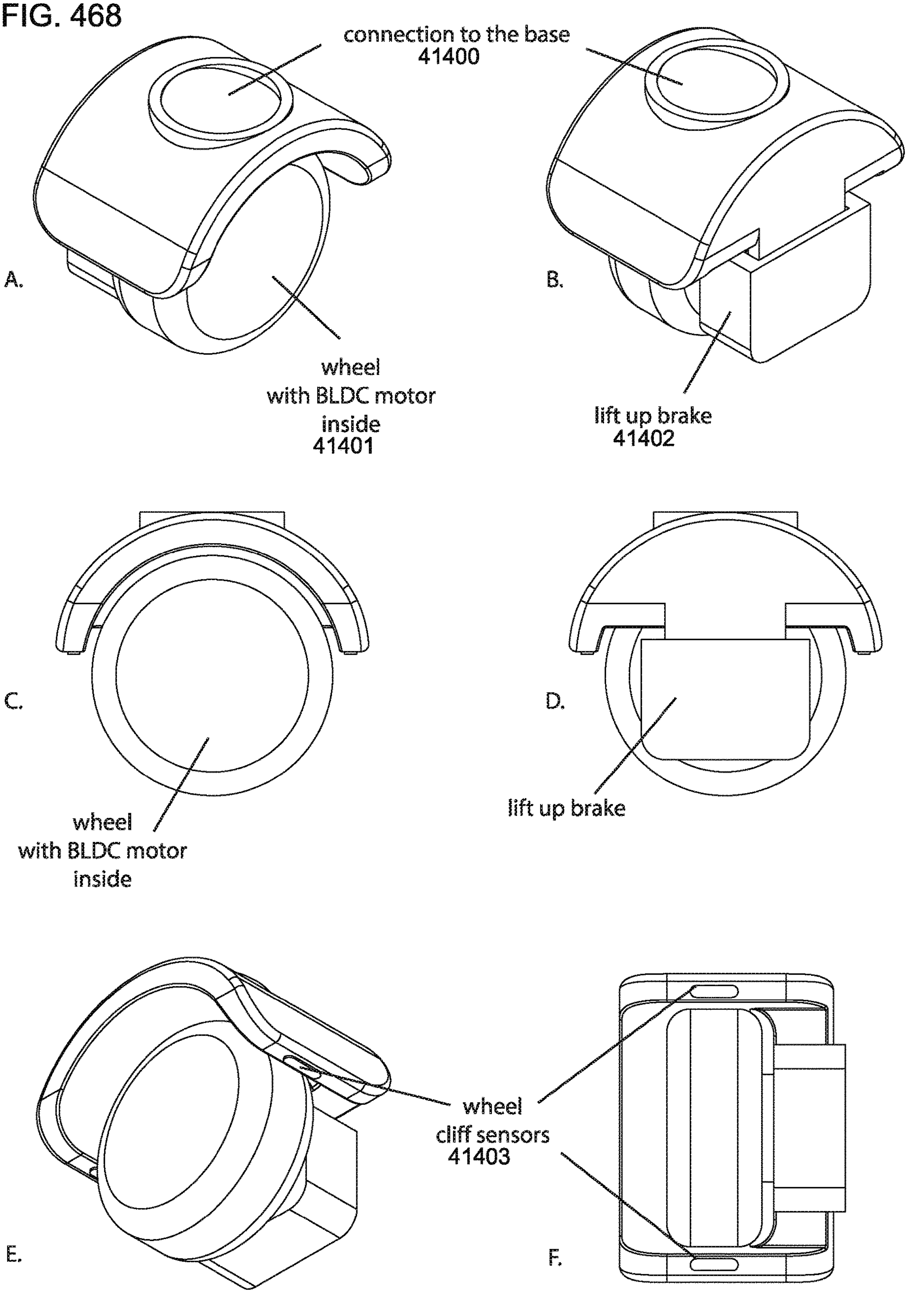
Figure 469:
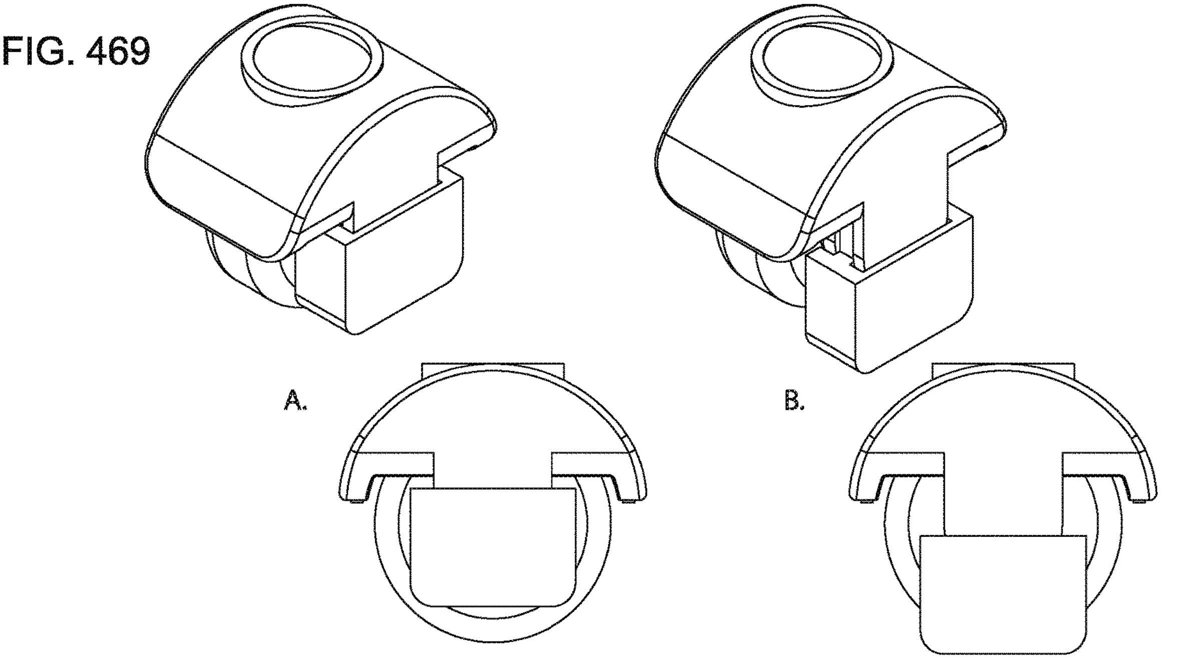
Figure 470:
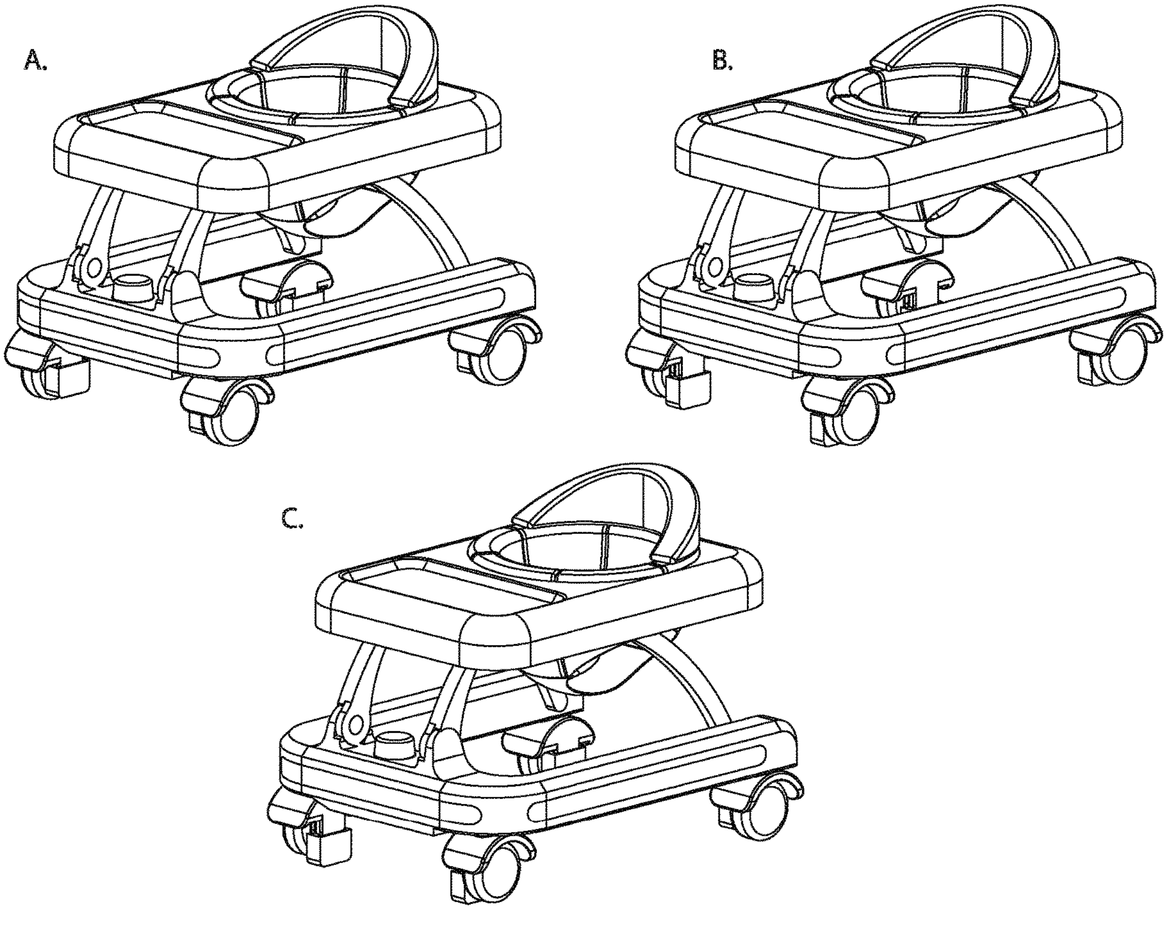

FIGS. 465A-465C illustrate various views of an example of a versatile mobile platform (VMP) customized as a baby walker. The baby walker comprises front and side sensor arrays positioned behind front and side sensor array windows 41100, a PCB 41101 and processor 41102, a battery 41103, a LIDAR sensor 41104, drive wheel assemblies 41105, a table 41106, a seat 41107, height adjustment handles 41108, and cliff sensors for wheels 41109 of the baby walker and the body 41110. FIG. 466 illustrates an additional rear component 41200 including a rear sensor array positioned behind a rear sensor window 41201. The additional obstacle sensors enhance safety features of the baby walker. FIG. 467 illustrates additional near range obstacle sensors 41300 for enhancing safety features and navigation of the baby walker. FIG. 468 illustrates various views of an example of a wheel assembly including a connection point 41400 for connecting to a base of the robot, a wheel 41401 within which a BLDC motor is positioned, a lift-up brake 41402, and wheel assembly cliff sensors 41403. FIG. 469 illustrates the lift-up brake of the wheel assembly in A. a retracted and deactivated state, wherein the wheel is free to rotate on a driving surface and B. an extended and activated state, wherein the baby walker cannot move as the wheel is lifted off of the driving surface. FIG. 470 illustrates the baby walker in a state wherein A. all the lift-up brakes are retracted and deactivated, B. all the lift-up brakes are extended and activated, and C. the two front lift-up brakes are extended and activated. For the robot to stop properly upon braking, the lift-up brakes are activated in pairs.

A shape of the base or the chassis may be rectangular, circular, elliptical or another geometric shape. In some embodiments, a rear portion of the baby walker is open such that babies use the baby walker as a standing walker. In some embodiments, the baby walker includes a locking mechanism for locking the rear comprising additional sensors for smaller babies. In some embodiments, the baby walker comprises a long handle in the front or the rear portion of the baby walker for parents to manually control the walker using the handle. In some embodiments, an application of a communication device paired with the baby walker controls the baby walker. Using the application the user defines safe zones, no-go zones and play areas for times the baby is positioned in the baby walker and playing by themselves. In some embodiments, the baby walker includes equipped a camera facing towards the baby and the video captured by the camera is broadcast to the application for displaying and viewing by parents. In some embodiments, a follow mode of the baby walker is enabled using the application, wherein the baby walker uses sensors or a location of the communication device to follow a parent around. Follow mode is an alternative to manually pushing the baby walker. In some embodiments, the application is used to summon the baby walker, wherein the baby walker navigates to a parent by locating the communication device. In some embodiments, the application is used to guide the baby walker to a specific location within a house by selecting the location on the map displayed by the application. The specific location may be a single selected point within the map or a room selected from available rooms within the map.

Figure 471:
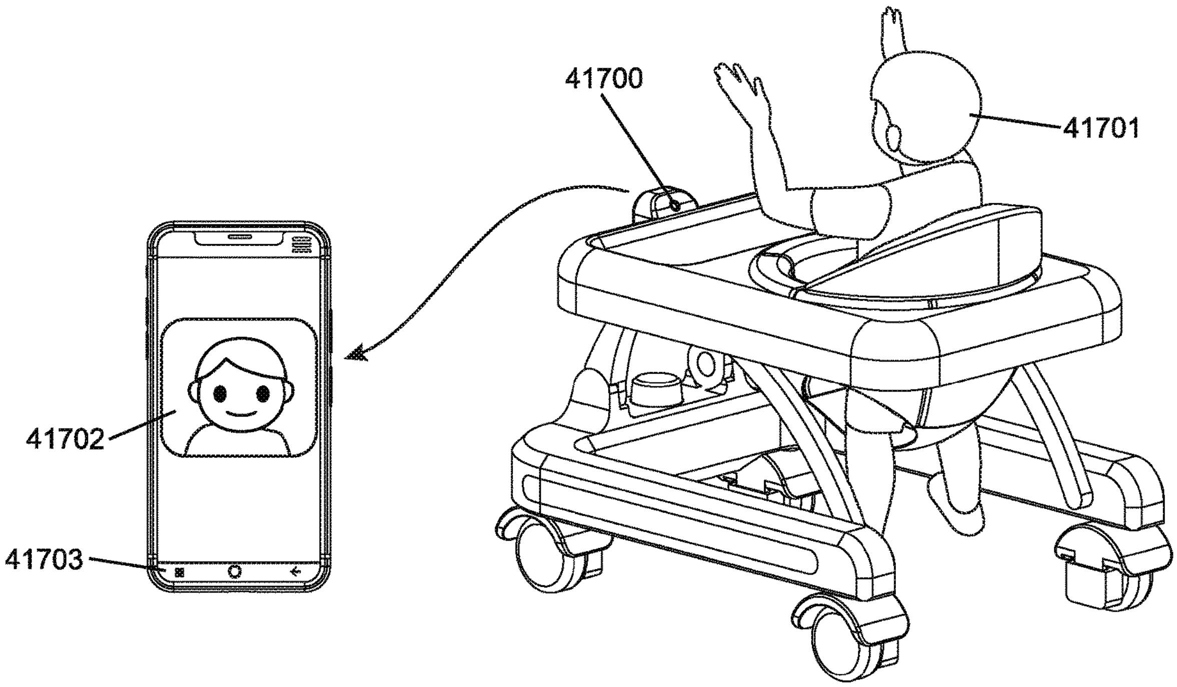
Figure 472:
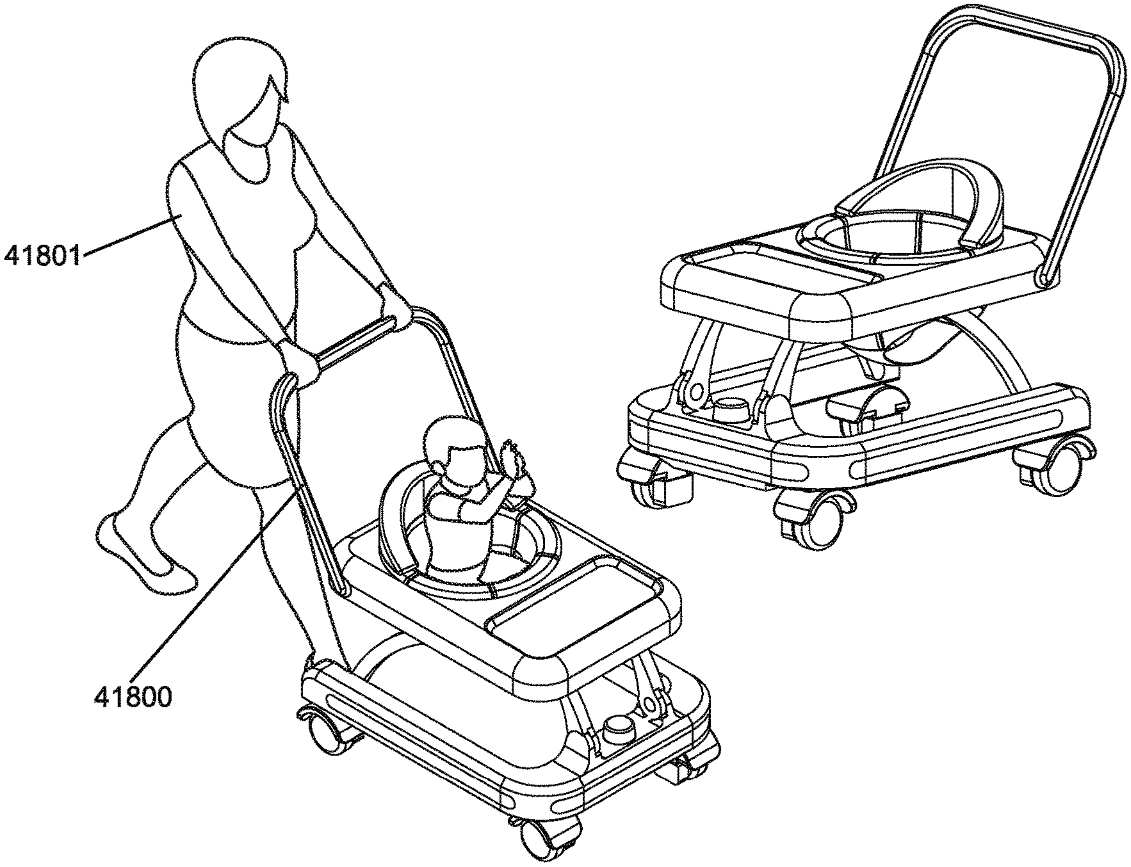
Figure 473:
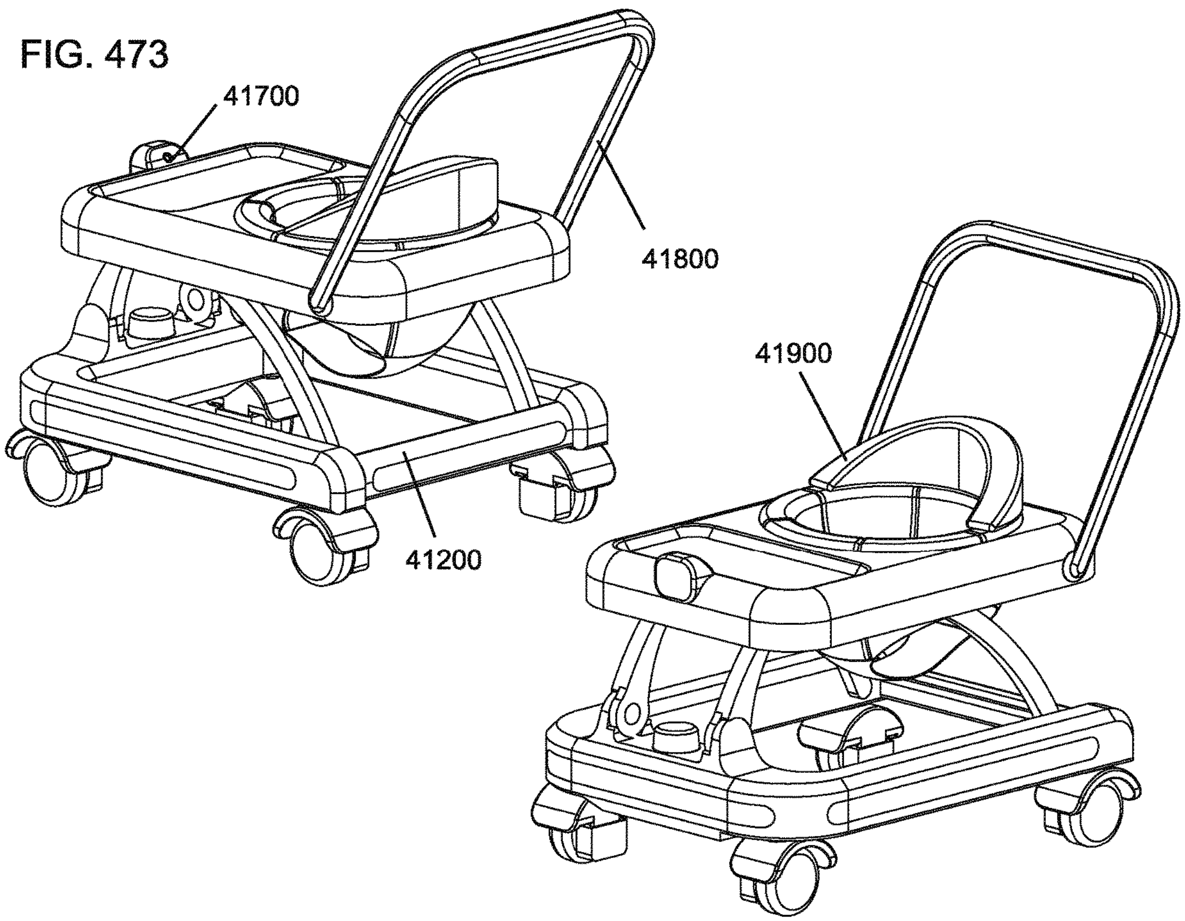
Figure 474:
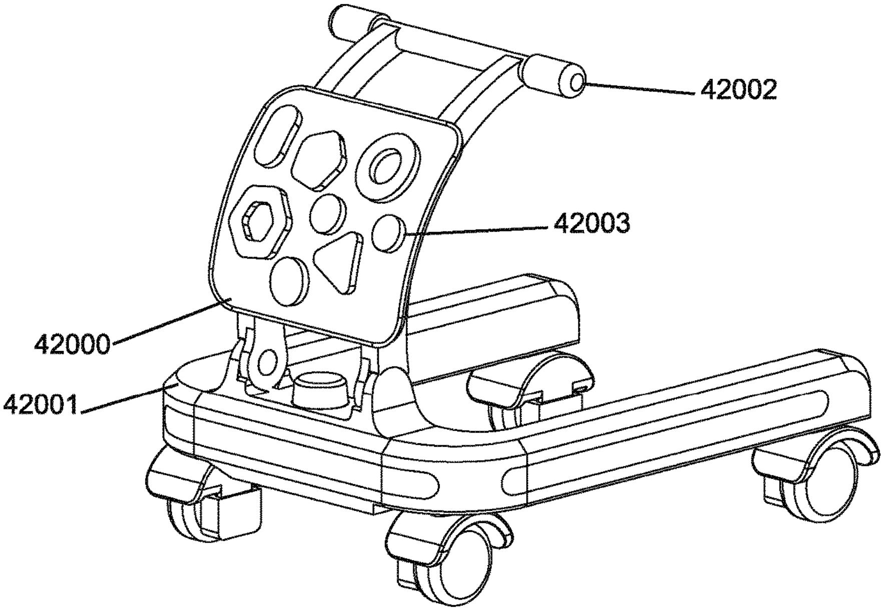
Figure 476:
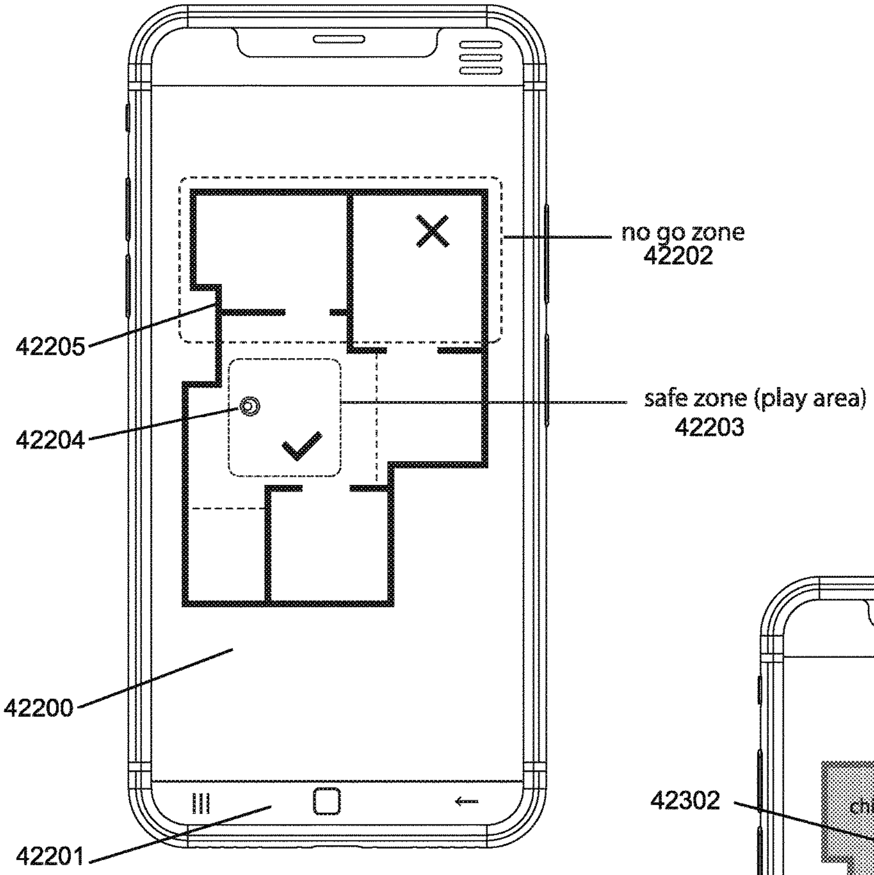
Figure 477:
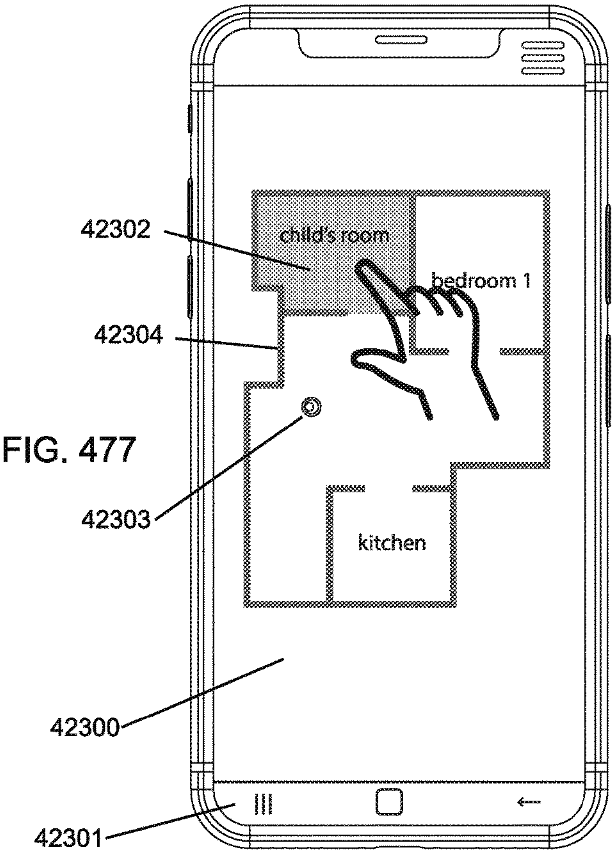
Figure 478:
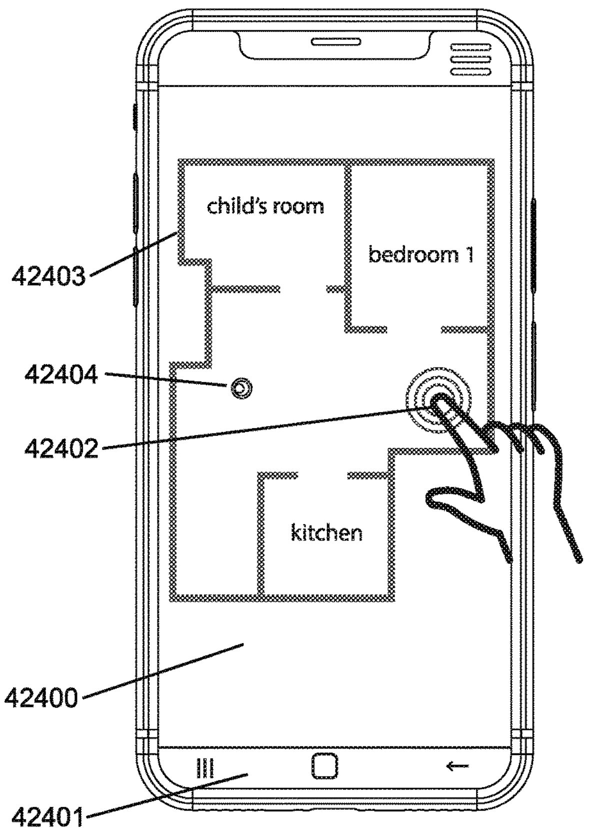
Figure 479:
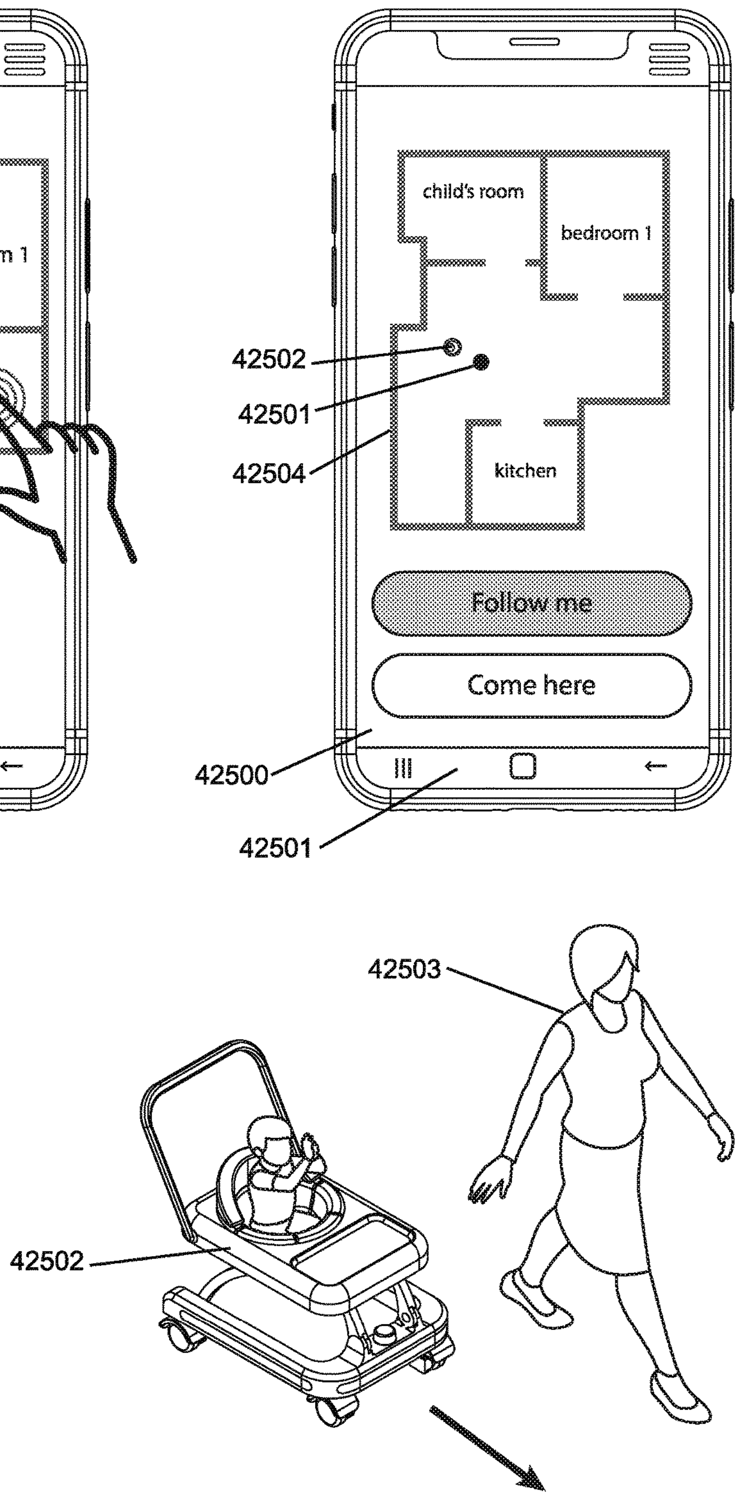
Figure 480:
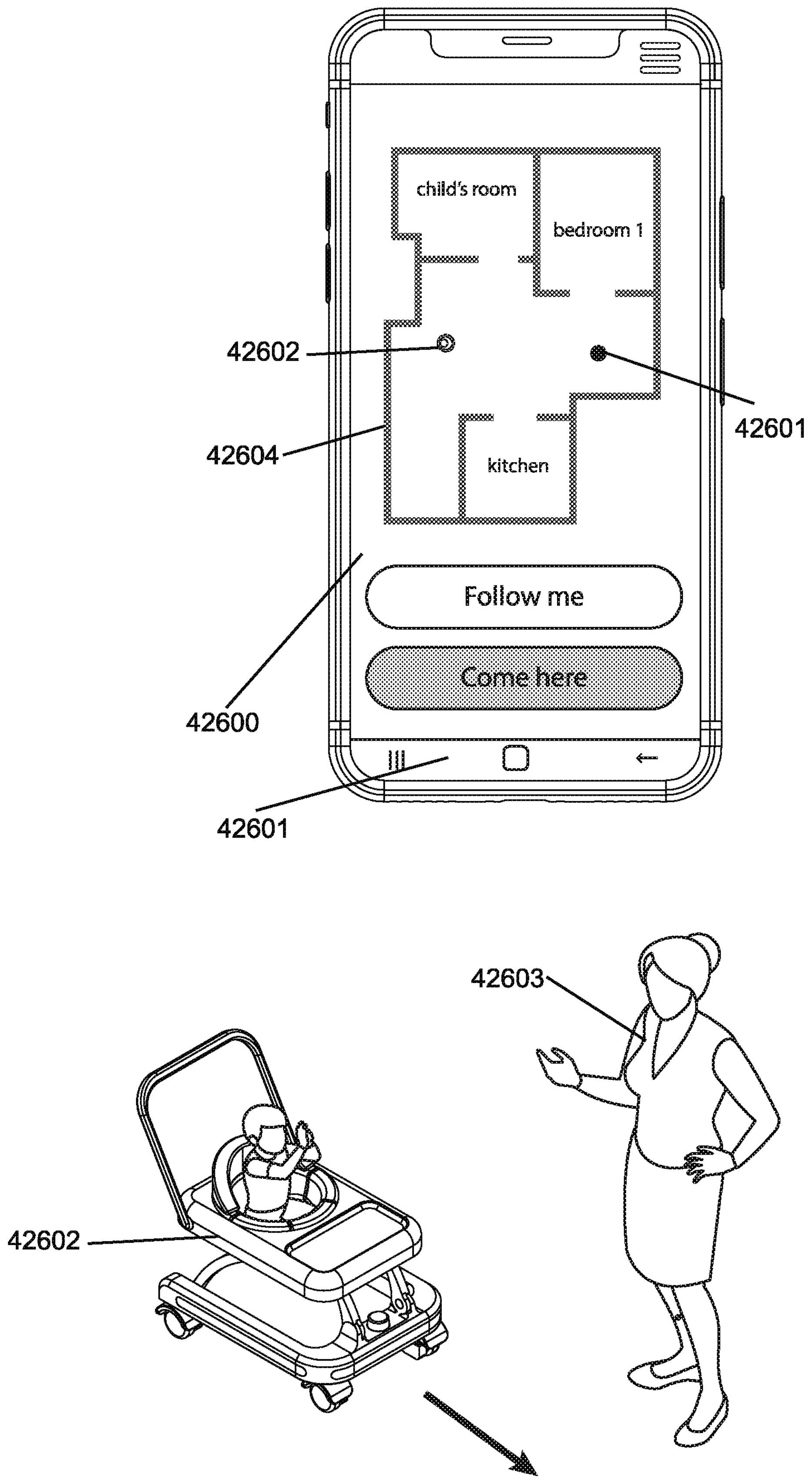

FIG. 471 illustrates an added camera 41700 to the baby walker facing towards a baby 41701 such that a video stream of the baby 41701 is broadcast to an application 41702 of a communication device 41703 of a parent paired with the baby walker. FIG. 472 illustrates an added handle 41800 to the baby walker for manual control of the baby walker by a parent 41801. Using sensor data captured by sensors of the baby walker a presence of the parent is detected by the processor of the baby walker, and in response, the processor adjusts an algorithm accordingly to allow for manual control of the baby walker. In some embodiments, the processor detects a direction of movement of the baby walker based on sensor data and actuates wheel motors to help with the movement. In some embodiments, SLAM features of the baby walker are turned off to provide more manual control to the parent. FIG. 473 illustrates the baby walker with the rear component 41200 with rear sensors, the camera 41700 facing towards the seat 41900, and the handle 41800. Note that all or some of the add-ons may be included with the baby walker initially or added at a later time. In some embodiments, components of the baby walker attached to the base are detachable and replaced by other attachments. For example, FIG. 474 illustrates a replacement attachment 42000 attached to a base 42001 for babies capable of standing and walking with the assistance of the walker. The attachment 42000 comprises handlebars 42002 and a puzzle board 42003. FIGS. 475A and 475B illustrate examples of VMPs customized as baby walkers with different shapes (in this case circular and oval) for a base 42100 and height adjusting mechanism 42101. A footprint of VMPs are not limited to rectangular shapes. FIG. 476 illustrates using an application 42200 of a communication device 42201 paired with the baby walker to define a no-go zone 42202 and a safe zone 42203 for the baby walker. The baby walker 42204 is shown in a map 42205 of the environment. FIG. 477 illustrates using an application 42300 of a communication device 42301 paired with the baby walker to summon the baby walker to a room by selecting the room 42302. The baby walker 42303 is shown in a map 42304 of the environment. FIG. 478 illustrates using an application 42400 of a communication device 42401 paired with the baby walker to summon the baby walker to a certain point 42402 within a house by touching and holding the point 42402 on the map 42403 displayed. The baby walker 42404 is shown in a map 42405 of the environment. FIG. 479 illustrates using an application 42500 of a communication device 42501 paired with the baby walker to select a follow mode, wherein the baby walker 42502 locates and follows the communication device 42501 of a parent 42503. The baby walker 42502 and communication device 42501 are shown in a map 42504 of the environment. FIG. 480 illustrates using an application 42600 of a communication device 42601 paired with the baby walker to select come here, wherein the baby walker 42602 locates and navigates to the communication device 42601 of a parent 42603. The baby walker 42602 and communication device 42601 are shown in a map 42604 of the environment.

Figure 481A:
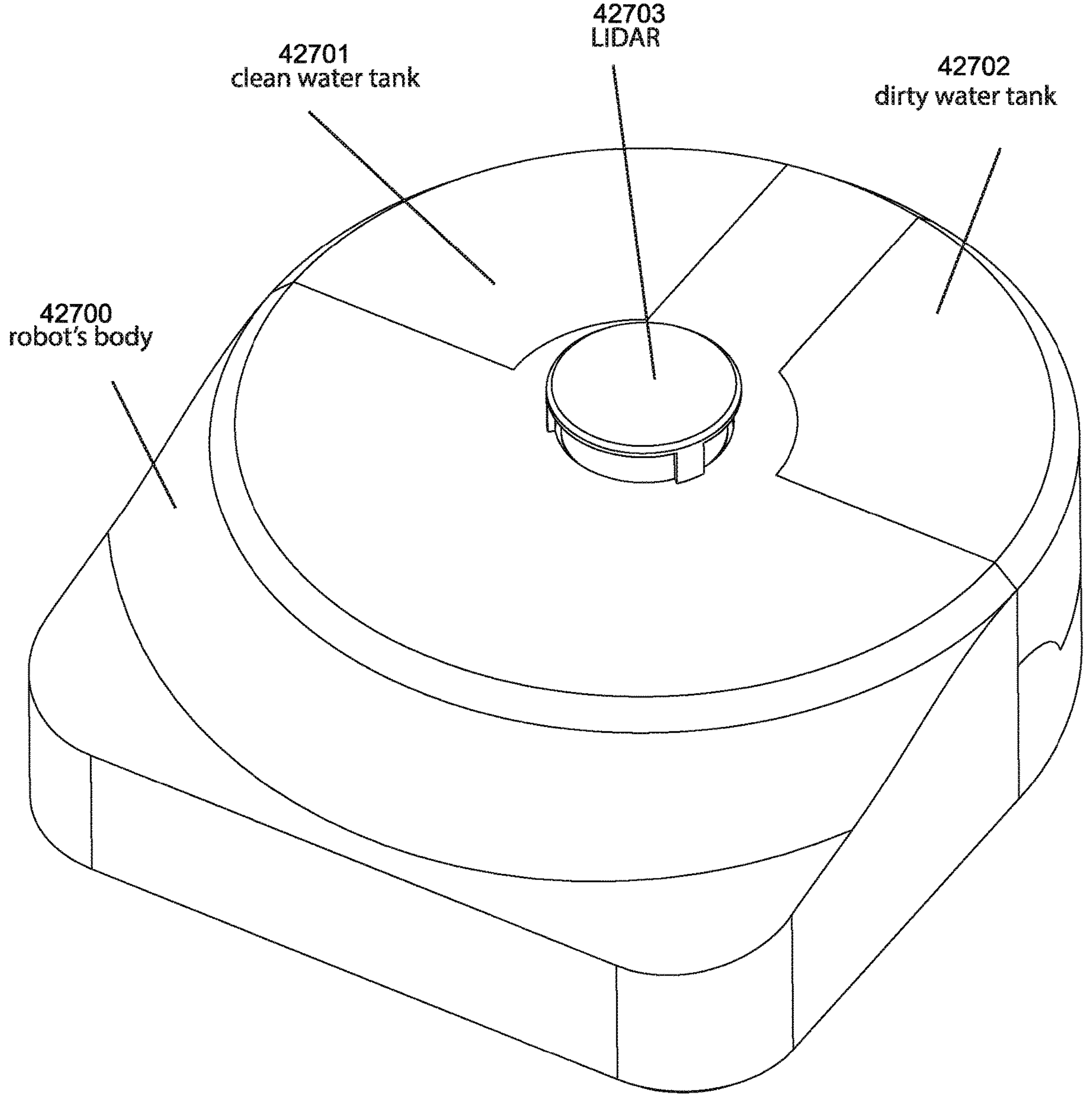
Figure 481B:
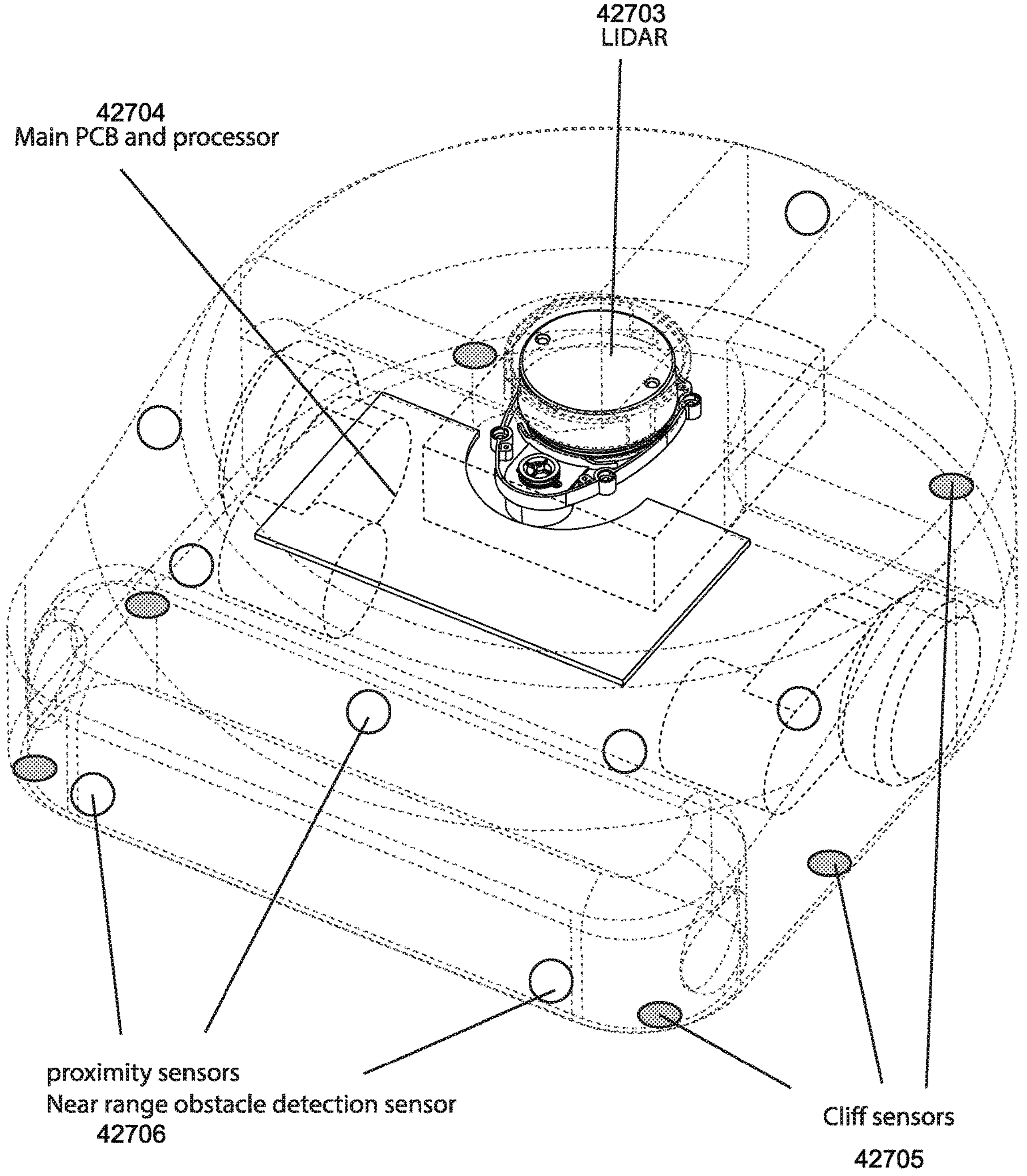
Figure 481C:
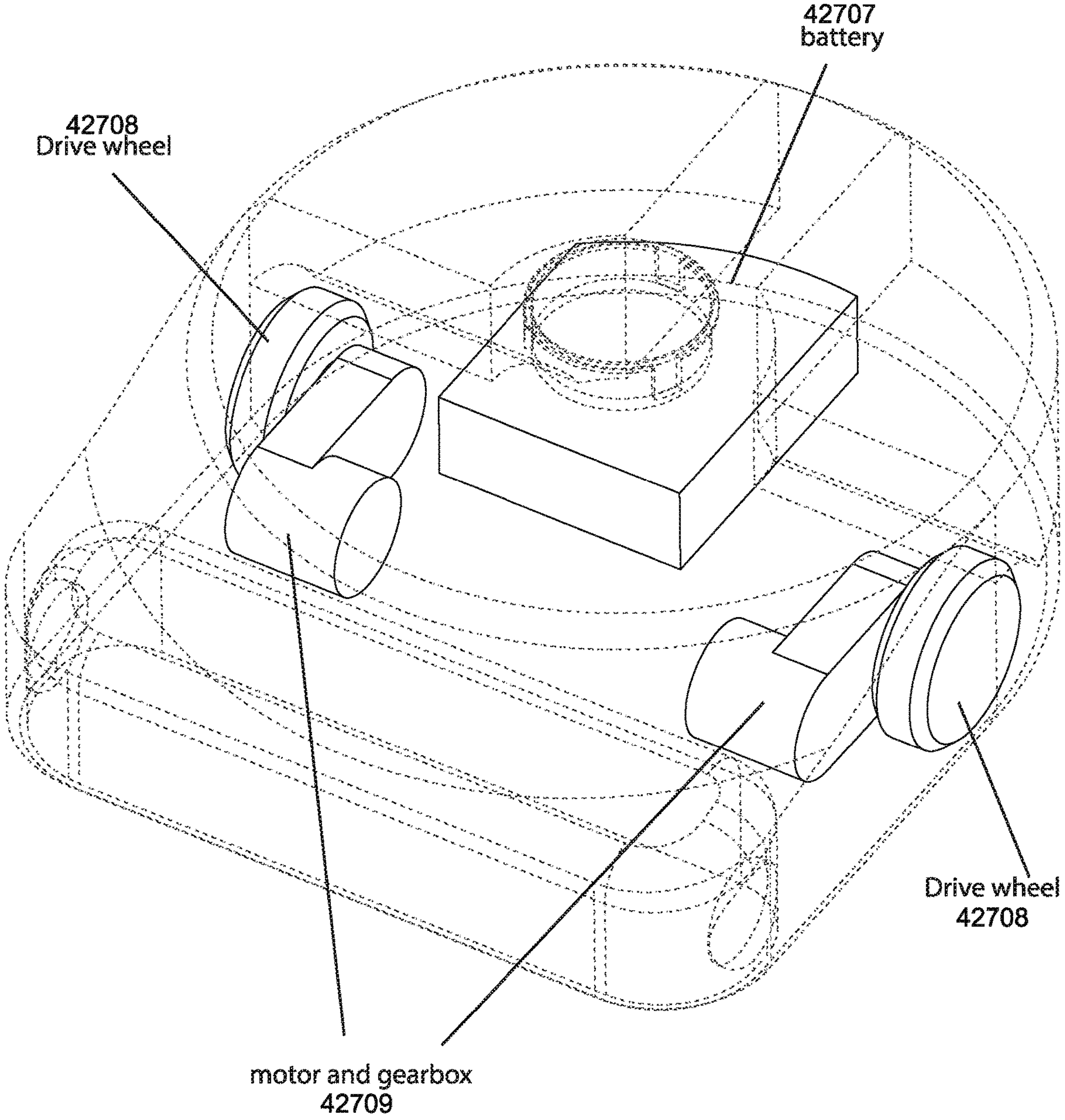
Figure 481D:
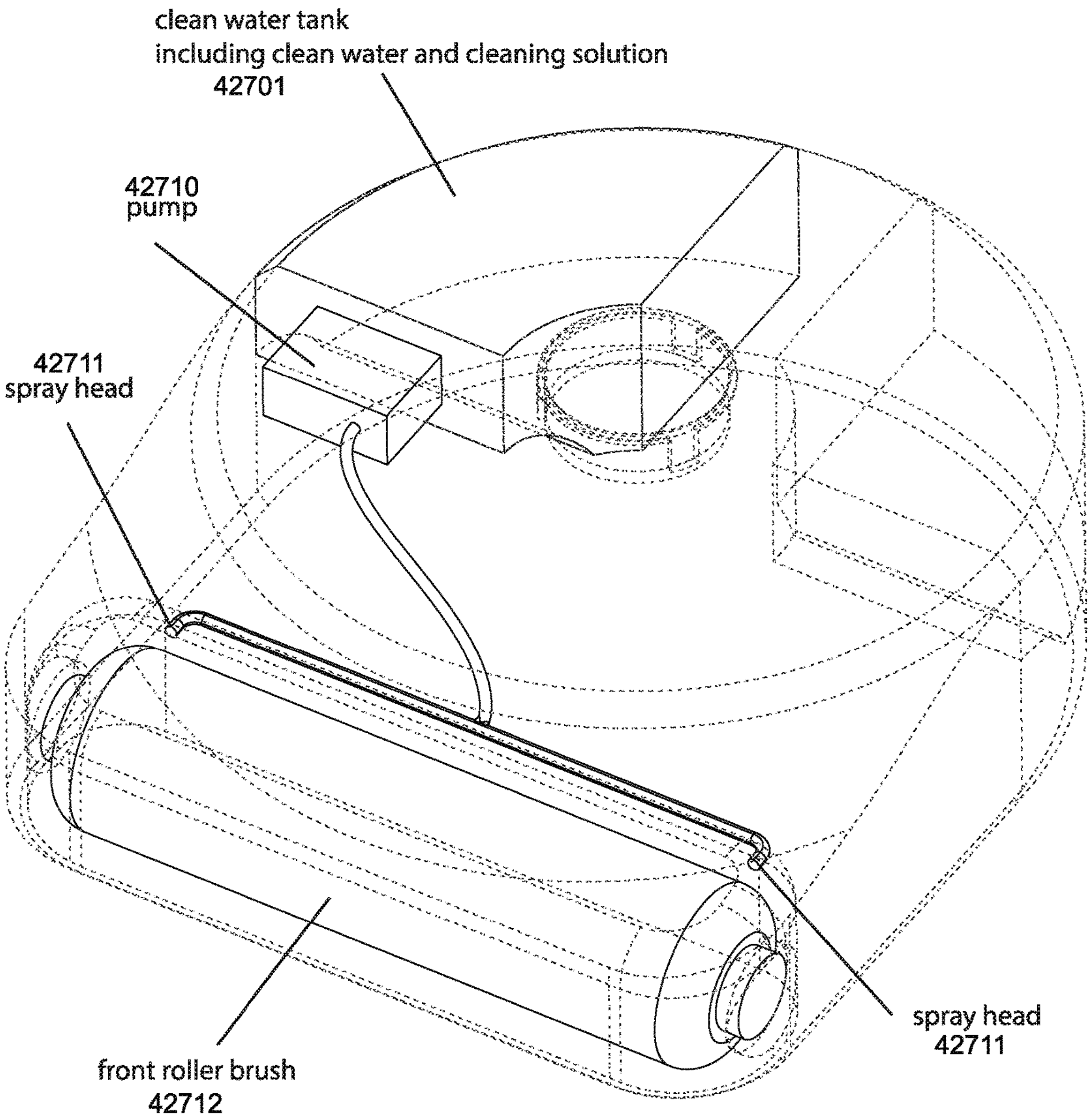
Figure 481E:
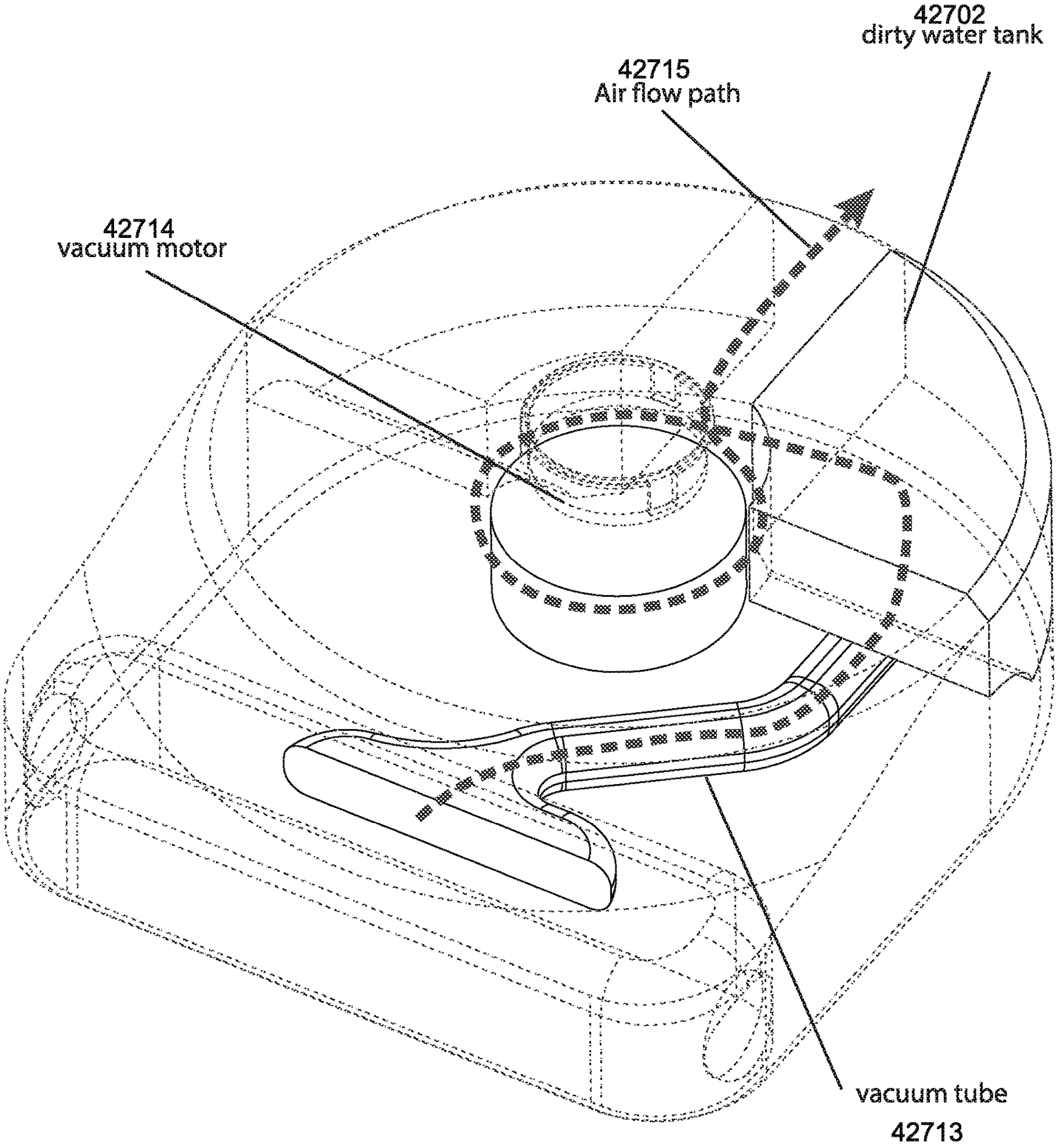
Figure 481F:
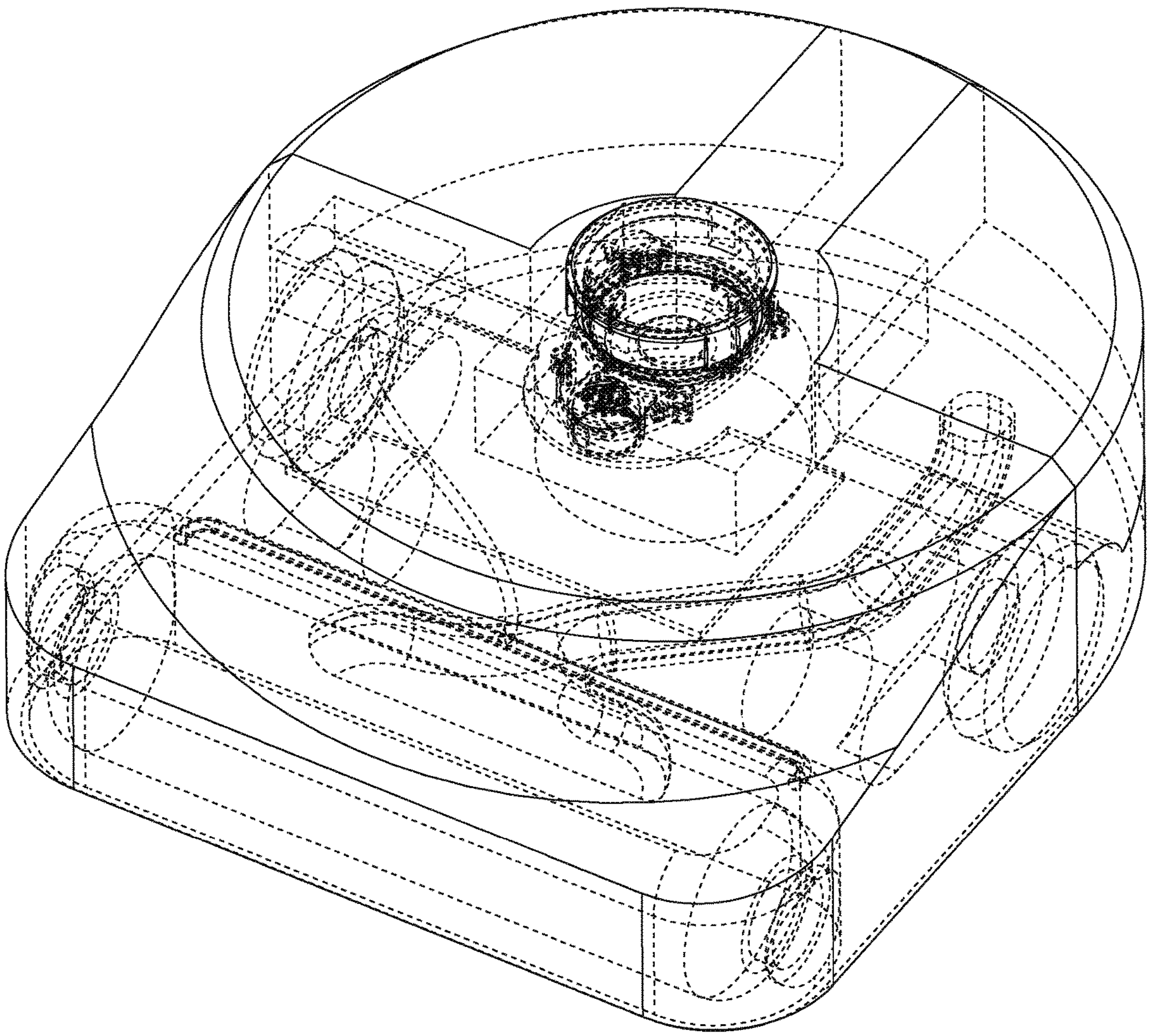

Some embodiments include a dry vacuum and wet mop robot for mopping and vacuuming hard surfaces simultaneously and, in some cases, spot cleaning carpeted areas. The robot may comprise a main body, a LIDAR sensor, a PCB and processor, proximity sensors, cliff sensors, a battery, drive wheels including motors and gearboxes, a mopping roller, a clean water/solution tank, a water spray system, a vacuum motor, and a dirty water and dirt collection tank. FIGS. 481A-481F illustrate an example of a dry vacuum and wet mop robot comprising a body 42700, a clean water tank 42701, a dirty water tank 42702, a LIDAR sensor 42703, main PCB and processor 42704, cliff sensors 42705, proximity sensors 42706, battery 42707, and drive wheels 42708 with motor and gearbox 42709. FIG. 481D illustrates a clean water spraying sub-system, wherein a pump 42710 is attached to the clean water tank 42701 and a spray head 42711. The spray head 42711 sprays liquid from the clean water tank 42701 onto a front roller brush 42712. FIG. 481E illustrates a dirty water and dirt collection sub-system including a vacuum nozzle 42713 and a vacuum motor 42714, the flow path 42715 of which is shown. FIG. 481F illustrates all subsystems and components of the robot shown in FIGS. 481A-481E.

Figure 481G:
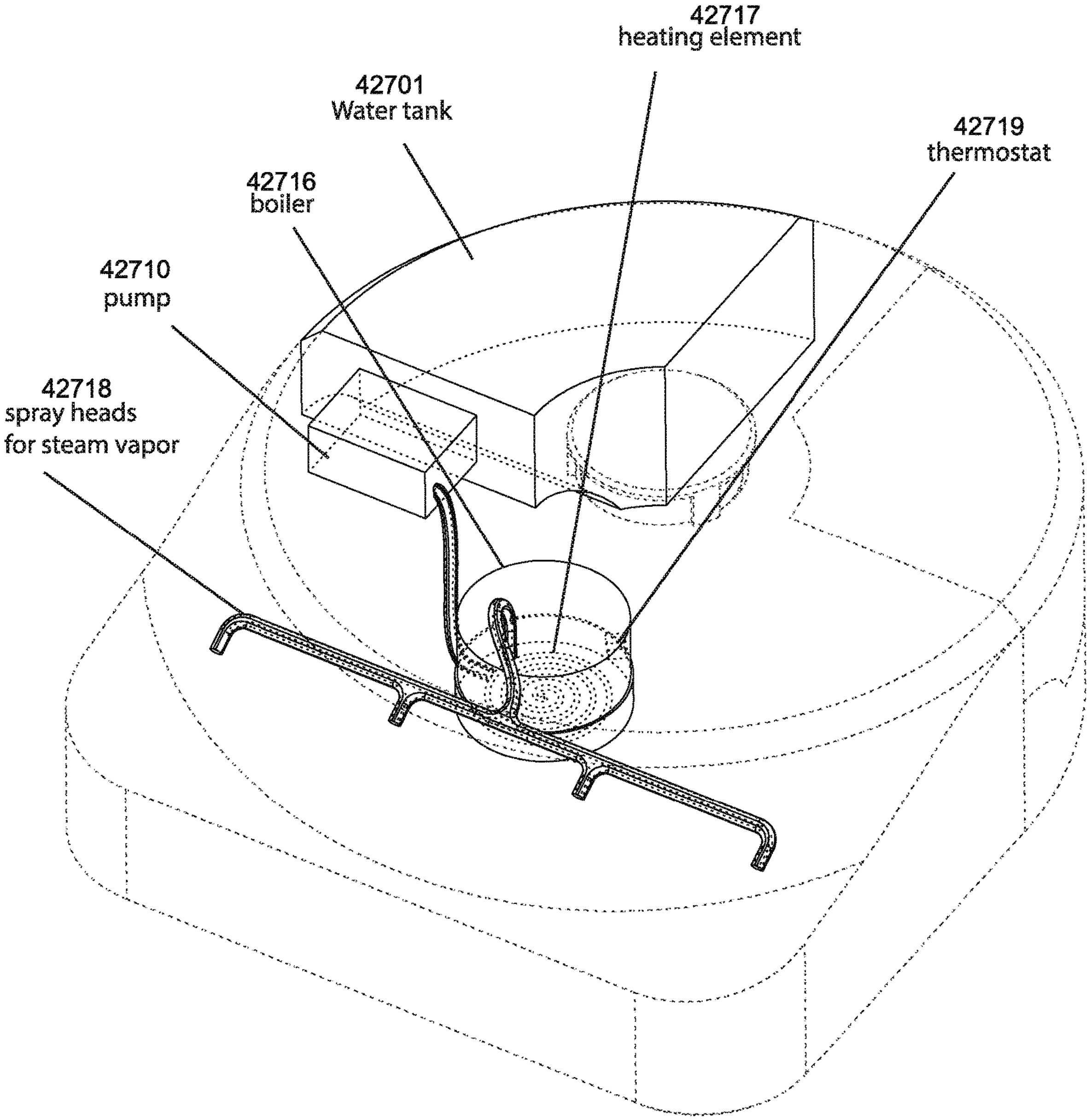

In some embodiments, the robot comprises a steam mop mechanism, wherein water is pumped into a boiler for boiling to form steam vapor. The vapor exits from spray heads positioned in a front portion of the robot onto an area in front of the robot. With both a steam mop and vacuum, it is beneficial to position the vacuum in front of the steam mop such that the robot vacuums the floor before steaming the floor for cleaning. FIG. 481G illustrates a steam mop sub-system of a robot comprising the water tank 42701, the pump 42710 attached to the water tank 42701, a boiler 42716 and heating element 42717 for generating steam from water fed to the boiler 42716 from the water tank 42701, and spray head 42718 for dispersing the vapor from the boiler 42716 onto a floor. A thermostat 42719 monitors a temperature in the boiler 42716. In some embodiments, the robot comprises a roller or a pad for moping the floor. The roller may be motorized or free to spin. Various types of pads may be used to scrub the floor deeply or delicately. In some embodiments, the robot comprises a mechanism for spinning the pad or moving the pad back and forth during cleaning, wherein the added movement of the pad cleans the floor more thoroughly. FIG. 482 illustrates different examples of cleaning pads of a robot including A. a static pad, B. a roller pad, and C. two spinning pads. In some embodiments, a vacuum nozzle is positioned in front of a mop roller/pad for dry vacuuming before mopping the floor. In some embodiments, vacuuming and mopping function separately, wherein only one of vacuuming and mopping operate at a time. In some embodiments, mopping is activated upon sensing changes in the floor characteristics, such as floor reflectivity or stickiness.

Figure 483:
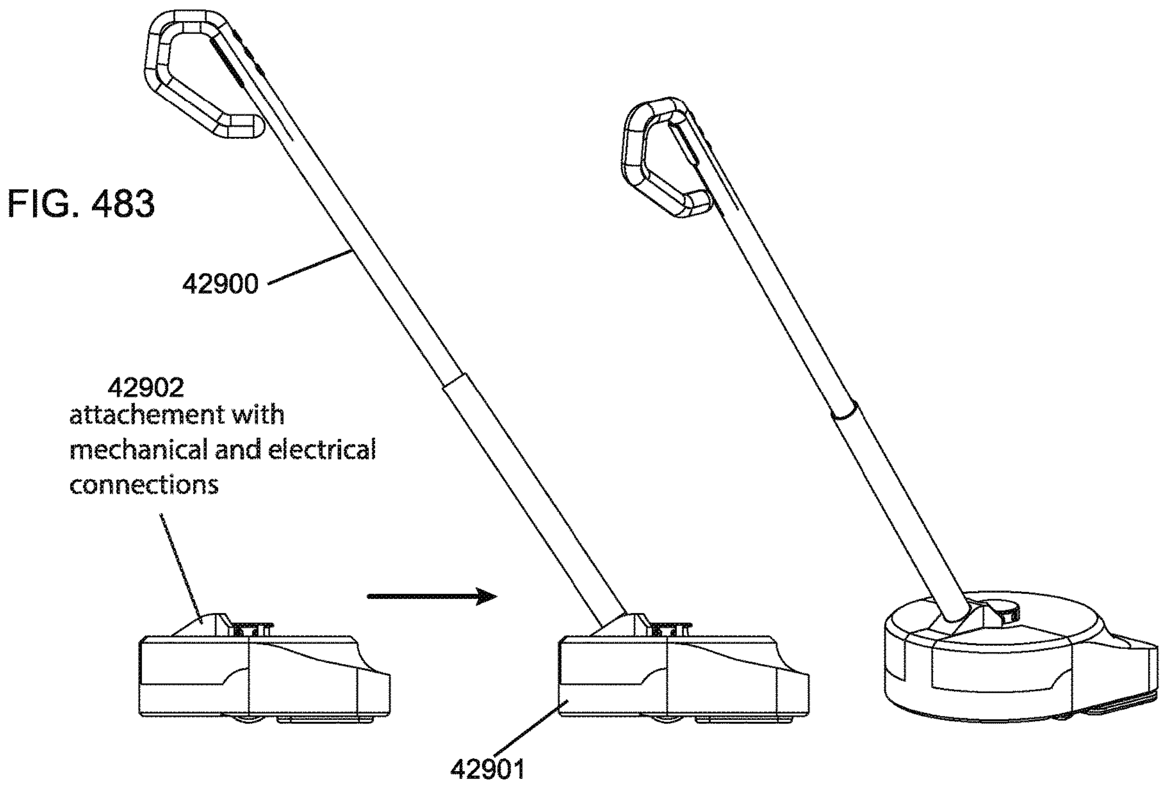
Figure 484:
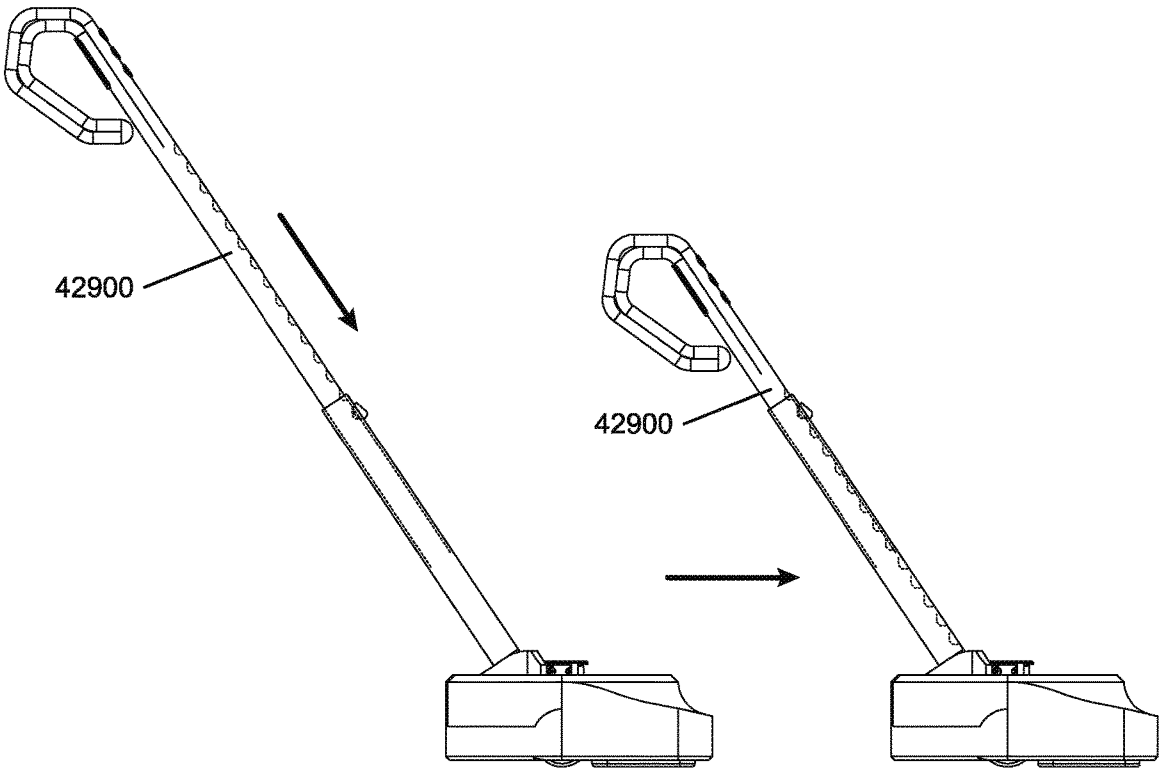
Figure 485:
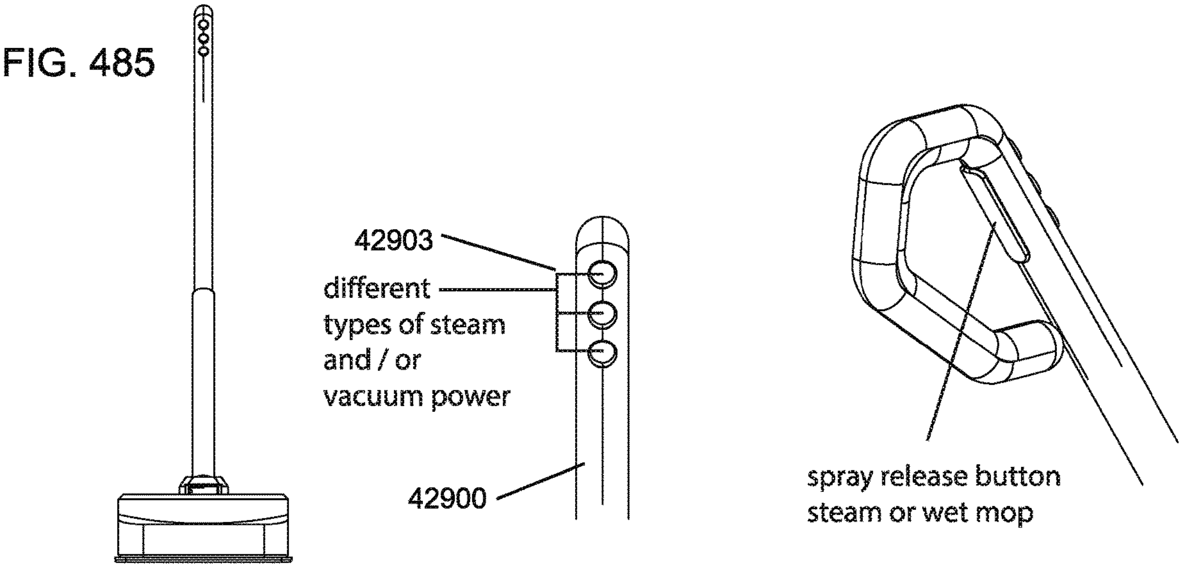
Figure 486:
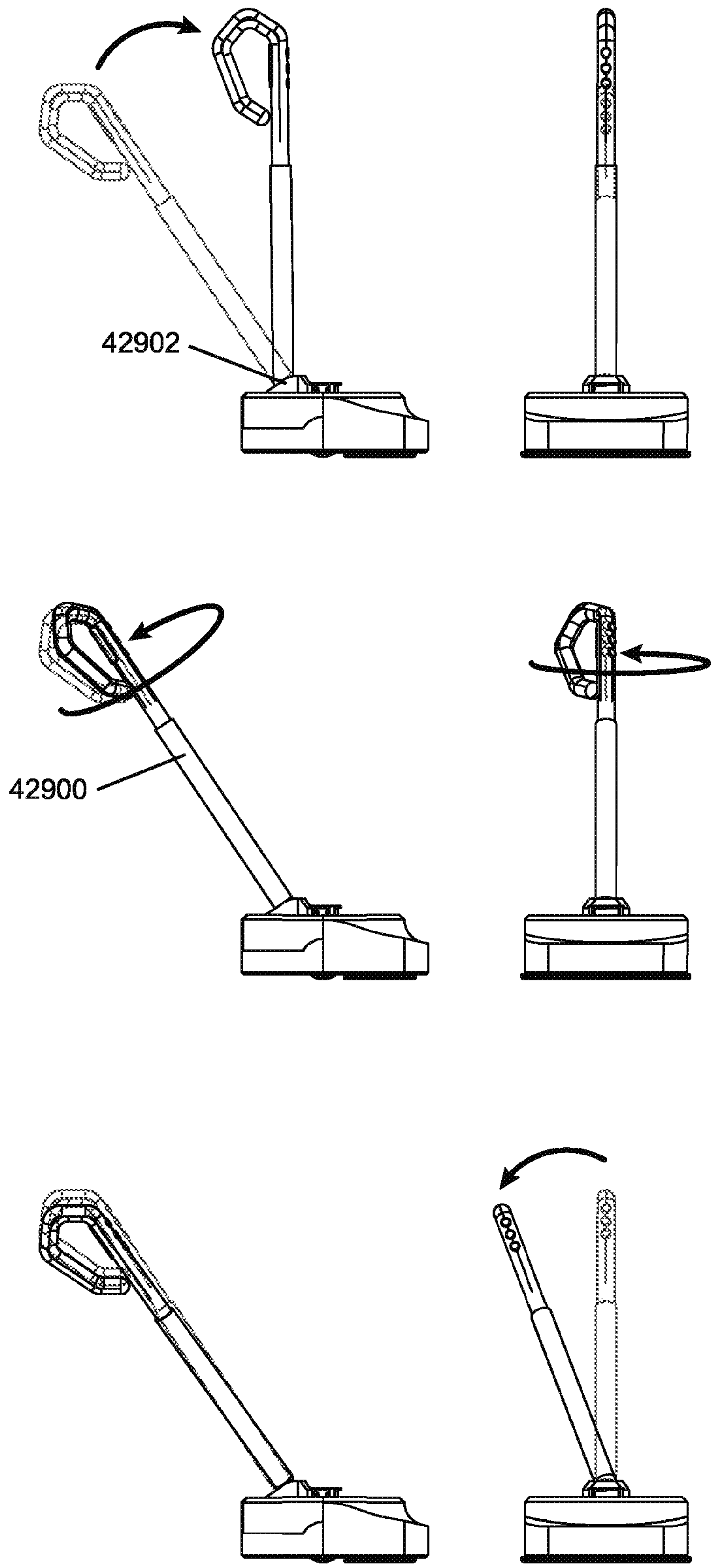

In some embodiments, a handle is attachable to the robot for manual movement of the robot, such as a case where a user mops a spot manually or when a user wants to apply a different pressure onto the floor while mopping. In some embodiments, the attached handle comprises a mechanism for adjusting a length of the handle, such that the robot may be used for more applications. For example, with a short handle the robot is used to steam sofas and other furniture. In some embodiments, manual controls such as a power button and steam release are shifted to the attached handle. In some embodiments, the handle is attached to the robot using a ball joint to provide more flexibility in manually controlling the robot. FIG. 483 illustrates a handle 42900 attached to a robot 42901 at an attachment point 42902 with mechanical and electrical connections. FIG. 484 illustrates adjusting a handle length of the handle 42900. FIG. 485 illustrates a transfer of controls 42903 shifted to the handle 42900 for manual control. FIG. 486 illustrates possible movements of the handle 42900 when a ball joint is used at the attachment point 42902.

In some embodiments, the robot includes a peripheral brush with one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robotic cleaner or when the peripheral brush continues or attempts to continue to rotate when entangled with an obstruction.

In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. Examples of stitching techniques including across a bundle of bristles using straight line technique, diagonal technique, crisscross technique, and combined straight line and crisscross techniques, respectively. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms.

In some embodiments, the robot autonomously empties its bin based on any of an amount of surface area covered since a last time the bin was emptied, an amount of runtime since a last time the bin was emptied, the amount of overlap in coverage (i.e., a distance between parallel lines in the boustrophedon movement path of the robot), a volume or weight of refuse collected in the bin (based on sensor data), etc. In some embodiments, the user may choose when the robot is to empty its bin using the application. For instance, sliders may be displayed by the application and adjusted by the user to determine at which amount of surface area or runtime, respectively, since a last time the bin was emptied, the robot should empty its bin.

FIG. 487A and FIG. 487B illustrate a charging station of a robot with an auto-empty feature. The robot connects to a dust intake opening 48700 and a vacuum motor 48701 generates suction to suck debris from a dustbin of the robot into a dustbin cartridge 48702 of the charging station. The excess air passes through the filter 48703 in the housing filter 48704 and out of the exhaust 48705. The dustbin cartridge 48702 is ejected by pressing button 48706. As the robot docks, docking sensors 48707 and physical guide 48708 are used to help align the robot with charging station such that corresponding charging contacts of the robot connect to charging contacts 48709 of the charging station. The filter 48703 is replaced by access through filter replacement frame 48710. The dustbin cartridge 48702 includes a handle 48711 for removal and emptying its contents. A base 48712 of the station includes anti-slip pads 48713.

In some embodiments, the amount of time it takes to locate the docking station and navigating to it may be improved. In products prior to this disclosure, the goal had been strictly to improve the rate of finding the station and some prior devices were based on exhaustive method of search. There was no time limit from when the robot started to look for docking until it found it and finally did dock. Search algorithms are often competing with each other. A breadth search and a depth search mechanism each have their own pros and cons and balancing them is a decision that a human can make but for AI, this is rather a challenging territory. To elaborate the issue, a thought experiment is explained. When a person is looking for their keychain, there are two ways to go about it. A quick glance inside each room where they could be. The overall process is fast but there is a chance that the key is not found. If the person performs an exhaustive search in each room, if the key is actually inside the last room the person searched, it takes a very long time. For a human, often balancing these are intuitive—not always still. However, a robot equipped with AI such as explained in this disclosure must perform the best balance. The amount of time it takes to find the dock by the robot may huge deviation from a mean. In some examples, the robot could quickly find the dock if dock was places that are high up in the search list based on the respective search method. In some occasions, the robot would go search the entire space thoroughly until it reaches the last room where the robot was in. In prior products, the timeliness finding of the dock largely depended on an algorithm and the resulting search order and where the robot would start the search. With a thorough search comes the problem of time. Robot could either optimize for accuracy or time but not both—as they have competing nature. In some embodiments, a multivariate cost function may be deployed. In other embodiments, a neural network to train the robot to search in the same manner as human would do may be deployed. The multivariate cost function may balance between the two requirements of thorough and quick search. In some embodiments, the neural network solution would create a series of floor plan simulations and the robot and would ask a human operator to draw a path from where the robot presumably run out of charge to the dock. In some embodiments, the robot keeps track of the charging station at all times and continuously have a plan for going back to it. In some embodiments in case when the charging station is totally lost, the robot will start the search from where it was last visible instead of where the robot was when it ran out of battery. In some embodiments, the last place where the charging station was observed would be the first place for the robot to start its search. The robot is required to avoid hitting its charging station when covering the area and particularly when covering the perimeter moving along the wall in which the station resides. In some embodiments, there are multiple charging stations, and the robot must avoid all of them.

In some embodiments, a no-entry zone such as those created manually by a user on the APP is created automatically where the charging station resides. This automatic generation of no entry zone where the station is located, prohibits the robot from entering a circle around the station. In some embodiments lining up with the docking station is implemented using IR sensors. In some embodiments lining up with the docking station is implemented using a 2D or 3D physical visual feature or a QR code captured by a camera or depth camera. In some embodiments lining up with the docking station is ensured by using more than one type of sensors. For example, a pair of complementary hall effect sensor may be used to confirm that the alignment of the robot with the docking station is even. In case that the alignment is uneven, incremental angular adjustments may be made to heading of the robot. A heading of the robot may be guided using the hall effect sensors, IR sensors, a QR code, or other methods. In some embodiments, the robot may dock from its rear for filling its liquid or water reservoir (mopping or steaming) or for emptying the content of its dustbin and detach from the dock, and re-align from front and dock from front to charge its battery. In some embodiments, the opposite order or any other order may be followed depending on the location of bin and reservoir and location of the battery. There may be several independent docking routines for various purposes. For one purpose, the robot may dock from the front and for another purpose it may dock from rear side. For one purpose, it may use one type of sensor, and for another purpose it may use a different sensor or a different combination of sensors. For example, if the robot has docked to charge its battery, the closed circuit created by touch of charging pads on the station and the conductive metal piece on robot and the electric current running through them is an indication that the charging is being done properly. If the docking is for the purpose of charging, this may suffice to confirm the robot is aligned well. If the docking is for any other purpose such as filling the water tank, the robot may dock from a different orientation so the presence of current as a result of closed circuit will not be available. In some cases, the robot may dock in an orientation that can serve multiple purposes. For example, in the same orientation, battery will be charged and the liquid reservoir will be filled and the dirty liquid container will be emptied. However, the current sensing, although works as an accurate enough method to ensure robot is charging, it may not accurately determine the placement of the robot in relation to the dock for applications such as emptying the collected dirty liquid, filling the reservoirs with clean fluid or water, or emptying the dust from the bin.

For these, additional sensing may be required. For example, the IR method may be combined with the hall effect sensors or QR code scanning, and such. In some embodiments, for finding signal emissions from a dock and service station by the robot, the algorithm causes the robot to fully explore all frontiers in a current room and drive along all outer navigation anchor nodes (anchor nodes with neighbor count <8) which would allow the robot to drive along the walls of the room and the perimeter of interior islands (where docks are usually positioned). This improvement helps as a dock search along just the outer nodes in each room biases the search to be successful at locating hard-to-see docks placed along the outer walls, however, would miss docks placed along interior islands. In some embodiments, the logic will first cause the robot to attempt to find the dock by performing a quick exploration of each room and then in a second step or alternative step could cause the robot to fully explore all frontiers in each room to search for the dock. If the dock is not found, then the algorithm could cause the robot to drive along all outer navigation anchor nodes in each room. Regular exploration in most cases is adequate in finding the dock and therefore will be a first step in finding the dock. In some embodiments algorithm allows the robot to adjust by stopping/slowing a forward movement at times and rotate or pivot in place to ensure that it does not miss a signal and specially in the last part of approach better align itself with the center-line. In some embodiments a number of IR receivers (two, three, four, or more) are used. In order to overcome ambient light interference a code-word system to distinguish signals that are sent with intent from those that are scattered in ambiance is implemented. In some embodiments code words are implemented with modulation of IR frequency. In some embodiments, a docking algorithm could be developed to parse the received code words and process the code words to control the driving of the robot such that it may be aligned with a center line of the docking station, and cause the robot to stop upon detecting the robot is on the charging pads. In some embodiments, a docking drive routine will start driving the robot to drive an arc within the IR zone while receiving IR readings from the docking station IR transmitters, parse and process the IR readings to identify code words, and provide driving instructions to the robot to align it with the docking station based on the code words received. To determine appropriate driving instructions, a position and direction of the robot relative to the docking station may be determined for sensor readings received by different IR receivers of the robot from different IR transmitters of the docking station. For example, when the far left and far right IR receivers of the robot receive code words indicating the signal received is from the left and right IR transmitter of the docking station, respectively, the robot is facing the dock and is close to the centerline of the dock.

In some embodiments, appropriate driving speed and angular rotation ranges required to achieve a high docking success rate are decided by the algorithm. In some embodiments, the previous failures and successes in a particular robot dock pair at a particular location may be used to improve the performance or rate of success of the future dockings. Machine Learning and AI can contribute to success of the robot docking based on the particular geometric and topologic settings of robot's work environment. Docking success rate versus dock location may be graphed using AI algorithms to understand what causes low success rates and optimize the algorithm at run time at the final work place. Feedback may be provided to the manufacturer to further improve the future algorithms.

In some embodiments, a charging station of the robot includes a bar code or QR code readable by a camera or a scanner. In some embodiments, an identification may be used to identify a location. Alternatively, the robot recognizes the charging station using image recognition technology. These methods of recognition may be used to recognize other places of interest, apart from the charging station. FIG. 488 illustrates an example of a charging station 43300 with a QR code 43301. A robot may use a camera disposed on the robot to read the QR code and thus recognize the charging station 43300. A charging station 43302 with a barcode 43303 is also illustrated. A robot may use a scanner disposed on the robot to read the barcode 43303 and thus recognize the charging station 43302. A charging station 43304 with a particular structure 43305 disposed on the charging station is also illustrated. A light source disposed on a robot may emit, for example, a laser line, and a camera disposed on a robot may capture images of the laser line projected onto object surfaces. A position of one or more segments of the laser line in a captured image depends on indentations of a surface of an object onto which the laser line is projected. Given the known indentations of structure 43305, a processor of the robot identifies the charging station upon extracting a particular pattern of the segments of the laser line in a captured image.

Figure 489:
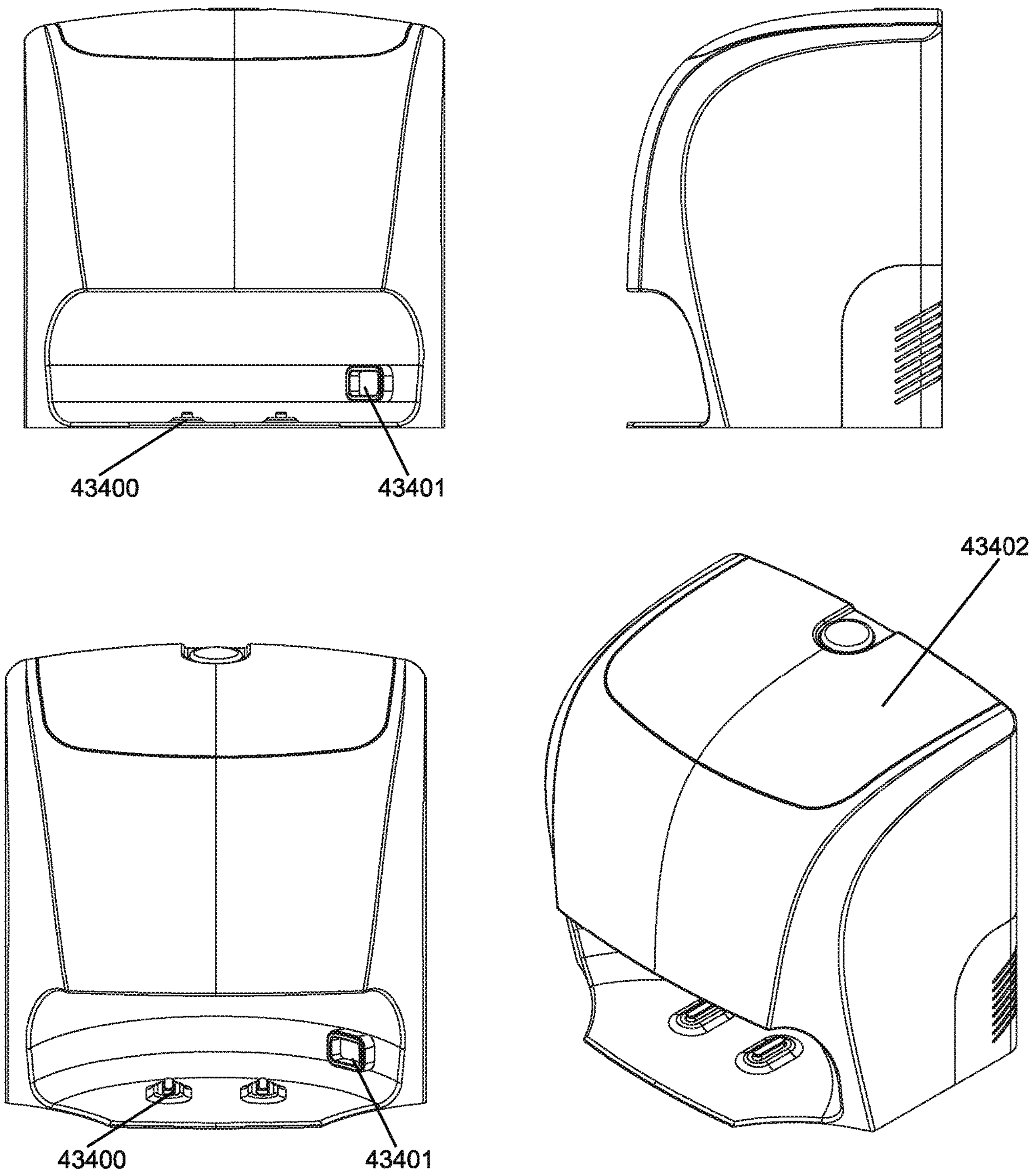
Figure 490:
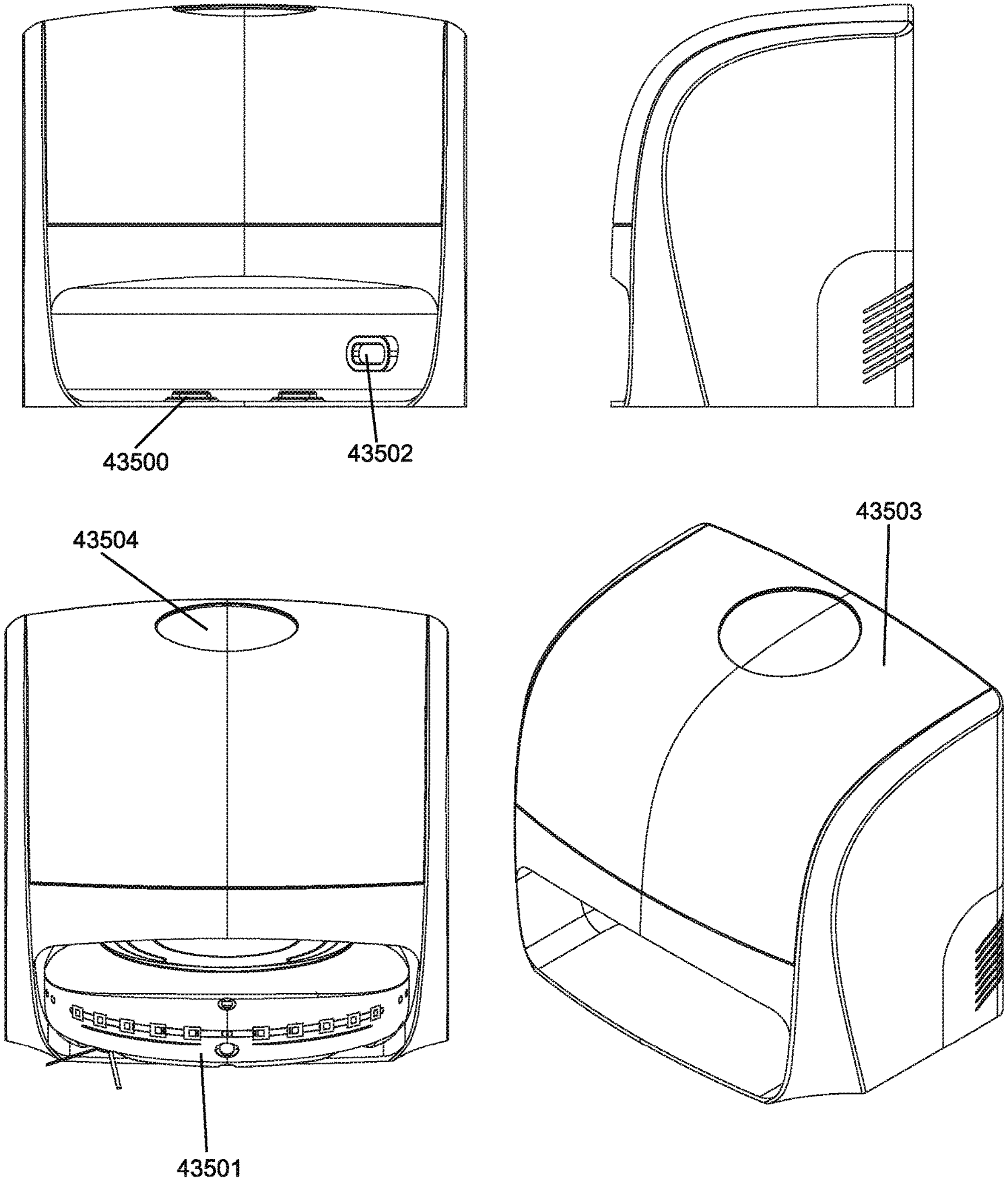
Figure 491:
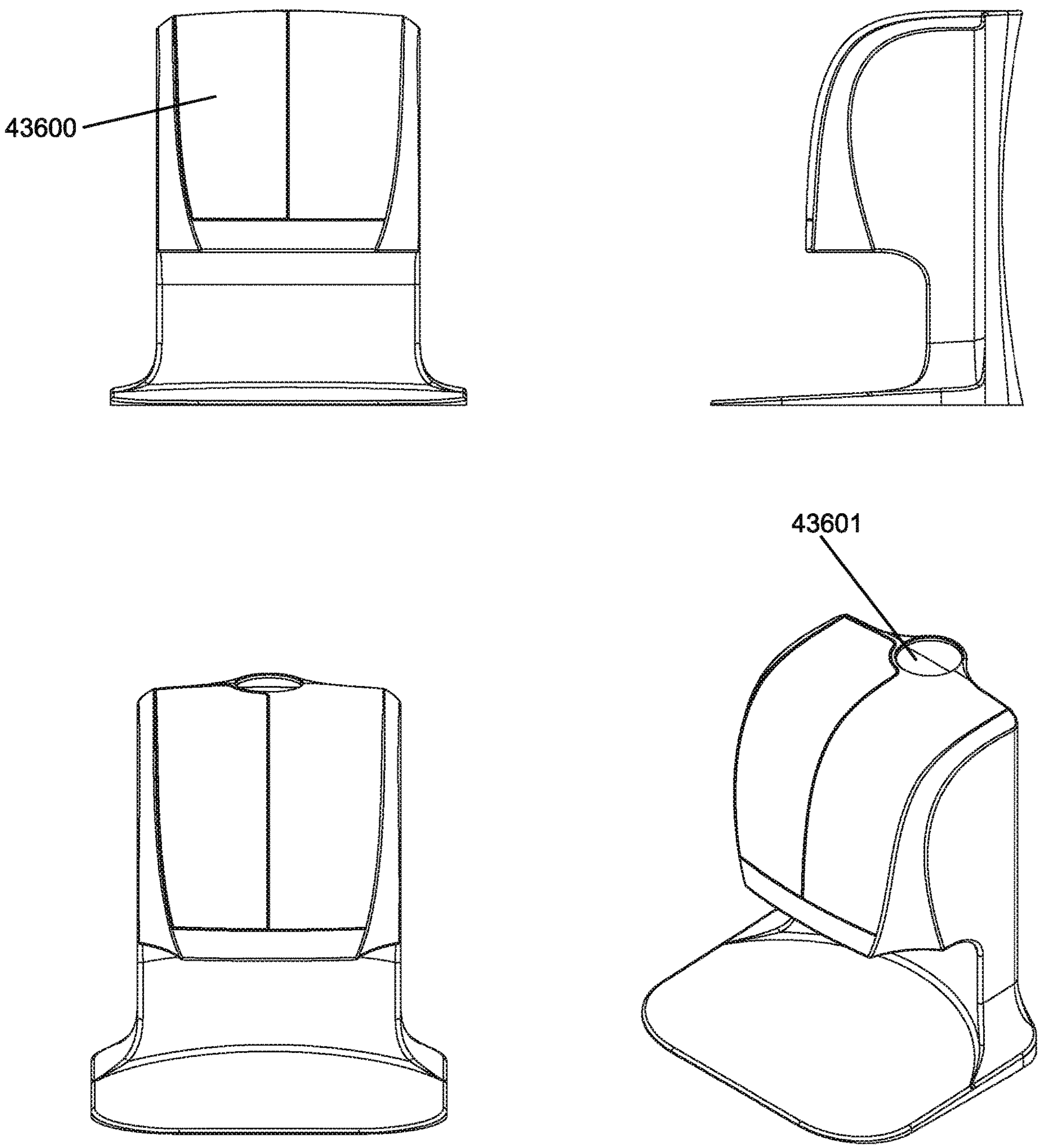
Figure 492:
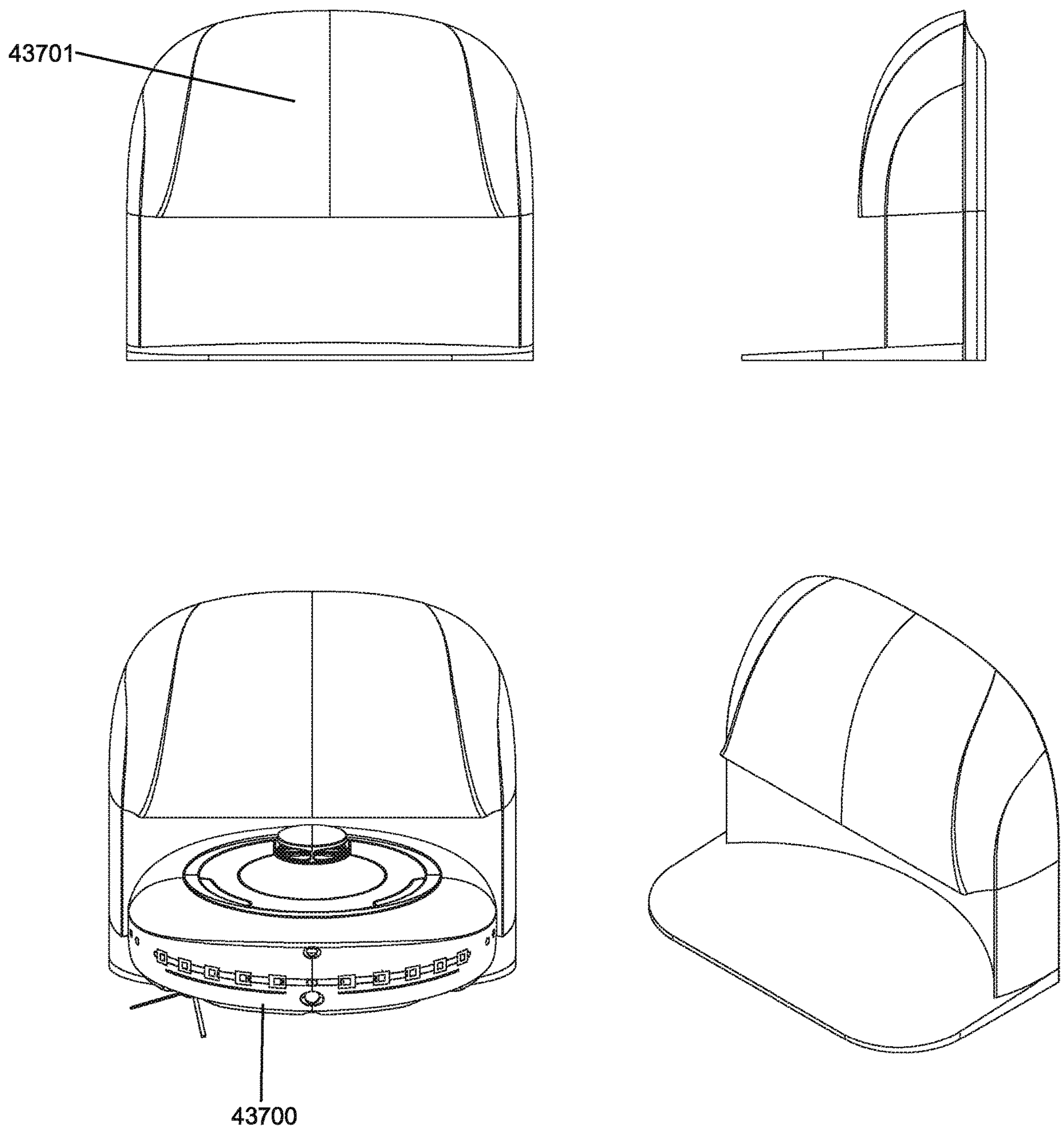

In some embodiments, the charging station of the robot includes a mechanism for emptying a dustbin of the robot into a bin of the charging station. For example, FIG. 489 illustrates an example of a charging station with an auto empty feature comprising electrical charging contacts 43400 that connect to charging contacts of a robot for charging, a suction port 43401 that attaches to a dustbin of the robot to empty debris from the dustbin of the robot into a bin of the charging station, and a compartment 43402 within which the bin of the charging station is housed. The compartment 43402 is opened to access the bin of the charging station for emptying the stored debris. FIG. 490 illustrates an example of a charging station with an auto empty feature comprising electrical charging contacts 43500 that connect to charging contacts of a robot 43501 for charging, a suction port 43502 that attaches to a dustbin of the robot to empty debris from the dustbin of the robot into a bin of the charging station, a compartment 43503 within which the bin of the charging station is housed, and a user interface 43504. The compartment 43503 is opened to access the bin of the charging station for emptying the stored debris. FIG. 491 illustrates an example of a charging station with an auto empty feature comprising electrical charging contacts that connect to charging contacts of a robot for charging, a suction port that attaches to a dustbin of the robot to empty debris from the dustbin of the robot into a bin of the charging station, a compartment 43600 within which the bin of the charging station is housed, and a user interface 43601. The compartment 43600 is opened to access the bin of the charging station for emptying the stored debris. FIG. 492 illustrates an example of a charging station with an auto empty feature comprising electrical charging contacts that connect to charging contacts of a robot 43700 for charging, a suction port that attaches to a dustbin of the robot to empty debris from the dustbin of the robot into a bin of the charging station, and a compartment 43701 within which the bin of the charging station is housed. The compartment 43701 is opened to access the bin of the charging station for emptying the stored debris.

In some embodiments, the robot comprises a bumper configured to recognize objects within the environment. When the bumper triggered, the processor of the robot recognizes a presence of an object and actuates the robot to stop or changes its path accordingly. In most embodiments, the bumper is positioned in a front portion of the robot as the robot is more likely to encounter an object in front of the robot, as the robot primarily drives in a forward direction. In some embodiments, the bumper is positioned on the front portion and on a back portion of the robot such that contact with an object during forward and backward movement of the robot are accounted for. Or, in some embodiments, the bumper surrounds all sides of the robot, covering the front portion, the back portion and left/ride sides of the robot. A bumper positioned on the right/left sides of the robot are useful when the robot approaches an object at an angle and for recognizing moving objects that approach the robot from its side. In some cases, the bumper covers a top portion of the robot, especially around top edges of the robot. A bumper surrounding the top edges of the robot helps in recognizing objects with an overhang (e.g., low cabinets, furniture with a low height clearance, or tables and chairs for taller robots) to avoid wedging underneath those objects.

With an integrated bumper that covers front, back, left/right side and top portions of the robot, identification of a direction of a force caused by an impact with an object is important in deciding a next move of the robot. Since the bumper moves upon impact, the direction of movement of the bumper is used to recognize the direction of the force, and ultimately, a location of the object relative to the robot. In embodiments, various sensors are used to detect a direction of movement of the bumper. For example, simple mechanical switches positioned around a body of the robot, between the body of the robot and the bumper are used to detect a direction of movement of the bumper. These switches are triggered upon impact of the bumper with, for example, an object. When impact of the bumper is with a front central portion, only a front switch is triggered and when impact of the bumper is with a front, left portion, both front and left switches are triggered. The mechanical switches are positioned strategically based on a shape of the robot such they accurately indicate a location of impact. Due to the nature of the switches being mechanical, they prone to wear and tear and/or losing accuracy. Another type of switch used to determine a direction of movement of the bumper is a fork sensor or infrared switch. Similar to mechanical switches, these sensors are positioned around the robot to detect a direction of movement of the bumper. Fork sensors or IR switches only recognize movement in one direction by sliding a moving piece inside a fork shaped slot, blocking light (i.e., IR wave) emitted between two arms of the fork. Therefore, positioning fork sensors or IR switches at an angle in relation to each other for a same moving part (bumper and body) may be limited. In another case, tactile or touch sensors are used to determine a direction of force acting on the bumper upon impacting an object. In this case, a series of tactile sensors are positioned between the bumper and the body of the robot. When the bumper presses against a sensor, the sensor is triggered and a location of impact is determined based on a location of the triggered sensor. Tactile sensors may be grouped together to simplify detection of a direction of impact with an object.

Another means of determining a direction of movement of the bumper includes the use of pressure sensors. A normal pressure sensor or a differential pressure sensor may be used. To use a pressure sensor for detecting impact with the bumper, a flexible silicon tube filled with air is positioned between the bumper and the body of the robot or on an outer surface of the bumper. Upon impact with an object, the tube is compressed and the air pressure inside the tube changes. The air pressure sensor detects and measure the change in pressure, indicating impact with the bumper. Accuracy of a location of the applied force is dependent on the placement of one or more tubes. For example, two separate tube systems are positioned on the front and the back portion of the bumper to distinguish between impacts on the front and back portions of the robot. In another example, four tube systems are positioned on four corners (front right, front left, back right, and back left) of the bumper to detect a location of impact more accurately. In some embodiments, differential pressure sensors are used to connect two tube systems together and measure their change in pressure using only one sensor. In some embodiments, the flexible tubes themselves are used as the bumper surrounding the robot, which may be useful for robots operating within water or flying robots having a tube shaped bumper surrounding a perimeter of their bodies.

Alternatively, inertia measurement units (IMU) sensors are positioned on the bumper and the body of the robot to detect a location and direction of impact with an object. IMU sensors are composed of a 3-axes accelerometer and a 3-axes gyroscope to detect acceleration and rotation in the 3 axes separately. A difference between readings of the IMU sensor positioned on the bumper and IMU sensor positioned on the body of the robot provides an indication of local movement of the bumper in relation to the body of the robot. For example, when the IMU sensor positioned on the bumper outputs readings of vertical acceleration (z axis) that are larger than the vertical acceleration output by the IMU sensor positioned on the body of the robot, the bumper is assumed to be pressed downwards. Simultaneously, a difference between horizontal rotation (x or y axis) readings output by the IMU sensor positioned on the bumper and the body of the robot indicates a location of the downward force (e.g., front, back, left or right side of the robot). Using two IMU sensors, one on the body of the robot and one on the bumper, an impact in a direction of movement of the robot is detected. Upon impact with an object, the impact is recorded by the IMU sensor positioned on the bumper initially, then the IMU sensor positioned on the body of the robot once the robot slows down, therefore there is a small time difference between activation of the two IMU sensors. Also, the impact detected by the IMU sensor positioned on the body of the robot is milder as a portion of the impact force is dampened by the bumper. In another example, two IMU sensors are positioned on the bumper at opposite ends (e.g., front and back) and one IMU sensor is positioned on the body of the robot. Readings of the IMU sensors positioned on the bumper are used to confirm a location and direction of impact with an object. For example, if a downward force is applied to a front portion of the bumper, the front IMU sensor records a large acceleration in the downwards direction while the back IMU sensor records a small acceleration in the upwards direction as the front portion of the bumper moves downwards while the back position of the bumper moves upwards. A combination of the IMU sensor readings indicates the location of the applied force in the front portion of the bumper. The difference between readings from the IMU sensor positioned on the body of the robot and the IMU sensor positioned on the bumper aids in determining whether movement of the bumper is caused by an object or movement of the robot. When readings of the IMU sensor positioned on the body are larger in magnitude and indicate impact sooner than the readings of the IMU sensor positioned on the bumper, it may be assumed the difference is due to acceleration or deceleration of the robot. When readings of the IMU sensor positioned on the bumper are larger in magnitude and indicate impact sooner than the readings of the IMU sensor positioned on the body, it may be assumed the difference is due to the bumper hitting an object.

For the bumper to perform its intended function correctly, the bumper must be capable of returning to a neutral state. Several methods may be used to return the bumper to a neutral position after impact. For example, extension springs positioned in between the bumper and the body of the robot are used, with one end of the spring connected to the body and the other end of the spring connected to the bumper. When the bumper contacts an object, the springs extend as the bumper moves backwards due to the impact. After disengaging with the object, the springs return to their neutral state, moving the bumper in a forward direction back to its neutral position. While this method is useful for front facing impacts, it does not work well in all directions. As such, compression springs may be added. Compression springs are similar to extension springs, however, their connection to the body of the robot and the bumper are opposite. For extension springs, the spring head closest to a center of the robot is connected to the body and the spring head furthest from the center of the robot is connected to the bumper, while for compression springs, the spring head closest to the center of the robot is connected to the bumper and the spring head furthest from the center of the robot is connected to the body. In this setup, a set of springs are extended upon impact with an object while another set of springs are compressed upon impact. After disengaging with the object, both sets of springs return to their neutral states, thereby returning the bumper to its neutral state as well. In some cases, leaf springs are positioned between the body of the robot and the bumper. A middle portion of each leaf spring is connected to the body while the two ends of the spring are connected to the bumper. Springs may be paired and positioned in opposite directions. Depending on a direction of the impact, one spring compresses while the other spring extends. After impact, both springs return to their neutral state and return the bumper back to its neutral state. While the middle portion of each spring is fixed to the body, the two ends of the spring require enough room to slide along an inner surface of the bumper when stretching and compressing. Leaf springs may be positioned on a top portion of the robot between the body of the robot and the bumper, accounting for cases of downward forces causing the bumper to tilt relative to the body.

Figure 493A:
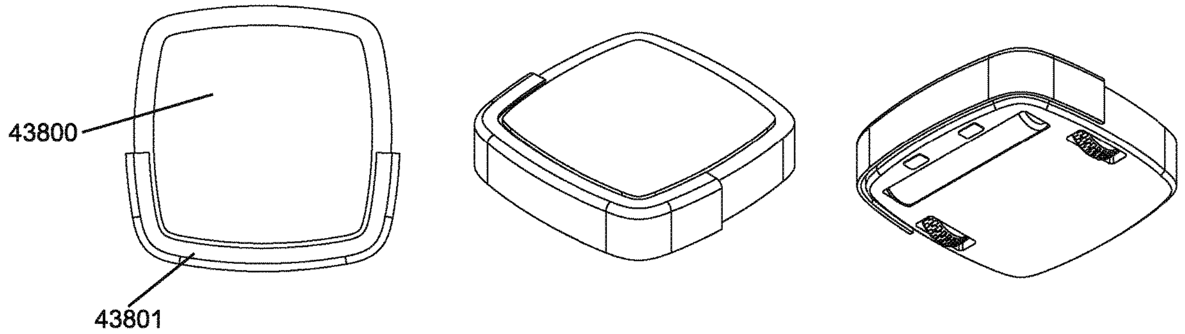
Figure 493B:
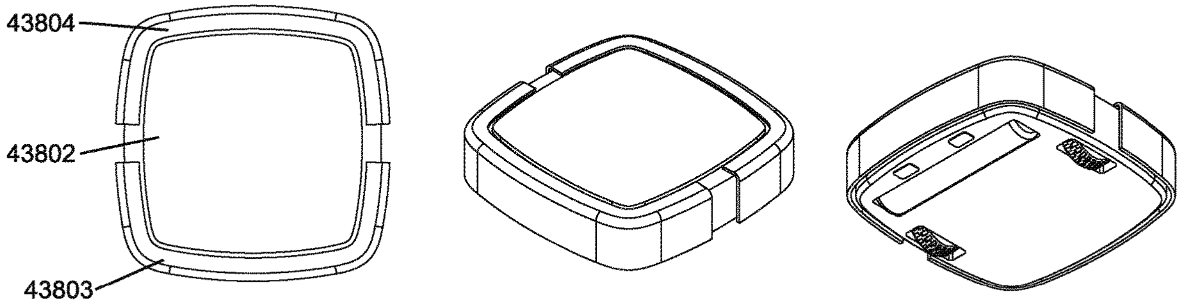
Figure 493C:
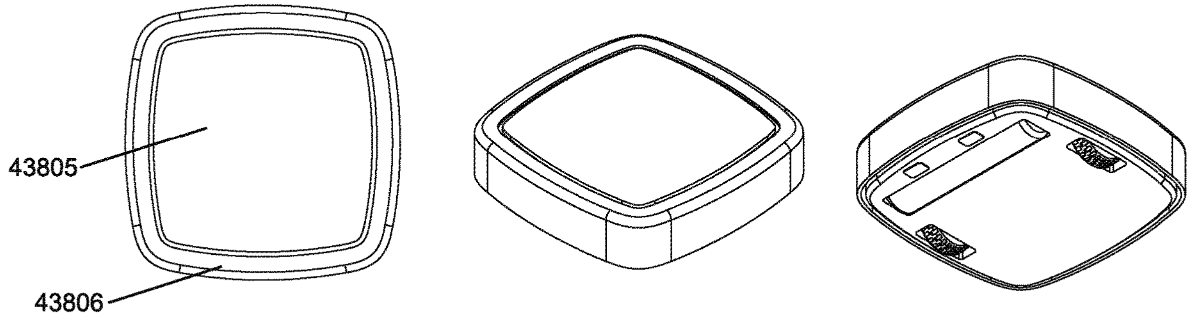
Figure 494:
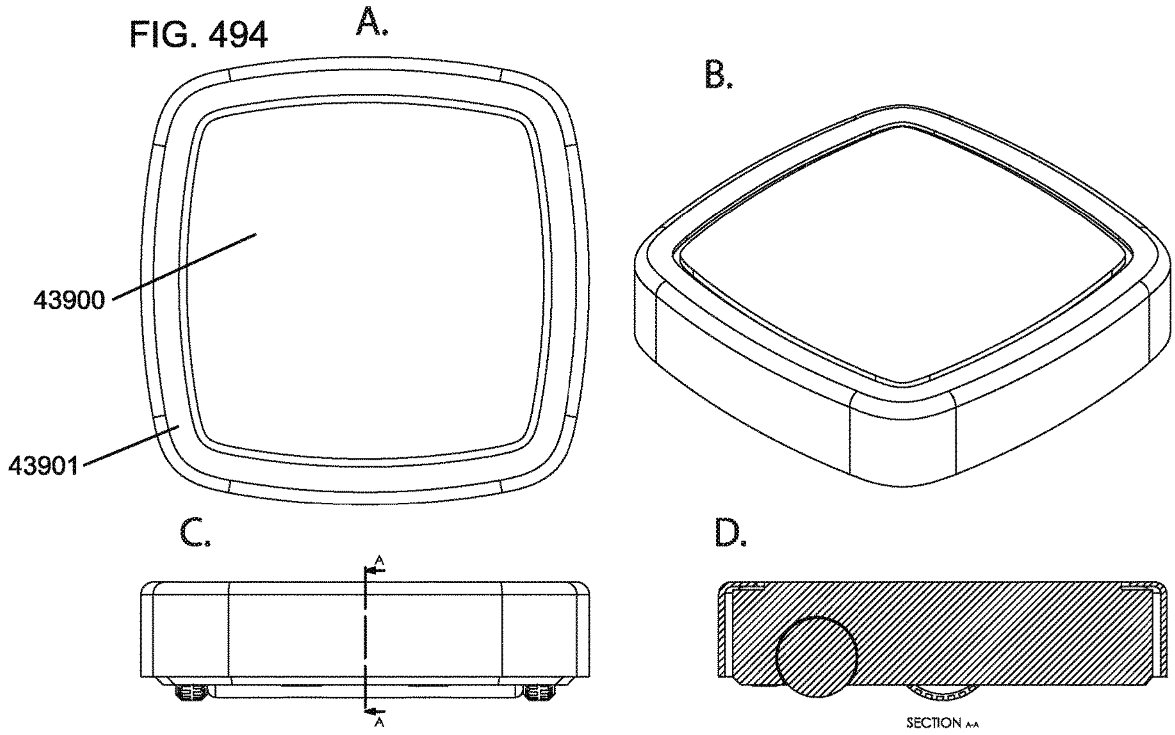
Figure 495:
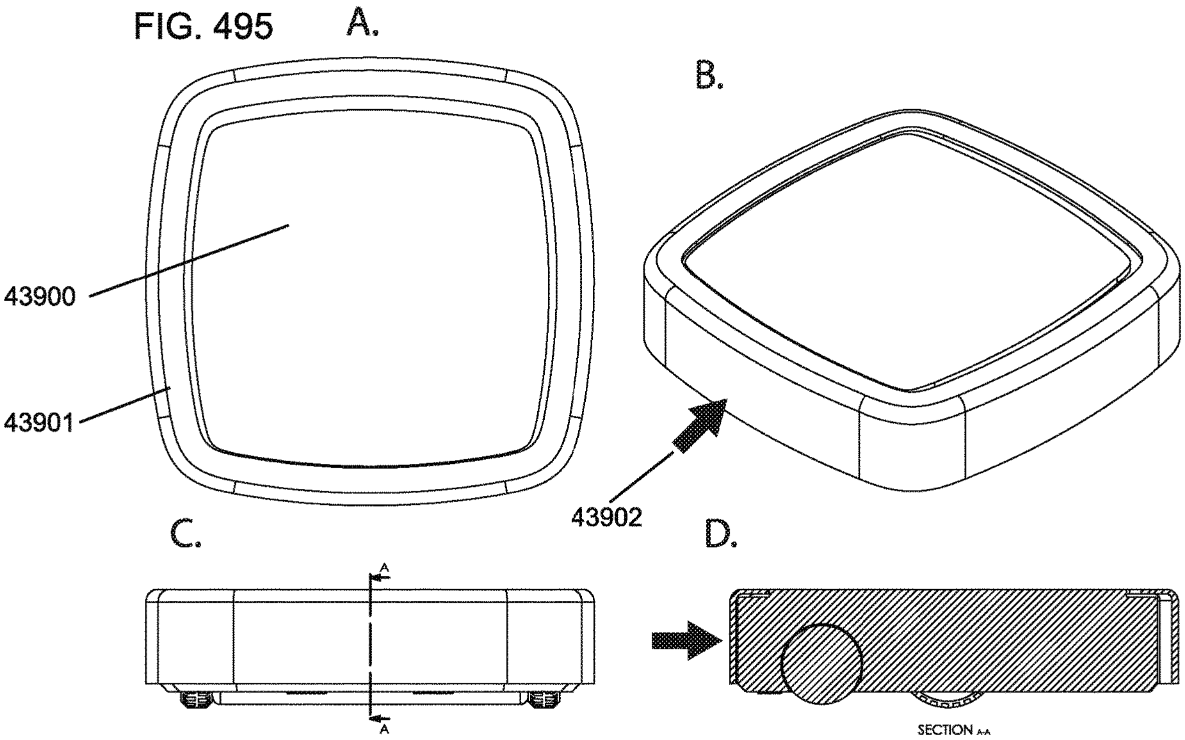
Figure 496:
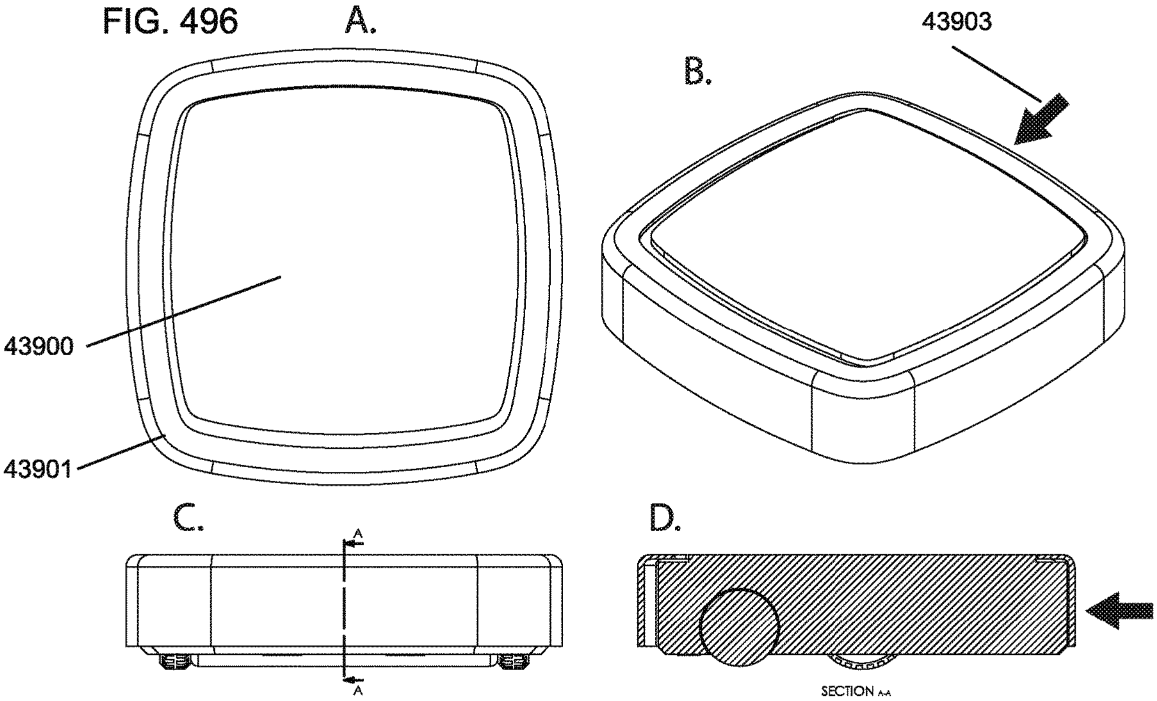
Figure 497:
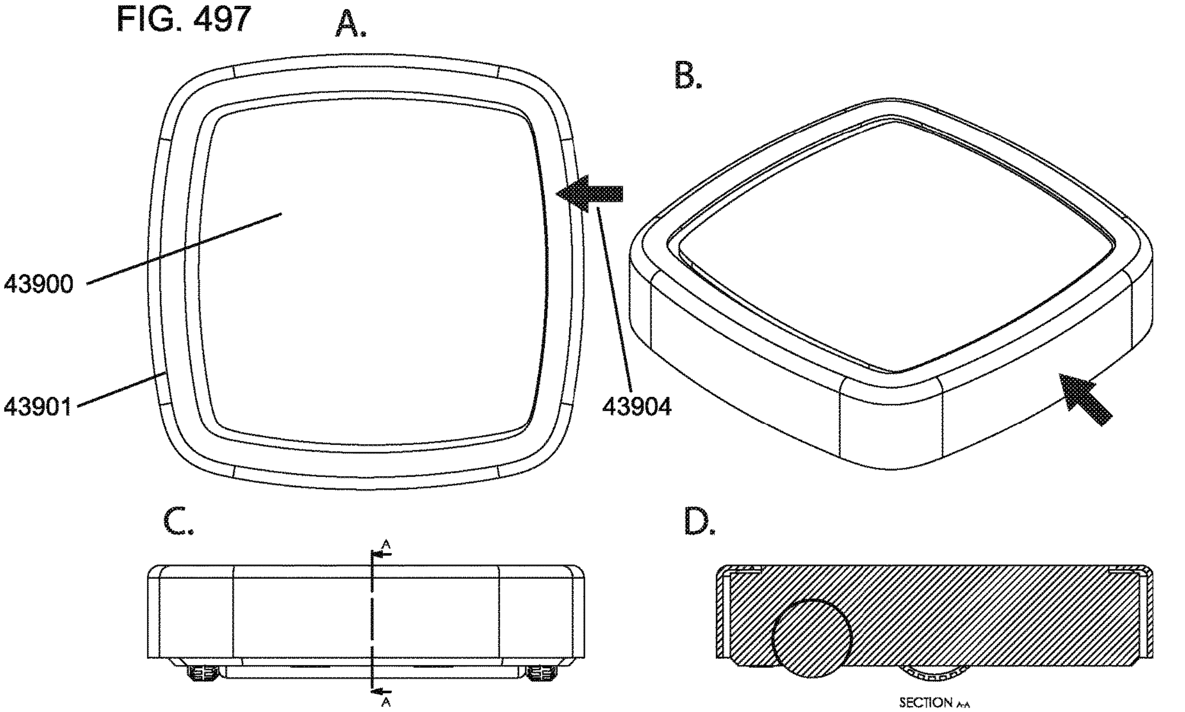
Figure 498:
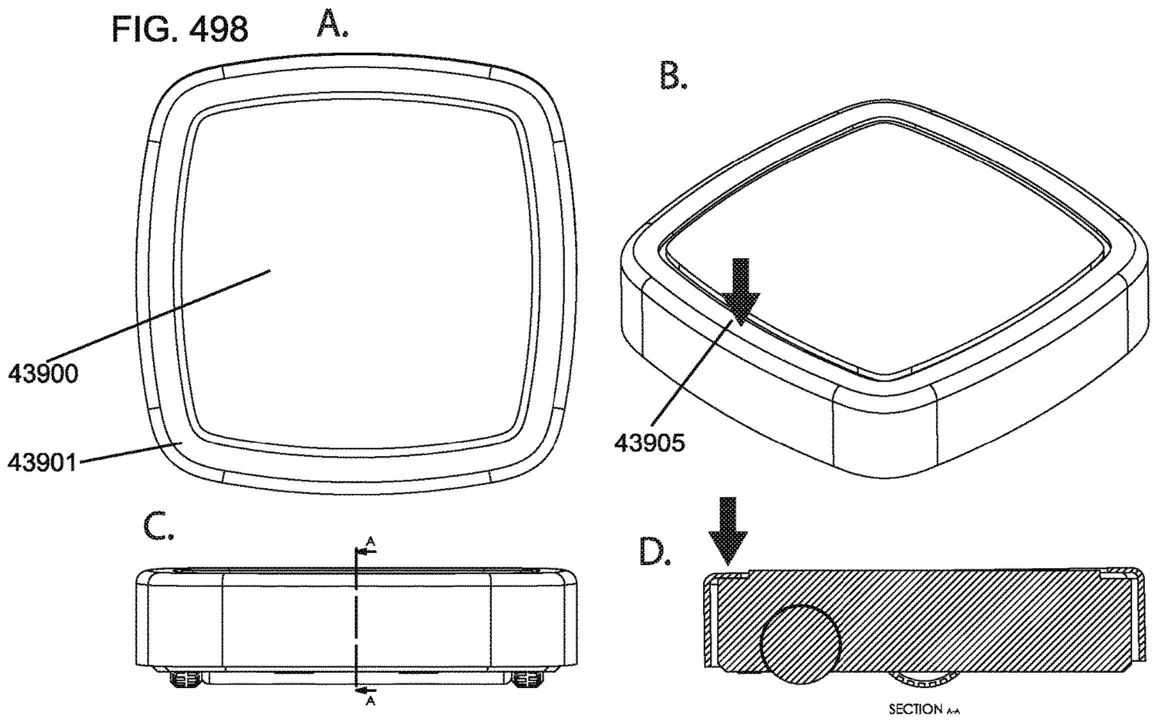

FIG. 493A illustrates top, perspective and bottom views of a cleaning robot 43800 comprising a front bumper 43801. FIG. 493B illustrates top, perspective and bottom views of a cleaning robot 43802 comprising a front bumper 43803 and a rear bumper 43804. FIG. 493C illustrates top, perspective and bottom views of a cleaning robot 43805 comprising an integrated bumper 43806. FIG. 494 illustrates A. top, B. perspective, C. front, and side sectional (A-A of C. front) views of a cleaning robot 43900 with an integrated bumper 43901 in neutral position. FIG. 495 illustrates A. top, B. perspective, C. front, and side sectional (A-A of C. front) views of the cleaning robot 43900 with the integrated bumper 43901 triggered by a force 43902 applied to a front portion of the bumper 43901. FIG. 496 illustrates A. top, B. perspective, C. front, and side sectional (A-A of C. front) views of the cleaning robot 43900 with the integrated bumper 43901 triggered by a force 43903 applied to a rear portion of the bumper 43901. FIG. 497 illustrates A. top, B. perspective, C. front, and side sectional (A-A of C. front) views of the cleaning robot 43900 with the integrated bumper 43901 triggered by a force 43904 applied to a side portion of the bumper 43901. FIG. 498 illustrates A. top, B. perspective, C. front, and side sectional (A-A of C. front) views of the cleaning robot 43900 with the integrated bumper 43901 triggered by a force 43905 applied to a top, front portion of the bumper 43901. Note the bumper 43901 is tilted relative to a body of the robot.

Figure 499:
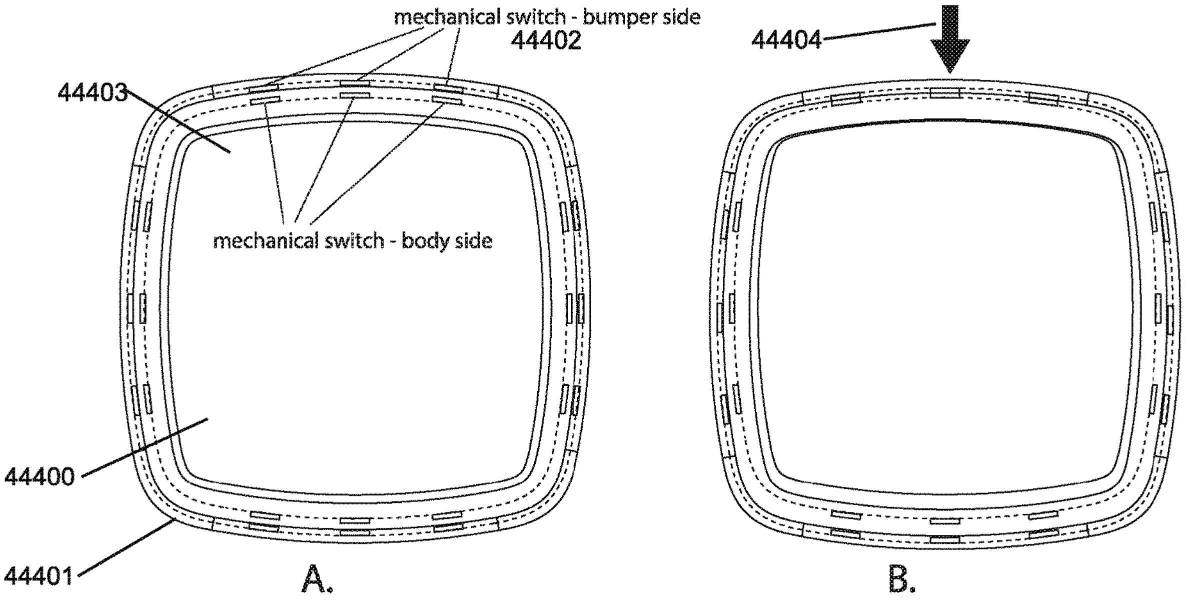
Figure 500:
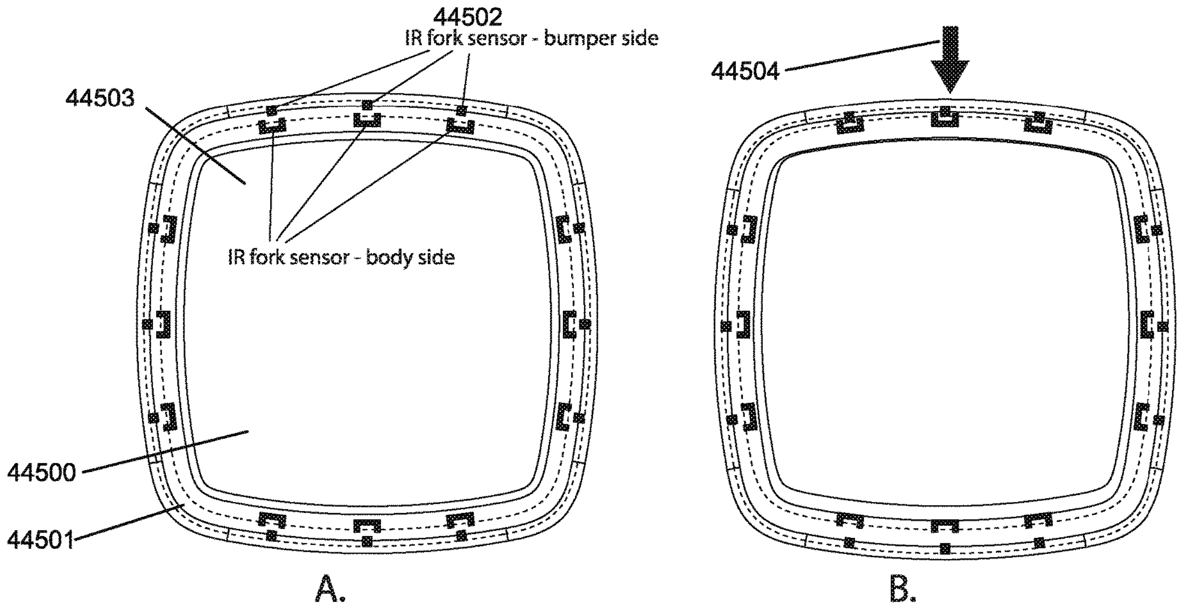
Figure 501:
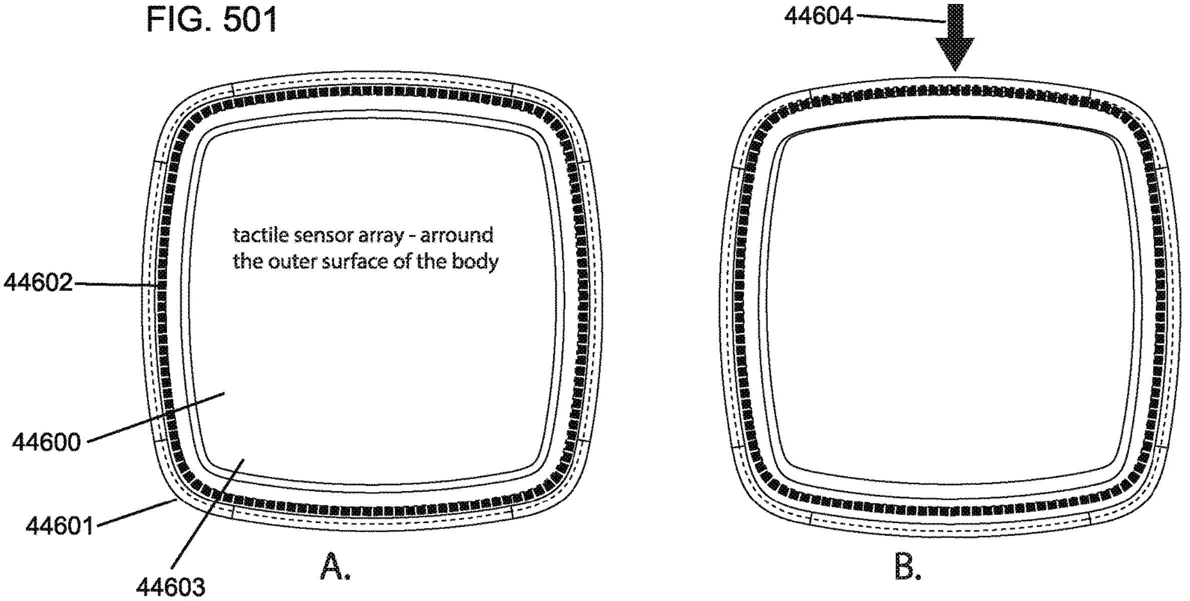
Figure 502:
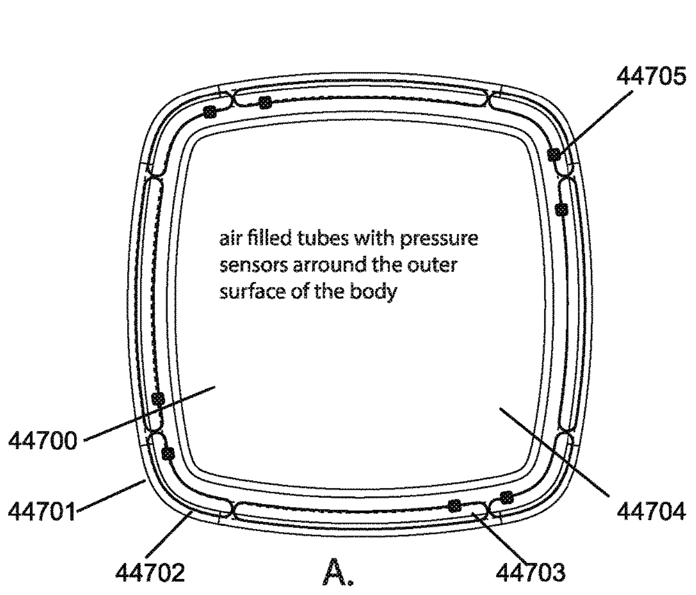
Figure 503:
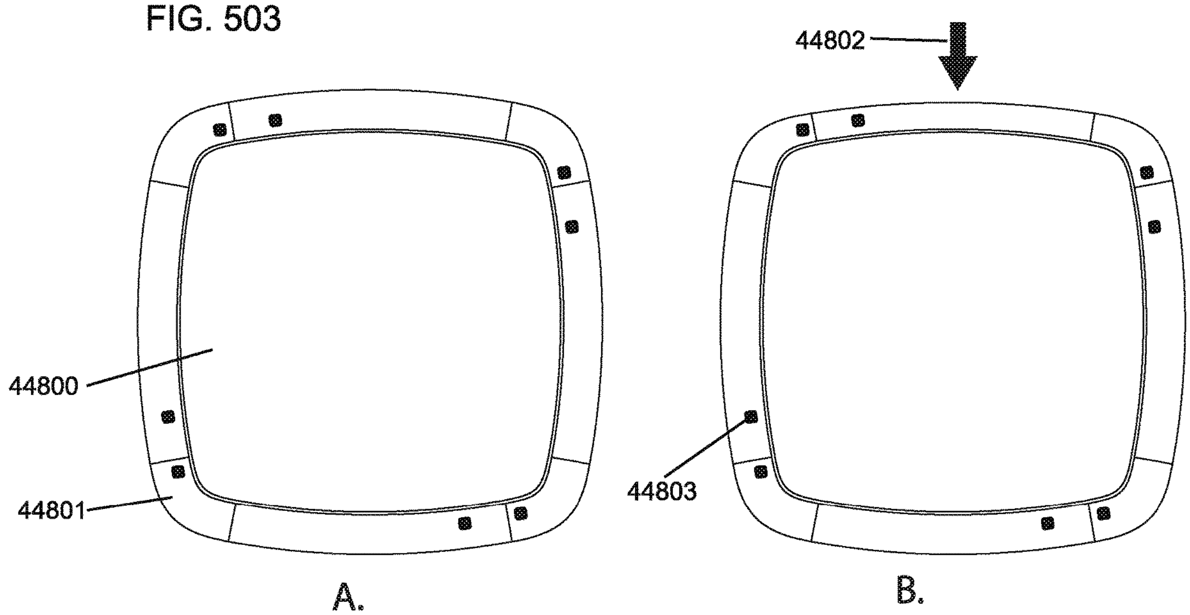
Figure 504:
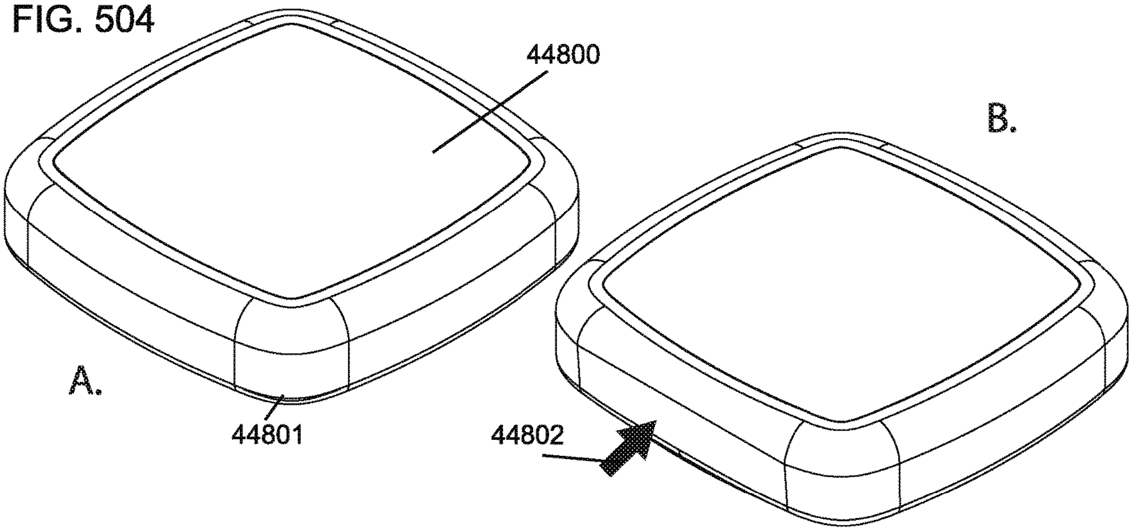

FIG. 499 illustrates a cleaning robot 44400 comprising an integrated bumper 44401 in A. a neutral state and B. a triggered state. A series of mechanical switches 44402 are positioned between a body 44403 of the robot 44400 and the bumper 44401. The switches 44402 are triggered when the bumper 44401 moves in direction 44404 due to impact with an object. FIG. 500 illustrates a cleaning robot 44500 comprising an integrated bumper 44501 in A. a neutral state and B. a triggered state. A series of IR fork sensors 44502 are positioned between a body 44503 of the robot 44500 and the bumper 44501. When the bumper 44501 moves in a direction 44504 due to impact with an object, some of the IR fork sensors 44502 are triggered, indicating the direction 44504 of the bump. FIG. 501 illustrates a cleaning robot 44600 comprising an integrated bumper 44601 in A. a neutral state and B. a triggered state. A series of tactile sensors 44602 are positioned between a body 44603 of the robot 44600 and the bumper 44601, around an outer surface of the body 44603. When the bumper 44601 moves in a direction 44604, some of the tactile sensors 44602 are triggered, indicating the direction 44604 of the bump. FIG. 502 illustrates a cleaning robot 44700 comprising an integrated bumper 44701 in A. a neutral state and B. a triggered state. A series of flexible tubes 44703 filled with air are positioned between a body 44704 of the robot 44700 and the bumper 44701. Each tube of tubes 44703 is connected to an air pressure sensor 44705. When the bumper 44701 moves in a direction 44706 due to impact with an object, some of the tubes 44703 between the bumper 44701 and the body 44704 compress, causing the air pressure in the tube to change. This change in air pressure is measured by the sensors 44705. In analyzing the readings from the air pressure sensors 44705, the direction and location of the bump is determined. FIGS. 503 and 504 illustrate a robot 44800 with a series of air-filled tubes 44801 as an integrated bumper in A. a neutral state and B. a triggered state. In this embodiment, the air pressure of the bumper itself changes upon an object impacting the bumper in a direction 44802. The bumper is segmented into a series of tubes 44801 with separate air pressure sensors 44803 for indicating a direction and location of the bump.

Figure 505:
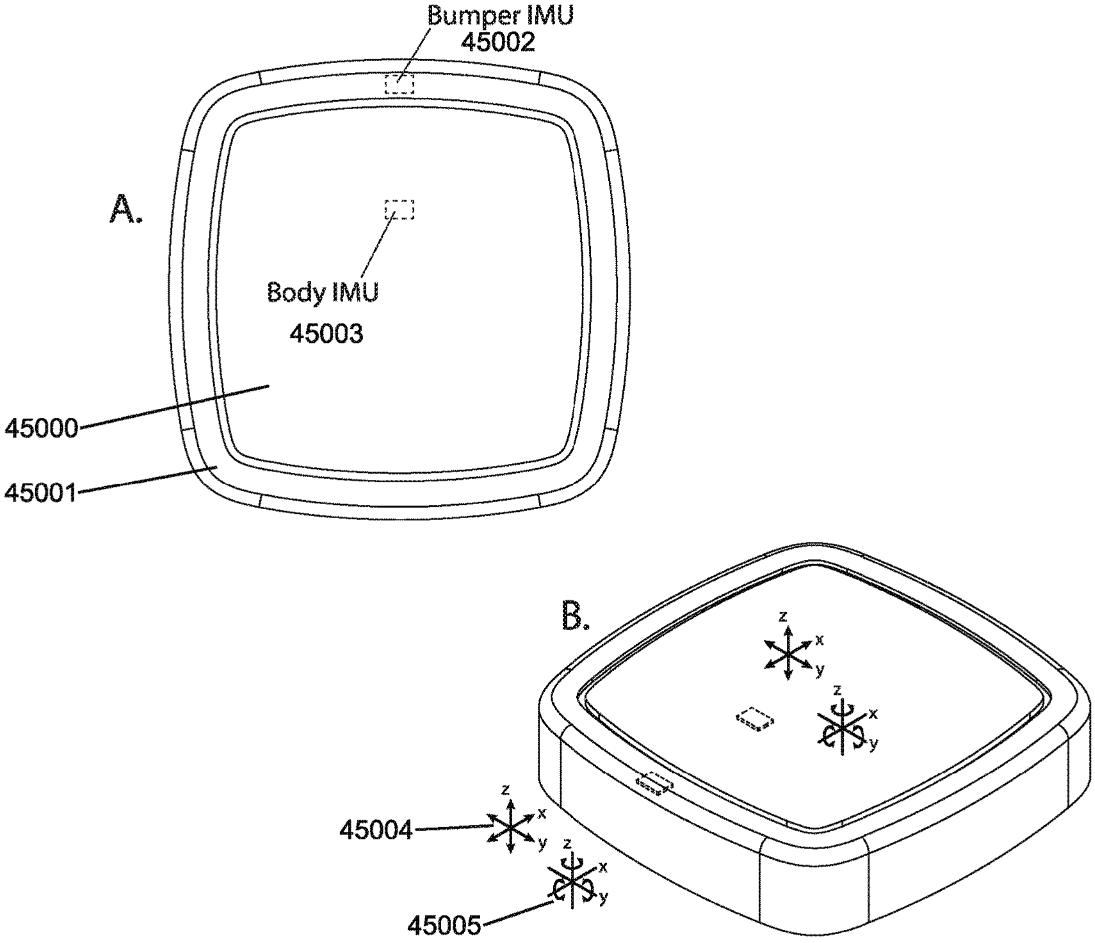
Figure 506:
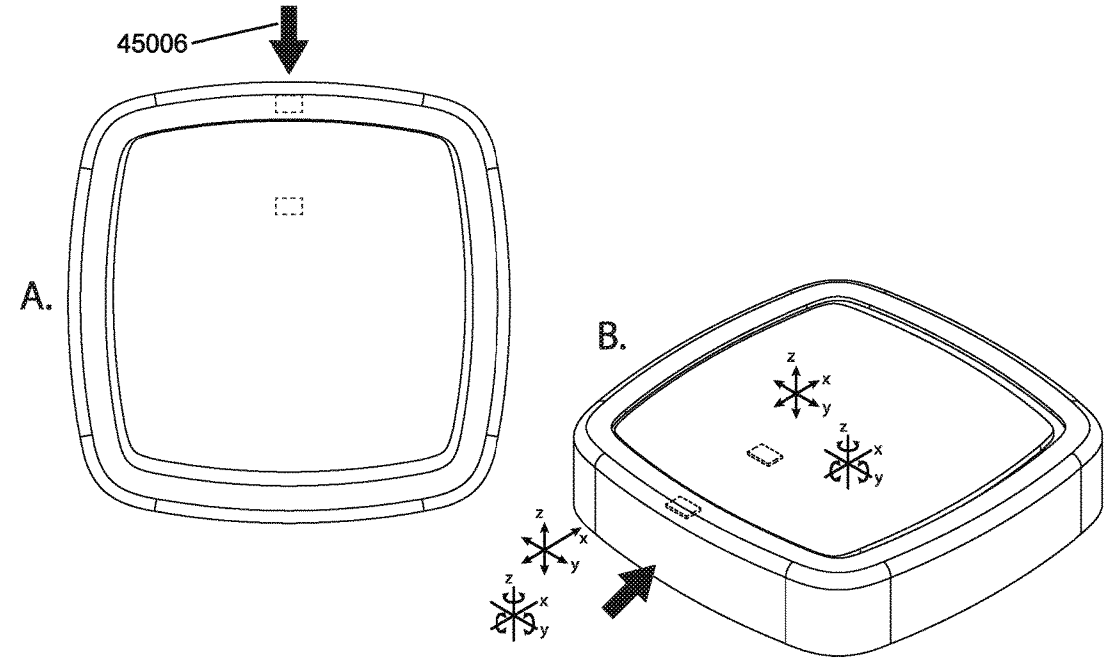
Figure 507:
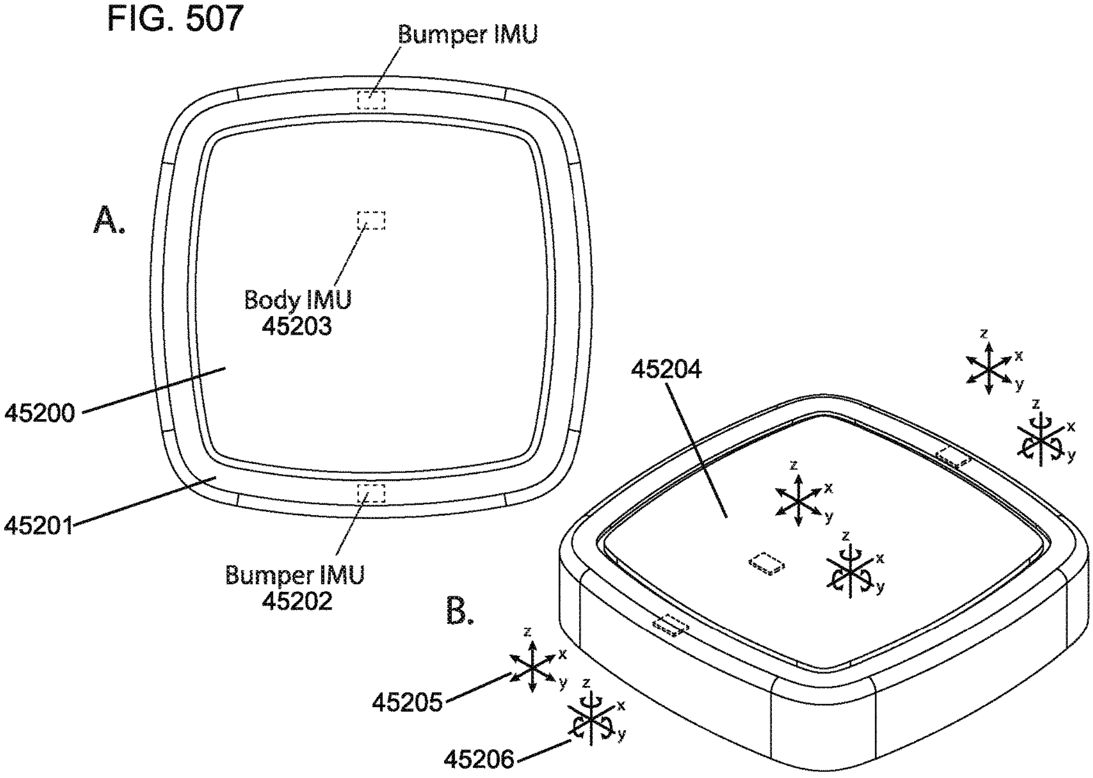
Figure 508:
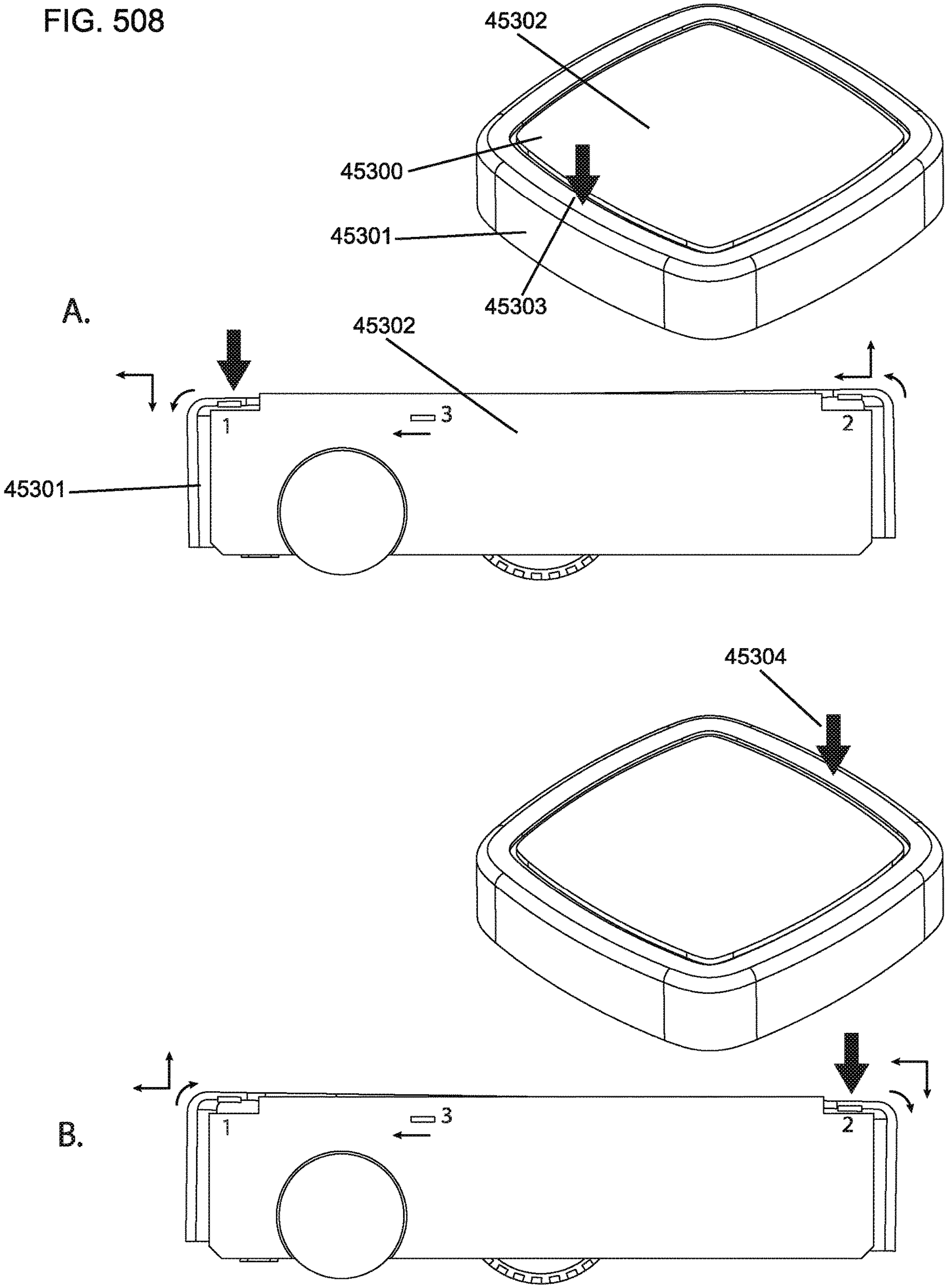

FIG. 505 illustrates A. top and B. perspective views of a cleaning robot 45000 comprising an integrated bumper 45001. A pair of IMU sensors 45002 are positioned on the bumper 45001 and a body 45003 of the robot 45000. Each IMU generates separate readings for acceleration 45004 and rotation 45005. Local movement of the bumper 45001 in relation to the robot 45000 is determined by comparing the two sets of IMU sensor readings. FIG. 506 illustrates A. top and B. perspective views of the cleaning robot 45000 with the integrated bumper 45001 and IMU sensors 45002. An impact force 45006 is applied to a front portion of the robot 45000. In this case, the IMU sensor positioned on the bumper 45001 reads a higher acceleration in a direction opposite to a movement of the robot 45000 before the IMU sensor positioned on the body 45003 of the robot 45000 senses the impact. The time difference between when each IMU sensor senses the impact and the change in acceleration and rotation of the two IMU sensors compared to each is indicative of impact and a direction of the impact force. FIG. 507 illustrates A. top and B. perspective views of a cleaning robot 45200 comprising an integrated bumper 45201. Two IMU sensors 45202 are positioned on opposite sides on the bumper 45201 and another IMU sensor 45203 is positioned on a body 45204 of the robot 45200. By fusing the acceleration 45205 and rotation 45206 readings of the two IMU sensors 45202 positioned on the bumper 45201, location and direction of the impact force is determined. FIG. 508 illustrates a cleaning robot 45300 comprising an integrated bumper 45301. Two IMU sensors (1) and (2) are positioned on opposite sides on the bumper 45301 and another IMU sensor (3) is positioned on a body 45302 of the robot 45300. In scenario A., a downward force 45303 is applied to a top, front portion of the bumper 45301 while the robot 45300 is moving in a forward direction. The IMU sensor (1) positioned on a front portion of the bumper 45301 reads an increase in downward acceleration and a counterclockwise rotation in addition to forward acceleration. The applied force 45303 causes the front portion of the bumper 45301 to tilt downward, causing a rear portion of the bumper 45301 to move upwards. Depending on a rigidity and form of the bumper 45301, the rear IMU sensor (2) reads an upward acceleration smaller or bigger than the acceleration readings of IMU sensor (1) and a counterclockwise rotation. Meanwhile, IMU sensor (3) positioned on the body 45302 only reads a forward acceleration at the time of impact. The force applied to the front portion of the robot 45300 is determined by comparing the combined readings of IMU sensors (1) and (2) with the readings of IMU sensor (3). In scenario B., a downward force 45304 is applied to a top, rear portion of the bumper 45301. IMU sensor (2) reads an increase in downward acceleration and a clockwise rotation in addition to a forward acceleration. The applied force 45304 causes the rear portion of the bumper 45301 to tilt downwards, causing the front portion of the bumper 45301 to move upwards. Depending on the rigidity and form of the bumper 45301, IMU sensor (1) reads an upward acceleration smaller or bigger than the corresponding readings of IMU sensor (2) and a clockwise rotation. Meanwhile, IMU sensor (3) only reads a forward acceleration at the time of impact. The force applied to the rear portion of the robot 45300 is determined by comparing the combined readings of IMU sensors (1) and (2) with the readings of IMU sensor (3).

Figure 512:
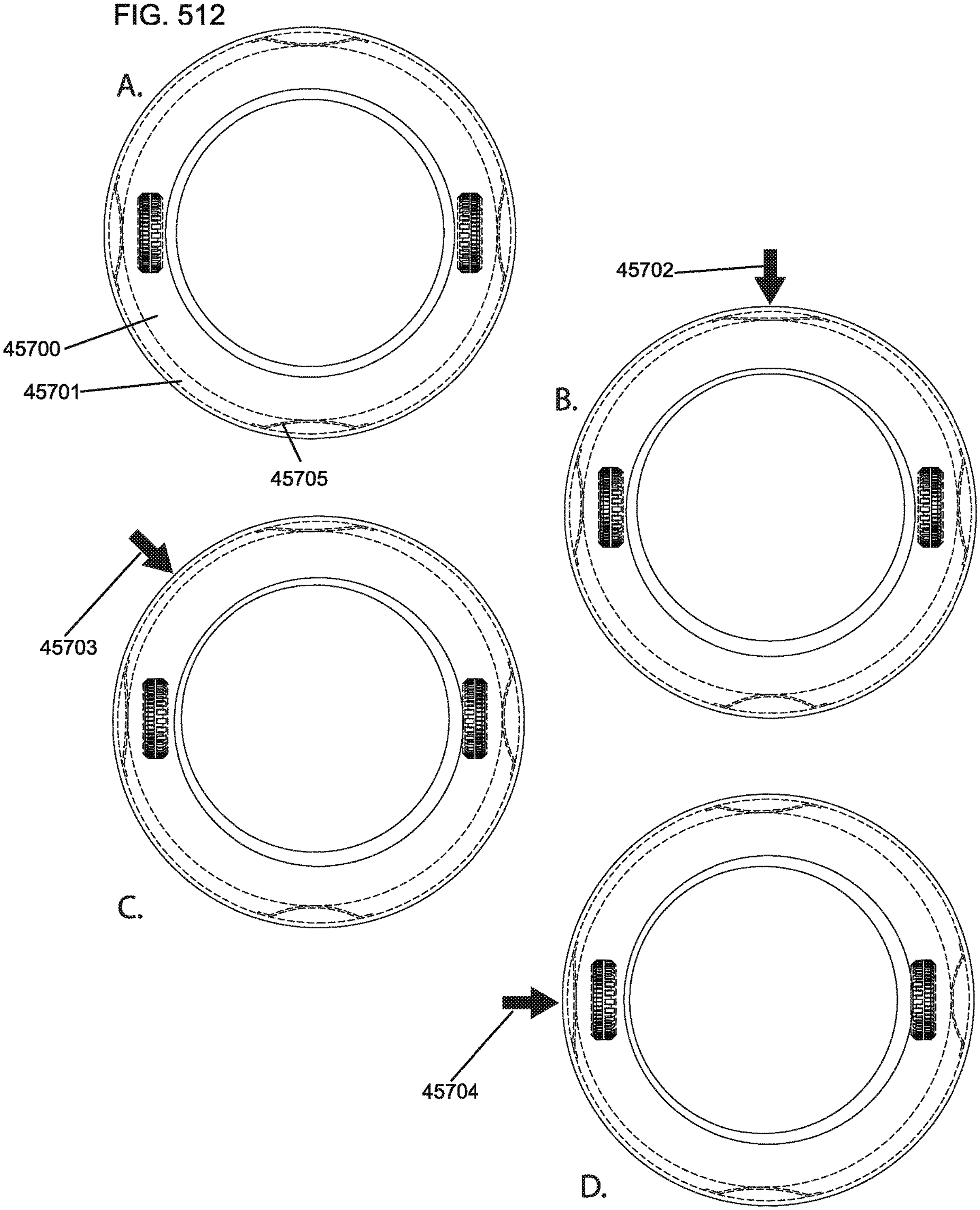

FIG. 509 illustrates a cleaning robot 45400 comprising an integrated bumper 45401 in A. a neutral state and B. a triggered state. The bumper 45401 covers a top surface of the robot 45400. A series of extension springs 45402 connect an inner top surface 45403 of the bumper 45401 and to an outer top surface 45404 of a body of the robot 45400. When the bumper 45401 is impacted and pushed back in a direction of impact, the springs 45402 extend, as shown in B. The springs 45402 return to their normal state after the impact, returning the bumper 45401 to its neutral position, shown in A. FIG. 510 illustrates a cleaning robot 45500 comprising an integrated bumper 45501 in A. a neutral state and B. a triggered state. The bumper 45501 covers a top surface of the robot 45500. A series of compression springs 45502 connect an inner top surface 45503 of the bumper 45501 and to an outer top surface 45504 of a body of the robot 45500. When the bumper 45501 is impacted and pushed back in a direction of impact, the springs 45502 compress, as shown in B. The springs 45502 return to their normal state after the impact, returning the bumper 45501 to its neutral position, shown in A. Compression springs are generally more durable and are easily inserted into an assembly with less manufacturing and molding complexity. However, compression springs are not ideal for resisting non-axial loads. FIG. 511 illustrates a cleaning robot 45600 comprising an integrated bumper 45601 in A. a neutral state and B. a triggered state. Cleaning robot 45600 includes both a series of extension springs 45602 and a series of compression springs 45603, as shown in FIGS. 509 and 510, respectively. Springs 45602 and 45603 connect an inner top surface 45604 of the bumper 45601 and to an outer top surface 45605 of a body of the robot 45600. When the bumper 45601 is impacted and pushed back in a direction of impact, the springs 45602 extend while the springs 45603 compress, as shown in B. The springs 45602 and 45603 return to their normal state after the impact, returning the bumper 45601 to its neutral position, shown in A. The combination of extension and compression springs provides more accuracy in keeping the bumper in place. FIG. 512 illustrates a cleaning robot 45700 comprising an integrated bumper 45701 positioned in A. a neutral state, B. a triggered state upon an impact force 45702 applied to a front portion of the robot 45700, C. triggered state upon an impact force 45703 applied at to a front, left portion of the robot 45700 at a 45 degrees angle, and D. triggered state upon an impact force 45704 applied to a left side of the robot 45700. Inner edges of the bumper 45701 are connected to outer edges of a body of the robot with a series of leaf springs 45705. Leaf springs 45705 are paired together to even out the applied forces and keep the bumper 45701 in place.

FIGS. 513A and 513B illustrate a robot vacuum cleaner 45800 comprising a detachable dustbin 45801. A dustbin lid 45802 rotates about a hinge to open the dustbin 45801. A separate trash bag 45803 is inserted into the dustbin 45801 and disposed when full. The trash bag 45803 is attached to the dustbin 45801 using a clip 45804. The trash bag 45803 include a bag lid 45805 that closes the trash bag 45803 prior to disposal, keeping debris contained. In some cases, the dustbin 45801 is used without the trash bag 45803. In some cases, the trash bag 45803 is reusable. In some cases, either one of the dustbin 45801 and the trash bag 45803 are washable.

Figure 514A:
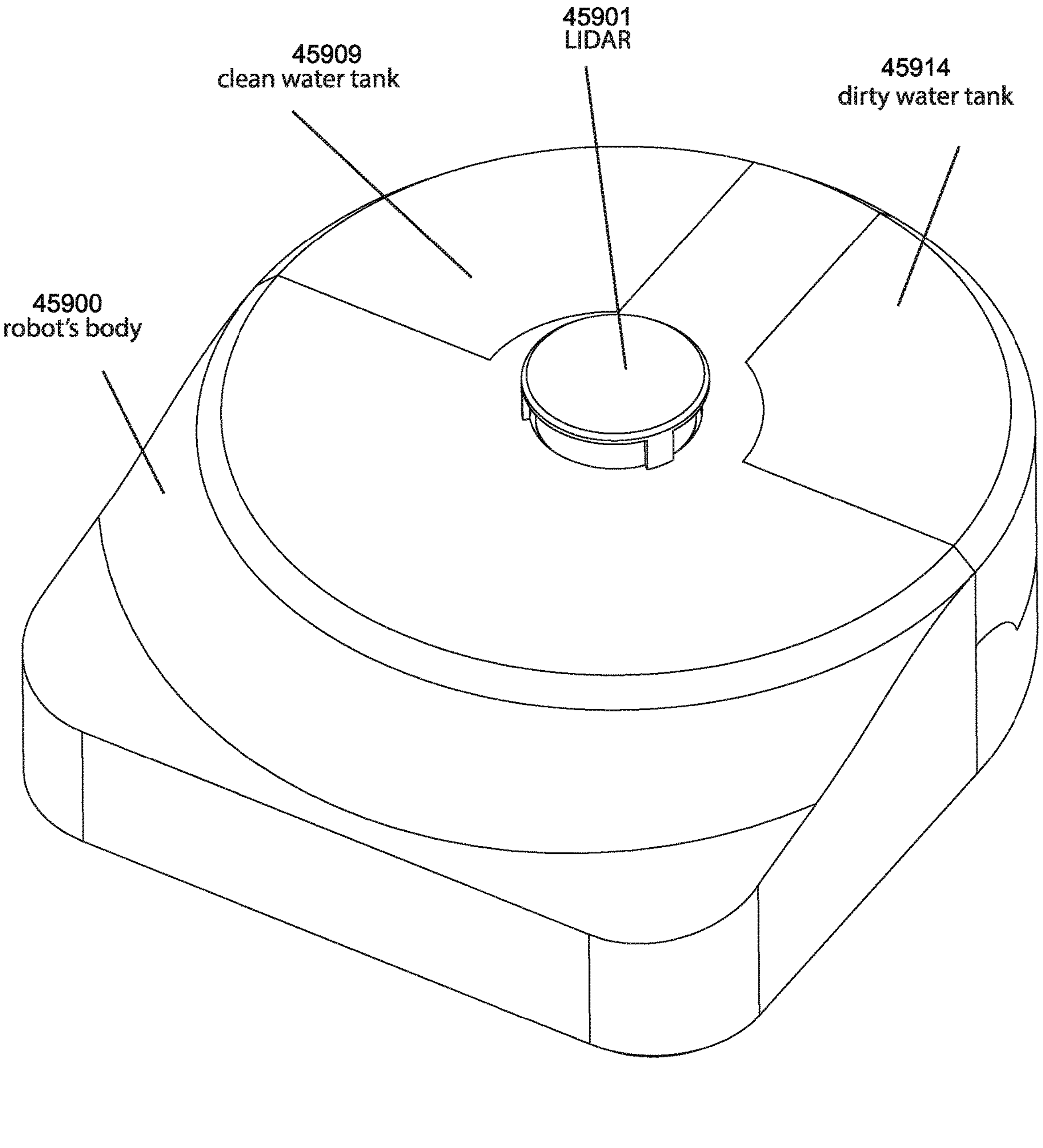
Figure 514B:
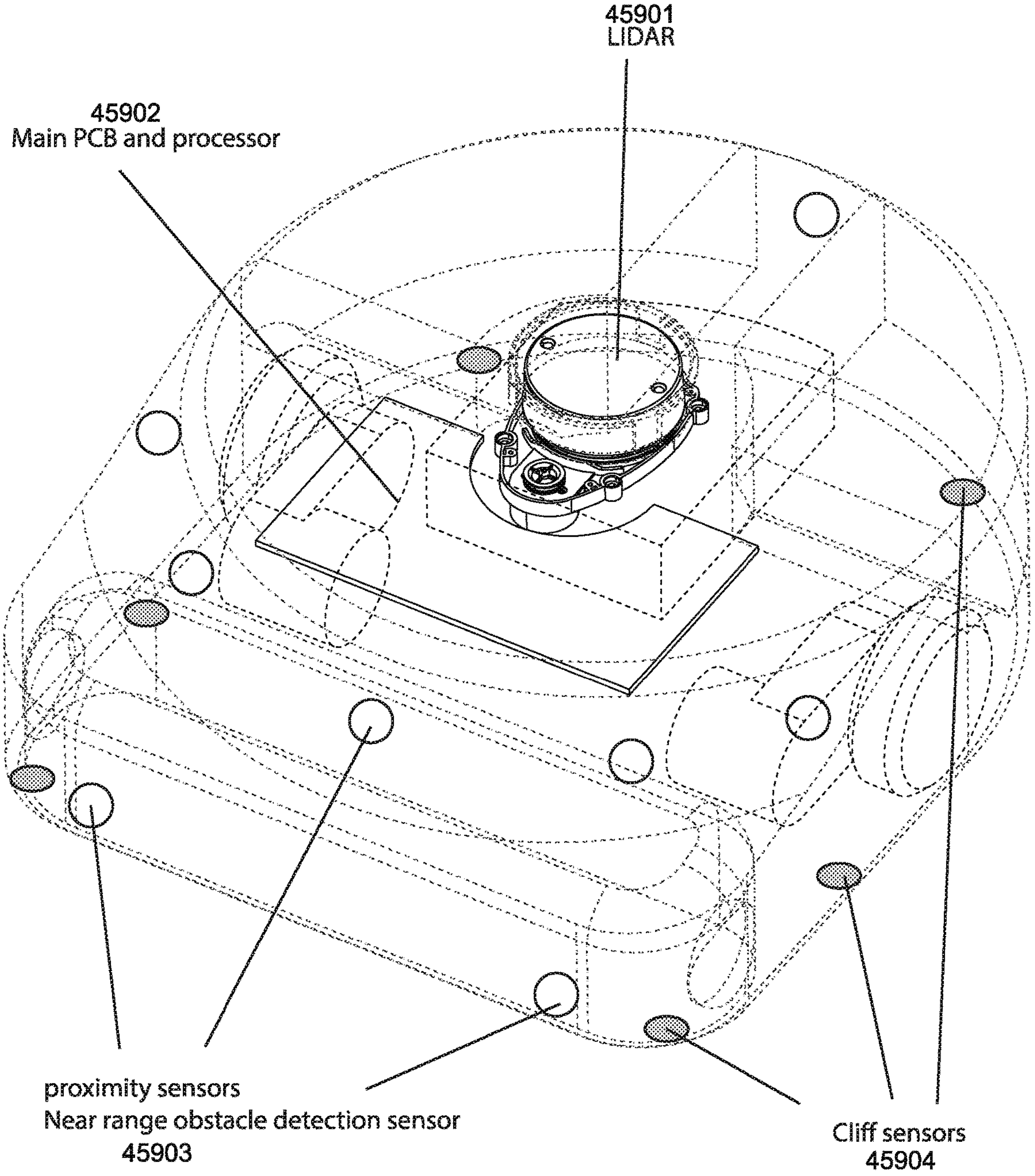
Figure 514C:
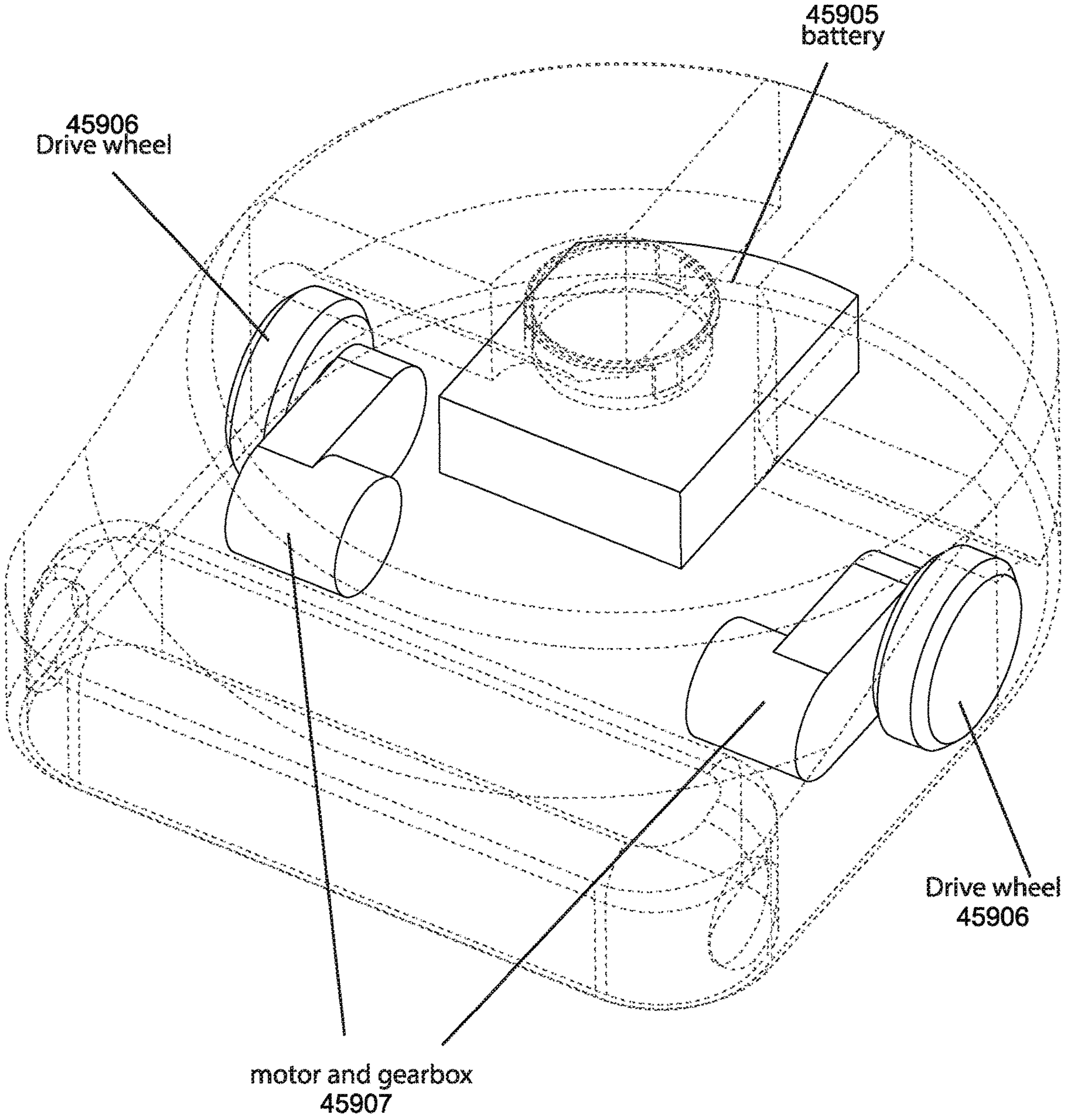
Figure 514D:
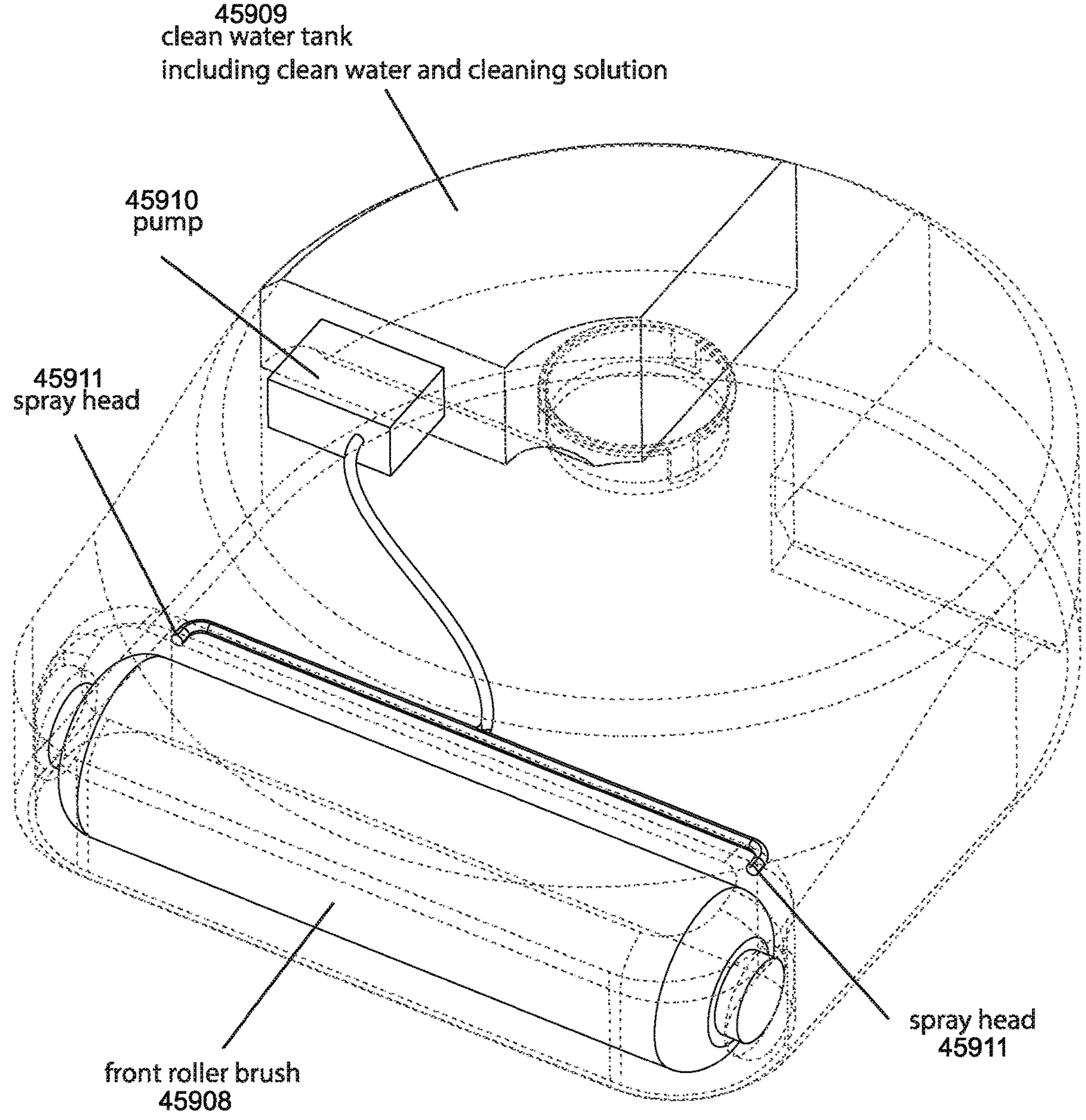
Figure 514E:
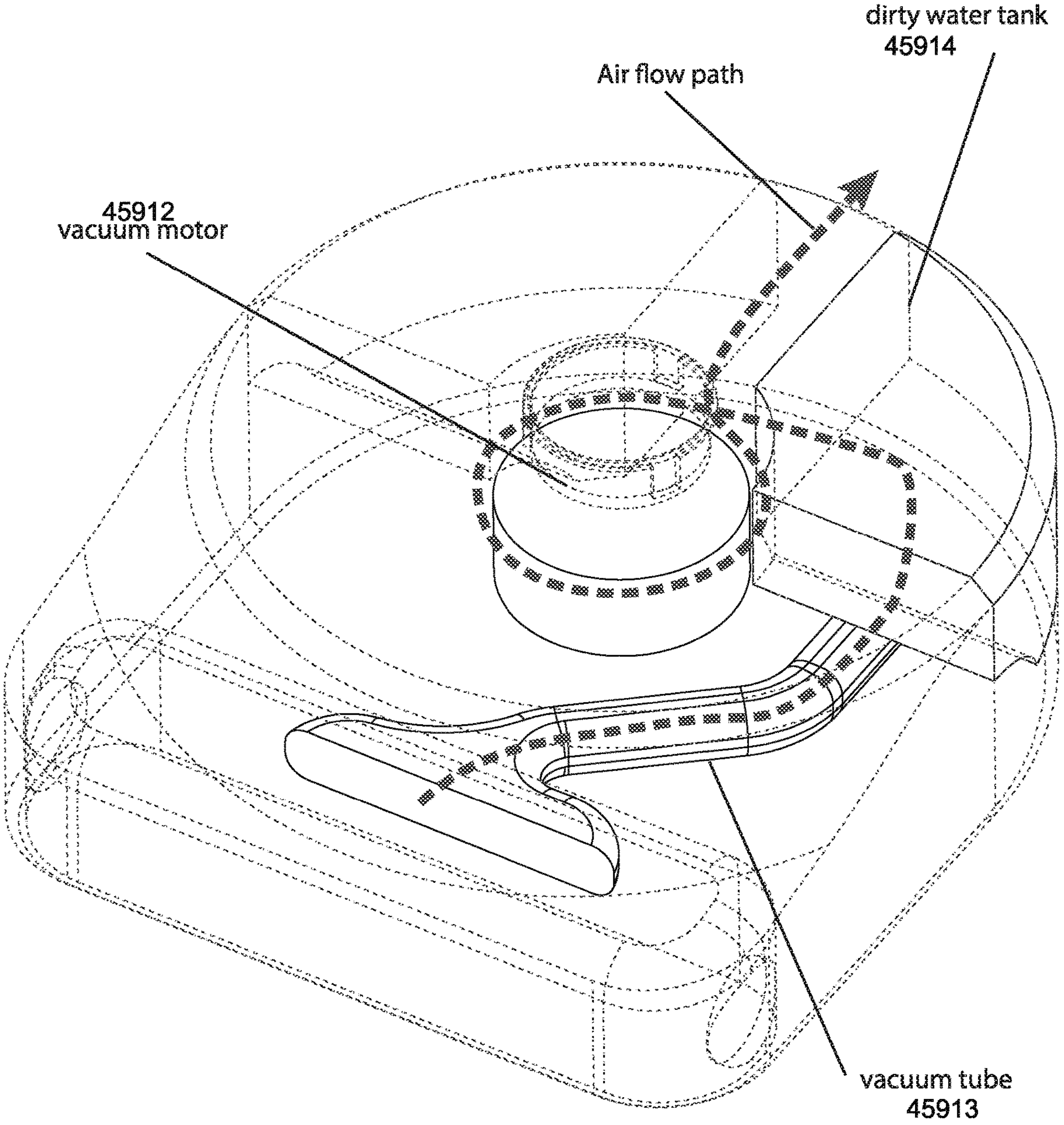
Figure 514F:
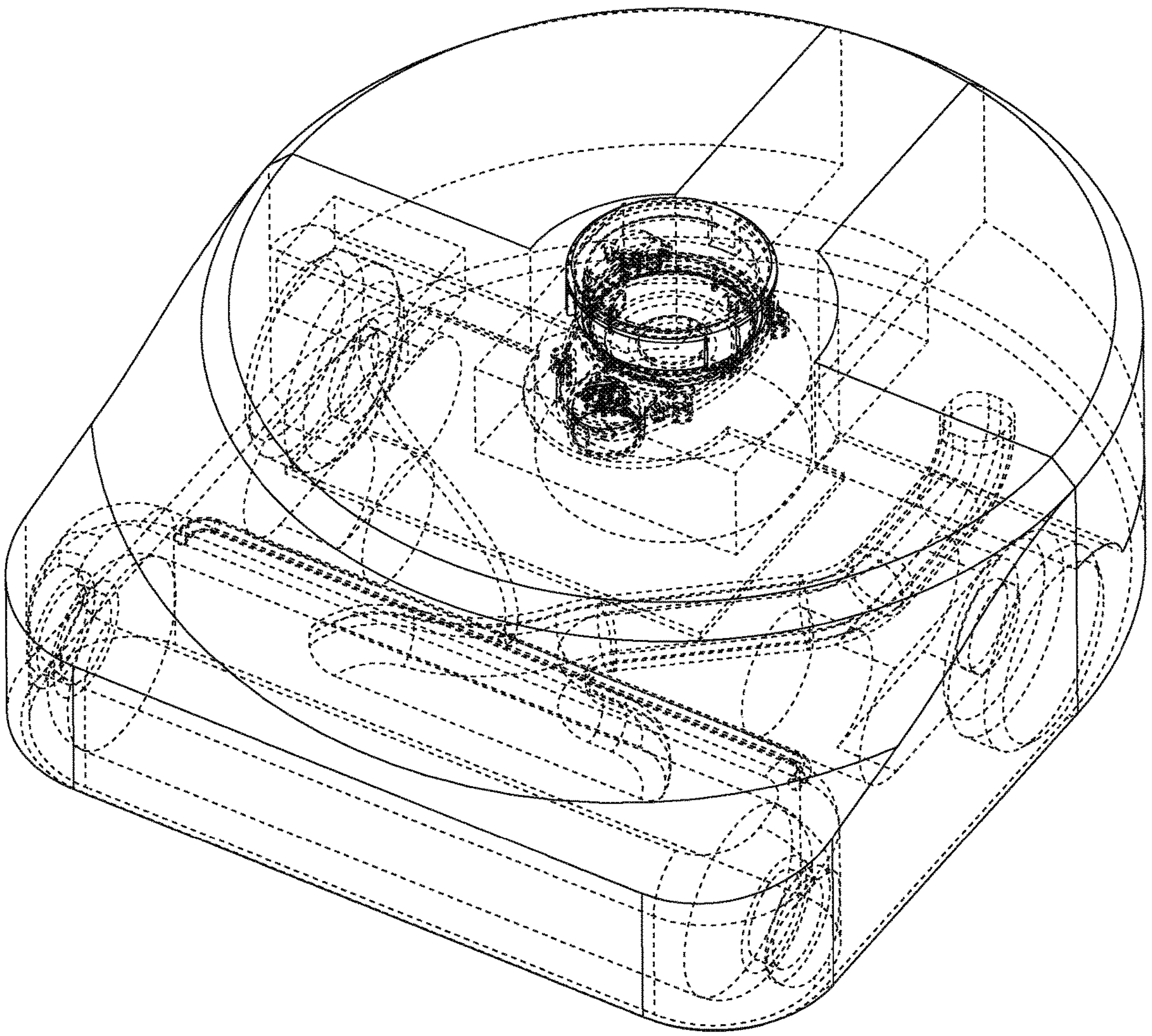

Some embodiments comprise robot including a wet mop and dry vacuum for mopping and vacuuming hard surfaces at a same time. FIGS. 514A-514F illustrate an example of a robot comprising a main body 45900, LIDAR 45901, PCB and processor 45902, proximity sensors 45903, cliff sensors 45904, battery 45905, drive wheels 45906 and their motors and gearboxes 45907, mopping roller brush 45908, clean liquid tank 45909, water spray system including a pump 45910 and spray head 45911, vacuum motor 45912, vacuum tube 45913, and dirty liquid tank 45914. FIG. 514A illustrates an exterior of the robot, FIG. 514B illustrates obstacle detecting components and the PCB and processor, FIG. 514C illustrates the drive wheels, their motors and gearboxes and the battery, FIG. 514D illustrates the clean liquid spraying system, FIG. 514E illustrates the dirty liquid collection system and an air flow path of the vacuum, and FIG. 514F illustrates all subsystems.

Figure 517:
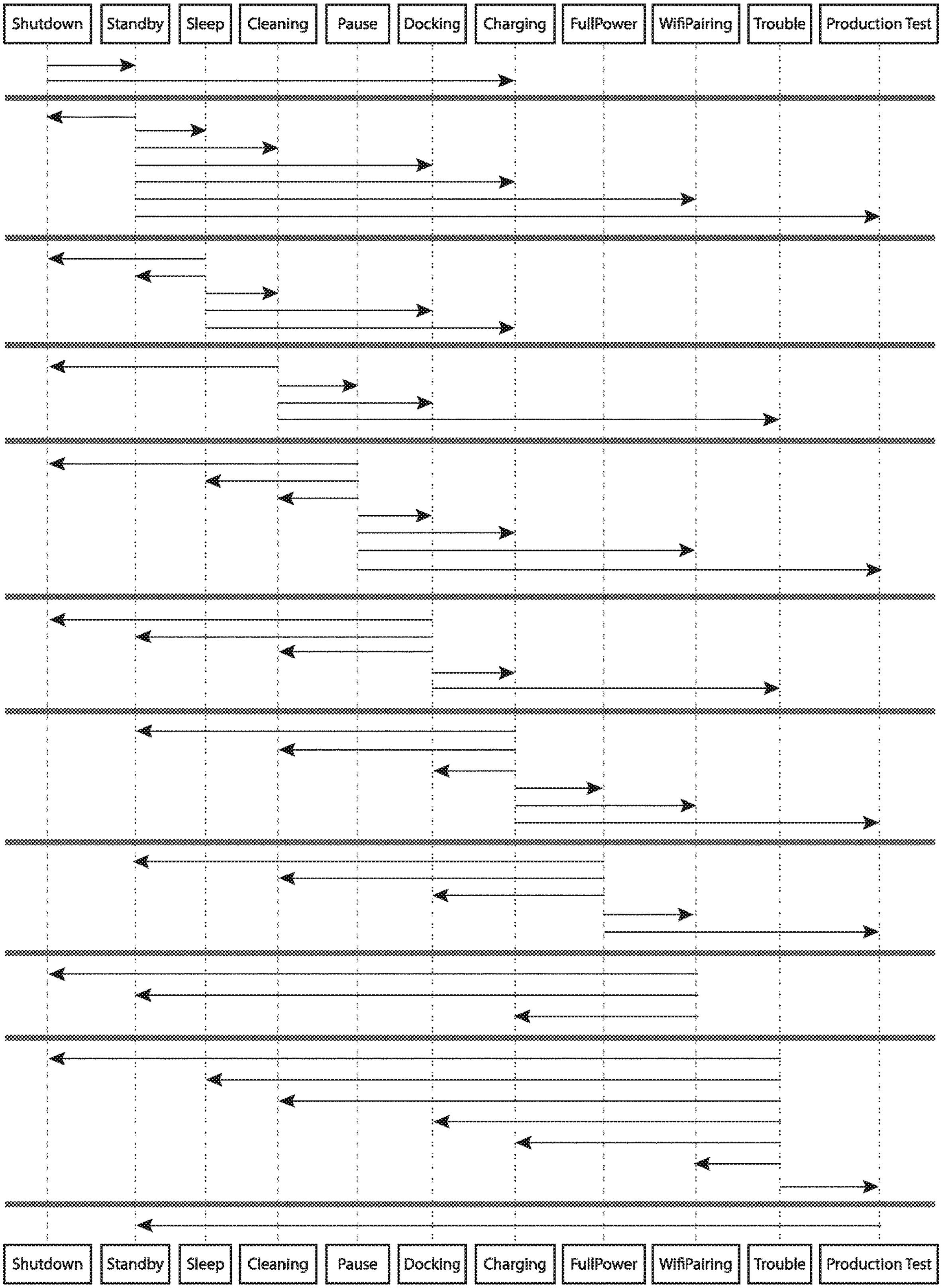

FIG. 515 illustrates an example of a commercial robotic cleaner including a PCB and processor, a front laser and camera, a LIDAR, drive wheels, a battery, a vacuum module (e.g., vacuum impeller and dustbin), an extractor brush for mopping, a squeegee for cleaning fluid left behind from the brush, a clean water tank providing fluid for mopping, and a dirty water tank for storing dirty water collected. FIG. 516 illustrates a similar commercial cleaner as shown in FIG. 515, including an additional LIDAR 51600 housed behind a narrow window 51601. FIG. 517 illustrates a summary of all possible state transitions for a cleaning robot.

Some embodiments include an appliance including a built-in robot vacuum and mop and maintenance station system. The maintenance station is installed within a kitchen, such as alongside, adjacent to (e.g., similar to a dishwasher), or integrated within lower cupboards of the kitchen cabinets. In embodiments, the robot vacuums and mops a floor of an environment of the robot. In embodiments, the robot includes mapping components, a main PCB including CPU and MCU processors and memory, a power supply, obstacle detection sensors, a vacuum system, a mopping module, communication components, and wheel modules. The mapping components may include a LIDAR sensor, cameras, and other sensors. The obstacle detection sensors may include proximity sensors, IR sensors, Time-of-Flight (TOF) sensors, structured light and camera device, and other sensors. The power supply may include a rechargeable battery. The vacuum system may include a main brush module, one or more side brushes, a vacuum motor, a dustbin, and filters. The main brush module may use single or dual brushes fabricated from bristles or rubber. The mopping module may include a water and/or cleaning solution container, a micro pump positioned within the container, a static or dynamic (e.g., spinning, rolling, vibrating, etc.) mopping attachment, and a mopping pad fabricated from a microfiber material or another material. The mopping module may be equipped with a lifting mechanism to lift the mopping pad when the robot approaches and drives on a carpeted area. The communication components may include a Wi-Fi module, a speaker, and a user interface (UI). Each wheel module may include a combination of two drive wheels powered separately and a front caster wheel. Wheels may have encoders to measure their individual speed and robot speed as a unit. The robot may have a separate roller on the back. In some embodiments, the robot includes an RGB camera for capturing and transmitting a viewpoint of the robot to an application of a communication device of a user of the robot. In some embodiments, the robot includes a microphone for receiving voice commands from the user. In some embodiments, the robot operates as a communication device for the user using a combination of a camera, Wi-Fi capabilities, a speaker, and a microphone. In embodiments, a processor of the robot maps and localizes the robot within the environment. In addition to mapping and localization, the processor of the robot executes object recognition, obstacle detection, object avoidance, communication, and other tasks.

In embodiments, the maintenance station built into the cabinets of the kitchen includes at least some of a charging component, guiding sensors, an auto-empty component, a self-refill component, a self-wash and self-clean component, a draining system, sensors, and a UI. The charging component may include charging pads positioned on a back wall portion of the maintenance station. In such a case, charging pads of the robot are positioned on a back portion of the robot. Alternatively, charging pads may be positioned on a front portion of the maintenance station. In such a case, charging pads of the robot are positioned on a bottom surface of a front portion of the robot. In some cases, charging pads may not be positioned on the bottom surface of a rear portion of the robot as the mopping module is positioned in the rear portion of the robot. In some embodiments, the guiding sensors are indicators the robot uses to find the maintenance station. The guiding sensors may include a parallel structured light, a barcode, a QR code, 2D patterns, or 3D structures with unique indentation patterns recognizable by the processor of robot. In some cases, the maintenance station includes a physical guiding mechanism to aid in positioning the robot in an exact desired position (e.g., cavities for the wheels of the robot). Positioning the robot in an exact desired position is especially important for washing and cleaning related mechanism. In another case, rollers may guide and course correct the robot as the robot docks at the maintenance station.

In embodiments, the auto-empty component empties the dustbin of the robot into a large dust container each time the robot returns to the maintenance station. The auto-empty component may include the large dust container, a vacuum motor to suction debris from the dustbin of the robot into the large dust container, an intake tube connecting the dustbin of the robot to the large dust container, and a filter. The large dust container may include a bag positioned within the container for collecting the dust and debris or may be used without a bag. In some embodiments, the large dust container is a part of a kitchen trash bin. Keeping a bag of the large container separate from the kitchen trash bin may be beneficial as a time period for the bag of the large dust container to get full is longer and the bag protects against spreading of allergens. The intake tube may connect to the dustbin directly, through the body of the robot, or through the main brush opening. In cases wherein the environment of the robot (e.g., a house, a condo, an apartment, etc.) is equipped with a central vacuum system, the auto-empty mechanism may empty the dustbin of the robot directly into the central vacuum system instead of the large dust container or bag of the maintenance station.

In embodiments, the self-refill component refills the container of the mopping module with water and/or cleaning solution. The self-refill component may include a water intake line for delivering water from a plumbing system of the environment directly to the container of the mopping module, a shut off valve for shutting off access to water from the plumbing system of the environment, and an intake valve and screen to control the flow of water from the plumbing system. In some embodiments, an intermediary reservoir is positioned between the mopping module and water intake line. The self-wash and self-clean component may include a water intake line (a different or same water intake line as the self-refill component) for directing water and/or cleaning solution to a mopping pad and a cleaning mechanism. The cleaning mechanism may include a brush in contact with the mopping pad and/or a squeegee for removing water buildup on the mopping pad into the draining system. The brush may have move locally, such as in a rotating motion or reciprocating motion, from one side of the mopping pad to other side of the mopping pad one or several times to clean the mopping pad. In some cases, spinning mop pads may be employed and a spinning motion of the spinning mopping pads may be used for cleaning the pads themselves, wherein the pads are spun on a stationary brush and squeegee disposed on the maintenance station. Stationary components are beneficial as they reduce an overall number of moving parts that are prone to mechanical failure. The draining system may include a drain hose, a filter, and a vacuum motor to suction water into the drain hose. The drain hose may be directly connected to a water waste system of the environment (similar to a dishwasher), wherein an air gap device is required prior to connection to the water waste system. In some embodiments, the drained dirty water is collected in a separate container that is emptied manually. In some embodiments, the vacuum motor of the robot is used in reverse in combination with a small heating element to dry the mopping pads using hot air flow after draining the dirty water and/or cleaning solution from the mopping pads. In some embodiments, a washing and draining area of the maintenance station is equipped with a removable tray that is manually cleaned periodically.

In some embodiments, sensors of the maintenance station recognize and guide the robot to the maintenance station for recharging, sensing whether containers need refilling or emptying, recognizing whether filters need to be cleaned, etc. In embodiments, the user interface of the maintenance station displays indicators including charging, fully charged, emptying the dustbin, dustbin emptied, cleaning, mopping pad cleaned, refilling the container (of the mopping module), container (of the mopping module) refilled, and clean the filters. In the case of the built-in maintenance station, it is important the indicators are visible on the maintenance station despite the robot also displaying the indicators, as in some instances the robot is positioned on the maintenance station beneath cupboards and indicators on the robot cannot be seen (e.g., when charging or emptying the dustbin). In some embodiments, the indicators are displayed by the application of the communication device. For at least some of the indicators the application alarms the user by sending notifications to the communication device. In some embodiments, the maintenance station includes a storage space for storing robot accessories and spare parts (e.g., extra brushes, mopping pads, cleaning tools, etc.). The storage space may be a separate compartment or part of the cabinets with a separate access point.

In some embodiments, there more than one robotic device is part of the built-in robot and maintenance station system. For example, the mopping robot and the vacuum robot may be separate robotic devices such that they may each perform more specialized tasks in different frequencies. The mopping robot may include different modes, such as dry mop, wet mop, and steam mop modes while the vacuuming robot may perform wet vacuuming (i.e., vacuuming liquids) and dry vacuuming. In some embodiments, the mopping robot and vacuum robot work and communicate with one another to clean the environment. For instance, the vacuum robot may wet vacuum an area in which a liquid spill occurred, after which the vacuum robot may inform the mopping robot of the spillage and the mopping robot may steam mop the area in which the liquid spill occurred. In cases wherein the mopping robot is configured to perform steam mopping, the mopping robot comprises a water tank as well. During operation, the water within the water tank of the mopping robot is heated to a temperature of approximately 120 degrees Celsius then is passed to microfiber mopping pads through one or more steam jets, moistening the pads and the floor. In some embodiments, a carpet cleaning robot is part of the built-in robot and maintenance station system. Unlike the mopping robot, the carpet cleaning robot targets carpeted areas and uses a mix of shampoo and water or steam to clean the carpeted areas. After washing the carpeted areas, the carpet cleaning robot vacuums the washed areas to remove liquid and dry the carpeted areas. In some embodiments, the carpet cleaning robot has a deep clean and/or a spot clean mode to target stains on a particular spot on the carpet. The carpet cleaning robot may clean carpeted areas using several passes and a higher vacuum power to fully extract the liquids from the washed carpeted areas. In some embodiments, the carpet cleaning robot has a thorough clean mode, wherein cleaning (i.e., washing and vacuuming) is performed in a single continuous pass. In some embodiments, the mopping robot and the carpet cleaning robot may be combined into a single robotic device.

In addition to the application paired with one or more robots, the built-in robot and maintenance station system may include a control panel for setting operational schedules of the robots, accessing information relating to the robots, and controlling the robots manually. The control panel may be attached to one of the cabinets surrounding the maintenance station or may be integrated into a smart home control panel.

Using the application or the control panel, the user may access information such as statistics relating to past operational sessions. Examples of statistics relating to a past operational session include a time a robot deployed from the maintenance station, a duration of the operational session, areas covered (e.g., provided numerically and/or displayed as highlighted areas within the map), a number of cycles (i.e., a number of returns to the maintenance station during one run), etc. Additional examples of information that may be accessed using the application or the control panel include a number of times a dust bin of the robot has auto emptied since a last time a dust bin of the maintenance station was emptied, an indication of an amount of space or volume used or remaining in the dust bin of the maintenance station, an indication that the washing area of the maintenance station needs cleaning, an indication that the filters of the maintenance station need cleaning, an indication that the filters of the robot need cleaning, a status of a dirty water tank of the robot (e.g., an indication of an amount of space or volume used or remaining or an indication that the tank needs to be emptied), a status of a clean water tank of the robot (e.g., an indication of an amount of clean water used or remaining or an indication that the tank needs to be refilled), etc.

In some embodiments, the user accesses, modifies, and/or adds operational scheduling information of the robot using the application or the control panel. The user may access scheduling options to choose days of the week to operate the robot, time of the day to operate the robot for each selected operational day, areas within which the robot is to operate for each selected day and an order of cleaning the selected areas, etc. The user may specify the areas within which the robot is to operate and their cleaning order or the robot may prioritize cleaning of areas and the order in which areas are cleaning automatically based on the labels associated with areas of the environment. For example, the robot may begin with cleaning areas labelled as bedrooms and living rooms, wherein floors are typically cleaner, using freshly cleaned mopping pads and with an empty dustbin. The robot may then finish with cleaning areas labelled as kitchen and bathrooms, which typically require deeper and more frequent cleaning, before going back to the washing area of the maintenance station to clean the mopping pads. The user may choose for the robot to return to the maintenance station between cleaning of certain areas using the application or the control panel. This ensures the robot is cleaning using new or cleaned mopping pads before cleaning certain areas.

In some embodiments, the control panel is equipped with a direct voice assistant such the user may audibly call the robot to action. In some embodiments, the built-in robot and maintenance station is connected to the smart home system and is audibly called to action using a voice assistant (e.g., Google Home or Amazon Alexa) of the smart home system. The direct voice assist may be triggered by voice prompt such as "hey robot" (or a name of the robot set using the application or control panel), followed by commands such as "start cleaning", "mop the kitchen" (i.e., the area labelled as kitchen within the map), "vacuum the living room", "clean the bedroom", "go back to the maintenance station", etc. When a smart home assistant of another system is used to audibly call the robot to action the user first wakes the smart home assistant prior to commanding the robot to perform a task. For example, the use may wake a smart home assistant of another system and command the robot using a voice prompt such as "hey Google, ask the robot to clean the bedroom" or "Alexa, tell the robot to clean the bathroom".

In some embodiments, rather than using one maintenance station configured to automatically empty the dustbin of the robot, a central vacuum system is used. A central vacuum system is especially useful for multistory buildings, wherein specific inlets may be placed on each floor for emptying the dustbins of one or more robots on each floor. Each inlet may be connected to a network of pipes connected to a strong vacuum motor disposed within a utility room or another area of the environment. The vacuum motor creates suction to suck dust and debris from the dustbin of the robot into a large dustbin container via the network of pipes. After a run and/or when the dustbin of the robot is full, the robot autonomously connects an outlet of the dustbin to a nearest inlet. The central vacuum motor sucks the dust and debris from the dustbin of the robot. The vacuum motor of the central vacuum system may continuously run or may detect when a robot is connected to one of the inlets, upon which the vacuum motor is triggered to run until the robot is disconnected from the inlet. A maintenance station for recharging, washing mopping pads, refilling a clean water container, etc. may be present elsewhere within the environment. In some embodiments, the auto empty inlet may be combined with charging pads as well so the robot can stay there after emptying the dustbin to recharge. In some embodiments, the maintenance station is connected to the central vacuum system, wherein the dust and debris is sucked into the large dustbin container of the central vacuum system.

Figure 518:
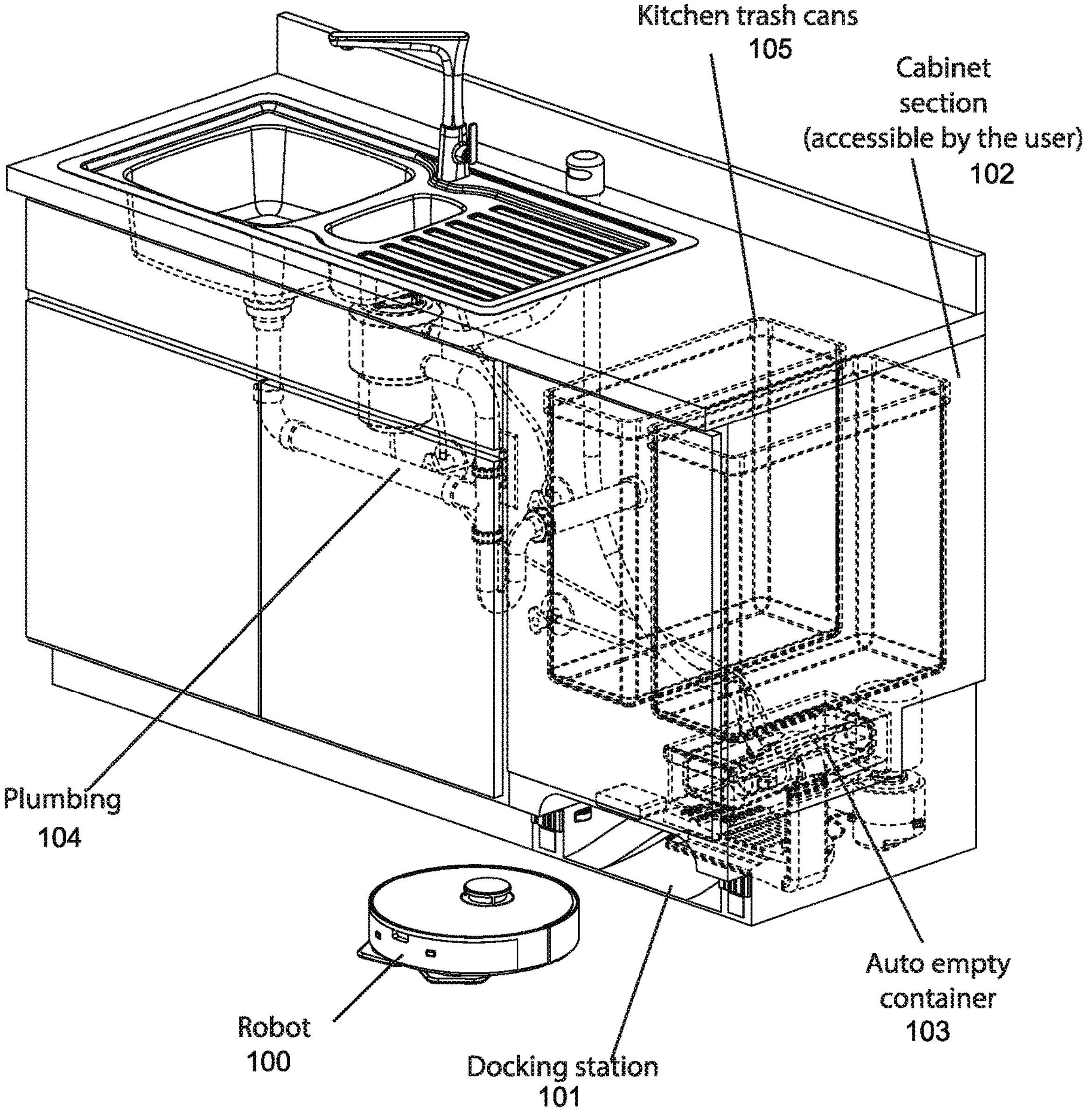
Figure 519A:
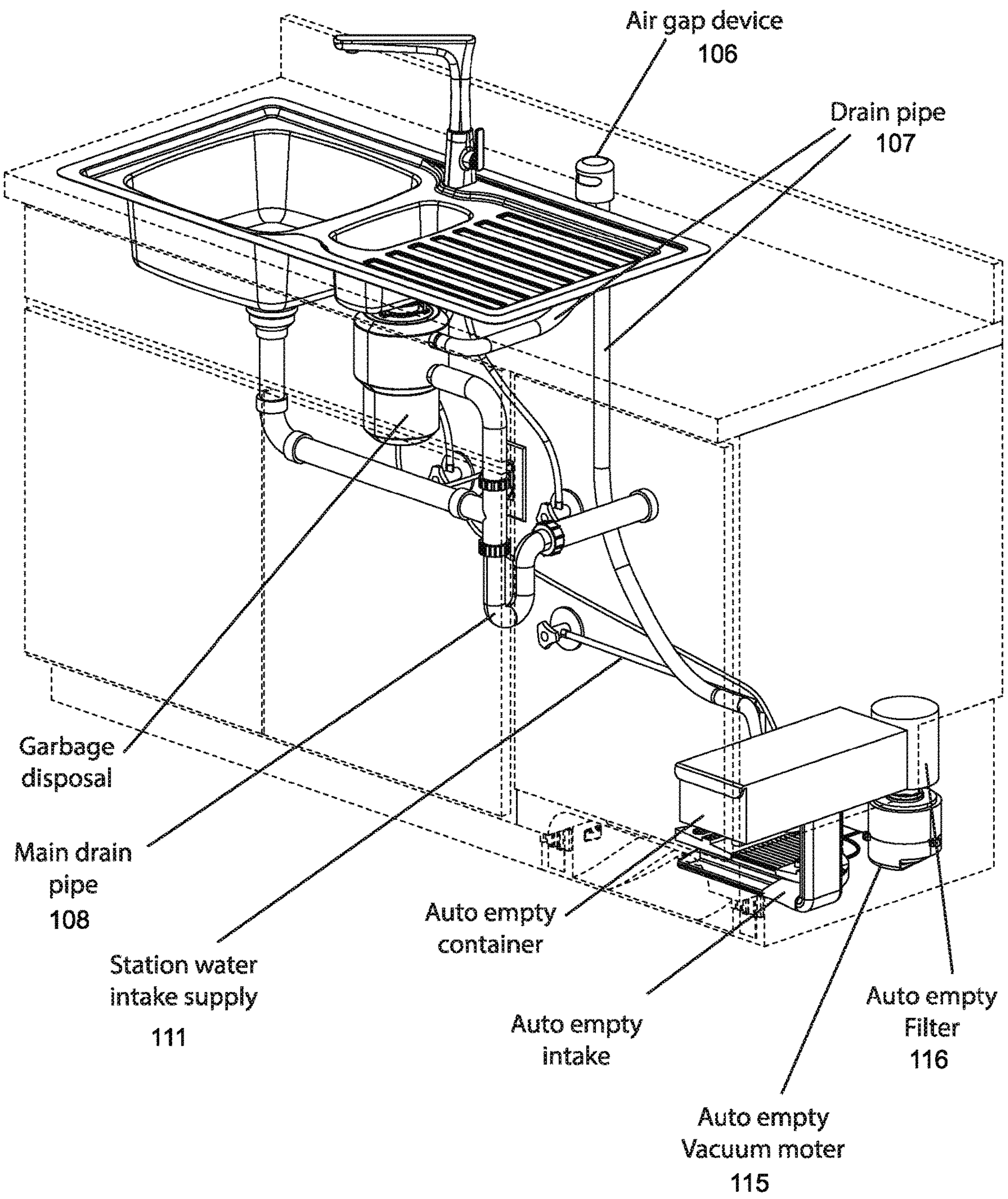
Figure 519B:
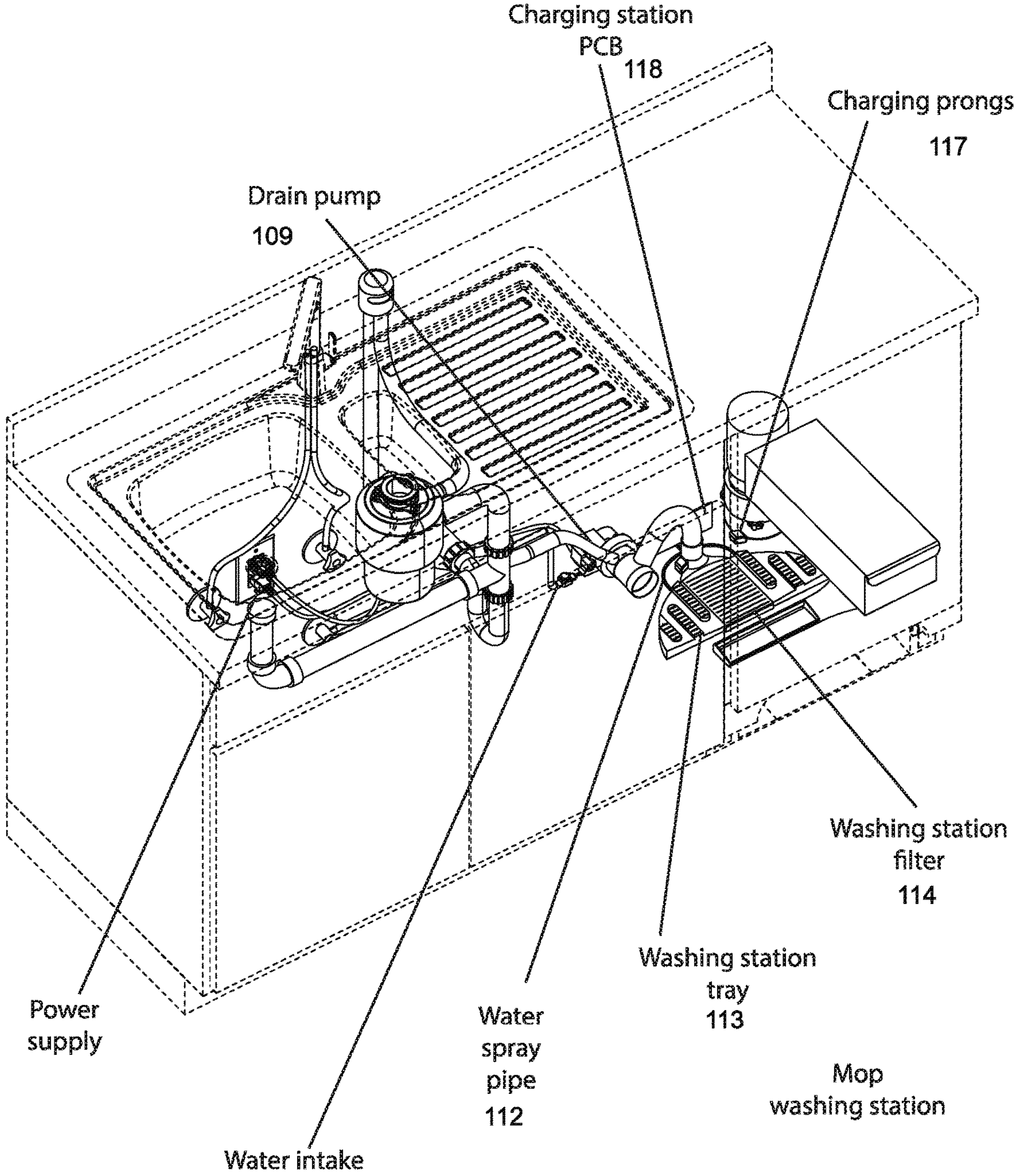
Figure 520:
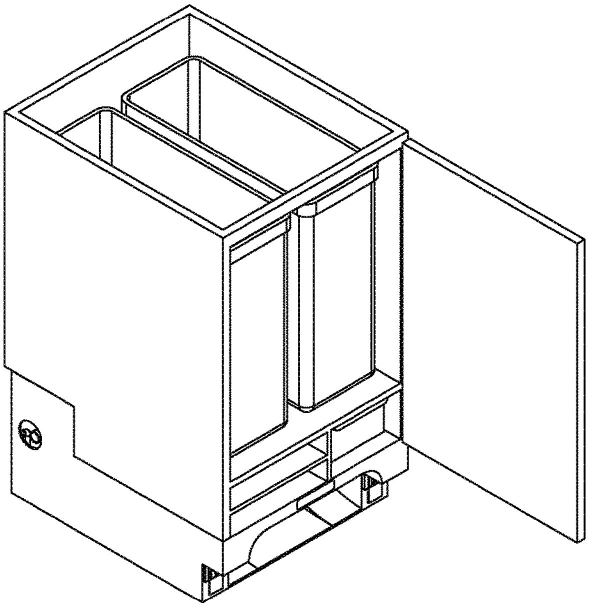
Figure 521:
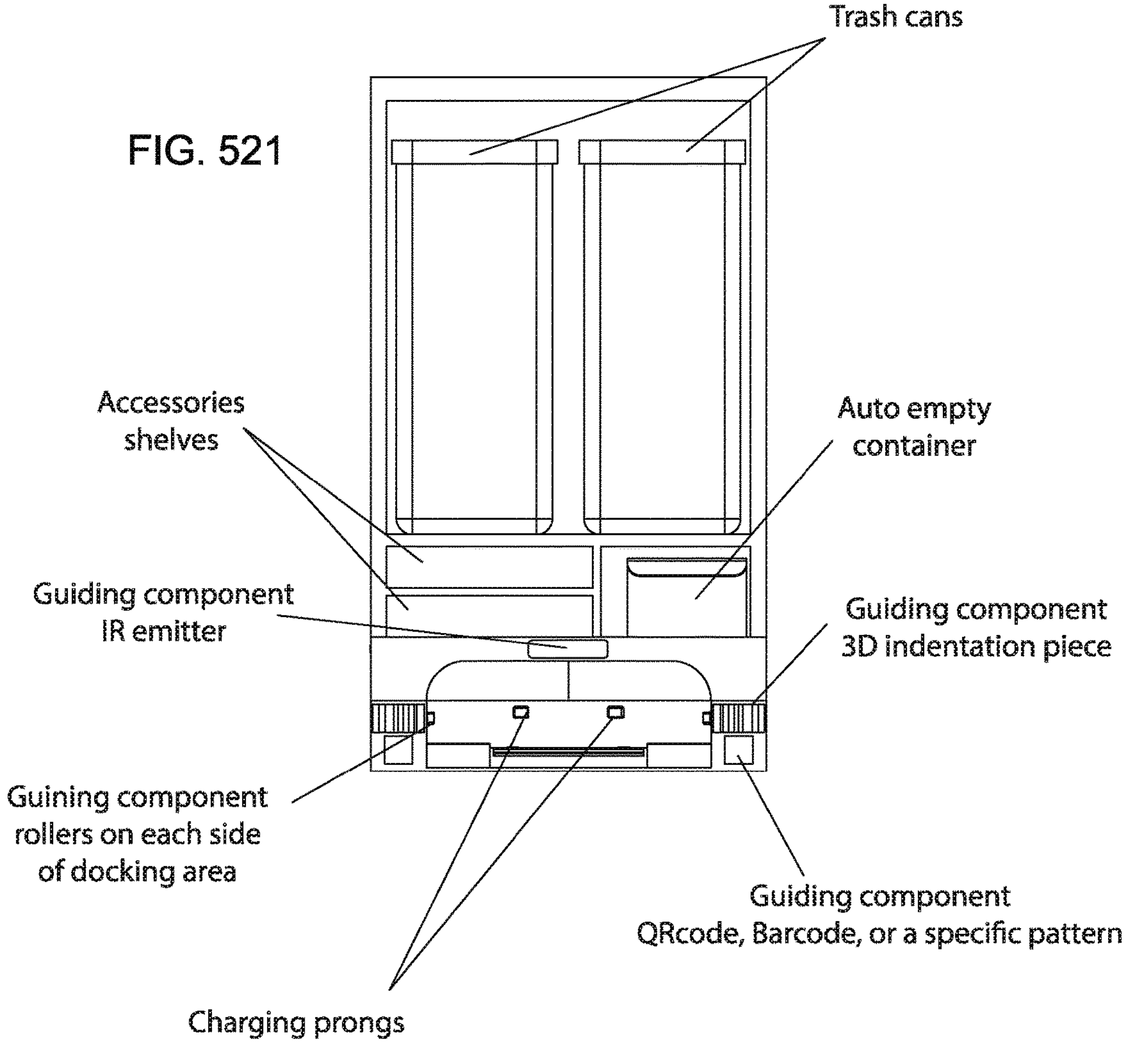

FIG. 518 illustrates an example of a built-in robotic vacuum system including a robot 100 and a corresponding docking station 101. The docking station 101 is built into the cabinet 102 and includes a mechanism for automatically emptying a dustbin of the robot 100 into a container 103 of the docking station 101. The docking station 101 also includes a washing station for washing a mopping pad of the robot 100. The washing station is directly connected to plumbing 104 for direct access to water. The docking station 101 also includes a mechanism for emptying dirty drained from washing the mopping pad directly into a drain pipe of the kitchen. The mechanism for emptying the dustbin of the robot 100 may be directly connected to the kitchen trashcans 105 such that contents from the container 103 of the docking station 101 may be emptied into the trashcans 105. FIGS. 519A and 519B illustrate connections between components of the mop washing station of the docking station 101 and the plumbing system of the kitchen. An air gap device 106 is connected to drain pipes 107. The drain pipes 107 drain dirty water removed during washing of the mopping pad directly into the main drain pipe 108 of the kitchen by suction of the dirty water using a drain pump 109. A main water supply 110 is connected to water intake 111 which deliver water to a water spray pipe 112 for cleaning the mopping pad. The mop washing station includes a washing station tray 113 and a washing station filter 114. The mechanism for emptying the dustbin includes a vacuum motor 115 for creating suction and a filter 116. The docking station 101 also includes charging prongs 117 for charging the robot 100 and a docking station PCB 118. The docking station 101 operates using power supply 119. FIGS. 520 and 521 illustrate a cabinet section 120 within which the docking station 101 is built. An inside of the cabinet section 120 is accessible using a front door 121 behind which trashcans 105, the docking station container 103, and robot accessories 122 are stored. In some embodiments, the cabinet section 120 may be a drawer, translating in an outwards direction when the door 121 is opened. FIG. 521 further illustrates guiding components for guiding the robot 100 to and aligning the robot 100 with the docking station 101. Guiding components includes an IR emitter 123, a structure 124 with a unique surface indentation pattern recognizable by the robot 100, a QR code or barcode 125, and physical guiding rollers 126. The use of such guiding components is described in detail above. In different embodiments, one or more of the guiding components are used.

Figure 522:
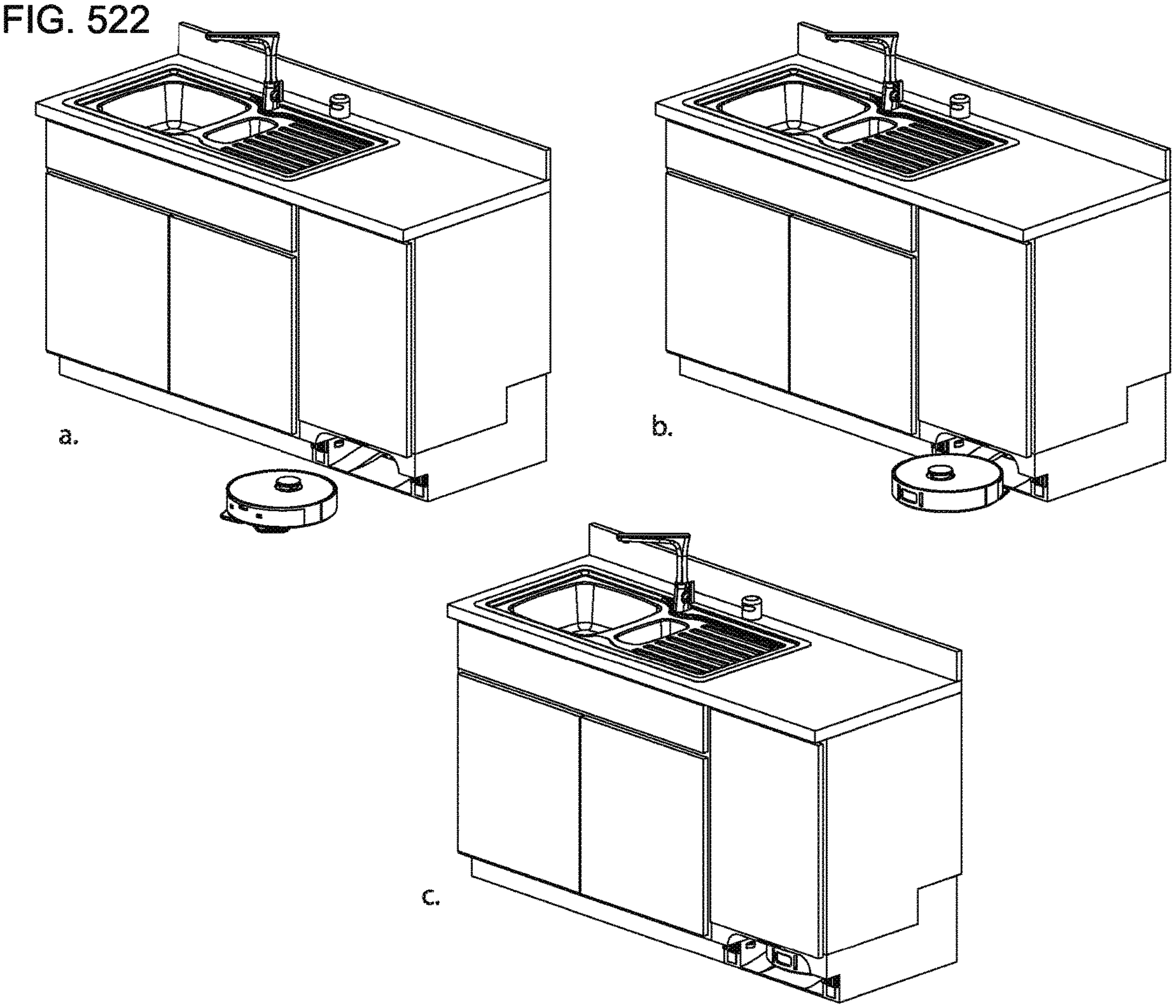
Figure 523:
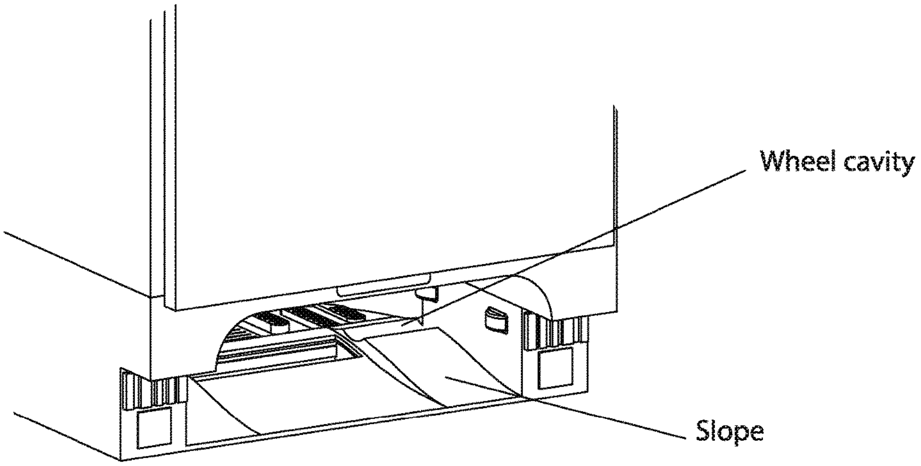

FIG. 522 illustrates the robot 100 approaching the docking station 101 and docking. The robot 100 approaches the docking station 101 forward facing as the majority of object and obstacle detection sensors are positioned in a front portion of the robot 100 (*a*). Once the robot 100 aligns with the dock 101 using the guiding components 122-125, the robot 100 rotates 180 degrees in place (b). The robot 100 then docks by driving in a backwards direction into the docking station 101 (*c*) such that the mopping module is positioned over the washing station of the dock 101 and charging prongs of the robot and charging prongs 117 of the dock 101 are aligned. FIG. 523 illustrates upward slopes 126 disposed on a front portion of the docking station 101 for elevating the robot 100 above the washing station. Wheel cavities 127 positioned each wheel of the robot 100 in the desired location.

Figure 524:
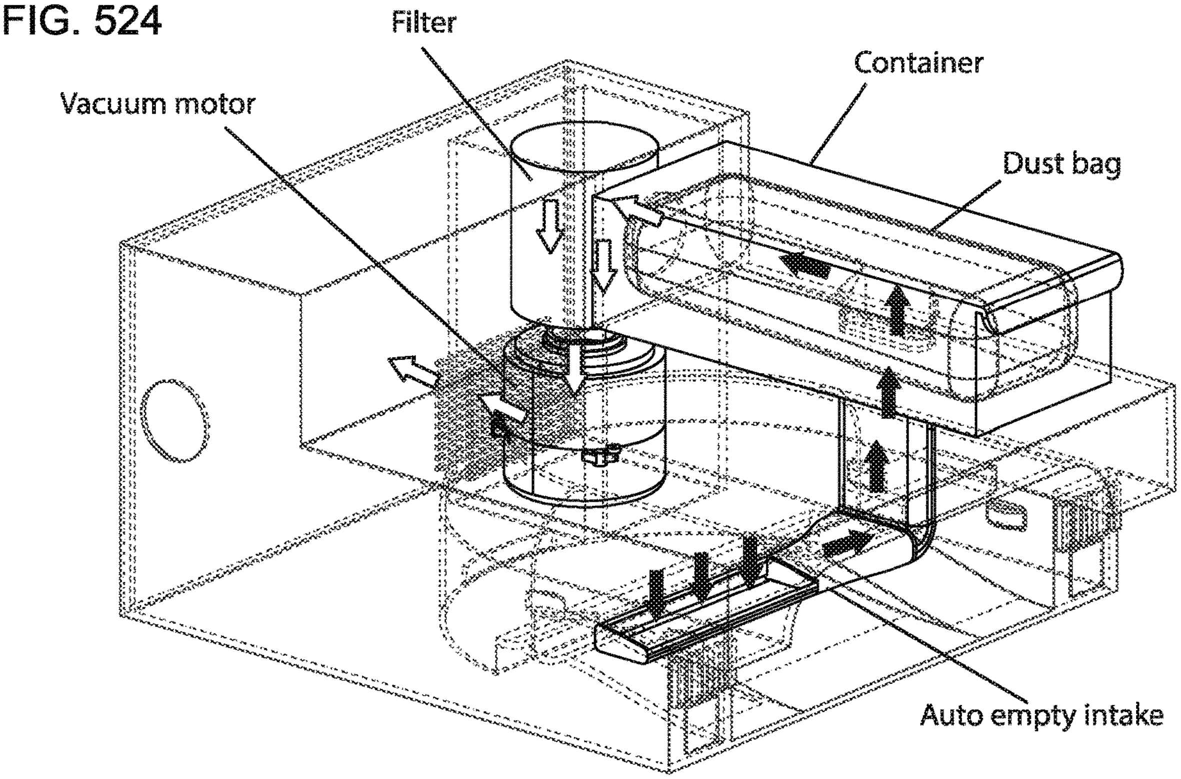
Figure 525:
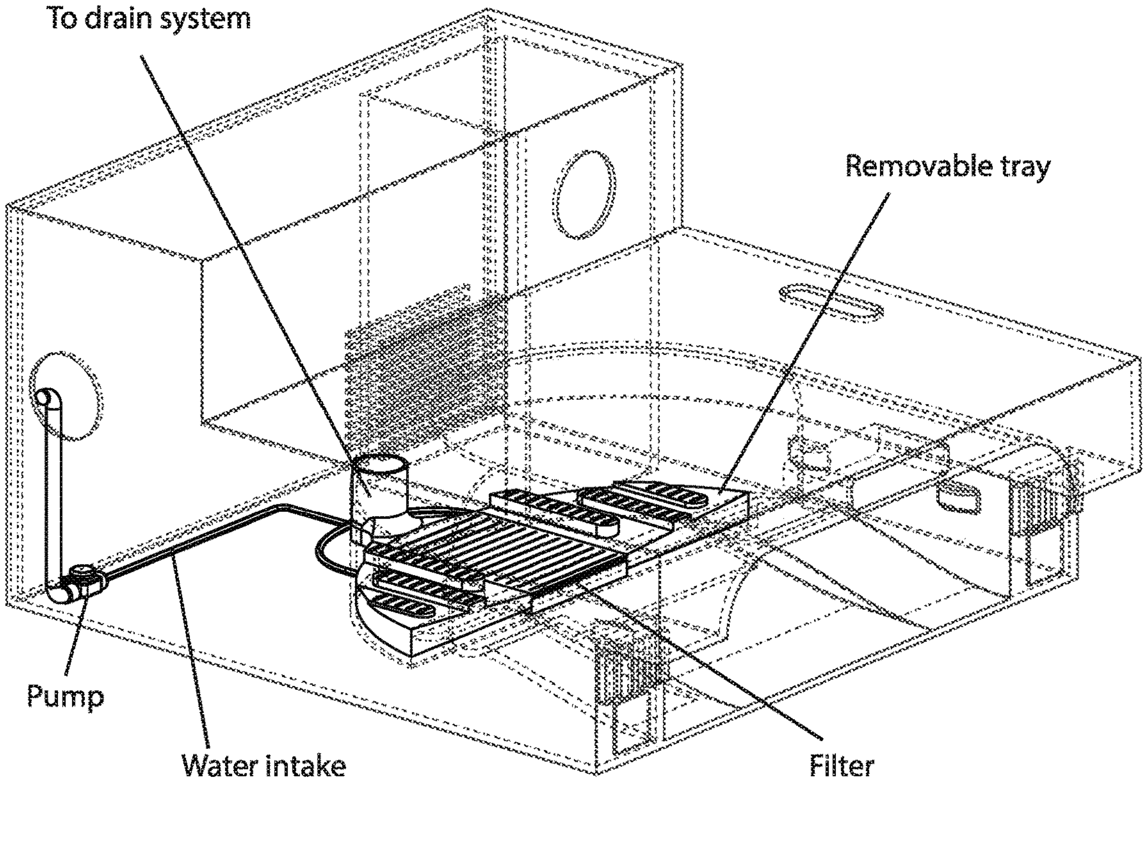
Figure 526:
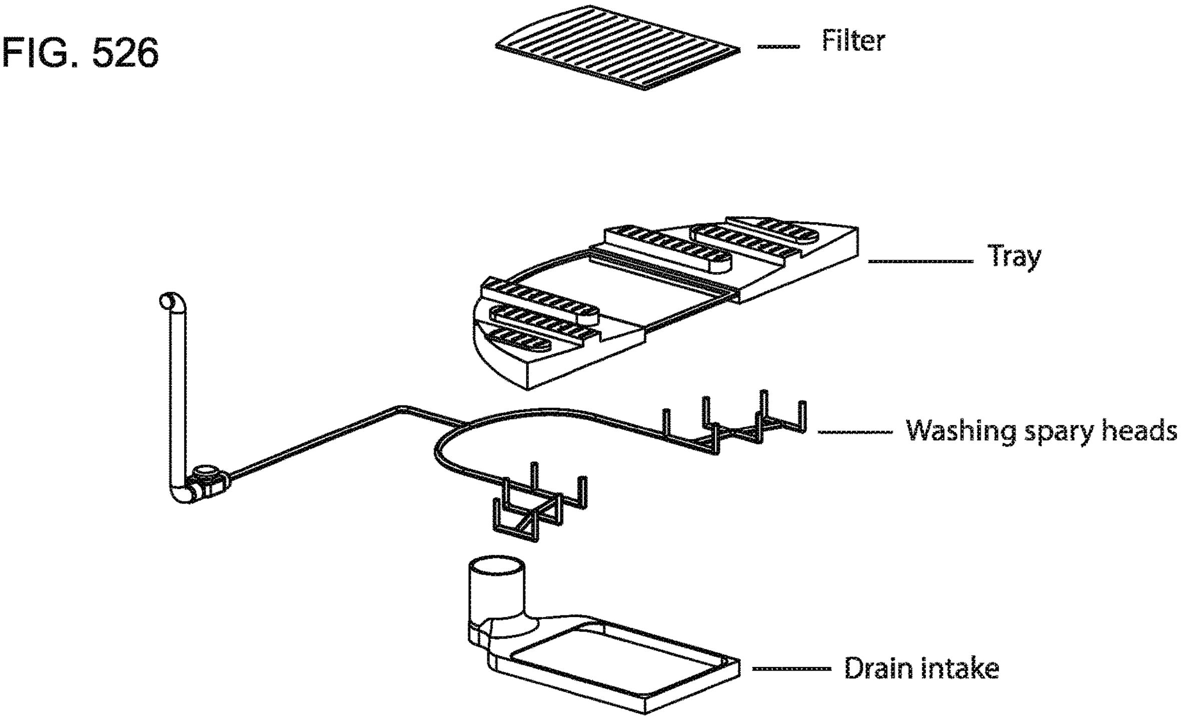
Figure 527:
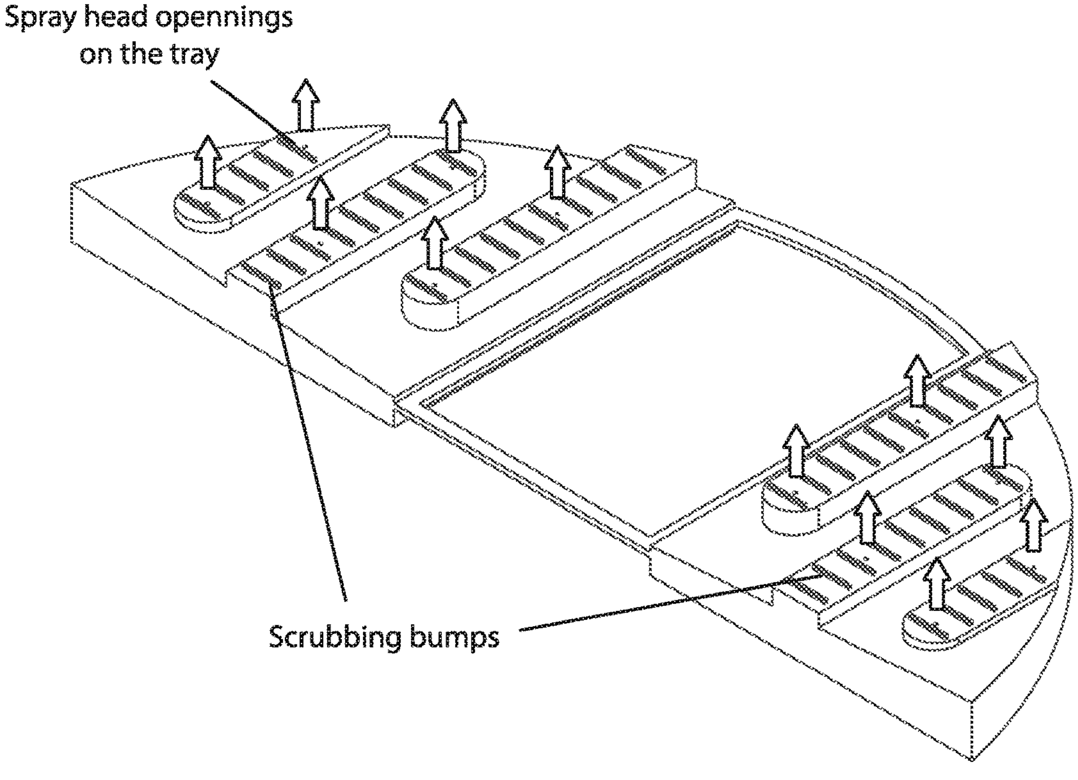
Figure 528:
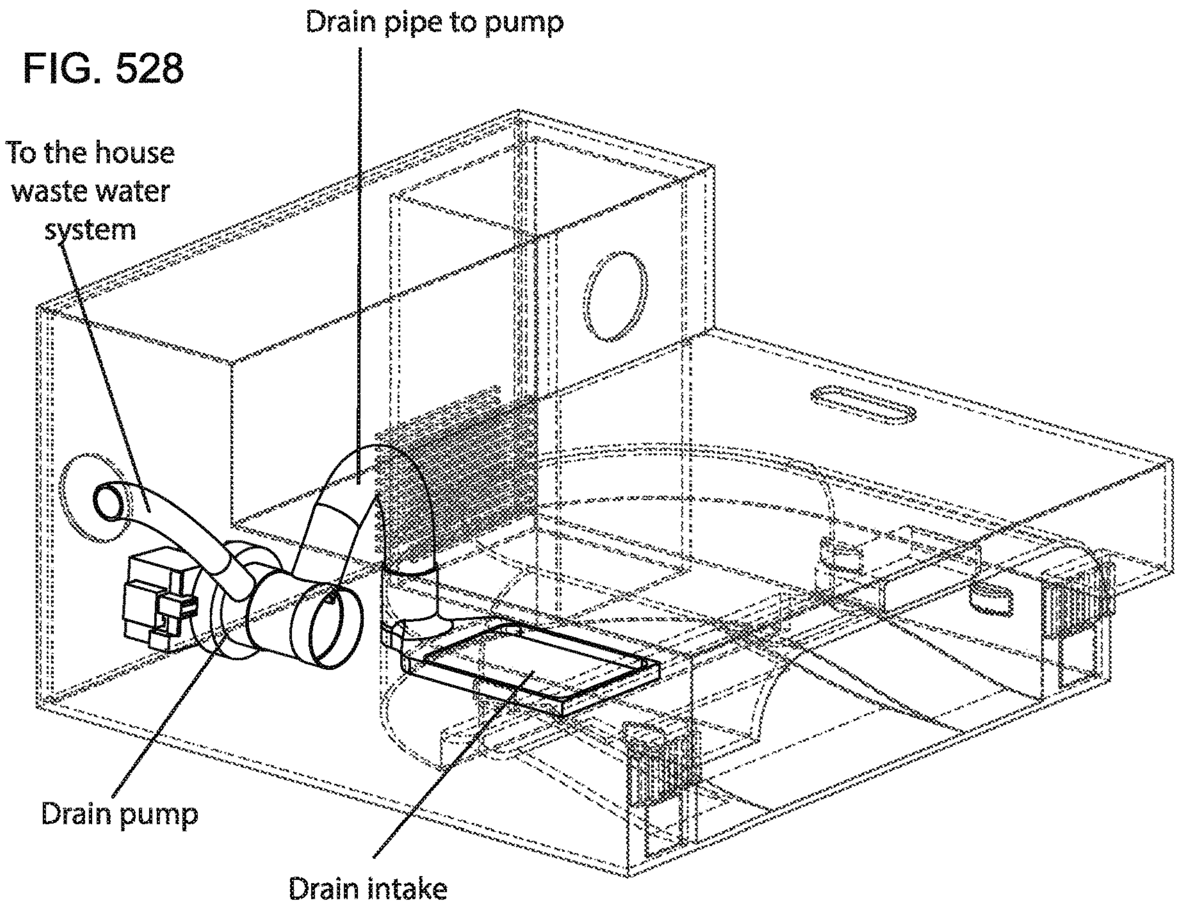
Figure 529:
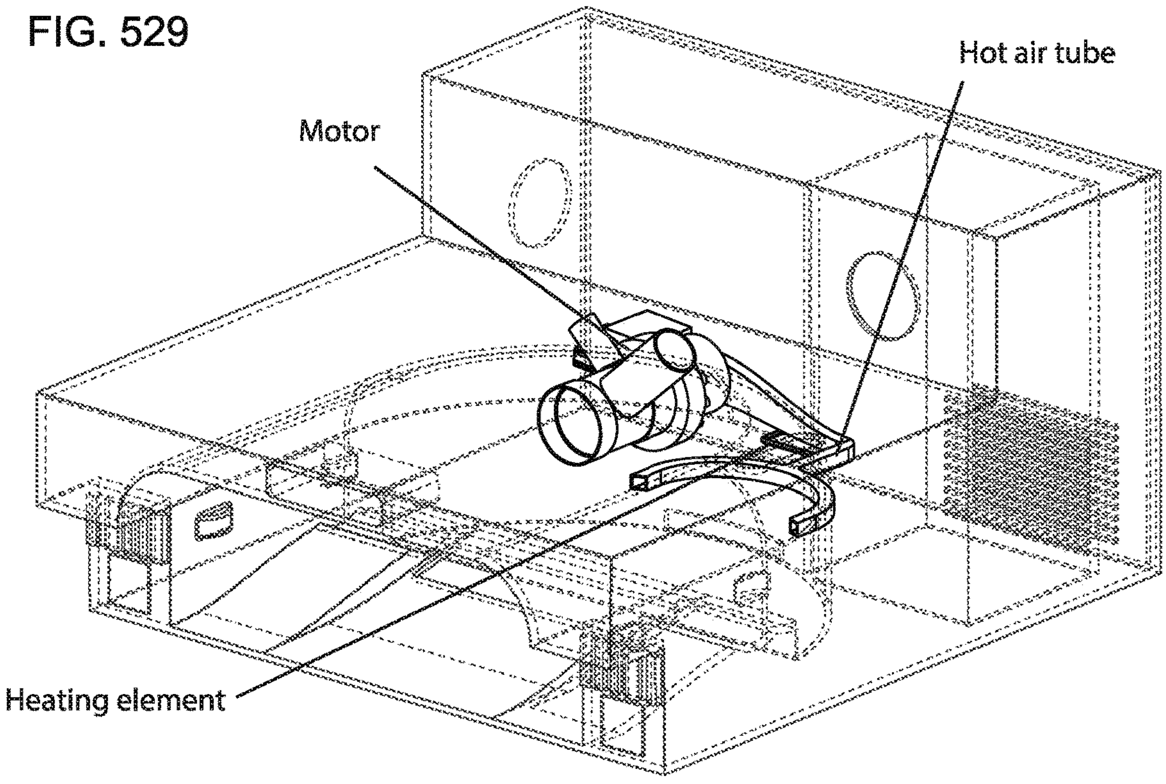

FIG. 524 illustrates the mechanism for automatically emptying the dustbin of the robot 100 including vacuum motor 115, filter 116, and the container 103. In this embodiment, a disposable dust bag 128 is placed within the container 103, however, in some embodiments dust and debris may be collected directly within the container 103. In some embodiments, the dust bag 128 may be reusable. A path of air flow 129 from an intake 130 to the container 103, filter 116, vacuum motor 115, and out a rear vent 131 is shown. The intake 130 of dust and debris is disposed below the robot 100 when docked, however, in some embodiments the intake 130 may be disposed above, to the side or behind the robot 100 when docked. FIG. 525 illustrates the washing station for mopping pads of the robot 100 including the water intake 111 which delivers water to the water spray pipe 112 for cleaning the mopping pad, the pump 132 for drawing the water, the removable tray 113, and the filter 114. The drain system 133 is connected to drain pipes 107 of the kitchen. In this example, the washing station is stationary, and during the washing process, the rotational mopping pads of the robot 100 are spun as water is sprayed upwards from the tray 113. As the mopping pads are spun they scrub against protruding structures 134 disposed on the tray 113 to scrub dirt off of the mopping pads. FIG. 526 illustrates an exploded view of the components of the washing station shown in FIG. 525 in addition to the washing spray heads 135 through which water sprays upwards and drain intake 136. FIG. 527 illustrates the protruding structures 134 disposed on the tray 113 and openings 137 through which water sprays upwards from the spray heads 135. Both the tray 113 and the filter 114 are removable for cleaning. Each side of the tray 113 is sloped towards the center to guide the dirty water into the drain intake 136. FIG. 528 illustrates the drain system 133 of the washing station including the drain intake 136 connected to a drain pump 137 via pipe 138. The drain pump 137 is also connected to the waste water system of the kitchen via pipe 139. FIG. 529 illustrates an embodiment wherein exhaust air from a motor 140 of the drain pump 137 dries the washing station and the mopping pads of the robot 100. Exhaust air is redirected back to the washing station via the hot air tube 141 and a heating element 142 increases a temperature of the air.

Figure 530:
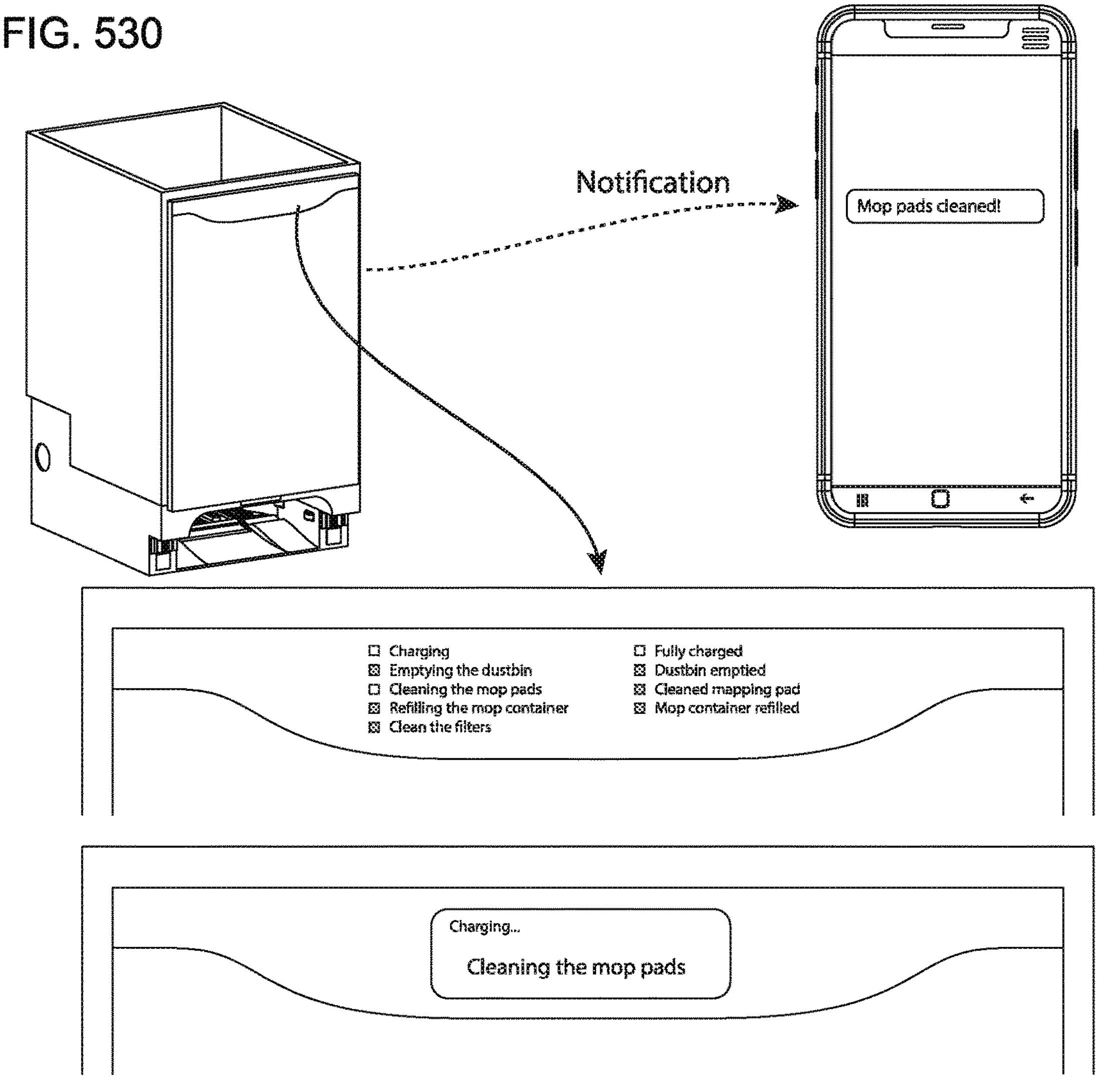
Figure 531:
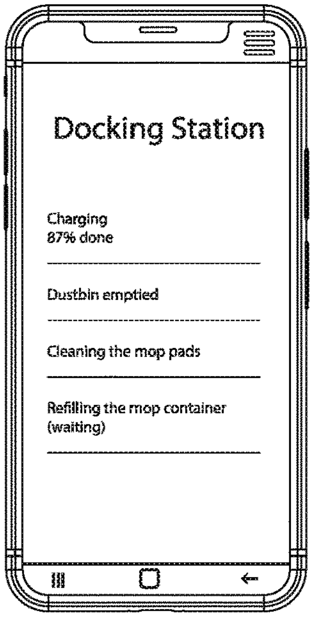

FIG. 530 illustrates a UI 143 of the docking station 101. The UI 143 is disposed on the front door 121 such that it is visible to a user. The main function of the UI 143 is to display indicators 144 conveying tasks currently in progress or finished by the robot 100 since most of the tasks are automatic (except some periodic maintenance such as changing and cleaning filters). The UI 143 of the docking station 101 displays simple text indicators 144 with lit LEDs 145 next to indicators 144 that are highlighted. In another embodiment, the UI 143 displays current tasks 145. The docking station 101 transmits notifications to an application 146 of a communication device 147 when a task is completed. FIG. 531 illustrates the application 146 displaying task states 148 (e.g., done, in progress, waiting, etc.) of the docking station 101.

Figure 532:
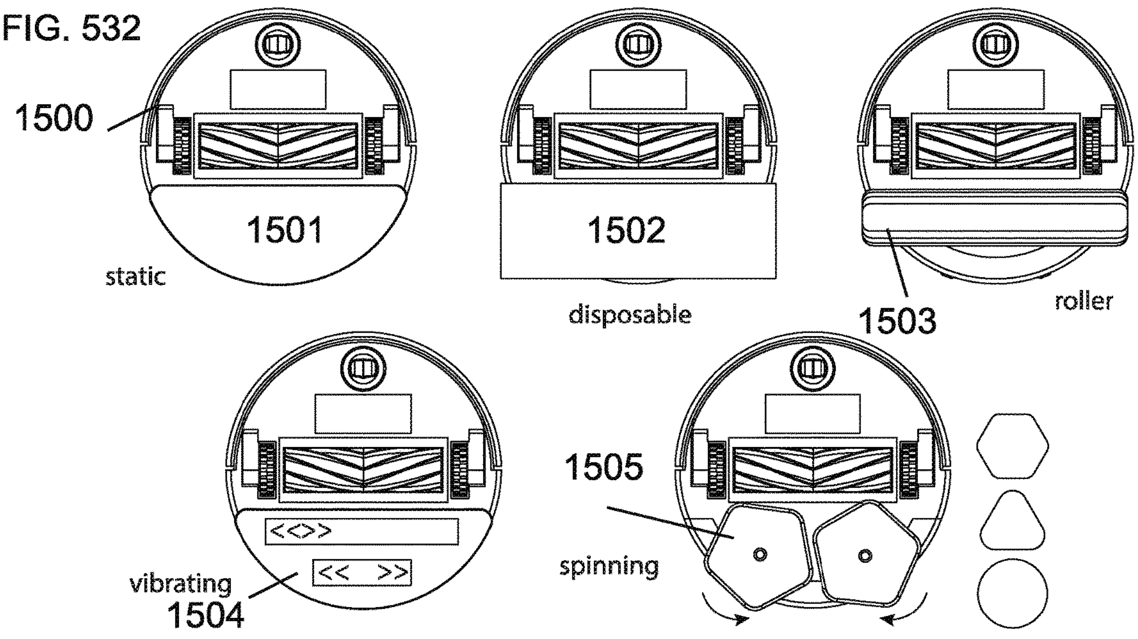
Figure 533:
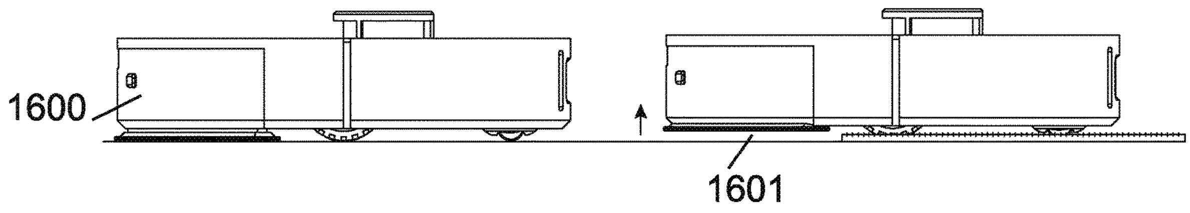
Figure 534:
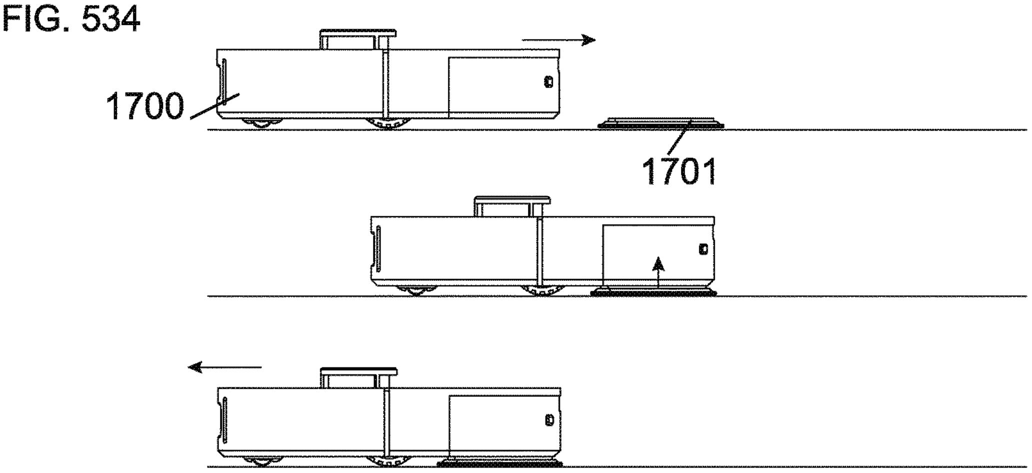

FIG. 532 illustrates different types of mopping modules of a robot 1500 including a mopping module with a static mopping pad 1501, a mopping module with a disposable mopping pad 1502, a mopping module with a roller 1503, a mopping module with a vibrating mopping pad 1504 and a mopping module with spinning mopping pads 1505 that may be of various shaped 1506. FIG. 533 illustrates a mopping module of a robot 1600 equipped with a lifting mechanism for raising a mopping pad 1601 (and some components of the mopping module) upon approaching a carpeted area 1602. Vertical movement of the mopping pad 1601 is also useful for applying downwards pressure during mopping and adjusting the height of the mopping pad 1601 for cleaning. FIG. 534 illustrates a robot 1700 driving towards a mopping pad 1701 and autonomously attaching 1702 the mopping pad 1701 and detaching 1703 the mopping pad 1701. This is useful for swappable and disposable mopping pads.

Figure 535:
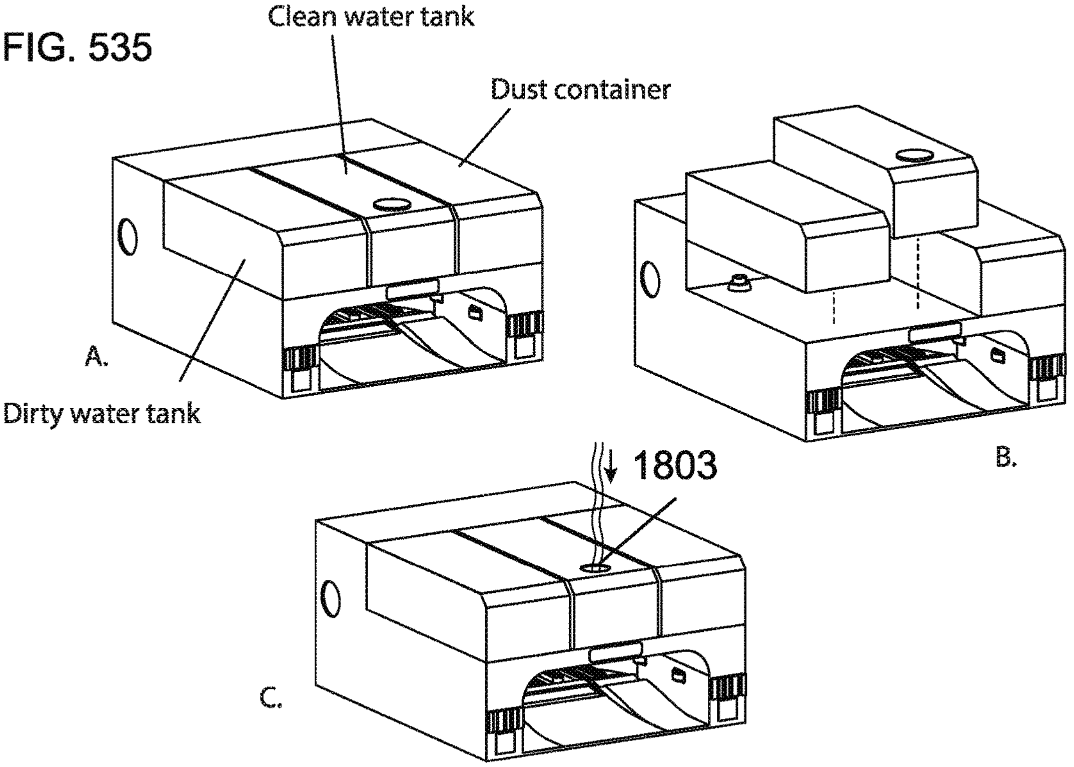
Figure 536:
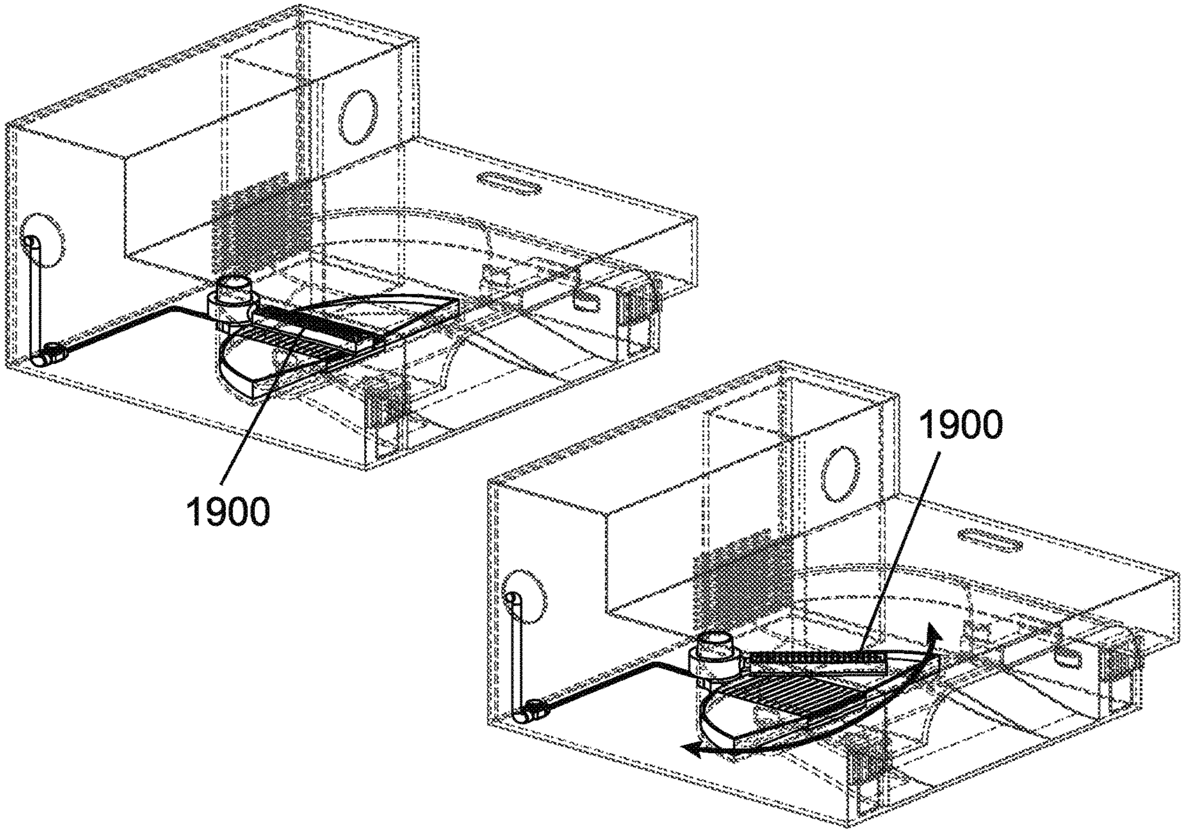
Figure 537:
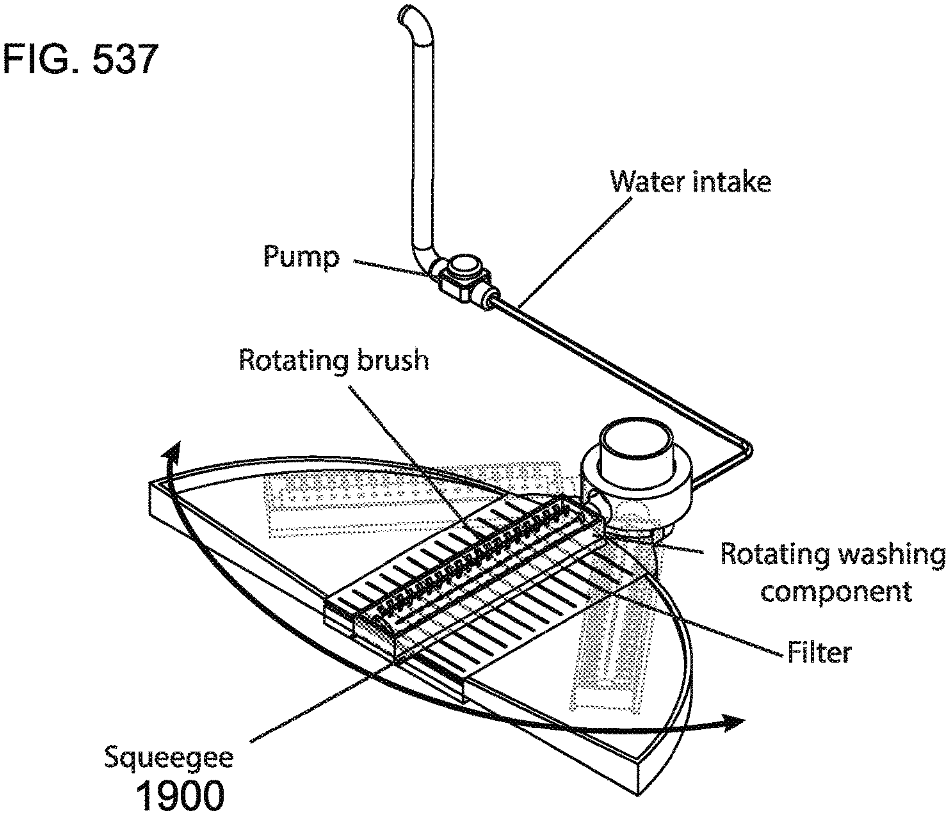
Figure 538:
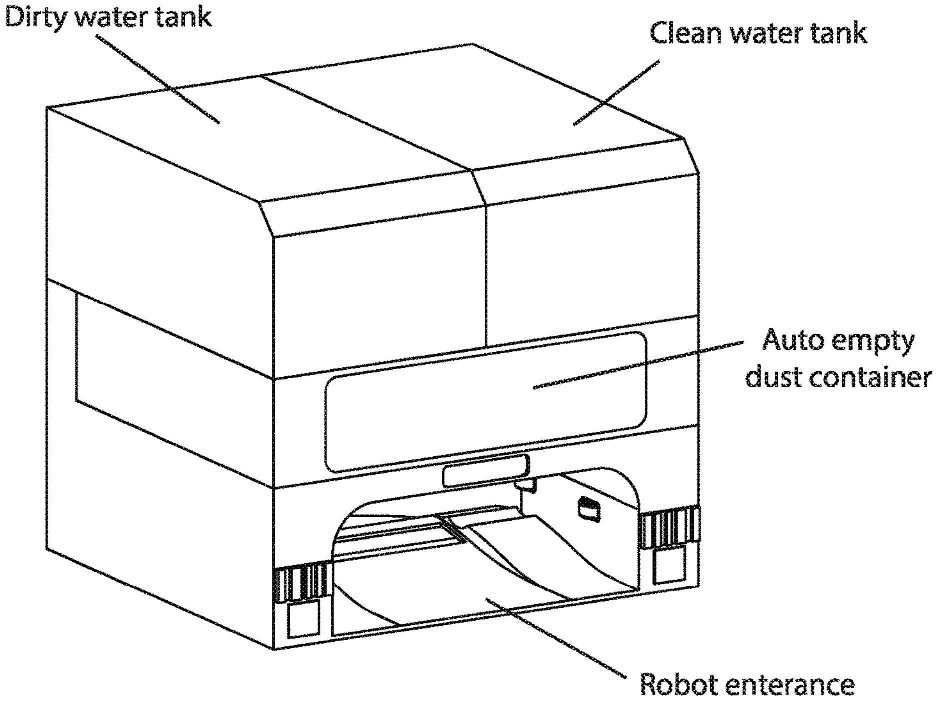
Figure 539:
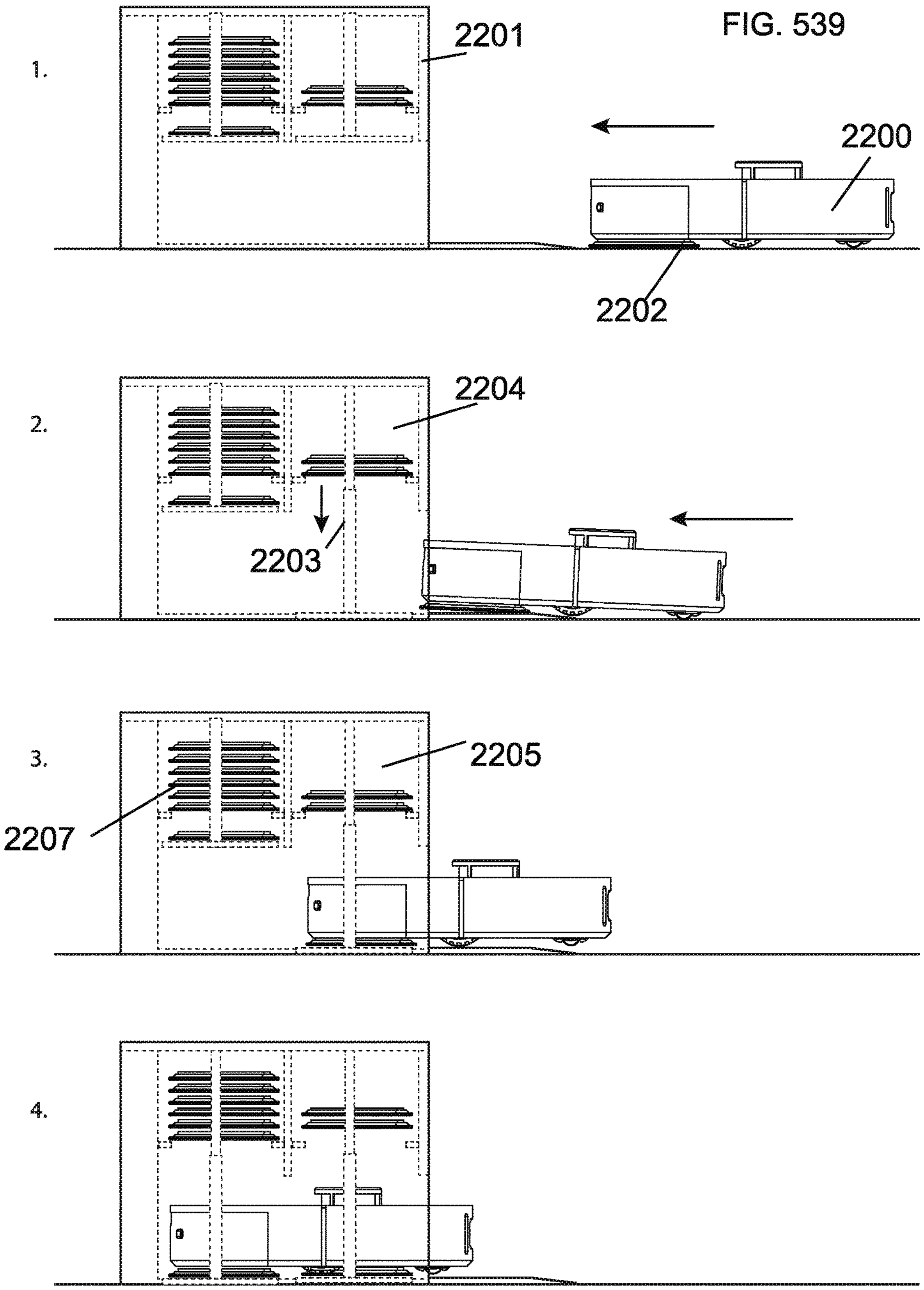
Figure 539:
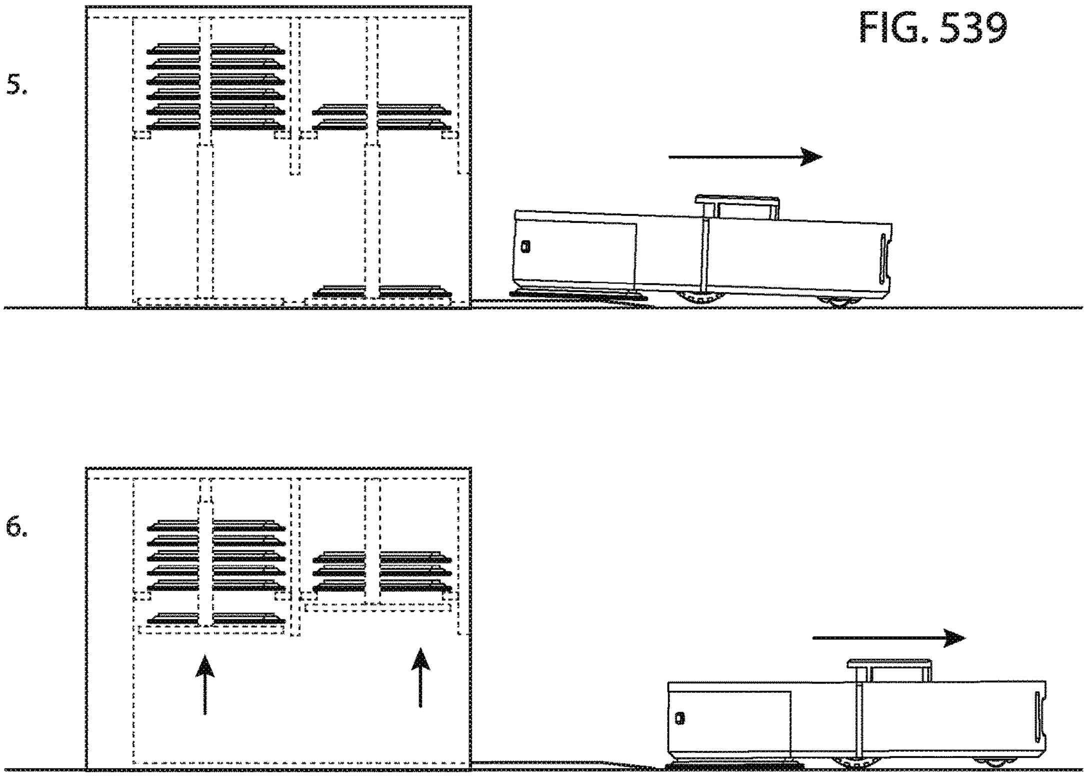

FIG. 535 illustrates a standalone docking station 1800 (i.e., disconnected from home, such as plumbing) of a robot. The docking station 1800 includes two water tanks 1801 and 1802. The tank 1801 is for clean water or cleaning solution to wash mopping pads of the robot and for refilling the mopping container of the robot (if applicable). The tank 1802 is for collecting dirty water removed from the mopping pads after washing. The tanks 1801 and 1802 are removable for cleaning and refilling, as shown in (B). In some cases, a user may refill the clean water tank 1801 without removing the tank 1801 from the docking station 1800 through hole 1803 (C). A dust container 1804 is positioned adjacent to clean water tank 1802 for collecting the debris in a dustbin of the robot. FIGS. 536 and 537 illustrate an alternate washing station, wherein a washing component 1900 moves in an oscillatory motion under the mopping pads of the robot when docked. Water is pumped via a pump 1901 upwards through the washing component 1900 via a water intake 1902 during washing of the mopping pads. A rotary brush 1903 within the washing component 1900 scrubs dirt off of the mopping pads. Squeegees 1904 guide the extracted dirty water to a filter 1905. This alternate washing station is useful for static mopping pads. FIG. 538 illustrates another variation of a standalone docking station 2100 including a dust container 2101 positioned below clean water tank 2102 and dirty water tank 2103 such that tanks 2102 and 2103 are positioned higher up for easy access. FIG. 539 illustrates a method for obtaining a clean disposable or reusable mopping pad of a robot 2200. In this method, a docking station 2201 automatically swaps a mopping pad 2202 of the robot 2200. The method includes (1) the robot 2200 approaching the docking station 2201, aligning with the dock 2201 (if necessary) and turning 180 degrees such that a side of the robot 2200 with the mopping pad 2202 enters the docking station 2201 first; (2) a mechanical plate 2203 in column 2204 lowers for positioning underneath a location of a mopping pad of the robot 2200, wherein column 2204 holds used mopping pads 2205 and column 2206 holds clean mopping pads 2207; (3) the robot 2200 positioning itself on top of the mechanical plate 2203 and detaching the used mop pad 2202; (4) a second mechanical plate 2208 in column 2206 lowering with a clean mopping pad for positioning underneath the robot 2200 as the robot 2200 moves towards a rear of the docking station 2201 to attach the clean mopping pad; (5) the robot 2200 reversing out of the docking station 2201; and (6) both mechanical plates 2203 and 2206 moving upwards to their original positions, the mechanical plate 2206 picking up a new mopping pad from mopping pads 2207 and the mechanical plate 2203 adding the detached used mopping pad to the used mopping pads 2205.

Figure 540A:
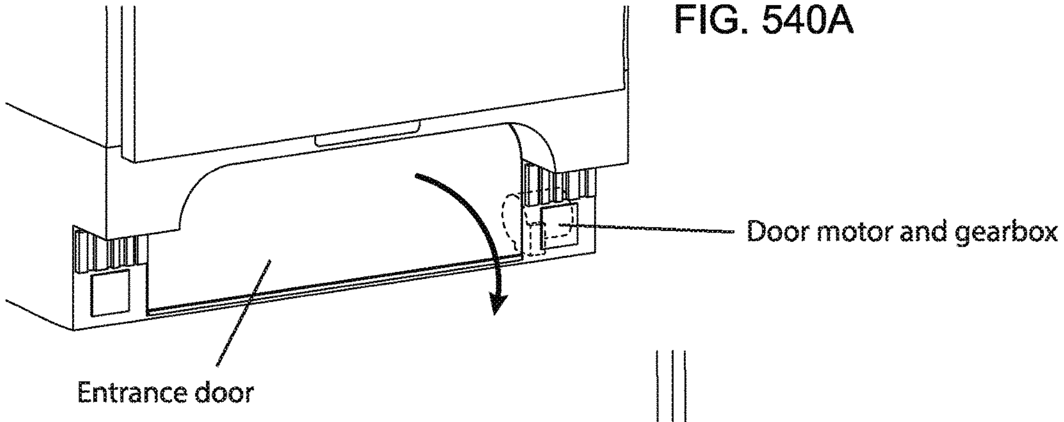
Figure 540B:
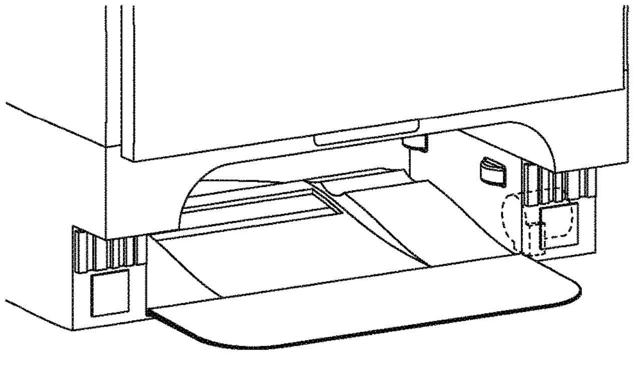

In some embodiments, the maintenance station of the robot includes a door. FIGS. 540A and 540B illustrate a front door 54000 of a maintenance station 54001 of a robot in a closed position and an open position, respectively. The door 54000 is closed when the robot is performing work and the robot is positioned inside the maintenance station 54001 for charging, emptying a dustbin of the robot, cleaning mopping pads of the robot, or other robot maintenance tasks (e.g., emptying or refilling water containers). The door 54000 reduces the noise expelled into the environment from operation of the different mechanisms inside the maintenance station (e.g., autonomous emptying of the dustbin of the robot, washing of the mopping pads of the robot, etc.) and provides aesthetics benefits. When the door 54000 is open, the door 54000 acts as a ramp for an easier entrance and exit by the robot from the maintenance station 54001. The door 54000 is opened and closed using the door motor and gearbox 54002. The maintenance station 54001 is configured to autonomously open the door 54000 as the robot is approaching the maintenance station 54001 for entry into the maintenance station 54001. The maintenance station 54001 is configured to close the door 54000 when the robot is within the maintenance station 54001 or ready to depart the maintenance station 54001 to perform work.

Figure 541A:
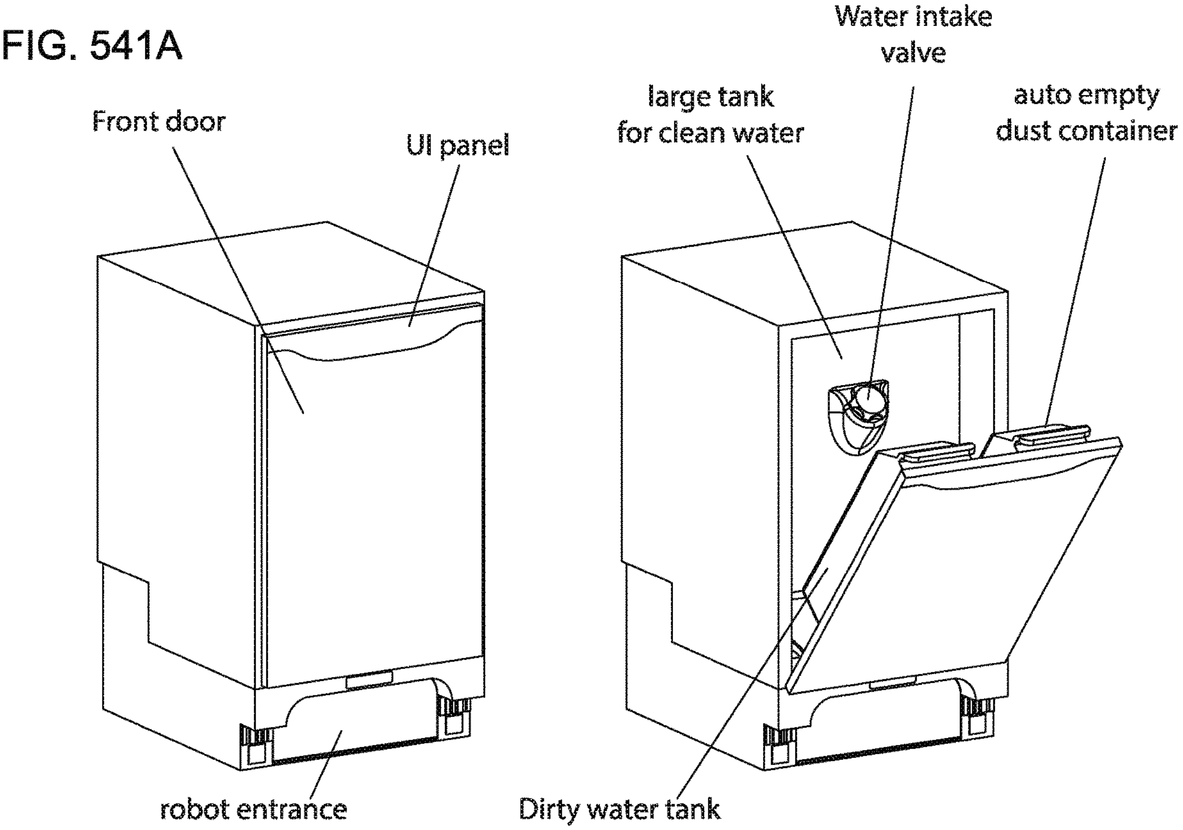
Figure 541B:
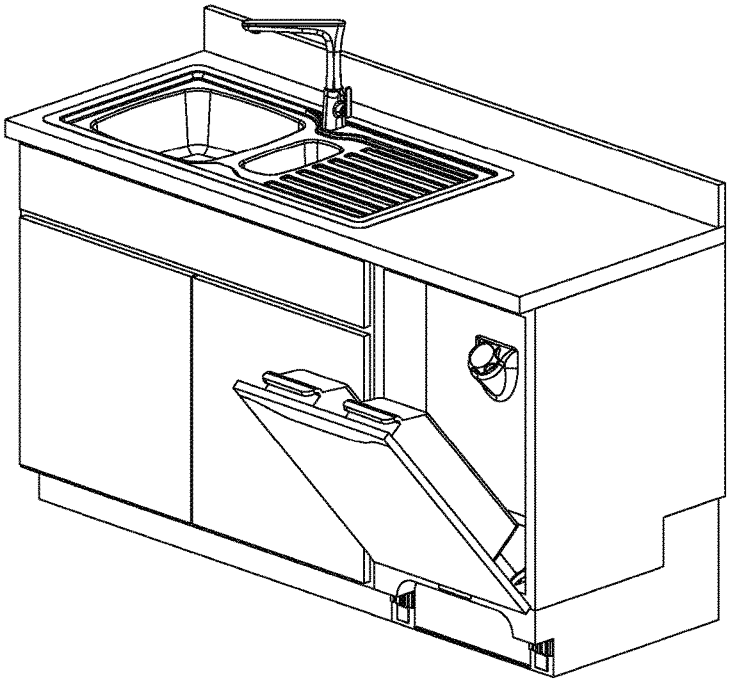

FIGS. 541A and 541B illustrate an example of a maintenance station of the built-in robot and maintenance station system. A robot enters the maintenance station using door 54100. A front door 54101 of the maintenance station includes a built-in user interface 54102. A large dust bin 54103 and dirty water container 54104 are coupled to the front door 54100. A large clean water tank 54105 is housed within the maintenance station and is refilled using water intake valve 54106. The maintenance station may be positioned within (or adjacent to) a cabinet 54107 of a kitchen or elsewhere in a house as the maintenance station does not require connection to a plumbing system of the house. The large clean water tank 54105 is able to store a large amount of clean water and as such requires refilling less frequently. The large dustbin 54103 and dirty water tank 54104 are large as well and as such require emptying less frequently.

Figure 542A:
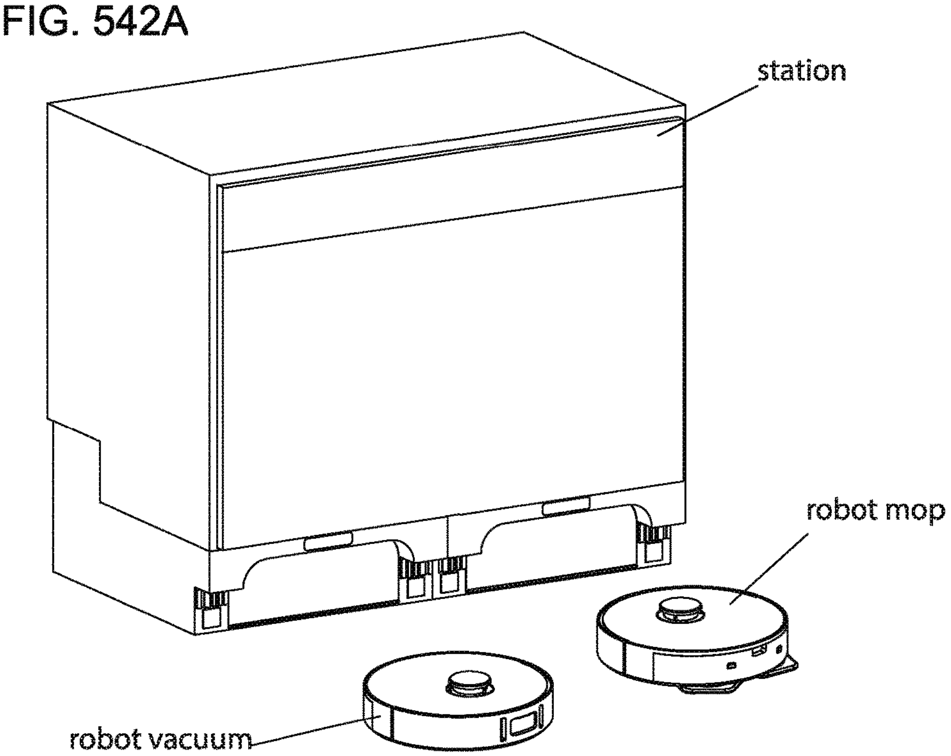
Figure 542B:
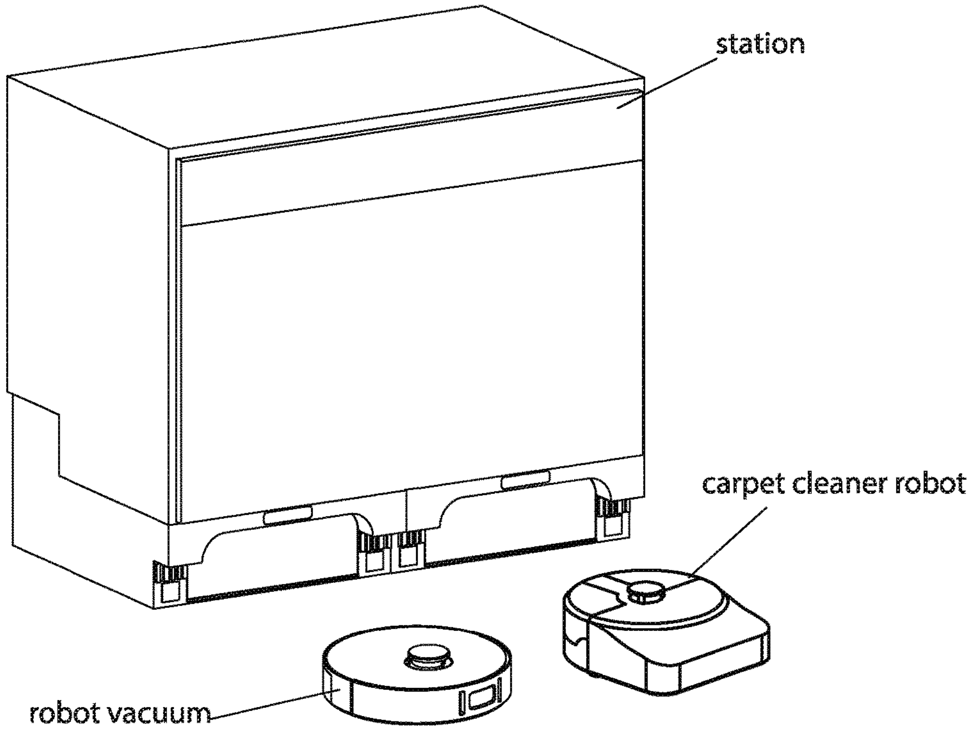

FIGS. 542A and 542B illustrate the built-in robot and maintenance station system expanded to include two separate robots. FIG. 542A illustrates a vacuum robot 54200 and a mopping robot 54201 while FIG. 542B illustrates the vacuum robot 54200 and a carpet cleaning robot 54202. In such a case, the maintenance station is equipped with respective mechanisms required to maintain each type of robot. In some embodiments, the two robots may share a same mechanism or feature of the maintenance station. For example, in the case of FIG. 542B, the vacuum robot may be configured with a wet vacuum and the maintenance station may include a single mechanism for emptying a dirty water container of both the vacuum robot 54200 and the carpet cleaning robot 54202. In embodiments, operational schedules of the two robots vary.

Figure 545:
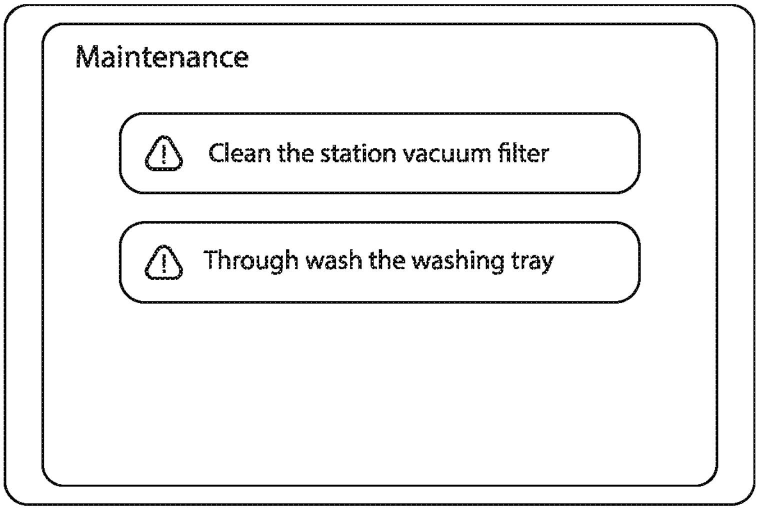
Figure 546:
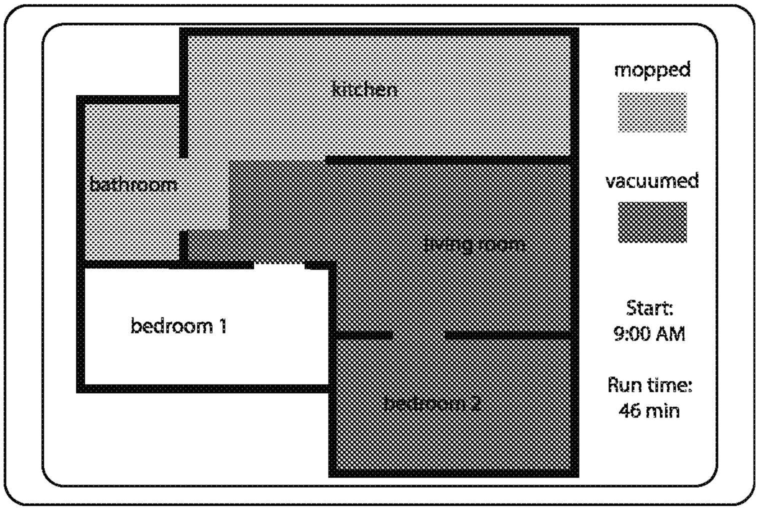
Figure 547:
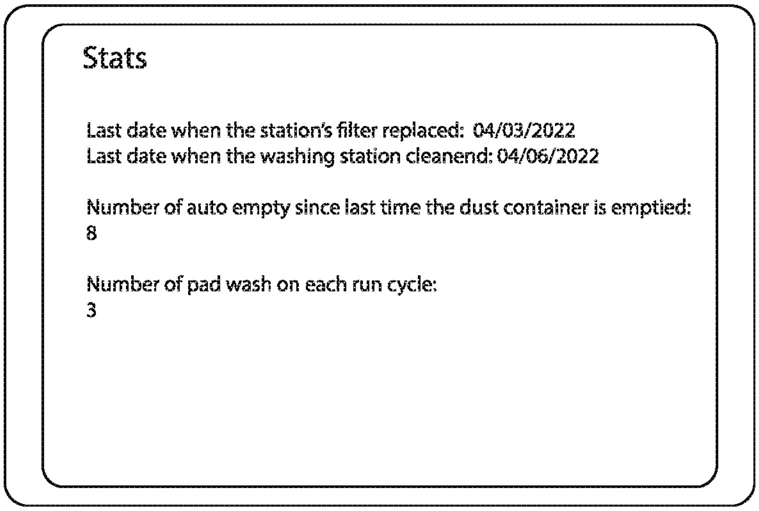

FIG. 543 illustrates a control panel 54300 of a maintenance station. A user may access information such as scheduling, maintenance, a coverage map, and other statistics related to a robot and the maintenance station. The user may use the control panel to access similar information, adjust similar settings, etc. as is possible using the application. FIG. 544A illustrates an example of an overview page for operational scheduling for vacuuming and mopping displayed by the control panel 54400. Different days and times are selected for vacuuming and mopping. FIG. 544B illustrates the control panel displaying a page used to order rooms for cleaning for both vacuuming 54401 and mopping 54402 on a particular day, Monday in this example. FIG. 545 illustrates the control panel 54500 displaying a maintenance page that indicates actions required to maintain the maintenance station and the robot, such as cleaning a vacuum filter of the maintenance station and thorough washing of a washing tray of the maintenance station. When maintenance of the maintenance station or the robot is required, the user interface or control panel of maintenance section or the application may display a notice icon and/or the maintenance station may illuminate in a particular color. The user may use the application or the UI or panel of the maintenance station to view maintenance tasks currently required. FIG. 546 illustrates the control panel 54600 displaying a coverage map page, wherein areas of an environment mopped and vacuumed during an operational session are displayed using different colors and other information such as a start time and runtime of the operational session. FIG. 547 illustrates the control panel 54700 displaying a statistics page, wherein an overview of performance of the built-in robot and maintenance station system is provided. The user may provide input to the control panel to aid in remembering particular maintenance tasks. For example, the user may provide input designating when the user installed a new filter or brush on the maintenance station or the robot to keep track of maintenance. In some embodiments, the maintenance station and/or the robot may include sensors for recognizing newly installed parts and the installation may be automatically logged.

Figure 548:
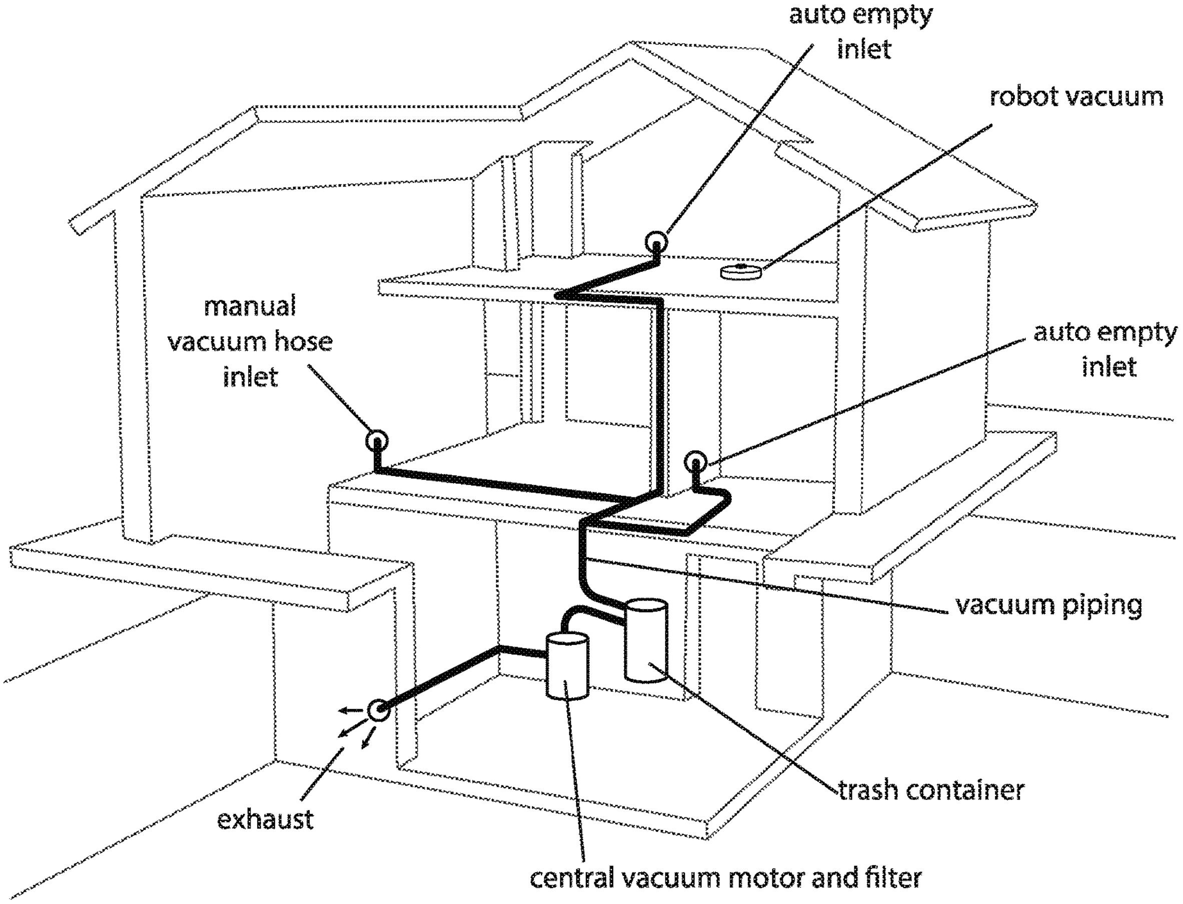
Figure 549:
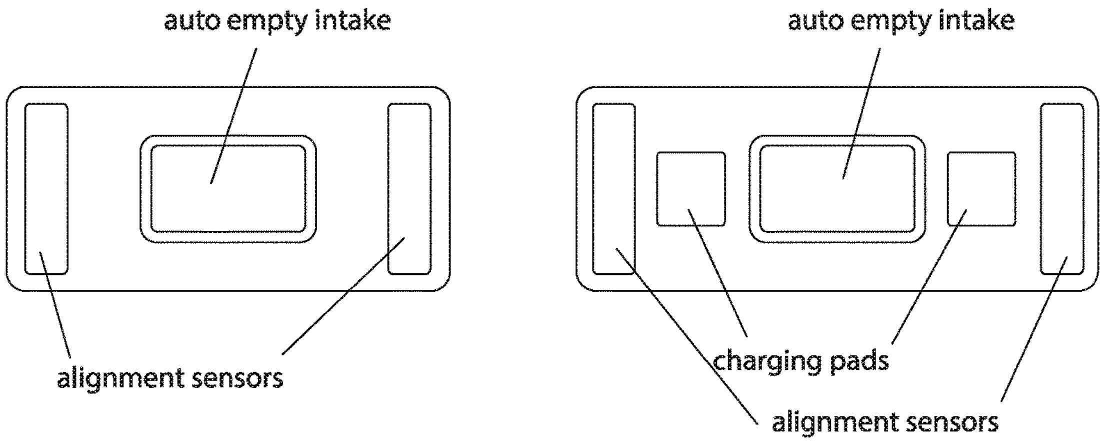
Figure 550:
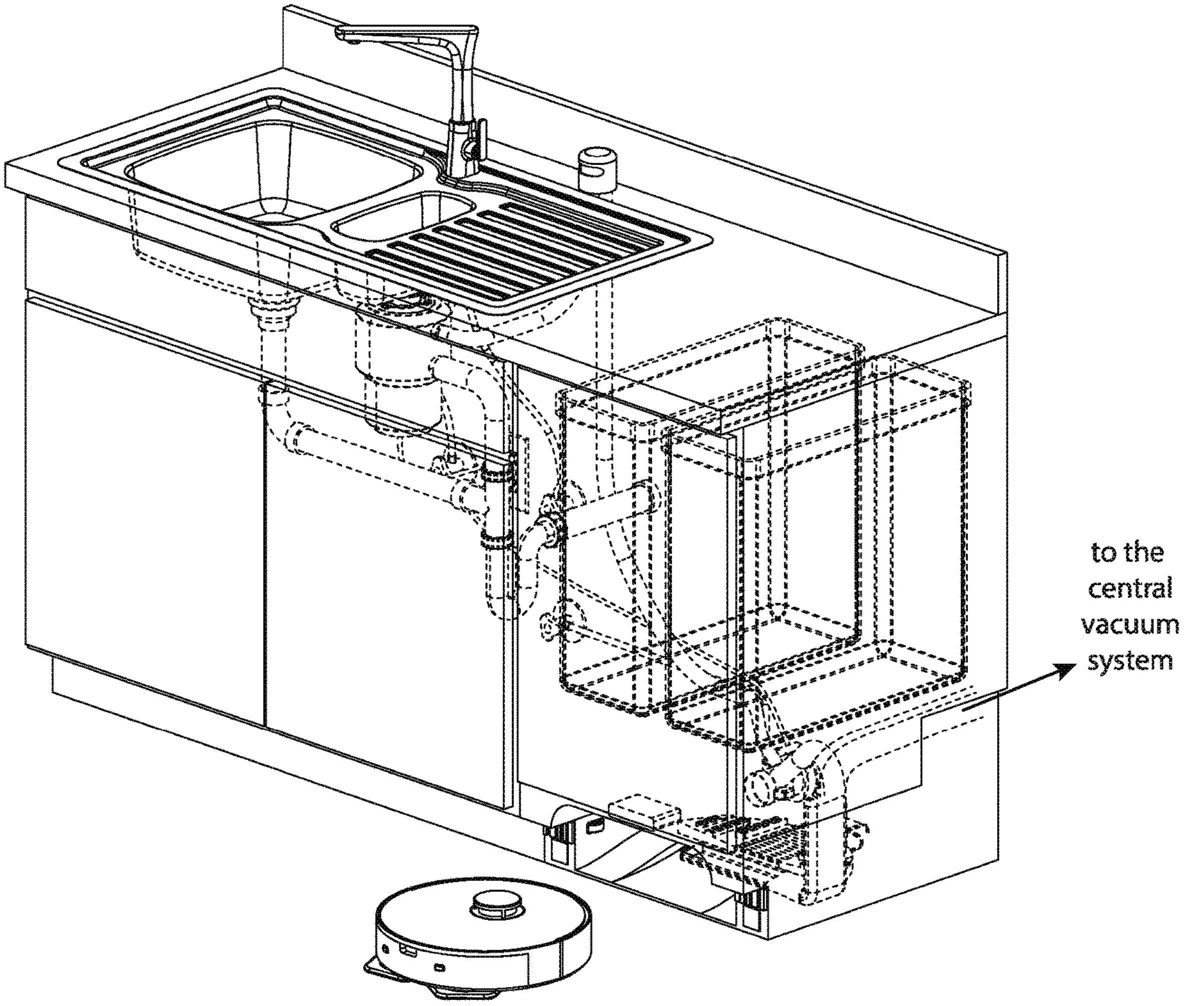

FIG. 548 illustrates a schematic view of a central vacuum system within a home including a network of pipes 54800 connected to inlets 54801 positioned on each floor of the home, a central vacuum motor and filter 54802, a trash container 54803, and an exhaust 54804. The trash container 54803, central vacuum motor 54802, and the exhaust 54804 are positioned in a basement of the home. A robot 54805 autonomously aligns and connects to any of the inlets 54801 for emptying a dustbin of the robot 54805 after an operational session and/or when the dustbin of the robot 54805 is full. The vacuum motor 54802 creates suction to suck the dust and debris from the dustbin of the robot into the trash container 54803 via the network of pipes 54800 and the exhaust 54804 of the vacuum motor 54802 leads the suctioned air outside of the home. The central vacuum system may include other inlets for a manual vacuuming hose as well. FIG. 549 illustrates two examples of inlets 54801 including an intake 54806 and alignment sensors 54807 used by the robot 54805 to align an outlet of the dustbin with the intake 54806 for connection. The inlets 54801 may include charging pads as well for recharging the robot 54805. FIG. 550 illustrates an example of a built-in robot and maintenance station 55000 directly connected to plumbing, disposal, and central vacuum systems of a home as described herein.

Figure 551:
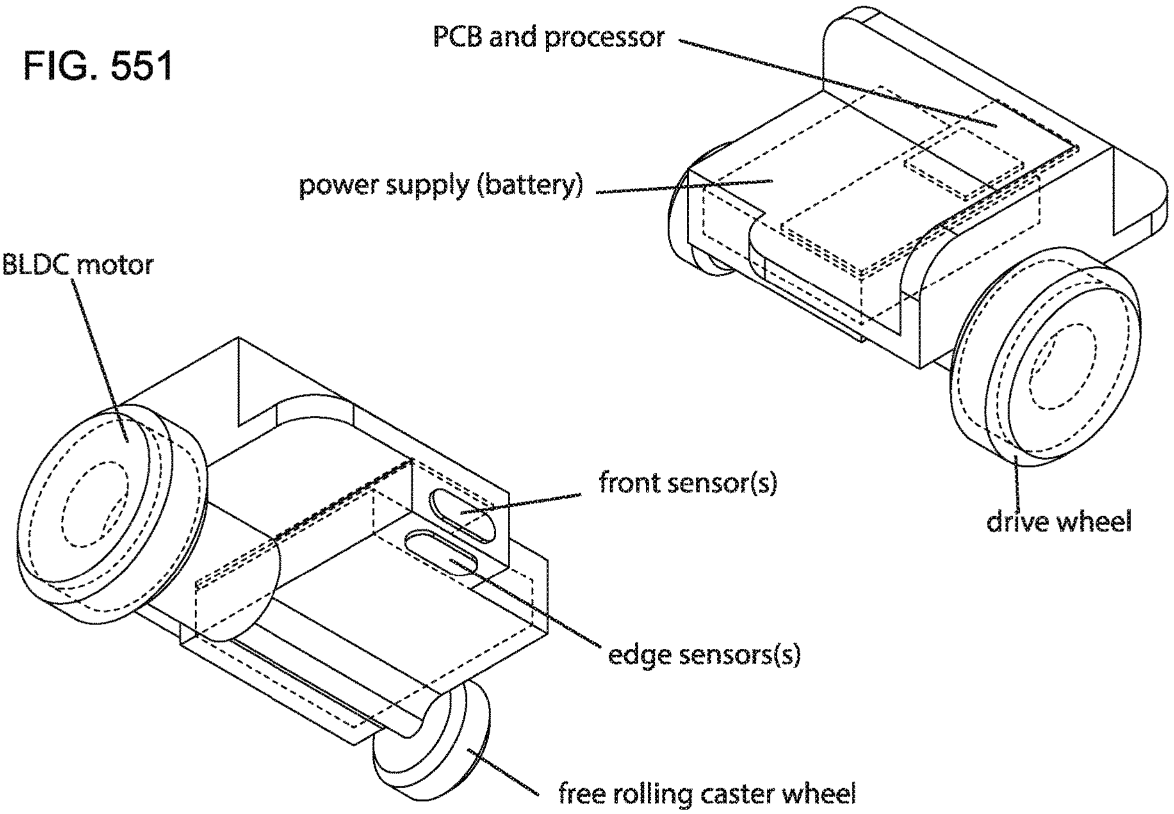
Figure 552:
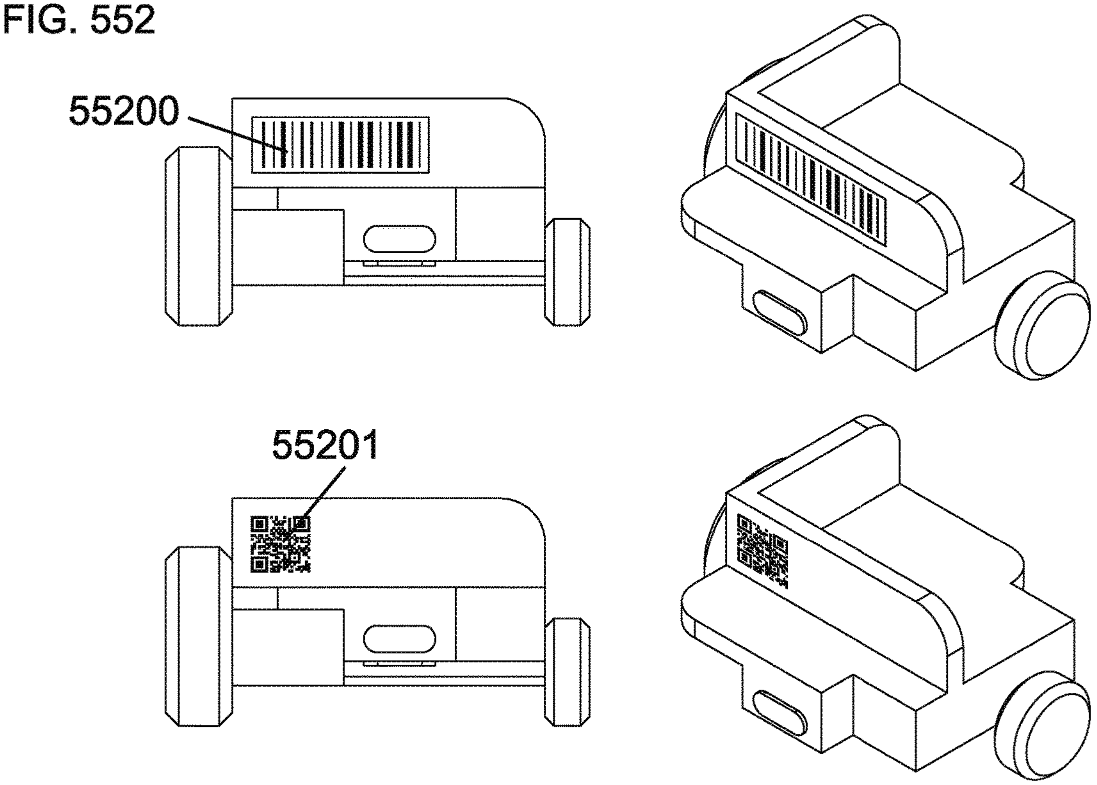
Figure 553:
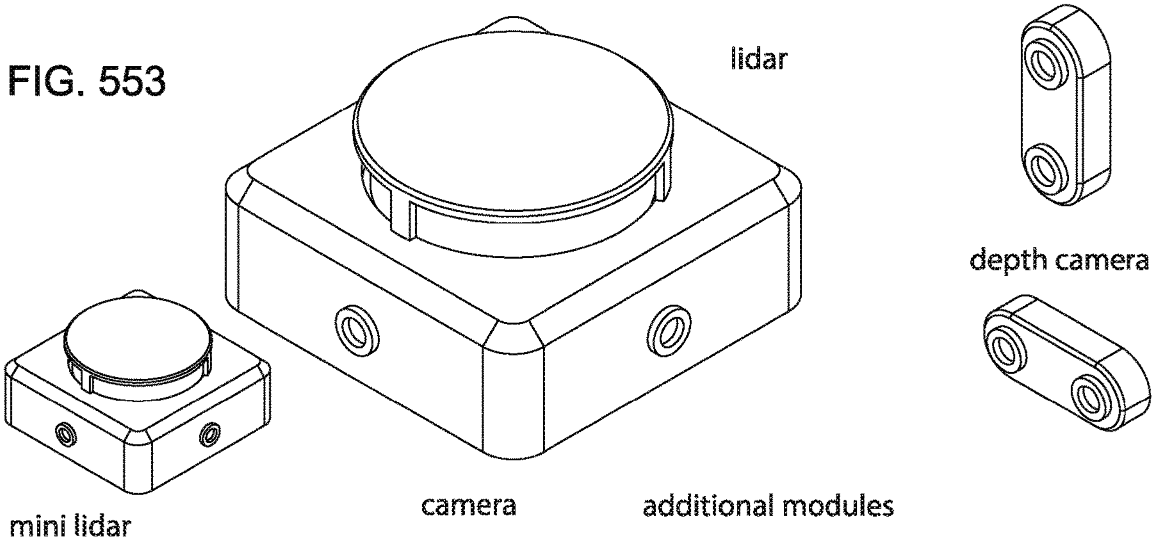
Figure 554:
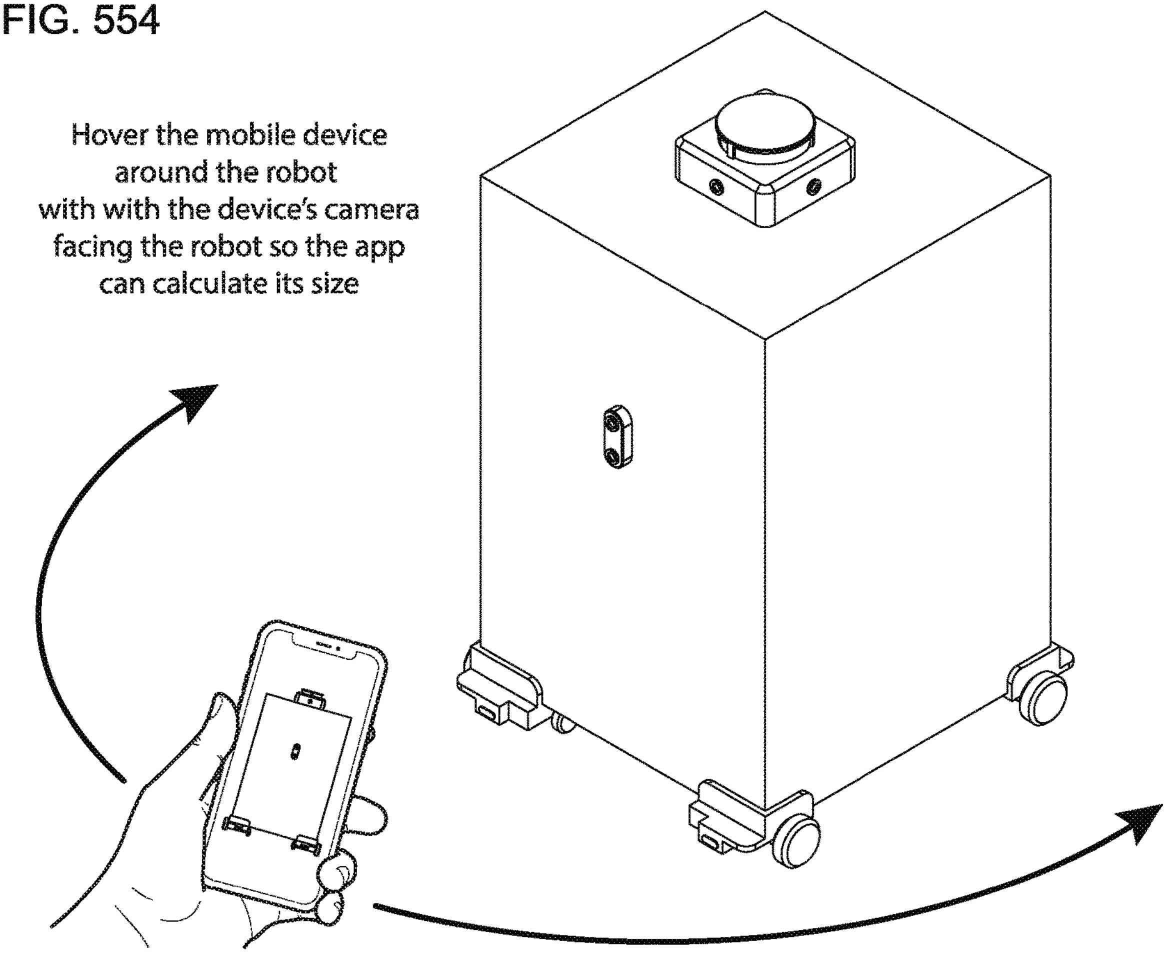
Figure 555:
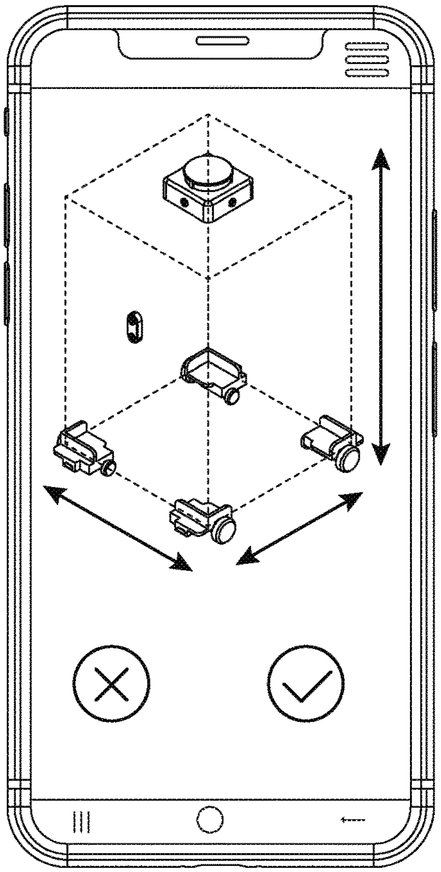
Figure 556:
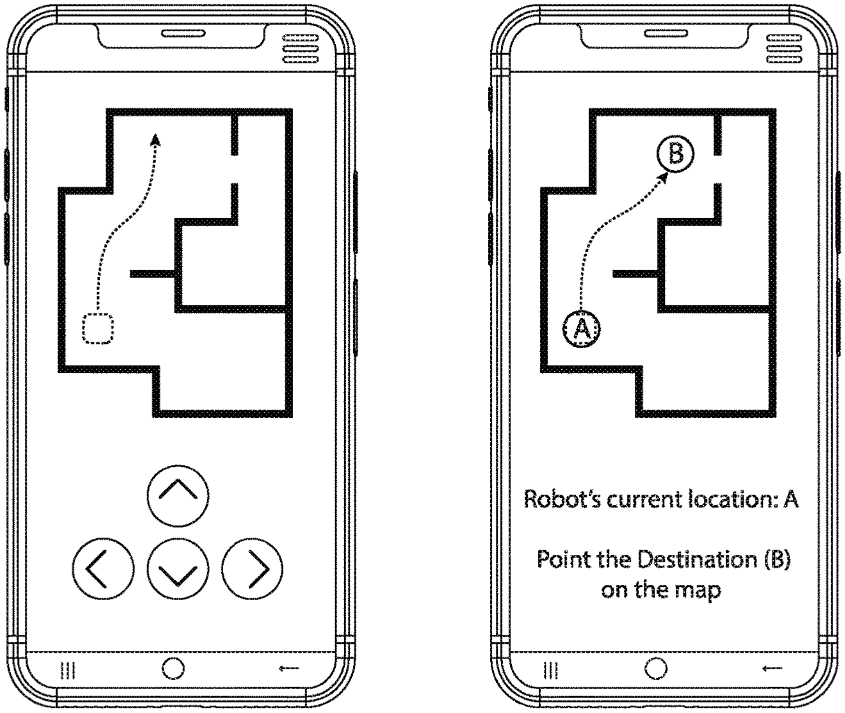
Figure 557:
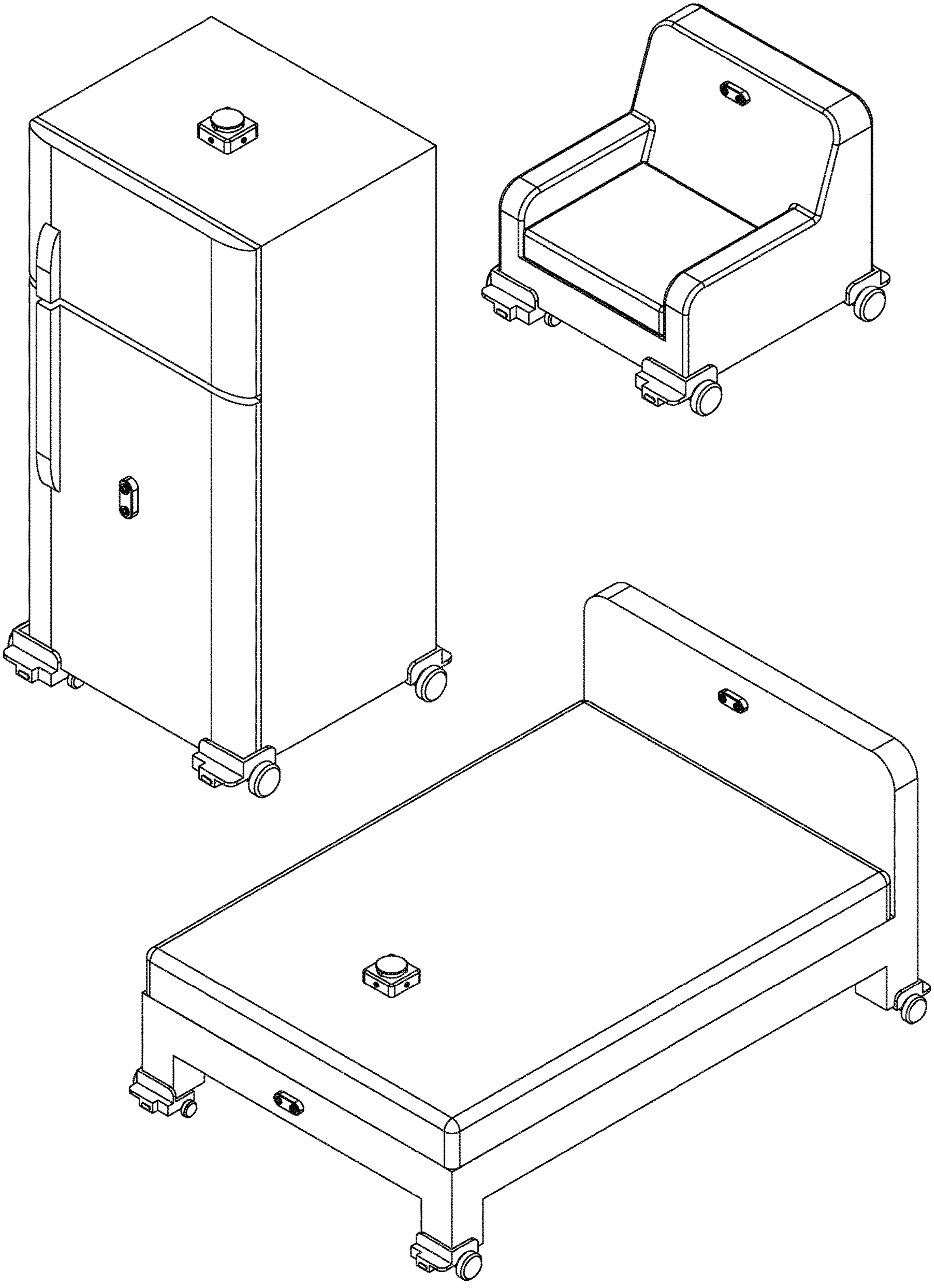

In some embodiments, a mobile robotic device may be installed on an existing machine, appliances (like refrigerator, washing machine, standalone air conditioner, etc.), a piece of furniture (like chair, sofa, bed, desk, table, etc.), or any type of load to make them moveable. Each component has a wheel powered by a BLDC motor, a power supply (battery), various types of sensors (which may include LIDAR sensor, camera, TOF sensor, proximity sensors, IR, sonar, and depth sensors) and a microcontroller unit. FIG. 551 illustrates an example of a mobile robotic device that may be installed on a load to make it mobile, including a drive wheel within which BLDC motors are housed, a free rolling caster wheel, a power supply (i.e., battery), front sensors, edge sensors, and a PCB and processor. These mobile robotic devices may be installed on a load in pairs (e.g., 2 wheels, 4 wheels, 6 wheels, etc.) and after installation, the user may take pictures of installed robotic mobile devices using the provided app for the robot to determine the location of each mobile robotic device in relation to the others. Each mobile robotic device may have a barcode, QR code, or a specific pattern or icon so the application can identify the robot more easily. FIG. 552 illustrates examples of the mobile robotic devices with a barcode 55200 and a QR code 55201. In some embodiments, external sensor modules may be added to the mix as well. For example, a module consisting of a LIDAR and cameras in four directions may be installed on top of the load to both determine the height of the load and provide line of sight for the robot at that height. Other examples include installing camera modules at a front and back of the load or modules with edge sensors underneath the load if the distance between wheel components and edge of the load is large. The wheel components themselves may be equipped with edge sensors as well. FIG. 553 illustrates examples of components that may be added to the load or the mobile robotic device installed on the load to make it mobile. Examples of components includes a mini and large LIDARs 55300 including cameras 55301 and depth cameras 55302. Alternatively, each mobile robotic device or the load itself may be equipped with some measuring apparatus, such as radio wave range finders, to localize themselves in relation to each other automatically. Alternatively, the user may hover their mobile device around the robot with the mobile device camera facing the robot such that the application may calculate a size of the load and distances between components. FIG. 554 illustrates an example of a load 55400 on which three mobile robotic devices 55401 are installed to make the load 55400 mobile. Depth cameras 55402 and a LIDAR with depth cameras 55403 installed on the load 55400. An application 55404 of a mobile device 55405 is paired with the mobile robotic devices 55401 and components 55402 and 55403. The mobile device 55405 is hovered around the load 55400 with the camera facing the load 55400 and the application 55404 calculates a size of the load 55400. After the location of each component is established in the application, the application forms a virtual robot by combining the mobile robotic devices 55401 and the components 55402 and 55403 and controls them as a unit. Some additional information may be added by the user manually, such as height and weight of the load the mobile robotic devices are carrying. FIG. 555 illustrates the application 55404 displaying a virtual robot 55406 comprising the load 55400, mobile robotic devices 55401, and components 55402 and 55403. The dimensions 55407 are displayed and the user may use icons 55408 to accept or reject the dimensions 55407. The virtual robot 55406 formed in the application 55404 works as a single unit. While each mobile robotic device 55401 and component 55402 and 55403 localizes itself separately, the localization data sent to the application is used to localize the robot as a whole, wherein another round of localization processes occur at a higher level using the device running the application or the cloud. FIG. 556 illustrates the application 55404 displaying the virtual robot 55406 within a map 55409 and icons 55410 used to control movement of the mobile devices 55401 as a single unit. The application 55404 also illustrates a current location A of the mobile devices 55401 and the load 55400. A user selects a location B for the mobile devices 55401 to navigate to. FIG. 557 illustrates examples of different items, namely a fridge 55700, a bed 55701, and a chair 55702, on which the mobile devices 55401 are installed to make the items mobile. Depth sensors 55402 and LIDARs with depth sensors 55403 are also installed on the items.

In some embodiments, the robot includes a cost-efficient two-wheel drive system. In some embodiments, the robot includes a flat face such as in UV robot in which the UV lights is placed so the disinfecting UV lights are positioned at a specific angle in respect to the environment. In some embodiments, a robot comprises a cleaning roller mop and fits well within a rectangular shape. In some embodiments, the robot has a shape that has a flat face, namely a squircle which is the mathematical geometrical term for one half circular and the other half rectangular shape. In some embodiments, a path planning method for a squircle robot is implemented that meets requirements of lightweight computing and real-time Computing. The path planning algorithm must generalize well into various shapes. For actuation of squircle shaped autonomous robot as well as a navigation system, an active two-wheeled differential drive system to maneuver in and out of tight areas and environment corners is required. Some embodiments employ development of methods for autonomous operation of a squircle shaped robot in a real environment. Some embodiments employ development of an algorithm that implements the methods for autonomous operation of a squircle shaped robot. Some embodiments employ development of a simulation software for virtually simulating and testing a squircle shaped robot executing the algorithm. Some embodiments employ design and manufacture of a physical squircle shaped robot. Some embodiments include a differential drive system with two locomotor wheels for driving a squircle shape robot. The physical constraint of the squircle robot is overcome by improving algorithms and software to increase versatility of such a drive system.

Figure 558:
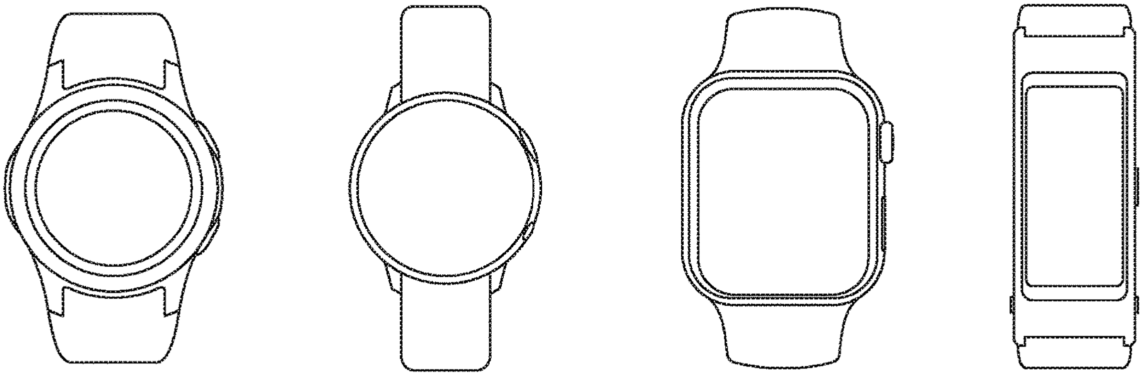
Figure 559:
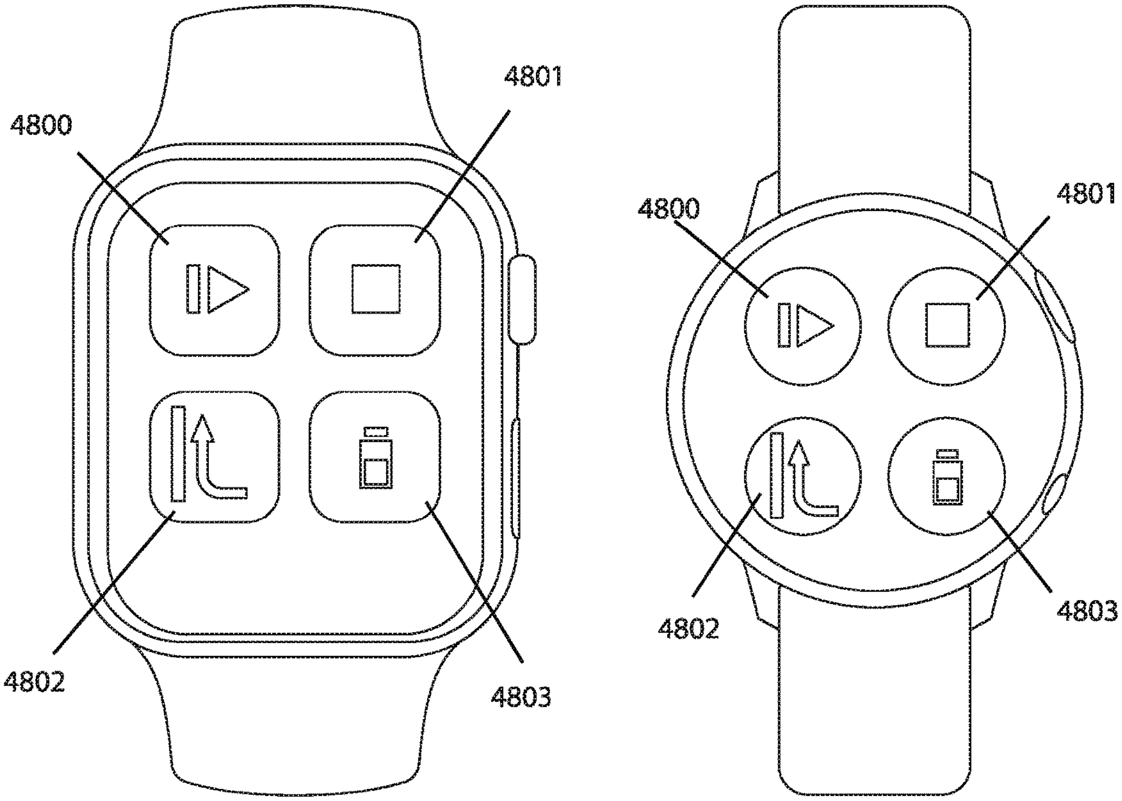
Figure 560:
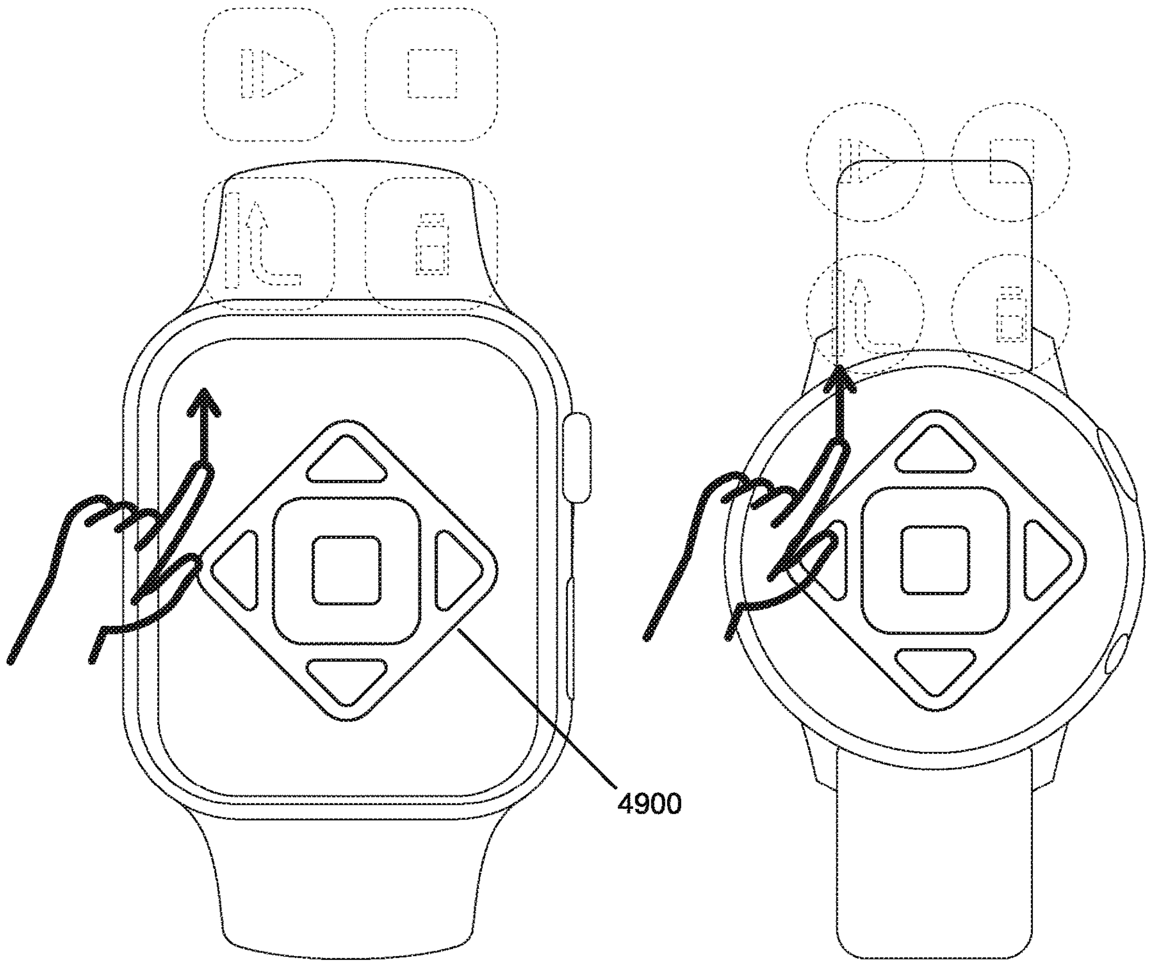
Figure 561:
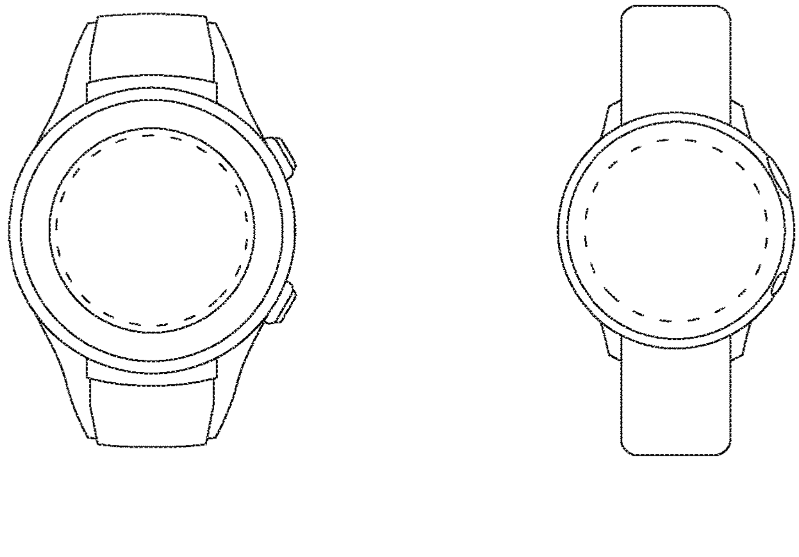
Figure 562:
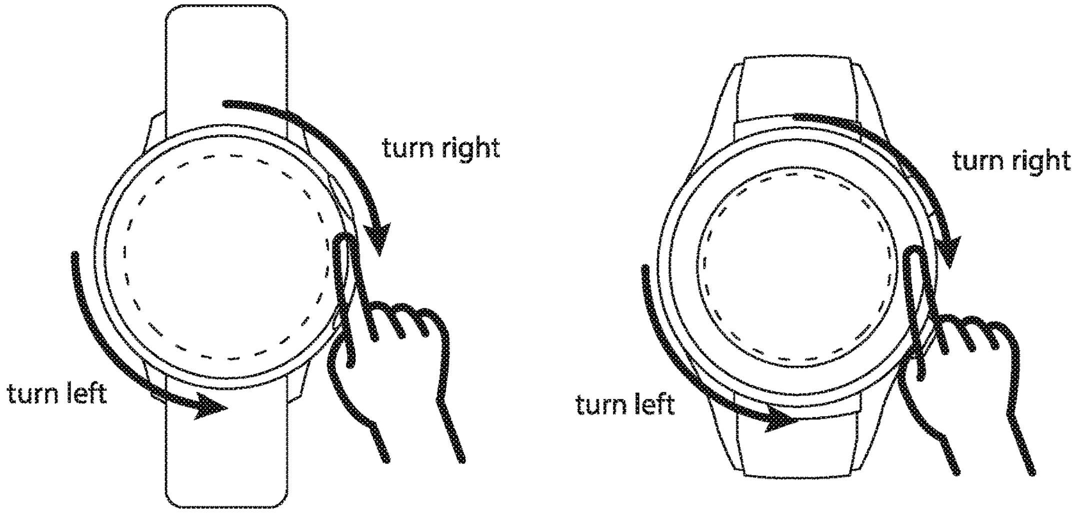
Figure 563:
Figure 564:
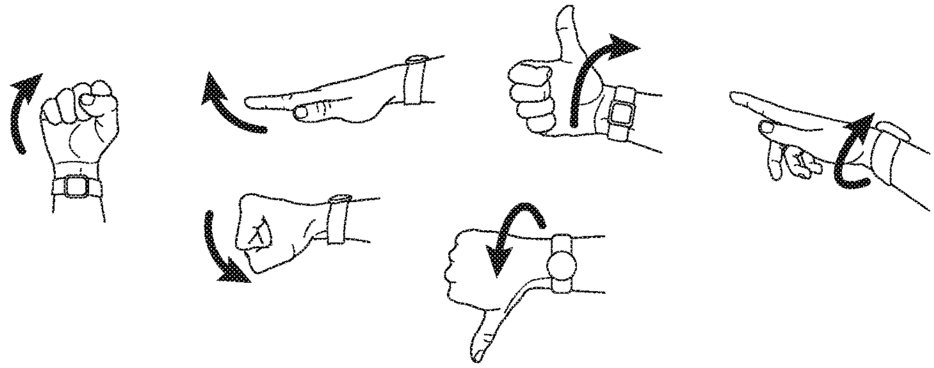

In embodiments, a user may control the robot using wearable devices, including but are not limited to, smart watches and virtual, augmented, or mixed reality headsets, gloves, etc. Due to the nature of these wearable devices and their differences in ergonomics and possibilities, user interaction differs for each wearable device. Smart watches may be vastly different from one other and may comprise different combinations of hardware and software-enabled controls that the user may use in interacting with the smart watches. For smart watches, the concept of customization based on the wearable device is important. FIG. 558 illustrates different variations of smart watches. There may be various options to control the robot using a smart watch. FIG. 559 illustrates essential controls displayed on the smart watches as a main interface, including start 4800, stop 4801, pause 4802, and charge 4803. FIG. 560 illustrates another interface displayed on the smart watches by swiping a screen of the smart watch, the interface displaying movement controls 4900. Some watches have a bezel (physical or digital) around their screen, as illustrated in FIG. 561, which may be used to command the robot to turn, speed up or slow down, etc., as illustrated in FIG. 562. Using dials and bezels of smart watches, the user may have access to more options such as scheduling, notifications, coverage report, etc. FIG. 563 illustrates the use of a voice assistant (e.g., Siri, Google, Bixby, Alexa, etc.) of the smart watches to verbally command the robot to execute different tasks via an AI assistant. Since most smart watches comprise a gyroscope or three-axes accelerometer sensor to recognize rotation of the arm, gestures of varying wrist motions may be used to command the robot. FIG. 564 illustrates examples of different wrist motions that may each be programmed to instructing the robot to execute a particular action, such as stop, start, speed up, slow down, etc.

Figure 565A:
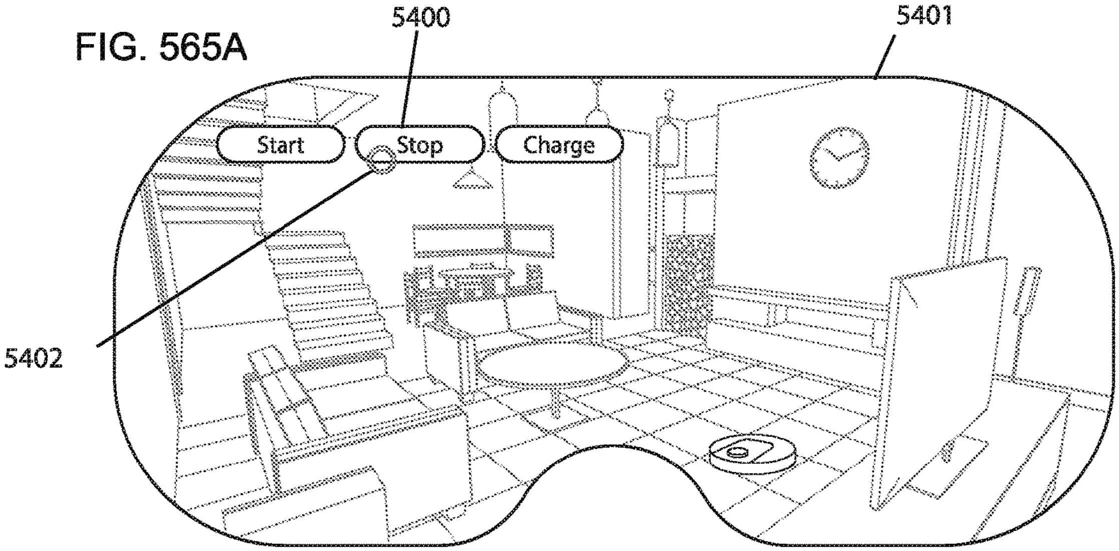
Figure 565B:
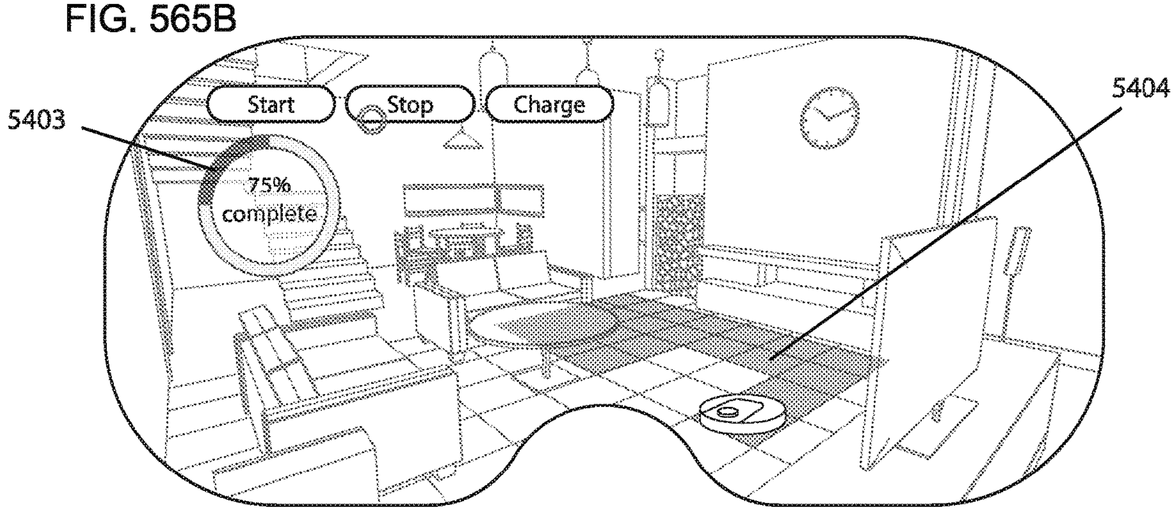
Figure 565C:
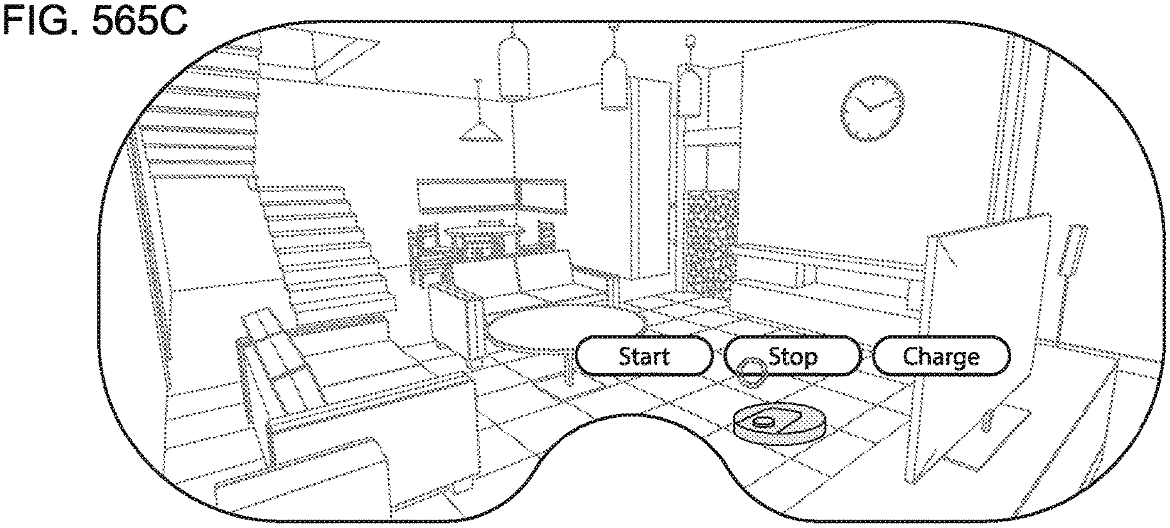
Figure 565D:
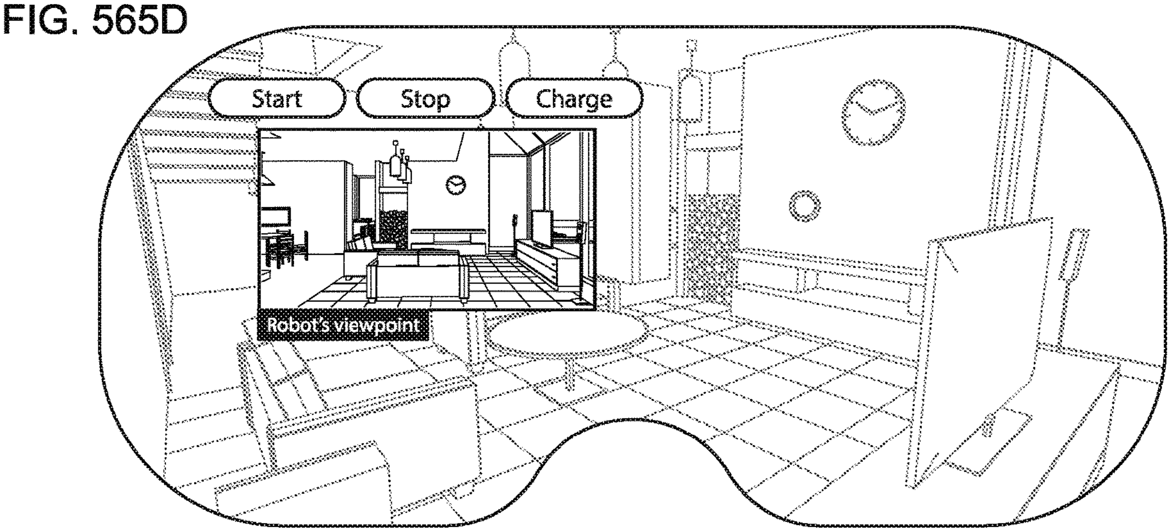
Figure 565E:
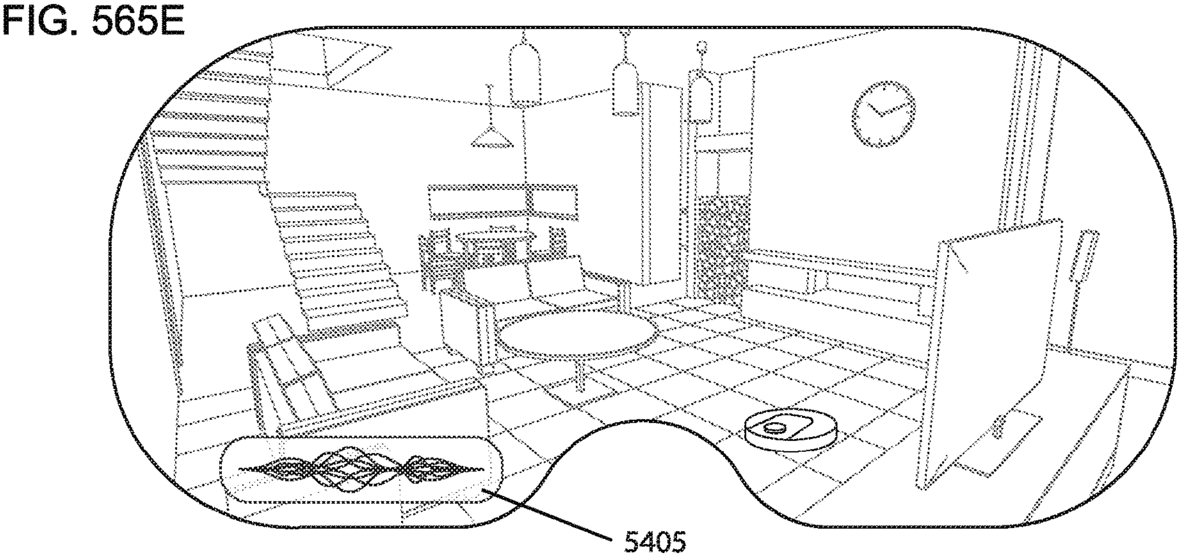

In some embodiments, a user controls the robot via a virtual reality (VR), an augmented reality (AR), or an extended reality (XR) headset. The user may view a virtual menu 5400 within a headset 5401 and choose a desired command, as illustrated in FIG. 565A. The headset may be equipped with an eye tracking system to control a pointer 5402 within the viewport area. In some cases, there may be additional information (e.g., schedule, runtime, coverage, debris, path, etc.) superimposed onto the headset viewport. For example, FIG. 565B illustrates run time duration 5403 is placed on top of the viewport in 2D and its location is linked to the viewport area. Coverage 5404 is also displayed in the viewport in 3D and its location is linked to the environment. In AR enabled headsets, the user may be able to virtually press buttons on the robot upon viewing them in the viewport. In AR enabled headsets, the user may access a virtual control panel of the robot when viewing the robot in the viewport, as illustrated in FIG. 565C. The user may switch the viewport of the environment with or access a viewport of the robot to view what the robot views, as illustrated in FIG. 565D. This may be helpful for survey robots, medical robots, patrolling and security robots, telepresence robots, etc. In some cases, the user may verbally command the robot using a voice assistant (e.g., Siri, Google, Bixby, Alexa, etc.) through the headset. FIG. 565E illustrates a verbal command 5405 received by the voice assistant of the headset 5401. In some embodiments, VR, XR, and AR headsets may be equipped with external controllers or gloves to control the pointer 5402 within the viewport area. Gloves are useful tools for recognizing hand gestures and may therefore be used for manual control of the robot wherein different hand gestures may be programmed to trigger different robot behaviors. For example, moving the hand to the right or left may be an indicator for the robot to turn right or left. Or a twisting first may be an indicator for the robot to start work. Or extension of an open hand and fingers may be an indicator for the robot to stop. FIG. 566 illustrates a glove 5500 with sensors 5501 used to sense gestures of the hand and various gestures of the hand 5502. Overall, controlling the robot using gloves provides a more active method of controlling the robot and may not be a most user-friendly method for controlling autonomous robots.

The invention claimed is:

1. A method of composing a plurality of semi-enclosed floor surface constituents for digitally representing a fully enclosed floor surface on a screen of a smart computing device paired with a robot, comprising:

composing, with a processor of the robot, in real-time, upon first startup of the robot, and as the robot moves on a floor surface, digital representations of boundary lines of the floor surface by organizing a swarm of points to form the boundary lines, wherein:

the swarm of points are formed based on at least light bouncing off of a wall or an obstacle captured by a sensor disposed on the robot; and a location of a boundary line corresponds to a location where the floor surface ends and a wall begins;

composing, with the processor of the robot, in real-time, and as the robot moves on the floor surface, digital representations of the plurality of semi-enclosed floor surface constituents by organizing the digital representations of the boundary lines as they are composed to form the digital representations of the plurality of semi-enclosed floor surface constituents, wherein:

an inner surface of each digital representation of a semi-enclosed floor surface constituent is semi-enclosed by digital representations of respective boundary lines;

the application displays, on the screen of the smart computing device, the digital representations of the plurality of semi-enclosed floor surface constituents as they are composed in real-time; and each digital representation of a semi-enclosed floor surface constituent is displayed in a different color; and composing, with the processor of the robot, in real-time, and as the robot moves on the floor surface, the digital representation of the fully enclosed floor surface using the digital representations of the plurality of semi-enclosed floor surface constituents as they are composed, wherein:

the digital representation of the fully enclosed floor surface is composed by iteratively connecting an inner surface of a new digital representation of a semi-enclosed floor surface constituent as it is composed to an inner surface of a previously composed digital representation of a semi-enclosed floor surface constituent, until the digital representation of the fully enclosed floor surface is complete;

the application displays, on the screen of the smart computing device, an inner surface of each digital representation of a semi-enclosed floor surface constituent in a different color of a color pallet as each digital representation of a semi-enclosed floor surface constituent is composed in real-time; and the application displays, on the screen of the smart computing device, the digital representation of the fully enclosed floor surface as it is composed and in completed form.

2. The method of claim 1, wherein the boundaries of the digital representation of each semi-enclosed floor surface constituent is displayed in a same color or a color of a background.

3. The method of claim 1, wherein:

each of the plurality of the semi-enclosed floor surface constituents represents a room; and the fully enclosed floor surface represents a floor plan.

4. The method of claim 1, wherein the application displays, on the screen of the smart computing device, the digital representation of the fully enclosed floor surface and the individually colored inner surface of each digital representation of a semi-enclosed floor surface constituent prior to an end of a first work session of the robot.

5. The method of claim 1, further comprising:

receiving, with the application, via the screen of the smart computing device, at least one input designating a division of a particular digital representation of a semi-enclosed floor surface constituent into two digital representations of two smaller semi-enclosed floor surface constituents, wherein:

the application displays, on the screen of the smart computing device, the particular digital representation of the semi-enclosed floor surface constituent in a single color prior to its division; and upon division of the particular digital representation of the semi-enclosed floor surface constituent, the application displays, on the screen of the smart computing device, each of the two digital representations of the two smaller semi-enclosed floor surface constituents in different colors.

6. The method of claim 1, further comprising:

receiving, with the application, via the screen of the smart computing device, at least one input designating a merger of two adjacent digital representations of semi-enclosed floor surface constituents to form a single larger digital representation of a semi-enclosed floor surface constituent, wherein:

the application displays, on the screen of the smart computing device, each of the two adjacent digital representations of the semi-enclosed floor surface constituents in different colors prior to their merger; and upon merging the two adjacent digital representations of the semi-enclosed floor surface constituents, the application displays, on the screen of the smart computing device, the single larger digital representation of the semi-enclosed floor surface constituent in a single color.

7. The method of claim 6, wherein the single larger digital representation of the semi-enclosed floor surface constituent is divided into two or more smaller digital representations of semi-enclosed floor surface constituents in one or more steps to achieve a different division of the single larger digital representation of the semi-enclosed floor surface constituent into the two or more digital representations of the semi-enclosed floor surface constituents prior to their merging.

8. The method of claim 7, wherein upon merging the two or more digital representations of the semi-enclosed floor surface constituents, the single larger digital representation of the semi-enclosed floor surface constituent is displayed in a color in which one of the two or more digital representations of the semi-enclosed floor surface constituents was displayed in prior to their merging.

9. The method of claim 1, further comprising:

actuating, with the processor of the robot, the robot to move along a first movement path, wherein actuating the robot to move along the first movement path comprises at least a repetitive iteration of:

actuating, with the processor of the robot, the robot to traverse a first linear segment;

actuating, with the processor of the robot, the robot to rotate 180 degrees in a first rotation comprising traversing a first distance in a direction perpendicular to the first linear segment after starting the first rotation and before finishing the first rotation;

actuating, with the processor of the robot, the robot to traverse a second linear segment; and actuating, with the processor of the robot, the robot to rotate 180 degrees in a second rotation comprising traversing a second distance in a direction perpendicular to the second linear segment after starting the second rotation and before finishing the second rotation, wherein:

the first distance and the second distance are less than the coverage width of the robot; and the coverage width of the robot is smaller than a width of the robot and equal to a length of a cleaning tool positioned on an underside of the robot.

10. The method of claim 1, wherein:

the robot performs a coverage task upon starting up and facing towards a work area; and the robot moves along at least parallel lines while executing the coverage task, while concurrently, and in the background, executing the method of composing the digital representation of the fully enclosed floor surface.

11. The method of claim 10, wherein:

the robot begins moving along the at least parallel lines after leaving a charging station of the robot and before following along a first wall;

the robot executes the coverage task outwardly from a starting point of the robot until completion of the coverage task; and the robot performs coverage of walls as they are encountered by the robot.

12. The method of claim 1, wherein:

the swarm of points forming the boundary lines are based on light detection and ranging (LIDAR) sensor data; and one of:

the LIDAR sensor is disposed on a top surface of a body of the robot and is occluded by at least two pillars holding a LIDAR sensor cover equipped with a tactile sensor for recognizing bumps with a height exceeding a height of the top surface of the body of the robot; or the LIDAR sensor is disposed within the body of the robot directly under the top surface and front facing, with at least a rear of the LIDAR sensor occluded.

13. The method of claim 1, wherein:

a camera is disposed on the robot;

the camera captures images along a trajectory of the robot; and the images comprise meta data including one of a time stamp of a time a respective image was captured and a location or a coordinate of the camera at a time the respective image was captured.

14. The method of claim 13, further comprising:

detecting, with the processor of the robot, objects in the images.

15. The method of claim 14, further comprising:

actuating, with the processor of the robot, the robot to alter a planned path of the robot based on default settings or user-provided instructions.

16. The method of claim 1, further comprising:

detecting, with the processor of the robot, in real-time, a sudden and unexpected displacement of the robot; and adjusting, with the processor of the robot, a location of the robot within the digital representation of the fully enclosed floor surface while maintaining an integrity of the digital representation of the fully enclosed floor surface.

17. The method of claim 16, wherein the processor of the robot maintains the integrity of the digital representation of the fully enclosed floor surface up to a displacement exceeding a diameter of the robot.

18. The method of claim 16, wherein the application displays, on the screen of the smart computing device, a path of the robot including a line indicative of the displacement within the digital representation of the fully enclosed floor surface.

19. The method of claim 1, wherein:

a second planned path of the robot for a coverage task performed during a second run improves after execution of a first planned path of the robot for the coverage task performed during a first run; and the improved second planned path completes the coverage task in less time than the first planned path completes the coverage task.

20. The method of claim 1, wherein control functions of the robot, sensor readings captured by sensors disposed on the robot, path planning methods, mapping methods, and room detection methods are all processed on a single microcontroller.

21. The method of claim 1, wherein:

data is transmitted from the robot to the cloud;

the data is accessible using the application; and the data is encrypted to prevent a third party, a manufacturer of the robot, a cloud service provider, or an unintended party from viewing the data.

22. The method of claim 1, wherein:

the robot comprises a camera disposed on a front side of the robot forward-facing;

the camera captures images of light emitted by the at least one illuminator onto obstacles; and the method further comprises:

recognizing, with the processor of the robot, an obstacle type of obstacles based on the captured images, wherein possible obstacle types comprises at least a wire, a toy, a garment, socks, shoes, animal feces, and furniture; and actuating, with the processor of the robot, the robot to perform a particular action based on the obstacle type.

23. The method of claim 22, wherein an illuminator is disposed on a front side of the robot forward-facing and operates in tandem with the camera for obstacle detection.

24. The method of claim 22, wherein the application displays, on the screen of the smart computing device, an obstacle type of each obstacle or an icon associated with the obstacle type at a location of the respective obstacle within the digital representation of the fully enclosed floor surface.

25. The method of claim 22, wherein the processor determines the obstacle type using a neural network algorithm trained using a training set of images comprising obstacles with different obstacle types.

26. The method of claim 24, where in the user corrects the obstacle type or the icon associated with the obstacle type using the application.

27. The method of claim 1, wherein:

the robot comprises at least two cleaning tools; and a speed of at least one of the two cleaning tools is based on a type of the floor surface or settings configured by a user using the application.

28. The method of claim 1, wherein pairing the application with the robot comprises:

a one-time exchange of information between the processor of robot and the application while the smart computing device is positioned within a proximity of the robot; or scanning a QR code displayed by the application, on the screen of the smart computing device, using a camera disposed on the robot.

29. The method of claim 1, wherein:

each of the plurality of the semi-enclosed floor surface constituents represents a room; and the robot finishes cleaning a first room prior to cleaning a next room of a plurality of rooms within the fully enclosed floor surface.

30. The method of claim 1, further comprising:

receiving, with the application, via the screen of the smart computing device, at least one input designating an instruction for the robot to clean an area in close proximity to a particularly labelled obstacle; and actuating, with the processor of the robot, the robot to execute the instruction.

31. The method of claim 1, further comprising:

receiving, with a home assistant paired with the robot, a verbal instruction for the robot to clean an area in close proximity to a particular labelled object or an area; and actuating, with the processor of the robot, the robot to execute the instruction.

32. The method of claim 1, further comprising:

capturing, with a floor sensor disposed on the robot, data indicative a floor type of the floor surface; and adjusting, with the processor of the robot, an impeller motor speed to reduce or increase suction based on the floor type, wherein the impeller motor speed is increased when the floor type is carpet.

33. The robot of claim 1, wherein:

the robot periodically downloads and updates a software or a firmware of the robot to include new features, enhancements, bug fixes, or newly supported language packs; and the application displays, on the screen of the smart computing device, an availability of a new update and a status of a download or update as it occurs.

34. The method of claim 1, wherein the application:

displays, on the screen of the smart computing device, a battery level; an estimated cleaning duration required to complete cleaning in an area or a current cleaning duration;

obstacles and obstacle types within the digital representation of the fully enclosed floor surface; a location of a docking station of the robot within the digital representation of the fully enclosed floor surface; a robot status; a quantity of area cleaned; cleaning history;

and firmware information; and receives, via the screen of the smart computing device, at least one input designating a schedule for cleaning different areas; an instruction to vacuum or mop or vacuum and mop different areas; a suction level for cleaning different areas; a no-entry zone; a modification to the digital representation of the fully enclosed floor surface; an addition, a modification, or a deletion of a name of an area; an instruction to find the robot; an instruction for the docking station to empty a dustbin of the robot into a bin of the docking station; and an instruction for the robot to navigate to a particular object or area for cleaning.

35. The method of claim 34, wherein the application further:

displays, on the screen of the smart computing device, a path of the robot; and a location of the robot within the digital representation of the fully enclosed floor surface; and receives, via the screen of the smart computing device, at least one input designating a fluid flow rate level for mopping different areas; and an instruction for the docking station to refill a container of the robot with cleaning solution or water.

36. The method of claim 1, further comprising:

determining, with the processor of the robot, an amount of uncovered area remaining for coverage by the robot during a work session when a battery level of the robot is below a predetermined threshold;

determining, with the processor of the robot, a battery level required to complete coverage of the uncovered area; and actuating, with the processor of the robot, the robot to return to a docking station to recharge a battery of the robot to at least the battery level required to complete coverage of the uncovered area then resume the work session.

37. The method of claim 1, wherein all data is processed on the robot, wherein no data processing is offloaded from the robot to the cloud.

38. The method of claim 1, further comprising:

determining, with the processor of the robot, a location and a size of an obstacle based on at least a portion of sensor data captured by sensors disposed on the robot; and adjusting, with the processor of the robot, a path of the robot based on the location and the size of the obstacle.

39. The method of claim 1, wherein:

the robot comprises a camera, a microphone, and a speaker for video calling;

the application streams, on the screen of the smart computing device, a video and audio captured by the camera and the microphone of the robot, respectively; and the robot streams audio captured by a microphone of the smart computing device.

40. The method of claim 1, wherein the robot comprises a built-in home assistant configured to receive voice commands from a user.

41. The method of claim 1, further comprising:

determining, with the processor of the robot, a location of a user based on audio data captured by at least one microphone disposed on the robot, wherein the audio data comprises a voice of the user spoken from the location; and actuating, with the processor of the robot, the robot to navigate to the location of the user.

42. The method of claim 1, wherein:

a digital representation of a fully enclosed floor surface is generated for each floor level of a plurality of floor levels within an environment; and the user selects a floor level on which the robot is located using the application.

43. The method of claim 1, wherein the processor of the robot autonomously recognizes which floor level and room the robot is currently located within based on at least a portion of sensor data captured by sensors disposed on the robot and the digital representations of fully enclosed floor surfaces corresponding to different floor levels.

44. The method of claim 1, wherein:

the robot comprises at least:

an impeller motor for generating suction to collect debris from the floor surface; and a dust bin for storing the collected debris; and the robot docks at a docking station comprising at least:

charging contacts for recharging a battery of the robot upon contact with corresponding charging contacts of the robot;

an impeller motor for generating suction to collect debris from a dust bin of the robot; and a bin for storing the debris collected from the dust bin of the robot.

45. The method of claim 44, wherein:

the robot docks at the docking station upon each of completion of a work episode; an input provided to an interface of the robot or the application via the screen of the smart computing device instructing the robot to dock; and meeting a preset configuration for emptying the dust bin of the robot;

the preset configuration comprises at least an amount of volume of debris within the dust bin of the robot; and the robot resumes cleaning after emptying the dust bin of the robot into the bin of the docking station when the dust bin of the robot is emptied during a work session.

46. The method of claim 44, wherein:

the robot further comprises a mopping apparatus, comprising:

a first container for storing cleaning solution or water for mopping; and at least one mopping pad for mopping the floor surface;

the docking station further comprises:

a first reservoir for storing cleaning solution or water; and a first mechanism for refilling the first container of the robot with cleaning solution or water from the first reservoir of the docking station; and the robot docks at the docking station to refill the first container of the robot with cleaning solution or water upon a volume of the cleaning solution falling below a predetermined threshold; and the robot resumes cleaning after refilling the first container of the robot from the first reservoir of the docking station when the first container is refilled during a work session.

47. The method of claim 46, wherein:

the mopping apparatus further comprises:

a first mechanism for moving at least one component of the mopping apparatus in a first direction and a second direction opposite the first direction on a plane parallel to the floor surface; and a second mechanism for adjusting a distance of the at least one mopping pad in relation to the floor surface in a direction perpendicular to the floor surface; and the method further comprises:

receiving, with the application, via the screen of the smart computing device, at least one input designating an adjustment to a speed of alternating between the first direction and the second direction;

determining, with the processor of the robot, a floor type of the floor surface based on sensor data captured by a floor sensor disposed on the robot; and actuating, with the processor of the robot, the second mechanism to increase the distance of the at least one mopping pad in relation to the floor surface when the floor type is carpet, the robot is positioned at the docking station, and the robot is finished mopping.

48. The method of claim 47, further comprising:

adjusting, with the processor of the robot, the speed of alternating between the first direction and the second direction upon detection of a dried stain on the floor surface.

49. The method of claim 47, further comprising:

actuating, with the processor of the robot, the second mechanism to move the at least one mopping pad downwards to apply a downward pressure onto the floor surface during mopping.

50. The method of claim 47, wherein the docking station further comprises:

a second mechanism for washing the at least one mopping pad after mopping the floor surface;

a second reservoir for storing liquid sewage from washing the at least one mopping pad; and a third mechanism for transferring the liquid sewage to the second reservoir.

51. The method of claim 50, wherein:

the second mechanism uses cleaning solution or water from the first reservoir to wash the at least one mopping pad; and the at least one mopping pad or a component of the second mechanism is in motion during washing of the at least one mopping pad.

52. The method of claim 50, wherein the docking station further comprises a heat-generating element for drying the at least one mopping pad after washing.

53. The method of claim 46, wherein the robot cleans areas that do not require mopping first.

54. A cleaning robot, comprising:

a chassis;

a set of wheels coupled to the chassis;

a plurality of sensors;

a processor; and memory storing instructions that when executed by the processor effectuate operations comprising:

composing, with the processor of the robot, in real-time, upon first startup of the robot, and as the robot moves on a floor surface, digital representations of boundary lines of the floor surface by organizing a swarm of points to form the boundary lines, wherein:

the swarm of points are formed based on at least light bouncing off of a wall or an obstacle captured by a sensor disposed on the robot; and a location of a boundary line corresponds to a location where the floor surface ends and a wall begins;

composing, with the processor of the robot, in real-time, and as the robot moves on the floor surface, digital representations of the plurality of semi-enclosed floor surface constituents by organizing the digital representations of the boundary lines as they are composed to form the digital representations of the plurality of semi-enclosed floor surface constituents, wherein:

an inner surface of each digital representation of a semi-enclosed floor surface constituent is semi-enclosed by digital representations of respective boundary lines;

the application displays, on the screen of the smart computing device, the digital representations of the plurality of semi-enclosed floor surface constituents as they are composed in real-time; and each digital representation of a semi-enclosed floor surface constituent is displayed in a different color; and composing, with the processor of the robot, in real-time, and as the robot moves on the floor surface, the digital representation of the fully enclosed floor surface using the digital representations of the plurality of semi-enclosed floor surface constituents as they are composed, wherein:

the digital representation of the fully enclosed floor surface is composed by iteratively connecting an inner surface of a new digital representation of a semi-enclosed floor surface constituent as it is composed to an inner surface of a previously composed digital representation of a semi-enclosed floor surface constituent, until the digital representation of the fully enclosed floor surface is complete;

the application displays, on the screen of the smart computing device, an inner surface of each digital representation of a semi-enclosed floor surface constituent in a different color of a color pallet as each digital representation of a semi-enclosed floor surface constituent is composed in real-time; and the application displays, on the screen of the smart computing device, the digital representation of the fully enclosed floor surface as it is composed and in completed form.

55. Memory storing instructions that when executed by a processor of a robot effectuate operations comprising:

composing, with the processor of the robot, in real-time, upon first startup of the robot, and as the robot moves on a floor surface, digital representations of boundary lines of the floor surface by organizing a swarm of points to form the boundary lines, wherein:

the swarm of points are formed based on at least light bouncing off of a wall or an obstacle captured by a sensor disposed on the robot; and a location of a boundary line corresponds to a location where the floor surface ends and a wall begins;

composing, with the processor of the robot, in real-time, and as the robot moves on the floor surface, digital representations of the plurality of semi-enclosed floor surface constituents by organizing the digital representations of the boundary lines as they are composed to form the digital representations of the plurality of semi-enclosed floor surface constituents, wherein:

an inner surface of each digital representation of a semi-enclosed floor surface constituent is semi-enclosed by digital representations of respective boundary lines;

the application displays, on the screen of the smart computing device, the digital representations of the plurality of semi-enclosed floor surface constituents as they are composed in real-time; and each digital representation of a semi-enclosed floor surface constituent is displayed in a different color; and composing, with the processor of the robot, in real-time, and as the robot moves on the floor surface, the digital representation of the fully enclosed floor surface using the digital representations of the plurality of semi-enclosed floor surface constituents as they are composed, wherein:

the digital representation of the fully enclosed floor surface is composed by iteratively connecting an inner surface of a new digital representation of a semi-enclosed floor surface constituent as it is composed to an inner surface of a previously composed digital representation of a semi-enclosed floor surface constituent, until the digital representation of the fully enclosed floor surface is complete;

the application displays, on the screen of the smart computing device, an inner surface of each digital representation of a semi-enclosed floor surface constituent in a different color of a color pallet as each digital representation of a semi-enclosed floor surface constituent is composed in real-time; and the application displays, on the screen of the smart computing device, the digital representation of the fully enclosed floor surface as it is composed and in completed form.

56. A method of composing a plurality of semi-enclosed floor surface constituents for digitally representing a fully enclosed floor surface on a screen of a smart computing device paired with a robot, comprising:

composing, with a processor of the robot, in real-time, upon a first startup of the robot, a first digital representation of a semi-enclosed boundary, an interior of which is colored in a first color, for digitally representing a first semi-enclosed floor surface constituent, wherein:

each digital representation of a semi-enclosed boundary is composed of digital representations of boundary lines;

each digital representation of a boundary line is composed of a swarm of points;

the swarm of points are formed based on at least light bouncing off of a wall or an obstacle captured by a sensor disposed on the robot;

a location of a digital representation of a boundary line on the screen corresponds to a location where a floor surface ends and a wall begins;

composing, with the processor of the robot, in real-time, and as the robot performs work and moves on the floor surface, a second digital representation of a semi-enclosed boundary, an interior of which is colored in a second color, for digitally representing a second semi-enclosed floor surface constituent, wherein:

as new swarms of points are obtained, new digital representations of semi-enclosed boundaries, an interior of each colored in a unique color, are iteratively composed for digitally representing new semi-enclosed floor surface constituents; and composing, with the processor of the robot, in real-time, and as the robot performs work and moves on the floor surface, the digital representation of the fully enclosed floor surface using the digital representations of the plurality of semi-enclosed floor surface constituents as they are composed, wherein:

the digital representation of the fully enclosed floor surface is composed after the robot navigates the plurality of semi-enclosed floor surface constituents;

the digital representation of the fully enclosed floor surface is stored and available to the processor of the robot for future work sessions; and the digital representation of the fully enclosed floor surface is viewed on the screen of the smart computing device and accessed by a user using an application executed on the smart computing device for at least spatially granular control of the robot.

57. A method for transmitting data for displaying a fully enclosed floor surface on a screen of a smart computing device paired with a robot, comprising:

transmitting, by a processor of the robot, to an application, in real-time, and upon startup of the robot at a beginning of a first work session, sensor data associated with a first semi-enclosed floor surface constituent comprising a first digit code, wherein:

the application displays, on the screen of the smart computing device, the first digit code in a first color;

the first color displayed represents a surface area of the first semi-enclosed floor surface constituent;

the robot determines the first surface area and where a floor surface ends and a wall begins using a swarm of points; and the swarm of points are formed based on at least light bouncing off of a wall or an obstacle captured by a sensor disposed on the robot;

transmitting, by the processor of the robot, to the application, in real-time, and as the robot performs work, sensor data associated with a second semi-enclosed floor surface constituent comprising a second digit code, wherein:

the application displays, on the screen of the smart computing device, the second digit code in a second color, unique to the first color; and the second color displayed represents a surface area of the second semi-enclosed floor surface constituent;

iteratively transmitting, by the processor of the robot, in real-time, and as the robot performs work, sensor data associated with each of a plurality of semi-enclosed floor surface constituents, each comprising a unique digit code, to the application, wherein:

the application displays, on the screen of the smart computing device, each unique digit code in a unique color; and each color displayed represents a surface area of a respective semi-enclosed floor surface constituent of the plurality of semi-enclosed floor surface constituents;

transmitting, by the processor of the robot, to the application, in real-time, and as the robot performs work, sensor data associated with a last semi-enclosed floor surface constituent comprising a last digit code, wherein:

the application displays, on the screen of the smart computing device, the last digit code in a last unique color; and the last unique color displayed represents a surface area of the last semi-enclosed floor surface constituent; and composing, with the processor of the robot, in real-time, and as the robot performs work, a digital representation of the fully enclosed floor surface using the semi-enclosed floor-surface constituents, wherein:

the application displays, on the screen of the smart computing device, the digital representation of the fully enclosed floor surface as it is composed and in completed form.

* * * * *